United States Patent [19]

Lacy

[11] 4,257,098

[45] Mar. 17, 1981

[54] COMPUTER TO RECORDING MEDIUM INTERFACE

[75] Inventor: Robert H. Lacy, Bartlesville, Okla.

[73] Assignee: Phillips Petroleum Company, Bartlesville, Okla.

[21] Appl. No.: 955,905

[22] Filed: Oct. 30, 1978

[51] Int. Cl.[3] .......................... G01V 1/28; G01V 1/24

[52] U.S. Cl. ...................................... 364/200; 340/60; 340/6.3; 371/33

[58] Field of Search ............... 364/200, 900, 102, 470, 364/421, 422; 340/15.5 TS, 15.5 DP, 146.1 BA; 371/33

[56] References Cited

U.S. PATENT DOCUMENTS

| | | | |
|---|---|---|---|
| 3,654,618 | 4/1972 | Kanda et al. | 364/900 |
| 3,676,846 | 7/1972 | Busch | 340/146.1 BA |
| 3,886,494 | 5/1975 | Kostelnicek et al. | 340/15.5 TS |
| 3,930,145 | 12/1975 | Fort et al. | 340/15.5 TS |
| 3,986,008 | 10/1976 | Fort et al. | 340/15.5 DP |
| 3,996,553 | 12/1976 | Siems et al. | 340/15.5 TS |
| 4,016,531 | 4/1977 | Cook et al. | 364/200 |
| 4,104,718 | 8/1978 | Poublan et al. | 364/200 |
| 4,152,691 | 5/1979 | Ward | 340/15.5 DP |

OTHER PUBLICATIONS

Microprocessors and Microcomputers by Soucek, Published by John Wiley and Sons in 1976, pp. 208-218.

Microprocessor Based Design by Peatman, published by McGraw-Hill in 1977, pp. 180-193.

*Primary Examiner*—Charles E. Atkinson
*Assistant Examiner*—Gary Chin

[57] ABSTRACT

A central computer is utilized to control a recording medium while a peripheral computer is utilized to supply data to the recording medium for recording on magnetic tape. Method and apparatus is provided whereby an error indication is provided to the central computer if an error occurs in the transfer of data from the peripheral computer to the recording medium.

16 Claims, 76 Drawing Figures

COMPUTER TO RECORDING MEDIUM INTERFACE

This invention relates to method and apparatus for recording data. In a particular aspect of this invention relates to method and apparatus for using a central computer to control the recording medium and for using a peripheral computer to supply data to the recording medium to be recorded. In another particular aspect, this invention relates to method and apparatus for detecting an error in the transfer of data from the peripheral computer to the recording medium and providing an error indication to the central computer.

Computer systems use various types of recording mediums such as magnetic tape or semiconductor memories to store data for use within the computer system. A computer may also utilize various recording mediums to store data for use at a later time. The rate at which data is acquired and stored varies from computer system to computer system and from one type of recording medium to another type of recording medium. Generally, the complexity of a computer system will increase as the rate at which data must be acquired, processed and stored increases. Also, the power consumption and related heat dissipation problems in a computer system will increase as the rate at which data must be acquired, processed and stored increases.

As a matter of economics and simplicity in using a computer system, it is desirable to utilize a well-known and established system. However, in some cases, because of the high rate at which data must be handled, it is not possible to utilize a well-known and established system for data handling processes. An example of this is in seismic exploration where data must be handled at an extremely high rate.

Even though a well-known and established computer system may not be available which will handle the data rate required in a particular system, it is desirable to use a well-known and established computer system to control a recording medium, in which data is being recorded, with a less well-known and established, but faster, computer system being utilized only to manipulate the data and supply the data to the recording medium. Because the well known and established computer system is not burdened with the task of data manipulation, its capacity may be used for a multiplicity of infrequent, but vital, tasks. In this manner, the power consumption required to record the data is minimized and the expense of the computer system required to record the data is substantially reduced. Accordingly, it is an object of this invention to provide method and apparatus for using a central computer to control a recording medium and for using a peripheral computer to supply data to the recording medium to be recorded.

A peripheral computer, which is otherwise referred to as a slave computer, may be used to handle the data acquisition, processing and recording process. As used herein, the term peripheral computer refers to a computer which is under the control of another computer which is referred to herein as a central computer. In this case, the central computer will be the well-established, well-known computer system which is too slow to handle the data rates required. The peripheral computer will be the faster, less established computer system which is utilized only to handle data.

Because the peripheral computer and the recording medium may be running asynchronously, it is possible that an error may occur in the transfer of data from the peripheral computer to the recording medium. It is desirable that such an error be detected and notice that an error has been detected in the transfer of data from the peripheral computer to the recording medium be provided to the central computer. It is thus another particular object of this invention to provide method and apparatus for detecting an error in transfer of data from the peripheral computer to the recording medium and for providing an error indication of such error to the central computer.

In accordance with the present invention, method and apparatus is provided whereby a central computer is utilized to initialize the operation of a recording medium and to provide operator control of the recording medium. A peripheral computer, which is under the control of the central computer, is utilized to acquire, process and supply data to the recording medium for recording. Error detection circuitry is provided to detect the occurrence of an error in the transfer of data from the peripheral computer to the recording medium. An indication that an error has occurred in the transfer of data from the peripheral computer to the recording medium is provided to the central computer. In response to the error indication, the central computer causes the peripheral computer to retransmit the data to the recording medium to thereby correct any errors which have occurred in the previous transmission of data from the peripheral computer to the recording medium.

The error detection logic contemplated by this invention should not be confused with standard techniques well known in the present art such as parity and cyclic redundancy checks. These techniques are applied within the recording device.

Because the peripheral computer is performing several data manipulation tasks, the time required to provide or retrieve data cannot be precisely predicted. Therefore the possibility of losing data exist. Such a loss would not be detected by conventional techniques (except by a "read-back" process of each data block which would be excessively time consuming).

Other objects and advantages of the invention will be apparent from the detailed description of the invention and the appended claims, as well as from the detailed description of the drawings in which:

FIG. 1 is an illustration of a possible physical arrangement of the components of the seismic exploration system;

FIG. *2a* is a block diagram of a central recording station;

FIG. *2b* is a block diagram of the remote telemetry unit of the present invention;

Figure 2A:
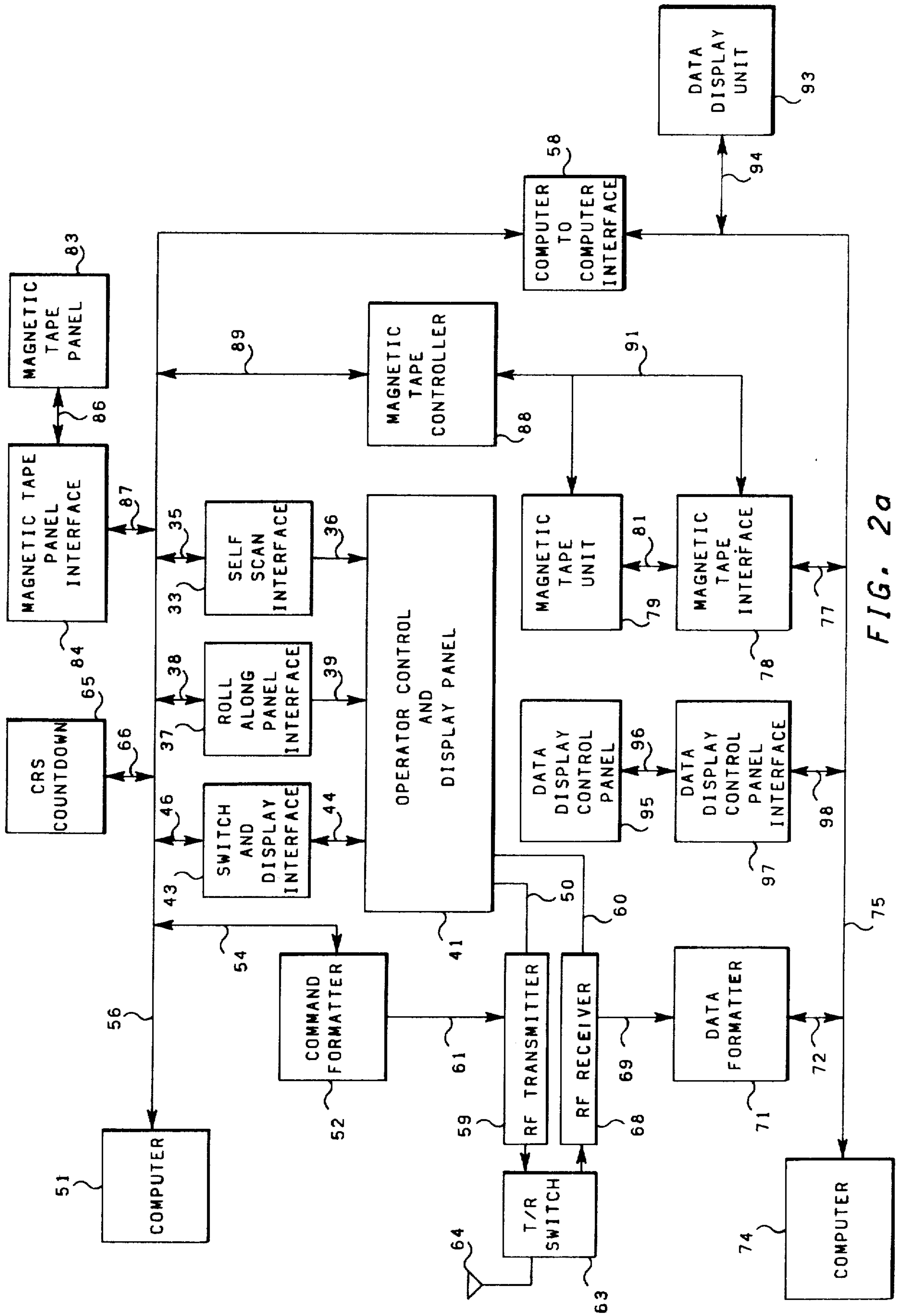
Figure 2B:
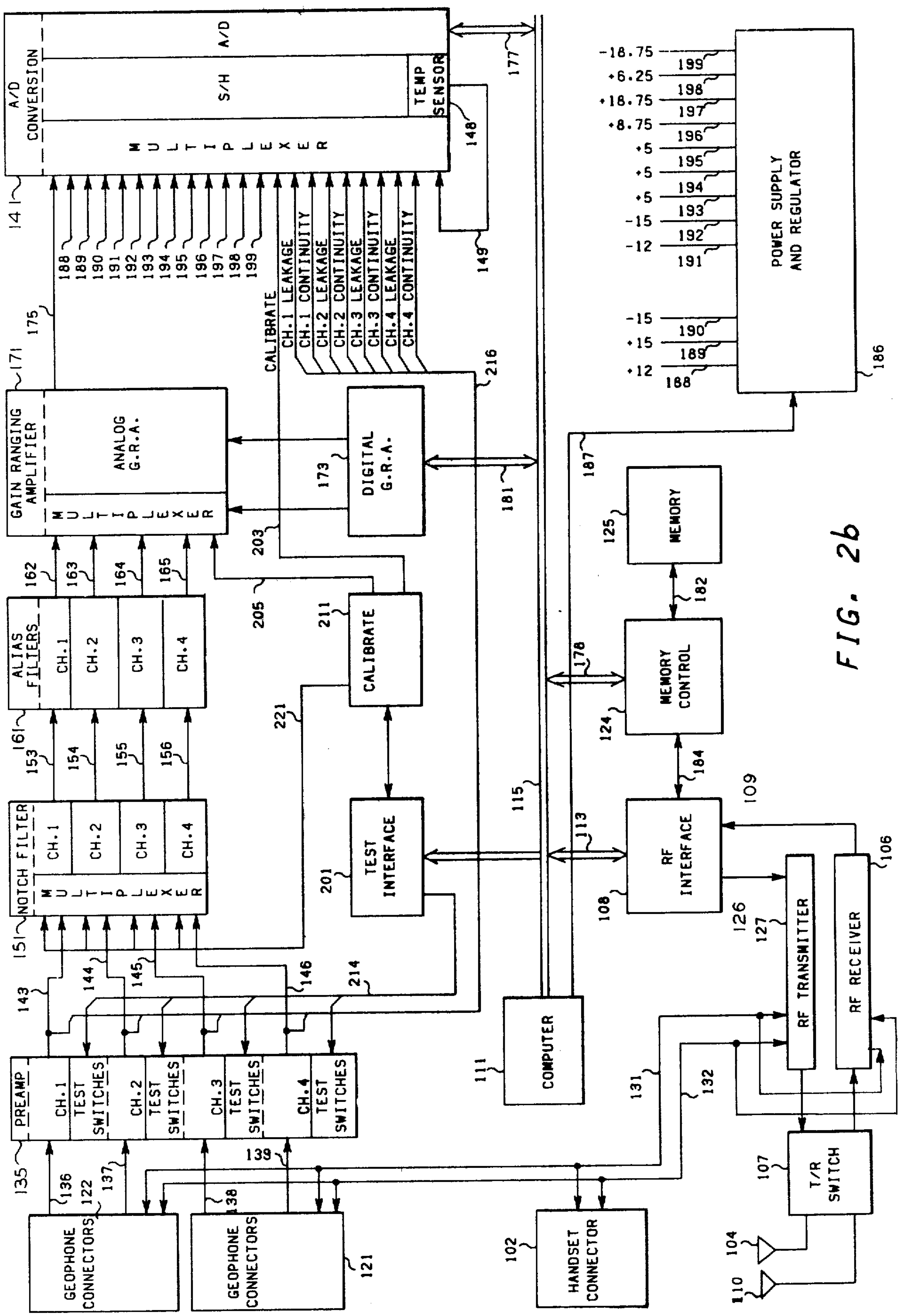
Figure 21:
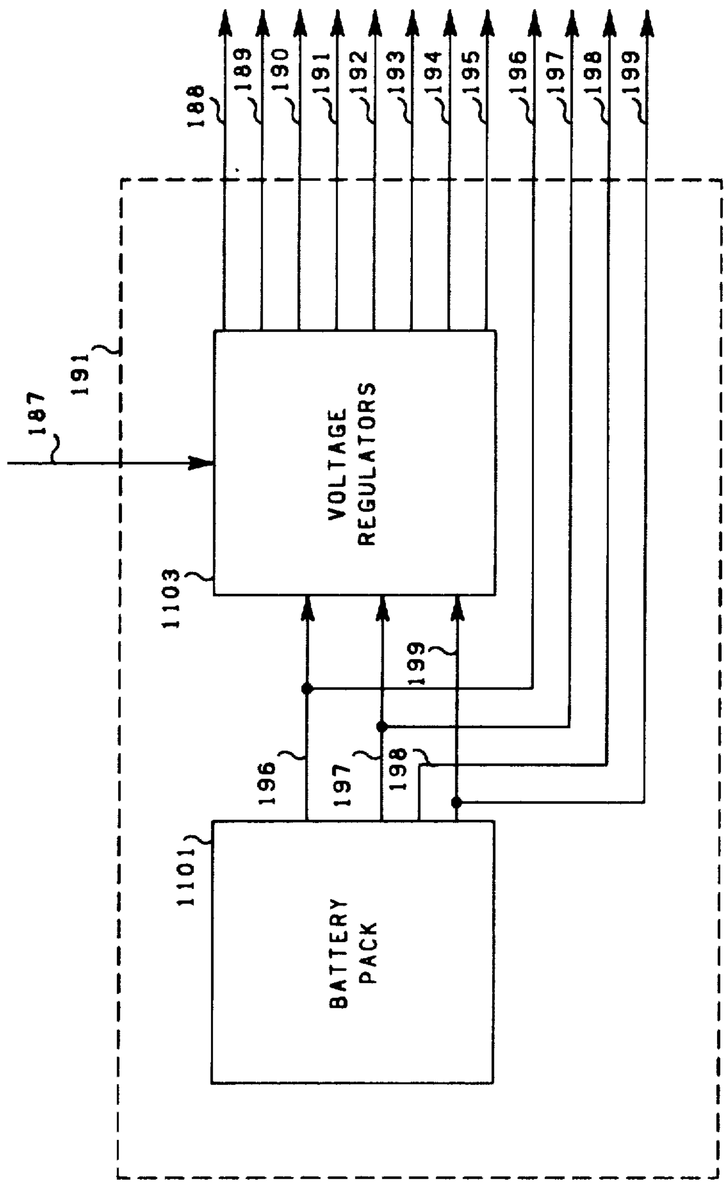
FIG. 21 is a block diagram of the power supply regulator illustrated in FIG. 2*b*.
Figure 22A:
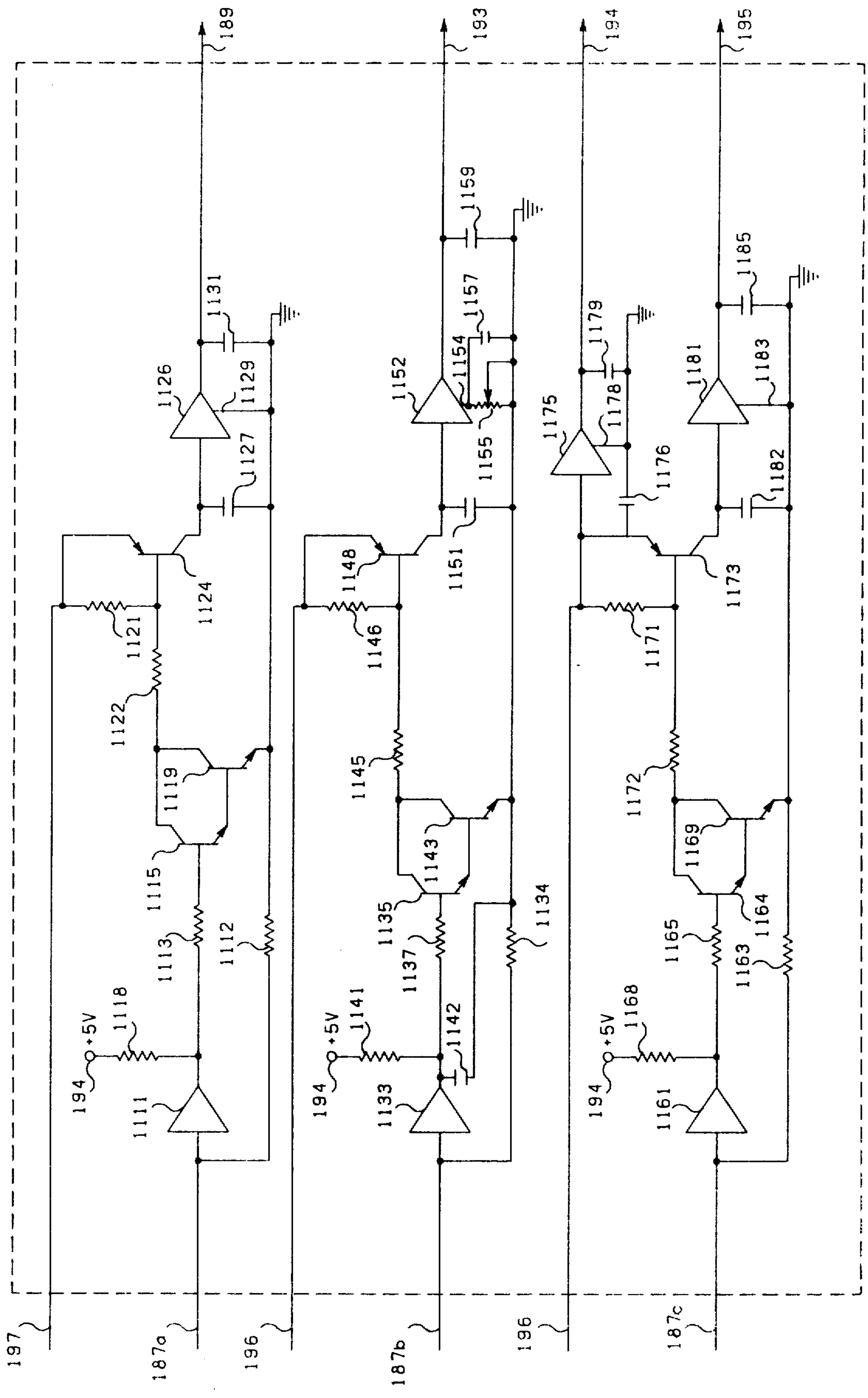
Figure 22B:
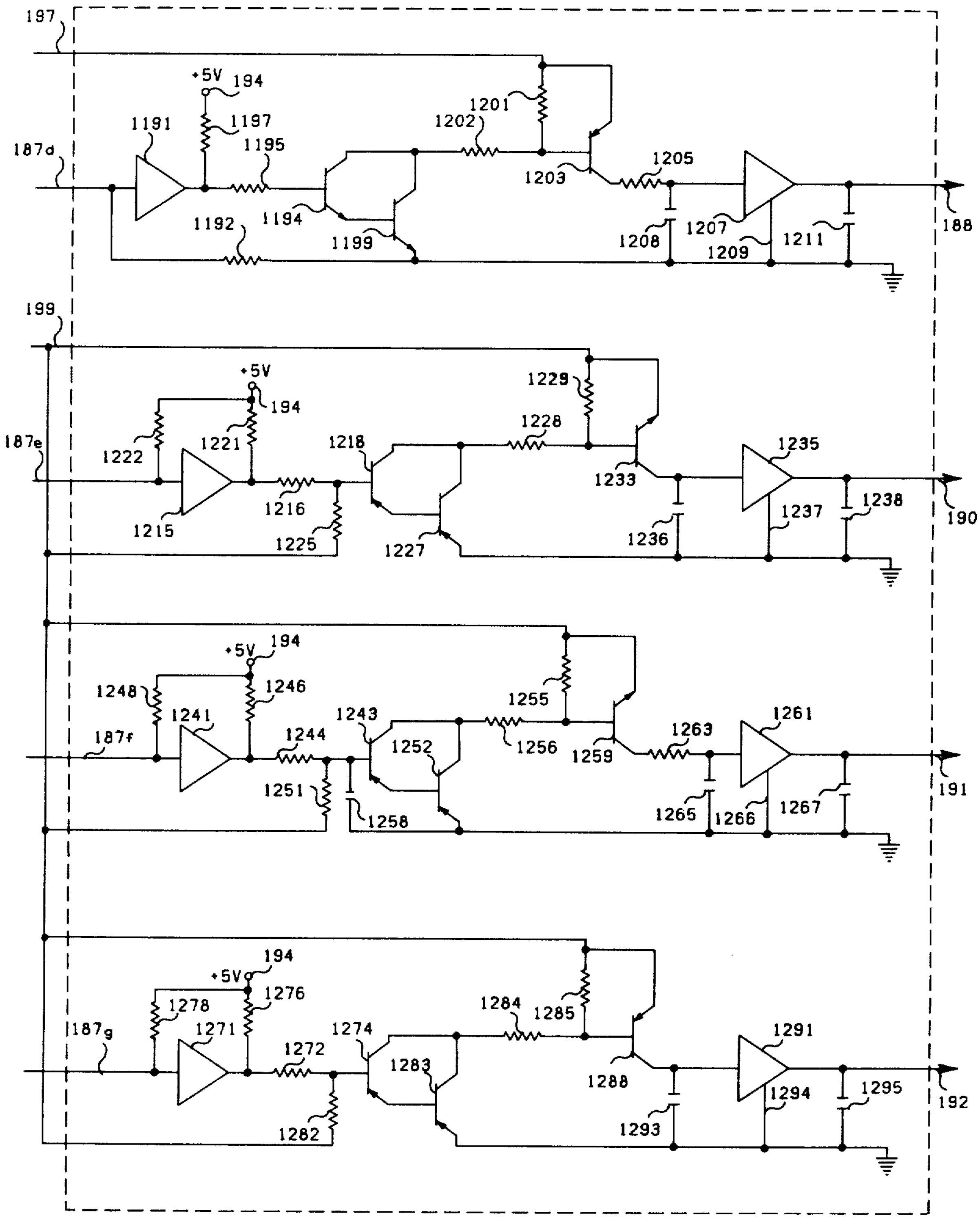
Figure 23:
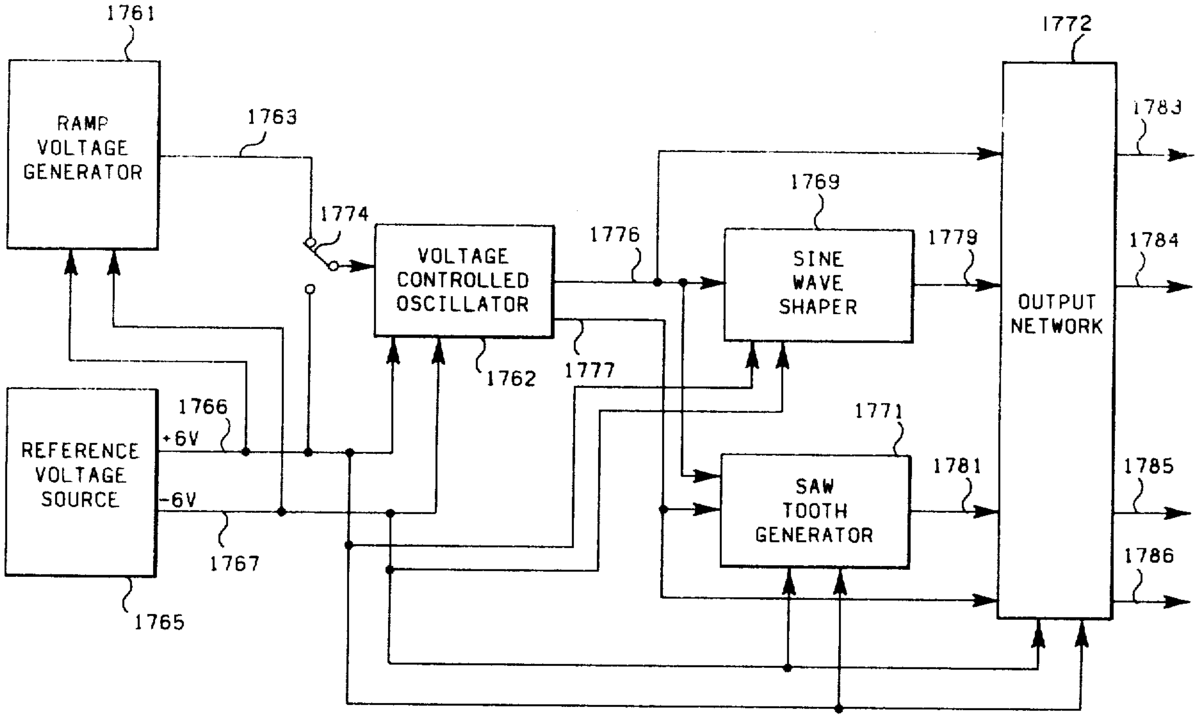
Figure 24:
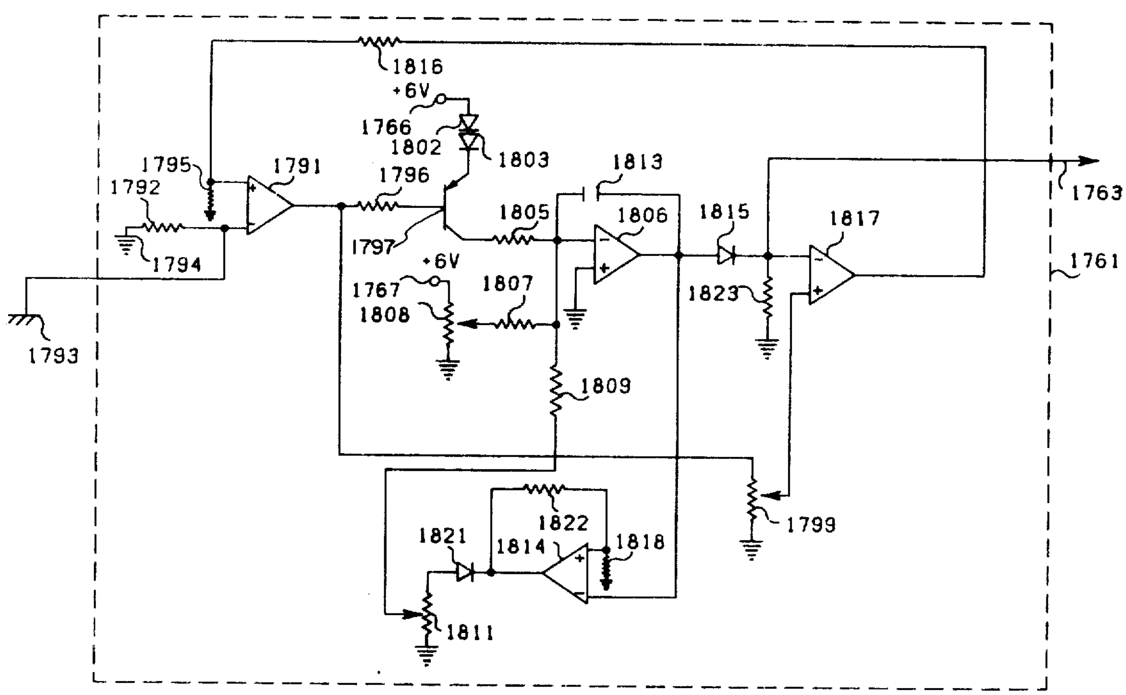
Figure 25:
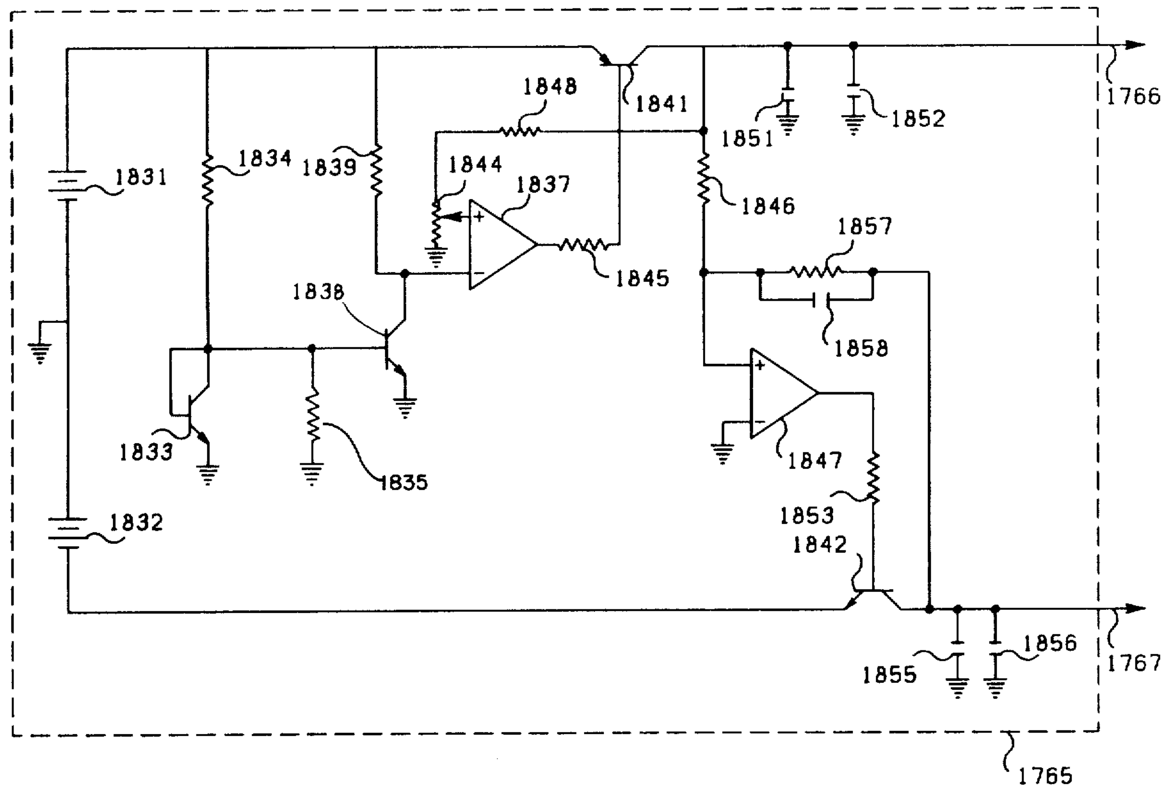
Figure 26:
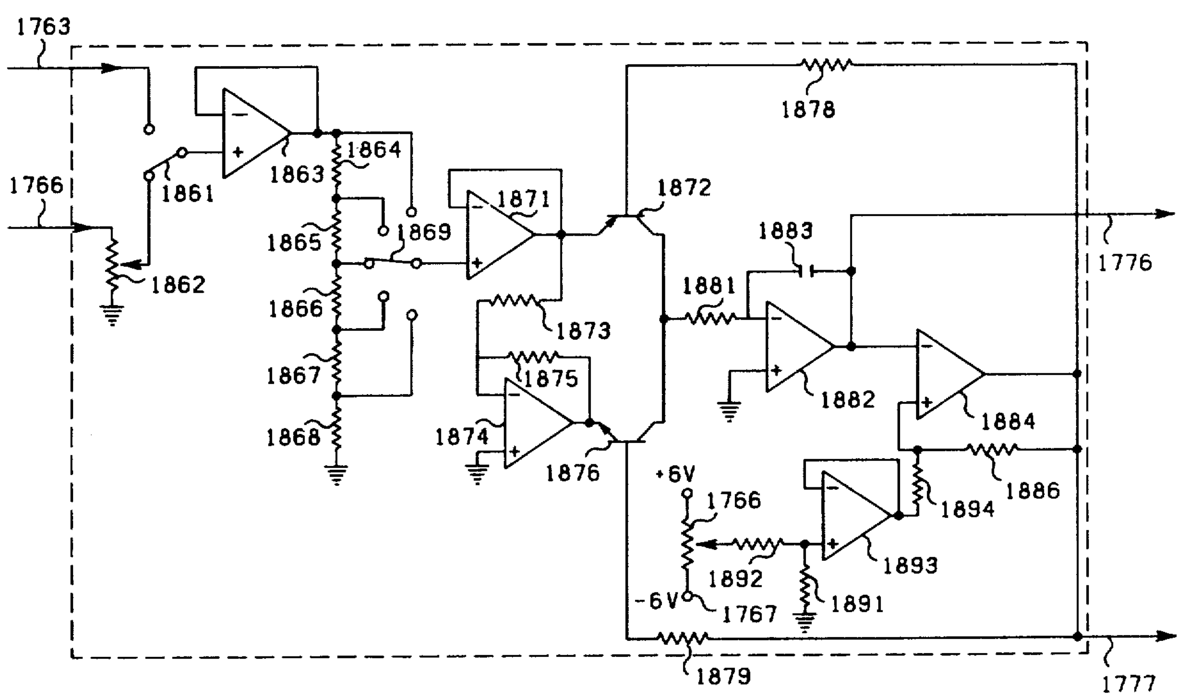
Figure 27:
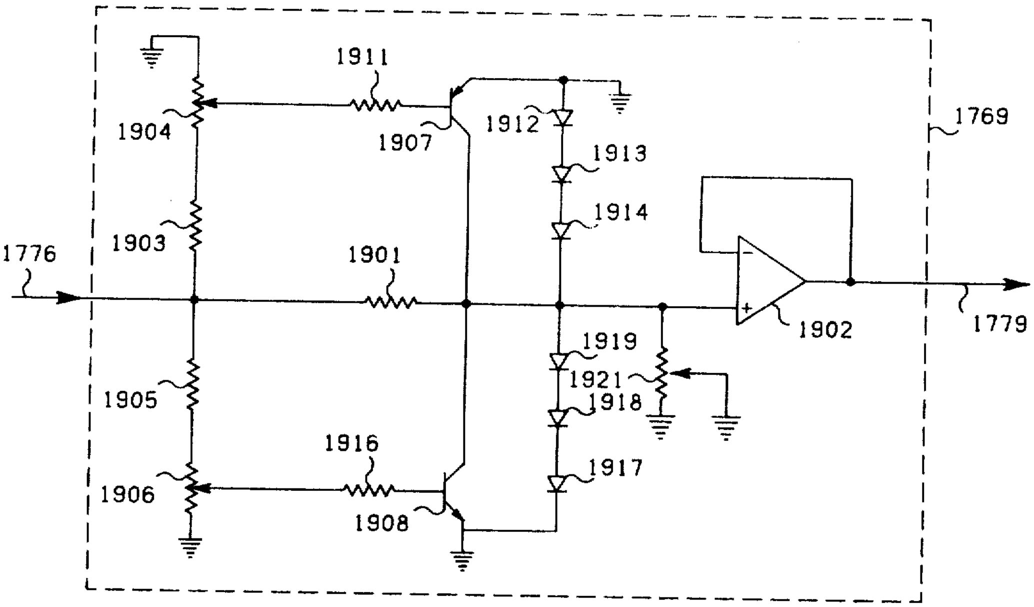
Figure 28:
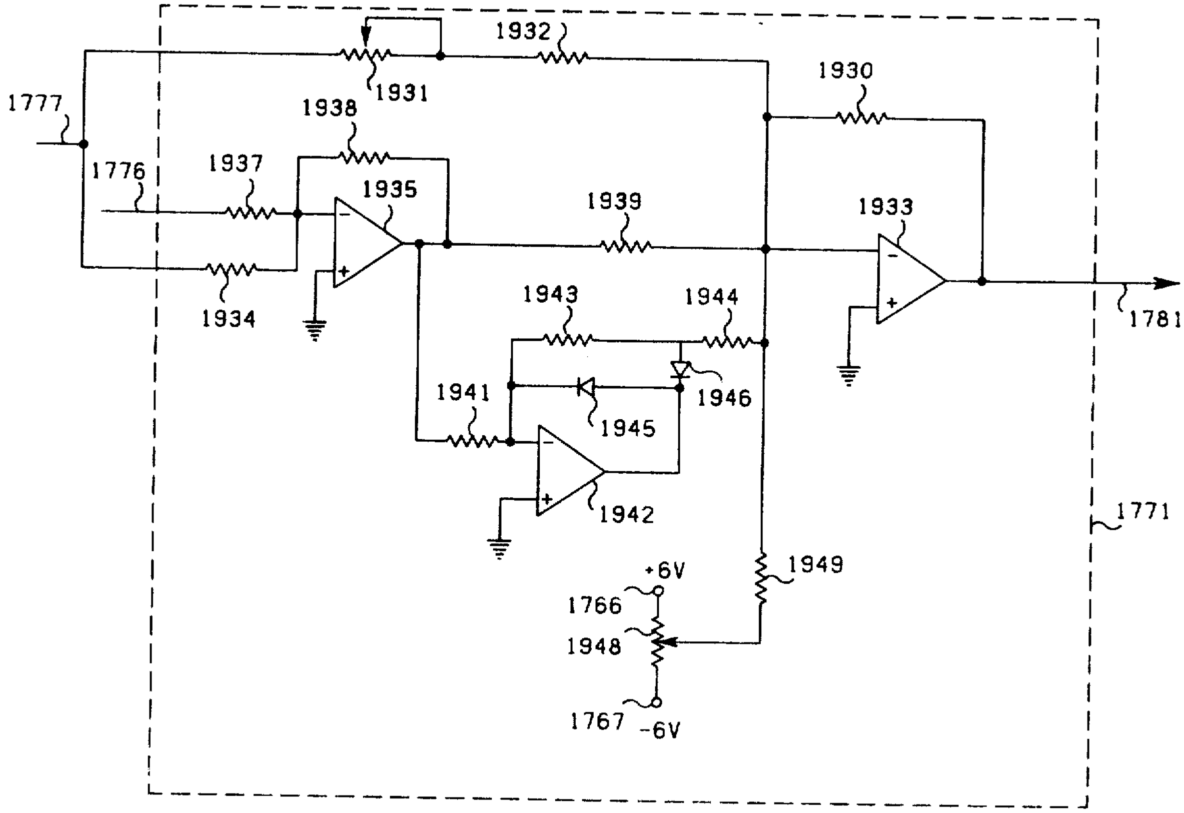
Figure 29:
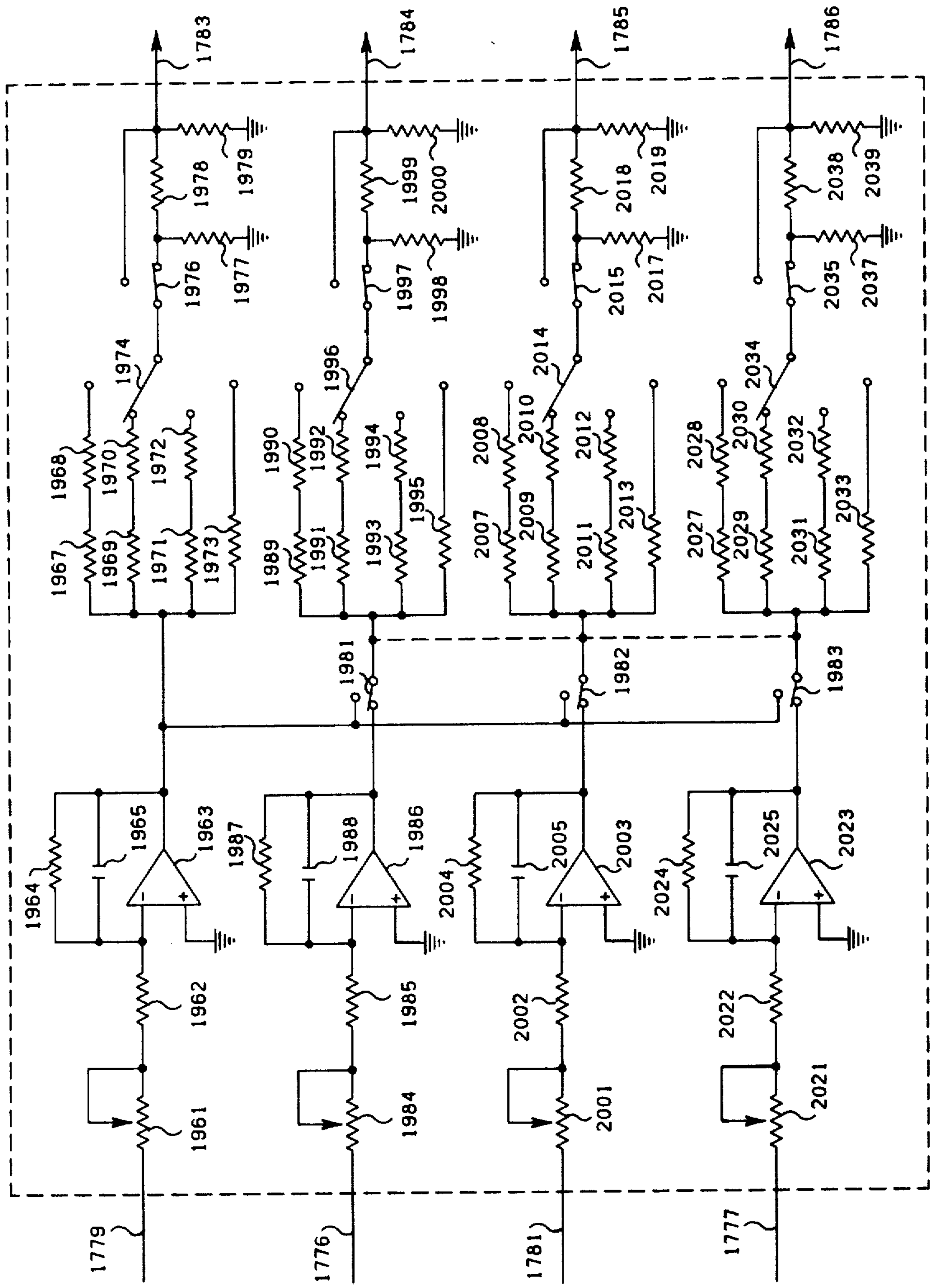
Figure 30:
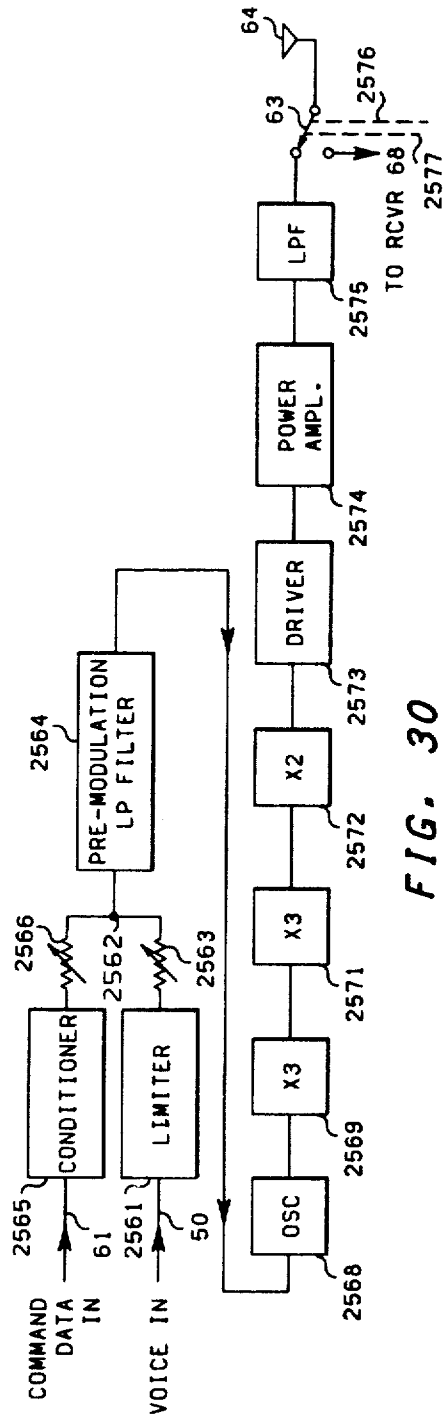
Figure 31:
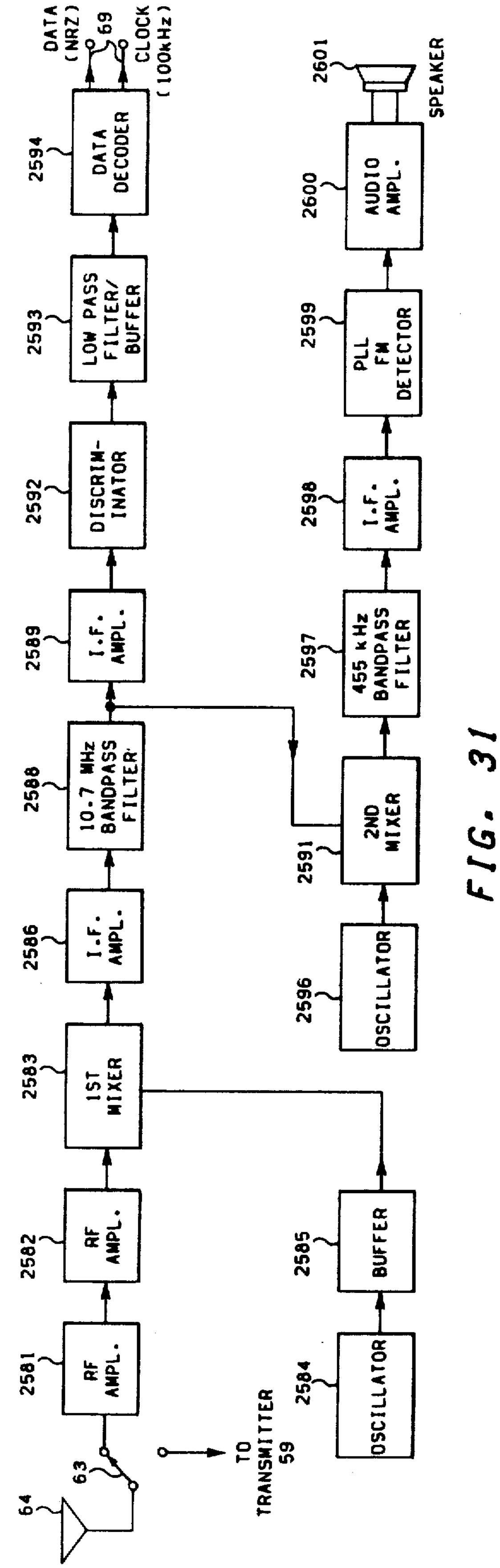
Figure 32:
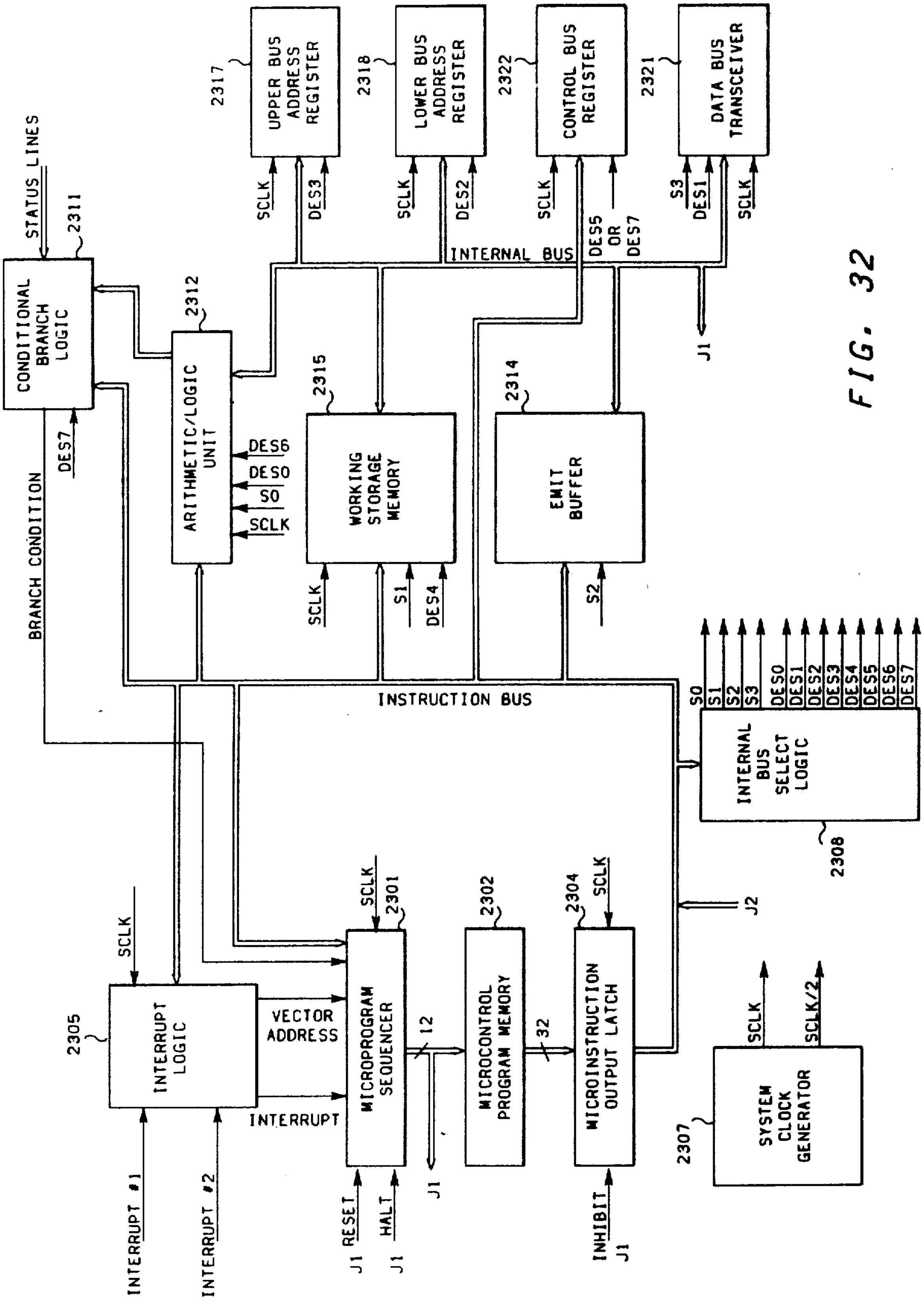
Figure 33:
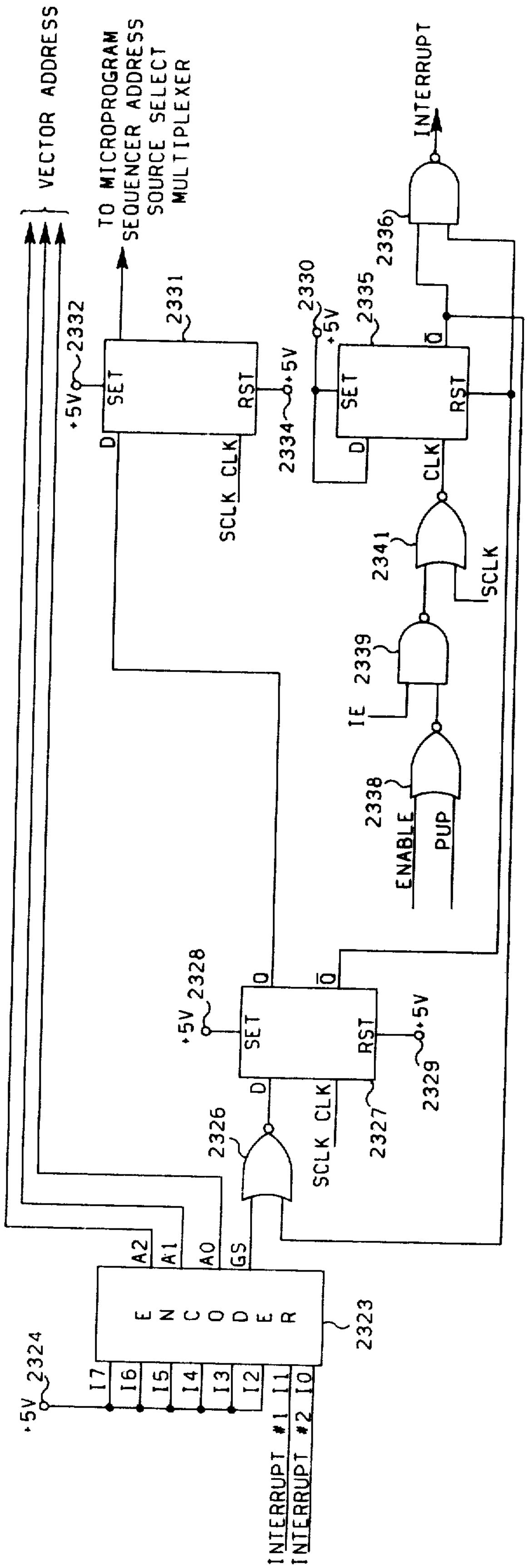
Figure 34:
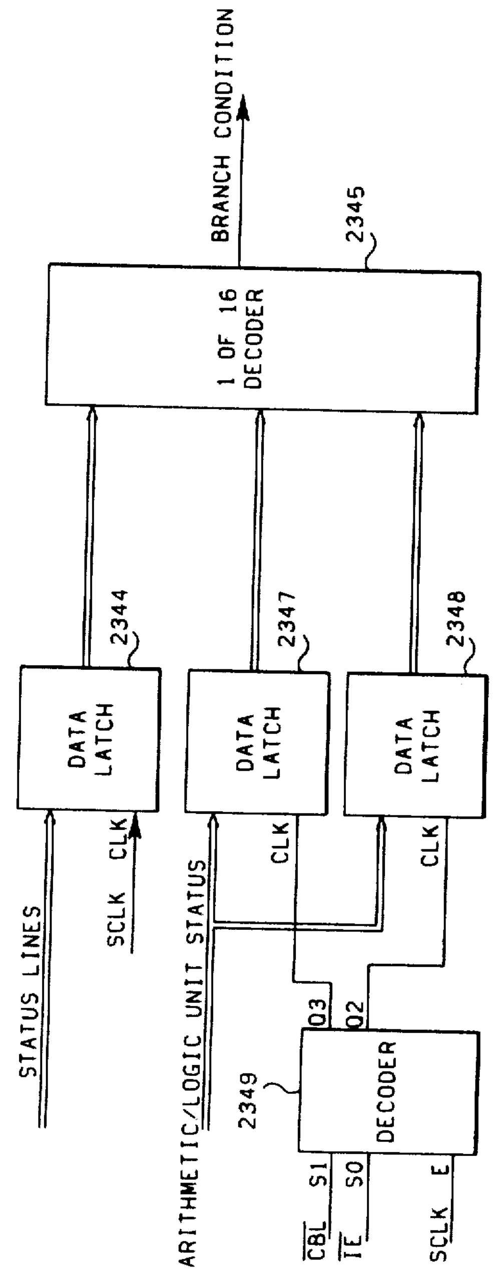
Figure 35:
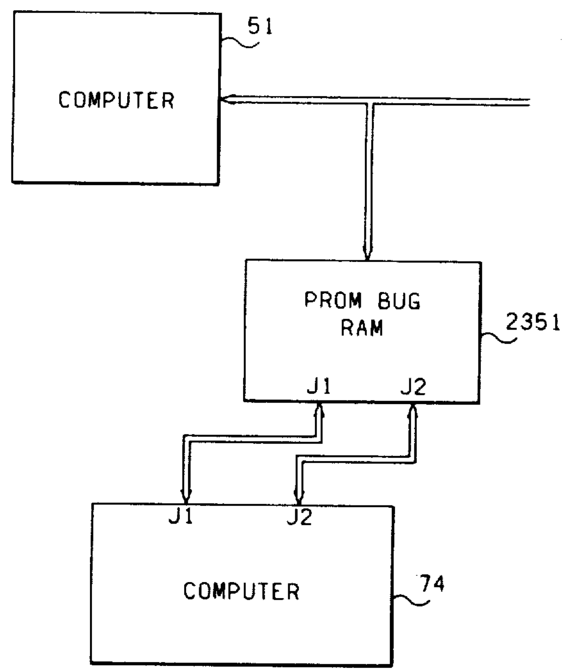
Figure 36:
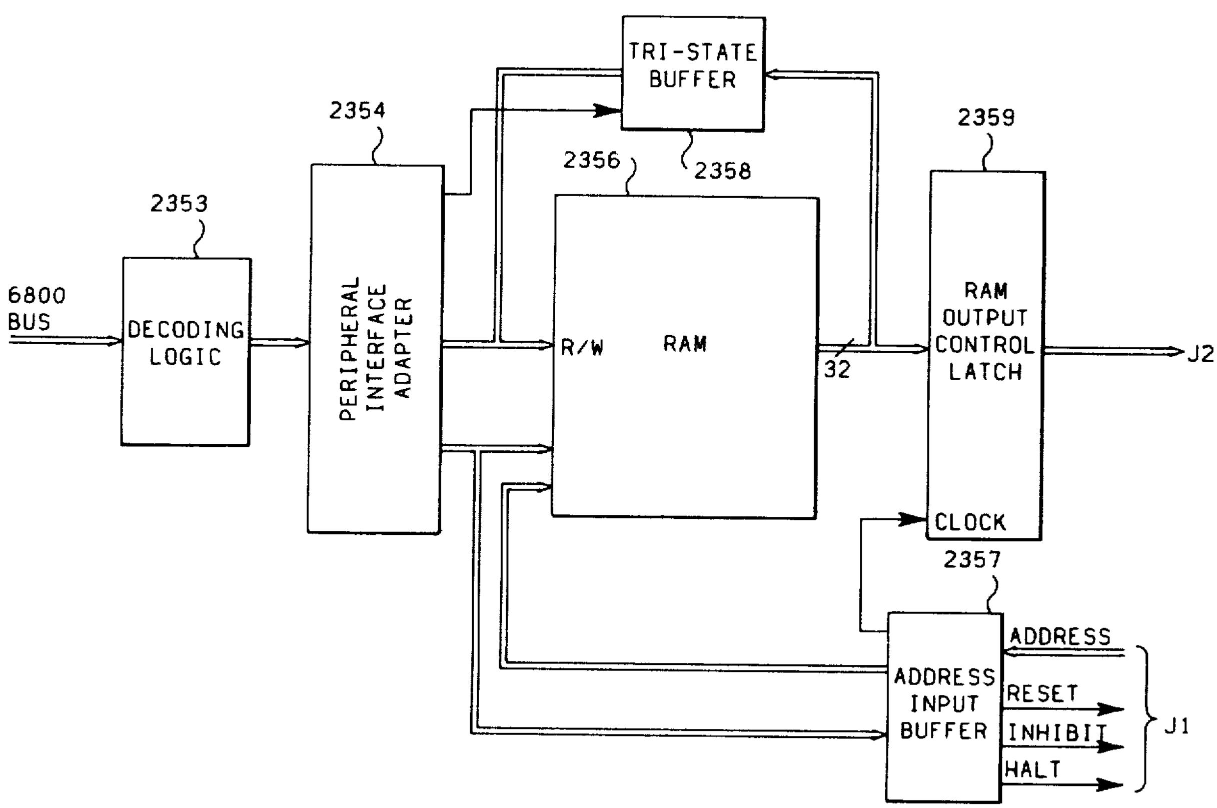
Figure 37:
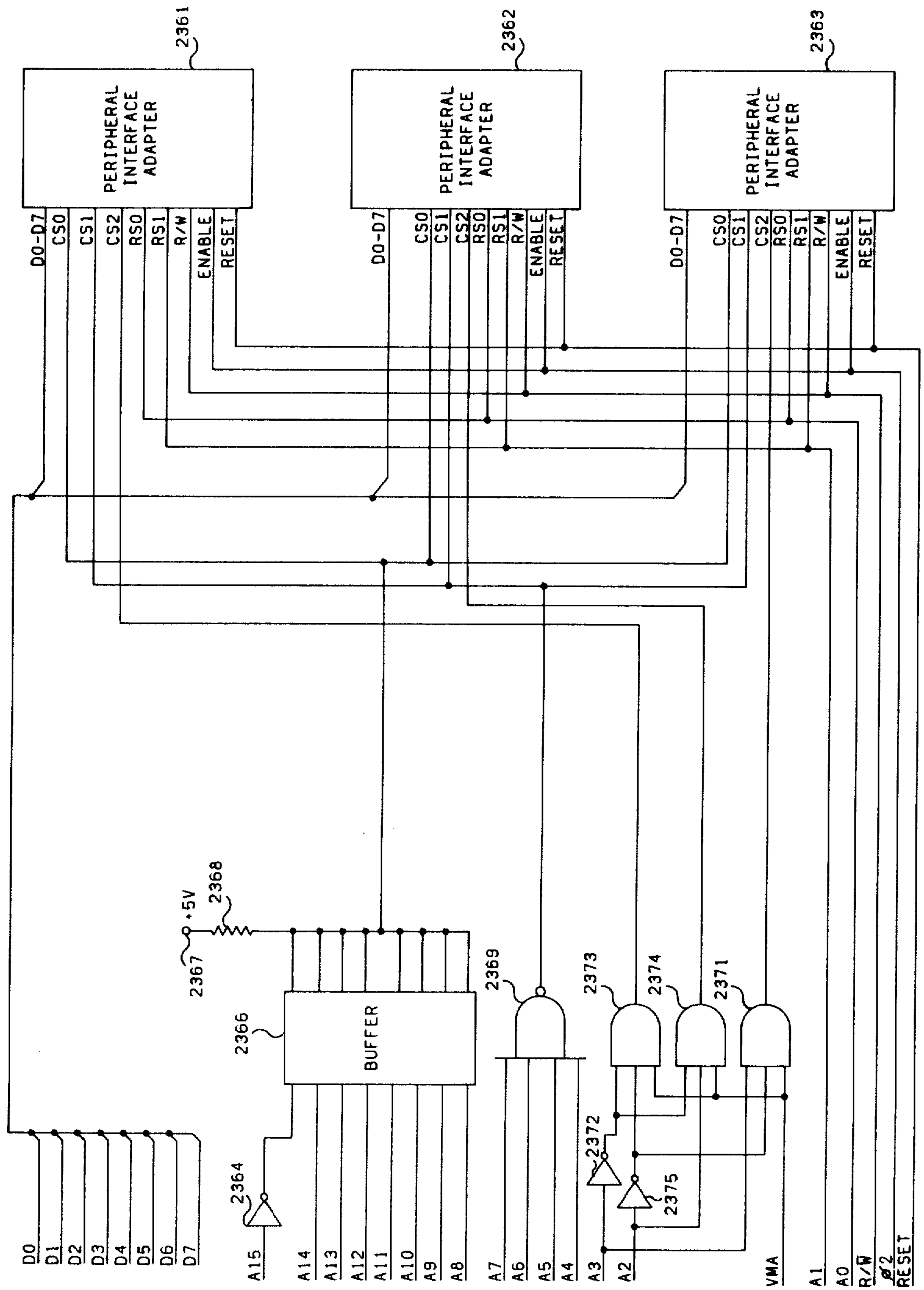
Figure 38:
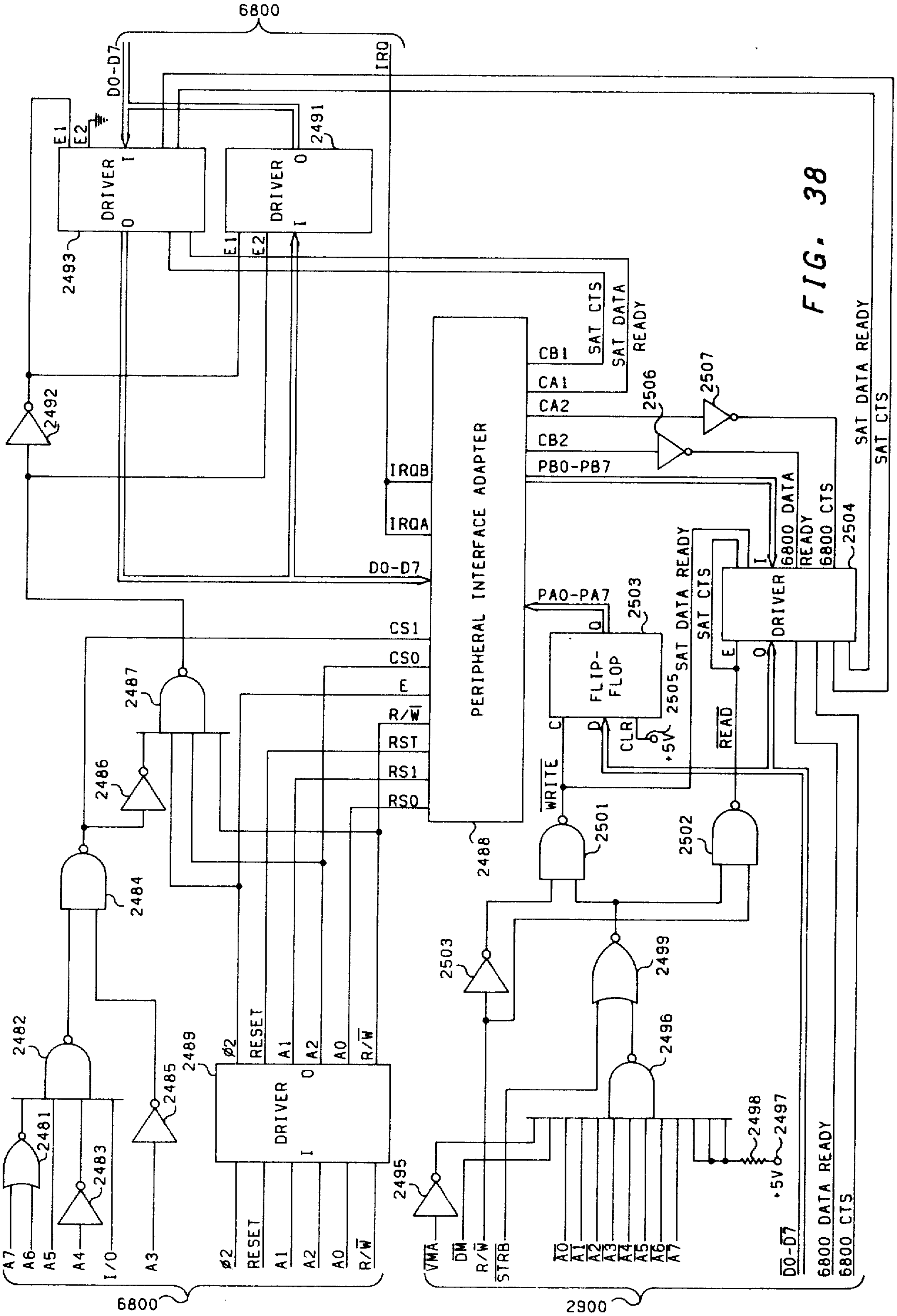
Figure 39:
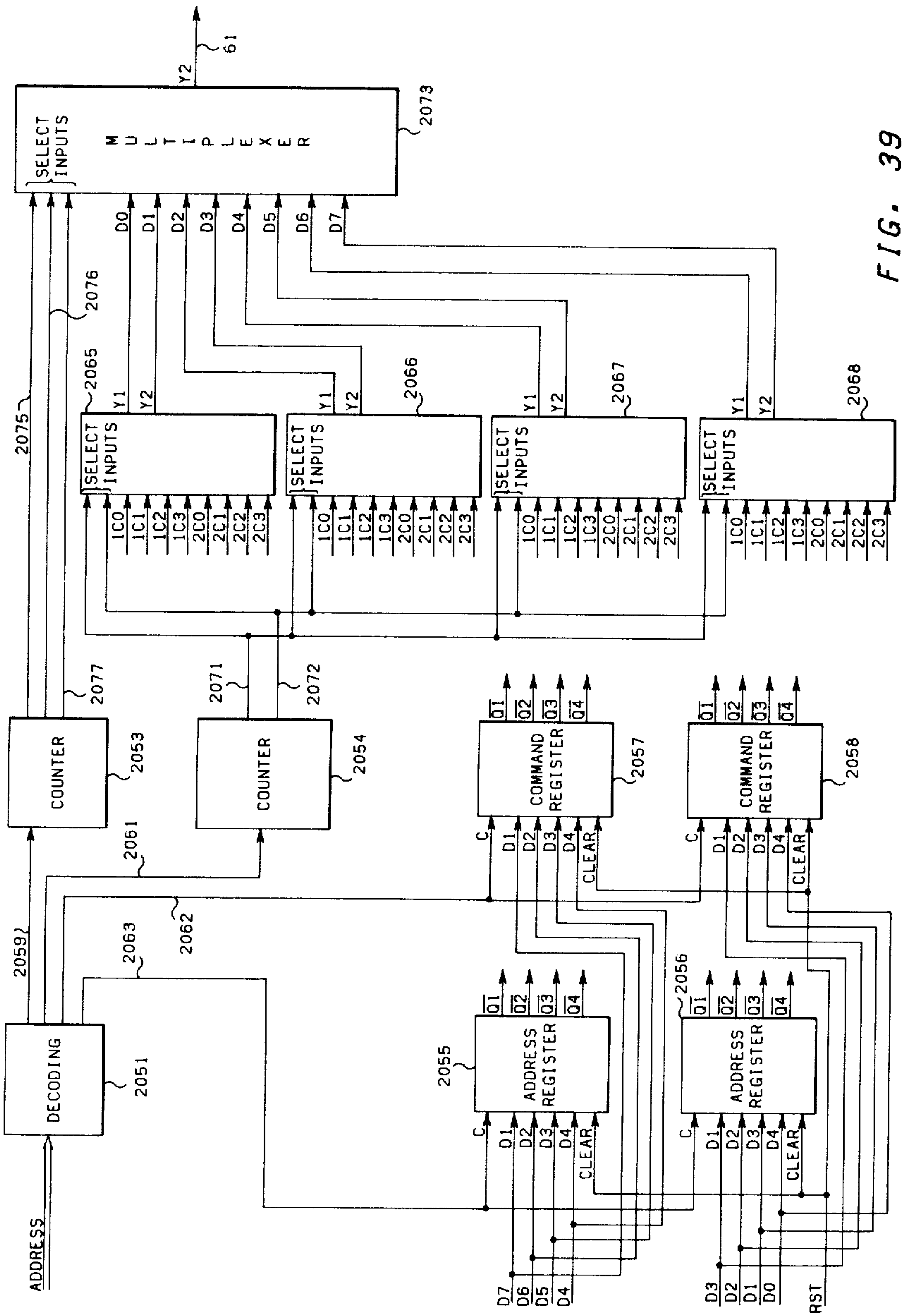
Figure 40:
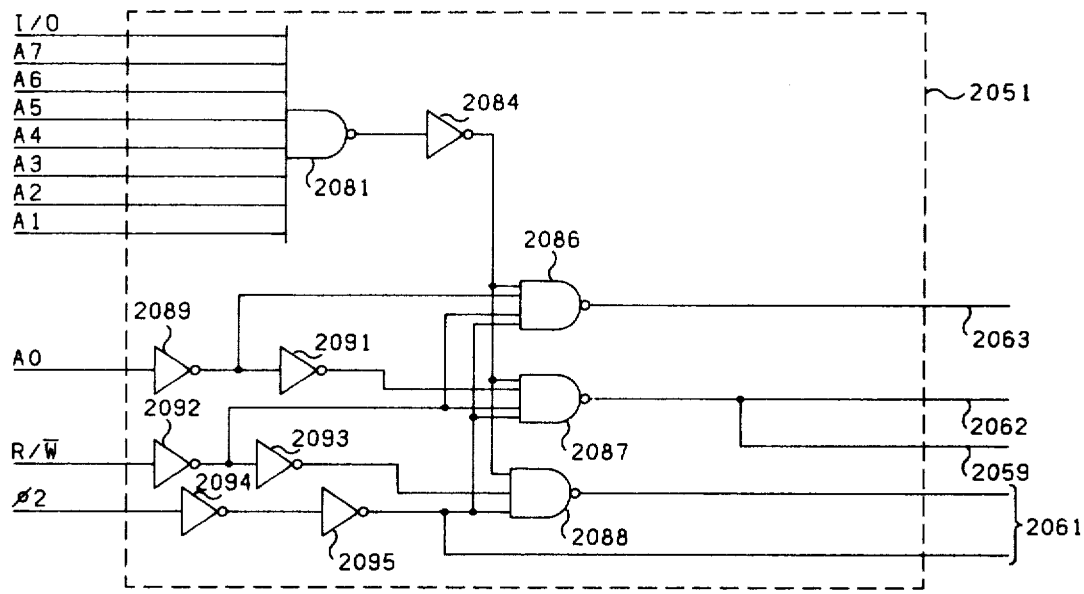
Figure 41:
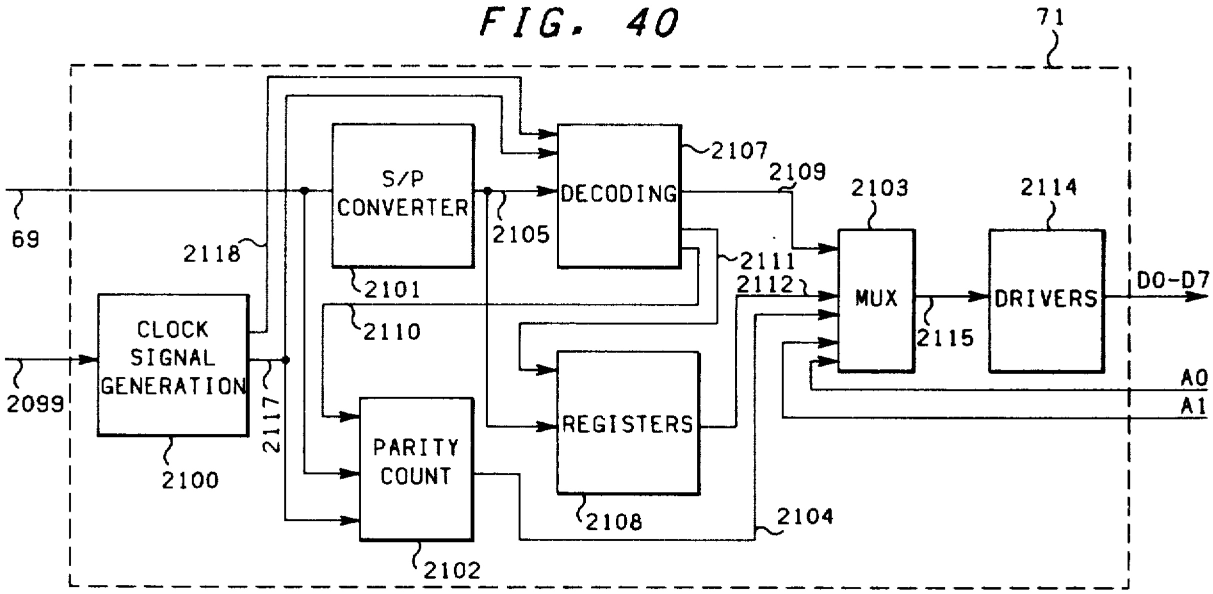
Figure 42:
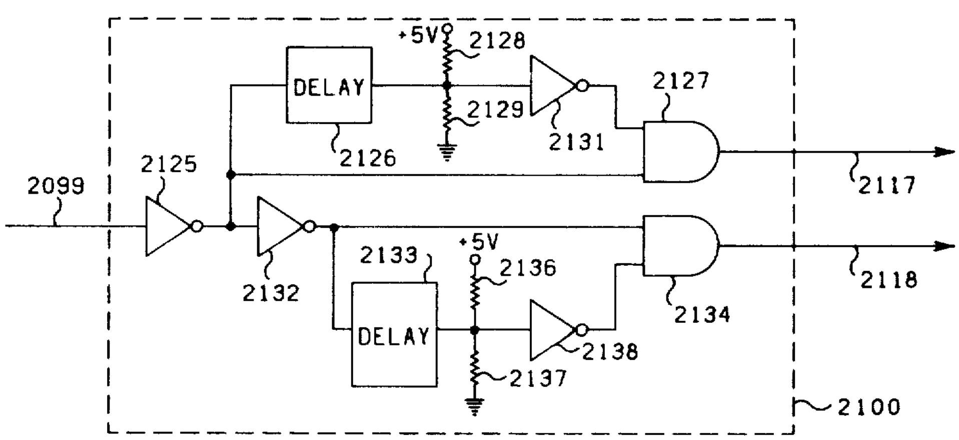
Figure 43:
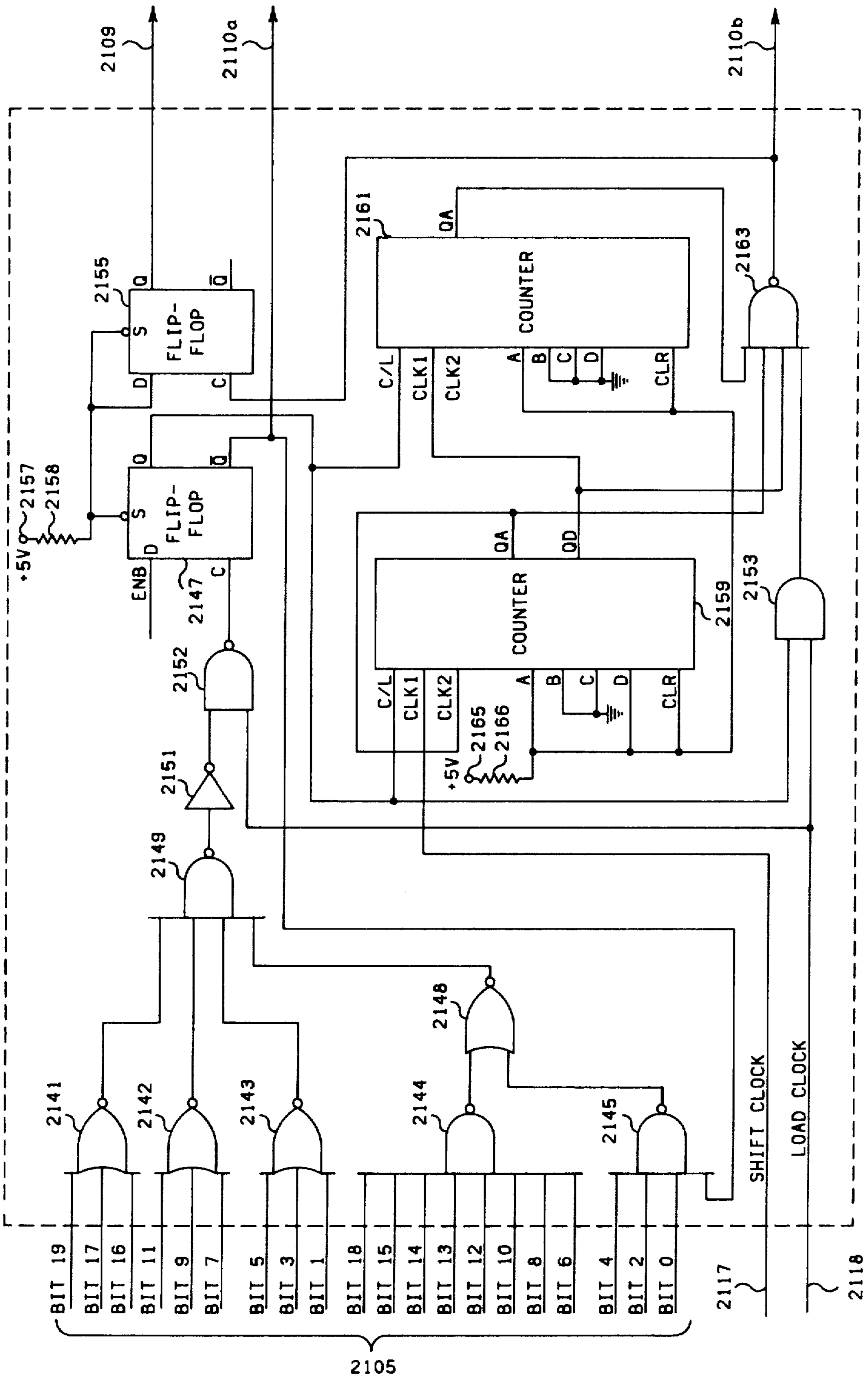
Figure 44:
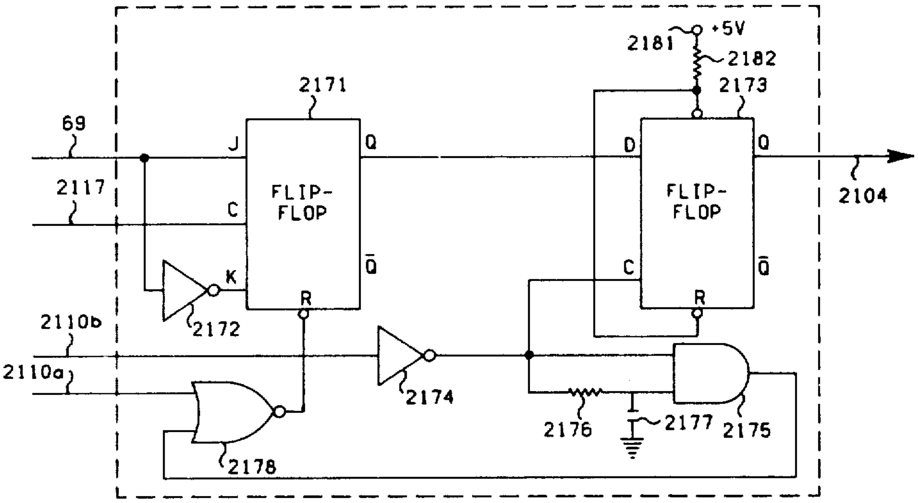
Figure 45:
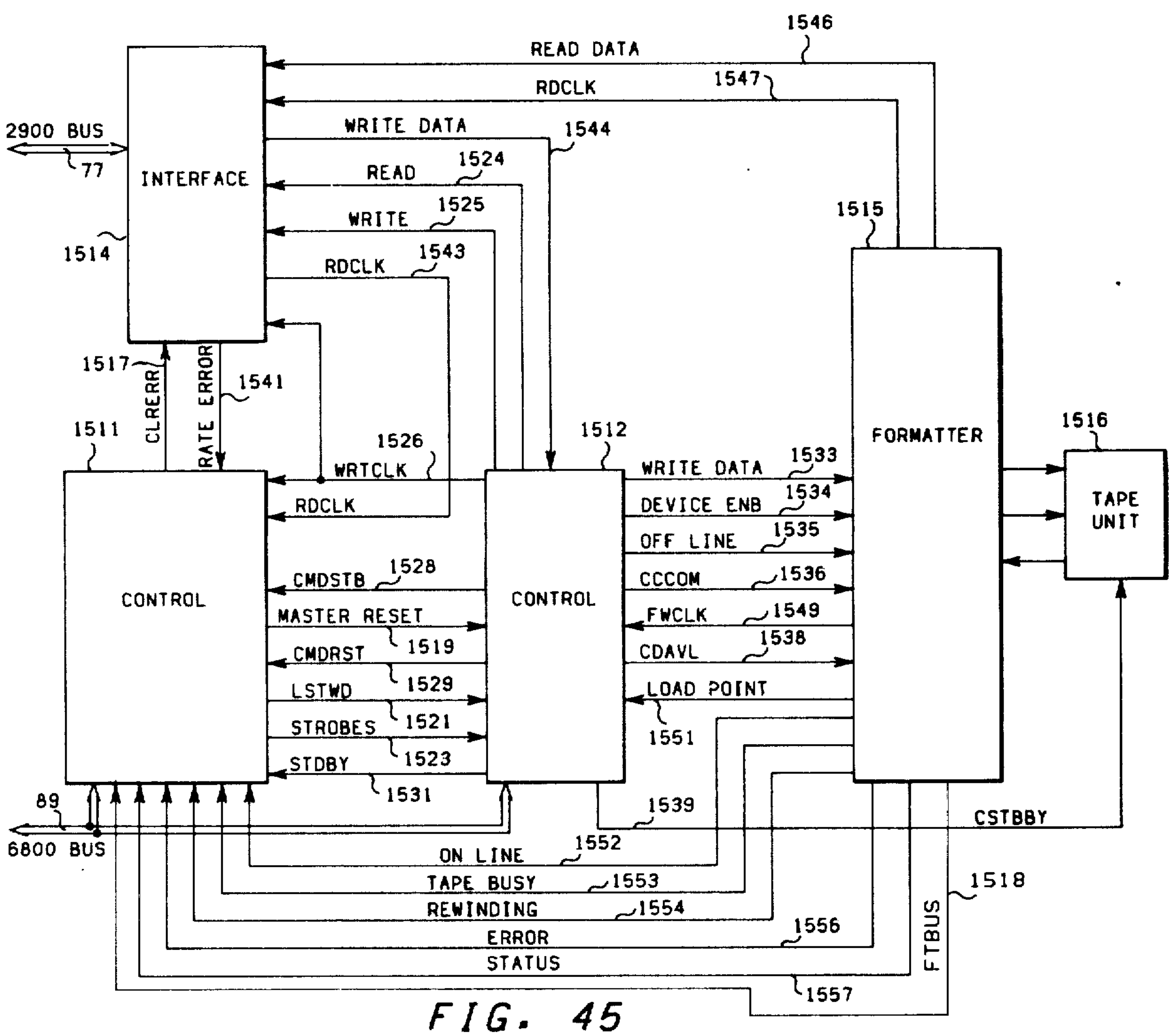
Figure 46:
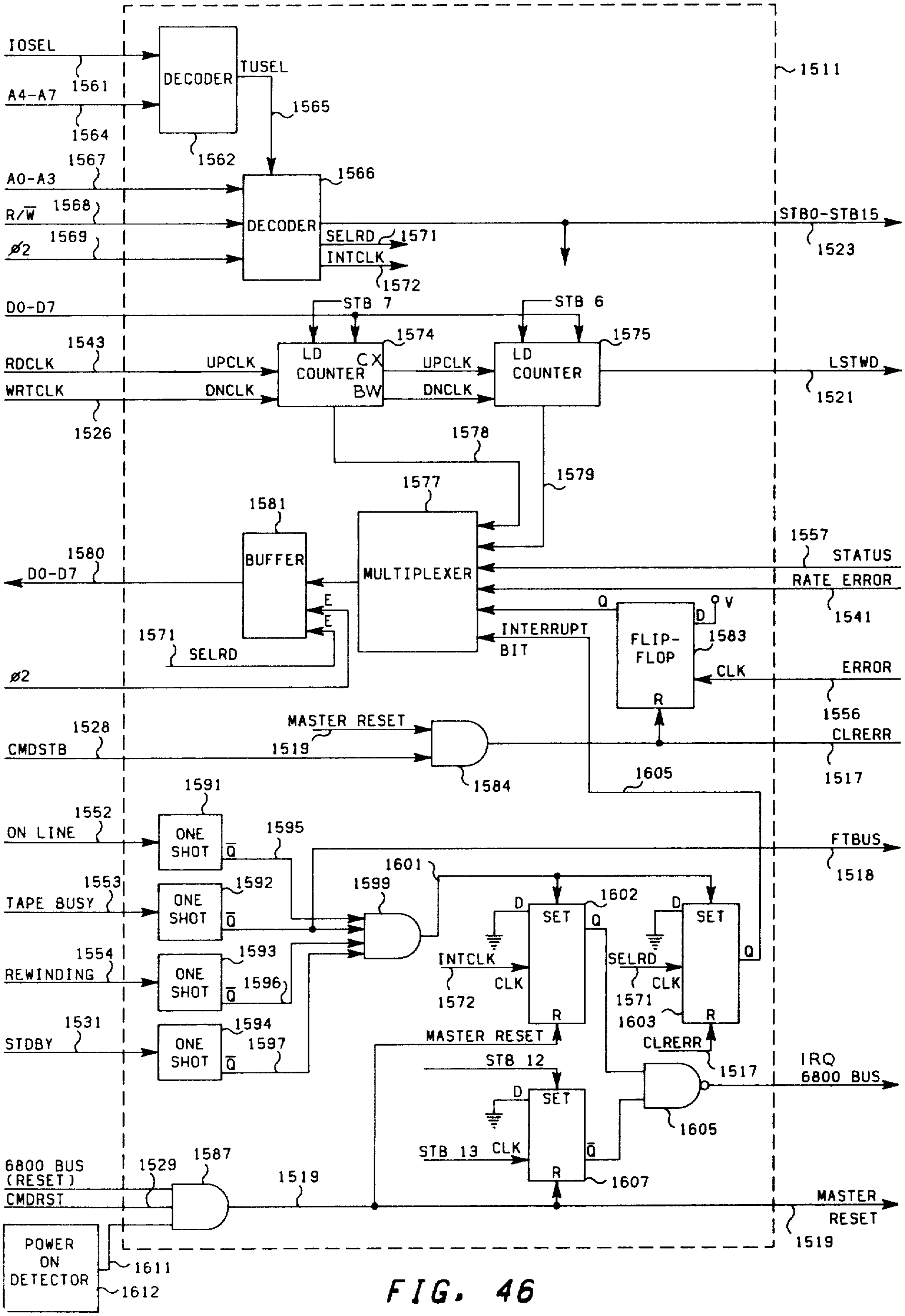
Figure 47A:
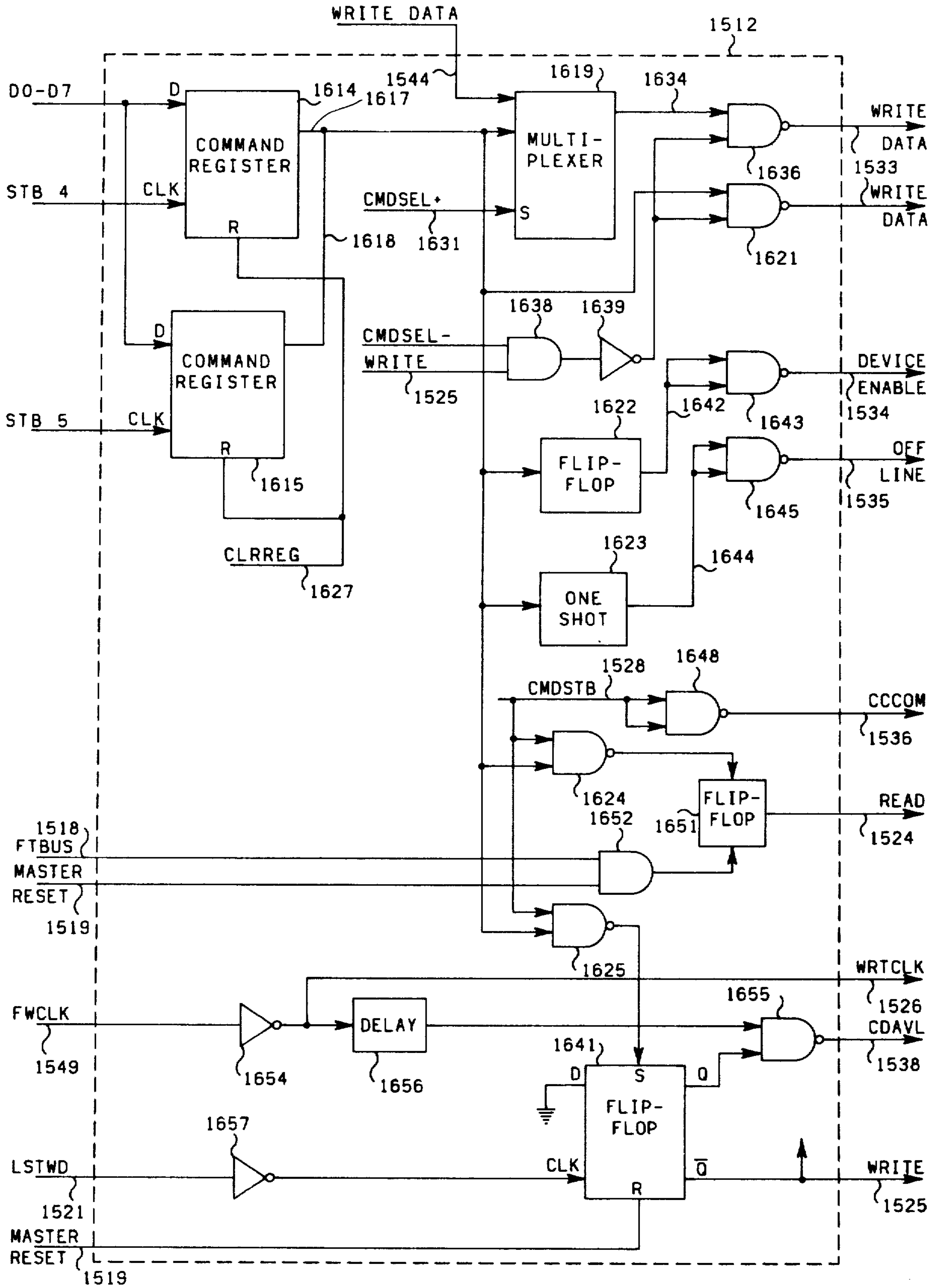
Figure 47B:
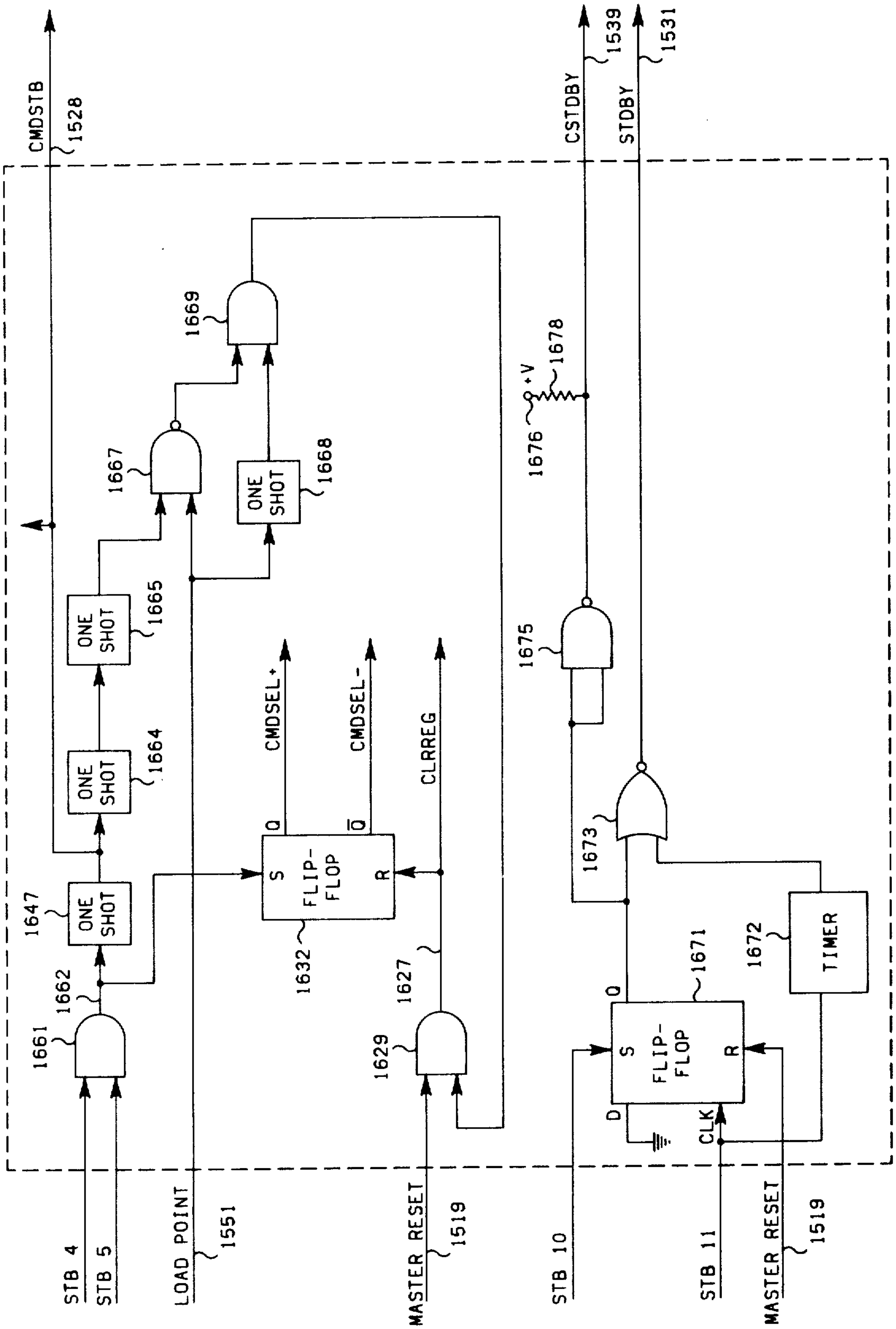
Figure 48:
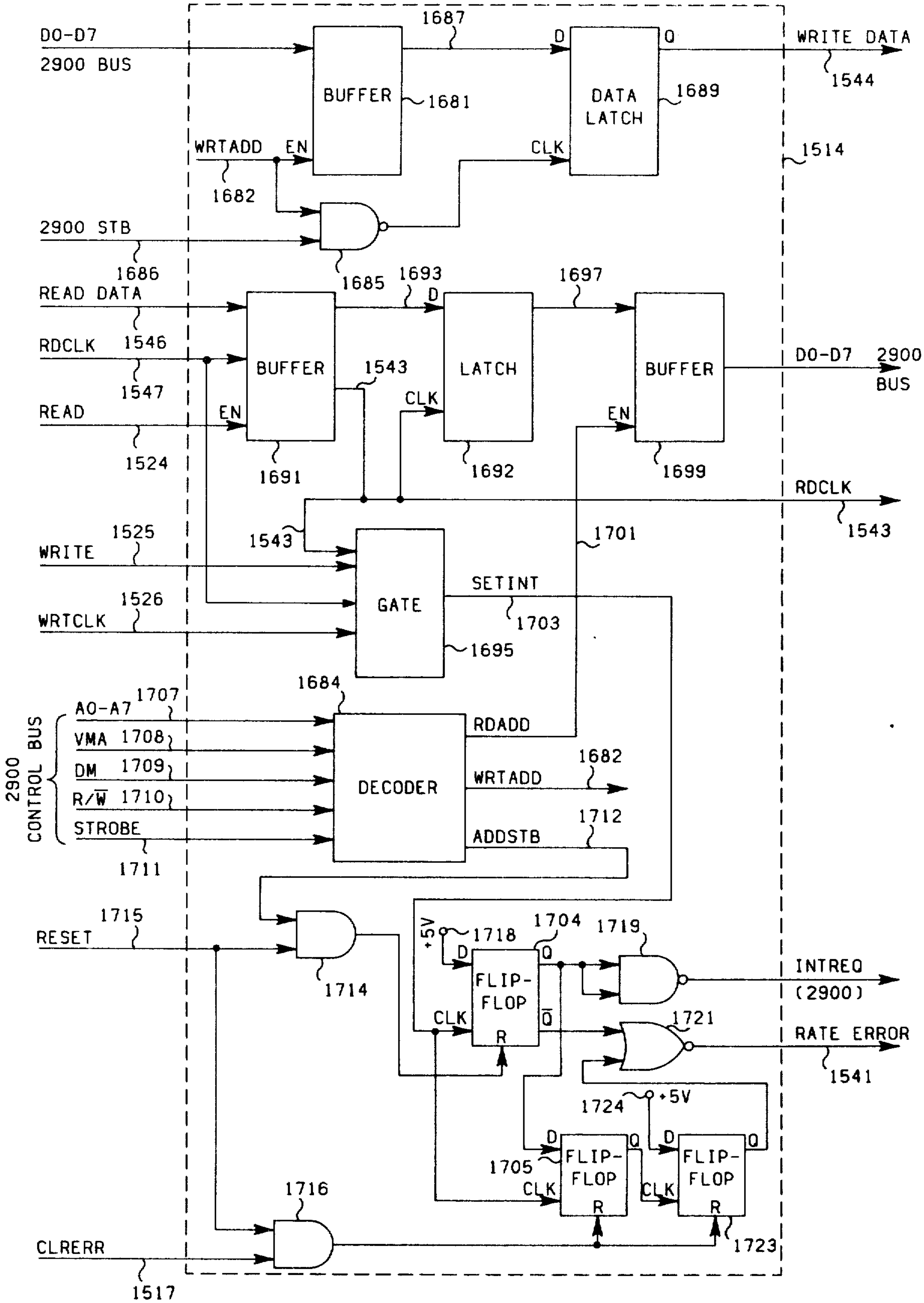
Figure 49:
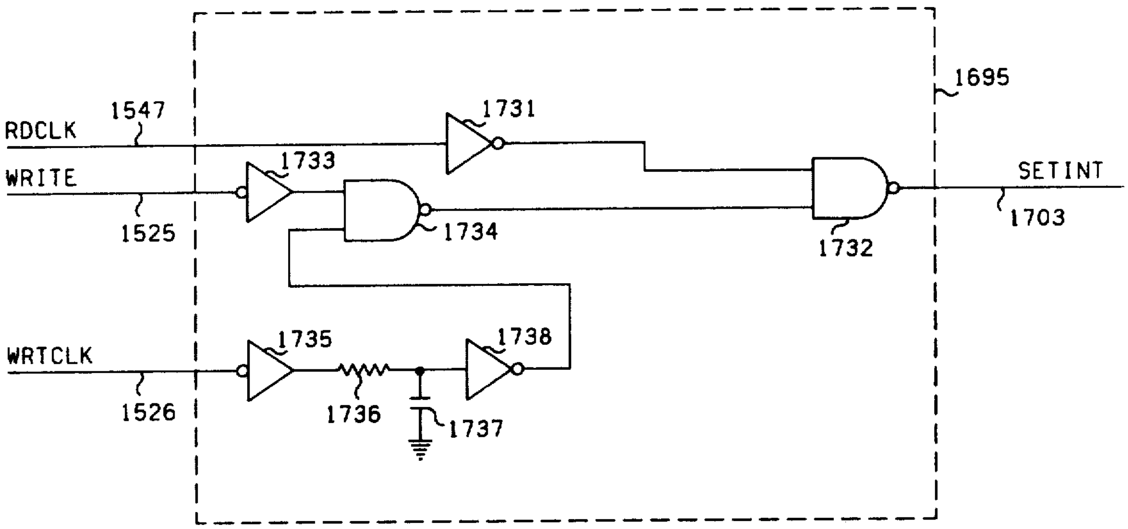
Figure 50:
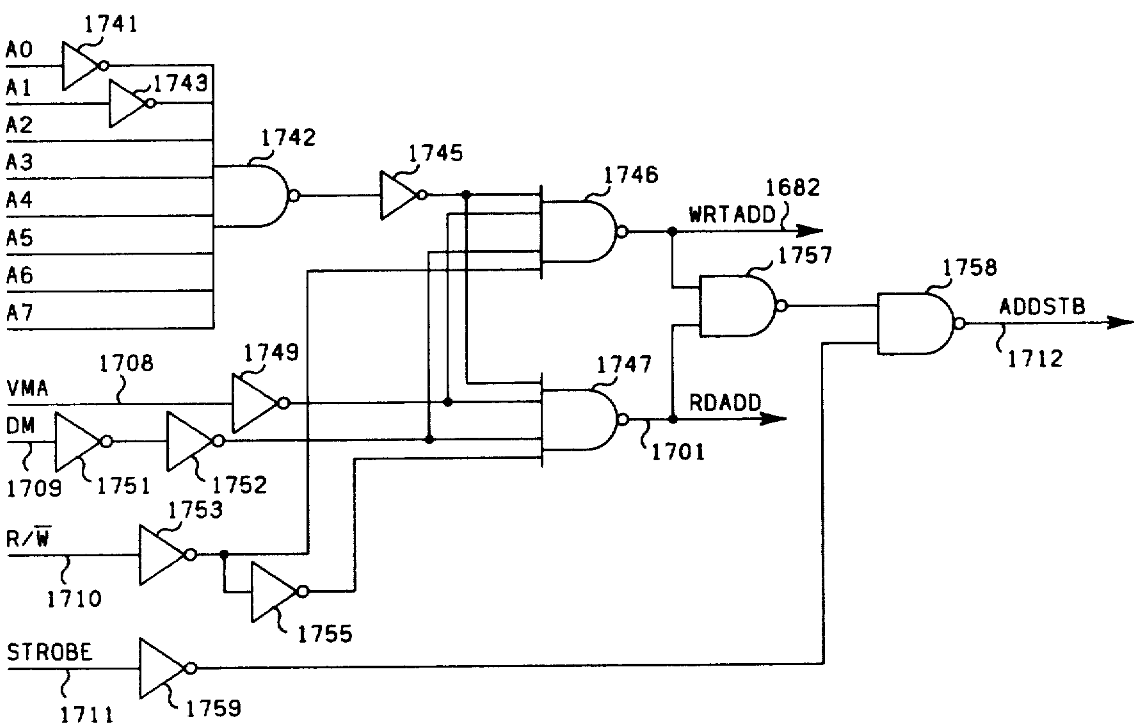
Figure 51:
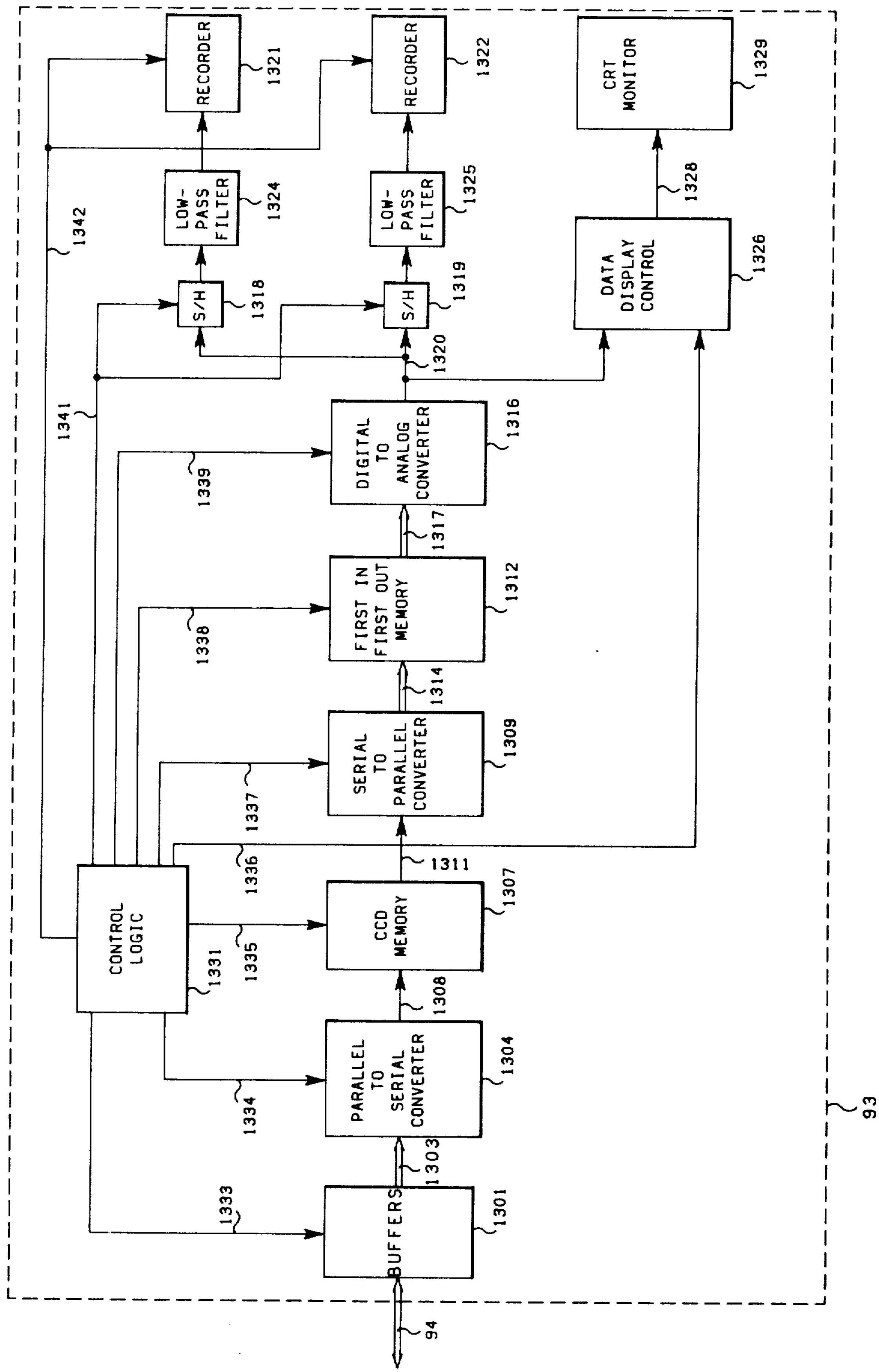
Figure 52:
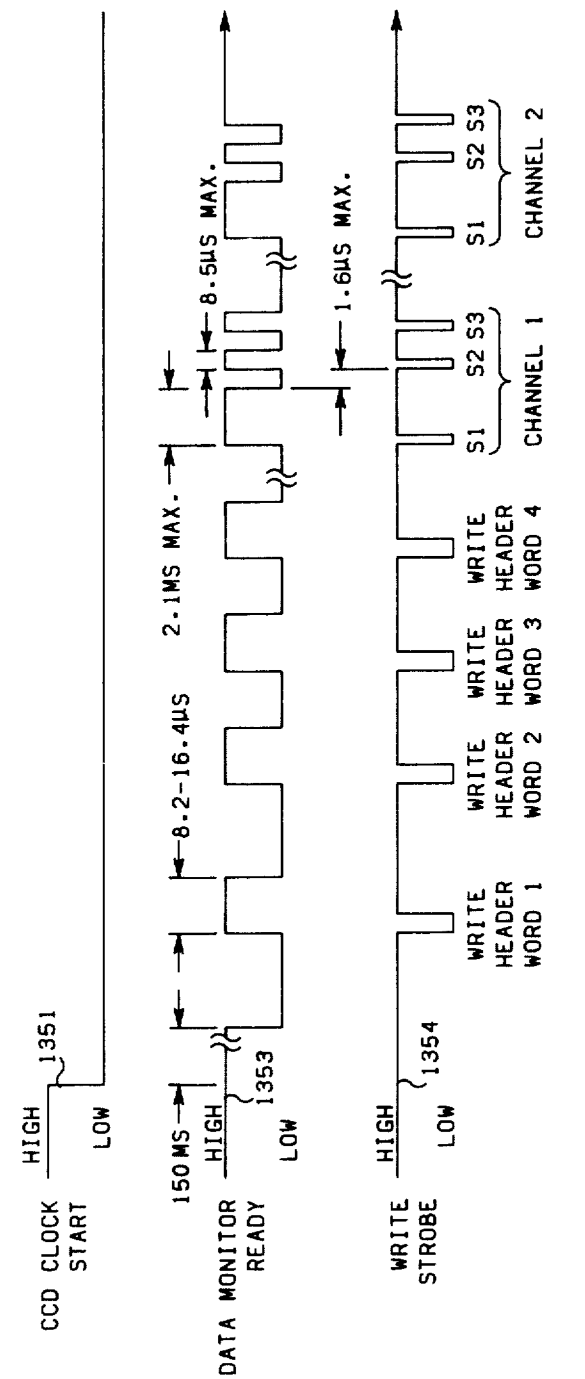
Figure 53:
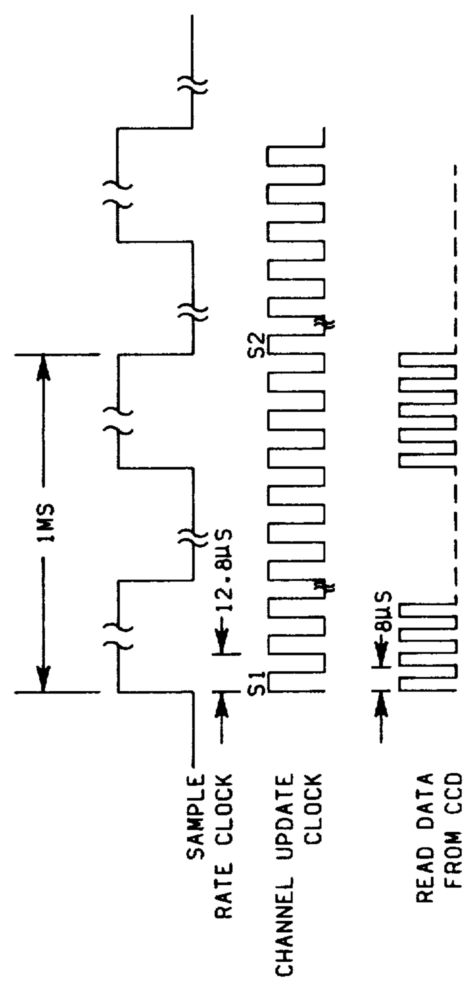
Figure 54:
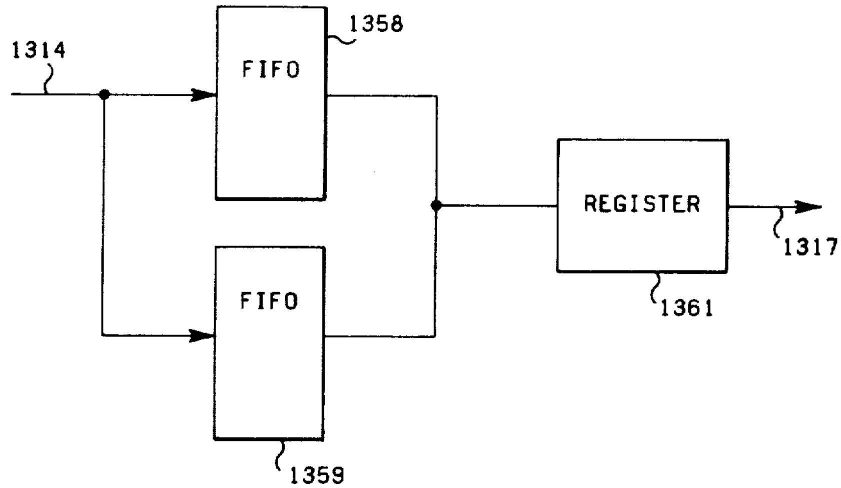
Figure 55:
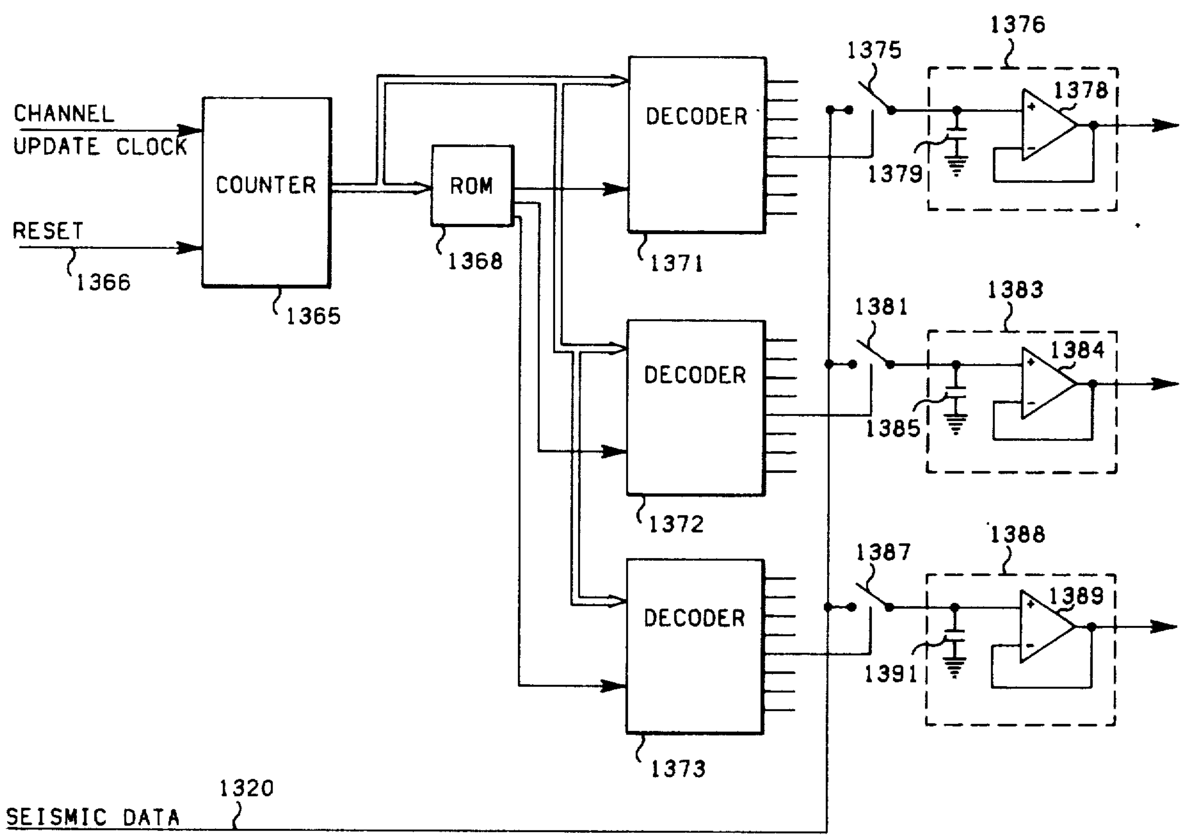
Figure 56:
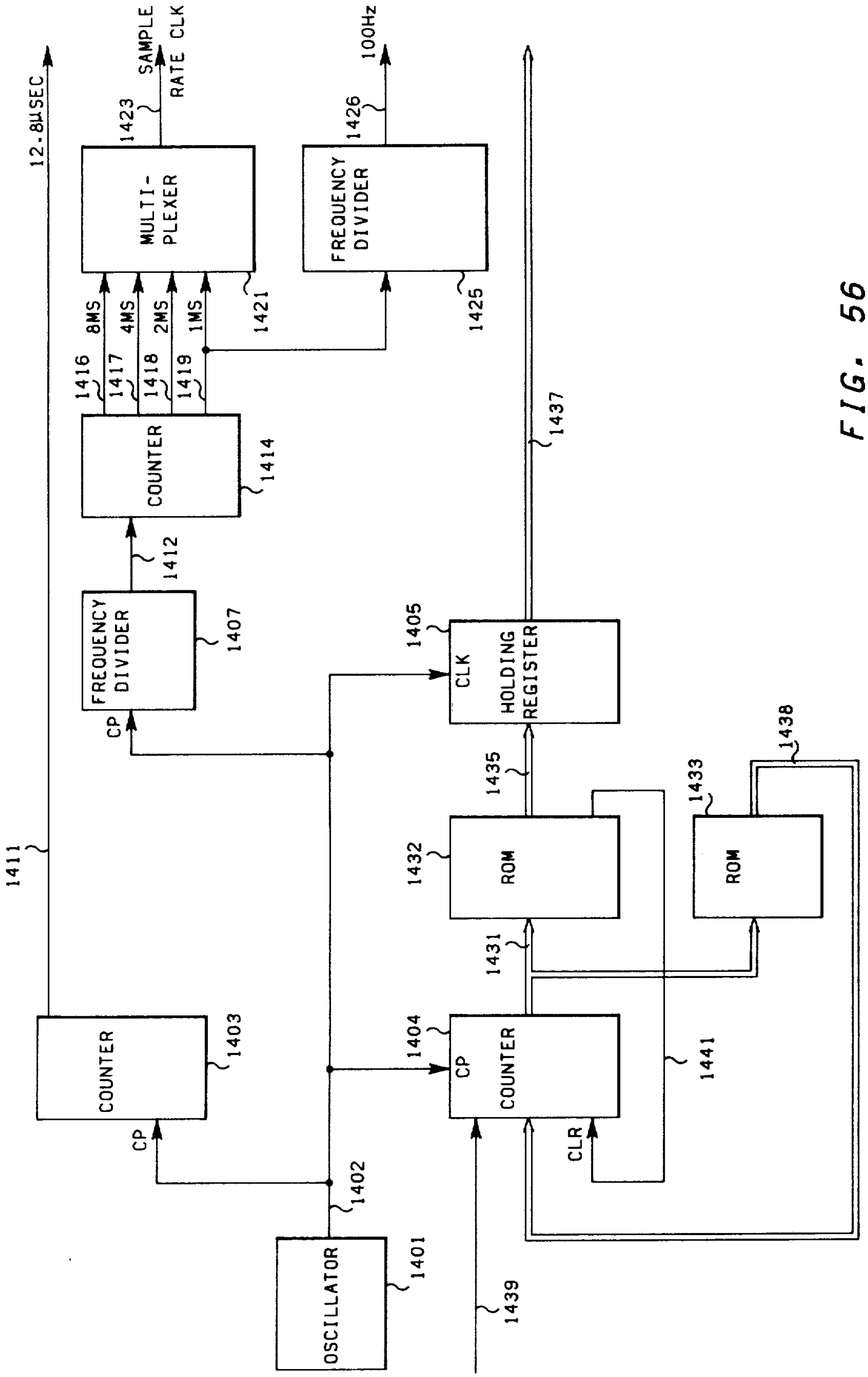
Figure 57:
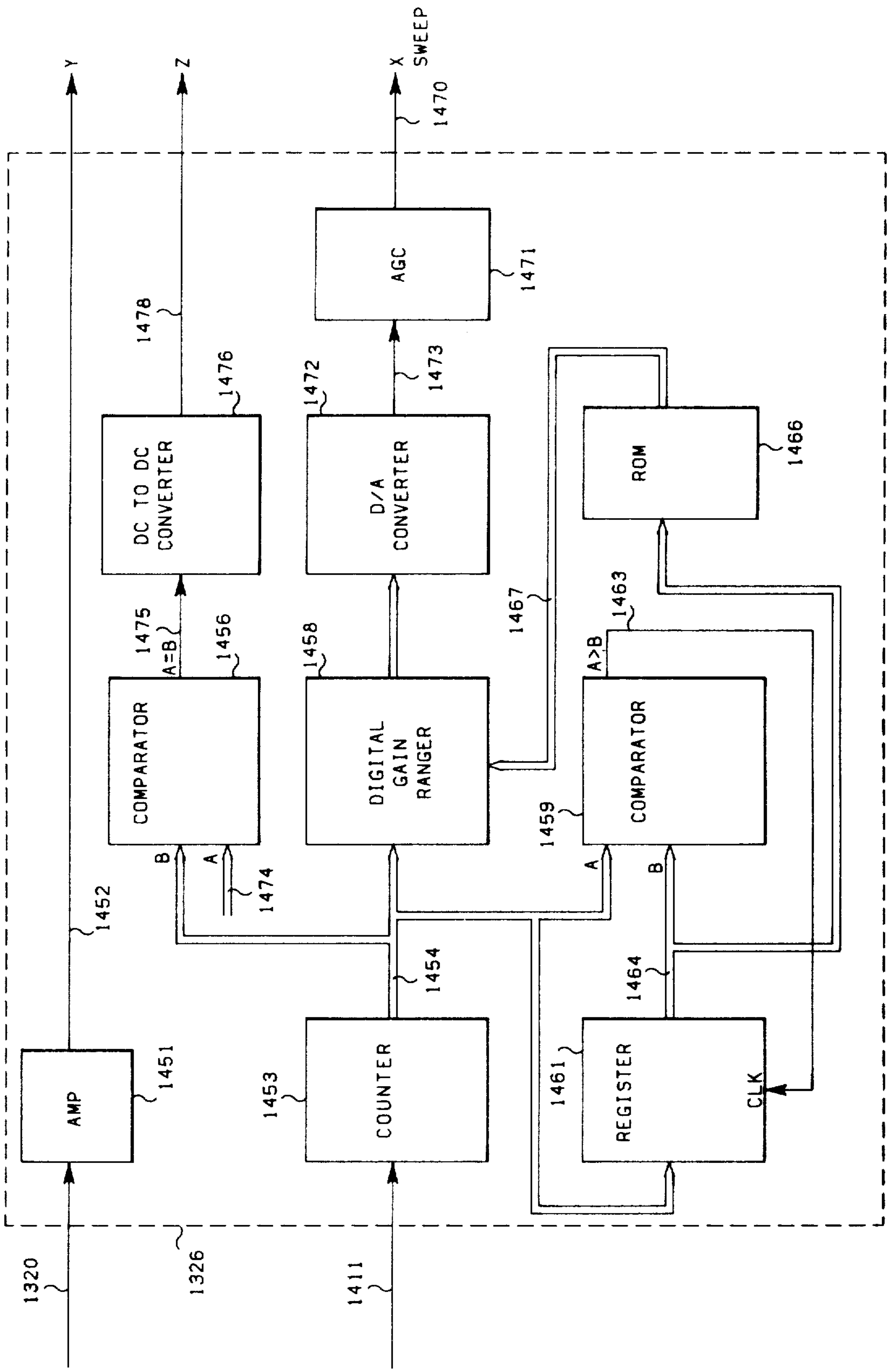
Figure 58:
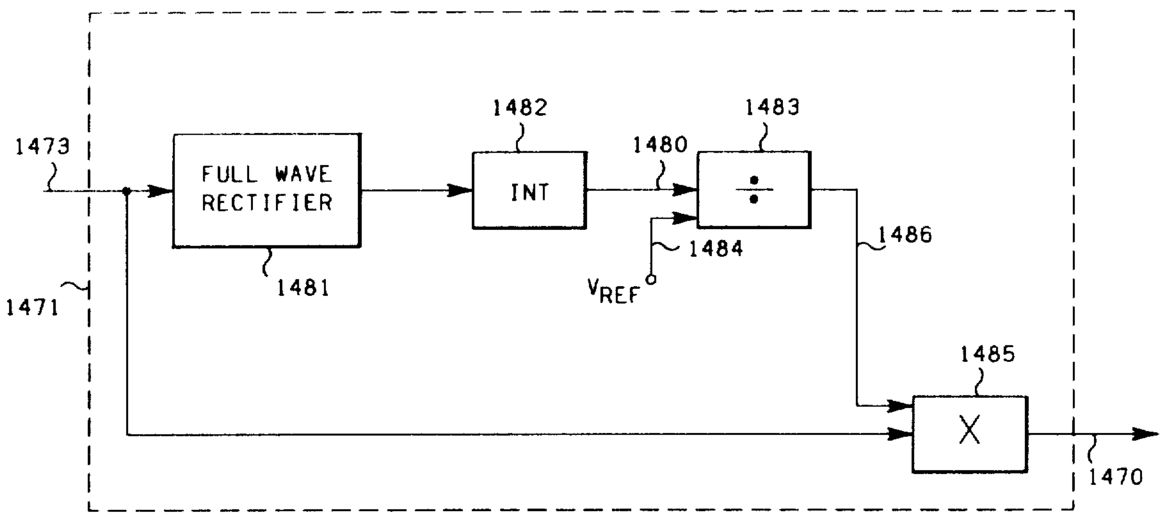
Figure 59:
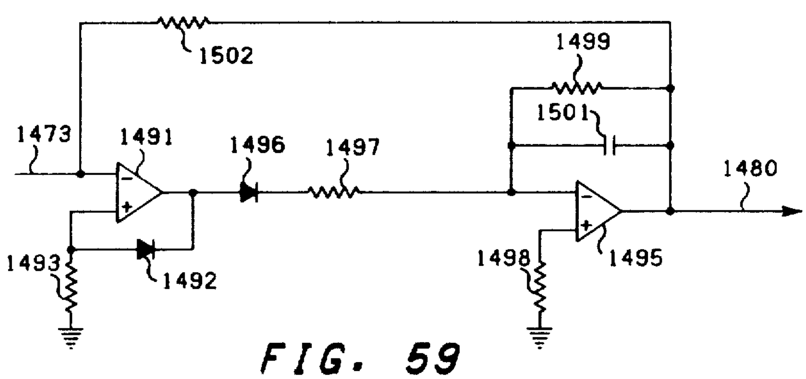
Figure 60:
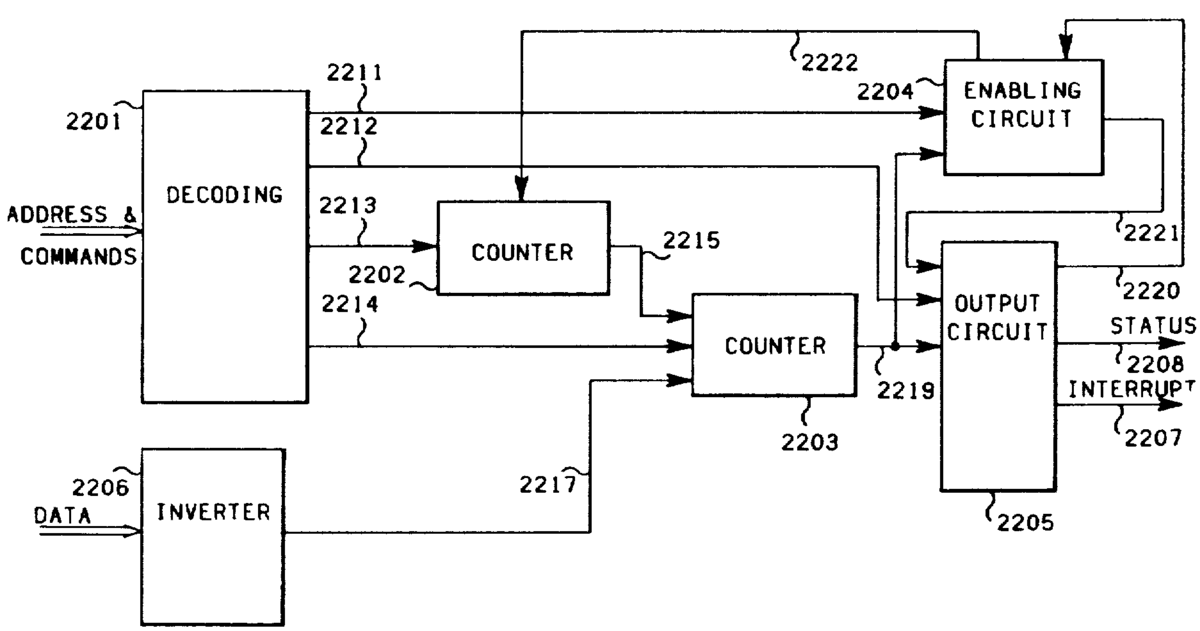
Figure 61:
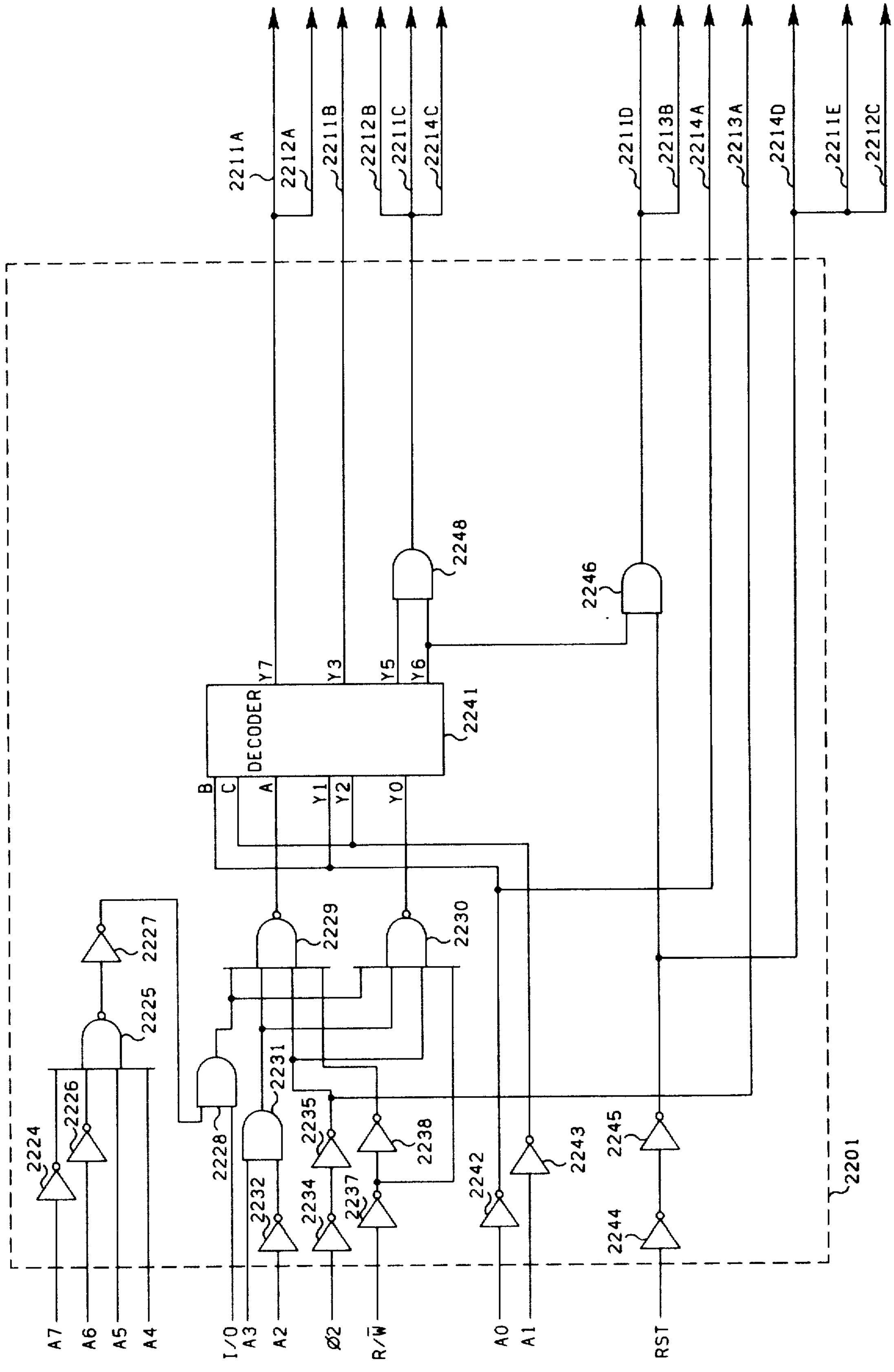
Figure 62:
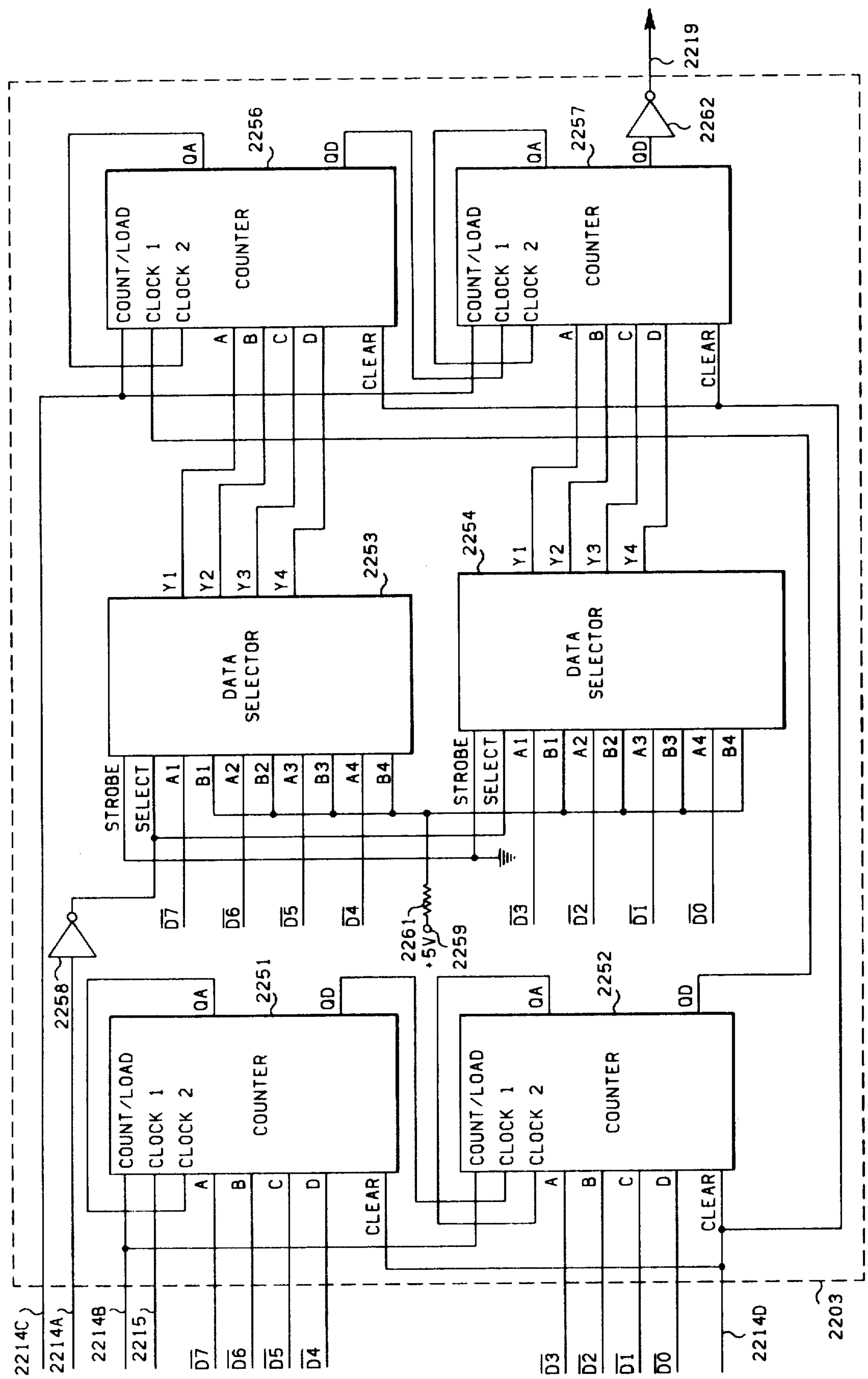
Figure 63:
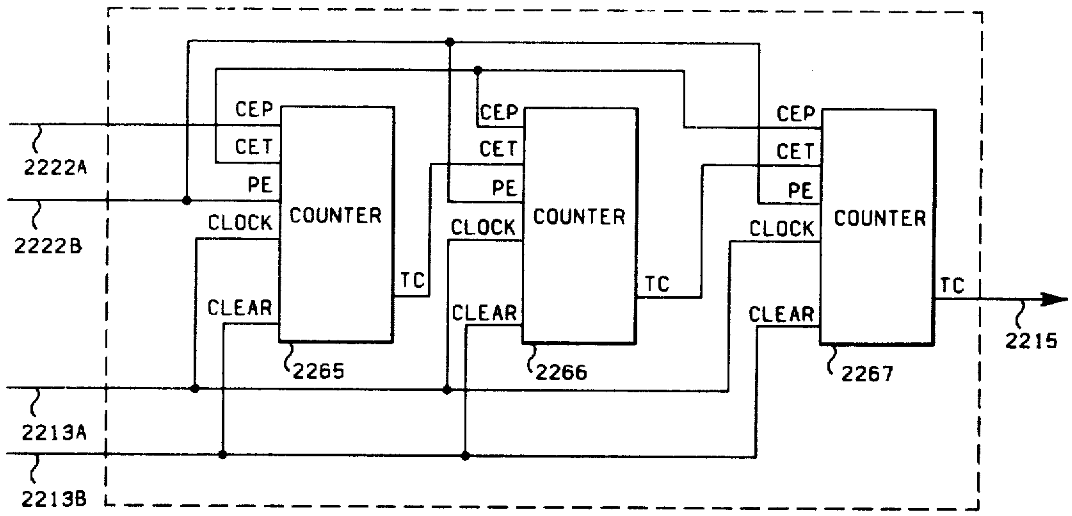
Figure 64:
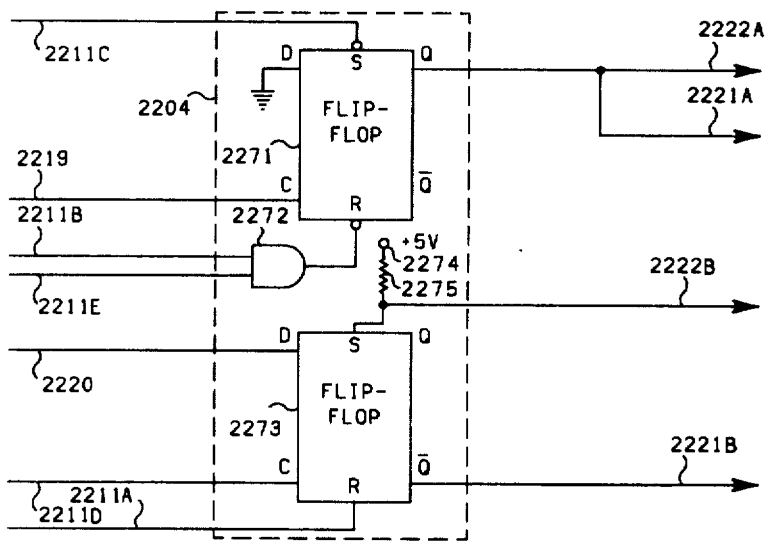
Figure 65:
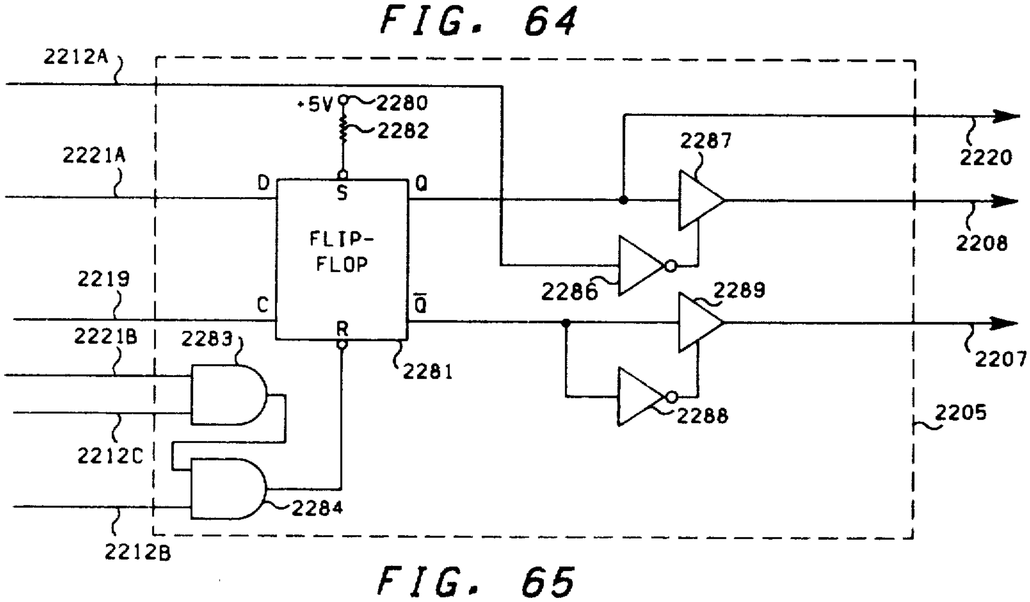
Figure 66:
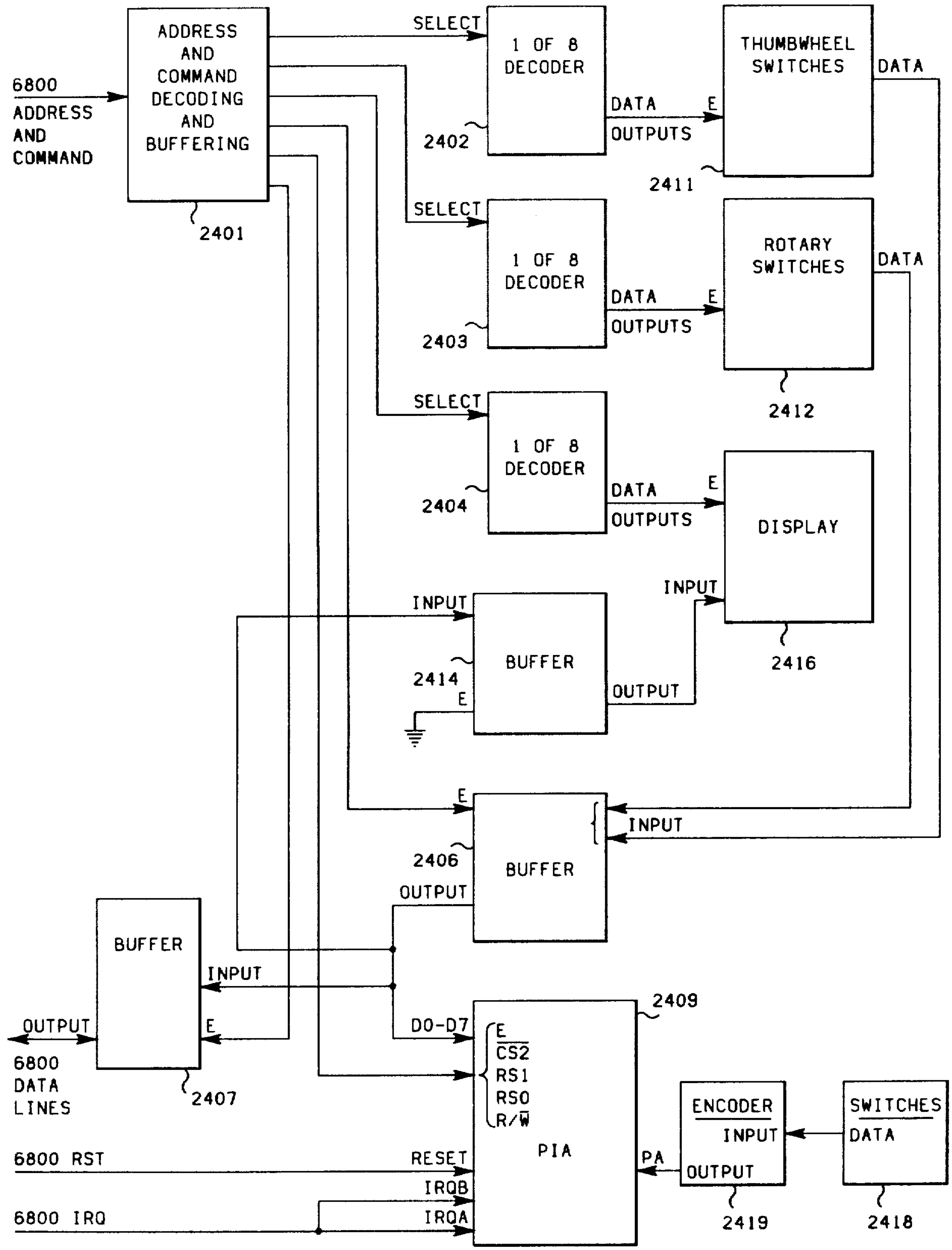
Figure 67:
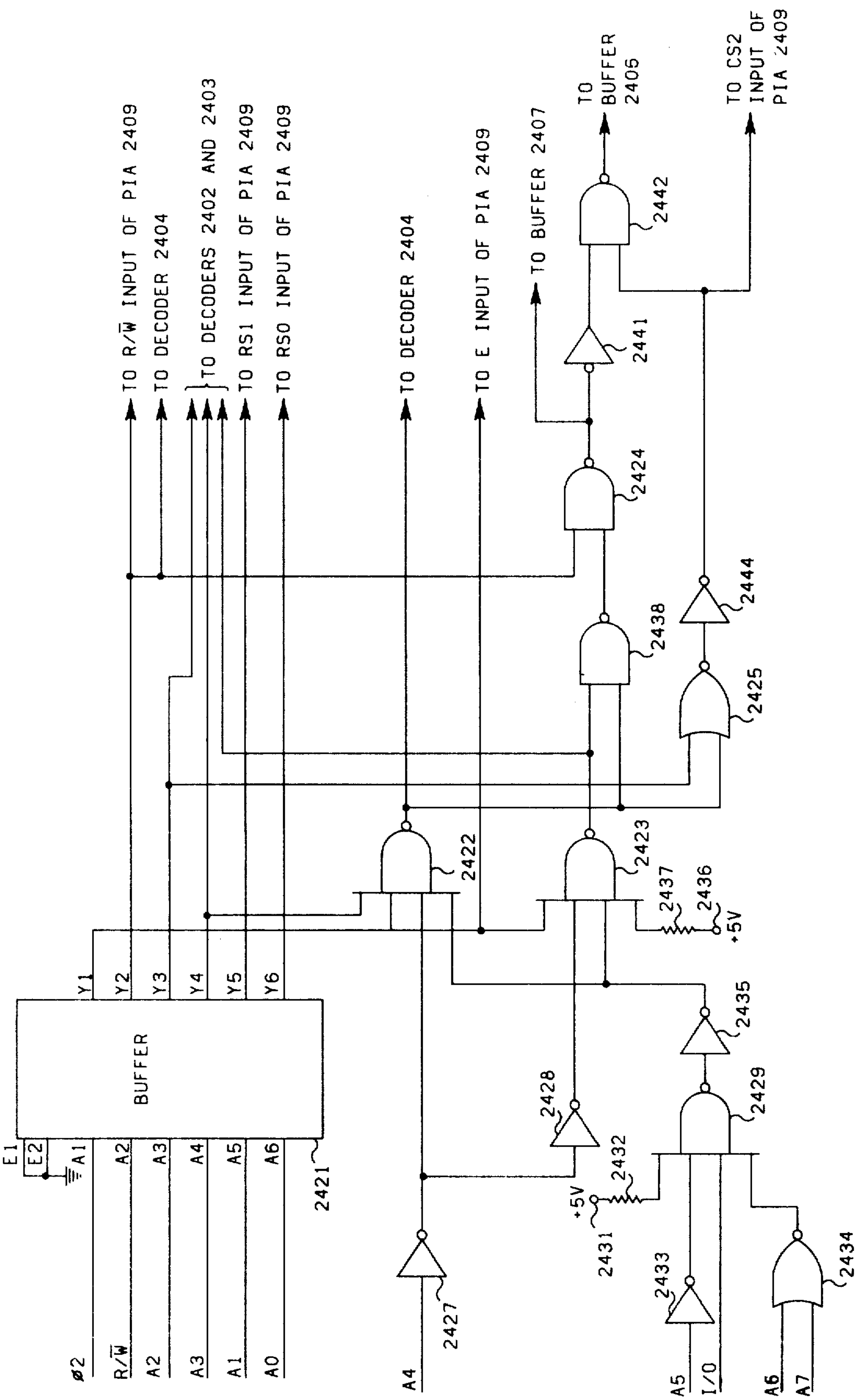
Figure 68:
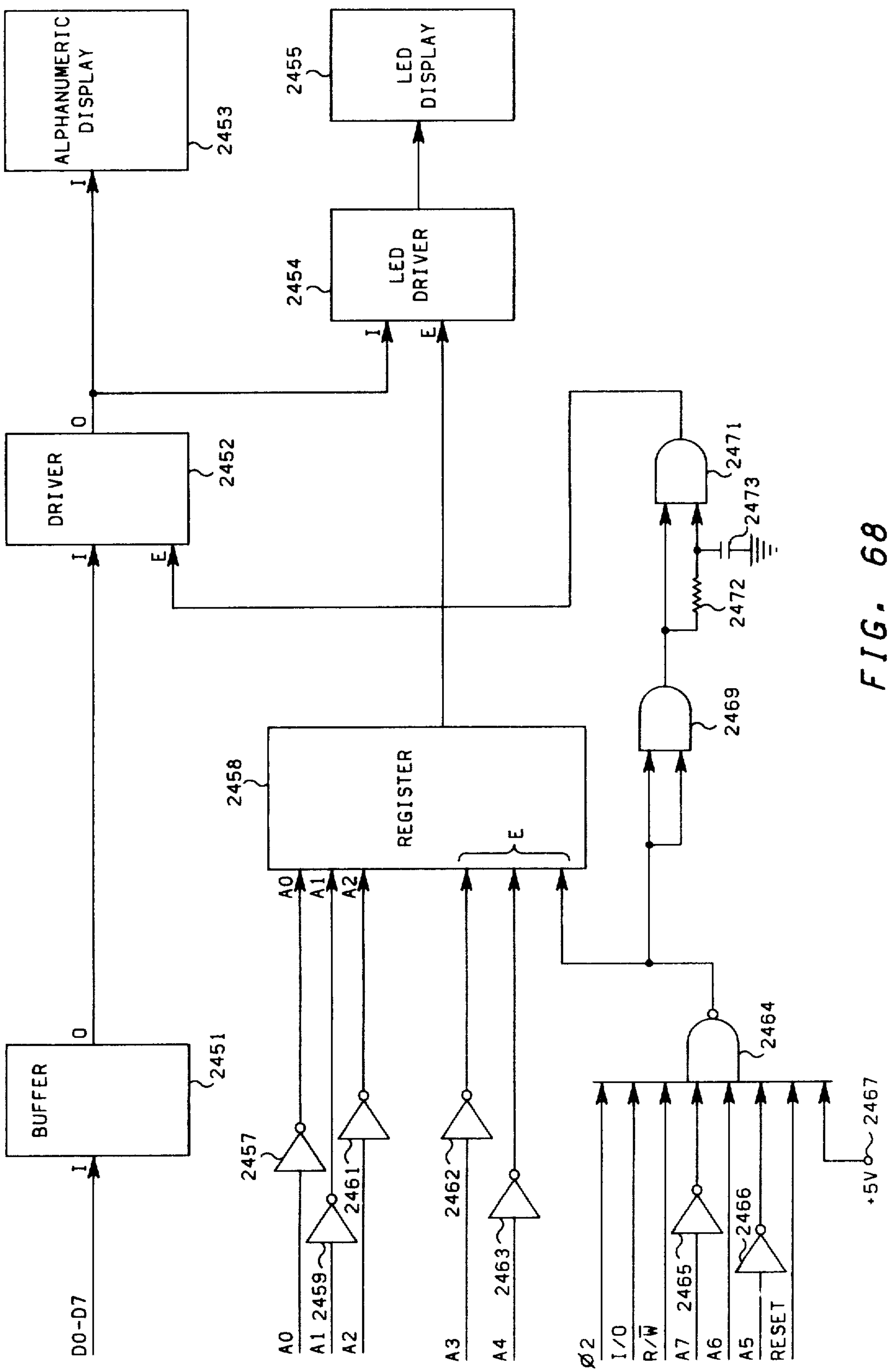
Figure 69:
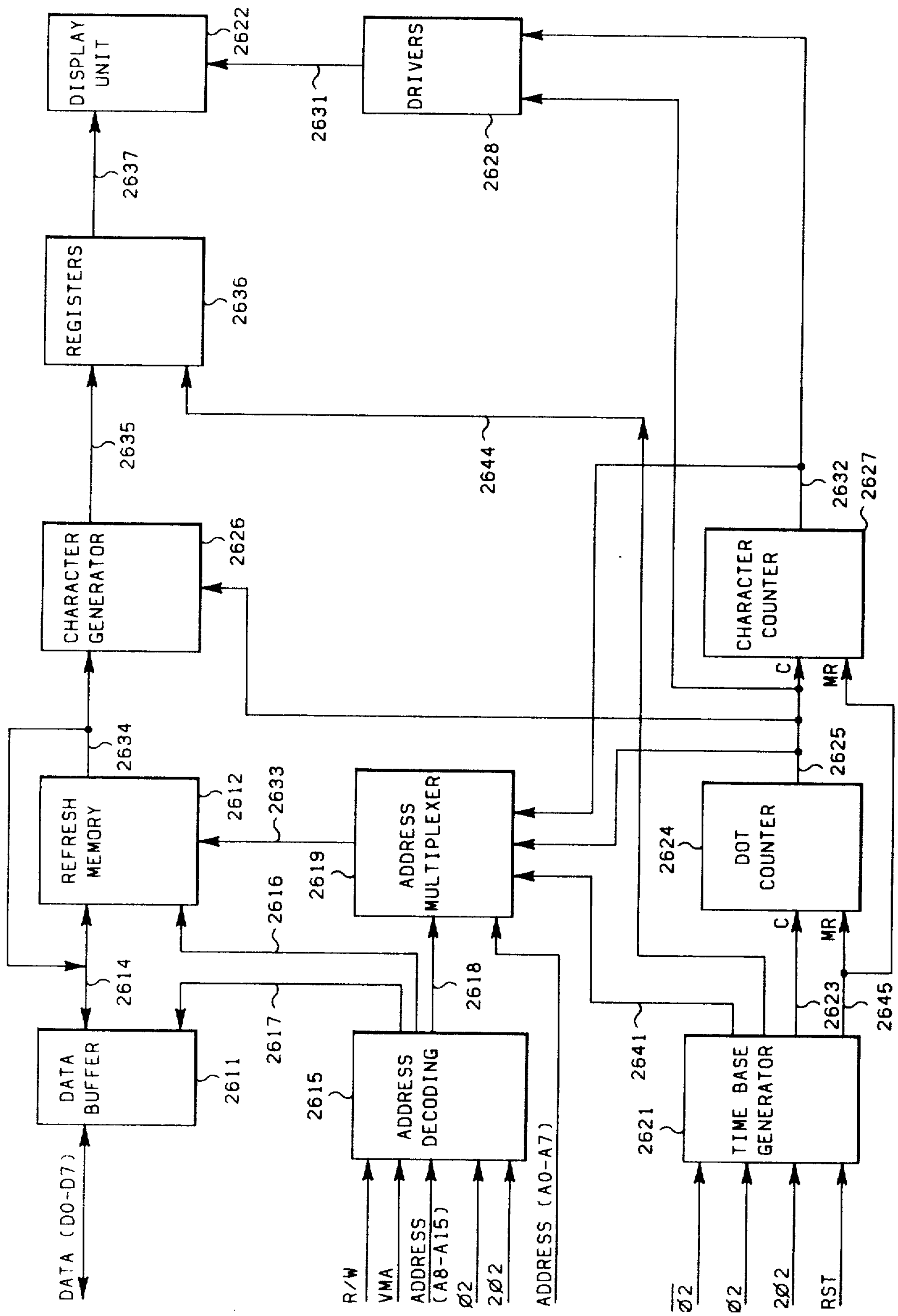
Figure 70:
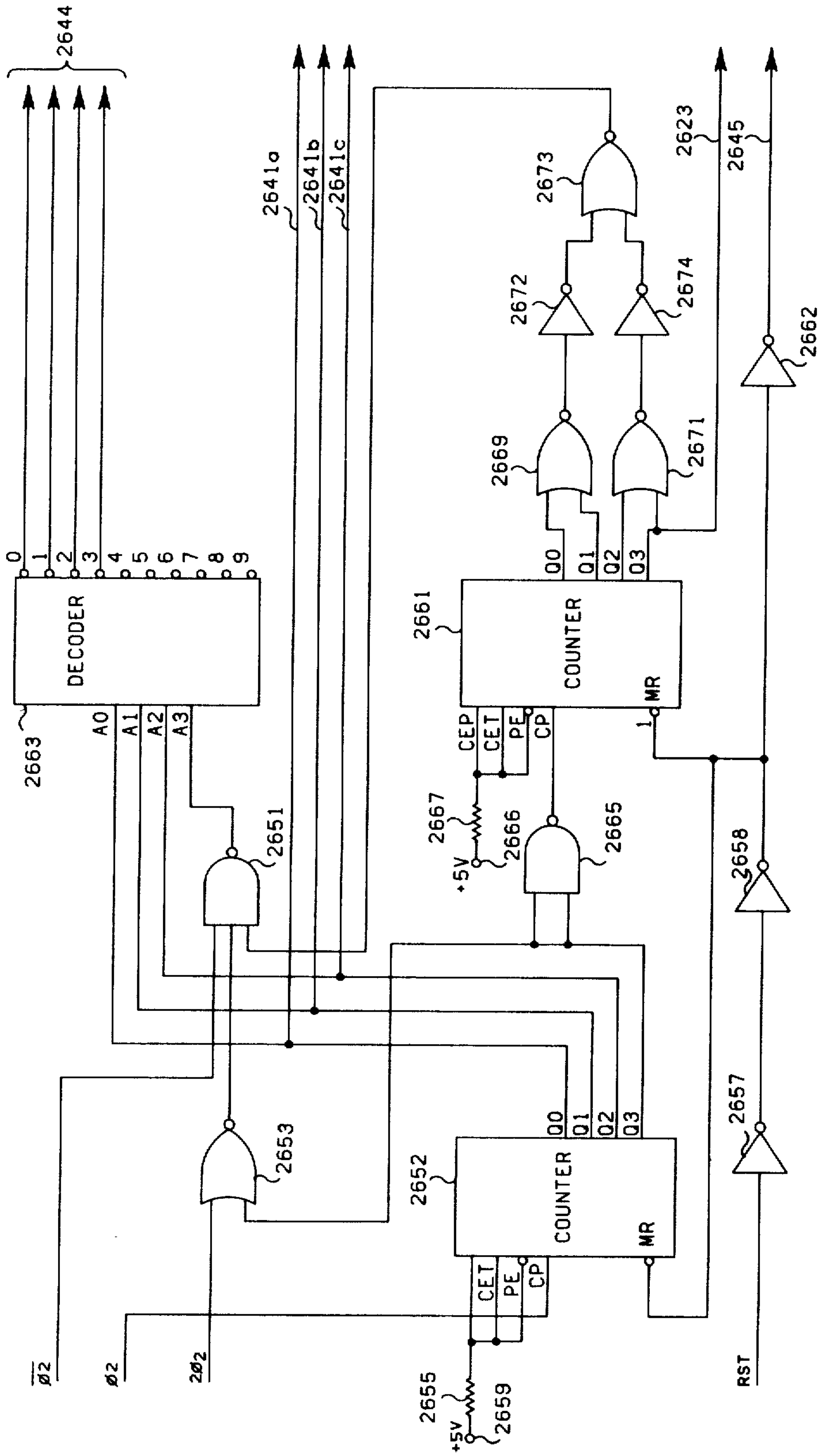
Figure 71:
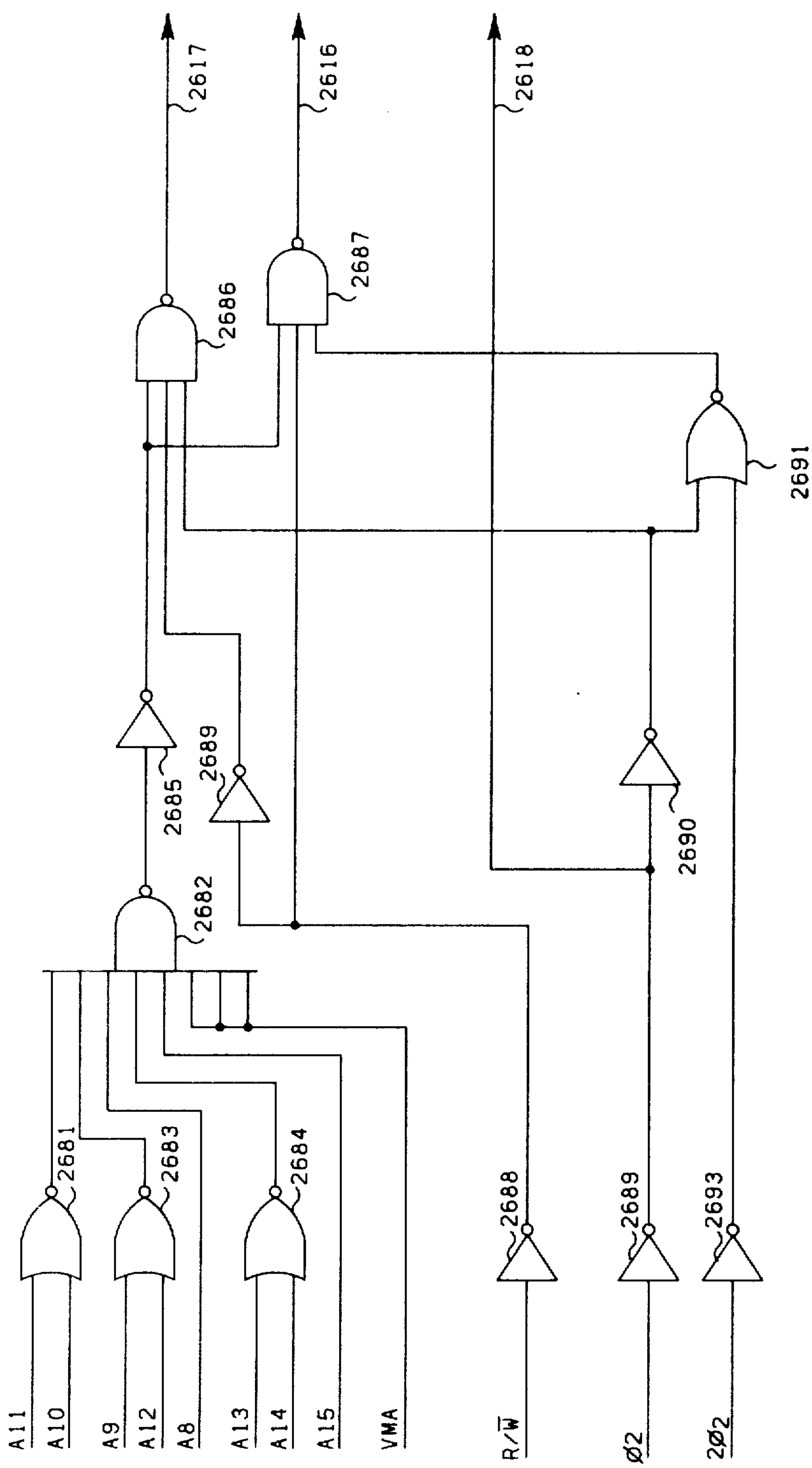
Figure 72:
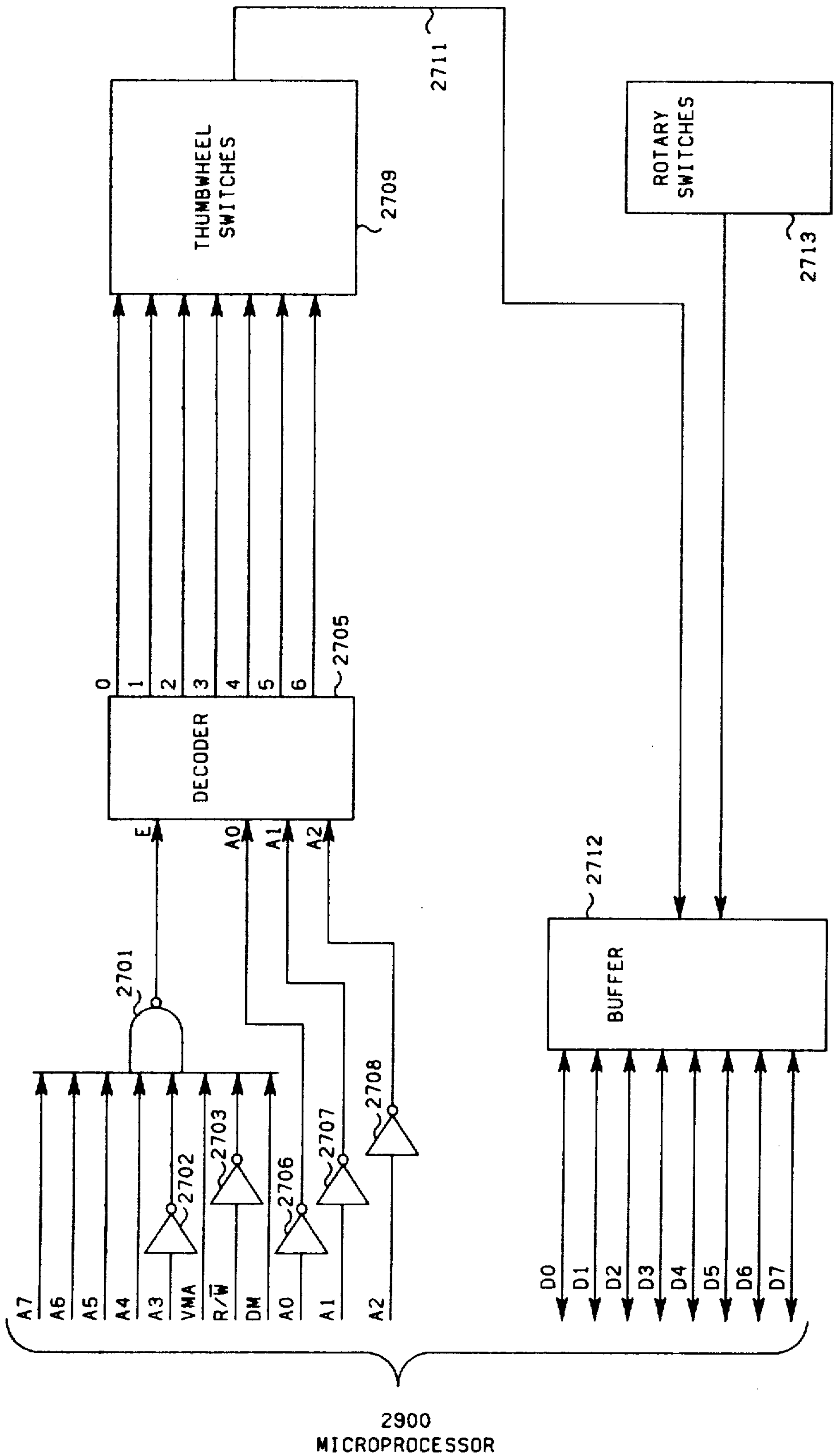

FIGS. 22*a* and 22*b* are schematics of the voltage regulators illustrated in FIG. 21;

FIG. 23 is a block diagram of a separate testing unit for the remote telemetry unit illustrated in FIG. 2*b*;

FIG. 24 is a schematic of the ramp generator illustrated in FIG. 23;

FIG. 25 is a schematic of the reference voltage source illustrated in FIG. 23;

FIG. 26 is a schematic of the voltage controlled oscillator illustrated in FIG. 23;

FIG. 27 is a schematic of the sine wave shaper illustrated in FIG. 23;

FIG. 28 is a schematic of the sawtooth generator illustrated in FIG. 23;

FIG. 29 is a schematic of the output network illustrated in FIG. 23;

FIG. 30 is a schematic of the RF transmitter illustrated in FIG. 2*a*;

FIG. 31 is a schematic of the RF receiver illustrated in FIG. 2*a*;

FIG. 32 is a block diagram of the 2900 microprocessor system illustrated in FIG. 2*a*;

FIG. 33 is a schematic of the interrupt logic illustrated in FIG. 32;

FIG. 34 is a schematic of the conditional branch logic illustrated in FIG. 32;

FIG. 35 is an illustration of the location of a random access memory utilized to develop and test programs for the 2900 microprocessor illustrated in FIG. 2*a*;

FIG. 36 is a schematic of the PROM bug RAM illustrated in FIG. 35;

FIG. 37 is a schematic of the decoding logic illustrated in FIG. 36;

FIG. 38 is a schematic of the computer-to-computer interface illustrated in FIG. 2*a*;

FIG. 39 is a schematic of the command formatter illustrated in FIG. 2*a*;

FIG. 40 is a schematic of the decoding circuit illustrated in FIG. 39;

FIG. 41 is a block diagram of the data formatter illustrated in FIG. 2*a*;

FIG. 42 is a schematic of the clock signal generation circuit illustrated in FIG. 41;

FIG. 43 is a schematic of the decoding circuit illustrated in FIG. 41;

FIG. 44 is a schematic of the parity count circuit illustrated in FIG. 41;

FIG. 45 is a block diagram of the magnetic tape unit, the magnetic tape controller and the magnetic tape interface illustrated in FIG. 2*a*;

FIG. 46 is a schematic of a first control unit illustrated in FIG. 45;

FIGS. 47*a* and 47*b* are schematics of a second control unit illustrated in FIG. 45;

FIG. 48 is a schematic of the interface illustrated in FIG. 45;

FIG. 49 is a schematic of the gate illustrated in FIG. 48;

FIG. 50 is a schematic of the decoder illustrated in FIG. 48;

FIG. 51 is a block diagram of the data display unit illustrated in FIG. 2*a*;

FIG. 52 is a timing diagram associated with the data display system illustrated in FIG. 51;

FIG. 53 is a timing diagram associated with the data display system illustrated in FIG. 51;

FIG. 54 is a schematic of the first-in first-out memory illustrated in FIG. 51;

FIG. 55 is an illustration of the manner in which the sample-and-hold circuits, illustrated in FIG. 51, are addressed;

FIG. 56 is a schematic of the control logic illustrated in FIG. 51;

FIG. 57 is a schematic of the data display control illustrated in FIG. 51;

FIG. 58 is a schematic of the AGC circuit illustrated in FIG. 57;

FIG. 59 is a schematic of the full wave rectifier and the integrator illustrated in FIG. 58;

FIG. 60 is a schematic of the CRS countdown circuit illustrated in FIG. 2*a*;

FIG. 61 is a schematic of the decoding circuit illustrated in FIG. 60;

FIG. 62 is a schematic of a first counter illustrated in FIG. 60;

FIG. 63 is a schematic of a second counter illustrated in FIG. 60;

FIG. 64 is a schematic of the enabling circuit illustrated in FIG. 60;

FIG. 65 is a schematic of the output circuit illustrated in FIG. 60;

FIG. 66 is a schematic of the switch-and-display interface and the portion of the operator and display panel which is related to the switch-and-display interface, both of which are illustrated in FIG. 2*a*;

FIG. 67 is a schematic of the address and command decoding and buffering circuit which is illustrated in FIG. 61;

FIG. 68 is a schematic of the roll along panel interface and the portion of the operator control and display panel which is related to the roll along panel interface, both of which are illustrated in FIG. 2*a*;

FIG. 69 is a schematic of the data display control panel and the data display control panel interface illustrated in FIG. 2*a*;

FIG. 70 is a schematic of the time base generator illustrated in FIG. 69;

FIG. 71 is a schematic of the address decoding illustrated in FIG. 69;

FIG. 72 is a schematic of the self-scan interface illustrated in FIG. 2*a*; and

Figure 73:
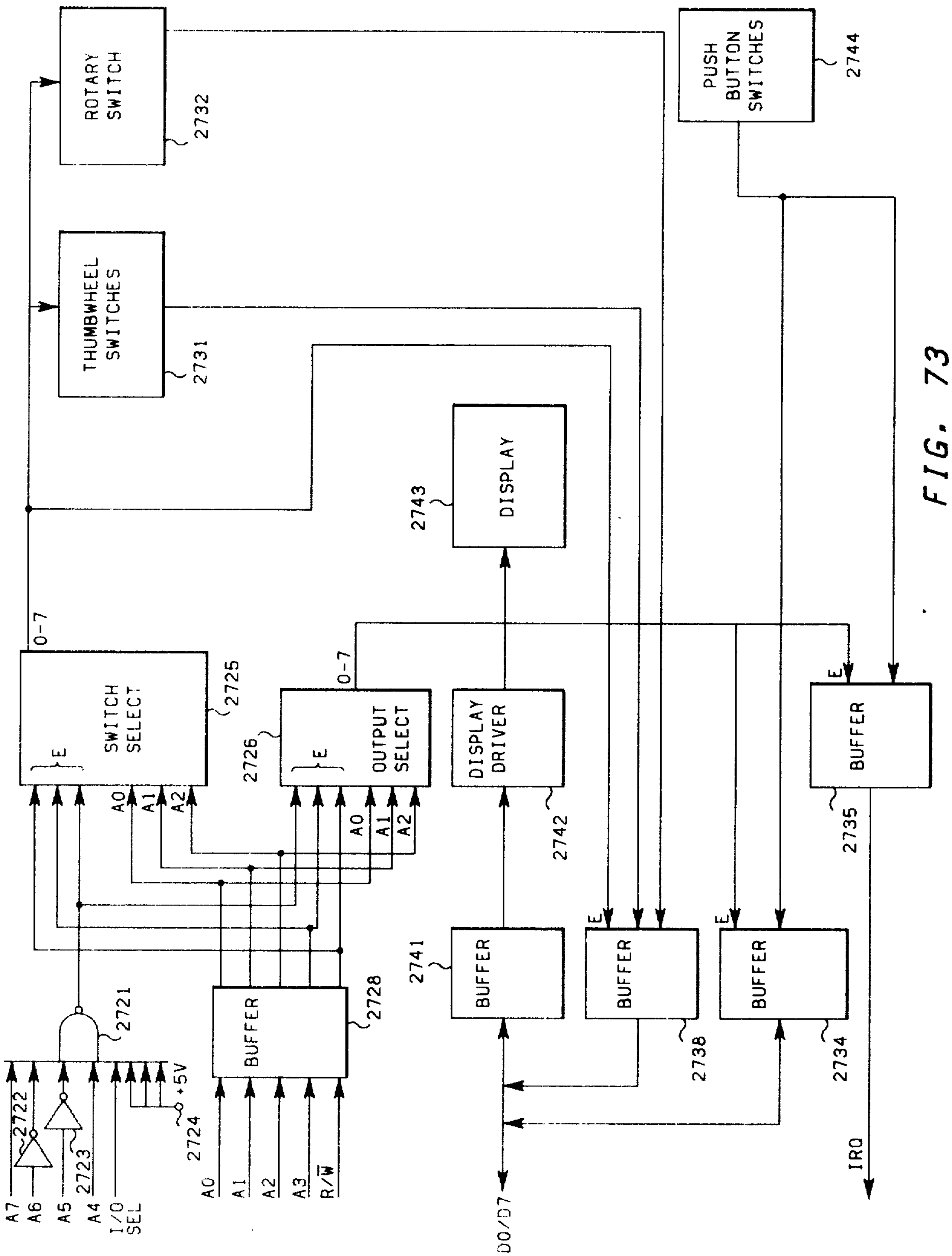

FIG. 73 is a schematic of the magnetic tape panel and the magnetic tape panel interface illustrated in FIG. 2*a*.

The invention is described in terms of a seismic exploration system but it is noted that the invention is not limited to seismic exploration systems but is rather applicable to any system in which it is desired to utilize a central computer to control a recording medium with a peripheral computer being utilized to acquire, process and supply data to a recording medium.

In the preferred embodiment of the present invention, the central computer utilized is a 6800 Microprocessor manufactured by Motorola Semiconductor and the peripheral computer utilized is a 2900 Microprocessor system manufactured by Advanced Micro Devices. The invention, however, is not limited to these specific microprocessor systems but is rather applicable to other computer systems which could be utilized for a central computer system or a peripheral computer system.

The 6800 Microprocessor system has a cycle time of 1 microsecond. Four to eight cycles may be necessary to execute a particular instruction. Thus 4 to 8 microseconds may be required per instruction for the 6800 Microprocessor system. In contrast, a 2900 Microprocessor has a cycle time of 225 nanoseconds and only one cycle is necessary to execute a particular instruction. Thus only 225 nanoseconds is required for each instruction of the 2900 Microprocessor. The very fast cycle time of the 2900 Microprocessor enables the handling of the data at the rate which must be utilized in a commercially feasible seismic exploration system.

The 6800 Microprocessor system is a standard, well-documented, computer system. The 6800 is a MOS device and is thus inexpensive and the equipment that is used to interface with the 6800 Microprocessor is inexpensive. The 2900 Microprocessor system is a relatively new computer system which is not well-documented. The 2900 Microprocessor is a bipolar device and thus the 2900 Microprocessor is expensive and consumes considerable power with attendant heat dissipation problems. All support components used with the 2900 Microprocessor must meet the same speed requirements and therefore carry the same cost and power penalties. It is thus desirable to use the 6800 Microprocessor to control all of the functions of the data acquisition sequence possible with the 2900 Microprocessor being utilized only to process the data and supply the data to the recording medium.

In the preferred embodiments of the present invention, the recording medium is a magnetic tape unit. However, other types of recording mediums could be utilized if desired. The particular magnetic tape unit utilized is a Kennedy Model 9800 Tape Unit with a Kennedy Model 9218 Formatter. Other models could be utilized if desired.

Figure 1:
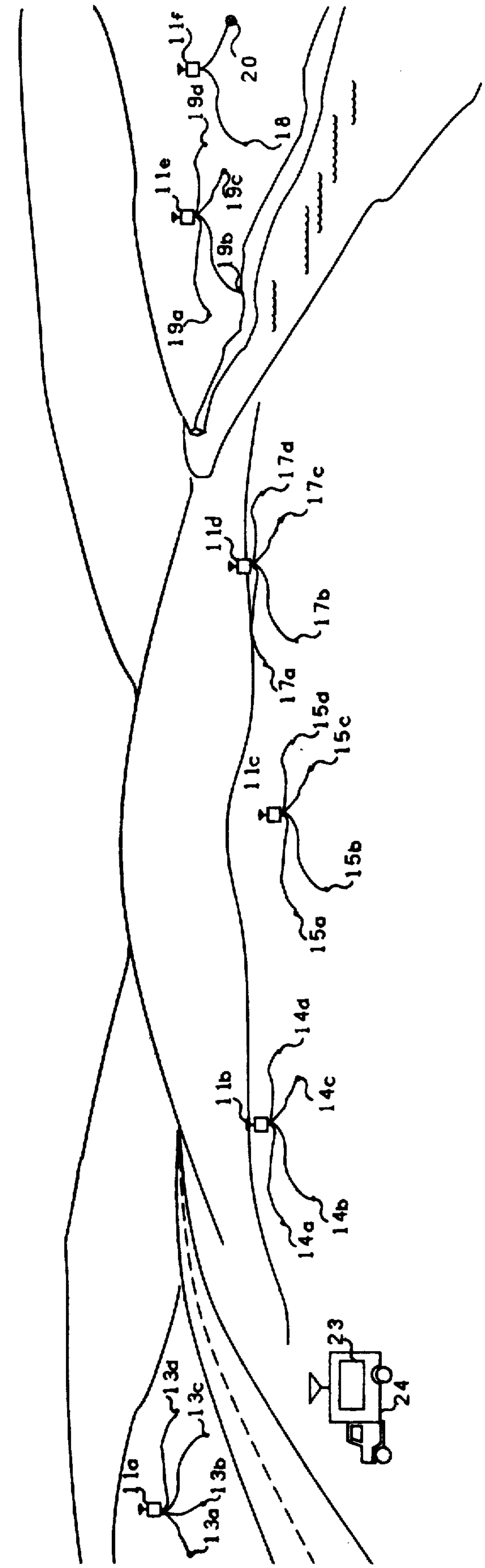

Referring now to the drawings and in particular to FIG. 1, there is illustrated a portion of a geophone spread. The geophone stations 13 *a–d*, 14 *a–d*, 15 *a–d*, 17 *a–d*, and 19 *a–d*, can be made up of a plurality of individual geophone sensors arranged in a predetermined manner so as to obtain maximum cancellation of noise and maximum signal resolution. Each of a plurality of remote geophone monitoring means (referred to hereinafter as an RTU) 11 *a–e* is associated with a respective group of the geophone stations. In the presently preferred embodiment, each group is composed of four geophone stations. Each RTU 11 *a–f* is equipped with a radio antenna and an associated transceiver. A shot point 20 having an RTU 11*f* and a geophone station 18 associated therewith is utilized to supply seismic energy to the earth. In this preferred embodiment, the shot point 20 is an explosive charge located in a shot hole but other types of seismic energy sources may be utilized if desired. The operation of the seismic exploration system is controlled by the use of a central recording and control unit (referred to hereinafter as the CRS) 23 which is conveniently located in the vehicle 24. The CRS 23 also has an antenna and transceiver associated therewith. The CRS 23 is designed to be portable and may be located in other facilities such as a helicopter, boat, or any desired structure.

Only a portion of the geophone spread is illustrated in FIG. 1 for the sake of convenience. If a common geophone spread having 48 geophone stations is utilized, then twelve RTUs are utilized in the preferred embodiment of this invention to monitor the 48 geophone stations with the output of 4 geophone stations being supplied to each RTU. A thirteenth RTU is needed to control the shot point and would be also available to monitor two other geophone stations if desired. In modern seismic techniques, several hundred geophone stations may be laid out in a single, long, extended line or in two or more substantially parallel lines. If desired, additional geophones can be located in transversing line segments. If only 48 geophone stations are being used to monitor each shot, then only the twelve RTUs associated with the 48 geophone stations, which are to be used to monitor a particular shot, and the RTU associated with the shot point are activated by the CRS 23 located in truck 24. A first shot is then fired and the seismic data is recorded at the CRS 23 located in vehicle 24. A different set of RTUs may be then be activated to record the next shot. This procedure is continued until the seismic survey is completed. The vehicle 24 may be moved easily to stay in range of the RTUs being used to monitor a particular shot.

If a plurality of geophone spreads are used it may be possible to fire a shot and record the results for a first spread and, while a second shot is being readied for the first spread, a first shot can be fired for a second spread and the results recorded at the CRS 23 located in truck 24. In this manner the use of the seismic exploration system is enhanced.

As is illustrated in FIG. 1, the system of the present invention is particularly applicable to situations in which the terrain presents substantial variations. The use of the RF link between the CRS 23 and the plurality of RTUs 11 *a–f* provides a means by which varied terrain may be surveyed without the need to place cables across roads, large depressions, mountainous areas, rivers, jungles, or other similar areas. The individual geophone stations and their associated RTUs may be set out as illustrated in FIG. 1 and the CRS 23 may then be moved to convenient locations to monitor and control the seismic exploration system.

All operations start with the CRS 23 located in vehicle 24. When it is desired to fire a shot to collect seismic data, the CRS 23 first turns on the RTUs, which have been activated during deployment thereof, and which are associated with the geophones which are to be utilized to monitor a particular shot to be fired. The CRS 23 then interrogates each of these RTUs to determine if the RTU is operable. If any RTU is found to be inoperable, then the RTU is either repaired or replaced before the shot is fired. If all of the selected RTUs are operable, then the CRS 23 issues a fire command to the RTU 11*f* which is controlling the seismic energy source 20.

The shot is fired in response to the fire command and the reflected energy is sensed by the geophone stations 13 *a–d*, 14 *a–d*, 15 *a–d*, 17 *a–d* and 19 *a–d*. The geophone stations 13 *a–d*, 14 *a–d*, 15 *a–d*, 17 *a–d* and 19 *a–d* transduce the reflected acoustical energy to analog electrical signals and then these electrical signals, representative of the seismic data, are supplied to the RTUs 11 *a–e*. The analog electrical signals are sampled, with the sampled values being converted to digital data and stored in memory at the respective one of the RTUs 11 *a–e*.

After the seismic data has been stored in memory at the RTUs 11 *a–e*, the CRS 23 first interrogates RTU 11*f* to determine the time at which the shot was fired (uphole data). The geophone station 18 provides the "uphole" data to the RTU 11*f*. Once this information has been obtained, the CRS 23 begins an interrogation of the RTUs 11 *a–e* to obtain the seismic data stored in memory at the RTUs 11 *a–e*. RTU 11*a* is first addressed and commanded to send the seismic data stored in memory in RTU 11*a*. In response to this command, data is transmitted from RTU 11*a* to the CRS 23. The CRS 23 checks this data to determine if errors are present in the data. If the error rate of the data transmitted from RTU 11*a* is greater than a specified limit, the CRS 23 commands the RTU 11*a* to retransmit the data. The data is retransmitted from the RTU 11*a* in response to the retransmit command and the retransmitted data is again checked for errors. The retransmission is utilized to replace bad data in the first transmission. This process is continued until the seismic data stored in the memory at the CRS 23 has an acceptable error rate.

After the seismic data has been obtained from RTU 11*a* the CRS commands RTU 11*a* to shut down and all functions of the RTU 11*a*, except the functions which monitor commands from the CRS 23, are shut down to conserve battery power. The CRS 23 then commands RTU 11*b* to transmit the seismic data stored in memory in RTU 11*b*. The seismic data is obtained from RTU 11*b* in the manner previously described for RTU 11*a* and this procedure is continued until the data has been obtained from all the RTUs which are utilized to record the seismic data from the particular shot fired.

After all of the seismic data from the particular shot has been stored in memory in CRS 23, a second shot may then be fired to obtain a second set of seismic data. The shot point 20 may be moved and the same RTUs utilized to record the shot or different RTUs may be utilized to record the shot. It is very common to shut down RTU 11*a* and turn on RTU 11*g*, not illustrated, in such a manner so as to extend the spread being utilized to record a shot without actually having to move geophone stations or RTUs. This technique is commonly referred to as "roll along".

The procedure set forth in the preceding paragraphs is repeated for the second shot and for any number of subsequent shots until the seismic survey is completed. The seismic data stored in memory at CRS 23 can be shipped or otherwise taken to a central processing facility where the seismic data can be interpreted.

The seismic exploration system of the present invention, as illustrated in FIG. 1, has the advantage of providing a reliable two-way RF link which facilitates compiling of the seismic data at a central location while avoiding the need for long cable runs. Error detection techniques are utilized to increase the reliability of the two-way RF link, and systems status checks are utilized to increase the reliability of the seismic exploration system and to insure that the seismic exploration system is operational during the seismic survey. The seismic data obtained from the RTUs 11 *a–e* and transmitted to the CRS 23 is displayed at the CRS 23 in such a manner that the operator can determine if the system is operable without having to process the seismic data. Also, alarms are provided at the CRS 23 to indicate if a portion of the system is malfunctioning so immediate remedial action may be taken.

The seismic exploration system of the present invention has been illustrated and described in a very general nature in FIG. 1. The following description is a more detailed description of a preferred embodiment of the seismic exploration system of the present invention. The detailed description of the seismic exploration system is set forth in terms of a single BTU 11*a* and CRS 23. The control of the seismic energy source 20 is also described in detail.

The CRS 23, illustrated in FIG. 1, is illustrated in block diagram form in FIG. 2*a*. The RTU 11*a*, illustrated in FIG. 1, is illustrated in block diagram form in FIG. 2*b*. It should be noted that RTU 11*f*, which is illustrated as controlling shot point 20 and geophone station 18 in FIG. 1, can be identical to RTU 11*a*. Thus FIG. 2*b* will be utilized to describe not only the monitoring of the geophone stations but also the control of the seismic energy source utilized to impart energy into the earth. FIGS. 2*a* and 2*b* represent a complete illustration of the seismic exploration system of the present invention in block diagram form. In the following description, the seismic exploration system of the present invention, as illustrated in FIGS. 2*a* and 2*b*, is described as an integral system and thus FIGS. 2*a* and 2*b* are referred to alternately throughout the following description.

Referring now to FIGS. 2*a* and 2*b*, the seismic exploration system is under the control of computer means 51 which is located in the CRS illustrated in FIG. 2*a*. The operator inputs information into computer means 51 from the operator control and display panel 41. System operation is initiated from the operator control and display panel 41. To begin a seismic survey the CRS, illustrated in FIG. 2*a*, is first energized. An operator then carries the RTU, illustrated in FIG. 2*b*, to a desired location. The operator who is deploying the RTU communicates with the operator at the CRS by means of a handset connector 102.

After the RTU, illustrated in FIG. 2*b*, has been deployed at its desired location, the operator at the CRS, illustrated in FIG. 2*a*, will assign the RTU a number and will also assign to each RTU four station numbers. The RTU number and the four station numbers are stored in memory in computer means 51. When the operator at the CRS desires to communicate with a particular RTU, the number of the RTU is input to computer means 51 and computer means 51 issues the proper address to the RTU with which communication is desired to be established.

When the four station numbers are input to the computer means 51, the computer means 51 automatically issues a test command which will be referred to as a normal test. The normal test command is input to the command formatter 52 through bus 54 which is operably connected to the computer bus 56. The computer bus 56 extends from computer means 51 to the computer-to-computer interface 58. The normal test command is converted from parallel data to serial data by the command formatter 52 and is input to the RF transmitter 59 through signal line 61. The transmit/receive (t/r)

switch 63 is placed in a transmit position and the normal test command is transmitted by the RF transmitter 59 through antenna 64 to the RTU illustrated in FIG. 2*b*. The normal test command is received at antenna 104 and is relayed to the RF receiver 100 through the t/r switch 107. The t/r switch 107 is normally in a receive mode. The normal test command is supplied from the RF receiver 106 to the RF interface 108 through signal line 109. From the RF interface 108, the normal test command is input to computer means 111 through bus 113 which is operably connected to the computer bus 115.

In response to the normal test command, computer means 111 implements a number of tests of the RTU. The four geophone stations which are connected to the RTU through the geophone connectors 121 and 122 are checked for continuity, response, and electric current leakage. Basic performance tests are performed on the geophones and the RTU and all of the power supply voltages are checked to insure that sufficient power is available for operation of the RTU.

The test interface 201 and the calibrate card 211 provide the required voltage levels and the control signals which are utilized in the normal tests. The test interface 201 and the calibrate card 211 essentially act as interfaces for computer means 111 and allow computer means 111 to control the performance of the normal test.

Data obtained during the normal test is supplied to the multiplexer associated with the analog to digital (A/D) conversion system 141. This analog data is sampled, with the samples being held and then converted from analog to digital form. The resulting digital data is then stored in memory unit 125.

The temperature of the RTU is checked during the normal test. The RTU is designed to operate from −20° C. to +70° C. Temperature sensor 148 supplies a signal 149 which is representative of the temperature of the RTU to the multiplexer associated with the A/D conversion unit 141. Signal 149 provides an indication of the temperature of the RTU and thus allows an operator at the CRS to determine if the RTU temperature is within the design limitations.

The battery voltages which are supplied from the power supply and regulator 186 are supplied as inputs to the multiplexer associated with the A/D conversion unit 141. These signals are illustrated in FIG. 2*b* and are designated as signals 188–199. The voltage levels of signals 188–199 will be described more fully in connection with the detailed description of the power supply and regulator 186. The voltage levels are multiplexed and converted to digital form and are stored in memory. This test provides the operator at the CRS with the information concerning the availability of power to the RTU.

The A/D conversion unit 141 is also calibrated during the normal test sequence. A sequence of input voltages are supplied by calibrate card 211 by means of signal 203 to the A/D conversion unit 141 to check the linearity of the response of the A/D conversion unit. The response of the A/D conversion unit 141 is stored in memory and provides a means by which the A/D conversion unit 141 can be calibrated if the test shows that the A/D conversion is not calibrated. The gain ranging amplifier system 171 is calibrated by providing a signal 205 from the calibrate card 211 which is provided to the multiplexer associated with the gain ranging amplifier system 171. Signal 205 is representative of a percentage of a full scale input to the gain ranging amplifier system 171. The gain ranging amplifier system 171 amplifies signal 205 in various stages and these amplified signals are supplied via signal line 175 to the multiplexer associated with the A/D conversion unit 141. This test data is converted into digital form and stored and is later used to calibrate the gain ranging amplifier system 171 during the data acquisition sequence for the RTU.

Leakage test, continuity test and levitate test are performed on the geophone units. These tests provide an operator with information as to the operability of the geophone units.

After the computer means 51 has issued a normal test command, enough time is allowed for the normal test to be completed by the RTU. The length of time waited is determined by the CRS countdown 65, which is connected to the computer bus 56 through bus 66. After the CRS countdown 65 indicates that the RTU has completed the normal test, the computer means 51 commands the RTU to send the test data. This command is transferred to the command formatter 52 and the RF transmitter 59 and thus to the RTU RF receiver 106 in the same manner as previously described for the normal test command. In response to the command to send data, computer means 111 retrieves the normal test data from memory means 125 through memory control 124 and the normal data is supplied to the RF interface 108. The normal test data is converted from parallel to serial form and is supplied to the RF transmitter 127 from the RF interface 108, through signal line 126. The t/r switch 107 is placed in a transmit mode and the normal test data is transmitted from the RF transmitter 127 by means of antenna 104 to antenna 64. The normal test data is thus supplied through t/r switch 63, which is in a receive mode normally, to the RF receiver 68. The normal test data is supplied to data formatter 71 through signal line 69. The normal test data is converted from serial to parallel format in the data formatter 71 which also performs a parity check to detect errors in the data transmitted from the RTU to the CRS. The normal test data is then transmitted to the computer means 74 through bus 72 which is operably connected to the computer bus 75. The computer bus 75 extends from computer 74 to the computer-to-computer interface 58.

Computer means 74 maintains a count of the number of errors in the normal test data transmitted from the RTU. This count is transmitted to the computer means 51 through computer bus 75, the computer-to-computer interface 58 and computer bus 56. The computer means 51 then makes a decision as to whether the error rate of the normal test data transmitted from the RTU is acceptable. If the error rate is acceptable the computer means 51 sends an acknowledge command to the RTU and the RTU shuts down all power except the power to the function which monitors commands from the CRS, to conserve battery power. If the error rate is not acceptable the computer means 51 does not send the acknowledge command but rather sends a retransmit command. In response to the retransmit command, the RTU will again transmit the normal test data. A parity check is performed on the retransmitted normal test data by the formatter 71 in the same manner as previously described. The good data blocks in the retransmitted test data is utilized to replace bad data blocks in the initially transmitted normal test data, which is stored in memory in computer means 74, and in this manner the error rate is reduced.

The capability to detect errors in the data that is transmitted from the RTU and to command retransmission of the data in which the error rate is unacceptable is utilized to increase the reliability of the RF link which connects the RTU to the CRS. The lack of reliability of the RF link has been a serious problem in prior art systems, as has been previously discussed, and the use of error detection and retransmission of the normal test data is one of the primary features of the present invention which presents an improvement over the prior art in that the reliability of the RF link between the CRS and the RTU is thus increased.

The error count of the new normal test data, which represents a compilation of the first normal test data transmitted and the retransmission of the normal test data, is again checked to ascertain whether or not the error rate is acceptable. If the error rate is acceptable, then an acknowledge command is sent to the RTU from computer means 51 and the RTU shuts down power. If the error rate is again not acceptable, a retransmit command will be issued and this procedure is continued until either acceptable data is obtained from the RTU or an operator decides that the data is acceptable even though there are errors still present in the data.

The procedure outlined in the preceding paragraphs is continued until all of the RTUs and the geophone stations have been deployed. After all the RTUs have been deployed, the operator will set up a particular spread configuration by selecting the RTUs to be utilized to monitor the particular shot and by selecting a particular shot point. After the spread configuration has been set up, the operator will implement a second normal test from the operator control and display panel 41. The second normal test command is supplied to the switch and display interface 43 through signal line 44 and thus to computer means 51 through bus 46 which is operably connected to computer bus 56. In response to the second normal test command from the operator control and display panel 41, computer means 51 will address all of the RTUs which have been selected as part of a particular spread configuration and will send a normal test command to all of the RTUs thus selected. This command is transmitted to the RTUs in the same manner as previously described and all of the RTUs will perform the same normal test, previously described, at the same time. After the period of time allowed for the RTUs to complete the normal test has passed, the computer means 51 will sequentially address the RTUs in the selected spread configuration to obtain the normal test data in the same manner as previously described. If the normal test from all of the selected RTUs indicates that all of the RTUs in the particular spread configuration are operational, then computer means 51 informs the operator through the operator control and display panel 41 that the system is operational. The operator is also informed of any malfunction in the RTUs and thus total operability of the system is insured before the seismic survey is begun. This is the second feature of the present invention which greatly increases the reliability of the seismic exploration system embodying the present invention.

After the normal test on the RTUs in the particular spread has been performed, the seismic exploration system is ready to fire a shot and record data from the shot. In preparing to fire a shot, the operator first performs a test on the RTU which is controlling the shot point to verify that the shot point is connected to the desired RTU and to verify that the shot point is in the desired location. The command to perform a test on the shot point RTU is transmitted to the shot point RTU by computer means 51 in the manner previously described for the nomal test command. The test data for the shot point RTU is transmitted back to the CRS also in the manner previously described. The test data tells the computer means 51 that the shot point location is correct. The shot point is connected to one of the inputs on geophone connectors 121 or 122. The shot point is addressed through signal lines 131 and 132 which are operably connected to the RF transmitter 127 and the RF receiver 106. The data is supplied from the shot point RTU to the A/D conversion unit 141 in the same manner as previously described for the normal test data from the geophone stations.

After the test of the RTU connected to the shot point has been completed and the test results have been verified by computer means 51, computer means 51 will automatically send out a prepare for blast command to all of the RTUs in the particular spread configuration. The prepare for blast command will instruct all of the selected RTUs to power up and prepare to receive data. At the same time that the prepare for blast command is sent to the RTUs, the computer means 51 will instruct computer means 74 to prepare to receive data. The computer means 74 will instruct the data formatter 71 to prepare to receive data. After the RTUs have been prepared to receive data, a blast command issues from computer means 51 and the shot is fired in response to the blast command. All of the selected RTUs will start gathering data at a fixed time delay after the blast command is transmitted from computer means 51.

The seismic data which is sensed at the geophone station is converted to analog electrical signals and is transmitted from four geophone stations through the geophone connectors 121 and 122 to the four channels of the preamplifier unit 135 through signal lines 136–139. The analog seismic data is amplified by a factor of 64 by preamplifier 135 and is transmitted through signal lines 143–146 to the multiplexer input of the notch filter 151. The seismic data is not multiplexed in notch filter 151, but is supplied as four separate channels of data through the notch filter 151 to the alias filters 161 through signal lines 153–156. The notch filter is utilized to attenuate 60 Hz inference which may occur from power lines and other sources of 60 Hz power. The alias filter 161 is made up of 4 channels. The alias filters 161 are utilized to prevent aliasing resulting from the sampling functions of the data acquisition system. The alias filters 161 are well known in communications art and may simply be likened to low pass filters.

The seismic data is supplied as 4 channels of data over signal lines 162–165 from the alias filters 161 to the gain ranging amplifier system 171. The gain ranging amplifier system 171, in combination with the digital gain ranging amplifier system 173, multiplexes the 4 channels of seismic data into a single channel of seismic data and amplifies the signal as needed to supply a full range input to the A/D conversion system 141. The single channel of seismic data is supplied from the gain ranging amplifier system 171 to the A/D conversion system 141 through signal line 175. The single channel of seismic data is sampled and is converted from analog to digital data by the A/D conversion system 141. The digital data thus derived is supplied to the memory control unit 124 through bus 177, which is operably connected to the computer bus 115, and through bus 178, which is also operably connected to the computer bus 115 and to the memory control unit 124. The digital gain ranging amplifier system 173 is also connected to the computer bus 115 through bus 181. The total signal supplied to the memory control unit 124 through the digital gain ranging amplifier system 173 and the A/D conversion system 141 is a digital signal which is representative both of the analog seismic data and of the amount of gain which has been applied by the gain ranging amplifier system 171. This seismic data is supplied from the memory control unit 124 to memory 125 through signal line 182 and is stored in memory 125.

After sufficient time has passed for the data acquisition procedure at the RTUs to be completed, the CRS first obtains the uphole and timebreak information from the RTU which is controlling the shot point. If the timebreak and uphole information is within specified system limitations (in this preferred embodiment 15 milliseconds), computer means 51 will commence addressing the RTUs in the particular spread configuration. The RTUs are addressed and the data is sent from the memory in exactly the manner as has been previously described for the transmission of the normal test command and the transmission of normal test data from the RTU to the CRS. The data is checked for errors, as has been previously described, and is stored in memory at computer means 74. If the data has an acceptable error rate, the data is transferred from the memory of computer means 74 through computer bus 75 and bus 77 to the magnetic tape interface 78. The seismic data is transferred from the magnetic tape interface 78 to the magnetic tape unit 79 through signal line 81 and is thus stored on the magnetic tape in the magnetic tape unit 79. Header data and other control data needed for the magnetic tape unit 79 is supplied from the magnetic tape panel 83 which is connected to the magnetic tape panel interface 84 through signal line 86. The magnetic tape panel interface 84 is connected to the computer bus 56 through bus 87. Command inputs at the magnetic tape panel 83 are transferred to the magnetic tape controller 88 through bus 89 which is operably connected to computer bus 56. The magnetic tape controller 88 implements the commands transmitted from the magnetic tape panel 83 and controls the magentic tape unit 79 and the magnetic tape interface 78 by means of commands transmitted over signal line 91. All of the command inputs from the magnetic tape panel 83 are processed by computer means 51 before being transferred to the magnetic tape controller 88. In the CRS, as illustrated in FIG. *2a*, all commands are processed by computer means 51 which controls the CRS.

The seismic data may also be displayed for the operator at the data display unit 93 which is connected to the computer bus 75 by bus 94. Essentially, the data display unit may be utilized to display the seismic data in such a manner that the operator can determine if the system is operational and may also be utilized to check the RF link between the CRS and the RTU to be sure that the RF link is operational. The format of the data and the manner in which the data is displayed is controlled from the data display control panel 95 which is operably connected to the data display control panel interface 97 by means of signal line 96. The data display control panel interface 97 is operably connected to the computer bus 75 by bus 98. Command inputs at the data display control panel 95 are transferred through data display control panel interface 97 to the computer means 51 and are then transferred from computer means 51 to the data display unit 93.

The self scan interface 33 is operably connected to the computer bus 56 by bus 35 and is operably connected to the operator control and display panel 41 through signal line 36. The self scan interface 33 provides an interface for information being transmitted from computer means 51 to the operator control and display panel 41.

The roll along panel interface 37 is operably connected to the computer bus 56 through bus 38. The roll along panel interface 37 is operably connected to the operator control and display panel 41 through signal line 39. The roll along panel interface 37 is provided to display information from the computer means 51 and primarily provides an indication of which RTUs are available to be utilized in a particular spread configuration and thus aids the operator in setting up a spread configuration.

Power is supplied to the RTU from the power supply and regulator system 186. The power supply and regulator system 186 is controlled from computer means 111 by signal line 187. The power levels available from the power supply and regulator system will be more fully discussed under the detailed description of the power supply and regulator system 186.

Audio communication between the CRS and the RTU is provided from handsets located at the operator control and display panel 41 and a handset connected to the handset connector 102. Audio signals are provided from the operator control and display panel 41 to the RF transmitter 59 through signal line 50. Audio signals are provided from the RF receiver 68 to the operator control and display panel 41 through signal line 60. Audio signals from the handset connected to the handset connector 102 to the RF transmitter 127 and from the RF receiver 106 to the handset connected to the handset connector 102 are provided through signal lines 131 and 132 which provide a bidirectional signal path.

The antenna 110, which will be referred to as an anti-theft antenna, is utilized to transmit a signal to the CRS, which indicates that the RTU is tilted. Such tilting may result from wind, an animal knocking over the RTU or unauthorized handling. The signal indicating that the RTU is tilted is generated in the RF interface 108. It is important to know when the RTU is tilted both because signals transmitted from the antenna 104 may not propagate as far if the RTU is tilted, which would result in antenna misalignment, and to indicate possible theft of the RTU.

The communications link between the CRS illustrated in FIG. *2a* and the RTU illustrated in FIG. *2b* is formed by the RF transmitter 59, the RF receiver 68, the transmit/receive switch 63 and the antenna 64, illustrated in FIG. *2a*, together with the RF transmitter 127, the RF receiver 106, the transmit/receive switch 107 and the antenna 104 illustrated in FIG. *2b*. The antennas 64 and 104 are preferably parasitic element antennas normally referred to as Yagi antennas. With a Yagi antenna design, it is possible to achieve high gain with a small physical size. The Yagi design utilized in the seismic exploration system of the present invention provides 6 db of gain. All data transmission between the RF transmitter 59 and the RF receiver 106 and between the RF transmitter 127 and the RF receiver 68 is accomplished digitally using narrow band frequency modulation. The communication system is operated in the VHF band and is preferably operated within the frequency band of 216 MHz to 220 MHz and at power level of 8±1 watts. At these frequencies and power level and with the antenna gains employed, the system will transmit successfully over a 160 db path loss which represents 8 to 10 miles distance when using the seismic exploration system of the present invention in a normal terrain environment.

Because the communication system employed in the seismic exploration system of the present invention operates in the VHF range, the radio waves are propagated by means of direct waves. It is thus desirable that line of sight between the receiving antenna 104 and the transmitting antenna 64 be maintained. However, due to a certain amount of refraction or bending of the radio waves that takes place in the lower atmosphere, the receiving antenna 104 can be located beyond the horizon and still receive transmission. However, the strength of the received signal will be reduced which may cause problems if large distances are involved or if the terrain or weather conditions are unfavorable. Radio waves in the VHF frequency range may also be blocked or reflected by objects which are large in size in comparison to the wave length. In the VHF frequency range at frequencies above 100 MHz, objects such as trees and buildings will block or reflect the radio waves noticeably.

Because of the characteristics of radio waves in the VHF frequency range, it is important that the communication system utilized in the seismic exploration system of the present invention be set up carefully so as to avoid obstacles which can block or reflect the radio waves or to avoid over-the-horizon transmission if possible. In this manner, radio waves having a maximum signal strength will be received by the RF receivers 106 and 68 which will enhance the reliability of the seismic exploration system of the present invention.

In the preceding paragraphs the seismic exploration system of the present invention has been described in terms of a functional block diagram as illustrated in FIGS. *2a*and *2b*. The following description and figures present a preferred implementation of the functional blocks illustrated in FIGS. *2a* and *2b*. Many different circuit configurations could be utilized to accomplish the functions illustrated in FIGS. *2a* and *2b*. The following circuits illustrated in FIGS. 3–74 are a preferred method of implementing the seismic exploration system of the present invention but the invention is not limited to these specific circuits illustrated in FIGS. 3–73.

Computer means 111 forms the heart of the RTU illustrated in FIG. *2b*. Computer means 111 is preferably a 6800 microprocessor system manufactured by Motorola Semiconductor. The 6800 microprocessor is a well-documented system. A complete description of the 6800 microprocessor may be found at pages 481–494 of "Microcomputer Base Design" by John B. Peatman, published in 1977 by McGraw-Hill Book Company, and at pages 299–340 of "Microprocessors and Microcomputers" by Branco Suchek, published in 1976 by John Wiley & Sons, Inc. These references discuss implementation of the 6800 Microprocessor system together with programming of the 6800 Microprocessor system. A number of references are also supplied by Motorola Semiconductor: M6800 Microcomputer System Design Data, (1976); M6800 Microprocessor Applications Manual (1976) and M6800 Programming Manual (1976).

Figure 3:
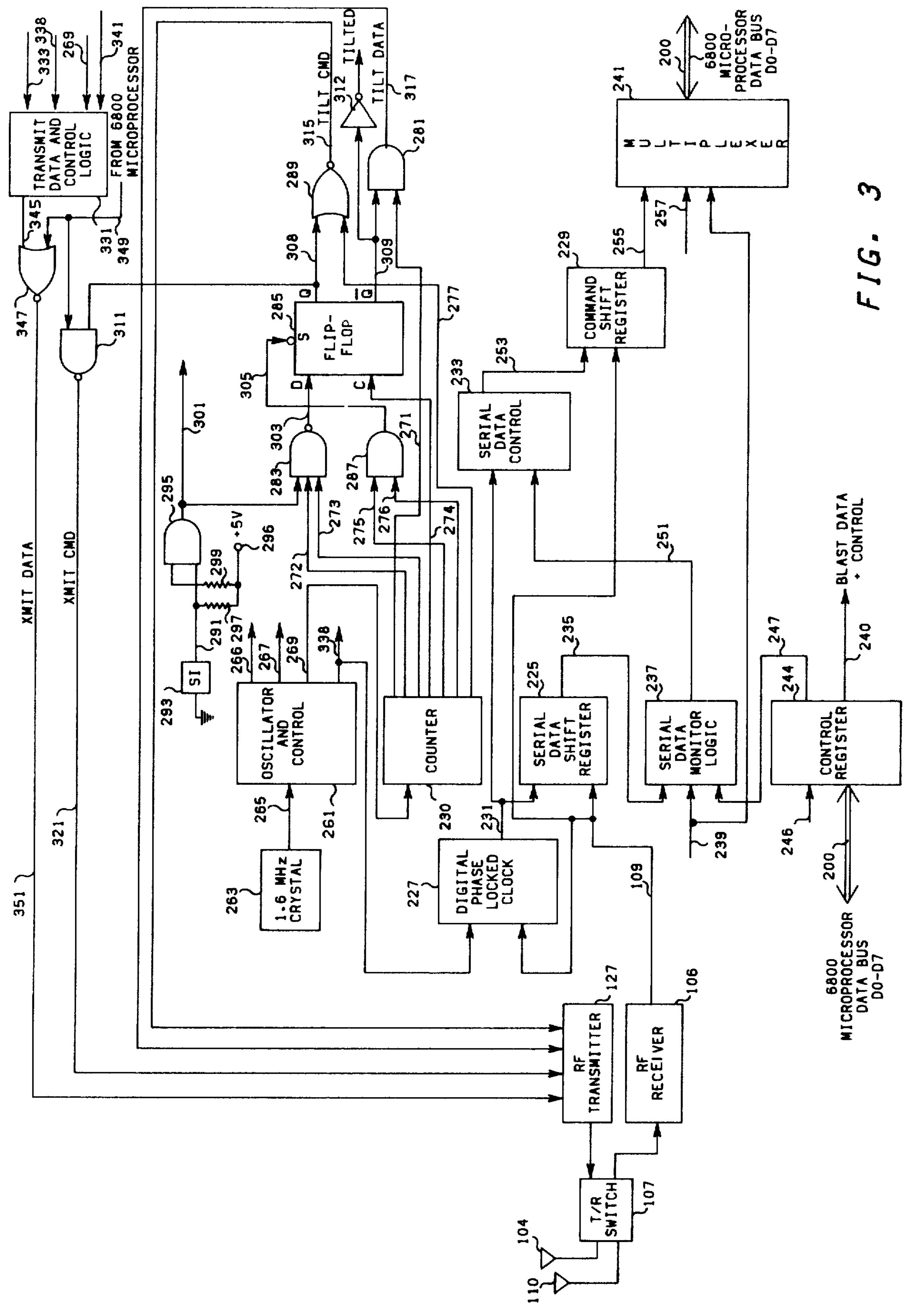
FIG. 3 is a schematic diagram of the RF interface illustrated in FIG. *2b;*

FIG. 3 is illustrative primarily of the RF receiver 106, the RF transmitter 127 and the RF interface 108 illustrated in FIG. *2b*. As has previously been described in reference to FIG. *2b*, the t/r switch 107 illustrated in FIG. 3 is normally in a receive mode. Commands from the CRS are supplied via the communications antenna 104 through the t/r switch 107 to the RF receiver 106. The commands from the CRS are then supplied by means of signal line 109 to the serial data shift register 225, the digital phase locked clock 227, and the command shift register 229. Each command from the CRS will consist of a preamble, a sync byte, an address and a command word. The preamble is utilized simply to alert the RTU that a command is being sent from the CRS. The sync byte provides synchronization between the CRS and the RTU and the address identifies a specific RTU which is being addressed by the CRS. The command word tells the RTU 6800 microprocessor what RTU function is to be performed. The digital phase locked clock 227 detects the fact that a carrier wave has been detected by the RF receiver 106 and supplies a 6.25 KHz clock signal 231 to the serial data control 233 and the serial data shift register 225. The 6.25 KHz frequency represented by signal 231 is equal to the data rate of the transmission from the CRS.

The serial data is shifted through the serial data shift register 225 in response to the clock signal 231. The serial data is supplied from the serial data shift register 225 by means of signal line 235 to the serial data monitor logic 237. The serial data monitor logic 237 is also supplied with a signal 239 which is representative of the specific address for the particular RTU. Signal 239 is also supplied as one input to the multiplexer 241.

Figure 4:
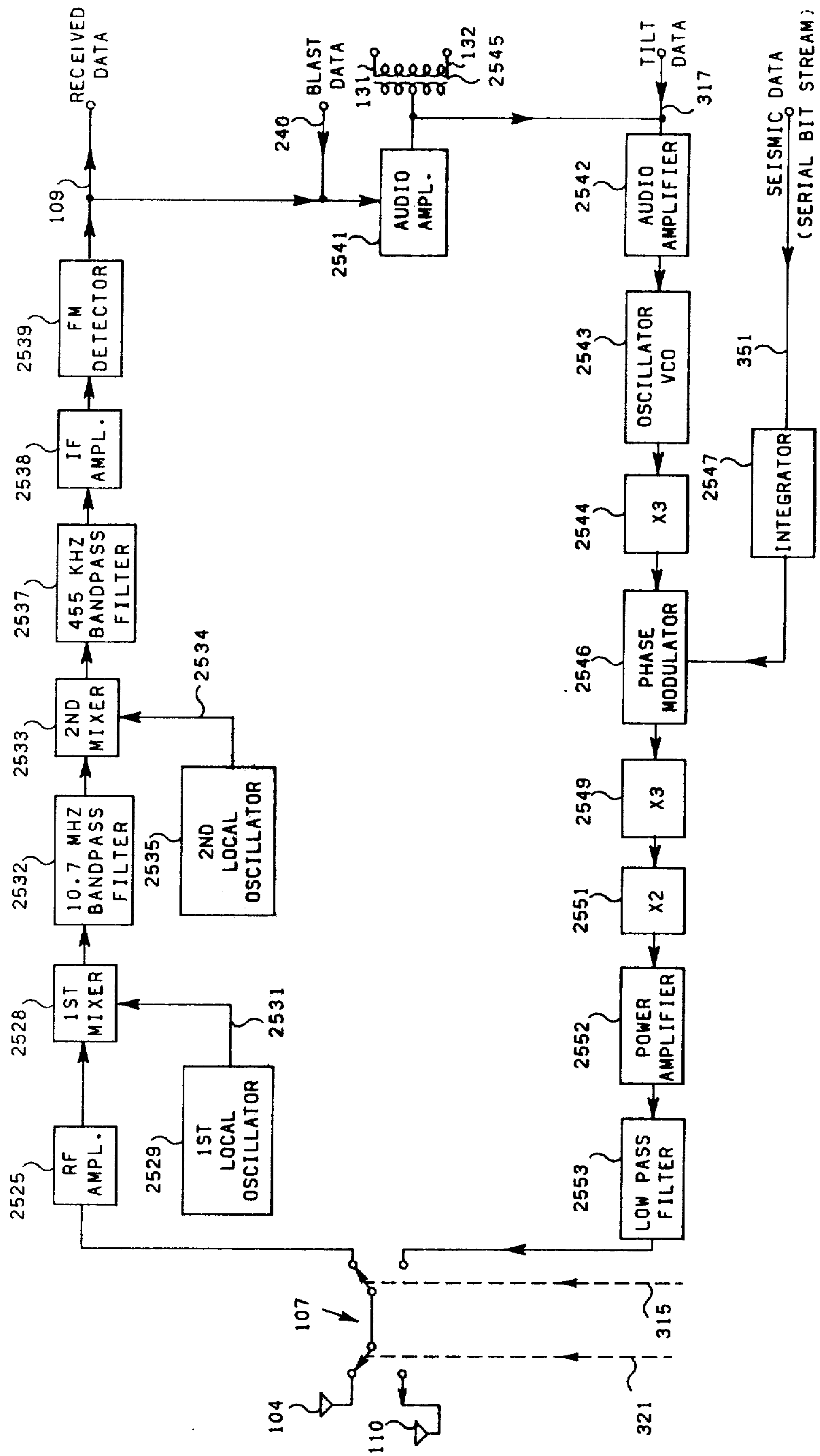
FIG. 4 is a schematic diagram of the RF receiver and the RF transmitter illustrated in FIG. *2b* and in FIG. 3.

The control register 244 is operably connected to the 6800 microprocessor data bus 200. Signal 246 which is a command from the 6800 microprocessor to load data into the control register 244 is supplied to the control register 244 from the memory location write control 409 illustrated in FIG. 7. The blaster control signal 240 is supplied as an output from the control register 244 and is provided to the RF transmitter 127 and the RF receiver 106 as is illustrated in FIG. 4. Signal 247 is supplied as an output from the control register 244 to the serial data monitor logic 237. Signal 247 is utilized to enable the RTU to respond not only to its specific address but also to an address of all of the RTUs from the CRS.

The serial data monitor logic 237 is utilized to determine if the address from the CRS is the same as the specific address of the RTU. It is also utilized to synchronize the received data and determine if a valid preamble has been sent. If the address from the CRS is valid, the serial data monitor logic 237 will supply an enabling signal 251 to the serial data control 233. In response to the enabling signal 251 and the clock signal 231, the serial data control 233 supplies a clock signal 253 to the command shift register 229. The clock signal 253 allows the command shift register 229 to load the command word from the CRS. The command word from the CRS is supplied through signal line 255 from the command shift register 229 to the multiplexer 241 and is supplied from the multiplexer 241 to the 6800 microprocessor by means of bus 200 which is operably connected to the multiplexer 241. Signal 257, which is a command to read data from the multiplexer 241, is supplied to the multiplexer 241 from the memory location read control 401, illustrated in FIG. 7. In this manner a command is supplied from the CRS to the 6800 microprocessor of the RTU and the RTU 6800 microprocessor will perform a specified function in response to the command from the CRS.

Clock signals for the RTU are supplied from the oscillator and control unit 261. The oscillator and control unit 261 is supplied a 1.6 MHz signal from the 1.6 MHz crystal 263 by means of signal line 265. In response to the 1.6 MHz signal, the oscillator and control unit 261 supplies an 800 KHz signal 266, a 400 KHz signal 267 and a 3.125 KHz signal 269. The 3.125 KHz signal is supplied as an input to the counter 230. In response to the 3.125 KHz signal 269, the counter 230, which in the preferred embodiment is an F4020 14-stage binary counter manufactured by Fairchild Semiconductor, provides a plurality of outputs having different periods. Signal 271 from the counter 230 has a period of 640 microseconds and is applied as one input to the AND gate 281. Signal 272 from the counter 230 has a period of 0.3293 milliseconds and is supplied as a first input to the NAND gate 283. Signal 273 from the counter 230 has a period of 0.6586 milliseconds and is supplied as a second input to the NAND gate 283. Signal 274 from the counter 230 has a period of 0.1647 milliseconds and is supplied as a clock signal to the decoder 285 which is a flip-flop. Signal 275 from the counter 230 has a period of 1.3172 seconds and is supplied as a first input to the AND gate 287. Signal 276 from the counter 230 has a period of 2.62 seconds and is supplied as a second input to the AND gate 287. Signal 277 from the counter 230 has a period of 5.24 seconds and is supplied as one input to the NOR gate 289.

The output signal 291 from switching means 293 is supplied as one input to the AND gate 295. Signal line 291 is tied to the +5 volt power supply 296, through resistor 297. The +5 volt power supply 296 is tied as a second input to the AND gate 295 through resistor 299. The output signal 301 from the AND gate 295 is supplied as a third input to the NAND gate 283 and is also supplied to the data bus driver 459, illustrated in FIG. 6.

The output signal 303 from the NAND gate 283 is supplied to the data input of the flip-flop 285. The output signal 305 from the AND gate 287 is supplied to the set input of the flip-flop 285.

The Q output of the flip-flop 285, which is represented as signal 308, is supplied as one input to the NOR gate 289 and is also supplied as one input to the NAND gate 311. The $\bar{Q}$ output of flip-flop 285, which is represented as signal 309, is supplied as a second input to the AND gate 281 and is also supplied as an input to the inverter 312. The output signal 315 from the NOR gate 289 is supplied as one input to the RF transmitter 127. The output signal 317 from the AND gate 281 is supplied as a second input to the RF transmitter 127.

Switch 293 is utilized to provide an alarm to the CRS if the RTU becomes tilted. In a radio communication system, such as is embodied in the seismic exploration system of the present invention, it is important that the RTU remain upright to insure that the communications antenna is properly aligned. After the RTUs are deployed it is possible that animals, wind, or other outside forces may cause the RTU to be tilted. It is also possible that a hunter or other person may think the RTU has been abandoned and simply try to pick up the RTU and carry it away. Switch 293 provides a means by which, upon the occurrence of any of these conditions, the CRS operator or field personnel may be altered to such conditions and thereby be stimulated to effect corrective action.

The alarm system indicating that the RTU has tilted is inhibited as long as the RTU is deployed in such a manner that the circuit card holding switch 293 is in a horizontal position. If the unit should be tilted at least 15° in any direction, switch 293 will open and will enable the tilt alarm circuitry. Switch 293 opens when the RTU is tilted, thus allowing the input of the AND gate 295, which is connected to signal line 291, to go high in response to the +5 volt power supply 296. Both inputs of the AND gate 295 will thus be high and signal 301 will go high.

When a signal 301 from the AND gate 295 is high, the output signal 303 from the NAND gate 283 will go low when both signals 272 and 273 are high. This will have the effect of supplying a low input to the data input of the flip-flop 285. Similarly when signals 275 and 276 go high, the output signal 305 from the AND gate 287 will go high and the high signal will thus be supplied to the set input of flip-flop 285. With the flip-flop 285 in this state, the next time signal 274 goes high the flip-flop 285 output will toggle. Basically, as long as switch 293 is open and the Q output of the flip-flop 285 will toggle low for 81.92 milliseconds each time the counter 230 sequences through the decoded states. The output signal 308, having a period of 81.92 milliseconds, is supplied to the NAND gate 311 to thereby enable the transmitter by means of signal 321 which connects the NAND gate 311 to the transmitter 127.

The output signal 309 from the flip-flop 285 is high when the output signal 308 from the flip-flop 285 is low. Signal 271 from the counter 230 and the output signal 309 from the flip-flop 285 are combined by AND gate 281 to provide a 1.5625 KHz signal 317 from the output of the AND gate 281 to theRF transmitter 127. Signal 317 is a data signal which is transmitted to the CRS to indicate that the RTU is tilted. Signal 309 is also inverted by an inverter 312 and is utilized to drive an audio alarm transducer at the RTU. This audio alarm is utilized to scare away any animals or to indicate to a human who picks up the RTU that the RTU has not been abandoned. The NOR gate 289 combines the output signal 308 from the flip-flop 285 and the output signal 277 from the counter 230 to provide a tilt command signal 315. Tilt command signal 315 is supplied to the RF transmitter 127 and enables the RF transmitter 127 to transmit by means of the auxiliary antenna 110.

The transmit data and control logic 331, illustrated in FIG. 3, is utilized to supply data from the RTU transmitter 127 to be transmitted to the CRS. The transmit data and control logic 331 is supplied with a transmitter clock enable signal 333 which is supplied from the memory control register 336 illustrated in FIG. 6. The transmit data and control logic is also supplied with a 100 KHz signal 338 and a 400 KHz signal 269, both of which are supplied from the oscillator and control unit 261. The transmit data and control logic 331 is supplied with data by means of signal line 341 which is supplied from the write 343 illustrated in FIG. 6. In response to the input signal, the transmit data and control logic 331 supplies a serial data line 345 as one input to the NOR gate 347. The RTU 6800 microprocessor supplies a signal 349, which is an enabling signal for the RF transmitter 127, as a second input to the NOR gate 347 and as a second input to the NAND gate 311. Serial data is supplied to the RF transmitter 127 to be transmitted to the CRS by means of signal line 351 which connects the output of the NOR gate 347 to the RF transmitter 127. When it is desired to transmit data from the RTU to the CRS, signal 321 enables the RF transmitter 127 and the data supplied by signal line 351 is transmitted to the CRS from the RF transmitter 127 through the communications antenna 104. The t/r switch 107 is placed in the transmit mode when it is desired to transmit data from the RTU to the CRS.

Commercially available components which may be utilized in the circuit illustrated in FIG. 3 are as follows:

| | |
|---|---|
| Switch 293 | TS-1094 Omni Directional Sensor Fifth Dimension, Inc., Princeton, N.J. |
| 1.6 MHz crystal 263 | AMA-713A, MIL - Type HC-33-U Erie Freq. Cont. Inc., Carlisle, Pa. |
| Oscillator and Control 261 | F4702 - Fairchild Semiconductor |
| Serial Data Shift Register 225 | F4015 - Fairchild Semiconductor |
| Counter 230 | F4020 - Fairchild Semiconductor |
| Serial Data Monitor Logic 237 | 74C85 (two required) National Semiconductor |
| Control Register 244 | 74C175 - National Semiconductor |
| Serial Data Control | F4040 - Fairchild Semiconductor |
| Command Shift Register | F4020 - Fairchild Semiconductor |
| Multiplexer 241 | 9LS257 (two required) National Semiconductor |
| AND gate 295, 287, 281 | 74C08 - National Semiconductor |
| NAND gate 283 | 74C10 - National Semiconductor |
| NOR gate 289, 347 | 74C02 - National Semiconductor |
| NAND gate 311 | 74C00 - National Semiconductor |
| Inverter 312 | 4049 - Fairchild Semiconductor |

The RF transmitter 127, the RF receiver 106, the transmit/receive switch 107, the transmit antenna 104 and the anti-theft antenna 110 which are illustrated both in FIG. 2*b* and FIG. 3 are more fully illustrated in FIG. 4. The RF transmitter 127 and the RF receiver 106 are described hereinafter in terms of blocks which are familiar to those in radio communication design. Specific designs and examples of the blocks illustrated in FIG. 4 may be found in a number of references. Two specific references are: Terman, Frederick Emmons, *Radio Engineers Handbook*, McGraw-Hill Book Co., Inc., 1943 and ITT, *Reference Data for Radio Engineers*, 5th Edition, Howard W. Sams & Co., Inc., 1969.

The RF signal from the RF transmitter 59, illustrated in FIG. 2*a*, is detected by the antenna 104 and is provided through the transmit/receive switch 107, which is preferably a DPDT relay, P/N3SAV1068A2, General Electric Co., to the RF amplifier 2525. The position of the transmit/receive switch 107 is controlled by the transmit command signal 321 and the tilt command signal 315 illustrated in FIG. 3. The RF amplifier 2525 provides image rejection and establishes a low system noise figure of 4 db. The amplified signal from the RF amplifier is coupled into the first mixer stage 2528. The first mixer stage 2528 is also provided with a local oscillator signal 2531 from the first local oscillator 2529. The local oscillator signal 2531 is 10.7 MHz above the RF input signal, thus the first mixer 2528 produces an intermediate frequency (IF) of 10.7 MHz. The 10.7 MHz signal is provided from the first mixer 2528 through the 10.7 MHz bandpass filter 2532 to the second mixer 2533. The second mixer 2533 is also provided with a signal 2534 having a frequency of 10.245 MHz from the second local oscillator 2535. Thus the IF frequency produced by the second mixer 2533 is 455 KHz. The 455 KHz signal from the second mixer 2533 is coupled through the 455 KHz bandpass filter 2537 to the IF amplifier 2538. The 455 KHz bandpass filter 2537 establishes the IF bandpass for the receiver and provides high attenuation to any adjacent channel signals. From the IF amplifier 2538 the 455 KHz signal is suplied to the frequency modulation (FM) detector 2539. The FM detector 2539 is a phase-lock loop detector circuit. Command data from the CRS is thus provided from the FM detector 2539 to the RTU by means of signal line 109 which is illustrated in both FIG. 2*b* and FIG. 3.

Any audio portion of the transmission from the CRS is routed through the audio amplifier 2541 and the transformer 2545 to the handset by means of handset connector 102 illustrated in FIG. 2*b*. The output side of the audio amplifier 2541 is also coupled to the audio amplifier 2542 which forms a part of the transmitter 127. The blast data and control signal 240 from the control register 244, illustrated in FIG. 3, is provided as an input to the audio amplifier 2541. In this manner the blast data and control signal 240 can be provided to the blaster through the audio amplifier 2541 and the transformer 2545 which couples the blast data and command signal 240 to the blaster by means of signal lines 131 and 132, illustrated in FIG. 2B. The blast data and command signal 240 can also be provided to the RF transmitter 127 through the audio amplifier 2541 which is coupled to the audio amplifier 2542.

The tilt data signal 317, which is illustrated in FIG. 3, is also provided as an input to the audio amplifier 2542. Either the tilt data signal or a signal from the handset is amplified by the audio amplifier 2542 and provided to the oscillator 2543. The oscillator 2543 provides a frequency modulated (FM) output to the frequency tripler 2544. From the frequency tripler the FM signal is provided to the phase modulator 2546. The phase modulator 2546 is also provided with the seismic data from the RTU by means of signal line 351 which is illustrated in FIG. 3. Seismic data which will be in digital form is provided through the integrator 2547 to the phase modulator 2546. The integrator 2547 is utilized to convert the digital waveform of signal 351 to a triangular waveform which is used by the phase modulator 2546. The signal from the phase modulator 2546 is phase modulated and provided to the output section of the transmitter. Thus, the handset used by the operator at the RTU, the tilt data signal, or seismic data from the RTU can enable the transmitter.

The phase modulated signal from the phase modulator 2546 is provided through the frequency tripler 2549 and frequency doubler 2551 to the power amplifier 2552. The power amplifier 2552 raises the signal to be transmitted to the desired power level and passes the signal through the lowpass filter 2553 to the antenna 104 through the transmit/receive switch 107. If tilt data is being transmitted, then the tilt data is coupled onto the antenna 110 through the transmit/receive switch 107.

A preferred specification for the transmitter and receiver illustrated in FIG. 4 is as follows:

RECEIVER a. Frequency=220 MHz, crystal controlled.
b. Center frequency stability=±0.001% (−30 to +70° C.).
c. Sensitivity=−115 dbm for 10 db or greater (S+N)/N ratio (8 KHz deviation, 1 KHz mod. rate).
d. Quieting sensitivity=−110 dbm for 20 db or greater quieting.
e. Modulation acceptance=0.2 to 7 KHz, up to 15 KHz peak deviation.
f. Squelch-adjustable attack time of 5 to 50 milliseconds.
release time of 50 to 70 milliseconds.
squelches audio only (not data)
available as logic output, +5V CMOS, active low.

g. Data Acceptance=6.25 KB/s, FSK/FM.
h. Data Output=CMOS, +5 V.
Audio Output=100 mV RMS (1 KHz, 8 deviation) across handset terminals.
j. Audio Conditioning for Blast Data (signal to Blaster)
Input: CMOS, +5V, FSK @ 2.4/4.8 Khz
Output (adjustable): 150 mV RMS across geophone/-handset line with handset attached.

TRANSMITTER a. Frequency=216 to 220 MHz, crystal controlled.
b. Frequency stability=±0.0005% from −30 to +50° C.
c. Power Output=8–10 watts nominal.
d. DC power=1.5 amps max. from +18.75 Vdc.
e. Spurious emission suppression=60 db or greater.
f. Audio Modulator (Oscillator 2543)
Direct FM (premodulation clipping/amplifier on RCVR board),
Deviation=5 KHz peak (1 KHz mod. rate),
Modulation sensitivity=2.5 KHz/volt,
Input impedance=100 KΩ minimum.
g. Data Modulator (Phase Modulator 2546)
Indirect FM (Phase modulator),
Rate=100 KB/S,
Coding=Bi-Phase (Manchester),
Input Level=$T^2L$,
Modulation Index=1.2 for 50 KHz square wave input,
Input impedance=10 KΩ, minimum.

Figure 5:
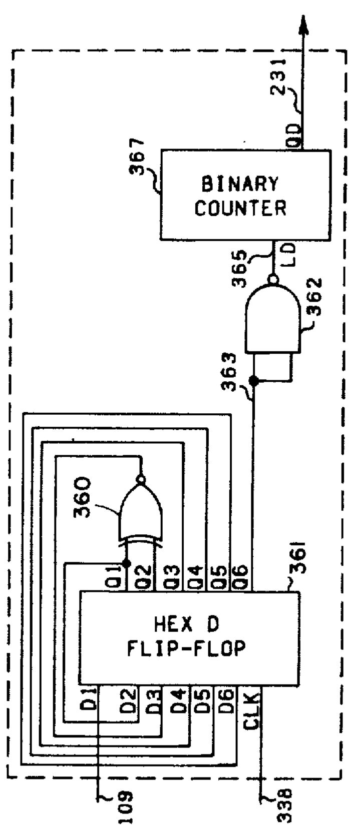
FIG. 5 is a schematic diagram of the digital phase-locked clock illustrated in FIG. 3.

The digital phase locked clock 227, illustrated in FIG. 3, is more fully illustrated in FIG. 5. As is illustrated in FIG. 5, the 100 KHz signal 338 is supplied to the clock input of a HEX-D flip-flop 361, which in this preferred embodiment is a 74 C 174 manufactured by National Semiconductor, which is configured basically as a shift register. The data signal 109 is supplied to the $D_1$ input of the HEX-D flip-flop 361. EXCLUSIVE OR gate 360, which in this preferred embodiment is a 74C86 manufactured by Natonal Semiconductor supplies a 10 microsecond wide pulse in reponse to a change in the data signal 109. This pulse is then delayed by being shifted through the other stages of the HEX-D flip-flop 361. Signal 363 from the $Q_6$ output of the HEX-D flip-flop 361 is supplied to both inputs of the NAND gate 362. In this preferred embodiment, the NAND gate 362 is a 74 c 00 manufactured by National Semiconductor. The output signal 365 from the NAND gate 362 is supplied to the load input of a binary counter 367, which in this preferred embodiment is a 74 C 163 manufactured by National Semiconductor. The clock signal 231, which has been described in FIG. 3, is supplied from the $Q_D$ output of the binary counter 367.

Figure 6:
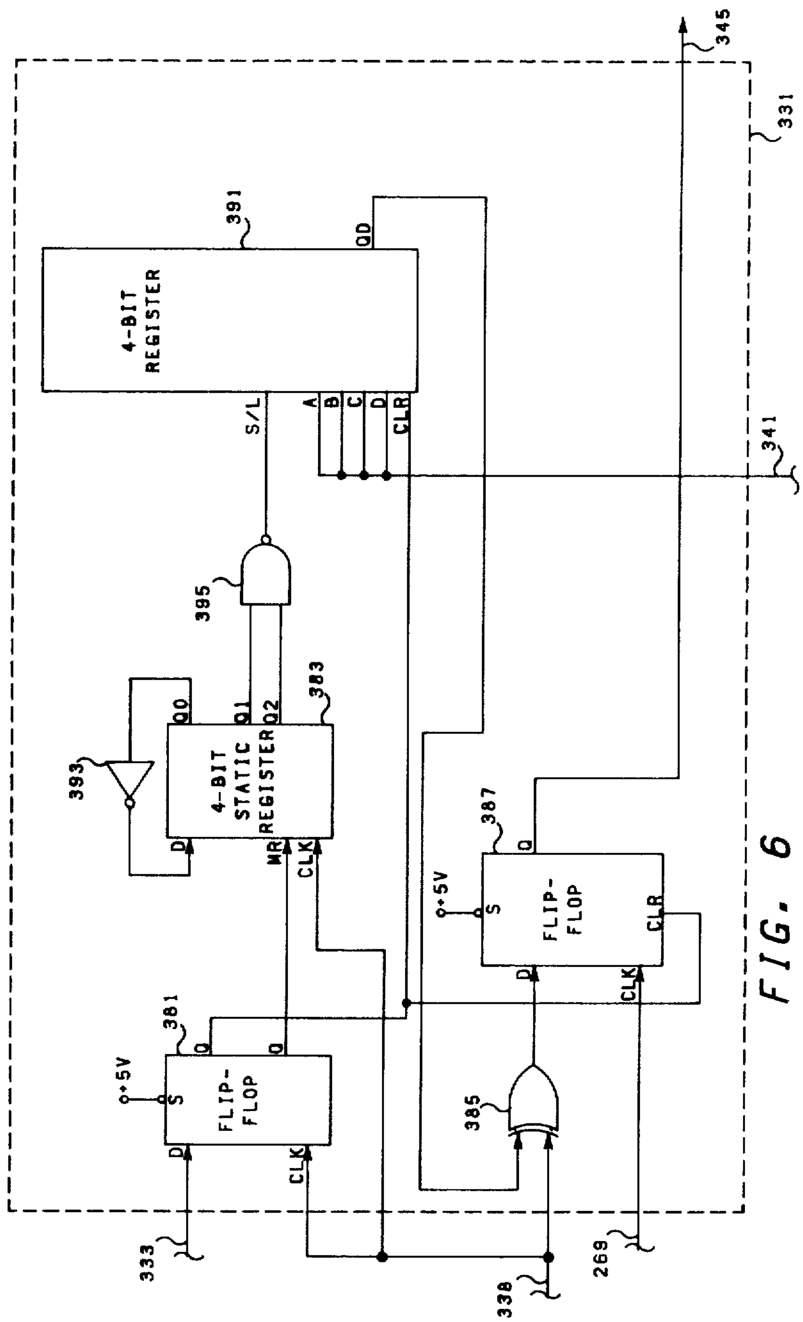
FIG. 6 is a schematic diagram of the transmit data and control logic illustrated in FIG. 3.

The transmit data and control logic 331, illustrated in FIG. 3, is more fully illustrated in FIG. 6. The transmit clock enable signal 333 is supplied to the D input of the flip-flop 381, which in this preferred embodiment is a 74 C 74, manufactured by National Semiconductor. The transmit clock signal 338 is supplied to the clock input of the flip-flop 381 and is also supplied to the clock input of the 4-bit static register 383 and as one input to the EXCLUSIVE OR gate 385. In this preferred embodiment, the 4-bit static register is one-half of a 4015 manufactured by Fairchild Semiconductor. The EXCLUSIVE OR gate 385 is a 74 C 86 manufactured by National Semiconductor. The 100 KHz clock signal 269 is supplied to the clock input of the flip-flop 387 which is identical to flip-flop 381.

The set input of flip-flop 381 and the set input of flip-flop 387 are both tied to a +5 volt power supply. The Q output of the flip-flop 381 is supplied to the clear input of flip-flop 387 and to the clear input of the 4-bit register 391, which in this preferred embodiment is a 74 C 175 manufactured by National Semiconductor. The Q output of the flip-flop 381 is supplied to the master reset of the 4-bit static register 383.

The $Q_O$ output of the 4-bit static register 383 is tied through inverter 393 to the D input of the 4-bit static register 383. The inverter 393 is a 4049 manufactured by National Semiconductor. The $Q_1$ and $Q_2$ outputs of the 4-bit static register 383 are supplied as inputs to the NAND gate 395. In this preferred embodiment the NAND gate 395 is a 9 LS 00 manufactured by National Semiconductor. The output of the NAND gate 395 is supplied to the shift/load (S/L) input of the 4-bit register 391. The data signal 341 is supplied to the A, B, C, and D inputs of the 4-bit register 391.

The $Q_D$ output of the 4-bit register 391 is supplied as a second input to the EXCLUSIVE OR gate 385. The output of the EXCLUSIVE OR gate 385 is supplied to the D input of the flip-flop 387. The Q output of the flip-flop 387 corresponds to the serial data line 345 and data is supplied by the signal line 345 to the RF transmitter 127, illustrated in FIG. 3.

Figure 7:
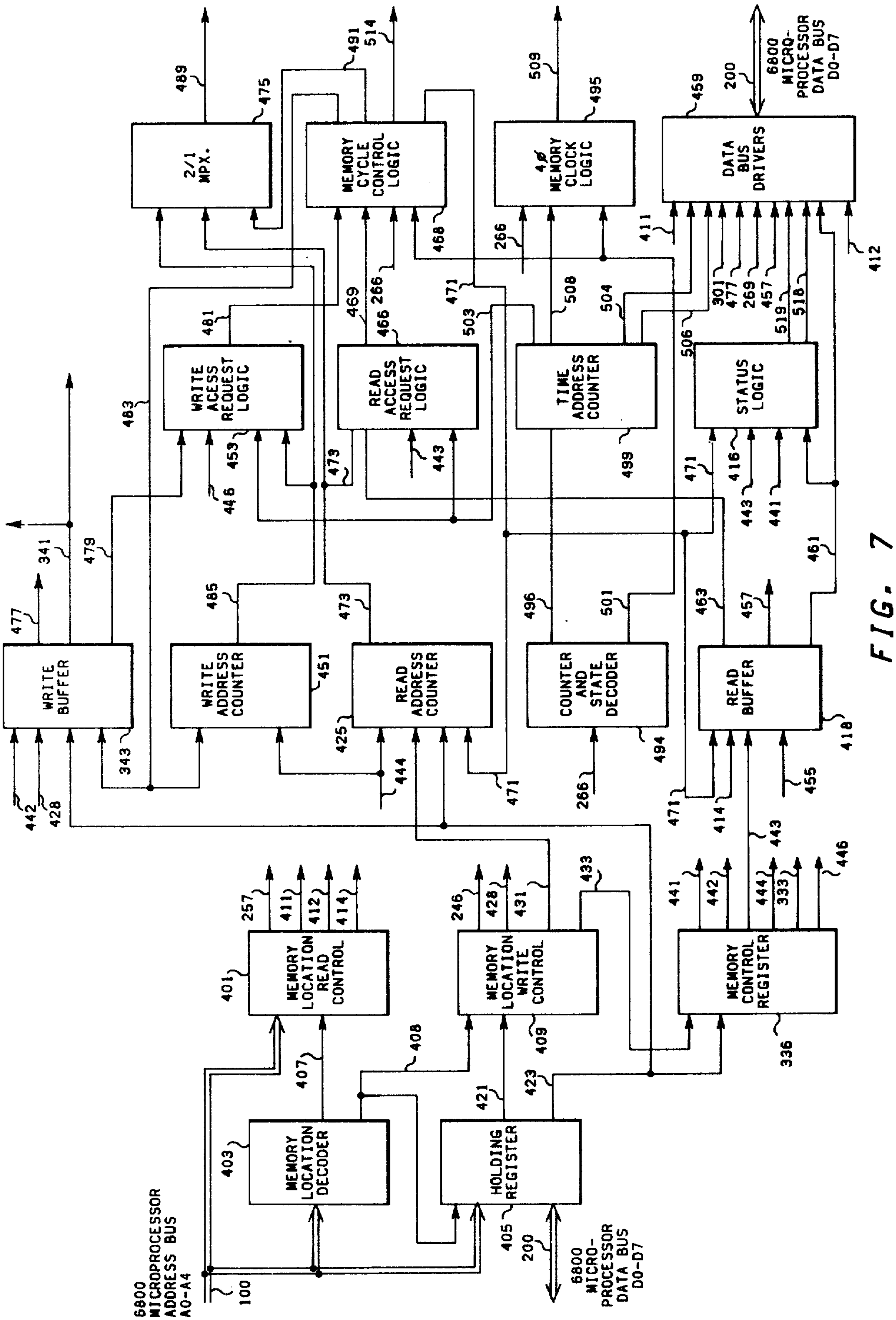
FIG. 7 is a schematic diagram of the memory control unit illustrated in FIG. *2b;*

The memory control unit 124 illustrated in FIG. **2*b* is more fully illustrated in FIG. 7. The primary function of the memory control unit 124 is to control the memory 125 and to provide an interface between the 6800 microprocessor 111 and the memory 125. In addition the memory control unit 124 provides part of the interface between the 6800 microprocessor 111 and the RF interface 108. Referring now to FIG. 7, a part of the 6800 microprocessor address bus 100 is supplied as an input to the memory location read control 401, the memory location decoder 403 and the holding register 405. The A0 and A1 address lines are supplied to the memory location read control 401 and the holding register 405. The A2–A4 address lines are supplied to the memory location decoder 403. These address lines supplied by the address bus 100 provide the read and write commands as well as the location to which data is to be written or the location from which data is to be read. In response to the address, the memory location decoder 403 provides an enabling signal 407 to the memory read control 401 and also supplies an enabling signal 408 to the holding register 405 and the memory location write control 409. The enabling signal 407 allows the memory location read control 401 to decode the address from the 6800 microprocessor to determine where data is to be read from. Four control signals are supplied from the memory location read control 401. Signal 257 is a command to read data from memory location 800 C/E which corresponds to the multiplexer 241 illustrated in FIG. 3. Signal 257 is provided to the multiplexer 241, illustrated in FIG. 3. Signal 411 is a command to read data from memory location 800 D which corresponds to the status logic unit 416. Signal 412 is a command to read data from location 800 F which corresponds to the read buffer 418. Signals 411 and 412 are provided from the memory location read control 401 to the data bus drivers 459. Signal 414 from the memory location read control 401 is supplied to the read buffer 418 and is a command to shift data out of read buffer 418**.

Data is supplied from the microprocessor to the memory control unit 124 by means of data bus 200 which is operably connected to the holding register 405. In response to signal 408, the address supplied from the address bus 100 and the data supplied from the data bus 200 is shifted from the holding register 405. The address is supplied by means of signal line 421 to the memory location write control 409. The data is supplied by means of signal line 423 to the memory control register 336, the read address counter 425 and the write buffer 343.

In response to the address supplied by signal line 421 and the enabling signal 408, the memory location write control 409 provides four output command signals which enables data to be written to specific locations. Signal 246 from the memory location write control 409 is supplied to the control register 244, illustrated in FIG. 3, and is a command to write data into the control register 244. Signal 428 from the memory location write control 409 is supplied to the write buffer 343 and is a command to write data into the write buffer 343. Signal 431 from the memory location write control 409 is supplied to the read address counter 425 and is a command to write data into the read address counter 425. Signal 433 from the memory location write control 409 is supplied to the memory control register 336 and is a command to write data into the memory control register 336.

In response to the data supplied by means of signal line 433 and the command to write data into the memory control register 336, the memory control register 336 provides a plurality of output signals for control of various functions of the memory control unit. Signal 441 is a status reset signal and is provided as an input to the status logic 416. Signal 442 is an enabling signal for the write buffer 343 and is supplied as an input to the write buffer 343. Signal 443 is an enabling signal for the read buffer 418 and is supplied as an input to the read buffer 418. Signal 443 is also supplied to the status logic 416 and the read access request logic 466. Signal 444 is a clear signal for the write address counter 451 and the read address counter 425. Signal 444 is supplied as an input to both the write address counter 451 and the read address counter 425. Signal 333 from the memory control register 336 has been previously described and is supplied as an input to the transmit and control logic 331 illustrated in FIG. 3. Signal 446 is a gating signal which is supplied as an input to the write access request logic 453.

Data from the memory 25 is supplied to the read buffer 418 by means of signal line 455. When data is available to be read out from the read buffer 418, the output ready signal 457 from the read buffer 418 provides an indication that data is available to the data bus drivers 459. Data is supplied from the read buffer 418 by means of signal line 461 to the status logic 416 and to the data bus drivers 459. In response to signal 457, the data bus drivers 459 will switch to data line 461 and data will be supplied to the 6800 microprocessor data bus 200 by means of the data bus driver 459.

When the read buffer 418 is ready to receive data, signal 463 is utilized to indicate this fact to the read access request logic 466. In response to signal 463, the read access request logic 466 provides a signal 469, which indicates to the memory cycle control logic 468 that data can be read into the read buffer 418. In response to signal 469, the memory cycle control logic 468 provides an acknowledge signal 471 to the read address counter 425, the status logic 416 and the read buffer 418. In response to signal 471, data, if available, is shifted into the read buffer 418.

The read address counter 425 supplies a read address 473 to the read access request logic 466 and to the 2 to 1 (2/1) multiplexer unit 475. The read address signal 473 is supplied in response to the previously described inputs to the read address counter 425.

The write buffer 343 operates in essentially the same manner as the read buffer 418. Signal 477 from the write buffer is supplied to the data bus drivers 459 and indicates to the 6800 microprocessor that data can be written into the write buffer 343. Signal 479 from the write buffer 343 is supplied to the write access request logic 453 and provides an indication that the write buffer 343 is ready to supply data. In response to signal 479, the write access request logic 453 supplies a signal 481 to the memory cycle control logic 468. Signal 481 indicates to the memory cycle control logic 468 that data can be taken from the write buffer 343. The memory cycle control logic 468 acknowledges by means of signal 483 that the current data at the output of the write buffer 343 is being transferred to the CCD memory 125. Signal 483 is supplied to both the write buffer 343 and to the write address counter 451. In response to the acknowledge signal 483, the write address counter 451 supplies a write address signal 485 to both the write access request logic 453 and to the 2/1 multiplexer unit 475. This address is provided to the memory 125 by means of signal line 489. The 2/1 multiplexer unit 475 is switched to the write address lines represented by signal 485 in response to control signal 491 which is supplied from the memory cycle control logic 468.

The 800 KHz signal 266 from the oscillator and control 261, illustrated in FIG. 3, is supplied as an input to the counter and state decoder 494, the four phase memory clock logic 495 and the memory cycle control logic 468. In response to the 800 KHz signal 266 the counter and state decoder 494 provides a signal 496 having a pulse width of 10 microseconds to the time address counter 499. The counter and state decoder 494 also supplies a clock signal 501 to the four phase memory clock logic 495 and the memory cycle control logic 468. In response to signal 496, the time address counter 499 supplies a count signal 503 to the read access request logic 466 and to the write access request logic 453 and also supplies a count signal 508 to the four phase memory clock logic 495. The time address counter 499 also supplies a signal 504, having a pulse width of 160 microseconds, and a signal 506, having a pulse width of 2560 microseconds, to the data bus drivers 459.

Figure 14:
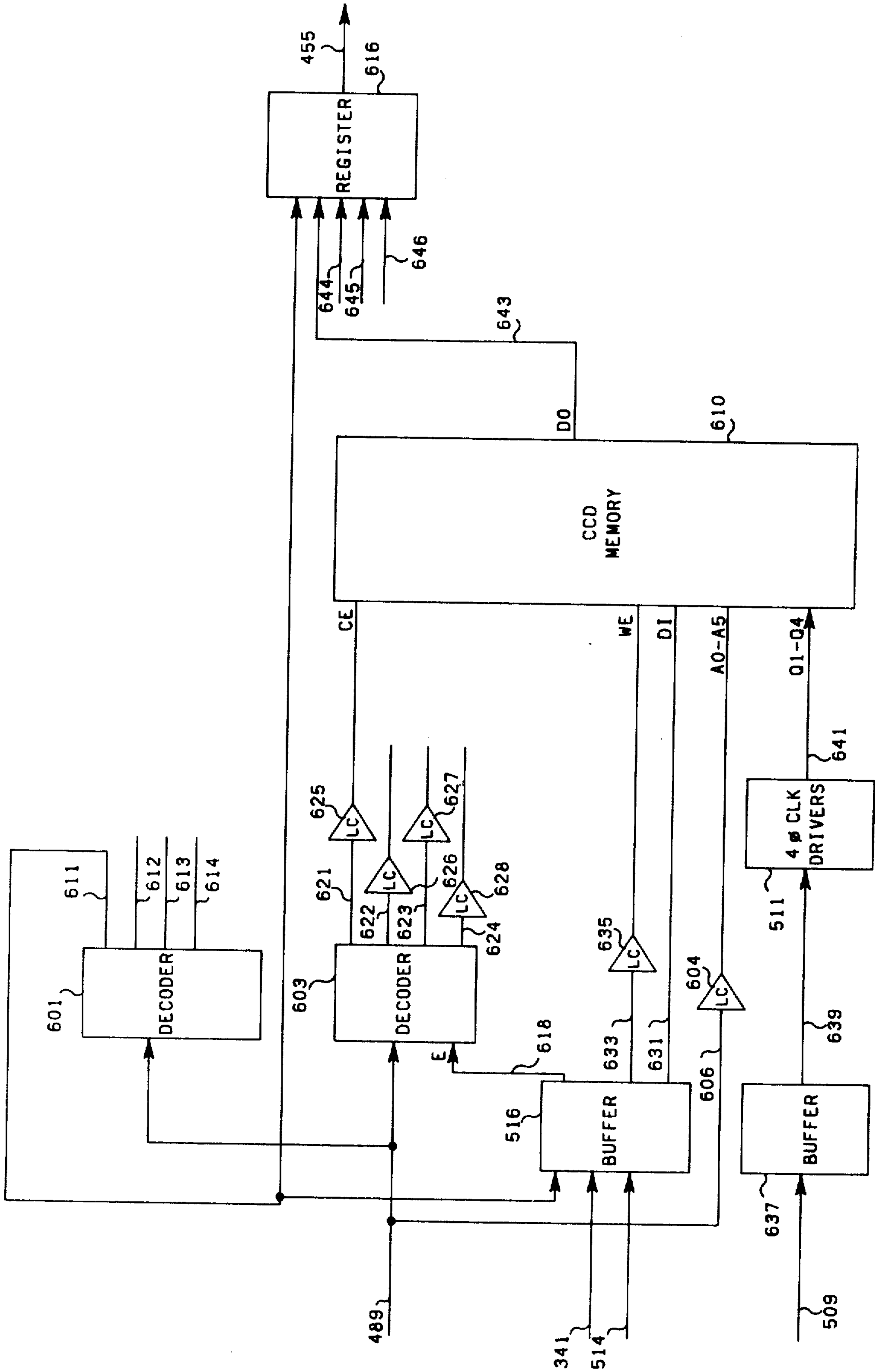
FIG. 14 is a schematic of the memory illustrated in FIG. 2*b*.

In response to signal 266 and signal 501, the four phase memory clock logic 495 generates a control signal 509 which is utilized to provide logic and control for the four phase clock driver 511 illustrated in FIG. 14.

In response to the previously described inputs, the memory cycle control logic 468 generates a memory control signal 514 which is supplied to the input of buffer 516, illustrated in FIG. 14. Depending on whether information is to be written into the memory or to be read from the memory, the control signal 514 will initiate the read or write operations respectively.

In response to the previously described inputs, the status logic 416 generates two output signals which are supplied to the data bus drivers 459. Signal 518 is a word available indicator and gives an indication to the 6800 microprocessor when twenty bits have been shifted into the read buffer 418. Signal 519 is a parity count which gives an indication of the number of ones in the binary data which have been supplied from the memory 610 by means of signal line 455. This parity count allows the 6800 mixcroprocessor to add parity bits as required.

Preferred, commercially available components, which can be utilized in the memory control circuit illustrated in FIG. 7 are listed below. If a single component cannot be used to perform an illustrated function, a more detailed schematic of the functions illustrated in block diagram form in FIG. 7 is presented in the following paragraphs.

| | |
|---|---|
| Memory Location Decoder 403 | 9 LS 139 DM, National Semiconductor |
| Holding Register 405 | Combination of 74C175 and 74C174 National Semiconductor |
| Memory Location Read Control 401 | 9 LS 139 DM, National Semiconductor |
| Memory Control Register 336 | 74C175, National Semiconductor |
| Write Buffer 343 and Read Buffer 418 | 3341 DM, Fairchild Semiconductor |
| Counter and State Decoder 494 | F 4028, Fairchild Semiconductor |
| Write Access Request Logic 453 and Read Access Request Logic 466 | 74C85 (two required) National Semiconductor |
| Time Address Counter 499 | F 4520, Fairchild Semiconductor |
| 2/1 Multiplexer 475 | F 4019 (3 required) Fairchild Semiconductor |
| Data Bus Drivers 459 | 9 LS 367 DM (2 required) National Semiconductor |

Figure 8:
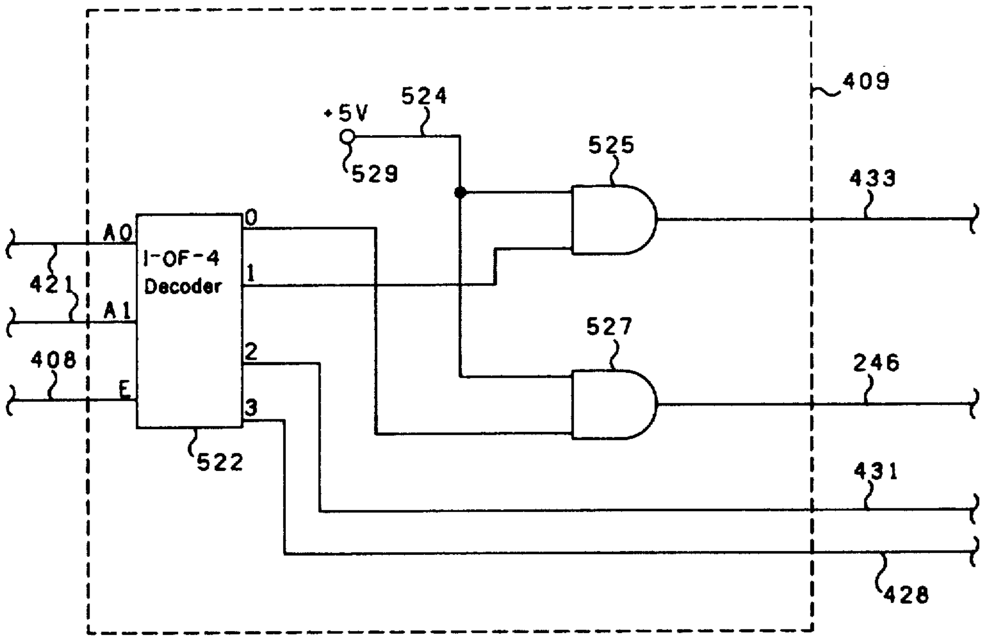
FIG. 8 is a schematic of the memory location write control illustrated in FIG. 7.

The memory location write control 409, illustrated in FIG. 7, is more fully illustrated in FIG. 8. The address lines 421 are supplied to the A0 and A1 input of the one-of-four decoder 522. The clock signal 408 is supplied to the enabling input of the one-of-four decoder 522. In this preferred embodiment, the one-of-four decoder 522 is an F4555 manufactured by Fairchild Semiconductor.

In response to the address 421, the one-of-four decoder 522 supplies four output signals labeled 0–3. The 0 output is supplied as a first input to the AND gate 527. The 1 output is supplied as a first input to the AND gate 525. The second input of both AND gate 525 and AND gate 527 is tied high to the +5 volt power supply 529. The AND gates 525 and 527 are preferably 9 LS 00 manufactured by National Semiconductor. The output of AND gate 525 is signal 433, illustrated in FIG. 7. The output of AND gate 527 is signal 246, illustrated in FIG. 7.

The output labeled 2 from the one-of-four decoder 522 corresponds to signal 431, illustrated in FIG. 7. The 3 output from the one-of-four decoder 522 is supplied as signal 428, illustrated in FIG. 7.

Figure 9:
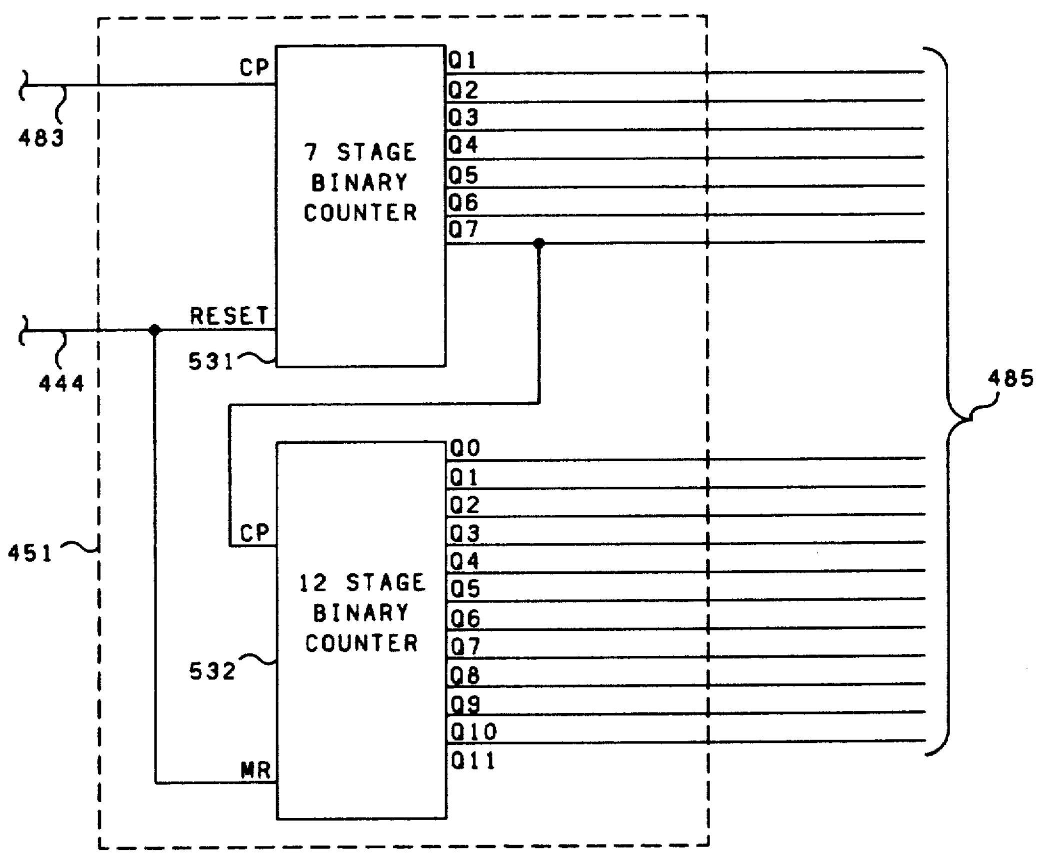
FIG. 9 is a schematic of the write address counter illustrated in FIG. 7.

The write address counter 451, illustrated in FIG. 7, is more fully illustrated in FIG. 9. Signal 483, illustrated in FIG. 7, is supplied to the clock pulse input of the seven stage binary counter 531. The clear signal 444 is supplied to the reset input of the seven stage binary counter 531 and is also supplied to the master reset input of the twelve stage binary counter 532. The Q7 output of the seven stage binary counter 531 is supplied to the clock pusle input of the twelve stage binary counter 532. The seven outputs of the seven stage binary counter 531 and eleven of the twelve outputs of the twelve stage binary counter 532 are utilized to provide the eighteen bits which make up signal 485 illustrated in FIG. 7.

The seven stage binary counter is a F4024 manufactured by Fairchild Semiconductor. The twelve stage binary counter 532 is a F4024 manufactured by Fairchild Semiconductor.

Figure 10:
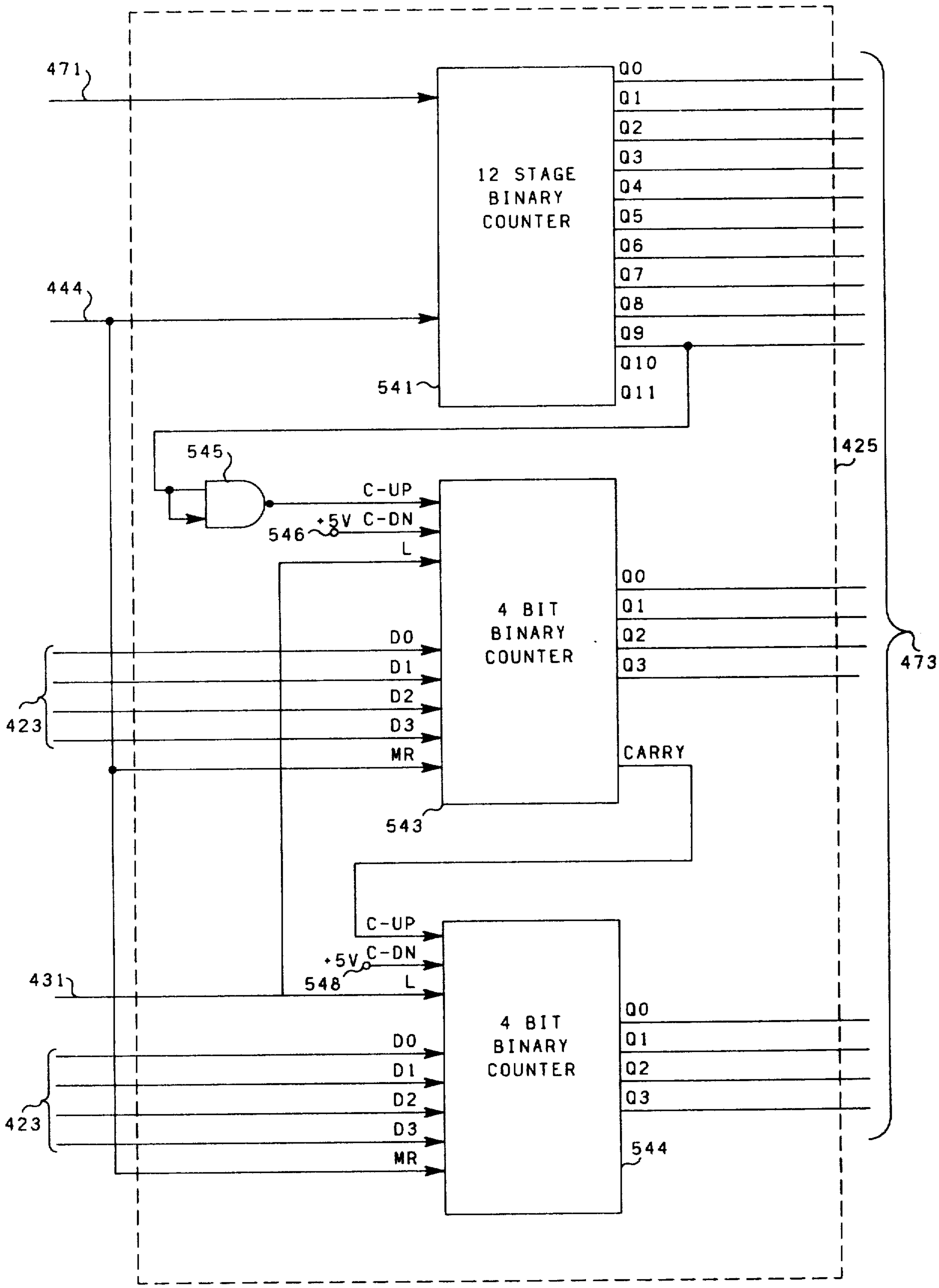
FIG. 10 is a schematic of the read address counter illustrated in FIG. 7.

The read address counter 425, illustrated in FIG. 7, is more fully illustrated in FIG. 10. Signal 471 is supplied to the clock pulse input of the twelve stage binary counter 541. Signal 444 is supplied to the master reset input of the twelve stage binary counter 541 and is also supplied to the master reset of the four bit binary counters 543 and 544. Signal 431 is supplied to the load input of the binary counters 543 and 544. The data signals 423 are supplied to the D0-D3 inputs of the binary counter 543 and 544. Ten of the outputs from the twelve stage binary conter 541 are supplied as part of signal 473 illustrated in FIG. 7. In addition, the Q9 output from the twelve stage binary counter 541 is supplied to both inputs of the NAND gate 545. The output of the NAND gate 545 is supplied to the countup input of the four bit binary counter 543. The countdown input of the four bit binary counter 543 is tied high to the +5 volt power supply 546. The Q0–Q3 outputs from the binary counter 543 provide four more data bits to make up signal 473. The carry output from the four bit binary counter 543 is supplied to the countup input of the four bit binary counter 544. The countdown input of the four bit binary counter 544 is tied high to the +5 volt power supply 548. The Q0–Q3 outputs from the four bit binary counter 544 make up the remaining four data bits for signal 473.

Commercially available components which can be utilized in the read address counter 427 is illustrated in FIG. 10 are as follows:

| | |
|---|---|
| 12 Stage Binary Counter 541 | F 4040, Fairchild Semiconductor |
| 4-Bit Binary Counter 543 and 544 | 74C 193, National Semiconductor |
| NAND Gate 545 | 74 C 00, National Semiconductor |

Figure 11:
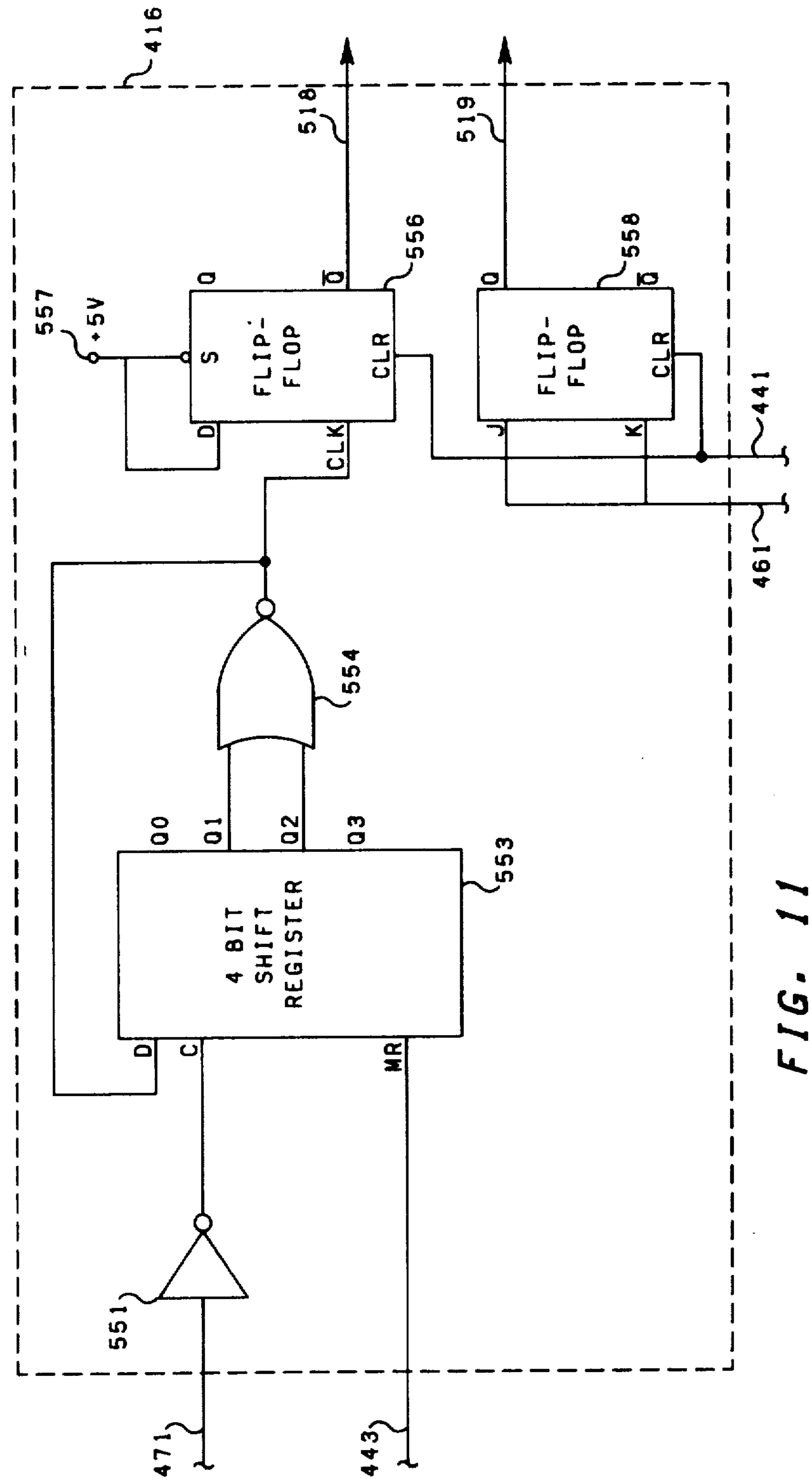
FIG. 11 is a schematic of the status logic illustrated in FIG. 7.

The status logic 416, illustrated in FIG. 7, is more fully illustrated in FIG. 11. Signal 471 is supplied through inverter 551 to the clock input of the four bit shift register 553. Signal 443 is supplied to the master reset input of the four bit shift register 553. The Q1 and Q2 outputs of the four bit shift register 553 are supplied as inputs to the NOR gate 554. The output of the NOR gate 554 is supplied to the D input of the four bit shift register 553 and is also supplied to the clock input of the flip-flop 556. This configuration results in a positive transition at the output of NOR gate 554 for every five pulses on signal 471.

The data input and the set input of the flip-flop 556 are tied high to the +5 volt power supply 557. Signal 441 is supplied to the clear input of the flip-flop 556 and is also supplied to the clear input of flip-flop 558. Signal 461 is supplied to both the J and K inputs of flip-flop 558. Signal 518, illustrated in FIG. 7, is output from the $\bar{Q}$ output of flip-flop 556. Signal 519, illustrated in FIG. 7, is output from the Q output of flip-flop 558.

Commercially available components which can be utilized in the circuit illustrated in FIG. 11 are as follows:

| | |
|---|---|
| Inverter 551 | 4049, Fairchild Semiconductor |
| 4-Bit Shift Register 553 | 4015, Fairchild Semiconductor |

-continued

| | |
|---|---|
| NOR Gate 554 | 74C02, National Semiconductor |
| Flip-Flop 556 | 74C74, National Semiconductor |
| Flip-Flop 558 | 74C107, National Semiconductor |

Figure 12:
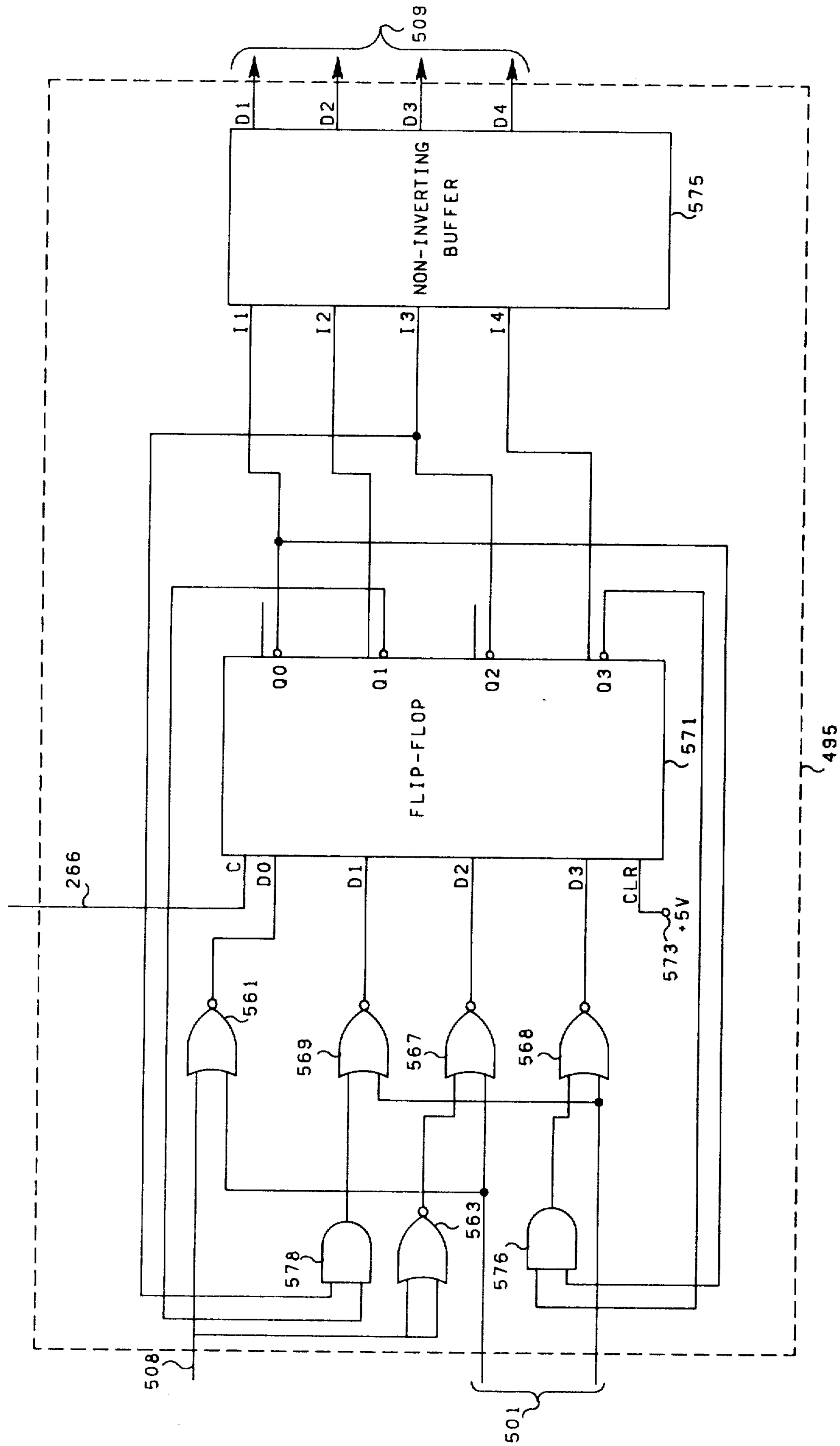
FIG. 12 is a schematic of the 4 phase memory clock logic illustrated in FIG. 7.

The four phase memory clock logic 459, illustrated in FIG. 7, is more fully illustrated in FIG. 12. Signal 508 is supplied as one input to the NOR gate 561 and is also supplied as both inputs to the NOR gate 563. Signal 501 is supplied as two signals, one going to both the second input of NOR gate 561 and the first input of NOR gate 567 and the second going to both the first input of NOR gates 568 and 569. The output of NOR gate 563 is supplied as the second input to NOR gate 567. The output of NOR gate 561 is tied to the $D_0$ input of the D flip-flop 571. The output of NOR gate 569 is supplied to the $D_1$ input of the D flip-flop 571. The output of the NOR gate 567 is supplied to the $D_2$ input of the D flip-flop 571. The output of the NOR gate 568 is supplied to the $D_3$ input of the D flip-flop 571.

Signal 266 is supplied to the clock input of the D flip-flop 571. The clear input of the D flip-flop 571 is tied high to the +5 volt power supply 573.

The inverted $Q_0$ output from D flip-flop 571 is supplied as an input to the $I_1$ input of the noninverting buffer 575 and is also supplied as a first input to the AND gate 576. The noninverted $Q_1$ output from the D flip-flop 571 is supplied to the $I_2$ input of the noninverting buffer 575. The inverted $Q_1$ output from the D flip-flop 571 is supplied as one input to the AND gate 578. The inverted $Q_2$ output from the D flip-flop 571 is supplied to the $I_3$ input of the noninverting buffer 575 and is also supplied as a second input to the AND gate 578. The noninverted $Q_3$ output is supplied to the $I_4$ input of the noninverting buffer 575. The inverted $Q_3$ output from the D flip-flop 571 is supplied as a second input to the AND gate 576.

The output from the AND gate 578 is supplied as a second input to the NOR gate 569. The output from the NOR gate 563 is supplied as a second input to the NOR gate 567. The output from the AND gate 576 is supplied as a second input to the NOR gate 568.

The $D_1$–$D_4$ outputs from the noninverting buffer 575 are utilized to provide signal 509, illustrated and described in FIG. 7.

Commercially available components which can be utilized in the circuit illustrated in FIG. 12 are as follows:

| | |
|---|---|
| AND Gate 576 and 578 | F 4081, Fairchild Semiconductor |
| NOR Gates 561,563,567, 568 and 569 | 74 C 02, National Semiconductor |
| D Flip-flop 571 | 74 C 175, National Semiconductor |
| Noninverting Buffer 575 | F 40097, Fairchild Semiconductor |

Figure 13:
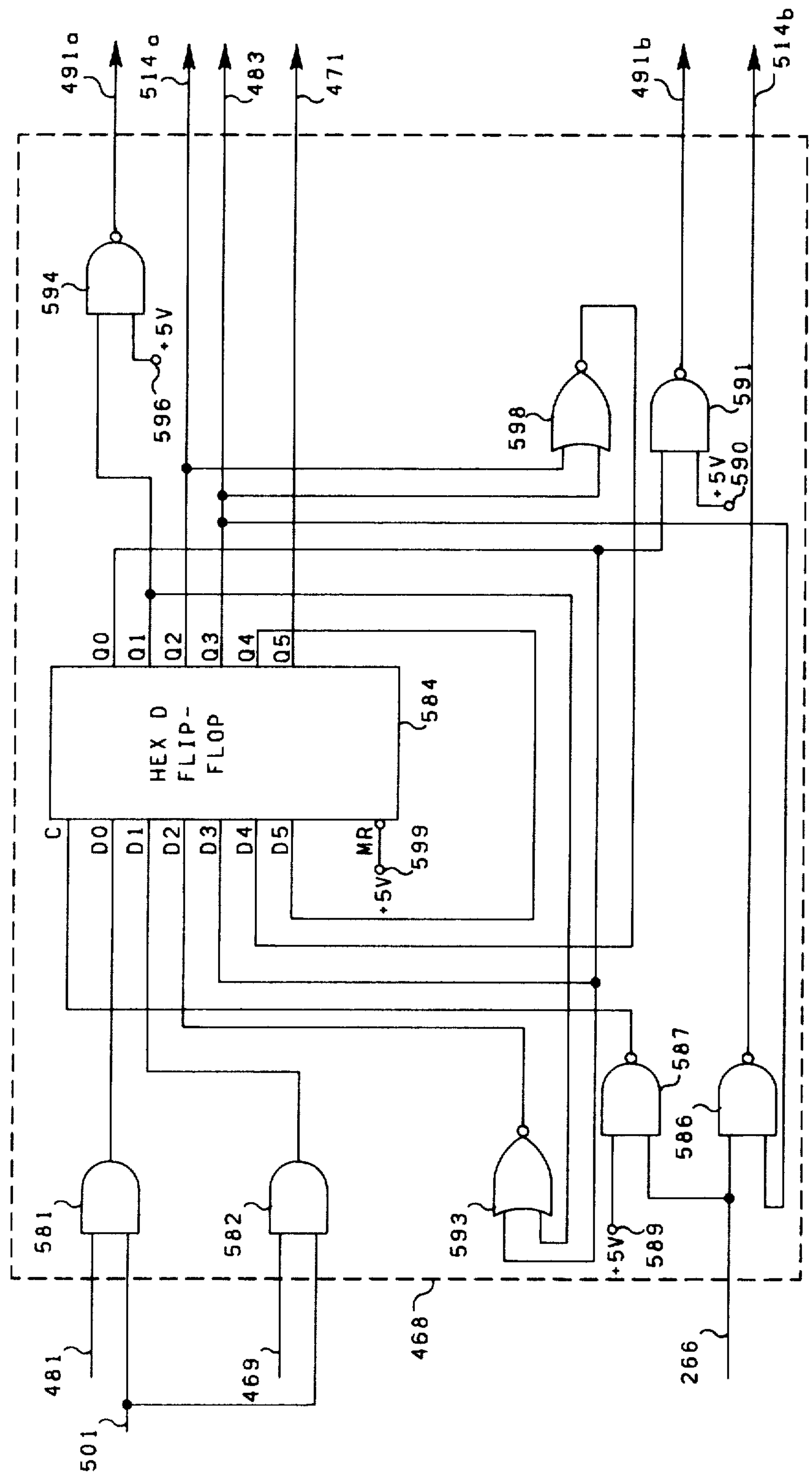
FIG. 13 is a schematic of the memory cycle control logic illustrated in FIG. 7.

The memory cycle control logic 468, illustrated in FIG. 7, is more fully illustrated in FIG. 13. Signal 501 is supplied as a first input to both AND gates 581 and 582. Signal 481 is supplied as a second input to AND gate 581. Signal 469 is supplied as a second input to AND gate 582. The output of AND gate 581 is supplied to the $D_0$ input of the HEX-D flip-flop 584. The output of the AND gate 582 is supplied to the $D_1$ input of the HEX-D flip-flop 584.

Signal 266 is supplied as a first input to NAND gates 586 and 587. The second input of NAND gate 587 is tied high to the +5 volt power supply 589. The output of NAND gate 587 is supplied to the clock input of the HEX-D flip-flop 584.

The $Q_0$ output of the HEX-D flip-flop 584 is supplied as a first input to the NAND gate 591. The $Q_0$ output from the HEX-D flip-flop 584 is also supplied to the $D_3$ input of the HEX-D flip-flop 584 and as a first input to the NOR gate 593. The $Q_1$ output from the HEX-D flip-flop 584 is supplied as a first input to the NAND gate 594 and is also supplied as a second input to the NOR gate 593.

The second input of the NAND gate 594 is tied to the +5 volt power supply 596. The output from the NAND gate 594 is signal 491*a* which forms one part of signal 491, illustrated in FIG. 7. The second input of the NAND gate 591 is tied high to the +5 volt power supply 590. The output from the NAND gate 591 is signal 491*b* which forms the second part of signal 491, illustrated in FIG. 7. The output from the NOR gate 593 is tied to the $D_2$ input of the HEX-D flip-flop 584.

The $Q_2$ output from the HEX-D flip-flop 584 supplies one part of signal 514 illustrated in FIG. 7 and is also supplied as a first input to NOR gate 598. The $Q_3$ output from the HEX-D flip-flop 584 is utilized to establish signal 483, illustrated in FIG. 7. The $Q_3$ output is also supplied as a second input to NOR gate 598 and as a second input to the NAND gate 586. The output from the NAND gate 586 forms the second part of signal 514 illustrated in FIG. 7. The output from the NOR gate 598 is supplied to the $D_4$ input of the HEX-D flip-flop 584.

The $Q_4$ output on the HEX-D flip-flop 584 is tied to the $D_5$ input of the HEX-D flip-flop 584. The $Q_5$ output from the HEX-D flip-flop 584 is utilized to form signal 471, illustrated in FIG. 7. The master reset of the HEX-D flip-flop 584 is tied to the +5 volt power supply 599.

Commercially available components which can be used in the circuit illustrated in FIG. 13 are as follows:

| | |
|---|---|
| AND Gates 581 and 582 | F 4081, Fairchild Semiconductor |
| NOR Gates 593 and 598 | 74C02, National Semiconductor |
| NAND Gates 586,587,591 and 594 | 74C00, National Semiconductor |
| HEX-D Flip-flop 584 | 74C174, National Semiconductor |

Memory means 125, illustrated in FIG. 2*b*, is more fully illustrated in FIG. 14. The memory utilized is a charge couple device (CCD) memory. The particular CCD memory utilized in the preferred embodiment of this invention is the P 2416 manufactured by Intel Corporation. Sixteen memory chips are utilized in the preferred embodiment of this invention. Up to four cards, each utilizing 16 chips (four banks of four chips each) can be utilized. Only one memory bank of one card is illustrated in FIG. 14 for the sake of convenience but the operation of all of the memory banks is identical.

Referring now to FIG. 14, the address signal 489 from the 2/1 multiplexer 475, illustrated in FIG. 7, is supplied as an input to the decoder 601, the decoder 603 and the level converter 604. Two bits of the address signal 489 are supplied to the decoder 601 and also two bits are supplied to decoder 603. The remaining six bits of the address signal 489 is supplied to the level converter 604 and from the level converter 604 to the A0–A5 input of the CCD memory 610 through signal line 606. Data is supplied from the memory control, illustrated in FIG. 7, by means of signal line 341 which is operably connected to buffer 516. Control signals from the memory cycle control logic 468, illustrated in FIG. 7, are supplied by means of signal line 514 to the buffer 516.

Decoder 601 decodes two address bits supplied by means of signal line 489, and determines which memory card has been addressed. Four enabling signals 611–614 are supplied from the decoder 601 to a respective memory card. As illustrated in FIG. 14, signal 611 is supplied as an enabling signal to the card containing CCD memory 610 and is supplied specifically to the buffer 516 and to the register 616.

In response to signal 611, the buffer 516 supplies an enabling signal 618 to the decoder 603. In response to signal 618, the decoder 603 decodes the two address bits supplied to the decoder 603, by means of signal line 489, and provides four enabling signals 621–624 to the four respective CCD memory banks located on the card which has been addressed. Signal 621–624 are supplied to level converters 625–628 and from the level converters 625–628 to the respective CCD memories. As illustrated in FIG. 14, signal 621 is supplied from level converter 625 to the enabling input of the CCD memory 610. Data is supplied to the CCD memory 610 from the buffer 516 by means of signal 631 which is connected to the data input of the CCD memory 610. Control signals are also supplied to the CCD memory 610 from buffer 516 by means of signal line 633 which is supplied to the write enable input of the CCD memory 610 through level converter 635.

The logic signals for the four phase clock drivers 511 are supplied through buffer 637, by means of signal line 509, from the four phase memory clock logic 495, illustrated in FIG. 7. Buffer 637 is tied to the four phase clock drivers 511 by signal line 639. The output 641 from the four phase clock drivers 511 is supplied to the $\phi_1$–$\phi_4$ inputs of the CCD memory 610.

Data is supplied from the CCD memory to the data output of the CCD memory by means of signal line 643 which is connected to register 616. Data is supplied from the other memory banks located on a particular card by means of signal lines 644–646 which are also connected to the register 616. In response to the enabling signal 611, data is shifted from the register 616 and is supplied by means of data line 455 to the read buffer 418, illustrated in FIG. 7.

Commercially available components which can be utilized in the circuit illustrated in FIG. 14 are as follows:

| | |
|---|---|
| Decoder 601 and 603 | F4556, Fairchild Semiconductor |
| Buffer 516 and 563 | F40097, Fairchild Semiconductor |
| 4-Phase Clock Drivers 511 | D5244, Intel |
| CCD Memory 610 | P2416, Intel |
| Register 616 | 74C173, National Semiconductor |
| Level Converters 604, 625–628, and 635 | F4104, Fairchild Semiconductor |

Figure 15:
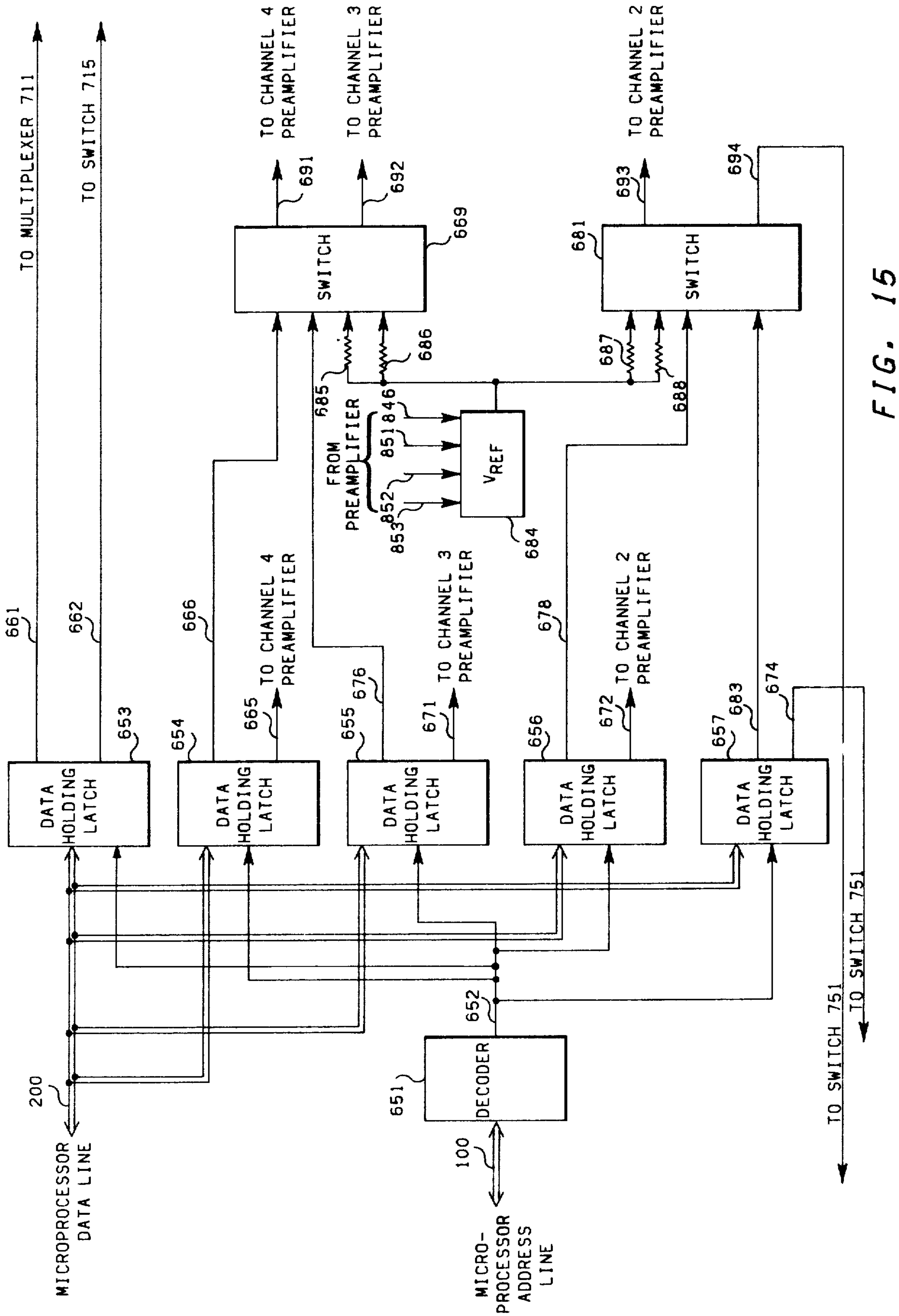
FIG. 15 is a schematic of the test interface illustrated in FIG. 2*b*.

The test interface 201, illustrated in FIG. 2*b*, is more fully illustrated in FIG. 15. As has been previously stated, the primary function of the test interface 201 is to supply control signals to the calibrate card 211 and to the preamplifier 135, illustrated in FIG. 2*b*, and also to provide a voltage source for testing the preamplifier 135. Referring now to FIG. 15, the 6800 microprocessor address line 100 is tied to the decoder 651. The decoder 651 decodes an address from the microprocessor and provides a plurality of decoded address signals, which are represented by 652, to the data holding latches 653–657. The 6800 microprocessor data line 200 is also supplied to the data holding latches 654–657 and to the data holding latch 653.

In response to the data input from the 6800 microprocessor data line 200, the data hold latch 653 generates two control signals 661 and 662. Control signal 661 from the data holding latch 653 is supplied to the multiplexer 711 illustrated in FIG. 16 and is utilized to control the switching of the multiplexer 711. Signal 662 from the data holding latch 653 is supplied as a control signal to the switch 715 illustrated in FIG. 16 and is utilized to control the selection of the voltage input supplied to the switch 175.

In response to the address supplied over the 6800 microprocessor address line 100 and the data supplied over the 6800 microprocessor data line 200, the data holding latches 654–657 provide two output control signals each. The data holding latch 654 provides a control signal 665 to channel 4 of the preamplifier 135, illustrated in FIG. 2*b*. The data holding latch 654 also provides a control signal 666 to the switch 669 which controls the channel to which the voltage, applied to the switch 669, will be applied. In like manner, data holding latch 655 provides a control signal 671 to channel 3 of the preamplifier 135, data holding latch 656 provides a control signal 672 to channel 2 of the preamplifier 135 and data holding latch 657 provides a control signal 674 to channel 1 of the preamplifier 135. Signal 674 is particularly supplied to the switch 751 illustrated in FIG. 18. The data holding latch 655 also provides a control signal 676 to the switch 669. The control signal 676 functions to control the supply of a reference voltage to channel 3 of the preamplifier 135 by means of switch 669. The data holding latch 656 also supplies a control signal 678 to the switch 681. Control signal 678 controls the application of a reference voltage to channel 2 of the preamplifier 135 by means of switch 681. The data holding latch 657 also supplies a control signal 683 to the switch 681 to thereby control the application of a reference voltage to channel 1 of the preamplifier 135 by means of switch 681.

The output signal from the reference voltage source 684 is supplied as an input to the switching means 669 and 681 through resistors 685–688. The output signal from the reference voltage source 684 is then supplied to the desired channel of the preamplifier by means of control signals 666, 676, 678 and 683 as has been previously described. Signal 691 from the switch 669 is supplied as a test or reference voltage to channel 4, of the preamplifier 135. Signal 692 from the switch 669 is provided as a test voltage to channel 3 of the preamplifier 135. Signal 693 from the switch 681 is provided as a test voltage to channel 2 of the preamplifier 135. Signal 694 from the switch 681 is provided to channel 1 of the preamplifier 135 and is particularly provided as an input to the switch 751 illustrated in FIG. 18. Signal 694 is also provided to multiplexer 951 illustrated in FIG. 20. The reference voltage source 684 is provided with the output signal 846 from the preamplifier illustrated in FIG. 18 and with signals 851–858 which represent the output signals from the remaining preamplifier channels illustrated in FIG. 2*b*.

Commercially available components which can be utilized in the circuit illustrated in FIG. 15 are as follows:

| | |
|---|---|
| Decoder 651 | 74 C 154, National Semiconductor |
| Decoder 653 | 74 C 175 (2 required) National Semiconductor |
| Data Holding Latches 654-657 | MM 74 C 174, National Semiconductor |
| Switching Means 669 and 681 | DG 201, National Semiconductor |
| Resistors 685-688 | 49.K ohmn, 1%, ⅛W Film, Mepco |

Figure 16:
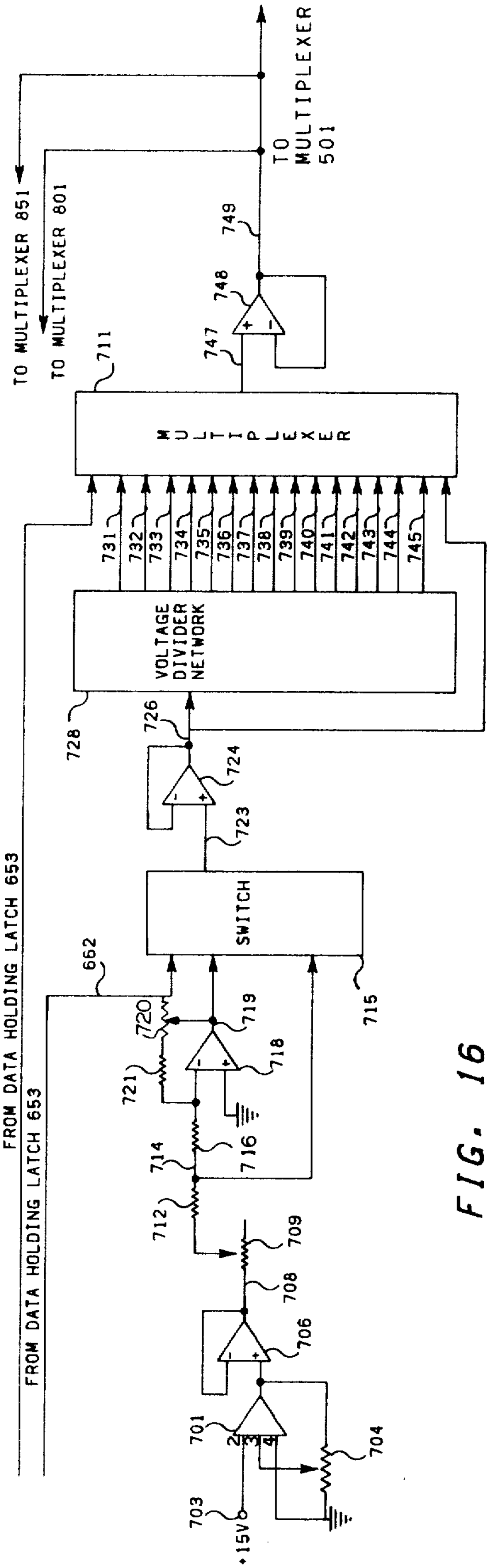
FIG. 16 is a schematic of the calibrator card illustrated in FIG. 2*b*.

The calibrator card 211, illustrated in FIG. 2*b*, is more fully illustrated in FIG. 16. As has been previously stated, the calibrator card 211 provides the circuitry for developing the precision voltages for calibration of the analog circuits of the RTU illustrated in FIG. 2*b*. The calibrator card 211 is also utilized to provide the test voltages for the notch filter 151 illustrated in FIG. 2*b*. Referring now to FIG. 16, pin 2 of the voltage regulator 701 is tied to the +15 volt power supply 703. In this embodiment of the invention, the voltage regulator 701 is a REF 01 AJ manufactured by Precision Monolithics. Pin 4 of the voltage regulator 701 is tied to ground. Pin 3 of the voltage regulator 701 is tied to the wiper of the potentiometer 704. The output of the voltage regulator 701 is tied to the noninverting input of the buffer amplifier 706 and is also tied to the ground through the potentiometer 704.

The voltage regulator 701 provides an output signal having a voltage level of 10 volts to the buffer amplifier 706. The buffer amplifier 706 prevents loading of the voltage regulator 701 and provides an output signal 708 also having a voltage level of 10 volts. The output signal 708 from the buffer amplifier 706 is also tied to the inverting input of the buffer amplifier 706. Signal 708 is supplied to the potentiometer 709 which, together with resistor 712, comprises a voltage divider network. Resistor 712 is connected to the wiper input of the potentiometer 709. The voltage divider network made up of the potentiometer 709 and the resistor 712 is scaled so as to provide an output signal 714 from the resistor 712 having a voltage level of +8.3 volts. Signal 714 is supplied as one input to the switch 715.

Signal 714 is also supplied through resistor 716 to the inverting input of the inverting amplifier 718. The noninverting input of the inverting amplifier 718 is tied to the ground. The output signal 719 from the inverting amplifier 718 has a voltage level of −8.3 volts and is supplied as a second input to the switch 715. The output signal 719 from the inverting amplifier 718 is also fed back to the inverting input of the inverting amplifier 718 through resistor 721 and potentiometer 720.

In response to the control signal 662, which is provided from the data holding latch 653, illustrated in FIG. 15, to the switch 715, the switch 715 selects either signal 719 or signal 714 to be supplied as an output. Thus, the switch 715 can supply an output signal 723 having a voltage level of ±8.3 volts depending on the command from the control signal 662.

The output signal 723 from the switching means 715 is supplied to the noninverting input of the buffer amplifier 724. The buffer amplifier 724 is provided to prevent loading of the switch 715 and provides an output signal 726 having a value of ±8.3 volts depending on the value of signal 723. The output signal 726 from the buffer amplifier 725 is provided as an input to the voltage divider network 728 and is also provided to the inverting input of the buffer amplifier 724. In addition, signal 726 is provided to the multiplexer 711.

The voltage divider network 728 provides a plurality of output signals to the multiplexer 711. The output signals 731-745 from the voltage divider network 728 are representative of signal 726 divided by powers of two. Thus signal 731 will have a value of ±4.15 volts depending on the value of signal 726. Signal 732 will have a value of ±2.075 volts depending upon the value of signal 726. The signals continue to decrease by powers of two, thus providing a plurality of input voltages to the multiplexer 711.

In response to the control signal 661, which is provided from the data holding latch 653, illustrated in FIG. 15, the multiplexer 711 selects one of the input voltages to be supplied as either an inpulse voltage or a calibrate voltage to the analog circuits illustrated in FIG. 2*b*. The output voltage 747 from the multiplexer means 711 is supplied to the noninverting input of the buffer amplifier 748. The buffer amplifier 748 prevents loading of the multiplexer 711. The output signal from the buffer amplifier 748 is fed back to the inverting input of the buffer amplifier 748 and is also supplied as an input to the notch filter 151, the gain ranging amplifier system 171, and the A/D conversion unit 141, illustrated in FIG. 2*b*. In particular signal 749 is provided as an input to the multiplexer 801, illustrated in FIG. 19, to the multiplexer 851 associated with the gain ranging amplifier system, illustrated in FIG. 20, and to the multiplexer 951 associated with the A/D conversion system also illustrated in FIG. 20.

Commercially available components which can be utilized in the circuit illustrated in FIG. 16 are as follows:

| | |
|---|---|
| Voltage Regulator 701 | REF 01 AJ, Precision Monolithics |
| Buffer Amplifier 706 and 724 and Inverting Amplifier 718 | LM 224D, National Semiconductor |
| Potentiometer 704 | 10K, 545-72HS, Weston |
| Potentiometer 709 | 500 Ω, 545-72HS, Weston |
| Resistor 712 | 1.65K, 1%, ⅛W, Mepco |
| Resistor 715 | 10K, 1%, ⅛W, Mepco |
| Switching Means 715 | DG 201, National Semiconductor |
| Multiplexer 711 | MPC-16S, Burr-Brown |
| Buffer Amplifier 748 | OPO7EJ, Precision Monolithics |

Figure 17:
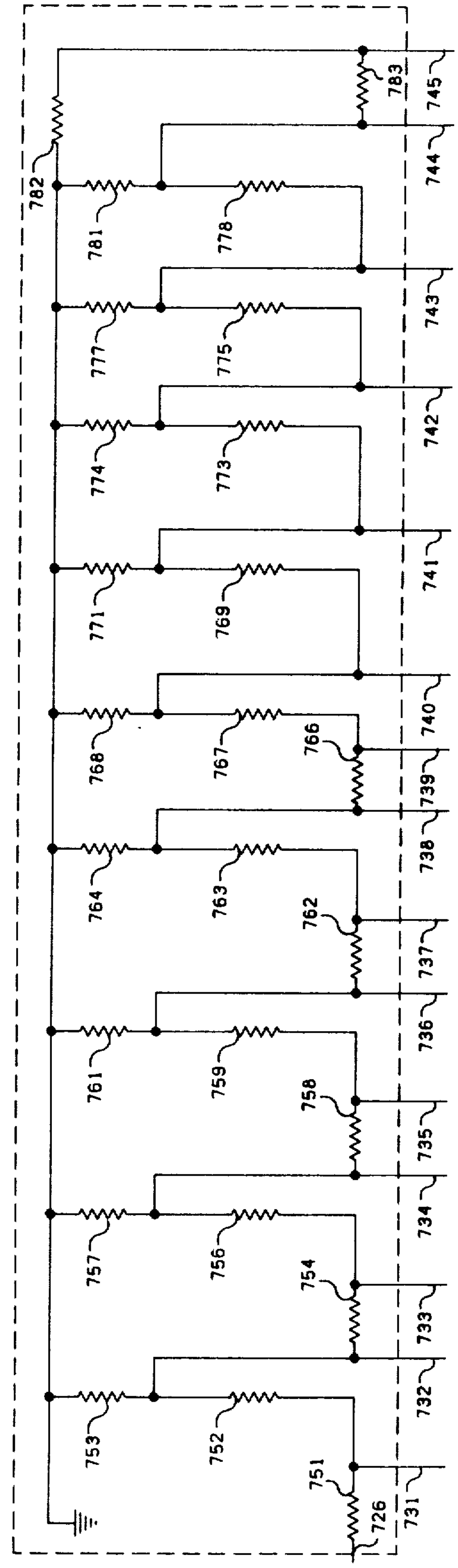
FIG. 17 is a schematic of the voltage divider network illustrated in FIG. 16.

The voltage divider network 728 illustrated in FIG. 16 is more fully illustrated in FIG. 17. For the sake of convenience, the resistors illustrated in FIG. 17 will be referred to as having first and second terminals. The first terminal will always be referred to as being the terminal to the left or to the bottom of the register as illustrated in FIG. 17. The second terminal of the resistor will always be referred to as being the terminal to the right or top side of the resistor as illustrated in FIG. 17.

Referring now to FIG. 17, signal 726 which was previously described in FIG. 16, is supplied to the first terminal of the resistor 751. The first terminal of resistor 752 is tied to the second terminal of resistor 751 as is signal line 731. The second terminal of resistor 752 is tied to the first terminal of resistor 753 as is signal line 732, which is also tied to the first terminal of resistor 754. The second terminal of resistor 753 is tied to the ground.

The second terminal of resistor 754 is tied to the first terminal of resistor 756 as is signal line 733. The second terminal of resistor 756 is tied to the first terminal of resistor 757 as is signal line 734, which is also tied to the first terminal of resistor 758. The second terminal of resistor 757 is tied to ground.

The second terminal of resistor 758 is tied to the first terminal of resistor 759 as is signal line 735. The second terminal of resistor 759 is tied to the first terminal of resistor 761 as is signal line 736, which is also tied to the first terminal of resistor 762. The second terminal of resistor 761 is tied to the ground.

The second terminal of resistor 762 is tied to the first terminal of resistor 763 as is signal line 737. The second terminal of resistor 763 is tied to the first terminal of resistor 764 as is signal line 738 which is also tied to the first terminal of resistor 766. The second terminal of resistor 764 is tied to the ground.

The second terminal of resistor 766 is tied to the first terminal of resistor 767 as is the signal line 739. The second terminal of resistor 767 is tied to the first terminal of resistor 768 as is signal line 740, which is also tied to the first terminal of resistor 769. The second terminal of resistor 768 is tied to the ground.

The second terminal of resistor 769 is tied to the first terminal of resistor 771 as is signal line 741, which is also tied to the first terminal of resistor 773. The second terminal of resistor 771 is tied to the ground.

The second terminal of resistor 773 is tied to the first terminal of resistor 774 as is signal line 742, which is also tied to the first terminal of resistor 775. The second terminal of resistor 774 is tied to the ground.

The second terminal of resistor 775 is tied to the first terminal of resistor 777 as is signal line 743, which is also tied to the first terminal of resistor 778. The second terminal of resistor 777 is tied to the ground.

The second terminal of resistor 778 is tied to the first terminal of resistor 781 and is signal line 744, which is also tied to the first terminal of resistor 783. The second terminal of resistor 781 is tied to the ground.

The second terminal of resistor 783 is tied to the ground through resistor 782 as is signal line 745.

Commercially available resistors which can be utilized in the voltage divider network illustrated in FIG. 17 and resistance values for the resistors illustrated in FIG. 17 are as follows:

| | |
|---|---|
| Resistors 751 and 753 | 2KΩ, 0.1%, ⅛W, Mepco |
| Resistors 752, 757 and 754 | 1KΩ, 0.1%, ⅛W, Mepco |
| Resistors 756, 758 and 761 | 500Ω, 0.1%, ⅛W, Mepco |
| Resistors 759, 762 and 764 | 250Ω, 0.1%, ⅛W, Mepco |
| Resistors 763,766,768,771,774,777 and 781 | 125Ω, 0.1%, ⅛W, Mepco |
| Resistors 767,769,773,775,778,782 and 783 | 62.5Ω, 0.1%, ⅛W, Mepco |

Figure 18:
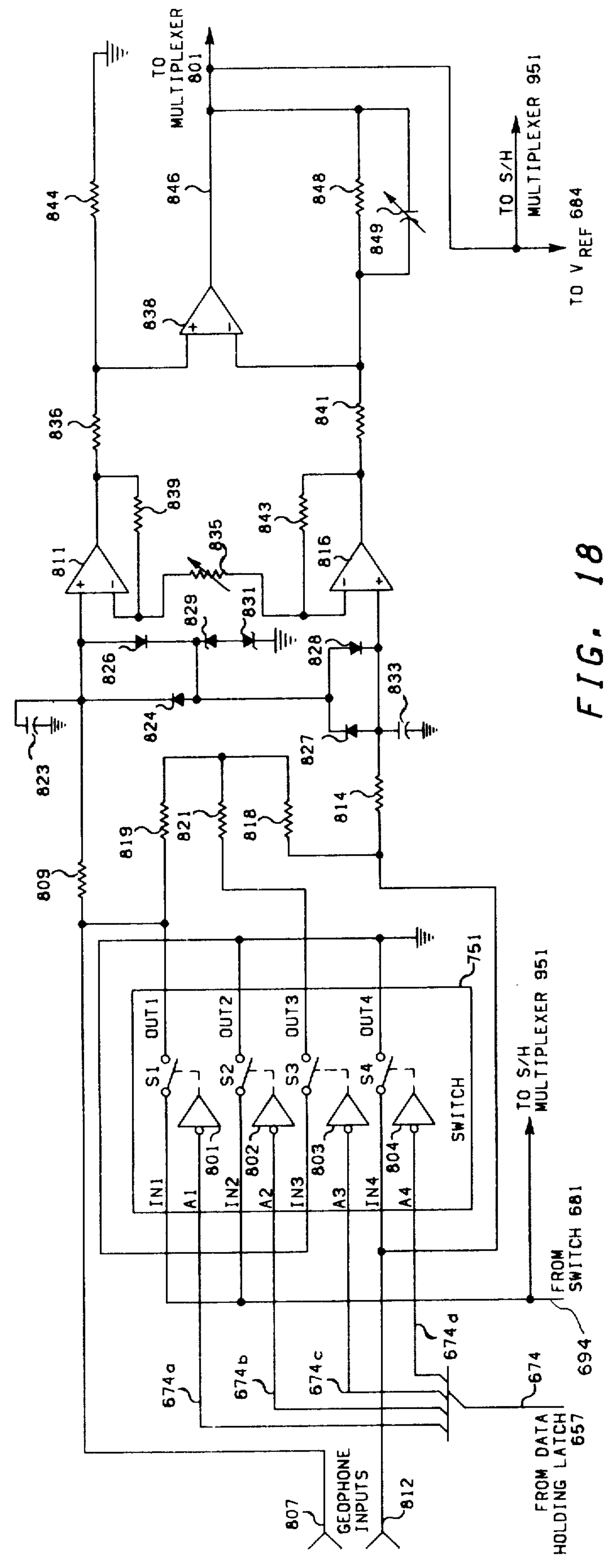
FIG. 18 is a schematic of the preamplifier illustrated in FIG. 2*b*.

The preamplifier 135, illustrated in FIG. *2b*, is more fully illustrated in FIG. 18. As is illustrated in FIG. *2b*, the preamplifier 135 consists of four channels. Each of the four channels are identical and independent, therefore, for the sake of convenience, only one channel is illustrated in FIG. 18. The description of this one channel is applicable to all of the channels of the preamplifier 135.

Referring now to FIG. 18, signal line 674 from the data holding latch 657, illustrated in FIG. 15, is actually four signal lines. As is shown in FIG. 18, signal lines 674*a* is supplied to the A1 input of the switching means 751. Signal line 674*b* is supplied to the A2 input of the switching means 751. Signal line 674*c* is supplied to the A3 input of the switching means 751. Signal line 674*d* is supplied to the A4 input of the switching means 751. Signal line 674*a–d* are supplied to inverters 801–804 respectively and the output from the inverters 801–804 is utilized to control switches S1–S4 respectively.

Switching means 751 is preferably an HI 201 analog switch manufactured by Harris Semiconductor. Part of the internal circuitry of switch 751 is illustrated in FIG. 18 to more particularly illustrate the teset functions which are performed through switching means 751.

Signal line 694, which is a test line supplied from switching means 681, illustrated in FIG. 15, is supplied to both input 1 and input 2 of the switching means 751. Input 1 is tied to switch S1 and input 2 is tied to switch S2.

A pair of inputs is supplied from each geophone. Geophone line 807 is supplied through resistor 809 to the noninverting input of the operational amplifier 811. Geophone line 807 is also tied to the first output of the switching means 751. The second line 812 from the geophone is supplied to the fourth input of the switching means 751 and is also supplied through resistor 814 to the noninverting input of the operational amplifier 816. The geophone signal line 812 is also tied through resistors 818 and 819 to the first output of the switching means 751.

The first output of the switching means 751 is tied to the third output of the switching means 751 through resistors 819 and 821. The third input, the second output and the fourth output from the switching means 751 are all tied to the ground. The third input of the switching means 751 is tied to switch S3 and the fourth input of switching means 751 is tied to switch S4. The four outputs of the switching means 751 are tied to switches S1–S4 respectively.

The positive side of capacitor 823 is tied to the noninverting input of operational amplifier 811. The negative side of capacitor 823 is tied to ground. The cathode side of diode 824 and the anode side of diode 826 are both tied to the noninverting input of the operational amplifier 811. The anode side of diode 824 is tied to the cathode of diode 827, to the anode of diode 828, to the cathode of diode 826, and to the cathode of Zener diode 829. The cathode of 826 is also tied to the cathode of Zener diode 829, the cathode of diode 827 and to the anode of diode 828. The anode of diode 829 is tied to the anode of Zener diode 831. The cathode of Zener diode 831 is tied to ground. The cathode of diode 828 is tied to the anode of diode 827. The anode of diode 827 is tied to the noninverting input of 816 as is the cathode of diode 828. The positive side of the capacitor 833 is also tied to the noninverting input of the operational amplifier 816. The negative side of the capacitor 833 is tied to the ground.

The inverting input of operational amplifier 811 is tied to the inverting input of operational amplifier 816 through the variable resistor 835. The output of operational amplifier 811 is tied through resistor 836 to the noninverting input of operational amplifier 838. The output of operational amplifier 811 is also fed back to the inverting input of operational amplifier 811 through resistor 839. The output from operational amplifier 816 is tied through resistor 841 to the inverting input of the operational amplifier 838. The output of operational amplifier 816 is also tied through resistor 843 to the inverting input of operational amplifier 816.

The noninverting input of operational amplifier 838 is tied to ground through resistor 844. The output signal 846 from the operational amplifier 838 is supplied as the channel 1 input to the multiplexer 801 illustrated in FIG. 19. Multiplexer 801, illustrated in FIG. 19, corresponds to the multiplexer associated with the notch filter 151 illustrated in FIG. *2b*. Signal 846 from the operational amplifier 838 is also tied through the resistor 848 and variable capacitor 849 to the inverting input of operational amplifier 838. Signal 846 from the operational amplifier 838 is also supplied to the S/H multiplexer 951 illustrated in FIG. 20.

Operational amplifiers 811 and 816 together with resistors 839 and 843 and variable resistor 835 make up a differential input-to-differential output operational amplifier. The gain of the differential input-to-differential output operational amplifier is determined primarily by the values of variable resistor 835 and fixed resistor 839 and 843. Only the differential signal is amplified; the common mode signal is passed unamplified.

The differential output which consists of the output signals from operational amplifiers 811 and 816 is supplied to the operational amplifier 838 which functions as a differential input to a single-ended output amplifier. The common mode signal is rejected by the operational amplifier 838 and only the differential signal is amplified. The input section to the differential input to differential output amplifier, made up of operational amplifier 811 and 816, consists of resistors 818, 819 and 821. Resistors 818, 819 and 821 provide a dc path to ground while maintaining a balanced input impedance. The resistor-diode network made up of resistors 809 and 814, diodes 824, 826, 827 and 828, and Zener diodes 829 and 831 comprise a clipping circuit which provides transient protection for the dual operational amplifier made up of operational amplifiers 811 and 816. This circuitry is provided primarily to provide protection against lightning. Capacitors 823 and 833 act simply as high frequency filters.

When the RTU, illustrated in FIG. *2b*, is in a data acquisition mode, switches S1, S2 and S4, illustrated in switching means 751, are open while switch S3 is closed. The geophone input signals 807 and 812 are supplied directly as inputs to the differential input to differential output differential amplifier made up of differential amplifiers 811 and 816. The difference between signals 807 and 812 is amplified in the differential input to differential output operational amplifier and the amplified signals are provided to the differential input to single ended output amplifier made up of operational amplifier 838. Amplifier 838 provides a single output signal 846 which is representative of the seismic data which has been sensed by the geophone units. Signal 846 is supplied directly to the multiplexer 801, illustrated in FIG. 19, when the RTU is in the data acquisition mode.

Three tests can be performed on the geophone units when the RTU is in a test mode. These three tests are referred to as the leakage test, continuity test and levitate test. The leakage test measures the leakage resistance between the geophone string and ground. During the leakage test, the command signal which is provided by means of signal lines 674 *a–d* causes switch S1 to close and causes switches S2, S3 and S4 to open. A voltage is supplied to the switching means 751 by means of test line 694. This voltage is supplied through switch S1, which is closed, to the geophone string through the geophone input line 807. Any current leakage from the geophone string to ground produces a voltage divider action which has the effect of reducing the test voltage supplied over the test line 694. The difference between the reference voltage which is supplied to the switching means 681 illustrated in FIG. 15 and the test voltage which is supplied to the S/H multiplexer 951 by means of signal line 694 will thus be representative of the leakage resistance fromthe geophone string to ground.

The continuity test measures the internal resistance between the input terminals represented by signal lines 807 and 812. To perform the continuity test, the command signal which is supplied over signal line 674 *a–d* causes switches S1 and S4 to close and causes switches S2 and S3 to open. A reference voltage is again supplied to the switching means 571 through the test line 694 and the reference voltage is supplied through switch S1 to the geophone unit by means of signal line 807. With switch S4 closed, the current from the reference voltage will flow through the geophone string. The voltage developed across the geophone by this current is amplified by the preamplifier system as has been previously described for the data acquisition sequence. The amplified voltage, which is proportional to the internal resistance of the geophone string, is supplied as an input to the S/H multiplexer 951, illustrated in FIG. 20, by means of signal line 846.

The levitate test provides a regulated voltage across the input terminals of the geophone unit, represented by signal lines 807 and 812, to levitate the geophone units suspended mass from its normal rest position. When the voltage is released causing the mass to drop, a damped oscillatory signal is produced which is ultimately analyzed to determine the performance parameters of the geophone unit. To initiate the levitate test, the command signals supplied by means of signal lines 674 *a–d* cause switches S1 and S4 to close and switches S2 and S3 to open. A voltage is supplied to the switching means 751 by means of the test line 694. This voltage is supplied through switch S1 to the geophone unit by means of signal line 807. Current flows through the geophone unit to ground through switch S4. The voltage thus developed across the geophone unit is amplified by means of the preamplifier as has been previously described and is supplied by means of signal line 846 to the reference voltage source 684 illustrated in FIG. 15. The reference voltage source 684 compares the preamplifier output supplied by means of signal line 846 with the original reference voltage, producing an error voltage. The error voltage is amplified and is supplied by means of test line 694 to the geophone unit in the same manner as previously described for the reference voltage. The voltage supplied to the geophone unit is thus regulated to reduce the error between the voltage supplied from the geophone, represented by signal 846, and the voltage supplied to the geophone, represented by signal 694.

The voltage is removed from the geophone by opening switches S1 and S4. When the voltage is removed from the geophone unit, the mass of the geophone coil oscillates about its original position with a damped motion resulting in the signal previously mentioned, which is represented as a voltage on signal lines 807 and 812. The resulting response signal of the geophone unit is amplified by the preamplifier as has been previously described and is provided as an input to the S/H multiplexer 951 illustrated in FIG. 20 by means of signal line 846.

Commercially available components which can be utilized in the circuit illustrated in FIG. 18 are as follows:

| | |
|---|---|
| Switching means 751 | HI-201, Harris Semiconductor |

-continued

| | |
|---|---|
| Resistors 809 and 814 | 100 ohms, 1%, ¼W, Mepco |
| Resistors 819 and 818 | 20 K ohms, 0.1%, ¼W, Mepco |
| Resistor 821 | 22 megohms, 5%, ¼W, Mepco |
| Capacitors 823 and 833 | 0.1 microfarad, 1%; polycarbonate film; Elpac |
| Diodes 824,826,827 and 828 | IN 4404, National Semiconductor |
| Zener diodes 829 and 831 | IN 4735A, National Semiconductor |
| Operations amplifiers 811 and 816 | OP-10, Precision Monolithics |
| Resistors 839 and 843 | 6.98 K ohms, 0.1%, ¼W, Mepco |
| Variable resistor 835 | 1K, Dale 101T |
| Resistors 836 and 841 | 10 K ohms, 0.1%, ⅛W; Matched TRW |
| Resistors 844 and 848 | 78.7 K ohms, 0.1%, ⅛W; Matched TRW |
| Variable capacitor 849 | 6.5-40PF, P/N CT-5-A-6R540-A, Mepco |
| Operational amplifier 838 | LM 224 D, National Semiconductor |

Figure 19:
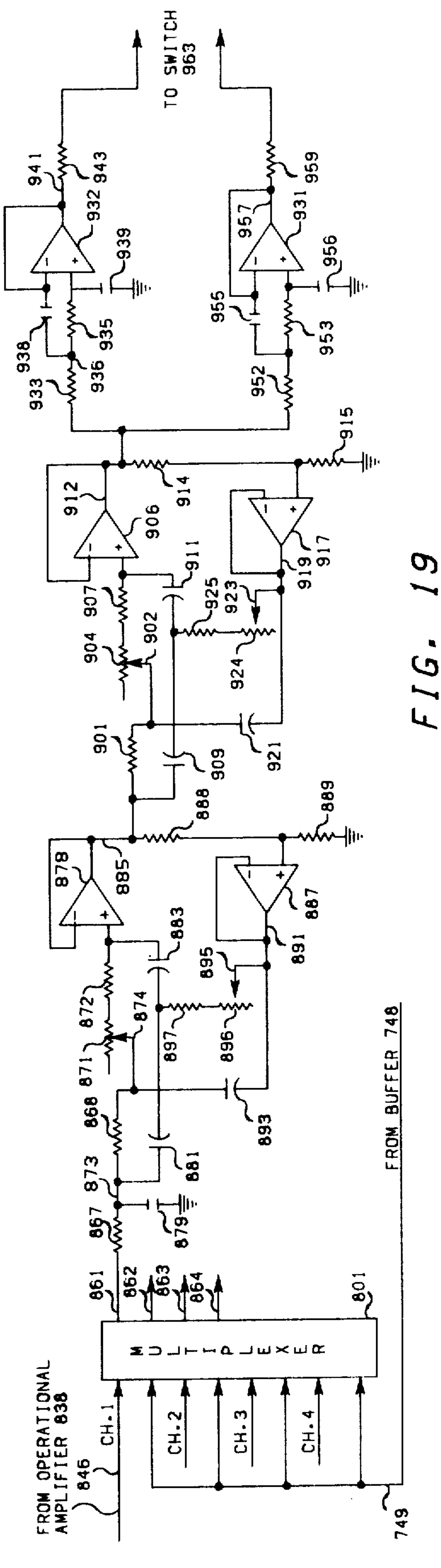
FIG. 19 is a schematic of the notch filter and the alias filter illustrated in FIG. 2*b*.

The notch filters 151 and the alias filters 161, illustrated in FIG. 1*b*, are more fully illustrated in FIG. 19. Four identical channels are provided in the notch filters 151 and the alias filters 161 but, again, for the sake of convenience, only one channel is illustrated in FIG. 19. Four channels of data are supplied to the multiplexer 801. Signal 846 is supplied to the channel 1 input from the operational amplifier 838 illustrated in FIG. 19. The multiplexer 801 is also supplied with a reference voltage signal 749 from the output of the buffer amplifier 748 illustrated in FIG. 16. Signal 749 is provided to each of the four channels by the multiplexer 801. The output signal 861 from the multiplexer 801 is representative of the channel 1 output from the multiplexer 801. In like manner, the output signals 862–864 are representative of the channel two-channel four outputs from the multiplexer 801.

Signal 861 from the multiplexer 801 is supplied through resistors 867 and 868 to the wiping arm 874 of the potentiometer 871. The resistors 867 and 868 are tied together by means of signal line 873. Signal 861 is provided from the variable resistor 871 through resistor 872 to the noninverting input of the operational amplifier 878. Capacitor 879, which is tied to signal line 873, is provided as a high frequency filter. The positive side of the capacitor 881 is tied to the signal line 873. The negative side of the capacitor 881 is tied to the negative side of capacitor 883. The positive side of capacitor 883 is tied to the noninverting input of the operational amplifier 878. The output of signal 885 from the operational amplifier 878 is tied to the inverting input of operational amplifier 878. The output signal 885 is also supplied to the noninverting input of operational amplifier 887 through the voltage divider network made up of resistors 888 and 889. The output signal 891 from the operational amplifier 887 is fed back to the inverting input of the operational amplifier 887. The output signal 891 is also tied to the negative side of the capacitor 893. The positive side of capacitor 893 is tied to the wiping arm 874 of the potentiometer 871. The output signal 891 and the operational amplifier 887 is also tied to the wiper arm 895 of the potentiometer 896. The potentiometer 896 is tied through resistor 897 to the negative side of capacitors 881 and 883.

The output signal 885 from the operational amplifier 878 is also supplied through resistor 901 to the wiping arm 902 of the potentiometer 904. The potentiometer 904 is tied to the noninverting input of the operational amplifier 906 through resistor 907. Signal 885 from the operatinal amplifier 878 is also supplied to the positive side of the capacitor 909. The negative side of the capacitor 909 is tied to the negative side of capacitor 911. The positive side of capacitor 911 is tied to the noninverting input of operational amplifier 906. The output signal 912 from the operational amplifier 906 is fed back to the inverting input of operational amplifier 906. The output signal 912 from the operational amplifier 906 is also supplied through the voltage divider network made up of resistors 914 and 915 to the noninverting input of operational amplifier 917. The output signal 919 from the operational amplifier 917 is fed back to the inverting input of operational amplifier 917 and is also provided to the negative side of the capacitor 921. The positive side of capacitor 921 is tied to the wiping arm 902 of the potentiometer 904. The output signal 919 from the operational amplifier 917 is also supplied to the wiping arm 923 of the potentiometer 924. The potentiometer 924 is tied to the negative sides of capacitors 909 and 911 through resistor 925.

Signal line 912 is provided as the output from the notch filter to the alias filter 161 illustrated in FIG. 2*b*. The notch filter illustrated in FIG. 19 is a twin tee notch filter which utilizes active feedback to raise the Q of the circuit. Use of the twin tee filters as notch filters is well known. Raising the Q of the circuit illustrated in FIG. 19 provides a very narrow rejection band width. The twin tee notch made up of operational amplifier 878 and 887, and the associated circuitry shown, has a notch frequency of 59.8 Hz in this preferred embodiment of the present invention. The twin tee filter made up of operational amplifiers 906 and 917, and the associated circuitry shown, has a notch frequency of 60.2 Hz in the preferred embodiment of the present invention. Since the circuits are in series a resultant response is developed which rejects the 60 Hz frequency. Rejection of the 60 Hz frequency is desirable because 60 Hz interference is commonly caused by power lines which may cross the area being serveyed.

Two channels of alias filters are provided for each channel of data provided from the preamplifier 135 illustrated in FIG. 2*b*. One channel, which is comprised primarily of operational amplifier 932 and the associated circuitry shown, has a cutoff frequency of 124 Hz. The second alias filter, which is comprised primarily of operational amplifier 931 and the associated circuitry shown in FIG. 19, has a cutoff frequency of 62 Hz. The alias filters are 12-pole Butterworth low pass active filters. The capacitor and resistor values in each stage are selected to produce a response equivalent to a particular "pole pair" of the 12-pole Butterworth filter. Six distinct "pole pair" stages are cascaded to give the 12-pole Butterworth response from the overall filter. The circuitry involved in a 12-pole Butterworth filter is well known. For this reson, only a single stage of the 12-pole Butterworth filter for each cutoff frequency is illustrated in FIG. 19. The output signal line 912 from the operational amplifier 906 is tied through resistors 933 and 935 to the noninverting terminal of the operational amplifier 932. Resistors 933 and 935 are tied together by signal line 936. Signal line 936 is tied to the inverting input of operational amplifier 932 through capacitor 938. Capacitor 939 is tied to the noninverting input of the operational amplifier 932. The output signal 941 from the operational amplifier 932 is tied to the inverting input of the operational amplifier 932 and is also supplied through resistor 943 to the next stage of the 12-pole Butterworth filter. The following stages of the 12-pole Butterworth filter, having a cutoff frequency of 124 Hz, have been deleted from FIG. 19 and signal 941 is illustrated as being supplied directly through resistor 943 to the cutoff frequency selector circuit 963, illustrated in FIG. 20.

Figure 20:
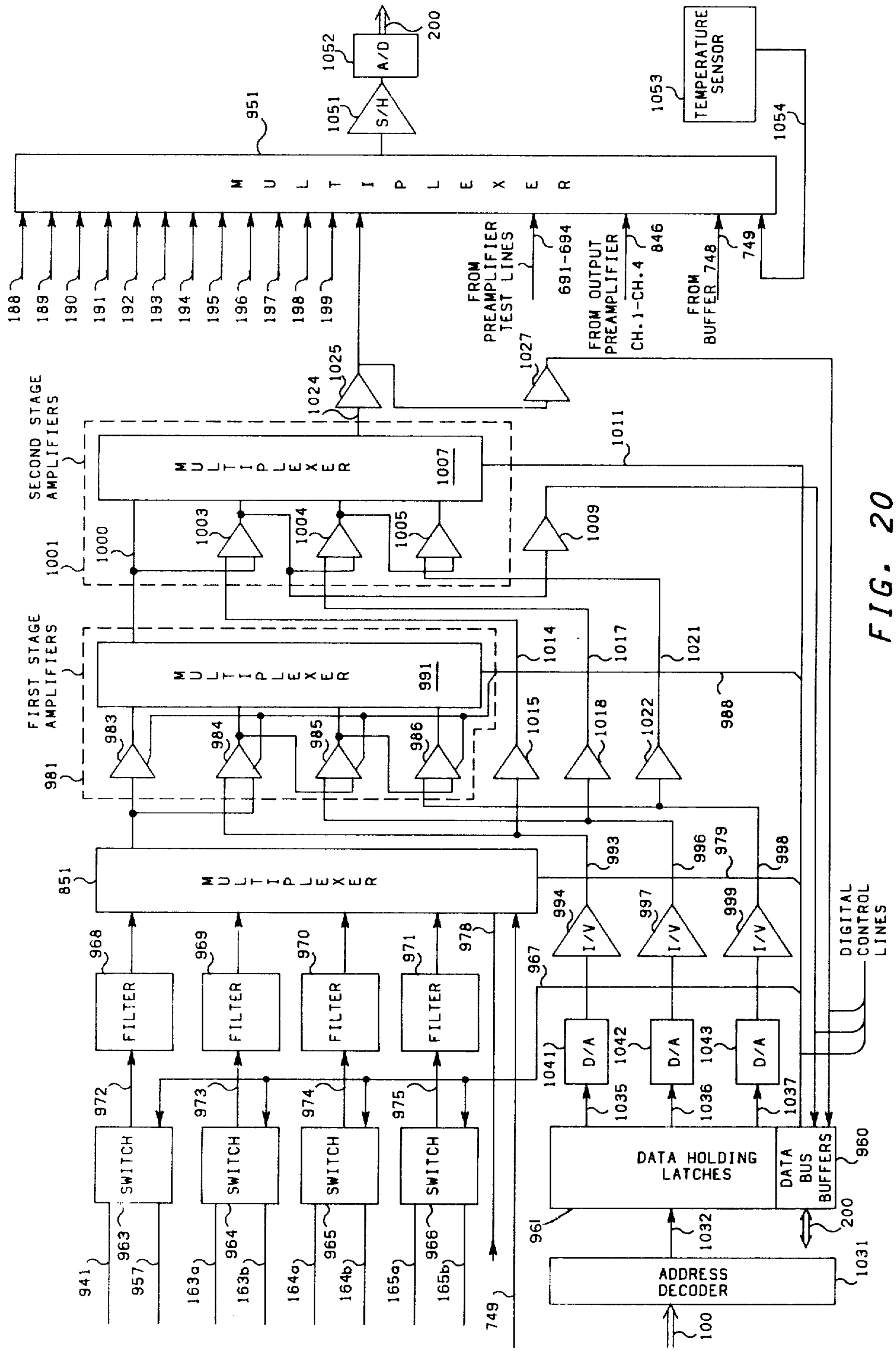
FIG. 20 is a schematic of the gain ranging amplifier system and the A/D conversion system illustrated in FIG. 2*b*.

Signal line 912 is also supplied through resistors 952 and 953 to the noninvertng input of the operational amplifier 931. Resistors 952 and 953 are tied together by means of signal line 954. Signal line 954 is tied through capacitor 955 to the inverting input of operational amplifier 931. Capacitor 956 is tied to the noninverting input of the operational amplifier 931. The output signal 957 from the operational amplifier 931 is fed back to the inverting input of the operational amplifier 931 and is also tied through resistor 959 to the cutoff frequency select circuit 963 illustrated in FIG. 20. The cutoff frequency select circuit 963, illustrated in FIG. 20, is utilized to select the alias filters utilized to provide data to the multiplexer 851, illustrated in FIG. 20. Again for the sake of simplicity the following stages of the 12-pole Butterworth filter, having a cutoff frequency of 62 Hz, have been deleted and signal 957 is shown as being supplied directly through resistor 959 to the cutoff frequency select circuit 963. The following stages of the 12-pole Butterworth filters are formed exactly as has been described for the stages illustrated in FIG. 19.

An impulse test is utilized to test the response of the notch filter 151 and the alias filters 161 illustrated in FIG. 2*b*. To perform the impulse test, a voltage is supplied to the multiplexer 801 by means of signal line 749. Multiplexer 801 provides the voltage provided by means of signal 749 as an input to the not ch filter and the alias filters illustrated in FIG. 19. The impulse has the effect of ringing the notch filter and the alias filters and the response of the notch filter and the alias filters can thus be determined. The impulse response of the notch filter and the alias filters is provided through the gain ranging amplifier system 171 to the A/D conversion system 141, as illustrated in FIG. 2*b*.

Commercially available components which can be utilized in the circuit illustrated in FIG. 19 are as follows:

| | |
|---|---|
| Multiplexer 801 | DG 201, National Semiconductor |
| Resistors 868, 872, 901 and 907 | 49.9K, 1%, ⅛W, MFF Series Dale Electronics |
| Potentiometers 871 and 904 | Model 85A, 10K ohms, Dale Electronics |
| Resistor 867 | 2K, 1%, ⅛ |
| 878; 887; 906 MFF Series | |
| | Dale Electronics |
| Resistor 897, 925 | 25.5K, 1%, ⅛W, MFF Series Dale Electronics |
| Resistor 888, 914 | 426 ohms, 1%, ⅛W, MFF Series Dale Electronics |
| Resistors 889 and 915 | 10K, 1%, ⅛W, MFF Series Dale Electronics |
| Potentiometers 896 and 924 | Model 85A, 2K ohms, Dale Electronics |
| Capacitor 879 | .033 microfarad, 10%, 50V, S&EI Mfg. Series 25E |
| Capacitor 881, 883, 909 and 911 | .05 microfarad, 1%, 50V, S&EI Mfg. Series 25E |
| Capacitor 893 and 921 | 0.1 microfarad, 1%, 50V, S&EI Mfg. Series 25E |
| Operational amplifiers 878, 887, 906 and 917 | OP-10, Precision Monolithics |
| Resistors 933 and 952 | 13.7K ohms, 0.1%, ⅛W, MFF Series Dale Electronics |
| Resistor 935, 953 | 240.8K ohms, 0.1%, ⅛W, MFF Series Dale Electronics |

-continued

| | |
|---|---|
| Capacitor 938 | 0.1 mfd, 1%, 50V, C1BXXX Series, ELPAC Components |
| Capacitor 955 | 0.05 mfd, 1%, 50V, C1BXXX Series, ELPAC Components |
| Capacitor 939 | 0.02 mfd, 1%, 50V, C1BXXX Series, ELPAC Components |
| Capacitor 956 | 0.01 mfd, 1%, 50V, C1BXXX Series, ELPAC Components |
| Resistors 943 and 959 | 14.82 K ohms, 1%, ⅛W, MFF Series Dale Electronics |
| Operational Amplifiers 932 and 931 | LM 224D, National Semiconductor |

The gain ranging amplifier system 171 and the A/D conversion system 141, illustrated in FIG. 2*b*, are more fully illustrated in FIG. 20. As has been previously stated, the output signal 941 from the alias filter having a 124 Hz cutoff frequency, which corresponds to a sampling rate of 2 milliseconds, and the output signal 957 from the alias filter having a cutoff frequency of 62 Hz, which corresponds to a 4 milliseconds sampling rate, are supplied as inputs to the switching means 963. In the same manner, signals 163 *a–b* which are representative of the channel 2 output from the alias filters, as illustrated in FIG. 2*b*, are provided as inputs to the switching means 964. Signals 164 *a–b* are supplied as inputs to the switching means 965 and signals 165 *a–b* are supplied as inputs to the switching means 966. Control signals 967 are provided to each of the switching means 963–966 from the data bus buffers 960. The control signals 967 are utilized to select the channel from the alias filters which will be supplied to the filters 968–971. Either the 124 Hz cutoff or the 64 Hz cutoff filters will be selected by the control signals 967, and the switching means 963–966 will provide data signals 972–975 respectively to the filters 968–971. The filters 968–971 are single-pole high-pass filters which are utilized to remove and DC offset from the signals 972–975. Data is supplied from the filters 968–971 to the multiplexer 851. The multiplexer 851 is also provided with a ground reference signal 978 and is also provided with a voltage reference signal 749 from the output of the buffer amplifier 748, illustrated in FIG. 16. Switching of the multiplexer 851 is controlled by means of control signal 979.

The output from the multiplexer 851 is provided as an input to the first stage amplifier 981. The first stage amplifier 981 consists of four sample and hold (S/H) amplifiers 983 ∝ 986. S/H amplifiers 983 has a gain of unity while S/H amplifiers 984–986 each have a gain of 16. The sampling and holding functions of the S/H amplifiers 983–986 are controlled by means of control line 988, which is provided to each of the S/H amplifiers 983–986 from the data bus buffers 960.

The output signal from the multiplexer 851 is provided as an input to the S/H amplifier 983 and as a first input to the S/H amplifier 984. The output from the S/H amplifier 984 is provided as a first input to the S/H amplifier 985. The output from the S/H amplifier 985 is provided as a first input to the S/H amplifier 986. The outputs from each of the S/H amplifiers 983–986 are provided to the multiplexer 991. In this manner, gains of 1, 16, 256 and 4,096 are available from the first stage amplifier 981.

S/H amplifier 984 is also provided with the output signal 993 from the current-to-voltage transducer 994. Signal 993 is utilized as a voltage offset (Vos) compensating signal which will be more fully described in the following paragraphs. S/H amplifier 985 is provided with the output signal 996 from the current-to-voltage transducer 997. Signal 996 is also utilized as a voltage offset compensating signal in the same manner as signal 993. S/H amplifier 986 is provided with the output signal 998 from the current-to-voltage transducer 999 as a second input. Signal 998 is also used as a voltage offset compensating signal.

The output signal from the first stage amplifier 981 is provided as an input to the second stage amplifier 1001. The second stage amplifier 1001 is made up of three amplifiers 1003–1005, each having a gain of two. The output signal 1000 from the first stage amplifier 981 is provided as an input to the multiplexer 1007 and is also provided as a first input to the amplifier 1003. The output from the amplifier 1003 is provided as a first input to the amplifier 1004 and is also provided as an input to the comparator 1009. The output from the amplifier 1004 is provided as a first input to the amplifier 1005. The output from each of the amplifiers 1003–1005 is provided as an input to the multiplexer 1007. The switching of the multiplexer 1007 is controlled by means of control line 1011 which is provided from the data bus buffers 960. The output of the comparator 1009 is provided as an input to the data bus buffers 960.

A second input signal 1014 is provided as an input to the amplifier 1003 from the output of the amplifier 1015. Signal 1014 is used as a voltage offset compensating signal in the same manner as signals 993, 996 and 998. Signal 1017 is provided as the second input to the amplifier 1004 from the amplifier 1018. Signal 1017 is also used as a voltage offset compensating signal. Signal 1021 is provided as a second input to the operational amplifier 1005 from the amplifier 1022. Signal 1021 is also used as a voltage offset compensating signal.

The output signal 1024 from the second stage amplifier complex 1001 is supplied through the buffer amplifier 1025 to the multiplexer 951. The output from the buffer amplifier 1025 is also supplied as an input to the comparator 1027. The output from the comparator 1027 is provided as an input to the data holding latches 960.

An address is provided to the gain ranging amplifier system by means of the address line 100 from the 6800 microprocessor which is applied to the address decoder 1031. The address is decoded by means of the address decoder 1031 and is provided to the data holding latches 961 means of signal lines 1032. These decoded address lines control the transfer of data between the 6800 microprocessor data bus and the gain ranging amplifier system latches and buffers. Three sets of output signal lines 1035–1037 are provided from the data holding latches 961 to the digital-to-analog (D/A) converters 1041–1043. The output from the D/A converter 1041 is proivided as an input to the current-to-voltage transducer 994. The output from the D/A converter 1042 is provided as an input to the current-to-voltage transducer 997. The output from the D/A converter 1043 is provided as an input to the current-to-voltage transducer 999.

The output from the multiplexer 951 is supplied to the sample-and-hold amplifier 1051. The output from the sample-and-hold amplifier 1051 is provided to the analog-to-digital (A/D) converter 1052. The output from the A/D converter 1052 is provided to the data bus 200 of the 6800 microprocessor.

The temperature sensor 1053 is provided to give an indication of the temperature of the RTU. The output signal 1054, representative of the temperature of the RTU is provided as an input to the multiplexer 951.

In operation, 24 values which are used by the gain ranging amplifier system for voltage offset compensation, must be computed and stored in the 6800 microprocessor memory prior to each usage of the gain ranging amplifier system for data acquisition. The voltage offset compensation values are determined for the sample-and-hold amplifier 984–986 and for the amplifier 1003–1005. No value is determined for the sample-and-hold amplifier 983. To determine the required voltage offset compensation values, channel 1 is selected and its input grounded. Multiplexers 991 and 1007 are then utilized to provide the outputs of each amplifier, except sample-and-hold amplifier 983, to the multiplexer 951. The output signals are sampled, held for a sufficient time to perform an A/D conversion, and then are provided to the 6800 microprocessor by means of data bus 200 from the A/D converter 1052. A value is then computed for each of the amplifiers tested which, when applied to their respective inputs, will drive the output of the amplifiers to zero. These values for each amplifier are stored in the 6800 microprocessor memory for subsequent use in voltage offset compensation during the data acquisition sequence. The voltage offset compensation values are provided to the gain ranging amplifier system by means of the address decoder 1031 and the data holding latches 961 which provide signals 1035–1037 which are representative of the voltage offset compensation values to the D/A converters 1043. The D/A converters 1041–1043 and the current-to-voltage converters 994, 997 and 999 are time shared to provide compensating values to the particular amplifiers being utilized in the data acquisition sequence. The procedure scans the four channels and collects data from the amplifiers such that four compensation values are determined per amplifier, one for each channel. This results in a total of 24 values. These values are stored in memory to be used for offset compensation.

When the 24 voltage offset values have been stored in memory, a data collection sequence can be initiated. In the data collection sequence, the sample-and-hold amplifiers in the first stage amplifier 981 act as sample-and-hold buffers in addition to providing most of the gain. In operation, a channel is selected by the multiplexer 851 and is provided to the first stage amplifier 981. All of the sample-and-hold amplifiers 983–986 are placed in a sample mode when the data acquisition sequence is initiated. The sample-and-hold amplifiers 983–986 sample for a sufficient time to allow stabilization and, after sufficient time has passed, all of the sample-and-hold amplifiers 983–986 are set to hold simultaneously by means of control signal 988 which is provided from the data bus buffers 960 in response to an address from the 6800 microprocessor. The output signal from the sample-and-hold amplifier 983 is provided from the multiplexer 991 through the amplifier 1003 to the comparator 1009. If the output signal from the sample-and-hold amplifier 983 is less than 0.5 volts, then the output signal from the comparator 1009 will provide an indication to the data bus buffers 960 that the signal output from the multiplexer 851 can be amplified by a factor of 16 without exceeding 8 volts. This insures that the input voltage limit of the A/D converter (10 volts) will not be exceeded. Generally, this is accomplished with the 6800 microprocessor by sampling the output of the comparator 1009. When this signal switches low, the output signal 1000 from the multiplexer 991 exceeds 0.5 volts.

If the output signal from the sample-and-hold amplifier 983 does not exceed 0.5 volts, then the microprocessor switches the multiplexer 991 providing the output signal from the sample-and-hold amplifier 984 to the comparator 1009 through the amplifier 1003. Again, the output from the comparator is checked to ascertain whether or not the output signal from the sample-and-hold amplifier 984 exceeds 0.5 volts. If the output from the sample-and-hold amplifier 984 does not exceed 0.5 volts, then the output from the comparator 1009 will stay high and the microprocessor will direct the multiplexer 991 to select the output signal from the sample-and-hold amplifier 985 as the output signal 1000 from the multiplexer 991. The selection of the sample-and-hold amplifiers is controlled by means of the control lines 988. This procedure is continued until the output from one of the sample-and-hold amplifiers 983–985 is found to exceed 0.5 volts or until the output from the sample-and-hold amplifier 986 is provided as the output from the multiplexer 991. The first output from the sample-and-hold amplifiers 983–985 which exceeds 0.5 volts will be selected by the microprocessor, using multiplexer 991, and the remaining sample-and-hold amplifiers will not be checked.

The compensation values represented by signals 993, 996 and 998 are utilized during the data acquisition sequence to provide the required voltage offset compensation by either adding to or subtracting from the signals which would ordinarily be output from the sample-and-hold amplifiers 984–986. When the sample-and-hold amplifiers 983–986 are set to sample, the compensation values for the sample-and-hold amplifiers 984–986 are stored in the three D/A converters 1041–1043. After the sample-and-hold amplifiers 983–986 are set to hold, the compensation values for the second stage amplifiers 1003–1005 are stored in the D/A converters 1041–1043. The new compensation values cannot change the voltage levels held by the first stage sample-and-hold amplifiers 984–986 since they are in the hold mode. This allows the D/A converters to be time shared in compensating the offset of the first and second stage amplifiers.

After the output from the first stage amplifier 981 has been determined, the output is provided as signal 1000 to the multiplexer 1007. The unamplified signal 1000 is first provided as signal 1024 from the multiplexer 1007 in response to the control signals 1011, which are provided from the data bus buffers 960 in response to an address and data from the 6800 microprocessor. The output from the multiplexer 1007 is provided through the output buffer 1025 as an input to the comparator 1027. The comparator 1027 provides a determination as to whether the output from the multiplexer 1007 has exceeded 4 volts. If the output from the multiplexer 1007 has not exceeded 4 volts, then it can be multiplied by a factor of 2 without exceeding the 8-volt input limitation set for the A/D converter 1052. The output from the comparator 1027 is provided as an input to the data bus buffers 960 as had previously been indicated. The output from the comparator 1027 is held high until such time as the output from the multiplexer 1007 exceeds 4 volts. If the output from the multiplexer 1007 exceeds 4 volts, then the output from the comparator 1027 goes low and the output from the multiplexer 991 is selected as the output to be provided to the multiplexer 951. Each of the outputs from the amplifiers 1003–1005 is provided to the comparator 1027 until such time as the output of the comparator 1027 goes low. At that time the gain ranging sequence is complete and in this manner the output from the first amplifier which exceeds 4 volts or the output of amplifier 1005 is provided to the multiplexer 951. Once an output has been selected to be provided the multiplexer 951, the channel multiplexer 851 is then advanced to the next channel in the gain ranging amplifier and the gain ranging process is repeated.

The data which is provided to the multiplexer 951 is converted to digital form by the A/D converter 1052 and is provided to the 6800 microprocessor data bus 200 in the same manner as previously described.

The multiplexer 951 is also provided with signals 188–199 from the power supply and regulator 186, illustrated in FIG. *2b*. These signals, which represent the various voltage levels provided by the power supply and regulator, are converted to digital form by the A/D converter 1022 and are provided to the 6800 microprocessor data bus from the A/D converter 1052. These signals 188–199 provide an indication of the availability of power for the RTU illustrated in FIG. *2b*.

Commercially available components which can be utilized in the schematic illustrated in FIG. 20 are as follows:

| | |
|---|---|
| Switching means 963–966 | DG 201, National Semiconductor |
| Filters 968–971 | LM 208AD, National Semiconductor |
| Multiplexer 851 | DG 201, National Semiconductor |
| Sample-and-Hold Amplifiers 983–986 | HAI-2420-2, Harris Semiconductor |
| Multiplexer 991 | DG 201, National Semiconductor |
| Amplifiers 1003–1005 | HAI-4741-2, Harris Semiconductor |
| Multiplexer 1007 | DG 201, National Semiconductor |
| Buffer Amplifier 1025 | HAI-4741-2, Harris Semiconductor |
| Comparator 1009 and 1027 | LM-239-0, National Semiconductor |
| Data Holding Latches 961 | 74 LS 75, National Semiconductor |
| D/A converters 1041–1043 | DAC 100, Burr-Brown |
| Amplifiers 1015, 1018 and 1022 | HAI-4741-2, Harris Semiconductor |
| Current to Voltage Converters 994, 997 and 999 | HAI-4741-2, Harris Semiconductor |
| Multiplexer 951 | MPC-16S and DG 508 with the output pins connected, Burr-Brown |
| Sample-and-Hold Amplifier 1051 | HA-1-2420-2, Harris Semiconductor |
| A/D Converter 1052 | MP-2814, Analogic, Inc. |
| Address Decoder 1031 | 74C20 (8 required) National Semiconductor |
| Temperature Sensor 1053 | YSI 44211, Yellow Springs, Inc. |

The power supply regulator 186 which is illustrated in FIG. *2b* is more fully illustrated in FIG. 21. Referring to FIG. 21, the battery pack 1101 supplies four output voltages by means of supply lines 196–199 which have been previously described in FIG. *2b*. Supply line 196 supplies +8.75 volts; supply line 197 supplies +18.75 volts; supply line 198 supplies −6.25 volts and supply line 199 supplies −18.75 volts. Supply line 198 is provided directly to the RTU. Supply lines 196, 197 and 199 are supplied to the voltage regulators 1103 and are also supplied directly to the RTU. The voltage regulators 1103 are also supplied with the control signal 187 from the microprocessor 111, as illustrated in FIG. *2b*.

In response to the voltages which are supplied by means of supply lines 196, 197 and 199 and the command signals which are supplied by means of signal line 187, the voltage regulators 1103 provide a plurality of output signals which have previously been described in FIG. *2b*. Signal line 188 supplies a +12 volts; signal line 189 supplies a +15 volts; signal line 190 supplies a −5 volts; signal line 191 supplies a −12 volts; signal line 192 supplies a −15 volts; signal line 193 supplies a +5 volts; signal line 194 supplies a +5 volts and signal line 195 supplies a +5 volts. The regulators 1103 are primarily utilized to set and maintain the respective voltage levels to lines 188–195 which would otherwise vary with variations in voltage levels supplied from battery pack 1101 due to depletion of charge therein with use (characteristic discharge curves), shelf life thereof, temperature thereof, etc.

The voltage regulator circuit 1103, illustrated in FIG. 21, is more fully illustrated in FIGS. *22a* and *b*. Referring now to FIG. *22a*, signal 187*a* from the microprocessor is representative of a command to turn on the +15 volt supply 189. Signal 187*a* goes high when it is desired to turn the +15 volt signal 189 on. Signal 187*a* is supplied to the buffer amplifier 1111 and is also supplied to ground through resistor 1112. The output from the buffer amplifier 1111 is supplied through resistor 1113 to the input of transistor 1115. The +5 volt supply 194 is tied through resistor 1118 to the output of the buffer amplifier 1111 and through resistor 1113 to the base of the transistor 1115.

Supply 197, having a voltage level of +18.75 volts, is tied to the collector of transistor 1115 and transistor 1119 through resistors 1121 and 1122. Supply 197 is also supplied to the emitter of transistor 1124. The collector of transistor 1115 is tied to the base of transistor 1124 through resistor 1122. The emitter of transistor 1115 is tied to the base of transistor 1119. The emitter of transistor 1119 is tied to ground. The collector of transistor 1124 is supplied as an input to the voltage regulator 1126 and is tied to ground through capacitor 1127. The ground input 1129 of the voltage regulator 1126 is tied to ground. The output from the voltage regulator 1126 is supplied as supply voltage 189 to the RTU. The output from the voltage regulator 1126 is also tied to ground through capacitor 1131. As has been previously stated, supply voltage 189 has a voltage level of +15 volts.

When command signal 187*a* goes high, the output from the buffer amplifier 1111 goes high, allowing current to flow from the +5 volt supply 194 to the base of the transistor 1115. Transistors 1115 and 1119 comprise a Darlington pair. When transistor 1115 turns on in response to the signal on line 187*a*, transistor 1119 also turns on and allows current to flow from the base of transistor 1124. Transistor 1124 turns on and thus provides the +18.75 volt input to the voltage regulator 1126 which provides a regulated +15 volt output in response to the voltage supplied from transistor 1124. Capacitors 1127 and 1131 provide stability for the voltage regulator 1126.

Signal 187*b* from the microprocessor, which is a command to turn on the +5 volt supply 193, is supplied as an input to the buffer amplifier 1133 and is also supplied to ground through resistor 1134. The output from the buffer amplifier 1133 is tied to the base of transistor 1135 through resistor 1137. The +5 volt power supply is tied to the base of transistor 1135 through resistors 1141 and 1137 and is also tied to the output of the buffer amplifier 1133 through resistor 1141. The output from the buffer amplifier 1133 is also tied to ground through capacitor 1142.

The collector of transistor 1135 and the collector of transistor 1143 are tied to the +8.75 volt supply 196 through resistors 1145 and 1146. Signal 196 is also tied to the emitter of transistor 1148. The collector of transistors 1135 and 1143 are tied to the base of transistor 1148 through resistor 1145. Supply 196 is tied to the base of transistor 1148 through resistor 1146. The emitter of transistor 1135 is tied to the base of transistor 1143. The emitter of transistor 1143 is tied to the ground. The collector of transistor 1148 is tied to ground through capacitor 1151 and is also supplied as an input to the voltage regulator 1152. The ground input 1154 to the voltage regulator 1152 is tied to ground through potentiometer 1155. The wiping arm of potentiometer 1155 is tied to ground. The ground input 1154 to the voltage regulator 1152 is also tied to ground through capacitor 1157. The output from the voltage regulator 1152 is provided as the +5 volt supply voltage 193 to the RTU and it is also tied to ground through capacitor 1159.

Signal 187*b* goes high when it is desired to turn on the +5 volt supply 193. When signal 187*b* goes high, the output from the buffer amplifier 1133 goes high allowing current to flow from the +5 volt supply 194 to the base of transistor 1135. Transistor 1135 turns on in response to the flow of current from the +5 volt supply 194 as does the transistor 1143 which together with transistor 1135 comprises a Darlington pair. When the Darlington pair, made up of transistors 1135 and 1143, is turned on, current flows from the base of transistor 1148. The transistor 1148 is thus turned on resulting in the application of the +8.75 volt supply voltage to the input of the voltage regulator 1152. In response to the input voltage, the voltage regulator 1152 provides a regulated +5 volt supply 193 to the RTU.

Capacitors 1151 and 1159 provide stability for the voltage regulator 1152. Potentiometer 1155 is provided to allow small changes to be made in the voltage level of supply 193. In some applications of the RTU, it is desirable for the level of the +5 volt supply 193 to be slightly greater than +5 volts.

The command signal 187*c*, supplied from the 6800 microprocessor, is representative of a command to turn on the +5 volt supply 195. Signal 187*c* is tied as an input to the buffer amplifier 1161 and is also supplied to ground through resistor 1163. The output from buffer amplifier 1161 is tied to the base of transistor 1164 through resistor 1165. The +5 volt supply 194 is tied to the base of the transistor 1164 through resistor 1168 and resistor 1165. The +5 volt supply 194 is also tied to the output of the buffer amplifier 1161 through resistor 1168.

The collectors of transistors 1164 and 1169, which together comprise a Darlington pair, are tied to the +8.75 volt supply 196 through resistors 1171 and 1172. The emitter of transistor 1164 is tied to the base of transistor 1169. The emitter of transistor 1169 is tied to the ground.

The +8.75 supply 196 is provided to the base of the transistor 1173 through resistor 1171. The collectors of transistors 1164 and 1169 are tied to the base of transistor 1173 through resistor 1172. The +8.75 volt supply 196 is also provided to the voltage regulator 1175 and to the emitter of transistor 1173. The collector of transistor 1173 is tied to the ground through capacitor 1176 and is also tied to the input of regulator 1181. The ground input 1178 to the voltage regulator 1175 is tied to ground. The output from the voltage regulator 1175 is provided as a +5 volt supply 194 to the RTU and to the regulators 1103. The output from the voltage regulator 1175 is also tied to ground through capacitor 1179.

The collector of transistor 1173 is tied to the input of voltage regulator 1181 and is also tied to ground through capacitor 1182. The ground input 1183 of the voltage regulator 1181 is tied to ground. The output of voltage regulator 1181 is provided as the +5 volt supply 195 and is tied to ground through capacitor 1185.

The +8.75 volt supply 196 is provided directly to the voltage regulator 1175. The +5 volt supply 194 is on at any time the RTU is operational and provides power to RF receiver 106 and to the RF interface 108 to allow a command from the CRS, illustrated in FIG. 2*a* to turn on the computer 111 illustrated in FIG. 2*b*. All other voltage supplies are on only when they are being utilized. The command signal 187*c* goes high when it is desired to turn on the +5 volt supply 195. When signal 187*c* goes high, the output from the buffer amplifier 1161 goes high and allows current to flow from the +5 volt supply 194 to the base of the transistor 1164. Both transistors 1164 and 1169 turn on in response to flow of current to the base of transistor 1164. When transistors 1164 and 1169 turn on, current is allowed to flow from the base of transistor 1173 thus turning it on. When transistor 1173 turns on, the +8.75 volt supply 196 is applied to the input of the voltage regulator 1181. In response to the +8.75 supply being applied to the input of voltage regulator 1181, a regulated +5 volt supply 195 is provided to the RTU.

Capacitors 1176 and 1179 are utilized to stabilize the voltage regulator 1175. Capacitors 1182 and 1185 are utilized to stabilize the voltage regulator 1181.

Referring now to FIG. 22*b*, the command signal 187*d* from the 6800 microprocessor is representative of the command to turn on the +12 volt supply 188. Signal 187*d* is supplied as an input to the buffer amplifier 1191 and is also tied to ground through resistor 1192. The output from the buffer amplifier 1191 is tied to the base of transistor 1194 through resistor 1195. The +5 volt supply 194 is tied to the output of the buffer amplifier 1191 through resistor 1197 and is also tied to the base of transistor 1194 through resistor 1195.

The collectors of transistors 1194 and 1199, which together comprise a Darlington pair, are tied to the +18.75 volt supply 197 through resistors 1201 and 1202. The emitter of transistor 1194 is tied to the base of transistor 1199. The emitter of transistor 1199 is tied to the ground. The collectors of transistors 1194 and 1199 are also provided to the base of the transistor 1203 through resistor 1202. The +18.75 volt supply 197 is also tied to the emitter of transistor 1203 as well as to the base of transistor 1203 through resistor 1201.

The collector of transistor 1203 is tied through resistor 1205 to the input of the voltage regulator 1207. The ground input 1209 of the voltage regulator 1207 is tied to ground. The supply input of voltage regulator 1207 is tied to ground through capacitor 1208. The output from the voltage regulator 1207 is provided as the +12 volt supply 188 and is tied to ground through capacitor 1211.

When it is desired to turn on the +12 volt supply 188, the command signal 187*d* goes high. When the command signal 187*d* goes high, the output from the buffer amplifier 1191 goes high allowing current to flow to the base of transistor 1194 from the +5 volt supply 194. Both transistors 1194 and 1199 turn on in response to the flow of current to the base of transistor 1194, thus allowing current to flow from the base of transistor 1203. Thus transistor 1203 turns on and switches supply voltage 197 to the input of the voltage regulator 1207. In response to the voltage input 197, the voltage regulator 1207 provides a regulated +12 volt supply 188 to the RTU.

The command signal 187*e* from the 6800 microprocessor is representative of a command to turn on the −5 volt supply 190. Signal 187*e* is provided as an input to the buffer amplifier 1215. The output from buffer amplifier 1215 is provided through resistor 1216 to the base of the transistor 1218. The +5 volt supply 194 is tied to the base of transistor 1218 through resistors 1221 and 1216. The +5 voltage supply 194 is also tied to the output of the buffer amplifier 1215 through resistor 1221 and to the input of buffer amplifier 1215 through resistor 1222. The −18.75 volt supply 199 is tied to the base of the transistor 1218 through resistor 1225.

Transistors 1218 and 1227 make up a Darlington pair. The collectors of transistors 1218 and 1227 are tied through resistors 1228 and 1229 to the −18.75 volt supply 199. the emitter of transistor 1218 is tied to the base of transistor 1227. The emitter of transistor 1227 is tied to ground.

The −18.75 volt supply 199 is tied to the base of transistor 1233 through resistor 1229. The −18.75 volt supply 199 is also tied to the emitter of transistor 1233. The collectors of transistors 1218 and 1227 are tied to the base of transistor 1233 through resistor 1228. The collector of transistor 1233 is tied to the input of voltage regulator 1235 and is also tied to ground through capacitor 1236. The ground input 1237 to the voltage regulator 1235 is tied to ground. The output from the voltage regulator 1235 provides the −5 volt supply 190 to the RTU. The output from the 1235 regulator is also tied to ground through the capacitor 1238.

When it is desired to turn on the −5 volt supply 190, the command signal 187*e* goes low. When the command signal 187*e* goes low, current is allowed to flow from the base of the transistor 1218. Both transistors 1218 and 1227 turn on in response to the flow of current from the base of transistor 1218, thus allowing current to flow to the base of transistor 1233. Transistor 1233 thus turns on and switches the −18.75 supply 199 to the input of voltage regulator 1235. In response to the −18.75 supply input, the voltage regulator 1235 provides a −5 volt regulated output supply 190.

The command signal 187*f* is a command to turn on the −12 volt supply 191. Signal 187*f* is provided as an input to buffer amplifier 1241. The output from the buffer amplifier 1241 is tied to the base of transistor 1243 through resistor 1244. The +5 volt supply 194 is tied to the base of transistor 1243 through resistors 1246 and 1244. The +5 volt supply 194 is also tied to the output of buffer amplifier 1241 through resistor 1246 and to the input of amplifier 1241 through resistor 1248. The −18.75 volt supply 199 is tied to the base of transistor 1243 through resistor 1251.

Transistors 1243 and 1252 make up a Darlington pair. The collectors of transistors 1243 and 1252 are tied to the −18.75 volt supply 199, through resistors 1255 and 1256. The emitter of transistor 1252 is tied to ground.

The base of transistor 1243 is tied to ground through capacitor 1258.

The −18.75 volt supply 199 is tied through resistor 1255 to the base of transistor 1259. The −18.75 volt supply 199 is also tied to the emitter of transistor 1259. The collectors of transistors 1243 and 1252 are tied to the base of transistor 1259 through resistor 1256. The collector of transistor 1259 is tied to the input of the voltage regulator 1261 through resistor 1263. The input of regulator 1261 is tied to ground through capacitor 1265. The ground input 1266 of the voltage regulator 1261 is tied to ground. The output from the voltage regulator 1261 provides −12 volt supply 191 to the RTU. The output from the voltage regulator 1261 is also tied to the ground through capacitor 1267.

When it is desired to turn on the −12 volt supply 191, the command signal **187*f* goes low. When the command signal 187*f* goes low, current is allowed to flow from the base of transistor 1243, thus turning on transistors 1243 and 1252. When transistors 1243 and 1252 turn on, current is allowed to flow to the base of transistor 1259, which turns transistor 1259 on; thus switching the −18.75 volt supply 199 to the input of voltage regulator 1261. In response to the voltage input, the voltage regulator 1261 provides a regulated −12 volt supply 191** to the RTU.

Signal **187*g* is representative of a command to turn on the −15 volt supply 192. Signal 187*g* is supplied as an input to the buffer amplifier 1271. The output from the buffer amplifier 1271 is provided through resistor 1272 to the base of transsitor 1274. The +5 volt supply 194 is tied to the base of the transistor 1274 through resistors 1276 and 1272. The +5 volt supply 194 is also tied to the output of the buffer amplifier 1271 through resistor 1276 and is also tied to the input of buffer amplifier 1271 through resistor 1278. The −18.75 volt supply 199 is tied to the base of transistor 1274 through resistor 1282**.

Transistors 1274 and 1283 comprise a Darlington pair. The collectors of transistors 1274 and 1283 are tied through resistors 1284 and 1285 to the −18.75 volt supply 199. The collectors of transistors 1274 and 1283 are also tied through resistor 1284 to the base of transistor 1288. The emitter of transistor 1274 is tied to the base of transistor 1283. The emitter of transistor 1283 is tied to ground. The −18.75 volt supply 199 is tied to the base of transistor 1288 through resistor 1285 and is also tied to the emitter of transistor 1288. The collector of transistor 1288 is tied to the input of the voltage regulator 1291. The collector of the transistor 1288 is also tied to the ground through capacitor 1293. The ground input 1294 of the voltage regulator 1291 is tied to ground. The output from voltage regulator 1291 is provided as the −15 volt supply 192 to the RTU. The output from voltage regulator 1291 is also tied to ground through capacitor 1295.

When it is desired to turn on the −15 volt supply 192, the command signal **187*g* goes low. When the command signal 187*g* goes low, current is allowed to flow from the base of transistor 1274; thus turning on the transistors 1274 and 1283. When transistors 1274 and 1283 turn on, current is allowed to flow from the base of transistor 1288; thus turning on the transistor 1288. When transistor 1288 turns on, the −18.75 volt supply is switched to the input of the voltage regulator 1291 which in turn provides a regulated −15 volt output supply 192**.

Commercially available components which can be utilized in the circuit illustrated in FIGS. **22*a* and *b*** are as follows: Values of capacitors and resistors are also set forth in the following list.

| | |
|---|---|
| Resistors 1118, 113, 112, 1121, 1141, 1137, 1134, 1146, 1168, 1165, 1171, 1163, 1197, 1195, 1192, 1201, 1216, 1244, 1255, 1272 and 1285 | 100 KΩ, 5%, ¼W, Dale |
| Resistor 1122 | 1 KΩ, 5%, 1W, Dale |
| Resistor 1145 | 229 Ω, 5%, 1W, Dale |
| Potentiometer 1155 | 100 Ω, Bourns, 3329H-1-101 |
| Resistors 1172 and 1202 | 390 Ω, 5%, 2W, Dale |
| Resistor 1205 | 8.2 Ω, 5%, 2W, Dale |
| Resistors 1222, 1221, 1248, 1246, 1278 and 1276 | 56 KΩ, 5%, ¼W, Dale |
| Resistors 1225, 1251 and 1282 | 649 K, 1%, ¼W, Dale |
| Resistor 1228 | 33 K, 5%, ¼W, Dale |
| Resistor 1229 | 1 MΩ, 5%, ¼W, Dale |
| Resistor 1256 | 3.9 KΩ, 5%, ¼W, Dale |
| Resistor 1263 | 82 Ω, 5%, ¼W, Dale |
| Resistor 1284 | ⅛W, KΩ, 5%, ¼W, ¼W, |
| Capacitors 1127 and 1208 | .22 Mf, 10%, Panasonic, Type ECQ-E |
| Capacitors 1142, 1157, 1159, 1185, 1211 and 1258 | .1 Mf, 10%, Panasonic, Type ECQ-E |
| Capacitors 1151 and 1182 | .33 Mf, 10%, Panasonic, Type ECQ-E |
| Capacitors 1176, 1179, 1238, 1265, 1267 and 1295 | 1 Mf, 10%, Panasonic, Type ECQ-E |
| Capacitors 1236 and 1293 | 2.2 Mf, 10%, Panasonic, Type ECQ-E |
| Buffer Amplifiers 1111, 1133, 1161, 1191, 1215, 1241 and 1271 | 74 C 906, National Semiconductor |
| Transistors 1115, 1119, 1135, 1143, 1164, 1169, 1194 and 1199 | MPS - A14, Motorola |
| Transistors 1218, 1227, 1243, 1252, 1274 and 1283 | MPS - A66, Motorola |
| Transistors 1124, 1148, 1173, and 1203 | MPS - U52, Motorola |
| Transistors 1233 and 1259 | 2N3904, Motorola |
| Transistor 1288 | MPS - U02, Motorola |
| Voltage Regulators 1126 | LM 340-T15, National Semiconductor |
| Voltage Regulator 1152 | MC 7805CP, Motorola |
| Voltage Regulator 1175 | LM 78LO5, National Semiconductor |
| Voltage Regulator 1181 | MC 7805 CP, Motorola |
| Voltage Regulator 1207 | LM 340-T12, National Semiconductor |
| Voltage Regulator 1235 | LM 320-H5, National Semiconductor |
| Voltage Regulator 1261 | μA 79M12 AHC, Fairchild |
| Voltage Regulator 1291 | LM 320 T15, National Semiconductor |

Because of the importance of being able to insure that the remote telemetry unit illustrated in FIG. **2*b* is operational, a separate testing unit, illustrated in FIG. 23, is provided as means for general testing of the remote telemetry unit illustrated in FIG. 2*b*. The primary function of the testing unit illustrated in FIG. 23 is to provide four output signals which can be utilized to test the four channels of the remote telemetry unit illustrated in FIG. 2*b*. A square wave, sawtooth wave, sine wave and triangular wave are output by the testing unit to provide a means for individually identifying each channel and for determining which, if any, of the channels of the remote telemetry unit are inoperable. The testing unit illustrated in FIG. 23 also provides a means by which a frequency sweep can be generated and supplied through the channels of the remote telemetry unit. This frequency sweep is utilized to test the operation of the notch filter 151 and the alias filters 161 illustrated in FIG. 2*b***.

Referring now to FIG. 23, the ramp voltage generator 1761 provides a ramp signal which is used by the voltage-controlled oscillator 1762 to generate a frequency sweep signal. The ramp signal 1763, output from the ramp voltage generator 1761, is delayed so as to allow the geophone test function to be completed and to allow the remote telemetry unit illustrated in FIG. *2b* to cycle to a data acquisition mode before the frequency sweep is applied to the inputs of the preamplifier 135 illustrated in FIG. *2b*.

The reference voltage source 1765 provides an output signal 1766 having a value of +6 volts and also provides an output signal 1767 having a value of −6 volts. The output signals, 1766 and 1767 from the reference voltage source are utilized to provide power to the voltage-controlled oscillator 1762, the ramp voltage generator 1761, the sine wave shaper 1769, the sawtooth generator 1771 and the output network 1772. The +6 volt signal 1766 is also provided as a possible input to the voltage-controlled oscillator 1762 to allow generation of a constant frequency output signal.

Switching means 1774 is utilized to select either the output signal 1763 from the ramp voltage generator or the output signal 1766 from the reference voltage source 1765 as an input to the voltage-controlled oscillator 1762. If signal 1763 is provided to the voltage-controlled oscillator through switching means 1774, then the output from the voltage-controlled oscillator will be a frequency sweep. If signal 1766 is selected to be provided to the voltage-controlled oscillator 1762 through switching means 1774, then the output of the voltage-controlled oscillator will be a constant frequency signal.

The voltage-controlled oscillator 1762 provides an output signal 1776 which is a triangular waveform and an output signal 1777 which is a square wave. The output signal 1776 is provided as an input to the sine wave shaper 1769, to the sawtooth generator 1771 and to the output network 1772. The output signal 1777 is provided as an input to the sawtooth generator 1771 and as an input to the output network 1772.

The sine wave shaper 1769 operates on the triangular waveform 1776 to form a sine wave from the triangular waveform. This sine wave, which is represented as signal 1779, is provided from the sine wave shaper 1769 to the output network 1772.

The sawtooth generator 1771 utilizes the triangular waveform 1776 and the square wave 1777 to generate a sawtooth waveform 1781. The sawtooth waveform 1781 is provided from the sawtooth generator 1771 as an input to the output network 1772.

In response to the input signals, the output network 1772 provides four output signals 1783–1786 with each one being supplied to a respective one of the channels of the preamplifier 135 illustrated in FIG. *2b*. Signal 1783 is a triangular waveform, signal 1784 is a sine wave, signal 1785 is a sawtooth waveform, and signal 1786 is a square wave. Switching is also provided in the output network 1772 to allow the sine wave represented by signal 1779 to be provided to all four of the input channels of the preamplifier 135 illustrated in FIG. *2b*. Thus, either four different waveforms can be provided to the four input channels of the preamplifier 135 or a sine wave can be provided to each of the input channels of the preamplifier 135.

When it is desired to test the remote telemetry unit illustrated in FIG. *2b* with the testing system illustrated in FIG. 23, the output signals 1783–1786 from the output network 1772 are tied to the inputs of the preamplifier 135. The output signal 1766 from the reference voltage source 1765 is tied to the voltage-controlled oscillator through switching means 1774. In response to the +6 volt input signal 1766, the testing system, illustrated in FIG. 23, will provide either four different waveforms having a constant frequency or four sine waves having a constant frequency to the preamplifier 135. The signals are transmitted through the data acquisition system of the remote telemetry unit, illustrated in FIG. *2b*, as has been previously described and are displayed by the display unit 93 illustrated in FIG. *2a*. This display gives an indication of whether the respective channels of the remote telemetry unit, illustrated in FIG. *2b*, are operational. The output voltage from the testing system illustrated in FIG. 23 may be varied to give an indication of the sensitivity of the remote telemetry unit illustrated in FIG. *2b*.

After this initial test is performed, the ramp voltage generator 1761 can be connected to the voltage-controlled oscillator 1762 through switching means 1774. After the preliminary test of the geophones is completed and the remote telemetry unit, illustrated in FIG. *2b*, has cycled to a data acquisition mode, the ramp voltage generator 1761 will output a ramp signal 1763. In response to this ramp signal, the testing system, illustrated in FIG. 23, will output four different waveforms which sweep in frequency or will output four sine waves which sweep in frequency. These signals are again supplied through the remote telemetry unit, as has been previously described, and are displayed by the data display unit 93 illustrated in FIG. *2a*. As the frequency sweep goes through 60 Hz, the waveforms displayed at the data display unit should approach straight lines, indicatin that the notch filter 151 is operational. The same phenomena should be observed when the frequency sweep goes through the cutoff frequencies of the alias filters 161, again indicating that the alias filters are operational. The testing unit illustrated in FIG. 23 thus provides another method by which the operability of the remote telemetry unit, illustrated in FIG. *2b*, can be insured which improves the reliability of the seismic exploration system embodied in the present invention.

The ramp generator 1761, illustrated in FIG. 23, is more fully illustrated in FIG. 24. Referring now to FIG. 24, the inverting input of the operational amplifier 1791 is tied to the common 1793 of the RTU, which is illustrated in FIG. *2b*, and is also tied through resistor 1792 to a separate ground 1794. The noninverting input of the operational amplifier 1791 is tied to ground through the resistor 1795. The output from the operational amplifier 1791 is tied through resistor 1796 to the base of the transistor 1797. The output from the operational amplifier 1791 is also tied through potentiometer 1799 to ground.

The emitter of the transistor 1797 is tied to the +6 volt signal 1766 through diodes 1802 and 1803. The +6 volt signal 1766 is supplied from the reference voltage source 1765 illustrated in FIG. 23. The collector of the transistor 1797 is tied through resistor 1805 to the inverting input of the operational amplifier 1806. The inverting input of the operational amplifier 1806 is also tied through resistor 1807 to the wiper of the potentiometer 1808 and is also tied through resistor 1809 to the potentiometer 1811. The noninverting input of the operational amplifier 1806 is tied to ground. One terminal of the potentiometer 1808 is tied to the −6 volt power supply 1767 which is supplied from the reference voltage source 1765, illustrated in FIG. 23. The second terminal of the potentiometer 1808 is tied to ground. The output from the operational amplifier 1806 is fed back through capacitor 1813 to the inverting input of the operational amplifier 1806. The output signal from the operational amplifier 1806 is also tied to the inverting input of the operational amplifier 1814 and is tied through diode 1815 to the inverting input of the operational amplifier 1817. The output of the operational amplifier 1814 is also supplied through diode 1815 as signal 1763, illustrated in FIG. 23.

The noninverting input of the operational amplifier 1814 is tied to ground through resistor 1818. The output from the operational amplifier 1814 is tied to one terminal of the potentiometer 1811 through diode 1821. The second terminal of the potentiometer 1811 is tied to ground. The output signal from the operational amplifier 1814 is also fed back to the noninverting input of the operational amplifier 1814 through resistor 1822.

The noninverting input of the operational amplifier 1817 is tied to the wiper of the potentiometer 1799. The inverting input of the operational amplifier 1817 is tied to ground through resistor 1823. The output from the operational amplifier 1817 is fed back through resistor 1816 to the noninverting input of the operational amplifier 1791.

In the circuit illustrated in FIG. 24, operational amplifiers 1791, 1814 and 1817 are utilized as comparators while operational amplifier 1806 is utilized as an integrator. In the quiescent state, the outputs of operational amplifiers 1791, 1817 and 1806 are negative full scale while the output from the operational amplifier 1814 is positive full scale. In this state, the noninverting input of the operational amplifier 1791 is at approximately −0.8 volts. The inverting input of operational amplifier 1817 cannot be pulled below ground by operational amplifier 1806 because of diode 1815. Since the noninverting input of the operational amplifier 1817 is being held below ground by operational amplifier 1791, the output of operational amplifier 1817 is held at negative full scale, thus producing a stable state.

When the remote telemetry unit, illustrated in FIG. *2b*, performs a leakage test, the common 1794 of the testing system illustrated in FIG. 23 is forced above the RTU common 1793 through resistor 1792. Operational amplifier 1791 senses this as a negative pulse at the inverting input. When this negative pulse drops below −0.8 volts, the output of operational amplifier 1791 switches to positive full scale. The noninverting input of operational amplifier 1817 then moves above ground. Therefore, the output of operational amplifier 1817 switches to positive full scale. This drives the noninverting input of operational amplifier 1791 to approximately +0.8 volts. The two commons 1793 and 1794 can then return to the same potential and the circuit will remain in the new state.

When the output of the operational amplifier 1791 was in the quiescent state, the transistor 1797 was held on. Thus, the output of the operational amplifier 1806 was held negative full scale. In the active state, the transistor 1797 is turned off. The output of operational amplifier 1806 begins a linear increase in voltage at a rate determined by the setting of the potentiometer 1808. The output signal 1763 will remain at zero until the output of the operational amplifier 1806 reaches approximately +0.6 volts. When the output of the operational amplifier 1806 reaches approximately +0.6 volts, the output signal 1763 from the ramp voltage generator will begin to follow the output of the integrator. Since the output of operational amplifier 1814 has been approximately +6 volts, the noninverting input is at approximately +0.6 volts. The output of the operational amplifier 1814 will switch to negative full scale when the output of the operational amplifier 1806 is approximately +0.6 volts. When this happens, the rate of change of the integrator output will change by an amount proportional to the setting of potentiometer 1811. The output signal 1763 will increase at this new rate until the threshold set by the potentiometer 1799 is reached. The circuit then will return to the quiescent state until another trigger pulse is received.

The ramp voltage generator illustrated in FIG. 24 provides a frequency sweep at the input of the preamplifier 135, illustrated in FIG. *2b*, by means of the test system illustrated in FIG. 23. The frequency sweep is delayed until after the initial tests of the RTU are completed and the RTU has cycled to a data collection mode.

The reference voltage source 1765, illustrated in FIG. 23, is more fully illustrated in FIG. 25. Two 9-volt batteries 1831 and 1832 are preferably used to provide power for the testing system illustrated in FIG. 23. One of the 9-volt batteries has the negative side thereof tied to ground. The second of the 9-volt batteries 1832 has the positive side thereof tied to ground. The positive side of the battery 1831 is tied to the collector of transistor 1833 and to the wiper of potentiometer 1835 through resistor 1834. The positive side of the battery 1831 is also tied to the inverting input of the operational amplifier 1837 and to the collector of transistor 1838 through resistor 1839. The positive side of the battery 1831 is also tied directly to the emitter of transistor 1841. The negative side of the battery 1832 is tied directly to the emitter of the transistor 1842.

The base of the transistor 1833 is tied to the collector of the transistor 1833. The emitter of the transistor 1833 is tied to ground. The collector and base of the transistor 1833 are also tied to the wiper of potentiometer 1835. One terminal of the potentiometer 1835 is tied to ground. The second terminal of the potentiometer 1835 is tied to the base of transistor 1838. The collector of the transistor 1838 is tied to the inverting input of the operational amplifier 1837. The emitter of the transistor 1838 is tied to ground. The noninverting input of the operational amplifier 1837 is tied to the wiper of potentiometer 1844. The output from the operational amplifier 1837 is tied to the base of transistor 1841 through resistor 1845. The collector of the transistor 1841 is tied through resistor 1846 to the noninverting input of the operational amplifier 1847. The collector of the transistor 1841 is also tied through resistor 1848 to one terminal of potentiometer 1844. The second terminal of the potentiometer 1844 is tied to ground. The collector of the transistor 1841 also provides the output signal 1766, which is illustrated and described in FIG. 23. One terminal of capacitors 1851 and 1852 is tied to the signal line 1766. The second terminal of the capacitors 1851 and 1852 is tied to ground.

The inverting terminal of the operational amplifier 1847 is tied to ground. The output from the operational amplifier 1847 is tied through resistor 1853 to the base of the transistor 1842. The collector of the transistor 1842 supplies the output signal 1767, which is illustrated and described in FIG. 23. Capacitors 1855 and 1856 both have one terminal tied to the signal line 1767. The second terminal of capacitors 1855 and 1856 is tied to ground. The collector of the transistor 1842 is also tied through the resistance capacitance network made up of resistor 1857 and capacitor 1858 to the noninverting input of the operational amplifier 1847.

In operation, a reference voltage is established at the inverting input of operational amplifier 1837 by the combination of transistors 1833 and 1838 together with resistors 1834, 1839 and potentiometer 1835. Resistors 1848 and potentiometer 1844 act to establish a sampling voltage at the noninverting input of the operational amplifier 1837. Operational amplifier 1837, which acts as a comparator, functions to detect any difference between the reference voltage and the sampling voltage. If a difference between the sampling voltage and the reference voltage is detected, the operational amplifier 1837 acts to provide a correction signal through resistor 1845 to the base of transistor 1841. Transistor 1841 turns on and functions to change the output voltage level represented by signal 1766 in such a manner that the sampling voltage and the reference voltage will be equal.

The transistor 1841 may be considered to be analogous to a variable resistor where the resistance is a function of the voltage applied to the base of transistor. Thus, as the output voltage represented by signal 1766 tends to diminish with an increase in load or a decrease in battery life, the sampling volage will also tend to diminish proportionately as will also the output voltage from the operational amplifier 1837. This results in a tendency for the base-to-emitter voltage of transistor 1841 to increase, which further results in transistor 1841 being turned on harder, decreasing its resistance, and thus it tends to allow more current to pass to the load. As the current passing to the load increases, the output voltage represented by signal 1766 and the sampling voltage tend to increase and the base-to-emitter voltage for transistor 1841 tends to decrease until the sampling voltage again equals the reference voltage.

The regulator illustrated in FIG. 25 functions within certain limits of the voltage supplied from the batteries 1831 and 1832 and the current supplied to a load. This particular regulator is designed to operate between battery voltage limits of 9.0 to 6.2 volts DC and current limits of approximately 0 to approximately 15 milliamps.

The use of the transistors 1833 and 1838 to generate the reference voltage is considered to be the novel feature of the circuit illustrated in FIG. 25. Because the reference voltage generator, illustrated in FIG. 25, is designed to generate stable reference voltages with an absolute minimum of battery drain, the forward voltage current characteristics of the base emitter junction of a silicon transistor as the basis for the generation of the reference voltage. Resistor 1834 biases the current to the base-emitter junction of transistor 1833 to such a level that the base-to-emitter voltage of transistor 1833 is essentially constant within the battery voltage excursions of 6.2 volts to 9.0 volts DC. Thus, a constant voltage is applied to potentiometer 1835 in series with the base of transistor 1838. Therefore, the collector-to-emitter voltage for transmitter 1838 is held essentially constant and this collector-emitter voltage is utilized as the reference voltage.

The voltage-controlled oscillator 1762, illustrated in FIG. 23, is more fully illustrated in FIG. 26. Referring now to FIG. 26, signal 1763 from the ramp voltage generator 1761 is supplied as one input to the switching means 1861. The output signal 1766 from the reference voltage source 1765 is provided as an input to one terminal of the potentiometer 1862. The second terminal of the potentiometer 1862 is tied to ground. The wiper of potentiometer 1862 is supplied as a second input to switching means 1861.

The noninverting input of the operational amplifier 1863 is tied to switching means 1861. The output from operational amplifier 1863 is fed back to the inverting input of the operational amplifier 1863. The output from the operational amplifier 1863 is also provided through a plurality of series connected resistors 1864–1868 to the switching means 1869. The plurality of resistors 1864–1868 are provided as a means for varying, in discrete steps, the voltage level of the signal supplied from the output of the operational amplifier 1863 to the noninverting input of the operational amplifier 1871, which is tied to the switching means 1869.

The output signal from the operational amplifier 1871 is fed back to the inverting input of the operational amplifier 1871 and is also supplied to the emitter of the transistor 1872. The output signal from the operational amplifier 1871 is also supplied through resistor 1873 to the inverting input of the operational amplifier 1874. The noninverting input of the operational amplifier 1874 is tied to ground. The output of the operational amplifier 1874 is fed back through resistor 1875 to the inverting terminal of the operational amplifier 1874 and is also tied to the emitter of the transistor 1876.

The base of transistor 1872 is tied through resistor 1878 to the signal line 1777 which is illustrated and described in FIG. 23. A square wave is provided from the voltage-controlled oscillator circuit, illustrated in FIG. 36, by means of signal line 1777. The base of the transistor 1876 is also tied through resistor 1879 to the signal line 1777. The collectors of transistors 1872 and 1876 are tied together and are also tied through resistor 1881 to the inverting input of the operational amplifier 1882. The noninverting input of the operational amplifier 1882 is tied to ground. The output from the operational amplifier 1882 is fed back through capacitor 1883 to the inverting input of the operational amplifier 1882. The output from the operational amplifier 1882 is also provided to the inverting input of the operational amplifier 1884 and provides a triangular waveform as an output by means of signal line 1776, which is illustrated and described in FIG. 23. The output from operational amplifier 1884 is tied to signal line 1777. The noninverting input of operational amplifier 1884 is also tied to signal line 1777 through resistor 1886.

One terminal of the potentiometer 1887 is tied to the +6 volt power supply line 1776 which is supplied from the reference voltage source 1765. The second terminal of the potentiometer 1887 is tied to the −6 volt power supply line 1767 which is supplied from the reference voltage source 1765. The wiper of the potentiometer 1887 is tied through the voltage divider network made up of resistors 1891 and 1892 to the noninverting input of the operational amplifier 1893. The output from the operational amplifier 1893 is fed back to the inverting input of the operational amplifier 1893. The output from the operational amplifier 1893 is also provided through resistor 1894 to the noninverting input of operational amplifier 1884 and is supplied through resistors 1894 and 1886 to signal line 1777.

Operation of the voltage-controlled oscillator circuit illustrated in FIG. 26 is as follows. First, assume that the output of the operational amplifier 1884, which is being utilized as a comparator, is low. The transistor 1872 will be on and the transistor 1876 will be off. The input to operational amplifier 1882, which is being utilized as an integrator, is then a positive voltage equal to the input voltage to the noninverting input of operational amplifier 1871. Thus, the output of operational amplifier 1882 decreases linearly. The output of the operational amplifier 1893 is near zero. Thus, the noninverting input of the operational amplifier 1884 is negative at a value which is determined by resistors 1894 and 1886.

When the output of the operational amplifier 1882 decreases to the value determined by resistors 1894 and 1886, the output of the operational amplifier 1884 will switch positive and the noninverting input of the operational amplifier 1884 will go positive also. The transistor 1876 will turn on while the transistor 1872 will turn off. This will cause the slope of the output from the operational amplifier 1882 to change signs. The rate of change of the output from operational amplifier 1882 is now determined by the magnitude of the voltage being supplied to the noninverting input of the operational amplifier 1871. This process continues and a triangular wave 1776 and a square wave 1777 are generated. The frequency of the triangular wave 1776 and the square wave 1777 are determined by the magnitude of the voltage being supplied to the noninverting input of the operational amplifier 1871. Thus, potentiometer 1862 and resistors 1864–1868 in combination with switching means 1869 can be utilized to regulate the frequency of the output signals from the voltage-controlled oscillator 1762.

The sine wave shaper 1769, illustrated in FIG. 23, is more fully illustrated in FIG. 27. The sine wave shaper 1769 acts to change the triangular wave 1776 into a sine wave 1779. The triangular wave 1776, which is supplied from the voltage-controlled oscillator 1762, is provided through resistor 1901 to the noninverting input of operational amplifier 1902. Signal line 1776 is tied to ground through resistor 1903 and potentiometer 1904. Signal line 1776 is also tied to ground through resistor 1905 and potentiometer 1906. Signal 1776 is also supplied through resistor 1901 to the collectors of transistors 1907 and 1908.

The base of the transistor 1907 is tied to the wiper of potentiometer 1904 through resistor 1911. The emitter of the transistor 1907 is tied to ground. Signal line 1776 is also tied through resistor 1901 to the cathode terminal of the diode string comprising series connected diodes 1914, 1913 and 1912 with the anode terminal of diode 1912 being connected to ground.

The base of transistor 1908 is tied to the potentiometer 1906 through resistor 1916. The emitter of the transistor 1908 is tied to ground. Signal line 1776 is also tied through resistor 1901 to the anode terminal of the diode string comprising series connected diodes 1919, 1918 and 1917 with the cathode of diode 1917 being connected to ground.

The noninverting input of the operational amplifier 1902 is tied to ground through the potentiometer 1921. The wiper of the potentiometer 1921 is tied to ground. The output signal from the operational amplifier 1902 is fed back to the inverting input of the operational amplifier 1902. The output signal from the operational amplifier 1902 is also provided as the sine wave signal 1779, which has been previously described in FIG. 23.

Resistor 1901 and the clipping diodes 1912–1914, 1917–1919 act to round the top of the triangular wave. The potentiometer 1921 is utilized to correct the slope of the triangular wave to more closely approximate a sine wave. The transistors 1907 and 1908 are provided to further round the peak of the triangular wave to provide a sine wave output. Operational amplifier 1902 is provided as a buffer to prevent overloading of the sine wave shaper circuit illustrated in FIG. 27.

The sawtooth generator 1771, illustrated in FIG. 23, is more fully illustrated in FIG. 28. Signal 1777, which is the square wave output from the voltage-controlled oscillator 1762, is provided through potentiometer 1931 and resistor 1932 to the inverting input of the operational amplifier 1933. Signal 1777 is also provided through resistor 1934 to the inverting input of the operational amplifier 1935. Signal 1776, which is the triangular wave output from the voltage-controlled oscillator 1762, is provided through resistor 1937 to the inverting input of the operational amplifier 1935. The noninverting input of the operational amplifier 1935 is tied to ground. The output from the operational amplifier 1935 is fed back to the inverting input of the operational amplifier 1935 through resistor 1938. The output from the operational amplifier 1935 is also provided through resistor 1939 to the inverting input of the operational amplifier 1933 and through resistor 1941 to the inverting input of the operational amplifier 1942.

The noninverting input of the operational amplifier 1942 is tied to ground. The output from the operational amplifier 1942 is tied through the resistor-diode network made up of resistors 1943 and 1944 and diodes 1945 and 1946 to the inverting input of the operational amplifier 1942 and to the inverting input of the operational amplifier 1933.

The wiper of the potentiometer 1948 is tied to the inverting input of the operational amplifier 1933 through resistor 1949. The first terminal of the potentiometer 1948 is tied to the +6 volt power supply line 1766. The second terminal of the potentiometer 1948 is tied to the −6 volt power supply line 1767. Both the +6 volt power supply line 1766 and the −6 volt power supply line 1767 are provided from the reference voltage source 1765 illustrated in FIG. 23.

The noninverting input of the operational amplifier 1933 is tied to ground. The output from the operational amplifier 1933 is supplied as the sawtooth signal 1781, which is described in FIG. 23.

Amplifier 1935 acts to add the triangular wave and the square wave to produce a summed output. The operational amplifiers 1942 and 1933, which together comprise a full wave rectifier, are then utilized to produce a sawtooth output signal in response to the summation of the square wave and the triangular wave. Potentiometer 1948 is adjusted to provide symmetry of the sawtooth wave about a zero voltage reference.

The output network 1772, illustrated in FIG. 23, is more fully illustrated in FIG. 29. Signal 1779 which is the sine wave output from the sine wave shaper 1769 is provided through potentiometer 1961 and resistor 1962 to the inverting input of the operational amplifier 1963. The noninverting input of the operational amplifier 1963 is tied to ground. The output from the operational amplifier 1963 is fed back to its inverting input through the resistance capacitance network made up of resistor 1964 and capacitor 1965. The output from the operational amplifier 1963 is also provided through the resistor network made up of resistors 1967–1973 to the switching means 1974. The plurality of resistance paths from the output of the operational amplifier 1963 to the switching means 1974 are provided to provide a means by which different voltage levels can be supplied as outputs from the output network 1772.

Switching means 1974 is tied to the switching means 1976. Switching means 1976 may be connected directly to the output signal line 1783 or may be connected to the voltage divider network made up of resistors 1977–1979. The output signal 1783 is the sine wave output from the output network 1772. Again, the voltage divider network made up of resistors 1977–1979, in cooperation with resistors 1967–1973, is provided as a means for attenuating the output signal 1783 is desired.

The sine wave output from the operational amplifier 1963 is also provided as inputs to switching means 1981–1983. Depending upon the position of switching means 1981–1983, either four different output signal can be provided from the output network 1772 or four sine waves can be provided from the output network 1772.

The triangular wave signal 1776 is provided through potentiometer 1984 and resistor 1985 to the inverting input of the operational amplifier 1986. The noninverting input of the operational amplifier 1986 is tied to ground. The output from the operational amplifier 1986 is fed back to the inverting input of the operational amplifier 1986 through resistor 1987 and capacitor 1988 which are in parallel. The output from the operational amplifier 1986 is also provided through switching means 1981 and the resistor network made up of resistors 1989–1995 to the switching means 1996. The resistor network 1989–1995 is utilized as the previously described resistor network 1967–1973.

Switching means 1996 is tied to switching means 1997. The switcing means 1997 may be tied directly to the output signal line 1784 or may be tied to the voltage divider network made up of resistors 1998–2000. The triangular wave output from the output network 1772 is provided by means of signal line 1784. Again, the voltage divider network made up of resistors 1998–2000, in cooperation with resistors 1989–1995, is utilized to attenuate the output signal 1784 if desired.

The sawtooth waveform 1781 is provided through potentiometer 2001 and resistor 2002 to the inverting input of the operational amplifier 2003. The noninverting input of the operational amplifier 2003 is tied to ground. The output from the operational amplifier 2003 is fed back to the inverting input of the operational amplifier 2003 through resistor 2004 and capacitor 2005 which are in parallel. The output from the operational amplifier 2003 is also provided through switching means 1982 and the resistor network made up of resistors 2007–2013 to the switching means 2014. Again, the resistor network 2007–2013 is utilized in the same manner as the resistor network 1967–1973 which has been previously described.

Switching means 2014 is tied to switching means 2015. Switching means 2015 may be tied directly to the output signal line 1785 or may be tied to the voltage divider network made up of resistors 2017–2019. The voltage divider netowrk made up of resistors 2017–2019 and resistors 2007–2013 is utilized to attenuate the output signal 1785 if desired. The sawtooth waveform is output by means of signal line 1785 from the output network 1772.

The square wave signal 1777 is provided through potentiometer 2021 and resistor 2022 to the inverting input of the operational amplifier 2023. The noninverting input of the operational amplifier 2023 is tied to ground. The output from the operational amplifier 2023 is fed back to the inverting input of the operational amplifier 2023 through resistor 2024 and capacitor 2025 which are in parallel. The output from the operational amplifier 2023 is also provided through switching means 1983 and the resistor network made up of resistors 2027–2033 to the switching means 2034. The resistor network made up of resistors 2027–2033 is utilized in the same manner as the resistor network 1967–1973 previously described.

Switching means 2034 is tied to switching means 2035. Switching means 2035 may be tied directly to the output signal line 1786 or may be tied to the voltage divider network made up of resistors 2037–2039. The voltage divider network made up of resistors 2037–2039 and resistors 2027–2033 is utilized to attenuate the output signal 1786 if desired. The square wave output from the output network 1772 is provided by means of signal line 1786.

Commercially available components, which can be utilized with the test system illustrated in FIG. 23, which is more fully illustrated in FIGS. 24–29, are as follows. Capacitance and resistance values are also given. The components will be listed under the specific FIGURE number in the following list.

FIG. 24

| | |
|---|---|
| Resistors 1792, 1807, 1809 and 1822 | 100 K ohms, 1%, ¼W, TRW/IRC, Type CEA |
| Resistors 1792, 1823 and 1818 | 10 K ohms, 1%, ¼W, TRW/IRC, Type CEA |
| Resistor 1816 | 47 K ohms, 1%, ¼W, TRW/IRC, Type CEA |
| Resistor 1796 | 15 K ohms, 1%, ¼W, TRW/IRC, Type CEA |
| Potentiometers 1808, 1811 and 1799 | 50 K ohms, CTS Series 362Y |
| Diodes 1802, 1803, 1815 and 1821 | IN 914, National Semiconductor |
| Capacitor 1813 | 10 Mf, 10%, 35 WVDC, Mallory, TIM Series |
| Operational amplifiers 1791, 1806 1817 and 1814 | 4741, Harris Semiconductor |
| Transistor 1797 | 2N3904 National Semiconductor |
| Resistor 1805 | 56 ohms, 1%, ¼W, TRW/IRC, Type CEA |

FIG. 25

| | |
|---|---|
| Resistors 1834 and 1848 | 100 K ohms, 1%, ¼W, TRW/IRC, Type CEA |
| Resistor 1839 | 3.9 M ohms, 1%, ¼W, TRW/IRC, Type CEA |
| Resistors 1845 and 1853 | 33 K ohms, 1%, ¼W, TRW/IRC, Type CEA |
| Resistors 1846 and 1857 | 47 K ohms, 1%, ¼W, TRW/IRC, Type CEA |
| Potentiometer 1835 | 1 K ohm, CTS, Series 362Y |
| Potentiometer 1844 | 50 K ohms, CTS, Series 362Y |
| Capacitor 1858 | .01 MF, S&EI, 25N series |
| Capacitors 1851 and 1855 | .1 Mf, Sprague, Type CKRO5 |
| Capacitors 1852 and 1856 | 2.2 Mf, 10%, 35WVDC Mallory, TIM Series |
| Transistor 1841 | 2N3906, National Semiconductor |
| Transistors 1833, 1838 and 1842 | 2N3904, National Semiconductor |
| Operational amplifiers 1837 and 1847 | LM324, National Semiconductor |

FIG. 26

| | |
|---|---|
| Resistors 1864, 1865 and 1866 | 10 K ohms, 1%, ¼, TRS/IRC, Type CEA |
| Resistor 1867 | 6 K ohms, 1%, ¼W, TRW/IRC, Type CEA |
| Resistor 1868 | 4 K ohms, 1%, ¼W, TRW/IRC, Type CEA |
| Resistors 1873 and 1875 | 47 K ohms, 1%, ¼W, TRW/IRC, Type CEA |
| Resistor 1878 | 33 K ohms, 1%, ¼W, TRW/IRC, Type CEA |
| Resistor 1881 | 22 K ohms, 1%, ¼W, TRW/IRC, Type CEA |
| Resistor 1886 | 6.8 K ohms, 1%, ¼W, TRW/IRC, |

FIG. 26-continued

| | |
|---|---|
| | Type CEA |
| Resistor 1894 | 15 K ohms, 1%, ¼W, TRW/IRC, Type CEA |
| Resistor 1892 | 22 K ohms, 1%, ¼W, TRW/IRC, Type CEA |
| Resistor 1891 | 10 K ohms, 1%, ¼W, TRW/IRC, Type CEA |
| Potentiometers 1862 and 1887 | 50 K ohms, CTS, Series 362Y |
| Switching means 1861 | Toggle, SPDT, Alcoswitch, TT11DG-PC-1 |
| Switching means 1869 | Rotary, S.P., 6 Pos. RCL Electronics, Series V |
| Operational amplifiers 1863, 1871, 1874, 1882, 1884 and 1893 | 4741, Harris Semiconductor |
| Transistor 1872 | 2N3906 National Semiconductor |
| Transistor 1876 | 2N3904 National Semiconductor |
| Capacitor 1883 | .1 Mf, Sprague, Type CKR05 |
| Resistor 1879 | 33 K ohms, 1%, ¼W, TRW/IRC, Type CEA |

FIG. 27

| | |
|---|---|
| Resistors 1904 and 1906 | 10 K ohms, 1%, ¼W, TRW/IRC, Type CEA |
| Resistors 1903 and 1905 | 33 K ohms, 1%, ¼W, TRW/IRC, Type CEA |
| Resistor 1901 | 6.8 K ohms, 1%, ¼W, TRW/IRC, Type CEA |
| Diodes 1912, 1913, 1914, 1919, 1918 and 1917 | IN914, National Semiconductor |
| Transistor 1907 | 2N3906, National Semiconductor |
| Transistor 1908 | 2N3904, National Semiconductor |
| Operational amplifier 1902 | 4741, Harris Semiconductor |
| Potentiometer 1921 | 10 K ohms, CTS, Series 362Y |
| Resistors 1911 and 1916 | 12 K ohms, 1%, ¼W, TRW/IRC, Type CEA |

FIG. 28

| | |
|---|---|
| Resistors 1937 and 1934 | 47 K ohms, 1%, ¼W, TRW/IRC, Type CEA |
| Resistor 1938 | 15 K ohms, 1%, ¼W, TRW/IRC, Type CEA |
| Resistors 1932, 1941 and 1949 | 22 K ohms, 1%, ¼W, TRW/IRC, Type CEA |
| Resistors 1930, 1939, 1943 | 20 K ohms, 1%, ¼W, TRW/IRC, Type CEA |
| Resistor 1944 | 10 K ohms, 1%, ¼W, TRW/IRC, Type CEA |
| Operational amplifiers 1935, 1942 and 1933 | 4741, Harris Semiconductor |
| Potentiometer 1948 | 50 K ohms, CTS, Series 362Y |
| Potentiometer 1931 | 100 K ohms, CTS, Series 362Y |
| Diodes 1945 and 1946 | IN 914 National Semiconductor |

FIG. 29

| | |
|---|---|
| Resistors 1962, 1964, 1987, 2004 and 2024 | 100 K ohms, 1%, ¼W, TRW/IRC, Type CEA |
| Resistor 1985 | 330 K ohms, 1%, ¼W, TRW/IRC, Type CEA |
| Resistor 2002 | 220 K ohms, 1%, ¼W, TRW/IRC, Type CEA |
| Resistor 2022 | 470 K ohms, 1%, ¼W, TRW/IRC, Type CEA |
| Resistors 1967, 1989, 2007 and 2027 | 1.5 K ohms, 1%, ¼W, TRW/IRC, Type CEA |
| Resistors 1968, 1990, 2008 and 2028 | 470 ohms, 1%, ¼W, TRW/IRC, Type CEA |
| Resistors 1969, 1991, 2009 and 2029 | 18 K ohms, 1%, ¼W, TRW/IRC, Type CEA |
| Resistors 1970, 1992, 2010 and 2030 | 3.9 K ohms, 1%, ¼W, TRW/IRC, Type CEA |
| Resistors 1971, 1993, 2011 and 2031 | 39 K ohms, 1%, ¼W, TRW/IRC, Type CEA |

FIG. 29-continued

| | |
|---|---|
| Resistors 1972, 1994, 2012 and 2032 | 4.7 K ohms, 1%, ¼W, TRW/IRC, Type CEA |
| Resistors 1973, 1995, 2013, 2033, 1978, 1999, 2018 and 2038 | 220 K ohms, 1%, ¼W, TRW/IRC, Type CEA |
| Resistors 1977, 1979, 1998, 2000, 2017, 2019, 2037 and 2039 | 220 K ohms, 1%, ¼W, TRW/IRC, Type CEA |
| Potentiometers 1961, 1984, 2001 and 2021 | 100 K ohms, CTS, Series 362Y |
| Capacitors 1965, 1988, 2005 and 2025 | 50 Pf, Sprague, Type CKR05 |
| Operational amplifiers 1963, 1986, 2003 and 2023 | 4741, Harris Semiconductor |
| Switching means 1974, 1996, 2014 and 2034 | Rotary, S.P. 6 Pos. RCL Electronics, Series V |
| Switching means 1976, 1997, 2015 and 2035 | Toggle, SPDT, Alcoswitch, TT11DG-PC-1 |

The RF transmitter 59, illustrated in FIG. 2*a*, is more fully illustrated in FIG. 30. The references applicable to the receiver 106 and the transmitter 127, illustrated in FIG. 2*b* and previously described herein, are also applicable to the design of the well known elements of the transmitter 59 and receiver 68, illustrated in FIG. 2*a* and more fully illustrated in FIGS. 30 and 31 respectively.

Referring now to FIG. 30, the audio input from the operator control and display panel 41 is supplied through signal line 50 to the limiter circuit 2561. The limiter circuit 2561 provides clipping of the audio input signal. The audio input signal is provided from the limiter circuit 2561 to the summing junction 2562 through the potentiometer 2563. The potentiometer 2563 provides a means for adjusting the peak audio deviation. The summing junction 2562 is a summing amplifier. From the summing junction 2562, the audio signal is supplied to the premodulation low-pass filter 2564.

Data or commands from the 6800 microprocessor are supplied through signal line 61 in the form of a nonreturn to zero (NRZ) serial bit stream to the conditioning circuit 2565. The data or command signal is amplified and centered around ground potential in the conditioning circuit 2565. The ground centered signal is then provided through potentiometer 2566 to the summing junction 2562. The potentiometer 2566 provides deviation control for the data or command signal. From the summing junction 2562, the data or command signal is provided to the premodulation low-pass filter 2564.

The premodulation low-pass filter 2564 is a fifth order Gaussian low-pass filter. Because the data rate of the transmitter, illustrated in FIG. 30, is 6.25 Kbits per second, the optimum −3 db bandwidth for the low-pass filter 2564 is set at 4 KHz which allows the amplitude of the narrowest pulses to closely equal the amplitude of the widest pulses. The filter also confines the higher order sidebands of the data and audio, restricting the RF spectrum to less than 30 Khz.

The output signal from the premodulation low-pass filter 2564 is provided as an input to the oscillator 2568. The oscillator 2568 is used to provide frequency modulation for the output signal provided from the premodulation low-pass filter 2564. The modulated output signal from the oscillator 2568 is provided through the frequency tripler 2569, the frequency tripler 2571 and the frequency doubler 2572 to the driver 2573. The driver stage 2573 amplifies the modulated signal from approximately 100 milliwatts to a level of 1 watt to drive the power amplifier 2574. The power amplifier 2574 brings the signal level from 1 watt to a nominal 10 watts output. The output from the power amplifier 2574 is provided through the low-pass filter 2575 to the transmit/- receive switch 63 illustrated in FIG. 2a. The output low-pass filter 2575 consists of a three-section pi arrangement to reduce all harmonics of the output signal to a level below the requirements of the FCC Rules and Regulations.

The transmit/receive switch 63 is normally in a receive mode. The transmit/receive switch 63 is switched to a transmit mode in response to signal 2576 which is representative of the actuation of the push-to-talk switch on the handset used for audio communication. The transmit/receive switch 63 may also be switched to the transmit mode by a transmit command signal 2577 which is provided from the 6800 microprocessor. From the transmit/receive switch, the output signal from the transmitter, illustrated in FIG. 30, is provided to the antenna 64, which is illustrated in FIG. 2a, and thus to the RTU illustrated in FIG. 2b.

A specification for the transmitter 59, illustrated in FIG. 2a and in FIG. 30, is as follows:

CRS TRANSMITTER (a) Frequency 216 to 220 MHz, crystal controlled,
(b) Frequency stability = ±0.005% from −30° to +70° C.,
(c) Power Output = 8 to 10 watts nominal,
(d) Spurious emission suppression = 60 db or greater;
(e) Audio Modulation:
  (A) carbon/button handset, carbon mike or Hi-Z dynamic or ceramic mike,
  (B) Adjustable clipping level (deviation control),
  (C) Adjustable peak modulation control,
  (D) Bias current (5mA) for carbon mikes,
  (E) Hi-Z mike preamplifier (gain adjustable from 2 to 100),
  (F) Direct FM of master oscillator,
  (G) Deviation = 5 KHz peak,
(f) Data Modulation:
  (A) Input = $T^2L$,
  (B) Coding = NRZ,
  (C) Data rate = 6.25 KB/s,
  (D) Varicap bias circuit (adjustable),
  (E) Adjustable data deviation control (4 to 9 KHz peak range),
  (F) 5-pole, Bessel function, premodulation filter,
  (G) Data mutes audio modulation circuitry.

The RF receiver 68, illustrated in FIG. 2a, is more fully illustrated in FIG. 31. Referring to FIG. 31, received signals from the RTU are provided from the antenna 64 through the transmit/receive switch 63 to the RF amplifier 2581. The RF amplifier 2581 and the RF amplifier 2582 provide two stages of RF amplification prior to introduction of the received signal into the first mixer 2583. The first mixer 2583 is also provided with an input signal, having a frequency which is 10.7 MHz above the frequency of the received signal from the oscillator 2584 and the buffer 2585. The first mixer 2583 thus provides an intermediate frequency (IF) signal one component of which has a frequency of 10.7 MHz. The output signal from the first mixer 2583 is amplified in the IF amplifier 2586 and is provided to the 10.7 MHz bandpass filter 2588. The bandpass filter 2588 has a 240 KHz bandwidth centered at 10.7 MHz. The output signal from the 10.7 MHz bandpass filter 2588 is provided to the IF amplifier 2589, which forms the first stage of the data detection portion of the receiver, and is also provided to the second mixer 2591, which forms the first stage of the audio detection circuitry of the RF receiver.

The signal going to the data detection circuit is amplified in the IF amplifier 2589 and is provided to the discriminator 2592. The discriminator 2592 is a standard discriminator transformer circuit. The output signal from the discriminator 2592 is provided through the low-pass filter and buffer circuit 2593 to the data decoder 2594. The low-pass filter and buffer circuit 2593 provides filtering of the higher order components and also provides buffering of the signal provided from the discriminator 2592 to the data decoder 2594. The data decoder 2594 generates a local data clock having a frequency of 100 KHz and also provides a nonreturn to zero (NFZ) serial data stream as an output. Both the NRZ data and the clock signal are provided by means of signal line 69 to the data formatter 71, illustrated in FIG. 2a.

The output signal from the 10.7 MHz bandpass filter 2588, which is provided to the second mixer 2591, is combined with a signal having a frequency of 10.245 MHz in the second mixer 2591. The 10.245 MHz signal is provided from the oscillator 2596. The mixing of the 10.7 MHz signal from the 10.7 MHz bandpass filter 2588 and the 10.245 MHz signal from the oscillator 2596 provides an IF signal at 455 KHz. The 455 KHz signal from a second mixer 2591 is provided through the 455 KHz bandpass filter 2597 to the IF amplifier 2598. The amplified signal provided from the IF amplifier 2598 is provided to the FM detector 2599 which is preferably a phase-locked loop detector. The audio signal from the FM detector 2599 is then amplified by the audio amplifier 2600 and is provided to the speaker 2601 which may also be a handset. The speaker 2601 or the handset is located at the operator control and display panel 41 illustrated in FIG. 2a. The signal from the audio amplifier 2600 is provided to the operator control and display panel 41 by means of signal line 60 as illustrated in FIG. 2a.

A specification for the RF receiver 68 illustrated in both FIG. 2a and in FIG. 31 is as follows:

CRS RECEIVER (a) Frequency = 216 to 220 MHz, crystal controlled,
(b) Center frequency stability = ±0.001% (−30° to +70° C.),
(c) Sensitivity (DATA) = 102 dbm for $10^{-6}$ BER (Bit Error Rate),
(d) Sensitivity (Audio) = −115 dbm (10db or greater S+N/N ratio, 8 KHz deviation, 1 KHz modulation).
(e) Modulation Acceptance
  Audio:
    0.2 to 4 KHz (−3 db)
    Deviation of 15 KHz peak
    (nominal = 5 KHz peak).
  Data:
    100 KB/s ±5%
    (Bi-Phase encoded)
    PCM/FM.
(f) Audio Power Output = 5 watts (4 ohm load),
(g) Audio output to handset earpiece = 400 mV RMS (adjustable),
(h) Data decoding:
  (A) Matched Filter, maximum likelihood detection scheme (Sample and hold, compare and dump circuits),
  (B) Data clock regeneration circuitry,
  (C) Data ambiguity decision circuit (50 mS decision time),
  (D) $T^2L$ data output (100 kB/S, NRZ), (E) $T^2L$ clock output (100 KHz, 0° phase).

Computer means 51 and computer means 74, which are illustrated in FIG. 2a, form the heart of the CRS illustrated in FIG. 2a. Computer means 51 is interfaced to the computer means 74 by the computer-to-computer interface 58 as has been previously stated.

Computer means 51 is preferably a 6800 microprocessor system manufactured by Motorola Semiconductor. Computer means 74 is a 2900 microprocessor system manufactured by Advanced Micro Devices. The 2900 microprocessor system features a very fast cycle time of 225 nanoseconds. The 2900 microprocessor system is utilized to reduce the load on the 6800 microprocessor system which is the master microprocessor. The 2900 microprocessor system is also utilized because of its fast cycle time which allows handling of the data rates which must be utilized in a commercially feasible seismic exploration system. The 6800 microprocessor system will not handle the data rates which must be used in modern seismic exploration.

As has been previously stated, the 6800 microprocessor system is a well documented system. The 2900 microprocessor system, which is represented by computer means 74, illustrated in FIG. 2a, is more fully illustrated in FIG. 32. Referring to FIG. 32, the microprogram sequencer 2301 supplies the address of the next instruction to be executed to the microcontrol program memory 2302. The address of the next instruction to be executed is selected from one of four sources which are as follows:

(a) the microprogram sequencer internal program counter for sequential addressing;

(b) an internal push-pop stack for subroutine and interrupt address handling;

(c) an internal address register loaded directly from the interrupt logic; and (d) directly from the microinstruction output latch 2304.

The microprogram sequencer 2301 is the 2909 microprogram sequencer manufactured by Advanced Micro Devices. The microprogram sequencer 2301 is a 4-bit-wide "next address" controller. The 2900 data processor uses the 2909 microprogram sequencer 2301 to generate a 12-bit microprogram memory address which is supplied to the microcontrol program memory. The 12-bit address from the microprogram sequencer is representative of the next instruction which is to be executed by the 2900 microprocessor system.

The interrupt logic 2305 is utilized to halt the microprogram sequencer 2301 upon receiving an external interrupt condition signal. The interrupt logic 2305 disables the microprogram sequencer 2301 output drivers and provides for retention of the current address information contained in the microprogram sequencer just prior to the interrupt. When the external interrupt has been cleared, the interrupt line, which is provided from the interrupt logic 2305 to the microprogram sequencer 2301, will be cleared, allowing the main program then to continue. The processor bus interrupt No. 1 and the processor bus interrupt No. 2 provide a means by which an external interrupt, such as an equipment data ready signal, may be supplied to the interrupt logic 2305. The vector address provided from the interrupt logic 2305 to the microprogram sequencer 2301 provides for interrupt handling by the microprogram sequencer 2301.

The microcontrol program memory 2302 is a 4K by 32 programmable read-only memory (PROM). The microcontrol program memory 2302 is the heart of the 2900 microprocessor system. The microcontrol program memory 2302 contains the object code which controls all of the 2900 microprocessor functions. At the start of each microprocessor cycle, a new address is presented to the microcontrol program memory from the microprogram sequencer 2301. This address from the microprogram sequencer provides access to a specific location within the microcontrol program memory 2302 which outputs a particular microinstruction word to the microinstruction output latch 2304 for execution on the next instruction cycle. The microinstruction word provided from the microcontrol program memory 2302 to the microinstruction output latch 2304 is a 32-bit data word.

The microinstruction output latch 2304 is a 32-bit-wide data latch which is loaded on the rising edge of the system clock (SCLK). The rising edge of the system clock indicates the start of each microprocessor cycle. The microinstruction output latch 2304 is loaded with the object code to be executed during the particular microprocessor cycle in which the microinstruction output latch 2304 is loaded. All microprocessor operations are specified by the object code which is loaded into the microinstruction output latch 2304 at the beginning of a microprocessor cycle.

The system clock generator 2307 provides a 4.45 MHz clock signal to the 2900 microprocessor system illustrated in FIG. 32. The system clock generator 2307 may also supply a 2.22 MHz clock signal if a slower clock rate is needed to allow the use of slower memory elements. The 4.45 MHz system clock signal provides basic timing for the 2900 microprocessor system illustrated in FIG. 32.

The 32-bit instruction from the microinstruction output latch 2304 can be provided to a plurality of data sources and destinations. The internal bus select logic 2308 is utilized to decode destination or source information from the 32-bit instruction which is provided from the microinstruction output latch 2304. After decoding the source and destination information, the internal bus select logic 2308 provides an enabling signal to the various sources and destinations for the instruction which is to be executed. Four source-enabling signals SO–S3 are provided and eight destination-enabling signals DESO–DES7 are provided from the internal bus select logic 2308 as is illustrated in FIG. 32.

The conditional branch logic 2311 is provided to sense the status of selected input/output devices or the result of an arithmetic/logic unit 2312 operation and alter the next address selection of the microprogram sequencer 2301 as required. The conditional branch logic 2311 selects one of sixteen possible branch conditions for input to the microprogram sequencer 2301 as the branch condition signal.

The emit buffer 2314 is utilized to place any desired data pattern on the 2900 microprocessor's internal data bus. The 32-bit instruction from the microinstruction output latch 2304 can be programmed so as to place any desired data pattern on the 2900 microprocessor's internal data bus by enabling the output drivers of the emit buffer 2314. This allows direct access to the internal data bus for the object code from the microinstruction output latch 2304. This means that any data word, constant, or mask bit pattern can be provided directly from a program statement.

The working storage memory 2315 is a 64-word by 8-bit random access memory (RAM) that serves as an extension of the register storage capabilities of the arithmetic/logic unit 2312. The working storage memory 2315 serves as a scratch pad storage area for arithmetic/logic unit 2312 data operations. The arithmetic/logic unit 2312 is composed of two 2901 4-bit bipolar microprocessor slices to form an 8-bit arithmetic/logic unit. The 2901 4-bit bipolar microprocessor slices are manufactured by Advanced Micro Devices. The primary function of the arithmetic/logic unit 2312 is to provide manipulation and arithmetic processing of data, input/output address information, and memory address information. The arithmetic/logic unit 2312 can supply data to the upper bus address register 2317, the lower bus address register 2318, the working storage memory 2315, and the data bus transceiver 2321. The arithmetic/logic unit utilizes internal registers for temporary storage.

The upper bus address register 2317 and the lower bus address register 2318 provide latching and buffering for all devices connected to the 2900 data processor bus. The upper bus address register 2317 and the lower bus address register 2318 are both loaded from the 2900 microprocessor internal bus from the arithmetic/logic unit 2312.

The control bus register 2322 is loaded directly from the 32-bit instruction provided from the microinstruction output latch 2304. The control bus register 2322 provides a source for synchronized external control bus signals. Control signals utilized are as follows:

- VMA—valid memory address for 2900 external bus;
- STROBE—provides synchronization for the 2900 external bus read and write operations;
- R/W—defines a read or write operation on the 2900 microprocessor bus; and
- DM—indicates an input/output operation to Data Memory (which requires a 20 bit address) when active. When DM is inactive only the lower 8 bits of address (on the external bus) are valid. This allows peripheral units to decode only these lower 8 bits for addressing purposes.

The data bus transceiver 2321 consists of two 4-bit 2904 transceiver chips manufactured by Advanced Micro Devices. The 2904 transceiver chips are connected in parallel to form an 8-bit data bus transceiver. Data is written into the data bus transceiver 2321 from the 2900 microprocessor internal data bus on the rising edge of the system clock. This data is enabled onto the 2900 microprocessor external bus by the Write signal going low. Data is written from the external 2900 microprocessor bus into the data bus transceiver 2321 during Read and Strobe coincidence on the external bus.

Commercially available components which can be utilized in the circuit illustrated in FIG. 32, which have not been previously specified, are as follows:

| | |
|---|---|
| Microcontrol program memory 2302 | 82S185, Signetics |
| Microinstruction output latch | 74LS374, National Semiconductor |
| Internal bus select logic | 74LS138, National Semiconductor |
| Emit buffer 2314 | DM81LS97, National Semiconductor |
| Working storage memory 2315 | 82S09, Signetics |
| Upper bus address register 2317, lower bus address register 2318 and control bus register 2322 | 25LS07, Advanced Micro Devices |
| System clock generator | Motorola Oscillator, |

-continued

| | |
|---|---|
| | Motorola Semiconductor |

The interrupt logic 2305 illustrated in FIG. 32 is more fully illustrated in FIG. 33. The first 2900 microprocessor bus interrupt is tied to the I1 input of the encoder 2323. The second 2900 microprocessor bus interrupt is tied to the I0 input of the encoder 2323. The I2–I7 inputs of the encoder 2323 are tied high to the +5 volt power supply 2324. The A0–A2 address outputs from the encoder 2323 are supplied as the vector address which is illustrated in FIG. 32. The group select output from the encoder 2323 is supplied as one input to the NOR gate 2326. The output of the NOR gate 2326 is tied to the D input of the flip-flop 2327. The system clock signal, which is supplied from the system clock generator 2307 illustrated in FIG. 32, is supplied to the clock input of the flip-flop 2327. The set input of the flip-flop 2327 is tied high to the +5 volt power supply 2328. The reset input of the flip-flop 2327 is also tied high to a +5 volt power supply 2329. The Q input from the flip-flop 2327 is tied to the D input of the flip-flop 2331. The system clock signal is supplied to the clock input of the flip-flop 2331. The set input of the flip-flop 2331 is tied high to the +5 volt power supply 2332. The reset input of the flip-flop 2331 is tied high to the +5 volt power supply 2334. The Q output from the flip-flop 2331 is supplied to the microprogram sequencer address source select multiplexer 2301, FIG. 32. The Q output from the flip-flop 2331 is illustrated as part of the vector address in FIG. 32.

The $\overline{Q}$ output from the flip-flop 2327 is tied to the reset input of flip-flop 2335 and is also supplied as a first input to the AND gate 2336. The set and D inputs of the flip-flop 2335 are tied high to the +5 volt power supply 2330. An enabling signal and a pullup signal are supplied as inputs to the NOR gate 2338. The output of the NOR gate 2338 is supplied as a first input to the NAND gate 2339. An interrupt enabling signal is supplied as a second input to the NAND gate 2339. The output of the NAND gate 2339 is supplied as a first input to the NOR gate 2341. The system clock signal is supplied as a second input to the NOR gate 2341. The output of the NOR gate 2341 is tied to the clock input of the flip-flop 2335.

The $\overline{Q}$ output from the flip-flop 2335 is tied as a second input to the NOR gate 2326 and is also supplied as a second input to the AND gate 2336. The output of the AND gate 2336 is the interrupt signal illustrated in FIG. 32.

Commercially available components which can be utilized in the circuit illustrated in FIG. 33 are as follows:

| | |
|---|---|
| Encoder 2323 | 93L18, Fairchild Semiconductor |
| Flip-flops 2327, 2331 and 2335 | 74LS74, National Semiconductor |
| NOR gates 2326, 2338 and 2341 | 74LS02, National Semiconductor |
| NAND gate 2339 | 74LS00, National Semiconductor |
| AND gate 2336 | 74LS08, National Semiconductor |

The conditional branch logic 2311 illustrated in FIG. 32 is more fully illustrated in FIG. 34. The status lines are supplied to the data inputs of the data latch 2344. The system clock signal, which is generated by the system clock generator 2307, illustrated in FIG. 55, is provided to the clock input of the data latch 2344. The data outputs from the data latch 2344 are tied to the one-of-sixteen decoder 2345. The arithmetic/logic unit 2312 status output is tied to the data inputs of the data latches 2347 and 2348. The control bus logic signal is supplied to the S1 select input of the decoder 2349. The interrupt enable signal is supplied to the S0 select input of the decoder 2349. The system clock is supplied to the enabling input of the decoder 2349. The $Q_3$ output of the decoder 2349 is tied to the clock input of the data latch 2347. The $Q_2$ output of the decoder 2349 is tied to the clock input of the data latch 2348. The data outputs of the data latch 2347 are tied as inputs to the one-of-sixteen decoder 2345. The data outputs of the data latch 2348 are also tied to the data inputs of the one-of-sixteen decoder 2345. The one-of-sixteen decoder 2345 selects one of the data inputs to be supplied as the branch condition signal which is illustrated in FIG. 32. The control bus logic signal and the interrupt enable signal, which form part of the instruction word from the microinstruction output latch 2304 illustrated in FIG. 32, are utilized to clock the data latch 2347 and the data latch 2348. When the interrupt enable signal is low and the control bus logic signal is high, data latch 2348 is clocked. When the control bus logic signal is high and the interrupt enable is high, the data latch 2347 is clocked. When the control bus logic is low, which is the case during all conditional branch statements, neither data latch 2347 nor data latch 2348 is changed. This allows sequences of conditional branch statements to be executed on the same set of arithmetic/logic unit status outputs.

Commercially available components which can be utilized in the circuit illustrated in FIG. 34 are as follows:

| | |
|---|---|
| Decoder 2349 | 74LS139, National Semiconductor |
| Data latch 2344 | 74LS174, National Semiconductor |
| Data latches 2347 and 2348 | 25LS374, National Semiconductor |
| One-of-sixteen decoder 2345 | 74150, Signetics |

When data is available, the 2900 microprocessor reads data from data formatter 71. This data is checked for errors and is stored in memory with a flag set by any data word which contains an error. If errors are present, a retransmission from one of the RTU's will occur and the retransmitted data is utilized to replace data words containing errors.

Once valid data has been stored in memory, the data is transferred to the magnetic tape unit 79. This transfer is accomplished under the control of the 6800 microprocessor 51. If data is to be provided to the data display unit 93, the 2900 microprocessor reads the data from memory, filters the data, and adjusts the gain on the data before the data is provided to the data display unit 91.

As has been previously stated, the microcontrol program memory 2302 illustrated in FIG. 32 is a programmable read-only memory (PROM). A PROM is a nonvolatile memory which means that if power is lost to the memory, the program contained in the memory is not lost. Thus the power to the central recording station, illustrated in FIG. *2a*, can be shut down without losing the program memory contained in the microcontrol program memory 2302. However, the disadvantage of using programmable read-only memories is that the program must be burnt into the memory and, once the program has been burnt into the memory, the program is very difficult to change. In some cases the program cannot be changed and the programmable read-only memory must be thrown away and a new programmable read-only memory must be programmed to change a program. This can result in a very high cost when a system such as the 2900 microprocessor is being utilized.

Provision is made in the present system to avoid the problem of changing a program in a programmable read-only memory. This method also allows the well-documented 6800 microprocessor system to be utilized to develop programs to be utilized by the 2900 microprocessor.

A randon access memory is utilized to develop and test programs which are to be utilized by the 2900 microprocessor. The random access memory and its associated circuitry is referred to as the programmable read-only memory (PROM) bug random access memory (RAM). The PROM bug RAM is not a permanent part of the central recording station, illustrated in FIG. *2a*, but rather provides diagnostic and trouble shooting capability for the 2900 microprocessor. The location of the PROM bug RAM when it is being utilized in the central recording station is illustrated in FIG. 35. The PROM bug RAM 2351 is connected to the 6800 microprocessor bus and is also connected to the J1 and J2 inputs of the 2900 microprocessor 74. The J1 and J2 inputs to the 2900 microprocessor are fully illustrated in FIG. 32. As is illustrated in FIG. 32, the PROM bug RAM can apply a reset signal to the microprogram sequencer 2301. The reset signal is utilized to initialize the 2900 microprocessor program execution and the microprogram sequencer. The PROM bug RAM 2351 can also apply a halt signal to the microprogram sequencer through the J1 input. The halt signal forces the microprogram sequencer 2301 to enter a high-impedance (tristate) mode. An inhibit signal is applied via the J1 input to the microinstruction output latch 2304. The inhibit signal forces the microinstruction output latch 2304 into its high-impedance(tristate) mode. The PROM bug RAM 2351 has a direct connection to the 12-bit address from the microprogram sequencer 2301 to the microcontrol program memory 2302 by means of the J1 input. The PROM bug RAM 2351 is also connected to the internal bus of the 2900 microprocessor by means of the J1 input. Finally, the PROM bug RAM 2351 is tied to the 32-bit output from the microinstruction output latch 2304 by means of the J2 connector.

The PROM bug RAM 2351, illustrated in FIG. 35, is more fully illustrated in FIG. 36. The decoding logic 2353 decodes the address from the 6800 microprocessor and provides the decoded address information to the peripheral interface adapter 2354. The peripheral interface adapter 2354 is preferably a 6820 peripheral interface adapter manufactured by Motorola Semiconductor. The peripheral interface adapter 2354 controls the address to the random access memory 2356. The peripheral interface adapter 2354 also provides control signals to the random access memory 2356 and to the address input buffer 2357. The peripheral interface adapter 2354 also supplies an enabling signal to the tristate buffer 2358.

The random access memory 2356 is preferably a 1K by 32-bit MOS memory composed of 32 1K by 1-bit memory devices which are preferably Type 3542 manufactured by Fairchild Semiconductor. When the random access memory 2356 is being utilized, the system clock generator 2307, illustrated in FIG. 32, is automatically switched to run at the system clock/2 speed. The random access memory 2356 is utilized to store the program which is to be tested.

A 32-bit data output is supplied from the random access memory 2356 to the random access memory output control latch 2359 and to the tristate buffer 2358. The tristate buffer 2358 provides isolation between the random access memory 2356 output and the peripheral interface adapter 2354. The tristate buffer 2358 is placed in the disabled mode when an address is being supplied from the peripheral interface adapter 2354 to the random access memory 2356 to prevent the random access memory output data lines from competing for control of the input data lines to the random access memory 2356. Conversely, when the peripheral interface adapter 2354 is programmed so as to allow data to be read from the random access memory 2356, the tristate buffer 2358 is enabled to allow the random access memory 2356 output data to be gated through the peripheral interface adapter 2354 to be read by the 6800 microprocessor.

The random access memory output control latch 2359 accepts the data from the random access memory 2356 and supplies the data to the 2900 microprocessor instruction bus by means of connector J2. An instruction can thus be provided from the random access memory 2356 to the 2900 microprocessor by means of the 2900 microprocessor instruction bus. The microcontrol program memory 2302, illustrated in FIG. 32, is thus bypassed, allowing the random access memory 2356 to replace the microcontrol program memory 2302.

The address input buffer 2357 is a simple buffer which allows tristating of the address inputs from the microprogram sequencer 2301 during programming by the 6800 microprocessor, illustrated in FIG. 32. Enabling the buffer 2357 allows the 2900 microprocessor to assume control of the random access memory 2356 when it is desired to test the program in the random access memory 2356 for the 2900 microprocessor.

Commercially available components which can be utilized in the circuit illustrated in FIG. 36 and which have not been previously specified are as follows:

| | |
|---|---|
| Tristate buffer 2358 and address input buffer 2357 | 74LS367, National Semiconductor |
| Random access memory output control latch 2359 | 74LS174, National Semiconductor |

The decoding logic 2353, illustrated in FIG. 36, is more fully illustrated in FIG. 37. Three 6820 peripheral interface adapters are utilized to form the peripheral interface adapter 2354 illustrated in FIG. 36. Referring now to FIG. 37, the D0–D7 data lines from the 6800 microprocessor are supplied to the D0–D7 data lines of the peripheral interface adapters 2361–2363. The A15 address line from the 6800 microprocessor is supplied through inverter 2364 to the buffer 2366. The A14–A8 address from the 6800 microprocessor are supplied directly as inputs to the buffer 2366. The output lines from the open collector buffer 2366 are all tied high to the +5 volt power supply 2367 through pullup resistor 2368. The output lines from the buffer 2366 are also all tied to the chip select zero input (CS0) of the peripheral interface adapters 2361–2363.

The A4–A7 address lines from the 6800 microprocessor are supplied as inputs to the NAND gate 2369. The output from the NAND gate 2369 is tied to the chip select one input (CS1) of the peripheral interface adapters 2361–2363.

The A3 address line from the 6800 microprocessor is supplied directly as a first input to AND gate 2371. The A3 address line is also supplied through the inverter 2372 as a first input to AND gate 2373 and AND gate 2374. The A2 address line from the 6800 microprocessor is supplied directly as a second input to AND gate 2374. The A2 address line from the 6800 microprocessor is also supplied through the inverter 2375 as a second input to AND gate 2373 and as a second input to AND gate 2371. The valid memory address (VMA) from the 6800 microprocessor is supplied directly as a third input to AND gates 2371, 2373 and 2374. The output from AND gate 2373 is tied to the chip select two input ($\overline{CS2}$) of the peripheral interface adapter 2361. The output from AND gate 2374 is tied to the chip select two input ($\overline{CS2}$) of the peripheral interface adapter 2362. The output from AND gate 2371 is tied to the chip select two input ($\overline{CS2}$) of the peripheral interface adapter 2363.

The A1 address line from the 6800 microprocessor is tied to the register select one input (RS1) of the peripheral interface adapters 2361–2363. The A0 address line from the 6800 microprocessor is tied to the register select one input (RS0) of the peripheral interface adapters 2361–2363. The read/write ($R/\overline{W}$) signal from the 6800 microprocessor is supplied to the read/write input of the peripheral interface adapters 2361–2363. The $\phi$2 clock from the 6800 microprocessor is supplied to the enable inputs of the peripheral interface adapters 2361–2363. The reset input from the 6800 microprocessor is tied to the reset inputs of the peripheral interface adapters 2361–2363.

Commercially available components which can be utilized in the circuit illustrated in FIG. 60 are as follows:

| | |
|---|---|
| Inverters 2364, 2372 and 2375 | 74LS04, National Semiconductor |
| Buffer 2366 | 74LS05, National Semiconductor |
| NAND gate 2369 | 74LS30, National Semiconductor |
| AND gates 2373, 2374 and 2371 | 74LS11, National Semiconductor |
| Resistor 2368 | 8.2 K ohms, RN60D, Dale |

FIGS. 32 and 36 should be referred to for the following discussion of the operational sequences which are employed in utilizing the random access memory 2356 to replace the programmable read-only memory which is illustrated as the microcontrol program memory 2302. While the random access memory is being programmed, the 2900 microprocessor is disabled. Once programming has been completed, the 6800 interface to the random access memory is disabled and the 2900 microprocessor is enabled to control the random access memory as if it were the microcontrol program memory 2302. This allows all of the 2900 microprocessor programs to be written and worked within a well-documented and supported software/hardware area (6800 microprocessor system) before any programmable read-only memory is programmed. Using the random access memory 2356, it is possible to load and run one diagnostic or program after another. In fact, the entire instruction set and/or program can be changed in a few seconds. This greatly reduces the expense involved in changing programs which have been programmed into a programmable read-only memory. It also greatly simplifies the task of developing programs for the 2900 microprocessor system.

To utilize the random access memory 2356, the reset, inhibit and halt signals are first set so as to disable the 2900 microprocessor. Specifically, the microcontrol program memory 2302 and the microinstruction output latch 2304 are disabled by setting both to their high-impedance state. The address input buffer 2357 is also set to a high-impedance state which enables the address of the random access memory 2356 to be controlled by the peripheral interface adapter 2354. The random access memory 2356 is thus completely controlled by the 6800 microprocessor system.

The random access memory 2356 is programmed by supplying addresses and writing data from the 6800 microprocessor system into the random access memory 2356. The output disable signal, which is supplied from the peripheral interface adapter 2354 to the tristate buffer 2358, is first set so as to disable the tristate buffer 2358 so that return data from the random access memory 2356 will be inhibited. An address and data are then provided from the 6800 microprocessor system to the random access memory 2356. The address and data are strobed into the random access memory by means of the read/write input to the random access memory 2356. The entire random access memory is programmed in this manner.

When it is desired to read data from the random access memory 2356 with the 6800 microprocessor, the output disable, supplied from the peripheral interface adapter 2354 to the tristate buffer 2358, is reset to allow the 32-bit output from the random access memory 2356 to be supplied back through the tristate buffer 2358 to the peripheral interface adapter 2354. Data is read from the random access memory 2356 through the peripheral interface adapter 2354 by the 6800 microprocessor.

After a program has been set up in the random access memory 2356 and the program has been tested by using the 6800 microprocessor, control is transferred to the 2900 microprocessor to test the program. The 2900 microprocessor utilizes the random access memory 2356 in the same manner as the microcontrol program memory 2302 which is disabled when the random access memory 2356 is connected. When it is desired to transfer control to the 2900 microprocessor, the tristate buffer 2358 is disabled to inhibit the transfer of data from the random access memory 2356 to the peripheral interface adapter 2354. The peripheral interface adapter 2354 is programmed to designate address and data lines as inputs. This is equivalent to tristating the peripheral interface adapter and thus disabling the peripheral interface adapter 2354. The halt signal to the 2900 microprocessor is reset, which removes the tristate condition at the microprogram sequencer 2301. This also enables the address input buffer 2357. Control has now been transferred to the 2900 microprocessor, which means that the microinstruction word is now being sourced from the random access memory 2356 under control of the 2900 microprogram sequencer 2301. By releasing the reset, program execution is then allowed to proceed.

At any time desired, by applying the halt and reset, program alteration or examination by the 6800 microprocessor system can be accomplished. The 6800 microprocessor system provides high-speed tape reader inputs and CRT outputs for ease of checkout and programming of the random access memory 2356. Therefore, the random access memory 2356 allows an easy method for checkout of programs for the 2900 microprocessor prior to burning the program into the microcontrol program memory 2302. This greatly facilitates programming of the 2900 microprocessor and alleviates the cost of having to reburn the program in the microcontrol program memory 2302 to change the program.

The computer-to-computer interface 58, illustrated in FIG. 2a, is more fully illustrated in FIG. 38. As has been previously stated, the computer-to-computer interface 58, illustrated in FIG. 2a, is a circuit which allows communication between the 6800 microprocessor and the 2900 microprocessor. The computer-to-computer interface 58 supplies the required interrupts which inform the 6800 microprocessor and the 2900 microprocessor when either computer is ready to send data to the other computer. Essentially the address and command lines from the 6800 microprocessor and the 2900 microprocessor are utilized to control the operation of the computer-to-computer interface 58. The data lines from the 6800 microprocessor and the 2900 microprocessor are utilized to transfer data between the 6800 microprocessor and the 2900 microprocessor. The address and command lines from the 6800 microprocessor and the 2900 microprocessor are also utilized to generate signals which indicate when data is available to be written from either computer to the other computer and also when each computer is ready to receive data.

Referring now to FIG. 38, the A7 address line from the 6800 microprocessor is supplied as the first input to the NOR gate 2481. The A6 address line from the 6800 microprocessor is supplied as the second input to the NOR gate 2481. The output from the NOR gate 2481 is supplied as the first input to the NAND gate 2482. The A5 address line from the 6800 microprocessor is supplied as the second input to the NAND gate 2482. The A4 address line from the 6800 microprocessor is supplied through inverter 2483 as a third input to the NAND gate 2482. The input/output (I/O) line from the 6800 microprocessor is tied as a fourth input to the NAND gate 2482.

The output from the NAND gate 2482 is supplied as a first input to the NAND gate 2484. The A3 address line from the 6800 microprocessor is supplied as a second input to the NAND gate 2484 through the inverter 2485. The output from the NAND gate 2484 is supplied through inverter 2486 as a first input to the NAND gate 2487 and is also supplied to the chip select 1 (CS1) input of the peripheral interface adapter 2488.

The $\phi 2$ clock from the 6800 microprocessor is supplied through the driver 2489 as a second input to the NAND gate 2487 and is also supplied to the enabling input of the peripheral interface adapter 2488. The reset line from the 6800 microprocessor is supplied through the driver 2489 to the reset input of peripheral interface adapter 2488. The A1 address line from the 6800 microprocessor is supplied through the driver 2489 to the register select 1 (RS1) input of the peripheral interface adapter 2488. The A2 address line from the 6800 microprocessor is supplied through the driver 2489 to the chip select 0 (CS0) input of the peripheral interface adapter 2488 and is also supplied as the third input to the NAND gate 2487. The A0 address line from the 6800 microprocessor is supplied through the driver 2489 to the register select 0 (RS0) input of the peripheral interface adapter 2488. The read/write (R/W) line from the 6800 microprocessor is supplied through the driver 2489 to the read/write input of the peripheral interface adapter 2488 and is also supplied as a fourth input to the NAND gate 2487.

The output from the NAND gate 2487 is supplied as an enabling signal to the E2 enabling input of the driver 2491. The output from the NAND gate 2487 is also supplied through the inverter 2492 as an enabling input to the E1 input of the driver 2491 and to the E1 enabling input of the driver 2493. The E2 enabling input of the driver 2493 is tied to ground.

The D0–D7 data lines from the 6800 microprocessor are tied to the input side of the driver 2493 and are also tied to the output side of the driver 2491. The output side of the driver 2493, which corresponds to the inputs to which the D0–D7 data lines from the 6800 microprocessor are tied, is tied to the D0–D7 data terminals of the peripheral interface adapter 2488. The D0–D7 data inputs of the peripheral interface adapter 2488 are also supplied to the input side of the driver 2491. The interrupt line from the 6800 microprocessor is supplied to the interrupt request A (IRQA) and interrupt request B (IRQB) inputs of the peripheral interface adapter 2488.

The valid memory address (VMA) line from the 2900 microprocessor is tied through inverter 2495 as a first input to the NAND gate 2496. The DM line from the 2900 microprocessor is tied as a second input to the NAND gate 2496. The A0–D7 address lines from the 2900 microprocessor are supplied as third through tenth input to the NAND gate 2496. The eleventh, twelfth and thirteenth inputs of the NAND gate 2496 are tied to the +5 volt power supply 2497 through the resistor 2498. The output of the NAND gate 2496 is supplied as the first input to the NOR gate 2499. The strobe (STRB) line frm the 2900 microprocessor is supplied as a second input to the NOR gate 2499. The output of the NOR gate 2499 is supplied as the first input to the NAND gate 2501 and the NAND gate 2502. The read/-write line from the 2900 microprocessor is supplied directly as a second input to the NAND gate 2502 and is supplied through the inverter 2503 as a second input to the NAND gate 2501.

The output from the NAND gate 2501 goes low when data is available to be written from the 2900 microprocessor to the 6800 microprocessor. The output from the NAND gate 2501 is supplied to the clock input of the flip-flop 2503. The output from the NAND gate 2501 is also supplied to the input of the driver 2504 and provides an indication that the 2900 microprocessor is ready to send data. The output from the NAND gate 2502 goes low when data can be read into the 2900 microprocessor from the 6800 microprocessor. The output from the NAND gate 2502 is supplied as an enabling input to the driver 2504 and is also supplied to the input side of the driver 2504 as an indication that the 2900 satellite microprocessor is clear to receive data.

The D0–D7 data lines from the 6800 microprocessor are supplied to the input side of the driver 2504 and are supplied to the D inputs of the flip-flop 2503. The clear input of the flip-flop 2503 is tied to the +5 volt power supply 2505. The Q outputs from the flip-flop 2503 are tied to the PA0–PA7 peripheral data lines of the peripheral interface adapter 2488.

The PB0–PB7 peripheral data lines from the peripheral interface adapter 2488 are tied to the input side of the driver 2504. The CB2 peripheral control line from the peripheral interface adapter 2488 is tied through inverter 2506 to the input side of the driver 2504. The CB2 control line from the peripheral interface adapter 2488 is utilized to provide an indication to the 2900 microprocessor that data is available for transmission from the 6800 microprocessor to the 2900 microprocessor. The CA2 peripheral control line from the peripheral interface adapter is tied through inverter 2507 to the input side of the driver 2504. The CA2 peripheral control line is utilized to provide an indication to the 2900 microprocessor that the 6800 microprocessor is clear to receive data.

The 6800 microprocessor data-ready signal and the 6800 clear-to-send signal are supplied through the dirver 2504 to the 2900 microprocessor. The 2900 data-ready signal and the 2900 clear-to-send signal are supplied through the dirver 2504 as inputs to the driver 2493. From the driver 2493, the 2900 data-ready signal and the 2900 clear-to-send signal are supplied to the peripheral interface adapter 2488. The 2900 data-ready signal is supplied to the CA1 interrupt input while the 2900 clear-to-send signal is supplied to the CB1 interrupt input.

The peripheral interface adapter 2488 forms the heart of the computer-to-computer interface 58 illustrated in FIG. 2*a*. Data is supplied from the 2900 microprocessor to the PA0–PA7 peripheral data lines of the peripheral interface adapter 2488. This data can be supplied from the peripheral interface adapter 2488 to the 6800 microprocessor by means of the D0–D7 data lines of the 6800 microprocessor which are tied to the D0–D7 data lines of the peripheral interface adapter 2488. In like manner, the D0–D7 data lines from the 6800 microprocessor can be utilized to supply data to the peripheral interface adapter 2488 by means of the D0–D7 data inputs of the peripheral interface adapter 2488. Data from the 6800 microprocessor is supplied to the 2900 microprocessor by means of the PB0–PB7 peripheral data lines of the peripheral inerface adapter 2488.

The address lines and the command lines from the 2900 microprocessor are used to generate the write signal which is output from the NAND gate 2501 and the read signal which is output from the NAND gate 2502. The write signal 2501 is utilized to clock the flip-flop 2503 to supply data from the 2900 microprocessor to the PA0–PA7 peripheral data lines of the peripheral interface adapter 2488. The write signal from the NAND gate 2501 is utilized also to supply the 2900 data-ready signal which indicates that data is available to be written from the 2900 microprocessor to the 6800 microprocessor. The 2900 ready-signal is supplied through the driver 2504 and the driver 2493 to the CA1 interrupt of the peripheral interface adapter 2488. The peripheral interface adapter 2488 provides an indication that data is available to be written from the 2900 microprocessor to the 6800 microprocessor by means of the interrupt request (IRQ) A and interrupt request (IRQ) B lines of the peripheral interface adapter 2488.

In the same manner, the read signal from the NAND gate 2502 is utilized to provide the 2900 clear-to-send signal which indicates that the 2900 microprocessor is clear and can receive data from the 6800 microprocessor. The 2900 clear-to-send signal is supplied from the driver 2504 through the driver 2493 to the CB1 interrupt input of the peripheral interface adapter 2488. The peripheral interface adapter 2488 supplies the 2900 clear-to-send signal to the 6800 microprocessor by means of the interrupt request (IRQ) A and interrupt request (IRQ) B outputs from the peripheral interface adapter 2488.

The addres lines and command lines from the 6800 microprocessor are utilized to control the CB2 and CA2 control outputs from the peripheral interface adapter so as to generate the 6800 data-ready signal and the 6800 clear-to-send signal. The 6800 data-ready signal indicates that data is available at the 6800 microprocessor to be transferred to the 2900 microprocessor. The 6800 clear-to-send signal indicates that the 6800 microprocessor is clear to receive data from the 2900 microprocessor. The 6800 data-ready signal and the 6800 clear-to-send signal are supplied through the driver 2504 to the 2900 microprocessor.

Commercially available components which can be utilized in the circuit illustrated in FIG. 38 are as follows:

| | |
|---|---|
| NOR gates 2481 and 2499 | 74LS02, National Semiconductor |
| NAND gates 2482 and 2487 | 74LS21, National Semiconductor |
| NAND gates 2484, 2501 and 2502 | 74LS00, National Semiconductor |
| NAND gate 2496 | 74LS133, National Semiconductor |
| Inverters 2483, 2485, 2492, 2486, 2495, 2503, 2506 and 2507 | 74LS04, National Semiconductor |
| Driver 2489 | 74LS365, National Semiconductor |
| Driver 2491 and 2493 | 74LS367, National Semiconductor |
| Driver 2504 | 74LS368 (2 required) National Semiconductor |
| Flip-flop 2503 | 74LS175 (2 required) National Semiconductor |
| Peripheral interface Adapter 2488 | MC6820, Motorola Semiconductor |
| Resistor 2498 | 5 K ohms, RN55D, Dale |

The command formatter 52 illustrated in FIG. 2*a* is more fully illustrated in FIG. 39. The command formatter 52 is used primarily to convert the commands and data from the 6800 microprocessor, which is illustrated as computer 51 in FIG. 2*a*, from a parallel to a serial format. Referring now to FIG. 39, the address from the 6800 microprocessor is supplied to decoding block 2051. In response to the address from the 6800 microprocessor, the decoding block 2051 supplies control signals and clock signals to the counters 2053 and 2054, the address registers 2055 and 2056, and the command registers 2057 and 2058. Signal 2059 is supplied from the decoding section 2051 as an enabling signal to counter 2053. Signal 2061 is supplied from the decoding section 2051 as an enabling signal to the counter 2054. Signal 2063 is supplied as a clock signal to the clock inputs of address registers 2055 and 2056. Signal 2062 is supplied from the decoding section 2051 to the clock input of the command registers 2057 and 2058.

The D4–D7 data lines from the 6800 microprocessor are loaded into the D1–D4 data inputs of the address register 2055 and into the D1–D4 data inputs of the command register 2057. The D0–D3 data lines from the 6800 microprocessor are loaded into the D1–D4 data inputs of the address register 2056 and into the D1–D4 data inputs of the command register 2058. The reset line from the 6800 microprocessor is supplied to the clear inputs of the address register 2055 and 2056 and the command registers 2057 and 2058. Data or commands are loaded into the address registers or command registers in response to the clock signals from the decoding section 2051. The data or commands are supplied from the address registers and command registers as inputs to the multiplexers 2065–2068. The $\overline{Q4}$ output from the address register 2056 is tied to the 1C3 data input of the multiplexer 2065. The $\overline{Q3}$ output from the address register 2056 is tied to the 2C3 data input of the multiplexer 2065. The $\overline{Q2}$ output from the address register 1056 is supplied to the 1C3 input of the multiplexer 2066. The $\overline{Q1}$ output from the address register 2056 is tied to the 2C3 input of the multiplexer 2066. The $\overline{Q4}$ output from the address register2055 is tied to the 1C3 data input of the multiplexer 2067. The $\overline{Q3}$ output from the address register 2055 is tied to the 2C3 data input of the multiplexer 2067. The $\overline{Q2}$ output from the address register 2055 is tied to the 1C3 input of the multiplexer 2068. The $\overline{Q1}$ output from the addres register 2055 is tied to the 2C3 data input of the multiplexer 2068. The $\overline{Q4}$ output from the command register 2058 is tied to the 1C2 data input of the multiplexer 2065. The $\overline{Q3}$ output from the command register 2058 is tied to the 2C2 data input of the multiplexer 2065. The $\overline{Q2}$ output from the command register 2058 is tied to the 1C2 input of the multiplexer 2066. The $\overline{Q1}$ output from the command register 2058 is tied to the 2C3 data input of the multiplexer 2066. The $\overline{Q4}$ output from the command register 2057 is tied to the 1C2 data input of the multiplexer 2067. The $\overline{Q3}$ data output from the command register 2057 is tied to the 2C2 data input of the multiplexer 2067. The $\overline{Q2}$ data output from the command register 2057 is tied to the 1C2 data input of the multiplexer 2068. The $\overline{Q1}$ output from the command register 2057 is tied to the 2C2 data input of the multiplexer 2068.

The IC0, IC1, 2C0 and 2C1 data inputs of the multiplexers 2065–2068 are strapped inputs which may be strapped in any manner desirable to provide the desired address or preamble from the central recording station, illustrated in FIG. 2*a*, to the remote telemetry unit illustrated in FIG. 2*b*.

The multiplexers 2065–2068 are capable of outputting two of the eight input signals. One of the inputs IC0–IC3 is selected and one of the inputs 2C0–2C3 is selected. The inputs selected are determined by the signals 2071 and 2072 which are supplied from the counter 2054 to the select inputs of the multiplexers 2065–2068. In response to the signals 2071 and 2072, the multiplexers 2065–2068 provide a plurality of output signals to the multiplexer 2073. The Y1 and Y2 outputs from the multiplexer 2065 are supplied to the D0 and D1 data inputs of the multiplexer 2073. The Y1 and Y2 outputs from the multiplexer 2066 are supplied to the D2 and D3 data inputs of the multiplexer 2073. The Y1 and Y2 outputs from the multiplexer 2067 are supplied to the D4 and D5 data inputs of the multiplexer 2073. The Y1 and Y2 outputs from the multiplexer 2068 are supplied to the D6 and D7 data inputs of the multiplexer 2073.

The multiplexer 2073 provides a single output signal 61 which is illustrated in FIG. 2*a*. The multiplexer 2073 is controlled in such a manner that one of the D0–D7 inputs is supplied to the Y2 output of the multiplexer 2073 is a sequential manner such that the parallel command or address is converted to a serial command or address and is thus supplied to the remote telemetry unit illustrated in FIG. 2*b*. The manner in which the D0–D7 inputs to the multiplexer 2073 are provided as output signals is determined by the control signals 2075–2077 which are provided from the counter 2053 to the select inputs of the multiplexer 2073.

The address from the 6800 microprocessor, which is supplied to the decoding section 2051, determines the manner in which data or commands are supplied over signal line 61 to the RF transmitter 59 illustrated in FIG. 2*a*. An address from the 6800 microprocessor is loaded into the address registers 2055 and 2056 in response to the control signal 2063 from the decoding section 2051. In like manner a command may be loaded into the command registers 2057 and 2058 in response to the clock signal 2062 from the decoding section 2051. The address or command is then supplied to the multiplexers 2065–2068 and the manner in which the address or command is supplied from the multiplexers 2065–2068 to the multiplexer 2073 is controlled by the counter 2054 in response to the control signal 2061 from the decoding section 2051. In like manner, the manner in which the address or command is supplied from the multiplexer 2073 is controlled by the counter 2053 in response to the control signal 2059 from the decoding section 2051. Thus the 6800 microprocessor not only supplies the address and command to the command formatter 52, illustrated in FIG. 2*a*, but also controls the manner in which the address or command is supplied from the command formatter 52 illustrated in FIG. 2*a*.

Commercially available components which can be utilized in the circuit illustrated in FIG. 39 are as follows:

| | |
|---|---|
| Address registers 2055 and 2056 and Command registers 2057 and 2058 | 74LS175, National Semiconductor |
| Multiplexers 2065-2068 | 93L09, Fairchild Semiconductor |
| Multiplexer 2073 | 93L12, Fairchild Semiconductor |
| Counter 2053 | 74LS197 (2 required) National Semiconductor |
| Counter 2054 | 93L10 (3 required) Fairchild Semiconductor |

The decoding section 2051, illustrated in FIG. 39, is more fully illustrated in FIG. 40. The I/O line from the 6800 microprocessor together with the A1–A7 address line from the 6800 microprocessor are supplied as inputs to the NAND gate 2081. The A7 address line is supplied through inverter 2082 while the A6 address line is supplied through inverter 2083. The output from the NAND gate 2081 is supplied through inverter 2084 as an input to NAND gates 2086–2088. The A0 address line from the 6800 microprocessor is supplied through inverter 2089 to the NAND gate 2086 and is also supplied through inverter 2089 and inverter 2091 to the NAND gate 2087. The $R/\overline{W}$ line from the 6800 microprocessor is supplied through inverter 2092 to the NAND gate 2087 and the NAND gate 2086. The $R/\overline{W}$ line from the 6800 microprocessor is also supplied through inverter 2092 and inverter 2093 to the NAND gate 2088. The $\phi 2$ clock from the 6800 microprocessor is supplied through inverter 2094 and 2095 as an input to the NAND gates 2086–2088 and is also supplied as one part of signal 2061 illustrated in FIG. 39. The output signal from the NAND gate 2088 makes up the second part of the signal 2061 illustrated in FIG. 39. The output from the NAND gate 2087 is supplied as both signal 2059 and signal 2062 illustrated in FIG. 39. The output from the NAND gate 2086 is supplied as the output signal 2063 illustrated in FIG. 39.

Commercially available components which can be utilized in the circuit illustrated in FIG. 40 are as follows:

| | |
|---|---|
| Inverters 2083-2084and 2089-2095 | 74LS04, National Semiconductor |
| NAND gate 2081 | 74LS30, National Semiconductor |
| NAND gate 2086 and 2087 | 74LS20, National Semiconductor |
| NAND gate 2088 | 74LS10, National Semiconductor |

The data formatter 71, illustrated in FIG. 2*a* is more fully illustrated in FIG. 41. Referring to FIG. 41, data is supplied from the RF receiver 68 by the means of signal line 69 as illustrated in FIG. 2*a*. The data is supplied from the RF receiver 68 to the serial-parallel converter 2101 and parity count circuit 2102. The data is transmitted from the remote telemetry unit, illustrated in FIG. 2*b*, in 20-bit blocks. The parity count circuit 2102 maintains a count of the number of ones in the 20-bit blocks and outputs this count to the multiplexer 2103 by means of signal line 2104. Signal line 2104 will either be high or low depending on the number of ones contained in the data block.

The data from the RF receiver 68 is in serial form. The data is converted to parallel form by the serial-to-parallel converter 2101. The output signal 2105 from the serial-to-parallel converter 2101 is representative of a 20-bit word in parallel form and thus is representative of 20 signal lines. The 20 signal lines from the serial-to-parallel converter 2101, which are represented by signal 2105, are supplied as inputs to the decoding circuit 2107 and the registers 2108. The registers 2108 are utilized as storage to allow additional time for processing of the incoming data from the remote telemetry unit illustrated in FIG. 2*b*. The decoding section 2107 is utilized to supply a clock signal to the register 2108 to enable the registers to load data and also supplies a data-available signal to the multiplexer 2103 as well as a control signal 2110 to the parity count circuit 2102. The data-available signal, which is illustrated as signal line 2109, is utilized to inform the 2900 microprocessor that data is available. The clock signal supplied from the decoding section 2107 is illustrated as signal 2111.

The clock signal generation circuit 2100 is utilized to supply the clock or timing signals for the data formatter 71. A clock signal 2099 is supplied from the RF receiver 68 by means of the signal line 69 which is illustrated in FIG. 2*a*. In response to signal 2099, the clock signal generation circuit 2100 generates a pair of clock signals 2117 and 2118 which are 180° out of phase. Clock signal 2117 is provided to both the parity count circuit 2102 and the decoding circuit 2107. Clock signal 2118 is provided to the decoding circuit 2107.

The output 2112 from the registers 2108 is supplied to the multiplexer 2103. Again, the output signal 2112 from the register 2108 is representative of 20 signal lines.

The A0 and A1 address lines from the 2900 microprocessor are supplied to the multiplexer 2103 and are utilized to select which input signals will be provided as outputs to the drivers 2114 by means of signal line 2115. The output signal line 2115 from the multiplexer 2103 are representative of 8 signal lines. The output signal line from the driver 2114 is connected to the D0–D7 data lines of the 2900 microprocessor.

Essentially, the data formatter 71, illustrated in FIG. 41, is utilized to convert the serial data from the remote telemetry unit to parallel form and to provide a parity count to the 2900 microprocessor. The decoding circuit 2107 provides synchronization for the data formatter. The manner in which the data is supplied to the 2900 microprocesssor is controlled by the 2900 microprocessor by means of the A0 and A1 address lines.

Commercially available components which can be utilized in the circuit illustrated in FIG. 41 are as follows:

| | |
|---|---|
| S/P converter 2101 | 74LS164, National Semiconductor |
| Register 2108 | 74LS175, National Semiconductor |
| Multiplexer 2103 | 93L09, National Semiconductor |
| Drivers 2114 | 74LS368, National Semiconductor |

The clock signal generation circuit 2100 which is illustrated in FIG. 41 is more fully illustrated in FIG. 42. The clock signal 2099 from the RF receiver 68, illustrated in FIG. *2a*, is supplied through inverter 2125 as an input to the delay 2126 and as a first input to the AND gate 2127. The output from the delay 2126 is supplied through the voltage divider network made up of resistors 2128 and 2129 and through inverter 2131 as a second input to the AND gate 2127. The output from the AND gate 2127 forms the clock signal 2117 which is illustrated in FIG. 41.

The clock signal 2099, from the RF receiver 68 illustrated in FIG. *2a*, is also supplied through inverters 2125 and 2132 as an input to the delay 2133 and as a first input to the AND gate 2134. The output from the delay 2133 is supplied through the voltage divider network made up of resistors 2136 and 2137 and through the inverter 2138 as a second input to the AND gate 2134. The output from the AND gate 2134 is the clock signal 2118 which is illustrated in FIG. 41. As has been previously stated, the clock signals 2117 and 2118 are 180 degrees out of phase.

Commercially available components which can be utilized in the circuit illustrated in FIG. 42 are as follows:

| | |
|---|---|
| Inverters 2125, 2132, 2131 and 2138 | 74LS04, National Semiconductor |
| Delay 2126 and 2133 | 1504-1000, Data Delay |
| Resistors 2128 and 2136 | 470 ohms, 1%, ¼W, RN55D, Dale |
| Resistors 2129 and 2137 | 680 ohms, 1%, ¼W, RN55D, Dale |
| AND gates 2127 and 2134 | 74LS08, National Semiconductor |

The decoding circuit 2107 illustrated in FIG. 41 is more fully illustrated in FIG. 43. Referring to FIG. 43, signal 2105 from the serial-to-parallel converter 2101, illustrated in FIG. 41, is made up of 20 bits. The 20 bits are supplied to a plurality of NOR gates and NAND gates as is illustrated in FIG. 43. Bits 19, 17 and 16 are supplied as inputs to the NOR gate 2141. Bits 11, 9 and 7 are supplied as inputs to the NOR gate 2142. Bits 5, 3 and 1 are supplied to the NOR gate 2143. Bits 18, 15, 14, 13, 12, 10, 8 and 6 are supplied as inputs to the NAND gate 2144. Bits 4, 2 and 0 are supplied as inputs to the NAND gate 2145. The NAND gate 2145 is also supplied with the $\overline{Q}$ output for the flip-flop 2147. The output from the NAND gate 2144 is supplied as a first input to the NOR gate 2148. The output from the NAND gate 2145 is supplied as second input to the NOR gate 2148. The output from the NOR gate 2148 is supplied as a first input to the NOR gate 2149. The output from the NOR gates 2141-2143 are also supplied as inputs to the NAND gate 2149. The output from the NAND gate 2149 is supplied through inverter 2151 as a first input to the NAND gate 2152.

The clock signal 2118 from the clock signal generation circuit 2100 is supplied as a second input to the NAND gate 2152 and is also supplied as a first input to the AND gate 2153. The output from the NAND gate 2152 is supplied to the clock input of the flip-flop 2147. The D input of the flip-flop 2147 is supplied with an enabling pulse which indicates that data is available. The set input of the flip-flop 2147, the set input of the flip-flop 2155 and the D input of the flip-flop 2155 are all tied to the +5 volt power supply 2157 through resistor 2158. The Q output of the flip-flop 2147 is tied to the count/load input of the counter 2159, to the count/load input of the counter 2161 and as a second input to the AND gate 2153. The output of the AND gate 2153 is supplied as one input to the NAND gate 2163. The $\overline{Q}$ output from the flip-flop 2147 is tied as one input to the NAND gate 2145, as has been previously stated, and is also supplied as signal 2110A which forms a part of signal 2110 illustrated in FIG. 41. The Q output from the flip-flop 2115 is utilized as the data-available signal 2109 which is illustrated in FIG. 41.

The clock signal 2117, from the clock signal generation circuit 2100 illustrated in FIG. 41, is supplied to the first clock input of the counter 2159. The A and D data inputs of the counter 2159, as well as the clear input of the counter 2159, together with the A data input and the clear input of counter 2161, are tied to the +5 volt power supply 2165 through resistor 2166. The B and C data inputs of counter 2159 are tied to ground. The B, C and D data inputs of counter 2161 are tied to ground. The QA output from the counter 2159 is tied to the second clock input of the counter 2159 and is supplied as a second input to the NAND gate 2163. The QD output from the counter 2159 is tied to the first clock input of the counter 2161 and is supplied as a third input to the NAND gate 2163. The QA output from the counter 2161 is supplied as a fourth input to the NAND gate 2163. The output from the NAND gate 2163 is supplied to the clock input of the flip-flop 2155 and is also supplied as signal 2110B which forms a second part of signal 2110 illustrated in FIG. 41.

The circuit illustrated in FIG. 43 is utilized to provide an indication that data is available to the 2900 microprocessor by means of the decoding of the 20 bits of signal 2105 from the serial-to-parallel converter 2101 illustrated in FIG. 41. The decoding circuit, illustrated in FIG. 43, also counts the number of bits by means of counters 2159 and 2161 to provide an indication of when each 20-bit word has been transmitted.

Commercially available components which can be utilized in the circuit illustrated in FIG. 43 are as follows:

| | |
|---|---|
| NOR gates 2141, 2142 and 2143 | 74LS27, National Semiconductor |
| NAND gate 2144 | 74LS30, National Semiconductor |
| NAND gate 2145, 2149 and 2163 | 74LS20, National Semiconductor |
| NOR gate 2148 | 74LS02, National Semiconductor |
| NAND gate 2152 | 74LS00, National Semiconductor |
| AND gate 2153 | 74LS08, National Semiconductor |
| Inverter 2151, | 74LS04, National Semiconductor |
| Flip-flops 2147 and 2155 | 74LS74, National Semiconductor |
| Counter 2159 | 74LS196, National Semiconductor |
| Counter 2161 | 74LS197, National Semiconductor |

-continued

| | |
|---|---|
| Resistors 2158 and 2166 | 4.7 K ohms, RN60D, Dale |

The parity count circuit 2102, illustrated in FIG. 41, is more fully illustrated in FIG. 44. The data signal 69 from the RF receiver 68, illustrated in FIG. *2a*, is supplied to the J input of the flip-flop 2171 and is supplied through inverter 2172 to the K input of the flip-flop 2171. The clock signal 2117, which is supplied from the clock signal generation circuit 2100, is supplied to the clock input of the flip-flop 2171. Signal 2110B, which is illustrated in FIG. 43, is supplied through inverter 2174 to the clock input of the flip-flop 2173. Signal 2110B is also supplied through the inverter 2174 directly as a first input to the AND gate 2175 and through the resistance capacitance network made up of resistor 2176 and capacitor 2177 as a second input to the NAND gate 2175. The output from the NAND gate 2175 is supplied as a first input to the NAND gate 2178. Signal 2110A, which is illustrated in FIG. 43, is supplied as a second input to the NOR gate 2178. The output from the NOR gate 2178 is tied to the reset input of the flip-flop 2171.

The Q output from the flip-flop 2171 is supplied to the D input of the flip-flop 2173. The set input and the reset input of the flip-flop 2173 are tied to the +5 volt power supply 2181 through the resistor 2182. The Q output from the flip-flop 2173 is supplied as the parity count signal 2104 which is illustrated and described in FIG. 41.

The circuit illustrated in FIG. 44 simply counts the number of ones in the data being transmitted in the data blocks from the receiver 68 illustrated in FIG. *2a*. Preferably, even parity is used and the Q output from flip-flop 2171 is utilized. If odd parity is desired, then the $\overline{Q}$ output from the flip-flop 2171 would be utilized. Signal 2104 provides an indication of whether or not the number of ones transmitted in a particular data block was even. If the number of ones is not even, then signal 2104 indicates to the 2900 microprocessor that an error has occurred in the particular data block being transmitted.

Commercially available components which can be utilized in the circuit illustrated in FIG. 47 are as follows:

| | |
|---|---|
| Inverter 2172 and 2174 | 74LS04, National Semiconductor |
| Flip-flop 2171 | 74LS109, National Semiconductor |
| Flip-flop 2173 | 74LS74, National Semiconductor |
| NOR gate 2178 | 74LS02, National Semiconductor |
| NAND gate 2175 | 74LS08, National Semiconductor |
| Resistor 2182 | 10K ohms, RN55D, Dale |
| Resistor 2176 | 1 K ohms, RN55D, Dale |
| Capacitor 2177 | .01 microfarads, Type 25B, SE & I |

The magnetic tape unit 79, the magnetic tape controller 88, and the magnetic tape interface 78, illustrated in FIG. *2a*, are more fully illustrated in FIG. 45. Control blocks 1511 and 1512 correspond to the magnetic tape controller illustrated in FIG. *2a*. Interface block 1514 corresponds to the magnetic tape interface 78 illustrated in FIG. *2a*. The formatter 1515 and the tape unit 1516 corresponds to the magnetic tape unit 79 illustrated in FIG. *2a*. In this preferred embodiment of the invention the formatter 1515 is a Kennedy Model 9218 and the tape until 1516 is a Kennedy Model 9800.

To the extent possible, the signal lines illustrated in FIG. 45 have been labeled consistently with the specifications for the formatter 1515 and the tape unit 1516. The general manner in which the formatter 1515 and the tape unit 1516 are interfaced to the 2900 microprocessor and the 6800 microprocessor is illustrated in FIG. 45. The primary problem encountered in interfacing the formatter 1515 and the tape unit 1516 to the 2900 microprocessor and the 6800 microprocessor is the fact that the tape unit 1516 and the two microprocessors are running asynchronously. A means had to be developed to determine whether the data transferred from the 2900 micropressor had been completely transferred to the tape unit 1516. Also, a means had to be developed for alerting the control computer, which is the 6800 microprocessor, of the fact that an error had occurred in the transfer of data from the 2900 to the tape unit 1516.

The control 1511 and the control 1512 are tied to the 6800 microprocessor bus by means of bus line 89 as is illustrated in FIG. *2a*. Control 1511 provides a plurality of output signals to the interface 1514 and to the control 1512. Signal 1517 is provided from the control 1511 to the interface 1514 and is utilized to clear any error indications that have been previously set in the interface 1514. The master reset signal 1519 is provided from the control 1511 to the control 1512 and is utilized to reset the logic chips located in control 1512. The last-word signal 1521 is provided from the control 1511 to the control 1512 and provides an indication that the last word of a data block has been transmitted from the 2900 microprocessor to the tape unit 1516. The strobe signals 1523 are provided from the control 1511 to the control 1512. The strobe signals 1523 are a plurality of clock signals which are utilized to clock the logic circuitry of the control 1512.

Control unit 1512, which is also tied to the 6800 microprocessor by means of bus line 89, provides a plurality of outputs to the formatter 1515, the tape unit 1516, the control unit 1511 and the interface 1514. The read signal 1524 and write signal 1525 are supplied from control 1512 to the interface 1514 to control the direction of data transfer. The write clock signal 1526 is provided from the control block 1512 to the control block 1511 and to the interface 1514. The write clock signal 1526 is utilized to clock data into the tape unit 1516. The command stobe signal 1528 is provided from the control 1512 to the control 1511 and is utilized to clear the status and error flip flops as well as to generate the clear error signal 1517. The command reset signal 1529 is provided from the control 1512 to the control 1511 and is utilized to generate the master reset signal 1519. The standby signal 1531 is provided from the control 1512 to the control 1511 and provides an indication that the power-up sequence for tape unit 1516 has been completed. The write data signal lines 1533 are provided from the control 1512 to the formatter 1515. Data is written from the 2900 microprocessor to the formatter 1515 by means of the write data lines 1533 and 1544. The device enable signal 1534 is provided from the control 1512 to the formatter 1515 and is utilized to enable all of the interface drivers and receivers in the formatter 1515. The off-line signal 1535 is provided from the control 1512 to the formatter 1515 and is utilized to place the tape unit 1516 under manual control. The command signal 1536 is provided from the control 1512 to the formatter 1515 to indicate that a commmand has been generated from the 6800 microprocessor. The data available strobe 1538 is provided from the control 1512 to the formatter 1516 and is a pulse supplied to the formatter 1515 for each character to be written to the tape unit 1516. The standby power supply line 1539 is provided from the control 1512 to the tape unit 1516 and is utilized to control the operate or standby power mode the tape unit 1516.

The interface 1514 is tied to the 2900 microprocessor bus by means of bus line 77 as is illustrated in FIG. 2*a*. The interface 1514 provides a plurality of outputs to the control 1511 and to the control 1512. The rate error signal 1541 is provided from the interface 1514 to the control 1511 and is an indication of whether or not an error has occurred in the transfer of data from the 2900 microprocessor to the tape unit 1516. The read clock signal 1543 is provided from the interface 1514 to the control 1511 and to the control 1512. The read clock signal 1543 clocks the reading of characters from the tape unit 1516 and increments the character counter in control 1511.

The write data signal lines 1544 are provided from the interface 1514 to the control 1512 and provides a means by which data may be tranferred from the 2900 microprocessor to the control 1512 and hence to the formatter 1515.

The formatter 1515 provides a plurality of input and output signals as is set forth in the specification for the formatter 1515. Only those output signals which are essential to an understanding of the manner in which the tape unit 1516 is interfaced to the 6800 microprocessor and the 2900 microprocessor are described. The read data lines 1546 are provided from the formatter 1515 to the interface 1514 and provide a means by which data may be transferred from the tape unit 1516 to the interface 1514. The read clock signal 1547 is provided from the formatter 1515 to the interface 1514 and provides the clock signal for reading data from the tape unit 1516 to the interface 1514. The write clock signal 1519 is provided from the formatter 1515 to the control 1512 and is utilized to clock the writing of data into the tape unit 1516. The load point signal 1551 is provided from the formatter 1515 to the control 1512. The load point signal 1551 indicates that a tape unit has been selected, is on line, is not rewinding, and the tape load point marker is under the photosensor. The on-line signal 1552 is provided from the formatter 1515 to the control 1511. The on-line signal 1552 provides an indication of whether the selected tape transport is under remote or local control. The tape busy signal 1553 is provided from the formatter 1515 to the control 1511 and provides an indication that the tape unit 1516 is not ready to receive data. The rewinding signal 1554 is provided from the formatter 1515 to the control 1511 and provides an indication that the tape unit 1516 is being rewound. A plurality of output signals, represented by the error signal 1556, are provided from the formatter 1515 to the control 1511. The error signals 1556 identify a variety of error conditions which may occur in the operation of the tape unit 1516. The status signal 1557, which is representative of a plurality of signals, is provided from the formatter 1515 to the control 1511 and provide operating status information for the tape unit 1516.

The control 1511 illustrated in FIG. 45 is more fully illustrated in FIG. 46. The input/output select signal 1561 is provided from the 6800 microprocessor to the decoder 1562. The input/output select signal 1561 is obtained by decoding the eight most significant bits of the address from the 6800 microprocessor. The decoded signal is then ANDED with the valid memory address (VMA) from the 6800 microprocessor to provide the input/output select signal 1561 (this decoding is accomplished in computer 51 illustrated in FIG. 2*a*). Decoder 1562 is also provided with the A4–A7 address bits from the 6800 microprocessor by means of a plurality of address lines which are represented as address lines 1564. In response to the input/output select signal 1561 and the A4–A7 address bits, the decoder 1562 provides a tape unit select signal 1565 to the decoder 1566. The decoder 1566 is also provided with the A0–A3 address lines from the 6800 microprocessor by means of a plurality of address lines which are represented as address lines 1567. The decoder 1566 is also provided with the read/write (R/$\overline{W}$) signal 1568 and the $\phi 2$ clock signal 1569 from the 6800 microprocessor. In response to the tape unit select signal 1565, address bits A0–A3, the read/write signal 1568, and the $\phi 2$ clock signal 1569, the decoder 1566 provides a plurality of clock signals for use in the control 1511 and the control 1512 illustrated in FIG. 45. Sixteen clock signals, which are called strobe signals are provided by a plurality of signal lines which are represented by signal line 1523. The select read signal 1571 and the interrupt clock signal 1572 are also provided from the decoder 1566.

The D0–D7 data lines from the 6800 microprocessor are provided as inputs to the counter 1574 and the counter 1575. The seventh strobe signal from the decoder 1566 is provided to the load input of the counter 1574. The sixth strobe signal from the decoder 1566 is provided to the load input of the counter 1575. The read clock signal 1543 is provided to the up clock input of the counter 1574. The write clock signal 1526 is provided to the down clock input of the counter 1574. Eight output lines from the counter 1574 are supplied to the multiplexer 1577 and are represented as signal line 1578. In like manner, eight output lines are supplied from the counter 1575 to the multiplexer 1577 and are represented by signal line 1579.

The counter 1574 and the counter 1575 together make up a 16 bit up/down character counter. The character counter is used in both read and write operations. In write operations, the character counter is preset to the number of characters to be written on the tape unit 1516 illustrated in FIG. 45. The character counter is decremented by the write clock signal 1526 as each character is written on tape, thus providing a count to the multiplexer 1577 of the number of characters which have been written on tape. The borrow output from the counter 1575 is utilized as a signal to the control 1512 that the last word of the data block has been written to the tape unit. This signal is designated as the last-word signal 1521.

In the read operation, the character counter is preset to zero and incremented by the read check signal 1543 as each character is read from the tape unit 1516. At the end of the read operation, the contents of the character counter are examined to determine the number of characters which have been read from the tape unit. The number of characters which have been read from the tape unit are supplied to the multiplexer 1577 by means of signal lines 1578 and 1579. This information is supplied to the 6800 microprocessor from the multiplexer 1577 through the buffer 1581 which is tied to the D0–D7 data lines of the 6800 microprocessor. The buffer 1581 is enabled by the select read signal 1571 which is provided from the decoder 1566 and the $\phi 2$ clock from the 6800 microprocessor.

The multiplexer 1577 selects one of four eight-bit words according to the status of the A0 and A1 address bits of the 6800 computer bus. Of the 4 available words the first word is the output of counter 1574 represented by signal 1578, the second word is signal 1579. A third word is the various status signals represented by 1557. The fourth word is represented by 1556 and provides error information.

The Q output from the flip-flop 1583 is set by the error signal 1556 to indicate that an error has occurred in the operation of the tape unit 1516. The Q output from the flip-flop 1583 remains set in an error condition until it is cleared by the clear error signal 1517 from the AND gate 1584. The status signal 1557, the rate error signal 1541 and the error signal 1556 are provided through the multiplexer 1557 and a buffer 1581 to the 6800 microprocessor by means of the D0–D7 data lines 1580.

The command strobe signal 1528 is provided as one input to the AND gate 1584. The master reset signal 1519, which is provided from the AND gate 1587, is also provided as an input to the AND gate 1584. The clear error signal 1517 goes low when either the master reset 1519 or the command strobe 1528 goes low. A low condition on the clear error signal 1517 is used to clear the error condition of the flip-flop 1583 and is also used to clear any error set in the interface 1514 illustrated in FIG. 45.

The on-line signal 1552 is provided to the one shot 1591. The $\bar{Q}$ output 1595 from the one shot 1591 is provided as a first input to the AND gate 1599. The tape busy signal 1553 is provided to the one shot 1592. The $\bar{Q}$ output from the one shot 1592 is provided as a second input to AND gate 1599 and is also provided as the formatter busy signal 1518 to the control 1512. The rewinding signal 1554 is provided to the one shot 1593. The $\bar{Q}$ output 1596 from the one shot 1593 is provided as a third input to the AND gate 1599. The standby signal 1531 is provided to the one shot 1594. The $\bar{Q}$ output 1597 from the one shot 1594 is provided as a fourth input to the AND gate 1599.

The output signal 1601 from the AND gate 1599 is provided to the set input of the flip-flop 1602 and 1603. The D inputs of the flip-flop 1602 and 1603 are grounded. The interrupt clock signal 1572 is provided to the clock input of the flip-flop 1602. The select read signal 1571 enables the buffer 1581 and clears the interrupt flip-flop 1603. The master reset signal 1519 is provided as a reset signal to the flip-flop 1602. The clear error signal 1517, which is provided from the AND gate 1584, is provided as a reset signal to the flip-flop 1603. The Q output from the flip-flop 1602 is provided as one input to the NAND gate 1605. The Q output from the flip-flop 1603 is provided as the interrupt bit signal 1605 to the multiplexer 1577 and is provided to the 6800 microprocessor by means of the multiplexer 1577 and the buffer 1581.

The twelfth strobe signal from the decoder 1566 is provided to the set input of the interrupt enable flip-flop 1607. The D input of the flip-flop 1607 is tied to ground while the clock input of the flip-flop 1607 is tied to the thirteenth strobe signal from the decoder 1566. The master reset signal 1519 is provided as a reset signal to the flip-flop 1607. The $\bar{Q}$ output from the flip-flop 1607 is provided as a second input to the NAND gate 1605. The output from the NAND gate 1605 is tied to the interrupt request (IRQ) line of the 6800 microprocessor.

The four status signals, on line 1552, tape busy 1553, rewinding 1554 and standby 1531, are capable of initiating an interrupt request to the 6800 microprocessor. The interrupt request is provided to the 6800 microprocessor by means of the output from the NAND gate 1605. Any of the status signals can trigger the one shot associated with the status signal to generate a pulse. This pulse is provided through AND gate 1599 to the set input of the flip-flop 1602 and 1603. Signals indicating that an interrupt has been requested are provided from the flip-flop 1602 to the 6800 microprocessor through the NAND gate 1605 and from the flip-flop 1603 through the multiplexer 1577.

The conditions for generating an interrupt are as follows:

1. The on-line status signal 1552 will become low and generate an interrupt when the tape unit is manually placed on line or when a device enable command is relatively from the 6800 microprocessor.

2. The tape busy signal 1553 goes high at the completion of each command generating an interrupt indicating that the tape unit is in a condition to accept the next command.

3. The rewinding signal 1554 goes high indicating a completion of a rewind sequence.

4. The standby signal line 1531 goes high approximately 1.5 seconds after a command to power up the tape unit has been issued, indicating that the power-up sequence is complete.

The reset signal from the 6800 microprocessor is provided as a first input to the AND gate 1587. The command reset signal 1529 is provided as a second input signal to the AND gate 1587. The power-on signal 1611 is provided as a third input to the AND gate 1587. The power-on signal 1611 is provided from the power-on detector 1612 and provides a reset signal when power is applied to the logic. The output signal 1519 from the AND gate 1587 is the master reset signal 1519.

Commercially available components which can be utilized in the circuits illustrated in FIG. 46 are as follows:

| | |
|---|---|
| Decoders 1562 and 1566 | 74LS138, National Semiconductor |
| Counters 1574 and 1575 | 74LS193 (4 required) National Semiconductor |
| Multiplexer 1578 | 74LS253 (4 required) National Semiconductor |
| Buffer 1581 | 74LS365 (2 required) National Semiconductor |
| Flip-flop 1583, 1602, 1603 and 1607 | 74LS74, National Semiconductor |
| AND gate 1584 | 74LS08, National Semiconductor |
| One shot 1591-1594 | 74L123, National Semiconductor |
| AND gate 1599, 1587 | 74LS20, National Semiconductor |
| NAND gate 1605 | 74LS38, National Semiconductor |

Control 1512, illustrated in FIG. 45, is more fully illustrated in FIG. 47*a* and *b*. Referring now to FIG. 47*a*, the D0–D7 data lines from the 6800 microprocessor are provided to the data input of the command registers 1614 and 1615. The fourth strobe output from the decoder 1566, illustrated in FIG. 46, is provided to the clock input of the command register 1614. The fifth strobe output from the decoder 1566 is provided to the clock input of the command register 1615. The output signals 1617 and 1618 from the command registers 1614 and 1615 are tied to the multiplexer 1619, the NAND gate 1621, the flip-flop 1622, the one-shot 1623, the NAND gate 1623 and the NAND gate 1625. Signal 1617 is representative of eight output lines from the command register 1614. In like manner signal 1618 is representative of eight output lines from the command register 1615. Of the sixteen output lines from the command register 1614 and the command register 1615, eight output lines are supplied to the multiplexer 1619, five output lines are supplied to the NAND gate 1621, one output line is supplied to the flip-flop 1622, one output line is supplied to the one-shot 1623, and one output line is supplied to both NAND gates 1624 and 1625. The clear register signal 1627, which is output from the AND gate 1629, is provided to the reset input of both the command register 1615 and the command register 1614.

The write data signal 1544, which is representative of eight data lines, is supplied as a second set of input signals to the multiplexer 1619. The command select plus signal 1631, which is provided from the flip-flop 1632 illustrated in FIG. 47*b*, is provided to the select input of the multiplexer 1619. The command select plus signal is utilized to select either the command, which has been provided by means of the D0–D7 data lines from the 6800 microprocessor, or the data from the 2900 microprocessor, which is being provided by data lines 1544, to be provided to the formatter 1515. The eight output signal lines from the multiplexer 1619, which are represented as signal lines 1634, are provided as inputs to the NAND gate 1636. The NAND gate 1636 is representative of eight NAND gates. The outputs from the plurality of NAND gates, which are represented by NAND gate 1636, are provided as eight of the write data lines to the formatter 1515. The remaining five of the write data lines 1533 are provided from the NAND gate 1621 which is representative of five NAND gates.

The command select minus signal, which is provided from the flip-flop 1632 illustrated in FIG. 47*b*, is provided as a first input to the AND gate 1638. The write signal 1525, which is established by the flip-flop 1641 illustrated in FIG. 47*a*, is provided as a second input to the AND gate 1638. The output from the AND gate 1638 is provided through inverter 1639 to the NAND gates represented by NAND gates 1636 and NAND gate 1621. The output signal from the inverter 1639 is utilized to enable the NAND gates represented by NAND gates 1636 and 1621.

The output signal 1642 from the flip-flop 1622 is provided to both inputs of the NAND gate 1643. The output from the NAND gate 1643 is the device enable signal 1534. The output signal 1644 from the one shot 1623 is provided to both inputs of the NAND gate 1645. The output from the NAND gate 1645 is the off-line signal 1535.

The command strobe signal 1528, which is provided as an output from the one shot 1646 illustrated in FIG. 47*b*, is provided to both of the inputs of the NAND gate 1648 and as a second input to the NAND gate 1624 and the NAND gate 1625. The output from the NAND gate 1648 is the control command signal 1536. The output from the NAND gate 1624 is provided to the set input of the flip-flop 1651. The output from the AND gate 1652 is provided to the reset input of the flip-flop 1651. The formatter busy signal 1518 and the master reset signal 1519 are provided as inputs to the AND gate 1652. The output from the flip-flop 1651 is the read signal 1524.

The formatter write clock signal 1549 is provided through the inverter 1654 to the delay 1656. The output from the inverter 1654 is the write clock signal 1526. The output from the delay 1656 is provided as a first input to the NAND gate 1655. The output from the NAND gate 1625 is provided to the set input of the flip-flop 1541. The last-word signal 1521 is provided through inverter 1657 to the clock input of the flip-flop 1641. The master reset signal 1519 is provided to the reset input of the flip-flop 1641. The D input of the flip-flop 1641 is tied to ground. The Q output from the flip-flop 1641 is provided as a second input to the NAND gate 1655. The output from the NAND gate 1655 is the data available signal 1538. The $\overline{Q}$ output from the flip-flop 1641 is the write signal 1525.

Referring now to FIG. 47*b*, the fourth strobe signal from the decoder 1566, illustrated in FIG. 46, is provided as a first input to the AND gate 1661. The fifth strobe output from the decoder 1566 is provided as a second input to the AND gate 1661. The output signal 1662, from the AND gate 1661, is provided as an input to the one shot 1647 and is provided to the set input of the flip-flop 1632.

The output from the one shot 1647 is the command strobe signal 1528. The output from the one shot 1657 is also provided to the one shot 1664. The output from the one shot 1664 is provided to the one shot 1665. The output from the one shot 1665 is provided as one input to the NAND gate 1667. The load point signal 1551 is provided as a second input to the NAND gate 1667. The load point signal 1551 is also provided as input to the one shot 1668. The output from the one shot 1668 is provided as a first input to the AND gate 1669. The output from the NAND gate 1667 is provided as a second input to the AND gate 1669. The output from the AND gate 1669 is provided as a first input to the AND gate 1629. The master reset signal 1519 is provided as a second input to the AND gate 1629. The output signal from the AND gate 1629 is the clear register signal 1627. Signal 1627 is provided to the command register 1614 and the command register 1615 as well as to the reset input of the flip-flop 1632. The Q output from the flip-flop 1632 is the command select plus signal 1631 which is supplied to the multiplexer 1619. The $\overline{Q}$ output from the flip-flop 1632 is the command select minus signal which is provided as an input to the AND gate 1638.

The tenth strobe signal from the decoder 1566, illustrated in FIG. 46, is supplied to the set input of the flip-flop 1671. The eleventh strobe signal from the decoder 1566 is provided to the clock input of the flip-flop 1671 and is provided as an input to the timer 1672. The master reset signal 1519 is provided to the reset input of the flip-flop 1671. The D input of the flip-flop 1671 is tied to ground. The Q output from the flip-flop 1671 is provided as a first input to the NOR gate 1673 and to both inputs of the NAND gate 1675. The output from the timer 1672 is provided as a second input to the NOR gate 1673. The timer 1672 is utilized essentially to provide a delay while the tape unit 1566 is being powered up. The voltage supply 1676 is tied through resistor 1678 to the output 1539 from the NAND gate 1675. The output from the NAND gate 1675 forms the standby power signal 1539. The output from the NOR gate 1673 forms the standby signal 1531 which indicates that the power-up sequence of the tape unit 1516 has been completed.

Referring now to FIGS. 45, 46, 47*a* and 47*b*, when a write command is issued from the 6800 microprocessor, the write flip-flop 1641 is set. The contents of the command registers 1614 and 1615 are sent to the formatter 1515. The formatter will bring the tape unit 1516 up to speed, write a preamble to the tape unit 1516 and, at the appropriate time, the formatter 1515 will generate the formatter write clock signal 1549. This signal is delayed slightly by delay means 1656 and is NANDED with the output from the write flip-flop 1641 to be provided to the formatter as the data available signal 1538. The data available signal 1538 causes the formatter to accept the data characters that are on the write data lines 1533.

The write clock signal 1526, which is derived from the formatter write clock signal 1549, decrements the character counters 1574 and 1575 illustrated in FIG. 46. The write process continues until the character counter provides the last-word output signal 1521. The last-word output signal 1521 clocks the write flip-flop 1641. Since the write flip-flop 1641 is reset before the delayed formatter write clock signal 1549 arrives, there is no signal applied to the data available line 1538. Failure to receive the data available signal 1538 within a prescribed time following the formatter write clock signal 1549 is interpreted by the formatter as completion of the write operation.

When a read command is issued, the read flip-flop 1651 is set. The read data 1546 and the read clock 1547 are supplied directly from the formatter 1515 to the interface 1514. The read clock signal 1543 from the interface 1514 increments the counters 1574 and 1575 illustrated in FIG. 46. The end of a data block is detected in the formatter 1515 and is signaled to the control 1512 by the formatter busy signal 1518 going high (false). At the conclusion of the read operation, the read flip-flop 1651 is reset by the formatter busy signal 1518 going high (false).

Commercially available components which can be utilized in the circuit illustrated in FIGS. 47*a* and 47*b* are as follows:

| | |
|---|---|
| Command register 1614 and 1615 | 74LS174, National Semiconductor |
| Multiplexer 1619 | 74LS257 (2 required) National Semiconductor |
| NAND gates 1636, 1621, 1643, 1645, 1648, 1655, and 1675 | 74LS38, National Semiconductor |
| AND gates 1629, 1638, 1652, 1661 and 1669 | 74LS08, National Semiconductor |
| Flip-flop 1622, 1651, 1641, 1632 and 1671 | 74LS74, National Semiconductor |
| One shot 1623, 1647, 1664, 1665 and 1668 | 74L123, National Semiconductor |
| NAND gates 1624, 1625 and 1667 | 74LS10, National Semiconductor |
| Inverters 1654 and 1657 | 74LS04, National Semiconductor |
| Delay 1656 | 74LS14, National Semiconductor |
| Resistor 1678 | 10 K ohms, RN55D, Dale |
| Timer 1672 | SE556, Signetics |
| NOR gate 1673 | 74LS02, National Semiconductor |

The interface 1514, illustrated in FIG. 45, is more fully illustrated in FIG. 48. The D0–D7 data lines from the 2900 microprocessor are provided to the buffer 1681. The buffer 1681 is also provided with the write address signal 1682 which is provided from the decoder 1684. The write address signal 1682 is provided as an enabling pulse to the buffer 1681 and is also provided as a first input to the NAND gate 1685. The NAND gate 1685 is also provided with a strobe signal 1686 from the 2900 microprocessor. The buffered data from the 2900 microprocessor is provided to the data latch 1689 by means of a plurality of data lines of which data line 1687 is representative. The output from the NAND gate 1685 is provided as a clock input to the data latch 1689. The 8 outputs from the data latch 1689 are tied to the control 1512, illustrated in FIG. 45, and data is written from the 2900 microprocessor to the tape unit over the write data lines 1544 and 1533.

The read data line 1546, the read clock 1547 and the read signal 1524 are all supplied to the buffer 1691. The read data line 1546 is representative of 8 data lines. The read signal 1524 is provided as an enabling signal to the buffer 1691. Buffered data is provided from the buffer 1691 to the latch 1692 by means of the output data line 1693 from the buffer 1691. Data line 1693 is representative of 8 data lines. The read clock signal 1543 is provided to the clock input of the data latch 1692 and is also provided an an input to the gate 1695. The read clock signal 1543 is also provided to the control 1511 and the control 1512. The 8 data lines from the latch 1692, of which data line 1697 is representative, are provided to the buffer 1699. The buffer 1699 is provided with the read address signal 1701 from the decoder 1684 as an enabling signal. The output from the buffer 1699 is tied to the D0–D7 data lines from the 2900 microprocessor. Data is read from the tape unit 1516 to the 2900 microprocessor by means of the read data line 1546 which is supplied through the buffer 1691, the latch 1692 and the buffer 1699 to the 2900 microprocessor by means of the D0–D7 data lines of the 2900 microprocessor.

The gate 1695 is provided with the write signal 1525, the write clock signal 1526 and the read clock signal 1543. The set interrupt output 1703 from the gate 1695 may be generated in response to any of the input signals to the gate 1695. The set interrupt output 1703 is provided as a clock signal to the flip-flop 1704 and the flip-flop 1705.

The A0–A7 address lines, which are represented as address line 1707, are provided to the decoder 1684 from the 2900 microprocessor. In like manner, the valid memory address (VMA) signal 1708, the DM signal 1709, the read/write ($R/\overline{W}$) signal 1710 and the strobe signal 1711 from the control bus of the 2900 microprocessor are provided to the decoder 1684. In response to the address from the 2900 microprocessor, the decoder 1684 provides the read address signal 1701, the write address signal 1682 and the address strobe 1712 as output signals. The read address signal 1701 and the write address signal 1682 are utilized as previously described. The address strobe signal 1712 is provided as one input to the AND gate 1714.

The reset signal 1715 from the 2900 microprocessor is supplied as a second input to the AND gate 1714 and as a first input to the AND gate 1716. The output from the AND gate 1714 is supplied to the reset input of the flip-flop 1704. The D input to the flip-flop 1704 is tied to the +5 volt supply 1718. The Q output from the flip-flop 1704 is tied to both inputs of the NAND gate 1719 and is also supplied to the D input of the flip-flop 1705. The output from the NAND gate 1719 is an interrupt request signal to the 2900 microprocessor. (The 2900 microprocessor does not respond to the interrupt request as an interrupt but periodically polls the line).

The clear error signal 1517 is provided as the second input to the AND gate 1716. The output from the AND gate 1716 is provided to the reset inputs of the flip-flop 1705 and the flip-flop 1723. The Q output from the flip-flop 1705 is provided to the clock input of the flip-flop 1723. The D input of the flip-flop 1723 is tied to the +5 volt supply 1724. The Q output from the flip-flop 1723 is provided as a first input to the NOR gate 1721. The $\overline{Q}$ output from the flip-flop 1704 is provided as a second input to the NOR gate 1721. The output from the NOR gate 1721 is the rate error signal 1541.

The logic of the interface 1514, illustrated in FIG. 48, detects that a write operation is being initialized by the write signal 1525 going low. The write signal 1525 is utilized to generate the set interrupt signal 1703.

The set interrupt signal 1703 clocks the interrupt request flip-flop 1704 and the rate error flip-flop 1705. Since the 2900 microprocessor has been previously initialized for a write operation by the 6800 microprocessor, the 2900 microprocessor responds to the interrupt request, which is generated in response to the set interrupt 1703, by placing a tape data character on the data bus and generating the proper address and control signals. The data character is buffered by buffer 1681 and is latched into the data latch 1689. The latched character data is provided to the formatter 1515 through the control 1512. The logic of the interface 1514 will remain in this condition until the first write clock signal 1526 occurs. There is a delay of approximately 17 milliseconds while the tape unit 1516 brings the tape up to speed and writes the 41 character preamble before the write clock signal 1526 occurs. The write clock signal 1526 propagates through the gate 1695 and the set interrupt signal 1703 is again generated. The set interrupt signal 1703 again clocks the interrupt request flip-flop 1704 and the rate error flip-flop 1705. This results in the setting of the interrupt request flip-flop 1704 which indicates that the previous data character has been accepted by the formatter 1515 and another data character is needed. After the initial delay, the write clock signal 1526 will occur at approximately 25 microsecond intervals.

The address strobe 1712, which is generated by decoder 1684 for either a read or write operation of the 2900 microprocessor, is applied as a first input to gate 1714. The output of gate 1714 resets the interrupt request flip-flop 1704 so that the Q output of flip-flop 1704 is low prior to the next set interrupt clock 1703 with the result that the flip-flop 1705 is never set. Should the 2900 microprocessor fail to provide data to the interface 1514 prior to the next write clock 1526 or read clock 1546, the Q output of flip-flop 1704 will be high and flip-flop 1705 will be set. Setting of flip-flop 1705 will cause flip-flop 1723 to be set. While flip-flop 1705 may be cleared by subsequent data transfers, flip-flop 1723 will remain set until cleared by clear error 1517 or reset signals.

A tape read operation is detected by the read signal 1524 going high and enabling the read data bus buffers 1691. The read data signal 1546 and read clock signal 1547 are passed through the buffer 1691 and latched into the data latch 1692. The read clock signal 1547 is utilized to clock the data into the latch 1692, to increment the character counter composed of counters 1574 and 1575 illustrated in FIG. 46, and to generate a set interrupt signal 1703 for the read operation. The set interrupt signal 1703 will again clock both the interrupt request flip-flop 1704 and the rate error flip-flop 1705.

In response to the setting of the interrupt request flip-flop 1704, the 2900 microprocessor will activate address and control signals to permit the read address signal 1701 to be generated by the decoder 1684. The read address signal 1701 enables the buffer 1699 to place the character from the read data line 1546 on the 2900 microprocessor data bus. After a short delay, the 2900 microprocessor will issue the strobe pulse 1711 indicating that the data character has been accepted. The strobe pulse 1711 causes the decoder 1684 to generate address strobe 1712 which clears the interrupt request flip-flop 1704.

Additional read clock pulses 1547 will occur at an average rate of 25 microseconds until the read operation has been completed. The character counters 1574 and 1575, which are illustrated in FIG. 46, may be read by the 6800 microprocessor to determine the number of characters read from tape.

The data transfer between the 2900 mmicroprocessor and the formatter 1515 is an asynchronous process with both devices running at variable rates. The number of characters to be transferred in a data block can be as high as 65,536. The transfer must be perfect or it must be definitely known that at least one error has occurred.

The rate error logic, illustrated in FIG. 48, verifies that each character read from the tape was accepted by the 2900 microprocessor within the allowable time frame and that a character was made available to the formatter 1515 for writing onto the tape unit 1516 within the allowable time. Failure of either of these conditions will result in a setting of the rate error flip-flop 1705.

The rate error detection logic requires three flip-flops. The set interrupt signal 1703 clocks the interrupt request flip-flop 1704 and the rate error flip-flop 1705. Since the interrupt request flip-flop 1704 is initially in a reset state, the rate error flip-flop 1705 will remain in the reset state. If, for any reason, the strobe signal from the 2900 microprocessor does not occur prior to the next set interrupt signal, the rate error flip-flop 1705 will be set. The rate error flip-flop 1705 will clock the output flip-flop 1723 which remains set until a reset signal 1715 or a clear error signal 1517 is received. It is possible that the last character was not accepted by the 2900 microprocessor. Therefore, the Q output from the interrupt request flip-flop 1704 is ORed with the Q output from the flip-flop 1723 to produce the rate error signal 1541 that is sent to the multiplexer 1577, illustrated in FIG. 46.

If an error occurs in the transfer of data from the 2900 microprocessor to the tape unit 1516 or from the tape unit 1516 to the 2900 microprocessor then the 6800 microprocessor commands the data to be retransmitted to thereby correct any error which has occurred in the previous data transfer.

Commercially available components which can be utilized in the circuit illustrated in FIG. 48 are as follows:

| | |
|---|---|
| Buffer 1681, 1691 and 1699 | 74LS366 (2 required) National Semiconductor |
| Data latch 1689 and 1692 | 74LS174, National Semiconductor |
| AND gates 1714 and 1716 | 74LS08, National Semiconductor |
| Flip-flops 1704, 1705 and 1723 | 74LS74, National Semiconductor |
| NAND gate 1719 | 74LS38, National Semiconductor |
| NOR gate 1721 | 74LS00, National Semiconductor |

The gate 1695 illustrated in FIG. 48 is more fully illustrated in FIG. 49. The read clock signal 1543 is provided through the inverter 1731 as a first input to the NAND gate 1732. The write signal 1525 is provided through the inverter 1733 as a first input to the NAND gate 1734. The write clock signal 1526 is also provided through the inverter 1735, the resistor-capacitor network made up of resistor 1736 and capacitor 1737, and the inverter 1738 as a second input to the NAND gate 1734. The output from the NAND gate 1734 is provided as a second input to the NAND gate 1732. The output from the NAND gate 1732 is the set interrupt signal 1703 illustrated in FIG. 48.

Commercially available components which can be utilized in the circuit illustrated in FIG. 49 are as follows:

| | |
|---|---|
| Inverters 1731, 1733, 1735 and 1738 | 74LS14, National Semiconductor |
| Resistor 1736 | 39 ohms, RN55D, Dale |
| Capacitor 1737 | 0.005 mfd., Type CKR05, Sprague |
| NAND gates 1734 and 1732 | 74LS00, National Semiconductor |

The decoder 1684, illustrated in FIG. 48, is more fully illustrated in FIG. 50. The A0 address bit from the 2900 microprocessor is supplied through the inverter 1741 as a first input to the NAND gate 1742. The A1 address line from the 2900 microprocessor is supplied though the inverter 1743 as a second input to the NAND gate 1742. The A2–A7 address lines from the 2900 microprocessor are supplied directly as third through eighth inputs to the NAND gate 1742. The output signal from the NAND gate 1742 is supplied through the inverter 1745 as a first input to the NAND gate 1746 and as a first input to the NAND gate 1747.

The valid memory address (VMA) line 1708 is supplied through the inverter 1749 as a second input to the NAND gate 1746 and as a second input to the NAND gate 1747. The DM signal 1709, from the 2900 microprocessor, is supplied through inverters 1751 and 1752 as a third input to the NAND gate 1747 and as a third input to the NAND gate 1746.

The read/write (R/$\overline{W}$) signal 1710 is supplied through inverter 1753 as a fourth input to the NAND gate 1746. The read/write (R/$\overline{W}$) signal 1710 is supplied through inverter 1753 and inverter 1755 as a fourth input to the NAND gate 1747.

The output signal from the NAND gate 1746 is the write address signal 1682 which is illustrated in FIG. 48. The write address signal is utilized as is illustrated in FIG. 48 and is also supplied as a first input to the NAND gate 1757. The output from the NAND gate 1747 is the read address signal 1701 which is illustrated in FIG. 48. The read address signal 1701 is utilized as is illustrated in FIG. 48 and is also supplied as a second input to the NAND gate 1757.

The output from the NAND gate 1757 is supplied as a first input to the NAND gate 1758. The strobe signal 1711, from the 2900 microprocessor, is supplied through the inverter 1759 as a second input to the NAND gate 1758. The output from the NAND gate 1758 is the address strobe signal 1712 which is illustrated in FIG. 48.

Commercially available components which can be utilized in the circuit illustrated in FIg. 50 are as follows:

| | |
|---|---|
| Inverters 1741, 1743, 1745, 1749, 1751, 1752, 1753, 1755 and 1759 | 74LS04, National Semiconductor |
| NAND gate 1742 | 74LS30, National Semiconductor |
| NAND gates 1746 and 1747 | 74LS20, National Semiconductor |
| NAND gates 1757 and 1758 | 74LS00, National Semiconductor |

The data display unit 93, illustrated in FIG. *2a*, is more fully illustrated in FIG. 51. Referring now to FIG. 51, seismic data is supplied to the buffers 1301 by means of data bus line 94 which is operably connected to the computer data bus line 75 illustrated in FIG. *2a*. The seismic data, wich has been transmitted from the RTU to the CRS illustrated in FIG. *2a*, is supplied from computer means 74 to the data display unit 93 in parallel form. The seismic data is supplied from the buffers 1301 to the parallel-to-serial (P/S) converter 1304 by means of data line 1303. The P/S converter 1304 converts the seismic data to serial form and supplies the seismic data to the charge coupled device (CCD) memory 1307 by means of signal line 1308.

When it is desired to display the seismic data, the seismic data stored in the CCD memory 1307 is supplied to the serial-to-parallel (S/P) converter 1309 by means of signal line 1311. The seismic data from the CCD memory, which is in a serial format, is converted to a parallel format by the S/P 1309 and is supplied to the first-in-first-out (FIFO) memory 1312 by means of signal line 1314. The FIFO memory 1312 is provided to compensate for speed variations between the recirculating speed of the CCD memory 1307 and the recorder speed of the recorders 1321 and 1322. The FIFO memory 1312 is made up of two buffers. While one of the buffers is being read and its data displayed, the other buffer is being loaded with data from the CCD memory 1307.

The seismic data is supplied from the FIFO memory to the digital-to-analog (D/A) converter 1316 by means of signal line 1317. The seismic data is converted to analog form by the D/A converter 1316 and is supplied to a plurality of sample-and-hold (S/H) circuits of which S/H circuits 1318 and 1319 are representative. In the preferred embodiment of the present invention, there may be as many as 72 S/H circuits to which data is supplied from the digital-to-analog (D/A) converter 1316. Only two S/H circuits 1318 and 1319 are illustrated both for the sake of convenience and because the principals of the system can be illustrated using only two S/H circuits. The number of S/H circuits to which data is supplied from the D/A converter 1316 is determined by the number of data channels that are being monitored by the RTUs employed in the seismic exploration system of the present invention. A data channel corresponds to a geophone string monitored by a particular RTU. In the present invention, four geophone strings can be monitored by each RTU and a plurality of RTUs may be utilized to monitor as many as 72 channels.

The seismic data is supplied from the S/H circuits 1318 and 1319 through the low-pass filters 1324 and 1325 to the recorders 1321 and 1322 respectively. The low-pass filters 1324 and 1325 are utilized to suppress the sampling frequency of the S/H circuits 1318 and 1319 to provide a smooth response. The recorders 1321 and 1322 are preferably oscillographs which provide a written trace of the data supplied from the S/H circuits 1318 and 1319.

Data is also supplied from the D/A converter 1316 to the data display control 1326. The seismic data is formatted by the data display control 1326 so as to provide an acceptable input signal 1328 to the CRT monitor 1329.

The data display unit 93 is controlled by means of the control logic 1331. The control logic 1331 provides a plurality of control and timing signals which control the operation of the data display unit 93 as illustrated in FIG. 51. Control signal 1333 is provided to the buffers 1303 from the control logic 1331. In like manner control signal 1334 is provided to the parallel-to-serial converter 1304; control signal 1335 is provided to the CCD memory 1307; control signal 1336 is provided to the data display control 1326; control signal 1337 is provided to the S/P converter 1309; control signal 1338 is provided to the FIFO memory 1312; control signal 1339 is provided to the D/A converter 1316; control signal 1341 is provided to the S/H circuits 1318 and 1319; and control signal 1342 is provided to the recorders 1321 and 1322.

When it is desired to display data which has been obtained from the RTUs, the seismic data obtained from the RTUs is provided, by channel, to the CCD memory 1307. All of the channel 1 data is supplied to the CCD memory and is stored; then all of the channel 2 data is supplied to the CCD memory and stored. This process is continued until all of the data from the last channel which was utilized in a particular shot sequence has been stored in the CCD memory 1307.

The data is read from the CCD memory 1307 by samples. That is, sample 1 of channel 1 is read from the CCD memory 1307 and is supplied to S/H circuit 1318. Then sample 1 of channel 2 is read from the CCD memory 1307 and is supplied to the S/H circuit utilized for channel 2. This is continued until the first sample of the last data channel has been read from the CCD memory 1307 and supplied to the S/H circuit which is utilized for the last data channel. As illustrated in FIG. 51, the last S/H circuit would correspond to S/H circuit 1319. After the first sample of each data channel has been read from the CCD memory 1307, the second sample of each channel is read from the CCD memory in the same manner as previously described for sample 1. This process is continued until all of the samples of all of the data channels have been read from the CCD memory 1307 and recorded by the plurality of recording means of which recorder 1321 and recorder 1322 are representative.

The plurality of S/H circuits, of which S/H circuit 1318 and S/H circuit 1319 are representative, provide a means by which the seismic data can be separated into its respective channels after being stored in the CCD memory 1307.

If it is desired to display data by means of the CRT monitor and not by means of the recorders 1321 and 1322, the recorders 1321 and 1322 are disabled and the seismic data supplied to the data display control 1326. The seismic data is displayed with respect to the particular channel number by the CRT monitor 1329 and this display provides a quick visual indication of the operability of the seismic exploration system embodied in the present invention.

Commercially available components which can be utilized in the circuit illustrated in FIG. 51 are as follows:

| | |
|---|---|
| Buffers 1301 | 8T87, Signetics |
| Parallel-to-serial converter 1304 | 74165, National Semiconductor |
| CCD memory 1307 | 2416, Intel |
| Serial-to-parallel converter 1309 | 74LS164, National Semiconductor |
| D/A converter 1316 | DAC 100, Precision Monolithics, Inc. |
| Recorders 1321 and 1322 (Multichannel Oscillograph) | ERC10-C, Southwest Industrial Electronics |
| CRT monitor 1329 | Model 86A122, Infodex |

The data display system (DDS) may be more fully understood by referring to the timing diagrams illustrated in FIGS. 52 and 53. FIG. 52 is illustrative of the manner in which data is written to the CCD memory 1307 illustrated in FIG. 51. The CCD clock start signal 1351 is supplied from the 6800 microprocessor 51 illustrated in FIG. 2a. The CCD clock start signal 1351 enables the CCD memory illustrated in FIG. 51. The data monitor ready signal 1353 is supplied from the data display unit 93 to the 2900 microprocessor 74 illustrated in FIG. 2a. The data monitor ready signal 1353 is supplied to bus line 94 by means of signal line 1333 illustrated in FIG. 51. The write strobe signal 1354 is supplied to the data display unit from the 2900 microprocessor 74 illustrated in FIG. 2a. Data is written from the 2900 microprocessor to the CDD memories 1307 in response to the write strobe signal 1354.

The CCD memory 1307 and the data display system is enabled when the CCD clock start signal 1351 goes low. After the CCD clock start signal goes low, a time of 150 milliseconds is allowed for the CCD memory to warm up and then the data monitor ready signal 1353 goes low signifying that data can be written to the CCD memory 1307. The data monitor ready signal 1353 is transmitted to the 2900 microprocessor. In response to the data monitor ready signal 1353 going low, the 2900 microprocesor first writes four header words to registers associated with the CCD memory 1307. The signal 1354 goes low when a header word is written to the CCD memory 1307. Each time the write strobe signal goes low the data monitor ready signal goes high for the period of time from 8.2 microseconds to 16.4 microseconds. After this time has elapsed, the data monitor ready signal returns to a low condition signifying that the second header word can be written. This process continues until four header words have been written.

After the four header words have been written, seismic data can be written to the CCD memory 1307. FIG. 52 illustrates the writing of two channels of data each having three samples to the CCD memory 1307. After the four header words have been written to the CCD memory 1307, as indefinite time may elapse before data is written to the CCD memory 1307. When sample 1 of channel 1 is written to CCD memory 1307, the write strobe signal 1304 will go low. At the same time the data monitor ready signal will go high for a maximum time period of 2.1 milliseconds to enable the CCD memory 1307 to locate the correct sector to which sample 1 of channel 1 should be written. After the correct sector has been located, the data monitor ready signal will go low and, within 1.6 microseconds of the time from which the data monitor ready signal goes low, sample 2 of channel 1 must be written to the CCD memory 1307. After sample 2 of channel 1 is written to the CCD memory 1307, the data monitor ready signal will go high for a maximum time period of 8.5 microseconds and then will again return to a low condition at which time sample 3 of channel 1 must be written to the CCD memory 1307 within the 1.6 microseconds. This process continues until all samples of channel 1 have been written to the CCD memory 1307.

After all samples of channel 1 have been written to the CCD memory 1307, all samples of channel 2 are written to the CCD memory 1307 in the same manner as previously described for channel 1. This process is continued until all of the channels of data have been written to the CCD memory 1307 illustrated in FIG. 51.

After all of the channels of data have been written to the CCD memory 1307, the data can then be read out to the recorders 1321 and 1322 and the CRT monitor 1329 illustrated in FIG. 51. The manner in which data is read from the CCD memory 1307 is illustrated in FIG. 53.

FIG. 53 can be more readily understood in connection with FIG. 54. As was previously stated, the FIFO memory 1312, illustrated in FIG. 51, consists of two FIFO registers. As illustrated in FIG. 54, the output signal 1314 from the S/P converter 1309, illustrated in FIG. 51, is supplied as an input to both the FIFO register 1358 and the FIFO register 1359. The output from both FIFI registers 1358 and 1359 is provided to the register 1361. The output signal 1317 from the register 1361 is provided to D/A converter 1316 as is illustrated in FIG. 51. The FIFO registers are provided to compensate for the difference in the time required to read data from the CCD memory 1307 and the time required for the S/H systems 1318 and 1319 to sample and hold the data signals provided from the D/A converter 1316. As is illustrated in FIG. 53, data can be read from the CCD memory 1307 at a rate of 8 microseconds per sample. Thus, 576 microseconds are required to read 72 samples from the CCD memory 1307. As has been previously stated, data is read from the CCD memories as sample 1, channel 1; sample 1, channel 2; sample 1, channel 3; etc. until all sample 1s of all the data channels have been read from the CCD memory 1307. If 72 channels are available, then 72 sample 1s are available and all sample 1s are read from the CCD memory before sample 2 of channel 1 is read from the CCD memory 1307.

After all sample 1s from all of the data channels have been read from the CCD memory 1307, approximately 160 to 200 microseconds is required to allow the CCD memory to find sample 2 of channel 1. Thus, all of the sample 1s of the data channels can be read from the CCD memory 1307 and the CCD memory 1307 can be prepared to output the sample 2s of the data channels within the one millisecond sample rate that is illustrated as the sample rate clock in FIG. 53. All of the sample 1s of the data channels are stored in the FIFO register 1358. Then all of the sample 2s of each of the data channels are stored in the FIFO register 1359. Sample 1 of channel 1 is read from the CCD memory 1307 to the FIFO register 1358 when the sample rate clock goes high. All of the sample 1s of the data channels must be read from the CCD memory 1307 to the FIFO memory 1358 before the sample rate clock completes its cycle.

After the seismic data, represented by the first and second samples, has been stored in FIFO registers 1358 and 1359 respectively, the seismic data can be read from the FIFO registers 1358 and 1359 to the S/H circuits 1318 and 1319 illustrated in FIG. 51. The samples are read from the FIFO registers 1358 and 1359 in response to the channel update clock, which has a period of 12.8 microseconds and is illustrated in FIG. 53. Sample 1 would be provided to the S/H circuit 1318 for a period of 12.8 microseconds at the end of which time the S/H circuit 1318 would be set to the hold mode. This procedure would be comtinued until all of the available sample 1s have been provided to the S/H circuits of which S/H circuits 1318 and 1319 are representative. All of the first samples of the available data channels are read to the S/H circuits within the one millisecond period of the sample rate clock. When the sample rate clock repeats a cycle, all of the sample 2s of the available data channels will be read to the S/H circuits from the FIFO register 1359 while at the same timd all of the sample 3s of the available data channels will be read from the CCD memory 1307 to the FIFO buffer 1358. In this manner, data is always available to be supplied to the S/H circuits and the difference between the rate at which data can be supplied to the S/H circuits and the rate at which data can be read from the CCD memory 1307 is compensated for.

Commercially available components which can be utilized in the circuit illustrated in FIG. 54 are as follows:

| | |
|---|---|
| FIFO registers 1358 and 1359 | 33512DC, Fairchild Semiconductors |
| Register 1361 | 74LS175, National Semiconductor |

FIG. 55 is illustrative of the manner in which the S/H circuits, of which S/H circuits 1318 and 1319 are representative, are addressed. The channel update clock, which is illustrated in FIG. 53, is supplied as one input to the counter 1365. The counter 1365 is also supplied with a reset input 1366. In response to the channel update clock and the reset input 1366, the counter 1365 will count up to the number of data channels available and then will start the count again. The output from the counter 1365 is provided to the read only memory (ROM) 1368 and to the decoders 1371–1373. The output control signals from the ROM 1368 are also provided to the decoders 1371–1373.

As has been previously stated, 72 S/H circuits are utilized in the data display system. Only three S/H circuits are illustrated in FIG. 55. The S/H circuits are divided up into three PC cards, each card holding 24 S/H circuits. Essentially, for the first 24 channels, the ROM 1368 operates to select the first PC card. For the second 24 channels, the ROM 1368 selects the second PC card and for the third 24 channels, the ROM 1368 selects the third PC card. There are also three decoders 1371–1373 on each PC card. The ROM 1368 also selects which decoder should be enabled. If the three decoders 1371–1373, illustrated in FIG. 55, are considered to be on the first PC card, then the ROM 1368 will select decoder 1371 if channel 1 through channel 8 is being read from the CCD memory 1307; will select decoder 1372 if channels 9 through 16 are being read from the CCD memory 1307, and will select decoder 1373 if channels 17 through 24 are being read from the CCD memory 1307.

After the PC card and decoder have been selected by the ROM 1368, the three least significant bits output from the counter 1365 are utilized to select which S/H circuit thereof will be enabled. As is illustrated in FIG. 55, each decoder controls eight S/H circuits. If channel 4 was being supplied to the S/H circuits, the decoder 1371 would effect the closing of switch 1375 which in turn would enable channel 4 to be supplied to the S/H circuit 1376. In like manner, the particular S/H circuit for each data channel is thus enabled when that respective data channel is output from the CCD memory 1307. Switch 1375, which is illustrative of the 72 switches utilized in the data display system, will be closed for 12.8 microseconds when channel 4 data is being supplied from the CCD memory 1307 to enable the S/H circuit 1376, which consists of the operational amplifier 1378 and the capacitor 1379, to sample the data provided by the seismic data line 1320. After 12.8 microseconds, the S/H circuit 1376 is set to the hold mode and the data will be supplied to the low-pass filter associated with that particular S/H circuit as is illustrated in FIG. 51.

In the same manner as previously described, switch 1381 is closed to supply seismic data to the S/H circuit 1383, which is made up of operational amplifier 1384 and capacitor 1385. Switch 1387 is closed to supply data to the S/H circuit 1388 which is made up of operational amplifier 1389 and capacitor 1391. The 72 switches, of which switches 1375, 1381 and 1387 are representative, are closed only when data from a particular channel with which a respective switch is associated is being supplied from the CCD memory 1307.

Commercially available components which can be utilized in the circuit illustrated in FIG. 55 are as follows:

| | |
|---|---|
| Counter 1365 | 74LS193, Motorola Semiconductor |
| ROM 1368 | 82S123, Signetics |
| Decoders 1371, 1372 and 1373 | 74LS138, National Semiconductor |
| Operational amplifiers 1378, 1384 and 1389 | 8043CPE, Intersil |
| Capacitors 1379, 1385 and 1391 | 0.001 μf, Type 25B, S & EI |
| Switches 1375, 1381 and 1387 | DG201, Siliconix |

The control logic 1331 illustrated in FIG. 51 is more fully illustrated in FIG. 56. The oscillator 1401 is a 10 MHz oscillator in the preferred embodiment of this invention. The output signal 1402 from the oscillator 1401 is supplied as a clock input to the counter 1403, the counter 1404, the holding register 1405 and the frequency divider 1407. The counter 1403 acts as a frequency divider to divide the 10 Mhz output signal 1402 from the oscillator 1401 down to a 18.125 KHz signal 1411. Signal 1411 corresponds to the clock signal having a period of 12.8 microseconds illustrated in FIG. 53.

The frequency divider 1407, which is a plurality of counters, acts to divide the 10 MHz signal 1402 down to a 2 KHz signal 1412. The 2 KHz signal 1412 is supplied from the frequency divider 1407 to the counter 1414. In response to the 2 KHz signal 1412, the counter 1414 provides a plurality of output signals having different periods. Signal 1416 from the counter 1414 has a period of 8 milliseconds; signal 1417 has a period of 4 milliseconds; signal 1418 has a period of 2 milliseconds and signal 1419 has a period of 1 millisecond. Signals 1416–1419 from the counter 1414 are supplied as inputs to the multiplexer 1421. One of the signals 1416–1419 is selected by the multiplexer 1421 to be supplied as the sample rate clock 1423. The sample rate clock 1423 corresponds to the sample rate clock signal illustrated in FIG. 53.

Signal 1419, having a period of 1 millisecond, is also supplied to the frequency divider 1425. The frequency divider divides the signal 1419, which has a frequency of 1000 Hz, by 10 to provide an output signal 1426 having a frequency of 1000 Hz. Signal 1426 is utilized to provide line markings for recorder 1321 and recorder 1322 illustrated in FIG. 51.

The plurality of output signals 1431 from the counter 1404 are supplied as inputs to the ROM 1432. The plurality of outputs 1435 from the ROM 1432 are provided to the holding register 1405. From the holding register 1405, the plurality of outputs 1437 from the ROM 1432 are provided as control signals for the data display system illustrated in FIG. 51.

The plurality of output signals 1431 from the counter 1404 are also supplied as inputs to the ROM 1433. The plurality of output signals 1438 from the ROM 1433 are provided as inputs to the data input of the counter 1404. The counter 1404 is also supplied with a signal 1439 which is representative of a command to load the data represented by the signal lines 1438 into the counter 1404. The counter 1404 is also supplied with a clear input 1441 from the ROM 1432.

The ROM 1432 is programmed to provide required output signals in response to the count input from the counter 1404. Each time the counter 1404 reaches a specified count, the ROM 1432 will drive one of the output signals 1435 either high or low as required to control the data display system illustrated in FIG. 51. The particular control signals output from the ROM 1432 will be repeated as the counter recycles each time. In this manner, the large number of clock and control signals which are required to control the data display system and particularly the CCD memory 1307, illustrated in FIG. 51, can be provided.

The ROM 1433 is provided to allow the counter 1404 to skip portions of the count. This feature is utilized when it is desired to speed up certain operations of the CCD memory 1307. A portion of the count may be skipped simply by programming the ROM 1433 to command the counter 1404, by means of data lines 1438, to skip a certain count when a specified count is reached by the counter 1404. For instance, the read only memory 1433 could be programmed to cause counter 1404 to skip to a count of 80 when a count of 10 is output from the counter 1404.

Commercially available components which can be utilized in the circuit illustrated in FIG. 56 are as follows:

| | |
|---|---|
| Oscillator 1401 | 10 MHz oscillator K1091A, Motorola |
| Counter 1404 | 74LS163 (2 required) National Semiconductor |
| Counter 1403 | 74LS161 (2 required) National Semiconductor |
| Read only memories 1432 and 1433 | 82S129, Signetics |
| Holding registers 1405 | 74LS174, National Semiconductor |
| Frequency divider 1407 | 74LS161 (4 required) National Semiconductor |
| Counter 1414 | 74LS161, National Semiconductor |
| Multiplexer 1421 | 74LS153, National Semiconductor |
| Frequency divider 1425 | 9319, Fairchild |

The data display control 1326, illustrated in FIG. 51, is more fully illustrated in FIG. 57. Signal 1320 from the D/A converter 1316, illustrated in FIG. 51, is provided as an input to the amplifier 1451. The amplifier 1451 provides an output signal 1452, representative of the seismic data from the RTUs, to the Y input of the CRT monitor 1329, illustrated in FIG. 51.

Signal 1411 from the counter 1403, illustrated in FIG. 56, is supplied as an input to the counter 1453. Signal 1411 has a period of 12.8 microseconds. In response to the input signal 1411, the counter 1453 provides a plurality of output signals which are represented as signal 1454. The output signals from the counter 1453 are provided as inputs to the comparator 1456, the digital gain ranger 1458, the comparator 1459 and the register 1461. The output 1463 from the comparator 1459 is provided as a clock signal to the register 1461. The plurality of outputs from the register 1461, which are designated as signal lines 1464, are provided as inputs to the comparator 1459 and to the ROM 1466.

As has been previously stated, data is output from the D/A converter 1316, illustrated in FIG. 51, as channel 1, sample 1; channel 2, sample 1; channel 3, sample 1; etc. until sample 1 of the last channel has been read from the D/A converter 1316. Signal 1454, illustrated in FIG. 57, is representative of the particular channel which is being read from the D/A converter 1316. Thus, the A input to the comparator 1459 will be representative of the channel count. The output from the comparator 1459 is used as the clock signal 1463 for the register 1461. The register 1461 is also supplied with the channel count signal 1454.

As an example of the operation of comparator 1459 and register 1461, consider a seismic exploration system having only three channels. When the D/A converter 1316 provides sample 1 of channel 1 as an output, the channel indicator signal 1454 will be representative of a 1. This 1 is provided to the A input of the comparator 1459. However, the B input of the comparator 1459 will still be at zero because the register has not been clocked to provide the channel count signal 1454 to the comparator 1459. Thus, the A input will be greater than the B input and the clock signal 1463 will enable the register 1461 to transfer the input count represented by the channel count signal 1454 to the B input of the comparator 1459. The A input will be equal to the B input after this transfer occurs.

When sample 1 of channel 2 is output from the D/A converter 1316, the A input to the comparator 1459 will go to 2. The A input will again be greater than the B input and the clock signal 1463 will allow the register 1461 to load the count signal 1454 into the B input of the comparator 1459. When this is done, the A input will again equal the B input. When sample 1 of channel 3 is output from the digital-to-analog converter 1316, the A input of the comparator 1459 will go to 3. Again, the A input will be greater than the B input and the clock signal 1463 will enable the register 1461 to load the channel count signal 1454 into the B input of the comparator 1459. This will again cause the A input to be equal to the B input.

After sample 1 of channel 3 has been read from the digital-to-analog converter 1316, sample 2 of channel 1 will be output from the digital-to-analog converter 1316 and the channel count signal 1454 will return to a count of 1. It is noted that the A input will not again be greater than the B input and the output signal 1464 from the register 1461 will thus be representative of the maximum number of channels that are being supplied from the RTUs. In response to signal 1464, the read only memory 1466 provides a plurality of output signals 1467, which are representative of the number of channels available, to the digital gain ranger 1458.

The digital gain ranger 1458 prepares the sweep signal, represented by the channel count signal 1454, for the automatic gain control (AGC) circuit 1471. If the output from the digital gain ranger 1458 is always supplied to the least significant bits inputs of the D/A converter 1472, the output from the D/A converter 1472 will have a dynamic range which is too great for the AGC circuit 1471 because the output level from the D/A converter 1472 would be a function of the number of channels of data being provided to the data display system. The digital gain ranger 1458 serves to overcome this dynamic range problem by controlling the manner in which the channel count signal 1454 is provided to the D/A converter 1472. If only a few channels of data are available, the channel count signal 1454 is supplied to the most significant bit input of the D/A converter 1472 in response to the control signal 1467 from the read only memory 1466. The digital gain ranger 1458 essentially consists of a plurality of gates which are controlled by the output signals 1467 from the read only memory 1466 to enable the channel count signal to be provided to specific inputs of the D/A converter 1472. By using the most significant bit inputs of the D/A converter 1472, a signal having a dynamic range compatible with the input requirements of the AGC circuit 1471 is provided.

It is desirable to completely fill the screen of the CRT regardless of the number of channels of data available. To accomplish this, the voltage swing of the sweep voltage must be the same whether a few channels of data are available or whether 72 channels are available. This is accomplished by using the AGC circuit 1471 to provide a constant voltage swing in response to the output signal 1473 from the D/A converter 1472 in order to provide a constant sweep voltage 1470 to the CRT monitor 1329 illustrated in FIG. 51.

The input to the CRT monitor 1329 is utilized to highlight a particular data channel of interest. This is accomplished by providing the channel count signal 1454 to the B input of the comparator 1456. A second input 1474, representative of the desired channel for enhancement, is supplied to the A input of the comparator 1456. In the preferred embodiment of the present invention, the signal 1474 is provided by means of a thumbwheel switch. When the channel count signal 1454 is equal to signal 1474, the output signal 1475 from the comparator 1456 is enabled. Signal 1475 is provided to the DC-to-DC converter 1476 which provides an output signal 1478 to the Z input of the CRT monitor 1329.

Commercially available components which can be utilized in the circuit illustrated in FIG. 57 are as follows:

| | |
|---|---|
| Amplifier 1451 | TL084CN, Texas Instruments |
| Counter 1453 | 74LS193, National Semiconductor |
| Comparators 1456 and 1459 | 74LS85, National Semiconductor |
| Register 1461 | 74LS175, National Semiconductor |
| Read only memory 1466 | 82S129, Signetics |
| Digital gain ranger 1458 | 74LS368 (5 required) National Semiconductor |
| D/A converter 1472 | DAC100, Precision Monolithics |
| DC-to-DC converter 1476 | UD5-15D45, Semiconductor Circuits, Inc. |

The AGC circuit 1471 illustrated in FIG. 57 is more fully illustrated in FIG. 58.

Signal 1473 from the D/A converter 1472, illustrated in FIG. 57, is provided to the full-wave rectifier 1481 and is also supplied as one input to the multiplier 1485. The output from the full-wave rectifier 1481 is provided to the integrator 1482. The output signal 1480 from the integrator 1482 is supplied as one input to the divider 1483. The divider 1483 is also supplied with a reference voltage 1484 as an input. The reference voltage 1484 is divided by the output from the integrator 1482 to provide an output signal 1486 from the divider 1483 which is provided as the second input to the multiplier 1485. The output from the multiplier 1485 is signal 1470 which has been previously illustrated and described in FIG. 57.

As the signal strength of signal 1473 increases, the signal level of signal 1486 decreases because signal 1473 is essentially being divided into the reference voltage 1484 to provide signal 1486. In like manner, when the signal strength of signal 1473 decreases, the signal strength of signal 1486 increases. In this manner, a substantially constant sweep signal 1470 can be provided to the CRT monitor 1329 illustrated in FIG. 51.

An AD 532, manufactured by Analog Devices, can be utilized for the divider 1483 and the multiplier 1485. A circuit which can be utilized for the full-wave rectifier 1481 and the integrator 1482, illustrated in FIG. 58, is illustrated in FIG. 59.

Referring now to FIG. 59, signal 1473 is supplied to the inverting input of operational amplifier 1491. The output of the operational amplifier1491 is tied to ground through the diode 1492 and the resistor 1493. The noninverting input of the operational amplifier 1491 is also tied to ground through resistor 1493. The output from the operational amplifier 1491 is also tied to the inverting input of the operational amplifier 1495 through diode 1496 and resistor 1497. The noninverting input of the operational amplifier 1495 is tied to ground through resistor 1498. The output from the operational amplifier 1495, which forms signal 1480 as illustrated in FIG. 58, is fed back to the inverting input of the operational amplifier 1495 through the parallel combination of resistor 1499 and capacitor 1501. The output signal 1480 from the operational amplifier 1495 is also fed back to the inverting input of operational amplifier 1491 through resistor 1502.

Commercially available components which can be utilized in the circuit illustrated in FIG. 59 are as follows. Resistance and capacitance values are also given.

| | |
|---|---|
| Operational amplifier 1491 and 1495 | TL084CN, Texas Instruments |
| Diodes 1492 and 1496 | IN914, Fairchild |
| Resistors 1473, 1497 and 1498 | 10 K ohms, ⅛W, 1%, RN55D, Dale |
| Resistor 1493 | 6.49 K ohms, ⅛W, 1%, RN55D, Dale |
| Resistor 1502 | 15 K ohms, ¼W, 1%, RN60D, Dale |
| Resistor 1499 | 22 megohms, 5%, ¼W, TRW/IRC, Type MEH |
| Capacitor 1501 | 0.1 microfarads, UR2020SX7R, Mepco/Electra |

The CRS countdown circuit 65, illustrated in FIG. *2a*, is more fully illustrated in FIG. 60. The CRS countdown circuit 65 is utilized to provide status and interrupt signals to the 6800 microprocessor which is illustrated as computer means 51 in FIG. *2a*. The status and interrupt signals provided from the CRS countdown circuit 65 are provided in response to an address and command from the 6800 microprocessor. Essentially, the CRS countdown circuit 65 is utilized to prevent operation of the 6800 microprocessor from being completely halted by a failure of some part of the seismic exploration system illustrated in FIGS. *2a* and *2b*. The 6800 microprocessor loads the CRS countdown circuit 65 with the time required for an operation. The CRS countdown circuit 65 provides interrupt and status signals at the end of that time.

Referring now to FIG. 60, the address and commands from the 6800 microprocessor which enable the CRS countdown circuit 65, illustrated in FIG. *2a*, are provided to the decoding circuit 2201. In response to the address and commands from the 6800 microprocessor, the decoding circuit 2201 provides an enabling signal 2213 to the counter 2202, an enabling signal 2214 to the counter 2203, an enabling signal 2211 to the enabling circuit 2204 and an enabling signal 2212 to the output circuit 2205. The counter 2202 is utilized to generate a 1 millisecond clock signal 2215 from the 1 microsecond $\phi 2$ clock signal of the 6800 microprocessor. The 1 millisecond clock signal 2215 from the counter 2202 is provided as a clock signal to the counter 2203.

The data lines from the 6800 microprocessor are utilized to load the time required for an operation into the CRS countdown circuit 65, illustrated in FIG. 60. The data lines are supplied to the inverting circuit 2206. The inverting circuit 2206, which is essentially a group of 74SO4 inverters supplied by National Semiconductor, supplies the data lines from the 6800 microprocessor to the counter 2203 by means of signal line 2217. The counter 2203 counts up to the time which has been loaded by means of the data lines from the 6800 microprocessor. When the counter 2203 reaches the specified count, an output signal 2219 is supplied to the output circuit 2205 and the enabling circuit 2204 from the counter 2203. In response to the enabling signal 2211 from the decoding circuit 2201 and the output from the counter 2203, the enabling circuit 2204 in turn enables the output circuit 2205, by means of signal line 2221, to provide the interrupt signal 2207 and the status signal 2208 to the 6800 microprocessor. The interrupt signal 2207 is provided to the 6800 microprocessor by means of the interrupt request (IRQ) line. The status signal 2208 is provided to the 6800 microprocessor by means of the D7 data line.

The enabling circuit 2204 also supplies an enabling signal 2222 to the counter 2202. The output 2220 from the output circuit 2205 is tied to the enabling circuit 2204.

The decoding circuit 2201, illustrated in FIG. 60, is more fully illustrated in FIG. 61. Referring to FIG. 61, the A7 address line from the 6800 microprocessor is supplied through inverter 2224 as a first input to the NAND gate 2225. The A6 address line from the 6800 microprocessor is supplied through inverter 2226 as a second input to the NAND gate 2225. The A4 and A5 address lines from the 6800 microprocessor are supplied directly, as third and fourth inputs respectively, to the NAND gate 2225. The output from the NAND gate 2225 is supplied through inverter 2227 as a first input to the AND gate 2228. The input/output (I/O) line from the 6800 microprocessor is supplied as a second input to the AND gate 2228. The output from the AND gate 2228 is supplied as a first input to both NAND gate 2229 and NAND gate 2230.

The A3 address line from the 6800 microprocessor is supplied as a first input to the AND gate 2231. The A2 address line from the 6800 microprocessor is supplied through inverter 2232 as a second input to the AND gate 2231. The output from the AND gate 2231 is supplied as a second input to both NAND gates 2229 and 2230.

The $\phi 2$ clock from the 6800 microprocessor is supplied through inverters 2234 and 2235 as a third input to both the NAND gate 2229 and the NAND gate 2230. The $\phi 2$ clock from the 6800 microprocessor is also supplied through inverters 2234 and 2235 as the output signal 2213A which forms a part of signal 2213 illustrated in FIG. 60.

The read/write (R/$\overline{W}$) signal from the 6800 microprocessor is supplied through inverter 2237 as a fourth input to the NAND gate 2230. The (R/$\overline{W}$) signal is also supplied through the inverter 2237 and inverter 2238 as a fourth input to the NAND gate 2229. The output from the NAND gate 2229 is provided to the A-select input of the decoder 2241. The output of the NAND gate 2230 is supplied to the YO input of the decoder 2241.

The A0 address line from the 6800 microprocessor is supplied through inverter 2242 to the B-select input of the decoder 2241 and the Y1 output of the decoder 2241. The A0 address line from the 6800 microprocessor is also supplied through inverter 2242 as the output signal 2214A which forms a part of signal 2214 illustrated in FIG. 60.

The A1 address line from the 6800 microprocessor is supplied through inverter 2243 to the C-select input and the Y2 port of the decoder 2241. The reset (RST) signal from the 6800 microprocessor is supplied through 2244 and 2245 as a first input to the AND gate 2246. The reset signal output from inverter 2245 is also provided as the output signal 2214D, which forms a part of signal 2214 illustrated in FIG. 60; output signal 2211E, which forms a part of signal 2211 illustrated in FIG. 60; and output signal 2212C, which forms a part of signal 2212 illustrated in FIG. 60.

The Y7 output from the decoder 2241 is provided as the output signal 2211A, which forms a part of signal 2211 illustrated in FIG. 60 and is also provided as the output signal 2212A which forms a part of signal 2212 illustrated in FIG. 60. The Y3 output from the decoder 2241 is provided as the output signal 2211B which also forms a part of signal 2211 illustrated in FIG. 60. The Y5 output from the decoder 2241 is provided as a first input to the AND gate 2248. The Y6 output from the decoder 2241 is provided as a second input to the AND gate 2246 and as a second input to the AND gate 2248. The Y6 output from the decoder 2241 is also provided as the output signal 2214B which forms a part of signal 2214 illustrated in FIG. 60. The output signal from the AND gate 2248 forms three output signals 2211C, 2212B and 2214C with the output signal 2211C forming a part of signal 2211, illustrated in FIG. 60, the output signal 2212B forming a part of signal 2212 illustrated in FIG. 60, and the output signal 2214C forming a part of signal 2214 illustrated in FIG. 60. The output signal from the AND gate 2246 also provides two output signals 2211D and 2213B. Signal 2211D forms a part of signal 2211, illustrated in FIG. 60, while signal 2213B forms a part of signal 2213 illustrated in FIG. 60.

Commercially available components which can be utilized in the circuit illustrated in FIG. 61 are as follows:

| | |
|---|---|
| Inverters 2224, 2226, 2227, 2232, 2234, 2235, 2237, 2238, 2242, 2243, 2244 and 2245 | 74LS04, National Semiconductor |
| NAND gates 2225, 2229 and 2230 | 74LS20, National Semiconductor |
| AND gates 2228, 2231, 2248 and 2246 | 74LS08, National Semiconductor |
| Decoder 2241 | 74LS139, National Semiconductor |

The counter 2203, illustrated in FIG. 60, is more fully illustrated in FIG. 62.

Signal 2214C, which is illustrated in FIG. 61, is provided as an input to the count/load input of the counter 2256 and to the count/load input of the counter 2257. Signal 2214A, which is illustrated in FIG. 61, is provided through inverter 2258 to the select input of the data selector 2253 and the data selector 2254. Signal 2214B, which is illustrated in FIG. 61, is provided as an input to the count/load input of the counter 2251 and the counter 2252. Signal 2215, which is illustrated in FIGS. 60 and 64 is provided as an input to the first clock input of the counter 2251. The $\overline{D7}$–$\overline{D4}$ data lines, which are illustrated in FIG. 62, are provided to the A-D data inputs of the counter 2251 and to the A1–A4 data inputs of the data selector 2253. The D3–D0 data lines which are illustrated in FIG. 60 are provided to the A–D data inputs of the counter 2252 and to the A1–A4 data inputs of the data selector 2254. The reset signal 2214D, which is illustrated in FIG. 61, is provided to the clear input of the counters 2251, 2252, 2256 and 2257.

The second clock input of the counter 2251 is tied to the $Q_a$ data output of the counter 2251. The first clock input of the counter 2252 is tied to the $Q_d$ data output of the counter 2251. The second clock input of the counter 2252 is tied to the $Q_a$ data output of the counter 2252. The $Q_d$ output of the counter 2252 is tied to the first clock input of the counter 2256.

The strobe input of both the data selector 2253 and the data selector 2254 is tied to ground. The D1-D4 inputs of both the data selector 2253 and the data selector 2254 are tied to the +5 volt power supply 2259 through resistor 2261. The Y1–Y4 data outputs from the data selector 2253 are tied to the A–D data inputs of the counter 2256. The Y1–Y4 data outputs from the data selector 2254 are tied to the A–D data inputs of the counter 2257.

The second clock input of the counter 2256 is tied to the $Q_a$ output of the counter 2256. The first clock input of the counter 2257 is tied to the $Q_d$ output of the counter 2256. The second clock input of the counter 2257 is tied to the $Q_a$ output of the counter 2257. The $Q_d$ output of the counter 2257 is provided to inverter 2262 as signal 2219 which is illustrated in FIG. 60.

The D0–D7 data lines, from the 6800 microprocessor, are utilized to load the counters 2252 and 2251 with the time required for an operation. The counters 2251 and 2252, together with the data selectors 2253 and 2254 and counters 2256 and 2257, are enabled by the output signals from the decoding circuit 2201 which is illustrated in FIG. 61. The clock signal for the counting circuit 2203 is provided from the counter 2202.

Commercially available components which can be utilized in the circuit illustrated in FIG. 62 are as follows:

| | |
|---|---|
| Counters 2251, 2252, 2256 and 2257 | 74LS197, National Semiconductor |
| Data selectors 2253 and 2254 | 74LS158, National Semiconductor |
| Resistor 2261 | 10 K ohms, RN55D, Dale |
| Inverter 2262 | 74LS04, National Semiconductor |

The counter 2202, illustrated in FIG. 60, is more fully illustrated in FIG. 63. Signal 2222A, which is illustrated in FIG. 64, is provided to both the count enable parallel (CEP) input and the count enable trickle (CET) input of the counter 2265. The signal 2222A is also provided to the CEP input of the counter 2266 and the CEP input of the counter 2267. The signal 2222B, which is illustrated in FIG. 64, is provided to the parallel enable PE input of the counters 2265, 2266 and 2267. The signal 2213A, which is illustrated in FIG. 61, is provided to the clock input of the counters 2265, 2266 and 2267. The signal 2213B, which is illustrated in FIG. 61, is provided to the clear input of the counters 2265, 2266 and 2267. The terminal count (TC) output from the counter 2265 is tied to the CET input of the counter 2266. The TC output from the counter 2266 is provided to the CET input of the counter 2267. The TC output from the counter 2267 is provided as the output signal 2215 which is illustrated in FIG. 60.

As has been previously stated, the counters illustrated in FIG. 63 are utilized to generate a 1 millisecond clock signal 2215 from the 1 microsecond $\phi 2$ clock signal of the 6800 microprocessor. An integrated circuit which may be used for counters 2265, 2266 and 2267 is the 93L10 manufactured by Fairchild Semiconductor.

The enabling circuit 2204, illustrated in FIG. 60, is more fully illustrated in FIG. 64. Signal 2211C, which is illustrated in FIG. 61, is provided to the set input of the flip-flop 2071. The D input of the flip-flop 2271 is grounded. Signal 2219, which is illustrated in FIG. 60 and FIG. 62, is provided to the clock input of the flip-flop 2271. Signal 2211B, which is illustrated in FIG. 61, is provided as a first input to the AND gate 2272. Signal 2211E, which is also illustrated in FIG. 61, is provided as a second input to the AND gate 2272. The output from the AND gate 2272 is provided to the reset input of the flip-flop 2271. The Q output from the flip-flop 2271 is provided as the output signal 2221, which forms a part of the output signal 2221 illustrated in FIG. 60 and is also provided as the output signal 2222A which forms a part of signal 2222 illustrated in FIG. 60.

The set input of the flip-flop 2273 is tied to the +5 volt power supply 2274 through the resistor 2275. The +5 volt power supply 2274 also provides the output signal 2222B through the resistor 2275. Signal 2222B forms a part of the output signal 2222 illustrated in FIG. 60. Signal 2220, which is illustrated in FIGS. 60 and 65, is provided to the D input of the flip-flop 2273. Signal 2211A, which is illustrated in FIG. 61, is provided to the clock input of the flip-flop 2273. Signal 2211D, which is illustrated in FIG. 61, is provided to the reset input of the flip-flop 2273. The $\overline{Q}$ output from the flip-flop 2273 is provided as the output signal 2221B which forms a part of signal 2221 illustrated in FIG. 60.

Commercially available components which can be utilized in the circuit illustrated in FIG. 64 are as follows:

| | |
|---|---|
| Flip-flops 2271 and 2273 | 74LS74, National Semiconductor |
| AND gate 2272 | 74LS08, National Semiconductor |
| Resistor 2275 | 10 K ohms, RN55D, Dale |

The output circuit 2205, illustrated in FIG. 60, is more fully illustrated in FIG. 65. Signal 2212A, which is illustrated in FIG. 61, is provided through the inverter 2286 to the enabling input of the tri-state buffer 2287. The set input of the flip-flop 2281 is tied to the +5 volt power supply 2280 through the resistor 2282. The signal 2221A, which is illustrated in FIG. 65, is provided to the D input of the flip-flop 2281. The signal 2219, which is illustrated in FIG. 60, is provided to the clock input of the flip-flop 2281. Signal 2221B, which is illustrated in FIG. 65, is provided as a first input to the AND gate 2283. Signal 2212C, which is illustrated in FIG. 61, is provided as a second input to the AND gate 2283. The output from the AND gate 2283 is tied as a first input to the AND gate 2283. Signal 2212B, which is illustrated in FIG. 61, is provided as a second input to the AND gate 2284. The output from the AND gate 2284 is tied to the reset input of the flip-flop 2281.

The Q output from the flip-flop 2281 is utilized as the output signal 2220 and is also provided through the tri-state buffer 2287 as the output signal 2208 which is illustrated in FIG. 60. The $\overline{Q}$ output from the flip-flop 2281 is provided through the tri-state buffer 2289 as the output signal 2207 which is illustrated in FIG. 60. The $\overline{Q}$ output from the flip-flop 2281 is also provided through inverter 2288 to the enabling input of the tri-state buffer 2289.

Commercially available components which can be utilized in the circuit illustrated in FIG. 65 are as follows:

| | |
|---|---|
| AND gates 2283 and 2284 | 74LS08, National Semiconductor |
| Flip-flop 2281 | 74LS74, National Semiconductor |
| Resistor 2282 | 10 K ohms, RN55D, Dale |
| Inverters 2286 and 2288, and Tri-state buffers 2287 and 2289 | DM8097, National Semiconductor |

The switch and display interface 43 and the portion of the operator and display panel 41 which is related to the switch and display interface 43, both of which are illustrated in FIG. 2a, are more fully illustrated in FIG. 66. Referring now to FIG. 66, the address and command lines from the 6800 microprocessor are supplied as inputs to the address and command decoding and buffering circuit 2401. In response to the address and commands from the 6800 microprocessor, the address and command decoding and buffering circuit 2401 provides a plurality of output signals which are utilized to control the functions of the switch and display interface 43 and the portion of the operator control and display panel 41 which is related to the switch and display interface 43. In response to the address and commands from the 6800 microprocessor, the address and command decoding and buffering circuit 2401 provides control signals to the select inputs of the one-of-eight decoders 2402–2404, an enabling signal to the enabling inputs of buffers 2406 and 2407, and a plurality of output signals to the enable input (E), the chip select 2 input (CS2), the register select 0 (RS0) and 1 (RS1), and the read/write (R/$\overline{W}$) input of the peripheral interface adapter 2409.

In response to the output signal from the address and command decoding and buffering circuit 2401, the one-of-eight decoder 2402 provides a plurality of enabling outputs to a plurality of thumbwheel switches which are located on the operator control and display panel 41 illustrated in FIG. 2a. The thumbwheel switches 2411 provide one means by which the operator can provide commands and data to the 6800 microprocessor. Data from the thumbwheel switches 2411 is provided to the output of the buffer 2406.

In response to the output signals from the address and command decoding and buffering circuit 2401, the one-of-eight decoder 2403 provides a plurality of enabling signals to the rotary switches 2412 which are located on the operator control and display panel 41 illustrated in FIG. 2a. The plurality of rotary switches 2412 provides another means by which the operator can supply data and commands to the 6800 microprocessor. Data from the rotary switches is provided from the data output of the rotary switches 2412 to the input of the buffer 2406.

The output from the buffer 2406 is tied to the D0–D7 data lines of the peripheral interface adapter 2409. The output from the buffer 2406 is also supplied to the input of the buffer 2407 and to the input of the buffer 2414. By means of the buffer 2406, data can be transferred from the thumbwheel switches 2411 and the rotary switches 2412 to the data input of the peripheral interface adapter 2409 and to the input of the buffer 2407. The output of the buffer 2407 is tied to the 6800 microprocessor data lines. The buffer 2407 provides a means by which the bidirectional data lines of the 6800 microprocessor can be tied to the thumbwheel switches 2411 and the rotary switches 2412 as well as the D0–D7 data lines of the peripheral interface adapter 2409.

In response to the output signal from the address and command decoding and buffering circuit 2401, the one-of-eight decoder 2404 provides a plurality of enabling signals to the enabling inputs of the display 2416. The display 2416 is made up of a plurality of light emitting diode, numeric displays. The output from the buffer 2414 is tied to the data input of the display 2416. The buffer 2414 provides a means by which the data from the thumbwheel switches 2411 or the rotary switches 2412 can be displayed at the display 2416. Data from the 6800 microprocessor can also be displayed at the display 2416. The display 2416 is located in the operator control and display panel 41 illustrated in FIG. 2*a*.

The reset line from the 6800 microprocessor is tied to the reset input of the peripheral interface adapter 2409. The interrupt line from the 6800 microprocessor is tied to the A and B interrupt inputs of the peripheral interface adapter 2409.

A plurality of pushbutton switches 2418 may be utilized to provide data from the operator to the peripheral interface adapter 2409. The data output of the switches 2418 are provided to the input of the encoder circuit 2419. The output of the encoder circuit 2419 is provided to section A of the peripheral data lines of the peripheral interface adapter 2409. Data appearing on the peripheral data lines of the peripheral interface adapter 2409 may be transferred to the 6800 microprocessor by means of the D0–D7 data lines of the peripheral interface adapter 2409. The data appearing on the peripheral data lines of the peripheral interface adapter 2409 may also be displayed on the display 2416 if desired.

Essentially, the circuit illustrated in FIG. 66 provides a means by which the operator can use a plurality of switches to transfer data and commands to the 6800 microprocessor. These data and commands may be displayed by the operator is desired and also data from the 6800 microprocessor may be displayed if desired. Addresses and commands from the 6800 microprocessor are utilized to enable the thumbwheel switches 2411 and the rotary switches 2412. The switches 2418 are always in an enabled condition. Thus, the circuit illustrated in FIG. 66 provides a means by which the operator can control operation of the seismic exploration system illustrated in FIGS. 2*a* and 2*b* by means of a plurality of switches which are available at the operator control and display panel 41 illustrated in FIG. 2*a*.

Commercially available components which can be used in the circuit illustrated in FIG. 66 are as follows:

| | |
|---|---|
| Decoders 2402, 2403 and 2404 | 74LS138, National Semiconductor |
| Buffer 2406 | 340098, Fairchild |
| Buffer 2414 | 74LS365, National Semiconductor |
| Buffer 2407 | 74LS367, National Semiconductor |
| Peripheral interface adapter 2409 | M6820, Motorola Semiconductor |
| Thumbwheel switches 2411 | Series 19000, Digitran |
| Rotary switches 2412 | Type 50A90, Grayhill |
| Pushbutton switches 2418 | 101SN11, Microswitch |
| Display 2416 | 5082-7300, Hewlett-Packard |
| Encoder 2419 | 93L18, Fairchild Semiconductor |

The address and command decoding and buffering circuit 2401, illustrated in FIG. 66, is more fully illustrated in FIG. 67. Referring now to FIG. 67, the E1 and E2 enabling inputs of the buffer 2421 are both tied to ground. The $\phi 2$ clock signal from the 6800 microprocessor is tied to the A1 address input of the buffer 2421. The read/write ($R/\overline{W}$) signal from the 6800 microprocessor is tied to the A2 address input of the buffer 2421. The A2 address line from the 6800 microprocessor is tied to the A3 address input of the buffer 2421. The A3 address line from the 6800 microprocessor is tied to the A4 address input of the buffer 2421. The A1 address line from the 6800 microprocessor is tied to the A5 address input of the buffer 2421. The A0 address line from the 6800 microprocessor is tied to the A6 address input of the buffer 2421.

The Y1 output from the buffer 2421 is supplied as a first input to the NAND gate 2422 and as a first input to the NAND gate 2423. The Y1 output from the buffer 2421 is also supplied to the enabling input of the peripheral interface adapter 2409 illustrated in FIG. 66. The Y2 data output from the buffer 2421 is supplied to the read-write ($R/\overline{W}$) input of the peripheral interface adapter 2409. The Y2 output from the buffer 2421 is also supplied to the decoder 2404 illustrated in FIG. 66 and is supplied to the first input to the NAND gate 2424. The Y3 output from the buffer 2421 is supplied as a input to both decoders 2402 and 2403, illustrated in FIG. 66, and is supplied as a first input to the NOR gate 2425. The Y4 output from the buffer 2421 is supplied as an input to both decoder 2402 and 2403 and is supplied as a second input to the NAND gate 2422. The Y5 output from the buffer 2421 is supplied to the register select 1 (RS1) input of the peripheral interface adapter 2409. The Y6 output from the buffer 2421 is tied to the read select 0 (RS0) input of the peripheral interface adapter 2409.

The A4 address line from the 6800 microprocessor is tied to the input of the inverter 2427. The output of the inverter 2427 is supplied as a third input to the NAND gate 2422 and is supplied through inverter 2428 as a second input to the NAND gate 2423.

The first input of the NAND gate 2429 is tied to the +5 volt power supply 2431 through the resistor 2432. The A5 address line from the 6800 microprocessor is supplied as a second input to the NAND gate 2429 through inverter 2433. The input/output (I/O) line from the 6800 microprocessor is supplied as a third input to the NAND gate 2429. The A6 address line from the 6800 microprocessor is supplied as a first input to the NOR gate 2434. The A7 address line from the 6800 microprocessor is supplied as a second input to the NOR gate 2434. The output from the NOR gate 2434 is supplied as a forth input to the NAND gate 2429. The output from the NAND gate 2429 is supplied through inverter 2435 as a fourth input to the NAND gate 2422 and as a third input to the NAND gate 2423. The fourth input of the NAND gate 2423 is tied to the +5 volt power supply 2436 through the resistor 2437.

The output of the NAND gate 2422 is supplied to the decoder 2404 illustrated in FIG. 66. The output from the NAND gate 2422 is also supplied as a first input to the NAND gate 2438 and as a second input to the NOR gate 2425. The output from the NAND gate 2423 is supplied as a second input to the NAND gate 2438 and is also supplied to the decoders 2402 and 2403 illustrated in FIG. 66.

The output of the NAND gate 2438 is supplied as a second input to the NAND gate 2424. The output of the NAND gate 2424 is supplied to the buffer 2407 illustrated in FIG. 66 and is also supplied through the inverter 2441 as a first input to the NAND gate 2442. The output of the NOR gate 2425 is supplied as a second input to the NAND gate 2442 through the inverter 2444. The output of the NOR gate 2425 is also tied to the chip select 2 (CS2) input of the peripheral interface adapter 2409 through the inverter 2444. The output of the NAND gate 2442 is supplied to the buffer 2406 illustrated in FIG. 66.

Commercially available components which can be utilized in the circuit illustrated in FIG. 67 are as follows:

| | |
|---|---|
| Buffer 2421 | 74LS365, National Semiconductor |
| Inverters 2427, 2428, 2433, 2435, 2444 and 2441 | 74LS04, National Semiconductor |
| NOR gates 2434 and 2425 | 74LS02, National Semiconductor |
| NAND gates 2429, 2423 and 2422 | 74LS20, National Semiconductor |
| NAND gates 2438, 2424 and 2442 | 74LS00, National Semiconductor |
| Resistors 2437 and 2432 | 5.1 K ohms, RN55D, Dale |

The roll-along panel interface 37 and the portion of the operator control and display panel 41 which is related to the roll-along panel interface 37, both of which are illustrated in FIG. *2a*, are more fully illustrated in FIG. 68. The roll-along display panel on the operator control and display panel provides visual identification of the programmed spread configuration for the seismic exploration system of the present invention. The data lines from the 6800 microprocessor are utilizied to drive LED displays and an alphanumeric display to provide the desired information.

Referring now to FIG. 68, the D0–D7 data lines from the 6800 microprocessor are supplied to the input side of the buffer 2451. The buffer data lines from the 6800 microprocessor are supplied from the output of the buffer 2451 to the input of the driver 2452. From the output of the driver 2452, the data lines from the 6800 microprocessor are supplied to the alphanumeric display 2453 and also to the light-emitting diode (LED) driver 2454. From the LED driver 2454, the data lines from the 6800 microprocessor are supplied to a plurality of light-emitting diodes located in the LED display 2455. The data lines from the 6800 microprocessor are utilized to drive both the alphanumeric display 2453 and the light-emitting diode located in the LED display 2454.

The A0 address line from the 6800 microprocessor is supplied through inverter 2457 to the A0 input of the register 2458. The A1 address line from the 6800 microprocessor is supplied to the A1 input of the register 2458 through inverter 2459. The A2 address line from the 6800 microprocessor is supplied through inverter 2461 to the A2 input of the register 2458. The A3 address line from the 6800 microprocessor is supplied through inverter 2462 as a first enabling input to the register 2458. The A4 address line from the 6800 microprocessor is supplied through inverter 2463 as a second enabling input to the register 2458.

The $\phi$2 clock signal from the 6800 microprocessor is supplied as a first input to the NAND gate 2464. The input/output (I/O) line from the 6800 microprocessor is supplied as a second input to the NAND gate 2464. The read/write (R/$\overline{W}$) line from the 6800 microprocessor is supplied as a third input to the NAND gate 2464. The A7 address line from the 6800 microprocessor is supplied through inverter 2465 as a fourth input to the NAND gate 2464. The A6 address line from the 6800 microprocessor is supplied as a fifth input to the NAND gate 2464. The A5 address line from the 6800 microprocessor is supplied through the inverter 2466 as a sixth input to the NAND gate 2464. The reset line from the 6800 microprocessor is supplied as a seventh input to the NAND gate 2464. The eighth input of the NAND gate 2464 is tied to the +5 volt power supply 2467.

The output signal from the NAND gate 2464 is supplied as a third enabling signal to the register 2458 and is also supplied to both inputs of the AND gate 2469. The output of the AND gate 2469 is tied directly to one input of the AND gate 2471 and is also tied to the second input of the AND gate 2471 through the RC network made up of register 2472 and capacitor 2473. The output from the AND gate 2471 is supplied as an enabling signal to the driver 2452. The output from the register 2458 is supplied as an enabling signal to the LED driver 2454.

When it is desired to set up a display on the roll-along status display which is located in the operator control and display panel 41, illustrated in FIG. *2a*, the roll-along panel interface 37, illustrated in FIG. *2a*, is enabled by the address and command lines from the 6800 microprocessor. Specifically, the A5–A7 address lines and the command lines from the 6800 microprocessor, which are illustrated in FIG. 68, are utilized to enable the register 2458 and also are utilized to enable the driver 2452. When the driver 2452 is enabled, the data on the D0–D7 data lines from the 6800 microprocessor is supplied to the alphanumeric display 2453. The data is also supplied to the LED driver 2454. When the LED driver 2454 is enabled in response to the output signal of the register 2458, the data is transferred to the LED display 2455. In this manner, a status display providing a visual identification of the spread configuration of the seismic exploration system is provided to the operator at the operator control and display panel 41 illustrated in FIG. *2a*.

Commercially available components which can be utilized in the circuit illustrated in FIG. 68 are as follows:

| | |
|---|---|
| Buffer 2451 and Inverters 2457, 2459, 2461, 2462, 2463, 2465 and 2466 | 74LS04, National Semiconductor |
| Register 2458 | 74LS138, National Semiconductor |
| NAND gate 2464 | 74LS30, National Semiconductor |
| AND gate 2469, 2471 | 74LS08, National Semiconductor |
| Resistor 2472 | 220 ohms, RN55D, Dale |
| Capacitor 2473 | 100 picofarads, Series 25B, S&EI |
| Driver 2452 | DM8096, National Semiconductor |
| LED Driver 2454 | DM8869, National Semiconductor |
| Alphanumeric Display 2454 | HP5082-7300, Hewlett-Packard |
| LED Display 2455 | HP5082-4657, Hewlett-Packard |

The self scan interface 33, illustrated in FIG. 2a, is more fully illustrated in FIG. 69. The portion of the operator control and display panel 41 which is associated with the self scan interface 33 is also illustrated in FIG. 69. Referring now to FIG. 69, the D0–D7 data lines from the 6800 microprocessor are tied through the data buffer 2611 to the refresh memory 2612 by means of signal lines 2614. The A8–A15 address lines from the 6800 microprocessor are provided to the address decoding circuit 2615. The read/write (R/$\overline{W}$) line, valid memory address (VMA) line, $\phi 2$ clock line, and $2\phi 2$ clock line from the 6800 microprocessor are also supplied to the address decoding circuit 2615. The response to the address and commands from the 6800 microprocessor, the address decoding circuit 2615 provides three enabling signals 2616, 2617 and 2618. The enabling signal 2616 is provided from the address decoding circuit 2615 to the refresh memory 2612. Signal 2617 is provided as an enabling signal to the data buffer 2617. Signal 2618 is provided as an enabling signal to the address multiplexer 2619.

The A0–A7 address lines from the 6800 microprocessor are tied as inputs to the address multiplexer 2619. The A0–A7 add ress lines are utilized to control the location in the refresh memory to which data is written from the 6800 microprocessor or from which data is read to the 6800 microprocessor.

The timebase generator 2621 provides a plurality of clock signals utilized in the self scan interface illustrated in FIG. 69. The time base generator circuit 2621 is provided with the $\overline{\phi 2}$ clock, the $\phi 2$ clock and the $2\phi 2$ clock from the 6800 microprocessor. The time base generator circuit 2621 is also provided with the reset (RST) line from the 6800 microprocessor. The output signal 2623 from the time base generator 2621 is provided as an input to the dot counter circuit 2624. The dot counter circuit is utilized to provide a sweep of the display unit 2622 and is also utilized to provide a portion of the address for the character to be displayed on display unit 2622. The output signal 2625 from the dot counter circuit 2624 is provided as an input to the address multiplexer 2619, the character generator 2626, the character counter 2627 and the drivers 2628. From the drivers 2628, the output from the dot counter 2624 is provided by signal line 2631 to the display unit 2622.

The time base generator circuit 2621 provides one address signal 2641 to the address multiplexers 2619. A enabling signal 2644 is supplied from the time base generator 2621 to the registers 2636. The reset signal 2645 is provided from the time base generator 2621 to the master reset (MR) of both the dot counter 2624 and the character counter 2627.

The character counter 2627 is utilized to provide a portion of the address for the character to be displayed on display unit 2622. The output signal 2632 from the character counter 2627 is provided as an input to the drivers 2628 and is also provided as an input to address multiplexer 2619. The output signal 2632 from the character counter 2627 is provided through the drivers 2628 to the display unit 2622 by means of signal line 2631.

The output signal 2633 from the address multiplexer 2619 is provided as an input to the refresh memory 2612. The address signal 2633 is representative of a location to which data is to be written or to be read from or will correspond to the location at which data is to be displayed on display unit 2622 depending on whether the A0–A7 address lines from the 6800 microprocessor or signals 2632, 2641 and 2625 are selected to be provided from the address multiplexer 2619 to the refresh memory 2612.

The output signal 2634 from the refresh memory 2612 is provided as an input to the character generator 2626. The output from the refresh memory 2612 is also tied back through the data buffer 2611 to the 6800 microprocessor. In this manner, data can be read from the refresh memory 2612 out to the 6800 microprocessor if desired.

The character generator 2626 is utilized to generate a binary address which determines which indicators on the display unit 2622 will be activated. This binary address is generated in response to the output signal 2634 from the refresh memory 2612 and also in response to the output signal 2625 from the dot counter 2624. The binary address from the character generator 2626 is provided by means of signal lines 2635 to the registers 2636. The output from the registers is provided to the display unit 2622 by means of signal line 2637.

Signal 2631 is utilized to sweep the display unit 2622. As the display unit is being swept, various indicators on the display unit 2622 will be activated in response to the binary address from the character generator 2626. In this manner, data can be supplied from the 6800 microprocessor to the display unit 2622 which is located on the operator control and display panel 41 illustrated in FIG. 2a. The display unit 2622 may be viewed by the CRS operator and thereby the operational status of the seismic exploration system of the present invention can be known.

Commercially available components which can be utilized in the circuit illustrated in FIG. 69 are as follows:

| | |
|---|---|
| Dot counter 2624 | 74290, Motorola |
| Character counter 2623 | 74293, Motorola |
| Registers 2636 | 74175, Motorola |
| Drivers 2628 | 9311, Fairchild Semiconductor |
| Display unit 2622 | HP5082-7300, Hewlett-Packard |
| Refresh memory 2612 | 3538F, American Microsystems, Inc. |
| Address multiplexer 2619 | 74157, Motorola |
| Character generator 2626 | 82S115, Signetics |
| Data buffer 2611 | 74LS368, National Semiconductor |

The time base generator 2621, illustrated in FIG. 69, is more fully illustrated in FIG. 70. Referring now to FIG. 70, the $\overline{\phi 2}$ clock from the 6800 microprocessor is supplied as a first input to the NAND gate 2651. The $\phi 2$ clock from the 6800 microprocessor is supplied to the clock input of the counter 2652. The $2\phi 2$ clock is supplied as a first input to the NOR gate 2653. The count enable parallel (CEP) input, the count enable trickle (CET) input and the parallel enable (PE) input of the counter 2652 are all tied high to the +5 volt power supply 2654 through the resistor 2655.

The reset signal (RST) from the 6800 microprocessor is supplied through inverters 2657 and 2658 to the master reset (MR) of the counter 2652 and the counter 2651. The reset signal (RST) from the 6800 microprocessor is also supplied through inverter 2657, 2658 and 2662 to the master reset (MR) of the dot counter 2624 and the character counter 2627 illustrated in FIG. 69.

The $Q_0$ parallel output from the counter 2652 is supplied to the $A_0$ input of the one-of-sixteen decoder 2663. The $Q_0$ output from the counter 2652 is also supplied as signal 2641A to the address multiplexer 2619 illustrated in FIG. 69. The $Q_1$ parallel output from the counter 2652 is provided to the $A_1$ input of the one-of-sixteen decoder 2663 and is also provided as signal 2641B to the address multiplexer 2619. The $Q_2$ output from the counter 2652 is supplied to the $A_2$ input of the one-of-sixteen decoder 2663 and is also provided as signal 2641C to the address multiplexer 2619. The $Q_3$ output from the counter 2652 is tied to both inputs of the NAND gate 2665 and is also supplied as a second input to the NOR gate 2653.

The output from the NOR gate 2653 is supplied to the clock input (CP) of the counter 2661. The count enable parallel (CEP) input, the count enable trickle (CET) input and the parallel input (PE) of the counter 2661 are all tied to the +5 volt power supply 2666 to the resistor 2667. The $Q_0$ and $Q_1$ output from the counter 2661 are supplied as first and second inputs respectively to the NOR gate 2669. The $Q_2$ and $Q_3$ output from the counter 2661 are tied as first and second inputs respectively to the NOR gate 2671. The $Q_3$ output from the counter 2661 is also supplied to the clock input of the dot counter 2624 illustrated in FIG. 69.

The output from the NOR gate 2669 is supplied through the inverter 2672 as a first input to NOR gate 2673. The output from the NOR gate 2671 is supplied through the inverter 2674 as a second input to the NOR gate 2673. The output from the NOR gate 2673 is tied as a third input to the NAND gate 2651.

The output from the NAND gate 2651 is tied to the $A_3$ input of the one-of-sixteen 2663. The 0-3 outputs from one-of-sixteen decoder 2663 are supplied as enabling signals 2644 to the register 2636 illustrated in FIG. 69.

Commercially available components which can be utilized in the circuits illustrated in FIG. 71 are as follows:

| | |
|---|---|
| NOR gate 2653, 2669, 2671 and 2673 | 74LS02, National Semiconductor |
| NAND gate 2651 | 74LS10, National Semiconductor |
| AND gate 2665 | 74LS02, National Semiconductor |
| Inverters 2657, 2658, 2672, 2674 and 2662 | 74LS04, National Semiconductor |
| Counters 2652 and 2661 | 9310, Fairchild Semiconductor |
| Decoder 2663 | A7442, Fairchild Semiconductor |
| Resistors 2655 and 2667 | 1 K ohm, ¼W, RN 60 D Dale |

The address decoding circuit 2615, illustrated in FIG. 69 is more fully illustrated in FIG. 71. Referring now to FIG. 71, the A11 address line is supplied as a first input to the NOR gate 2681. The A10 address line is supplied as a second input to the NOR gate 2681. The output from the NOR gate 2681 is supplied as a first input to the NAND gate 2682. The A9 address line is tied as a first input to the NOR gate 2683. The A12 address line is tied as a second input to the NOR gate 2683. The output from the NOR gate 2683 is tied as a second input to the NAND gate 2682. The A8 address line is tied directly as a third input to the NAND gate 2682. The A13 address line is tied as a first input to the NOR gate 2684. The A14 address line is tied as a second input to the NOR gate 2684. The output from the NOR gate 2684 is tied as a fourth input to the NAND gate 2682. The A15 address line is tied directly as a fifth input to the NAND gate 2682. The valid memory address (VMA) line is tied as the sixth, seventh and eighth inputs to the NAND gate 2682. The output from the NAND gate 2682 is supplied through the inverter 2685 as a first input to the NAND gate 2686 and as a first input to the NAND gate 2687. The read/write ($R/\overline{W}$) line is supplied through inverter 2688 as a second input to the NAND gate 2687 and is also supplied through inverter 2688 and inverter 2689 as a second input to the NAND gate 2686.

The $\phi 2$ clock signal is supplied through inverter 2689 as signal 2618 illustrated in FIG. 69. The $\phi 2$ clock signal is also supplied through inverter 2689 and inverter 2690 as a first input to NOR gate 2691 and as a third input to NAND gate 2686.

The $2\phi 2$ clock signal is supplied through inverter 2693 as a second input to NOR gate 2691. The output from NOR gate 2691 is tied as a third input to NAND gate 2687. The output from NAND gate 2687 is signal 2616 which is illustrated in FIG. 69 and which is supplied to the read/write ($R/\overline{W}$) input of the refresh memory 2612 illustrated in FIG. 69. Signal 2616 is utilized to control whether data is being written into the refresh memory 2612 from the 6800 microprocessor or whether data is being read from the refresh memory 2612 to the 6800 microprocessor.

The output signal from the NAND gate 2686 is signal 2617 which is illustrated in FIG. 69 and which is supplied from the address decoding circuit 2615 to the data buffer 2611. The data buffer 2611 is enabled by signal 2617 to either transfer data from the 6800 microprocessor to the refresh memory 2612 or to transfer data from the refresh memory 2612 to the 6800 microprocessor.

Commercially available components which can be utilized in the circuit illustrated in FIG. 71 are as follows:

| | |
|---|---|
| NOR gates 2681, 2683, 2684 and 2691 | 74LS02, National Semiconductor |
| Inverters 2688, 2689, 2693, 2689 and 2690 | 74LS04, National Semiconductor |
| NAND gate 2682 | 74LS30, National Semiconductor |
| NAND gates 2686 and 2687 | 74LS10, National Semiconductor |

The data display control panel 95 and the data display interface 97, both of which are illustrated in FIG. *2a*, are more fully illustrated in FIG. 72. Referring now to FIG. 72, all of the address lines, command lines and data lines illustrated are from the 2900 microprocessor. The A7 address line is supplied as a first input to the NAND gate 2701. The A6 address line is provided as a second input to the NAND gate 2701. The A5 address line is provided as a third input to the NAND gate 2701. The A4 address line is provided as a fourth input to the NAND gate 2701. The A3 address line is provided through inverter 2702 as a fifth input to the NAND gate 2701. The valid memory address (VMA) line is supplied through inverter 2703 as a sixth input to the NAND gate 2701. The read/write ($R/\overline{W}$) line is provided as a seventh input to the NAND gate 2701. The display mode (DM) line is provided as an eighth input to the NAND gate 2701. The output of the NAND gate 2701 is provided to the enabling (E) input of the decoder 2705.

The A0 address line is supplied through inverter 2706 to the $A_0$ input of the decoder 2705. The A1 address line is provided through inverter 2707 to the $A_1$ input of the decoder 2705. The A2 address line is provided through inverter 2708 to the $A_2$ input of the decoder 2705. The A0-A2 address lines are utilized to enable a particular one of the thumbwheel switches 2709.

The 0-6 outputs from the decoder 2705 are supplied to the enabling inputs of the thumbwheel switches 2709. The thumbwheel switches 2709 are located on the data display control panel 95, illustrated in FIG. 2*a* and may be utilized by the operator to control the manner in which data is displayed at the data display unit 93. The thumbwheel switches 2709 are encoded so as to provide a binary coded decimal (BCD) output signal 2711. Signal 2711, which is actually representative of a plurality of signal lines, is provided to the buffers 2712.

The rotary switches 2713 are located on the data display control panel 95 and provide another means by which the operator may control the manner in which data is displayed at the data display unit 93. The output from the rotary switches 2713 is also provided to the buffers 2712. The buffers 2712 are tied to the DO–D7 data lines of the 2900 microprocessor. In this manner, the commands set up by the operator by means of the thumbwheel switches 2709 and the rotary switches 2713 may be transferred to the 2900 microprocessor by means of the 2900 microprocessor data bus. In response to these commands, the 2900 microprocessor controls the manner in which data is displayed at the data display unit 93 illustrated in FIG. 2*a*.

Commercially available components which can be utilized in the circuit illustrated in FIG. 72 are as follows:

| | |
|---|---|
| Inverters 2702, 2703, 2706, 2707 and 2708 | 74LS04, National Semiconductor |
| NAND gate 2701 | 74LS30, National Semiconductor |
| Decoder 2705 | 74S138, National Semiconductor |
| Buffers 2712 | 74LS366, National Semiconductor |
| Thumbwheel switches 2709 | Series 19000, Digitran |
| Rotary switches 2713 | Type 50A90, Grayhill |

The magnetic tape panel 83 and the magnetic tape panel interface 84, which are illustrated in FIG. 2*a*, are more fully illustrated in FIG. 73. The magnetic tape panel 83 and the magnetic tape panel interface 84 primarily provide for operator control of the recording of seismic data on magnetic tape at the central recording station. Referring now to FIG. 73, the A7 address line from the 6800 microprocessor is supplied as a first input to NAND gate 2721. The A6 address line is supplied through inverter 2722 as a second input to NAND gate 2721. The A5 address line is supplied through inverter 2723 as a third input to NAND gate 2721. The A4 address line is supplied directly as a fourth input to NAND gate 2721. The input-output (I/O) select line is supplied as a fifth input to NAND gate 2721. The remaining inputs of NAND gate 2721 are tied high to the +5 volt power supply 2724. The output from NAND gate 2721 is tied as a first enabling input to switch-select circuit 2725 and as a first enabling input to output-select circuit 2726. The A4–A7 address lines from the 6800 microprocessor and the input-output (I/O) select line are primarily utilized to enable either switch-select circuit 2725 or output-select circuit 2726.

The A0 address line from the 6800 microprocessor is supplied through buffer 2728 to the $A_0$ input of select-switch circuit 2725 and to the $A_0$ input of output-select circuit 2726. The A1 address line is supplied through the buffer 2728 to the $A_1$ input of select-switch circuit 2725 and to the $A_1$ input of output-select circuit 2726. The A2 address line is tied through buffer 2728 to the $A_2$ input of switch-select circuit 2725 and to the $A_2$ input of output-select circuit 2726. The A3 address line is supplied through buffer 2728 as a second enabling input to switch-select circuit 2725 and to output-select circuit 2726. The read/write (R/$\overline{W}$) signal line is supplied through buffer 2728 as a third enabling input to switch-select circuit 2725 and as a third enabling input to output-select circuit 2726. The A3 address line and the rear/write (R/$\overline{W}$) line are further used to enable either switch-select circuit 2725 or output-select circuit 2726. If the switch-select circuit 2725 is enabled, then either one of the thumbwheel switches 2731 or the rotary switch 2732 will be enabled. If the output-select circuit 2726 is enabled, then either the buffer 2734 or the buffer 2735 will be enabled. The A0–A2 address lines from the 6800 microprocessor are utilized to determine which of the thumb wheel switches will be enabled. The rotary switch 2732 may also be enabled by the A0–A2 address lines. In like manner, the A0–A2 address lines are utilized to determine whether buffer 2734 or buffer 2735 will be enabled. The 0–7 output lines from switch-select circuit 2725 are tied to the ground inputs of thumbwheel switches 2731 and the ground input of rotary switch 2732. The 0–7 output lines from switch-select circuit 2725 are utilized to enable thumbwheel switches 2732 or rotary-switch 2732 by supplying a currentsink at the ground of either one of thumbwheel switches 2731 or rotary-switch 2732.

Information set up on thumbwheel switches 2731 and rotary-switch 2732 may be transferred to the 6800 microprocessor through buffer 2738, the output side of which is tied to the D0–D7 data lines of the 6800 microprocessor. The buffer 2738 is enabled by the 0–7 output lines from switch-select circuit 2725.

The D0–D7 data lines from the 6800 microprocessor are supplied through the buffer 2741 to display driver 2742. From display driver 2742 the D0–D7 data lines are supplied to display 2743. Data from the 6800 microprocessor may be displayed for the operator by means of display 2743.

The pushbutton switches 2744 are provided to allow the operator to start the tape unit, to write header information on the magnetic tape, and to set the file number at which the data from the first shot is to be stored. The output from pushbutton switches 2744 is tied through buffer 2734 to the 6800 microprocessor by means of the D0–D7 data lines. The output from pushbutton switches 2744 also provides an interrupt to the 6800 microprocessor through buffer 2735.

The rotary switch 2732 is utilized primarily to allow the operator to instruct the 6800 microprocessor as to what operation is needed in a search of the magnetic tape. The rotary switch has four positions. The rotary switch 2732 may be set to instruct the 6800 to automatically position the magnetic tape after the last data record has been recorded, to reverse and locate the last record on the tape, to reverse and to search for the file number set on thumb-wheel switches 2731 or to go forward and search for the file number set on thumbwheel switches 2731.

The pushbutton switches 2744 are utilized to allow the operator to enable operation of the magnetic tape unit. Three switches are provided which are labeled "set file", "write header" and "start". When the "start" button is pushed, an interrupt is provided to the 6800 microprocessor through the buffer 2735. The 6800 microprocessor will then enable buffer 2738 and the position of rotary switch 2732 will be read to determine what action is needed. If the "set file" pushbutton switch is pressed, buffer 2738 is again enabled but this time the 6800 microprocessor will read and store the file number which is set on thumbwheel switches 2731. This information is also displayed at display 2743.

It is noted that thumbwheel switches 2731 are utilized to set only the initial file number for recording of seismic data on the magnetic tape. After the initial file number has been set, the 6800 microprocessor will automatically increment the file number with each shot fired. The incremented file number will appear at display 2743 and will change after each shot is fired.

The "write header" pushbutton switch may be activated to allow the 6800 microprocessor to write header information on the magnetic tape.

The thumbwheel switches 2731, the rotary switch 2732 and the pushbutton switches 2744 are provided to allow operator control of the recording of seismic data on magnetic tape. The thumbwheel switches 2731 are utilized to set up the file number for the initial recording to begin and the rotary switches 2732 are utilized to set up different operations. The pushbutton switches 2744 are utilized to start the operation of the magnetic tape unit and also to provide interrupts to the 6800 microprocessor to enable the 6800 microprocessor to read the data set on thumbwheel switches 2731 and rotary switch 2732. Data is read from thumbwheel switches 2731 or rotary switch 2732 by enabling switch-select circuit 2725 and enabling buffer 2738 by means of the A0–A2 address lines from the 6800 microprocessor. The position of the pushbutton switches is read by the 6800 microprocessor by enabling output-select circuit 2726 which in turn enables buffer 2734 or buffer 2735.

Commercially available components which can be utilized in the circuit illustrated in FIG. 73 are as follows:

| | |
|---|---|
| Inverter 2722 and 2723 | 74LS04, National Semiconductor |
| Buffer 2728 | 74LS04, National Semiconductor |
| NAND Gate 2721 | 74LS30, National Semiconductor |
| Switch-select circuit 2725, and Output select circuit 2726 | 74LS138, National Semiconductor |
| Thumbwheel switches 2731 | Series 19000, Digitran |
| Rotary switch 2732 | Type 50A90, Grayhill |
| Pushbutton switches 2744 | 101SN11, Microswitch |
| Buffer 2741 | 74LS04, National Semiconductor |
| Display driver 2742 | 74LS00, National Semiconductor |
| Display 2743 | 5082-7300, Hewlett-Packard |
| Buffer 2738 | 7438, National Semiconductor |
| Buffer 2734 | 74LS04, National Semiconductor |
| Buffer 2738 | 74LS365, National Semiconductor |

The heart of the seismic exploration system of the present invention is the computers associated with the central recording station illustrated in FIG. *2a* and the remote telemetry unit illustrated in FIG. *2b*. Computer 51, which is illustrated in FIG. *2a*, is a 6800 microprocessor and is the master control computer for the seismic exploration system. The 2900 microprocessor which is illustrated as computer 74 in FIG. *2a* is a peripheral microprocessor which is utilized primarily in the seismic data acquisition sequences. The 2900 microprocessor is under the control of the 6800 microprocessor which is illustrated as computer 51. Computer 111 which is illustrated in FIG. *2b* is also a 6800 microprocessor. Computer 111 controls the functions of the remote telemetry unit, illustrated in FIG. *2b*, but computer 111 is also under the control of computer 51.

Many different types of software programs could be written in different languages and formats. The software programs are simply means by which the computers can initiate various functions of the seismic exploration system and control other functions of the seismic exploration system.

While many different software programs could be developed to control the hardware of the seismic exploration system of the present invention, a preferred software program is attached as an appendix to the present application. The software program found in the appendix is a printout of the actual program presently being used in the seismic exploration system. The software program employs a standard language developed by Motorola Semiconductor for the 6800 microprocessor. The various steps in the program are defined and the language is defined in the extensive documentation that is provided by Motorola Semiconductor for the 6800 microprocessor.

Specific references are the *M*6800 *Microprocessor Programming Manual* (1976) and *Microprocessor Course* (1976) both of which are provided by Motorola Semiconductor.

The invention has been described in terms of a preferred embodiment in which detailed schematics have been set forth. The invention is not limited to these detailed schematics. It is well known that there are many circuit configurations which can be utilized to perform specified functions. This is especially true with regard to many elements in the circuits which may be supplied by a plurality of manufacturers.

While the invention has been described in terms of the presently preferred embodiments, reasonable variations and modifications are possible by those skilled in the art, within the scope of the described invention and the appended claims.

APPENDIX

```
                *DIRECT-MEMORY
                *
0000  0000      TMP     FDB   0,0          TEMPORARY STORAGE
0002  0000
0004  00        FIRST   FCB   0            FLAG IND FIRST TIME THRU LOO
0005  00        DATA    FCB   0,0,0        ADC DATA STORAGE
0006  00
0007  00
0008            PTCNT   RMB   2            SAMPLE COUNT FOR NOISE TEST
000A            RDCNT   RMB   2            CONTAINS # OF WORDS IN CCD M
000C  10        CHANRD  FCB   $10          10=CAL/READ CHAN 1-4, 0= CAL
000D  01        DOGAIN  FCB   $01          1 = DO GAIN RANGING, 0 = SKI
000E  97        CNVPLS  FCB   $97          VALUE TO GEN GAIN RG. CNVT P
000F  17        PLSRST  FCB   $17          VALUE TO RESET CNVT PULSE, S
0010  01        GAIN    FCB   1            1 = DO GAIN RANGEING, 0= NO
0011  0000      BLSTCH  FDB   0            BALST CHAN; 0=NO BLAST CHAN.
0013  80        HZ      FCB   $80          SAMPLE RATE
0014  11        SETUP   FCB   $11          SET UP CHC FOR CALIBRATION
0015  81        HZSAM   FCB   $81          EVERYBODY SAMPLE
0016  91        HZ11    FCB   $91          INT. SAMPLE, OUTPUT HOLD @ X
0017  A1        HZ21    FCB   $A1          INT. HOLD, OUTPUT SAMPLE @ X
0018  B1        HZ31    FCB   $B1          ALL HOLD
0019  A2        HZ22    FCB   $A2          INT. HOLD, OUTPUT SAMPLE @ X
001A  A4        HZ24    FCB   $A4          INT. HOLD, OUTPUT SAMPLE @ X
001B  A8        HZ28    FCB   $A8          INT HOLD, OUTPUT SAMPLE @ X8
                * VARIABLE STORAGE
001C            CNTL    RMB   1            TMP STORAGE FOR MULTIPLY ROU
001D  01        BLKSIZ  FCB   1            TRANSMISSION BLOCK SIZE
001E            PWRSTT  RMB   1            POWER STATUS
001F            ACTV    RMB   1            ACTIVE STATUS
0020  0028      CSTKPT  FDB   CMDSTK       COMMAND STACK POINTER
0022  0000      WDCNT   FDB   0            SAMPLE COUNT FOR DATA COLLEC
0024            XADDR   RMB   1            RTU ADDR IN RAM
0025            RTUCC   RMB   1            RTU CONDITION CODE
0026            PECNT   RMB   2            PARITY ERROR COUNT
0028            CMDSTK  RMB   32           COMMAND STACK
0048            ADDR    RMB   2            ADDRESS OF TEST CHANGE
004A            END     RMB   1            END VALUE OF TEST CHANGE
004B            STRT    RMB   1            START VALUE OF TEST CHANGE
004C            CMD     RMB   1            CONTAINS LAST COMMAND AS REC
004D            BLSTER  RMB   2            BLASTER INDEX SET BY 8X COMM
004F            VALCNT  RMB   2            CONTAINS # OF VALUES TO RECO
0051                    ORG   255
00FF            SYSSTK  RMB   1            SYSTEM STACK AREA
                *
                *END-OF-DIRECT-MEMORY
                *
0100                    ORG   $101
0101            PAOFST  RMB   24+48        24 OFFSET VALUES + 24 16-BIT
0018            AVG     EQU   24           AVG VALUES KEPT AT PAOFST+24
0101            INDEX   EQU   PAOFST
0004            CH      EQU   4
0000            C1D2    EQU   0            GAIN 2 OFFSET
0004            C1D3    EQU   C1D2+CH      GAIN 4 OFFSET
0008            C1D4    EQU   C1D3+CH      GAIN 8 OFFSET
000C            C2D1    EQU   C1D4+CH      GAIN 16 OFFSET
0010            C3D1    EQU   C2D1+CH      GAIN 256 OFFSET
0014            C4D1    EQU   C3D1+CH      GAIN 4096 OFFSET

0018            CHANC1  EQU   PAOFST+24-PAOFSTCHANNEL 1 CONTROL GROUP
001C            CHANC2  EQU   CHANC1+4     CHANNEL 2 CONTROL GROUP
0020            CHANC3  EQU   CHANC2+4     CHANNEL 3 CONTROL GROUP
0024            CHANC4  EQU   CHANC3+4     CHANNEL 4 CONTROL GROUP
                *
0149            CNT     RMB   1            AVERAGE COUNT/TIME BREAK COU
014A            CNT2    RMB   1            NUMBER OF AVERAGES TO MAKE W
014B            CBADD   RMB   2            POINTER TO CB TABLE
014D            PAOADD  RMB   2            POINTER TO PAOFST TABLE
014F            BIADD   RMB   2            POINTER TO BIAS VALUES
0151            HCADD   RMB   2            POINTER TO HC TABLE
0153            CHANEL  RMB   1            CHANNEL COUNT
```

```
0154  00             BRSET   FCB    0              ADC VALUE FOR BLAST CHANNEL
0155  0000           LSTVAL  FDB    0              TEMP STORAGE USED WHILE SEAR
0157  0000           BSRCH   FDB    0              FLAG, NON-ZERO = SEARCH FOR
                     *

                     * I/O ADDRESSES
                     *
0159                         ORG    $800C
800C                 CMDREG  EQU    *              R COMMAND
800C                 BLSTRG  RMB    1              W 4 SPARES, ACTIVE, SPARE, B
800D                 CCDSTR  EQU    *              R CCD STATUS BITS
                     * (WORD IND, PARITY, 128 NT, 8 NT, RBOR, 320US, WBIR, TILT
800D                 CCDCTL  RMB    1              W CCD CONTROL
                     * (READ, WRITE, XMIT, ACLR, WBEN, STATRST, XMIT(0=REPEAT,1
800E                 RTUADR  EQU    *              R RTU ADDRESS
800E                 CCDADR  RMB    1              W CCD START ADDRESS
800F                 CCD     RMB    1              R/W CCD MEMORY DATA
8010                         RMB    1              R SPARE
8011                 PCH1    RMB    1              W PREAMP CHANNEL 1
8012                 PCH2    RMB    1              W PREAMP CHANNEL 2
8013                 PCH3    RMB    1              W PREAMP CHANNEL 3
8014                 PCH4    RMB    1              W PREAMP CHANNEL 4
8015                 CALSTP  RMB    1              W CALIBRATOR CONTROL
                     * (GRD FILTER INPUT, PULSE FILTER, CALIBRATE, VOLTAGE)
8016                 ADCMSB  RMB    1              R MOST SIGNIFICANT BYTE OF D
8017                 ADCLSB  RMB    1              R LEAST SIGNIFICANT BYTE OF
8018                 ADCNVP  EQU    $8018          ADDR TO GENERATE CONVERT PUL
                     * (CONVERT, S&H, MULTIPLEXER)
8019                 CHC     EQU    $8019          ADDR FOR CHAN & X1,X16,X256,
8019                 GAINST  EQU    $8019          ADDR TO READ X1,X16,X256,X40
801A                 SHD     EQU    $801A          ADDR FOR HZ, S&H CONTROL, &
801A                 DSTAT   EQU    $801A          ADDR TO READ X1,X2,X4,X8 GAI
801B                 OSB1    EQU    $801B          ADDR TO WRITE X16/X2 OFFSET
801C                 OSB2    EQU    $801C          ADDR TO WRITE X256/X4 OFFSET
801D                 OSB3    EQU    $801D          ADDR TO WRITE X4096/X8 OFFSE
8018                         ORG    $800
0800                 POWER   RMB    1              W POWER SWITCHES
                     * (SPARE, SPARE, SWON, 18, 12A, 12D, 5ACQ, 5M)
                     *
                     * DATA VALUES
                     *
0001                 STBIT   EQU    $01            BIT THAT, WHEN SET IN DSTAT
0008                 WRMPWR  EQU    $08            TO TURN ON ANALOG POWER
000C                 CCDPWR  EQU    $0C            TO TURN ON CCD POWER
000E                 ACQPWR  EQU    $0E            TO TURN ON POWER FOR DATA AC
0005                 HLDPWR  EQU    $05            TO TURN ON POWER FOR HOLDING
0014                 XMTPWR  EQU    $14            TO TURN ON POWER FOR TRANSMI
0001                 SBYPWR  EQU    $01            TO TURN OFF ALL POWER
0001                 ACKV    EQU    1              ACKNOWLEDGE (DATA ACCEPTED)
0002                 INITV   EQU    2              INITIALIZE COMMAND
0004                 RDYBLV  EQU    4              GET READY FOR BLAST CMD
0020                 DTESTV  EQU    1*32           DEPLOY TEST CMD
0040                 PTESTV  EQU    2*32           PERF TEST CMD
0060                 STATV   EQU    3*32           SET STATUS CMD
0080                 SLCTV   EQU    4*32           SELECT SHOT POINT CMD
00A0                 SSWPV   EQU    5*32           START SWEEP CMD
00C0                 XMITV   EQU    6*32           TRANSMIT CMD
00E0                 BLSTV   EQU    7*32           BLAST CMD
0039                 RUNV    EQU    $39            RUN VALUE TO PREAMP LATCHES
00C0                 DATACL  EQU    $C0            DATA COLLECT MODE TO CALIBRA
0040                 IMPLSV  EQU    $40            IMPULSE MODE TO CALIBRATE LA
0801                         ORG    $F800

                     *
                     * C O M M A N D - I N T E R R U P T - P R O C E S S O R
                     *
F800                 INITIN  EQU    *              INTERUPT TRANSFERS CONTROL H
F800  8E00FF                 LDS    #SYSSTK
F803  BDFA80                 JSR    DATRD1         RESET CALIBRATOR OUTPUT
F806  86D5                   LDA A  #1280/DWM
F808  4A                     DEC A
F809  26FD                   BNE    *-1            WAIT 1.28 MSEC (8 BIT TIMES)
F80B  B6800C                 LDA A  CMDREG         GET CRS COMMAND
```

```
F80E  974C        STA A   CMD
F810  8102        CMP A   #INITV         IS THIS AN INITIALIZE COMMAN
F812  277B        BEQ     INTRTU         B IF INITIALIZE CMD
F814  DE20        LDX     CSTKPT         CMD STACK PTR
F816  08          INX
F817  8C0020      CPX     #32
F81A  2607        BNE     INITG          B IF STACK IS NOT FULL
F81C  09          DEX
F81D  D625  INITF LDA B   RTUCC
F81F  CA02        ORA B   #$2
F821  D725        STA B   RTUCC          SET STACK FULL BIT
F823  DF20  INITG STX     CSTKPT
F825  A728        STA A   CMDSTK,X       SAVE CMD
F827  16          TAB
            * D E C O D E - C O M M A N D
F828  C4E0        AND B   #$E0
F82A  2742        BEQ     CK1TO8         B IF CMD .LE. X'1F'
F82C  C160        CMP B   #STATV
F82E  2748        BEQ     STATE          B IF CMD = CHANGE STATE (X'6
F830  C180        CMP B   #SLCTV
F832  2747        BEQ     SELECT         B IF CMD = SELECT BLAST CHAN
F834  C1C0        CMP B   #XMITV
F836  2754        BEQ     XMIT           B IF CMD = TRANSMIT (X'CX')
F838  16          TAB
            * DIVIDE TIME BY SAMPLING RATE
F839  4F    MX1000 CLR A
F83A  C41F        AND B   #$1F
F83C  270F        BEQ     MXE            B IF ZERO PRODUCT
F83E  4A    MXA   DEC A
F83F  D71C        STA B   CNTL
F841  50    TIMEK NEG B                  **
F842  58          ASL B                  *
F843  58          ASL B                  *
F844  DB1C        ADD B   CNTL           *
F846  58          ASL B                  ** 1000*CNT = # SAMPLES @ 62
F847  9B1C        ADD A   CNTL           *
F849  58          ASL B                  *
F84A  49          ROL A                  *
F84B  58          ASL B                  *
F84C  49          ROL A                  **
F84D        MXE   EQU     *
F84D  7D0015      TST     HZSAM
F850  2A02        BPL     STORCT         B IF 62 HZ RATE
F852  58          ASL B
F853  49          ROL A                  TIMES 2 FOR 124 HZ
F854  9708  STORCT STA A  PTCNT
F856  D709        STA B   PTCNT+1        # OF DATA POINTS TO READ
F858  DE08        LDX     PTCNT

F85A  DF22        STX     WDCNT          # OF DATA POINTS TO SAMPLE
F85C  D64C        LDA B   CMD
F85E  C4E0        AND B   #$E0
F860  C140        CMP B   #PTESTV
F862  271A        BEQ     PTEST          B IF CMP = PERFORMANCE TEST
F864  C120        CMP B   #DTESTV
F866  271D        BEQ     DTEST          B IF CMD = DEPLOYMENT TEST (
F868  C1E0        CMP B   #BLSTV
F86A  2764        BEQ     BLAST          B IF CMD = BLAST (X'EX')
F86C  2047        BRA     ACK3           UNRECOGNIZED CMD
F86E  8104  CK1TO8 CMP A  #RDYBLV
F870  2749        BEQ     READY          B IF CMD = GET READY FOR BLA
F872  8101        CMP A   #ACKV
F874  272D        BEQ     ACK            B IF CMD = DATA ACCEPTED (X'
F876  203D        BRA     ACK3           UNRECOGNIZED CMD
            * JUMP TABLE TO JUMP TO PROPER COMMAND PROCESSOR
F878  7EFA9A STATE JMP    DOSTAT
F87B  7EFAD0 SELECT JMP   DOSEL
F87E  DE0A  PTEST LDX     RDCNT
F880  2633        BNE     ACK3           B IF DATA IS IN MEMORY
F882  7EFB6F      JMP     PERFRM
F885  DE0A  DTEST LDX     RDCNT
F887  262C        BNE     ACK3           B IF DATA IS IN MEMORY
F889  7EFAE9      JMP     DODTST
```

```
F88C  7EF930   XMIT     JMP    DOXMIT
               *
               * INITIALIZE RTU
               *
F88F           INTRTU   EQU    *           ** INITIALIZE RTU **
F88F  CE0000            LDX    #0
F892  DF4D              STX    BLSTER      CLEAR BLASTER
F894  F6800E            LDA B  RTUADR
F897  D724              STA B  XADDR       SET RTU ADDR FOR REPLY TO CR
F899  5F                CLR B
F89A  D71F              STA B  ACTV        CLEAR ACTIVE STATUS
F89C  F7800C            STA B  BLSTRG      CLEAR ACTIVE STATUS
F89F  C611              LDA B  #$11
F8A1  D714              STA B  SETUP       INITIALIZE SETUP FOR CALIBRA
               *
               * ACKNOWLEDGE RECEIPT OF DATA
               *
F8A3           ACK      EQU    *           ** ACKNOWLEDGE RECEIVED **
F8A3  CE0000   ACK2     LDX    #0
F8A6  DF20              STX    CSTKPT      RESET COMMAND STACK POINTER
F8A8  9728              STA A  CMDSTK      SAVE THIS COMMAND
F8AA  DF11              STX    BLSTCH      RESET BLASTER CHANNEL TEST
F8AC  DF0A              STX    RDCNT       CLEAR CCD DATA COUNT
F8AE  7F0025            CLR    RTUCC       CLEAR RTU SS BYTE
F8B1  8601              LDA A  #SBYPWR
F8B3  971E     ACK3A    STA A  PWRSTT      SAVE POWER STATUS
F8B5  961E     ACK3     LDA A  PWRSTT
F8B7  B70800            STA A  POWER       POWER=POWER STATUS
F8BA  3E                WAI
               *
               * READY RTU FOR DATA COLLECTION
               *
F8BB           READY    EQU    *
F8BB  DE0A              LDX    RDCNT

F8BD  26F6              BNE    ACK3        B IF DATA IS IN MEMORY
F8BF  BDFA55            JSR    DATARD      READY THE CCD MEMORY
F8C2  BDFA85            JSR    DATRD2      READY THE CHANNEL SWITCHES
F8C5  BDFBD4            JSR    CALIB1      CALIBRATE THE GAIN RANGER AN
F8C8  BDFA80            JSR    DATRD1      READY THE CHANNEL SWITCHES
F8CB  860E              LDA A  #ACQPWR
F8CD  971E              STA A  PWRSTT      SET POWER STATUS TO ACQUIRE
F8CF  3E                WAI                WAIT FOR BLAST COMMAND
               *
               * START BLAST AND RECORD DATA
               *
F8D0           BLAST    EQU    *
F8D0  860E              LDA A  #ACQPWR
F8D2  911E              CMP A  PWRSTT
F8D4  26DF              BNE    ACK3        B IF 04 CMD DID NOT PRECEED
F8D6  860F              LDA A  #15
F8D8  9701              STA A  TMP+1       SET EXTENDED TIME
F8DA  8602              LDA A  #2
F8DC  DE4D              LDX    BLSTER
F8DE  DF11              STX    BLSTCH      SET SWITCH FOR TIME BREAK SE
F8E0  CEF923            LDX    #FSKTBL
F8E3  E600     BLST1    LDA B  0,X
F8E5  2736              BEQ    BLST9       BRH IF END OF FSK SIGNAL
F8E7  D700              STA B  TMP         STORE NUMBER OF CYCLES
F8E9  08                INX
F8EA  984D     BLST2    EOR A  BLSTER
F8EC  B7800C            STA A  BLSTRG      SET HIGH HALF CYCLE
F8EF  E600              LDA B  0,X
F8F1  5A       BLST3    DEC B
F8F2  26FD              BNE    BLST3       WAIT OUT HALF CYCLE
F8F4  984D              EOR A  BLSTER
F8F6  B7800C            STA A  BLSTRG      SET LOW HALF CYCLE
F8F9  E600              LDA B  0,X
F8FB  C008              SUB B  #8
F8FD  5A       BLST4    DEC B
F8FE  26FD              BNE    BLST4       WAIT OUT HALF CYCLE
F900  7A0000            DEC    TMP
F903  2707              BEQ    BLST6       BRH IF FS NEEDED
```

```
F905  C605                LDA B  #5
F907  5A         BLST5    DEC B
F908  26FD                BNE    BLST5         FINISH WAIT OF HALF CYCLE
F90A  20DE                BRH    BLST2
F90C  01         BLST6    NOP                  TIMING INSTR
F90D  7A0001              DEC    TMP+1
F910  2704                BEQ    BLST7         BRH IF NOT EXTENDED TIME
F912  C603                LDA B  #3
F914  20F1                BRA    BLST5
F916  7C0001     BLST7    INC    TMP+1
F919  08                  INX
F91A  7EF8E3              JMP    BLST1
F91D  BDFDF9     BLST9    JSR    DATCOL        COLLECT DATA
F920  7EFA00              JMP    HLDDT
F923  FF         FSKTBL   FCB    255,32,8,15,2,32,4,15,4,32,8,15,0BLAST CODE
F924  20
F925  08
F926  0F
F927  02
F928  20

F929  04
F92A  0F
F92B  04
F92C  20
F92D  08
F92E  0F
F92F  00
                 *
                 * TRANSMIT DATA FROM BULK MEMORY
                 *
F930             DOXMIT   EQU    *
F930  C614                LDA B  #XMTPWR
F932  F70800              STA B  POWER         POWER XMTR ON
F935  CE0063              LDX    #3*DW
F938  BDFFB5              JSR    D1400
F93B  C610                LDA B  #$10
F93D  F7800D              STA B  CCDCTL        RESET CCD CONTROLS
F940  C62C                LDA B  #$2C
F942  F7800D              STA B  CCDCTL        ENABLE FIFO TO XMTR
F945  841F                AND A  #$1F
F947  16                  TAB
F948  48                  ASL A
F949  48                  ASL A
F94A  1B                  ABA
F94B  B7800E              STA A  CCDADP        STORE BLOCK NUMBER
F94E  B6800D              LDA A  CCDSTB
F951  8401                AND A  #$01
F953  9A25                ORA A  RTUCC
F955  9725                STA A  RTUCC         SET TILT STATUS BIT
F957  8655                LDA A  #$55
F959  B7800F              STA A  CCD           SEND PREAMBLE
F95C  860F                LDA A  #$F
F95E  B7800F              STA A  CCD           SEND SYNC
F961  8604                LDA A  #$4
F963  B7800F              STA A  CCD
F966  CE056A              LDX    #42*DW
F969  BDFFB5              JSR    D1400         DELAY 45 MSEC
F96C  DF26                STX    PECNT         ZERO PARITY ERROR COUNT
F96E  58                  ASL B
F96F  58                  ASL B
F970  960A                LDA A  RDCNT
F972  10                  SBA
F973  D60B                LDA B  RDCNT+1
F975  9722                STA A  WDCNT         STORE # OF WORDS FROM
F977  D723                STA B  WDCNT+1       .SPECIFIED BLOCK TO END OF D
F979  D61D                LDA B  BLKSIZ
F97B  5C                  INC B
F97C  C107                CMP B  #7
F97E  2E0E                BGT    XMT4          B IF XMIT TO END OF DATA REQ
F980  2D01                BLT    XMT5          BRH IF BLK SIZE <= 6K WORDS
F982  5C                  INC B
F983  58         XMT5     ASL B
```

```
F984  58             ASL B
F985  D122           CMP B  WDCNT
F987  2E05           BGT    XMT4      B IF XMIT TO END OF DATA REQ
F989  D722     XMT6  STA B  WDCNT     STORE XMIT DATA BLOCK SIZE
F98B  7F0023         CLR    WDCNT+1
F98E  CE0020   XMT4  LDX    #CSTKPT

F991  C603           LDA B  #3
F993  BDFA1A         JSR    XMT2B     SEND HEADER INFO
F996  DE22           LDX    WDCNT
F998  2F79           BLE    XMT2C     B IF NO DATA
F99A  86A8           LDA A  #$A8
F99C  B7800D         STA A  CCDCTL    START READ FROM CCD
F99F  C6AA           LDA B  #$AA
F9A1  B6800D   XMT9  LDA A  CCDSTB
F9A4  2AFB           BPL    XMT9      B UNTIL CCD IS SYNCED
F9A6  F7800D         STA B  CCDCTL    START SEQUENTIAL DATA
F9A9  B6800D   XMT1  LDA A  CCDSTB
F9AC  2AFB           BPL    XMT1      WAIT FOR CCD WORD IND
F9AE  86AE           LDA A  #$AE
F9B0  B7800D         STA A  CCDCTL    CLEAR PARITY COUNT
F9B3  86AA           LDA A  #$AA
F9B5  B7800D         STA A  CCDCTL    SET CCD TO XMTR PATH
F9B8  F6800F         LDA B  CCD
F9BB  B6800F         LDA A  CCD
F9BE  9700           STA A  TMP       SAVE WORD TO CORRECT PARITY
F9C0  B6800F         LDA A  CCD
F9C3  9701           STA A  TMP+1
F9C5  B6800F         LDA A  CCD
F9C8  9702           STA A  TMP+2
F9CA  B6800F         LDA A  CCD
F9CD  9703           STA A  TMP+3
F9CF  B6800D         LDA A  CCDSTB
F9D2  48             ASL A
F9D3  2B0A           BMI    XMT3      B IF NO PARITY ERROR
F9D5  7C0027         INC    PECNT+1   INCREMENT PARITY ERROR COUNT
F9D8  2603           BNE    XMT3A     B IF NO CARRY
F9DA  7C0026         INC    PECNT
F9DD  C801     XMT3A EOR B  #1        CORRECT PARITY
F9DF  F7800F   XMT3  STA B  CCD       SEND DATA
F9E2  9600           LDA A  TMP
F9E4  B7800F         STA A  CCD
F9E7  9601           LDA A  TMP+1
F9E9  B7800F         STA A  CCD
F9EC  9602           LDA A  TMP+2
F9EE  B7800F         STA A  CCD
F9F1  9603           LDA A  TMP+3
F9F3  B7800F         STA A  CCD
F9F6  09             DEX
F9F7  26B0           BNE    XMT1      B IF MORE DATA
F9F9  CE0026   XMT2A LDX    #PECNT
F9FC  C611           LDA B  #17
F9FE  8D1A           BSR    XMT2B
FA00  961F     HLDDT LDA A  ACTV
FA02  B7800C         STA A  BLSTRG    RESTORE ACTIVE OR NOT ACTIVE
FA05  CE0084         LDX    #4*DW
FA08  BDFFB5         JSR    D1400     DELAY 4 MSEC
FA0B  7F800D         CLR    CCDCTL    STOP READ, WRITE, OR XMIT
FA0E  8605           LDA A  #HLDPWR
FA10  7EF8B3         JMP    ACK3A
FA13  862A     XMT2C LDA A  #$2A
FA15  B7800D         STA A  CCDCTL    TRANSMITTER ON
FA18  20DF           BRA    XMT2A
FA1A  D700     XMT2B STA B  TMP
FA1C  A600     XMT2  LDA A  0,X

FA1E  A801           EOR A  1,X
FA20  16             TAB
FA21  54             LSR B
FA22  1B             ABA
FA23  54             LSR B
FA24  1B             ABA
FA25  54             LSR B
```

```
FA26  1B                    ABA
FA27  54                    LSR B
FA28  1B                    ABA
FA29  54                    LSR B
FA2A  1B                    ABA
FA2B  54                    LSR B
FA2C  1B                    ABA
FA2D  54                    LSR B
FA2E  1B                    ABA
FA2F  43                    COM A
FA30  8401                  AND A  #1          GENERATE EVEN PARITY
FA32  B7800F                STA A  CCD         XMIT COMMAND STRING
FA35  A601                  LDA A  1,X
FA37  B7800F                STA A  CCD
FA3A  44                    LSR A
FA3B  44                    LSR A
FA3C  44                    LSR A
FA3D  44                    LSR A
FA3E  B7800F                STA A  CCD
FA41  A600                  LDA A  0,X
FA43  B7800F                STA A  CCD
FA46  44                    LSR A
FA47  44                    LSR A
FA48  44                    LSR A
FA49  44                    LSR A
FA4A  B7800F                STA A  CCD
FA4D  08                    INX
FA4E  08                    INX
FA4F  7A0000                DEC    TMP
FA52  26C8                  BNE    XMT2        3  3     3
FA54  39                    RTS
                  * POWER UP SEQUENCE
FA55              DATARD    EQU    *           SETUP TO CALIBRATE/READ CHAN
FA55  C608                  LDA B  #WRMPWR
FA57  F70800                STA B  POWER       POWER = WARM
FA5A  BDFFB2                JSR    DLAY14
FA5D  BDFFB2                JSR    DLAY14      DELAY 3.2 SECONDS
FA60  C60C        SETCCD    LDA B  #CCDPWR
FA62  F70800                STA B  POWER       POWER = CCD
FA65  CE0528                LDX    #40*DW
FA68  BDFFB5                JSR    D1400       DELAY 40 MSEC
FA6B  C60E                  LDA B  #ACQPWR
FA6D  F70800                STA B  POWER       POWER = ACQUIRE
FA70  C614                  LDA B  #$14
FA72  F7800D                STA B  CCDCTL      CLEAR ADDRESS AND PARITY COU
FA75  C648                  LDA B  #$48
FA77  F7800D                STA B  CCDCTL      SET WRITE AND WRITE-BUFFER-E
FA7A  CE0000                LDX    #0
FA7D  DF0A                  STX    RDCNT       ZERO DATA COUNT
FA7F  39                    RTS
                  * SETUP PREAMPS

FA80  C600        DATRD1    LDA B  #DATACL
FA82  F78015                STA B  CALSTP      SETUP TO SAMPLE OUTSIDE
FA85  C639        DATRD2    LDA B  #RUNV
FA87  BDFB43                JSR    SETCHN      SET PRE-AMP CHANNELS 1 - 4 T
FA8A  CE1001                LDX    #$1001
FA8D  DF0C                  STX    CHANRD      SETUP TO CALIBRATE/READ CHAN
FA8F  CE9717                LDX    #$9717
FA92  DF0E                  STX    CNVPLS      SETUP ADC CONVERT AND RESET
FA94  DE14                  LDX    SETUP
FA96  FF8019                STX    CHC         SET GAIN-RG. TO SAMPLE
FA99  39                    RTS
                  *
                  * STATUS TRANSFER
                  *
FA9A              DOSTAT    EQU    *           ** PROCESS STATE: ACTIVE/INA
FA9A  16                    TAB
FA9B  C408                  AND B  #$8
FA9D  D71F                  STA B  ACTV        SAVE ACTIVE STATUS
FA9F  F7800C                STA B  BLSTRG      X'80' = ACTIVE, 0 = INACTIVE
FAA2  16                    TAB
FAA3  C407                  AND B  #$7
```

```
FAA5  D71D          STA B  BLKSIZ          SAVE TRANSMISSION BLOCK SIZE
FAA7  C640    NOBLK LDA B  #$40
FAA9  8510          BIT A  #$10
FAAB  2701          BEQ    *+3             B IF 62 HZ (4 MS. RATE)
FAAD  58            ASL B                  124 HZ (2 MS. RATE)
FAAE  17            TBA
FAAF  9713          STA A  HZ              SETUP ALIAS FILTER SELECTION
FAB1  8A01          ORA A  #$01            ..GAIN RANGER SWITCH CONTROL
FAB3  9715          STA A  HZSAM
FAB5  8A10          ORA A  #$10
FAB7  9716          STA A  HZ11
FAB9  8B10          ADD A  #$10
FABB  9717          STA A  HZ21
FABD  8B10          ADD A  #$10
FABF  9718          STA A  HZ31
FAC1  CA22          ORA B  #$22
FAC3  D719          STA B  HZ22
FAC5  CB02          ADD B  #$2
FAC7  D71A          STA B  HZ24
FAC9  CB04          ADD B  #$4
FACB  D71B          STA B  HZ28
FACD  7EF8B5  ACK2A JMP    ACK3
              *
              * BLAST CHANNEL SELECT CHANNEL INDEX WILL BE STORED IN BLS
              * - - MOVED TO BLSTCH WHEN BLAST COMMAND IS RECEIVED
              *
FAD0          DOSEL EQU    *               ** BLAST CHANNEL SELECT **
FAD0  8407          AND A  #$7
FAD2  270E          BEQ    CLRSEL          B IF CMD = CLEAR SELECT
FAD4  16            TAB
              *     ADDA   #PAOFST-$101    PAOFST=$101
FAD5  974E          STA A  BLSTER+1
FAD7  8601          LDA A  #PAOFST/$100
FAD9  974D          STA A  BLSTER          SAVE CHANNEL INDEX
FADB  CB23          ADD B  #$23
FADD  F70154        STA B  BRSET           ADC CHANNEL ADDR TO SAMPLE
FAE0  20EB          BRA    ACK2A

FAE2  CE0000  CLRSEL LDX   #0
FAE5  DF4D          STX    BLSTER          CLEAR BLASTER CHANNEL INDEX
FAE7  20E4          BRA    ACK2A
              *
              * PERFORM DEPLOYMENT TESTS (NORMAL TEST)
              *
FAE9          DODTST EQU   *               ** DEPLOYMENT (NORMAL) TEST
FAE9  C697          LDA B  #$97
FAEB  F7800C        STA B  BLSTRG          REMOVE DC BIAS ON PHONE LINE
FAEE  D70E          STA B  CNVPLS          SET CONVERT PULSE VALUE
FAF0  C61A          LDA B  #$1A
FAF2  8D4F          BSR    SETCHN          SETUP LEAKAGE TEST
FAF4  BDFA60        JSR    SETCCD          READY CCD MEMORY
FAF7  7F000D        CLR    DOGAIN          NO GAIN RANGING REQ'D
FAFA  8D6D          BSR    SPFA            SET MAX POSITIVE CALIB
FAFC  8610    S     LDA A  #$10            ADC START ADDR
FAFE  C601          LDA B  #1
FB00  F7014A        STA B  CNT2            NUMBER OF VALUES/ADDR TO REA
FB03  C617          LDA B  #$17            ADC END ADDR
FB05  CE000F        LDX    #PLSRST         ADDR TO STORE NEW ADC READ A
FB08  7F0022        CLR    WDCNT
FB0B  8D43          BSR    STAIRS          READ TEMP THRU MAX CALIB
FB0D  863F          LDA A  #$3F
FB0F  8D5A          BSR    SPFB            SET MAX NEGATIVE ADC
FB11  8D2D          BSR    DATCL1          READ MIN CALIB
FB13  8618          LDA A  #$18
FB15  C624          LDA B  #$24
FB17  8D39          BSR    STAIR2          READ REG VOLTS AND LEAKAGE
FB19  C612          LDA B  #$12
FB1B  8D26          BSR    SETCHN          SETUP CONTINUITY TEST
FB1D  CE0528        LDX    #40*DW
FB20  BDFFB5        JSR    D1400           DELAY 40 MSEC
FB23  8624          LDA A  #$24
FB25  C628          LDA B  #$28
FB27  8D29          BSR    STAIR2          READ CONTINUITY
```

```
FB29  DE08                LDX    PTCNT
FB2B  2710                BEQ    SKNOIS      B IF NO NOISE DATA REQ'D
FB2D  DF22                STX    WDCNT       COUNT OF # OF NOISE SAMPLES
FB2F  BDFA80              JSR    DATRD1      SETUP PREAMPS
FB32  BDFBDA              JSR    CALIB1      CALIBRATE THE GAIN RANGER AM
FB35  BDFA80              JSR    DATRD1
FB38  BDFFB2              JSR    DLAY14      DELAY 1.59 SEC (10 TIME CONS
FB3B  8D03                BSR    DATCL1      COLLECT NOISE DATA
FB3D  7EFA00      SKNOIS  JMP    HLDDT
                  *
FB40  7EFDF9      DATCL1  JMP    DATCOL
                  *
FB43  F78014      SETCHN  STA B  PCH4        SET PREAMP VALUE FOR PREAMP
FB46  F78013              STA B  PCH3
FB49  F78012              STA B  PCH2
FB4C  F78011              STA B  PCH1
FB4F  39                  RTS
                  *
FB50  DF48        STAIRS  STX    ADDR        SAVE ADDRESS OF TEST CHANGE
FB52  D74A        STAIR2  STA B  END         SAVE END VALUE OF TEST CHANG
FB54  974B        STLOOP  STA A  STRT        SAVE START VALUE OF TEST CHA
FB56  F6014A              LDA B  CNT2
FB59  D723                STA B  WDCNT+1     SET # OF SAMPLES AT ONE TEST

FB5B  DE48                LDX    ADDR
FB5D  A700                STA A  0,X         MAKE TEST CHANGE
FB5F  8DDF                BSR    DATCL1      COLLECT DATA
FB61  964B                LDA A  STRT
FB63  4C                  INC A
FB64  914A                CMP A  END
FB66  26EC                BNE    STLOOP      B IF MORE TEST CHANGES
FB68  39                  RTS
                  *
                  * P E R F R M DRIVES THRU THE PERFORMANCE TEST
                  * - - 1) CALIBRATES CHANNELS 1 - 4
                  * - - 2) GENERATES IMPULSE
                  * - - 3) RECORDS 256 MS. OF IMPULSE DATA AFTER 1.59 SEC DE
                  * - - 4) GENERATES LEVITATE SIGNAL
                  * - - 5) RECORDS 256 MS. OF LEVITATE DATA AFTER 500 MIC/SE
                  * - - 6) CALIBRATES CHANNEL ZERO
                  * - - 7) RECORDS 33 G.R. STAIRCASE VALUES
                  * - - 8) RECORDS 33 ADC STAIRCASE VALUES
                  *
                  *
FB69  862F        SPFA    LDA A  #$2F
FB6B  B78015      SPFB    STA A  CALSTP      SET CALIBRATOR VOLTAGE
FB6E  39                  RTS
FB6F              PERFRM  EQU    *
FB6F  BDFA55              JSR    DATARD      READY CCD MEMORY
FB72  BDFA85              JSR    DATRD2      READY THE CHANNEL SWITCHES
FB75  BDFBDA              JSR    CALIB1      GO CALIBRATE CHAN 1 - 4
FB78  D615                LDA B  HZSAM
FB7A  F7801A              STA B  SHD         SET GAIN-RG. TO SAMPLE
FB7D  C622                LDA B  #$22
FB7F  F7800C              STA B  BLSTRG      REMOVE DC BIAS ON PHONE LINE
FB82  8DBF                BSR    SETCHN      SETUP LEVITATE SIGNAL
FB84  8DE3                BSR    SPFA        INIT IMPULSE
FB86  BDFFB2              JSR    DLAY14      DELAY 1.59 SECONDS
FB89  863F                LDA A  #$3F
FB8B  8DDE                BSR    SPFB        START IMPULSE
FB8D  CE0800              LDX    #2048       (4) NUMBER OF IMPULSE VALUES
FB90  DF22                STX    WDCNT       (5)
FB92  8600                LDA A  #0
FB94  4A                  DEC A              (2*81)
FB95  26FD                BNE    *-1         (4*81)
FB97  8DD0                BSR    SPFA        COMPLETE IMPULSE
FB99  8DA5        IMPULS  BSR    DATCL1      READ/REACORD IMPULSE DATA
FB9B  7F8015              CLR    CALSTP      REMOVE PULSE FOR LEVITATE
FB9E  BDFFB2              JSR    DLAY14      DELAY 1.59 TO  SETTLE FILTER
FBA1  C639                LDA B  #RUNV
FBA3  8D9E                BSR    SETCHN      SET PREAMPS FOR RUN
FBA5  86C0                LDA A  #DATACL
FBA7  B78015              STA A  CALSTP      SET CALIBRATE FUNCTION TO RU
```

```
FBAA  CE0800   633          LDX    #2048           NUMBER OF LEVITATE VALUES TO
FBAD  DF22     634          STX    WDCNT
FBAF  8D8F     635 LEVTAT   BSR    DATCL1          READ/RECORD LEVITATE DATA
FBB1  8640     636          LDA A  #$40
FBB3  B78015   637          STA A  CALSTP          SET CALIBRATE FUNCTION TO ST
FBB6  7F000C   638          CLR    CHANRD          SETUP FLAG FOR CHAN 0
FBB9  BDFBDA   639          JSR    CALIB1          CALIBRATE CHANNEL 0
FBBC  8608     640 GRSTAR   LDA A  #8              NUMBER OF VALUES TO READ FOR
FBBE  B7014A   641          STA A  CNT2

FBC1  8620     642          LDA A  #$20            STAIRCASE START VALUE
FBC3  C641     643          LDA B  #$41            STAIRCASE END VALUE (+1)
FBC5  CE8015   644          LDX    #CALSTP         ADDR TO STORE STEP VALUE
FBC8  8D86     645          BSR    STAIRS          PERFORM GAIN RG. STAIRCASE
FBCA  CE9616   646 ADCSTR   LDX    #$9616
FBCD  DF0E     647          STX    CNVPLS          SET CONVERT, RESET PULSE FOR
FBCF  7F000D   648          CLR    DOGAIN          RESET FLAG TO BYPASS GAIN-RG
FBD2  8620     649          LDA A  #$20
FBD4  BDFB54   650          JSR    STLOOP          PERFORM ADC STAIRCASE
FBD7  7EFB3D   651          JMP    SKNOIS

               654 * *********************************************************
               655 *
               656 * C A L I B R A T I O N - S U B R O U T I N E
               657 *
               658 * CALIBRATES EITHER CHANNELS 1 THRU 4 OR THE CALIBRATION
               659 * - - CHANNEL.  TO CALIB 1 THRU 4, ADDR 'CHANRD' MUST CONT
               660 * - - A HEX '10'.  FOR THE CALIBRATION CHANNEL, 'CHANRD' M
               661 * - - CONTAIN A HEX '00'.
               662 *
               663 *
               664 *      DETERMINE, FOR EACH CHANNEL, THE ZERO OFFSET FOR:
               665 * 1-C1XD2 1X2
               666 * 2-C1XD3 1X4
               667 * 3-C1XD4 1X8
               668 * 4-C2XD1 16X1
               669 * 5-C3XD1 256X1
               670 * 6-C4XD1 4096X1
               671 * 6 RANGES - 10 AVERAGES - 32 VALUES/AVG. - 4 CHANNELS
               672 *
               673 * *********************************************************
FBDA  8640     674 CALIB1   LDA A  #$40
FBDC  B78015   675          STA A  CALSTP          SET NOTCH TO GROUND FOR CALI
FBDF  DE14     676          LDX    SETUP
FBE1  FF8019   677          STX    CHC             SET SAMPLE & HOLDS TO SAMPLE
FBE4  5F       678          CLR B
FBE5  F7801B   679          STA B  OSB1            ZERO OFFSET DACS
FBE8  F7801C   680          STA B  OSB2
FBEB  F7801D   681          STA B  OSB3
FBEE  CE0149   682          LDX    #PAOFST+24+48
FBF1  09       683 CLRPAO   DEX
FBF2  E700     684          STA B  0,X             CLR OFFSETS AND BIASES
FBF4  8C0101   685          CPX    #PAOFST
FBF7  26F8     686          BNE    CLRPAO          B UNTIL TABLE IS CLEAR
FBF9  FF014D   687          STX    PAOADD          PAO ADDRESS AT FIRST OFFSET
FBFC  09       688          DEX
FBFD  FF014F   689          STX    BIADD           BI ADDRESS AT FIRST BIAS
FC00  CEFFD3   690          LDX    #HC
FC03  FF0151   691          STX    HCADD           HC ADDRESS AT FIRST CHC CONT
FC06  CEFFBB   692          LDX    #CB
FC09  7D000C   693          TST    CHANRD
FC0C  2606     694          BNE    CALALL          B IF CHAN 1 - 4 TO BE CALIBR
FC0E  CEFFE0   695          LDX    #CALCH          CALIBRATION CHANNEL
FC11  F78019   696          STA B  CHC
FC14  FF014B   697 CALALL   STX    CBADD           CB ADDRESS AT FIRST SHD CONT
FC17  BDFFB2   698          JSR    DLAY14          DELAY 1.4 SECONDS FOR CAPACI
FC1A           699 CLRK     EQU    *
               700 *    POINTER TABLE INITIALIZATION COMPLETE
FC1A  D60F     701          LDA B  PLSRST          SETUP FOR CONVERT PULSE
FC1C  F78018   702          STA B  ADCNVP          CONVERT PULSE
FC1F  860A     703 CALC0    LDA A  #10             10 AVERAGES
FC21  B7014A   704          STA A  CNT2
FC24  8621     705 CALC1    LDA A  #33             32 (+1) VALUES TO BE AVERAGE
```

```
FC26  B70149   706          STA A  CNT
FC29  7F0004   707          CLR    FIRST          CLEAR FIRST LOOP FLAG
FC2C  8604     708 CALC3    LDA A  #4
FC2E  B70153   709          STA A  CHANEL         CHANNEL COUNT=4
FC31  FE014B   710 CALC2    LDX    CBADD          5
FC34  A600     711          LDA A  0,X            5

FC36  84F0     712          AND A  #$F0           2
FC38  8B01     713          ADD A  #1             2 SAMPLE AT X1 GAIN
FC3A  FE0151   714          LDX    HCADD          5
FC3D  E606     715          LDA B  DB-HC,X        5
FC3F  DA13     716          ORA B  HZ             3
FC41  FE014D   717          LDX    PAOADD         5/49
FC44  A500     718          BIT A  0,X            5 DELAY
FC46  B78019   719          STA A  CHC            5 SET CHANNEL
FC49  A60C     720          LDA A  C2D1,X         5
FC4B  B7801B   721          STA A  OSB1           5
FC4E  A610     722          LDA A  C3D1,X         5
FC50  B7801C   723          STA A  OSB2           5
FC53  A614     724          LDA A  C4D1,X         5
FC55  B7801D   725          STA A  OSB3           5
FC58  9500     726          BIT A  TMP            3 DELAY
FC5A  F7801A   727          STA B  SHD            5/43  ** INTERMEDIATE SAMPLE
0065           728 CET1     EQU    49+9+43
FC5D  D604     729          LDA B  FIRST          3
FC5F  2608     730          BNE    NOTFST         4/7 B IF NOT FIRST LOOP
FC61  C60B     731 FSTTIM   LDA B  #11            2
FC63  5A       732          DEC B                 2*11
FC64  26FD     733          BNE    *-1            4*11 DELAY
FC66  7EFC7A   734          JMP    GETHCA         3/71
FC69           735 NOTFST   EQU    *
FC69  B68016   736          LDA A  ADCMSB         4 PREVIOUS CHANNEL DATA
0070           737 CET2     EQU    CET1+11
FC6C  F68017   738          LDA B  ADCLSB         4/8
FC6F  47       739          ASR A                 2
FC70  56       740          ROR B                 2
FC71  47       741          ASR A                 2
FC72  56       742          ROR B                 2/8
FC73  BDFDD8   743          JSR    MAG128         9+37/46
FC76  9705     744          STA A  DATA           4 STORE BIAS DATA
FC78  D706     745          STA B  DATA+1         4/8
FC7A  FE0151   746 GETHCA   LDX    HCADD          5
FC7D  A600     747          LDA A  0,X            5
FC7F  9A13     748          ORA A  HZ             3
FC81  2B03     749          BMI    *+5            4
FC83  BDFFAA   750          JSR    DLAY5          (500) 62 HZ; GO DELAY 500 MI
FC86  FE014B   751          LDX    CBADD          5
FC89  3F       752          SWI                   22 DELAY
FC8A  E600     753          LDA B  0,X            5/28
FC8C  B7801A   754          STA A  SHD            5/21 ** INTERMED. HOLD, OUTP
00E3           755 CET3     EQU    4+8+46+8+28+21+CET2
FC8F  F78019   756          STA B  CHC            5 SET OUTPUT TO SAMPLE @ PRO
FC92  9604     757          LDA A  FIRST          3
FC94  2610     758          BNE    CONT           4/12 B IF NOT FIRST LOOP
FC96  8608     759          LDA A  #8             2
FC98  9704     760          STA A  FIRST          4 SET FIRST LOOP FLAG
FC9A  4A       761          DEC A                 (2*2)
FC9B  26FD     762          BNE    *-1            (4*2) DELAY
FC9D  960C     763          LDA A  CHANRD
FC9F  2640     764          BNE    INCCB          B IF ADJUSTING RECORDING CHA
FCA1  7C0150   765          INC    BIADD+1
FCA4  2025     766          BRA    CALCHN
FCA6           767 CONT     EQU    *
FCA6  FE014D   768          LDX    PAOADD         5 **
FCA9  A600     769          LDA A  C1D2,X         5 *

FCAB  B7801B   770          STA A  OSB1           5 *
FCAE  A604     771          LDA A  C1D3,X         5 ** TIMES 16,256,4096 OFFSE
FCB0  B7801C   772          STA A  OSB2           5 *
FCB3  A608     773          LDA A  C1D4,X         5 *
FCB5  B7801D   774          STA A  OSB3           5 **
FCB8  9605     775          LDA A  DATA           3
FCBA  D606     776          LDA B  DATA+1         3
```

```
FCBC  FE014F            LDX    BIADD          5 GET ADDRESS TO STORE NEW B
FCBF  EB18              ADD B  AVG,X          5
FCC1  A930              ADC A  AVG+24,X       5/56
FCC3  A730              STA A  AVG+24,X       STORE NEW BIAS TOTAL
FCC5  E718              STA B  AVG,X          5
FCC7  960C     CHANCK   LDA A  CHANRD
013D           CET4     EQU    12+56+22+CET3
FCC9  260E              BNE    CYCCK          4/22
FCCB           CALCHN   EQU    *              CALIBRATION CHANNEL ONLY
FCCB  8607              LDA A  #7
FCCD  7A0149            DEC    CNT
FCD0  2633              BNE    LPHOLD         B IF NOT LASTSAMPLE OF AVG
FCD2  8680              LDA A  #$80
FCD4  7A0150            DEC    BIADD+1
FCD7  205C              BRA    MOVADD         3 GO MOVE CALIBRATION AVG
FCD9  B60153   CYCCK    LDA A  CHANEL
FCDC  8104              CMP A  #4
FCDE  2746              BEQ    CHGOFS         B IF CHAN 4 LAST ONE READ
FCE0  3F                SWI                   22 DELAY
FCE1  7C014C   INCCB    INC    CBADD+1        6 INC TO NEXT CHANNEL
FCE4  7C014E            INC    PAOADD+1       6 INC TO NEXT CHANNEL
FCE7  7C0150            INC    BIADD+1        INC TO NEXT CHANNEL
FCEA  860E              LDA A  #14
FCEC  7A0153            DEC    CHANEL         6
FCEF  2614              BNE    LPHOLD         4/22 B IF NOT LAST CHANNEL
0177           CET5     EQU    CET4+10+16+10+22
FCF1  8604              LDA A  #4             2
FCF3  B70153            STA A  CHANEL         5 RESET CHANNEL COUNT
FCF6  B6014C   MODCB    LDA A  CBADD+1        4 BACKUP CBADD TO START AT C
FCF9  8004              SUB A  #4             2
FCFB  B7014C            STA A  CBADD+1        5 CYCLE CBADD TO CHAN 1 CONT
FCFE  8601              LDA A  #PAOFST-$100   2
FD00  B7014E            STA A  PAOADD+1       5 CYCLE PAOADD TO CHAN 1 OFF
FD03  8608              LDA A  #8             2
FD05  4A       LPHOLD   DEC A                 2
FD06  26FD              BNE    *-1            4 DELAY
01A0           CET6     EQU    CET5+25+16
FD08  FE0151   SETHLD   LDX    HCADD          5
FD0B  A600              LDA A  0,X            5
FD0D  8A10              ORA A  #$10           2
FD0F  9A13              ORA A  HZ
FD11  B7801A            STA A  SHD            5/17 ** EVERYBODY HOLD **
FD14  8605              LDA A  #5             2 DELAY TO MATCH DATA COL. L
FD16  4A                DEC A                 2
FD17  26FD              BNE    *-1            4 DELAY
FD19           CALC     EQU    *
FD19  960E              LDA A  CNVPLS         3
FD1B  B78018            STA A  ADCNVP         5 GENERATE CONVERT PULSE
FD1E  960F              LDA A  PLSRST         3
FD20  B78018            STA A  ADCNVP         5 RESET PULSE
FD23  7EFC31            JMP    CALC2          3/23

               *
FD26  B60150   CHGOFS   LDA A  BIADD+1        4
FD29  8004              SUB A  #4             2
FD2B  B70150            STA A  BIADD+1        5 CYCLE BIADD TO CHAN 1 BIAS
FD2E  7A0149            DEC    CNT            6
FD31  26AE              BNE    INCCB          4/26 B IF MORE VALUES TO AVE
FD33  8610              LDA A  #$10
FD35  B70149   MOVADD   STA A  CNT
FD38  FE014F            LDX    BIADD
FD3B  A631     MOVAVG   LDA A  AVG+24+1,X
FD3D  E619              LDA B  AVG+1,X        GET AVG
FD3F  58                ASL B                 DIVIDE BY 64
FD40  49                ROL A
FD41  58                ASL B
FD42  49                ROL A
FD43  AB01              ADD A  1,X
FD45  2812              BVC    FLGS1          B IF NO OVERFLOW
FD47  867F              LDA A  #$7F
FD49  2401              BCC    *+3            B IF MAX POSITIVE NEEDED
FD4B  43                COM A
FD4C  F6014A            LDA B  CNT2
```

```
FD4F  5A                   DEC B
FD50  2607                 BNE    FLGS1          B IF MORE TRIALS NEEDED
FD52  F60149               LDA B  CNT
FD55  DA25                 ORA B  RTUCC
FD57  D725                 STA B  RTUCC          STORE OFFSET OUT OF RANGE FL
FD59            FLGS1      EQU    *
FD59  A701                 STA A  1,X            STORE MAX VALUE FOR OFFSET
FD5B  6F19                 CLR    AVG+1,X        CLEAR FOR NEXT AVG
FD5D  6F31                 CLR    AVG+24+1,X
FD5F  08                   INX
FD60  780149               ASL    CNT
FD63  24D6                 BCC    MOVAVG         MOVE 4 VALUES
FD65  7A014A               DEC    CNT2
FD68  2703                 BEQ    NXTGAN
FD6A  7EFC24               JMP    CALC1          GO START NEW AVERAGES
FD6D  FF014F    NXTGAN     STX    BIADD          NEST SET OF OFFSET VALUES
FD70  B6014C               LDA A  CBADD+1
FD73  8B04                 ADD A  #4
FD75  B7014C               STA A  CBADD+1        INC CBADD TO NEXT GAIN
FD78  7C0152               INC    HCADD+1        INC HCADD TO NEXT GAIN
FD7B  FE0151               LDX    HCADD
FD7E  960C                 LDA A  CHANRD         IS THIS CALIB CHAN
FD80  2610                 BNE    CKDONE         B IF NO
FD82  B6014C               LDA A  CBADD+1
FD85  8003                 SUB A  #3
FD87  B7014C               STA A  CBADD+1        CORRECT CBADD FOR CALIBRATOR
FD8A  B60150               LDA A  BIADD+1
FD8D  8B03                 ADD A  #3
FD8F  B70150               STA A  BIADD+1        CORRECT BIADD FOR CALIBRATOR
FD92  8CFFD9    CKDONE     CPX    #HC+6
FD95  2703                 BEQ    NGANRT
FD97  7EFC1F               JMP    CALC0
FD9A  960C      NGANRT     LDA A  CHANRD
FD9C  2614                 BNE    SETRD          B IF NOT CALIBRATOR CHANNEL
FD9E  C606      SETCAL     LDA B  #6             SET ALL OFFSETS TO MATCH 1ST
FDA0  CE0101               LDX    #PAOFST
FDA3            SETC2      EQU    *

FDA3  A600                 LDA A  0,X
FDA5  08                   INX
FDA6  A700                 STA A  0,X            STORE OFFSET
FDA8  08                   INX
FDA9  A700                 STA A  0,X
FDAB  08                   INX
FDAC  A700                 STA A  0,X
FDAE  08                   INX
FDAF  5A                   DEC B
FDB0  26F1                 BNE    SETC2
FDB2            SETRD      EQU    *              INITIALIZE TABLE OF OPERATIO
FDB2  CE0401               LDX    #$0401
FDB5  DF00                 STX    TMP            TMP=4
FDB7  CE0119               LDX    #INDEX+CHANC1
FDBA  C604      SETLP1     LDA B  #4
FDBC  F70149               STA B  CNT            CNT=4
FDBF  D60C                 LDA B  CHANRD
FDC1  DB01                 ADD B  TMP+1
FDC3  E700      SETLP2     STA B  0,X            STORE CONTROL
FDC5  08                   INX
FDC6  DB0C                 ADD B  CHANRD
FDC8  7A0149               DEC    CNT
FDCB  26F6                 BNE    SETLP2         B IF MORE CHANNELS
FDCD  7A0000               DEC    TMP
FDD0  2705                 BEQ    SETXIT         B IF TABLE END
FDD2  780001               ASL    TMP+1          INC GAIN
FDD5  20E3                 BRA    SETLP1
FDD7  39        SETXIT     RTS
                * C A L I B R A T I O N - C O M P L E T E D
                *
FDD8            MAG128     EQU    *              VERIFY MAGNITUDE .LT. 128
FDD8  7F0010               CLR    GAIN           CLEAR ERROR FLAG
FDDB  4D                   TST A                 2
FDDC  2B0D                 BMI    CKNEG          4
FDDE  01                   NOP                   2 DELAY
```

```
FDDF  2603                 BNE    MAGER1        4/10
FDE1  5D                   TST B                2
FDE2  2A06                 BPL    NER1          4
FDE4  4F          MAGER1   CLR A                2
FDE5  C67F                 LDA B  #127          2
FDE7  7C0010               INC    GAIN          SET ERROR FLAG
FDEA  39          NER1     RTS                  5/19,21,OR 25
FDEB  4C          CKNEG    INC A                2
FDEC  2603                 BNE    MAGER2        4/12
FDEE  5D                   TST B                2
FDEF  2B05                 BMI    NER2          4
FDF1  C680        MAGER2   LDA B  #-128         2
FDF3  7C0010               INC    GAIN          SET ERROR FLAG
FDF6  86FF        NER2     LDA A  #-1           2
FDF8  39                   RTS                  5/21,25,OR 27

                  ****************************************************************
                  *
                  *
                  *  THE FOLLOWING ASSUMPTIONS ARE MADE BY THE DATA READ ROU
                  * - - 1) CALIBRATION HAS BEEN COMPLETED & THE OFFSET BIASE
                  * - - - - IN THE TABLE PAOFST
                  *
                  * - - 2) THE ADC HAS BEEN TURNED ON AND READY TO ACCEPT A
                  *
                  * - - 3) A 1.4 SECOND DELAY FOR CAPACITOR CHARGE HAS BEEN
                  *
                  * - - 4) THE CCD IS READY TO ACCEPT DATA (ALREADY ON AND I
                  *
                  * - - 5) THE PROPER HZ HAS BEEN 'OR'ED WITH THE APPROPRIAT
                  * - - - - HZ11,HZ21,HZ31,HZ22,HZ24,HZ28
                  *
                  * - - 6) THE LOCATION 'WDCNT' & WDCNT+1 CONTAINS THE NUMBE
                  * - - - - WORDS WHICH ARE TO BE STORED IN THE CCD
                  *
                  * - - 7) TABLES CHANC1 THRU CHANC4 HAVE BEEN MOVED TO FOLL
                  * - - - - PAOFST IN POWER PROTECTED RAM FOR COMMON INDEX A
                  * - - 8) IF THE BLASTER IS ON THIS RTU, THEN 'BLSTCH' CONT
                  * - - - - INDEX TO THE CHANNEL (ADDR OF 'PAOADD'-1 + CHAN#
                  * - - - - 'BRSET' CONTAINS THE ADC ADDR REQ'D TO SAMPLE TH
                  * - - - - DIRECTLY (X'24' - X'27'). NOTE!! THESE CELLS MUS
                  * - - - - UNTIL THE BLAST COMMAND IS RECEIVED.
                  *
                  ****************************************************************
FDF9              DATCOL   EQU    *             DATA COLLECTION ROUTINE
FDF9  4F                   CLR A
FDFA  9704                 STA A  FIRST         INIT FIRST LOOP SWITCH
FDFC  9706                 STA A  DATA+1        ZERO DATA FOR TB SEARCH
FDFE  B70155               STA A  LSTVAL        INIT TB FLAG
FE01  9622                 LDA A  WDCNT
FE03  D623                 LDA B  WDCNT+1
FE05  DB0B                 ADD B  RDCNT+1
FE07  990A                 ADC A  RDCNT
FE09  970A                 STA A  RDCNT
FE0B  D70B                 STA B  RDCNT+1       TOTAL NUMBER OF POINTS READ
FE0D  DE22                 LDX    WDCNT
FE0F  08                   INX
FE10  DF22                 STX    WDCNT         ADJUST COUNT FOR LOOP CONTRO
FE12  86FF                 LDA A  #TDLAY/$100   2
FE14  9702                 STA A  TMP+2         4 INIT DELAY TABLE POINTER
FE16  9618                 LDA A  HZ31
FE18  B7801A               STA A  SHD           SET BOTH S&H TO HOLD
FE1B  960F                 LDA A  PLSRST
FE1D  DE11                 LDX    BLSTCH
FE1F  FF0157               STX    BSRCH
FE22  2729                 BEQ    INITC3        B IF NO BLASTER
FE24  2000                 BRA    *+2           X HAS BLASTER CHANNEL NDX
FE26  7EFE51               JMP    INITC1
                  *
FE29  9704        FTIM     STA A  FIRST         **
FE2B  F70149               STA B  CNT           INITIALIZE CNT
FE2E  860F                 LDA A  #15           ** 108 MIC/SEC DELAY
                  *:90        90 USEC TO FOLLOWING *;
FE30  4A                   DEC A                *
```

```
FE31  26FD                BNE    *-1           *
           *;
FE33  01                  NOP                  2
FE34  01                  NOP                  *
FE35  7EFEBD              JMP    CKGAIN        **
           *
FE38             NOTC3    EQU    *
FE38  7EFE50              JMP    INITC
           *
FE3B  D60D       NOTBLT   LDA B  DOGAIN        3 NOT BLAST CHAN, GET DESIRE
FE3D  7EFE5B              JMP    RSTPLS        3
           *
           *
           *
           * T = 0
FE40             LOOP     EQU    *
FE40  960F                LDA A  PLSRST        3
FE42  16                  TAB
FE43  CA80                ORA B  #$80
FE45  F78018              STA B  ADCNVP        GENERATE CONVERT PULSE
FE48             INIT     EQU    *
FE48  8C0104              CPX    #INDEX+3      3
FE4B  26EB                BNE    NOTC3         4
FE4D  CE0100     INITC3   LDX    #INDEX-1      3 RESET FOR CHANNEL 1
FE50  08         INITC    INX
FE51  DF00       INITC1   STX    TMP           5
FE53  9C11                CPX    BLSTCH        4
FE55  26E4                BNE    NOTBLT        4/38 B IF NOT BLASTER CHAN
FE57  B60154              LDA A  BRSET         4 SETUP ADC TO SAMPLE BLASTE
FE5A  5F                  CLR B                2/6 NO GAIN ON BLAST CHAN
FE5B  B78018     RSTPLS   STA A  ADCNVP        5 RESET CONV. PULSE, SET ADC
FE5E  D710                STA B  GAIN          4 SET GAIN/NO-GAIN CORRECTIO
FE60  E618                LDA B  CHANC1,X      5/14
           *
           * T = 58 MIC/SEC
           *
FE62             RDCH1    EQU    *
FE62  F78019              STA B  CHC           5 SET CHANNEL
FE65  A60C                LDA A  C2D1,X        5
FE67  B7801B              STA A  OSB1          5 ZERO GAIN RANGE AMPS WITH
FE6A  A610                LDA A  C3D1,X        5  FIRST OFFSET VALUES
FE6C  B7801C              STA A  OSB2          5
FE6F  A614                LDA A  C4D1,X        5
FE71  B7801D              STA A  OSB3          5
FE74  9616                LDA A  HZ11          3  INTERMEDIATE SAMPLE
FE76  B7801A              STA A  SHD           5/43
FE79  F60004              LDA B  FIRSTE
0004             FIRSTE   EQU    FIRST         EQU TO FORCE EXTENDED MODE
FE7C  27AB                BEQ    FTIM          4/7  B IF INITIAL LOOP
           *
006E             ET1      EQU    58+2+43+7
           *
FE7E  B68016              LDA A  ADCMSB        4 PREVIOUS CHANNEL DATA
FE81  F68017              LDA B  ADCLSB        4/8
FE84  C4FC                AND B  #$FC          2
FE86  9706                STA A  DATA+1        4 STORE ACQUIRED DATA
FE88  D707                STA B  DATA+2        4/10
           *

           * COMPUTE ODD PARITY
           *
FE8A  9805                EOR A  DATA          3
FE8C  9807                EOR A  DATA+2        3
FE8E  16                  TAB                  2
FE8F  54                  LSR B                2
FE90  1B                  ABA                  2
FE91  54                  LSR B                2
FE92  1B                  ABA                  2
FE93  54                  LSR B                2
FE94  1B                  ABA                  2
FE95  54                  LSR B                2
FE96  1B                  ABA                  2
```

```
FE97  54               LSR B                2
FE98  1B               ABA                  2
FE99  54               LSR B                2
FE9A  1B               ABA                  2
FE9B  54               LSR B                2
FE9C  1B               ABA                  2
FE9D  43               COM A                2 GENERATE ODD PARITY
FE9E  8401             AND A  #1            2/40
FEA0  9A07             ORA A  DATA+2        3/3
FEA2  B7800F           STA A  CCD           5 STORE DATA INTO CCD
FEA5  44               LSR A                2
FEA6  44               LSR A                2
FEA7  44               LSR A                2
FEA8  44               LSR A                2
FEA9  B7800F           STA A  CCD           5/18
FEAC  9606             LDA A  DATA+1        3
FEAE  B7800F           STA A  CCD           5
FEB1  44               LSR A                2
FEB2  44               LSR A                2
FEB3  44               LSR A                2
FEB4  44               LSR A                2
FEB5  B7800F           STA A  CCD           5
FEB8  9605             LDA A  DATA          3
FEBA  B7800F           STA A  CCD           5/29
              *
00DA          ET2      EQU    ET1+8+10+40+3+18+29** ELAPSED TIME **
              *
FEBD          CKGAIN   EQU    *
FEBD  9617             LDA A  HZ21          3
FEBF  2B03             BMI    *+5           4
              *:500         500 USEC TO FOLLOWING *;
FEC1  BDFFAA           JSR    HZIS62        (9) B IF SLOW RATE
              *;
FEC4  B7801A  IHOS     STA A  SHD           5 INTERMED HOLD, OUTPUT SAMP
FEC7  A600             LDA A  C1D2,X        5
FEC9  B7801B           STA A  OSB1          5 ZERO GAIN RANGE AMPS WITH
FECC  A604             LDA A  C1D3,X        5  SECOND OFFSET VALUES
FECE  B7801C           STA A  OSB2          5
FED1  A608             LDA A  C1D4,X        5
FED3  B7801D           STA A  OSB3          5
FED6  7F0005           CLR    DATA          6
FED9  A61C             LDA A  CHANC2,X      5
FEDB  C601             LDA B  #STBIT        2/55
FEDD  D510             BIT B  GAIN          3 CK TO SEE IF GAIN REQ'D
FEDF  2603             BNE    *+5           4/7

FEE1  7EFF72           JMP    SKPGAN        (3) BYPASS GAIN CORRECTION
              *
0118          ET3      EQU    55+7+ET2      ** E L A P S E D - T I M E *
              *
FEE4  F58019           BIT B  GAINST        4
              *:60,0        ADD 60USEC IF NO BRANCH, 0USEC OTHERWISE
FEE7  2603             BNE    TRYC2         4
FEE9  7EFF6C           JMP    GOTC          (3) GAIN IS C1
FEEC  B78019  TRYC2    STA A  CHC           5/13
              *
0125          ET4      EQU    ET3+13        ** E L A P S E D - T I M E *
              *
FEEF  8604             LDA A  #4            2
FEF1  9705             STA A  DATA          4
FEF3  A620             LDA A  CHANC3,X      5
FEF5  7D0024           TST    CHANC4        6/17 DELAY
              *
FEF8  F58019           BIT B  GAINST        4
              *:30,0        ADD 30USEC IF NO BRANCH, 0USEC OTHERWISE
FEFB  2603             BNE    TRYC3         4
FEFD  7EFF6C           JMP    GOTC          (3) GAIN IS C2 (X16)
FF00  B78019  TRYC3    STA A  CHC           5/13
              *
FF03  8608             LDA A  #8            2
FF05  9705             STA A  DATA          4
FF07  A624             LDA A  CHANC4,X      5
```

```
FF09  7D0024          TST    CHANC4        6/17 DELAY
                *
FF0C  F58019          BIT B  GAINST        4
FF0F  2603            BNE    ITSC4         4
FF11  7EFF6C          JMP    GOTC          (3) GAIN IS C3 (X512)
FF14  B78019    ITSC4 STA A  CHC           5/13 GAIN IS C4 (X1024)
                *
FF17  860C            LDA A  #12           2
FF19  9705            STA A  DATA          4/6
                *
0167            ET5   EQU    ET4+17+13+17+13+6** E L A P S E D - T I M E
                *
FF1B            GOTCGN EQU   *
FF1B  9619            LDA A  HZ22          3/3
                *
FF1D  C601            LDA B  #STBIT        2
FF1F  F5801A          BIT B  DSTAT         4
                *:0,72      ADD 0USEC IF NO BRANCH, 72USEC OTHERWISE
FF22  2729            BEQ    GOTGAN        4 B IF XD1
FF24  B7801A          STA A  SHD           5/15
                *
0179            ET6   EQU    ET5+3+15      ** E L A P S E D - T I M E *
                *
FF27  7C0005          INC    DATA          6
FF2A  961A            LDA A  HZ24          3
FF2C  7DFFBB          TST    CB            6 DELAY
FF2F  01              NOP                  2/17
                *
FF30  F5801A          BIT B  DSTAT         4
                *:0,42      ADD 0USEC IF NO BRANCH, 42USEC OTHERWISE
FF33  2718            BEQ    GOTGAN        4 B IF XD2
FF35  B7801A          STA A  SHD           5/13

                *
FF38  7C0005          INC    DATA          6
FF3B  961B            LDA A  HZ28          3
FF3D  7DFFBB          TST    CB            6 DELAY
FF40  01              NOP                  2/17
                *
FF41  F5801A          BIT B  DSTAT         4
                *:0,12      ADD 0USEC IF NO BRANCH, 12USEC OTHERWISE
FF44  2707            BEQ    GOTGAN        4 B IF XD3
FF46  B7801A          STA A  SHD           5/13
                *
FF49  DB05            ADD B  DATA          3 **
FF4B  D705            STA B  DATA          4 ** 7 MIC/SEC DELAY REQ'D F
                *
01BC            ET7   EQU    ET6+17+13+17+13+7** E L A P S E D - T I M E
FF4D            GOTGAN EQU   *
FF4D  86E6            LDA A  #TDLAY-TDLAYH 2
FF4F  9B05            ADD A  DATA          3
FF51  9703            STA A  TMP+3         4
FF53  DE02            LDX    TMP+2         4
FF55  A600            LDA A  0,X           5
FF57  4A        TLOOP DEC A                2
                *:4          4 USEC TO FOLLOWING *;
FF58  26FD            BNE    *-1           4/24 DELAY ACCORDING TO GAIN
                *;
                *
                * T = 468 MIC/SEC EXPIRED REGUARDLESS OF GAIN SELECTED
                *
FF5A            RDSET EQU    *
FF5A  9618            LDA A  HZ31          3
FF5C  B7801A          STA A  SHD           5 BOTH SAMPLE & HOLDS TO HOL
FF5F  DE22            LDX    WDCNT         4
FF61  09              DEX                  4
FF62  2707            BEQ    DUNX          4
FF64  DF22            STX    WDCNT         5
FF66  DE00            LDX    TMP           4
FF68  7EFE40          JMP    LOOP          3/32
                *$          END OF LOOP.  TIME TO HERE
                *
                * T = 500 ** E N D - O F - L O O P **
                *
```

```
FF6B            1211 DUNX     EQU    *
FF6B   39       1212          RTS
FF6C   BCFF6C   1213 GOTC     CPX    GOTC            (5) DELAY
FF6F   7EFF1B   1214          JMP    GOTCGN          (3)
FF72            1215 SKPGAN   EQU    *
FF72   B60157   1216          LDA A  BSRCH           4
FF75   2607     1217          BNE    CKBLST          4/8 GO CHECK FOR BLAST SIGNA
FF77   861C     1218          LDA A  #28             2
FF79   01       1219          NOP                    2
FF7A   01       1220          NOP                    2 DELAY
                1221 *:162         162 USEC TO FOLLOWING *;
                1222 *;
FF7B   7EFF57   1223 CKB5     JMP    TLOOP           3/7+8 = 15
FF7E   7C0149   1224 CKBLST   INC    CNT             6 MAINTAIN CNT TO NEXT CHAN
FF81   9606     1225          LDA A  DATA+1          3
FF83   48       1226          ASL A                  2
FF84   2916     1227          BVS    CKB1            4 B IF TIMEBREAK > 5.12V

FF86   48       1228          ASL A                  2
FF87   2916     1229          BVS    CKB2            4 B IF TIMEBREAK > 2.56V
FF89   B60155   1230          LDA A  LSTVAL          4
FF8C   2718     1231          BEQ    CKB3            4 B IF TIMEBREAK NOT RISEN Y
FF8E   F60149   1232 NXTCHN   LDA B  CNT             4
FF91   C403     1233          AND B  #$3             2
FF93   D701     1234          STA B  TMP+1           4 ADDR OF NEXT CHAN
FF95   7F0157   1235          CLR    BSRCH           6
FF98   8615     1236          LDA A  #21             2
                1237 *:120         120 USEC TO FOLLOWING *;
                1238 *;
FF9A   20BB     1239          BRA    TLOOP           4 TIME OUT AND CONTINUE LOOP
FF9C   7C0155   1240 CKB1     INC    LSTVAL          6 SET TIMEBREAK RISE FLAG
FF9F   8618     1241 CKB2     LDA A  #24             2
                1242 *:138         138 USEC TO FOLLOWING *;
                1243 *;
FFA1   7A0001   1244 CKB4     DEC    TMP+1           RESET BLASTER CHANNEL COMPAR
FFA4   20B1     1245          BRA    TLOOP           4 TIME OUT AND CONTINUE LOOP
FFA6   8616     1246 CKB3     LDA A  #22             2
                1247 *:126         126 USEC TO FOLLOWING *;
                1248 *;
FFA8   20F7     1249          BRA    CKB4            4 TIME OUT AND CONTINUE LOOP
FFAA            1250 DLAY5    EQU    *
FFAA   C650     1251 HZIS62   LDA B  #80             2 DELAY ADDITIONAL 500 MIC/S
FFAC   5A       1252          DEC B                  2*80 = 160
FFAD   26FD     1253          BNE    *-1             4*80 = 320
FFAF   01       1254          NOP                    2
FFB0   01       1255          NOP                    2
FFB1   39       1256          RTS                    5/491
FFB2   CECD17   1257 DLAY14   LDX    #1591*DW        DELAY 1.591 SECONDS (10 TIME
FFB5   3F       1258 D1400    SWI                    22
FFB6   09       1259          DEX                    4
FFB7   26FC     1260          BNE    D1400           4/64 * 24860 = 1591040 MIC/S
FFB9   39       1261          RTS
FFBA   3B       1262 NOP      RTI
0021            1263 DW       EQU    1000/30         DELAY WAIT TIME IN CYCLES/MI
0006            1264 DWM      EQU    6               SMALL DELAY WAIT TIME IN USE

                1266 *
                1267 * THE FOLLOWING TABLES S H A L L - N O T I  BE LOCATED ACR
                1268 * - - - - ADDRESS BOUNDARY, I.E., 2F5 TO 31A IS A NO-NO. T
                1269 * - - - - SHOULD BE CONTIGUOUS.
                1270 *
                1271 *
FFBB            1272 CB       EQU    *               CHANNEL/BIAS BIT NUMBER FOR
FFBB   11       1273          FCB    $11,$21,$31,$41CHAN TIMES 2
FFBC   21
FFBD   31
FFBE   41
FFBF   11       1274          FCB    $11,$21,$31,$41CHAN TIMES 4
FFC0   21
FFC1   31
FFC2   41
FFC3   11       1275          FCB    $11,$21,$31,$41CHAN TIMES 8
FFC4   21
```

```
FFC5  31
FFC6  41
FFC7  12               FCB     $12,$22,$32,$42CHAN TIMES 16
FFC8  22
FFC9  32
FFCA  42
FFCB  14               FCB     $14,$24,$34,$44CHAN TIMES 256
FFCC  24
FFCD  34
FFCE  44
FFCF  18               FCB     $18,$28,$38,$48CHAN TIMES 4096
FFD0  28
FFD1  38
FFD2  48
FFD3          HC       EQU     *                HOLD/SAMPLE & X2,4,8 FOR ADD
FFD3  22               FCB     $22,$24,$28      SET 2
FFD4  24
FFD5  28
FFD6  21               FCB     $21,$21,$21      SET 1 PREAMPS
FFD7  21
FFD8  21
FFD9          DB       EQU     *                SAMPLE/HOLD & X2,4,8 FOR ADD
FFD9  12               FCB     $12,$14,$18      SET 2 CALIB
FFDA  14
FFDB  18
FFDC  11               FCB     $11,$11,$11      SET 1 CALIB
FFDD  11
FFDE  11
FFDF  11               FCB     $11
FFE0          CALCH    EQU     *                TABLE CB EQUIVILENT FOR CALI
FFE0  01               FCB     $01,$01,$01
FFE1  01
FFE2  01
FFE3  02               FCB     $02,$04,$08
FFE4  04
FFE5  08
              *
              * TABLE PAOFST MUST BE IN POWER-PROTECTED RAM. A ROUTINE M
              * - - TABLES CHANC1 THRU CHANC4 TO FOLLOW PAOFST IN ORDER
              * - - COMMON INDEXING
              *
FFE6          TDLAY    EQU     *                CONTAINS # OF 6 MIC/SEC DELA
FF00          TDLAYH   EQU     TDLAY/$100*$100
FFE6  17               FCB     23,18,13,11      C1XD2,3,4 DELAY
FFE7  12
FFE8  0D
FFE9  0B
FFEA  12               FCB     18,13,8,6        C2XD2,3,4 DELAY
FFEB  0D
FFEC  08
FFED  06
FFEE  0D               FCB     13,8,3,1         C3XD2,3,4 DELAY
FFEF  08
FFF0  03
FFF1  01
FFF2  0D               FCB     13,8,3,1         C4XD2,3,4 DELAY
FFF3  08
FFF4  03
FFF5  01
              *
              *
              * ************************************************************
              *
              *
FFF6                   ORG     $FFF8
FFF8  F800             FDB     INITIN,NOP,INITIN,INITIN
FFFA  FFBA
FFFC  F800
FFFE  F800
0000                   END
```

NO ERRORS

| | | | | | | | | | | | | |
|---|---|---|---|---|---|---|---|---|---|---|---|---|
| ACK | F8A3 | 231 | 203 | | | | | | | | | |
| ACK2 | F8A3 | 232 | | | | | | | | | | |
| ACK2A | FACD | 510 | 525 | 528 | | | | | | | | |
| ACK3 | F8B5 | 240 | 199 | 204 | 209 | 212 | 248 | 262 | 510 | | | |
| ACK3A | F8B3 | 239 | 404 | | | | | | | | | |
| ACKV | 0001 | 117 | 202 | | | | | | | | | |
| ACQPWR | 000E | 113 | 253 | 260 | 458 | | | | | | | |
| ACTV | 001F | 28 | 224 | 398 | 485 | | | | | | | |
| ADCLSB | 8017 | 94 | 738 | 1049 | | | | | | | | |
| ADCMSB | 8016 | 93 | 736 | 1048 | | | | | | | | |
| ADCNVP | 8018 | 95 | 702 | 824 | 826 | 1015 | 1026 | | | | | |
| ADCSTR | FBCA | 646 | | | | | | | | | | |
| ADDR | 0048 | 35 | 579 | 584 | | | | | | | | |
| AVG | 0018 | 48 | 778 | 779 | 780 | 781 | 837 | 838 | 856 | 857 | | |
| BIADD | 014F | 66 | 689 | 765 | 777 | 790 | 798 | 829 | 831 | 836 | 864 | 87 |
| BLAST | F8D0 | 259 | 198 | | | | | | | | | |
| BLKSIZ | 001D | 26 | 339 | 489 | | | | | | | | |
| BLST1 | F8E3 | 269 | 297 | | | | | | | | | |
| BLST2 | F8EA | 273 | 289 | | | | | | | | | |
| BLST3 | F8F1 | 276 | 277 | | | | | | | | | |
| BLST4 | F8FD | 282 | 283 | | | | | | | | | |
| BLST5 | F907 | 287 | 288 | 294 | | | | | | | | |
| BLST6 | F90C | 290 | 285 | | | | | | | | | |
| BLST7 | F916 | 295 | 292 | | | | | | | | | |
| BLST9 | F91D | 298 | 270 | | | | | | | | | |
| BLSTCH | 0011 | 14 | 235 | 267 | 985 | 1022 | | | | | | |
| BLSTER | 004D | 39 | 220 | 266 | 273 | 278 | 520 | 522 | 527 | | | |
| BLSTRG | 800C | 78 | 225 | 274 | 279 | 399 | 436 | 534 | 614 | | | |
| BLSTV | 00E0 | 126 | 197 | | | | | | | | | |
| BRSET | 0154 | 69 | 524 | 1024 | | | | | | | | |
| BSRCH | 0157 | 71 | 986 | 1216 | 1235 | | | | | | | |
| C1D2 | 0000 | 51 | 52 | 769 | 1101 | | | | | | | |
| C1D3 | 0004 | 52 | 53 | 771 | 1103 | | | | | | | |
| C1D4 | 0008 | 53 | 54 | 773 | 1105 | | | | | | | |
| C2D1 | 000C | 54 | 55 | 720 | 1034 | | | | | | | |
| C3D1 | 0010 | 55 | 56 | 722 | 1036 | | | | | | | |
| C4D1 | 0014 | 56 | 724 | 1038 | | | | | | | | |
| CALALL | FC14 | 697 | 694 | | | | | | | | | |
| CALC | FD19 | 822 | | | | | | | | | | |
| CALC0 | FC1F | 703 | 880 | | | | | | | | | |
| CALC1 | FC24 | 705 | 863 | | | | | | | | | |
| CALC2 | FC31 | 710 | 827 | | | | | | | | | |
| CALC3 | FC2C | 708 | | | | | | | | | | |
| CALCH | FFE0 | 1286 | 695 | | | | | | | | | |
| CALCHN | FCCB | 785 | 766 | | | | | | | | | |
| CALIB1 | FBDA | 674 | 251 | 565 | 610 | 639 | | | | | | |
| CALSTP | 8015 | 91 | 469 | 605 | 627 | 632 | 637 | 644 | 675 | | | |
| CB | FFBB | 1272 | 692 | 1163 | 1173 | | | | | | | |
| CBADD | 014B | 64 | 697 | 710 | 751 | 796 | 805 | 807 | 865 | 867 | 872 | 87 |
| CCD | 800F | 85 | 324 | 326 | 328 | 368 | 369 | 371 | 373 | 375 | 384 | 38 |
| | | | 437 | 442 | 1076 | 1081 | 1083 | 1088 | 1090 | | | |
| CCDADR | 800E | 84 | 318 | | | | | | | | | |
| CCDCTL | 800D | 81 | 310 | 312 | 357 | 361 | 365 | 367 | 402 | 406 | 461 | 46 |
| CCDPWR | 000C | 112 | 454 | | | | | | | | | |
| CCDSTB | 800D | 79 | 319 | 359 | 362 | 377 | | | | | | |
| CET1 | 0065 | 728 | 737 | | | | | | | | | |
| CET2 | 0070 | 737 | 755 | | | | | | | | | |
| CET3 | 00E3 | 755 | 783 | | | | | | | | | |
| CET4 | 013D | 783 | 802 | | | | | | | | | |
| CET5 | 0177 | 802 | 813 | | | | | | | | | |
| CET6 | 01A0 | 813 | | | | | | | | | | |
| CH | 0004 | 50 | 52 | 53 | 54 | 55 | 56 | | | | | |
| CHANC1 | 0018 | 57 | 58 | 899 | 1028 | | | | | | | |
| CHANC2 | 001C | 58 | 59 | 1108 | | | | | | | | |
| CHANC3 | 0020 | 59 | 60 | 1126 | | | | | | | | |
| CHANC4 | 0024 | 60 | 1127 | 1137 | 1138 | | | | | | | |
| CHANCK | FCC7 | 782 | | | | | | | | | | |
| CHANEL | 0153 | 68 | 709 | 792 | 800 | 804 | | | | | | |
| CHANRD | 000C | 9 | 473 | 638 | 693 | 763 | 782 | 870 | 881 | 902 | 906 | |

| | | | | | | | | | | | | | |
|---|---|---|---|---|---|---|---|---|---|---|---|---|---|
| CHC | 8019 | 97 | 477 | 677 | 696 | 719 | 756 | 1033 | 1120 | 1133 | 1143 | | |
| CHGOFS | FD26 | 829 | 794 | | | | | | | | | | |
| CK1TO8 | F86E | 200 | 158 | | | | | | | | | | |
| CKB1 | FF9C | 1240 | 1227 | | | | | | | | | | |
| CKB2 | FF9F | 1241 | 1229 | | | | | | | | | | |
| CKB3 | FFA6 | 1246 | 1231 | | | | | | | | | | |
| CKB4 | FFA1 | 1244 | 1249 | | | | | | | | | | |
| CKB5 | FF7B | 1223 | | | | | | | | | | | |
| CKBLST | FF7E | 1224 | 1217 | | | | | | | | | | |
| CKDONE | FD92 | 878 | 871 | | | | | | | | | | |
| CKGAIN | FEBD | 1094 | 1000 | | | | | | | | | | |
| CKNEG | FDEB | 928 | 919 | | | | | | | | | | |
| CLRK | FC1A | 699 | | | | | | | | | | | |
| CLRPAO | FBF1 | 683 | 686 | | | | | | | | | | |
| CLRSEL | FAE2 | 526 | 517 | | | | | | | | | | |
| CMD | 004C | 38 | 142 | 191 | | | | | | | | | |
| CMDREG | 800C | 77 | 141 | | | | | | | | | | |
| CMDSTK | 0028 | 34 | 29 | 154 | 234 | | | | | | | | |
| CNT | 0149 | 62 | 706 | 787 | 832 | 835 | 851 | 859 | 901 | 907 | 992 | 122 | |
| CNT2 | 014A | 63 | 543 | 582 | 641 | 704 | 848 | 861 | | | | | |
| CNTL | 001C | 25 | 171 | 175 | 177 | | | | | | | | |
| CNVPLS | 000E | 11 | 475 | 535 | 647 | 823 | | | | | | | |
| CONT | FCA6 | 767 | 758 | | | | | | | | | | |
| CSTKPT | 0020 | 29 | 145 | 153 | 233 | 351 | | | | | | | |
| CYCCK | FCD9 | 792 | 784 | | | | | | | | | | |
| D1400 | FFB5 | 1258 | 308 | 330 | 401 | 457 | 557 | 1260 | | | | | |
| DATA | 0005 | 6 | 744 | 745 | 775 | 776 | 969 | 1051 | 1052 | 1056 | 1057 | 107 | |
| | | | 1161 | 1171 | 1181 | 1182 | 1187 | 1225 | | | | | |
| DATACL | 00C0 | 128 | 468 | 631 | | | | | | | | | |
| DATARD | FA55 | 449 | 249 | 608 | | | | | | | | | |
| DATCL1 | FB40 | 571 | 550 | 568 | 586 | 626 | 635 | | | | | | |
| DATCOL | FDF9 | 966 | 298 | 571 | | | | | | | | | |
| DATRD1 | FA30 | 468 | 137 | 252 | 564 | 566 | | | | | | | |
| DATRD2 | FA35 | 470 | 250 | 609 | | | | | | | | | |
| DB | FFD9 | 1282 | 715 | | | | | | | | | | |
| DLAY14 | FFB2 | 1257 | 452 | 453 | 567 | 617 | 628 | 698 | | | | | |
| DLAY5 | FFAA | 1250 | 750 | | | | | | | | | | |
| DODTST | FAE9 | 532 | 213 | | | | | | | | | | |
| DOGAIN | 000D | 10 | 539 | 648 | 1005 | | | | | | | | |
| DOSEL | FAD0 | 515 | 207 | | | | | | | | | | |
| DOSTAT | FA9A | 482 | 206 | | | | | | | | | | |
| DOXMIT | F930 | 304 | 214 | | | | | | | | | | |
| DSTAT | 801A | 100 | 1154 | 1166 | 1176 | | | | | | | | |
| DTEST | F885 | 211 | 196 | | | | | | | | | | |
| DTESTV | 0020 | 120 | 195 | | | | | | | | | | |
| DUNX | FF6B | 1211 | 1203 | | | | | | | | | | |
| DW | 0021 | 1263 | 307 | 329 | 400 | 456 | 556 | 1257 | | | | | |
| DWM | 0006 | 1264 | 138 | | | | | | | | | | |
| END | 004A | 36 | 580 | 589 | | | | | | | | | |
| ET1 | 006E | 1046 | 1092 | | | | | | | | | | |
| ET2 | 00DA | 1092 | 1114 | | | | | | | | | | |
| ET3 | 0118 | 1114 | 1122 | | | | | | | | | | |
| ET4 | 0125 | 1122 | 1148 | | | | | | | | | | |
| ET5 | 0167 | 1148 | 1159 | | | | | | | | | | |
| ET6 | 0179 | 1159 | 1184 | | | | | | | | | | |
| ET7 | 01BC | 1184 | | | | | | | | | | | |
| FIRST | 0004 | 5 | 707 | 729 | 757 | 760 | 968 | 991 | 1043 | | | | |
| FIRSTE | 0004 | 1043 | 1042 | | | | | | | | | | |
| FLGS1 | FD59 | 854 | 844 | 850 | | | | | | | | | |
| FSKTBL | F923 | 300 | 268 | | | | | | | | | | |
| FSTTIM | FC61 | 731 | | | | | | | | | | | |
| FTIM | FE29 | 991 | 1044 | | | | | | | | | | |
| GAIN | 0010 | 13 | 917 | 926 | 933 | 1027 | 1110 | | | | | | |
| GAINST | 8019 | 98 | 1116 | 1129 | 1140 | | | | | | | | |
| GETHCA | FC7A | 746 | 734 | | | | | | | | | | |
| GOTC | FF6C | 1213 | 1119 | 1132 | 1142 | 1213 | | | | | | | |
| GOTCGN | FF1B | 1150 | 1214 | | | | | | | | | | |
| GOTGAN | FF4D | 1185 | 1156 | 1168 | 1178 | | | | | | | | |
| GRSTAR | FBBC | 640 | | | | | | | | | | | |
| HC | FFD3 | 1279 | 690 | 715 | 878 | | | | | | | | |
| HCADD | 0151 | 67 | 691 | 714 | 746 | 814 | 868 | 869 | | | | | |
| HLDDT | FA00 | 398 | 299 | 569 | | | | | | | | | |

| | | | | | | | | | | | | |
|---|---|---|---|---|---|---|---|---|---|---|---|---|
| HLDPWR | 0005 | 114 | 403 | | | | | | | | | |
| HZ | 0013 | 15 | 495 | 716 | 748 | 817 | | | | | | |
| HZ11 | 0016 | 18 | 499 | 1040 | | | | | | | | |
| HZ21 | 0017 | 19 | 501 | 1095 | | | | | | | | |
| HZ22 | 0019 | 21 | 505 | 1151 | | | | | | | | |
| HZ24 | 001A | 22 | 507 | 1162 | | | | | | | | |
| HZ28 | 001B | 23 | 509 | 1172 | | | | | | | | |
| HZ31 | 0018 | 20 | 503 | 982 | 1199 | | | | | | | |
| HZIS62 | FFAA | 1251 | 1098 | | | | | | | | | |
| HZSAM | 0015 | 17 | 183 | 497 | 611 | | | | | | | |
| IHOS | FEC4 | 1100 | | | | | | | | | | |
| IMPLSV | 0040 | 129 | | | | | | | | | | |
| IMPULS | FB99 | 626 | | | | | | | | | | |
| INCCB | FCE1 | 796 | 764 | 833 | | | | | | | | |
| INDEX | 0101 | 49 | 899 | 1017 | 1019 | | | | | | | |
| INIT | FE48 | 1016 | | | | | | | | | | |
| INITC | FE50 | 1020 | 1003 | | | | | | | | | |
| INITC1 | FE51 | 1021 | 989 | | | | | | | | | |
| INITC3 | FE4D | 1019 | 987 | | | | | | | | | |
| INITF | F81D | 150 | | | | | | | | | | |
| INITG | F823 | 153 | 148 | | | | | | | | | |
| INITIN | F800 | 135 | 1306 | 1306 | 1306 | | | | | | | |
| INITV | 0002 | 118 | 143 | | | | | | | | | |
| INTRTU | F88F | 218 | 144 | | | | | | | | | |
| ITSC4 | FF14 | 1143 | 1141 | | | | | | | | | |
| LEVTAT | FBAF | 635 | | | | | | | | | | |
| LOOP | FE40 | 1011 | 1206 | | | | | | | | | |
| LPHOLD | FD05 | 811 | 788 | 801 | | | | | | | | |
| LSTVAL | 0155 | 70 | 970 | 1230 | 1240 | | | | | | | |
| MAG128 | FDD8 | 916 | 743 | | | | | | | | | |
| MAGER1 | FDE4 | 924 | 921 | | | | | | | | | |
| MAGER2 | FDF1 | 932 | 929 | | | | | | | | | |
| MODCB | FCF6 | 805 | | | | | | | | | | |
| MOVADD | FD35 | 835 | 791 | | | | | | | | | |
| MOVAVG | FD3B | 837 | 860 | | | | | | | | | |
| MX1000 | F839 | 167 | | | | | | | | | | |
| MXA | F83E | 170 | | | | | | | | | | |
| MXE | F84D | 182 | 169 | | | | | | | | | |
| NER1 | FDEA | 927 | 923 | | | | | | | | | |
| NER2 | FDF6 | 934 | 931 | | | | | | | | | |
| NGANRT | FD9A | 881 | 879 | | | | | | | | | |
| NOBLK | FAA7 | 490 | | | | | | | | | | |
| NOP | FFBA | 1262 | 1306 | | | | | | | | | |
| NOTBLT | FE3B | 1005 | 1023 | | | | | | | | | |
| NOTC3 | FE38 | 1002 | 1018 | | | | | | | | | |
| NOTFST | FC69 | 735 | 730 | | | | | | | | | |
| NXTCHN | FF8E | 1232 | | | | | | | | | | |
| NXTGAN | FD6D | 864 | 862 | | | | | | | | | |
| OSB1 | 801B | 101 | 679 | 721 | 770 | 1035 | 1102 | | | | | |
| OSB2 | 801C | 102 | 680 | 723 | 772 | 1037 | 1104 | | | | | |
| OSB3 | 801D | 103 | 681 | 725 | 774 | 1039 | 1106 | | | | | |
| PAOADD | 014D | 65 | 687 | 717 | 768 | 797 | 809 | | | | | |
| PAOFST | 0101 | 47 | 49 | 57 | 57 | 521 | 682 | 685 | 808 | 884 | | |
| PCH1 | 8011 | 87 | 576 | | | | | | | | | |
| PCH2 | 8012 | 88 | 575 | | | | | | | | | |
| PCH3 | 8013 | 89 | 574 | | | | | | | | | |
| PCH4 | 8014 | 90 | 573 | | | | | | | | | |
| PECNT | 0026 | 33 | 331 | 380 | 382 | 395 | | | | | | |
| PERFRM | FB6F | 607 | 210 | | | | | | | | | |
| PLSRST | 000F | 12 | 545 | 701 | 825 | 984 | 1012 | | | | | |
| POWER | 0800 | 105 | 241 | 306 | 451 | 455 | 459 | | | | | |
| PTCNT | 0008 | 7 | 187 | 188 | 189 | 561 | | | | | | |
| PTEST | F87E | 208 | 194 | | | | | | | | | |
| PTESTV | 0040 | 121 | 193 | | | | | | | | | |
| PWRSTT | 001E | 27 | 239 | 240 | 254 | 261 | | | | | | |
| RDCH1 | FE62 | 1032 | | | | | | | | | | |
| RDCNT | 000A | 8 | 208 | 211 | 236 | 247 | 334 | 336 | 465 | 973 | 974 | 97 |
| RDSET | FF5A | 1198 | | | | | | | | | | |
| RDYBLV | 0004 | 119 | 200 | | | | | | | | | |
| READY | F8BB | 246 | 201 | | | | | | | | | |
| RSTPLS | FE5B | 1026 | 1006 | | | | | | | | | |
| RTUADR | 800E | 83 | 221 | | | | | | | | | |

| | | | |
|---|---|---|---|
| RTUCC | 0025 | 32 | 150 152 237 321 322 852 853 |
| RUNV | 0039 | 127 | 470 629 |
| S | FAFC | 541 | |
| SBYPWR | 0001 | 116 | 238 |
| SELECT | F87B | 207 | 162 |
| SETC2 | FDA3 | 885 | 895 |
| SETCAL | FD9E | 883 | |
| SETCCD | FA60 | 454 | 538 |
| SETCHN | FB43 | 573 | 471 537 555 615 630 |
| SETHLD | FD08 | 814 | |
| SETLP1 | FDBA | 900 | 912 |
| SETLP2 | FDC3 | 904 | 908 |
| SETRD | FDB2 | 896 | 882 |
| SETUP | 0014 | 16 | 227 476 676 |
| SETXIT | FDD7 | 913 | 910 |
| SHD | 801A | 99 | 612 727 754 818 983 1041 1100 1157 1169 117 |
| SKNOIS | FB3D | 569 | 562 651 |
| SKPGAN | FF72 | 1215 | 1112 |
| SLCTV | 0080 | 123 | 161 |
| SPFA | FB69 | 604 | 540 616 625 |
| SPFB | FB6B | 605 | 549 619 |
| SSWPV | 00A0 | 124 | |
| STAIR2 | FB52 | 580 | 553 560 |
| STAIRS | FB50 | 579 | 547 645 |
| STATE | F878 | 206 | 160 |
| STATV | 0060 | 122 | 159 |
| STBIT | 0001 | 110 | 1109 1153 |
| STLOOP | FB54 | 581 | 590 650 |
| STORCT | F854 | 187 | 184 |
| STRT | 004B | 37 | 581 587 |
| SYSSTK | 00FF | 42 | 136 |
| TDLAY | FFE6 | 1294 | 980 1186 1295 |
| TDLAYH | FF00 | 1295 | 1186 |
| TIMEK | F841 | 172 | |
| TLOOP | FF57 | 1191 | 1223 1239 1245 |
| TMP | 0000 | 4 | 264 271 284 291 295 370 372 374 376 38 898 903 909 911 981 1021 1188 1189 1205 123 |
| TRYC2 | FEEC | 1120 | 1118 |
| TRYC3 | FF00 | 1133 | 1131 |
| VALCNT | 004F | 40 | |
| WDCNT | 0022 | 30 | 190 337 338 347 349 350 354 546 563 58 1201 1204 |
| WRMPWR | 0008 | 111 | 450 |
| XADDR | 0024 | 31 | 222 |
| XMIT | F88C | 214 | 164 |
| XMITV | 00C0 | 125 | 163 |
| XMT1 | F9A9 | 362 | 363 394 |
| XMT2 | FA1C | 409 | 446 |
| XMT2A | F9F9 | 395 | 407 |
| XMT2B | FA1A | 408 | 353 397 |
| XMT2C | FA13 | 405 | 355 |
| XMT3 | F9DF | 384 | 379 |
| XMT3A | F9DD | 383 | 381 |
| XMT4 | F98E | 351 | 342 348 |
| XMT5 | F983 | 345 | 343 |
| XMT6 | F989 | 349 | |
| XMT9 | F9A1 | 359 | 360 |
| XMTPWR | 0014 | 115 | 305 |

```
F LOC    OBJ         LBL        CD     OPERAND LIST      COMMENTS

                     *
                     * COMMAND LIST
                     *
  0000               CMDFM      EQU    0                 FORMATTER TO MEMORY
  0001               CMDSEQ     EQU    1                 SEND COMMAND SEQ TO 6800
  0002               CMDDATA    EQU    2                 SEND DATA TO 6800
  0003               CMDPRTY    EQU    3                 SEND PARITY COUNT TO 6800
  0004               CMDTB      EQU    4                 SEND TIME BREAK VALUE TO 6800
  0005               CMDRFM     EQU    5                 RETRY FORMATTER TO MEMORY COMMAND
  0006               CMDSN      EQU    6                 STORE NORMAL TEST VALUES
```

```
0007              11 CMDRN    EQU   7              RETRIEVE NORMAL TEST VALUES TO 6800
0008              12 CMDMT    EQU   8              MEMORY TO TAPE COMMAND
0010              13 CMDMD    EQU   16             MEMORY TO DATA MONITOR COMMAND
0018              14 CMDMTD   EQU   24             MEMORY TO TAPE AND MONITOR COMMAND
0020              15 CMDHDR   EQU   32             WRITE TAPE REEL HEADER
0021              16 CMDTHDR  EQU   33             TRACE HEADER
0022              17 CMDTM    EQU   34             TAPE TO MEMORY COMMAND
0023              18 CMDMHDR  EQU   35             MONITOR HEADER
FFFF              19 CMDST    EQU   -1             SELF TEST FUNCTION
                  20 *
                  21 * DEVICE ADDRESSES
                  22 *
0000              23 M6800    EQU   0              R/W 6800
0001              24 DATMON   EQU   1              W DATA MONITOR DATA REGISTER
0003              25 TAPE     EQU   3              R/W TAPE DRIVE DATA REGISTER
0007              26 DFR0     EQU   7              R DATA FORMATTER (ERROR COUNT)
0006              27 DFR1     EQU   6              R DATA FORMATTER LSB
0005              28 DFR2     EQU   5              R DATA FORMATTER NSB
0004              29 DFR3     EQU   4              R DATA FORMATTER MSB
0008              30 DDTT     EQU   8              R DATA DISPLAY TRIP TIME
0009              31 DDTS     EQU   9              R DATA DISPLAY TRIP SLOPE
000A              32 DDFG     EQU   10             R DATA DISPLAY FIXED GAIN
000B              33 DDAGC    EQU   11             R DATA DISPLAY AGC RATE
000C              34 DDLF     EQU   12             R DATA DISPLAY LOW FILTER
000D              35 DDNGN    EQU   13             R DATA DISPLAY NOISE FIXED GAIN
000E              36 DDAGN    EQU   14             R DATA DISPLAY AUX GAIN
000F              37 DDSEL    EQU   15             R DATA DISPLAY ROTARY SELECT
                  38 *
                  39 * WORKING STORAGE ALLOCATION
                  40 *
0000              41 TAPINTSW WS    1
0001              42 TAPDTSW  WS    1              TAPE DATA SWITCH
0002              43 MONINTSW WS    1              MONITOR INTERRUPT SWITCH
0003              44 MONDTSW  WS    1              MONITOR DATA SWITCH
0004              45 ADDR     WS    2              DATA ADDRESS
0006              46 CNTWS    WS    2              DATA COUNT (TAPE)
0008              47 MCNT     WS    2              DATA COUNT (MONITOR)
000A              48 MONSW    WS    1              MONITOR SWITCH FOR MTOTD CMD
000B              49 GAIN     WS    1              FIXED DATA GAIN
000C              50 TTIME    WS    2              TRIP TIME
000E              51 TSLOPE   WS    1              TRIP SLOPE
000F              52 AGCT     WS    1              AGC
0010              53 FREQ     WS    1              FILTER FREQUENCY
0011              54 MODE     WS    1              DATA
0012              55 NGAIN    WS    1              NOISE GAIN
 ETA-ASSEMBLER  V00R1  3/04/75                  04/13/78  16:49:17    PAGE

F LOC   OBJ      SEQ  LBL      CD    OPERAND LIST   COMMENTS

0013              56 TBDIFF   WS    1              TIME BREAK DIFF
0014              57 UPSW     WS    1              TB UP SWITCH
0015              58 TRIP     WS    2              # OF SAMPLES TO TRIP AGC
0017              59 NOISESW  WS    1              NOISE SWITCH
0018              60 QGAIN    WS    1              CURRENT AGC GAIN
0019              61 XGAIN    WS    1              AUX GAIN VALUE
001A              62 AGCSTPU  WS    1              AGC SWITCH FOR STEP UP
001B              63 AGCSTPD  WS    1              AGC SWITCH FOR STEP DOWN
001C              64 TMP      WS    1
001D              65 DINC     WS    1              ADDR INC
001E              66 V1       WS    3              VI(K-1)
0021              67 V2       WS    3              VM(K)
0021              68 V3       EQU   V2             VM(K-1)
0024              69 V4       WS    3              VM(K-2)
0027              70 V5       WS    3              VO(K-1)
002A              71 V6       WS    3              VO(K-2)
002D              72 K1       WS    2              K2'
002F              73 K2       WS    2              K1'
0031              74 K3       WS    2              K3
0033              75 K4       WS    2              K2
0035              76 K5       WS    2              K1
0037              77 TRIP2    WS    1              TRIP RATIO BETWEEN UP AND DOWN
0038              78 TGAIN    WS    1              TMP GAIN STRG
```

```
0039                 79 TIDC      WS    1                        TRACE ID CODE
                     80 *
                     81 * DATA MEMORY ALLOCATIONS
                     82 *
002E                 83 DCMDSEQH EQU   X'2E'                     COMMAND SEQUENCE ADDR = 2EF8
00F8                 84 DCMDSEQL EQU   X'F8'
002F                 85 DRHDRH   EQU   X'2F'                     REEL HEADER ADDR = 2F00
0000                 86 DRHDRL   EQU   X'0'
002F                 87 DTHDRH   EQU   X'2F'                     TRACE HEADER ADDR = 2F10
0010                 88 DTHDRL   EQU   X'10'
002F                 89 DPRTYH   EQU   X'2F'                     RTU STATUS RECORD ADDR = 2FFA
00FA                 90 DPRTYL   EQU   X'FA'
0030                 91 DNRMLU   EQU   X'30'                     NORMAL TEST DATA ADDR = 3000
0000                 92 DDATAH   EQU   X'00'                     DATA ADDR = 0000
0000                 93 DDATAL   EQU   X'00'
                     94 *
                     95 * DATA EQUATES
                     96 *
0040                 97 EBLNK    EQU   X'40'                     EBCDIC BLANK CODE
000A                 98 RFLAG    EQU   MONSW                     REXMIT FLAG SWITCH
0080                 99 ECODE    EQU   X'30'                     ERROR CODE
007F                100 CCODE    EQU   X'7F'                     GOOD CONDITION CODE
META-ASSEMBLER  V00R1   3/04/75                         04/13/78  16:49:18     PAGE   3

F LOC   OBJ          SEQ  LBL      CD    OPERAND LIST            COMMENTS

                    102 *
                    103 * MAIN PROGRAM
                    104 *
 0000               105 BEGIN    EQU   *
 0000  26420810     106          Z     TAPDTSW                   SET FLAG TO NO DATA
 0001  26420830     107          Z     MONDTSW                   SET FLAG TO NO DATA
 0002  2F000610     108          MIQ   1
 0003  24420600     109          MQW   TAPINTSW                  SET FLAG TO NO INTERRUPT
 0004  24420620     110          MQW   MONINTSW                  SET FLAG TO NO INTERRUPT
 0005  C8020006     111          NOP   (12,,4,Z,,,,,,,CMDDC)ENABLE INTERRUPTS
 0006  D0520023     112 CMDDC    CALL  M6800R,(C,0)              WAIT FOR COMMAND
 0007  26000600     113          MRQ   R0
                    114 * CQI CMDFM
 0008  707313B6     115          BM    NEGCMD                    B IF SELF-TEST COMMAND
 0009  70730184     116          BZ    FTOM                      B IF FORMATTER TO MEMORY COMMAND
 000A  3D020220     117          CQI   CMDDATA
 000B  7073116D     118          BM    CMDSEQR                   B IF REQUEST FOR COMMAND SEQUENCE
 000C  7073006A     119          BZ    DATA                      B IF REQUEST FOR DATA
 000D  3D020240     120          CQI   CMDTB
 000E  7073117B     121          BM    PRTY                      B IF REQUEST FOR PARITY COUNT
 000F  70730181     122          BZ    TBDIFFR                   B IF REQUEST FOR TIME BREAK DIFF
 0010  3D020260     123          CQI   CMDSN
 0011  70731186     124          BM    RFTOM                     B IF REXMIT FORMATTER TO MEMORY
 0012  70730307     125          BZ    SNRML                     B IF STORE NORMAL TEST COMMAND
 0013  3D020280     126          CQI   CMDMT
 0014  70731325     127          BM    RNRML                     B IF RETRIEVE NORMAL TEST COMMAND
 0015  707300B6     128          BZ    MTOT
 0016  3D021200     129          CQI   CMDMD
 0017  70730088     130          BZ    MTOD                      B IF MEMORY TO DATA MONITOR COMMAND
 0018  3D021280     131          CQI   CMDMTD
 0019  707300B8     132          BZ    MTOTD                     B IF BOTH OF ABOVE
 001A  3D022210     133          CQI   CMDTHDR
 001B  707312BC     134          BM    THDR                      B IF TAPE REEL HEADER
 001C  707302DE     135          BZ    TRHDR                     B IF TRACE HEADER
 001D  3D022230     136          CQI   CMDMHDR
 001E  707312F1     137          BM    TTOM                      B IF TAPE TO MEMORY COMMAND
 001F  7073024C     138          BZ    MHDR                      B IF MONITOR HEADER
 0020  2F068600     139 ERRCMPLT MIR   R0,ECODE
 0021  D002002A     140          CALL  M6800W                    ERROR COMPLETION
 0022  F0020006     141          B     CMDDC
 0023  7073A023     142 M6800R   BUDNR M6800R                    B UNTIL DATA AVAILABLE
 0024  2F220000     143          MIL   M6800                     ADDRL=M6800
 0025  2052B000     144          CNTL  VMA
 0026  2052C000     145          CNTL  VMA+STRB
 0027  2F860600     146          MDR   R0
 0028  7072A028     147 M68R2    BUDR  M63R2                     B UNTIL HANDSHAKE COMPLETE
 0029  80520000     148          RTS   (,,,,C,0)                 CLEAR CNTRL
```

```
002A  7073B02A       149 M6800W   BUCNR M6800W          B UNTIL CLEAR TO SEND
002B  26160600       150          MRD   R0
002C  2F220000       151          MIL   M6800           ADDRESS THE 6800
002D  2052A000       152          CNTL  VMA+W
002E  2052E000       153          CNTL  VMA+W+STRB
002F  7072B02F       154 M68W2    BUCR  M68W2           B UNTIL HANDSHAKE COMPLETE
0030  80520000       155          RTS   (,,,,C,0)       CLEAR CNTRL
0031  2636860E       156 DMREAD0  MRU   R14,(,BYTE4)
META-ASSEMBLER  V00R1   3/04/75                04/13/78  16:49:28    PAGE   4

F LOC   OBJ          SEQ  LBL     CD    OPERAND LIST    COMMENTS

0032  F0020038       157          B     DMREAD
0033  2636160E       158 DMREAD1  MRU   R14,(,BYTE1)
0034  F0020038       159          B     DMREAD
0035  2636260E       160 DMREAD2  MRU   R14,(,BYTE2)
0036  F0020038       161          B     DMREAD
0037  2636460E       162 DMREAD3  MRU   R14,(,BYTE3)    SET MSB ADDR AND BYTE
0038  2626960F       163 DMREAD   MRL   R15,(,VMA+DM)   SET LSB ADDR AND CONTROL
0039  2052D000       164          CNTL  VMA+DM+STRB     STROBE
003A  2052D000       165          CNTL  VMA+DM+STRB     STROBE AGAIN
003B  2F860600       166          MDR   R0              LOAD DATA
003C  80520000       167          RTS   (,,,,C,0)       CLEAR CNTRL
003D  3636860E       168 DMWRT0   MRU   R14,(,BYTE4)
003E  F0020044       169          B     DMWRT
003F  2636160E       170 DMWRT1   MRU   R14,(,BYTE1)
0040  F0020044       171          B     DMWRT
0041  2636260E       172 DMWRT2   MRU   R14,(,BYTE2)
0042  F0020044       173          B     DMWRT
0043  2636460E       174 DMWRT3   MRU   R14,(,BYTE3)    SET MSB ADDR AND BYTE
0044  26160600       175 DMWRT    MRD   R0              STORE DATA
0045  2626B60F       176          MRL   R15,(,VMA+DM+W) SET LSB ADDR AND CONTROL
0046  2052F000       177          CNTL  VMA+DM+W+STRB   STROBE
0047  80520000       178          RTS   (,,,,C,0)       CLEAR CNTRL
0048  7073C048       179 TPREAD   BTNR  TPREAD          B UNTIL TAPE DATA READY
0049  2F220030       180          MIL   TAPE
004A  20528000       181          CNTL  VMA
004B  2052C000       182          CNTL  VMA+STRB
004C  2F860600       183          MDR   R0
004D  80520000       184          RTS   (,,,,C,0)
004E  7073C04E       185 TPWRT    BTNR  TPWRT           B UNTIL TAPE IS READY FOR DATA
004F  2F220030       186          MIL   TAPE
0050  2052A000       187          CNTL  VMA+W
0051  26160600       188          MRD   R0              XMIT DATA
0052  2052E000       189          CNTL  VMA+W+STRB
0053  80520000       190          RTS   (,,,,C,0)       CLEAR CONTROLS
0054  26160600       191 MONWRT   MRD   R0              XMIT DATA
0055  2F220010       192          MIL   DATMON
0056  7073D056       193          BMNR  *               B UNTIL DATA MONITOR READY FOR DATA
0057  2052A000       194          CNTL  VMA+W
0058  2052E000       195          CNTL  VMA+W+STRB
0059  80520000       196          RTS   (,,,,C,0)
005A  7073905A       197 FMREAD   BDFNR FMREAD          B UNTIL DATA FORMATTER READY
005B  2F220040       198 FTOM2    MIL   DFR3
005C  20528000       199          CNTL  VMA
005D  2052C000       200          CNTL  VMA+STRB
005E  2F860600       201          MDR   R0
005F  2F220050       202          MIL   DFR2
0060  20528000       203          CNTL  VMA
0061  2052C000       204          CNTL  VMA+STRB
0062  2F860601       205          MDR   R1
0063  2F220060       206          MIL   DFR1
0064  20528000       207          CNTL  VMA
0065  2052C000       208          CNTL  VMA+STRB
0066  2F860602       209          MDR   R2
0067  2F064603       210          MIR   R3,X'40'
0068  22060803       211          AND   R3,R0
META-ASSEMBLER  V00R1   3/04/75                04/13/78  16:49:34    PAGE   5

F LOC   OBJ          SEQ  LBL     CD    OPERAND LIST    COMMENTS

0069  80520000       212          RTS   (,,,,C,0)
006A                 213 DATA     EQU   *
```

```
006A  D0020023    214          CALL  M6800R          READ MSB OF COUNT
006B  2806060C    215          MRR   R12,R0
006C  D0020023    216          CALL  M6800R          READ LSB OF COUNT
006D  2806060D    217          MRR   R13,R0
006E  70730070    218          BZ    *+2
006F  3606000C    219          INC   R12
0070  D0020023    220          CALL  M6800R          READ MSB OF DATA POINTER
0071  2806060E    221          MRR   R14,R0
0072  D0020023    222          CALL  M6800R          READ LSB OF DATA POINTER
0073  2806060F    223          MRR   R15,R0
0074  D0020023    224          CALL  M6800R          READ MODE
0075  2806060B    225          MRR   R11,R0
0076  D0020037    226 XMT1     CALL  DMREAD3
0077  D002002A    227          CALL  M6800W          WRITE MSB TO 6800
0078  D0020035    228          CALL  DMREAD2
0079  D002002A    229          CALL  M6800W          WRITE NSB TO 6800
007A  D0020033    230          CALL  DMREAD1
007B  D002002A    231          CALL  M6800W          WRITE LSB TO 6800
007C  280606BB    232          MRR   R11,R11
007D  70730080    233          BZ    XMT3            B IF 3 BYTE MODE
007E  D0020031    234          CALL  DMREAD0
007F  D002002A    235          CALL  M6800W          WRITE LSB TO 6800
0080  3606000F    236 XMT3     INC   R15
0081  70720083    237          BNZ   XMT2            B IF NO CARRY
0082  3606000E    238          INC   R14
0083  2606020D    239 XMT2     DEC   R13
0084  70720076    240          BNZ   XMT1            B IF MORE DATA
0085  2606020C    241          DEC   R12
0086  70720076    242          BNZ   XMT1            B IF MORE DATA
0087  F0020006    243          B     CMDDC
0088              244 MTOD     EQU   *
0088  D0020023    245          CALL  M6800R          READ LSB OF ADDR
0089  26460650    246          MRW   R0,ADDR+1       SAVE ADDRESS
008A  D0020132    247          CALL  MTOD9           SET TRIP POINT
008B  2E86068C    248 MTOD3A   MWR   R12,MCNT
008C  2E86069D    249          MWR   R13,MCNT+1
008D  2E810790    250          MWQ   TIDC
008E  3D020230    251          CQI   3
008F  707300AF    252          BZ    MTOD6           B IF DEAD TRACE
0090  2E86064E    253          MWR   R14,ADDR
0091  2E86065F    254          MWR   R15,ADDR+1
0092  264209F0    255          Z     V1+1
0093  26430820    256          Z     V2+1
0094  26430850    257          Z     V4+1
0095  26430880    258          Z     V5+1
0096  264308B0    259          Z     V6+1            INIT DELAYED VALUES
0097              260 MTOD4    EQU   *
0097  D0020406    261          CALL  MTOT1C          CONVERT DATA FOR MONITOR
0098  D002003D    262          CALL  DMWRT0          STORE MONITOR DATA
0099  2E8607D6    263          MWR   R6,DINC
009A  2206006F    264          A     R15,R6
009B  7072309D    265          BNC   MTOD5
009C  3606000E    266          INC   R14
META-ASSEMBLER  V00R1   3/04/75                      04/13/78  16:49:40    PAGE   6

F LOC  OBJ        SEQ LBL      CD    OPERAND LIST    COMMENTS

009D  2606020D    267 MTOD5    DEC   R13
009E  70720097    268          BNZ   MTOD4           B IF MORE DATA
009F  2606020C    269          DEC   R12
00A0  70720097    270          BNZ   MTOD4           B IF MORE DATA
00A1  2E86068C    271 MTOD0    MWR   R12,MCNT
00A2  2E86069D    272          MWR   R13,MCNT+1
00A3  2E86064E    273 MTOD1    MWR   R14,ADDR
00A4  2E86065F    274          MWR   R15,ADDR+1
00A5  D0020031    275 MTOD1A   CALL  DMREAD0
00A6  D0020054    276          CALL  MONWRT            WRITE MONITOR DATA
00A7  2206006F    277          A     R15,R6
00A8  707230AA    278          BNC   MTOD2           B IF NO CARRY
00A9  3606000E    279          INC   R14
00AA  2606020D    280 MTOD2    DEC   R13
00AB  707200A5    281          BNZ   MTOD1A          B IF MORE DATA
00AC  2606020C    282          DEC   R12
```

```
00AD 707200A5        BNZ  MTOD1A          B IF MORE DATA
00AE F002023D        B    NCMPLTN
00AF 28060800 MTOD6  ZR   R0
00B0 D0020054        CALL MONWRT          WRITE ZERO FOR DEAD TRACE
00B1 2606020D        DEC  R13
00B2 707200AF        BNZ  MTOD6           B IF MORE DATA
00B3 2606020C        DEC  R12
00B4 707200AF        BNZ  MTOD6           B IF MORE DATA
00B5 F002023D        B    NCMPLTN
00B6          MTOT   EQU  *
00B6 264208A0        Z    MONSW
00B7 F00200BA        B    MTOT0
00B8          MTOTD  EQU  *
00B8 2F000610        MIQ  1
00B9 244206A0        MQW  MONSW           SET MONITOR SWITCH ON
00BA          MTOT0  EQU  *
00BA 2F0626FE        MIR  R14,DTHDRH
00BB 2F0626CF        MIR  R15,DTHDRL+28
00BC D0020033 GCNT1  CALL DMREAD1         READ
00BD 2806060C        MRR  R12,R0
00BE D0020031        CALL DMREAD0         READ LSB OF COUNT
00BF 26460670        MRW  R0,CNTWS+1      SAVE WORD OUNT
00C0 707300C2        BZ   *+2
00C1 3606000C        INC  R12
00C2 2646066C        MRW  R12,CNTWS
00C3 D0020023        CALL M6800R          READ LSB OF ADDR
00C4 26460650        MRW  R0,ADDR+1
00C5 D0020132        CALL MTOD9           SET TRIP POINT
00C6 2F0626FE        MIR  R14,DTHDRH
00C7 2F06160F        MIR  R15,DTHDRL
00C8 D0020023        CALL M6800R          READ AND STORE TRACE-SEQ-#-W/I-LINE
00C9 D0020043        CALL DMWRT3          .(LOC=DTHDR)
00CA D0020023        CALL M6800R
00CB D0020041        CALL DMWRT2
00CC D0020023        CALL M6800R
00CD D002003F        CALL DMWRT1
00CE D0020023        CALL M6800R
00CF D002003D        CALL DMWRT0
00D0 3606000F        INC  R15
META-ASSEMBLER  V00R1   3/04/75                04/13/78  16:50:00     PAGE   7

F LOC  OBJ      SEQ LBL  OD   OPERAND LIST    COMMENTS

00D1 D0020023        CALL M6800R          READ AND STORE TRACE-SEQ-#-W/I-REEL
00D2 D0020043        CALL DMWRT3          .(LOC=DTHDR+1)
00D3 D0020023        CALL M6800R
00D4 D0020041        CALL DMWRT2
00D5 D0020023        CALL M6800R
00D6 D002003F        CALL DMWRT1
00D7 D0020023        CALL M6800R
00D8 D002003D        CALL DMWRT0
00D9 3606000F        INC  R15
00DA 3606000F        INC  R15
00DB D0020023        CALL M6800R          READ AND STORE TRACE-SEQ-#
00DC D002003D        CALL DMWRT0          .(LOC=DTHDR+3)
00DD 28060608        MRR  R8,R0           REMEMBER KEY
00DE 2F000640        MIQ  4
00DF 200600FF        A    R15,R15,(AQ)
00E0 D0020023        CALL M6800R          READ AND STORE TRACE ID
00E1 D0020023        CALL M6800R
00E2 D0020041        CALL DMWRT2          .(LOC=DTHDR+7)
00E3 2E820770        TST  NOISESW
00E4 707210E9        BP   MTOM1A          B IF NOT DATA TRACE
00E5 26000600        MRQ  R0
00E6 3D020250        CQI  5
00E7 707200E9        BNZ  MTOM1A          B IF NOT BLASTER CHANNEL
00E8 26420970        Z    NOISESW         SET SWITCH
00E9 2F002660 MTOM1A MIQ  38
00EA 200600FF        A    R15,R15,(AQ)
00EB D0020023        CALL M6800R          READ AND STORE RTU ADDRESS
00EC D0020023        CALL M6800R
00ED D0020041        CALL DMWRT2          .(LOC=DTHDR+45)
00EE D0020023        CALL M6800R          READ AND STORE CHAN ADDRESS
```

```
00EF  D002003D              CALL  DMWRT0           .(LOC=DTHDR+45)
00F0  D002033C              CALL  KEYR             SET FROM ADDR AND COUNT
00F1  280606EA              MRR   R10,R14
00F2  380600FB      MTOM1   AC    R11,R15,(0A)     R11=R15+1
00F3  2806068E              MRR   R14,R8
00F4  2806069F              MRR   R15,R9
00F5  D0020342              CALL  WORDIN
00F6  36060009              INC   R9
00F7  707200F9              BNZ   MTOM2            B IF NO CARRY
00F8  36060008              INC   R8
00F9  280606AE      MTOM2   MRR   R14,R10
00FA  280606BF              MRR   R15,R11
00FB  D002034A              CALL  WORDOUT          STORE NORMAL TEST VALUES INTO HEADER
00FC  2606020D              DEC   R13
00FD  707200F2              BNZ   MTOM1            B IF MORE VALUES
00FE  2F0636CD              MIR   R13,60
00FF  2F0626FE              MIR   R14,DTHDRH
0100  2F06160F              MIR   R15,DTHDRL
0101  D0020037      MTOTH1  CALL  DMREAD3          WRITE TRACE HEADER
0102  D002004E              CALL  TPWRT
0103  D0020035              CALL  DMREAD2
0104  D002004E              CALL  TPWRT
0105  D0020033              CALL  DMREAD1
0106  D002004E              CALL  TPWRT
0107  D0020031              CALL  DMREAD0
META-ASSEMBLER  V00P1   3/04/75                    04/13/78  16:50:07     PAGE   8

F LOC   OBJ         SEQ LBL     OP    OPERAND LIST     COMMENTS

0108  D002004E              CALL  TPWRT
0109  3606000F              INC   R15
010A  2606020D              DEC   R13
010B  70720101              BNZ   MTOTH1           B FOR MORE HEADER
010C  2E86066C              MWR   R12,CNTWS
010D  2E86067D              MWR   R13,CNTWS+1
010E  2E810790              MWQ   TIDC
010F  3D020230              CQI   3
0110  70730128              BZ    MTOT6            B IF DEAD TRACE
0111  2E86064E              MWR   R14,ADDR
0112  2E86065F              MWR   R15,ADDR+1
0113                MTOT1   EQU   *
0113  D0020037              CALL  DMREAD3
0114  D002004E              CALL  TPWRT            WRITE MSB
0115  D0020035              CALL  DMREAD2
0116  D002004E              CALL  TPWRT            WRITE NMSB
0117  D0020033              CALL  DMREAD1
0118  D002004E              CALL  TPWRT            WRITE NLSB
0119  28060800              ZR    R0
011A  D002004E              CALL  TPWRT            WRITE LSB
011B  2206006F              A     R15,R6
011C  7072311E              BNC   MTOT2            B IF NO CARRY
011D  3606000E              INC   R14
011E  2606020D      MTOT2   DEC   R13
011F  70720113              BNZ   MTOT1            B IF MORE DATA
0120  2606020C              DEC   R12
0121  70720113              BNZ   MTOT1            B IF MORE DATA
0122  D002004E              CALL  TPWRT            SATIS. EXTRA WRITE
0123  2F0676F0      MTOT3   MIR   R0,CCODE
0124  D002002A              CALL  M6800W           IND. TAPE WRITE COMPLETE
0125  2E8206A0              TST   MONSW
0126  70730006              BZ    CMDDC            B IF MTOT CMD
0127  F002008B              B     MTOD3A
0128  28060800      MTOT6   ZR    R0
0129  D002004E              CALL  TPWRT            WRITE ZERO FOR DEAD TRACE
012A  D002004E              CALL  TPWRT
012B  D002004E              CALL  TPWRT
012C  D002004E              CALL  TPWRT
012D  2606020D              DEC   R13
012E  70720128              BNZ   MTOT6            B IF MORE DATA
012F  2606020C              DEC   R12
0130  70720128              BNZ   MTOT6            B IF MORE DATA
0131  F0020123              B     MTOT3
0132  D0020023      MTOD9   CALL  M6800R           READ TRACE COUNT FROM BLASTER
```

```
     0133  2F0626FE     421         MIR   R14,DTHDRH
     0134  2F06166F     422         MIR   R15,DTHDRL+6
     0135  D0020041     423         CALL  DMWRT2           STORE B-T COUNT IN HEADER
     0136  26460750     424         MRW   R0,TRIP          SAVE B-T COUNT
     0137  2F060611     425         MIR   R1,1
     0138  2E800650     426         MWQ   ADDR+1
     0139  3D023200     427         CQI   60
     013A  70730144     428         BZ    MTOD9T           B IF DATA FROM TAPE
     013B  2F060646     429         MIR   R6,4
     013C  26430990     430         Z     TIDC             ZERO ID CODE (IND NOT DEAD)
     013D  3D020240     431         CQI   4
META-ASSEMBLER  V00R1   3/04/75                          04/13/78  16:50:21    PAGE   9

F LOC   OBJ          SEQ  LBL     CD    OPERAND LIST     COMMENTS

     013E  70721157     432         BP    MTOD9B           B IF NOISE TEST
U    013F  2E800610     433         MWQ   CNT+1
     0140  3D022240     434         CQI   X'84'
     0141  70730156     435         BZ    MTOD9C           B IF PERFORMANCE TEST
     0142  2F06167F     436         MIR   R15,DTHDRL+7
     0143  F0020155     437         B     MTOD9U
     0144  2F060616     438 MTOD9T  MIR   R6,1
     0145  2F06060E     439         MIR   R14,DDATAH
     0146  2F06066F     440         MIR   R15,DDATAL+6
     0147  D0020035     441         CALL  DMREAD2          RETRIEVE B-T COUNT
     0148  26460750     442         MRW   R0,TRIP
     0149  2F06068F     443         MIR   R15,DDATAL+8
     014A  D0020031     444         CALL  DMREAD0          RETRIEVE USE CODE
     014B  26000600     445         MRQ   R0
     014C  3D020220     446         CQI   2
     014D  70730157     447         BZ    MTOD9B           B IF NOISE DATA
     014E  70721156     448         BP    MTOD9C           B IF PERFORMANCE DATA
     014F  2606020F     449         DEC   R15
     0150  D0020035     450         CALL  DMREAD2          RETRIEVE TRACE ID CODE
     0151  26000600     451         MRQ   R0
     0152  24430790     452         MQW   TIDC             SAVE ID CODE
     0153  3D020250     453         CQI   5
     0154  70730156     454         BZ    MTOD9C           B IF BLASTER DATA
     0155  26060201     455 MTOD9U  DEC   R1
     0156  26060201     456 MTOD9C  DEC   R1
     0157  26460771     457 MTOD9B  MRW   R1,NOISESW       SET SW (+=NOISE,-=DATA,0=PERF)
     0158  2E860750     458         MWR   R0,TRIP
     0159  2E8606E1     459         MWR   R1,TSLOPE
     015A  D0020352     460         CALL  MULT
     015B  2E8006D0     461         MWQ   TTIME+1
     015C  20060033     462         A     R3,R3,(AQ)
     015D  7072315F     463         BNC   *+2              B IF NO CARRY
     015E  36060002     464         INC   R2
     015F  2E8006C0     465         MWQ   TTIME
     0160  20060022     466         A     R2,R2,(AQ)
     0161  26460752     467         MRW   R2,TRIP          STORE # SAMPLES TO AGC TRIP
     0162  26460763     468         MRW   R3,TRIP+1
     0163  26430970     469         Z     TRIP2            PRESET TRIP FOR AGC
     0164  2F0636F0     470         MIR   R0,X'3F'
     0165  264607A0     471         MRW   R0,AGCSTPU       PRESET AGC UP TO NOSTEP
     0166  264607B0     472         MRW   R0,AGCSTPD       PRESET AGC DOWN TO NOSTEP
     0167  2E8606B0     473         MWR   R0,GAIN
     0168  26460780     474         MRW   R0,QGAIN         PRESET AGC GAIN TO FIXED GAIN
     0169  264607D6     475         MRW   R6,DINC
     016A  2F000600     476         MIQ   DDATAH
     016B  24420640     477         MQW   ADDR             PRESET HIORD BYTE OF ADDRESS
     016C  80020000     478         RTS
     016D               479 CMDSEQR EQU   *
     016D  2F0626FE     480         MIR   R14,DPRTYH
     016E  2F06F6CF     481         MIR   R15,DPRTYL+2
     016F  D0020035     482         CALL  DMREAD2
     0170  26000600     483         MRQ   R0
     0171  3D022200     484         CQI   32
     0172  70731174     485         BM    *+2              B IF COUNT IS LESS THAN LIMIT
     0173  2F0616F0     486         MIR   R0,31            SET COUNT TO LIMIT
```

```
ικTA-ASSEMBLER  V00R1   3/04/75                                04/13/78  16:50:30     PAGE  10

F LOC   OBJ          SEQ  LBL       CD     OPERAND LIST           COMMENTS

  0174  D002002A     487            CALL   M6800W                 WRITE BYTE TO 6800
  0175  2F06061B     488            MIR    R11,1
  0176  2F06061C     489            MIR    R12,1
  0177  2F06068D     490            MIR    R13,8
  0178  2F0626EE     491            MIR    R14,DCMDSEQH
  0179  2F06F68F     492            MIR    R15,DCMDSEQL
  017A  F0020076     493            B      XMT1
  017B               494 PRTY       EQU    *
  017B  2F06061B     495            MIR    R11,1
  017C  2F06061C     496            MIR    R12,1
  017D  2F06063D     497            MIR    R13,3                  COUNT = 3
  017E  2F0626FE     498            MIR    R14,DPRTYH
  017F  2F06F6AF     499            MIR    R15,DPRTYL
  0180  F0020076     500            B      XMT1
  0181               501 TBDIFFR    EQU    *
  0181  2E860730     502            MWR    R0,TBDIFF
  0182  D002002A     503            CALL   M6800W                 WRITE TIME BREAK DIFFERENCE
  0183  F0020006     504            B      CMDDC
  0184               505 FTOM       EQU    *
  0184  264208A0     506            Z      RFLAG                  SET FLAG TO NEW DATA
  0185  F0020188     507            B      FTOM0
  0186               508 RFTOM      EQU    *
  0186  2F000610     509            MIQ    1
  0187  244206A0     510            MQW    RFLAG                  SET DATA FLAG TO REPLACE
  0188  2F0606F9     511 FTOM0      MIR    R9,X'F'
  0189  28060807     512            ZR     R7
  018A  28060806     513            ZR     R6
  018B  26420940     514            Z      UPSW                   SET UPSW TO 'NOT RISEN'
  018C  2F220050     515            MIL    DFR2                   RESET FORMATTER
  018D  2052A000     516            CNTL   VMA+W
  018E  2052E000     517            CNTL   VMA+W+STRB
  018F  2F220040     518            MIL    DFR3                   START FORMATTER
  0190  2052A000     519            CNTL   VMA+W
  0191  2052E000     520            CNTL   VMA+W+STRB
  0192  20520000     521            CNTL   0
  0193  D0020023     522            CALL   M6800R
  0194  2806060C     523            MRR    R12,R0                 SET MSB OF COUNT
  0195  D0020023     524            CALL   M6800R
  0196  2806060D     525            MRR    R13,R0                 SET LSB OF COUNT
  0197  D0020023     526            CALL   M6800R
  0198  2806060A     527            MRR    R10,R0                 SET ADDR MSB
  0199  D0020023     528            CALL   M6800R
  019A  2806060B     529            MRR    R11,R0                 SET MODE OF DATA
  019B  260E060A     530            SLR    R10
  019C  260E060A     531            SLR    R10
  019D  707201A3     532            BNZ    FTOM1C                 B IF MODE MUST BE DATA
  019E  280606BB     533            MRR    R11,R11
  019F  707301A5     534            BZ     FTOM3A
  01A0  2F000620     535            MIQ    2
  01A1  300602BB     536            S      R11,R11,(AQ)
  01A2  707311AF     537            BM     FTOM1B                 B IF TB SEARCH
  01A3  2806080B     538 FTOM1C     ZR     R11
  01A4  F00201AF     539            B      FTOM1B
  01A5  2F06168B     540 FTOM3A     MIR    R11,24
  01A6  2E8206A0     541            TST    RFLAG
ικTA-ASSEMBLER  V00R1   3/04/75                                04/13/78  16:50:36     PAGE  11

F LOC   OBJ          SEQ  LBL       CD     OPERAND LIST           COMMENTS

  01A7  707201AF     542            BNZ    FTOM1B                 B IF REPLACE CMD
  01A8  28060800     543            ZR     R0
  01A9  2F06060E     544            MIR    R14,0
  01AA  2F06167F     545            MIR    R15,23
  01AB               546 FTOM1D     EQU    *
  01AB  D0020041     547            CALL   DMWRT2
  01AC  D002003F     548            CALL   DMWRT1
  01AD  2606020F     549            DEC    R15
  01AE  707211AB     550            BP     FTOM1D
  01AF  2F0626FE     551 FTOM1B     MIR    R14,DPRTYH
```

```
 01B0  2F06F6CF     552         MIR   R15,DPRTYL+2
 01B1  D002005A     553         CALL  FMREAD           READ DATA WORD 1
 01B2  D0020246     554         CALL  FTOMR1
 01B3  28060610     555         MRR   R0,R1
 01B4  D0020041     556         CALL  DMWRT2           STORE COMMAND COUNT
 01B5  28060630     557         MRR   R0,R3
 01B6  D0020043     558         CALL  DMWRT3           STORE COMMAND COUNT ERROR
 01B7  2606020F     559         DEC   R15
 01B8  D002005A     560         CALL  FMREAD           READ DATA WORD 2
 01B9  D0020240     561         CALL  FTOMR0
 01BA  D0020246     562         CALL  FTOMR1
 01BB  28060600     563         MRR   R0,R0
 01BC  707211BF     564         BP    *+3              B IF PROPER POSITIVE COUNT
 01BD  28060800     565         ZR    R0
 01BE  28060801     566         ZR    R1
 01BF  28060633     567         MRR   R3,R3
 01C0  707201C3     568         BNZ   *+3              B IF PARITY ERROR
 01C1  2806060C     569         MRR   R12,R0
 01C2  2806061D     570         MRR   R13,R1
 01C3  D002003F     571         CALL  DMWRT1           STORE DATA COUNT MSB
 01C4  28060610     572         MRR   R0,R1
 01C5  D002003D     573         CALL  DMWRT0           STORE DATA COUNT LSB
 01C6  2600060C     574         MRQ   R12
 01C7  3D0222E0     575         CQI   X'2E'
 01C8  707311CF     576         BM    FTOM2A           B IF COUNT IN BOUNDS
 01C9  707201CD     577         BNZ   FTOM2B           B IF COUNT OUT OF BOUNDS
 01CA  2600060D     578         MRQ   R13
 01CB  3D02F290     579         CQI   X'F9'
 01CC  707311CF     580         BM    FTOM2A           B IF COUNT IN BOUNDS
 01CD  2F0626EC     581 FTOM2B  MIR   R12,X'2E'
 01CE  2F06E60D     582         MIR   R13,X'E0'
 01CF  280606DD     583 FTOM2A  MRR   R13,R13
 01D0  707301D2     584         BZ    *+2
 01D1  3606000C     585         INC   R12
 01D2  28060630     586         MRR   R0,R3
 01D3  D0020041     587         CALL  DMWRT2           STORE DATA COUNT ERROR
 01D4  D002005A     588         CALL  FMREAD           READ DATA WORD 3
 01D5  D0020240     589         CALL  FTOMR0
 01D6  D0020043     590         CALL  DMWRT3           STORE RTU ADDR
 01D7  2606020F     591         DEC   R15
 01D8  28060630     592         MRR   R0,R3
 01D9  D002003D     593         CALL  DMWRT0           STORE RTU ADDR ERROR
 01DA  3606000F     594         INC   R15
 01DB  3606000F     595         INC   R15
 01DC  D0020246     596         CALL  FTOMR1
DELTA-ASSEMBLER  V00R1   3/04/75                       04/13/78  16:50:47    PAGE  12

F LOC   OBJ          SEQ  LBL    CD    OPERAND LIST     COMMENTS

 01DD  28060610     597         MRR   R0,R1
 01DE  D002003F     598         CALL  DMWRT1           STORE TIPPED STATUS
 01DF  2F000600     599         MIQ   DDATAH
 01E0  200600AE     600         A     R14,R10,(AQ)     LOAD MSB OF ADDRESS
 01E1  2F06060F     601         MIR   R15,DDATAL       SET LSB OF ADDRESS
 01E2  D002005A     602 FTOM1   CALL  FMREAD           READ
 01E3  2E8206A0     603         TST   RFLAG
 01E4  707301EA     604         BZ    FTOM5            B IF NEW DATA
 01E5  26000600     605         MRQ   R0
 01E6  D0020031     606         CALL  DMREAD0          READ PARITY ERROR FLAG
 01E7  28060600     607         MRR   R0,R0
 01E8  7073020F     608         BZ    FTOM7            B IF DATA REPLACEMENT NOT NEEDED
 01E9  24060600     609         MQR   R0
 01EA  28060633     610 FTOM5   MRR   R3,R3
 01EB  707301EF     611         BZ    FTOM6            B IF NO PARITY ERROR
 01EC  36060007     612         INC   R7
 01ED  707201EF     613         BNZ   FTOM6            B IF MAX COUNT NOT
 01EE  26060207     614         DEC   R7
 01EF  22060890     615 FTOM6   AND   R0,R9
 01F0  280606BB     616         MRR   R11,R11
 01F1  7072020D     617         BNZ   FTOM3B           B IF TEST OR TB DATA
 01F2  28060666     618         MRR   R6,R6
 01F3  7073020D     619         BZ    FTOM3B           B IF NORMAL DATA
 01F4  280606EE     620         MRR   R14,R14
```

```
 01F5  7072020D    621          BNZ   FTOM3B           B IF BEYOND 4TH DATA
 01F6  2600060F    622          MRQ   R15
 01F7  3D020240    623          CQI   4
 01F8  7072120D    624          BP    FTOM3B           B IF BEYOND 4TH DATA
 01F9  2F061681    625 FTOM3E   MIR   R1,X'18'         FORCE PSEUDO TB INTO DATA
 01FA  F002020D    626          B     FTOM3B
 01FB  7072120B    627 FTOM3F   BP    FTOM3C           B IF TEST VALUES
 01FC  36060006    628          INC   R6
 01FD  26000601    629          MRQ   R1
 01FE  70721200    630          BP    FTOM4A           B IF POSITIVE DATA
 01FF  34000400    631          NA    0,0,(OQ,Q)       INVERT DATA
 0200  3D024200    632 FTOM4A   CQI   X'40'
 0201  70721208    633          BP    FTOM4B           B IF TB > 5.12
 0202  3D022200    634          CQI   X'20'
 0203  7072120D    635          BP    FTOM3B           B IF TB > 2.56
 0204  2E820740    636          TST   UPSW
 0205  707301F9    637          BZ    FTOM3E           B IF TB 'NOT RISEN' YET
 0206  2806080B    638          ZR    R11
 0207  F002020D    639          B     FTOM3B
 0208  2F000610    640 FTOM4B   MIQ   1
 0209  24420740    641          MQW   UPSW             SET UPSW TO 'RISEN'
 020A  F002020D    642          B     FTOM3B
 020B  2606020B    643 FTOM3C   DEC   R11
 020C  F002020E    644          B     FTOM3D
 020D  D002035E    645 FTOM3B   CALL  FLOAT
 020E  D002034A    646 FTOM3D   CALL  WORDOUT          STORE DATA
 020F  3606000F    647 FTOM7    INC   R15
 0210  70720212    648          BNZ   FTOM4            B IF NO CARRY
 0211  3606000E    649          INC   R14
 0212  2606020D    650 FTOM4    DEC   R13
 0213  707201E2    651          BNZ   FTOM1            B FOR MORE DATA
...TA-ASSEMBLER  V00R1   3/04/75                    04/13/78  16:51:03     PAGE  13

F LOC   OBJ         SEQ LBL      CD    OPERAND LIST     COMMENTS

 0214  2606020C    652          DEC   R12
 0215  707201E2    653          BNZ   FTOM1            B FOR MORE DATA
 0216  D002005A    654          CALL  FMREAD           READ PARITY WORD
 0217  2F0006F0    655          MIQ   X'F'
 0218  20020800    656          AND   R0,R0,(AQ,Z)
 0219  7072021D    657          BNZ   *+4
 021A  2F00F600    658          MIQ   X'F0'
 021B  20020811    659          AND   R1,R1,(AQ,Z)
 021C  7073021F    660          BZ    *+3
 021D  2F06F6F1    661          MIR   R1,X'FF'         SET MAX PARITY ERROR
 021E  F0020220    662          B     *+2
 021F  D002024E    663          CALL  FTOMR1
 0220  2F0626FE    664          MIR   R14,DPRTYH       SET UP ADDRESS FOR PARITY COUNT
 0221  2F06F6AF    665          MIR   R15,DPRTYL
 0222  28060610    666          MRR   R0,R1
 0223  D002003F    667          CALL  DMWRT1           STORE RTU PARITY COUNT
 0224  28060630    668          MRR   R0,R3
 0225  D0020041    669          CALL  DMWRT2           STORE RTU PARITY ERROR
 0226  28060670    670          MRR   R0,R7
 0227  D0020043    671          CALL  DMWRT3           STORE DATA PARITY COUNT
 0228  2F06068D    672          MIR   R13,8
 0229  2F0626EE    673          MIR   R14,DCMDSEQH
 022A  2F06F68F    674          MIR   R15,DCMDSEQL
 022B  D002005A    675 FTOMP1   CALL  FMREAD           READ COMMAND WORDS
 022C  D0020240    676          CALL  FTOMR0
 022D  D0020043    677          CALL  DMWRT3
 022E  D0020246    678          CALL  FTOMR1
 022F  28060610    679          MRR   R0,R1
 0230  D0020041    680          CALL  DMWRT2
 0231  D002005A    681          CALL  FMREAD           READ COMMAND WORDS
 0232  D0020240    682          CALL  FTOMR0
 0233  D002003F    683          CALL  DMWRT1
 0234  D0020246    684          CALL  FTOMR1
 0235  28060610    685          MRR   R0,R1
 0236  D002003D    686          CALL  DMWRT0
 0237  3606000F    687          INC   R15
 0238  2606020D    688          DEC   R13
 0239  7072022B    689          BNZ   FTOMP1           B FOR MORE CMD SEQ
```

```
 023A 28060666      690          MRR   R6,R6
 023B 7073023D      691          BZ    NCMPLTN          B IF NO TIME BREAK
 023C 26460736      692          MRW   R6,TBDIFF        STORE TIME BREAD DIFF
 023D 2F0676F0      693 NCMPLTN  MIR   R0,CCODE
 023E D002002A      694          CALL  M6800W           RETURN SUCCESSFUL COMPLETION COD
 023F F0020006      695          B     CMDDC
 0240 26000601      696 FTOMR0   MRQ   R1
 0241 260C3600      697          SLA   R0
 0242 260C3600      698          SLA   R0
 0243 260C3600      699          SLA   R0
 0244 260C3600      700          SLA   R0
 0245 80020000      701          RTS
 0246 26000602      702 FTOMR1   MRQ   R2
 0247 260C3601      703          SLA   R1
 0248 260C3601      704          SLA   R1
 0249 260C3601      705          SLA   R1
 024A 260C3601      706          SLA   R1
META-ASSEMBLER  V00R1   3/04/75                               04/13/78  16:51:14    PAGE  14

F LOC  OBJ          SEQ  LBL     CD    OPERAND LIST     COMMENTS

 024B 80020000      707          RTS
 024C               708 MHDR     EQU   *
 024C D0020023      709          CALL  M6800R           READ # OF CHANNELS
 024D 28083603      710          OR    R3,R0,(OA,SRBQ,,,3)  MOVE AND SHIFT
 024E 26083603      711          SRA   R3
 024F 26083603      712          SRA   R3
 0250 26080604      713          SRRQ  R4
 0251 26080604      714          SRRQ  R4
 0252 2D060674      715          OR    R4,0,(DQ,,E,,,7)
 0253 D0020023      716          CALL  M6800R           READ MSB OF # OF SAMPLES
 0254 28060601      717          MRR   R1,R0
 0255 D0020023      718          CALL  M6800R           READ LSB OF # OF SAMPLES
 0256 2F0036F0      719          MIQ   X'3F'
 0257 20000811      720          AND   R1,R1,(AQ,Q)
 0258 34420080      721          AC    0,0,(OQ,Z,,W,,MCNT)  SAVE MONITOR DATA COUNT
 0259 26460690      722          MRW   R0,MCNT+1
 025A 28060202      723          SB    R2,R0,(OA,B)
 025B 7073325D      724          BC    *+2
 025C 26060201      725          DEC   R1
 025D D0020023      726          CALL  M6800R           READ SAMPLE RATE
 025E 28060605      727          MRR   R5,R0
 025F 260A0605      728          SRR   R5
 0260 260A0605      729          SRR   R5
 0261 26460705      730          MRW   R5,FREQ          SAVE SAMPLE RATE
 0262 260E0600      731          SLR   R0
 0263 260E0600      732          SLR   R0
 0264 260E0600      733          SLR   R0
 0265 22060603      734          OR    R3,R0
 0266 28060610      735          MRR   R0,R1
 0267 D0020054      736          CALL  MONWRT
 0268 28060620      737          MRR   R0,R2
 0269 D0020054      738          CALL  MONWRT
 026A 28060630      739          MRR   R0,R3
 026B D0020054      740          CALL  MONWRT
 026C 28060640      741          MRR   R0,R4
 026D D0020054      742          CALL  MONWRT
 026E D002051D      743          CALL  MID              OUTPUT ID TRACE
 026F 2F2200D0      744          MIL   DDNGN
 0270 D00202B9      745          CALL  VMASTRB          STROBE SWITCHES
 0271 2F800600      746          MDQ
 0272 24420720      747          MQW   NGAIN            SET NOISE GAIN
 0273 2F220080      748          MIL   DDTT
 0274 D00202B9      749          CALL  VMASTRB          STROBE SWITCHES
 0275 2F860601      750          MDR   R1
 0276 2F061690      751          MIR   R0,25
 0277 2E820700      752          TST   FREQ
 0278 7072027A      753          BNZ   *+2              B IF 4 MS RATE
 0279 260E0600      754          SLR   R0
 027A D0020352      755          CALL  MULT
 027B 264606C2      756          MRW   R2,TTIME         SET TRIP TIME
 027C 264606D3      757          MRW   R3,TTIME+1
 027D 2F220090      758          MIL   DDTS
```

```
 027E  D00202B9      759           CALL  VMASTRB            STROBE SWITCHES
 027F  2F860601      760           MDR   R1
 0280  2F060650      761           MIR   R0,5
META-ASSEMBLER  V00R1   3/04/75                        04/13/78  16:51:21     PAGE  15

F LOC   OBJ          SEQ  LBL      CD    OPERAND LIST       COMMENTS

 0281  2E820700      762           TST   FREQ
 0282  70720284      763           BNZ   *+2                B IF 4 MS RATE
 0283  260E0600      764           SLR   R0
 0284  D0020352      765           CALL  MULT
 0285  264606E3      766           MRW   R3,TSLOPE          SET TRIP SLOPE
 0286  2F2200A0      767           MIL   DDFG
 0287  D00202B9      768           CALL  VMASTRB            STROBE SWITCHES
 0288  2F800600      769           MDQ
 0289  244206B0      770           MQW   GAIN               SET DATA GAIN
 028A  2F060610      771           MIR   R0,1
 028B  2E820700      772           TST   FREQ
 028C  7072028E      773           BNZ   *+2                B IF 4 MS RATE
 028D  260E0600      774           SLR   R0
 028E  2F2200B0      775           MIL   DDAGC
 028F  D00202B9      776           CALL  VMASTRB            STROBE SWITCHES
 0290  2F860601      777           MDR   R1
 0291  70730295      778           BZ    *+4                B IF 16 MS AGC
 0292  260E0600      779 MHDR1     SLR   R0
 0293  26060201      780           DEC   R1
 0294  70720292      781           BNZ   MHDR1              B UNTIL POWER OF 2 COMPLETE
 0295  264606F0      782           MRW   R0,AGCT            SET AGC TIME RATE
 0296  2F2200C0      783           MIL   DDLF
 0297  D00202B9      784           CALL  VMASTRB            STROBE SWITCHES
 0298  2F860600      785           MDR   R0
 0299  26460700      786           MRW   R0,FREQ            SET FILTER FREQUENCY
 029A  D002002A      787           CALL  M6800W             REQUEST FILTER CONSTANTS
 029B  D0020023      788           CALL  M6800R
 029C  264706F0      789           MRW   R0,K2
 029D  D0020023      790           CALL  M6800R
 029E  26470700      791           MRW   R0,K2+1
 029F  D0020023      792           CALL  M6800R
 02A0  264706D0      793           MRW   R0,K1
 02A1  D0020023      794           CALL  M6800R
 02A2  264706E0      795           MRW   R0,K1+1
 02A3  D0020023      796           CALL  M6800R
 02A4  26470750      797           MRW   R0,K5
 02A5  D0020023      798           CALL  M6800R
 02A6  26470760      799           MRW   R0,K5+1
 02A7  D0020023      800           CALL  M6800R
 02A8  26470730      801           MRW   R0,K4
 02A9  D0020023      802           CALL  M6800R
 02AA  26470740      803           MRW   R0,K4+1
 02AB  D0020023      804           CALL  M6800R
 02AC  26470710      805           MRW   R0,K3
 02AD  D0020023      806           CALL  M6800R
 02AE  26470720      807           MRW   R0,K3+1
 02AF  2F2200F0      808           MIL   DDSEL
 02B0  D00202B9      809           CALL  VMASTRB            STROBE SWITCHES
 02B1  2F800600      810           MDQ
 02B2  24420710      811           MQW   MODE               SET DATA CONVERSION MODE
 02B3  2F2200E0      812           MIL   DDAGN
 02B4  D00202B9      813           CALL  VMASTRB            STROBE SWITCHES
 02B5  2F800600      814           MDQ
 02B6  20520000      815           CNTL  0
 02B7  24420790      816           MQW   XGAIN              SET AUX GAIN
META-ASSEMBLER  V00R1   3/04/75                        04/13/78  16:51:26     PAGE  16

F LOC   OBJ          SEQ  LBL      CD    OPERAND LIST       COMMENTS

 02B8  F002023D      817           B     NCMPLTN
 02B9  20520000      818 VMASTRB   CNTL  VMA+STRB
 02BA  20520000      819           CNTL  VMA+STRB
 02BB  80020000      820           RTS
 02BC                821 THDR      EQU   *
 02BC  2F06067D      822           MIR   R13,7
 02BD  2F0626FE      823           MIR   R14,DRHDRH
```

```
02BE  2F06060F   824         MIR   R15,DRHDRL
02BF  D00202E3   825         CALL  RCV
02C0  2F0606DC   826         MIR   R12,13
02C1  2F06860D   827         MIR   R13,128
02C2  2F064600   828         MIR   R0,EBLNK
02C3  D002004E   829 RHD1    CALL  TPWRT               WRITE BLANKS TO TAPE
02C4  2606020D   830         DEC   R13
02C5  707202C3   831         BNZ   RHD1                B IF MORE BLANKS
02C6  2606020C   832         DEC   R12
02C7  707202C3   833         BNZ   RHD1                B IF MORE BLANKS
02C8  2F06067D   834         MIR   R13,7
02C9  2F0626FE   835         MIR   R14,DRHDRH
02CA  2F06060F   836         MIR   R15,DRHDRL
02CB  D0020037   837 RHD3    CALL  DMREAD3
02CC  D002004E   838         CALL  TPWRT               WRITE NON-ZERO PART OF HEADER
02CD  D0020035   839         CALL  DMREAD2
02CE  D002004E   840         CALL  TPWRT
02CF  D0020033   841         CALL  DMREAD1
02D0  D002004E   842         CALL  TPWRT
02D1  D0020031   843         CALL  DMREAD0
02D2  D002004E   844         CALL  TPWRT
02D3  3606000F   845         INC   R15
02D4  2606020D   846 RHD2    DEC   R13
02D5  707202CB   847         BNZ   RHD3                B IF MORE HEADER
02D6  2F06B6AD   848         MIR   R13,186
02D7  28060800   849         ZR    R0                  SUPPLY ZERO DATA
02D8  D002004E   850 RHD4    CALL  TPWRT
02D9  D002004E   851         CALL  TPWRT
02DA  2606020D   852         DEC   R13
02DB  707202D8   853         BNZ   RHD4                B IF MORE ZEROS
02DC  D002004E   854         CALL  TPWRT               SATIS. EXTRA WRITE
02DD  F002023D   855         B     NCMPLTN
02DE             856 TRHDR   EQU   *
02DE  2F0636CD   857         MIR   R13,60
02DF  2F0626FE   858         MIR   R14,DTHDRH
02E0  2F06160F   859         MIR   R15,DTHDRL
02E1  D00202E3   860         CALL  RCV
02E2  F002023D   861         B     NCMPLTN
02E3  D0020023   862 RCV     CALL  M6800R
02E4  D0020043   863         CALL  DMWRT3
02E5  D0020023   864         CALL  M6800R
02E6  D0020041   865         CALL  DMWRT2
02E7  D0020023   866         CALL  M6800R
02E8  D002003F   867         CALL  DMWRT1
02E9  D0020023   868         CALL  M6800R
02EA  D002003D   869         CALL  DMWRT0
02EB  3606000F   870         INC   R15
02EC  707202EE   871         BNZ   RCV1                B IF NO CARRY
META-ASSEMBLER  V00R1   3/04/75                        04/13/78  16:51:31     PAGE  17

F LOC   OBJ        SEQ  LBL     CD    OPERAND LIST        COMMENTS

02ED  3606000E   872         INC   R14
02EE  2606020D   873 RCV1    DEC   R13
02EF  707202E3   874         BNZ   RCV                 B IF MORE INPUT
02F0  80020000   875         RTS
02F1             876 TTOM    EQU   *
02F1  2806080E   877         ZR    R14
02F2  2806080F   878         ZR    R15
02F3  2F0676F0   879         MIR   R0,CCODE
02F4  D002002A   880         CALL  M6800W              SIGNAL ROUTINE OPERATIONAL
02F5  D0020048   881 TTOM1   CALL  TPREAD
02F6  D0020043   882         CALL  DMWRT3              STORE MSB
02F7  D0020048   883         CALL  TPREAD
02F8  D0020041   884         CALL  DMWRT2              STORE NMSB
02F9  D0020048   885         CALL  TPREAD
02FA  D002003F   886         CALL  DMWRT1              STORE NLSB
02FB  D0020048   887         CALL  TPREAD
02FC  D002003D   888         CALL  DMWRT0              STORE LSB
02FD  2600060E   889         MRQ   R14
02FE  3D0222E0   890         CQI   DDATAH+X'2E'
02FF  70731303   891         BM    TTOM2               B IF ADDRESS OK
0300  2600060F   892         MRQ   R15
```

```
0301  3D02F280    893         CQI   DDATAL+X'F8'
0302  707212F5    894         BP    TTOM1           B IF ADDRESS BEYOND BOUND
0303  3606000F    895 TTOM2   INC   R15
0304  707202F5    896         BNZ   TTOM1           B IF NO CARRY
0305  3606000E    897         INC   R14
0306  F00202F5    898         B     TTOM1           B FOR MORE DATA
0307              899 SNRML   EQU   *
0307  2F060644    900         MIR   R4,4
0308  D0020023    901 SND0    CALL  M6800R          READ KEY
0309  28060608    902         MRR   R8,R0
030A  70730322    903         BZ    SND3            B IF NULL KEY
030B  D002033C    904         CALL  KEYR            SET FROM ADDR AND COUNT
030C  2806080B    905         ZR    R11
030D  2806080E    906 SND1    ZR    R14
030E  280606BF    907         MRR   R15,R11
030F  D0020035    908         CALL  DMREAD2         LOAD WORD
0310  28060605    909         MRR   R5,R0
0311  D0020033    910         CALL  DMREAD1
0312  28060603    911         MRR   R3,R0
0313  3606000F    912         INC   R15
0314  D0020035    913         CALL  DMREAD2
0315  28060602    914         MRR   R2,R0
0316  D0020033    915         CALL  DMREAD1
0317  28060601    916         MRR   R1,R0
0318  28060650    917         MRR   R0,R5
0319  380600FB    918         AC    R11,R15,(0A)    R11=R15+1
031A  2806068E    919         MRR   R14,R8
031B  2806069F    920         MRR   R15,R9
031C  D002034A    921         CALL  WORDOUT         STORE WORD
031D  36060009    922         INC   R9
031E  70720320    923         BNZ   SND2            B IF NO CARRY
031F  36060008    924         INC   R8
0320  2606020D    925 SND2    DEC   R13
0321  7072030D    926         BNZ   SND1            B IF MORE NORMAL TEST DATA
META-ASSEMBLER  V00R1  3/04/75                  04/13/78  16:51:35   PAGE  18

F LOC  OBJ         SEQ LBL     CD    OPERAND LIST    COMMENTS

0322  26060204    927 SND3    DEC   R4
0323  70720308    928         BNZ   SND0            B IF MORE KEYS
0324  F002023D    929         B     NCMPLTN
0325              930 RNRML   EQU   *
0325  D0020023    931         CALL  M6800R          READ KEY
0326  28060608    932         MRR   R8,R0
0327  D002033C    933         CALL  KEYR            SET FROM ADDR AND COUNT
0328  2806068E    934         MRR   R14,R8
0329  2806069F    935         MRR   R15,R9
032A  28060800    936 RND1    ZR    R0
032B  D002002A    937         CALL  M6800W
032C  D0020342    938         CALL  WORDIN
032D  D002002A    939         CALL  M6800W
032E  28060610    940         MRR   R0,R1
032F  D002002A    941         CALL  M6800W
0330  28060800    942         ZR    R0
0331  D002002A    943         CALL  M6800W
0332  28060620    944         MRR   R0,R2
0333  D002002A    945         CALL  M6800W
0334  28060630    946         MRR   R0,R3
0335  D002002A    947         CALL  M6800W
0336  3606000F    948         INC   R15
0337  70720339    949         BNZ   RND2            B IF NO CARRY
0338  3606000E    950         INC   R14
0339  2606020D    951 RND2    DEC   R13
033A  7072032A    952         BNZ   RND1
033B  F0020006    953         B     CMDDC
033C  280E0689    954 KEYR    OR    R9,R8,(0A,SLB)  R9=R8*2
033D  220E0089    955         A     R9,R8,(,SLB)    R9=(R8+R9)*2
033E  260E0609    956         SLR   R9
033F  2F063608    957         MIR   R8,DNRMLU
0340  2F0606CD    958         MIR   R13,12          COUNT = 12
0341  80020000    959         RTS
0342  D0020031    960 WORDIN  CALL  DMREAD0
0343  28060603    961         MRR   R3,R0
```

```
 0344 D0020033    962          CALL  DMREAD1
 0345 28060602    963          MRR   R2,R0
 0346 D0020035    964          CALL  DMREAD2
 0347 28060601    965          MRR   R1,R0
 0348 D0020037    966          CALL  DMREAD3
 0349 80020000    967          RTS
 034A D0020043    968 WORDOUT  CALL  DMWRT3
 034B 28060610    969          MRR   R0,R1
 034C D0020041    970          CALL  DMWRT2
 034D 28060620    971          MRR   R0,R2
 034E D002003F    972          CALL  DMWRT1
 034F 28060630    973          MRR   R0,R3
 0350 D002003D    974          CALL  DMWRT0
 0351 80020000    975          RTS
 0352 26000600    976 MULT     MRQ   R0
 0353 28060802    977          ZR    R2
 0354 26681012    978          CAS   R2,R1
 0355 26681012    979          CAS   R2,R1
 0356 26681012    980          CAS   R2,R1
 0357 26681012    981          CAS   R2,R1
META-ASSEMBLER  V00R1   3/04/75                          04/13/78  16:51:38    PAGE  19

F LOC  OBJ         SEQ  LBL      CD    OPERAND LIST        COMMENTS

 0358 26681012    982          CAS   R2,R1
 0359 26681012    983          CAS   R2,R1
 035A 26681012    984          CAS   R2,R1
 035B 36681212    985          S     R2,R1,(OB,SRBQ,,MPY,1)
 035C 24060603    986          MQR   R3
 035D 80020000    987          RTS
 035E 264607C1    988 FLOAT    MRW   R1,TMP
 035F 70721364    989          BP    FLT1                  B IF POSITIVE VALUE
 0360 26060E11    990          XORB  R1,R1,(OB)            ABSOLUTE VALUE
 0361 36060422    991          NA    R2,R2,(OB)
 0362 70720364    992          BNZ   FLT1                  B IF NO CARRY
 0363 36060001    993          INC   R1
 0364 38060405    994 FLT1     NA    R5,R0,(OA)            2'S COMPLEMENT OF GAIN
 0365 2F000630    995          MIQ   3
 0366 20060855    996          AND   R5,R5,(AQ)
 0367 7073037B    997          BZ    FLT4A                 B IF ADJ TO BASE 16
 0368 26000602    998          MRQ   R2
 0369 28060614    999          MRR   R4,R1
 036A 26003604   1000 FLT2     SLA   R4
 036B 70731374   1001          BM    FLT3                  B IF OVERFLOW
 036C 26060205   1002          DEC   R5
 036D 7072036A   1003          BNZ   FLT2                  B UNTIL ADJ TO BASE 16
 036E 28060641   1004          MRR   R1,R4
 036F 24060602   1005          MQR   R2
 0370 260A0600   1006          SRR   R0
 0371 260A0600   1007          SRR   R0
 0372 36060000   1008          INC   R0
 0373 F002037D   1009          B     FLT5
 0374 2F000630   1010 FLT3     MIQ   3
 0375 20060805   1011          AND   R5,R0,(AQ)
 0376 26000602   1012          MRQ   R2
 0377 26083601   1013 FLT4     SRA   R1
 0378 26060205   1014          DEC   R5
 0379 70720377   1015          BNZ   FLT4                  B UNTIL NORMALIZED
 037A 24060602   1016          MQR   R2
 037B 260A0600   1017 FLT4A    SRR   R0
 037C 260A0600   1018          SRR   R0
 037D 28060611   1019 FLT5     MRR   R1,R1
 037E 70720386   1020          BNZ   FLT7
 037F 36060000   1021          INC   R0
 0380 36060000   1022          INC   R0
 0381 28060621   1023          MRR   R1,R2
 0382 70720385   1024          BNZ   FLT6                  B IF NON-ZERO VALUE
 0383 28060800   1025          ZR    R0
 0384 F0020394   1026          B     FLT9
 0385 28060802   1027 FLT6     ZR    R2
 0386 2F00F600   1028 FLT7     MIQ   X'F0'
 0387 20020810   1029          AND   0,R1,(AQ,Z)           BIT TEST HIGH ORDER HEX DIGIT
 0388 70720390   1030          BNZ   FLT8                  B IF NORMALIZED
```

```
  0389  36060000    1031           INC   R0
  038A  26000E02    1032           MRQ   R2
  038B  260C3601    1033           SLA   R1
  038C  260C3601    1034           SLA   R1
  038D  260C3601    1035           SLA   R1
  038E  260C3601    1036           SLA   R1
 META-ASSEMBLER  V00R1   3/04/75                     04/13/78  16:51:44     PAGE  20

F LOC   OBJ         SEQ  LBL       CD    OPERAND LIST          COMMENTS

  038F  24060602    1037           MQR   R2
  0390  2E8007C0    1038 FLT8      MUQ   TMP
S 0391  2D000800    1039           AND   0,0,(DQ,Q,E,,,,,X'80')
S 0392  2D000600    1040           OR    0,0,(DQ,Q,E,,,,,X'40')
  0393  30060200    1041           S     R0,R0,(AQ)
  0394  80020000    1042 FLT9      RTS
                    1043 * R1,R2 * R4,R5 -> RA,RB -> R1,R2
  0395  2806080A    1044 MULT16    ZR    R10
  0396  2806080B    1045           ZR    R11
  0397  26000602    1046           MRQ   R2
  0398  2F060689    1047           MIR   R9,8
  0399  266A005B    1048 MULT16A   A     R11,R5,(OB,SRB,,MPY,0)
  039A  7072339C    1049           BNC   *+2
  039B  3606000A    1050           INC   R10
  039C  2668104A    1051           CAS   R10,R4
  039D  26060209    1052           DEC   R9
  039E  70720399    1053           BNZ   MULT16A               B IF MORE DIGITS
  039F  200600BB    1054           A     R11,R11,(AQ)
  03A0  707233A1    1055           BNC   *+1                   ROUND HIGH
  03A1  3606000A    1056           INC   R10
  03A2  26000601    1057           MRQ   R1
  03A3  2F060679    1058           MIR   R9,7
  03A4  266A005B    1059 MULT16B   A     R11,R5,(OB,SRB,,MPY,0)
  03A5  707233A7    1060           BNC   *+2
  03A6  3606000A    1061           INC   R10
  03A7  2668104A    1062           CAS   R10,R4
  03A8  26060209    1063           DEC   R9
  03A9  707203A4    1064           BNZ   MULT16B               B FOR MORE DIGITS
  03AA  366A025B    1065           S     R11,R5,(OB,SRB,,MPY,0)
  03AB  707333AD    1066           BC    *+2
  03AC  2606020A    1067           DEC   R10
  03AD  3668124A    1068           S     R10,R4,(OB,SRBQ,,MPY,1)
  03AE  2F0676F2    1069           MIR   R2,X'7F'
  03AF  2206082B    1070           AND   R11,R2                REMOVE - SHIFTED IN WITH S&SFT CODE
  03B0  200600BB    1071           A     R11,R11,(AQ)
  03B1  707233B3    1072           BNC   *+2
  03B2  3606000A    1073           INC   R10
  03B3  280606B2    1074           MRR   R2,R11
  03B4  280606A1    1075           MRR   R1,R10
  03B5  80020000    1076           RTS
  03B6  3D02F2E0    1077 NEGCMD    CQI   -2
  03B7  707303CB    1078           BZ    RMPGEN                B IF RAMP GENERATOR CMD
  03B8  7072153E    1079           BP    SELFTEST              B IF STROUT SELFTEST CMD
  03B9  3D02F2C0    1080           CQI   -4
  03BA  707303F5    1081           BZ    SIGGEN                B IF SIGNAL GENERATOR CMD
  03BB  707213D8    1082           BP    MONTST                B IF MONITOR WRITE TEST CMD
  03BC  3D02F2A0    1083           CQI   -6
  03BD  707303C2    1084           BZ    LNKTST                B IF PROCESSOR LINK TEST CMD
U 03BE  70721000    1085           BP    DMTST                 B IF DATA MEMORY TEST
  03BF  3D02F280    1086           CQI   -8
  03C0  707213C5    1087           BP    PNLTST                B IF PANEL TEST
  03C1  F0020020    1088           B     ERRCMPLT
  03C2  D0020023    1089 LNKTST    CALL  M6800R
  03C3  D002002A    1090           CALL  M6800W
  03C4  F0020006    1091           B     CMDDC
 META-ASSEMBLER  V00R1   3/04/75                     04/13/78  16:51:53     PAGE  21

F LOC   OBJ         SEQ  LBL       CD    OPERAND LIST          COMMENTS

  03C5  D0020023    1092 PNLTST    CALL  M6800R
  03C6  26260600    1093           MRL   R0
  03C7  D00202B9    1094           CALL  VMASTRB               STROBE SWITCH
  03C8  2F860600    1095           MDR   R0
```

```
   03C9  D002002A     1096           CALL  M6800W
   03CA  F002023D     1097           B     NCMPLTN
   03CB  2F06E600     1098 RMPGEN    MIR   R0,X'E0'
   03CC  2F060611     1099           MIR   R1,1
   03CD  2F060612     1100           MIR   R2,1
   03CE  2F0626EE     1101           MIR   R14,X'2E'
   03CF  2F06E60F     1102           MIR   R15,X'E0'
   03D0  32060210     1103 RMPG1     S     R0,R1
   03D1  3206022F     1104           S     R15,R2
   03D2  D002003D     1105           CALL  DMWRT0
   03D3  280606FF     1106           MRR   R15,R15
   03D4  707203D0     1107           BNZ   RMPG1
   03D5  2606020E     1108           DEC   R14
   03D6  707213D0     1109           BP    RMPG1
   03D7  F002023D     1110           B     NCMPLTN
   03D8  D0020023     1111 MONTST    CALL  M6800R
   03D9  2806060C     1112           MRR   R12,R0
   03DA  D0020023     1113           CALL  M6800R
   03DB  2806060D     1114           MRR   R13,R0
   03DC  707303DE     1115           BZ    *+2
   03DD  3606000C     1116           INC   R12
   03DE  2F06060E     1117           MIR   R14,0
   03DF  2F06060F     1118           MIR   R15,0
   03E0  2636860E     1119 MONT1     MRU   R14,(,BYTE4)
   03E1  2626060F     1120           MRL   R15
   03E2  20529000     1121           CNTL  VMA+DM
   03E3  2052D000     1122           CNTL  VMA+DM+STRB
   03E4  2052D000     1123           CNTL  VMA+DM+STRB
   03E5  2F860600     1124           MDR   R0
   03E6  20520000     1125           CNTL  0
   03E7  26160600     1126           MRD   R0
   03E8  2F220010     1127           MIL   DATMON
   03E9  7073D3E9     1128           BMNR  *
   03EA  2052A000     1129           CNTL  VMA+W
   03EB  2052E000     1130           CNTL  VMA+W+STRB
   03EC  20520000     1131           CNTL  0
   03ED  3606000F     1132           INC   R15
   03EE  707233F0     1133           BNC   *+2
   03EF  3606000E     1134           INC   R14
   03F0  2606020D     1135           DEC   R13
   03F1  707203E0     1136           BNZ   MONT1
   03F2  2606020C     1137           DEC   R12
   03F3  707203E0     1138           BNZ   MONT1
   03F4  F002023D     1139           B     NCMPLTN
                      1140 * SIGNAL GENERATOR
   03F5               1141 SIGGEN    EQU   *
   03F5  D0020023     1142           CALL  M6800R
   03F6  2806060E     1143           MRR   R14,R0
   03F7  D0020023     1144           CALL  M6800R
   03F8  2806060F     1145           MRR   R15,R0
   03F9  D002002A     1146           CALL  M6800W              IND FAKE COMPLETION
META-ASSEMBLER  V00P1   3/04/75                         04/13/78  16:51:57     PAGE  22

F LOC   OBJ           SEQ  LBL       CD    OPERAND LIST        COMMENTS

   03FA  D0020023     1147 SIGG1     CALL  M6800R
   03FB  D0020043     1148           CALL  DMWRT3
   03FC  D0020023     1149           CALL  M6800R
   03FD  D0020041     1150           CALL  DMWRT2
   03FE  D0020023     1151           CALL  M6800R
   03FF  D002003F     1152           CALL  DMWRT1
   0400  D0020023     1153           CALL  M6800R
   0401  D002003D     1154           CALL  DMWRT0
   0402  3606000F     1155           INC   R15
   0403  707203FA     1156           BNZ   SIGG1
   0404  3606000E     1157           INC   R14
   0405  F00203FA     1158           B     SIGG1
                      1159 * FILTER PROGRAM
   0406               1160 MTOT1C    EQU   *
   0406  D0020033     1161           CALL  DMREAD1             VIK -> R0
   0407  26000600     1162           MRQ   R0
   0408  D0020035     1163           CALL  DMREAD2
   0409  28060601     1164           MRR   R1,R0
```

```
040A  D0020037    1165          CALL  DMREAD3
040B  28060602    1166          MRR   R2,R0                 SAVE SIGN
040C  260E0600    1167          SLR   R0
040D  260E0600    1168          SLR   R0
040E  26060200    1169          DEC   R0
040F  28060611    1170          MRR   R1,R1
0410  70721415    1171          BP    *+5                   B IF NO OVERFLOW
0411  26083601    1172          SRA   R1
0412  2F0676F9    1173          MIR   R9,X'7F'
0413  22060891    1174          AND   R1,R9
0414  36060000    1175          INC   R0
0415  28060622    1176          MRR   R2,R2
0416  7072141B    1177          BP    *+5                   B IF POSITIVE VALUE
0417  26060E11    1178          XORB  R1,R1,(OB)
0418  34000400    1179          NA    0,0,(OQ,Q)
0419  7072041B    1180          BNZ   *+2                   B IF NO CARRY
041A  36060001    1181          INC   R1
041B  24060602    1182          MQR   R2
041C  D0020500    1183          CALL  NORM
041D  2E820770    1184          TST   NOISESW
041E  70730452    1185          BZ    PTST                  B IF PERF OR BLAST DATA
041F  70721454    1186          BP    MTST                  B IF NOISE DATA
0420  2E800710    1187          MWQ   MODE
0421  3D020210    1188          CQI   1
0422  70730430    1189          BZ    MDBITS                B IF DATA BIT MODE
0423  3D020240    1190          CQI   4
0424  70731433    1191          BM    MAGC                  B IF AGC MODE
0425  70730456    1192          BZ    MFGAIN                B IF FIXED GAIN MODE
0426  260E0600    1193 MGBITS   SLR   R0
0427  260E0600    1194          SLR   R0
0428  2F0676F2    1195          MIR   R2,127
0429  28060611    1196          MRR   R1,R1
042A  7073142D    1197          BM    MGBIT1                B IF DATA NEG
042B  22060020    1198          A     R0,R2
042C  80020000    1199          RTS
042D  36060002    1200 MGBIT1   INC   R2
042E  32060420    1201          NA    R0,R2
META-ASSEMBLER  V00R1   3/04/75                    04/13/78  16:52:02     PAGE  23

F LOC   OBJ         SEQ  LBL    CD    OPERAND LIST          COMMENTS

042F  80020000    1202          RTS
0430  2F008600    1203 MDBITS   MIQ   X'80'
0431  20060C10    1204          XOR   R0,R1,(AQ)
0432  80020000    1205          RTS
0433  2E860754    1206 MAGC     MWR   R4,TRIP
0434  2E860765    1207          MWR   R5,TRIP+1
0435  7072044D    1208          BNZ   MAGC3
0436  28060644    1209          MRR   R4,R4
0437  7072044C    1210          BNZ   MAGC2                 B IF NOT TRIP TIME
0438  2E8007A0    1211          MWQ   AGCSTPU
0439  264209A0    1212          Z     AGCSTPU               RESET GAIN UP SWITCH
043A  3D024200    1213          CQI   X'40'
043B  7073143E    1214          BM    MAGC4                 B IF NO GAIN CHG DOWN
043C  2E860584    1215          NAB   R4,0,(DO,,W,,,QGAIN)
043D  26460784    1216          MRW   R4,QGAIN              DECREMENT GAIN
043E  2C8007B0    1217 MAGC4    OR    0,0,(DQ,Q,W,,,AGCSTPD)
043F  244207B0    1218          MQW   AGCSTPD               KEEP MAX FOR STEP DOWN AGC
0440  2E870776    1219          MWR   R6,TRIP2
0441  70720448    1220          BNZ   MAGC1                 B IF NO GAIN CHG UP
0442  264209B0    1221          Z     AGCSTPD               RESET GAIN DOWN SWITCH
0443  3D022200    1222          CQI   X'20'
0444  70721447    1223          BP    MAGC0                 B IF NOSTEP IN AGC
0445  3E860184    1224          AC    R4,0,(DO,,W,,,QGAIN)  INCREMENT GAIN
0446  26460784    1225          MRW   R4,QGAIN              STORE NEW AGC GAIN
0447  2F060656    1226 MAGC0    MIR   R6,5
0448  26060206    1227 MAGC1    DEC   R6
0449  26470776    1228          MRW   R6,TRIP2
044A  2F060614    1229          MIR   R4,1
044B  2E8606F5    1230          MWR   R5,AGCT
044C  26060204    1231 MAGC2    DEC   R4
044D  26060205    1232 MAGC3    DEC   R5
044E  26460754    1233          MRW   R4,TRIP               STORE NEXT TRIP TIME
```

```
 044F  26460765    1234         MRW   R5,TRIP+1
 0450  2E800780    1235         MWQ   QGAIN
 0451  F0020457    1236         B     FIX0
 0452  2E800790    1237 PTST    MWQ   XGAIN
 0453  F0020457    1238         B     FIX0
 0454  2E800720    1239 MTST    MWQ   NGAIN
 0455  F0020457    1240         B     FIX0
 0456  2E8006B0    1241 MFGAIN  MWQ   GAIN
 0457  2E820700    1242 FIX0    TST   FREQ
 0458  7073049E    1243         BZ    FIX0A
 0459  24430780    1244         MQW   TGAIN
 045A  2E8607E3    1245         MWR   R3,V1          VI(K-1) -> E1
 045B  2E8607F4    1246         MWR   R4,V1+1
 045C  2E870605    1247         MWR   R5,V1+2
 045D  264607E0    1248         MRW   R0,V1          R0 -> VI(K-1)
 045E  264607F1    1249         MRW   R1,V1+1
 045F  26470602    1250         MRW   R2,V1+2
 0460  D00204D5    1251         CALL  SUBT           VI(K)-VI(K-1) -> E0
 0461  2E8706D4    1252         MWR   R4,K1          K2' -> R1
 0462  2E8706E5    1253         MWR   R5,K1+1
 0463  2F060603    1254         MIR   R3,0
 0464  D0020515    1255         CALL  MPY            K2'(VI(K-1)-VI(K)) -> R0
 0465  D00204DE    1256         CALL  MV02           R0 -> R2
META-ASSEMBLER  V00R1    3/04/75                04/13/78  16:52:09     PAGE  24

F LOC  OBJ         SEQ  LBL     CD    OPERAND LIST   COMMENTS

 0466  2E870610    1257         MWR   R0,V2          VM(K-1) -> R0
 0467  2E870621    1258         MWR   R1,V2+1
 0468  2E870632    1259         MWR   R2,V2+2
 0469  2E8706F4    1260         MWR   R4,K2          K1' -> R1
 046A  2E870705    1261         MWR   R5,K2+1
 046B  2F060603    1262         MIR   R3,0
 046C  D0020515    1263         CALL  MPY            K1'*VM(K-1) -> R0
 046D  D00204E2    1264         CALL  MV21           R2 -> R1
 046E  D00204C4    1265         CALL  ADD            K1'*VM(K-1)+K2'(VI(K-1)-VI(K)) -> R0
 046F  2E870613    1266         MWR   R3,V3          VM(K-1) -> R1
 0470  2E870624    1267         MWR   R4,V3+1
 0471  2E870635    1268         MWR   R5,V3+2
 0472  2E870646    1269         MWR   R6,V4          VM(K-2) -> R2
 0473  2E870657    1270         MWR   R7,V4+1
 0474  2E870668    1271         MWR   R8,V4+2
 0475  26470643    1272         MRW   R3,V4          R1 -> VM(K-2)
 0476  26470654    1273         MRW   R4,V4+1
 0477  26470665    1274         MRW   R5,V4+2
 0478  26470610    1275         MRW   R0,V3          R0 -> VM(K-1)
 0479  26470621    1276         MRW   R1,V3+1
 047A  26470632    1277         MRW   R2,V3+2
 047B  36060003    1278         INC   R3             2VM(K-1) -> R1
 047C  D00204D5    1279         CALL  SUBT           VM(K)-2VM(K-1) -> E0
 047D  D00204E2    1280         CALL  MV21           VM(K-2) -> R1
 047E  D00204C4    1281         CALL  ADD            VM(K)-2VM(K-1)+VM(K-2) -> E0
 047F  2E870714    1282         MWR   R4,K3          K3 -> R1
 0480  2E870725    1283         MWR   R5,K3+1
 0481  2F060603    1284         MIR   R3,0
 0482  D0020515    1285         CALL  MPY            K3(VM(K)-2VM(K-1)+VM(K-2))
 0483  D00204DE    1286         CALL  MV02           R0 -> R2
 0484  2E870670    1287         MWR   R0,V5          VO(K-2) -> R0
 0485  2E870681    1288         MWR   R1,V5+1
 0486  2E870692    1289         MWR   R2,V5+2
 0487  2E870734    1290         MWR   R4,K4          K2 -> R1
 0488  2E870745    1291         MWR   R5,K4+1
 0489  2F060603    1292         MIR   R3,0
 048A  D0020515    1293         CALL  MPY            K2*VO(K-2) -> R0
 048B  D00204E2    1294         CALL  MV21           R2 -> R1
 048C  D00204C4    1295         CALL  ADD            T2+T3 -> R0
 048D  D00204DE    1296         CALL  MV02           R0 -> R2
 048E  2E8706A0    1297         MWR   R0,V6          VO(K-1) -> R0
 048F  2E8706B1    1298         MWR   R1,V6+1
 0490  2E8706C2    1299         MWR   R2,V6+2
 0491  26470670    1300         MRW   R0,V5          R0 -> VO(K-2)
 0492  26470681    1301         MRW   R1,V5+1
 0493  26470692    1302         MRW   R2,V5+2
```

```
 0494  2E870754      1303           MWR    R4,K5              K1 -> R1
 0495  2E870765      1304           MWR    R5,K5+1
 0496  2F060613      1305           MIR    R3,1
 0497  D0020515      1306           CALL   MPY                K1*V0(K-1) -> R0
 0498  D00204E2      1307           CALL   MV21               R2 -> R1
 0499  D00204C4      1308           CALL   ADD                T1+T2+T3 -> R0
 049A  264706A0      1309           MRW    R0,V6              R0 -> V0(K-1)
 049B  264706B1      1310           MRW    R1,V6+1
 049C  264706C2      1311           MRW    R2,V6+2
META-ASSEMBLER  V00R1   3/04/75                             04/13/78  16:52:20     PAGE  25

F LOC   OBJ          SEQ  LBL       CD     OPERAND LIST       COMMENTS

 049D  2E810780      1312           MWQ    TGAIN
 049E  20060003      1313 FIX0A     A      R3,R0,(AQ)
 049F  707304BA      1314           BZ     FIX5               B IF NO SHIFT NEEDED
 04A0  707314B4      1315           BM     FIX2               B IF SHIFT RIGHT IS NEEDED
 04A1  26000602      1316           MRQ    R2
 04A2  28060611      1317           MRR    R1,R1
 04A3  707314AC      1318           BM     FIX1A              B IF VALUE IS NEGATIVE
 04A4  260C3601      1319 FIX1      SLA    R1
 04A5  707314AA      1320           BM     FIX6               B IF OVERFLOW
 04A6  26060203      1321           DEC    R3
 04A7  707204A4      1322           BNZ    FIX1               B UNTIL SHIFT COMPLTET
 04A8  28060611      1323           MRR    R1,R1
 04A9  707214BA      1324           BP     FIX5               B IF NO OVERFLOW
 04AA  2F0676F1      1325 FIX6      MIR    R1,X'7F'           WET MAX POSITIVE
 04AB  F00204BA      1326           B      FIX5
 04AC  260C3601      1327 FIX1A     SLA    R1
 04AD  707214B2      1328           BP     FIX6A              B IF OVERFLOW
 04AE  26060203      1329           DEC    R3
 04AF  707204AC      1330           BNZ    FIX1A              B UNTIL SHIFT COMPLETE
 04B0  28060611      1331           MRR    R1,R1
 04B1  707314BA      1332           BM     FIX5               B IF NO OVERFLOW
 04B2  2F068611      1333 FIX6A     MIR    R1,X'81'
 04B3  F00204BA      1334           B      FIX5
 04B4  26000603      1335 FIX2      MRQ    R3
 04B5  3D02F280      1336           CQI    -8
 04B6  707314C2      1337           BM     FIX9
 04B7  26083601      1338 FIX2A     SRA    R1
 04B8  36060003      1339           INC    R3
 04B9  707204B7      1340           BNZ    FIX2A              B UNTIL SHIFT COMPLETE
 04BA  2F0076F0      1341 FIX5      MIQ    X'7F'
 04BB  20060C10      1342           XOR    R0,R1,(AQ)         INVERT DATA BITS
 04BC  707214BE      1343           BP     *+2                B IF DATA IS POSITIVE
 04BD  36060411      1344           NA     R1,R1,(OB)
 04BE  2E8007A0      1345           MWQ    AGCSTPU
 04BF  20060611      1346           OR     R1,R1,(AQ)
 04C0  264607A1      1347           MRW    R1,AGCSTPU         A G C
 04C1  80020000      1348           RTS
 04C2  28060801      1349 FIX9      ZR     R1
 04C3  F00204BA      1350           B      FIX5
                     1351 * E1 + E0 -> E0
 04C4  D00204E6      1352 ADD       CALL   ADJST              ALIGN POINT
 04C5  22060052      1353           A      R2,R5
 04C6  707234CA      1354           BNC    ADD1               B IF NO CARRY
 04C7  32060041      1355           AC     R1,R4
 04C8  707324CC      1356           BO     ADD2               B IF MANTISSA OVERFLOW
 04C9  F00204D3      1357           B      ADD3
 04CA  22060041      1358 ADD1      A      R1,R4
 04CB  707224D3      1359           BNO    ADD3               B IF NO MANTISSA OVERFLOW
 04CC  26000602      1360 ADD2      MRQ    R2
 04CD  26083601      1361           SRA    R1
 04CE  24060602      1362           MQR    R2
 04CF  2F008600      1363           MIQ    X'80'
 04D0  20060C11      1364           XOR    R1,R1,(AQ)
 04D1  36060000      1365           INC    R0
 04D2  80020000      1366           RTS
META-ASSEMBLER  V00R1   3/04/75                             04/13/78  16:52:25     PAGE  26

F LOC   OBJ          SEQ  LBL       CD     OPERAND LIST       COMMENTS

 04D3  D0020500      1367 ADD3      CALL   NORM               NORMALIZE THE RESULT
```

```
04D4  80020000     1368           RTS
                   1369 * E1 - E0 -> E0
04D5  D00204E6     1370 SUBT      CALL   ADJST                  ALIGN POINT
04D6  32060252     1371           S      R2,R5
04D7  707334DB     1372           BC     SUBT1
04D8  22060241     1373           SB     R1,R4
04D9  707324CC     1374           BO     ADD2                   B IF MANTISSA OVERFLOW
04DA  F00204D3     1375           B      ADD3
04DB  32060241     1376 SUBT1     S      R1,R4
04DC  707324CC     1377           BO     ADD2                   B IF MANTISSA OVERFLOW
04DD  F00204D3     1378           B      ADD3
04DE  28060606     1379 MV02      MRR    R6,R0
04DF  28060617     1380           MRR    R7,R1
04E0  28060628     1381           MRR    R8,R2
04E1  80020000     1382           RTS
04E2  28060663     1383 MV21      MRR    R3,R6
04E3  28060674     1384           MRR    R4,R7
04E4  28060685     1385           MRR    R5,R8
04E5  80020000     1386           RTS
04E6  28060611     1387 ADJST     MRR    R1,R1
04E7  707304FB     1388           BZ     ADJ1                   B IF HI BYTE ZERO
04E8  28060644     1389           MRR    R4,R4
04E9  707304FE     1390           BZ     ADJ2                   B IF HI BYTE ZERO
04EA  32020230     1391           S      R0,R3,(,Z)
04EB  707304F3     1392           BZ     ADJ4
04EC  707314F4     1393           BM     ADJ3                   B IF SUBTRAHEND SMALLER
04ED  26000605     1394           MRQ    R5
04EE  26083604     1395 ADJ0A     SRA    R4
04EF  36060003     1396           INC    R3
04F0  32020230     1397           S      R0,R3,(,Z)
04F1  707204EE     1398           BNZ    ADJ0A
04F2  24060605     1399           MQR    R5
04F3  80020000     1400 ADJ4      RTS
04F4  26000602     1401 ADJ3      MRQ    R2
04F5  26083601     1402 ADJ3A     SRA    R1
04F6  36060000     1403           INC    R0
04F7  32020230     1404           S      R0,R3,(,Z)
04F8  707204F5     1405           BNZ    ADJ3A
04F9  24060602     1406           MQR    R2
04FA  80020000     1407           RTS
04FB  28060630     1408 ADJ1      MRR    R0,R3
04FC  28060802     1409           ZR     R2
04FD  80020000     1410           RTS
04FE  28060805     1411 ADJ2      ZR     R5
04FF  80020000     1412           RTS
0500  2F064609     1413 NORM      MIR    R9,X'40'
0501  26000602     1414           MRQ    R2
0502  28060611     1415           MRR    R1,R1
0503  70730511     1416           BZ     NORM1
0504  7072150A     1417           BP     NORM2
0505  22020891     1418 NORM3     AND    R1,R9,(,Z)
0506  7073050F     1419           BZ     NORM9                  B WHEN NORMALIZED
0507  260C3601     1420           SLA    R1
0508  26060200     1421           DEC    R0
META-ASSEMBLER  V00R1   3/04/75                         04/13/78  16:52:28     PAGE  27

F LOC   OBJ        SEQ  LBL       CD     OPERAND LIST           COMMENTS

0509  F0020505     1422           B      NORM3
050A  22020891     1423 NORM2     AND    R1,R9,(,Z)
050B  7072050F     1424           BNZ    NORM9
050C  260C3601     1425           SLA    R1
050D  26060200     1426           DEC    R0
050E  F002050A     1427           B      NORM2
050F  24060602     1428 NORM9     MQR    R2
0510  80020000     1429           RTS
0511  28060622     1430 NORM1     MRR    R2,R2
0512  7072050A     1431           BNZ    NORM2
0513  28060800     1432           ZR     R0
0514  80020000     1433           RTS
0515  28060611     1434 MPY       MRR    R1,R1
0516  7073051B     1435           BZ     MPY1                   B IF RESULT IS ZERO
0517  D0020395     1436           CALL   MULT16                 MULTIPLY MANTISSA
```

```
0518 32060030    1437          AC    R0,R3
0519 D0020500    1438 MPY2     CALL  NORM           NORMALIZE THE RESULT
051A 80020000    1439          RTS
051B 28060802    1440 MPY1     ZR    R2             FORCE ZERO RESULT
051C F0020519    1441          B     MPY2
051D D0020023    1442 MID      CALL  M6800R         READ MSB OF FILE NO
051E 28060605    1443          MRR   R5,R0
051F D0020023    1444          CALL  M6800R         READ CB OF FILE NO
0520 28060606    1445          MRR   R6,R0
0521 D0020023    1446          CALL  M6800R         READ LSB OF FILE NO
0522 28060607    1447          MRR   R7,R0
0523 2F060634    1448          MIR   R4,3
0524 28060651    1449 MID1     MRR   R1,R5
0525 28060665    1450          MRR   R5,R6
0526 28060676    1451          MRR   R6,R7
0527 260E0601    1452          SLR   R1
0528 260E0601    1453          SLR   R1
0529 260E0601    1454          SLR   R1
052A 260E0601    1455          SLR   R1
052B 2F060642    1456          MIR   R2,4
052C 260E0601    1457 MID2     SLR   R1
052D 70731530    1458          BM    MID3           B IF BIT IS ONE
052E 2F06F6F0    1459          MIR   R0,X'FF'       IND ZERO
052F F0020533    1460          B     MID5
0530 2F0676F0    1461 MID3     MIR   R0,X'7F'       IND ONE
0531 F0020533    1462          B     MID5
0532 2F060600    1463 MID4     MIR   R0,X'00'       IND BREAK
0533 2F060653    1464 MID5     MIR   R3,5
0534 D0020054    1465 MID5A    CALL  MONWRT         WRITE TO MONITOR
0535 26060203    1466          DEC   R3
0536 70720534    1467          BNZ   MID5A          B UNTIL BIT DISPLAYED
0537 26060202    1468          DEC   R2
0538 7073153B    1469          BM    MID6           B IF DIGIT COMPLETE
0539 7072052C    1470          BNZ   MID2           B UNTIL DIGIT COMPLETE
053A F0020532    1471          B     MID4
053B 26060204    1472 MID6     DEC   R4
053C 70720524    1473          BNZ   MID1           B UNTIL ID COMPLETE
053D 80020000    1474          RTS
053E             1475 SELFTEST EQU   *              TBA
053E             1476          END
  4 ERRORS
META-ASSEMBLER  V00R1   3/04/75                   04/13/78  16:52:36     PAGE  28

LABEL     VALUE DEF       REFERENCES
ADD       04C4 1352      1308 1295 1281 1265
ADD1      04CA 1358      1354
ADD2      04CC 1360      1377 1374 1356
ADD3      04D3 1367      1378 1375 1359 1357
ADDR      0004   45       477  426  387  386  309  274  273  254  253  246
ADJ0A     04EE 1395      1398
ADJ1      04FB 1408      1388
ADJ2      04FE 1411      1390
ADJ3      04F4 1401      1393
ADJ3A     04F5 1402      1405
ADJ4      04F3 1400      1392
ADJST     04E6 1387      1370 1352
AGCSTPD   001B   63      1221 1218 1217  472
AGCSTPU   001A   62      1347 1345 1212 1211  471
AGCT      000F   52      1230  782
AQ        0000    0      1364 1346 1342 1313 1204 1071 1054 1041 1029 1011  996  720  659  656  60
                     462  347  336
B         0003    0       723
BEGIN     0000  105
BYTE1     0001    0       170  158
BYTE2     0002    0       172  160
BYTE3     0004    0       174  162
BYTE4     0008    0      1119  168  156
C         0005    0       212  196  190  184  178  167  155  148  112
CCODE     007F  100       879  693  405
CMDDATA   0002    6       117
CMDDC     0006  112      1091  953  695  504  408  243  141  111
CMDFM     0000    4
CMDHDR    0020   15
```

```
CMDMD     0010   13      129
CMDMHDR   0023   18      136
CMDMT     0008   12      126
CMDMTD    0018   14      131
CMDPRTY   0003    7
CMDRFM    0005    9
CMDRN     0007   11
CMDSEQ    0001    5
CMDSEQR   016D  479      118
CMDSN     0006   10      123
CMDST     FFFF   19
CMDTB     0004    8      120
CMDTHDR   0021   16      133
CMDTM     0022   17
CNTWS     0006   46      382  381  307  304
DATA      006A  213      119
DATMON    0001   24     1127  192
DCMDSEQH  002E   83      673  491
DCMDSEQL  00F8   84      674  492
DDAGC     000B   33      775
DDAGN     000E   36      812
DDATAH    0000   92      890  599  476  439
DDATAL    0000   93      893  601  443  440
DDFG      000A   32      767
DDLF      000C   34      783
DDNGN     000D   35      744
META-ASSEMBLER  V00R1   3/04/75         23        04/13/78  16:52:39     PAGE  29

LABEL     VALUE DEF      REFERENCES
DDSEL     000F   37      808
DDTS      0009   31      758
DDTT      0008   30      748
DFR0      0007   26
DFR1      0006   27      206
DFR2      0005   28      515  202
DFR3      0004   29      518  198
DINC      001D   65      475  263
DM        0001    0     1123 1122 1121  177  176  165  164  163
DMREAD    0038  163      161  159  157
DMREAD0   0031  156      960  843  606  444  376  303  275  234
DMREAD1   0033  158     1161  962  915  910  841  393  374  301  230
DMREAD2   0035  160     1163  964  913  908  839  482  450  441  391  372  228
DMREAD3   0037  162     1165  966  837  389  370  226
DMWRT     0044  175      173  171  169
DMWRT0    003D  168     1154 1105  974  888  869  686  593  573  352  333  329  320  262
DMWRT1    003F  170     1152  972  886  867  683  667  598  571  548  327  318
DMWRT2    0041  172     1150  970  884  865  680  669  587  556  547  423  350  339  325  316
DMWRT3    0043  174     1148  968  882  863  677  671  590  558  323  314
DNRMLU    0030   91      957
DO        0007    0     1224 1215
DPRTYH    002F   89      664  551  498  480
DPRTYL    00FA   90      665  552  499  481
DQ        0006    0     1217 1040 1039  715
DRHDRH    002F   85      835  823
DRHDRL    0000   86      836  824
DTHDRH    002F   87      858  421  368  311  299
DTHDRL    0010   88      859  436  422  369  312  300
E         0002    0     1040 1039  715
EBLNK     0040   97      828
ECODE     0080   99      139
ERRCMPLT  0020  139     1088
FIX0      0457 1242     1240 1238 1236
FIX0A     049E 1313     1243
FIX1      04A4 1319     1322
FIX1A     04AC 1327     1330 1318
FIX2      04B4 1335     1315
FIX2A     04B7 1338     1340
FIX5      04BA 1341     1350 1334 1332 1326 1324 1314
FIX6      04AA 1325     1320
FIX6A     04B2 1333     1328
FIX9      04C2 1349     1337
FLOAT     035E  988      645
FLT1      0364  994      992  989
```

```
FLT2     036A 1000    1003
FLT3     0374 1010    1001
FLT4     0377 1013    1015
FLT4A    037B 1017     997
FLT5     037D 1019    1009
FLT6     0385 1027    1024
FLT7     0386 1028    1020
FLT8     0390 1038    1030
FLT9     0394 1042    1026
FMREAD   005A  197     681  675  654  602  588  560  553  197
FREQ     0010   53    1242  786  772  762  752  730
META-ASSEMBLER  V00R1  3/04/75                    04/13/78  16:52:43    PAGE  30

LABEL    VALUE DEF     REFERENCES
FTOM     0184  505     116
FTOM0    0188  511     507
FTOM1    01E2  602     653  651
FTOM1B   01AF  551     542  539  537
FTOM1C   01A3  538     532
FTOM1D   01AB  546     550
FTOM2    005B  198
FTOM2A   01CF  583     580  576
FTOM2B   01CD  581     577
FTOM3A   01A5  540     534
FTOM3B   020D  645     642  639  635  626  624  621  619  617
FTOM3C   020B  643     627
FTOM3D   020E  646     644
FTOM3E   01F9  625     637
FTOM3F   01FB  627
FTOM4    0212  650     648
FTOM4A   0200  632     630
FTOM4B   0208  640     633
FTOM5    01EA  610     604
FTOM6    01EF  615     613  611
FTOM7    020F  647     608
FTOMP1   022B  675     689
FTOMR0   0240  696     682  676  589  561
FTOMR1   0246  702     684  678  663  596  562  554
GAIN     000B   49    1241  770  473
GCNT1    00BC  301
K1       002D   72    1253 1252  795  793
K2       002F   73    1261 1260  791  789
K3       0031   74    1283 1282  807  805
K4       0033   75    1291 1290  803  801
K5       0035   76    1304 1303  799  797
KEYR     033C  954     933  904  353
LNKTST   03C2 1089
M6800    0000   23     151  143
M6800R   0023  142    1446 1444 1442 1153 1151 1149 1147 1144 1142 1113 1111 1092 1089  931  90
                  864  862  806  804  802  800  798  796  794  792  790  788  726  718  716  70
                  524  522  420  351  349  348  338  337  332  328  326  324  322  319  317  31
                  245  224  222  220  216  214  142  112
M6800W   002A  149    1146 1096 1090  947  945  943  941  939  937  880  787  694  503  487  40
                  229  227  149  140
M68R2    0028  147     147
M68W2    002F  154     154
MAGC     0433 1206    1191
MAGC0    0447 1226    1223
MAGC1    0448 1227    1220
MAGC2    044C 1231    1210
MAGC3    044D 1232    1208
MAGC4    043E 1217    1214
MCNT     0008   47     722  721  272  271  249  248
MDBITS   0430 1203    1189
MFGAIN   0456 1241    1192
MGBIT1   042D 1200    1197
MGBITS   0426 1193
MHDR     024C  708     138
MHDR1    0292  779     781
META-ASSEMBLER  V00R1  3/04/75                    04/13/78  16:52:47    PAGE  31

LABEL    VALUE DEF     REFERENCES
MID      051D 1442     743
```

```
MID1     0524 1449      1473
MID2     052C 1457      1470
MID3     0530 1461      1458
MID4     0532 1463      1471
MID5     0533 1464      1462 1460
MID5A    0534 1465      1467
MID6     053B 1472      1469
MODE     0011   54      1187  811
MONDTSW  0003   44       107
MONINTSW 0002   43       110
MONSW    000A   48       407  297  293   98
MONT1    03E0 1119      1138 1136
MONTST   03D8 1111      1082
MONWRT   0054  191      1465  742  740  738  736  286  276
MPY      0006    0      1068 1065 1059 1048  985
MPY      0515 1434      1306 1293 1285 1263 1255
MPY1     051B 1440      1435
MPY2     0519 1438      1441
MTOD     0088  244       130
MTOD0    00A1  271
MTOD1    00A3  273
MTOD1A   00A5  275       283  281
MTOD2    00AA  280       278
MTOD3A   008B  248       409
MTOD4    0097  260       270  268
MTOD5    009D  267       265
MTOD6    00AF  285       290  288  252
MTOD9    0132  420       310  247
MTOD9B   0157  457       447  432
MTOD9C   0156  456       454  448  435
MTOD9T   0144  438       428
MTOD9U   0155  455       437
MTOM1    00F2  355       366
MTOM1A   00E9  346       344  341
MTOM2    00F9  362       360
MTOT     00B6  292       128
MTOT0    00BA  293       294
MTOT1    0113  388       403  401
MTOT1C   0406 1160       261
MTOT2    011E  400       398
MTOT3    0123  405       419
MTOT6    0128  410       418  416  385
MTOTD    00B8  295       132
MTOTH1   0101  370       380
MTST     0454 1239      1186
MULT     0352  976       765  755  460
MULT16   0395 1044      1436
MULT16A  0399 1048      1053
MULT16B  03A4 1059      1064
MV02     04DE 1379      1296 1286 1256
MV21     04E2 1383      1307 1294 1280 1264
NCMPLTN  023D  693      1139 1110 1097  929  861  855  817  691  291  284
NEGCMD   03B6 1077       115
NGAIN    0012   55      1239  747
META-ASSEMBLER  V00R1   3/04/75                    04/13/78  16:52:50     PAGE  32

LABEL    VALUE DEF       REFERENCES
NOISESW  0017   59      1184  457  345  340
NORM     0500 1413      1438 1367 1183
NORM1    0511 1430      1416
NORM2    050A 1423      1431 1427 1417
NORM3    0505 1418      1422
NORM9    050F 1428      1424 1419
OA       0004    0       994  954  918  723  710  355
OB       0003    0      1344 1178 1068 1065 1059 1048  991  990  985
OQ       0002    0      1179  721  631
PNLTST   03C5 1092      1087
PRTY     017B  494       121
PTST     0452 1237      1185
Q        0000    0      1217 1179 1040 1039  720  631
QGAIN    0018   60      1235 1225 1224 1216 1215  474
R0       0000    0      1463 1461 1459 1447 1445 1443 1437 1432 1426 1421 1408 1404 1403 1397 139
                   1342 1313 1309 1300 1297 1287 1275 1257 1248 1204 1201 1198 1194 1193 1175 116
```

```
                       1166 1164 1162 1145 1143 1126 1124 1114 1112 1103 1098 1095 1093 1041 1041 103
                       1021 1018 1017 1011 1008 1007 1006  994  976  973  971  969  965  963  961  94
                        940  936  932  917  916  914  911  909  902  879  849  828  807  805  803  80
                        795  793  791  789  786  785  782  779  774  771  764  761  754  751  741  73
                        734  733  732  731  727  723  722  717  710  700  699  698  697  693  685  67
                        666  656  656  615  609  607  607  605  597  592  586  572  569  565  563  56
                        543  529  527  525  523  502  486  483  474  473  472  471  470  458  451  44
                        410  405  395  342  334  309  304  302  285  246  225  223  221  217  215  21
                        188  183  175  166  150  146  139  113
R1        0001     0        1457 1455 1454 1453 1452 1449 1434 1434 1425 1423 1420 1418 1415 1415 140
                       1380 1376 1373 1364 1364 1361 1358 1355 1349 1347 1346 1346 1344 1344 1342 133
                       1331 1327 1325 1323 1323 1319 1317 1317 1310 1301 1298 1288 1276 1258 1249 120
                       1181 1178 1178 1174 1172 1170 1170 1164 1103 1099 1075 1057 1036 1035 1034 103
                       1019 1019 1013 1004  999  993  990  990  988  985  984  983  982  981  980  97
                        965  940  916  780  777  760  750  735  725  720  720  717  706  705  704  70
                        679  666  661  659  659  629  625  597  572  570  566  555  459  457  456  45
R10       000A     0        1075 1073 1068 1067 1062 1061 1056 1051 1050 1044  600  531  530  527  36
R11       000B     0        1074 1071 1071 1070 1065 1059 1054 1054 1048 1045  918  907  905  643  63
                        540  538  536  536  533  533  529  495  488  363  355  232  232  225
R12       000C     0        1137 1116 1112  832  826  652  585  581  574  569  523  496  489  417  40
                        306  302  289  282  271  269  248  241  219  215
R13       000D     0        1135 1114  958  951  925  873  857  852  848  846  834  830  827  822  68
                        583  583  582  578  570  525  497  490  415  400  382  379  367  365  287  28
                        249  239  217
R14       000E     0        1157 1143 1134 1119 1117 1108 1101  950  934  919  906  897  889  877  87
                        823  673  664  649  620  620  600  551  544  498  491  480  439  421  399  38
                        356  354  311  299  279  273  266  253  238  221  174  172  170  168  162  16
R15       000F     0        1155 1145 1132 1120 1118 1106 1106 1104 1102  948  935  920  918  912  90
                        878  870  859  845  836  824  687  674  665  647  622  601  595  594  591  55
                        545  499  492  481  449  443  440  436  422  397  387  378  369  363  357  35
                        336  336  331  330  321  312  300  277  274  264  254  236  223  176  163
R2        0002     0        1468 1456 1440 1430 1430 1428 1414 1409 1406 1401 1381 1371 1362 1360 135
                       1302 1299 1289 1277 1259 1250 1201 1200 1198 1195 1182 1176 1176 1166 1104 110
                       1069 1046 1037 1032 1027 1023 1016 1012 1005  998  991  991  985  984  983  98
                        979  978  977  971  963  944  914  756  737  723  702  467  466  466  464  20
R3        0003     0        1466 1464 1437 1408 1404 1397 1396 1391 1383 1339 1335 1329 1321 1313 130
                       1278 1272 1266 1262 1254 1245  986  973  961  946  911  766  757  739  734  71
                        668  610  610  592  586  567  567  557  468  462  462  211  210
R4        0004     0        1472 1448 1395 1389 1389 1384 1376 1373 1358 1355 1303 1290 1282 1273 126
META-ASSEMBLER  V00R1   3/04/75                         04/13/78  16:52:57       PAGE  33

LABEL     VALUE DEF       REFERENCES
                       1246 1233 1231 1229 1225 1224 1216 1215 1209 1209 1206 1068 1062 1051 1004 100
                        900  741  715  714  713
R5        0005     0        1450 1449 1443 1411 1399 1394 1385 1371 1353 1304 1291 1283 1274 1268 126
                       1234 1232 1230 1207 1065 1059 1048 1014 1011 1002  996  996  994  917  909  73
                        727
R6        0006     0        1451 1450 1445 1383 1379 1269 1228 1227 1226 1219  692  690  690  628  61
                        475  438  429  397  277  264  263
R7        0007     0        1451 1447 1384 1380 1270  670  614  612  512
R8        0008     0        1385 1381 1271  957  955  954  934  932  924  919  902  361  356  334
R9        0009     0        1423 1418 1413 1174 1173 1063 1058 1052 1047  956  955  954  935  922  92
                        359  357
RCV       02E3   862         874  860  825
RCV1      02EE   873         871
RFLAG     000A    98         603  541  510  506
RFTOM     0186   508         124
RHD1      02C3   829         833  831
RHD2      02D4   846
RHD3      02CB   837         847
RHD4      02D8   850         853
RMPG1     03D0  1103        1109 1107
RMPGEN    03CB  1098        1078
RND1      032A   936         952
RND2      0339   951         949
RNRML     0325   930         127
SELFTEST  053E  1475        1079
SIGG1     03FA  1147        1158 1156
SIGGEN    03F5  1141        1081
SLB       0007     0         955  954
SND0      0308   901         928
SND1      030D   906         926
SND2      0320   925         923
```

```
SND3     0322  927      903
SNRML    0307  899      125
SRB      0005    0      1065 1059 1048
SRBQ     0004    0      1068  985  710
STRB     0004    0      1130 1123 1122  819  818  520  517  208  204  200  195  189  182  177  16
                   145
SUBT     04D5 1370      1279 1251
SUBT1    04DB 1376      1372
TAPDTSW  0001   42       106
TAPE     0003   25       186  180
TAPINTSW 0000   41       109
TBDIFF   0013   56       692  502
TBDIFFR  0181  501       122
TGAIN    0038   78      1312 1244
THDR     02BC  821       134
TIDC     0039   79       452  430  383  250
TMP      001C   64      1038  988
TPREAD   0048  179       887  885  883  881  179
TPWRT    004E  185       854  851  850  844  842  840  838  829  414  413  412  411  404  396  39
                   377   375  373  371  185
TRHDR    02DE  856       135
TRIP     0015   58      1234 1233 1207 1206  468  467  458  442  424
TRIP2    0037   77      1228 1219  469
TSLOPE   000E   51       766  459
META-ASSEMBLER  V00R1    3/04/75                    04/13/78  16:53:01     PAGE  34

LABEL    VALUE DEF       REFERENCES
TTIME    000C   50       757  756  465  461
TTOM     02F1  876       137
TTOM1    02F5  881       898  896  894
TTOM2    0303  895       891
UPSW     0014   57       641  636  514
V1       001E   66      1250 1249 1248 1247 1246 1245  255
V2       0021   67      1259 1258 1257  256   68
V3       0021   68      1277 1276 1275 1268 1267 1266
V4       0024   69      1274 1273 1272 1271 1270 1269  257
V5       0027   70      1302 1301 1300 1289 1288 1287  258
V6       002A   71      1311 1310 1309 1299 1298 1297  259
VMA      0008    0      1130 1129 1123 1122 1121  819  818  520  519  517  516  208  207  204  20
                   195   194  189  187  182  181  177  176  165  164  163  153  152  145  144
VMASTRB  02B9  818      1094  813  809  784  776  768  759  749  745
W        0001    0      1224 1217 1215
W        0002    0      1130 1129  520  519  517  516  195  194  189  187  177  176  153  152
W        0004    0       721
WORDIN   0342  960       938  358
WORDOUT  034A  968       921  646  364
XGAIN    0019   61      1237  816
XMT1     0076  226       500  493  242  240
XMT2     0083  239       237
XMT3     0080  236       233
Z        0001    0      1423 1418 1404 1397 1391 1029  721  659  656  111
L..TRG(A0011.02.001AA  CRS CONTROL STORAGE AREA)        08/04/78  11:43:18  PAGE   1

 0000 A              2           ASEC
                     3 *
                     4           DEF     LCSSAP,LCSSAR,LCSSBP,LCSSBR,LCSDPT
                     5 *
                     6 *
                     7 *      LINE CONTROL STORAGE INDEXES
                     8 *
 0000 A              9 LCSSAP    EQU     0            SHOOTER A PARAMTERSR
 0026 A             10 LCSSAR    EQU     38           SHOOTER A RECORDING PATTERN
 0040 A             11 LCSSBP    EQU     64           SHOOTER B PARAMETERS
 0066 A             12 LCSSBR    EQU     102          SHOOTER B RECORDING PATTERN
 0080 A             13 LCSDPT    EQU     128          DEPLOYMENT TABLE OFFSET
                    14 *
                    15           DEF     DPTITB,DPTID1,DPTID2,DPTDT1,DPTDT2,DPTLPT,DPTBTF,DPTEND
                    16 *
                    17 *
                    18 *      DEPLOYMENT TABLE OFFSETS
                    19 *
 0000 A             20 DPTITB    EQU     0            PNTR TO DEPLOYMENT TABLE MAP
```

```
0002 A    DPTID1   EQU  2            DEPLOYMENT INDEX 1
0004 A    DPTID2   EQU  4            DEPLOYMENT INDEX 2
0006 A    DPTDT1   EQU  6            DEPLOYMENT TABLE 1
00CE A    DPTDT2   EQU  206          DEPLOYMENT TABLE 2
0196 A    DPTLPT   EQU  406          DEPLOYMENT LITE PATTERN
01B0 A    DPTBTF   EQU  432          BAD TEST FLASH PATTERN
01C9 A    DPTEND   EQU  DPTBTF+25
          *
                   DEF  DTBSKP,DTBNTE
          *
          *
          *     DEPLOYMENT TABLE FLAGS
          *
0080 A    DTBSKP   EQU  $80          SKIP STATION
0040 A    DTBNTE   EQU  $40          NORMAL TEST ERROR
          *
                   DEF  LCASPT,LCANRS,LCARSR,LCABBR,LCATRS
                   DEF  LCASP1,LCASP2,LCASP3,LCASP4,LCASP5
                   DEF  LCAST1,LCAST2,LCAST3,LCAST4
                   DEF  LCAMDE,LCAPAR,LCADTB,LCASPL,LCADPM,LCASTN,LCASBT,LCASHA
          *
          *
          *     CURRENT LINE CONTROL STORAGE OFFSETS
          *
0000 A    LCASPT   EQU  0            SHOT POINT STATION
0002 A    LCANRS   EQU  2            # STATIONS NOT RECORDED EACH SIDE OF S. P.
0003 A    LCARSR   EQU  3            # RECORDING STATIONS TO 1ST RECORDING STN
0004 A    LCABBR   EQU  4            TOTAL # STATIONS TO 1ST RECORDING STATION
0005 A    LCATRS   EQU  5            TOTAL # RECORDING STATIONS
          *
          *             PARAMETER SAVE AREA FOR ADVANCE KEY RESET FUNCTION
          *
0006 A    LCASP1   EQU  6
0008 A    LCASP2   EQU  8
0009 A    LCASP3   EQU  9
000A A    LCASP4   EQU  10
000B A    LCASP5   EQU  11
          *
          *             LINE STATUS FLAGS
L..TRG(A0011.02.001AA  CRS CONTROL STORAGE AREA)     08/04/78  11:43:19  PAGE  2

          *
000C A    LCAST1   EQU  12           STATUS FLAGS BYTE 1
          *
          *             BIT  7 => EXECUTIVE MODE FLAG
          *                  6 => MOMENTARY SWITCH FLAG
          *                  5 => FIRE SEQUENCE PROGRAMMED
          *                  4 => TAPE BY-PASS
          *                  3 => CAMERA BY-PASS
          *                  1 => MULTIPLE MONITOR OUTPUT REQUEST
          *                  0 => MULTIPLE NORMAL TEST PASSED
          *
000D A    LCAST2   EQU  13           STATUS FLAGS BYTE 2
          *
          *             BIT  7 => DECIMAL KEY REQUEST PENDING
          *                  6 => DECIMAL KEY REQUEST COMPLETE
          *                  5 => BLANK FIELD IN DECIMAL KEY REQUEST
          *                  4 => RETRY OR CONTINUE DECIMAL KEY REQUEST
          *                  3 => MULTIPLE NORMAL TEST -IN-PROGRD
          *                  3 => MULTIPLE NORMAL TEST-IN-PROGRESS
          *                  2 => NORMAL TEST-IN-PROGRESS
          *                  1 => BLAST TEST-IN-PROGRESS
          *                  0 => TILT SEARCH-IN-PROGRESS
          *
000E A    LCAST3   EQU  14           STATUS FLAGS BYTE 2
          *
          *             BIT  7 => UNIT STATUS DISPLAY TOGGLE
          *                  6 => BLASTER ERROR
          *                  5 => MANUAL TEST FLAG
          *                  4 => SINGLE TEST FLAG
          *                  3 => NORMAL TEST ERROR FLAG
          *                  2 => NORMAL TEST ERROR FLAG (MULTIPLE TEST)
          *                  1 => NOISE DATA RECORDING
```

```
                       *                  0 => UNUSED
                       *
000F A                 LCAST4    EQU    15           STATUS FLAGS BYTE 4
                       *
                       *             BIT 7 => TRACE IDENTIFICATION HEADER
                       *                  6 => MONITOR HEADER
                       *                  5 => RETRY OR CONTINUE INDICATOR
                       *                  4 => FIRE LOCK OUT
                       *                  3 => OVERRIDE LOCK OUT
                       *                  2 => TEST LOCK OUT
                       *                  1 => SHOT POINT ADVANCE LOCK OUT
                       *                  0 => SPREAD ADVANCE LOCK OUT
                       *
0010 A                 LCAMDE    EQU    16           LINE MODE
                       *
                       *         VALUE               MODE
                       *
                       *           0                 FREE
                       *           1                 DEPLOY
                       *           2                 PROGRAM
                       *           3                 FIRE
                       *           4                 TEST
                       *           5                 FIRE ABORT
                       *           6                 ADVANCE
                       *
0011 A                 LCAPAR    EQU    17           PARITY COUNT
LCSTRG(A0011.02.001AA  CRS CONTROL STORAGE AREA)       08/04/78  11:43:21  PAGE   3

0012 A                 LCADTB    EQU    18           TIME BREAK
0013 A                 LCASPL    EQU    19           KEYBOARD LITES
0014 A                 LCADPM    EQU    20           ADDR OF START OF DEPLOYMENT MAP
0016 A                 LCASTN    EQU    22           LAST STN # DEPLOYED FOR THIS LINE AND SHOOE
0018 A                 LCASBT    EQU    24           ROLL ALONG DISPLAY PARAMETERS
0019 A                 LCASHA    EQU    25           ROLL ALONG DISPLAY PARAMETERS
001B A                 LCACTY    EQU    27           TEST TEN YEARS
001C A                 LCACUY    EQU    28           TEST UNIT YEARS
001D A                 LCACHD    EQU    29           TEST HUNDRED DAY
001E A                 LCACTD    EQU    30           TEST TEN DAY
001F A                 LCACUD    EQU    31           TEST UNIT DAY
0020 A                 LCACTH    EQU    32           TEST TEN HOURS
0021 A                 LCACUH    EQU    33           TEST UNIT HOURS
0022 A                 LCACTM    EQU    34           TEST TEN MINUTES
0023 A                 LCACUM    EQU    35           TEST UNIT MINUTES
                       *
0024 A                 LCAFLG    EQU    36           SHOOTER CONTROL FLAGS
0025 A                 LCASPR    EQU    37
                       *
                       *
00D2 A                           ORG    210
                       *
                                 DEF    RTUFLA,RTUADR,CHNADR,STNADR
                                 DEF    STNAD2
                       *
00D2 A 00              RTUFLA    FCB    0            RTU ADDRESS OVERFLOW
00D3 A 00              RTUADR    FCB    0            RTU ADDRESS STORAGE
00D4 A 00              CHNADR    FCB    0            CHANNEL ADDRESS STORAGE
00D5 A 0000     A      STNADR    FDB    0            STATION NUMBER
00D6 A                 STNAD2    EQU    *-1
00DC A                           ORG    220
                       *
                                 DEF    PPRSTR,CURMSM,CURMS2,CUREKM,CUREK2,CURPKM,CURPK2
                                 DEF    CURCSP,CURLS3,CURLIN,CURIDX,ROLSTS,TMRSTS
                                 DEF    STLSW1,STLSW2,TAPST1,TAPST2,PPREND
                                 DEF    MONSTS
                       *
                       *
                       *     PROCESSING PARAMETERS FOR CURRENT LINE
                       *
00DC A                 PPRSTR    EQU    *
00DC A 0000     A      CURMSM    FDB    0            MOMENTARY SWITCH VALID KEY MASK
00DE A 0000     A      CURMS2    FDB    0            MOMENTARY VALID KEY MASK 2
00E0 A 0000     A      CUREKM    FDB    0            EXECUTIVE VALID KEY MASK
00E2 A 0000     A      CUREK2    FDB    0            EXEC VALID KEY MASK 2
```

```
00E4 A 0000    A   CURPKM   FDB   0        PROCESSING VALID KEY MASK
00E6 A 0000    A   CURPK2   FDB   0        PROCESSING VALID KEY MASK 2
00E8 A 0000    A   CURCSP   FDB   0        POINTER TO CONTROL STARAGE AREA
00EA A 0000    A   CURLSS   FDB   0        PNTR TO SELECTED STORAGE AREA
00EC A 00          CURLIN   FCB   0        CURRENT EXECUTING LINE NUMBER
00ED A 0000    A   CURIDX   FDB   0        CURRENT PROGRAM INDEXES
00EF A 00          ROLSTS   FCB   0        ROLL-ALONG DISPLAY STATUS WORD
00F0 A 00          TMPSTS   FCB   0        TIMER STATUS WORD
                   *
                   *        SATELLITE STATUS WORDS
                   *
00F1 A 00          STLSW1   FCB   0        SATELLITE COMPUTER STATUS WORD 1
00F2 A 00          STLSW2   FCB   0        SATELLITE COMPUTER STATUS WORD 2
LCSTRG(A0011.02.001AA  CRS CONTROL STORAGE AREA)     08/04/78  11:43:22  PAGE   4

                   *
                   *        MAG TAPE UNIT STATUS WORDS
00F3 A 00          TAPST1   FCB   0        MAGNETIC TAPE UNIT STATUS WORD1
00F4 A 00          TAPST2   FCB   0        MAGNETIC TAPE UNIT STATUS WORD 2
                   *
                   *        DATA MONITOR STATUS WORD
                   *
00F5 A 00          MONSTS   FCB   0
                   *
00F6 A             PPREND   EQU   *
                   *
                            DEF   TMRBSY,TMRRCP
                   *
                   *
                   *        TIMER STATUS WORD EQUATES
                   *
0080 A             TMRBSY   EQU   $80      TIMER BUSY
0040 A             TMRRCP   EQU   $40      REQUEST COMPLETE
                   *
                            DEF   TW1TRB,TW1TRC,TW1DER,TW1STO,TW1STR,TW1WRT,TW1CMD,TW1STS
                   *
                   *
                   *        MAG TAPE UNIT STATUS WORD 1 EQUATES
                   *
0080 A             TW1TRB   EQU   $80      TAPE REQUEST BUSY
0040 A             TW1TRC   EQU   $40      TAPE REQUEST COMPLETE
0020 A             TW1DER   EQU   $20      DEVICE ERROR
0010 A             TW1STO   EQU   $10      SOFTWARE TIMEOUT
0008 A             TW1STR   EQU   8        SATELLITE REQUEST
0004 A             TW1WRT   EQU   4        WRITE REQUEST
0002 A             TW1CMD   EQU   2        COMMAND REQUEST
0001 A             TW1STS   EQU   1        STATUS REQUEST
                   *
                            DEF   TW2INT,TW2BSY,TW2DUV,TW2DTE,TW2EOT,TW2BOT,TW2EOF
                   *
                   *
                   *        MAG TAPE UNIT STATUS WORD 2 EQUATES
                   *
0080 A             TW2INT   EQU   $80      TAPE INTERRUPT
0040 A             TW2BSY   EQU   $40      DEVICE BUSY
0020 A             TW2DUV   EQU   $20      DEVICE UNAVAILABLE
0010 A             TW2DTE   EQU   $10      DATA ERROR
0004 A             TW2EOT   EQU   4        END-OF-TAPE
0002 A             TW2BOT   EQU   2        LOAD POINT
0001 A             TW2EOF   EQU   1        FILE MARK DETECTED
                   *
                            DEF   SW1SRB,SW1SRC,SW1DTO,SW1STO,SW1MRQ,SW1TRQ,SW1URD,SW1WRS
                   *
                   *
                   *        STATUS WORD 2 EQUATE EXPLANATIONS
                   *
                   *        TW2BSY => FORMATTER BUSY, TAPE UNIT BUSY, REWINDING
                   *        TW2DUV => OFF LINE, STANDBY POWER
                   *        TW2DTE => BAD DATA BLOCK BLOCK, FILE WRITE PROTECTED
                   *
                   *        SATELLITE STATUS WORD 1 EQUATES
                   *
0080 A             SW1SRB   EQU   $80      SATELLITE REQUEST BUSY
```

```
LLSTRG(A0011.02.001AA  CRS CONTROL STORAGE AREA)       08/04/78  11:43:24  PAGE   5

0040 A         SW1SRC    EQU    $40         SATELLITE REQUEST COMPLETE
0020 A         SW1DTO    EQU    $20         DEVICE TIMEOUT (SET IF TAPE UNIT ERROR)
0010 A         SW1STO    EQU    $10         SOFTWARE TIMEOUT
0008 A         SW1MRQ    EQU    8           MONITOR REQUEST
0004 A         SW1TRQ    EQU    4           TAPE REQUEST
0002 A         SW1URD    EQU    2           UNFORMATTED READ (1ST BYTE = RCVR CNT)
0001 A         SW1WRS    EQU    1           W/R SEQUENCE
               *
                         DEF    SW2SSC,SW2TSC,SW2WRM,SW2INT,SW2XRC,SW2BTR
               *
               *
               *      SATELLITE STATUS WORD 2 EQUATES
               *
0080 A         SW2SSC    EQU    $80         SATELLITE SEQ COMPLETE
0040 A         SW2TSC    EQU    $40         TAPE SEQ COMPLETE
0010 A         SW2WRM    EQU    $10         W/R MODE (0=> WRITE; 1=> READ)
0008 A         SW2INT    EQU    8           SATELLITE INTERRUPT
0004 A         SW2XRC    EQU    4           XMT/RCV COMPLETE
0002 A         SW2BTR    EQU    2           BAD TAPE REQUEST
               *
                         DEF    ROLLMP,ROLDSP
               *
               *
               *      ROLL-ALONG DISPLAY STATUS WORD EQUATES
               *
0080 A         ROLLMP    EQU    $80         LAMP TEST INDICATOR
0040 A         ROLDSP    EQU    $40         DISPLAY DEPLOYMENT INDICATOR
               *
               *
                         DEF    LSTEMF,LSTMSF,LSTPRG,LSTTBP,LSTCBP,LSTEOT,LSTMMO,LSTMTP
               *
               *
               *      LINE STATUS FLAG EQUATES (BYTE 1)
               *
0080 A         LSTEMF    EQU    $80         EXECUTIVE MODE
0040 A         LSTMSF    EQU    $40         MOMENTARY SWITCH FLAG
0020 A         LSTPRG    EQU    $20         FIRE SEQUENCE PROGRAMMED
0010 A         LSTTBP    EQU    $10         TAPE BY-PASS
0008 A         LSTCBP    EQU    8           CAMERA BY-PASS
0004 A         LSTEOT  , EQU    4           END-OF-TAPE
0002 A         LSTMMO    EQU    2           MULTIPLE MONITOR OUTPUT REQUEST
0001 A         LSTMTP    EQU    1           MULTIPLE NORMAL TEST PASSED
               *
                         DEF    LS2DKR,LS2RCP,LS2BFD,LS2RCR,LS2TIP,LS2NTP,LS2BTP,LS2TSP
               *
               *
               *      LINE STATUS FLAG EQUATES (BYTE 2)
               *
0080 A         LS2DKR    EQU    $80         DECIMAL KEY REQUEST PENDING
0040 A         LS2RCP    EQU    $40         DECIMAL KEY REQUEST COMPLETE
0020 A         LS2BFD    EQU    $20         BLANK FIELD IN DECIMAL REQUEST
0010 A         LS2RCR    EQU    $10         RETRY OR CONTINUE DECIMAL KEY REQUEST
0008 A         LS2TIP    EQU    8           MULTIPLE NORMAL TEST-IN-PROGRESS
0004 A         LS2NTP    EQU    4           NORMAL TEST-IN-PROGRESS
0002 A         LS2BTP    EQU    2           BLAST TEST-IN-PROGRESS
0001 A         LS2TSP    EQU    1           TILT SEARCH-IN-PROGRESS
               *
                         DEF    LS3BVT,LS3BLE,LS3MTT,LS3STF,LS3NEF,LS3MNE,LS3NDR
LLSTRG(A0011.02.001AA  CRS CONTROL STORAGE AREA)       08/04/78  11:43:25  PAGE   6

                         DEF    LS3TFP
               *
               *
               *      LINE STATUS FLAG EQUATES (BYTE 3)
               *
0080 A         LS3BVT    EQU    $80         UNIT STATUS DISPLAY TOGGLE
0040 A         LS3BLE    EQU    $40         BLASTER ERROR
0020 A         LS3MTT    EQU    $20         MANUAL TEST FLAG
0010 A         LS3STF    EQU    $10         SINGLE TEST FLAG
0008 A         LS3NEF    EQU    8           NORMAL TEST ERROR FLAG
0004 A         LS3MNE    EQU    4           NORMAL TEST ERROR GLAG (MULTIPLE TEST)
```

```
0002 A          303 LS3NDR    EQU   2          NOISE DATA RECORDING
0001 A          304 LS3TFP    EQU   1          TAPE SEARCH FUNCTION-IN-PROGRESS
                305 *
                306           DEF   LS4TIH,LS4DMH,LS4RCE,LS4FRL,LS4OVL,LS4TSL,LS4SPL,LS4SRL
                307 *
                308 *
                309 *      LINE STATUS FLAG EQUATES (BYTE 4)
                310 *
0080 A          311 LS4TIH    EQU   $80        TRACE IDENTIFICATION HEADER
0040 A          312 LS4DMH    EQU   $40        MONITOR HEADER
0020 A          313 LS4RCE    EQU   $20        RETRY OR CONTINUE INDICATOR
0010 A          314 LS4FRL    EQU   $10        FIRE LOCK OUT
0008 A          315 LS4OVL    EQU   8          OVERRIDE LOCK OUT
0004 A          316 LS4TSL    EQU   4          TEST LOCK OUT
0002 A          317 LS4SPL    EQU   2          SHOT POINT ADVANCE LOCK OUT
0001 A          318 LS4SRL    EQU   1          SPREAD ADVANCE LOCK OUT
                319 *
                320 *
                321           DEF   MODFRE,MODPLY,MODPRG,MODFIR,MODTST,MODFRA,MODADV
                322 *
                323 *
                324 *      LINE MODE EQUATES
                325 *
0000 A          326 MODFRE    EQU   0          FREE MODE
0001 A          327 MODPLY    EQU   1          DEPLOY MODE
0002 A          328 MODPRG    EQU   2          PROGRAM MODE
0003 A          329 MODFIR    EQU   3          FIRE MODE
0004 A          330 MODTST    EQU   4          TEST MODE
0005 A          331 MODFRA    EQU   5          FIRE ABORT MODE
0006 A          332 MODADV    EQU   6          ADVANCE MODE
                333 *
                334           DEF   SCFADV
                335 *
                336 *      SHOOTER CONTROL FLAGS EQUATES
                337 *
0080 A          338 SCFADV    EQU   $80        ADVANCE MODE SELECT (BIT => 1 = S. P.
                339 *
                340           DEF   STACK
                341 *
                342 *
                343 *      PARAMETER SAVE AREA
                344 *
8FFF A          345 STACK     EQU   $8FFF      STACK PNTR
                346 *
                347 *
00F6            348           END
LOSTRG(A0011.02.001AA  CRS CONTROL STORAGE AREA)        08/04/78  11:43:27  PAGE   7

   NO ERRORS
  PSECT LENGTH --     0
  DSECT LENGTH --     0

< CMNADR    00D4 A   145   140
< CURFCSP   00E8 A   165   151
< CUREK2    00E2 A   162   150
< CUREKM    00E0 A   161   150
< CURIDX    00ED A   168   151
< CURLIN    00EC A   167   151
< CURLSS    00EA A   166   151
< CURMS2    00DE A   160   150
< CURMSM    00DC A   159   150
< CURPK2    00E6 A   164   150
< CURPKM    00E4 A   163   150
< DPTBTF    01B0 A    26    15   27
  DPTDT1    0006 A    23    15
  DPTDT2    00CE A    24    15
< DPTEND    01C9 A    27    15
< DPTID1    0002 A    21    15
< DPTID2    0004 A    22    15
< DPTITB    0000 A    20    15
< DPTLPT    0196 A    25    15
< DTBMTE    0040 A    35    29
< DTBSKP    0080 A    34    29
```

| | | | | | |
|---|---|---|---|---|---|
| < | LCABBR | 0004 | A | 48 | 37 |
| | LCACHD | 001D | A | 126 | |
| | LCACTD | 001E | A | 127 | |
| | LCACTH | 0020 | A | 129 | |
| | LCACTM | 0022 | A | 131 | |
| | LCACTY | 001B | A | 124 | |
| | LCACUD | 001F | A | 128 | |
| | LCACUH | 0021 | A | 130 | |
| | LCACUM | 0023 | A | 132 | |
| | LCACUY | 001C | A | 125 | |
| < | LCADPM | 0014 | A | 120 | 40 |
| < | LCADTB | 0012 | A | 118 | 40 |
| | LCAFLG | 0024 | A | 134 | |
| < | LCAMDE | 0010 | A | 105 | 40 |
| < | LCANRS | 0002 | A | 46 | 37 |
| < | LCAPAR | 0011 | A | 117 | 40 |
| < | LCARSR | 0003 | A | 47 | 37 |
| < | LCASBT | 0013 | A | 122 | 40 |
| < | LCASHA | 0019 | A | 123 | 40 |
| < | LCASP1 | 0006 | A | 53 | 38 |
| < | LCASP2 | 0008 | A | 54 | 38 |
| < | LCASP3 | 0009 | A | 55 | 38 |
| < | LCASP4 | 000A | A | 56 | 38 |
| < | LCASP5 | 000B | A | 57 | 38 |
| < | LCASPL | 0013 | A | 119 | 40 |
| | LCASPR | 0025 | A | 135 | |
| < | LCASPT | 0000 | A | 45 | 37 |
| < | LCAST1 | 000C | A | 61 | 39 |
| < | LCAST2 | 000D | A | 71 | 39 |
| < | LCAST3 | 000E | A | 83 | 39 |
| < | LCAST4 | 000F | A | 94 | 39 |
| < | LCASTN | 0016 | A | 121 | 40 |

LCSTPC(A0011.02.001AA CRS CONTROL STORAGE AREA) 08/04/78 11:43:27 PAGE 8

| | | | | | |
|---|---|---|---|---|---|
| < | LCATRS | 0005 | A | 49 | 37 |
| < | LCSDPT | 0080 | A | 13 | 4 |
| < | LCSSAP | 0000 | A | 9 | 4 |
| < | LCSSAR | 0026 | A | 10 | 4 |
| < | LCSSBP | 0040 | A | 11 | 4 |
| < | LCSSBR | 0066 | A | 12 | 4 |
| < | LS2BFD | 0020 | A | 284 | 277 |
| < | LS2BTP | 0002 | A | 288 | 277 |
| < | LS2DKR | 0080 | A | 282 | 277 |
| < | LS2NTP | 0004 | A | 287 | 277 |
| | LS2RCP | 0040 | A | 283 | 277 |
| < | LS2RCR | 0010 | A | 285 | 277 |
| < | LS2TIP | 0008 | A | 286 | 277 |
| < | LS2TSP | 0001 | A | 289 | 277 |
| < | LS3BLE | 0040 | A | 298 | 291 |
| < | LS3BVT | 0080 | A | 297 | 291 |
| < | LS3MNE | 0004 | A | 302 | 291 |
| < | LS3MTT | 0020 | A | 299 | 291 |
| < | LS3NDR | 0002 | A | 303 | 291 |
| < | LS3NEF | 0008 | A | 301 | 291 |
| < | LS3STF | 0010 | A | 300 | 291 |
| < | LS3TFP | 0001 | A | 304 | 292 |
| < | LS4DMH | 0040 | A | 312 | 306 |
| < | LS4FRL | 0010 | A | 314 | 306 |
| < | LS4OVL | 0008 | A | 315 | 306 |
| < | LS4RCE | 0020 | A | 313 | 306 |
| < | LS4SPL | 0002 | A | 317 | 306 |
| < | LS4SRL | 0001 | A | 318 | 306 |
| < | LS4TIH | 0080 | A | 311 | 306 |
| < | LS4TSL | 0004 | A | 316 | 306 |
| < | LSTCBP | 0008 | A | 272 | 263 |
| < | LSTEMF | 0080 | A | 268 | 263 |
| < | LSTEOT | 0004 | A | 273 | 263 |
| < | LSTMMO | 0002 | A | 274 | 263 |
| < | LSTMSF | 0040 | A | 269 | 263 |
| < | LSTMTP | 0001 | A | 275 | 263 |
| < | LSTPRG | 0020 | A | 270 | 263 |
| < | LSTTBP | 0010 | A | 271 | 263 |
| < | MODADV | 0006 | A | 332 | 321 |

```
< MODFIR   0003 A   329   321
< MODFRA   0005 A   331   321
< MODFRE   0000 A   326   321
< MODPLY   0001 A   327   321
< MODPRG   0002 A   328   321
< MODTST   0004 A   330   321
< MONSTS   00F5 A   183   153
< PPREND   00F6 A   185   152
< PPRSTR   00DC A   158   150
< ROLDSP   0040 A   260   254
< ROLLMP   0080 A   259   254
< ROLSTS   00EF A   169   151
< RTUADR   00D3 A   144   140
< RTUFLA   00D2 A   143   140
< SCFADV   0080 A   338   334
< STACK    8FFF A   345   340
< STLSW1   00F1 A   174   152
< STLSW2   00F2 A   175   152
< STNAD2   00D6 A   147   141
LCSTRG(A0011.02.001AA  CRS CONTROL STORAGE AREA)        08/04/78  11:43:28  PAGE   9

< STNADR   00D5 A   146   140
< SW1DTO   0020 A   235   222
< SW1MRQ   0008 A   237   222
  SW1SRB   0080 A   233   222
  SW1SRC   0040 A   234   222
< SW1STO   0010 A   236   222
< SW1TRQ   0004 A   238   222
< SW1URD   0002 A   239   222
< SW1WRS   0001 A   240   222
< SW2BTR   0002 A   252   242
< SW2INT   0008 A   250   242
< SW2SSC   0080 A   247   242
< SW2TSC   0040 A   248   242
< SW2WRM   0010 A   249   242
< SW2XRC   0004 A   251   242
< TAPST1   00F3 A   178   152
< TAPST2   00F4 A   179   152
< TMRBSY   0080 A   192   187
< TMRRCP   0040 A   193   187
< TMRSTS   00F0 A   170   151
< TW1CMD   0002 A   206   195
< TW1DER   0020 A   202   195
< TW1STO   0010 A   203   195
< TW1STR   0008 A   204   195
< TW1STS   0001 A   207   195
< TW1TRB   0080 A   200   195
< TW1TRC   0040 A   201   195
< TW1WRT   0004 A   205   195
< TW2BOT   0002 A   219   209
< TW2BSY   0040 A   215   209
< TW2DTE   0010 A   217   209
< TW2DUV   0020 A   216   209
< TW2EOF   0001 A   220   209
< TW2EOT   0004 A   218   209
< TW2INT   0080 A   214   209
INICRS(A0011.02.002AA  CRS INITIALIZATION ROUTINE)      08/04/78  11:53:28  PAGE   1

 0000 I              2          ISEC
                     3 *
                     4          DEF     INICRS,INIPIA
                     5          DEF     LCTBLE,LCTBEN,CLRDSP,NUMMSV
                     6          DEF     CRCBFR
                     7 *
                     8 *
                     9          REF     SLFTST
                    10          REF     CRCLST
                    11          REF     DEXRTN,RTNRTL
                    12          REF     LGINIT,LGFECT,LGWCNT
                    13          REF     MVCHAR,INX4,IDXRTN,DISPLY,LITOFF,CLRCOR
                    14          REF     TCDMRC,TCDDEN,TCDSSP,EXECTV
                    15          REF     FILPS1,TODSVC
                    16          REF     INTRTN
```

```
              REF   TMRCDV
              REF   TPBYPI
              REF   PROM.TST
              REF   RTSSPT
              REF   LITON,DLYRTN
              REF   CRS.KYBD,CRS.SCAN
              REF   SLF.INIT
         *
         *
              REF   RCMAPT,RACTLS
              REF   TMRBCA
              REF   TMRBTV
              REF   LGRAVL,LGRSWD,LGRTHD,LGRCNT,LGRWCT
              REF   LGRFRM,LGRCRB,LGRTYP,LGRBLN,LGRBFR
              REF   PTRAVL,PTRSWD,PTRQTH,PTRCTL
              REF   LRQLST,BFRSVC,LGOVTX
              REF   RQBSVA,RQBSAV
              REF   CFRMWD
              REF   CURPKM
              REF   AUXSAV
              REF   STNADR
              REF   CHRQST,MVCSTR,MVCDST,TIHTNL
              REF   NUMMSG
              REF   PPRSTR,PPREND
              REF   AUXSPL
              REF   AUXFAR,AUXDTB,ROLUHD,ROLUTU,ROLLHD,ROLLTU
              REF   TODHFN
              REF   TCPLIT,TCPDSP,TCPIDS
              REF   FILENO,FILEN1
              REF   CURLSS,CURCSP,CURIDX,CURLIN
              REF   PIAKCR,PIAKDR,PIADCR,PIADDR
              REF   STLRCR,STLRDR,STLWCR,STLWDR
              REF   DATMON,CAEIR
              REF   STACK
              REF   SCNENB
              REF   SCNERR
              REF   STSTAT
              REF   SLF.STAT
              DEF   RTUMAP,RTUMEN
         *
         *
0006 A   MAXDG   EQU   6          MAXIMUM # DIGITS FOR DISPLAY OR ENTRY
         *
1..CRS(A0011.02.002AA  CRS INITIALIZATION ROUTINE)    08/04/78  11:53:29  PAGE  2

0000 A   LCTCSP  EQU   0          PNTR TO START OF CONTROL STORAGE AREA
0002 A   LCTCDP  EQU   2          PNTR TO START OF DEPLOYMENT MAP
0004 A   LCTCAT  EQU   4          PNTR TO SHOOTER A PARAMETERS
0006 A   LCTCBP  EQU   6          PNTR TO SHOOTER B PARAMETERS
000A A   LCTCNT  EQU   10         PNTR TO START OF NEXT AREA
         *
0002 A   DPTID1  EQU   2          DEPLOYMENT INDEX 1
0004 A   DPTID2  EQU   4          DEPLOYMENT INDEX 2
0006 A   DPTDT1  EQU   6          DEPLOYMENT TABLE 1
00CE A   DPTDT2  EQU   206        DEPLOYMENT TABLE 2
01B0 A   DPTBTF  EQU   432        BAD TEST FLASH PATTERN
01C9 A   DPTEND  EQU   DPTBTF+25
         *
003F A   KCRNSW  EQU   $3F        NORMAL SWITCH (LEADING EDGE TRANSITION)
0007 A   ROLENB  EQU   7          ROLL-ALONG INTERRUPT (INTERRUPTS ENABLED)
0027 A   STLRMK  EQU   $27        SATELLITE READ MASK
0027 A   STLWMK  EQU   $27        SATELLITE WRITE MASK
0000 A   MONOFF  EQU   0          MONITOR OFF
0004 A   STLRST  EQU   4          SATELLITE RESET
         *
         *
         *       LINE CONTROL STORAGE INDEXES
         *
0000 A   LCSSAP  EQU   0          SHOOTER A PARAMTERS
0026 A   LCSSAR  EQU   38         SHOOTER A RECORDING PATTERN
0040 A   LCSSBP  EQU   64         SHOOTER B PARAMTERS
0066 A   LCSSBR  EQU   102        SHOOTER B RECORDING PATTERN
0080 A   LCSDPT  EQU   128        DEPLOYMENT TABLE OFFSET
         *
```

```
                *       CURRENT LINE CONTROL STORAGE OFFSETS
                *
0000 A          LCASPT   EQU   0          SHOT POINT STATION
0002 A          LCANRS   EQU   2          # STATIONS NOT RECORDED EACH SIDE OF S. P.
0003 A          LCARSR   EQU   3          # RECORDING STATIONS TO 1ST RECORDING STN
0004 A          LCABBR   EQU   4          TOTAL # STATIONS TO 1ST RECORDING STATION
0005 A          LCATRS   EQU   5          TOTAL # RECORDING STATIONS
                *
                *          PARAMETER SAVE AREA FOR ADVANCE KEY RESET FUNCTION
                *
0006 A          LCASP1   EQU   6
0008 A          LCASP2   EQU   8
0009 A          LCASP3   EQU   9
000A A          LCASP4   EQU   10
000B A          LCASP5   EQU   11
                *
                *          LINE STATUS FLAGS
                *
000C A          LCAST1   EQU   12         STATUS FLAGS
000D A          LCAST2   EQU   13         STATUS FLAGS BYTE 2
000E A          LCAST3   EQU   14
000F A          LCAST4   EQU   15         STATUS FLAGS BYTE 4
0010 A          LCAMDE   EQU   16         LINE MODE
                *
                *        VALUE            MODE
                *
                *          0              FREE
                *          1              DEPLOY
                *          2              PROGRAM
I...RS(A0011.02.002AA  CRS INITIALIZATION ROUTINE)     08/04/78  11:53:30  PAGE   3

                *          3              FIRE
                *          4              TEST
                *          5              FIRE ABORT
                *          6              ADVANCE
                *
0011 A          LCAPAR   EQU   17         PARITY COUNT
0012 A          LCADTB   EQU   18         TIME BREAK
0013 A          LCASPL   EQU   19         KEYBOARD LITES
0014 A          LCADPM   EQU   20         ADDR OF START OF DEPLOYMENT MAP
0016 A          LCASTN   EQU   22         LAST STN # DEPLOYED FOR THIS LINE AND SHOVE
0018 A          LCASBT   EQU   24         ROLL ALONG DISPLAY PARAMETERS
0019 A          LCASHA   EQU   25         ROLL ALONG DISPLAY PARAMETERS
                *
                *       LINE MODE EQUATES
                *
0000 A          MODFRE   EQU   0          FREE MODE
0001 A          MODPLY   EQU   1          DEPLOY MODE
0002 A          MODPRG   EQU   2          PROGRAM MODE
0003 A          MODFIR   EQU   3          FIRE MODE
0004 A          MODTST   EQU   4          TEST MODE
0005 A          MODFRA   EQU   5          FIRE ABORT MODE
0006 A          MODADV   EQU   6          ADVANCE MODE
                *
                *       SCOPE DISPLAY SELECT
                *
0002 A          SCPRFS   EQU   2          SELECT RF SPECTRUM FOR SCOPE DISPAY
                *
                *
                *
FFE8 A          IRQVEC   EQU   $FFE8      EXBUG - MNEBUG SECONDARY IRQ VECTOR
FFEB A          SWIVEC   EQU   $FFEB      EXBUG - MNEBUG SECONDARY SWI VECTOR
                *
                *
                *
                *       LOG REQUEST TYPE EQUATES
                *
0080 A          LTPCMD   EQU   $80        COMMAND REQUEST
0040 A          LTPRDR   EQU   $40        READ REQUEST
0001 A          LTPUFM   EQU   1          UNFORMATTED REQUEST
                *
                *
```

```
                    159 *        LOGGING CONTROL PARAMETER EQUATES
                    160 *
001E A              161 LGRQMX    EQU    30           MAXIMUM # LOG REQUESTS
00C4 A              162 LGBFLN    EQU    196          MAXIMUM LOG MESSAGE BUFFER LENGTH
0020 A              163 LSWHLD    EQU    $20          REQUEST HOLD
                    164 *
3EFF A              165 DSCMAX    EQU    $3EFF        DATA SECTION ADDR
                    166 *
                    167 *        LOG DEVICE ACIA REGISTER EQUATES (SERIAL INTERFACE)
                    168 *
8004 A              169 ACIAC     EQU    $8004        CONTROL REGISTER
8004 A              170 ACIASS    EQU    $8004        STATUS REGISTER
8005 A              171 ACIADR    EQU    $8005        DATA REGISTER
                    172 *
00B5 A              173 ACIAIE    EQU    $B5          ENABLE XMIT & RCV INTERRUPTS
0003 A              174 ACIAMR    EQU    $3           MASTER RESET
                    175 *
INITCRS(A0011.02.002AA  CRS INITIALIZATION ROUTINE)      08/04/78  11:53:31  PAGE   4

0080 A              176 CRGRIE    EQU    $80          RECEIVER INTERRUPT ENABLE
0020 A              177 CRGXIE    EQU    $20          XMIT INTERRUPT ENABLE
                    178 *
                    179 *
7530 A              180 LGITMO    EQU    30000        LOG DEVICE INITIALIZATION REQUEST
                    181 *
                    182 *
                    183 *        CIRCULAR LIST FUNCTION CODE EQUATES
                    184 *
0000 A              185 FCABL     EQU    0            ADD TO BOTTOM OF LIST
0001 A              186 FCATL     EQU    1            ADD TO TOP-OF-LIST
0002 A              187 FCRBL     EQU    2            REMOVE FROM BOTTOM OF LIST
0003 A              188 FCRTL     EQU    3            REMOVE FROM TOP OF LIST
                    189 *
                    190 *
                    191 *        FLOPPY DISC PIA REGISTERS
                    192 *
8069 A              193 DIOREG    EQU    $8069        DATA
8068 A              194 CTLREG    EQU    $8068        CONTROLLER COMMAND & STATUS REGISTER
806A A              195 RDIREG    EQU    $806A        READ PULSE, DATA INPUT REGISTER
806B A              196 WCIREG    EQU    $806B        WRITE PULSE, COMMAND INPUT REGISTER
806E A              197 DOUTRG    EQU    $806E        DATA OUTPUT IRQ REGISTER
806F A              198 COUTRG    EQU    $806F        COMMAND OUTPUT IRQ REGISTER
                    199 *
                    200 *
0004 A              201 CRGPDR    EQU    4            SELECT PERIPHERAL DATA REGISTER
                    202 *
                    203 *        DATA DIRECTION REGISTER SETUP EQUATES
                    204 *
00FF A              205 DIODDR    EQU    $FF          ALL DATA LINES OUTPUS
0003 A              206 CTLDDR    EQU    $3           RESET,STATUS/DATA OUTPUTS; RESET COMPLETE N
                    207 *
                    208 *        CONTROL REGISTER INITIAL EQUATES
                    209 *
003F A              210 RDICRG    EQU    $3F
002F A              211 WCICRG    EQU    $2F
0005 A              212 DOTCRG    EQU    5
0005 A              213 WOTCRG    EQU    5
                    214 *
0037 A              215 RDIPCR    EQU    $37          READ PULSE CONTROL REG EQUATE
                    216 *
                    217 *        CONTROLLER COMMAND & STATUS REGISTER EQUATES
                    218 *
0001 A              219 CTLRST    EQU    1            CONTROLLER RESET
0002 A              220 CTLCMD    EQU    2            COMMAND OUTPUT MODE
0000 A              221 CTLDTA    EQU    0            DATA OUTPUT MODE
0080 A              222 CTLRCP    EQU    $80          CONTROLLER RESET COMPLETE
                    223 *
                    224 *        PRINTER PIA REGISTERS
                    225 *
8061 A              226 DOPTRG    EQU    $8061        DATA OUTPUT REGISTER (SIDE B)
8063 A              227 DOPCRG    EQU    $8063        ACKNOWLEDGE INDICATOR (CB2)
                    228 *
```

```
8060 A                229 COPTRG    EQU   $8060       COMMAND OUTPUT REGISTER (SIDE A)
8062 A                230 COPCRG    EQU   $8062       BUSY INDICATOR (CA2)
                      231 *
                      232 *      DATA OUTPUT REGISTER EQUATES
                      233 *
IN.CRS(A0011.02.002AA  CRS INITIALIZATION ROUTINE)     08/04/78  11:53:31  PAGE   5

0080 A                234 DTASTB    EQU   $80         DATA STROBE
000C A                235 DTACTL    EQU   $C          CONTROL REGISTER SETUP
00FF A                236 DTAIO     EQU   $FF         DATA DIRECTION REGISTER SETUP
                      237 *
                      238 *      COMMAND OUTPUT REGISTER EQUATES
                      239 *
0080 A                240 CMDBSY    EQU   $80         BUSY STATUS
0004 A                241 CMDFD     EQU   4           FEED
0002 A                242 CMDPRT    EQU   2           PRINT
0001 A                243 CMDRST    EQU   1           RESET
                      244 *
000C A                245 CMDCTL    EQU   $C
007F A                246 CMDIO     EQU   $7F         DATA DIRECTION REG SETUP
                      247 *
0004 A                248 CRGPDR    EQU   4           PERIPHERAL DATA REGISTER SELECT
                      249 *
                      250 *      CRS INTERRUPT VECTORS
                      251 *
0000 I 7E 000C I      252           JMP   INICRS      POWER FAIL/RESET
0003 I 7E 02BD I      253           JMP   SLFT.INI    ONLINE TEST SUBSYSTEM INITIALIZATION
0006 I 7E 0013 R      254           JMP   INTRTN      I/O INTERRUPT
0009 I 7E 0001 R      255           JMP   CRCLST      SWI INTERRUPT
                      256 *
                      257 *      CENTRAL RECORDING STATION INITIALIZATION ROUTINE
                      258 *
000C I                259 INICRS    EQU   *
000C I 01             260           NOP
000D I 0F             261           SEI               MASK INTERRUPTS
000E I 8E 005A R      262           LDS   #STACK      INITIALIZE STACK PNTR
0011 I FE 0000 R      263           LDX   SLFTST
0014 I 8C FFFF A      264           CPX   #-1
0017 I 27 1F          265           BEQ   INIC1
0019 I 7F 005D R      266           CLR   STSTAT
001C I BD 0016 R      267           JSR   PROM.TST    PERFORM PROM TEST
001F I 27 17          268           BEQ   INIC1       CONTINUE IF NO ERRORS
0021 I 4F             269 INIC2     CLR A
0022 I B7 003F R      270           STA A AUXSPL
0025 I CE 03E8 A      271           LDX   #1000
0028 I BD 0019 R      272           JSR   DLYRTN
002B I 86 FF          273           LDA A #$FF
002D I B7 003F R      274           STA A AUXSPL
0030 I CE 03E8 A      275           LDX   #1000
0033 I BD 0019 R      276           JSR   DLYRTN      FLASH KEYBOARD LITES
0036 I 20 E9          277           BRA   INIC2       TO INDICATE PROM ERROR
0038 I CE 0013 R      278 INIC1     LDX   #INTRTN     SETUP MNEBUG SECONDARY
003B I FF FFE8 A      279           STX   IRQVEC      INTERRUPT VECTOR
003E I CE 0001 R      280           LDX   #CRCLST     INITIALIZE MNEBUG SECONDARY
0041 I FF FFEB A      281           STX   SWIVEC      SWI VECTOR
0044 I 86 06          282           LDA A #MAXDG      INIT CHARACTER
0046 I B7 0038 R      283           STA A CHRQST      REQUEST PARAMETER
0049 I 86 0A          284           LDA A #MAXDG+4
004B I CE 039E I      285           LDX   #NUMMSV     NYMERIC
004E I FF 0039 R      286           STX   MVCSTR      OUTPUT AND
0051 I CE 003C R      287           LDX   #NUMMSG     INPUT MESSAGE
0054 I FF 003A R      288           STX   MVCDST      AREA
0057 I BD 0007 R      289           JSR   MVCHAR
                      290 *
005A I CE 001E R      291           LDX   #RACTLS
IN.CRS(A0011.02.002AA  CRS INITIALIZATION ROUTINE)     08/04/78  11:53:32  PAGE   6

005D I FF 001D R      292           STX   RCMAPT
                      293 *
                      294 *
                      295 *      LINE CONTROL STORAGE AREA INITIALIZATION
                      296 *
0060 I                297 INILCS    EQU   *
```

```
0060 I CE 0342 I          LDX    #LCTBLE-LCTCNTINIT
0063 I FF 19AA D          STX    INIPTR        TABLE PNTR
0066 I FE 19AA D    INIS  LDX    INIPTR        PICK UP PNTR TO NEXT ENTRY
0069 I BD 0008 R          JSR    INX4          INCR PNTR
006C I BD 0008 R          JSR    INX4          TO NEXT ENTRY
006F I 08                 INX
0070 I 08                 INX
0071 I FF 19AA D          STX    INIPTR
0074 I 8C 039C I          CPX    #LCTBEN       END--OF-TABLE
0077 I 27 58              BEQ    INI1          YES
0079 I EE 0A              LDX    LCTCNT,X      PICK UP UPPER BOUND
007B I FF 19AC D          STX    INIBND
007E I FE 19AA D          LDX    INIPTR        LOAD PNTR TO
0081 I EE 00              LDX    0,X           START OF CONTROL STORAGE AREA
0083 I 6F 00        INI2  CLR    0,X           CLEAR OUT STORAGE
0085 I 08                 INX                  AREA FOR
0086 I BC 19AC D          CPX    INIBND        CURRENT
0089 I 26 F8              BNE    INI2          LINE
008B I FE 19AA D          LDX    INIPTR
008E I EE 02              LDX    LCTCDP,X      SAVE DEPLOYMENT
0090 I FF 19AC D          STX    INIBND        MAP PNTR
0093 I FE 19AA D          LDX    INIPTR
0096 I C6 02              LDA B  #2
0098 I 5A           INI3  DEC B                BOTH A AND B PARAMETERS INITIALIZED
0099 I 2B 17              BMI    INI7        . YES, START NEXT LINE
009B I EE 04              LDX    4,X           PICK UP PNTR TO START OF PARAMETERS
009D I 86 01              LDA A  #MODPLY       SET DEPLOY
009F I A7 10              STA A  LCAMDE,X      MODE
00A1 I B6 19AC D          LDA A  INIBND        MOVE
00A4 I A7 14              STA A  LCADPM,X      PNTR TO
00A6 I B6 19AD D          LDA A  INIBND+1      DEPLOYMENT
00A9 I A7 15              STA A  LCADPM+1,X    MAP INTO TBLES
00AB I FE 19AA D          LDX    INIPTR        INCR PNTR
00AE I 08                 INX                  FOR SHOOTER
00AF I 08                 INX                  B PARAMETERS
00B0 I 20 E6              BRA    INI3          CONTINUE
00B2 I FE 19AA D    INI7  LDX    INIPTR        MOVE DEPLOYMENT MAP PNTR
00B5 I A6 08              LDA A  8,X
00B7 I E6 09              LDA B  9,X
00B9 I FE 19AC D          LDX    INIBND        PICK UP DEPLOYMENT PNTR
00BC I A7 00              STA A  0,X
00BE I E7 01              STA B  1,X
00C0 I CE 19AC D          LDX    #INIBND       INTO DEPLOYMENT TABLE
00C3 I 86 04              LDA A  #DPTID2
00C5 I BD 0009 R          JSR    IDXRTN
00C8 I 86 64              LDA A  #100
00CA I FE 19AC D          LDX    INIBND
00CD I A7 01              STA A  1,X
00CF I 20 95              BRA    INIS
                    *
                    *     PROCESSING PARAMETERS FOR CURRENT LINE INITIALIZATION
                    *
[illegible] 00011 02.002AA  CRS INITIALIZATION ROUTINE     08/04/78  11:53:33  PAGE  7

00D1 I CE 003D R    INI1  LDX    #PPRSTR
00D4 I 8C 003E R    INI4  CPX    #PPREND
00D7 I 27 05              BEQ    INI5
00D9 I 6F 00              CLR    0,X
00DB I 08                 INX
00DC I 20 F6              BRA    INI4
00DE I CE 0500 D    INI5  LDX    #LCSL1A       SET STORAGE AREA
00E1 I FF 004C R          STX    CURLSS        PNTRS TO LINE 1
00E4 I FF 004D R          STX    CURCSP        SHOOTER A PARAMETERS
00E7 I FF 004E R          STX    CURIDX        SET PROGRAM INDEX
00EA I 7C 004F R          INC    CURLIN        SET LINE = 1
00ED I CE 0003 A          LDX    #3            ENABLE DECIMAL KEY
00F0 I FF 0035 R          STX    CURPKM        AND ESCAPE KEY
00F3 I CE 0000 A          LDX    #0            INIT GROUND
00F6 I FF 0037 R          STX    STNADR        ADDRESS
00F9 I 7F 0034 R          CLR    CFRMWD        INIT COMMAND FORMATTER WORD
                    *
                    *     RTU MAP INITIALIZATION
                    *
```

```
00FC I CE 0100 D   369            LDX    #RTUMAP
00FF I 8C 0500 D   370 INI9       CPX    #RTUMEN
0102 I 27 05       371            BEQ    INI8
0104 I 6F 00       372            CLR    0,X
0106 I 08          373            INX
0107 I 20 F6       374            BRA    INI9
0109 I CE 03A8 I   375 INI8       LDX    #CLRDSP
010C I BD 000A R   376            JSR    DISPLY      CLERA DISPLAY
010F I 86 FF       377            LDA A  #$FF
0111 I BD 000B R   378            JSR    LITOFF      TURN OFF LITES AND MINUS/PLUS SIGN
0114 I 7F 0036 R   379            CLR    AUXSAV      TURN OFF MINUS SIGN
0117 I 4F          380            CLR A
0118 I B7 0040 R   381            STA A  AUXPAR      CLEAR PARITY ERROR
011B I B7 0041 R   382            STA A  AUXDTB      AND BLAST DELAY
011E I B7 0042 R   383            STA A  ROLUHD      SET
0121 I B7 0043 R   384            STA A  ROLUTU      ROLL-ALONG
0124 I B7 0044 R   385            STA A  ROLLHD      INDEX VALUES
0127 I B7 0045 R   386            STA A  ROLLTU      TO ZERO
                   387 *
                   388 *      TAPE CONTROL PANEL INITIALIZATION
012A I 7F 004A R   389            CLR    FILENO      CLEAR TAPE FILE NUMBER
012D I 7F 004B R   390            CLR    FILEN1
0130 I 7F 0047 R   391            CLR    TCPLIT      AND CONTROL PANEL LIGHTS
0133 I CE 0048 R   392            LDX    #TCPDSP
0136 I 6F 00       393 INI10      CLR    0,X         CLEAR PENDING INTERRUPT
0138 I 08          394            INX                AND ENABLE INTERRUPT
0139 I 8C 0049 R   395            CPX    #TCPIDS
013C I 26 F8       396            BNE    INI10
                   397 *
                   398 *
                   399 *      TRACE IDENTIFICATION HEADER PARAMETEF INITIALIZATION
                   400 *
013E I 86 08       401            LDA A  #8
0140 I CE 003B R   402            LDX    #TIHTNL
0143 I BD 000C R   403            JSR    CLRCOR
0146 I BD 02DA I   404            JSR    INIPIA      INITIALIZE PIAS
                   405 **
                   406 **     PRINTER INITIALIZATION
                   407 **
1 CRS(A0011.02.002AA  CRS INITIALIZATION ROUTINE)     08/04/78  11:53:34  PAGE   8

0149 I 7F 002C R   408            CLR    PTRSWD      INIT PRINTER STATUS
014C I CE 002E R   409            LDX    #PTRCTL     INIT PRINTER REQUEST
014F I FF 002D R   410            STX    PTRQTH      LIST PNTR
0152 I 7F 002B R   411            CLR    PTRAVL      ANTICIPATE PRINTER AVAILABLE
                   412 *
                   413 *      COMMAND OUTPUT REGISTER SETUP
                   414 *
0155 I CE 8062 A   415            LDX    #COPCRG     SELECT CMND OUTPUT REG
0158 I 4F          416            CLR A
0159 I A7 00       417            STA A  0,X         SELECT DATA DIRECTION REGISTER
015B I 86 7F       418            LDA A  #CMDIO      SET I/O REQUIREMENTS
015D I B7 8060 A   419            STA A  COPTRG      IN DATA DIRECTION REGISTER
0160 I 86 0C       420            LDA A  #CMDCTL
0162 I A7 00       421            STA A  0,X         SETUP CONTROL REGISTER
0164 I 7F 8060 A   422            CLR    COPTRG      REMOVE CMND STROBES
0167 I B6 8060 A   423            LDA A  COPTRG      CLEAR INTERRUPTS
                   424 *
                   425 *      DATA OUTPUT REGISTER ETUP
                   426 *
016A I CE 8063 A   427            LDX    #DOPCRG     SELECT DATA OUTPUT REGISTER
016D I 4F          428            CLR A
016E I A7 00       429            STA A  0,X         SELECT DATA DIRECTION REGISTER
0170 I 86 FF       430            LDA A  #DTAIO      SET I/O REQUIREMENTS REGISTER
0172 I B7 8061 A   431            STA A  DOPTRG      IN DATA DIRECTION REGISTER
0175 I 86 0C       432            LDA A  #DTACTL
0177 I A7 00       433            STA A  0,X         SETUP CONTROL REGISTER
0179 I B6 8061 A   434            LDA A  DOPTRG      CLEAR INTERRUPTS
                   435 *
                   436 *      RESET PRINTER, CHECK IF CONNECTED
                   437 *
017C I 86 01       438            LDA A  #CMDRST
017E I B7 8060 A   439            STA A  COPTRG      OUTPUT RESET COMMAND
```

```
0181 I CE 000A A   440          LDX    #10
0184 I 09          441 INP1     DEX
0185 I 26 FD       442          BNE    INP1        DELAT FOR RESET
0187 I 7F 8060 A   443          CLR    COPTRG      REMOVE RESET
                   444 *
018A I B6 8060 A   445          LDA A  COPTRG
018D I 2B 03       446          BMI    INP2        JUJP IF CONTROLLER RESET COMPLETE
018F I 7A 002B R   447          DEC    PTRAVL      SET PRINTER NOT AVAILABLE INDICATOR
0192 I B6 8061 A   448 INP2     LDA A  DOPTRG      CLEAR INTERRUPTS
0195 I B6 8060 A   449          LDA A  COPTRG
                   450 **
                   451 **    FLOPPY DISC DEVICE INITIALIZATION
                   452 **
0198 I 7F 0022 R   453          CLR    LGRSWD      CLEAR DISC STATUS WORD
019B I CE 002F R   454          LDX    #LPQLST
019E I FF 0023 R   455          STX    LGRTHD      SETUP PNTR TO REQUEAST QUEUE
01A1 I CE 0005 R   456          LDX    #LGFECT
01A4 I FF 0024 R   457          STX    LGRCNT
01A7 I CE 0006 R   458          LDX    #LGWCNT
01AA I FF 0025 R   459          STX    LGRWCT
                   460 *
                   461 *     SETUP DATA DIRECTION REGISTERS
                   462 *
01AD I CE 0000 A   463          LDX    #0
01B0 I FF 806A A   464          STX    RDIREG      SELECT DATA DIRECTION REGISTER
01B3 I 86 03       465          LDA A  #CTLDDR     SETUP DDR FOR CONTROLLER COMMAND REGISTER
I CRS(A0011.02.002AA  CRS INITIALIZATION ROUTINE

01B5 I A7 00       466          STA A  0,X
01B7 I 86 FF       467          LDA A  #DIODDR     SETUP DDR FOR DATA I/O REGISTER
01B9 I A7 01       468          STA A  1,X
                   469 *
                   470 *     SETUP CONTROL REGISTERS
                   471 *
01BB I CE 806A A   472          LDX    #RDIREG
01BE I 86 3F       473          LDA A  #RDICRG
01C0 I A7 00       474          STA A  0,X         SETUP CONTROL FOR READ PULSE, DATA INPUT
01C2 I 86 2F       475          LDA A  #WCICRG     SETUP CONTROL FOR
01C4 I A7 01       476          STA A  1,X         WRITE PULSE, COMMAND INPUT REGISTER
01C6 I CE 806E A   477          LDX    #DOUTRG
01C9 I 86 05       478          LDA A  #DOTCRG     SETUP CONTROL FOR
01CB I A7 00       479          STA A  0,X         DATA OUTPUT IRQ REGISTER
01CD I A7 01       480          STA A  1,X         AND COMMAND OUTPUT IRQ REGISTER
                   481 *
                   482 *     CHECK IF DISC CONNECTED
                   483 *
01CF I 86 01       484          LDA A  #CTLRST
01D1 I B7 8068 A   485          STA A  CTLREG
01D4 I 7F 8068 A   486          CLR    CTLREG      TOGGLE RESET LINE
01D7 I F6 8068 A   487          LDA B  CTLREG      RESET COMPLETE LOW ?
01DA I 2B 0A       488          BMI    IND1        NO, DISC NOT AVAILABLE
01DC I 5F          489          CLR B
01DD I B7 8068 A   490          STA A  CTLREG
01E0 I B6 8068 A   491          LDA A  CTLREG
01E3 I 2B 01       492          BMI    IND1
01E5 I 5A          493          DEC B
01E6 I F7 0021 R   494 IND1     STA B  LGRAVL      SET DISC AVAILABLE/NOT AVAILABLE INDICATOR
01E9 I FE 8068 A   495          LDX    CTLREG      CLEAR PENDING
01EC I FE 806C A   496          LDX    DOUTRG-2    INTERRUPTS
01EF I C6 01       497          LDA B  #1
                   498 *
                   499 *     FLOPPY DISC REQUEST QUEUE INITIALIZATION
                   500 *
01F1 I 86 1E       501          LDA A  #LGRQMX
01F3 I CE 002F R   502          LDX    #LRQLST
01F6 I A7 00       503          STA A  0,X         SET MAXIMUM # ALOWABLE REQUESTS
01F8 I 6F 01       504          CLR    1,X         CLEAR # REQUESTS IN QUEUE
01FA I E7 02       505          STA B  2,X         INITIALIZE CURRENT TOP AND
01FC I E7 03       506          STA B  3,X         NEXT BORTOM PNTR
                   507 *
                   508 *     PRINTER REQUEST QUEUE INITIALIZATION
                   509 *
01FE I 86 1E       510          LDA A  #LGRQMX
```

```
0200 I CE 002E R                 LDX    #PTRCTL
0203 I A7 00                     STA A  0,X       SET MAXIMUM # ALLOWABLE REQUEST
0205 I 6F 01                     CLR    1,X       CLEAR # REQUESTS IN QUEUE
0207 I E7 02                     STA B  2,X       INITIALIZE CURRENT TOP
0209 I E7 03                     STA B  3,X       AND NEXT BOTTOM PNTR
                        *
                        *      LOG REQUEST EMPTY QUEUE INITIALIZATION
                        *
020B I CE 1AA0 D                 LDX    #CRCBFR
020E I 86 1E                     LDA A  #LGRQMX
0210 I A7 00                     STA A  0,X       SETUP MAXIMUM # EMPTY REQUEST BLOCKS
0212 I 6F 01                     CLR    1,X       CLEAR # EMPTY REQ BLOCKS IN QUEUE
0214 I E7 02                     STA B  2,X       INITIALIZE CURRENT TOP &
TN CRS(A0011.02.002AA  CRS INITIALIZATION ROUTINE)     08/04/78  11:53:36  PAGE  10

0216 I E7 03                     STA B  3,X       NEXT BOTTOM PNTR
0218 I C6 1E                     LDA B  #LGRQMX   INIT EMPTY BLOCK COUNTER
021A I CE 00C9 A                 LDX    #LGBFLN+5
021D I FF 19A8 D                 STX    INIBFL
0220 I CE 3EFF A                 LDX    #DSCMAX
0223 I FF 19AE D                 STX    INIRQB
0226 I 5A               INL2     DEC B
0227 I 2B 3C                     BMI    INL1
0229 I 37                        PSH B            SAVE REQUEST BLOCK COUNT
022A I B6 19AE D                 LDA A  INIRQB
022D I F6 19AF D                 LDA B  INIRQB+1
0230 I F0 19A9 D                 SUB B  INIBFL+1
0233 I F7 19AF D                 STA B  INIRQB+1
0236 I B2 19A8 D                 SBC A  INIBFL    COMPUTE PNTR TO NEXT REQUEST
0239 I B7 19AE D                 STA A  INIRQB    BLOCK-BUFFER COMBINATION
023C I FE 19AE D                 LDX    INIRQB    PICK UP PNTR TO NEXT EMPTY REQUEST BLOCK
023F I 6F 00                     CLR    0,X       SET WRITE ASCII AND PROCEED
0241 I CB 05                     ADD B  #5
0243 I 89 00                     ADC A  #0
0245 I A7 03                     STA A  3,X       SAVE BUFFER
0247 I E7 04                     STA B  4,X       ADDR IN REQUEST BLOCK
0249 I B6 19A8 D                 LDA A  INIBFL
024C I F6 19A9 D                 LDA B  INIBFL+1
024F I C0 05                     SUB B  #5
0251 I 82 00                     SBC A  #0
0253 I A7 01                     STA A  1,X       SAVE REQUEST BUFFER
0255 I E7 02                     STA B  2,X       LENGTH
0257 I CE 1AA0 D                 LDX    #CRCBFR
025A I B6 19AE D                 LDA A  INIRQB
025D I F6 19AF D                 LDA B  INIRQB+1
0260 I 3F                        SWI              ADD REQUEST BLOCK TO EMPTY QUEUE
0261 I 01                        FCB    FCATL
0262 I 33                        PUL B
0263 I 20 C1                     BRA    INL2
                        *
                        *
0265 I                  INL1     EQU    *
0265 I 8E 005A R                 LDS    #STACK
0268 I 7F 005D R                 CLR    STSTAT    MARK ONLINE TEST SYSTEM INACTIVE
026B I 7F 005B R                 CLR    SCNENB    DISABLE TEST USUAGE OF SELF SCAN
026E I 01                        NOP
026F I 0E                        CLI              CLEAR INTERRUPT MASK
                        *
0270 I 7D 0021 R                 TST    LGRAVL    DISC CONNECTED ?
0273 I 26 00                     BNE    IND2      NO, SKIP SETUP
                        **
                        **     CODE FOR MODE, KILL, AND SAVE COMMAND WILL BE INSERTED HERE
                        **
0275 I                  IND2     EQU    *
                        *
                        *      INITIALIZATION FOR MAG TAPE UNIT
                        *
0275 I BD 000D R                 JSR    TCDMRC
0278 I BD 000E R                 JSR    TCDDEN    DEVICE ENABLE
027B I BD 000F R                 JSR    TCDSSP    SET STANDBY POWER
                        *
                        *      FILE NUMBER INITIALIZATION
                        *
```

```
...CRS/A0011.02.002AA  CRS INITIALIZATION ROUTINE)      08/04/78  11:53:38  PAGE  11

027E I CE 0046 R                LDX    #TODHFN
0281 I BD 0011 R                JSR    FILPS1
                     *
                     *        INITIALIZE SYSTEM IN TAPE BY-PASS MODE
                     *
0284 I BD 0015 R                JSR    TPBYPI
                     *
                     *      TIME-OF-DAY CLOCK INTIALIZATION
                     *
0287 I 7E 0012 R                JMP    TODSVC
                     *
                     *      PIA INITIALIZATION ROUTINE
                     *
028A I                   INIPIA EQU    *
                     *        *
                     *        *     KEYBOARD INITIALIZATION
                     *        *
028A I 86 3F                    LDA A  #KCRNSW      SET CONTROL REGISTER FOR
028C I B7 0050 R                STA A  PIAKCR       NORMAL SWITCH ENTRY
028F I B6 0051 R                LDA A  PIAKDR       READ DATA TO CLEAR INTERRUPT
                     *        *
                     *        *     ROLL-ALONG DISPLAY INITIALIZATION
                     *        *
0292 I 86 07                    LDA A  #ROLENB      SET CONTROL REGISTER
0294 I B7 0052 R                STA A  PIADCR       FOR ROLL-ALONG TIMER INTERRUPT
0297 I B6 0053 R                LDA A  PIADDR       READ DATA TO CLEAR INTERRUPT
                     *        *
                     *        *     SATELLITE INTERFACE INITIALIZATION
                     *        *
029A I 86 27                    LDA A  #STLRMK      SET CONTROL REGISTER
029C I B7 0054 R                STA A  STLRCR       ON READ SIDE
029F I B6 0055 R                LDA A  STLRDR       CLEAR INTERRUPT
02A2 I 86 23                    LDA A  #STLWMK-4    SELECT DATA
02A4 I B7 0056 R                STA A  STLWCR       REGISTER ON WRITE SIDE
02A7 I C6 FF                    LDA B  #$FF
02A9 I F7 0059 R                STA B  CAEIR        ENABLE TAPE INTERRUPT
02AC I F7 0057 R                STA B  STLWDR       SET OUTPUT MASK
02AF I 86 27                    LDA A  #STLWMK      SETUP CONTROL REGISTER
02B1 I B7 0056 R                STA A  STLWCR       FOR WRITE
02B4 I B6 0057 R                LDA A  STLWDR       CLEAR INTERRUPT
02B7 I 86 06                    LDA A  #MONOFF+STLRST+SCPRFSTURN OFF
02B9 I B7 0058 R                STA A  DATMON       DATA MONITOR
02BC I 39                       RTS
                     *
                     *       ON LINE SYSTEM TEST INITIALIZATION ROUTINE
                     *
02BD I                   SLFT.INI EQU   *
02BD I CE 0000 R                LDX    #SLFTST      TEST SYBSYSTEM INCLUDED IN CRS ?
02C0 I 26 01                    BNE    SLF1         YES - CONTINUE
02C2 I 3B                       RTI                 NO - IGNORE NMI INTERRUPT
02C3 I 01                SLF1   NOP
02C4 I 0F                       SEI                 MASK IRQ
02C5 I 8E 005A R                LDS    #STACK       RESET STACK PNTR
02C8 I CE 0013 R                LDX    #INTRTN      SETUP MNEBUG SECONDARY
02CB I FF FFE8 A                STX    IRQVEC       INTERRUPT VECTOR
02CE I CE 003D R                LDX    #PPRSTR
02D1 I 8C 003E R         SLF3   CPX    #PPREND      CLEAR DEVICE
02D4 I 27 05                    BEQ    SLF2         STATUS WORDS
TI CRS/A0011.02.002AA  CRS INITIALIZATION ROUTINE)      08/04/78  11:53:39  PAGE  12

02D6 I 6F 00                    CLR    0,X
02D8 I 08                       INX
02D9 I 20 F6                    BRA    SLF3
02DB I 86 3F             SLF2   LDA A  #KCRNSW      ENABLE
02DD I B7 0050 R                STA A  PIAKCR       KEYBOARD
02E0 I B6 0051 R                LDA A  PIAKDR       INTERRUPTS
02E3 I 86 07                    LDA A  #ROLENB
02E5 I B7 0052 R                STA A  PIADCR       ROLL-ALONG TIMER IRQ ENABLE
02E8 I B6 0053 R                LDA A  PIADDR
02EB I CE 0048 R                LDX    #TCPDSP
02EE I 6F 00             SLF6   CLR    0,X
```

```
02F0 I 08            651            INX                   INITIALIZE TAPE
02F1 I 8C 0049 R     652            CPX    #TCPIDS        CONTROL
02F4 I 26 F8         653            BNE    SLF6
02F6 I 86 01         654            LDA A  #1
02F8 I B7 005D R     655            STA A  STSTAT         MARK ON-LINE TEST SUBSYSTEM ACTIVE
02FB I 7F 005B R     656            CLR    SCNENB         RESET SELF-SCAN SCREEN ENABLE
02FE I 7F 005E R     657            CLR    SLF.STAT       CLEAR TEST CONTROL WORD
0301 I 01            658            NOP
0302 I 0E            659            CLI
0303 I BD 001A R     660 SLF4       JSR    CRS.KYBD       INPUT KEY FROM KEYBOARD
0306 I F6 0017 R     661            LDA B  RTSSPT         SELFISCAN TEST REQUESTED ?
0309 I C1 02         662            CMP B  #2
030B I 26 F6         663            BNE    SLF4           NO - CONTINUE WITH KEYBOARD
030D I 7F 005C R     664            CLR    SCNERR
0310 I BD 001B R     665            JSR    CRS.SCAN       PERFORM SELF-SCAN TEST
0313 I 7D 005C R     666            TST    SCNERR         ERROR ?
0316 I 27 03         667            BEQ    SLF5           NO - ENABLE COMPLETE ON-LINE TEST SYS
0318 I 01            668            NOP                   YES - MASK IRQ
0319 I 0F            669            SEI
031A I 3E            670            WAI                   WAIT FOR NMI INTERRUPT
031B I 7C 005B R     671 SLF5       INC    SCNENB         ENABLE SELF-SCAN USUAGE
031E I BD 028A I     672            JSR    INIPIA         ENABLE DEVICE INTERRUPTS
0321 I 7E 001C R     673            JMP    SLF.INIT       INITIATE 1ST TEST
                     674 *
                     675 *
                     676 *
0000 D               677            DSEC
0000 D               678            RMB    256
                     679 *
                     680 *
                     681 *
                     682 *      RTUMAP ENTRY DESCRIPTION (4 BYTES PER ENTRY)
                     683 *
                     684 *      BYTE    1 => LINE # ON WHICH RTU CURRENTLY DEPLOYED
                     685 *            2-3 => STATION NUMBER OF 1ST STATION DEPLOYED FOR THIS RTU
                     686 *              4 => COMMAND COUNT
0100 D               687 RTUMAP     RMB    1024           RTU MAP TABLE
0500 D               688 RTUMEN     EQU    *
                     689 *
                     690            DEF    LCTCSP,LCTCDP,LCTCAT,LCTCBP,LCTCNT
                     691 *
                     692 *
                     693 *      LINE CONTROL STORAGE INDEX TABLE ENTRY EQUATES
                     694 *
0000 A               695 LCTCSP     EQU    0              PNTR TO START OF CONTROL STORAGE AREA
0002 A               696 LCTCDP     EQU    2              PNTR TO START OF DEPLOYMENT MAP
0004 A               697 LCTCAT     EQU    4              PNTR TO SHOOTER A PARAMETERS
CRS/A0011.02.002AA  CRS INITIALIZATION ROUTINE     08/04/78  11:53:41  PAGE  13

0006 A               698 LCTCBP     EQU    6              PNTR TO SHOOTER B PARAMETERS
000A A               699 LCTCNT     EQU    10             PNTR TO START OF NEXT AREA
                     700 *
                     701            DEF    LCSLN1,LCSL1D,LCSL1A,LCSL1B
                     702            DEF    LCSLN2,LCSL2D,LCSL2A,LCSL2B
                     703            DEF    LCSLN3,LCSL3D,LCSL3A,LCSL3B
                     704            DEF    LCSLN4,LCSL4D,LCSL4A,LCSL4B
                     705            DEF    LCSLN5,LCSL5D,LCSL5A,LCSL5B
                     706            DEF    LCSLN6,LCSL6D,LCSL6A,LCSL6B
                     707            DEF    LCSLN7,LCSL7D,LCSL7A,LCSL7B
                     708            DEF    LCSLN8,LCSL8D,LCSL8A,LCSL8B
                     709            DEF    LCSLN9
                     710 *
                     711 *      LINE CONTROL STORAGE AREA
                     712 *
024A A               713 CARLEN     EQU    LCSDPT+DPTEND+1
0500 D               714 LCSLN1     RMB    CARLEN
0550 D               715 LCSL1D     EQU    LCSLN1+LCSDPT
0500 D               716 LCSL1A     EQU    LCSLN1+LCSSAP
0540 D               717 LCSL1B     EQU    LCSLN1+LCSSBP
074A D               718 LCSLN2     RMB    CARLEN
07CA D               719 LCSL2D     EQU    LCSLN2+LCSDPT
074A D               720 LCSL2A     EQU    LCSLN2+LCSSAP
078A D               721 LCSL2B     EQU    LCSLN2+LCSSBP
```

```
0994 D              722 LCSLN3    RMB    CARLEN
0A14 D              723 LCSL3D    EQU    LCSLN3+LCSDPT
0994 D              724 LCSL3A    EQU    LCSLN3+LCSSAP
09D4 D              725 LCSL3B    EQU    LCSLN3+LCSSBP
0BDE D              726 LCSLN4    RMB    CARLEN
0C5E D              727 LCSL4D    EQU    LCSLN4+LCSDPT
0BDE D              728 LCSL4A    EQU    LCSLN4+LCSSAP
0C1E D              729 LCSL4B    EQU    LCSLN4+LCSSBP
0E28 D              730 LCSLN5    RMB    CARLEN
0EA8 D              731 LCSL5D    EQU    LCSLN5+LCSDPT
0E28 D              732 LCSL5A    EQU    LCSLN5+LCSSAP
0E68 D              733 LCSL5B    EQU    LCSLN5+LCSSBP
1072 D              734 LCSLN6    RMB    CARLEN
10F2 D              735 LCSL6D    EQU    LCSLN6+LCSDPT
1072 D              736 LCSL6A    EQU    LCSLN6+LCSSAP
10B2 D              737 LCSL6B    EQU    LCSLN6+LCSSBP
12BC D              738 LCSLN7    RMB    CARLEN
133C D              739 LCSL7D    EQU    LCSLN7+LCSDPT
12BC D              740 LCSL7A    EQU    LCSLN7+LCSSAP
12FC D              741 LCSL7B    EQU    LCSLN7+LCSSBP
1506 D              742 LCSLN8    RMB    CARLEN
1586 D              743 LCSL8D    EQU    LCSLN8+LCSDPT
1506 D              744 LCSL8A    EQU    LCSLN8+LCSSAP
1546 D              745 LCSL8B    EQU    LCSLN8+LCSSBP
1750 D              746 LCSLN9    EQU    LCSLN8+CARLEN
                    747 *
                    748 *
                    749 *
                    750 *
                    751           DEF    RCMSTR,RTMELN
                    752           DEF    RSTMEN
                    753 *
1750 D              754 RCMSTR    RMB    600          RECORDING MAP AREA
0006 A              755 RTMELN    EQU    6            # BYTES PER ENTRY
T..CRS(A0011.02.002AA  CRS INITIALIZATION ROUTINE)     08/04/78  11:53:42  PAGE  14

174A D              756 RSTMEN    EQU    RCMSTR-RTMELN
                    757 *
                    758 *      STORAGE REQUIREMENTS FOR 'INICRS'
                    759 *
19A8 D 0000    A    760 INIBFL    FDB    0            LOGBUFFER LENGTH AVE AREA
19AA D 0000    A    761 INIPTR    FDB    0
19AC D 0000    A    762 INIBND    FDB    0
19AE D 0000    A    763 INIRQB    FDB    0            REQUEST BLOCK ADDR SAVE AREA
19B0 D              764 BFRDLA    RMB    240          DELETE ACKNOWLEDGE BUFFER
                    765 *
1AA0 D              766 CRCBFR    EQU    *
1AA0 D 1E           767           FCB    LGRQMX       MAXIMUM # EMPTY BLOCKS
1AA1 D 00           768           FCB    0            # EMPTY BLOCKS REMAINING
1AA2 D 00           769           FCB    0            CURRENT TOP PNTR
1AA3 D 00           770           FCB    0            NEXT BOTTOM PNTR
1AA4 D              771           RMB    LGRQMX*2
                    772 *
                    773 *
0324 I              774           ISEC
                    775 *
                    776 *
                    777 *      DEPLOYMENT TABLE MAP AREA
                    778 *
0002 A              779 DPMENT    EQU    2            # ENTRIES IN MAP FOR EACH LINE
0324 I              780 DPMLN1    EQU    *
0324 I 02           781           FCB    DPMENT
0325 I 0586    D    782           FDB    LCSL1D+DPTDT1
0327 I 064E    D    783           FDB    LCSL1D+DPTDT2
0329 I 02           784 DPMLN2    FCB    DPMENT
032A I 07D0    D    785           FDB    LCSL2D+DPTDT1
032C I 0898    D    786           FDB    LCSL2D+DPTDT2
032E I 02           787 DPMLN3    FCB    DPMENT
032F I 0A1A    D    788           FDB    LCSL3D+DPTDT1
0331 I 0AE2    D    789           FDB    LCSL3D+DPTDT2
0333 I 02           790 DPMLN4    FCB    DPMENT
0334 I 0C64    D    791           FDB    LCSL4D+DPTDT1
0336 I 0D2C    D    792           FDB    LCSL4D+DPTDT2
```

```
0338 I 02              DPMLN5   FCB    DPMENT
0339 I 0EAE     D               FDB    LCSL5D+DPTDT1
033B I 0F76     D               FDB    LCSL5D+DPTDT2
033D I 02              DPMLN6   FCB    DPMENT
033E I 10F8     D               FDB    LCSL6D+DPTDT1
0340 I 1100     D               FDB    LCSL6D+DPTDT2
0342 I 02              DPMLN7   FCB    DPMENT
0343 I 1342     D               FDB    LCSL7D+DPTDT1
0345 I 140A     D               FDB    LCSL7D+DPTDT2
0347 I 02              DPMLN8   FCB    DPMENT
0348 I 158C     D               FDB    LCSL8D+DPTDT1
034A I 1654     D               FDB    LCSL8D+DPTDT2
                       *
                       *       LINE CONTROL STORAGE INDEX TABLE
                       *
034C I                 LCTBLE   EQU    *
034C I 0500     D               FDB    LCSLN1      PNTR TO CONTROL STORAGE FOR LINE 1
034E I 0580     D               FDB    LCSL1D      PNTR TO START OF DEPLOYMENT MAP
0350 I 0500     D               FDB    LCSL1A      PN TR TO SHOOTER A PARAMETERS
0352 I 0540     D               FDB    LCSL1B      SHOOTER B PARAMTERS
0354 I 0324     I               FDB    DPMLN1
: LCRS(A0011,02,002AA  CRS INITIALIZATION ROUTINE)      08/04/78  11:53:44  PAGE  15

                       *
0356 I 074A     D               FDB    LCSLN2      LINE 2 PARAMETERS
0358 I 070A     D               FDB    LCSL2D      PNTR TO START OF DEPLOYMENT MAP
035A I 074A     D               FDB    LCSL2A
035C I 078A     D               FDB    LCSL2B
035E I 0329     I               FDB    DPMLN2
                       *
0360 I 0994     D               FDB    LCSLN3      LINE 3 PARAMETERS
0362 I 0A14     D               FDB    LCSL3D      PNTR TO START OF DEPLOYMENT MAP
0364 I 0994     D               FDB    LCSL3A
0366 I 09D4     D               FDB    LCSL3B
0368 I 032E     I               FDB    DPMLN3
                       *
036A I 0BDE     D               FDB    LCSLN4      LINE 4 PARAMETERS
036C I 0C5E     D               FDB    LCSL4D      PNTR TO START OF DEPLOYMENT MAP
036E I 0BDE     D               FDB    LCSL4A
0370 I 0C1E     D               FDB    LCSL4B
0372 I 0333     I               FDB    DPMLN4
                       *
0374 I 0E28     D               FDB    LCSLN5      LINE 5 PARAMETERS
0376 I 0EA8     D               FDB    LCSL5D      PNTR TO START OF DEPLOYMENT MAP
0378 I 0E28     D               FDB    LCSL5A
037A I 0E68     D               FDB    LCSL5B
037C I 0338     I               FDB    DPMLN5
                       *
037E I 1072     D               FDB    LCSLN6      LINE 6 PARAMTERS
0380 I 10F2     D               FDB    LCSL6D      PNTR TO START OF DEPLOYMENT MAP
0382 I 1072     D               FDB    LCSL6A
0384 I 10B2     D               FDB    LCSL6B
0386 I 033D     I               FDB    DPMLN6
                       *
0388 I 12BC     D               FDB    LCSLN7      LINE 7 PARAMETERS
038A I 133C     D               FDB    LCSL7D      PNTR TO START OF DEPLOYMENT MAP
038C I 12BC     D               FDB    LCSL7A
038E I 12FC     D               FDB    LCSL7B
0390 I 0342     I               FDB    DPMLN7
                       *
0392 I 1506     D               FDB    LCSLN8      LINE 8 PARAMETERS
0394 I 1586     D               FDB    LCSL8D
0396 I 1506     D               FDB    LCSL8A
0398 I 1546     D               FDB    LCSL8B
039A I 0347     I               FDB    DPMLN8
039C I                 LCTBEN   EQU    *
039C I 1750     D               FDB    LCSLN9
                       *
                       *       'INICRS' MESSAGES
                       *
039E I 10              NUMMSV   FCB    $10,0,0
039F I 00
03A0 I 00
```

```
03A1 I 00          862          FCB    0,0,0,0,0,0
03A2 I 00
03A3 I 00
03A4 I 00
03A5 I 00
03A6 I 00
03A7 I 0F          863          FCB    $F
03A8 I 0D          864 CLRDSP   FCB    $D,$D,$D,$D,4
```

```
03A9 I 0D
03AA I 0D
03AB I 0D
03AC I 04
03AD I             865 INISVC   EQU    *
03AD I 532043      866          FCC    /S CRSLOG01.ERR/
03BB I 0D          867          FCB    $D,$A,4
03BC I 0A
03BD I 04
03BE I             868 INISCE   EQU    *
03BE I             869 INILOV   EQU    *
03BE I 455252      870          FCC    /ERROR LOG OVERFLOW/
03D0 I 0D          871          FCB    $D,4
03D1 I 04
03D2 I             872 INILOE   EQU    *
                   873 *
                   874 *      CRS LOGGING FEATURE SETUP REQUEST BLOCK
                   875 *
03D2 I             876 RQBDEL   EQU    *
03D2 I 81          877          FCB    LTPCMD+LTPUFM
03D3 I 0010    A   878          FDB    16
03D5 I 03D7    I   879          FDB    BFRDEL
03D7 I 4B2043      880 BFRDEL   FCC    ?K CRS.SYS/0 1?
03E4 I 0D          881          FCB    $D,$A,4
03E5 I 0A
03E6 I 04
03E7 I             882 RQBDLA   EQU    *
03E7 I C0          883          FCB    LTPCMD+LTPRDR
03E8 I 00F0    A   884          FDB    240
03EA I 19B0    D   885          FDB    BFRDLA
03EC               886          END
```

```
   NO ERRORS
 ISECT LENGTH --  1004
 DSECT LENGTH --  6880

  ACIAC     8004 A   169
  ACIADR    8005 A   171
  ACIAIE    00B5 A   173
  ACIAMR    0003 A   174
  ACIASS    8004 A   170
> AUXDTB    0041      42     42    382
> AUXPAR    0040      42     42    381
> AUXSAV    0036      36     36    379
> AUXSPL    003F      41     41    270    274
  BFRDEL    03D7 I   880    879
  BFRDLA    19B0 D   764    885
> BFRSVC    0030      32     32
> CAEIR     0059      49     49    617
  CARLEN    024A A   713    714    718    722    726    730    734    738    742    746
> CFRMWD    0034      34     34    365
> CHRGST    0038      38     38    283
> CLRCOR    000C      13     13    403
< CLRDSP    03A8 I   864      5    375
  CMDBSY    0080 A   240
  CMDCTL    000C A   245    420
  CMDFD     0004 A   241
  CMDIO     007F A   246    418
  CMDPRT    0002 A   242
  CMDRST    0001 A   243    438
  COPCPG    8062 A   230    415
```

```
  COPTRG    8060 A   229    419   422   423   439   443   445   449
  COUTRG    806F A   198
< CRCBFR    1AA0 D   766      6   519   551
> CRCLST    0001      10     10   255   280
  CRGPDR    0004 A   248
  CRGRIE    0080 A   176
  CRGXIE    0020 A   177
> CRS.KYBD  001A      22     22   660
> CRS.SCAN  001B      22     22   665
  CTLCMD    0002 A   220
  CTLDDR    0003 A   206    465
  CTLDTA    0000 A   221
  CTLRCP    0080 A   222
  CTLREG    8068 A   194    485   486   487   490   491   495
  CTLRST    0001 A   219    484
> CURCSP    004D      46     46   358
> CURIDX    004E      46     46   359
> CURLIN    004F      46     46   360
> CURLSS    004C      46     46   357
> CURPKM    0035      35     35   362
> DATMON    0058      49     49   623
> DEXRTN    0002      11     11
  DIODDR    00FF A   205    467
  DIOREG    8069 A   193
> DISPLY    000A      13     13   376
> DLYRTN    0019      21     21   272   276
  DOPCRG    8063 A   227    427
  DOPTRG    8061 A   226    431   434   448
1 ..CRS(A0011 02.002AA  CRS INITIALIZATION ROUTINE)     08/04/78  11:53:47  PAGE  18

  DOTCRG    0005 A   212    478
  DOUTRG    806E A   197    477   496
  DPMENT    0002 A   779    781   784   787   790   793   796   799   802
  DPMLN1    0324 I   780    813
  DPMLN2    0329 I   784    819
  DPMLN3    032E I   787    825
  DPMLN4    0333 I   790    831
  DPMLN5    0338 I   793    837
  DPMLN6    033D I   796    843
  DPMLN7    0342 I   799    849
  DPMLN8    0347 I   802    855
  DPTBTF    01B0 A    70     71
  DPTDT1    0006 A    68    782   785   788   791   794   797   800   803
  DPTDT2    00CE A    69    783   786   789   792   795   798   801   804
  DPTEND    01C9 A    71    713
  DPTID1    0002 A    66
  DPTID2    0004 A    67    341
  DSCMAX    3EFF A   165    528
  DTACTL    000C A   235    432
  DTAIO     00FF A   236    430
  DTASTB    0080 A   234
> EXECTV    0010      14     14
  FCABL     0000 A   185
  FCATL     0001 A   186    555
  FCRBL     0002 A   187
  FCRTL     0003 A   188
> FILEN1    004B      45     45   390
> FILENO    004A      45     45   389
> FILPS1    0011      15     15   583
> IDXRTN    0009      13     13   342
  IND1      01E6 I   494    488   492
  IND2      0275 I   572    568
  INI1      00D1 I   350    307
  INI10     0136 I   393    396
  INI2      0083 I   312    315
  INI3      0098 I   321    333
  INI4      00D4 I   351    355
  INI5      00DE I   356    352
  INI7      00B2 I   334    322
  INI8      0109 I   375    371
  INI9      00FF I   370    374
  INIBFL    19A8 D   760    527   535   537   545   546
  INIBND    19AC D   762    309   314   318   326   328   337   340   344
```

```
  INIC1     0038 I   278    265    268
  INIC2     0021 I   269    277
< INICRS    000C I   259      4    252
  INILCS    0060 I   297
  INILOE    03D2 I   872
  INILOV    03BE I   869
< INIPIA    028A I   595      4    404    672
  INIPTR    19AA D   761    299    300    305    310    316    319    330    334
  INIRQB    194E D   763    529    533    534    536    538    539    552    553
  INIS      0066 I   300    346
  INISCE    03BE I   868
  INISVC    03AD I   865
  INL1      0265 I   560    531
  INL2      0226 I   530    557
  INP1      0184 I   441    442
```

```
  INP2      0192 I   448    446
< INTRTN    0013      16     16    254    278    635
< INX4      0008      13     13    301    302
  IRQVEC    FFE8 A   147    279    636
  KCRNSW    003F A    73    599    643
  LCABBR    0004 A    94
  LCADPM    0014 A   126    327    329
  LCADTB    0012 A   124
  LCAMDE    0010 A   111    325
  LCANRS    0002 A    92
  LCAPAR    0011 A   123
  LCARSR    0003 A    93
  LCASBT    0018 A   128
  LCASHA    0019 A   129
  LCASP1    0006 A    99
  LCASP2    0008 A   100
  LCASP3    0009 A   101
  LCASP4    000A A   102
  LCASP5    000B A   103
  LCASPL    0013 A   125
< LCASPT    0000 A    91
  LCAST1    000C A   107
  LCAST2    000D A   108
  LCAST3    000E A   109
  LCAST4    000F A   110
  LCASTN    0016 A   127
  LCATRS    0005 A    95
  LCSDPT    0080 A    87    713    715    719    723    727    731    735    739    743
  LCSL1A    0500 D   716    356    701    811
< LCSL1B    0540 D   717    701    812
< LCSL1D    0580 D   715    701    782    783    810
< LCSL2A    074A D   720    702    817
< LCSL2B    078A D   721    702    818
< LCSL2D    07CA D   719    702    785    786    816
< LCSL3A    0994 D   724    703    823
< LCSL3B    09D4 D   725    703    824
< LCSL3D    0A14 D   723    703    788    789    822
< LCSL4A    0BDE D   728    704    829
< LCSL4B    0C1E D   729    704    830
< LCSL4D    0C5E D   727    704    791    792    828
< LCSL5A    0E28 D   732    705    835
< LCSL5B    0E68 D   733    705    836
< LCSL5D    0EA8 D   731    705    794    795    834
< LCSL6A    1072 D   736    706    841
< LCSL6B    10B2 D   737    706    842
< LCSL6D    10F2 D   735    706    797    798    840
< LCSL7A    12BC D   740    707    847
< LCSL7B    12FC D   741    707    848
< LCSL7D    133C D   739    707    800    801    846
< LCSL8A    1506 D   744    708    853
< LCSL8B    1546 D   745    708    854
< LCSL8D    1586 D   743    708    803    804    852
< LCSLN1    0500 D   714    701    715    716    717    809
< LCSLN2    074A D   718    702    719    720    721    815
< LCSLN3    0994 D   722    703    723    724    725    821
< LCSLN4    0BDE D   726    704    727    728    729    827
```

```
< LCSLN5   0E28 D   730    705   731   732   733   833
< LCSLN6   1072 D   734    706   735   736   737   839
1. .CRS(A0011.02.002AA  CRS INITIALIZATION ROUTINE)      08/04/78  11:53:42  PAGE  20

< LCSLN7   12BC D   738    707   739   740   741   845
< LCSLN8   1506 D   742    708   743   744   745   746   851
< LCSLN9   1750 D   746    709   857
  LCSSAP   0000 A    83    716   720   724   728   732   736   740   744
  LCSSAR   0026 A    84
  LCSSBP   0040 A    85    717   721   725   729   733   737   741   745
  LCSSBR   0066 A    86
< LCTBEN   039C I   856      5   306
< LCTBLE   034C I   808      5   298
  LCTCAT   0004 A   697    690
  LCTCBP   0006 A   698    690
  LCTCDP   0002 A   696    317   690
  LCTCNT   000A A   699    298   308   690
  LCTCSP   0000 A   695    690
  LGBFLN   00C4 A   162    526
> LGFECT   0005      12     12   456
> LGINIT   0004      12     12
  LGITMO   7530 A   180
> LGOVTX   0031      32     32
> LGRAVL   0021      29     29   494   567
> LGRBFR   002A      30     30
> LGRBLN   0029      30     30
> LGRCNT   0024      29     29   457
> LGRCRB   0027      30     30
> LGRFRM   0026      30     30
  LGRQMX   001E A   161    501   510   520   525   767   771
> LGRSWD   0022      29     29   453
> LGRTHD   0023      29     29   455
> LGRTYP   0028      30     30
> LGRWCT   0025      29     29   459
> LGWCNT   0006      12     12   458
> LITOFF   000B      13     13   378
> LITON    0018      21     21
> LRQLST   002F      32     32   454   502
  LSWHLD   0020 A   163
  LTPCMD   0080 A   154    877   883
  LTPRDR   0040 A   155    883
  LTPUFM   0001 A   156    877
  MAXDG    0006 A    58    282   284
  MODADV   0006 A   139
  MODFIR   0003 A   136
  MODFRA   0005 A   138
  MODFRE   0000 A   133
  MODPLY   0001 A   134    324
  MODPRG   0002 A   135
  MODTST   0004 A   137
  MONOFF   0000 A    77    622
> MVCDST   003A      38     38   288
> MVCHAR   0007      13     13   289
> MVCSTR   0039      38     38   286
> NUMMSG   003C      39     39   287
< NUMMSV   039E I   861      5   285
> PIADCR   0052      47     47   606   647
> PIADDR   0053      47     47   607   648
> PIAKCR   0050      47     47   600   644
> PIAKDR   0051      47     47   601   645
> PPREND   003E      40     40   351   638
> PPRSTR   003D      40     40   350   637
IN..CRS(A0011.02.002AA  CRS INITIALIZATION ROUTINE)      08/04/78  11:53:48  PAGE  21

> PROM.TST 0016      19     19   267
> PTRAVL   002B      31     31   411   447
> PTRCTL   002E      31     31   409   511
  PTRQTH   002D      31     31   410
> PTRSWD   002C      31     31   408
> RACTLS   001E      26     26   291
> RCMAPT   001D      26     26   292
< RCMSTR   1750 D   754    751   756
  RDICRG   003F A   210    473
```

```
  RDIPCR    0037 A   215
  RDIREG    806A A   195    464    472
  ROLENB    0007 A    74    605    646
> ROLLHD    0044      42     42    385
> ROLLTU    0045      42     42    386
> ROLUHD    0042      42     42    383
> ROLUTU    0043      42     42    384
  RQBDEL    03D2 I   876
  RQBDLA    03E7 I   882
> RQBSAV    0033      33     33
> RQBSVA    0032      33     33
< RSTMEN    174A D   756    752
< RTMELN    0006 A   755    751    756
> RTNPTL    0003      11     11
> RTSSPT    0017      20     20    661
< RTUMAP    0100 D   687     55    369
< RTUMEN    0500 D   688     55    370
> SCNENB    005B      51     51    563    656    671
> SCNERR    005C      52     52    664    666
  SCPRFS    0002 A   143    622
> SLF.INIT  001C      23     23    673
> SLF.STAT  005E      54     54    657
  SLF1      02C3 I   632    630
  SLF2      02DB I   643    639
  SLF3      02D1 I   638    642
  SLF4      0303 I   660    663
  SLF5      031B I   671    667
  SLF6      02EE I   650    653
  SLFT.INI  02BD I   628    253
> SLFTST    0000       9      9    263    629
> STACK     005A      50     50    262    561    634
> STLRCR    0054      48     48    612
> STLRDR    0055      48     48    613
  STLRMK    0027 A    75    611
  STLRST    0004 A    78    622
> STLWCR    0056      48     48    615    620
> STLWDR    0057      48     48    618    621
  STLWMK    0027 A    76    614    619
> STNADR    0037      37     37    364
> STSTAT    005D      53     53    266    562    655
  SWIVEC    FFEB A   148    281
> TCDDEN    000E      14     14    577
> TCDMRC    000D      14     14    576
> TCDSSP    000F      14     14    578
> TCPDSP    0048      44     44    392    649
> TCPIDS    0049      44     44    395    652
> TCPLIT    0047      44     44    391
> TIHTNL    003B      38     38    402
> TMRBCA    001F      27     27
INICRS(A0011.02.002AA  CRS INITIALIZATION ROUTINE)      08/04/78  11:53:48  PAGE  22

> TMRBTV    0020      28     28
> TMRCDV    0014      17     17
> TODHFN    0046      43     43    582
> TODSVC    0012      15     15    591
> TPBYPI    0015      18     18    587
  WCICRG    002F A   211    475
  WCIREG    806B A   196
  WOTCRG    0005 A   213
EXECTV(A0011.02.003AA  CRS EXECUTIVE ROUTINE)          08/04/78  13:29:58  PAGE   1

     *
              DEF     EXECTV,EXMDKM
              DEF     FSPNPG
     *
     *
              REF     CURCSP,CURLSS,CURIDX,LINENO,CURLIN,CUREKM,CUREK2
              REF     PIAKCR
              REF     AUXPAR,AUXDTB,AUXSPL
              REF     RCTSST
              REF     MSGRQT
              REF     CFRMWD
              REF     STNADR
```

```
                      REF     RACTLS
                      REF     RCMAPT
               *
                      REF     IDXRTN,DISPLY,RSTRID,RTUCMD,ACTRTN
                      REF     SEQTST,SELIDX,CHKDEP,LITOFF
                      REF     CLRPRG,MSGOUT
                      REF     RCMSET
               *
               *
               *
0004 A         MSGTRC  EQU    4           RETRY OR CONTINUE REQUEST
               *
               *
0020 A         CFRTLT  EQU    $20         TILT MODE FLAG
               *
               *
003E A         INTMSK  EQU    $3E         LEADING EDGE TRANSITION (INTERRUPTS MASKED
003F A         INTENB  EQU    $3F         LEADING EDGE TRANSITION (INTERRUPTS EN
               *
00FF A         RTUACT  EQU    $FF         ADDR FOR ALL ACTIVE RTUS
0060 A         RTUSTS  EQU    $60         RTU STATUS TRANSFER
0000 A         STSIAV  EQU    0           INACTIVE STATE
               *
               *
               *      CURRENT LINE CONTROL STORAGE OFFSETS
               *
0000 A         LCASPT  EQU    0           SHOT POINT STATION
0002 A         LCANRS  EQU    2           # STATIONS NOT RECORDED EACH SIDE OF S. P.
0003 A         LCARSR  EQU    3           # RECORDING STATIONS TO 1ST RECORDING STN
0004 A         LCABBR  EQU    4           TOTAL # STATIONS TO 1ST RECORDING STATION
0005 A         LCATRS  EQU    5           TOTAL # RECORDING STATIONS
               *
               *          PARAMETER SAVE AREA FOR ADVANCE KEY RESET FUNCTION
               *
0006 A         LCASP1  EQU    6
0008 A         LCASP2  EQU    8
0009 A         LCASP3  EQU    9
000A A         LCASP4  EQU    10
000B A         LCASP5  EQU    11
               *
               *          LINE STATUS FLAGS
               *
000C A         LCAST1  EQU    12          STATUS FLAGS
000D A         LCAST2  EQU    13          STATUS FLAGS BYTE 2
000E A         LCAST3  EQU    14
000F A         LCAST4  EQU    15          STATUS FLAGS BYTE 4
E .CTV(A0011.02.003AA  CRS EXECUTIVE ROUTINE)      08/04/78  13:29:59  PAGE   2

0010 A         LCAMDE  EQU    16          LINE MODE
0011 A         LCAPAR  EQU    17          PARITY COUNT
0012 A         LCADTB  EQU    18          TIME BREAK
0013 A         LCASPL  EQU    19          KEYBOARD LITES
0014 A         LCADPM  EQU    20          ADDR OF START OF DEPLOYMENT MAP
0016 A         LCASTN  EQU    22          LAST STN # DEPLOYED FOR THIS LINE AND SHO
0018 A         LCASBT  EQU    24          ROLL ALONG DISPLAY PARAMETERS
0019 A         LCASHA  EQU    25          ROLL ALONG DISPLAY PARAMETERS
               *
               *      LINE STATUS FLAGS (BYTE1)
               *
0080 A         LSTEMF  EQU    $80         EXECUTIVE MODE
0040 A         LSTMSF  EQU    $40         MOMENTARY SWITCH FLAG
0020 A         LSTPRG  EQU    $20         FIRE SEQUENCE PROGRAMMED
0010 A         LSTTBP  EQU    $10         TAPE BY-PASS
0008 A         LSTCBP  EQU    8           CAMERA BY-PASS
0004 A         LSTEOT  EQU    4           END-OF-TAPE
0002 A         LSTMMO  EQU    2           MULTIPLE MONITOR OUTPUT REQU%ST
0001 A         LSTMTP  EQU    1           MULTIPLE NORMAL TEST PASSED
               *
               *      LINE STATUS FLAGS (BYTE 2)
               *
0080 A         LS2DKR  EQU    $80         DECIMAL KEY REQUEST PENDING
0040 A         LS2RCP  EQU    $40         DECIMAL KEY REQUEST COMPLETE
0020 A         LS2BFD  EQU    $20         BLANK FIELD IN DECIAL REQUEST
```

```
0010 A              85 LS2RCR    EQU    $10          RETRY OR CONTINUE DECIAML KEY ENTRY
0008 A              86 LS2TIP    EQU    8            MULTIPLE NORMAL TEST-IN-PORGRESS
0004 A              87 LS2NTP    EQU    4            NORMAL TEST-IN-PROGRESS
0004 A              88 LS2NTP    EQU    4            NORMAL TEST-IN-PROGRESS
0002 A              89 LS2BTP    EQU    2            BLAST TEST-IN-POGRESS
0001 A              90 LS2TSP    EQU    1            TILT SEARCH-IN-PROGRESS
                    91 *
                    92 *      LINE STATUS FLAG EQUATES (BYTE 3)
                    93 *
0080 A              94 LS3BVT    EQU    $80          UNIT STATUS DISPLAY TOGGLE
0040 A              95 LS3BLE    EQU    $40          BLASTER ERROR
0020 A              96 LS3MTT    EQU    $20          MANUAL TEST FLAG
0010 A              97 LS3STF    EQU    $10          SINGLE TEST FLAG
0008 A              98 LS3NEF    EQU    8            NORMAL TEST ERROR FLAG
0004 A              99 LS3MNE    EQU    4            NORMAL TEST ERROR FLAG (MULTIPLE TEST
0002 A             100 LS3NDR    EQU    2            NOISE DATA RECORDING
                   101 *
                   102 *      LINE STATUS FLAGS (BYTE 4)
                   103 *
0010 A             104 LS4FRL    EQU    $10          FIRE LOCK OUT
0008 A             105 LS4OVL    EQU    8            OVERRIDE LOCK OUT
0004 A             106 LS4TSL    EQU    4            TEST LOCK OUT
0002 A             107 LS4SPL    EQU    2            SHOT POINT ADVANCE LOCK OUT
0001 A             108 LS4SRL    EQU    1            SPREAD ADVANCE LOCK OUT
                   109 *
                   110 *      LINE MODE EQUATES
                   111 *
0000 A             112 MODFRE    EQU    0            FREE MODE
0001 A             113 MODPLY    EQU    1            DEPLOY MODE
0002 A             114 MODPRG    EQU    2            PROGRAM MODE
0003 A             115 MODFIR    EQU    3            FIRE MODE
0004 A             116 MODTST    EQU    4            TEST MODE
0005 A             117 MODFRA    EQU    5            FIRE ABORT MODE
E  .TV(A0011.02.003AA  CRS EXECUTIVE ROUTINE)          08:04 78  13:30:00  PAGE   3

0006 A             118 MODADV    EQU    6            ADVANCE MODE
                   119 *
                   120 *      AUXILIARY KEYBOARD LITE EQUATES
                   121 *
0008 A             122 AXLCBP    EQU    8            CAMERA BY-PASS
0001 A             123 AXLTBP    EQU    1            TAPE BY-PASS
0002 A             124 AXLNTS    EQU    2            NORMAL TEST-IN-PROGRESS LITE
0080 A             125 AXLADV    EQU    $80          ADVANCE LITE
0040 A             126 AXLFIR    EQU    $40          FIRE LITE
0020 A             127 AXLOVR    EQU    $20          OVERRIDE LITE
0010 A             128 AXLFTS    EQU    $10          AUTO FIRE MULT NORMAL TEST
                   129 *
0000 I             130           ISEC
                   131 *
                   132 *      CENTRAL RECORING STATION EXECUTIVE ROUTINE
                   133 *
0000 I             134 EXECTV    EQU    *
0000 I FE 0000 R   135           LDX    CURCSP
0003 I A6 0C       136 EXC6      LDA A  LCAST1,X     WAIT FOR MOMENTARY SWITCH
0005 I 85 40       137           BIT A  #LSTMSF      TO BE RELEASED
0007 I 26 FA       138           BNE    EXC6
0009 I B6 000D R   139           LDA A  CFRMWD
000C I 84 DF       140           AND A  #-1-CFRTLT   RESET TILT MODE FLAG
000E I B7 000D R   141           STA A  CFRMWD
0011 I 86 3E       142           LDA A  #INTMSK      DISABLE CONTROL
0013 I B7 0007 R   143           STA A  PIAKCR       CONSOLE INTERRUPTS
0016 I CE 0125 I   144 EXC1      LDX    #EXMDKM      SET BASE INDEX FOR EXECUTIVE MASK TABLE
0019 I FF 0000 D   145           STX    EXCSAV       SAVE INDEX
001C I FE 0000 R   146           LDX    CURCSP       LOAD PNTR TO CURRENT CONTROL STORAGE AREA
001F I A6 0C       147           LDA A  LCAST1,X     SET EXECUTIVE
0021 I 8A 30       148           ORA A  #LSTEMF      MODE
0023 I A7 0C       149           STA A  LCAST1,X     INDICATOR
0025 I A6 10       150           LDA A  LCAMDE,X     LOAD CURRENT LINE MODE
0027 I 4A          151           DEC A               MULTIPLY BY
0028 I 48          152           ASL A               # BYTES PER
0029 I 16          153           TAB
002A I 48          154           ASL A               TABLE ENTRY
002B I 1B          155           ABA
```

```
002C I CE 0000 D    156          LDX    #EXCSAV      COMPUTE INDEX INTO EXECUTIVE MASK TABLE
002F I BD 0011 R    157          JSR    IDXRTN
0032 I EE 00        158          LDX    0,X          LOAD TABLE INDEX
0034 I A6 00        159          LDA A  0,X          LOAD CONDITIONAL FLAGS INDICATOR
0036 I EE 00        160          LDX    0,X          SET EXECUTIVE MODE
0038 I FF 0005 R    161          STX    CUREKM       VALID KEY MASK
003B I FE 0000 D    162          LDX    EXCSAV
003E I EE 02        163          LDX    2,X
0040 I FF 0006 R    164          STX    CUREK2
0043 I FF 0002 D    165          STX    EXCMSK
0046 I FE 0000 R    166          LDX    CURCSP
0049 I E6 0F        167          LDA B  LCAST4,X
004B I 17           168          TBA
004C I C4 1F        169          AND B  #LS4FRL+LS40VL+LS4TSL+LS4SPL+LS4SRL
004E I 7D 0005 R    170          TST    CUREKM       CONDITIONAL FLAGS ?
0051 I 2A 12        171          BPL    EXC2         NO, SET CONDITIONAL FLAGS TO MASK VALUE
0053 I 4F           172          CLR A               SET MASK ACCORDING TO CONDITIONAL FLAGS
0054 I 54           173          LSR B
0055 I 46           174          ROR A
0056 I 54           175          LSR B
E _CTV(A0011.02.003AA  CRS EXECUTIVE ROUTINE)          08/04/78  13:30:02  PAGE   4

0057 I 46           176          ROR A
0058 I CE 0006 R    177          LDX    #CUREK2
005B I AA 01        178          ORA A  1,X
005D I EA 00        179          ORA B  0,X
005F I A7 01        180          STA A  1,X
0061 I E7 00        181          STA B  0,X
0063 I 20 19        182          BRA    EXC3
0065 I 78 0003 D    183 EXC2     ASL    EXCMK1
0068 I 79 0002 D    184          ROL    EXCMSK
006B I 78 0003 D    185          ASL    EXCMK1
006E I 79 0002 D    186          ROL    EXCMSK
0071 I F6 0002 D    187          LDA B  EXCMSK
0074 I C4 1F        188          AND B  #LS4FRL+LS40VL+LS4TSL+LS4SPL+LS4SRL
0076 I 84 E0        189          AND A  #-1-LS4FRL-LS40VL-LS4TSL-LS4SPL-LS4SRL
0078 I 1B           190          ABA
0079 I FE 0000 R    191          LDX    CURCSP
007C I A7 0F        192          STA A  LCAST4,X
007E I 86 3F        193 EXC3     LDA A  #INTENB      ENABLE CONTROL
0080 I B7 0007 R    194          STA A  PIAKCR       CONSOLE INTERRUPTS
0083 I FE 0000 D    195          LDX    EXCSAV       DISPLAY
0086 I EE 04        196          LDX    4,X          EXECUTIVE MODE
0088 I 27 03        197          BEQ    EXC4         DO NOT DISPLAY MESSAGE IF MSG PNTR = 0
008A I BD 0012 R    198          JSR    DISPLY       MESSAGE
008D I FE 0001 R    199 EXC4     LDX    CURLSS       PICK UP PNTR TO SELECTED CONTROL STORAGE AE
0090 I BC 0000 R    200          CPX    CURCSP       HAVE LINE AND SHOOTER SETTINGS CHANGED
0093 I 27 F8        201          BEQ    EXC4         YES, REQUEST OPERATOR ACTION
0095 I 86 3E        202          LDA A  #INTMSK      MASK CONTROL
0097 I B7 0007 R    203          STA A  PIAKCR       CONSOLE INTERRUPTS
009A I 86 FF        204          LDA A  #RTUACT
009C I C6 60        205          LDA B  #RTUSTS+STSIAV
009E I CE 000B R    206          LDX    #RCTSST
00A1 I BD 0014 R    207          JSR    RTUCMD       SET ALL ACTIVE RTU'S INACTIVE
00A4 I CE 000F R    208          LDX    #RACTLS
00A7 I FF 0010 R    209          STX    RCMAPT
00AA I FE 0000 R    210          LDX    CURCSP       SET INDEX TO
00AD I FF 0002 R    211          STX    CURIDX       LAST PROGRAM VALUES
00B0 I FE 0001 R    212          LDX    CURLSS
00B3 I FF 0000 R    213          STX    CURCSP       SET CURRENT PNTR = SELECTED PNTR
00B6 I B6 0003 R    214          LDA A  LINENO
00B9 I B7 0004 R    215          STA A  CURLIN       SET CURRENT LINE NUMBER
00BC I BD 0013 R    216          JSR    RSTRID       UPDATE ROLL-ALONG INDEXES
00BF I FE 0000 R    217          LDX    CURCSP
00C2 I A6 11        218          LDA A  LCAPAR,X     UPDATE
00C4 I B7 0008 R    219          STA A  AUXPAR       PANEL LITES
00C7 I A6 12        220          LDA A  LCADTB,X     AND
00C9 I B7 0009 R    221          STA A  AUXDTB       DISPLAYS
00CC I A6 13        222          LDA A  LCASPL,X
00CE I B7 000A R    223          STA A  AUXSPL
00D1 I A6 0C        224          LDA A  LCAST1,X     FIRE SEQUENCE PROGRAMMED
00D3 I 85 20        225          BIT A  #LSTPRG
00D5 I 27 45        226          BEQ    EXC7         NO
```

```
00D7 I BD 0016 R    227             JSR     SEQTST          ALL RTU'S DEPLOYED
00DA I 26 12        228             BNE     EXC9            NO
00DC I FE 0000 R    229             LDX     CURCSP
00DF I EE 00        230             LDX     0,X
00E1 I FF 000E R    231             STX     STNADR
00E4 I BD 0017 R    232             JSR     SELIDX          S.P. STATION OUTSIDE SPREAD
00E7 I 2B 05        233             BMI     EXC9            YES
```

```
00E9 I BD 0018 R    234             JSR     CHKDEP          S. P. STATION DEPLOYED
00EC I 26 28        235             BNE     EXCA
00EE I FE 0000 R    236 EXC9        LDX     CURCSP
00F1 I A6 0C        237             LDA A   LCAST1,X
00F3 I 84 DF        238             AND A   #-1-LSTPRG      RESET FIRE SEQUENCE PROGRAMMED FLAG
00F5 I A7 0C        239             STA A   LCAST1,X
00F7 I E6 0F        240             LDA B   LCAST4,X
00F9 I C4 EC        241             AND B   #-1-LS4FRL-LS4SRL-LS4SPL
00FB I E7 0F        242             STA B   LCAST4,X
00FD I 86 01        243             LDA A   #MODPLY
00FF I A7 10        244             STA A   LCAMDE,X        SET DEPLOY MODE
0101 I 86 F0        245             LDA A   #AXLADV+AXLFIR+AXLOVR+AXLFTS
0103 I BD 0019 R    246             JSR     LITOFF
0106 I BD 001A R    247             JSR     CLRPRG          CLEAR RECORDING PATTERN DISPLAY
0109 I CE 0210 I    248             LDX     #FSPNPG         INFORM OPERATOR THAT
010C I FF 000C R    249             STX     MSGRQT          FIRE SEQUENCE NO LONGER PROGRAMMED
010F I C6 04        250             LDA B   #MSGTRC
0111 I BD 001B R    251             JSR     MSGOUT
0114 I 20 06        252             BRA     EXC7
0116 I BD 001C R    253 EXCA        JSR     RCMSET          SETUP NEW RECORDING MAP
0119 I BD 0015 R    254             JSR     ACTRTN          SET ALL RTUS IN SPREAD ACTIVE
011C I CE 01EC I    255 EXC7        LDX     #LOSCHG         DISPLAY LINE OR  .
011F I BD 0012 R    256             JSR     DISPLY          SHOOTER CHANGE MESG
0122 I 7E 0016 I    257             JMP     EXC1            SET UP MASKS
                    258 *
                    259 *       EXECUTIVE MODE VALID KEY MASK
                    260 *
0125 I              261 EXMDKM      EQU     *
                    262 *
0125 I FD7D     A   263             FDB     $FD7D,$E03E     DEPLOY
0127 I E03E     A
0129 I 0143     I   264             FDB     DEPMSG
                    265 *
012B I 4D7D     A   266             FDB     $4D7D,$E17E     PROGRAM
012D I E17E     A
012F I 0169     I   267             FDB     PRGMSG
                    268 *
0131 I 4D7D     A   269             FDB     $4D7D,$E07E     FIRE
0133 I E07E     A
0135 I 0185     I   270             FDB     FIRMSG
                    271 *
0137 I FD7D     A   272             FDB     $FD7D,$E03E     TEST
0139 I E03E     A
013B I 0000     A   273             FDB     0
                    274 *
013D I 7D7D     A   275             FDB     $7D7D,$E37E     FIRE ABORT
013F I E37E     A
0141 I 01CD     I   276             FDB     FABMSG
                    277 *
0143 I 4D7C     A   278             FDB     $4D7C,$E17E     ADVANCE
0145 I E17E     A
0147 I 0169     I   279             FDB     ADVMSG
                    280 *
                    281 *       NOTE: IF BIT 7 OF 1ST BYTE OF TABLE ENTRY IS SET, INDICATES
                    282 *             MASK CONTAINS CONDITIONAL FLAGS
                    283 *
                    284 *       EXECUTIVE MODE MESSAGES
                    285 *
```

```
0149 I 10           286 DEPMSG      FCB     $10,2,0         POSITION CURSOR TO LINE 2
014A I 02
014B I 00
014C I 11           287             FCB     $11
```

```
014D I 2A2A20        288              FCC    /** DEPLOY OR PROGRAM **/
0164 I 12            289              FCB    $12
01E5 I 0D            290              FCB    $D,$D,$D,4
0166 I 0D
0167 I 0D
0168 I 04
                     291 *
0169 I 10            292 PRGMSG       FCB    $10,2,0
016A I 02
016B I 00
016C I 11            293              FCB    $11
016D I 2A2A20        294              FCC    /** READY TO TEST **/
0180 I 12            295              FCB    $12
0181 I 0D            296              FCB    $D,$D,$D,4
0182 I 0D
0183 I 0D
0184 I 04
                     297 *
0185 I 10            298 FIRMSG       FCB    $10,2,0
0186 I 02
0187 I 00
0188 I 11            299              FCB    $11
0189 I 2A2A20        300              FCC    /** READY TO ADVANCE SHOT **/
01A4 I 12            301              FCB    $12
01A5 I 0D            302              FCB    $D,$D,$D,4
01A6 I 0D
01A7 I 0D
01A8 I 04
                     303 *
01A9 I               304 TSTMSG       EQU    *
01A9 I 10            305              FCB    $10,2,0
01AA I 02
01AB I 00
01AC I 11            306              FCB    $11
01AD I 2A2A20        307              FCC    /** READY TO TEST OR FIRE **/
01C8 I 12            308              FCB    $12
01C9 I 0D            309              FCB    $D,$D,$D,4
01CA I 0D
01CB I 0D
01CC I 04
                     310 *
01CD I 10            311 FABMSG       FCB    $10,2,0
01CE I 02
01CF I 00
01D0 I 11            312              FCB    $11
01D1 I 2A2A20        313              FCC    /** OVERRIDE OR TEST **/
01E7 I 12            314              FCB    $12
01E8 I 0D            315              FCB    $D,$D,$D,4
01E9 I 0D
01EA I 0D
01EB I 04
                     316 *
0169 I               317 ADVMSG       EQU    PRGMSG
                     318 *
EXECTV(A0011.02.003AA  CRS EXECUTIVE ROUTINE)          08/04/78  13:30:05  PAGE

01EC I 4C494E        319 LOSCHG       FCC    /LINE OR SHOOTER SETTING CHANGED/
020B I 0D            320              FCB    $D,$D,$D,$D,4
020C I 0D
020D I 0D
020E I 0D
020F I 04
                     321 *
0210 I 4E4F20        322 FSPNPG       FCC    /NO FIRE SEQUENCE PROGRAMMED/
022B I 0D            323              FCB    $D
022C I 444550        324              FCC    /DEPRESS CONTINUE/
023C I 0D            325              FCB    $D,$D,$D,4
023D I 0D
023E I 0D
023F I 04
0000 D               326              DSEC
                     327 *
                     328 *            EXECTV                   ROUTINE
                     329 *
```

```
0000 D 0000    A   330 EXCSAV    FDB    0          INDEX REGISTER SAVE AREA
0002 D 0000    A   331 EXCMSK    FDB    0          MASK MANIPULATION AREA
0003 D             332 EXCMK1    EQU    *-1
                   333 *
0004               334           END
   NO ERRORS
  ISECT LENGTH --    576
  DSECT LENGTH --      4

> ACTRTN   0015      17    17   254
  ADVMSG   0169 I   317   279
> AUXDTB   0009       9     9   221
> AUXPAR   0008       9     9   219
> AUXSPL   000A       9     9   223
  AXLADV   0080 A   125   245
  AXLCBP   0008 A   122
  AXLFIR   0040 A   126   245
  AXLFTS   0010 A   128   245
  AXLNTS   0002 A   124
  AXLOVR   0020 A   127   245
  AXLTBP   0001 A   123
> CFRMWD   000D      12    12   139   141
  CFRTLT   0020 A    27   140
> CHKDEP   0018      18    18   234
> CLRPRG   001A      19    19   247
> CURCSP   0000       7     7   135   146   166   191   200   210   213   217   229   236
> CUREK2   0006       7     7   164   177
> CUREKM   0005       7     7   161   170
> CURIDX   0002       7     7   211
> CURLIN   0004       7     7   215
> CURLSS   0001       7     7   199   212
  DEPMSG   0149 I   286   264
> DISPLY   0012      17    17   198   256
  EXC1     0016 I   144   257
  EXC2     0065 I   183   171
  EXC3     007E I   193   182
  EXC4     008D I   199   197   201
  EXC6     0003 I   136   138
  EXC7     011C I   255   226   252
  EXC9     00EE I   236   228   233
  EXCA     0116 I   253   235
  EXCMK1   0003 D   332   183   185
  EXCMSK   0002 D   331   165   184   186   187
  EXCSAV   0000 D   330   145   156   162   195
< EXECTV   0000 I   134     3
< EXMDKM   0125 I   261     3   144
  FABMSG   01CD I   311   276
  FIRMSG   0185 I   298   270
< FSFNPG   0210 I   322     4   243
> IDXRTN   0011      17    17   157
  INTENB   003F A    31   193
  INTMSK   003E A    30   142   202
  LCABBR   0004 A    43
  LCADPM   0014 A    64
  LCADTB   0012 A    62   220
  LCAMDE   0010 A    60   150   244
  LCANRS   0002 A    41
  LCAPAR   0011 A    61   218
  LCARSR   0003 A    42
  LCASBT   0018 A    66
  LCASHA   0019 A    67
  LCASP1   0006 A    48
  LCASP2   0008 A    49
  LCASP3   0009 A    50
  LCASP4   000A A    51
  LCASP5   000B A    52
  LCASPL   0013 A    63   222
  LCASPT   0000 A    40
  LCAST1   000C A    56   136   147   149   224   237   239
  LCAST2   000D A    57
  LCAST3   000E A    58
  LCAST4   000F A    59   167   192   240   242
  LCASTN   0016 A    65
  LCATRS   0005 A    44
```

```
> LINENO   0003      7     7   214
> LITOFF   0019     18    18   246
  LOSCHG   01EC I  319   255
  LS2BFD   0020 A   84
  LS2BTP   0002 A   89
  LS2DKR   0080 A   82
  LS2NTP   0004 A   88
  LS2RCP   0040 A   83
  LS2RCR   0010 A   85
  LS2TIP   0008 A   86
  LS2TSP   0001 A   90
  LS3BLE   0040 A   95
  LS3BVT   0080 A   94
  LS3MNE   0004 A   99
  LS3MTT   0020 A   96
  LS3NDR   0002 A  100
  LS3NEF   0008 A   98
  LS3STF   0010 A   97
  LS4FRL   0010 A  104   169   188   189   241
  LS4OVL   0008 A  105   169   188   189
  LS4SPL   0002 A  107   169   188   189   241
  LS4SRL   0001 A  108   169   188   189   241
  LS4TSL   0004 A  106   169   188   189
  LSTCBP   0008 A   75
  LSTEMF   0080 A   71   148
  LSTEOT   0004 A   76
  LSTMMO   0002 A   77
  LSTMSF   0040 A   72   137
  LSTMTP   0001 A   78
  LSTPRG   0020 A   73   225   238
  LSTTBP   0010 A   74
  MODADV   0006 A  118
  MODFIR   0003 A  115
  MODFRA   0005 A  117
  MODFRE   0000 A  112
  MODPLY   0001 A  113   243
  MODPRG   0002 A  114
  MODTST   0004 A  116
> MSGOUT   001B     19    19   251
> MSGRQT   000C     11    11   249
  MSGTRC   0004 A   24   250
> PI4KCR   0007      8     8   143   194   203
  PRGMSG   0169 I  292   267   317
> RACTLS   000F     14    14   208
> RCMAPT   0010     15    15   209
> RCMSET   001C     20    20   253
> RCTSST   000B     10    10   206
> RSTRID   0013     17    17   216
  RTUACT   00FF A   33   204
> RTUCMD   0014     17    17   207
  RTUSTS   0060 A   34   205
> SELIDX   0017     18    18   232
> SEQTST   0016     18    18   227
> STNADR   000E     13    13   231
  STSIAV   0000 A   35   205
  TSTMSG   01A9 I  304
```

```
          *
          *      CENTRAL RECORDING STATION ESCAPE ROUTINE
          *
0000 I              ISEC
          *
                    DEF      ESCAPE
          *
                    REF      CASR2
                    REF      TMRSTS,STLSW1,TAPST1
                    REF      CURCSP
                    REF      RDYFIR
                    REF      CFRMWD
                    REF      TCPLED
                    REF      RCTACK
                    REF      RTUADR
          *
                    REF      TCDEOF,TCDBSR
                    REF      TMONOF,TCDSSP,DISPLY,EXECTV
```

```
                              REF      LITOFF
                              REF      DEPYX
                              REF      RTUCMD
                     *
                     *
                     *      LINE MODE
                     *
0010 A               LCAMDE   EQU      16          LINE MDE OFFSET
0004 A               MODTST   EQU      4           TEST MODE
                     *
                     *      LINE STATUS FLAGS (BYTE 2)
000D A               LCAST2   EQU      13
0008 A               LS2TIP   EQU      8           MULITIPLE NORMAL TEST-IN-PROGRESS
0004 A               LS2NTP   EQU      4           NORMAL TEST IN PROGRESS
0002 A               LS2BTP   EQU      2           BLAST TEST-IN-PROGRESS
0001 A               LS2TSP   EQU      1           TILT SEARCH-IN-PROGRESS
                     *
0002 A               AXLNTS   EQU      2           NORMAL TEST-IN-PROGRESS LITE
0040 A               AXLFIR   EQU      $40         AUTO FIRE LITE
                     *
                     *
                     *
0013 A               LCASPL   EQU      19          AUXILIARY LITES SAVE AREA
                     *
000C A               LCAST1   EQU      12          LINE STATUS FLAGS (BYTE 1)
0020 A               LSTPRG   EQU      $20         FIRE SEQUENCE PROGRAMMED
                     *
000E A               LCAST3   EQU      14
0001 A               LS3TFP   EQU      1           TAPE FUNCTION IN PROGRESS
0002 A               LS3NDR   EQU      2           NOISE DATA RECORDING
                     *
0040 A               STDBY    EQU      $40         STANDBY POWER
                     *
                     *        RTU COMMAND EQUATES
                     *
00FF A               RTUACT   EQU      $FF         ALL ACTIVE RTUS
0000 A               RTUACK   EQU      0           ACK-INIT.
0001 A               DATACK   EQU      1           DATA ACKNOWLEDGE
                     *
                     *
0000 I               ESCAPE   EQU      *
0000 I B6 0000 R              LDA A    CASR2
0003 I 85 40                  BIT A    #STDBY      STANDBY POWER ON TAPE UNOT
0005 I 26 1B                  BNE      ESC3        YES, TAPE NOT IN USE
0007 I FE 0004 R              LDX      CURCSP
000A I A6 0E                  LDA A    LCAST3,X
000C I 85 01                  BIT A    #LS3TFP     TAPE IN SEARCHIN PROGRESS
000E I 26 06                  BNE      ESC4        YES, NO EOF WRITTEN
0010 I BD 000A R              JSR      TCDEOF
0013 I BD 000B R              JSR      TCDBSR
0016 I FE 0004 R     ESC4     LDX      CURCSP
0019 I A6 0E                  LDA A    LCAST3,X
001B I 84 FE                  AND A    #-1-LS3TFP
001D I A7 0E                  STA A    LCAST3,X
001F I BD 000D R              JSR      TCDSSP      SET STANDBY POWER ON TAPE UNIT
0022 I CE 006C I     ESC3     LDX      #SEQABT     INFORM OPERATOR OF ABORTED SEQUENCE
0025 I BD 000E R              JSR      DISPLY
0028 I 7F 0001 R              CLR      TMRSTS      CLEAR TIMER REQUEST
002B I 7F 0002 R              CLR      STLSW1      CLEAR SATELLITE REQUEST
002E I 7F 0003 R              CLR      TAPST1      CLEAR TAPE REQUEST
0031 I 7F 0006 R              CLR      CFRMWD      CLEAR CMND-FORMATTER STATUS WORD
0034 I BD 000C R              JSR      TMONOF      TURN OFF DATA MONITOR
0037 I FE 0004 R              LDX      CURCSP
003A I A6 10                  LDA A    LCAMDE,X
003C I 81 04                  CMP A    #MODTST     TEST MODE ?
003E I 26 14                  BNE      ESC1        NO, CONTINUE
0040 I A6 0D                  LDA A    LCAST2,X    RESET TEST-IN-PROGRESS FLAGS
0042 I 84 F0                  AND A    #-1-LS2TIP-LS2NTP-LS2BTP-LS2TSP
0044 I A7 0D                  STA A    LCAST2,X
0046 I A6 0E                  LDA A    LCAST3,X
0048 I 84 FC                  AND A    #-1-LS3NDR-LS3TFP
004A I A7 0E                  STA A    LCAST3,X    RESET NOISE DATA RECORDING & TAPE FUNCTIONF
004C I 86 02         ESC2     LDA A    #AXLNTS     TURN OFF TEST-IN-PROGRESS LITE
```

```
004E I BD 0010 R     93            JSR     LITOFF
0051 I 7F 0007 R     94            CLR     TCPLED       TAPE PANEL FUNCTION ACTIVE
0054 I CE 0008 R     95 ESC1       LDX     #RCTACK
0057 I B6 0009 R     96            LDA A   RTUADR
005A I C6 01         97            LDA B   #RTUACK+DATACK
005C I BD 0012 R     98            JSR     RTUCMD       TURN OFF LAST INDIVIDUAL RTU ACCESSED
005F I CE 0008 R     99            LDX     #RCTACK
0062 I C6 01        100            LDA B   #RTUACK+DATACK
0064 I 86 FF        101            LDA A   #RTUACT
0066 I BD 0012 R    102            JSR     RTUCMD       TURN OFF ALL ACTIVE RTUS
0069 I 7E 0011 R    103            JMP     DEPYX        INITIATE NEXT SEQUENCE
                    104 *
006C I 534551       105 SEQABT     FCC     /SEQUENCE IN PROGRESS ABORTED/
0088 I 0D           106            FCB     $D,$D,$D,$D,4
0089 I 0D
008A I 0D
008B I 0D
008C I 04
008D                107            END
     NO ERRORS
   ISECT LENGTH --    141
   DSECT LENGTH --      0

   AXLFIR     0040 A     38
   AXLNTS     0002 A     37     92
 > CASR2      0000        9      9     61
 > CFRMWD     0006       13     13     80
 > CURCSP     0004       11     11     64     70     82
   DATACK     0001 A     57     97    100
 > DEPYX      0011       21     21    103
 > DISPLY     000E       19     19     76
   ESC1       0054 I     95     85
   ESC2       004C I     92
   ESC3       0022 I     75     63
   ESC4       0016 I     70     67
 < ESCAPE     0000 I     60      7
 > EXECTV     000F       19     19
   LCAMDE     0010 A     27     83
   LCASPL     0013 A     42
   LCAST1     000C A     44
   LCAST2     000D A     31     86     88
   LCAST3     000E A     47     65     71     73     89     91
 > LITOFF     0010       20     20     93
   LS2BTP     0002 A     34     87
   LS2NTP     0004 A     33     87
   LS2TIP     0008 A     32     87
   LS2TSP     0001 A     35     87
   LS3NDR     0002 A     49     90
   LS3TFP     0001 A     48     66     72     90
   LSTPRG     0020 A     45
   MODTST     0004 A     28     84
 > RCTACK     0008       15     15     95     99
 > RDYFIR     0005       12     12
   RTUACK     0000 A     56     97    100
   RTUACT     00FF A     55    101
 > RTUADR     0009       16     16     96
 > RTUCMD     0012       22     22     98    102
   SEQABT     006C I    105     75
   STDBY      0040 A     51     62
 > STLSW1     0002       10     10     78
 > TAPST1     0003       10     10     79
 > TCDBSR     000B       18     18     69
 > TCDEOF     000A       18     18     68
 > TCDSSP     000D       19     19     74
 > TCPLED     0007       14     14     94
 > TMONOF     000C       19     19     81
 > TMRSTS     0001       10     10     77
                          2 *
                          3 *       CENTRAL RECORDING STATION TILT SEARCH ROUTINE
                          4 *
 0000 I                   5            ISEC
                          6 *
                          7            DEF     TLTSRH
                          8 *
```

```
                          REF     MSGRQT
                          REF     CURCSP
                          REF     RTUMAP,RTUMEN
                          REF     DEPSAR
                          REF     STNADR
                          REF     LINSAV
                          REF     XMTOTL,TLTSTS
                          REF     IDTRTU,IDTLNM
                          REF     CFRMWD
                   *
                          REF     DISPLY,MSGOUT
                          REF     IDXRTN
                          REF     DEXRTN
                          REF     EXECTV
                          REF     CPCTIX
                          REF     SELID2,CHKDEP
                          REF     CHMSET
                          REF     RCVMRT
                          REF     RTSMAP,DPLRTU
                          REF     CHKRDP
                   *
0020 A                CFRTLT  EQU     $20          TILT MODE FLAG
                   *
                   *
                   *      LINE STATUS FLAG EQUATES
                   *
000D A                LCAST2  EQU     13           LINE STATUS FLAGS (BYTE 2)
0008 A                LS2TIP  EQU     8            MULTIPLE NORMAL TEST-IN-PROGRESS
0004 A                LS2NTP  EQU     4            NORMAL TEST-IN-PROGRESS
0002 A                LS2BTP  EQU     2            BLAST TEST-IN-PROGRESS
0001 A                LS2TSP  EQU     1            TILT SEARCH-IN-PROGRESS
                   *
0080 A                MSGTCV  EQU     $80          CONVERT AND DISPLAY OLD VALUE
                   *
0000 I                TLTSRH  EQU     *
0000 I FE 0001 R              LDX     CURCSP
0003 I A6 0D                  LDA A   LCAST2,X
0005 I 8A 01                  ORA A   #LS2TSP      SET TILT SEARCH-IN-PROGRESS INDICATOR
0007 I 84 F1                  AND A   #-1-LS2TIP-LS2NTP-LS2BTPRESET OTHER TEST IN PROGRESS INA
0009 I A7 0D                  STA A   LCAST2,X
000B I B6 000B R              LDA A   CFRMWD
000E I 8A 20                  ORA A   #CFRTLT      SET TILT MODE FLAG
0010 I B7 000B R              STA A   CFRMWD
0013 I CE 0002 R              LDX     #RTUMAP      INIT RTU MAP PNTR
0016 I FF 0000 D              STX     RMPNTR
0019 I 86 04          TLT1    LDA A   #RTUMFL      INCR MAP PNTR
001B I CE 0000 D              LDX     #RMPNTR      TO NEXT
001E I BD 000E R              JSR     IDXRTN       RTU
0021 I FE 0000 D              LDX     RMPNTR
0024 I 8C 0003 R              CPX     #RTUMEN      LAST RTU PROCESSED
0027 I 26 1A                  BNE     TLT2         NO
0029 I CE 009A I              LDX     #TLTNUF      INFORM OPERATOR THAT
002C I BD 000C R              JSR     DISPLY       NO TILTED UNIT WAS FOUND
002F I FE 0001 R      TLT3    LDX     CURCSP
0032 I A6 0D                  LDA A   LCAST2,X
0034 I 84 FE                  AND A   #-1-LS2TSP   RESET TILT SEARCH-IN-PROGRESS FL..
0036 I A7 0D                  STA A   LCAST2,X
0038 I B6 000B R              LDA A   CFRMWD
003B I 84 DF                  AND A   #-1-CFRTLT   RESET TILT MODE FLAG
003D I B7 000B R              STA A   CFRMWD
0040 I 7E 0010 R              JMP     EXECTV       INITIATE NEXT SEQUENCE
0043 I E6 00          TLT2    LDA B   0,X          SAVE ASSOCIATED
0045 I 27 D2                  BEQ     TLT1
0047 I F7 0004 R              STA B   DEPSAR       LINE NUMBER
004A I EE 01                  LDX     1,X          SAVE FIRST STATION NUMBER
004C I FF 0005 R              STX     STNADR       DEPLOYED FOR THIS RTU
004F I BD 0011 R              JSR     CPCTIX
0052 I FE 0006 R              LDX     LINSAV
0055 I EE 02                  LDX     2,X          FIND PNTR TO DEPLOYMENT MAP FOR THIS RT.
0057 I BD 0012 R              JSR     SELID2       COMPUTE INDEX INTO
005A I BD 0013 R              JSR     CHKDEP       DEPLOYMENT TABLE FOR 1ST STATION NUMBER
005D I BD 0014 R              JSR     CHMSET       SETUP CHANNEL MAP & RECORDING MASKS
0060 I CE 0000 A              LDX     #0           SET WORD COUNT
0063 I FF 0007 R              STX     XMTOTL       EQUAL TO ZERO
```

```
0066 I BD 0015 R     83             JSR     RCVMRT        INPUT TILT STATUS FROM RTU
0069 I B6 0008 R     84             LDA A   TLTSTS        UNIT TILTED ?
006C I 27 AB         85             BEQ     TLT1          NO, CONTINUE SEARCH
006E I CE 00B4 I     86             LDX     #TLTFND       INFORM OPERATOR
0071 I BD 000C R     87             JSR     DISPLY        THAT UNIT WAS FOUND
0074 I CE 0009 R     88             LDX     #IDTRTU
0077 I FF 0000 R     89             STX     MSGRQT
007A I C6 80         90             LDA B   #MSGTCV
007C I BD 000D R     91             JSR     MSGOUT        DISPLAY RTU NUMBER
007F I CE 000A R     92             LDX     #IDTLNM
0082 I FF 0000 R     93             STX     MSGRQT
0085 I C6 80         94             LDA B   #MSGTCV
0087 I BD 000D R     95             JSR     MSGOUT        DISPLAY LINE NUMBER
008A I BD 0018 R     96             JSR     CHKRDP
008D I EE 01         97             LDX     1,X           PICK UP FIRST STATION ADDR
008F I FF 0005 R     98             STX     STNADR
0092 I BD 0016 R     99             JSR     RTSMAP        SETUP RTU CHANNEL ASSIGNMENTS
0095 I BD 0017 R    100             JSR     DPLRTU        DISPLAY RTU CHANNEL ASSIGNMENTS
0098 I 20 95        101             BRA     TLT3          GO RESET TILT SEARCH FLAG
                    102 *
                    103 *       TILT SEARCH MESSAGES
                    104 *
009A I 54494C       105 TLTNUF      FCC     /TILTED UNIT NOT FOUND/
00AF I 0D           106             FCB     $D,$D,$D,$D,4
00B0 I 0D
00B1 I 0D
00B2 I 0D
00B3 I 04
00B4 I 464F55       107 TLTFND      FCC     /FOUND/
00B9 I 0D           108             FCB     $D,$D,$D,$D,4
00BA I 0D
00BB I 0D
00BC I 0D
00BD I 04
                    109 *
                    110 *       TILT SEARCH ROUTINE STORAGE REQUIREMENTS
                    111 *
0000 D              112             DSEC
0000 D 0000    A    113 RMPNTR      FDB     0             RTU MAP PNTR
                    114 *
0004 A              115 RTUMPL      EQU     4             NUMBER BYTES PER RTU MAP ENTRY
                    116 *
0002                117             END
    NO ERRORS
  ISECT LENGTH ---    190
  DSECT LENGTH ---      2

 > CFRMWD   000B      17    17    49    51    66    68
   CFRTLT   0020 A    30    50    67
 > CHKDEP   0013      24    24    79
 > CHKRDP   0018      28    28    96
 > CHMSET   0014      25    25    80
 > CPCTIX   0011      23    23    75
 > CURCSP   0001      10    10    44    62
 > DEPSAR   0004      12    12    72
 > DEXRTN   000F      21    21
 > DISPLY   000C      19    19    61    87
 > DPLRTU   0017      27    27   100
 > EXECTV   0010      22    22    69
 > IDTLNM   000A      16    16    92
 > IDTRTU   0009      16    16    88
 > IDXPTN   000E      20    20    56
   LCAST2   000D A    35    45    48    63    65
 > LINSAV   0006      14    14    76
   LS2BTP   0002 A    38    47
   LS2NTP   0004 A    37    47
   LS2TIP   0008 A    36    47
   LS2TSP   0001 A    39    46    64
 > MSGOUT   000D      19    19    91    95
 > MSGRQT   0000       9     9    89    93
   MSGTCV   0080 A    41    90    94
 > RCVMRT   0015      26    26    83
   RMPNTR   0000 D   113    53    55    57
 > RTSMAP   0016      27    27    99
```

```
 > RTUMAP     0002        11      11      52
 > RTUMEN     0003        11      11      58
   RTUMPL     0004 A     115      54
 > SELID2     0012        24      24      78
 > STNADR     0005        13      13      74      98
   TLT1       0019 I      54      71      85
   TLT2       0043 I      70      59
   TLT3       002F I      62     101
   TLTFND     00B4 I     107      86
   TLTNUF     009A I     105      60
 < TLTSRH     0000 I      43       7
 > TLTSTS     0008        15      15      84
 > XMTOTL     0007        15      15      82
0000 I                 2           ISEC
                       3 *
                       4            DEF     TODSVC
                       5            DEF     CALYRS,CALYR1,CALMNT,CALDAY,CALDAY,CALH[illegible]
                       6            DEF     CALHR1,CALMIN,CALMN1,CALSEC,CALSEC,CALSC1
                       7            DEF     CALASM,CALASD,CALAM1,CALAD1
                       8            DEF     TCVDAY,TCVHRS,TCVMIN,TCVSEC,TCVYRS
                       9            DEF     DOYTMD
                      10 *
                      11 *
                      12            REF     TODTSC,TODUSC,TODTMN,TODUMN,TODTHR,TODUHR
                      13            REF     TODHDY,TODTDY,TODUDY,TODTHY,TODHYR
                      14            REF     TODTYR,TODUYR
                      15            REF     NDMXM1,NDMXM2,NDMXM3
                      16            REF     NDMXM4
                      17 *
                      18 *
                      19            REF     MSGOUT,EXECTV,DISPLY,KYS2,BINDEC,DECBIN
                      20 *
                      21            REF     MSGRQT,CHRQST,NUMD,MAXDG,NUMCHR
                      22            REF     SVDT42,NUMMSG
                      23            REF     DECNUM,CNVPTR,SAVDT4
                      24 *
                      25 *
                      26 *      MESSAGE REQUEST TYPE
                      27 *
0080 A                28 MSGTCV     EQU     $80            CONVERT AND DISPLAY OLD VALUE
0040 A                29 MSGTIP     EQU     $40            INPUT AND DISPLAY NEW VALUE
0020 A                30 MSGTBF     EQU     $20            SET BLANK FLAG
0010 A                31 MSGTPS     EQU     $10            CONVERSION PNTR ALREADY SET
0008 A                32 MSGTSV     EQU     8              CONVERTED VALUE STORED READY FOR DISPLAY
                      33 *
                      34 *      TIME OF DAY CLOCK SERVICE ROUTINE
                      35 *
0000 I                36 TODSVC     EQU     *
0000 I BD 01A8 I      37            JSR     TCVYRS         CONVERT CURRENT YEAR SETTING
0003 I BD 01BE I      38            JSR     TCVDAY         CONVERT DAY OF YEAR
0006 I BD 01CC I      39            JSR     TCVHRS         CONVERT CURRENT HOUR
0009 I BD 01DA I      40            JSR     TCVMIN         CONVERT CURRENT MINUTE
000C I BD 01E6 I      41            JSR     TCVSEC         CONVERT CURRENT SECONDS
000F I BD 0151 I      42            JSR     DOYTMD         CONVERT DAY-OF-YEAR TO MONTH AND DAY
0012 I 8D 73          43            BSR     TODDSP         DISPLAY DATE AND TIME
0014 I CE 0248 I      44            LDX     #TODMTM
0017 I FF 0017 R      45            STX     MSGRQT
001A I C6 E0          46            LDA B   #MSGTCV+MSGTIP+MSGTBF
001C I BD 0011 R      47            JSR     MSGOUT         SET MONTH VALUE
001F I CE 000C D      48            LDX     #CALASM
0022 I BD 01FA I      49            JSR     SCKCTR
0025 I CE 0259 I      50            LDX     #TODDYM
0028 I FF 0017 R      51            STX     MSGRQT
002B I C6 E0          52            LDA B   #MSGTCV+MSGTIP+MSGTBF
002D I BD 0011 R      53            JSR     MSGOUT         SET DAY VALUE
0030 I CE 000E D      54            LDX     #CALASD
0033 I BD 01FA I      55            JSR     SCKCTR
0036 I CE 0268 I      56            LDX     #TODYRM
0039 I FF 0017 R      57            STX     MSGRQT
003C I C6 E0          58            LDA B   #MSGTCV+MSGTIP+MSGTBF
003E I BD 0011 R      59            JSR     MSGOUT         SET YEAR VALUE
0041 I CE 0009 R      60            LDX     #TODTHY
0044 I BD 01F2 I      61            JSR     SCKCT2
0047 I CE 000B R      62            LDX     #TODTYR
```

```
004A I BD 01FA I            JSR    SCKCTR
004D I CE 0211 I            LDX    #TODHRM
0050 I FF 0017 R            STX    MSGRQT
0053 I C6 E0                LDA B  #MSGTCV+MSGTIP+MSGTBF
0055 I BD 0011 R            JSR    MSGOUT       HOURS VALUE
0058 I CE 0004 R            LDX    #TODTHR
005B I BD 01FA I            JSR    SCKCTR
005E I CE 0222 I            LDX    #TODMNM
0061 I FF 0017 R            STX    MSGRQT
0064 I C6 E0                LDA B  #MSGTCV+MSGTIP+MSGTBF
0066 I BD 0011 R            JSR    MSGOUT       SET MINUTES VALUE
0069 I CE 0002 R            LDX    #TODTMN
006C I BD 01FA I            JSR    SCKCTR
006F I CE 0235 I            LDX    #TODSCM
0072 I FF 0017 R            STX    MSGRQT
0075 I C6 E0                LDA B  #MSGTCV+MSGTIP+MSGTBF
0077 I BD 0011 R            JSR    MSGOUT       SET SECONDS VALUE
007A I CE 0000 R            LDX    #TODTSC
007D I BD 01FA I            JSR    SCKCTR
0080 I 8D 7C                BSR    MDTDOY       CONVERT MONTH AND DAY TO DAY OF YEAR
0082 I 8D 03                BSR    TODDSP       DISPLAY UPDATED DATE AND TIME
0084 I 7E 0012 R            JMP    EXECTV
                   *
                   *     ROUTINE TO DISPLAY AND UPDATE DATE AND TIME
                   *
0087 I             TODDSP   EQU    *
0087 I CE 0278 I            LDX    #TIMDAT
008A I BD 0013 R            JSR    DISPLY
008D I 86 02                LDA A  #2           SETUP
008F I B7 0018 R            STA A  CHRQST       INTERNAL
0092 I C6 20                LDA B  #$20         STORAGE
0094 I BD 0014 R            JSR    KYS2         AREA
0097 I FE 0004 R            LDX    TODTHR
009A I FF 000E R            STX    NDMXM2
009D I CE 029B I            LDX    #TDPHRS
00A0 I FF 0017 R            STX    MSGRQT
00A3 I C6 08                LDA B  #MSGTSV
00A5 I BD 0011 R            JSR    MSGOUT       OUTPUT HOURS
00A8 I FE 0002 R            LDX    TODTMN
00AB I FF 000E R            STX    NDMXM2
00AE I CE 02A4 I            LDX    #TDPMIN
00B1 I FF 0017 R            STX    MSGRQT
00B4 I C6 08                LDA B  #MSGTSV
00B6 I BD 0011 R            JSR    MSGOUT       OUTPUT MINUTES
00B9 I FE 0000 R            LDX    TODTSC
00BC I FF 000E R            STX    NDMXM2
00BF I CE 02AD I            LDX    #TDPSEC
00C2 I FF 0017 R            STX    MSGRQT
00C5 I C6 08                LDA B  #MSGTSV
00C7 I BD 0011 R            JSR    MSGOUT       OUTPUT SECONDS
00CA I FE 000C D            LDX    CALASM
00CD I FF 000E R            STX    NDMXM2
00D0 I CE 02B6 I            LDX    #TDPMNT
00D3 I FF 0017 R            STX    MSGRQT
00D6 I C6 08                LDA B  #MSGTSV
00D8 I BD 0011 R            JSR    MSGOUT       OUTPUT MONTH
00DB I FE 000E D            LDX    CALASD
00DE I FF 000E R            STX    NDMXM2
00E1 I CE 02BF I            LDX    #TDPDAY
00E4 I FF 0017 R            STX    MSGRQT
00E7 I C6 08                LDA B  #MSGTSV
00E9 I BD 0011 R            JSR    MSGOUT       OUTPUT DAY
00EC I FE 000B R            LDX    TODTYR
00EF I FF 000E R            STX    NDMXM2
00F2 I CE 02C8 I            LDX    #TDPYRS
00F5 I FF 0017 R            STX    MSGRQT
00F8 I C6 08                LDA B  #MSGTSV
00FA I BD 0011 R            JSR    MSGOUT       OUTPUT YEAR
00FD I 39                   RTS
                   *
                   *     ROUTINE TO CONVERT MONTH AND DAY TO DAY-OF-YEAR
                   *
                   *     CALLING SEQUENCE:  JSR  MDTDOY
                   *
```

```
               *       CALMNT => MONTH
               *       CALDAY => DAY
               *       CALYRS => YEAR
               *
               *       RETURN SEQUENCE:
               *
               *       CALDYR => DAY-OF-YEAR
               *
00FE I           MDTDOY  EQU    *
00FE I B6 0002 D         LDA A  CALMNT       SAVE CURRENT
0101 I B7 0020 R         STA A  SAVDT4       MONTH
0104 I 5F                CLR B               CLEAR
0105 I 4F                CLR A               ACCUMULATOR
0106 I CE 0204 I         LDX    #CALTAB-1    INIT CALENDAR TABLE PNTR
0109 I 7A 0020 R MDT1    DEC    SAVDT4
010C I 27 1B             BEQ    MDT2
010E I 08                INX
010F I EB 00             ADD B  0,X          INCR BY #
0111 I 89 00             ADC A  #0           DAYS/MONTH
0113 I 8C 0206 I         CPX    #CALTAB+1    FEBRUARY
0116 I 26 F1             BNE    MDT1         NO
0118 I 37                PSH B               SAVE ACCM
0119 I F6 0001 D         LDA B  CALYRS+1     PICK UP CURRENT YEAR
011C I 57                ASR B
011D I 25 01             BCS    MDT3
011F I 57                ASR B
0120 I 33        MDT3    PUL B               RESTORE ACCM
0121 I 25 E6             BCS    MDT1         JUMP IF NOT LEAP YEAR
0123 I CB 01             ADD B  #1
0125 I 89 00             ADC A  #0
0127 I 20 E0             BRA    MDT1
0129 I FB 0003 D MDT2    ADD B  CALDAY       INCR BY
012C I 89 00             ADC A  #0           DAY OF MONTH
012E I CE 0004 D         LDX    #CALDYR
0131 I A7 00             STA A  0,X
0133 I E7 01             STA B  1,X
0135 I 86 03             LDA A  #3
0137 I BD 0015 R         JSR    BINDEC
013A I CE 0006 R         LDX    #TODHDY
013D I B6 000F R         LDA A  NDMXM3
0140 I F6 000E R         LDA B  NDMXM2
0142 I 8A 30             ORA A  #$30
0145 I CA 30             ORA B  #$30
0147 I A7 00             STA A  0,X
0149 I E7 01             STA B  1,X
014B I B6 000D R         LDA A  NDMXM1
014E I A7 02             STA A  2,X
0150 I 39                RTS
               *
               *       ROUTINE TO CONVERT DAY OF YEAR TO MONTH AND DAY
               *
               *       CALLING SEQUENCE:   JSR  DOYTMD
               *
               *       CALDYR => HEX DAY OF YEAR
               *       CALYRS => HEX YEAR
               *
               *       RETURN SEQUENCE:
               *
               *       CALMNT => CURRENT MONTH
               *       CALDAY => CURRENT DAY
               *
0151 I           DOYTMD  EQU    *
0151 I 7F 0002 D         CLR    CALMNT       CLEAR MONTH CNTR
0154 I B6 0004 D         LDA A  CALDYR       INIT DAY
0157 I F6 0005 D         LDA B  CALDYR+1     CNTR
015A I CE 0204 I         LDX    #CALTAB-1    INIT CALENDAR TABLE PNTR
015D I 7C 0002 D DOY1    INC    CALMNT
0160 I 08                INX                 INCR TABLE PNTR
0161 I F7 001C R         STA B  SVDT42       SAVE CURRENT
0164 I B7 0020 R         STA A  SAVDT4       # DAYS REMAINGING
0167 I E0 00             SUB B  0,X          DECR # DAYS
0169 I 82 00             SBC A  #0           BY DAYS/MONTH
016B I 8C 0206 I         CPX    #CALTAB+1    FEBRUARY
016E I 26 0F             BNE    DOY2         NO
```

```
0170 I 37                   PSH B               SAVE CNTR
0171 I F6 0000 D            LDA B   CALYRS      PICK UP CURRENT YEAR
0174 I 57                   ASR B
0175 I 25 01                BCS     DOY3
0177 I 57                   ASR B
0178 I 33          DOY3     PUL B               RESTORE CNTR
0179 I 25 04                BCS     DOY2        JUMP IF NOT LEAP YEAR
017B I C0 01                SUB B   #1
017D I 82 00                SBC A   #0
017F I 4D          DOY2     TST A               DAY-OF-YEAR FALLS IN THIS MONTH
0180 I 2B 05                BMI     DOY4        YES
0182 I 26 D9                BNE     DOY1        NO
0184 I 5D                   TST B
0185 I 26 D6                BNE     DOY1        NO
0187 I F6 0010 R   DOY4     LDA B   SVDT42
018A I F7 0003 D            STA B   CALDAY      SET CURRENT DAY
018D I CE 0002 D            LDX     #CALMNT
0190 I 86 82                LDA A   #$82
0192 I BD 0015 R            JSR     BINDEC
0195 I CE 000C D            LDX     #CALASM
0198 I 8D 60                BSR     SCKCTR
019A I CE 0003 D            LDX     #CALDAY
019D I 86 82                LDA A   #$82
019F I BD 0015 R            JSR     BINDEC
01A2 I CE 000E D            LDX     #CALASD
01A5 I 8D 53                BSR     SCKCTR
01A7 I 39                   RTS
                   *
                   *        ROUTINE TO CONVERT CURRENT YEAR SETTING
                   *
01A8 I             TCVYRS   EQU     *
01A8 I CE 0009 R            LDX     #TODTHY     PICK UP TO MOST SIGNIFICANT DIGIT
01AB I 09                   DEX
01AC I FF 001E R            STX     DECNUM
01AF I CE 0000 D            LDX     #CALYRS     PICK UP PNTR TO CONV STORAGE APEA
01B2 I 86 04                LDA A   #4          SET # DIGITS TO CONVERT
01B4 I FF 001F R   TCV2     STX     CNVPTR      SET CONV PNTR
01B7 I B7 001B R            STA A   NUMCHR      SET # CHARS
01BA I BD 0016 R            JSR     DECBIN      CONVERT CLOCK SETTING
01BD I 39                   RTS
                   *
                   *        ROUTINE TO CONVERT DAY-OF-YEAR
                   *
01BE I             TCVDAY   EQU     *
01BE I CE 0006 R            LDX     #TODHDY     PNTR TO MOST
01C1 I 09                   DEX
01C2 I FF 001E R            STX     DECNUM      SIGNIFICANT DIGIT
01C5 I CE 0004 D            LDX     #CALDYR     PNTR TO CONV STORAGE AREA
01C8 I 86 03                LDA A   #3
01CA I 20 E8                BRA     TCV2        CONVERT DAY-OF-YEAR
                   *
                   *        ROUTINE TO CONVERT HOUR SETTING
                   *
01CC I             TCVHRS   EQU     *
01CC I CE 0004 R            LDX     #TODTHR     PNTR TO
01CF I 09                   DEX
01D0 I FF 001E R            STX     DECNUM      MOST SIGNIFICANT DIGIT
01D3 I CE 0006 D            LDX     #CALHRS     PNTR TO CONV STORAGE AREA
01D6 I 86 02       TCV1     LDA A   #2          SET # DIGITS TO CONVERT
01D8 I 20 DA                BRA     TCV2
                   *
                   *        ROUTINE TO CONVERT MINUTE SETTING
                   *
01DA I             TCVMIN   EQU     *
01DA I CE 0002 R            LDX     #TODTMN
01DD I 09                   DEX
01DE I FF 001E R            STX     DECNUM
01E1 I CE 0008 D            LDX     #CALMIN
01E4 I 20 F0                BRA     TCV1
                   *
                   *        ROUTINE TO CONVERT SECOND SETTING
                   *
01E6 I             TCVSEC   EQU     *
```

```
01E6 I CE 0000 R          LDX    #TODTSC
01E9 I 09                 DEX
01EA I FF 001E R          STX    DECNUM
01ED I CE 000A D          LDX    #CALSEC
01F0 I 20 E4              BRA    TCV1
                     *
                     *    ROUTINE TO SET TIME-OF-DAY CLOCK CNTR
                     *
                     *    CALLING SEQUENCE:   JSR  SCKCTR
                     *
                     *    IDX => CLOCK PARAMETER PNTR
                     *
01F2 I               SCKCT2   EQU    *
01F2 I B6 0010 R              LDA A  NDMXM4
01F5 I F6 000F R              LDA B  NDMXM3
01F8 I 20 06                  BRA    SCK1
01FA I               SCKCTR   EQU    *
01FA I B6 000E R              LDA A  NDMXM2
01FD I F6 000D R              LDA B  NDMXM1
0200 I A7 00         SCK1     STA A  0,X
0202 I E7 01                  STA B  1,X
0204 I 39                     RTS
                     *
                     *    DAYS PER MONTH LOOK-UP TABLE
                     *
0205 I               CALTAB   EQU    *
0205 I 1F                     FCB    31          JANUARY
0206 I 1C                     FCB    28          FEBRUARY
0207 I 1F                     FCB    31          MARCH
0208 I 1E                     FCB    30          APRIL
0209 I 1F                     FCB    31          MAY
020A I 1E                     FCB    30          JUNE
020B I 1F                     FCB    31          JULY
020C I 1F                     FCB    31          AUGUST
020D I 1E                     FCB    30          SEPTEMBER
020E I 1F                     FCB    31          OCTOBER
020F I 1E                     FCB    30          NOVEMBER
0210 I 1F                     FCB    31          DECEMBER
                     *
                     *    TIME OF DAY SERVICE MESSAGES
                     *
0211 I 02            TODHRM   FCB    2
0212 I 02                     FCB    2,25
0213 I 19
0214 I 0006     D             FDB    CALHRS
0216 I 10                     FCB    $10,2,16
0217 I 02
0218 I 10
0219 I 484F55                 FCC    /HOURS/
021E I 0E                     FCB    $E
021F I 001D     R             FDB    NUMMSG
0221 I 04                     FCB    4
0222 I 02            TODMNM   FCB    2
0223 I 03                     FCB    3,25
0224 I 19
0225 I 0008     D             FDB    CALMIN
0227 I 10                     FCB    $10,3,16
0228 I 03
0229 I 10
022A I 4D494E                 FCC    /MINUTES/
0231 I 0E                     FCB    $E
0232 I 001D     R             FDB    NUMMSG
0234 I 04                     FCB    4
0235 I 02            TODSCM   FCB    2
0236 I 04                     FCB    4,25
0237 I 19
0238 I 000A     D             FDB    CALSEC
023A I 10                     FCB    $10,4,16
023B I 04
023C I 10
023D I 534543                 FCC    /SECONDS/
0244 I 0E                     FCB    $E
0245 I 001D     R             FDB    NUMMSG
0247 I 04                     FCB    4
```

```
0248 I 82           349 TODMTM   FCB   $82
0249 I 02           350          FCB   2,8
024A I 08
024B I 0002    D    351          FDB   CALMNT
024D I 10           352          FCB   $10,2,0
024E I 02
024F I 00
0250 I 4D4F4E       353          FCC   /MONTH/
0255 I 0E           354          FCB   $E
0256 I 001D    R    355          FDB   NUMMSG
0258 I 04           356          FCB   4
0259 I 82           357 TODDYM   FCB   $82
025A I 03           358          FCB   3,8
025B I 08
025C I 0003    D    359          FDB   CALDAY
025E I 10           360          FCB   $10,3,0
025F I 03
0260 I 00
0261 I 444159       361          FCC   /DAY/
0264 I 0E           362          FCB   $E
0265 I 001D    R    363          FDB   NUMMSG
0267 I 04           364          FCB   4
0268 I 04           365 TODYRM   FCB   4
0269 I 04           366          FCB   4,8
026A I 08
026B I 0000    D    367          FDB   CALYRS
026D I 10           368          FCB   $10,4,0
026E I 04
026F I 00
0270 I 594541       369          FCC   /YEAR/
0274 I 0E           370          FCB   $E
0275 I 001D    R    371          FDB   NUMMSG
0277 I 04           372          FCB   4
0278 I 54494D       373 TIMDAT   FCC   /TIME:/
027D I 0D           374          FCB   $D
027E I 10           375          FCB   $10,1,9
027F I 01
0280 I 09
0281 I 3A           376          FCC   /:/
0282 I 10           377          FCB   $10,1,12
0283 I 01
0284 I 0C
0285 I 3A           378          FCC   /:/
0286 I 10           379          FCB   $10,1,16
0287 I 01
0288 I 10
0289 I 444154       380          FCC   /DATE:/
028E I 10           381          FCB   $10,1,25
023F I 01
0290 I 19
0291 I 2F           382          FCB   '/
0292 I 10           383          FCB   $10,1,28
0293 I 01
0294 I 1C
0295 I 2F           384          FCB   '/
0296 I 0D           385          FCB   $D,$D,$D,$D,4
0297 I 0D
0298 I 0D
0299 I 0D
029A I 04
029B I 82           386 TDPHRS   FCB   $82
029C I 01           387          FCB   1,7
029D I 07
029E I 0000    A    388          FDB   0
02A0 I 0E           389          FCB   $E
02A1 I 001D    R    390          FDB   NUMMSG
02A3 I 04           391          FCB   4
02A4 I 82           392 TDPMIN   FCB   $82
02A5 I 01           393          FCB   1,10
02A6 I 0A
02A7 I 0000    A    394          FDB   0
02A9 I 0E           395          FCB   $E
02AA I 001D    R    396          FDB   NUMMSG
02AC I 04           397          FCB   4
```

```
02AD I 82          398 TDPSEC    FCB    $82
02AE I 01          399           FCB    1,13
02AF I 0D
02B0 I 0000    A   400           FDB    0
02B2 I 0E          401           FCB    $E
02B3 I 001D    R   402           FDB    NUMMSG
02B5 I 04          403           FCB    4
02B6 I 82          404 TDPMNT    FCB    $82
02B7 I 01          405           FCB    1,23
02B8 I 17
02B9 I 0000    A   406           FDB    0
02BB I 0E          407           FCB    $E
02BC I 001D    R   408           FDB    NUMMSG
02BE I 04          409           FCB    4
02BF I 82          410 TDPDAY    FCB    $82
02C0 I 01          411           FCB    1,26
02C1 I 1A
02C2 I 0000    A   412           FDB    0
02C4 I 0E          413           FCB    $E
02C5 I 001D    R   414           FDB    NUMMSG
02C7 I 04          415           FCB    4
02C8 I 04          416 TDPYRS    FCB    4
02C9 I 01          417           FCB    1,29
02CA I 1D
02CB I 0000    A   418           FDB    0
02CD I 0E          419           FCB    $E
02CE I 001D    R   420           FDB    NUMMSG
02D0 I 04          421           FCB    4
0000 D             422           DSEC
                   423 *
                   424 *      STORAGE REQUIREMENTS FOR 'TODSVC'
                   425 *
0000 D 0000    A   426 CALYRS    FDB    0          YEAR
0001 D             427 CALYR1    EQU    *-1
0002 D 00          428 CALMNT    FCB    0          MONTH
0003 D 00          429 CALDAY    FCB    0          DAY
0004 D 0000    A   430 CALDYR    FDB    0          DAY-OF-YEAR
0005 D             431 CALDY1    EQU    *-1
0006 D 0000    A   432 CALHRS    FDB    0          HOURS
0007 D             433 CALHR1    EQU    *-1
0008 D 0000    A   434 CALMIN    FDB    0          MINUTES
0009 D             435 CALMN1    EQU    *-1
000A D 0000    A   436 CALSEC    FDB    0          SECONDS
000B D             437 CALSC1    EQU    *-1
000C D             438 CALASM    RMB    2          ASCII MONTH STORAGE
000D D             439 CALAM1    EQU    *-1
000E D             440 CALASD    RMB    2          ASCII DAY STORAGE
000F D             441 CALAD1    EQU    *-1
0010               442           END
> BINDEC     0015      19      19    174   229   234
< CALAD1     000F D   441       7
< CALAM1     000D D   439       7
< CALASD     000E D   440       7     54   119   235
< CALASM     000C D   438       7     48   113   230
< CALDAY     0003 D   429       5      5   168   226   232   359
< CALDY1     0005 D   431       5
< CALDYR     0004 D   430       5    170   200   201   258
< CALHR1     0007 D   433       6
< CALHRS     0006 D   432       5    268   327
< CALMIN     0008 D   434       6    278   335
< CALMN1     0009 D   435       6
< CALMNT     0002 D   428       5    146   199   203   227   351
< CALSC1     000B D   437       6
< CALSEC     000A D   436       6      6   287   343
  CALTAB     0205 I   309     150    156   202   209
< CALYR1     0001 D   427       5
< CALYRS     0000 D   426       5    159   212   245   367
> CHRGST     0018      21      21     92
> CNVPTR     001F      23      23    247
> DECBIN     0016      19      19    249
> DECNUM     001E      23      23    244   257   267   277   286
> DISPLY     0013      19      19     90
  DOY1       015D I   203     222    224
  DOY2       017F I   220     210    217
```

```
  DOY3      0178 I   216    214
  DOY4      0187 I   225    221
< DOYTMD    0151 I   198      9    42
> EXECTV    0012      19     19    84
> KYS2      0014      19     19    94
> MAXDG     001A      21     21
  MDT1      0109 I   151    157   164   167
  MDT2      0129 I   168    152
  MDT3      0120 I   163    161
  MDTDOY    00FE I   145     82
> MSGOUT    0011      19     19    47    53    59    67    73    79   100   106   112   118   124
                            130
> MSGRQT    0017      21     21    45    51    57    65    71    77    98   104   110   116   122
                            128
  MSGTBF    0020 A    30     46    52    58    66    72    78
  MSGTCV    0080 A    28     46    52    58    66    72    78
  MSGTIP    0040 A    29     46    52    58    66    72    78
  MSGTPS    0010 A    31
  MSGTSV    0008 A    32     99   105   111   117   123   129
> NDMXM1    000D      15     15   182   302
> NDMXM2    000E      15     15    96   102   108   114   120   126   177   301
> NDMXM3    000F      15     15   176   298
> NDMXM4    0010      16     16   297
> NUMCHR    001B      21     21   248
> NUMD      0019      21     21
> NUMMSG    001D      22     22   331   339   347   355   363   371   390   396   402   408   414
                            420
> SAVDT4    0020      23     23   147   151   206
  SCK1      0200 I   303    299
  SCKCT2    01F2 I   296     61
  SCKCTR    01FA I   300     49    55    63    69    75    81   231   236
> SVDT42    001C      22     22   205   225
  TCV1      01D6 I   269    279   288
  TCV2      01B4 I   247    260   270
< TCVDAY    01BE I   254      8    38
< TCVHRS    01CC I   264      8    39
< TCVMIN    01DA I   274      8    40
< TCVSEC    01E6 I   283      8    41
< TCVYRS    01A8 I   241      8    37
  TDPDAY    02BF I   410    121
  TDPHRS    029B I   386     97
  TDPMIN    02A4 I   392    103
  TDPMNT    02B6 I   404    115
  TDPSEC    02AD I   398    109
  TDPYRS    02C8 I   416    127
  TIMDAT    0278 I   373     89
  TODDSP    0087 I    88     43    83
  TODDYM    0259 I   357     50
> TODHDY    0006      13     13   175   255
  TODHRM    0211 I   325     64
> TODHYR    000A      13     13
  TODMNM    0222 I   333     70
  TODMTM    0248 I   349     44
  TODSCM    0235 I   341     76
< TODSVC    0000 I    36      4
> TODTDY    0007      13     13
> TODTHR    0004      12     12    68    95   265
> TODTHY    0009      13     13    60   242
> TODTMN    0002      12     12    74   101   275
> TODTSC    0000      12     12    80   107   284
> TODTYR    000B      14     14    62   125
> TODUDY    0008      13     13
> TODUHR    0005      12     12
> TODUMN    0003      12     12
> TODUSC    0001      12     12
> TODUYR    000C      14     14
  TODYRM    0268 I   365     56
0000 I               2          ISEC
                     3 *
                     4          DEF      DISPDP
                     5 *
                     6          REF      CURCSP
                     7          REF      ROLSTS
                     8 *
```

```
                        9 *       ROLL-ALONG DISPLAY STATUS WORD EQUATES
                       10 *
0040 A                 11 ROLDSP    EQU     $40          DISPLAY DEPLOYMENT INDICATOR
                       12 *
                       13 *
                       14 *
                       15 *
                       16 *       LINE STATUS FLAGS EQUATES
                       17 *
000C A                 18 LCAST1    EQU     12           LINE STATUS FLAGS (BYTE 1)
0040 A                 19 LSTMSF    EQU     $40          MOMENTARY SWITCH FLAG
                       20 *       CENTRAL RECORDING STATION DISPLAY DEPLOYMENT ROUTINE
                       21 *
0000 I                 22 DISPDP    EQU     *
0000 I F6 0001 R       23           LDA B   ROLSTS       LOAD ROLL-ALONG STATUS WORD
0003 I C5 40           24           BIT B   #ROLDSP
0005 I 27 09           25           BEQ     DIS1
0007 I FE 0000 R       26           LDX     CURCSP       RESET
000A I A6 0C           27           LDA A   LCAST1,X     MOMENTARY
000C I 84 BF           28           AND A   #-1-LSTMSF   SWITCH
000E I A7 0C           29           STA A   LCAST1,X     FLAG
0010 I C8 40           30 DIS1      EOR B   #ROLDSP      TOGGLE DISPLAY FLAG
0012 I F7 0001 R       31           STA B   ROLSTS
0015 I 3B              32           RTI                  RETURN TO INTERRUPTED ROUTINE
0016                   33           END
   NO ERRORS
  ISECT LENGTH --      22
  DSECT LENGTH --       0

> CURCSP    0000      6      6     26
  DIS1      0010 I   30     25
< DISPDP    0000 I   22      4
  LCAST1    000C A   18     27     29
  LSTMSF    0040 A   19     28
  ROLDSP    0040 A   11     24     30
> ROLSTS    0001      7      7     23     31
0000 I                  2           ISEC
                        3 *
                        4           DEF     STAIDT
                        5           DEF     IDTMSG
                        6 *
                        7           REF     STNADR,RTUADR,CHNADR,MSGRQT,CHKIDS,CURCSP
                        8           REF     NUMMSG,RTUFLA
                        9 *
                       10           REF     MSGOUT,SELIDX,CHKDEP,DISPLY,DEPYX,ADPICP
                       11 *
                       12 *
                       13 *       MAXIMUM NUMBER DIGITS FOR DEPLOY PARAMETERS
                       14 *
0003 A                 15 RTUNDG    EQU     3            RTU ADDRESS
0001 A                 16 CHNNDG    EQU     1            CHANNEL ADDRESS
0004 A                 17 STNNDG    EQU     4            STATION NUMBER
                       18 *
                       19 *       MESSAGE REQUEST TYPE
                       20 *
0080 A                 21 MSGTCV    EQU     $80          CONVERT AND DISPLAY OLD VALUE
0040 A                 22 MSGTIP    EQU     $40          INPUT AND DISPLAY NEW VALUE
0020 A                 23 MSGTBF    EQU     $20          SET BLANK FLAG
0010 A                 24 MSGTPS    EQU     $10          CONVERSION PNTR ALREADY SET
0008 A                 25 MSGTSV    EQU     8            CONVERTED VALUE STORED READY FOR DISPLAY
                       26 *
0016 A                 27 LCASTN    EQU     22           LAST STATION DEPLOYED FOR THIS LINE & SHOO
                       28 *
                       29 *       CENTRAL RECORDING STATION STATION IDENTIFICATION ROUTINE
                       30 *
0000 I                 31 STAIDT    EQU     *
0000 I CE 0097 I       32           LDX     #GSIMSG
0003 I BD 000B R       33           JSR     DISPLY
0006 I FE 0005 R       34           LDX     CURCSP       DISPLAY LAST STATION NUMBER DEPLOYED
0009 I EE 16           35           LDX     LCASTN,X
000B I FF 0000 R       36           STX     STNADR
000E I CE 00B9 I       37 STA2      LDX     #IDTMSG      INPUT
0011 I FF 0003 R       38           STX     MSGRQT       STATION
0014 I C6 E0           39           LDA B   #MSGTIP+MSGTCV+MSGTBF
0016 I BD 0008 R       40           JSR     MSGOUT       NUMBER
```

```
0019 I FE 0000 R   41           LDX    STNADR      EXIT
001C I 27 10       42           BEQ    STAX        YES
001E I BD 0009 R   43           JSR    SELIDX      COMPUTE PNTR INTO DEPLOYMENT TABLE
0021 I 26 05       44           BNE    STA3
0023 I BD 000A R   45           JSR    CHKDEP      STATION DEPLOYED ?
0026 I 26 12       46           BNE    STA1        YES
0028 I CE 00D4 I   47 STA3      LDX    #STNNDP     DISPLAY DEPLOYMENT
002B I BD 000B R   48           JSR    DISPLY      ERROR
002E I CE 0134 I   49 STAX      LDX    #STAIDC
0031 I BD 000B R   50           JSR    DISPLY
0034 I FE 0005 R   51           LDX    CURCSP
0037 I 7E 000C R   52           JMP    DEPYX
003A I BD 000D R   53 STA1      JSR    ADPICP      PICK UP ASSOCIATED RTU AND CHANNEL ADDRESS
003D I B7 0001 R   54           STA A  RTUADR      SAVE
0040 I F7 0002 R   55           STA B  CHNADR      ADDRESSES
0043 I CE 00EA I   56           LDX    #IDRMSG     RTU
0046 I FF 0003 R   57           STX    MSGRQT
0049 I C6 80       58           LDA B  #MSGTCV
004B I BD 0008 R   59           JSR    MSGOUT      ADDRESS
004E I 7D 0001 R   60           TST    RTUADR
0051 I 26 06       61           BNE    STA4
0053 I CE 0073 I   62           LDX    #AFCMSG     DUMMY
0056 I BD 000B R   63           JSR    DISPLY      RTU
0059 I CE 0120 I   64 STA4      LDX    #IDCMSG
005C I FF 0003 R   65           STX    MSGRQT
005F I C6 80       66           LDA B  #MSGTCV
0061 I BD 0008 R   67           JSR    MSGOUT      NUMBER
0064 I FE 0004 R   68           LDX    CHKIDS
0067 I 6D 00       69           TST    0,X         DEAD CHANNEL ?
0069 I 2A A3       70           BPL    STA2
006B I CE 0084 I   71           LDX    #SKCHMG
006E I BD 000B R   72           JSR    DISPLY
0071 I 20 9B       73           BRA    STA2        CONTINUE
                   74 *
                   75 *      STATION ID ROUTINE ID
                   76 *
0073 I 10          77 AFCMSG    FCB    $10,3,18
0074 I 03
0075 I 12
0076 I 284152      78           FCC    /(ARTIFICIAL)/
0082 I 0D          79           FCB    $D,4
0083 I 04
0084 I 10          80 SKCHMG    FCB    $10,4,14
0085 I 04
0086 I 0E
0087 I 284445      81           FCC    /(DEAD CHANNEL)/
0095 I 0D          82           FCB    $D,4
0096 I 04
0097 I 47524F      83 GSIMSG    FCC    /GROUND STATION IDENTIFICATION/
00B4 I 0D          84           FCB    $D,$D,$D,$D,4
00B5 I 0D
00B6 I 0D
00B7 I 0D
00B8 I 04
00B9 I 04          85 IDTMSG    FCB    STNNDG
00BA I 02          86           FCB    2,16        DISPLAY CO-ORDINATES
00BB I 10
00BC I 0000    R   87           FDB    STNADR
00BE I 10          88           FCB    $10,2,0
00BF I 02
00C0 I 00
00C1 I 535441      89           FCC    /STATION NUMBER/
00CF I 0D          90           FCB    $D,$E
00D0 I 0E
00D1 I 0006    R   91           FDB    NUMMSG
00D3 I 04          92           FCB    4
00D4 I 535441      93 STNNDP    FCC    /STATION NOT DEPLOYED/
00E8 I 0D          94           FCB    $D,4
00E9 I 04
00EA I 03          95 IDRMSG    FCB    RTUNDG
00EB I 03          96 RTUADF    FCB    3,11        DISPLAY CO-ORDINATES
00EC I 0B
00ED I 0007    R   97           FDB    RTUFLA
00EF I 10          98           FCB    $10,3,0
00F0 I 03
00F1 I 00
```

```
00F2 I 525455       99            FCC    /RTU NUMBER/
00FC I 0D          100            FCB    $D,$E
00FD I 0E
00FE I 0006    R   101            FDB    NUMMSG
0100 I 04          102            FCB    4
0101 I 10          103 SNDMSG     FCB    $10,1,0
0102 I 01
0103 I 00
0104 I 535441      104            FCC    /STATION NOT DEPLOYED/
0118 I 0D          105            FCB    $D,$E
0119 I 0E
011A I 0006    R   106            FDB    NUMMSG
011C I 0D          107            FCB    $D,$D,$D,4
011D I 0D
011E I 0D
011F I 04
0120 I 81          108 IDCMSG     FCB    CHNNDG+$80
0121 I 04          109 CHNADF     FCB    4,8          DISPLAY C/-/RDINATES
0122 I 08
0123 I 0002    R   110            FDB    CHNADR
0125 I 10          111            FCB    $10,4,0
0126 I 04
0127 I 00
0128 I 434841      112            FCC    /CHANNEL/
012F I 0D          113            FCB    $D,$E
0130 I 0E
0131 I 0006    R   114            FDB    NUMMSG
0133 I 04          115            FCB    4
0134 I 535441      116 STAIDC     FCC    /STATION ID COMPLETE/
0147 I 0D          117            FCB    $D,$D,$D,$D,4
0148 I 0D
0149 I 0D
014A I 0D
014B I 04
                   118 *
014C               119            END
    NO ERRORS
  ISECT LENGTH --   332
  DSECT LENGTH --     0
> ADPICP    000D     10     10    53
  AFCMSG    0073 I   77     62
> CHKDEP    000A     10     10    45
> CHKIDS    0004      7      7    68
  CHNADF    0121 I  109
> CHNADR    0002      7      7    55   110
  CHNNDG    0001 A   16    108
> CURCSP    0005      7      7    34    51
> DEPYX     000C     10     10    52
> DISPLY    000B     10     10    33    48    50    63    72
  GSIMSG    0097 I   83     32
  IDCMSG    0120 I  108     64
  IDRMSG    00EA I   95     56
< IDTMSG    00B9 I   85      5    37
  LCASTN    0016 A   27     35
> MSGOUT    0008     10     10    40    59    67
> MSGRQT    0003      7      7    38    57    65
  MSGTBF    0020 A   23     39
  MSGTCV    0080 A   21     39    58    66
  MSGTIP    0040 A   22     39
  MSGTPS    0010 A   24
  MSGTSV    0008 A   25
> NUMMSG    0006      8      8    91   101   106   114
  RTUADF    00EB I   96
> RTUADR    0001      7      7    54    60
> RTUFLA    0007      8      8    97
  RTUNDG    0003 A   15     95
> SELIDX    0009     10     10    43
  SKCHMG    0084 I   80     71
  SNDMSG    0101 I  103
  STA1      003A I   53     46
  STA2      000E I   37     70    73
  STA3      0028 I   47     44
  STA4      0059 I   64     61
  STAIDC    0134 I  116     49
< STAIDT    0000 I   31      4
  STAX      002E I   49     42
```

```
> STNADR    0000      7      7     36     41     87
  STNNDG    0004 A   17     85
  STNNDP    00D4 I   93     47

0000 I                  2           ISEC
                        3 *
                        4           DEF     RTUIDT
                        5           DEF     IDTRTU,IDTLNM
                        6 *
                        7           REF     CHNADR,CHRCNT,RTUADR,CURCSP,DEPSAR,STNADR
                        8           REF     STNMP8
                        9           REF     MSGRQT,STNMAP,STNMPT,LINSAV,NUMMSG
                       10           REF     RTUFLA
                       11 *
                       12           REF     DISPLY,MSGOUT,CHKRDP,RTSMAP,DPLRTU,CPCTIX
                       13           REF     SELID2,CHKDEP
                       14           REF     DEPYX
                       15 *
                       16 *     MAXIMUM # DIGITS FOR DEPLOYMENT PARAMTERS
                       17 *
0003 A                 18 RTUNDG    EQU     3               RTU ADDRESS
0001 A                 19 CHNNDG    EQU     1               CHANNEL ADDRESS
                       20 *
                       21 *
                       22 *     MESSAGE REQUEST TYPE
                       23 *
0080 A                 24 MSGTCV    EQU     $80             CONVERT AND DISPLAY OLD VALUE
0040 A                 25 MSGTIP    EQU     $40             INPUT AND DISPLAY NEW VALUE
0020 A                 26 MSGTBF    EQU     $20             SET BLANK FLAG
0010 A                 27 MSGTPS    EQU     $10             CONVERSION PNTR ALREADY SET
0008 A                 28 MSGTSV    EQU     8               CONVERTED VALUE STORED READY FOR DISPLAY
0004 A                 29 MSGTRC    EQU     4               RETRY OR CONTINUE
                       30 *
000C A                 31 LCAST1    EQU     12              LINE STATUS FLAGS (BYTE 1)
0020 A                 32 LSTPRG    EQU     $20             FIRE SEQUENCE PROGARMMED
                       33 *
                       34 *     CENTRAL RECORDING STATION RTU INDENTIFICATION ROUTINE
                       35 *
0000 I                 36 RTUIDT    EQU     *
0000 I CE 00EE I       37           LDX     #RTUIDM         DISPLAY IDENTIFICATION
0003 I BD 000D R       38           JSR     DISPLY          MESSAGE
0006 I 7F 0000 R       39           CLR     CHNADR          CLEAR DISPLAY CNTR
0009 I CE 0105 I       40 RTI4      LDX     #IDTRTU
000C I FF 0007 R       41           STX     MSGRQT
000F I C6 E0           42           LDA B   #MSGTIP+MSGTBF+MSGTCV
0011 I BD 000E R       43           JSR     MSGOUT          REQUEST RTU NUMBER
0014 I 7D 0000 R       44           TST     CHNADR          SKIP STATUS
0017 I 27 05           45           BEQ     RTIA            CHECK IF 1ST ENTRY
0019 I 7D 0001 R       46           TST     CHRCNT          DISPLAY CHANNEL STATUS
001C I 27 44           47           BEQ     RTI2            YES
001E I B6 0002 R       48 RTIA      LDA A   RTUADR          EXIT
0021 I 27 0A           49           BEQ     RTIX            YES
0023 I BD 000F R       50           JSR     CHKRDP          RTU DEPLOYED
0026 I 26 0E           51           BNE     RTI1            YES
0028 I CE 01B7 I       52           LDX     #RTUNDP         DISPLAY RTU
002B I 20 03           53           BRA     RTIXA           NOT DEPLOYED
002D I CE 00CE I       54 RTIX      LDX     #RTUIDC
0030 I BD 000D R       55 RTIXA     JSR     DISPLY
0033 I 7E 0015 R       56           JMP     DEPYX           INITIATE NEXT SEQUENCE
0036 I F7 0004 R       57 RTI1      STA B   DEPSAR          SAVE LINE # FOR DISPLAY
0039 I EE 01           58           LDX     1,X
003B I FF 0005 R       59           STX     STNADR          SAVE STATION NUMBER
003E I BD 0010 R       60           JSR     RTSMAP          SET UP RTU STATION MAP FOR DISPLAY
0041 I CE 011B I       61           LDX     #IDTLNM
0044 I FF 0007 R       62           STX     MSGRQT
0047 I C6 80           63           LDA B   #MSGTCV
0049 I BD 000E R       64           JSR     MSGOUT          DISPLAY RTU LINE #
004C I BD 0011 R       65           JSR     DPLRTU          DISPLAY CHANNEL ASSIGNMENTS
004F I 86 05           66           LDA A   #5              SET U
0051 I B7 0000 R       67           STA A   CHNADR          FOR CHANNEL
0054 I CE 0006 R       68           LDX     #STNMP8         INFORMATION
0057 I FF 0009 R       69           STX     STNMPT          DISPLAY
005A I CE 0132 I       70           LDX     #STNSTS         DEPRESS ENTER
005D I BD 000D R       71           JSR     DISPLY          TO DISPLAY STATION STATUS
0060 I 20 A7           72           BRA     RTI4
0062 I 7A 0000 R       73 RTI2      DEC     CHNADR          LAST CHANNEL DISPLAYED
0065 I 2F 99           74           BLE     RTUIDT          YES, REQUEST NEW RTU
```

```
0067 I CE 0153 I              LDX    #RTCHDP
006A I FF 0007 R              STX    MSGRQT
006D I C6 80                  LDA B  #MSGTCV
006F I BD 000E R              JSR    MSGOUT      DISPLAY CHANNEL #
0072 I FE 0009 R              LDX    STNMPT
0075 I 09                     DEX
0076 I 09                     DEX
0077 I FF 0009 R              STX    STNMPT
007A I EE 00                  LDX    0,X         PICK UP STATION #
007C I 26 08                  BNE    RTI3        CONTINUE IF NOT UNUSED CHANNEL
007E I CE 0168 I              LDX    #RTDDCH     DISPLAY UNUSED CHANNEL MSG
0081 I BD 000D R      RTI5    JSR    DISPLY      DISPLAY CHANNEL TYPE
0084 I 20 83                  BRA    RTI4        CONTINUE
0086 I FF 0005 R      RTI3    STX    STNADR      SAVE STATION #
0089 I F6 0004 R              LDA B  DEPSAR      PICK UP LINE #
008C I BD 0012 R              JSR    CPCTIX
008F I FE 000A R              LDX    LINSAV
0092 I EE 02                  LDX    2,X         PICK UP DEPLOYMENT PNTR
0094 I BD 0013 R              JSR    SELID2
0097 I BD 0014 R              JSR    CHKDEP
009A I A6 00                  LDA A  0,X         DEAD CHANNEL
009C I 2A 05                  BPL    RTI6
009E I CE 017C I              LDX    #RTSKCH     DISPLAY DEAD
00A1 I 20 DE                  BRA    RTI5        CHANNEL MESG
00A3 I 86 02          RTI6    LDA A  #2
00A5 I 4A             RTI8    DEC A
00A6 I 2B 21                  BMI    RTI9        NOT BLASTER
00A8 I FE 000A R              LDX    LINSAV
00AB I EE 04                  LDX    4,X         PICK UP PNTR TO SHOOTER PARAMS
00AD I E6 0C                  LDA B  LCAST1,X
00AF I C5 20                  BIT B  #LSTPRG     FIRE SEQUENCE PROGRAMMED
00B1 I 27 07                  BEQ    RTI9A       NO, NOT BLASTER
00B3 I EE 00                  LDX    0,X         CHANNEL ASSIGNED
00B5 I BC 0005 R              CPX    STNADR      TO SHOT PT
00B8 I 27 0A                  BEQ    RTI7        YES
00BA I FE 000A R      RTI9A   LDX    LINSAV
00BD I 08                     INX
00BE I 08                     INX
00BF I FF 000A R              STX    LINSAV
00C2 I 20 E1                  BRA    RTI8        CONTINUE
00C4 I CE 018E I      RTI7    LDX    #RTBLCH     BLASTER
00C7 I 20 B8                  BRA    RTI5        CHANNEL
00C9 I CE 01A3 I      RTI9    LDX    #RTUNCH     NORMAL
00CC I 20 B3                  BRA    RTI5        CHANNEL
                      *
                      *      RTU IDENTIFICATION MESSAGES
                      *
00CE I 525455         RTUIDC  FCC    /RTU IDENTIFICATION COMPLETE/
00E9 I 0D                     FCB    $D,$D,$D,$D,4
00EA I 0D
00EB I 0D
00EC I 0D
00ED I 04
00EE I 525455         RTUIDM  FCC    /RTU IDENTIFICATION/
0100 I 0D                     FCB    $D,$D,$D,$D,4
0101 I 0D
0102 I 0D
0103 I 0D
0104 I 04
0105 I 03             IDTRTU  FCB    RTUNDG
0106 I 02                     FCB    2,11
0107 I 0B
0108 I 000C     R             FDB    RTUFLA
010A I 10                     FCB    $10,2,0
010B I 02
010C I 00
010D I 525455                 FCC    /RTU NUMBER/
0117 I 0E                     FCB    $E
0118 I 000B     R             FDB    NUMMSG
011A I 04                     FCB    4
011B I 81             IDTLNM  FCB    $81
011C I 02                     FCB    2,29
011D I 1D
011E I 0004     R             FDB    DEPSAR
```

```
0120 I 10           137          FCB    $10,2,15
0121 I 02
0122 I 0F
0123 I 4C494E       138          FCC    /LINE NUMBER/
012E I 0E           139          FCB    $E
012F I 000B    R    140          FDB    NUMMSG
0131 I 04           141          FCB    4
0132 I 505245       142 STNSTS   FCC    /PRESS ENTER TO DISPLAY CHANNELS/
0151 I 0D           143          FCB    $D,4
0152 I 04
0153 I 81           144 RTCHDP   FCB    CHNNDG+$80
0154 I 03           145          FCB    3,8
0155 I 08
0156 I 0000    R    146          FDB    CHNADR
0158 I 10           147          FCB    $10,3,0
0159 I 03
015A I 00
015B I 434841       148          FCC    /CHANNEL/
0162 I 0D           149          FCB    $D,$D,$E
0163 I 0D
0164 I 0E
0165 I 000B    R    150          FDB    NUMMSG
0167 I 04           151          FCB    4
0168 I 10           152 RTDDCH   FCB    $10,3,10
0169 I 03
016A I 0A
016B I 28554E       153          FCC    /(UNUSED CHANNEL)/
017B I 04           154          FCB    4
017C I 10           155 RTSKCH   FCB    $10,3,10
017D I 03
017E I 0A
017F I 284445       156          FCC    /(DEAD CHANNEL)/
018D I 04           157          FCB    4
018E I 10           158 RTBLCH   FCB    $10,3,10
018F I 03
0190 I 0A
0191 I 28424C       159          FCC    /(BLASTER CHANNEL)/
01A2 I 04           160          FCB    4
01A3 I 10           161 RTUNCH   FCB    $10,3,10
01A4 I 03
01A5 I 0A
01A6 I 284E4F       162          FCC    /(NORMAL CHANNEL)/
01B6 I 04           163          FCB    4
01B7 I 525455       164 RTUNDP   FCC    /RTU NOT DEPLOYED/
01C7 I 0D           165          FCB    $D,4
01C8 I 04
01C9                166          END
    NO ERRORS
  ISECT LENGTH --    457
  DSECT LENGTH --      0

> CHKDEP    0014      13     13    94
> CHKRDP    000F      12     12    50
> CHNADR    0000       7      7    39    44    67    73   146
  CHNNDG    0001 A    19    144
> CHRCNT    0001       7      7    46
> CPCTIX    0012      12     12    90
> CURCSP    0003       7      7
> DEPSAR    0004       7      7    57    89   136
> DEPYX     0015      14     14    56
> DISPLY    000D      12     12    38    55    71    86
> DPLRTU    0011      12     12    65
< IDTLNM    011B I   134      5    61
< IDTRTU    0105 I   126      5    40
  LCAST1    000C A    31    104
> LINSAV    000A       9      9    91   102   110   113
  LSTPRG    0020 A    32    105
> MSGOUT    000E      12     12    43    64    78
> MSGRQT    0007       9      9    41    62    76
  MSGTBF    0020 A    26     42
  MSGTCV    0080 A    24     42    63    77
  MSGTIP    0040 A    25     42
  MSGTPS    0010 A    27
  MSGTRC    0004 A    29
```

```
   MSGTSV   0008 A    28
 > NUMMSG   000B       9     9    132    140    150
   RTBLCH   018E I   158   115
   RTCHDP   0153 I   144    75
   RTDDCH   0168 I   152    85
   RTI1     0036 I    57    51
   RTI2     0062 I    73    47
   RTI3     0086 I    88    84
   RTI4     0009 I    40    72     87
   RTI5     0081 I    86    98    116    118
   RTI6     00A3 I    99    96
   RTI7     00C4 I   115   109
   RTI8     00A5 I   100   114
   RTI9     00C9 I   117   101
   RTI9A    00BA I   110   106
   RTIA     001E I    48    45
   RTIX     002D I    54    49
   RTIXA    0030 I    55    53
   RTSKCH   017C I   155    97
 > RTSMAP   0010      12    12     60
 > RTUADR   0002       7     7     48
 > RTUFLA   000C      10    10    128
   RTUIDC   00CE I   122    54
   RTUIDM   00EE I   124    37
 < RTUIDT   0000 I    36     4     74
   RTUNCH   01A3 I   161   117
   RTUNDG   0003 A    18   126
   RTUNDP   01B7 I   164    52
 > SELID2   0013      13    13     93
 > STNADR   0005       7     7     59     88    108
 > STNMAP   0008       9     9
 > STNMP8   0006       8     8     68
 > STNMPT   0009       9     9     69     79     82
   STNSTS   0132 I   142    70
                      2 *
                      3 *      CENTRAL RECORDING STATION DEPLOYMENT ROUTINE
                      4 *
0000 I                5             ISEC
                      6 *
                      7             DEF     DEPLOY
                      8             DEF     LOOPFG
                      9             DEF     DEPYX
                     10             DEF     DEPIDX,DEPSAR
                     11             DEF     SAVDTI,SVDTI2
                     12             DEF     IDXSAV,IDXSV2
                     13             DEF     SAVDT2,SVDT22,SAVDT3,SVDT32,SAVDT4,SVDT42
                     14             DEF     DEPFLG,DEPOVL,DEPSKP,DEP2IG,DEPFSN
                     15             DEF     RDYFIR
                     16 *
                     17             DEF     STNSAV,STNSV2,RTUSAV
                     18 *
                     19 *
                     20             REF     RTUFLA,RTUADR,STNADR,CHNADR
                     21             REF     STNAD2
                     22             REF     MSGRQT,CHRCNT,CHKIDS,LINSAV
                     23             REF     PIAKCR
                     24             REF     CURCSP,CURLIN
                     25             REF     TMRBTV,BNDSTR,BNDEND,CMPPR1,CMPPR2
                     26             REF     TMRBCA
                     27             REF     RCTACK,RCTSST
                     28             REF     FSQNPG,NUMMSG
                     29             REF     TFMCNT
                     30             REF     RACTLS,RCMAPT
                     31 *
                     32             REF     DISPLY,EXECTV,CHKRDP,RTSMAP,DPLRTU,MSGOUT
                     33             REF     RTUPDR,SELIDX,CHKDEP,DLPUPD
                     34             REF     RTSTAT,RTUCMD,NRMTST,SEQTST,CLRPRG
                     35             REF     DEXRTN,IDXRTN,CMPRTN
                     36             REF     INX4
                     37             REF     LITOFF
                     38             REF     TMRCDV
                     39 *
                     40 *      DEPLOYMENT TABLE OFFSETS
```

```
                 *
0006 A           DPTDT1   EQU   6         DEPLOYMENT TABLE 1
00CE A           DPTDT2   EQU   206       DEPLOYMENT TABLE 2
                 *
                 *        CURRENT LINE CONTROL STORAGE OFFSETS
                 *
0000 A           LCASPT   EQU   0         SHOT POINT STATION
0002 A           LCANRS   EQU   2         # STATIONS NOT RECORDED EACH SIDE OF S. P.
0003 A           LCARSR   EQU   3         # RECORDING STATIONS TO 1ST RECORDING STN
0004 A           LCABBR   EQU   4         TOTAL # STATIONS TO 1ST RECORDING STATION
0005 A           LCATRS   EQU   5         TOTAL # RECORDING STATIONS
                 *
                 *             PARAMETER SAVE AREA FOR ADVANCE KEY RESET FUNCTION
                 *
0006 A           LCASP1   EQU   6
0008 A           LCASP2   EQU   8
0009 A           LCASP3   EQU   9
000A A           LCASP4   EQU   10
000B A           LCASP5   EQU   11
                 *
                 *             LINE STATUS FLAGS
                 *
000C A           LCAST1   EQU   12        STATUS FLAGS
000D A           LCAST2   EQU   13        STATUS FLAGS BYTE 2
000E A           LCAST3   EQU   14
000F A           LCAST4   EQU   15        STATUS FLAGS BYTE 4
0010 A           LCAMDE   EQU   16        LINE MODE
0011 A           LCAPAR   EQU   17        PARITY COUNT
0012 A           LCADTB   EQU   18        TIME BREAK
0013 A           LCASPL   EQU   19        KEYBOARD LITES
0014 A           LCADPM   EQU   20        ADDR OF START OF DEPLOYMENT MAP
0016 A           LCASTN   EQU   22        LAST STN # DEPLOYED FOR THIS LINE AND SHOO
0018 A           LCASBT   EQU   24        ROLL ALONG DISPLAY PARAMETERS
0019 A           LCASHA   EQU   25        ROLL ALONG DISPLAY PARAMETERS
                 *
                 *        LINE STATUS FLAGS (BYTE 1)
                 *
0080 A           LSTEMF   EQU   $80       EXECUTIVE MODE
0040 A           LSTMSF   EQU   $40       MOMENTARY SWITCH FLAG
0020 A           LSTPRG   EQU   $20       FIRE SEQUENCE PROGRAMMED
0010 A           LSTTBP   EQU   $10       TAPE BY-PASS
0008 A           LSTCBP   EQU   8         CAMERA BY-PASS
0004 A           LSTEOT   EQU   4         END-OF-TAPE
0002 A           LSTMMO   EQU   2         MULTIPLE MONITOR OUTPUT REQUEST
0001 A           LSTMTP   EQU   1         MULTIPLE NORMAL TEST PASSED
                 *
                 *        LINE STATUS FLAGS (BYTE 2)
                 *
0080 A           LS2DKR   EQU   $80       DECIMAL KEY REQUEST PENDING
0040 A           LS2RCP   EQU   $40       DECIMAL KEY REQUEST COMPLETE
0020 A           LS2BFD   EQU   $20       BLANK FIELD IN DECIAML REQUEST
0010 A           LS2RCR   EQU   $10       RETRY OR CONTINUE DECIMAL KEY ENTRY
0008 A           LS2TIP   EQU   8         MULTIPLE NORMAL TEST-IN-PROGRESS
0004 A           LS2NTP   EQU   4         NORMAL TEST-IN-PROGRESS
0002 A           LS2BTP   EQU   2         BLAST TEST-IN-PROGRESS
0001 A           LS2TSP   EQU   1         TILT SEARCH-IN-PROGRESS
                 *
                 *        LINE STATUS FLAG EQUATES (BYTE 3)
                 *
0080 A           LS3BVT   EQU   $80       UNIT STATUS DISPLAY TOGGLE
0040 A           LS3BLE   EQU   $40       BLASTER ERROR
0020 A           LS3MTT   EQU   $20       MANUAL TEST FLAG
0010 A           LS3STF   EQU   $10       SINGLE TEST FLAG
0008 A           LS3NEF   EQU   8         NORMAL TEST ERROR FLAG
0004 A           LS3MNE   EQU   4         NORMAL TEST ERROR FLAG (MULTIPLE TEST
0002 A           LS3NDR   EQU   2         NOISE DATA RECORDING
                 *
                 *        LINE STATUS FLAGS (BYTE 4)
                 *
0010 A           LS4FRL   EQU   $10       FIRE LOCK OUT
0008 A           LS4OVL   EQU   8         OVERRIDE LOCK OUT
0004 A           LS4TSL   EQU   4         TEST LOCK OUT
0002 A           LS4SPL   EQU   2         SHOT POINT ADVANCE LOCK OUT
```

```
0001 A                LS4SRL    EQU     1           SPREAD ADVANCE LOCK OUT
                      *
                      *     LINE MODE EQUATES
                      *
0000 A                MODFRE    EQU     0           FREE MODE
0001 A                MODPLY    EQU     1           DEPLOY MODE
0002 A                MODPRG    EQU     2           PROGRAM MODE
0003 A                MODFIR    EQU     3           FIRE MODE
0004 A                MODTST    EQU     4           TEST MODE
0005 A                MODFRA    EQU     5           FIRE ABORT MODE
0006 A                MODADV    EQU     6           ADVANCE MODE
                      *
                      *     MESSAGE REQUEST TYPE
                      *
0080 A                MSGTCV    EQU     $80         CONVERT AND DISPLAY OLD VALUE
0040 A                MSGTIP    EQU     $40         INPUT AND DISPLAY NEW VALUE
0020 A                MSGTBF    EQU     $20         SET BLANK FLAG
0010 A                MSGTPS    EQU     $10         CONVERSION PNTR ALREADY SET
0008 A                MSGTSV    EQU     8           CONVERTED VALUE STORED READY FOR DISPLAY
0004 A                MSGTRC    EQU     4           RETRY OR CONTINUE REQUEST
                      *
                      *     MAXIMUM # DIGITS FOR DEPLOY PARAMETERS
                      *
0003 A                RTUNDG    EQU     3           RTU ADDRESS
0001 A                CHNNDG    EQU     1           CHANNEL ADDRESS
0004 A                STNNDG    EQU     4           STATION NUMBER
                      *
                      *     KEYBOARD INTERRUPT MASKS
                      *
003E A                INTMSK    EQU     $3E         LEADING EDGE TRANSITION (INTERRUPTS MASKED
003F A                INTENB    EQU     $3F         LEADING EDGE TRANSITION (INTERRUPTS ENABLE
                      *
                      *     RTU COMMAND EQUATES
                      *
00FF A                RTUACT    EQU     $FF         ALL ACTIVE RTU ADDR
0002 A                RTUINT    EQU     2           INITIALIZE
0060 A                RTUSTS    EQU     $60         RTU STATUS TRANSFER
0000 A                STSIAV    EQU     0           INACTIVE STATE
                      *
                      *
                      *
0080 A                AXLADV    EQU     $80         ADVANCE
0040 A                AXLFIR    EQU     $40         FIRE LITE
0020 A                AXLOVR    EQU     $20         OVERRIDE
0010 A                AXLFTS    EQU     $10         AUTO FIRE MULT TEST
                      *
                      *
0000 I                DEPLOY    EQU     *
0000 I 7F 0000 D                CLR     DEPFLG      CLEAR DEPLOYMENT FLAGS
0003 I CE 0575 I                LDX     #RTUMSG     REQUEST
0006 I FF 0005 R                STX     MSGRQT      RTU
0009 I C6 40                    LDA B   #MSGTIP     ADDRESS
000B I BD 001E R                JSR     MSGOUT
000E I B6 0000 R                LDA A   RTUFLA      VALID ADDR
0011 I 26 07                    BNE     DEPK        NO
0013 I B6 0001 R                LDA A   RTUADR
0016 I 81 FE                    CMP A   #254        VALID ADDR
0018 I 23 09                    BLS     DEP2        YES
001A I CE 05C5 I      DEPK      LDX     #INVRTA     DISPLAY INVALID RTU ADDR
001D I BD 0019 R                JSR     DISPLY
0020 I 7E 001A R                JMP     EXECTV      INITIATE NEXT SEQUENCE
0023 I 7D 0001 R      DEP2      TST     RTUADR      SKIP ENTRY
0026 I 26 03                    BNE     DEP1B
0028 I 7E 00B6 I      DEP1C     JMP     DEP1
002B I BD 001B R      DEP1B     JSR     CHKRDP      RTU ALREADY DEPLOYED ?
002E I 27 F8                    BEQ     DEP1C
0030 I F7 0006 D                STA B   DEPSAR      SAVE LINE # FOR DISPLAY
0033 I EE 01                    LDX     1,X
0035 I FF 0002 R                STX     STNADR
0038 I CE 05DA I                LDX     #RTUDPE
003B I FF 0005 R                STX     MSGRQT
003E I C6 80                    LDA B   #MSGTCV     DISPLAY LINE #
0040 I BD 001E R                JSR     MSGOUT      RTU DEPLOYED ON
0043 I F6 0006 D                LDA B   DEPSAR      PICK UP LINE NUMBER
```

```
0046 I BD 001C R   188          JSR    RTSMAP       SET UP RTU STATION MAP
0049 I BD 001D R   189          JSR    DPLRTU
004C I CE 0609 I   190          LDX    #RTURET      REQUEST
004F I FF 0005 R   191          STX    MSGRQT       NEW
0052 I C6 04       192          LDA B  #MSGTRC
0054 I BD 001E R   193          JSR    MSGOUT       RTU NUMBER
0057 I 27 A7       194          BEQ    DEPLOY       JUMP IF RETRY SPECIFIED
0059 I BD 001F R   195          JSR    RTUPDR       UPDATE RTU MAP AND DEPLOYMENT TABLE
005C I FE 000A R   196          LDX    CURCSP
005F I A6 0C       197          LDA A  LCAST1,X
0061 I 85 20       198          BIT A  #LSTPRG      FIRE SEQUENCE PROGRAMMED ?
0063 I 27 51       199          BEQ    DEP1         NO, CONTINUE
0065 I BD 0026 R   200          JSR    SEQTST       ALL RTU'S DEPLOYED
0068 I 26 12       201          BNE    DEP1A        NO
006A I FE 000A R   202          LDX    CURCSP
006D I EE 00       203          LDX    0,X
006F I FF 0002 R   204          STX    STNADR
0072 I BD 0020 R   205          JSR    SELIDX       S. P. WITHIN SPREAD
0075 I 2B 05       206          BMI    DEP1A        NO
0077 I BD 0021 R   207          JSR    CHKDEP       S. P. STATION DEPLOYED
007A I 26 3A       208          BNE    DEP1         YES, CONTINUE
007C I FE 000A R   209 DEP1A    LDX    CURCSP
007F I A6 0C       210          LDA A  LCAST1,X
0081 I 84 DF       211          AND A  #-1-LSTPRG
0083 I A7 0C       212          STA A  LCAST1,X
0085 I E6 0F       213          LDA B  LCAST4,X
0087 I C4 EC       214          AND B  #-1-LS4FRL-LS4SRL-LS4SPL
0089 I E7 0F       215          STA B  LCAST4,X
008B I 86 F0       216          LDA A  #AXLADV+AXLFIR+AXLOVR+AXLFTS
008D I BD 002C R   217          JSR    LITOFF
0090 I BD 0027 R   218          JSR    CLRPRG
0093 I CE 051F I   219          LDX    #FSPNPG
0096 I FF 0005 R   220          STX    MSGRQT
0099 I C6 04       221          LDA B  #MSGTRC
009B I BD 001E R   222          JSR    MSGOUT
009E I B6 0001 R   223          LDA A  RTUADR
00A1 I 36          224          PSH A               SAVE RTU ADDR
00A2 I 86 FF       225          LDA A  #RTUACT      SET ALL
00A4 I C6 60       226          LDA B  #RTUSTS+STSIAV
00A6 I CE 0013 R   227          LDX    #RCTSST      ACTIVE RTUS
00A9 I BD 0024 R   228          JSR    RTUCMD       INACTIVE
00AC I CE 0017 R   229          LDX    #RACTLS      RESET
00AF I FF 0018 R   230          STX    RCMAPT       RECORDING MAP PNTR
00B2 I 32          231          PUL A
00B3 I B7 0001 R   232          STA A  RTUADR
00B6 I B6 0000 D   233 DEP1     LDA A  DEPFLG       SET FIRST
00B9 I 8A 10       234          ORA A  #DEPFSN      STATION NUMBER
00BB I B7 0000 D   235          STA A  DEPFLG       INDICATOR
00BE I FE 000A R   236          LDX    CURCSP       LOAD LAST STATION NUMBER
00C1 I EE 16       237          LDX    LCASTN,X     TO BE DEPLOYED FOR THIS
00C3 I FF 0002 R   238          STX    STNADR       LINE AND SHOOTER
00C6 I 7F 0003 R   239          CLR    CHNADR       INITIALIZE CHANNEL ADDR
00C9 I 7C 0003 R   240 DEPC     INC    CHNADR       STEP TO NEXT CHANNEL
00CC I FE 0002 R   241          LDX    STNADR       COMPUTE NEXT
00CF I 08          242          INX                 STATION # TO BE
00D0 I FF 0002 R   243          STX    STNADR       DEPLOYED
00D3 I CE 0575 I   244 DEPCA    LDX    #RTUMSG      DISPLAY
00D6 I FF 0005 R   245          STX    MSGRQT       RTU
00D9 I C6 80       246          LDA B  #MSGTCV      ADDRESS
00DB I BD 001E R   247          JSR    MSGOUT
00DE I CE 058E I   248          LDX    #CHNMSG      DISPLAY
00E1 I FF 0005 R   249          STX    MSGRQT       CHANNEL
00E4 I C6 80       250          LDA B  #MSGTCV      ADDRESS
00E6 I BD 001E R   251          JSR    MSGOUT
00E9 I B6 0000 D   252 DEP8     LDA A  DEPFLG       RESET DEAD
00EC I 84 BF       253          AND A  #-1-DEPSKP   CHANNEL
00EE I B7 0000 D   254          STA A  DEPFLG       INDICATOR
00F1 I CE 05A4 I   255          LDX    #STNMSG      SET UP FOR
00F4 I FF 0005 R   256          STX    MSGRQT       STATION # MESSAGE
00F7 I C6 E0       257          LDA B  #MSGTCV+MSGTIP+MSGTBF
00F9 I BD 001E R   258 DEP3     JSR    MSGOUT       DISPLAY STATION TO BE DEPLOYED
00FC I B6 0000 D   259          LDA A  DEPFLG
00FF I 36          260          PSH A
0100 I 85 40       261          BIT A  #DEPSKP      DEAD STATION
```

```
0102 I 27 15           BEQ    DEP4
0104 I CE 05C0 I       LDX    #DSNMSG
0107 I BD 0019 R       JSR    DISPLY      ADD DEAD STATION IDENTIFIER
010A I CE 0000 A       LDX    #0
010D I FF 0011 R       STX    TMRBCA
0110 I CE 03E8 A       LDX    #1000
0113 I FF 000C R       STX    TMRBTV
0116 I BD 002D R       JSR    TMRCDV
0119 I 32       DEP4   PUL A
011A I FE 0002 R       LDX    STNADR      UNUSED CHANNEL
011D I 26 0B           BNE    DEP6        NO
011F I FE 000A R       LDX    CURCSP      RESTORE
0122 I EE 16           LDX    LCASTN,X    LAST STAION #
0124 I FF 0002 R       STX    STNADR      DEPLOYED
0127 I 7E 02BA I       JMP    DEPD        SETUP FOR NEXT CHANNEL
012A I 85 10    DEP6   BIT A  #DEPFSN     FIRST CHANNEL
012C I 26 0E           BNE    DEPN        YES
012E I 7D 0006 R       TST    CHRCNT
0131 I 27 09           BEQ    DEPN
0133 I FE 000A R       LDX    CURCSP      SET STATION # TO NEXT SEQUENTIAL STATION
0136 I EE 16           LDX    LCASTN,X
0138 I 08              INX
0139 I FF 0002 R       STX    STNADR
013C I BD 0020 R DEPN  JSR    SELIDX      SELECT PROPER DEPLOYMENT TABLE INDEX
013F I 2B 03           BMI    DEPNA       JUMP IF MAP OVERFLOW
0141 I 7E 01E4 I       JMP    DEP7        CONTINUE IF NO MAP OVERFLOW
0144 I CE 0002 R DEPNA LDX    #STNADR     SAVE PNTR TO STATION
0147 I FF 000F R       STX    CMPPR1      ADDR FOR COMPARISON
014A I FE 0004 D       LDX    IDXSAV      PICK UP DEPLOYMENT MAP PNTR
014D I C6 CE           LDA B  #DPTDT2     ANTICIPATE IDX1 > IDX2
014F I B6 0000 D       LDA A  DEPFLG
0152 I 85 20           BIT A  #DEP2IG     IDX2 > IDX1
0154 I 27 04           BEQ    DEPN1       NO
0156 I C6 06           LDA B  #DPTDT1     SET OFFSET TO LOWER DEPLOYMENT TABLE HALF
0158 I 08              INX
0159 I 08              INX
015A I 08       DEPN1  INX
015B I 08              INX
015C I F7 000A D       STA B  SAVDT3      SAVE OFFSET TO LOWER DEPLOYMENT TABLE
015F I FF 0010 R       STX    CMPPR2      SAVE COMPARISON PNTR
0162 I EE 00           LDX    0,X
0164 I FF 0002 D       STX    SAVDTI      SAVE LARGER INDEX VALUE
0167 I BD 002A R       JSR    CMPRTN      UPWARD ADVANCEMENT ?
016A I 22 48           BHI    DEPN2       NO, CHECK LOW SIDE OVERLAP
016C I CE 0002 D       LDX    #SAVDTI
016F I FF 0010 R       STX    CMPPR2
0172 I 86 C8           LDA A  #200
0174 I BD 0029 R       JSR    IDXRTN      COMPUTE OVERLAP UPPER BOUNDARY
0177 I C6 C8           LDA B  #200
0179 I 86 06           LDA A  #DPTDT1     ANTICIPATE COMPLETE OVERLAP
017B I BD 002A R       JSR    CMPRTN      OVERLAP UPPER BOUNDARY < STATION ADDR
017E I 23 05           BLS    DEPN3       YES, CHECK BOTH HALVES OF DEPLOYMENT TA
0180 I C6 64    DEPN8  LDA B  #100
0182 I B6 000A D       LDA A  SAVDT3      PICK UP OFFSET TO LOWER DEPLOYMENT TABLE HL
0185 I FE 0004 D DEPN3 LDX    IDXSAV
0188 I FF 0002 D       STX    SAVDTI
018B I CE 0002 D       LDX    #SAVDTI
018E I BD 0029 R       JSR    IDXRTN      COMPUTE PNTR TO PROPER SECTION OF DEPLOYMET
0191 I EE 00           LDX    0,X         PICK UP DEPLOYMENT TABLE PNTR
0193 I C0 01    DEPN4  SUB B  #1          ALL OF TABLE PROCESSED ?
0195 I 25 18           BCS    DEPN5       YES
0197 I A6 00           LDA A  0,X         STATION DEPLOYED ?
0199 I 26 04           BNE    DEPN6       YES, NOTIFY OPERATOR
019B I 08              INX
019C I 08              INX
019D I 20 F4           BRA    DEPN4
019F I CE 060F I DEPN6 LDX    #OVLMSG
01A2 I FF 0005 R       STX    MSGRQT
01A5 I C6 04           LDA B  #MSGTRC
01A7 I BD 001E R       JSR    MSGOUT      NOTIFY OPERATOR OF OVERLAP
01AA I 26 03           BNE    DEPNE       JUMP IF CONTINUE
01AC I 7E 00D3 I       JMP    DEPCA       JUMP IF RETRY SET
01AF I BD 03B6 I DEPN5 JSR    DPMUPD      UPDATE DEPLOYMENT MAP
01B2 I 20 88           BRA    DEPN        CHECK NEW DEPLOYMENT
```

```
01B4 I FE 0004 D   336 DEPN2   LDX    IDXSAV
01B7 I C6 CE       337         LDA B  #DPTDT2     ANTICIAPTE IDX1 < IDX2
01B9 I B6 0000 D   338         LDA A  DEPFLG
01BC I 85 20       339         BIT A  #DEP2IG     IDX2 > IDX1
01BE I 26 04       340         BNE    DEPN7       YES, FETCH LOWER HALF OF DEPLOYMENT TABLE
01C0 I C6 06       341         LDA B  #DPTDT1     SET OFFSET TO HIGHER DEPLOYMENT TABLE HALF
01C2 I 08          342         INX
01C3 I 08          343         INX
01C4 I 08          344 DEPN7   INX
01C5 I 08          345         INX
01C6 I F7 000A D   346         STA B  SAVDT3      SAVE OFFSET TO HIGHER DEPLOYMENT TABLE HAL
01C9 I EE 00       347         LDX    0,X
01CB I FF 0002 D   348         STX    SAVDTI      SAVE LOWER INDEX VALUE
01CE I 86 65       349         LDA A  #101
01D0 I CE 0002 D   350         LDX    #SAVDTI
01D3 I FF 0010 R   351         STX    CMPPR2
01D6 I BD 0028 R   352         JSR    DEXRTN      COMPUTE COMPLETE OVERLAP BOUNDARY
01D9 I C6 C8       353         LDA B  #200
01DB I 86 06       354         LDA A  #DPTDT1     ANTICIPATE COMPLETE OVERLAP
01DD I BD 002A R   355         JSR    CMPRTN      OVERLAP LOWER BOUNDARY > STATION ADDR
01E0 I 24 A3       356         BCC    DEPN3       YES, CHECK BOTH HALVES OF DEPLOYMENT TABLE
01E2 I 20 9C       357         BRA    DEPN8
01E4 I BD 0021 R   358 DEP7    JSR    CHKDEP      COMPUTE INDEX INTO DEPLOYMENT TABLE
01E7 I 26 03       359         BNE    DEPR
01E9 I 7E 026F I   360 DEPZ    JMP    DEPL
01EC I A6 01       361 DEPR    LDA A  1,X         CONTINUE IF
01EE I 27 F9       362         BEQ    DEPZ        DUMMY RTU
01F0 I CE 054F I   363         LDX    #STNDPY     DISPLAY WARNING
01F3 I FF 0005 R   364         STX    MSGRQT
01F6 I C6 04       365         LDA B  #MSGTRC
01F8 I BD 001E R   366         JSR    MSGOUT
01FB I 26 03       367         BNE    DEPRA       JUMP IF CONTINUE
01FD I 7E 00D3 I   368         JMP    DEPCA       JUMP IF RETRY
0200 I FE 0007 R   369 DEPRA   LDX    CHKIDS      RESTORE PNTR INTO DEPLOYMENT TABLE
0203 I A6 01       370         LDA A  1,X         PICK UP RTU ADDRESS
0205 I F6 0001 R   371         LDA B  RTUADR      SAVE RTU
0208 I 37          372         PSH B              ADDRESS
0209 I B7 0001 R   373         STA A  RTUADR      SET OLD RTU ADDRESS
020C I BD 001B R   374         JSR    CHKRDP      COMPUTE INDEX INTO RTU MAP
020F I EE 01       375         LDX    1,X         PICK UP 1ST STN ASSOCIATED WITH RTU
0211 I BC 0002 R   376         CPX    STNADR      COMPLETE REPLACEMENT
0214 I 26 46       377         BNE    DEPM        NO
0216 I FE 0002 R   378         LDX    STNADR      SAVE CURRENT
0219 I FF 000E D   379         STX    STNSAV      STATION #
021C I 08          380         INX                SET UP FOR NEXT
021D I FF 0002 R   381         STX    STNADR      STATION CHECK
0220 I FE 0007 R   382         LDX    CHKIDS      SAVE DEPLOYMENT
0223 I FF 000C D   383         STX    SAVDT4      TABLE INDEX
0226 I BD 0020 R   384         JSR    SELIDX      NEXT STATION OUTSIDE MAP
0229 I 2B 1C       385         BMI    DEPP        YES, CLEAR RTU MAP ENTRY
022B I BD 0021 R   386         JSR    CHKDEP      COMPUTE DEPLOYMENT MAP INDEX FOR NEXT STATO
022E I FE 0007 R   387         LDX    CHKIDS      NEXT STATION
0231 I A6 01       388         LDA A  1,X         ASSIGNED TO SAME
0233 I B1 0001 R   389         CMP A  RTUADR      RTU
0236 I 26 0F       390         BNE    DEPP        NO, CLEAR RTU MAP ENTRY
0238 I B6 0002 R   391         LDA A  STNADR      UPDATE RTU
023B I F6 0004 R   392         LDA B  STNAD2      MAP 1ST
023E I FE 0008 R   393         LDX    LINSAV      STATION
0241 I A7 01       394         STA A  1,X         ENTRY
0243 I E7 02       395         STA B  2,X
0245 I 20 09       396         BRA    DEPQ        RESTORE PARAMENTERS
0247 I FE 0008 R   397 DEPP    LDX    LINSAV      CLEAR
024A I 6F 00       398         CLR    0,X         OLD
024C I 6F 01       399         CLR    1,X         RTU MAP
024E I 6F 02       400         CLR    2,X         ENTRY
0250 I FE 000E D   401 DEPQ    LDX    STNSAV      RESTORE CURRENT STATION
0253 I FF 0002 R   402         STX    STNADR      NUMBER
0256 I FE 000C D   403         LDX    SAVDT4      RESTORE DEPLOYMENT TABLE
0259 I FF 0007 R   404         STX    CHKIDS      INDEX
025C I FE 0007 R   405 DEPM    LDX    CHKIDS      CLEAR OLD
025F I 6F 00       406         CLR    0,X         DEPLOYMENT MAP
0261 I 6F 01       407         CLR    1,X         ENTRY
0263 I FE 000A R   408         LDX    CURCSP
0266 I EE 14       409         LDX    LCADPM,X
```

```
0268 I BD 0022 R              JSR    DLPUPD         UPDATE DEPLOYMENT LITE PATTERN
026B I 32                     PUL A                 RESTORE NEW
026C I B7 0001 R              STA A  RTUADR         RTU ADDRESS
026F I 86 3E          DEPL    LDA A  #INTMSK        MASK KEYBOARD
0271 I B7 0009 R              STA A  PIAKCR         INTERRUPTS
0274 I B6 0002 R              LDA A  STNADR         UPDATE
0277 I F6 0004 R              LDA B  STNAD2         LAST
027A I FE 000A R              LDX    CURCSP         STATION
027D I E7 17                  STA B  LCASTN+1,X     NUMBER
027F I A7 16                  STA A  LCASTN,X       DEPLOYED
0281 I FE 0007 R              LDX    CHKIDS         PICK DEPLOYMENT TABLE INDEX
0284 I F6 0003 R              LDA B  CHNADR         PICK UP CHANNEL ADDRESS
0287 I B6 0000 D              LDA A  DEPFLG         SKIP
028A I 7D 0001 R              TST    RTUADR         SET SKIP IF
028D I 27 04                  BEQ    DEPO           DUMMY RTU
028F I 85 40                  BIT A  #DEPSKP        CHANNEL
0291 I 27 02                  BEQ    DEPB           NO
0293 I CA 80          DEPO    ORA B  #$80           SET SKIP INDICATOR
0295 I E7 00          DEPB    STA B  0,X            SET CHANNEL IN DEPLOYMENT TABLE
0297 I F6 0001 R              LDA B  RTUADR         SET RTU ADDRESS
029A I E7 01                  STA B  1,X            IN DEPLOYMENT
029C I 85 10                  BIT A  #DEPFSN        FIRST STATION
029E I 27 1A                  BEQ    DEPD           NO
02A0 I 84 EF                  AND A  #-1-DEPFSN     RESET FIRST
02A2 I B7 0000 D              STA A  DEPFLG         STATION FLAG
02A5 I BD 001B R              JSR    CHKRDP         COMPUTE PNTR INOT RTU MAP
02A8 I B6 000B R              LDA A  CURLIN         PICK UP CURRENT LINE #
02AB I A7 00                  STA A  0,X            SET LINE ADDRESS IN RTU MAP
02AD I B6 0002 R              LDA A  STNADR         MOVE FIRST
02B0 I F6 0004 R              LDA B  STNAD2         STATION NUMBER
02B3 I A7 01                  STA A  1,X            INTO RTU
02B5 I E7 02                  STA B  2,X            MAP
02B7 I B6 0000 D              LDA A  DEPFLG         RESTORE DEPLOYMENT FLAGS
02BA I 84 BF          DEPD    AND A  #-1-DEPSKP     RESET SKIP CHANNEL
02BC I B7 0000 D              STA A  DEPFLG
02BF I 86 3F                  LDA A  #INTENB        UNMASK KEYBOARD
02C1 I B7 0009 R              STA A  PIAKCR         INTERRUPT
02C4 I FE 000A R              LDX    CURCSP         UPDATE
02C7 I EE 14                  LDX    LCADPM,X       DEPLOYMENT TABLE
02C9 I BD 0022 R              JSR    DLPUPD         LITE PATTERN
02CC I 86 04                  LDA A  #4             LAST
02CE I B1 0003 R              CMP A  CHNADR         CHANNEL
02D1 I 27 03                  BEQ    DEPE
02D3 I 7E 00C9 I              JMP    DEPC           CONTINUE WITH NEXT CHANNEL
                      *
                      *       CODE TO PERFORM SINGLE NORMAL TEST
                      *
02D6 I                DEPE    EQU    *
02D6 I FE 000A R              LDX    CURCSP
02D9 I A6 0C                  LDA A  LCAST1,X
02DB I 85 20                  BIT A  #LSTPRG        FIRE SEQUENCE PREVIOUSLY PROGRAMMED
02DD I 27 39                  BEQ    DEPE1          NO, SKIP DEPLOYMENT CHECK
02DF I BD 002E R              JSR    SEQTST         ALL RTU'S DEPLOYED
02E2 I 26 12                  BNE    DEPV
02E4 I FE 000A R              LDX    CURCSP         PICK
02E7 I EE 00                  LDX    0,X            UP CHOT PT
02E9 I FF 0002 R              STX    STNADR         STATION
02EC I BD 0020 R              JSR    SELIDX         OUTSIDE DEPLOYMENT MAP
02EF I 2B 05                  BMI    DEPV
02F1 I BD 0021 R              JSR    CHKDEP         STATION DEPLOYED
02F4 I 26 22                  BNE    DEPE1
02F6 I FE 000A R      DEPV    LDX    CURCSP
02F9 I A6 0C                  LDA A  LCAST1,X
02FB I 84 DF                  AND A  #-1-LSTPRG     RESET FIRE SEQUENCE PROGRAMMED
02FD I A7 0C                  STA A  LCAST1,X
02FF I E6 0F                  LDA B  LCAST4,X       SET FIRE AND ADVANCE LOCKOUTS
0301 I C4 0D                  AND B  #LS4FRL-LS4SRL-LS4SPL
0303 I E7 0F                  STA B  LCAST4,X
0305 I BD 0027 R              JSR    CLRPRG         CLEAR RECORDING PATTERN DISPLAY
0308 I 86 F0                  LDA A  #AXLFIR+AXLADV+AXLOVR+AXLFTS
030A I BD 002C R              JSR    LITOFF
030D I CE 051F I              LDX    #FSPNPG        FIRE SEQUENCE
0310 I FF 0005 R              STX    MSGRQT
0313 I C6 04                  LDA B  #MSGTRC
```

```
0315 I BD 001E R   484         JSR    MSGOUT      NOT PROGRAMMED
0318 I 7D 0001 R   485 DEPE1   TST    RTUADR      SKIP TEST
031B I 27 4B       486         BEQ    DEPG        IF ARTIFICIAL RTUP
031D I CE 0012 R   487         LDX    #RCTACK     INITIALIZE DEPLOYED RTU
0320 I FF 000C R   488         STX    TMRBTV
0323 I C6 02       489         LDA B  #RTUINT
0325 I B6 0001 R   490         LDA A  RTUADR
0328 I BD 0024 R   491         JSR    RTUCMD
032B I 86 60       492         LDA A  #RTUSTS+STSIAVSET RTU STATE
032D I BD 0023 R   493         JSR    RTSTAT
0330 I CE 0013 R   494         LDX    #RCTSST
0333 I FF 000C R   495         STX    TMRBTV
0336 I 16          496         TAB
0337 I B6 0001 R   497         LDA A  RTUADR
033A I BD 0024 R   498         JSR    RTUCMD
033D I CE 0683 I   499         LDX    #NMTIPG     DISPLAY NORMAL
0340 I BD 0019 R   500         JSR    DISPLY      TEST-IN-PROGRESS MESG
0343 I FE 000A R   501         LDX    CURCSP
0346 I A6 0E       502         LDA A  LCAST3,X
0348 I 8A 10       503         ORA A  #LS3STF
034A I 84 DF       504         AND A  #-1-LS3MTT
034C I A7 0E       505         STA A  LCAST3,X
034E I EE 16       506         LDX    LCASTN,X
0350 I FF 0002 R   507         STX    STNADR
0353 I BD 0025 R   508         JSR    NRMTST      PERFORM SINGLE NORMAL TEST
0356 I FE 000A R   509         LDX    CURCSP
0359 I A6 0E       510         LDA A  LCAST3,X
035B I CE 0639 I   511         LDX    #GNTCMP     ANTICIPATE GOOD TEST
035E I 85 08       512         BIT A  #LS3NEF     ERROR
0360 I 27 03       513         BEQ    DEPS        NO
0362 I CE 062F I   514         LDX    #BNTCMP     BAD TEST MESG
0365 I BD 0019 R   515 DEPS    JSR    DISPLY
0368 I FE 000A R   516 DEPG    LDX    CURCSP      UPDATE
036B I EE 14       517         LDX    LCADPM,X    DEPLOYMENT
036D I BD 0022 R   518         JSR    DLPUPD      TABLE
0370 I 7D 0001 R   519 DEPY    TST    RTUADR      ATIFICIAL RTU ?
0373 I 27 3E       520         BEQ    DEPT        YES
0375 I FE 000A R   521         LDX    CURCSP
0378 I C6 04       522         LDA B  #MODTST
037A I A6 0E       523         LDA A  LCAST3,X
```

DEPLOY(A0011.02.010AA CRS DEPLOYMENT ROUTINE)      08/04/78 13:18:58 PAGE 10

```
037C I 85 08       524         BIT A  #LS3NEF     NORMAL TEST ERROR
037E I 26 31       525         BNE    DEPU
0380 I             526 DEPYX   EQU    *
0380 I FE 000A R   527         LDX    CURCSP
0383 I A6 0C       528         LDA A  LCAST1,X
0385 I 85 20       529         BIT A  #LSTPRG     FIRE SEQUENCE PROG
0387 I 27 2A       530         BEQ    DEPT        NO
0389 I A6 10       531         LDA A  LCAMDE,X
038B I 81 05       532         CMP A  #MODFRA
038D I 27 24       533         BEQ    DEPT
038F I A6 13       534         LDA A  LCASPL,X
0391 I 85 40       535         BIT A  #AXLFIR     READY TO FIRE ?
0393 I 27 08       536         BEQ    DEPYX1      NO
0395 I CE 06A1 I   537         LDX    #RDYFIR
0398 I BD 0019 R   538         JSR    DISPLY      INFORM OPERATOR
039B I 20 16       539         BRA    DEPT
039D I A6 0F       540 DEPYX1  LDA A  LCAST4,X    PICK UP CONDITIONAL FLAGS
039F I C6 02       541         LDA B  #MODPRG
03A1 I 85 04       542         BIT A  #LS4TSL     READY TO TEST
03A3 I 26 0C       543         BNE    DEPU
03A5 I C6 05       544         LDA B  #MODADV     ANTICIPATE FIRE
03A7 I 85 10       545         BIT A  #LS4FRL     FIRE LOCK OUT
03A9 I 26 06       546         BNE    DEPU        NO, READY TO FIRE
03AB I C6 03       547         LDA B  #MODFIR     ANTICIAPTE ADVANCE
03AD I 85 03       548         BIT A  #LS4SRL+LS4SPLADVANCE LOCK OUT
03AF I 27 02       549         BEQ    DEPT
03B1 I E7 10       550 DEPU    STA B  LCAMDE,X    SET LINE MODE
03B3 I 7E 001A R   551 DEPT    JMP    EXECTV      INITIATE NEXT SEQUENCE
                   552 *
                   553 *       DEPLOYMENT TABLE UPDATE ROUTINE
                   554 *
```

```
03B6 I               555 DPMUPD   EQU     *
03B6 I B6 0001 R     556          LDA A   RTUADR       SAVE RTU ADDRESS
03B9 I B7 0010 D     557          STA A   RTUSAV       ADDRESS
03BC I FE 0002 R     558          LDX     STNADR
03BF I FF 000E D     559          STX     STNSAV
                     560 *
                     561 *      COMPUTE BASE INDEX VALUE FOR CURRENT STATION #
                     562 *
03C2 I 7F 0002 D     563          CLR     SAVDTI       ZERO BASE
03C5 I 7F 0003 D     564          CLR     SAVDTI+1     INDEX
03C8 I CE 000E D     565 DPMA     LDX     #STNSAV
03CB I 86 64         566          LDA A   #100
03CD I BD 0028 R     567          JSR     DEXRTN
03D0 I 7D 000E D     568          TST     STNSAV       COMPLETE ?
03D3 I 2B 0A         569          BMI     DPMB         YES
03D5 I 86 64         570          LDA A   #100
03D7 I CE 0002 D     571          LDX     #SAVDTI
03DA I BD 0029 R     572          JSR     IDXRTN
03DD I 20 E9         573          BRA     DPMA
03DF I FE 000A R     574 DPMB     LDX     CURCSP       PICK UP
03E2 I EE 14         575          LDX     LCADPM,X     PNTR TO
03E4 I FF 0004 D     576          STX     IDXSAV       DEPLOYMENT TABLE
03E7 I 08            577          INX                  ANTICIPATE 1ST
03E8 I 08            578          INX                  INDEX AS SMALLEST
03E9 I FF 000D R     579          STX     BNDSTR       INDEX
03EC I B6 0000 D     580          LDA A   DEPFLG
03EF I 85 20         581          BIT A   #DEP2IG      2ND INDEX LARGER
DEPLOY(A0011.02.010AA  CRS DEPLOYMENT ROUTINE)          08/04/78  13:18:59  PAGE  11

03F1 I 27 07         582          BEQ     DPM1         NO
03F3 I 08            583          INX
03F4 I 08            584          INX
03F5 I FF 000E R     585          STX     BNDEND       SET PNTR TOLARGER INDEX
03F8 I 20 08         586          BRA     DPM2
03FA I FF 000E R     587 DPM1     STX     BNDEND       SET PNTR TO LARGER INDEX
03FD I 08            588          INX
03FE I 08            589          INX
03FF I FF 000D R     590          STX     BNDSTR       SET PNTR TO SMALLER INDEX
0402 I FE 000D R     591 DPM2     LDX     BNDSTR
0405 I FF 000F R     592          STX     CMPPR1
0408 I CE 0002 R     593          LDX     #STNADR
040B I FF 0010 R     594          STX     CMPPR2       STATION NUMBER >
040E I BD 002A R     595          JSR     CMPRTN       SMALLEST INDEX
0411 I 25 03         596          BCS     DPMF
0413 I 7E 04BC I     597          JMP     DPM3
0416 I FE 000D R     598 DPMF     LDX     BNDSTR
0419 I EE 00         599          LDX     0,X
041B I FF 000E D     600          STX     STNSAV
041E I CE 0002 D     601          LDX     #SAVDTI
0421 I FF 0010 R     602          STX     CMPPR2
0424 I 86 C8         603          LDA A   #200
0426 I CE 000E D     604          LDX     #STNSAV
0429 I FF 000F R     605          STX     CMPPR1
042C I BD 0028 R     606          JSR     DEXRTN       STATION # BASE
042F I B6 000E D     607          LDA A   STNSAV       JUMP IF MINUS
0432 I 2B 05         608          BMI     DPMS
0434 I BD 002A R     609          JSR     CMPRTN       200 < SMALLEST INDEX
0437 I 23 4E         610          BLS     DPM4         YES
0439 I B6 0002 D     611 DPMS     LDA A   SAVDTI
043C I F6 0003 D     612          LDA B   SAVDTI+1
043F I FE 000E R     613          LDX     BNDEND       PICK UP PNTR TO LARGEST INDEX
0442 I A7 00         614          STA A   0,X          REPLACE LARGER
0444 I E7 01         615          STA B   1,X          INDEX
0446 I 86 65         616          LDA A   #101         SET ENTRY COUNT
0448 I FE 0004 D     617 DPMC     LDX     IDXSAV       PICK UP PNTR TO DEPLOYMENT TABLE
044B I EE 00         618          LDX     0,X          PICK UP PNTR TO DEPLOYMNT MAP TABLE
044D I 08            619          INX                  SET PNTR TO 1ST SECTION OF TABLE
044E I F6 0000 D     620          LDA B   DEPFLG
0451 I C5 20         621          BIT B   #DEP2IG      1ST INDEX LARGEST
0453 I 27 02         622          BEQ     DPM5         YES
0455 I 08            623          INX
0456 I 08            624          INX
0457 I EE 00         625 DPM5     LDX     0,X          PICK UP PNTR TO START OF DEPLOYMENT TABLE
```

```
0459 I FF 0004 D   626          STX    IDXSAV      SAVE PNTR TO START OF TABLE
045C I 4A          627 DPM9     DEC A              UPDATE COMPLETE ?
045D I 27 21       628          BEQ    DPM8        YES
045F I FE 0004 D   629          LDX    IDXSAV      PICK UP PNTR TO NEXT DEPLOYMENT TABLE ENTR
0462 I E6 01       630          LDA B  1,X         PICK UP RTU ADDRESS
0464 I F7 0001 R   631          STA B  RTUADR
0467 I 6F 00       632          CLR    0,X         CLEAR DEPLOYMENT TABLE
0469 I 6F 01       633          CLR    1,X         ENTRY
046B I 08          634          INX                INCR TABLE
046C I 08          635          INX                PNTR TO
046D I FF 0004 D   636          STX    IDXSAV      NEXT ENTRY
0470 I 7D 0001 R   637          TST    RTUADR
0473 I 27 E7       638          BEQ    DPM9
0475 I BD 001B R   639          JSR    CHKRDP      COMPUTE PNTR TO PROPER RTU MAP ENTRY
DEPLOY(A0011.02.010AA  CRS DEPLOYMENT ROUTINE)      08/04/78  13:19:01  PAGE  12

0478 I 6F 00       640          CLR    0,X         REMOVE
047A I 6F 01       641          CLR    1,X         ENTRY FROM
047C I 6F 02       642          CLR    2,X         RTU MAP
047E I 20 DC       643          BRA    DPM9        CONTINUE WITH NEST ENTRY
0480 I B6 0010 D   644 DPM8     LDA A  RTUSAV      RESTORE
0483 I B7 0001 R   645          STA A  RTUADR      RTU ADDRESS
0486 I 39          646          RTS                RETURN TO CALLER
0487 I FE 0004 D   647 DPM4     LDX    IDXSAV
048A I 08          648          INX                SET PNTR TO 1ST INDEX
048B I 08          649          INX
048C I B6 0002 D   650          LDA A  SAVDTI      SET
048F I F6 0003 D   651          LDA B  SAVDTI+1    IDX1 =
0492 I A7 00       652          STA A  0,X         STATION #
0494 I E7 01       653          STA B  1,X         BASE
0496 I 86 64       654          LDA A  #100
0498 I CE 0002 D   655          LDX    #SAVDTI
049B I BD 0029 R   656          JSR    IDXRTN      COMPUTE BASE INDEX + 100
049E I FE 0004 D   657          LDX    IDXSAV
04A1 I BD 002B R   658          JSR    INX4
04A4 I B6 0002 D   659 DPM1     LDA A  SAVDTI      SET IDX2 =
04A7 I F6 0003 D   660          LDA B  SAVDTI+1    STATION # BASE + 100
04AA I A7 00       661          STA A  0,X
04AC I E7 01       662          STA B  1,X
04AE I B6 0000 D   663          LDA A  DEPFLG      SET
04B1 I 8A 10       664          ORA A  #DEPFSN     FIRST STATION INDICATOR
04B3 I 84 DF       665          AND A  #-1-DEP2IG
04B5 I B7 0000 D   666          STA A  DEPFLG
04B8 I 86 C9       667          LDA A  #201
04BA I 20 8C       668          BRA    DPMC        CLEAR DEPLOYMENT TABLE AND RTU MAP
                   669 *
                   670 *      STATION GREATER THAN INDEX VALUE
                   671 *
04BC I FE 000E R   672 DPM3     LDX    BNDEND
04BF I EE 00       673          LDX    0,X
04C1 I FF 000E D   674          STX    STNSAV
04C4 I CE 0002 D   675          LDX    #SAVDTI
04C7 I FF 0010 R   676          STX    CMPPR2
04CA I 86 C8       677          LDA A  #200
04CC I CE 000E D   678          LDX    #STNSAV
04CF I FF 000F R   679          STX    CMPPR1
04D2 I BD 0029 R   680          JSR    IDXRTN      STATION # BASE 200 >
04D5 I BD 002A R   681          JSR    CMPRTN      LARGEST INDEX
04D8 I 24 26       682          BCC    DPMD        YES
04DA I B6 0002 D   683          LDA A  SAVDTI
04DD I F6 0003 D   684          LDA B  SAVDTI+1
04E0 I FE 000D R   685          LDX    BNDSTR
04E3 I A7 00       686          STA A  0,X         REPLACE SMALLER
04E5 I E7 01       687          STA B  1,X         INDEX
04E7 I FE 0004 D   688          LDX    IDXSAV
04EA I EE 00       689          LDX    0,X
04EC I 08          690          INX
04ED I B6 0000 D   691          LDA A  DEPFLG
04F0 I 85 20       692          BIT A  #DEP2IG
04F2 I 26 02       693          BNE    DPME
04F4 I 08          694          INX
04F5 I 08          695          INX
04F6 I EE 00       696 DPME     LDX    0,X
04F8 I FF 0004 D   697          STX    IDXSAV      SET PNTR TO DEPLOYMENT TABLE
```

```
04FB I 86 65         698          LDA A  #101        SET ENTRY COUNT
04FD I 7E 045C I     699          JMP    DPM9        CLEAN UP DEPLOYMENT TABLE
0500 I FE 0004 D     700 DPMD     LDX    IDXSAV
0503 I BD 002B R     701          JSR    INX4
0506 I B6 0002 D     702          LDA A  SAVDTI
0509 I F6 0003 D     703          LDA B  SAVDTI+1
050C I A7 00         704          STA A  0,X         SET IDX2 =
050E I E7 01         705          STA B  1,X         STATION NUMBER BASE
0510 I CE 0002 D     706          LDX    #SAVDTI
0513 I 86 64         707          LDA A  #100
0515 I BD 0028 R     708          JSR    DEXRTN      SET IDX1 = STATION
0518 I FE 0004 D     709          LDX    IDXSAV      NUMBER BASE - 100
051B I 08            710          INX
051C I 08            711          INX
051D I 20 85         712          BRA    DPMM
                     713 *
                     714 *
                     715 *     DEPLOY MODE MESSAGES
                     716 *
051F I 4E4F20        717 FSPNPG   FCC    /NO FIRE SEQUENCE PROGRAMMED/
053A I 0D            718          FCB    $D
053B I 444550        719          FCC    /DEPRESS CONTINUE/
054B I 0D            720          FCB    $D,$D,$D,4
054C I 0D
054D I 0D
054E I 04
054F I 11            721 STNDPY   FCB    $11
0550 I 574152        722          FCC    /WARNING /
0558 I 12            723          FCB    $12
0559 I 535441        724          FCC    /STATION ALREADY DEPLOYED/
0571 I 0D            725          FCB    $D,$E
0572 I 0E
0573 I 0016     R    726          FDB    TPMCNT
0575 I 03            727 RTUMSG   FCB    RTUNDG
0576 I 01            728 RTUFLD   FCB    1,12
0577 I 0C
0578 I 0000     R    729          FDB    RTUFLA
057A I 525455        730          FCC    /RTU NUMBER  /
0586 I 0E            731          FCB    $E
0587 I 0015     R    732          FDB    NUMMSG
0589 I 0D            733          FCB    $D,$D,$D,$D,4
058A I 0D
058B I 0D
058C I 0D
058D I 04
                     734 *
058E I 81            735 CHNMSG   FCB    CHNNDG+$80
058F I 02            736 CHNFLD   FCB    2,8
0590 I 08
0591 I 0003     R    737          FDB    CHNADR
0593 I 10            738          FCB    $10,2,0
0594 I 02
0595 I 00
0596 I 434841        739          FCC    /CHANNEL/
059D I 0E            740          FCB    $E
059E I 0015     R    741          FDB    NUMMSG
05A0 I 0D            742          FCB    $D,$D,$D,4
05A1 I 0D
```

```
05A2 I 0D
05A3 I 04
                     743 *
05A4 I 04            744 STNMSG   FCB    STNNDG
05A5 I 03            745          FCB    3,25
05A6 I 19
05A7 I 0002     R    746          FDB    STNADR
05A9 I 10            747          FCB    $10,3,0
05AA I 03
05AB I 00
05AC I 535441        748          FCC    /STATION NUMBER/
```

```
05BA I 0E          749          FCB    $E
05BB I 0015    R   750          FDB    NUMMSG
05BD I 0D          751          FCB    $D,$D,4
05BE I 0D
05BF I 04
                   752 *
05C0 I 10          753 DSNMSG   FCB    $10,3,30
05C1 I 03
05C2 I 1E
05C3 I 44          754          FCC    /D/
05C4 I 04          755          FCB    4
                   756 *
05C5 I 494E56      757 INVRTA   FCC    /INVALID RTU ADDRESS/
05D8 I 0D          758          FCB    $D,4
05D9 I 04
05DA I 81          759 RTUDPE   FCB    $81
05DB I 01          760          FCB    1,30
05DC I 1E
05DD I 0006    D   761          FDB    DEPSAR
05DF I 10          762          FCB    $10,1,0,$11
05E0 I 01
05E1 I 00
05E2 I 11
05E3 I 574152      763          FCC    /WARNING /
05EB I 12          764          FCB    $12
05EC I 525455      765          FCC    /RTU /
05F0 I 10          766          FCB    $10,1,16
05F1 I 01
05F2 I 10
05F3 I 444550      767          FCC    /DEPLOYED LINE/
0600 I 0D          768          FCB    $D,$E
0601 I 0E
0602 I 0015    R   769          FDB    NUMMSG
0604 I 0D          770          FCB    $D,$D,$D,$D,4
0605 I 0D
0606 I 0D
0607 I 0D
0608 I 04
0609 I 10          771 RTURET   FCB    $10,2,0
060A I 02
060B I 00
060C I 0E          772          FCB    $E
060D I 0016    R   773          FDB    TPMCNT
060F I 11          774 OVLMSG   FCB    $11
0610 I 574152      775          FCC    /WARNING /
0618 I 12          776          FCB    $12
0619 I 444550      777          FCC    /DEPLOYMENT OVERLAP/
DEPLOY(A0011.02.010AA  CRS DEPLOYMENT ROUTINE)       08/04/78  13:19:05  PAGE  15

062B I 0D          778          FCB    $D
062C I 0E          779          FCB    $E
062D I 0016    R   780          FDB    TPMCNT
062F I 424144      781 BNTCMP   FCC    /BAD/
0632 I 0D          782          FCB    $D,$10,1,4,$E
0633 I 10
0634 I 01
0635 I 04
0636 I 0E
0637 I 0644    I   783          FDB    NMTCMP
0639 I 474F4F      784 GNTCMP   FCC    /GOOD/
063D I 0D          785          FCB    $D,$10,1,5,$E
063E I 10
063F I 01
0640 I 05
0641 I 0E
0642 I 0644    I   786          FDB    NMTCMP
0644 I 4E4F52      787 NMTCMP   FCC    /NORMAL TEST COMPLETION/
065A I 0D          788          FCB    $D
065B I 444953      789          FCC    /DISPLAY STATUS FOR /
066E I 0D          790          FCB    $D
066F I 464155      791          FCC    /FAULTY CONDITIONS/
0680 I 0D          792          FCB    $D,$D,4
0681 I 0D
```

```
0682 I 04
0683 I 10          793 NMTIPG    FCB    $10,2,0
0684 I 02
0685 I 00
0686 I 4E4F52      794           FCC    /NORMAL TEST IN PROGRESS/
069D I 0D          795           FCB    $D,$D,$D,4
069E I 0D
069F I 0D
06A0 I 04
06A1 I 10          796 RDYFIR    FCB    $10,2,0
06A2 I 02
06A3 I 00
06A4 I 11          797           FCB    $11
06A5 I 2A2A20      798           FCC    /** READY TO FIRE **/
06B8 I 12          799           FCB    $12
06B9 I 0D          800           FCB    $D,$D,$D,$D,4
06BA I 0D
06BB I 0D
06BC I 0D
06BD I 04
0000 D             801           DSEC
                   802 *
                   803 *      DEPLOYMENT ROUTINE STORAGE REQUIREMENTS
                   804 *
0000 D 00          805 DEPFLG    FCB    0           DEPLOY FLAGS
0001 D 00          806 LOOPFG    FCB    0           LOOP FLAG
0002 D 0000    A   807 SAVDTI    FDB    0           INDEX REGISTER SAVE AREA
0003 D             808 SVDTI2    EQU    *-1
0004 D 0000    A   809 IDXSAV    FDB    0           INDEX REGISTER SAVE
0005 D             810 IDXSV2    EQU    *-1
0006 D 00          811 DEPSAR    FCB    0           SKIP ENTRY AREA
0007 D 00          812 DEPIDX    FCB    0           INDEX SAVE AREA
0008 D 0000    A   813 SAVDT2    FDB    0
0009 D             814 SVDT22    EQU    *-1
DEPLOY(A0011.02.010AA  CRS DEPLOYMENT ROUTINE)         08/04/78  13:19:06  PAGE  16

000A D 0000    A   815 SAVDT3    FDB    0
000B D             816 SVDT32    EQU    *-1
000C D 0000    A   817 SAVDT4    FDB    0
000D D             818 SVDT42    EQU    *-1
                   819 *
                   820 *          DEPLOY FLAG EQUATES
                   821 *
0080 A             822 DEPOVL    EQU    $80         DEPLOYMENT MAP OVERFLAW
0040 A             823 DEPSKP    EQU    $40         SKIP FUNCTION
0020 A             824 DEP2IG    EQU    $20         IDX2 > IDX1
0010 A             825 DEPFSN    EQU    $10         FIRST STATION NUMBER
                   826 *
                   827 *      STORAGE REQUIREMENTS FOR 'DPMUPD'
                   828 *
000E D 0000    A   829 STNSAV    FDB    0           STATION SAVE AREA
000F D             830 STNSV2    EQU    *-1
0010 D 00          831 RTUSAV    FCB    0           RTU ADDRESS SAVE AREA
0011               832           END
DEPLOY(A0011.02.010AA  CRS DEPLOYMENT ROUTINE)         08/04/78  13:19:07  PAGE  17

   NO ERRORS
  ISECT LENGTH --  1726
  DSECT LENGTH --    17

  AXLADV   0080 A   155    216   479
  AXLFIR   0040 A   156    216   479   535
  AXLFTS   0010 A   158    216   479
  AXLOVR   0020 A   157    216   479
> BNDEND   000E      25     25   585   587   613   672
> BNDSTR   000D      25     25   579   590   591   598   685
  BNTCMP   062F I   781    514
> CHKDEP   0021      33     33   207   358   386   469
> CHKIDS   0007      22     22   369   382   387   404   405   420
> CHKRDP   001B      32     32   178   374   435   639
> CHNADR   0003      20     20   239   240   421   451   737
  CHNFLD   058F I   736
  CHNMSG   058E I   735    248
```

```
  CHNNDG   0001 A  138   735
> CHRCNT   0006     22    22   279
> CLRPRG   0027     34    34   218   478
> CMPPR1   000F     25    25   289   592   605   679
> CMPPR2   0010     25    25   301   307   351   594   602   676
> CMPRTN   002A     35    35   304   312   355   595   609   681
> CURCSP   000A     24    24   196   202   209   236   273   281   408   417   447   458   464
                         471   501   509   516   521   527   574
> CURLIN   000B     24    24   436
  DEP1     00B6 I  233   177   199   208
  DEP1A    007C I  209   201   206
  DEP1B    002B I  178   176
  DEP1C    0028 I  177   179
  DEP2     0023 I  175   171
< DEP2IG   0020 A  824    14   293   339   581   621   665   692
  DEP3     00F9 I  258
  DEP4     0119 I  270   262
  DEP6     012A I  277   272
  DEP7     01E4 I  358   287
  DEP8     00E9 I  252
  DEPB     0295 I  428   426
  DEPC     00C9 I  240   453
  DEPCA    00D3 I  244   333   368
  DEPD     02BA I  443   276   432
  DEPE     02D6 I  457   452
  DEPE1    0318 I  485   461   470
< DEPFLG   0000 D  805    14   162   233   235   252   254   259   292   338   422   434   442
                         444   580   620   663   666   691
< DEPFSN   0010 A  825    14   234   277   431   433   664
  DEPG     0368 I  516   486
< DEPIDX   0007 D  812    10
  DEPK     001A I  172   168
  DEPL     026F I  413   360
< DEPLOY   0000 I  161     7   194
  DEPM     025C I  405   377
  DEPN     013C I  285   278   280   335
  DEPN1    015A I  298   294
  DEPN2    01B4 I  336   305
  DEPN3    0185 I  316   313   356
  DEPN4    0193 I  321   327
DEPLOY(A0011.02.010AA  CRS DEPLOYMENT ROUTINE)          08/04/78  13:19:08  PAGE  18

  DEPN5    01AF I  334   322   332
  DEPN6    019F I  328   324
  DEPN7    01C4 I  344   340
  DEPN8    0180 I  314   357
  DEPNA    0144 I  288   286
  DEPO     0293 I  427   424
< DEPOVL   0080 A  822    14
  DEPP     0247 I  397   385   390
  DEPQ     0250 I  401   396
  DEPR     01EC I  361   359
  DEPRA    0200 I  369   367
  DEPS     0365 I  515   513
< DEPSAR   0006 D  811    10   180   187   761
< DEPSKP   0040 A  823    14   253   261   425   443
  DEPT     03B3 I  551   520   530   533   539   549
  DEPU     03B1 I  550   525   543   546
  DEPV     02F6 I  471   463   468
  DEPY     0370 I  519
< DEPYX    0380 I  526     9
  DEPYX1   039D I  540   536
  DEPZ     01E9 I  360   362
> DEXRTN   0028     35    35   352   567   606   708
> DISPLY   0019     32    32   173   264   500   515   538
> DLPUPD   0022     33    33   410   449   518
> DPLRTU   001D     32    32   189
  DPM1     03FA I  587   582
  DPM2     0402 I  591   586
  DPM3     04BC I  672   597
  DPM4     0487 I  647   610
  DPM5     0457 I  625   622
  DPM8     0480 I  644   628
```

```
   DPM9      045C I   627    638   643   699
   DPMA      03C8 I   565    573
   DPMB      03DF I   574    569
   DPMC      0448 I   617    668
   DPMD      0500 I   700    682
   DPME      04F6 I   696    693
   DPMF      0416 I   598    596
   DPMM      04A4 I   659    712
   DPMS      0439 I   611    608
   DPMUPD    03B6 I   555    334
   DPTDT1    0006 A    42    295   311   341   354
   DPTDT2    00CE A    43    291   337
   DSNMSG    05C0 I   753    263
 > EXECTV    001A      32     32   174   551
   FSPNPG    051F I   717    219   481
 > FSQNPG    0014      28     28
   GNTCMP    0639 I   784    511
 > IDXRTN    0029      35     35   309   319   572   656   680
 < IDXSAV    0004 D   809     12   290   316   336   576   617   626   629   636   647   657   688
                             697   700   709
 < IDXSV2    0005 D   810     12
   INTENB    003F A   144    445
   INTMSK    003E A   143    413
   INVPTA    05C5 I   757    172
 > INX4      002B      36     36   658   701
   LCABBR    0004 A    50
   LCADPM    0014 A    71    409   448   517   575
DEPLOY(A0011.02.010AA  CRS DEPLOYMENT ROUTINE)          08/04/78  13:19:08  PAGE  19

   LCADTB    0012 A    69
   LCAMDE    0010 A    67    531   550
   LCANRS    0002 A    48
   LCAPAR    0011 A    68
   LCARSR    0003 A    49
   LCASBT    0018 A    73
   LCASHA    0019 A    74
   LCASP1    0006 A    55
   LCASP2    0008 A    56
   LCASP3    0009 A    57
   LCASP4    000A A    58
   LCASP5    000B A    59
   LCASPL    0013 A    70    534
   LCASPT    0000 A    47
   LCAST1    000C A    63    197   210   212   459   472   474   528
   LCAST2    000D A    64
   LCAST3    000E A    65    502   505   510   523
   LCAST4    000F A    66    213   215   475   477   540
   LCASTN    0016 A    72    237   274   282   418   419   506
   LCATRS    0005 A    51
 > LINSAV    0008      22     22   393   397
 > LITOFF    002C      37     37   217   480
 < LOOPFG    0001 D   806      8
   LS2BFD    0020 A    91
   LS2BTP    0002 A    95
   LS2DKR    0080 A    89
   LS2NTP    0004 A    94
   LS2RCP    0040 A    90
   LS2RCR    0010 A    92
   LS2TIP    0008 A    93
   LS2TSP    0001 A    96
   LS3BLE    0040 A   101
   LS3BVT    0080 A   100
   LS3MNE    0004 A   105
   LS3MTT    0020 A   102    504
   LS3NDR    0002 A   106
   LS3NEF    0008 A   104    512   524
   LS3STF    0010 A   103    503
   LS4FRL    0010 A   110    214   476   545
   LS4OVL    0003 A   111
   LS4SPL    0002 A   113    214   476   548
   LS4SRL    0001 A   114    214   476   548
   LS4TSL    0004 A   112    542
   LSTCBP    0008 A    82
```

```
 LSTEMF    0080 A    78
 LSTEOT    0004 A    83
 LSTMMO    0002 A    84
 LSTMSF    0040 A    79
 LSTMTP    0001 A    85
 LSTPRG    0020 A    80   198  211  460  473  529
 LSTTBP    0010 A    81
 MODADV    0006 A   124   544
 MODFIR    0003 A   121   547
 MODFRA    0005 A   123   532
 MODFRE    0000 A   118
 MODFLY    0001 A   119
 MODPRG    0002 A   120   541
 MODTST    0004 A   122   522
DEPLOY(A0011.02.010AA  CRS DEPLOYMENT ROUTINE)         08/04/78  13:19:08  PAGE  20

> MSGOUT   001E      32    32  166  186  193  222  247  251  258  331  366  484
> MSGRQT   0005      22    22  164  184  191  220  245  249  256  329  364  482
  MSGTBF   0020 A   130   257
  MSGTCV   0080 A   128   185  246  250  257
  MSGTIP   0040 A   129   165  257
  MSGTPS   0010 A   131
  MSGTRC   0004 A   133   192  221  330  365  483
  MSGTSV   0008 A   132
  NMTCMP   0644 I   787   783  786
  NMTIPG   0683 I   793   499
> NRMTST   0025      34    34  508
> NUMMSG   0015      28    28  732  741  750  769
  OVLMSG   060F I   774   328
> PIAKCR   0009      23    23  414  446
> RACTLS   0017      30    30  229
> RCMAPT   0018      30    30  230
> RCTACK   0012      27    27  487
> RCTSST   0013      27    27  227  494
< RDYFIR   06A1 I   796    15  537
> RTSMAP   001C      32    32  188
> RTSTAT   0023      34    34  493
  RTUACT   00FF A   148   225
> RTUADR   0001      20    20  169  175  223  232  371  373  389  412  423  429  485
                          490  497  519  556  631  637  645
> RTUCMD   0024      34    34  228  491  498
  RTUDPE   05DA I   759   183
> RTUFLA   0000      20    20  167  729
  RTUFLD   0576 I   728
  RTUINT   0002 A   149   489
  RTUMSG   0575 I   727   163  244
  RTUNDG   0003 A   137   727
> RTUPDR   001F      33    33  195
  RTURET   0609 I   771   190
< RTUSAV   0010 D   831    17  557  644
  RTUSTS   0060 A   150   226  492
< SAVDT2   0008 D   813    13
< SAVDT3   000A D   815    13  300  315  346
< SAVDT4   000C D   817    13  383  403
< SAVDTI   0002 D   807    11  303  306  317  318  348  350  563  564  571  601  611
                          612  650  651  655  659  660  675  683  684  702  703  706
> SELIDX   0020      33    33  205  285  384  467
> SEQTST   0026      34    34  200  462
> STNAD2   0004      21    21  392  416  439
> STNADR   0002      20    20  182  204  238  241  243  271  275  284  288  376  378
                          381  391  402  415  438  466  507  558  593  746
  STNDPY   054F I   721   363
  STNMSG   05A4 I   744   255
  STNNDG   0004 A   139   744
< STNSAV   000E D   829    17  379  401  559  565  568  600  604  607  674  678
< STNSV2   000F D   830    17
  STSIAV   0000 A   151   226  492
< SVDT22   0009 D   814    13
< SVDT32   000B D   816    13
< SVDT42   000D D   818    13
< SVDTI2   0003 D   808    11
> TMRBCA   0011      26    26  266
> TMRBTV   000C      25    25  268  488  495
> TMRCDV   002D      38    38  269
```

```
DEPLOY(A0011.02.010AA  CRS DEPLOYMENT ROUTINE)          08/04/78  13:19:09  PAGE  21

> TPMCNT    0016      29      29   726   773   780
PRGRAM(A0011.02.011AA  CRS SPREAD PROGRAM ROUTINE)      08/04/78  09:42:07  PAGE   1

                  *
                  *      CENTRAL RECORDING STATION PROGRAMMING ROUTINE
                  *
0000 I                     ISEC
                  *
                           DEF     PRGRAM
                           DEF     SPNDPY,PRGDBS,PRGESN
                           DEF     PRGPTR
                           DEF     STNFLD
                           DEF     CLRPRG
                  *
                           REF     TIHESN,TIHDBS
                  *
                           REF     CURCSP,CURIDX,STNADR,STNAD2,STNSAV,STNSV2
                  *
                           REF     TSWNCO,TSWNCT
                  *
                           REF     CHRQST,DECNUM,NUMCHR,HEXVAL,HEXVL1
                           REF     CHRCNT,CNVPTR,DPAVAL
                  *
                           REF     DEPFLG,NUMMSG,BLASKP
                  *
                           REF     MSGCNV,MSGROT
                  *
                           REF     MPRSTG
                           REF     RCMAPT
                           REF     RACTLS
                  *
                           REF     RCTSST
                  *
                  *
                           REF     MPRRST,MPRSAV,RTUCMD,LITOFF,MSGOUT
                           REF     SELIDX,CHKDEP,DISPLY,EXECTV,KYS2
                           REF     DECBIN,DEXRTN,DPADDR,SEQTST,ACTRTN
                           REF     USPRTN
                           REF     IDXRTN
                           REF     LITEON
                           REF     RCMSET
                  *
                  *
                  *      MAXIMUM # DIGITS FOR DEPLOY PARAMTERS
                  *
0004 A               STNNDG   EQU     4           STATION NUMBER
0006 A               MAXDG    EQU     6           MAX # DIGITS FOR DISPLAY OR ENTRY
                  *
                  *      LINE STORAGE OFFSET EQUATES
                  *
0024 A               LCSSAR   EQU     36          OFFSET TO SHOOTER A RECORDING PATTERN
003E A               LCSSBP   EQU     62          OFFSET TO SHOOTER B PARAMETERS
                  *
                  *      RTU COMMAND EQUATES
                  *
00FF A               RTUACT   EQU     $FF         ALL ACTIVE RTUS
0060 A               RTUSTS   EQU     $60         RTU STATUS TRANSFER
0000 A               STSIAV   EQU     0           INACTIVE STATE
                  *
                  *
                  *      CURRENT LINE CONTROL STORAGE OFFSETS
PRGRAM(A0011.02.011AA  CRS SPREAD PROGRAM ROUTINE)      08/04/78  09:42:08  PAGE   2

                  *
0000 A               LCASPT   EQU     0           SHOT POINT STATION
0002 A               LCANRS   EQU     2           # STATIONS NOT RECORDED EACH SIDE OF S. P.
0003 A               LCARSR   EQU     3           # RECORDING STATIONS TO 1ST RECORDING STN
0004 A               LCABBR   EQU     4           TOTAL # STATIONS TO 1ST RECORDING STATION
0005 A               LCATRS   EQU     5           TOTAL # RECORDING STATIONS
                  *
                  *           PARAMETER SAVE AREA FOR ADVANCE KEY RESET FUNCTION
                  *
```

```
0006 A           69 LCASP1    EQU   6
0008 A           70 LCASP2    EQU   8
0009 A           71 LCASP3    EQU   9
000A A           72 LCASP4    EQU   10
000B A           73 LCASP5    EQU   11
                 74 *
                 75 *            LINE STATUS FLAG
                 76 *
000C A           77 LCAST1    EQU   12          STATUS FLAGS
000D A           78 LCAST2    EQU   13          STATUS FLAGS BYTE 2
000E A           79 LCAST3    EQU   14
000F A           80 LCAST4    EQU   15          STATUS FLAGS BYTE 4
0010 A           81 LCAMDE    EQU   16          LINE MODE
0011 A           82 LCAPAR    EQU   17          PARITY COUNT
0012 A           83 LCADTB    EQU   18          TIME BREAK
0013 A           84 LCASPL    EQU   19          KEYBOARD LITES
0014 A           85 LCADPM    EQU   20          ADDR OF START OF DEPLOYMENT MAP
0016 A           86 LCASTN    EQU   22          LAST STN # DEPLOYED FOR THIS LINE AND SHOOE
0018 A           87 LCASBT    EQU   24          ROLL ALONG DISPLAY PARAMETERS
0019 A           88 LCASHA    EQU   25          ROLL ALONG DISPLAY PARAMETERS
                 89 *
                 90 *      LINE STATUS FLAGS (BYTE 1)
                 91 *
0080 A           92 LSTEMF    EQU   $80         EXECUTIVE MODE
0040 A           93 LSTMSF    EQU   $40         MOMENTARY SWITCH FLAG
0020 A           94 LSTPRG    EQU   $20         FIRE SEQUENCE PROGRAMMED
0010 A           95 LSTTBP    EQU   $10         TAPE BY-PASS
0008 A           96 LSTCBP    EQU   8           CAMERA BY-PASS
0004 A           97 LSTEOT    EQU   4           END-OF-TAPE
0002 A           98 LSTMMO    EQU   2           MULTIPLE MONITOR OUTPUT REQUEST
0001 A           99 LSTMTP    EQU   1           MULTIPLE NORMAL TEST PASSED
                100 *
                101 *      LINE STATUS FLAGS (BYTE 2)
                102 *
0080 A          103 LS2DKR    EQU   $80         DECIMAL KEY REQUEST PENDING
0040 A          104 LS2RCP    EQU   $40         DECIMAL KEY REQUEST COMPLETE
0020 A          105 LS2BFD    EQU   $20         BLANK FIELD IN DECIAL REQUEST
0010 A          106 LS2RCR    EQU   $10         RETRY OR CONTINUE DECIMAL KEY ENTRY
0008 A          107 LS2TIP    EQU   8           MULTIPLE NORMAL TEST-IN-PROGRESS
0004 A          108 LS2NTP    EQU   4           NORMAL TEST-IN-PROGRESS
0002 A          109 LS2BTP    EQU   2           BLAST TEST-IN-PROGRESS
0001 A          110 LS2TSP    EQU   1           TILT SEARCH-IN-PROGRESS
                111 *
                112 *      LINE STATUS FLAG EQUATES (BYTE 3)
                113 *
0080 A          114 LS3BVT    EQU   $80         UNIT STATUS DISPLAY TOGGLE
0040 A          115 LS3BLE    EQU   $40         BLASTER ERROR
0020 A          116 LS3MTT    EQU   $20         MANUAL TEST FLAG
0010 A          117 LS3STF    EQU   $10         SINGLE TEST FLAG
PRGRAM(A0011.02.011AA  CRS SPREAD PROGRAM ROUTINE)     08/04/78  09:42:09  PAGE   3

0008 A          118 LS3NEF    EQU   8           NORMAL TEST ERROR FLAG
0004 A          119 LS3MNE    EQU   4           NORMAL TEST ERROR FLAG (MULTIPLE TE
0002 A          120 LS3NDR    EQU   2           NOISE DATA RECORDING
                121 *
                122 *      LINE STATUS FLAGS (BYTE 4)
                123 *
0010 A          124 LS4FRL    EQU   $10         FIRE LOCK OUT
0008 A          125 LS4OVL    EQU   8           OVERRIDE LOCK OUT
0004 A          126 LS4TSL    EQU   4           TEST LOCK OUT
0002 A          127 LS4SPL    EQU   2           SHOT POINT ADVANCE LOCK OUT
0001 A          128 LS4SRL    EQU   1           SPREAD ADVANCE LOCK OUT
                129 *
                130 *      LINE MODE EQUATES
                131 *
0000 A          132 MODFRE    EQU   0           FREE MODE
0001 A          133 MODPLY    EQU   1           DEPLOY MODE
0002 A          134 MODPRG    EQU   2           PROGRAM MODE
0003 A          135 MODFIR    EQU   3           FIRE MODE
0004 A          136 MODTST    EQU   4           TEST MODE
0005 A          137 MODFRA    EQU   5           FIRE ABORT MODE
0006 A          138 MODADV    EQU   6           ADVANCE MODE
                139 *
```

```
                *       MESSAGE REQUEST TYPE
                *
0080 A            MSGTCV    EQU    $80          CONVERT AND DISPLAY OLD VALUE
0040 A            MSGTIP    EQU    $40          INPUT AND DISPLAY NEW VALUE
0020 A            MSGTBF    EQU    $20          SET BLANK FLAG
0010 A            MSGTPS    EQU    $10          CONVERSION PNTR ALREADY SET
0008 A            MSGTSV    EQU    8            CONVERTED VALUE STORED READY FOR DISPLAY
0004 A            MSGTRC    EQU    4            RETRY OR CONTINUE REQUEST
                *
                *       AUXILIARY KEYBOARD LITE EQUATES
                *
0008 A            AXLCBP    EQU    8            CAMERA BY-PASS
0001 A            AXLTBP    EQU    1            TAPE BY-PASS LITE
0002 A            AXLNTS    EQU    2            NORMAL TEST-IN-PROGRESS LITE
0080 A            AXLADV    EQU    $80          ADVANCE LITE
0040 A            AXLFIR    EQU    $40          FIRE LITE
0020 A            AXLOVR    EQU    $20          OVERRIDE LITE
0010 A            AXLFTS    EQU    $10          AUTO FIRE MULT NORMAL TEST
                *
0024 A            LCAFLG    EQU    36           SHOOTER CONTROL FLAGS
                *
0080 A            SCFADV    EQU    $80          ADVANCE MODE SELECT (BIT => 1 = S. P.
                *
                *
                **
                **      SPREAD PARAMETER DEFINITIONS
                **
                *
                *       SHOT POINT RIGHT OF SPREAD
                *
                *            LCARSR = 0
                *            LCABBR = (NO. STATIONS BETWEEN BLASTER & 1ST RECORDING STN)
                *                     (EXCLUDES BLANK STATIONS)
                *
                *                                  EXAMPLE:  ]*        LCABBR = 1
                *                                            ]XX*      LCABBR = 3
PRGRAM(A0011.02.011AA  CRS SPREAD PROGRAM ROUTINE)     02/04/78  09:42:10  PAGE   4

                *                                            ]__*      LCABBR = 1
                *
                *                                  WHERE:  ] => 1ST RECORDING STA
                *                                          X => STATION POSITION
                *                                          _ => BLANK STATION
                *                                          * => BLASTER LOCATION
                *
                *       SHOT POINT LEFT OF SPREAD
                *
                *            LCARSR = LCATRS
                *            LCABBR = (NO/ STATIONS TO 1ST RECORDING EXCLUDING BLANK S
                *
                *
                *       SHOT POINT WITHIN SPREAD
                *
                *            LCABBR = 0
                *
0000 I            PRGRAM    EQU    *
0000 I FE 0002 R            LDX    CURCSP
0003 I 6D 00                TST    0,X          SHOOTER PROGRAMMED
0005 I 26 06                BNE    PRGE
0007 I FE 0003 R            LDX    CURIDX       PICK UP PNTR TO LAST PROGRAM
000A I BD 001B R            JSR    MPRRST       MOVE IN LAST PARAMETERS
000D I FE 0002 R  PRGE      LDX    CURCSP       SAVE OLD
0010 I BD 001C R            JSR    MPRSAV       PARAMETERS
0013 I BD 01A9 I            JSR    CLRPRG       CLEAR RECORDING PATTERN DISPLAY
0016 I FE 0002 R            LDX    CURCSP       PICK UP PNTR TO CONTROL STORAGE AREA
0019 I A6 0C                LDA A  LCAST1,X     RESET FIRE
001B I 84 DE                AND A  #-1-LSTPRG-LSTMTPSEQUENDE
001D I A7 0C                STA A  LCAST1,X     PROGRAMMED FLAG
001F I A6 0F                LDA A  LCAST4,X
0021 I 84 EC                AND A  #-1-LS4SRL-LS4SPL-LS4FRL
0023 I A7 0F                STA A  LCAST4,X
0025 I 86 FF                LDA A  #RTUACT      SET
0027 I C6 60                LDA B  #RTUSTS+STSIAVALL RTUS
0029 I CE 001A R            LDX    #RCTSST
```

```
002C I BD 001D R   212            JSR    RTUCMD       INACTIVE
002F I CE 0019 R   213            LDX    #RACTLS
0032 I FF 0018 R   214            STX    RCMAPT
0035 I 86 F0       215            LDA A  #AXLFIR+AXLADV+AXLOVR+AXLFTSTURN OFF
0037 I BD 001E R   216            JSR    LITOFF       STEP ADVANCE LITE AND ABORT LITE
003A I FE 0002 R   217            LDX    CURCSP       PICK UP POINTER TO PARAMETER SAVE AREA
003D I FF 0000 D   218            STX    PRGPTR       SAVE CONVERSION
0040 I FF 0015 R   219            STX    MSGCNV       POINTER
0043 I CE 0305 I   220            LDX    #SPSMSG      PROCESS SHOT-POINT
0046 I FF 0016 R   221            STX    MSGRQT       STATION
0049 I C6 F0       222            LDA B  #MSGTCV+MSGTIP+MSGTBF+MSGTPS
004B I BD 001F R   223            JSR    MSGOUT       REQUEST
004E I FE 0000 D   224            LDX    PRGPTR       SET UP
0051 I EE 00       225            LDX    0,X          STATION
0053 I FF 0004 R   226            STX    STNADR       NUMBER
0056 I 7F 0012 R   227            CLR    DEPFLG       SELECT PROPER
0059 I BD 0020 R   228            JSR    SELIDX       INDX
005C I 2B 05       229            BMI    PRG2         JUMP IF NOT OUTSIDE DEPLOYMENT MAP
005E I BD 0021 R   230            JSR    CHKDEP       SHOT POINT DEPLOYED
0061 I 26 16       231            BNE    PRG3
0063 I CE 02E1 I   232 PRG2       LDX    #SPNDPY      DISPLAY ERROR
0066 I BD 0022 R   233 PRGG       JSR    DISPLY       MESSAGE
PRGRAM(A0011 02.011AA  CRS SPREAD PROGRAM ROUTINE)      [illegible]

0069 I FE 0002 R   234 PRGX       LDX    CURCSP       SET
006C I 86 01       235            LDA A  #MODPLY      SET DISPLAY
006E I A7 10       236            STA A  LCAMDE,X
0070 I FE 0017 R   237            LDX    MPRSTG       RESTORE OLD LINE AND
0073 I BD 001B R   238            JSR    MPRRST       SHOOTER PARAMETERS
0076 I 7E 0023 R   239            JMP    EXECTV       INITIATE NEXT SEQUENCE
0079 I 6D 00       240 PRG3       TST    0,X          SKIP STATION
007B I 2A 05       241            BPL    PRGF
007D I CE 0014 R   242            LDX    #BLASKP
0080 I 20 E4       243            BRA    PRGG
0082 I FE 0000 D   244 PRGF       LDX    PRGPTR       SET
0085 I 08          245            INX                 PNTR TO
0086 I 08          246            INX                 # NON-RECORDING
0087 I FF 0000 D   247            STX    PRGPTR       CHANNELS
008A I FF 0015 R   248            STX    MSGCNV       SET UP DISPLAY PARAMETER
008D I CE 0207 I   249            LDX    #NNRMSG      PROCESS
0090 I FF 0016 R   250            STX    MSGRQT       NUMBER NON-RECORDING
0093 I C6 F0       251            LDA B  #MSGTCV+MSGTIP+MSGTBF+MSGTPS
0095 I BD 001F R   252            JSR    MSGOUT       REQUEST
0098 I FE 0000 D   253            LDX    PRGPTR       SET PNTR TO
009B I 08          254            INX                 CURRENT VALUE
009C I FF 0000 D   255            STX    PRGPTR       TO RIGHT OF
009F I FF 0015 R   256            STX    MSGCNV       SHOT POINT
00A2 I CE 0245 I   257            LDX    #NCFMSG      PROCESS
00A5 I FF 0016 R   258            STX    MSGRQT       DISPLAY
00A8 I C6 F0       259            LDA B  #MSGTCV+MSGTIP+MSGTBF+MSGTPS
00AA I BD 001F R   260            JSR    MSGOUT       REQUEST
00AD I FE 0000 D   261            LDX    PRGPTR
00B0 I 08          262            INX
00B1 I 6F 00       263            CLR    0,X          CLEAR TOTAL # CHANNELS
00B3 I 08          264            INX
00B4 I FF 0015 R   265            STX    MSGCNV
00B7 I FF 0000 D   266            STX    PRGPTR
00BA I 86 06       267            LDA A  #MAXDG
00BC I B7 000A R   268            STA A  CHRQST       INTERNAL
00BF I 5F          269            CLR B               STORAGE
00C0 I BD 0024 R   270            JSR    KYS2         AREA
00C3 I 09          271            DEX                 DECR IDX TO 1ST DIGIT
00C4 I B6 0008 R   272            LDA A  TSWNCO       MOVE TOTAL
00C7 I 8A 30       273            ORA A  #$30         # RECORDING
00C9 I A7 00       274            STA A  0,X          CHANNELS FROM
00CB I B6 0009 R   275            LDA A  TSWNCT
00CE I 09          276            DEX                 SWITCHES
00CF I 8A 30       277            ORA A  #$30
00D1 I A7 00       278            STA A. 0,X
00D3 I 09          279 PRGM       DEX
00D4 I FF 000B R   280            STX    DECNUM
00D7 I 86 02       281            LDA A  #TNCNDG
00D9 I B7 000C R   282            STA A  NUMCHR
```

```
00DC I CE 000D R             LDX    #HEXVAL
00DF I FF 0010 R             STX    CNVPTR
00E2 I BD 0025 R             JSR    DECBIN
00E5 I FE 0000 D             LDX    PRGPTR
00E8 I B6 000E R             LDA A  HEXVL1
00EB I A7 00                 STA A  0,X
00ED I CE 028F I     PRG5    LDX    #TNCMSG      PROCESS TOTAL # CHANNELS REQUEST
00F0 I FF 0016 R             STX    MSGRQT
00F3 I C6 F0                 LDA B  #MSGTIP+MSGTBF+MSGTPS+MSGTCV
PRGRAM(A0011.02 011AA  CRS SPREAD PROGRAM ROUTINE)      08/04/78  09:42:12  PAGE   6

00F5 I BD 001F R             JSR    MSGOUT
00F8 I FE 0002 R             LDX    CURCSP
00FB I EE 00                 LDX    LCASPT,X     SET SHOT POINT STATION #
00FD I FF 0004 R             STX    STNADR       FOR USE IN COMPUTATION
0100 I FF 0006 R             STX    STNSAV
0103 I FE 0002 R             LDX    CURCSP       SET PNTR TO CONTROL STORAGE AREA
0106 I A6 02                 LDA A  LCANRS,X     PICK UP # BLANKING STATIONS
0108 I E6 03                 LDA B  LCARSR,X     PICK UP # STNS TO 1ST RECORDING STATI
010A I 26 0C                 BNE    PRG8         JUMP IF SHOT POINT NOT LOCATED RIGHT OF SPL
010C I 4C                    INC A               NNR = NNR + 1
010D I 5C                    INC B
010E I E7 04                 STA B  LCABBR,X     SET TOTAL # CHANNELS
0110 I CE 0004 R             LDX    #STNADR
0113 I BD 0026 R             JSR    DEXRTN
0116 I 20 11                 BRA    PRGB
0118 I E1 05         PRG8    CMP B  LCATRS,X
011A I 2D 06                 BLT    PRG9
011C I E7 04                 STA B  LCABBR,X     SET TOTAL # CHANNELS
011E I E6 05                 LDA B  LCATRS,X     SET NCR V TNC
0120 I E7 03                 STA B  LCARSR,X
0122 I 1B            PRG9    ABA                 SET 1ST RECORDING STATION
0123 I CE 0004 R             LDX    #STNADR      COMPUTE 1ST RECORDING
0126 I BD 002B R             JSR    IDXRTN       STATION #
0129 I CE 0325 I     PRGB    LDX    #FSNMSG      DISPLAY COMPUTED FIRST
012C I FF 0016 R             STX    MSGRQT       STATION NUMBER AND
012F I C6 E0                 LDA B  #MSGTCV+MSGTIP+MSGTBF
0131 I BD 001F R             JSR    MSGOUT       REQUEST AFFIRMATION
0134 I 7D 000F R             TST    CHRCNT       FIRST  STATION CORRECT
0137 I 27 24                 BEQ    PRGC         YES
0139 I CE 0004 R             LDX    #STNADR      SET PNTR TO
013C I FF 0011 R             STX    DPAVAL       VALUE TO BE INCREMENTED
013F I 73 0006 R             COM    STNSAV       COMPLEMENT
0142 I 73 0007 R             COM    STNSV2       SHOT POINT
0145 I FE 0006 R             LDX    STNSAV       STATION
0148 I 08                    INX
0149 I BD 0027 R             JSR    DPADDR
014C I FE 0002 R             LDX    CURCSP
014F I A6 03                 LDA A  LCARSR,X     NCR = 0
0151 I 26 03                 BNE    PRGD
0153 I 70 0005 R             NEG    STNAD2
0156 I F6 0005 R     PRGD    LDA B  STNAD2
0159 I E0 02                 SUB B  LCANRS,X
015B I E7 04                 STA B  LCABBR,X     SET TOTAL # STATIONS TO 1ST RECORDING STN
015D I BD 0028 R     PRGC    JSR    SEQTST       FIRE SEQUENCE DEPLOYED
0160 I 27 09                 BEQ    PRG6         YES
0162 I CE 02BD I             LDX    #FSQDPE      DISPLAY ERROR
0165 I BD 0022 R             JSR    DISPLY       MESG
0168 I 7E 0069 I             JMP    PRGX         EXIT VIA ERROR CONDITIONS
016B I BD 002D R     PRG6    JSR    RCMSET       SETUP RECORDING MAP FOR NEW SPREAD
016E I BD 0029 R             JSR    ACTRTN       SET ALL RTU'S IN SPREAD ACTIVE
0171 I FE 0002 R             LDX    CURCSP       RESET
0174 I FF 0003 R             STX    CURIDX       SET NEW PROGRAM INDEX
0177 I A6 0F                 LDA A  LCAST4,X     ADVANCE AND
0179 I 8A 11                 ORA A  #LS4SRL+LS4FRL
017B I A7 0F                 STA A  LCAST4,X     FIRE LOCK OUTS
017D I A6 0C                 LDA A  LCAST1,X     SET FIRE
017F I 8A 20                 ORA A  #LSTPRG      SEQUENCE
0181 I A7 0C                 STA A  LCAST1,X     PROGRAMMED
PRGRAM(A0011.02.011AA  CRS SPREAD PROGRAM ROUTINE)      08/04/78  09:42:13  PAGE   7

0183 I 86 10                 LDA A  #AXLFTS      TURN TEST LITE
0185 I BD 002C R             JSR    LITEON
```

```
0188 I BD 002A R    352           JSR    USPRTN        UPDATE SHOOTER PATTERNP
018B I CE 0349 I    353           LDX    #SLCTAV
018E I FF 0016 R    354           STX    MSGRQT
0191 I C6 40        355           LDA B  #MSGTIP
0193 I BD 001F R    356           JSR    MSGOUT        SELECT ADVANCE
0196 I FE 0002 R    357           LDX    CURCSP
0199 I A6 24        358           LDA A  LCAFLG,X
019B I 84 7F        359           AND A  #-1-SCFADV    SELECT SPREAD ADVANCE
019D I 7D 0002 D    360           TST    ADVMOD
01A0 I 27 02        361           BEQ    PRG6A         JUMP IF SPREAD ADVANCE SELECTED
01A2 I 8A 80        362           ORA A  #SCFADV       SELECT SHOT POINT ADVANCE
01A4 I A7 24        363 PRG6A     STA A  LCAFLG,X
01A6 I 7E 0023 R    364           JMP    EXECTV        INITIATE NEXT SEQUENCE
                    365 *
                    366 *      ROUTINE TO CLEAR RECORDING PATTERN DISPLAY
                    367 *
01A9 I              368 CLRPRG    EQU    *
01A9 I FE 0002 R    369           LDX    CURCSP        CLEAR BLASTER
01AC I 6F 18        370           CLR    LCASBT,X      BIT MASK
01AE I C6 1A        371           LDA B  #LCSSBP-LCSSAR
01B0 I 6F 24        372 CLRF2     CLR    LCSSAR,X      CLEAR
01B2 I 5A           373           DEC B                RECORDING
01B3 I 27 03        374           BEQ    CLRP1         PATTERN SAVE
01B5 I 08           375           INX
01B6 I 20 F8        376           BRA    CLRP2
01B8 I 39           377 CLRP1     RTS
                    378 *
                    379 *      PROGRAM MODE MESSAGES
                    380 *
01B9 I 04           381 PRGESN    FCB    4
01BA I 01           382           FCB    1,27
01BB I 1B
01BC I 0000     R   383           FDB    TIHESN
01BE I 454E45       384           FCC    /ENERGY SOURCE POINT NUMBER/
01D8 I 0D           385           FCB    $D,$E
01D9 I 0E
01DA I 0013     R   386           FDB    NUMMSG
01DC I 0D           387           FCB    $D,$D,$D,$D,4
01DD I 0D
01DE I 0D
01DF I 0D
01E0 I 04
01E1 I 04           388 PRGDBS    FCB    4
01E2 I 02           389           FCB    2,27
01E3 I 1B
01E4 I 0001     R   390           FDB    TIHDBS
01E6 I 10           391           FCB    $10,2,0
01E7 I 02
01E8 I 00
01E9 I 534F55       392           FCC    /SOURCE DEPTH BELOW SURFACE/
0203 I 0E           393           FCB    $E
0204 I 0013     R   394           FDB    NUMMSG
0206 I 04           395           FCB    4
0207 I 82           396 NNRMSG    FCB    NNRNDG+$80    MAX # DIGITS
0208 I 01           397           FCB    1,28          CO-ORDINATES
0209 I 1C
PRGRAM(A0011 02.011AA  CRS SPREAD PROGRAM ROUTINE)      08/04/78  09:42:14  PAGE   8

020A I 0000     A   398           FDB    0
020C I 4E4F2E       399           FCC    /NO. STATIONS NOT RECORDED/
0225 I 0D           400           FCB    $D
0226 I 454143       401           FCC    /EACH SIDE OF SHOT POINT./
023E I 0D           402           FCB    $D,$D,$D,$E
023F I 0D
0240 I 0D
0241 I 0E
0242 I 0013     R   403           FDB    NUMMSG
0244 I 04           404           FCB    4
0002 A              405 NNRNDG    EQU    2
0002 A              406 NCFNDG    EQU    2             MAX # DIGITS FOR # CHANNEL RIGHT OF SHOT P
0245 I 83           407 NCFMSG    FCB    $83
0246 I 01           408           FCB    1,28          DISPLAY CO-ORDINATES
0247 I 1C
0248 I 0000     A   409           FDB    0
```

```
024A I 4E4F2E       410          FCC    /NO. RECORDING STATIONS/
0260 I 0D           411          FCB    $D
0261 I 46524F       412          FCC    /FROM SHOT POINT/
0270 I 0D           413          FCB    $D
0271 I 544F20       414          FCC    /TO 1ST RECORDING STATION/
0289 I 0D           415          FCB    $D,$D,$E
028A I 0D
028B I 0E
028C I 0013    R    416          FDB    NUMMSG
028E I 04           417          FCB    4
0002 A              418 TNCNDG   EQU    2          MAX # DIGITS FOR TOTAL # CHANNELS
028F I 83           419 TNCMSG   FCB    $83
0290 I 01           420          FCB    1,28       DISPLAY CO-ORDINATES
0291 I 1C
0292 I 0000    A    421          FDB    0
0294 I 544F54       422          FCC    /TOTAL NUMBER OF/
02A3 I 0D           423          FCB    $D
02A4 I 524543       424          FCC    /RECORDING STATIONS/
02B6 I 0D           425          FCB    $D,$D,$D,$E
02B7 I 0D
02B8 I 0D
02B9 I 0E
02BA I 0013    R    426          FDB    NUMMSG
02BC I 04           427          FCB    4
02BD I 464952       428 FSQDPE   FCC    /FIRE SEQUENCE DEPLOYMENT ERROR/
02DB I 0D           429          FCB    $D,$D,$D,$D,4
02DC I 0D
02DD I 0D
02DE I 0D
02DF I 04
02E0 I 04           430          FCB    4
02E1 I 53484F       431 SPNDPY   FCC    /SHOT POINT STATION NOT DEPLOYED/
0300 I 0D           432          FCB    $D,$D,$D,$D,4
0301 I 0D
0302 I 0D
0303 I 0D
0304 I 04
0305 I 04           433 SFSMSG   FCB    STNNDG
0306 I 01           434 STNFLD   FCB    1,27       DISPLAY CO-ORDINATES
0307 I 1B
0308 I 0000    A    435          FDB    0
030A I 53484F       436          FCC    /SHOT POINT STATION/
PRGRAM(A0011.02.011AA  CRS SPREAD PROGRAM ROUTINE)      08/04/78  09:42:14  PAGE   9

031C I 0D           437          FCB    $D,$E
031D I 0E
031E I 0013    R    438          FDB    NUMMSG
0320 I 0D           439          FCB    $D,$D,$D,$D,4
0321 I 0D
0322 I 0D
0323 I 0D
0324 I 04
0325 I 04           440 FSNMSG   FCB    STNNDG
0326 I 01           441          FCB    1,26
0327 I 1A
0328 I 0004    R    442          FDB    STNADR
032A I 464952       443          FCC    /FIRST RECORDING STATION/
0341 I 0E           444          FCB    $E
0342 I 0013    R    445          FDB    NUMMSG
0344 I 0D           446          FCB    $D,$D,$D,$D,4
0345 I 0D
0346 I 0D
0347 I 0D
0348 I 04
0349 I              447 SLCTAV   EQU    *
0349 I 81           448          FCB    $81
034A I 02           449          FCB    2,28
034B I 1C
034C I 0002    D    450          FDB    ADVMOD
034E I 53454C       451          FCC    /SELECT ADVANCE MODE/
0361 I 0D           452          FCB    $D
0362 I 303D3E       453          FCC    /0=>SPREAD; 1=>SHOT POINT:   /
037D I 0D           454          FCB    $D,$D,$D,4
```

```
037E I 0D
037F I 0D
0380 I 04
                   455 *
0000 D             456          DSEC
                   457 *
                   458 *     STORAGE REQUIREMENTS FOR 'PRGRAM'
                   459 *
0000 D 0000    A   460 PRGPTR    FDB    0           POINTER TO STORAGE AREA FOR NEW PARAMETERS
0002 D 00          461 ADVMOD    FCB    0           ADVANCE MODE
0003               462           END
PRGRAM(A0011.02.011AA  CRS SPREAD PROGRAM ROUTINE)      08/04/78  09:42:15  PAGE  10

   NO ERRORS
  ISECT LENGTH --   897
  DSECT LENGTH --     3

> ACTRTN    0029      35     35    341
  ADVMOD    0002 D   461    360    450
  AXLADV    0080 A   154    215
  AXLCBP    0008 A   151
  AXLFIR    0040 A   155    215
  AXLFTS    0010 A   157    215    350
  AXLNTS    0002 A   153
  AXLOVR    0020 A   156    215
  AXLTBP    0001 A   152
> BLASKP    0014      22     22    242
> CHKDEP    0021      34     34    230
> CHRCNT    000F      20     20    319
> CHRQST    000A      19     19    268
  CLRP1     01B8 I   377    374
  CLRP2     01B0 I   372    376
< CLRPRG    01A9 I   368     11    201
> CNVPTR    0010      20     20    284
> CURCSP    0002      15     15    194    199    202    217    234    293    297    328    342    357    369
> CURIDX    0003      15     15    197    343
> DECBIN    0025      35     35    285
> DECNUM    000B      19     19    280
> DEPFLG    0012      22     22    227
> DEXRTN    0026      35     35    305
> DISPLY    0022      34     34    233    338
> DPADDR    0027      35     35    327
> DPAVAL    0011      20     20    322
> EXECTV    0023      34     34    239    364
  FSNMSG    0325 I   440    315
  FSQDPE    02BD I   428    337
> HEXVAL    000D      19     19    283
> HEXVL1    000E      19     19    287
> IDXRTN    002B      37     37    314
> KYS2      0024      34     34    270
  LCABBR    0004 A    64    303    309    334
  LCADPM    0014 A    85
  LCADTB    0012 A    83
  LCAFLG    0024 A   159    358    363
  LCAMDE    0010 A    81    236
  LCANRS    0002 A    62    298    333
  LCAPAR    0011 A    82
  LCARSR    0003 A    63    299    311    329
  LCASBT    0018 A    87    370
  LCASHA    0019 A    88
  LCASP1    0006 A    69
  LCASP2    0008 A    70
  LCASP3    0009 A    71
  LCASP4    000A A    72
  LCASP5    000B A    73
  LCASPL    0013 A    84
  LCASPT    0000 A    61    294
  LCAST1    000C A    77    203    205    347    349
  LCAST2    000D A    78
  LCAST3    000E A    79
PRGRAM(A0011.02.011AA  CRS SPREAD PROGRAM ROUTINE)      08/04/78  09:42:16  PAGE  11

  LCAST4    000F A    80    206    208    344    346
  LCASTN    0016 A    86
  LCATRS    0005 A    65    307    310
```

| | | | | | | | | | | | | |
|---|---|---|---|---|---|---|---|---|---|---|---|---|
| | LCSSAR | 0024 | A | 49 | 371 | 372 | | | | | | |
| | LCSSBP | 003E | A | 50 | 371 | | | | | | | |
| > | LITEON | 002C | | 38 | 38 | 351 | | | | | | |
| > | LITOFF | 001E | | 33 | 33 | 216 | | | | | | |
| | LS2BFD | 0020 | A | 105 | | | | | | | | |
| | LS2BTP | 0002 | A | 109 | | | | | | | | |
| | LS2DKR | 0080 | A | 103 | | | | | | | | |
| | LS2NTP | 0004 | A | 108 | | | | | | | | |
| | LS2RCP | 0040 | A | 104 | | | | | | | | |
| | LS2RCR | 0010 | A | 106 | | | | | | | | |
| | LS2TIP | 0008 | A | 107 | | | | | | | | |
| | LS2TSP | 0001 | A | 110 | | | | | | | | |
| | LS3BLE | 0040 | A | 115 | | | | | | | | |
| | LS3BVT | 0080 | A | 114 | | | | | | | | |
| | LS3MNE | 0004 | A | 119 | | | | | | | | |
| | LS3MTT | 0020 | A | 116 | | | | | | | | |
| | LS3NDR | 0002 | A | 120 | | | | | | | | |
| | LS3NEF | 0008 | A | 118 | | | | | | | | |
| | LS3STF | 0010 | A | 117 | | | | | | | | |
| | LS4FRL | 0010 | A | 124 | 207 | 345 | | | | | | |
| | LS4OVL | 0008 | A | 125 | | | | | | | | |
| | LS4SPL | 0002 | A | 127 | 207 | | | | | | | |
| | LS4SRL | 0001 | A | 128 | 207 | 345 | | | | | | |
| | LS4TSL | 0004 | A | 126 | | | | | | | | |
| | LSTCBP | 0008 | A | 96 | | | | | | | | |
| | LSTEMF | 0080 | A | 92 | | | | | | | | |
| | LSTEOT | 0004 | A | 97 | | | | | | | | |
| | LSTMMO | 0002 | A | 98 | | | | | | | | |
| | LSTMSF | 0040 | A | 93 | | | | | | | | |
| | LSTMTP | 0001 | A | 99 | 204 | | | | | | | |
| | LSTPRG | 0020 | A | 94 | 204 | 348 | | | | | | |
| | LSTTBP | 0010 | A | 95 | | | | | | | | |
| | MAXDG | 0006 | A | 45 | 267 | | | | | | | |
| | MODADV | 0006 | A | 138 | | | | | | | | |
| | MODFIR | 0003 | A | 135 | | | | | | | | |
| | MODFRA | 0005 | A | 137 | | | | | | | | |
| | MODFRE | 0000 | A | 132 | | | | | | | | |
| | MODPLY | 0001 | A | 133 | 235 | | | | | | | |
| | MODPRG | 0002 | A | 134 | | | | | | | | |
| | MODTST | 0004 | A | 136 | | | | | | | | |
| > | MPRRST | 001B | | 33 | 33 | 198 | 238 | | | | | |
| > | MPRSAV | 001C | | 33 | 33 | 200 | | | | | | |
| > | MPRSTG | 0017 | | 26 | 26 | 237 | | | | | | |
| > | MSGCNV | 0015 | | 24 | 24 | 219 | 248 | 256 | 265 | | | |
| > | MSGOUT | 001F | | 33 | 33 | 223 | 252 | 260 | 292 | 318 | 356 | |
| > | MSGRQT | 0016 | | 24 | 24 | 221 | 250 | 258 | 290 | 316 | 354 | |
| | MSGTBF | 0020 | A | 144 | 222 | 251 | 259 | 291 | 317 | | | |
| | MSGTCV | 0080 | A | 142 | 222 | 251 | 259 | 291 | 317 | | | |
| | MSGTIP | 0040 | A | 143 | 222 | 251 | 259 | 291 | 317 | 355 | | |
| | MSGTPS | 0010 | A | 145 | 222 | 251 | 259 | 291 | | | | |
| | MSGTRC | 0004 | A | 147 | | | | | | | | |
| | MSGTSV | 0008 | A | 146 | | | | | | | | |
| | NCFMSG | 0245 | I | 407 | 257 | | | | | | | |
| | NCFNDG | 0002 | A | 406 | | | | | | | | |
| | NNRMSG | 0207 | I | 396 | 249 | | | | | | | |

PRGRAM(A0011.02.011AA CRS SPREAD PROGRAM ROUTINE) 08/04/78 09:42:16 PAGE 12

| | | | | | | | | | | | | |
|---|---|---|---|---|---|---|---|---|---|---|---|---|
| | NNRNDG | 0002 | A | 405 | 396 | | | | | | | |
| > | NUMCHR | 000C | | 19 | 19 | 282 | | | | | | |
| > | NUMMSG | 0013 | | 22 | 22 | 386 | 394 | 403 | 416 | 426 | 438 | 445 |
| | PRG2 | 0063 | I | 232 | 229 | | | | | | | |
| | PRG3 | 0079 | I | 240 | 231 | | | | | | | |
| | PRG5 | 00ED | I | 289 | | | | | | | | |
| | PRG6 | 016B | I | 340 | 336 | | | | | | | |
| | PRG6A | 01A4 | I | 363 | 361 | | | | | | | |
| | PRG8 | 0118 | I | 307 | 300 | | | | | | | |
| | PRG9 | 0122 | I | 312 | 308 | | | | | | | |
| | PRGB | 0129 | I | 315 | 306 | | | | | | | |
| | PRGC | 015D | I | 335 | 320 | | | | | | | |
| | PRGD | 0156 | I | 332 | 330 | | | | | | | |
| < | PRGDBS | 01E1 | I | 388 | 8 | | | | | | | |
| | PRGE | 000D | I | 199 | 196 | | | | | | | |
| < | PRGESN | 01B9 | I | 381 | 8 | | | | | | | |

```
  PRGF      0082 I   244     241
  PRGG      0066 I   233     243
  PRGM      00D3 I   279
< PRGPTR    0000 D   460       9   218   224   244   247   253   255   261   266   286
< PRGRAM    0000 I   193       7
  PRGX      0069 I   234     339
> RACTLS    0019      28      28   213
> RCMAPT    0018      27      27   214
> RCMSET    002D      39      39   340
> RCTSST    001A      30      30   211
  RTUACT    00FF A    54     209
> RTUCMD    001D      33      33   212
  RTUSTS    0060 A    55     210
  SCFADV    0080 A   161     359   362
> SELIDX    0020      34      34   228
> SEQTST    0028      35      35   335
  SLCTAV    0349 I   447     353
< SPNDPY    02E1 I   431       8   232
  SPSMSG    0305 I   433     220
> STNAD2    0005      15      15   331   332
> STNADR    0004      15      15   226   295   304   313   321   442
< STNFLD    0306 I   434      10
  STNNDG    0004 A    44     433   440
> STNSAV    0006      15      15   296   323   325
> STNSV2    0007      15      15   324
  STSIAV    0000 A    56     210
> TIHDBS    0001      13      13   390
> TIHESN    0000      13      13   383
  TNCMSG    028F I   419     289
  TNCNDG    0002 A   418     281
> TSWNCO    0008      17      17   272
> TSWNCT    0009      17      17   275
> USPRTN    002A      36      36   352
T, JYP(A0011.02.012AA  CRS TAPE BYPASS ROUTINE)         08/04/78  13:31:33  PAGE    1

                    2 *
                    3 *      CENTRAL RECORDING STATION TAPE BYPASS ROUTINE
                    4 *
0000 I              5             ISEC
                    6 *
                    7             DEF      TAPBYP
                    8             DEF      SABCPM
                    9             DEF      SAPARM,SBPARM
                   10             DEF      TPBYPI
                   11             DEF      SAVIXP
                   12 *
                   13             REF      CURCSP
                   14             REF      LCTBLE,LCTBEN
                   15             REF      PIAKCR,CASR1,CASR2
                   16 *
                   17             REF      LITEON
                   18             REF      LITOFF
                   19             REF      EXECTV
                   20             REF      LITON,LITOF
                   21             REF      TCDSSP
                   22 *
                   23 *      LINE STATUS FLAGS
                   24 *
000C A             25 LCAST1      EQU      12           LINE STATUS FLAGS (BYTE 1)
0010 A             26 LSTTBP      EQU      $10          TAPE BY-PASS
0040 A             27 LSTMSF      EQU      $40          MOMENTARY SWITCH
                   28 *
000F A             29 LCAST4      EQU      15           LINE STATUS FLAGS (BYTE 4)
0080 A             30 LS4TIH      EQU      $80          TRACE ID HEADER
                   31 *
                   32 *
                   33 *      CRS PANEL LITES
                   34 *
0001 A             35 AXLTBP      EQU      1            TAPE BY-PASS LITE
                   36 *
003D A             37 KCRMSW      EQU      $3D          MOMENTARY SWITCH
0020 A             38 SONLN       EQU      $20          ON LINE
0040 A             39 STDBY       EQU      $40          STANDBY
                   40 *
```

```
0013 A              41 LCASPL    EQU    19
                    42 *
                    43 *
                    44 *
                    45 *
0000 I              46 TAPBYP    EQU    *
0000 I B6 0003 R    47           LDA A  PIAKCR
0003 I 81 3D        48           CMP A  #KCRMSW      IRQ ON TRAILING EDGE OF SWITCH
0005 I 27 02        49           BEQ    TAPX         NO-IGNORE LEADING EDGE INTERRUPT
0007 I 8D 01        50           BSR    TPBYPS       PROCESS TAPE BY-PASS KEY
0009 I 3B           51 TAPX      RTI
                    52 *
000A I              53 TPBYPS    EQU    *
000A I F6 0005 R    54           LDA B  CASR2
000D I C5 40        55           BIT B  #STDBY       TAPE UNIT IN STANDBY MODE ?
000F I 26 16        56           BNE    TPBYPI       YES - TOGGLE TAPE BY-PASS
0011 I FE 0000 R    57           LDX    CURCSP
0014 I A6 0C        58           LDA A  LCAST1,X
0016 I 85 10        59           BIT A  #LSTTBP      TAPE BY-PASS RESET REQUESTED ?
T  YP(A0011.02.012AA  CRS TAPE BYPASS ROUTINE)        08/04/78  13:31:34  PAGE   2

0018 I 26 3E        60           BNE    TPBX         YES - IGNORE REQUEST
001A I A6 0F        61 TPB2      LDA A  LCAST4,X
001C I 85 80        62           BIT A  #LS4TIH      TAPE HEADER ALREADY OUTPUT ?
001E I 27 38        63           BEQ    TPBX         YES - IGNORE ENTRY
0020 I 84 7F        64           AND A  #-1-LS4TIH   RESET TRACE HEADER
0022 I A7 0F        65           STA A  LCAST4,X     FLAG
0024 I BD 000B R    66           JSR    TCDSSP       SET STANDBY POWER ON TAPE UNIT
                    67 *
0027 I              68 TPBYPI    EQU    *
0027 I CE 0001 R    69           LDX    #LCTBLE      PICK UP PNTRX TO SHOOTER A & B
002A I 8D 3B        70 TAP1      BSR    SABCPM       PARAMETERS FOR NEXT LINE
002C I FF 0004 D    71           STX    SAVIXP       SAVE LINE CONTROL STORAGE INDEX TABLE PNTR
002F I FE 0000 D    72           LDX    SAPARM
0032 I E6 0C        73 TAP3      LDA B  LCAST1,X
0034 I C8 10        74           EOR B  #LSTTBP      INVERT TAPE BY-PASS LITE
0036 I E7 0C        75           STA B  LCAST1,X
0038 I 86 01        76           LDA A  #AXLTBP      ANTICIPATE APE BY-PASS MODE
003A I C5 10        77           BIT B  #LSTTBP      TAPE BY-PASS SELECTED ?
003C I 27 05        78           BEQ    TAP5         NO-TURN OFF LITE
003E I BD 0009 R    79           JSR    LITON        TURN ON TAPE BY-PASS LITE
0041 I 20 03        80           BRA    TAP6
0043 I BD 000A R    81 TAP5      JSR    LITOF        TURN OFF TAPE BY-PASS LITE
0046 I BC 0000 D    82 TAP6      CPX    SAPARM       SHOOTER A ?
0049 I 26 05        83           BNE    TAP2         NO-SHOOTERS A & B PROCESSED
004B I FE 0002 D    84           LDX    SBPARM       TOGGLE TAPE BY-PASS FOR
004E I 20 E2        85           BRA    TAP3         SHOOTER B
0050 I FE 0004 D    86 TAP2      LDX    SAVIXP       ALL LINES
0053 I 8C 0002 R    87           CPX    #LCTBEN      PROCESSED
0056 I 26 D2        88           BNE    TAP1         NO-CONTNUE
0058 I FE 0000 R    89 TPBX      LDX    CURCSP
005B I A6 0C        90           LDA A  LCAST1,X     RESET MOMENTARY
005D I 84 BF        91           AND A  #-1-LSTMSF
005F I A7 0C        92           STA A  LCAST1,X     SWITCH FLAG
0061 I A6 13        93           LDA A  LCASPL,X
0063 I BD 0006 R    94           JSR    LITEON
0066 I 39           95           RTS                 RETURN
                    96 *
                    97 *      ROUTINE TO PICK UP SHOOTER A & B CONTROL PARAM POINTERS
                    98 *
                    99 *      CALLING SEQUENCE:   JSR  SABCPM
                   100 *
                   101 *           REGISTER CONTENTS:  IX => LINE CONTROL STORAGE INDEX TABLE P
                   102 *
                   103 *      RETURN INFORMATION:  SAPARM => PNTR TO SHOOTER A PARAMS
                   104 *                           SBPARM => PNTR TO SHOOTER B PARAMS
                   105 *
0067 I             106 SABCPM    EQU    *
0067 I A6 04       107           LDA A  4,X
0069 I E6 05       108           LDA B  5,X
006B I B7 0000 D   109           STA A  SAPARM       SETUP PNTR TO
006E I F7 0001 D   110           STA B  SAPARM+1     SHOOTER A RECORDING PATTERN
0071 I A6 06       111           LDA A  6,X
0073 I E6 07       112           LDA B  7,X
```

```
 0075 I B7 0002 D    113          STA A  SBPARM      SETUP PNTR TO SHOOTER B
 0078 I F7 0003 D    114          STA B  SBPARM+1    RECORDING
 007B I 86 0A        115          LDA A  #10
 007D I 08           116 SAB1     INX                SET PNTR TO NEXT
 007E I 4A           117          DEC A              LINE INDEX POINTERS
1  BYP(A0011.02.012AA  CRS TAPE BYPASS ROUTINE)        08/04/78  13:31:34  PAGE   3

 007F I 26 FC        118          BNE    SAB1
 0081 I 39           119          RTS                RETURN
                     120 *
 0000 D              121          DSEC
                     122 *
 0000 D              123 SAPARM   RMB    2           POINTER TO SHOOTER A PARAMS
 0002 D              124 SBPARM   RMB    2           POINTER TO SHOOTER B PARAMS
 0004 D              125 SAVIXP   RMB    2           INDEX CONTROL STORAGE SABE AREA
                     126 *
 0006                127          END

T  BYP(A0011.02.012AA  CRS TAPE BYPASS ROUTINE)        08/04/78  13:31:35  PAGE   4

   NO ERRORS
  ISECT LENGTH --   130
  DSECT LENGTH --     6

  AXLTBP    0001 A   35    76
> CASR1     0004     15    15
> CASR2     0005     15    15    54
> CURCSP    0000     13    13    57    89
> EXECTV    0008     19    19
  KCRMSW    003D A   37    48
  LCASPL    0013 A   41    93
  LCAST1    000C A   25    58    73    75    90    92
  LCAST4    000F A   29    61    65
> LCTBEN    0002     14    14    87
> LCTBLE    0001     14    14    69
> LITEON    0006     17    17    94
> LITOF     000A     20    20    81
> LITOFF    0007     18    18
> LITON     0009     20    20    79
  LS4TIH    0080 A   30    62    64
  LSTMSF    0040 A   27    91
  LSTTBP    0010 A   26    59    74    77
> PIAKCR    0003     15    15    47
  SAB1      007D I  116   118
< SABCPM    0067 I  106     8    70
< SAPARM    0000 D  123     9    72    82   109   110
< SAVIXP    0004 D  125    11    71    86
< SBPARM    0002 D  124     9    84   113   114
  SONLN     0020 A   38
  STDBY     0040 A   39    55
  TAP1      002A I   70    88
  TAP2      0050 I   86    83
  TAP3      0032 I   73    85
  TAP5      0043 I   81    78
  TAP6      0046 I   82    80
< TAPBYP    0000 I   46     7
  TAPX      0009 I   51    49
> TCDSSP    000B     21    21    66
  TPB2      001A I   61
  TPBX      0058 I   89    60    63
< TPBYPI    0027 I   68    10    56
  TPBYPS    000A I   53    50
DSPSTS(A0011.02.013AA  CRS UNIT STATUS DISPLAY)        08/04/78  09:43:35  PAGE   1

 0000 I                2          ISEC
                       3 *
                       4          DEF    UNTSTS,CHNSTS
                       5 *
                       6          REF    IDTMSG,DEPSAR,NUMMSG
                       7          REF    MSGRQT,MSGN1,MSGN2,MSGN3,CURCSP
                       8 *
                       9          REF    DISPLY,FNDRNM,EXECTV
                      10          REF    MSGOUT
```

```
                           REF    ADPENT
                      *
000E A                LCAST3  EQU    14          LINE STATUS FLAGS (BYTE 3)
0080 A                LS3BVT  EQU    $80         UNIT STATUS DISPLAY TOGGLE
                      *
0010 A                LCAMDE  EQU    16          LINE MODE
0005 A                MODFRA  EQU    5           FIRE ABORT MODE
                      *
                      *     MESSAGE REQUEST TYPE
                      *
0080 A                MSGTCV  EQU    $80         CONVERT AND DISPLAY OLD VALUE
0040 A                MSGTIP  EQU    $40         INPUT AND DISPLAY NEW VALUE
0020 A                MSGTBF  EQU    $20         SET BLANK FLAG
0010 A                MSGTPS  EQU    $10         CONVERSION PNTR ALREADY SET
0008 A                MSGTSV  EQU    8           CONVERTED VALUE STORED READY FOR DISPLAY
0004 A                MSGTRC  EQU    4           RETRY OR CONTINUE REQUEST
                      *
                      *
                      *     CENTRAL RECORDING STATION UNIT STATUS
                      *
0000 I                UNTSTS  EQU    *
0000 I FE 0007 R              LDX    CURCSP
0003 I A6 0E                  LDA A  LCAST3,X
0005 I 85 80                  BIT A  #LS3BVT     DISPLAY REGULATED VOLTAGES
0007 I 26 55                  BNE    UNT1        YES
0009 I E6 10                  LDA B  LCAMDE,X
000B I C1 05                  CMP B  #MODFRA     FIRE ABORT
000D I 26 2C                  BNE    UNT2        NO
000F I CE 00A3 I              LDX    #UNTSDP     OUTPUT UNIT STATUS DISPLAY MESG
0012 I BD 0008 R              JSR    DISPLY
0015 I CE 0000 R      UNT3    LDX    #IDTMSG
0018 I FF 0003 R              STX    MSGRQT
001B I C6 E0                  LDA B  #MSGTIP+MSGTCV+MSGTBF
001D I BD 000B R              JSR    MSGOUT      INPUT STAION #
0020 I BD 000C R              JSR    ADPENT      ARTIFICIAL RTU
0023 I 26 08                  BNE    UNT8        NO
0025 I CE 00F9 I              LDX    #ARTRTU
0028 I BD 0008 R              JSR    DISPLY
002B I 20 E8                  BRA    UNT3
002D I 4F             UNT8    CLR A
002E I BD 0009 R              JSR    FNDRNM      PICK UP RECORDING #
0031 I 2A 08                  BPL    UNT2        CONTINUE IF VALID STATION #
0033 I CE 00BB I              LDX    #STNSOP     STATION OUTSIDE
0036 I BD 0008 R              JSR    DISPLY      SPREAD
0039 I 20 DA                  BRA    UNT3        INPUT NEW STATION #
003B I CE 0004 R      UNT2    LDX    #MSGN1      DISPLAY BATTERY VOLTAGES
003E I BD 0008 R      UNT4    JSR    DISPLY
0041 I FE 0007 R              LDX    CURCSP
0044 I A6 0E                  LDA A  LCAST3,X
DSPSTS(A0011.02.013AA  CPS UNIT STATUS DISPLAY)        08/04/78  09:43:36  PAGE   2

0046 I 88 80                  EOR A  #LS3BVT     TOGGLE DISPLAY FLAG
0048 I A7 0E                  STA A  LCAST3,X
004A I A6 10          UNTX    LDA A  LCAMDE,X    PICK UP CURRENT
004C I 81 05                  CMP A  #MODFRA     FIRE ABORT
004E I 26 0B                  BNE    UNT5        NO
0050 I CE 00F8 I              LDX    #DPLOIT     WAIT FOR OPERATOR RELEASE
0053 I FF 0003 R              STX    MSGRQT
0056 I C6 04                  LDA B  #MSGTRC
0058 I BD 000B R              JSR    MSGOUT
005B I 7E 000A R      UNT5    JMP    EXECTV      INITIATE NEXT SEQUENCE
005E I CE 0005 R      UNT1    LDX    #MSGN2      DISPLAY REGULATED VOLTAGES
0061 I 20 DB                  BRA    UNT4
                      *
                      *     CENTRAL RECORDING STATION CHANNEL STATUS DISPLAY
                      *
0063 I                CHNSTS  EQU    *
0063 I FE 0007 R              LDX    CURCSP
0066 I A6 10                  LDA A  LCAMDE,X
0068 I 81 05                  CMP A  #MODFRA     FIRE ABORT
006A I 26 2C                  BNE    CHN1        NO
006C I CE 00DD I              LDX    #CHNSTD     OUTPUT CHANNEL STATUS
006F I BD 0008 R              JSR    DISPLY      DISPLAY MESG
```

```
0072 I CE 0000 R    82 CHN2      LDX    #IDTMSG
0075 I FF 0003 R    83           STX    MSGRQT
0078 I C6 E0        84           LDA B  #MSGTIP+MSGTCV+MSGTBF
007A I BD 000B R    85           JSR    MSGOUT      REQUEST STATION #
007D I BD 000C R    86           JSR    ADPENT
0080 I 26 08        87           BNE    CHN3        JUMP IF NOT ARTIFICIAL RTU
0082 I CE 00F9 I    88           LDX    #ARTRTU
0085 I BD 0008 R    89           JSR    DISPLY
0088 I 20 E8        90           BRA    CHN2
008A I 4F           91 CHN3      CLR A
008B I BD 0009 R    92           JSR    FNDRNM      PICK UP RECORDING #
008E I 2A 08        93           BPL    CHN1        CONTINUE IF VALID STATION #
0090 I CE 00BB I    94           LDX    #STNSOP     STATION OUTSIDE
0093 I BD 0008 R    95           JSR    DISPLY      SPREAD
0096 I 20 DA        96           BRA    CHN2        INPUT NEW STATION #
0098 I CE 0006 R    97 CHN1      LDX    #MSGN3      DISPLAY CHANNEL
009B I BD 0008 R    98           JSR    DISPLY      STATUS
009E I FE 0007 R    99           LDX    CURCSP
00A1 I 20 A7        100          BRA    UNTX        WAIT FOR OPERATOR RELEASE
00A3 I 554E49       101 UNTSDP   FCC    /UNIT STATUS DISPLAY/
00B6 I 0D           102          FCB    $D,$D,$D,$D,4
00B7 I 0D
00B8 I 0D
00B9 I 0D
00BA I 04
00BB I 535441       103 STNSOP   FCC    /STATION OUTSIDE SPREAD.  REENTER/
00DB I 0D           104          FCB    $D,4
00DC I 04
00DD I 434841       105 CHNSTD   FCC    /CHANNEL STATUS DISPLAY/
00F3 I 0D           106          FCB    $D,$D,$D,$D,4
00F4 I 0D
00F5 I 0D
00F6 I 0D
00F7 I 04
00F8 I 04           107 DPLOIT   FCB    4           OPERATOR RELEASE REQUEST
00F9 I 415254       108 ARTRTU   FCC    /ARTIFICIAL RTU /
DSPSTS(A0011.02.013AA  CRS UNIT STATUS DISPLAY)        08/04/78  09:43:37  PAGE   3

0108 I 0D           109          FCB    $D,$D,$D,$D,4
0109 I 0D
010A I 0D
010B I 0D
010C I 04
010D                110          END
DSPSTS(A0011.02.013AA  CRS UNIT STATUS DISPLAY)        08/04/78  09:43:37  PAGE   4

   NO ERRORS
  ISECT LENGTH --   269
  DSECT LENGTH --     0

> ADPENT    000C      11    11    45    86
  ARTRTU    00F9 I   108    47    88
  CHN1      0098 I    97    79    93
  CHN2      0072 I    82    90    96
  CHN3      008A I    91    87
  CHNSTD    00DD I   105    80
< CHNSTS    0063 I    75     4
> CURCSP    0007       7     7    32    58    76    99
> DEPSAR    0001       6     6
> DISPLY    0008       9     9    40    48    54    57    81    89    95    98
  DPLOIT    00F8 I   107    65
> EXECTV    000A       9     9    69
> FNDRNM    0009       9     9    51    92
> IDTMSG    0000       6     6    41    82
  LCAMDE    0010 A    16    36    62    77
  LCAST3    000E A    13    33    59    61
  LS3BVT    0080 A    14    34    60
  MODFRA    0005 A    17    37    63    78
> MSGN1     0004       7     7    56
> MSGN2     0005       7     7    70
> MSGN3     0006       7     7    97
> MSGOUT    000B      10    10    44    68    85
```

```
> MSGRQT     0003       7      7     42     66     83
  MSGTBF     0020 A    23     43     84
  MSGTCV     0080 A    21     43     84
  MSGTIP     0040 A    22     43     84
  MSGTPS     0010 A    24
  MSGTRC     0004 A    26     67
  MSGTSV     0008 A    25
> NUMMSG     0002       6      6
  STNSOP     00BB I   103     53     94
  UNT1       005E I    70     35
  UNT2       003B I    56     38     52
  UNT3       0015 I    41     49     55
  UNT4       003E I    57     71
  UNT5       005B I    69     64
  UNT8       002D I    50     46
  UNTSDP     00A3 I   101     39
< UNTSTS     0000 I    31      4
  UNTX       004A I    62    100
   1BYP(A0011.02.014AA  CRS CAMERA BYPASS ROUTINE)      08/04/78  13:34:06  PAGE   1

                       *
                       *      CENTRAL RECORDING STATION CAMERA BY-PASS ROUTINE
                       *
 0000 I                          ISEC
                       *
                                 DEF     CAMBYP
                       *
                                 REF     SAPARM,SBPARM
                                 REF     LCTBLE,LCTBEN
                                 REF     SAVIXP
                                 REF     SABCPM
                                 REF     CURCSP
                       *
                                 REF     LITEON,LITOFF
                                 REF     EXECTV
                                 REF     LITON,LITOF
                       *
                       *      LINE STATUS FLAGS
                       *
 000C A                  LCAST1  EQU     12          LINE STATUS FLAGS (BYTE 1)
 0008 A                  LSTCBP  EQU     8           TAPE BY-PASS
                       *
 0013 A                  LCASPL  EQU     19
                       *
                       *
                       *      CRS PANEL LITE EQUATES
                       *
 0008 A                  AXLCBP  EQU     8           CAMERA BY-PASS LITE
                       *
 0000 I                  CAMBYP  EQU     *
 0000 I CE 0002 R                LDX     #LCTBLE     PICK UP PNTRS TO SHOOTER A & B
 0003 I BD 0005 R        CAM1    JSR     SABCPM      PARAMETERS FOR NEXT LINE
 0006 I FF 0004 R                STX     SAVIXP      SAVE LINE CONTROL STORAGE INDEX RTBLE PNTR
 0009 I FE 0000 R                LDX     SAPARM      SHOOTER A PARAMS
 000C I E6 0C            CAM3    LDA B   LCAST1,X
 000E I C8 08                    EOR B   #LSTCBP     INVERT CAMERA BY-PASS STATUS
 0010 I E7 0C                    STA B   LCAST1,X
 0012 I 86 08                    LDA A   #AXLCBP     ANTICIPATE CAMERA BY-PASS MODE
 0014 I C5 08                    BIT B   #LSTCBP     CAMERA BY-PASS SELECTED ?
 0016 I 27 05                    BEQ     CAM5        NO-TURN OFF LITE
 0018 I BD 000A R                JSR     LITON       TURN ON CAMERA BY-PASS LITE
 001B I 20 03                    BRA     CAM6
 001D I BD 000B R        CAM5    JSR     LITOF       TURN OFF CAMERA BY-PASS LITE
 0020 I BC 0000 R        CAM6    CPX     SAPARM      SHOOTER A ?
 0023 I 26 05                    BNE     CAM2        NO-SHOOTERS A & B PROCESSED ?
 0025 I FE 0001 R                LDX     SBPARM      TOGGLE CAMERA BY-PASS
 0028 I 20 E2                    BRA     CAM3        FOR SHOOTER B
 002A I FE 0004 R        CAM2    LDX     SAVIXP      ALL LINES
 002D I 8C 0003 R                CPX     #LCTBEN     PROCESSED
 0030 I 26 D1                    BNE     CAM1        NO-CONTINUE
 0032 I FE 0006 R                LDX     CURCSP
 0035 I A6 13                    LDA A   LCASPL,X
 0037 I BD 0007 R                JSR     LITEON
```

```
003A I 7E 0009 R    55          JMP    EXECTV       INITIATE NEXT SEQUENCE
                    56 *
003D                57          END

C..IBYP(A0011.02.014AA  CRS CAMERA BYPASS ROUTINE)        08/04/78  13:34:07  PAGE   ?

  NO ERRORS
 ISECT LENGTH --     61
 DSECT LENGTH --     0

  AXLCBP    0008 A    29    39
  CAM1      0003 I    33    51
  CAM2      002A I    49    46
  CAM3      000C I    36    48
  CAM5      001D I    44    41
  CAM6      0020 I    45    43
< CAMBYP    0000 I    31     7
> CURCSP    0006      13    13    52
> EXECTV    0009      16    16    55
  LCASPL    0013 A    24    53
  LCAST1    000C A    21    36    38
> LCTBEN    0003      10    10    50
> LCTBLE    0002      10    10    32
> LITEON    0007      15    15    54
> LITOF     000B      17    17    44
> LITOFF    0008      15    15
> LITON     000A      17    17    42
  LSTCBP    0008 A    22    37    40
> SABCPM    0005      12    12    33
> SAPARM    0000       9     9    35    45
> SAVIXP    0004      11    11    34    49
> SBPARM    0001       9     9    47
B..TST(A0011.02.015AA  CRS BLAST TEST ROUTINE)        08/04/78  13:32:40  PAGE   1

                     2 *
                     3 *      CENTRAL RECORDING STATION BLAST TEST ROUTINE
                     4 *
0000 I               5          ISEC
                     6 *
                     7          DEF    BLSTST
                     8          DEF    MODSAV
                     9 *
                    10          REF    CURCSP,STNADR,RTUADR,MSGRQT
                    11          REF    STLBRK,SRCVBF,AUXDTB,TSWRLO
                    12          REF    RCTBLT,RCTSEL,RCTACK
                    13          REF    RCTPB2,RCTPB4
                    14          REF    SPNDPY,NUMMSG
                    15          REF    MONWMW
                    16          REF    DATMON,MONSTS
                    17          REF    RECTM0,RECTM1,XMTOTL,XMTTL1
                    18          REF    TMRBTV,TMRBT1
                    19          REF    STLSW1
                    20          REF    TPMCNT
                    21 *
                    22          REF    SYSERR
                    23          REF    DEPYX
                    24          REF    DISPLY,EXECTV,SLCPNT,SELIDX,CHKDEP,ADFICP
                    25          REF    ACKTMO,RTUCMD,RTSTAT,MSGOUT,STLCRQ,PTBCNV
                    26          REF    CHMSET,RCVMRT,RECDTA,TWTINI,DMNINI,TPRCMP,TCDSSP
                    27          REF    MX1000,TMONOF
                    28 *
                    29 *      LINE STATUS FLAGS
                    30 *
000C A              31 LCAST1   EQU    12           LINE STATUS FLAGS (BYTE 1)
0010 A              32 LSTTBP   EQU    $10          TAPE BY-PASS
                    33 *
000D A              34 LCAST2   EQU    13           LINE STATUS FLAGS (BYTE 2)
0008 A              35 LS2TIP   EQU    8            MULTIPLE NORMAL TEST-IN-PROGRESS
0004 A              36 LS2NTP   EQU    4            NORMAL TEST-IN-PROGRESS
0002 A              37 LS2BTP   EQU    2            BLAST TEST-IN-PROGRESS
0001 A              38 LS2TSP   EQU    1            TILT SEARCH-IN-PROGRESS
                    39 *
000E A              40 LCAST3   EQU    14           LINE STATUS FLAGS (BYTE 3)
```

```
0010 A               LS3STF    EQU    $10          SINGLE TEST FLAG
0002 A               LS3NDR    EQU    2            NOISE DATA RECORDING
                     *
0010 A               LCAMDE    EQU    16           LINE MODE
                     *
0004 A               MODTST    EQU    4            TEST MODE
                     *
0012 A               LCADTB    EQU    18           TIME BREAK SAVE AREA
                     *
                     *
0010 A               STS2MS    EQU    $10          2 MSEC SAMPLE RATE
                     *
                     *
0010 A               SW1STO    EQU    $10          SOFTWARE TIMEOUT
                     *
                     *
                     *      MESSAGE REQUEST TYPE
                     *
0080 A               MSGTCV    EQU    $80          CONVERT AND DISPLAY OLD VALUE
BLSTST(A0011.02.015AA  CRS BLAST TEST ROUTINE)     08/04/78  13:32:41  PAGE   2

0040 A               MSGTIP    EQU    $40          INPUT AND DISPLAY NEW VALUE
0020 A               MSGTBF    EQU    $20          SET BLANK FLAG
0010 A               MSGTPS    EQU    $10          CONVERSION PNTR ALREADY SET
0008 A               MSGTSV    EQU    8            CONVERTED VALUE STORED READY FOR DISPLAY
0004 A               MSGTRC    EQU    4            RETRY OR CONTINUE
                     *
                     *      MAXIMUM NUMBER DIGITS FOR DEPLOY PARAMETERS
                     *
0004 A               STNNDG    EQU    4            STATION NUMBER
                     *
                     *
0002 A               SCPSDT    EQU    2            SELECT SEISMIC DATA FOR SCOPE DISPLAY
0000 A               SCPRFS    EQU    0            SELECT RF SPECTRUM FOR SCOPE DISPLAY
                     *
                     *
                     *      RTU COMMAND PARAMETER EQUATES
                     *
0004 A               RTUPTB    EQU    $4           PREPARE TO BLAST
00E0 A               RTUBLT    EQU    $E0          BLAST COMMAND
0080 A               RTUSPT    EQU    $80          SHOT POINT SELECT
0000 A               RTUACK    EQU    0            ACK. - INIT.
0001 A               DATACK    EQU    1            DATA ACKNOWLEDGE
                     *
000E A               MAXTBV    EQU    14           MAXIMUM TIME BREAK VALUE
                     *
                     *
0000 I               BLSTST    EQU    *
0000 I CE 0159 I               LDX    #BLTIPG      DISPLAY
0003 I BD 001C R               JSR    DISPLY       TEST-IN-PROGRESS MESSAGE
0006 I C6 FF                   LDA B  #$FF         BLANK OUT TIME
0008 I F7 0006 R               STA B  AUXDTB       BREAK VALUE
000B I FE 0000 P               LDX    CURCSP       PICK UP PNTR TO CONTROL STORAGE AREA
000E I A6 10                   LDA A  LCAMDE,X
0010 I B7 0000 D               STA A  MODSAV
0013 I 86 04                   LDA A  #MODTST
0015 I A7 10                   STA A  LCAMDE,X
0017 I A6 0D                   LDA A  LCAST2,X     RESET NORMAL TEST-IN-PROGRESS FLAGS
0019 I 84 F2                   AND A  #-1-LS2TIP-LS2NTP-LS2TSP
001B I 8A 02                   ORA A  #LS2BTP      SET BLAST TEST-IN-PROGRESS FLAG
001D I A7 0D                   STA A  LCAST2,X
001F I A6 0E                   LDA A  LCAST3,X
0021 I 84 FD                   AND A  #-1-LS3NDR   RESET NOISE DATE RECORDING INDICATOR
0023 I A7 0E                   STA A  LCAST3,X
0025 I EE 00                   LDX    0,X          DISPLAY CURRENT SHOT
0027 I FF 0001 R               STX    STNADR       POINT STATION NUMBER
002A I CE 0174 I               LDX    #BSNMSG      CONVERT SHOT POINT
002D I FF 0003 R               STX    MSGRQT       STATION FOR DISPLAY
0030 I C6 E0                   LDA B  #MSGTCV+MSGTIP+MSGTBFALLOW OPERATOR TO ACCEPT STATION
0032 I BD 0025 R               JSR    MSGOUT       OR ENTER NEW STATION NUMBEP
0035 I BD 001F R               JSR    SELIDX       STATION NUMBER WITHIN MAP
0038 I 2B 05                   BMI    BLS1         NO, INFORM OPERATOR
003A I BD 0020 R               JSR    CHKDEP       STATION DEPLOYED ?
```

```
003D I 26 09         112           BNE    BLS2         YES, CONTINUE TEST SEQUENCE
003F I CE 000D R     113 BLS1      LDX    #SPNDPY      INFORM OPERATOR
0042 I BD 001C R     114           JSR    DISPLY       OF DEPLOYMENT ERROR
0045 I 7E 014E I     115           JMP    BLS6A        INITIATE NEXT SEQUENCE
0048 I BD 0021 R     116 BLS2      JSR    ADPICP       PICK UP ASSOCIATED RTU AND CHANNEL ADDR
004B I B7 0002 R     117           STA A  RTUADR       SAVE RTU ADDR
BLSTST(A0011.02.015AA  CRS BLAST TEST ROUTINE)           08/04/78  13:32:41  PAGE   3

004E I CA 80         118           ORA B  #RTUSPT      SELECT SHOT PT CHANNEL
0050 I CE 0009 R     119           LDX    #RCTSEL      SET COMMAND TIMEOUT VALUE
0053 I BD 0023 R     120           JSR    RTUCMD       ISSUE COMMAND TO SELECT SHOT
0056 I 4F            121           CLR A
0057 I BD 0024 R     122           JSR    RTSTAT       PICK UP SAMPLE RATE
005A I CE 000B R     123           LDX    #RCTPB2      ANTICIPATE 2 MSEC SAMPLE RATE
005D I 85 10         124           BIT A  #STS2MS      2 MSEC SAMPLE RATE ?
005F I 26 03         125           BNE    BLS7         YES
0061 I CE 000C R     126           LDX    #RCTPB4      SET TIMEOUT VALUE FOR 4 MSEC RATE
0064 I B6 0002 R     127 BLS7      LDA A  RTUADR       RESTORE RTU ADDRESS
0067 I C6 04         128           LDA B  #RTUPTB      SET PREPARE TO BLAST COMMAND
0069 I BD 0023 R     129           JSR    RTUCMD       PREPARE RTU FOR BLAST DATA
006C I CE 0008 R     130           LDX    #RCTBLT      INIT BLAST COMMAND
006F I FF 0016 R     131           STX    TMRBTV       TIMEOUT VALUE
0072 I CE 000F R     132           LDX    #MONWMU      SET OUTPUT TIMEOUT VALUE
0075 I FF 0012 R     133           STX    RECTMO       TO MONITOR WARM UP TIME
0078 I C6 01         134           LDA B  #1           ANTICIPATE INVLAID RECORD LENGTH
007A I B6 0007 R     135           LDA A  TSWRLO       PICK UP RCORD LENGTH IN SECONDS
007D I 81 06         136           CMP A  #6
007F I 22 04         137           BHI    BLS7A
0081 I 4D            138           TST A
0082 I 27 01         139           BEQ    BLS7A
0084 I 16            140           TAB
0085 I BD 002F R     141 BLS7A     JSR    MX1000       COMPUTE BLAST TIME IN MILLI SECONDS
0088 I F7 0015 R     142           STA B  XMTTL1       SAVE # WORDS OF
008B I B7 0014 R     143           STA A  XMTOTL       DATA TO XMIT
008E I 36            144           PSH A
008F I 37            145           PSH B
0090 I FB 0017 R     146           ADD B  TMRBT1       COMPUTE BLAST
0093 I F7 0017 R     147           STA B  TMRBT1       TIMEOUT
0096 I B9 0016 R     148           ADC A  TMRBTV       VALUE
0099 I B7 0016 R     149           STA A  TMRBTV
009C I 33            150           PUL B
009D I 32            151           PUL A
009E I FB 0013 R     152           ADD B  RECTM1       COMPUTE
00A1 I F7 0013 R     153           STA B  RECTM1       MONITOR OUTPUT
00A4 I B9 0012 R     154           ADC A  RECTMO       TIME
00A7 I B7 0012 R     155           STA A  RECTMO       VALUE
00AA I 4F            156           CLR A
00AB I BD 0024 R     157           JSR    RTSTAT       PICK UP CURRENT SAMPLE RATE
00AE I 85 10         158           BIT A  #STS2MS      4 MSEC SAMPLE RATE
00B0 I 27 06         159           BEQ    BLS3         YES, # WORDS TO XMIT IS CORRECT
00B2 I 78 0015 R     160           ASL    XMTTL1       COMPUTE # WORDS TO XMIT
00B5 I 79 0014 R     161           ROL    XMTOTL       FOR 2 MSEC SAMPLE RATE
00B8 I FE 0016 R     162 BLS3      LDX    TMRBTV       PICK UP BLAST TIMEOUT VALUE
00BB I B6 0002 R     163           LDA A  RTUADR       PICK UP RTU ADDR
00BE I F6 0007 R     164           LDA B  TSWRLO       SETUP BLAST COMMAND
00C1 I CA E0         165           ORA B  #RTUBLT      FOR SELECTED RECORD LENGTH
00C3 I BD 0023 R     166           JSR    RTUCMD       OUTPUT BLAST COMMAND
00C6 I BD 0028 R     167           JSR    CHMSET       SETUP RECORDING MAP
00C9 I BD 0029 R     168 BLS3B     JSR    RCVMRT       INPUT DATA FROM RTU
00CC I CE 0004 R     169           LDX    #STLBRK      ASK FOR TIME
00CF I BD 0026 R     170           JSR    STLCRO       BREAK VALUE
00D2 I B6 0018 R     171           LDA A  STLSW1
00D5 I 85 10         172           BIT A  #SW1STO      SOFTWARE TIMEOUT
00D7 I 27 05         173           BEQ    BLS3A        NO, CONTINUE
00D9 I BD 001A R     174           JSR    SYSERR       INFORM OPERATOR
00DC I 27 EB         175           BEQ    BLS3B
BLSTST(A0011.02.015AA  CRS BLAST TEST ROUTINE)           08/04/78  13:32:42  PAGE   4

00DE I BD 0022 R     176 BLS3A     JSR    ACKTMO       TIMEOUT BEFORE ACKNOWLEDGE
00E1 I CE 000A R     177           LDX    #RCTACK
00E4 I B6 0002 R     178           LDA A  RTUADR       TURN POWER
00E7 I C6 01         179           LDA B  #RTUACK+DATACKOFF ON
00E9 I BD 0023 R     180           JSR    RTUCMD       RTU
```

```
00EC I CE 0009 R   181            LDX    #RCTSEL
00EF I B6 0002 R   182            LDA A  RTUADR
00F2 I C6 80       183            LDA B  #RTUSPT     CLEAR
00F4 I BD 0023 R   184            JSR    RTUCMD      SHOT POINT STATION
00F7 I B6 0011 R   185            LDA A  MONSTS
00FA I 8A 02       186            ORA A  #SCPSDT
00FC I B7 0011 R   187            STA A  MONSTS      SELECT SEISMIC DATA
00FF I B7 0010 R   188            STA A  DATMON      FOR SCOPE DISPLAY
0102 I 4F          189            CLR A
0103 I BD 0024 R   190            JSR    RTSTAT      PICK UP SAMPLE RATE
0106 I F6 0005 R   191            LDA B  SRCVBF      PICK UP TIME BREAK VALUE
0109 I 85 10       192            BIT A  #STS2MS     4 MSEC SAMPLE RATE ?
010B I 27 01       193            BEQ    BLS9        YES, NO TIME BREAK VALUE ADJUSTMENT REQUIRED
010D I 57          194            ASR B              COMPUTE TIME BREAK FOR 2 MSEC SAMPLE RATE
010E I BD 0027 R   195 BLS9       JSR    PTBCNV      CONVERT TIME BREAK VALUE FOR DISPLAY
0111 I FE 0000 R   196            LDX    CURCSP
0114 I A7 12       197            STA A  LCADTB,X    SAVE TIME BREAK VALUE
0116 I B7 0006 R   198            STA A  AUXDTB
0119 I 81 0E       199            CMP A  #MAXTBV     MAXIMUM TIME BREAK EXCEEDED
011B I 23 10       200            BLS    BLS4        NO, RECORD DATA TO MONITOR
011D I CE 01B5 I   201            LDX    #AFRBLE     INFORM OPERATOR
0120 I FF 0003 R   202            STX    MSGRQT      THAT MAXIMUM ALLOWABLE
0123 I C6 04       203            LDA B  #MSGTRC     TIME BREAK EXCEEDED
0125 I BD 0025 R   204            JSR    MSGOUT      RETRY OR CONTINUE
0128 I 26 03       205            BNE    BLS4        CONTINUE
012A I 7E 0000 I   206            JMP    BLSTST      JUMP IF RETRY SPECIFIED
012D I FE 0000 R   207 BLS4       LDX    CURCSP
0130 I A6 0E       208            LDA A  LCAST3,X
0132 I 8A 10       209            ORA A  #LS3STF     SET SINGLE TEST FLAG
0134 I A7 0E       210            STA A  LCAST3,X
0136 I A6 0C       211            LDA A  LCAST1,X
0138 I 85 10       212            BIT A  #LSTTBP     TAPE BY-PASS SET
013A I 26 03       213            BNE    BLS5        YES, SKIP OUTPUT INITIALIZATION
013C I BD 002B R   214            JSR    TUTINI      INIT. TAPE UNIT FOR OUTPUT
013F I BD 002C R   215 BLS5       JSR    DMNINI      INIT DATA MONITOR FOR OUTPUT
0142 I BD 002A R   216            JSR    RECDTA      RECORD BLAST TEST DATA
0145 I BD 002D R   217            JSR    TPRCMP      TAPE REQUEST COMPLETION
0148 I CE 019D I   218 BLS6       LDX    #BLTCMP     DISPLAY TEST COMPLETE MESSAGE
014B I BD 001C R   219            JSR    DISPLY
014E I B6 0000 D   220 BLS6A      LDA A  MODSAV
0151 I FE 0000 R   221            LDX    CURCSP
0154 I A7 10       222            STA A  LCAMDE,X    RESTORE LINE MODE
0156 I 7E 001B R   223            JMP    DEPYX       INITIATE NEXT SEQUENCE
                   224 *
                   225 *      BLAST TEST ROUTINE MESSAGES
                   226 *
0159 I 424C41      227 BLTIPG     FCC    /BLAST TEST-IN-PROGRESS/
016F I 0D          228            FCB    $D,$D,$D,$D,4
0170 I 0D
0171 I 0D
0172 I 0D
0173 I 04
0174 I 04          223 BSNMSG     FCB    STNNDG
BLASTST(A0011.02.015AA  CRS BLAST TEST ROUTINE)          08/04/78  13:32:43  PAGE   5

0175 I 02          230            FCB    2,28
0176 I 1C
0177 I 0001    R   231            FDB    STNADR
0179 I 10          232            FCB    $10,2,0
017A I 02
017B I 00
017C I 454E54      233            FCC    /ENTER BLAST STATION NUMBER/
0196 I 0D          234            FCB    $D,$D,$D,$E
0197 I 0D
0198 I 0D
0199 I 0E
019A I 000E    R   235            FDB    NUMMSG
019C I 04          236            FCB    4
019D I 424C41      237 BLTCMP     FCC    /BLAST TEST COMPLETE/
01B0 I 0D          238            FCB    $D,$D,$D,$D,4
01B1 I 0D
01B2 I 0D
01B3 I 0D
```

```
01B4 I 04
01B5 I 424C41        239 AFRBLE    FCC    /BLASTER ERROR/
01C2 I 0D            240           FCB    $D,$E
01C3 I 0E
01C4 I 0019    R     241           FDB    TPMCNT
                     242 *
0000 D               243           DSEC
                     244 *
0000 D 00            245 MODSAV    FCB    0             V CURRENT LINE MODE SAVE AREA
                     246 *
0001                 247           END
```

BLSTST(A0011.02.015AA CRS BLAST TEST ROUTINE) 08/04/78 13:32:43 PAGE 6

```
   NO ERRORS
  ISECT LENGTH --    454
  DSECT LENGTH --      1

> ACKTMO    0022       25     25    176
> ADPICP    0021       24     24    116
  AFRBLE    01B5 I    239    201
> AUXDTB    0006       11     11     90    198
  BLS1      003F I    113    110
  BLS2      0048 I    116    112
  BLS3      00B8 I    162    159
  BLS3A     00DE I    176    173
  BLS3B     00C9 I    168    175
  BLS4      012D I    207    200    205
  BLS5      013F I    215    213
  BLS6      0148 I    218
  BLS6A     014E I    220    115
  BLS7      0064 I    127    125
  BLS7A     0085 I    141    137    139
  BLS9      010E I    195    193
< BLSTST    0000 I     86      7    206
  BLTCMP    019D I    237    218
  BLTIPG    0159 I    227     87
  BSNMSG    0174 I    229    105
> CHKDEP    0020       24     24    111
> CHMSET    0028       26     26    167
> CURCSP    0000       10     10     91    196    207    221
  DATACK    0001 A     81    179
> DATMON    0010       16     16    188
> DEPYX     001B       23     23    223
> DISPLY    001C       24     24     88    114    219
> DMNINI    002C       26     26    215
> EXECTV    001D       24     24
  LCADTB    0012 A     48    197
  LCAMDE    0010 A     44     92     95    222
  LCAST1    000C A     31    211
  LCAST2    000D A     34     96     99
  LCAST3    000E A     40    100    102    208    210
  LS2BTP    0002 A     37     98
  LS2NTP    0004 A     36     97
  LS2TIP    0008 A     35     97
  LS2TSP    0001 A     38     97
  LS3NDR    0002 A     42    101
  LS3STF    0010 A     41    209
  LSTTBP    0010 A     32    212
  MAXTBV    000E A     83    199
< MODSAV    0000 D    245      8     93    220
  MODTST    0004 A     46     94
> MONSTS    0011       16     16    185    187
> MONWMU    000F       15     15    132
> MSGOUT    0025       25     25    108    204
> MSGRQT    0003       10     10    106    202
  MSGTBF    0020 A     61    107
  MSGTCV    0080 A     59    107
  MSGT1P    0040 A     60    107
  MSGTPS    0010 A     62
  MSGTRC    0004 A     64    203
```

```
BLSTST(A0011.02.015AA  CRS BLAST TEST ROUTINE)          08/04/78  13:32:44  PAGE   7

  MSGTSV    0008 A    63
> MX1000    002F      27      27    141
> NUMMSG    000E      14      14    235
> PTBCNV    0027      25      25    195
> RCTACK    000A      12      12    177
> RCTBLT    0008      12      12    130
> RCTPB2    000B      13      13    123
> RCTPB4    000C      13      13    126
> RCTSEL    0009      12      12    119    181
> RCVMRT    0029      26      26    168
> RECDTA    002A      26      26    216
> RECTM1    0013      17      17    152    153
> RECTMO    0012      17      17    133    154    155
> RTSTAT    0024      25      25    122    157    190
  RTUACK    0000 A    80     179
> RTUADR    0002      10      10    117    127    163    178    182
  RTUBLT    00E0 A    78     165
> RTUCMD    0023      25      25    120    129    166    180    184
  RTUPTB    0004 A    77     128
  RTUSPT    0080 A    79     118    183
  SCPRFS    0000 A    72
  SCPSDT    0002 A    71     186
> SELIDX    001F      24      24    109
> SLCPNT    001E      24      24
> SPNDPY    000D      14      14    113
> SRCVBF    0005      11      11    191
> STLBRK    0004      11      11    169
> STLCRQ    0026      25      25    170
> STLSW1    0018      19      19    171
> STNADR    0001      10      10    104    231
  STNNDG    0004 A    68     229
  STS2MS    0010 A    51     124    158    192
  SW1STO    0010 A    54     172
> SYSERR    001A      22      22    174
> TCDSSP    002E      26      26
> TMONOF    0030      27      27
> TMRBT1    0017      18      18    146    147
> TMRBTV    0016      18      18    131    148    149    162
> TPMCNT    0019      20      20    241
> TPRCMP    002D      26      26    217
> TSWRLO    0007      11      11    135    164
> TWTINI    002B      26      26    214
> XMTOTL    0014      17      17    143    161
> XMTTL1    0015      17      17    142    160
CALBRT(A0011.02.016AA  CRS PERFORMANCE TEST)            08/04/78  09:46:25  PAGE   1

                      2 *
                      3 *       CENTRAL RECORDING STATION PERFORMANCE TEST ROUTINE
                      4 *
 0000 I               5            ISEC
                      6 *
                      7            DEF      CALBRT
                      8 *
                      9 *
                     10            REF      CURCSP
                     11            REF      XMTOTL
                     12            REF      RECTMO
                     13            REF      ATVCMD
                     14            REF      MODSAV
                     15 *
                     16            REF      DEPYX
                     17            REF      DISPLY
                     18            REF      NRMLST,NRMINI
                     19            REF      RECDTA
                     20            REF      EXECTV
                     21            REF      TPRCMP
                     22            REF      RLSSTT,RTUCMD
                     23 *
                     24 *
                     25 *       LINE STATUS EQUATES
                     26 *
```

```
000C A            27 LCAST1     EQU    12          LINE STATUS FLAGS (BYTE 1)
0020 A            28 LSTPRG     EQU    $20         FIRE SEQUENCE PROGRAMMED
                  29 *
000D A            30 LCAST2     EQU    13          LINE STATUS FLAGS (BYTE 2)
0008 A            31 LS2TIP     EQU    8           MULTIPLE NORMAL TEST-IN-PROGRESS
0004 A            32 LS2NTP     EQU    4           NORMAL TEST-IN-PROGRESS
0002 A            33 LS2BTP     EQU    2           BLAST TEST-IN-PROGRESS
0001 A            34 LS2TSP     EQU    1           TILT SEARCH-IN-PROGRESS
                  35 *
000E A            36 LCAST3     EQU    14          LINE STATUS FLAGS (BYTE 3)
0002 A            37 LS3NDR     EQU    2           NOISE DATA RECORDING
0010 A            38 LS3STF     EQU    $10         SINGLE TESDT FLAG
                  39 *
                  40 *      LINE MODE EQUATES
                  41 *
0010 A            42 LCAMDE     EQU    16          LINE MODE
0001 A            43 MODPLY     EQU    1           DEPLOY MODE
0004 A            44 MODTST     EQU    4           TEST MODE
                  45 *
                  46 *      RTU COMMAND EQUATES
                  47 *
00FF A            48 RTUACT     EQU    $FF         RTU ADDRESS FOR ALL ACTIVE RTU'S
0000 A            49 RTUACK     EQU    0           ACKNOWLEDGE - INITIALIZE
0001 A            50 DATACK     EQU    1           DATA ACKNOWLEDGE
0040 A            51 RTUPPT     EQU    $40         PERFORM PERFORMANCE TEST
                  52 *
0010 A            53 STS2MS     EQU    $10         2 MSEC SAMPLE RATE
                  54 *
                  55 *      RTU PERFORMANCE TEST WORD LENGTHS
                  56 *
1210 A            57 XMTPTD     EQU    4624        PERFORMANCE TEST WORD LENGTH (2 MSEC SAMPL)
1210 A            58 XMTPT4     EQU    4624        PERFORMANCE TEST WORD LENGTH (4 MSEC SAMPL)
                  59 *
CALBRT(A0011.02.016AA  CRS PERFORMANCE TEST)        08/04/78  09:46:26  PAGE   2

                  60 *      MONITOR OUTPUT WARM UP TIME
                  61 *
0578 A            62 MONWMU     EQU    1400        MONITOR WARM UP TIME
                  63 *
                  64 *      PERFORMANCE TEST DATA MONITOR OUTPUT TIMES
                  65 *
0E74 A            66 PDO2MS     EQU    2300+MONWMU PERFORMANCE DATA MONITOR OUTPUT
1770 A            67 PDO4MS     EQU    4600+MONWMU PERFORMANCE DATA MONITOR OUTPUT (4
                  68 *
                  69 *      PERFORMANCE TEST TIMES
                  70 *
4330 A            71 RCTPT2     EQU    17200       PERFORMANCE TEST (2 MSEC SAMPLE RATE)
5F5B A            72 RCTPT4     EQU    24411       PERFORMANCE TEST (4 MSEC SAMPLE RATE
                  73 *
                  74 *
0000 I            75 CALBRT     EQU    *
0000 I FE 0000 R  76            LDX    CURCSP
0003 I A6 10      77            LDA A  LCAMDE,X
0005 I B7 0004 R  78            STA A  MODSAV
0008 I 86 04      79            LDA A  #MODTST
000A I A7 10      80            STA A  LCAMDE,X
000C I A6 0E      81            LDA A  LCAST3,X
000E I 84 ED      82            AND A  #-1-LS3NDR-LS3STF
0010 I A7 0E      83            STA A  LCAST3,X
0012 I A6 0D      84            LDA A  LCAST2,X    RESET TEST-IN-PROGRESS
0014 I 84 F0      85            AND A  #-1-LS2TIP-LS2NTP-LS2BTP-LS2TSP
0016 I A7 0D      86            STA A  LCAST2,X    INDICATORS
0018 I A6 0C      87            LDA A  LCAST1,X
001A I 85 20      88            BIT A  #LSTPRG     FIRE SEQUENCE PROGRAMMED
001C I 26 0D      89            BNE    CAL1        YES, CONTINUE
001E I 86 01      90            LDA A  #MODPLY
0020 I A7 10      91            STA A  LCAMDE,X    SET MODE TO DEPLOY OR PROGRAM
0022 I CE 00D5 I  92            LDX    #SPRNPG
0025 I BD 0006 R  93            JSR    DISPLY      INFORM OPERATOR OF ERROR
0028 I 7E 000A R  94            JMP    EXECTV      INITIATE NEXT SEQUENCE
002B I CE 0032 I  95 CAL1       LDX    #MPFTST
002E I BD 0006 R  96            JSR    DISPLY      DISPLAY MULTIPLE PERFORMANCE TEST MESSAGE
0031 I BD 0008 R  97            JSR    NRMINI      SETUP RECORDING MAP AND PREPARE FOR OUTPUT
```

```
0034 I BD 000C R    98            JSR    RLSSTT      SELECT RTU STATE
0037 I CE 1210 A    99            LDX    #XMTPTD     SET TOTAL # WORDS
003A I FF 0001 R   100            STX    XMTOTL      TO OUTPUT FOR 2 MSEC SAMPLE RATE
003D I CE 0E74 A   101            LDX    #PDO2MS     SET MONITOR OUTPUT TIME FOR 2 MSEC RATE
0040 I B6 0003 R   102            LDA A  ATVCMD
0043 I 85 10       103            BIT A  #STS2MS     2 MSEC SAMPLE RATE SELECTED
0045 I 26 09       104            BNE    CAL2        YES, CONTINUE
0047 I CE 1210 A   105            LDX    #XMTPT4     SET TOTAL # WORDS TO OUTPUT
004A I FF 0001 R   106            STX    XMTOTL      FOR 4 MSEC SAMPLE RATE
004D I CE 1770 A   107            LDX    #PDO4MS     SET MONITOR OUTPUT TIME FOR 4 MSEC RATE
0050 I FF 0002 R   108 CAL2       STX    RECTMO      SAVE PROPER MONITOR OUTPUT TIME
0053 I CE 4330 A   109            LDX    #RCTPT2     ANTICIPATE 2 MSEC SAMPLE RATE
0056 I 85 10       110            BIT A  #STS2MS     2 MSEC SAMPLE RATE SELECTED
0058 I 26 03       111            BNE    CAL3        YES
005A I CE 5F5B A   112            LDX    #RCTPT4     SET COMMAND TIMEOUT FOR 4 MSEC SAMPLE RATE
005D I 86 FF       113 CAL3       LDA A  #RTUACT
005F I C6 40       114            LDA B  #RTUPPT     PERFORM PERFORMANCE TEST
0061 I BD 000D R   115            JSR    RTUCMD      ON ALL ACTIVE RTUS
0064 I BD 0007 R   116 CAL5       JSR    NRMLST      INPUT PERFORMANCE TEST DATA FOR NEXT RTU
0067 I 2B 05       117            BMI    CAL4        JUMP IF LAST RTU ALREADY PROCESSED
CALBRT(A0011.02.016AA  CRS PERFORMANCE TEST)            08/04/78  09:46:27  PAGE   3

0069 I BD 0009 R   118            JSR    RECDTA      RECORD PERFORMANCE DATA
006C I 20 F6       119            BRA    CAL5        PROCESS NEXT RTU
006E I BD 000B R   120 CAL4       JSR    TPRCMP      COMPLETE OUTPUT REQUEST
0071 I CE 00B7 I   121            LDX    #PFTCMP     INFORM OPERATOR OF PERFORMANCE
0074 I BD 0006 R   122            JSR    DISPLY      TEST COMPLETION
0077 I B6 0004 R   123            LDA A  MODSAV
007A I FE 0000 R   124            LDX    CURCSP
007D I A7 10       125            STA A  LCAMDE,X    RESTORE CURRENT LINE MODE
007F I 7E 0005 R   126            JMP    DEPYX       INITIATE NEXT SEQUENCE
                   127 *
                   128 *      PERFORMANCE TEST MESSAGES
                   129 *
0082 I 4D554C      130 MPFTST     FCC    /MULTIPLE RTU PERFORMANCE TEST/
009F I 0D          131            FCB    $D
00A0 I 544553      132            FCC    /TEST DATA RECORDING/
00B3 I 0D          133            FCB    $D,$D,$D,4
00B4 I 0D
00B5 I 0D
00B6 I 04
00B7 I 504552      134 PFTCMP     FCC    /PERFORMANCE TEST COMPLETE/
00D0 I 0D          135            FCB    $D,$D,$D,$D,4
00D1 I 0D
00D2 I 0D
00D3 I 0D
00D4 I 04
00D5 I 535052      136 SPRNPG     FCC    /SPREAD NOT PROGRAMMED/
00EA I 0D          137            FCB    $D,$D,$D,$D,4
00EB I 0D
00EC I 0D
00ED I 0D
00EE I 04
                   138 *
00EF               139            END
CALBRT(A0011.02.016AA  CRS PERFORMANCE TEST)            08/04/78  09:46:27  PAGE   4

   NO ERRORS
  ISECT LENGTH --   239
  DSECT LENGTH --    0

> ATVCMD     0003      13     13    102
  CAL1       002B I    95     89
  CAL2       0050 I   108    104
  CAL3       005D I   113    111
  CAL4       006E I   120    117
  CAL5       0064 I   116    119
< CALBRT     0000 I    75      7
> CURCSP     0000      10     10     76    124
  DATACK     0001 A    50
> DEPYX      0005      16     16    126
> DISPLY     0006      17     17     93     96    122
```

```
> EXECTV   000A     20   20   94
  LCAMDE   0010 A   42   77   80   91   125
  LCAST1   000C A   27   87
  LCAST2   000D A   30   84   86
  LCAST3   000E A   36   81   83
  LS  TP   0002 A   33   85
  LS  TP   0004 A   32   85
  LS  IP   0008 A   31   85
  LS  SP   0001 A   34   85
  LS  DR   0002 A   37   82
  LS3 TF   0010 A   38   82
  LSTFRG   0020 A   28   88
  MODFLY   0001 A   43   90
> MODSAV   0004     14   14   78   123
  MODTST   0004 A   44   79
  MONWMU   0578 A   62   66   67
  MPFTST   0082 I  130   95
> NRMINI   0008     18   18   97
> NRMLST   0007     18   18  116
  PD02MS   0E74 A   66  101
  PD04MS   1770 A   67  107
  PFTCMP   00B7 I  134  121
  RCTPT2   4330 A   71  109
  RCTPT4   5F5B A   72  112
> RECDTA   0009     19   19  118
> RECTMO   0002     12   12  108
> RLSSTT   000C     22   22   98
  RTUACK   0000 A   49
  RTUACT   00FF A   48  113
> RTUCMD   000D     22   22  115
  RTUPPT   0040 A   51  114
  SPHHPG   00D5 I  136   92
  STS MS   0010 A   53  103  110
> TPR MP   000B     21   21  120
> XMTCTL   0001     11   11  100   106
  XMTPT4   1210 A   58  105
  XMTPTD   1210 A   57   99
LMPTST(A0011.02.017AA  CRS LAMP TEST ROUTINE)          08/04/78  09:52:29  PAGE   1

0000 I                     ISEC
                      *
                           DEF    LMPTST
                      *
                           REF    CURCSP
                           REF    ROLSTS
                           REF    AUXSPL,AUXPAR,AUXDTB
                           REF    AUXSAV
                      *
                           REF    RSTRID
                      *
                      *
                      *       ROLL-ALONG DISPLAY STATUS WORD EQUATES
                      *
0080 A                  ROLLMP     EQU    $80          LAMP TEST INDICATOR
                      *
                      *
                      *       LINE STATUS FLAGS EQUATES
                      *
000C A                  LCAST1     EQU    12           LINE STATUS FLAGS (BYTE 1)
0040 A                  LSTMSF     EQU    $40          MOMENTARY SWITCH FLAG
                      *
                      *       LINE CONTROL STORAGE EQUATES
                      *
0011 A                  LCAPAR     EQU    17           PARITY COUNT SAVE AREA
0012 A                  LCADTB     EQU    18           TIME BREAK
0013 A                  LCASPL     EQU    19           KEYBOARD LITE SAVE AREA
                      *
                      *       CENTRAL RECORDING STATION LAMP TEST ROUTINE
                      *
0000 I                  LMPTST     EQU    *
0000 I FE 0000 R                   LDX    CURCSP
0003 I E6 13                       LDA B  LCASPL,X     ANTICIPATE OFF CMND
0005 I B6 0001 R                   LDA A  ROLSTS       PICK UP ROLL-ALONG STATUS WORD
```

```
0008 I 2B 02          36          BMI    LMP1          JUMP IF OFF ENTRANCE
000A I C6 FF          37          LDA B  #$FF          TURN LITES ON AND TIME SIGN
000C I F7 0002 R      38 LMP1     STA B  AUXSPL        OUTPUT COMMAND TO LITES
000F I F7 0005 R      39          STA B  AUXSAV        OUTPUT COMMAND TO TIME BREAK SIGN INDICATO
0012 I 88 80          40          EOR A  #ROLLMP       SET STATE FLAG
0014 I C6 AA          41          LDA B  #$AA
0016 I F7 0003 R      42          STA B  AUXPAR
0019 I F7 0004 R      43          STA B  AUXDTB
001C I B7 0001 R      44          STA A  ROLSTS        IN STATUS WORD
001F I 2C 01          45          BGE    LMP2          JUMP IF 'OFF' ENTRANCE
0021 I 3B             46          RTI                  INITIATE NEXT SEQUENCE
0022 I BD 0006 R      47 LMP2     JSR    RSTRID        RESTORE ROLL-ALONG INDEXES
0025 I FE 0000 R      48          LDX    CURCSP        RESET
0028 I A6 11          49          LDA A  LCAPAR,X
002A I B7 0003 R      50          STA A  AUXPAR        RESTORE PARITY COUNT
002D I A6 12          51          LDA A  LCADTB,X
002F I B7 0004 R      52          STA A  AUXDTB        RESTORE TIME BREAK
0032 I A6 0C          53          LDA A  LCAST1,X      MOMENTARY
0034 I 84 BF          54          AND A  #-1-LSTMSF    SWITCH
0036 I A7 0C          55          STA A  LCAST1,X      FLAG
0038 I 3B             56          RTI
0039                  57          END
LMPTST(A0011.02.017AA  CRS LAMP TEST ROUTINE)         08/04/78  09:52:30  PAGE   2

   NO ERRORS
  ISECT LENGTH --     57
  DSECT LENGTH --      0

> AUXDTB     0004       8       8      43     52
> AUXPAR     0003       8       8      42     50
> AUXSAV     0005       9       9      39
> AUXSPL     0002       8       8      38
> CURCSP     0000       6       6      33     48
  LCADTB     0012 A    27      51
  LCAPAR     0011 A    26      49
  LCASPL     0013 A    28      34
  LCAST1     000C A    21      53      55
  LMP1       000C I    38      36
  LMP2       0022 I    47      45
< LMPTST     0000 I    32       4
  LSTMSF     0040 A    22      54
  ROLLMP     0080 A    16      40
> ROLSTS     0001       7       7      35     44
> RSTRID     0006      11      11      47
NRMTST(A0011.02.018AA  CRS NORMAL TEST ROUTINE)       08/04/78  09:53:33  PAGE   1

                       2 *
                       3 *       CENTRAL RECORDING STATION NORMAL TEST ROUTINE
                       4 *
 0000 I                5          ISEC
                       6 *
                       7          DEF    MTSFSQ,SGLTST,MLTEST
                       8          DEF    NRMTST,NMCONT
                       9          DEF    STBTFP,RLSSTT
                      10          DEF    NRMNTL
                      11 *
                      12          REF    SXMTBF,SXMTB1,SXMTB3,SXMTB5
                      13          REF    STLRRD,STLRSN
                      14          REF    STLSW1
                      15 *
                      16          REF    RCTACK,RCTSST,RCTNT2,RCTNT4,RCTNS2,RCTNS4
                      17 *
                      18          REF    RCMSET,NRMCMC,RCMSTR,RCMPTR,RCMENT
                      19          REF    RTUCMT,RTUCME,RCMTM3
                      20          REF    RMSKTB,RMSKP2
                      21 *
                      22          REF    RECTM0,RECTM1
                      23          REF    XMTOTL,XMTTL1
                      24          REF    TMRBTV,TMRBT1
                      25 *
                      26          REF    CURCSP,RTUADR,CHNADR
                      27          REF    STNADR,STNAD2,SAVDT2
                      28 *
```

```
                     REF    MSGN1,SYSERR
                     REF    MSGN2,MSGN3
                     REF    MSGRQT,NUMMSG
          *
                     REF    RTUCC1
                     REF    MSGN1B,MSGN1C
                     REF    MSGN1D,MSGN1A
          *
                     REF    CMPPR2,CMPPR1
                     REF    BNDSTR,BNDEND,MVCSTR,MVCDST
          *
                     REF    CHKIDS
                     REF    ATVCMD
                     REF    PRGPTR
                     REF    XT01
                     REF    RTSTLN
                     REF    MONSTS,DATMON
          *
          *
                     REF    MONWMU
          *
                     REF    TODTYR
          *
          *
                     REF    TWTINI,DMNINI,TPRCMP
          *
                     REF    DEXRTN,IDXRTN,MX1000
          *
                     REF    MSGOUT,DISPLY
                     REF    SELIDX,CHKDEP,ADPICP
                     REF    CHMSET,BNDSET,NRMLST,NRMINI
NRMTST(A0011.02.018AA  CRS NORMAL TEST ROUTINE)       08/04/78  09:53:34  PAGE   2

                     REF    ACKTMO,RTUCMD,TMONOF
                     REF    UPDFLN,UPDTFP
          *
                     REF    EXECTV,STLCRQ
                     REF    CNVNTD
                     REF    RCVMRT,RECDTA
                     REF    CMPRTN,RTSTAT
          *
                     REF    MVCHAR,ASL4
                     REF    LITEON,LITOFF
          *
                     REF    LOGFRM
          *
          *
          *       CRS PANEL LITES
          *
0040 A    AXLFIR     EQU    $40        FIRE LITE
0020 A    AXLOVR     EQU    $20        OVERRIDE LITE
0010 A    AXLFTS     EQU    $10        AUTO FIRE MULTIPLE NORMAL TEST LITE
0080 A    AXLADV     EQU    $80        ADVANCE LITE
0002 A    AXLNTS     EQU    2          NORMAL TEST-IN-PROGRESS LITE
0001 A    AXLTBP     EQU    1          TAPE BY-PASS LITE
0008 A    AXLCBP     EQU    8          CAMERA BY-PASS LITE
          *
          *       MESSAGE REQUEST TYPE
          *
0080 A    MSGTCV     EQU    $80        CONVERT AND DISPLAY OLD VALUE
0040 A    MSGTIP     EQU    $40        INPUT AND DISPLAY NEW VALUE
0020 A    MSGTBF     EQU    $20        SET BLANK FLAG
0010 A    MSGTPS     EQU    $10        CONVERSION PNTR ALREADY SET
0008 A    MSGTSV     EQU    8          CONVERTED VALUE STORED READY FOR DISPLAY
0004 A    MSGTRC     EQU    4          RETRY OR CONTINUE REQUEST
          *
          *       LINE STATUS FLAGS
          *
000C A    LCAST1     EQU    12         LINE STATUS FLAGS (BYTE 1)
0020 A    LSTPRG     EQU    $20        FIRE SEQUENCE PROGRAMMED
0010 A    LSTTBP     EQU    $10        TAPE BY-PASS
0008 A    LSTCBP     EQU    8          CAMERA BY-PASS
```

```
0001 A          99 LSTMTP    EQU    1          MULTIPLE NORMAL TEST PASSED
               100 *
000D A         101 LCAST2    EQU    13         LINE STATUS FLAGS (BYTE 2)
0008 A         102 LS2TIP    EQU    8          MULTIPLE NORMAL TEST-IN-PROGRESS
0004 A         103 LS2NTP    EQU    4          NORMAL TEST-IN-PROGRESS
0002 A         104 LS2BTP    EQU    2          BLAST TEST-IN-PROGRESS
0001 A         105 LS2TSP    EQU    1          TILT SEARCH-IN-PROGRESS
               106 *
000E A         107 LCAST3    EQU    14         LINE STATUS FLAGS (BYTE 3)
0080 A         108 LS3BVT    EQU    $80        UNIT STATUS DISPLAY TOGGLE
0040 A         109 LS3BLE    EQU    $40        BLASTER ERROR
0020 A         110 LS3MTT    EQU    $20        MANUAL TEST
0010 A         111 LS3STF    EQU    $10        SINGLE TEST FLAG
0008 A         112 LS3NEF    EQU    8          NORMAL TEST ERROR FLAG
0004 A         113 LS3MNE    EQU    4          NORMAL TEST ERROR FLAG (MULT TEST)
0002 A         114 LS3NDR    EQU    2          NOISE DATA RECORDING
               115 *
000F A         116 LCAST4    EQU    15         LINE STATUS FLAGS (BYTE 4)
0010 A         117 LS4FRL    EQU    $10        FIRE LOCK OUT
NRMTST(A0011.02.018AA  CRS NORMAL TEST ROUTINE)     08/04/78  09:53:35  PAGE   3

0008 A         118 LS4OVL    EQU    $8         OVERRIDE LOCKOUT
               119 *
               120 *
               121 *      LINE MODE EQUATES
               122 *
0010 A         123 LCAMDE    EQU    16         LINE MODE OFFSET
0001 A         124 MODPLY    EQU    1          DEPLOY MODE
0003 A         125 MODFIR    EQU    3          FIRE MODE
0005 A         126 MODFRA    EQU    5          FIRE ABORT MODE
               127 *
               128 *      NORMAL TEST COMPLETION TIME SAVE AREA
               129 *
001B A         130 LCACTY    EQU    27         TEST TEN YEARS
001C A         131 LCACUY    EQU    28         TEST UNIT YEARS
001D A         132 LCACHD    EQU    29         TEST HUNDRED DAY
001E A         133 LCACTD    EQU    30         TEST TEN DAY
001F A         134 LCACUD    EQU    31         TEST UNIT DAY
0020 A         135 LCACTH    EQU    32         TEST TEN HOURS
0021 A         136 LCACUH    EQU    33         TEST UNIT HOURS
0022 A         137 LCACTM    EQU    34         TEST TEN MINUTES
0023 A         138 LCACUM    EQU    35         TEST UNIT MINUTES
               139 *
               140 *
0014 A         141 LCADPM    EQU    20         ADDR OF START OF DEPLOYMENT TABLE
               142 *
               143 *      MAXIMUM # DIGITS FOR DEPLOY PARAMETERS
               144 *
0004 A         145 STNNDG    EQU    4          STATION ADDR
               146 *
               147 *      RTU COMMAND EQUATES
               148 *
0000 A         149 RTUACK    EQU    0          ACKNOWLEDGE-INITIALIZE
0001 A         150 DATACK    EQU    1          DATA ACKNOWLEDGE
0020 A         151 RTUPNT    EQU    $20        PERFORM NORMAL TEST
00FF A         152 RTUACT    EQU    $FF        RTU ADDRESS FOR ALL ACTIVE RTUS
0060 A         153 RTUSTS    EQU    $60        RTU STATUS TRANSFER
0000 A         154 STSIAV    EQU    0          INACTIVE STATE
0010 A         155 STS2MS    EQU    $10        2 MSEC SAMPLE RATE
               156 *
               157 *      DEPLOYMENT TABLE FLAGS
               158 *
0080 A         159 DTBSKP    EQU    $80        DEAD STATION
0040 A         160 DTBNTE    EQU    $40        NORMAL TEST ERROR
               161 *
               162 *      SATELLITE STATUS FLAGS
               163 *
0010 A         164 SW1STO    EQU    $10        SOFTWARE TIMEOUT
               165 *
0000 A         166 DWT3BT    EQU    0          3 BYTE WORDS
               167 *
```

```
0006 A              168 DPTDT1    EQU    6              DEPLOYMENT TABLE 1
                    169 *
                    170 *
                    171 *
0002 A              172 SCPSDT    EQU    2              SELECT SEISMIC DATA FOR SCOPE DISPLAY
0000 A              173 SCPRFS    EQU    0              SELECT RF SPECTRUM FOR SCOPE DISPLAY
                    174 *
                    175 *
NRMTST(A0011.02.018AA  CRS NORMAL TEST ROUTINE)          08/04/78  09:53:36  PAGE   4

                    176 *       ROUTINE TO PROCESS FIRE SEQUENCE MULTIPLE NORMAL TEST
                    177 *
0000 I              178 MTSFSQ    EQU    *
0000 I FE 001D R    179           LDX    CURCSP
0003 I A6 0E        180           LDA A  LCAST3,X
0005 I 84 CF        181           AND A  #-1-LS3MTT-LS3STFRESET MANUAL AND SINGLE TEST FLAGS
0007 I A7 0E        182           STA A  LCAST3,X
0009 I 8D 66        183           BSR    NRMTST         PERFORM MULTIPLE NORMAL TEST
000B I FE 001D R    184 MTS2      LDX    CURCSP
000E I A6 0E        185           LDA A  LCAST3,X
0010 I 84 FD        186           AND A  #-1-LS3NDR
0012 I A7 0E        187           STA A  LCAST3,X
0014 I E6 0F        188           LDA B  LCAST4,X       PICK UP LOCK OUT FLAGS
0016 I A6 0C        189           LDA A  LCAST1,X
0018 I 85 01        190           BIT A  #LS1MTP        MULTIPLE TEST PASSED ?
001A I 26 1B        191           BNE    MTS1           YES, PREPARE TO FIRE
001C I CA 08        192           ORA B  #LS4OVL
001E I E7 0F        193           STA B  LCAST4,X       RESET OVERRIDE LOCK OUT
0020 I 86 05        194           LDA A  #MODFRA
0022 I A7 10        195           STA A  LCAMDE,X       SET MODE = FIRE ABORT
0024 I A6 0E        196           LDA A  LCAST3,X
0026 I 84 7F        197           AND A  #-1-LS3BVT
0028 I A7 0E        198           STA A  LCAST3,X
002A I 86 30        199           LDA A  #AXLOVR+AXLFTS
002C I BD 005A R    200           JSR    LITEON         TURN ON OVERRIDE LITE
002F I 86 40        201           LDA A  #AXLFIR
0031 I BD 005B R    202           JSR    LITOFF
0034 I 7E 0051 R    203           JMP    EXECTV         INITIATE NEXT SEQUENCE
0037 I CA 10        204 MTS1      ORA B  #LS4FRL        RESET FIRE LOCK OUT
0039 I E7 0F        205           STA B  LCAST4,X
003B I 86 30        206           LDA A  #AXLFTS+AXLOVR
003D I BD 005B R    207           JSR    LITOFF         TURN OFF TEST AND OVERRIDE LITES
0040 I 86 40        208           LDA A  #AXLFIR
0042 I BD 005A R    209           JSR    LITEON         TURN ON FIRE LITE
0045 I 7E 0051 R    210           JMP    EXECTV         INITIATE NEXT SEQUENCE
                    211 *
                    212 *       ROUTINE TO PROCESS SINGLE NORMAL TEST SWITCH
                    213 *
0048 I              214 SGLTST    EQU    *
0048 I FE 001D R    215           LDX    CURCSP
004B I A6 0E        216           LDA A  LCAST3,X
004D I 8A 30        217           ORA A  #LS3MTT+LS3STFSET MANUAL AND SINGLE TEST FLAGS
004F I A7 0E        218           STA A  LCAST3,X
0051 I 8D 1E        219           BSR    NRMTST         PERFORM NORMAL TEST
0053 I 7E 0051 R    220           JMP    EXECTV         INITIATE NEXT SEQUENCE
                    221 *
                    222 *       ROUTINE TO PROCESS MULTIPLE NORMAL TEST SWITCH
                    223 *
0056 I              224 MLTEST    EQU    *
0056 I FE 001D R    225           LDX    CURCSP
0059 I A6 0E        226           LDA A  LCAST3,X
005B I 8A 20        227           ORA A  #LS3MTT        SET MANUAL TEST FLAG
005D I 84 EF        228           AND A  #-1-LS3STF     RESET SINGLE TEST FLAG
005F I A7 0E        229           STA A  LCAST3,X
0061 I E6 0D        230           LDA B  LCAST2,X
0063 I CE 0071 I    231           LDX    #NRMTST        ANTICIPATE NORMAL ENTRY
0066 I C5 08        232           BIT B  #LS2TIP        MULTIPLE NORMAL TEST-IN-PROGRESS
0068 I 27 03        233           BEQ    MLT1           NO, INITIATE MULTIPLE NORMAL TEST
NRMTST(A0011.02.018AA  CRS NORMAL TEST ROUTINE)          08/04/78  09:53:37  PAGE   5

006A I CE 01CA I    234           LDX    #NMCONT        CONTINUE MULTIPLE TEST WITH NEXT RTU
006D I AD 00        235 MLT1      JSR    0,X
006F I 20 9A        236           BRA    MTS2           INITIATE NEXT SEQUENCE
                    237 *
```

```
                          *      CRS NORMAL TEST ROUTINE
                          *
0071 I                NRMTST   EQU    *
0071 I 86 02                   LDA A  #AXLNTS
0073 I BD 005A R               JSR    LITEON      TURN ON NORMAL TEST LITE
0076 I FE 001D R               LDX    CURCSP
0079 I A6 0E                   LDA A  LCAST3,X    RESET TEST ERROR AND
007B I 84 B1                   AND A  #-1-LS3BLE-LS3MNE-LS3NDR
007D I A7 0E                   STA A  LCAST3,X    NORMAL DATA RECORDING FLAGS
007F I E6 0D                   LDA B  LCAST2,X    RESET BLAST TEST AND
0081 I C4 FC                   AND B  #-1-LS2BTP-LS2TSPTILT SEARCH-IN-PROGRESS FLAGS
0083 I CA 0C                   ORA B  #LS2NTP+LS2TIPSET NORMAL TEST-IN-PROGRESS FLAGS
0085 I E7 0D                   STA B  LCAST2,X
0087 I 5F                      CLR B              ANTICIPATE NON-MANUAL TEST
0088 I 85 20                   BIT A  #LS3MTT     MANUAL TEST ?
008A I 27 0A                   BEQ    NRM1        YES, NO NOISE DATA
008C I F6 0038 R               LDA B  RTSTLN      PICK UP SELECTED NOISE LENGTH
008F I 54                      LSR B
0090 I C1 04                   CMP B  #4          COMPUTE TEST LENGTH IN SECONDS
0092 I 26 02                   BNE    NRM1
0094 I CB 02                   ADD B  #2
0096 I F7 0000 D      NRM1     STA B  NRMNTL      SAVE NOISE TEST LENGTH
0099 I CE 003B R               LDX    #MONWMU     SET RECORDING TIMEOUT VALUE
009C I FF 0017 R               STX    RECTMO      TO MONITOR WARM UP TIME
009F I BD 0042 R               JSR    MX1000
00A2 I F7 001A R               STA B  XMTTL1
00A5 I B7 0019 R               STA A  XMTOTL      SET TOTAL # WORDS
00A8 I FB 0018 R               ADD B  RECTM1
00AB I F7 0018 R               STA B  RECTM1
00AE I B9 0017 R               ADC A  RECTMO
00B1 I B7 0017 R               STA A  RECTMO      COMPUTE TOTAL MONITOR RECORDING TIMEOUT VAU
00B4 I 4F                      CLR A              SAVE TEST FLAGS
00B5 I BD 0057 R               JSR    RTSTAT
00B8 I 85 10                   BIT A  #STS2MS     4 MSEC SAMPLE RATE
00BA I 27 06                   BEQ    NRM2        YES
00BC I 78 001A R               ASL    XMTTL1      COMPUTE # WORDS
00BF I 79 0019 R               ROL    XMTOTL      FOR 2 MSEC RATE
00C2 I 86 18          NRM2     LDA A  #24
00C4 I CE 0019 R               LDX    #XMTOTL     INCLUDE 24 WORDS OF
00C7 I BD 0041 R               JSR    IDXRTN      NORMAL TEST DATA
00CA I FE 001D R               LDX    CURCSP
00CD I A6 0E                   LDA A  LCAST3,X
00CF I F6 0000 D               LDA B  NRMNTL      NOISE DATA TO BE RECORDED ?
00D2 I 27 04                   BEQ    NRM4        NO
00D4 I 8A 02                   ORA A  #LS3NDR     SET NOISE DATA RECORDING INDICATOR
00D6 I A7 0E                   STA A  LCAST3,X
00D8 I 85 10          NRM4     BIT A  #LS3STF     SINGLE TEST FLAG ?
00DA I 26 03                   BNE    NRM4A       YES, PERFORM SINGLE TEST
00DC I 7E 019B I               JMP    NRM3        NO, PERFORM MULTIPLE TEST
00DF I E6 0D          NRM4A    LDA B  LCAST2,X
00E1 I C4 F7                   AND B  #-1-LS2TIP  RESET TEST-IN-PROGRESS FLAG
00E3 I E7 0D                   STA B  LCAST2,X
00E5 I 85 20                   BIT A  #LS3MTT     MANUAL TEST ?
00E7 I 27 0B                   BEQ    NRM5        NO, TEST STATION ALREADY SETUP
NRMTST(A0011.02.018AA  CRS NORMAL TEST ROUTINE)      08/04/78  09:53:38  PAGE   6
00E9 I CE 045C I               LDX    #SNTMSG
00EC I FF 0027 R               STX    MSGRQT
00EF I C6 40                   LDA B  #MSGTIP
00F1 I BD 0043 R               JSR    MSGOUT      ASK OPERATOR TO ENTER TEST STATION ADDR
00F4 I BD 0045 R      NRM5     JSR    SELIDX      STATION WITHIN MAP BOUNDARIES ?
00F7 I 2B 05                   BMI    NRM6        NO, NOTIFY OPERATOR
00F9 I BD 0046 R               JSR    CHKDEP      STATION DEPLOYED ?
00FC I 26 24                   BNE    NRM7        YES, PERFORM TEST
00FE I FE 001D R      NRM6     LDX    CURCSP
0101 I A6 0E                   LDA A  LCAST3,X
0103 I 8A 08                   ORA A  #LS3NEF     SET NORMAL TEST ERROR FLAG
0105 I A7 0E                   STA A  LCAST3,X
0107 I 36                      PSH A
0108 I CE 4531 A               LDX    #$4531
010B I BD 005C R               JSR    LOGFRM
010E I 32                      PUL A
010F I FE 001D R               LDX    CURCSP
0112 I 85 20                   BIT A  #LS3MTT     MANUAL TEST ?
0114 I 27 73                   BEQ    NRM8        NO, SKIP MESSAGE DISPLAY
0116 I 86 01                   LDA A  #MODPLY
```

```
0118 I A7 10        312          STA A  LCAMDE,X     SET MODE = DEPLOY
011A I CE 055F I    313          LDX    #TSTNDP      TEST STATION NOT DEPLOYED
011D I BD 0044 R    314          JSR    DISPLY
0120 I 20 67        315          BRA    NRM8
0122 I F6 0000 D    316 NRM7     LDA B  NRMNTL       NOISE DATA RECORDING ?
0125 I 27 0F        317          BEQ    NRM9         NO, SKIP DEVICE INITIALIZATION
0127 I FE 001D R    318          LDX    CURCSP
012A I A6 0C        319          LDA A  LCAST1,X
012C I 85 10        320          BIT A  #LSTTBP      TAPE BY-PASS ?
012E I 26 03        321          BNE    NRMA         YES, SKIP TAPE INITIALIZATION
0130 I BD 003D R    322          JSR    TWTINI       INITIALIZE TAPE UNIT FOR OUTPUT
0133 I BD 003E R    323 NRMA     JSR    DMNINI       INITIALIZE MONITOR FOR OUTPUT
0136 I BD 0047 R    324 NRM9     JSR    ADPICP
0139 I B7 001E R    325          STA A  RTUADR       SAVE CURRENT RTU ADDR
013C I BD 0048 R    326          JSR    CHMSET       SETUP RECORDING MAP FOR CURRENT RTU
013F I CE 050D I    327          LDX    #NTPMSG
0142 I BD 0044 R    328          JSR    DISPLY
0145 I BD 0293 I    329          JSR    SNMTST       PERFORM NORMAL TEST
0148 I BD 0402 I    330          JSR    STBTFP       SETUP BAD TEST FLASH PATTERN
014B I FE 001D R    331          LDX    CURCSP
014E I A6 0E        332          LDA A  LCAST3,X
0150 I 84 7F        333          AND A  #-1-LS3BVT   RESET UNIT DISPLAY TOGGLE
0152 I A7 0E        334          STA A  LCAST3,X
0154 I 85 20        335          BIT A  #LS3MTT      MANUAL TEST ?
0156 I 27 29        336          BEQ    NRMD         NO, DO NOT DISPLAY NORMAL TEST DATA
0158 I 8A 80        337          ORA A  #LS3BVT
015A I A7 0E        338          STA A  LCAST3,X     SET UNIT DISPLAY TOGGLE
015C I FE 0029 R    339          LDX    RTUCC1
015F I 8C 002A R    340          CPX    #MSGN1B      BAD BATERRIES ?
0162 I 26 05        341          BNE    NRM9A        NO - CONTINUE
0164 I CE 0023 R    342          LDX    #MSGN1       YES - DISPLAY
0167 I 20 0D        343          BRA    NRMD2        BATTERY VOLTAGES
0169 I 8C 002B R    344 NRM9A    CPX    #MSGN1C      BAD REGULATORS ?
016C I 26 05        345          BNE    NRM9B        NO - CONTINUE
016E I CE 0025 R    346          LDX    #MSGN2       YES - DISPLAY
0171 I 20 03        347          BRA    NRMD2        TAPPED-REGULATED VOLTAGES
0173 I CE 0026 R    348 NRM9B    LDX    #MSGN3       BAD CHANNELS OR GOOD RTU
0176 I 7D 001E R    349 NRMD2    TST    RTUADR       ARTIFICIAL RTU
NRMTST(A0011.02.018AA  CRS NORMAL TEST ROUTINE)        08/04/78  09:53:39  PAGE

0179 I 26 03        350          BNE    NRMD1        NO-CONTINUE
017B I CE 059B I    351          LDX    #ARTUTC      INFORM OPERATOR
017E I BD 0044 R    352 NRMD1    JSR    DISPLY       VOLTAGES
0181 I F6 0000 D    353 NRMD     LDA B  NRMNTL       NOISE DATA RECORDING ?
0184 I 27 03        354          BEQ    NRM8         NO, SKIP REQUEST COMPLETION
0186 I BD 003F R    355          JSR    TPRCMP       COMPLETE OUTPUT REQUEST
0189 I 86 02        356 NRM8     LDA A  #AXLNTS
018B I BD 005B R    357          JSR    LITOFF       TURN OFF RTU TEST LITE
018E I A6 0D        358          LDA A  LCAST2,X     RESET TEST-IN-PROGRESS FLAGS
0190 I 84 F3        359          AND A  #-1-LS2NTP-LS2TIP
0192 I A7 0D        360          STA A  LCAST2,X
0194 I A6 0E        361          LDA A  LCAST3,X
0196 I 84 FD        362          AND A  #-1-LS3NDR
0198 I A7 0E        363          STA A  LCAST3,X
019A I 39           364          RTS                 RETURN TO CALLER
                    365 *
                    366 *      MULTIPLE NORMAL TEST
                    367 *
019B I              368 NRM3     EQU    *
019B I CE 050D I    369          LDX    #NTPMSG
019E I BD 0044 R    370          JSR    DISPLY
01A1 I FE 001D R    371          LDX    CURCSP
01A4 I A6 0C        372          LDA A  LCAST1,X
01A6 I 84 FE        373          AND A  #-1-LSTMTP   RESET MULTIPLE NORMAL TEST PASSED FLAG
01A8 I A7 0C        374          STA A  LCAST1,X
01AA I 85 20        375          BIT A  #LSTPRG      FIRE_SEQUENCE PROGRAMMED
01AC I 26 0C        376          BNE    NRME         YES, BEGIN TEST
01AE I 86 01        377          LDA A  #MODPLY
01B0 I A7 10        378          STA A  LCAMDE,X     SET MODE = DEPLOY
01B2 I CE 057D I    379          LDX    #FSQNPG
01B5 I BD 0044 R    380          JSR    DISPLY       NOTIFY OPERATOR
01B8 I 20 CF        381          BRA    NRM8         COMPLETE TEST
01BA I BD 004B R    382 NRME     JSR    NRMINI       SET UP RECORDING MAP
```

```
01BD I BD 0339 I              JSR    STPNTT       SETUP NORMAL TEST COMMAND TIMEOUT VALUE
01C0 I C6 20                  LDA B  #RTUPNT      AND NORMAL TEST COMMAND
01C2 I FB 0000 D              ADD B  NRMNTL       INCLUDE NOISE TEST LENGTH
01C5 I 86 FF                  LDA A  #RTUACT      PERFORM NORMAL TEST
01C7 I BD 004D R              JSR    RTUCMD       ON ALL ACTIVE RTUS
                     *
                     *      MULTIPLE NORMAL TEST CONTINUATION
                     *
01CA I                   NMCONT   EQU    *
01CA I BD 004A R              JSR    NRMLST       INPUT NORMAL TEST DATA FROM NEXT RTU
01CD I 2B 37                  BMI    NRMB         JUMP IF LAST RTU ALREADY PROCESSED
01CF I CE 0529 I              LDX    #MNTMSG
01D2 I BD 0044 R              JSR    DISPLY
01D5 I BD 0293 I              JSR    SNMTST       PROCESS NORMAL TEST DATA FOR CURRENT RTU
01D8 I BD 0402 I              JSR    STBTFP       SETUP BAD TEST FLASH PATTERN
01DB I FE 001D R              LDX    CURCSP
01DE I A6 0E                  LDA A  LCAST3,X
01E0 I 85 08                  BIT A  #LS3NEF      NORMAL TEST ERROR ?
01E2 I 27 E6                  BEQ    NMCONT       NO, PROCESS NEXT RTU
01E4 I 84 F7                  AND A  #-1-LS3NEF   RESET SINGLE ERROR FLAG
01E6 I 8A 04                  ORA A  #LS3MNE      SET MULTIPLE ERROR FLAG
01E8 I A7 0E                  STA A  LCAST3,X
01EA I 36                     PSH A
01EB I CE 4531 A              LDX    #$4531
01EE I BD 005C R              JSR    LOGFRM
NRMTST(A0011.02.01SAA  CRS NORMAL TEST ROUTINE)        08/04/78  09:53:40  PAGE   8

01F1 I 32                     PUL A
01F2 I 85 20                  BIT A  #LS3MTT      MANUAL TEST ?
01F4 I 27 D4                  BEQ    NMCONT       NO, PROCESS NEXT RTU
01F6 I 8A 80                  ORA A  #LS3BVT      SET UNIT STATUS DISPLAY TOGG.-
01F8 I FE 001D R              LDX    CURCSP
01FB I A7 0E                  STA A  LCAST3,X
01FD I CE 0023 R              LDX    #MSGN1
0200 I BD 0044 R              JSR    DISPLY       DISPLAY BATTERY VOLTAGES
0203 I 7E 0051 R              JMP    EXECTV       INITIATE NEXT SEQUENCE
                     *
                     *      MULTIPLE NORMAL TEST COMPLETION ROUTINE
                     *
0206 I                   NRMB     EQU    *
0206 I CE 003C R              LDX    #TODTYR
0209 I FF 0032 R              STX    MVCSTR       SET STARTING ADDR
020C I FE 001D R              LDX    CURCSP
020F I FF 0033 R              STX    MVCDST
0212 I CE 0033 R              LDX    #MVCDST
0215 I 86 1B                  LDA A  #LCACTY
0217 I BD 0041 R              JSR    IDXRTN       COMPUTE DESTINATION ADDR
021A I 86 09                  LDA A  #LCACUM-LCACTY+1
021C I BD 0058 R              JSR    MVCHAR       SAVE CURRENT TIME
021F I 86 22                  LDA A  #LCACTM
0221 I C6 10                  LDA B  #$10
0223 I BD 036C I              JSR    CLKICR       ADD 10 MINUTES TO CURRENT TIME
0226 I 81 60                  CMP A  #$60         MINUTES OVERFLOW ?
0228 I 2D 4C                  BLT    NRMH         NO, NORMAL TEST TIMEOUT SETUP COMPLETE
022A I 86 30                  LDA A  #$30         RESET TENS
022C I A7 00                  STA A  0,X          PLACE DIGIT
022E I C6 01                  LDA B  #1
0230 I 86 20                  LDA A  #LCACTH
0232 I BD 036C I              JSR    CLKICR       INCR HOUR COUNTER
0235 I 81 24                  CMP A  #$24         HOURS OVERFLOW ?
0237 I 2D 3D                  BLT    NRMH         NO, NORMAL TEST TIMEOUT SETUP COMPLETE
0239 I 86 30                  LDA A  #$30
023B I A7 00                  STA A  0,X          SET HOURS
023D I A7 01                  STA A  1,X          TO ZERO
023F I C6 01                  LDA B  #1
0241 I 86 1E                  LDA A  #LCACTD
0243 I BD 036C I              JSR    CLKICR       INCR CURRENT DAY COUNT
0246 I 09                     DEX                 SET PNTR TO HUNDREDS DAY DIGIT
0247 I 4D                     TST A               CARRY REQUIRED
0248 I 26 02                  BNE    NRMI         NO, CHECK FOR OVERFLOW
024A I 6C 00                  INC    0,X          INCR HUNDREDS DAY DIGIT
024C I E6 00             NRMI     LDA B  0,X
024E I C1 03                  CMP B  #3           OVERFLOW CHECK REQUIRED ?
```

```
0250 I 26 24                 BNE    NRMH        NO, NORMAL TEST TIMEOUT SETUP COMPLETE
0252 I FE 001D R             LDX    CURCSP
0255 I 36                    PSH A              SAVE DAYS TENS AND UNITS DIGITS
0256 I A6 1C                 LDA A  LCACUY,X    PICK UP CURRENT YEAR
0258 I C6 41                 LDA B  #65         ANTICIPATE NORMAL YEAR
025A I 84 03                 AND A  #3
025C I 26 02                 BNE    NRMJ        JUMP IF NORMAL YEAR
025E I C6 42                 LDA B  #66         SETUP COMPARISON VALUE FOR LEAP YEAR
0260 I 32              NRMJ  PUL A
0261 I 11                    CBA                DAYS OVERFLOW ?
0262 I 2D 12                 BLT    NRMH        NO, NORMAL TEST TIMEOUT SETUP COMPLETE
0264 I FE 001D R             LDX    CURCSP
NRMTST(A0011.02.018AA  CRS NORMAL TEST ROUTINE)    08/04/78  09:53:41  PAGE   9

0267 I 86 30                 LDA A  #$30
0269 I A7 1D                 STA A  LCACHD,X    SET
026B I A7 1E                 STA A  LCACTD,X    DAYS EQUAL
026D I A7 1F                 STA A  LCACUD,X    TO ZERO
026F I 86 1B                 LDA A  #LCACTY
0271 I C6 01                 LDA B  #1
0273 I BD 036C I             JSR    CLKICR      INCR CURRENT YEAR COUNTER
0276 I FE 001D R       NRMH  LDX    CURCSP
0279 I A6 0E                 LDA A  LCAST3,X
027B I 85 04                 BIT A  #LS3MNE     MULTIPLE NORMAL TEST ERROR ?
027D I 26 0B                 BNE    NRMK        YES, NOTIFY OPERATOR
027F I E6 0C                 LDA B  LCAST1,X
0281 I CA 01                 ORA B  #LSTMTP     SET MULTIPLE TEST PASSED FLAG
0283 I E7 0C                 STA B  LCAST1,X
0285 I CE 049C I             LDX    #MNTGCP     NOTIFY OPERATOR OF GOOD COMPLETION
0288 I 20 03                 BRA    NRML
028A I CE 04F0 I       NRMK  LDX    #MNTMBC     NOTIFY OPERATOR OF BAD COMPLETION
028D I BD 0044 R       NRML  JSR    DISPLY
0290 I 7E 0181 I             JMP    NRMD        COMPLETE REQUEST
                       *
                       *     CENTRAL RECORDING STATION SINGLE NORMAL TEST ROUTINE
                       *
0293 I                 SNMTST EQU   *
0293 I 7D 001E R             TST    RTUADR      ARTIFICIAL RTU ?
0296 I 26 06                 BNE    SNM1        NO, PERFORM TEST
0298 I 7D 0000 D             TST    NRMNTL      NOISE DATA RECORDING
029B I 26 01                 BNE    SNM1        YES, CONTINUE
029D I 39                    RTS                SKIP TEST ON ARTIFICIAL RTU
029E I BD 039A I       SNM1  JSR    RLSSTT      SELECT RTU STATE
02A1 I FE 001D R             LDX    CURCSP
02A4 I A6 0E                 LDA A  LCAST3,X
02A6 I 85 10                 BIT A  #LS3STF     SINGLE TEST ?
02A8 I 27 2C                 BEQ    SNM5        NO, MULTIPLE NORMAL TEST
02AA I BD 0339 I             JSR    STPNTT      SETUP NORMAL TEST COMMAND TIMEOUT VALUE
02AD I C6 20                 LDA B  #RTUPNT     PICK UP NORMAL TEST COMMAND
02AF I FB 0000 D             ADD B  NRMNTL      INCLUDE NOISE TEST LENGTH
02B2 I B6 001E R             LDA A  RTUADR      PERFORM NORMAL TEST
02B5 I BD 004D R             JSR    RTUCMD      ON CURRENT RTU
02B8 I BD 0054 R             JSR    RCVMRT      INPUT NORMAL TEST DATA
02BB I BD 004C R             JSR    ACKTMO
02BE I B6 001E R             LDA A  RTUADR
02C1 I C6 01                 LDA B  #RTUACK+DATACK
02C3 I CE 0007 R             LDX    #RCTACK
02C6 I BD 004D R             JSR    RTUCMD      ACKNOWLEDGE RTU DATA
02C9 I B6 0039 R             LDA A  MONSTS
02CC I 8A 02                 ORA A  #SCPSDT     SELECT SEISMIC DATA FOR SCOPE DISPLAY
02CE I B7 0039 R             STA A  MONSTS
02D1 I B7 003A R             STA A  DATMON
02D4 I 20 1E                 BRA    SNM6        GO RETRIEVE NORMAL TEST DATA
02D6 I FE 0015 R       SNM5  LDX    RMSKTB      MOVE RECORDING
02D9 I FF 0001 R             STX    SXMTB1      MASKS INTO
02DC I FE 0016 R             LDX    RMSKP2      SATELLITE
02DF I FF 0002 R             STX    SXMTB3      COMMAND BUFFER
02E2 I CE 0005 R       SNM7  LDX    #STLRSN     STORE NORMAL TEST DATA
02E5 I BD 0052 R             JSR    STLCRQ      CALL SATELLITE DRIVER
02E8 I B6 0006 R             LDA A  STLSW1
02EB I 85 10                 BIT A  #SW1STO     SOFTWARE TIMEOUT ?
02ED I 27 05                 BEQ    SNM6        NO
```

```
02EF I BD 0024 R   524          JSR    SYSERR
02F2 I 27 EE       525          BEQ    SNM7       JUMP IF RETRY SPECIFIED
02F4 I CE 0018 A   526 SNM6     LDX    #24        SET # WORDS FOR NORMAL TEST DATA
02F7 I FF 0001 R   527          STX    SXMTB1     IN SATELLITE COMMAND BUFFER
02FA I CE 0000 A   528          LDX    #0
02FD I FF 0002 R   529          STX    SXMTB3     SET ADDR IN SATELLITE BUFFER
0300 I 86 00       530          LDA A  #DWT3BT    ASK FOR 3
0302 I B7 0003 R   531          STA A  SXMTB5     BYTE WORDS
0305 I CE 0004 R   532 SNM9     LDX    #STLRRD
0308 I BD 0052 R   533          JSR    STLCRQ     ASK FOR NORMAL TEST DATA
030B I B6 0006 R   534          LDA A  STLSW1
030E I 85 10       535          BIT A  #SW1STO    SOFTWARE TIMEOUT ?
0310 I 27 05       536          BEQ    SNM8       NO, CONVERT NORMAL TEST DATA
0312 I BD 0024 R   537          JSR    SYSERR     INFORM OPERATOR
0315 I 27 EE       538          BEQ    SNM9       JUMP IF RETRY SPECIFIED
0317 I BD 0053 R   539 SNM8     JSR    CNVNTD     CONVERT NORMAL TEST DATA
031A I CE 4C32 A   540          LDX    #$4C32
031D I BD 005C R   541          JSR    LOGFRM
0320 I F6 0000 D   542          LDA B  NRMNTL     NOISE DATA RECORDING ?
0323 I 27 13       543          BEQ    SNMA       NO, SKIP DATA RECORDING
0325 I 86 18       544          LDA A  #24
0327 I CE 0019 R   545          LDX    #XMTOTL    SUBTRACT NORMAL TEST LENGTH
032A I BD 0040 R   546          JSR    DEXRTN     FROM NOISE DATA LENGTH
032D I BD 0055 R   547          JSR    RECDTA     RECORD NOISE DATA
0330 I 86 18       548          LDA A  #24
0332 I CE 0019 R   549          LDX    #XMTOTL    ADD NORMAL TEST LENGTH
0335 I BD 0041 R   550          JSR    IDXRTN     TO NOISE DATA LENGTH
0338 I 39          551 SNMA     RTS               RETURN TO CALLER
                   552 *
                   553 *     ROUTINE TO SETUP NORMAL TEST COMMAND TIMEOUT VALUE
                   554 *
0339 I             555 STPNTT   EQU    *
0339 I CE 0009 R   556          LDX    #RCTNT2    ANTICIPATE NORMAL TEST W/O NOISE (2 MSEC)
033C I 4F          557          CLR A
033D I BD 0057 R   558          JSR    RTSTAT     PICK UP CURRENT SAMPLE RATE
0340 I 85 10       559          BIT A  #STS2MS    2 MSEC SAMPLE RATE ?
0342 I 26 03       560          BNE    STP1       YES
0344 I CE 000A R   561          LDX    #RCTNT4    ANTICIPATE NORMAL TEST W/O NOISE (4 MSEC)
0347 I F6 0000 D   562 STP1     LDA B  NRMNTL     NOISE DATA RECORDING ?
034A I 27 0A       563          BEQ    STP2       NO, TIMEOUT SETUP COMPLETE
034C I CE 000B R   564          LDX    #RCTNS2    ANTICIPATE NORMAL TEST W/ NOISE (2 MSEC)
034F I 85 10       565          BIT A  #STS2MS    2 MSEC SAMPLE RATE ?
0351 I 26 03       566          BNE    STP2       YES
0353 I CE 000C R   567          LDX    #RCTNS4    SET NORMAL TEST W/ NOISE (4 MSEC)
0356 I FF 001B R   568 STP2     STX    TMRBTV     SETUP TIMEOUT VALUE
0359 I BD 0042 R   569          JSR    MX1000
035C I FB 001C R   570          ADD B  TMRBT1
035F I F7 001C R   571          STA B  TMRBT1     INCLUDE NOISE DATA
0362 I B9 001B R   572          ADC A  TMRBTV     TIME IN
0365 I B7 001B R   573          STA A  TMRBTV     TIMEOUT VALUE
0368 I FE 001B R   574          LDX    TMRBTV     PICK UP TIMEOUT VALUE
036B I 39          575          RTS               RETURN TO CALLER
                   576 *
                   577 *     ROUTINE TO INCREMENT CLOCK UNITS
                   578 *
                   579 *          CALLING SEQUENCE: JSR  CLKICR
                   580 *
                   581 *                            ACCA => OFFSET TO SAVE AREA
```

```
                   582 *                            ACCB => AMOUNT TO INCREMENT (BCD
                   583 *
036C I             584 CLKICR   EQU    *
036C I 37          585          PSH B             SAVE INCR VALUE
036D I FE 001D R   586          LDX    CURCSP
0370 I FF 0033 R   587          STX    MVCDST
0373 I CE 0033 R   588          LDX    #MVCDST    COMPUTE PNTR TO HIGH
0376 I BD 0041 R   589          JSR    IDXRTN     ORDER DIGIT OF NUMBER
0379 I FE 0033 R   590          LDX    MVCDST
037C I A6 00       591          LDA A  0,X        PICK UP AND POSITION
037E I BD 0059 R   592          JSR    ASL4       HIGH ORDER DIGIT
0381 I E6 01       593          LDA B  1,X
```

```
0383 I C4 0F        594          AND B  #$F        MASK LOW ORDER DIGIT
0385 I 1B           595          ABA               COMBINE TO BCD VALUE
0386 I 33           596          PUL B             RESTORE INCREMENT VALUE
0387 I 1B           597          ABA
0388 I 19           598          DAA               INCR CLOCK VALUE
0389 I 16           599          TAB
038A I C4 0F        600          AND B  #$F
038C I CA 30        601          ORA B  #$30
038E I E7 01        602          STA B  1,X
0390 I 16           603          TAB
0391 I 57           604          ASR B
0392 I 57           605          ASR B
0393 I 57           606          ASR B
0394 I 57           607          ASR B
0395 I CA 30        608          ORA B  #$30
0397 I E7 00        609          STA B  0,X        UPDATE CLOCK COUNTER
0399 I 39           610          RTS               RETURN TO CALLER
                    611 *
                    612 *     ROUTINE TO SELECT RTU STATE
                    613 *
039A I              614 RLSSTT   EQU    *
039A I FE 001D R    615          LDX    CURCSP
039D I A6 0E        616          LDA A  LCAST3,X
039F I 85 10        617          BIT A  #LS3STF    MULTIPLE TEST
03A1 I 27 5E        618          BEQ    RLS1
03A3 I E6 0C        619          LDA B  LCAST1,X   FIRE SEQUENCE PROGRAMMED
03A5 I C5 20        620          BIT B  #LSTPRG
03A7 I 27 43        621          BEQ    SNM2       NO
03A9 I BD 0049 R    622          JSR    BNDSET     COMPUTE SPREAD BOUNDARIES
03AC I CE 0014 R    623          LDX    #RCMTM3    INIT CHANNEL MAP PNTR
03AF I 08           624 SNM4     INX               INCR TO
03B0 I 08           625          INX               NEXT TABL
03B1 I 08           626          INX               ENTRY
03B2 I 8C 0013 R    627          CPX    #RTUCME    END-OF-MAP
03B5 I 27 35        628          BEQ    SNM2       YES, NOT PART OF SPREAD
03B7 I FF 0022 R    629          STX    SAVDT2     SAVE TABLE PNTR
03BA I EE 00        630          LDX    0,X        DEAD CHANNEL
03BC I 27 29        631          BEQ    SNM3       YES, CONTINUE
03BE I FF 0020 R    632          STX    STNADR     SAVE ASSOCIATED CHANNEL #
03C1 I FE 001D R    633          LDX    CURCSP
03C4 I EE 00        634          LDX    0,X
03C6 I BC 0020 R    635          CPX    STNADR     SHOT POINT ?
03C9 I 27 36        636          BEQ    RLS1       YES-SKIP SPPEAD BOUNDARY CHECK
03CB I CE 0020 R    637          LDX    #STNADR
03CE I FF 002E R    638          STX    CMPPR2
03D1 I CE 0030 R    639          LDX    #BNDSTR
NMTST(A0011.02 018AA  CRS NORMAL TEST ROUTINE)        08/04/78  09:53:44  PAGE  12

03D4 I FF 002F R    640          STX    CMPPR1
03D7 I BD 0056 R    641          JSR    CMPRTN     STATION WITHIN SPREAD
03DA I 25 0B        642          BCS    SNM3       NO
03DC I CE 0031 R    643          LDX    #BNDEND
03DF I FF 002F R    644          STX    CMPPR1     STATION WITHIN SPREAD
03E2 I BD 0056 R    645          JSR    CMPRTN
03E5 I 23 1A        646          BLS    RLS1       YES
03E7 I FE 0022 R    647 SNM3     LDX    SAVDT2     PICK UP PNTR TO CHANNEL MAP TABLE
03EA I 20 C3        648          BRA    SNM4       CONTINUE
03EC I 86 60        649 SNM2     LDA A  #RTUSTS+STSIAVSET UP RTU INACTIVE
03EE I BD 0057 R    650          JSR    RTSTAT     SET UP PROPER RTU STATE
03F1 I CE 0008 R    651          LDX    #RCTSST    SET TIMEOUT
03F4 I FF 001B R    652          STX    TMRBTV     VALUE FOR STATUS COMMAND
03F7 I 16           653          TAB
03F8 I F7 0035 R    654          STA B  ATVCMD     SAVE STATUS COMAND
03FB I B6 001E R    655          LDA A  RTUADR     SET RTU
03FE I BD 004D R    656          JSR    RTUCMD     STATE
0401 I 39           657 RLS1     RTS
                    658 *
                    659 *     ROUTINE TO SETUP BAD TEST FLASH INDICATORS IN DEPLOYMENT TABLE
                    660 *
                    661 *     LS3NEF = 1 NORMAL TEST ERROR INDICATOR IN DEPLOYMENT TABLE
                    662 *     LS3NEF = 0 NORMAL TEST ERROR INDICATOR RESET IN DEPLOYMENT TABLE
                    663 *
0402 I              664 STBTFP   EQU    *
```

```
0402 I 86 04        665          LDA A  #4          SET
0404 I B7 001F R    666          STA A  CHNADR      CNTR IN CHANNEL ADDRESS
0407 I CE 0014 R    667          LDX    #RCMTM3     INITIALIZE MAP
040A I FF 0036 R    668          STX    PRGPTR      PNTR
040D I 7A 001F R    669 STB2     DEC    CHNADR      LAST CHANNEL
0410 I 2B 33        670          BMI    STB1        YES
0412 I FE 0036 R    671          LDX    PRGPTR      SET
0415 I 08           672          INX                PNTR
0416 I 08           673          INX                TO NEXT
0417 I 08           674          INX                CHANNEL MAP
0418 I FF 0036 R    675          STX    PRGPTR
041B I EE 00        676          LDX    0,X
041D I 27 EE        677          BEQ    STB2        DEAD CHANNEL
041F I FF 0020 R    678          STX    STNADR
0422 I BD 0045 R    679          JSR    SELIDX      COMPUTE DEPLOYMENT
0425 I BD 0046 R    680          JSR    CHKDEP      TABLE INDEX
0428 I A6 00        681          LDA A  0,X
042A I 84 BF        682          AND A  #-1-DTBNTE  RESET ERROR FLAG
042C I FE 001D R    683          LDX    CURCSP
042F I E6 0E        684          LDA B  LCAST3,X
0431 I C5 08        685          BIT B  #LS3NEF     NORMAL TEST ERROR ?
0433 I 27 09        686          BEQ    STB3        NO - CONTINUE
0435 I FE 0036 R    687          LDX    PRGPTR
0438 I E6 02        688          LDA B  2,X         CHANNEL ERRORS ?
043A I 2A 02        689          BPL    STB3        NO - CONTINUE
043C I 8A 40        690          ORA A  #DTBNTE     SET ERROR FLAG
043E I FE 0034 R    691 STB3     LDX    CHKIDS      RESTORE DEPLOYMENT TABLE INDEX
0441 I A7 00        692          STA A  0,X         UPDATE DEPLOYMENT TABLE ENTRY
0443 I 20 C8        693          BRA    STB2        CONTINUE
0445 I FE 001D R    694 STB1     LDX    CURCSP      PICK UP PNTR TO
0448 I EE 14        695          LDX    LCADPM,X    START OF DEPLOYMENT TABLE
044A I FF 0037 R    696          STX    XT01
044D I 86 06        697          LDA A  #DPTDT1     COMPUTE PNTR TO START OF MAP
NRMTST(A0011.02.018AA  CRS NORMAL TEST ROUTINE)        08/04/78  09:53:45  PAGE  13

044F I CE 0037 R    698          LDX    #XT01
0452 I BD 0041 R    699          JSR    IDXRTN
0455 I FE 0037 R    700          LDX    XT01
0458 I BD 0050 R    701          JSR    UDBTFP      UPDATE BAD TEST FLASH PATTERN
045B I 39           702          RTS                RETURN TO CALLER
045C I 04           703 SNTMSG   FCB    STNNDG
045D I 03           704          FCB    3,27
045E I 1B
045F I 0020    R    705          FDB    STNADR
0461 I 53494E       706          FCC    /SINGLE NORMAL TEST/
0473 I 0D           707          FCB    $D
0474 I 454E54       708          FCC    /ENTER TEST STATION/
0486 I 0D           709          FCB    $D
0487 I 535441       710          FCC    /STATION NUMBER/
0495 I 0D           711          FCB    $D,$E
0496 I 0E
0497 I 0028    R    712          FDB    NUMMSG
0499 I 0D           713          FCB    $D,$D,4
049A I 0D
049B I 04
049C I 4D554C       714 MNTGCP   FCC    /MULTIPLE NORMAL TEST PASSED/
04B7 I 0D           715          FCB    $D,$D,$D,$D,4
04B8 I 0D
04B9 I 0D
04BA I 0D
04BB I 04
04BC I 10           716 MNTBCP   FCB    $10,3,0
04BD I 03
04BE I 00
04BF I 444953       717          FCC    /DISPLAY DEPLOYMENT TO/
04D4 I 0D           718          FCB    $D
04D5 I 444554       719          FCC    /DETERMINE FAULTY STATIONS/
04EE I 0D           720          FCB    $D,4
04EF I 04
04F0 I 4D554C       721 MNTMBC   FCC    /MULTIPLE NORMAL TEST FAILED/
050B I 0D           722          FCB    $D,4
050C I 04
050D I 4E4F52       723 NTPMSG   FCC    /NORMAL TEST-IN-PROGRESS/
```

```
0524 I 0D          724          FCB    $D,$D,$D,$D,4
0525 I 0D
0526 I 0D
0527 I 0D
0528 I 04
0529 I 4D554C      725 MNTMSG   FCC    /MULTIPLE NORMAL TEST/
053D I 0D          726          FCB    $D,$D,$D,$D,$E
053E I 0D
053F I 0D
0540 I 0D
0541 I 0E
0542 I 0544   I    727          FDB    TSTDRC
0544 I 10          728 TSTDRC   FCB    $10,2,0
0545 I 02
0546 I 00
0547 I 544553      729          FCC    /TEST DATA RECORDING/
055A I 0D          730          FCB    $D,$D,$D,$D,4
055B I 0D
055C I 0D
055D I 0D
NRMTST(A0011.02.018AA  CRS NORMAL TEST ROUTINE)          08/04/78  09:53:46  PAGE  14

055E I 04
055F I 544553      731 TSTNDP   FCC    /TEST STATION NOT DEPLOYED/
0578 I 0D          732          FCB    $D,$D,$D,$D,4
0579 I 0D
057A I 0D
057B I 0D
057C I 04
057D I 464952      733 FSQNPG   FCC    /FIRE SEQUENCE NOT PROGRAMMED/
0599 I 0D          734          FCB    $D,4
059A I 04
059B I 415254      735 ARTUTC   FCC    /ARTIFICIAL RTU TEST COMPLETE/
05B7 I 0D          736          FCB    $D,$D,$D,$D,4
05B8 I 0D
05B9 I 0D
05BA I 0D
05BB I 04
                   737 *
0000 D             738          DSEC
                   739 *
                   740 *     STORAGE REQURIEMENTS
                   741 *
0000 D 00          742 NRMNTL   FCB    0           NOISE TEST LENGTH
                   743 *
0001               744          END
NRMTST(A0011.02.018AA  CRS NORMAL TEST ROUTINE)          08/04/78  09:53:46  PAGE  15

  NO ERRORS
 ISECT LENGTH --   1468
 DSECT LENGTH --      1

> ACKTMO     004C      60     60    505
> ADPICP     0047      58     58    324
  ARTUTC     059B I   735    351
> ASL4       0059      68     68    592
> ATVCMD     0035      41     41    654
  AXLADV     0080 A    79
  AXLCBP     0008 A    82
  AXLFIR     0040 A    76    201    208
  AXLFTS     0010 A    78    199    206
  AXLNTS     0002 A    80    241    356
  AXLOVR     0020 A    77    199    206
  AXLTBP     0001 A    81
> BNDEND     0031      38     38    643
> BNDSET     0049      59     59    622
> BNDSTR     0030      38     38    639
> CHKDEP     0046      58     58    298    680
> CHKIDS     0034      40     40    691
> CHMSET     0048      59     59    326
> CHNADR     001F      26     26    666    669
  CLKICR     036C I   584    432    439    447    472
> CMPPR1     002F      37     37    640    644
```

```
> CMPPR2   002E      37    37   638
> CMPRTN   0056      66    66   641   645
> CNVNTD   0053      64    64   539
> CURCSP   001D      26    26   179   184   215   225   243   278   300   308   318   331   371
                           398   412   423   455   465   473   495   586   615   633   683   694
  DATACK   0001 A   150   507
> DATMON   003A      45    45   513
> DEXRTN   0040      55    55   546
> DISPLY   0044      57    57   314   328   352   370   380   395   415   483
> DMNINI   003E      53    53   323
  DPTDT1   0006 A   168   697
  DTBNTE   0040 A   160   682   690
  DTBSKP   0080 A   159
  DWT3BT   0000 A   166   530
> EXECTV   0051      63    63   203   210   220   416
  FSQNPG   057D I   733   379
> IDXRTN   0041      55    55   277   427   550   589   699
  LCACHD   001D A   132   467
  LCACTD   001E A   133   446   468
  LCACTH   0020 A   135   438
  LCACTM   0022 A   137   430
  LCACTY   001B A   130   426   428   470
  LCACUD   001F A   134   469
  LCACUH   0021 A   136
  LCACUM   0023 A   138   428
  LCACUY   001C A   131   457
  LCADPM   0014 A   141   695
  LCAMDE   0010 A   123   195   312   378
  LCAST1   000C A    95   189   319   372   374   477   479   619
  LCAST2   000D A   101   230   247   250   287   289   358   360
  LCAST3   000E A   107   180   182   185   187   196   198   216   218   226   229   244   246
                          279   283   301   303   332   334   338   361   363   399   404   413
NWITST.A001: 02.018AA  CPS NORMAL TEST ROUTINE)        08/04/78  09:53:47  PAGE  16

                          474   496   616   684
  LCAST4   000F A   116   188   193   205
> LITEON   005A      69    69   200   209   242
> LITOFF   005B      69    69   202   207   357
> LOGFRM   005C      71    71   306   407   541
  LS2BTP   0002 A   104   248
  LS2NTP   0004 A   103   249   359
  LS2TIP   0008 A   102   232   249   288   359
  LS2TSP   0001 A   105   248
  LS3BLE   0040 A   109   245
  LS3BVT   0080 A   108   197   333   337   411
  LS3MNE   0004 A   113   245   403   475
  LS3MTT   0020 A   110   181   217   227   252   290   309   335   409
  LS3NDR   0002 A   114   186   245   282   362
  LS3NEF   0008 A   112   245   302   400   402   685
  LS3STF   0010 A   111   181   217   228   284   497   617
  LS4FRL   0010 A   117   204
  LS4OVL   0008 A   118   192
  LSTCBP   0008 A    98
  LSTMTP   0001 A    99   190   373   478
  LSTPRG   0020 A    96   375   620
  LSTTBP   0010 A    97   320
  MLT1     006D I   235   233
< MLTEST   0056 I   224     7
  MNTBCP   04BC I   716
  MNTGCP   049C I   714   480
  MNTMBC   04F0 I   721   482
  MNTMSG   0529 I   725   394
  MODFIR   0003 A   125
  MODFRA   0005 A   126   194
  MODPLY   0001 A   124   311   377
> MONSTS   0039      45    45   510   512
> MONWMU   003B      48    48   260
> MSGN1    0023      29    29   342   414
> MSGN1A   002D      35    35
> MSGN1B   002A      34    34   340
> MSGN1C   002B      34    34   344
> MSGN1D   002C      35    35
> MSGN2    0025      30    30   346
> MSGN3    0026      30    30   348
> MSGOUT   0043      57    57   295
> MSGRQT   0027      31    31   293
```

```
  MSGTBF    0020 A    88
  MSGTCV    0080 A    86
  MSGTIP    0040 A    87    294
  MSGTPS    0010 A    89
  MSGTRC    0004 A    91
  MSGTSV    0008 A    90
  MTS1      0037 I   204    191
  MTS2      000B I   184    236
< MTSFSQ    0000 I   178      7
> MVCDST    0033      38     38    424    425    587    588    590
> MVCHAR    0058      68     68    429
> MVCSTR    0032      38     38    422
> MX1000    0042      55     55    262    569
< NMCONT    01CA I   391      8    234    401    410
  NRM1      0096 I   259    253    257
  NRM2      00C2 I   275    272
NRMTST(A0011.02.018AA  CRS NORMAL TEST ROUTINE)          08/04/78  09:53:47  PAGE  17

  NRM3      019B I   368    286
  NRM4      00D8 I   284    281
  NRM4A     00DF I   287    285
  NRM5      00F4 I   296    291
  NRM6      00FE I   300    297
  NRM7      0122 I   316    299
  NRM8      0189 I   356    310    315    354    381
  NRM9      0136 I   324    317
  NRM9A     0169 I   344    341
  NRM9B     0173 I   348    345
  NRMA      0133 I   323    321
  NRMB      0206 I   420    393
> NRMCMC    000E      18     18
  NRMD      0181 I   353    336    484
  NRMD1     017E I   352    350
  NRMD2     0176 I   349    343    347
  NRME      01BA I   382    376
  NRMH      0276 I   473    434    441    454    464
  NRMI      024C I   452    450
> NRMINI    004B      59     59    382
  NRMJ      0260 I   462    460
  NRMK      028A I   482    476
  NRML      028D I   483    481
> NRMLST    004A      59     59    392
< NRMNTL    0000 D   742     10    259    280    316    353    385    491    501    542    562
< NRMTST    0071 I   240      8    183    219    231
  NTPMSG    050D I   723    327    369
> NUMMSG    0028      31     31    712
> PRGPTR    0036      42     42    668    671    675    687
> RCMENT    0011      18     18
> RCMPTR    0010      18     18
> RCMSET    000D      18     18
> RCMSTR    000F      18     18
> RCMTM3    0014      19     19    623    667
> RCTACK    0007      16     16    508
> RCTNS2    000B      16     16    564
> RCTNS4    000C      16     16    567
> RCTNT2    0009      16     16    556
> RCTNT4    000A      16     16    561
> RCTSST    0008      16     16    651
> RCVMRT    0054      65     65    504
> RECDTA    0055      65     65    547
> RECTM1    0018      22     22    265    266
> RECTMO    0017      22     22    261    267    268
  RLS1      0401 I   657    618    636    646
< RLSSTT    039A I   614      9    494
> RMSKP2    0016      20     20    517
> RMSKTB    0015      20     20    515
> RTSTAT    0057      66     66    270    558    650
> RTSTLN    0038      44     44    254
  RTUACK    0000 A   149    507
  RTUACT    00FF A   152    386
> RTUADR    001E      26     26    325    349    429    502    506    655
> RTUCC1    0029      33     33    339
> RTUCMD    004D      60     60    387    503    509    656
```

```
> RTUCME.   0013      19    19   627
> RTUCMT    0012      19    19
  RTUPNT    0020 A   151   384   500
NRMTST(A0011.02.018AA  CRS NORMAL TEST ROUTINE)        08/04/78  09:53:47  PAGE  18

  RTUSTS    0060 A   153   649
> SAVDT2    0022      27    27   629   647
  SCPRFS    0000 A   173
  SCPSDT    0002 A   172   511
> SELIDX    0045      58    58   296   679
< SGLTST    0048 I   214     7
  SNM1      029E I   494   490   492
  SNM2      03EC I   649   621   628
  SNM3      03E7 I   647   631   642
  SNM4      03AF I   624   648
  SNM5      02D6 I   515   498
  SNM6      02F4 I   526   514   523
  SNM7      02E2 I   519   525
  SNM8      0317 I   539   536
  SNM9      0305 I   532   538
  SNMA      0338 I   551   543
  SNMTST    0293 I   488   329   396
  SNTMSG    045C I   703   292
  STB1      0445 I   694   670
  STB2      040D I   669   677   693
  STB3      043E I   691   686   689
< STBTFP    0402 I   664     9   330   397
> STLCRQ    0052      63    63   520   533
> STLRRD    0004      13    13   532
> STLRSN    0005      13    13   519
> STLSW1    0006      14    14   521   534
> STNAD2    0021      27    27
> STNADR    0020      27    27   632   635   637   678   705
  STNNDG    0004 A   145   703
  STP1      0347 I   562   560
  STP2      0356 I   568   563   566
  STPNTT    0339 I   555   383   499
  STS2MS    0010 A   155   271   559   565
  STSIAV    0000 A   154   649
  SW1STO    0010 A   164   522   535
> SXMTB1    0001      12    12   516   527
> SXMTB3    0002      12    12   518   529
> SXMTB5    0003      12    12   531
> SXMTBF    0000      12    12
> SYSERR    0024      29    29   524   537
> TMONOF    004E      60    60
> TMRBT1    001C      24    24   570   571
> TMRBTV    001B      24    24   568   572   573   574   652
> TODTYR    003C      50    50   421
> TPRCMP    003F      53    53   355
  TSTDRC    0544 I   728   727
  TSTNDP    055F I   731   313
> TWTINI    003D      53    53   322
> UDBTFP    0050      61    61   701
> UPDFLN    004F      61    61
> XMTOTL    0019      23    23   264   274   276   545   549
> XMTTL1    001A      23    23   263   273
> XTO1      0037      43    43   696   698   700
SLWADV(A0011.02.019AA  CRS SPREAD ADVANCE ROUTINE)      08/04/78  09:55:47  PAGE   1

 0000 I              2           ISEC
                     3 *
                     4           DEF     SPRADV,SPTADV
                     5 *
                     6           REF     CURCSP
                     7           REF     RTSADV
                     8 *
                     9           REF     SDPCHK,LITOFF,LITEON
                    10           REF     USPRTN,EXECTV,MPRSAV
                    11           REF     DEXRTN,IDXRTN
                    12           REF     RCMSET
                    13 *
 0000 A             14 LCASPT    EQU     0              SHOT POINT STATION
```

```
0002 A         LCANRS    EQU    2         * STATIONS NOT RECORDING EACH SIDE OF S
0003 A         LCARSR    EQU    3         * RECORDING STATIONS TO 1ST RECORDING STA D
0004 A         LCABBR    EQU    4         TOTAL * STATIONS TO 1ST RECORDING STATION
0005 A         LCATRS    EQU    5         TOTAL * REOCRDING STATIONS
               *
000C A         LCAST1    EQU    12        LINE STATUS FLAGS (BYTE 1)
0001 A         LSTMTP    EQU    1         MULTIPLE NORMAL TEST PASSED
               *
000F A         LCAST4    EQU    15        LINE STATUS FLAGS (BYTE 4)
0002 A         LS4SPL    EQU    2         SHOT POINT ADVANCE LOCK OUT
0001 A         LS4SRL    EQU    1         SPREAD ADVANCE LOCK OUT
0010 A         LS4FRL    EQU    $10       FIRE LOCK OUT
               *
               *
               *      AUXILIARY KEYBOARD LITE EQUATES
               *
0080 A         AXLADV    EQU    $80       ADVANCE LITE
0040 A         AXLFIR    EQU    $40       FIRE LITE
0020 A         AXLOVR    EQU    $20       OVERRIDE LITE
0010 A         AXLFTS    EQU    $10       TEST
               *
0024 A         LCAFLG    EQU    36        SHOOTER CONTROL FLAGS
               *
0080 A         SCFADV    EQU    $80       SHOT POINT ADVANCE FLAG
               *
               *
               *
               *      SPRFAD ADVANCE ROUTINE COMMENT TERMINOLOGY
               *
               *      NCR => * CHANNELS TO 1ST RECORDING STATION (EXCLUDING NNR)
               *      NNR => * NON-RECORDING CHANNELS  (LCANRS)
               *      NCB => TOTAL * CHANNELS TO 1ST RECORDING STATION (LCABBR)
               *      NCF => * RECORDING STATIONS TO 1ST RECORDING STATION (LCARSR)
               *      TNC => TOTAL * RECORDING STATIONS (LCATRS)
               *      SPT => SHOT-POINT STATION NUMBER (LCASPT)
               *      AVS => ADVANCE SIGN
               *
               *      CENTRAL RECORDING STATION SHOT POINT ADVANCE RCUTINE
               *
0000 I         SPTADV    EQU    *
0000 I BD 00D9 I         JSR    PSPADV    ADVANCE SHOT POINT
0003 I 26 03             BNE    SPTE
0005 I 7E 0092 I         JMP    SPTX      EXIT IF ZERO ADVANCE
0008 I 7D 0000 D SPTE    TST    SPTAVS    POSITIVE ADVANCE
000B I 2B 06             BMI    SPTN      NO
SEQADV(A0011.02.019AA  CRS SPREAD ADVANCE ROUTINE)    08/04/78  09:55:48  PAGE   2

000D I 6D 03             TST    LCARSR,X  POSSIBLE TRANSITION
000F I 27 2E             BEQ    SPT5      NO
0011 I 20 04             BRA    SPTO
0013 I 6D 03     SPTN    TST    LCARSR,X  POSSIBLE TRANSITION
0015 I 26 28             BNE    SPT5      NO
0017 I A6 04     SPTO    LDA A  LCABBR,X  SHOT POINT WITHIN SPREAD
0019 I 26 02             BNE    SPT3      NO
001B I A6 03             LDA A  LCARSR,X
001D I B0 0001 D SPT3    SUB A  SPTAVL    TRANSITION PHASE
0020 I 2E 1D             BGT    SPT5      NO
               *
               *      NEGATIVE ADVANCE INTO SPREAD OR POSITIVE ADVANCE OUT OF SPREA
               *
0022 I 7D 0000 D         TST    SPTAVS    INCLUDE
0025 I 2A 01             BPL    SPTZ      ADVANCE
0027 I 40                NEG A            COEFFICIENT
0028 I 6F 03     SPTZ    CLR    LCARSR,X  NCF = 0
002A I 7D 0000 D         TST    SPTAVS    POSITIVE ADVANCE
002D I 2B 09             BMI    SPT7      NO
               *
               *      POSITIVE ADVANCE OUT OF SPREAD
               *
002F I 4D                TST A            COMPUTE TOTAL *
0030 I 2A 01             BPL    SPTY      CHANNELS TO
0032 I 40                NEG A            1ST RECORDING STATION
0033 I 4C        SPTY    INC A
```

```
0034 I A7 04        86           STA A  LCABBR,X
0036 I 20 57        87           BRA    SPT6         CHECK VALID SEQUENCE
                    88 *
                    89 *       NEGATIVE ADVANCE INTO SPREAD
                    90 *
0038 I 4C           91 SPT7      INC A               COMPUTE # RECORDING STATIONS
0039 I A7 03        92           STA A  LCARSR,X     TO 1ST RECORDING STATION
003B I 6F 04        93           CLR    LCABBR,X     CLEAR NCB
003D I 20 50        94           BRA    SPT6         CHECK IF VALID FIRE SEQUENCE
                    95 *
003F I 7D 0000 D    96 SPT5      TST    SPTAVS       NEGATIVE ADVANCE
0042 I 2E 26        97           BGT    SPT8         NO
0044 I A6 03        98           LDA A  LCARSR,X     PICK UP NCF
0046 I E6 04        99           LDA B  LCABBR,X     OLD SHOT POINT WITHIN SPREAD
0048 I 26 11       100           BNE    SPT9         NO
                   101 *
                   102 *       OLD SHOT POINT WITHIN SPREAD
                   103 *
004A I BB 0001 D   104 SPTF      ADD A  SPTAVL       COMPUTE # RECORDING STATIONS
004D I A7 03       105           STA A  LCARSR,X     TO 1ST RECORDING STATION (NCF)
004F I A1 05       106           CMP A  LCATRS,X     NCF > TNC
0051 I 2F 3C       107           BLE    SPT6         NO, CHECK VALID SEQUENCE
0053 I A7 04       108           STA A  LCABBR,X     NCB = NCF
0055 I A6 05       109           LDA A  LCATRS,X     SET NCF =
0057 I A7 03       110           STA A  LCARSR,X     TOTAL # RECORDING STATIONS
0059 I 20 34       111           BRA    SPT6         CHECK VALID SEQUENCE
                   112 *
005B I 4D          113 SPT9      TST A               SHOT POINT RIGHT OF SPREAD
005C I 27 07       114           BEQ    SPTA         YES
                   115 *
                   116 *       SHOT POINT LEFT OF SPREAD
                   117 *
_QADV(A0011.02.019AA  CRS SPREAD ADVANCE ROUTINE)       08/04/78  09:55:49  PAGE

005E I FB 0001 D   118           ADD B  SPTAVL       COMPUTE TOTAL #
0061 I E7 04       119 SPTW      STA B  LCABBR,X     CHANNELS TO 1ST
0063 I 20 2A       120           BRA    SPT6         RECORDING STATION
                   121 *
                   122 *       SHOT POINT RIGHT OF SPREAD
                   123 *
0065 I F0 0001 D   124 SPTA      SUB B  SPTAVL       COMPUTE TOTAL # CHANNELS
0068 I 20 F7       125           BRA    SPTW         TO 1ST RECORDING STATION
                   126 *
                   127 *       POSITIVE ADVANCE
                   128 *
006A I E6 04       129 SPT8      LDA B  LCABBR,X     PICK UP NCB
006C I A6 03       130           LDA A  LCARSR,X     SHOT POINT RIGHT OF SPREAD
006E I 26 07       131           BNE    SPTC         NO
                   132 *
                   133 *       SHOT POINT RIGHT OF SPREAD
                   134 *
0070 I FB 0001 D   135           ADD B  SPTAVL       COMPUTE TOTAL # CHANNELS TO
0073 I E7 04       136           STA B  LCABBR,X     1ST RECORDING STATION
0075 I 20 18       137           BRA    SPT6         CHECK IF VALID SEQUENCE
                   138 *
0077 I 5D          139 SPTC      TST B               SHOT POINT LEFT OF SPREAD
0078 I 27 10       140           BEQ    SPTD         NO
                   141 *
                   142 *       SHOT POINT LEFT OF SPREAD
                   143 *
007A I F0 0001 D   144           SUB B  SPTAVL       COMPUTE TOTAL # CHANNELS
007D I E7 04       145           STA B  LCABBR,X     TO 1ST RECORDING CHANNEL
007F I E0 05       146           SUB B  LCATRS,X     POSITIVE ADVANCE INTO SPREAD
0081 I 2E 0C       147           BGT    SPT6         NO, CHECK VALID SEQUENCE
0083 I 1B          148           ABA                 COMPUTE # RECORDING STNS TO 1ST RECORDING T
0084 I 6F 04       149           CLR    LCABBR,X     CLEAR NCB
0086 I A7 03       150 SPTV      STA A  LCARSR,X
0088 I 20 05       151           BRA    SPT6         CHECK VALID SEQUENCE
                   152 *
                   153 *       SHOT POINT WITHIN SPREAD
                   154 *
008A I B0 0001 D   155 SPTD      SUB A  SPTAVL       COMPUTE NCF
008D I 20 F7       156           BRA    SPTV
```

```
008F I BD 0002 R   157 SPT6      JSR    SDPCHK      CHECK IF ALL RTUS IN SPREAD DEPLOYED
0092 I BD 0114 I   158 SPTX      JSR    ADVRTN      SET RTUS IN SPREAD ACTIVE
0095 I 86 FD       159           LDA A  #-1-LS4SPL  LOAD SHOT POINT ADVANCE LOCK OUT MASK
0097 I 20 18       160           BRA    SPRC        COMPLETE ADVANCE SEQUENCE
                   161 *
                   162 *     CENTRAL RECORDING STATION SPREAD ADVANCE ROUTINE
                   163 *
0099 I             164 SPRADV    EQU    *
0099 I FE 0000 R   165           LDX    CURCSP
009C I A6 24       166           LDA A  LCAFLG,X
009E I 85 80       167           BIT A  #SCFADV     SPREAD ADVANCE ?
00A0 I 27 03       168           BEQ    SPR7A       YES
00A2 I 7E 0000 I   169           JMP    SPTADV      NO - ADVANCE SHOT POINT
00A5 I 8D 32       170 SPR7A     BSR    PSPADV      ADVANCE SHOT POINT
00A7 I 27 03       171           BEQ    SPR7        EXIT IF ZERO ADVANCE
00A9 I BD 0002 R   172           JSR    SDPCHK      CHECK IF ALL RTU'S IN SPREAD DEPLOYED
00AC I BD 0114 I   173 SPR7      JSR    ADVRTN      SET RTUS IN SPREAD ACTIVE
00AF I 86 FE       174           LDA A  #-1-LS4SRL  LOAD SPREAD ADVANCE LOCK OUT MASK
00B1 I FE 0000 R   175 SPRC      LDX    CURCSP      SET
S. ADV(A0011.02.019AA  CRS SPREAD ADVANCE ROUTINE)      08/04/78  09:55:50  PAGE   4

00B4 I A4 0F       176           AND A  LCAST4,X    ADVANCE LOCK OUT
00B6 I A7 0F       177           STA A  LCAST4,X
00B8 I 86 E0       178           LDA A  #AXLOVR+AXLADV+AXLFIR
00BA I BD 0003 R   179           JSR    LITOFF      ADVANCE LITES
00BD I 86 10       180           LDA A  #AXLFTS     TURN TEST LITE
00BF I BD 0004 R   181           JSR    LITEON
00C2 I BD 0005 R   182           JSR    USPRTN      UPDATE SHOOTER PATTERN
00C5 I B6 0001 R   183           LDA A  RTSADV
00C8 I 27 0C       184           BEQ    SPRD        JUMP IF ZERO ADVANCE
00CA I FE 0000 R   185           LDX    CURCSP
00CD I A6 0C       186           LDA A  LCAST1,X
00CF I 84 FE       187           AND A  #-1-LSTMTP  RESET MULTIPLE NORMAL TEST PASSED FLAG
00D1 I A7 0C       188           STA A  LCAST1,X
00D3 I BD 000A R   189           JSR    RCMSET      SETUP RECORDING MAP FOR NEW SPREAD
00D6 I 7E 0006 R   190 SPRD      JMP    EXECTV      INITIATE NEXT SEQUENCE
                   191 *
                   192 *     ROUTINE TO PROCESS SHOT POINT ADVANCE REQUESTS
                   193 *
00D9 I             194 PSPADV    EQU    *
00D9 I FE 0000 R   195           LDX    CURCSP      SAVE CURRENT LINE
00DC I BD 0007 R   196           JSR    MPRSAV      AND SHOOTER PARAMETERS
00DF I FE 0000 R   197           LDX    CURCSP      SET PNTR TO SHOT POINT
00E2 I B6 0001 R   198           LDA A  RTSADV      INPUT ADVANCE SWITCH SETTING
00E5 I 27 16       199           BEQ    RAS1        JUMP IF ADV=0
00E7 I 16          200           TAB                SAVE SETTING
00E8 I 84 F0       201           AND A  #$F0        POSITIVE ADVANCE ?
00EA I 27 09       202           BEQ    RAS2        NO
00EC I 16          203           TAB                COMPUTE POSITIVE
00ED I 86 04       204           LDA A  #4          ADVANCE INDEX
00EF I 58          205 RAS4      ASL B
00F0 I 25 0B       206           BCS    RAS1
00F2 I 4A          207           DEC A
00F3 I 20 FA       208           BRA    RAS4
00F5 I 86 FF       209 RAS2      LDA A  #-1         COMPUTE
00F7 I 54          210 RAS3      LSR B              NEGATIVE
00F8 I 25 03       211           BCS    RAS1        ADVANCE
00FA I 4A          212           DEC A
00FB I 20 FA       213           BRA    RAS3
00FD I 4D          214 RAS1      TST A              SET CONDITION CODE
00FE I 27 13       215           BEQ    PSP3        JUMP IF 0 ADVANCE
0100 I 16          216           TAB
0101 I B7 0000 D   217           STA A  SPTAVS      SET ADVANCE SIGN
0104 I 2E 07       218           BGT    PSP1        JUMP IF POSITIVE ADVANCE
0106 I 40          219           NEG A              SET ABSOLUTE VALUE OF ADVANCE
0107 I 16          220           TAB
0108 I BD 0008 R   221           JSR    DEXRTN      DECREMENT SHOT-POINT BY INDEX
010B I 20 03       222           BRA    PSP2
010D I BD 0009 R   223 PSP1      JSR    IDXRTN      ADVANCE SHOT-POINT
0110 I F7 0001 D   224 PSP2      STA B  SPTAVL      SET ABSOLUTE ADVANCE VALUE
0113 I 39          225 PSP3      RTS                RETURN TO CALLER
                   226 *
                   227 *     ROUTINE TO HANDLE SETTING OF RTU STATUS FOR ADVANCE FUNCTIONS
```

```
                 228 *
                 229 *
                 230           DEF    ADVRTN
                 231 *
                 232           REF    RTUADR,STNADR,STNSAV
                 233           REF    MPRSTG
S..QADV(A0011.02.019AA  CRS SPREAD ADVANCE ROUTINE)      08/04/78  09:55:51  PAGE   5

                 234           REF    BNDSTR,BNDEND
                 235           REF    ATVLLT,ATVHLT
                 236           REF    CMPPR1,CMPPR2
                 237 *
                 238           REF    BNDSET,CMPRTN,ATVRTN,DATVRT,ADPENT
                 239 *
0114 I           240 ADVRTN    EQU    *
0114 I FE 000E R 241           LDX    MPRSTG        COMPUTE SPREAD LIMITS FOR
0117 I BD 0015 R 242           JSR    BNDSET        OLD LINE AND SHOOTER PARAMETERS
011A I FE 000F R 243           LDX    BNDSTR        SAVE
011D I FF 0002 D 244           STX    ADVSTR        OLD
0120 I FE 0010 R 245           LDX    BNDEND        LIMITS
0123 I FF 0004 D 246           STX    ADVEND
0126 I FE 0000 R 247           LDX    CURCSP        COMPUTE SPREAD LIMITS
0129 I BD 0015 R 248           JSR    BNDSET        FOR NEW PARAMETERS
012C I FE 0002 D 249           LDX    ADVSTR        PICK UP OLD LOW LIMIT
012F I FF 0011 R 250           STX    ATVLLT        ANTICIPATE DEACTIVATION
0132 I CE 0002 D 251           LDX    #ADVSTR
0135 I FF 0014 R 252           STX    CMPPR2
0138 I CE 000F R 253           LDX    #BNDSTR
013B I FF 0013 R 254           STX    CMPPR1
013E I BD 0016 R 255           JSR    CMPRTN        DEACTIVATION REQUIRED
0141 I 25 31     256           BCS    ADV1          YES
0143 I 26 03     257           BNE    ADV3A
0145 I 7E 01D4 I 258           JMP    ADV2          CONTINUE IF LOWER LIMITS EQUAL
0148 I FE 000F R 259 ADV3A     LDX    BNDSTR        SET ACTIVATION
014B I FF 0011 R 260           STX    ATVLLT        LOWER LIMIT
014E I FE 0010 R 261           LDX    BNDEND
0151 I FF 0012 R 262           STX    ATVHLT        ANTICIPATE SEPARATE SPREADS
0154 I CE 0010 R 263           LDX    #BNDEND
0157 I FF 0014 R 264           STX    CMPPR2
015A I CE 0002 D 265           LDX    #ADVSTR
015D I FF 0013 R 266           STX    CMPPR1
0160 I BD 0016 R 267           JSR    CMPRTN        SEPARATE SPREADS ?
0163 I 25 07     268           BCS    ADV3          YES, CHECK FOR OVERLAP
0165 I FE 0002 D 269           LDX    ADVSTR        SET
0168 I 09        270           DEX                  ACTIVATION
0169 I FF 0012 R 271           STX    ATVHLT        HIGHER LIMIT
016C I CE 0002 D 272 ADV3      LDX    #ADVSTR       SAVE PNTR TO UPPER
016F I FF 000D R 273           STX    STNSAV        LIMIT FOR OVERLAP COMPARISON
0172 I 20 1E     274           BRA    ADV6
0174 I FE 0004 D 275 ADV1      LDX    ADVEND        ANTICIPATE
0177 I FF 0012 R 276           STX    ATVHLT        SEPARATE SPREADS
017A I CE 0004 D 277           LDX    #ADVEND
017D I FF 0014 R 278           STX    CMPPR2
0180 I BD 0016 R 279           JSR    CMPRTN        SEPARATE SPREADS ?
0183 I 25 07     280           BCS    ADV8          YES, CHECK OVERLAP
0185 I FE 000F R 281           LDX    BNDSTR        SET
0188 I 09        282           DEX                  DEACTIVATION
0189 I FF 0012 R 283           STX    ATVHLT        HIGHER LIMIT
018C I CE 000F R 284 ADV8      LDX    #BNDSTR       SET PNTR TO UPPER LIMIT
018F I FF 000D R 285           STX    STNSAV        FOR OVERLAP COMPARISON
0192 I EE 00     286 ADV6      LDX    0,X           PICK UP COMPARISON UPPER LIMIT STATION ADD
0194 I FF 000C R 287           STX    STNADR
0197 I BD 0019 R 288           JSR    ADPENT        SAVE ASSOCIATED
019A I B7 000B R 289           STA A  RTUADR        RTU ADDR
019D I FE 0011 R 290           LDX    ATVLLT        PICK UP RTU ADDR
01A0 I FF 000C R 291           STX    STNADR        ASSOCIATED WITH
S..QADV(A0011.02.019AA  CRS SPREAD ADVANCE ROUTINE)      08/04/78  09:55:52  PAGE   6

01A3 I BD 0019 R 292           JSR    ADPENT        ACTIVATION LOWER LIMIT
01A6 I B1 000B R 293           CMP A  RTUADR        SPREAD OVERLAP
01A9 I 27 29     294           BEQ    ADV2          YES, SKIP ACTIVATION-DEACTIVATION
01AB I FE 0012 R 295           LDX    ATVHLT        CHECK FOR SPREAD OVERLAP
01AE I FF 000C R 296 ADVA      STX    STNADR        ON UPPER END OF ACTIVATION LIMITS
01B1 I BD 0019 R 297           JSR    ADPENT        PICK UP ASSOCIATED RTU
01B4 I B1 000B R 298           CMP A  RTUADR        OVERLAP RESOLVED ?
01B7 I 26 09     299           BNE    ADV9          YES, ACTIVATE-DEACTIVATE RTU'S
```

```
01B9 I FE 000C R         LDX    STNADR     CHECK NEXT
01BC I 09                DEX               STATION IN
01BD I FF 0012 R         STX    ATVHLT     UPDATE UPPER LIMIT
01C0 I 20 EC             BRA    ADVA       ACTIVATION SPREAD
01C2 I CE 0002 D  ADV9   LDX    #ADVSTR
01C5 I BC 000D R         CPX    STNSAV     ACTIVATION SEQUENCE ?
01C8 I 26 05             BNE    ADVB       NO
01CA I CE 0017 R         LDX    #ATVRTN    SETUP ACTIVATION ROUTINE ADDR
01CD I 20 03             BRA    ADVC
01CF I CE 0018 R  ADVB   LDX    #DATVRT    SETUP DEACTIVATION ROUTINE ADDR
01D2 I AD 00      ADVC   JSR    0,X        PERFORM ACTIVATE-DEACTIVATE SEQUENCE
01D4 I FE 0004 D  ADV2   LDX    ADVEND     ANTICIPATE DEACTIVATION
01D7 I FF 0012 R         STX    ATVHLT     FROM SPREAD
01DA I CE 0004 D         LDX    #ADVEND
01DD I FF 0014 R         STX    CMPPR2
01E0 I CE 0010 R         LDX    #BNDEND
01E3 I FF 0013 R         STX    CMPPR1
01E6 I BD 0016 R         JSR    CMPRTN     DEACTIVATE ?
01E9 I 26 03             BNE    ADV2A
01EB I 7E 027F I         JMP    ADV4       JUMP IF HIGH LIMITS EQUAL
01EE I 25 23      ADV2A  BCS    ADV5       JUMP IF ACTIVATION REQUIRED
01F0 I FE 0002 D         LDX    ADVSTR     ANTICIPATE SEPARATE
01F3 I FF 0011 R         STX    ATVLLT     SPREADS
01F6 I CE 0002 D         LDX    #ADVSTR
01F9 I FF 0014 R         STX    CMPPR2
01FC I CE 0010 R         LDX    #BNDEND
01FF I FF 0013 R         STX    CMPPR1
0202 I BD 0016 R         JSR    CMPRTN     SEPARATE SPREADS ?
0205 I 22 07             BHI    ADVD       YES, CHECK FOR OVERLAP
0207 I FE 0010 R         LDX    BNDEND     SET
020A I 08                INX               DEACTIVATION
020B I FF 0011 R         STX    ATVLLT     LOWER LIMIT
020E I CE 0010 R  ADVD   LDX    #BNDEND    SAVE PNTR TO LOWER LIMIT FOR OVERLAP COMP-I
0211 I 20 27             BRA    ADVE       GO CHECK OVERLAP
0213 I FE 0010 R  ADV5   LDX    BNDEND     SET ACTIVATION
0216 I FF 0012 R         STX    ATVHLT     HIGH LIMIT
0219 I FE 000F R         LDX    BNDSTR     ANTICIPATE SEPARATE SPREADS
021C I FF 0011 R         STX    ATVLLT
021F I CE 000F R         LDX    #BNDSTR
0222 I FF 0014 R         STX    CMPPR2
0225 I CE 0004 D         LDX    #ADVEND
0228 I FF 0013 R         STX    CMPPR1
022B I BD 0016 R         JSR    CMPRTN     SEPARATE SPREADS ?
022E I 22 07             BHI    ADVF       YES, CHECK OVERLAP
0230 I FE 0004 D         LDX    ADVEND     SET
0233 I 08                INX               ACTIVATION
0234 I FF 0011 R         STX    ATVLLT     LOWER LIMIT
0237 I CE 0004 D  ADVF   LDX    #ADVEND
023A I FF 000D R  ADVE   STX    STNSAV     PICK UP
023D I EE 00             LDX    0,X        LOWER LIMIT
S..ADV(A0011.02.019AA  CRS SPREAD ADVANCE ROUTINE)   08/04/78  09:55:53  PAGE   7
023F I FF 000C R         STX    STNADR     STATION ADDR
0242 I BD 0019 R         JSR    ADPENT     SAVE ASSOCIATED
0245 I B7 000B R         STA A  RTUADR     RTU ADDRESS
0248 I FE 0012 R         LDX    ATVHLT     PICK UP ACTIVATION
024B I FF 000C R         STX    STNADR     UPPER LIMIT STATION ADDR
024E I BD 0019 R         JSR    ADPENT     FIND ASSOCIATED RTU ADDR
0251 I B1 000B R         CMP A  RTUADR     ACTIVATION REQUIRED
0254 I 27 29             BEQ    ADV4       NO, SAME RTU
0256 I FE 0011 R         LDX    ATVLLT     PICK UP ACTIVATION SPREAD
0259 I FF 000C R  ADVH   STX    STNADR     UPPER LIMIT STATION ADDR
025C I BD 0019 R         JSR    ADPENT     FIND ASSOCIATED RTU ADDR
025F I B1 000B R         CMP A  RTUADR     OVERLAP RESOLVED ?
0262 I 26 09             BNE    ADVG       YES, ACTIVATE-DEACTIVATE AS NECESSARY
0264 I FE 000C R         LDX    STNADR
0267 I 08                INX
0268 I FF 0011 R         STX    ATVLLT     UPDATE LOWER LIMIT
026B I 20 EC             BRA    ADVH
026D I CE 0010 R  ADVG   LDX    #BNDEND
0270 I BC 000D R         CPX    STNSAV     DEACTIVATION ?
0273 I 26 05             BNE    ADVI       NO
0275 I CE 0018 R         LDX    #DATVRT    SETUP DEACTIVATION ROUTINE ADDR
0278 I 20 03             BRA    ADVJ
027A I CE 0017 R  ADVI   LDX    #ATVRTN    SETUP ACTIVATION ROUTINE ADDR
027D I AD 00      ADVJ   JSR    0,X
```

```
027F I FE 000E R    374 ADV4      LDX     MPRSTG        PICK UP OLD SHOT
0282 I EE 00        375           LDX     0,X           POINT STATION
0284 I FF 000C R    376           STX     STNADR        ADDR
0287 I FF 0011 R    377           STX     ATVLLT
028A I FF 0012 R    378           STX     ATVHLT
028D I BD 0019 R    379           JSR     ADPENT        FIND ASSOCIATED RTU ADDR
0290 I B7 000B R    380           STA A   RTUADR
0293 I CE 000C R    381           LDX     #STNADR
0296 I FF 0014 R    382           STX     CMPPR2
0299 I CE 000F R    383           LDX     #BNDSTR
029C I FF 0013 R    384           STX     CMPPR1        OLD SHOT-POINT
029F I BD 0016 R    385           JSR     CMPRTN        LEFT OF SPREAD
02A2 I 24 05        386           BCC     ADV7          NO
02A4 I FE 000F R    387           LDX     BNDSTR        PICK UP 1ST STATION ADDR IN NEW SPREAD
02A7 I 20 0E        388           BRA     ADVK
02A9 I CE 0010 R    389 ADV7      LDX     #BNDEND
02AC I FF 0013 R    390           STX     CMPPR1        OLD SHOT PT RIGHT
02AF I BD 0016 R    391           JSR     CMPRTN        OF NEW SPREAD
02B2 I 23 11        392           BLS     ADVL          NO, DEACTIVATION NOT NECESSARY
02B4 I FE 0010 R    393           LDX     BNDEND
02B7 I FF 000C R    394 ADVK      STX     STNADR
02BA I BD 0019 R    395           JSR     ADPENT        PICK UP ASSOCIATED RTU ADDR
02BD I B1 000B R    396           CMP A   RTUADR        RTU OVERLAP ?
02C0 I 27 03        397           BEQ     ADVL          YES, SKIP DEACTIVATION
02C2 I BD 0018 R    398           JSR     DATVRT        DEACTIVATE OLD SHOT PT RTU
02C5 I FE 0000 R    399 ADVL      LDX     CURCSP        ACTIVATE
02C8 I EE 00        400           LDX     0,X           SHOT-POINT
02CA I FF 0011 R    401           STX     ATVLLT        RTU
02CD I FF 0012 R    402           STX     ATVHLT
02D0 I BD 0017 R    403           JSR     ATVRTN
02D3 I 39           404           RTS                   RETURN TO CALLER
0000 D              405           DSEC
                    406 *
                    407 *      STORAGE REQUIREMENTS FOR 'PSPADV'
SPADV(A0011.02.019AA  CRS SPREAD ADVANCE ROUTINE)      08/04/78  09:55:55  PAGE   8

                    408 *
0000 D 00           409 SPTAVS    FCB     0             ADVANCE SIGN INDICATOR
0001 D 00           410 SPTAVL    FCB     0             ABSOLUTE ADVANCE INDEX
                    411 *
                    412 *      STORAGE REQUIREMENTS FOR 'ADVRTN'
                    413 *
0002 D 0000    A    414 ADVSTR    FDB     0             OLD SPREAD LOWER LIMIT
0004 D 0000    A    415 ADVEND    FDB     0             OLD SPREAD HIGHER LIMIT
0006                416           END
  ADV(A0011.02.019AA  CRS SPREAD ADVANCE ROUTINE)      08/04/78  09:55:55  PAGE   9

   NO ERRORS
  ISECT LENGTH --    724
  DSECT LENGTH --      6

> ADPENT    0019     238    238    288    292    297    351    355    360    379    395
  ADV1      0174 I   275    256
  ADV2      01D4 I   311    258    294
  ADV2A     01EE I   320    318
  ADV3      016C I   272    268
  ADV3A     0148 I   259    257
  ADV4      027F I   374    319    357
  ADV5      0213 I   334    320
  ADV6      0192 I   286    274
  ADV7      02A9 I   389    386
  ADV8      018C I   284    280
  ADV9      01C2 I   304    299
  ADVA      01AE I   296    303
  ADVB      01CF I   309    306
  ADVC      01D2 I   310    308
  ADVD      020E I   332    328
  ADVE      023A I   348    333
  ADVEND    0004 D   415    246    275    277    311    313    340    344    347
  ADVF      0237 I   347    343
  ADVG      026D I   367    362
  ADVH      0259 I   359    366
  ADVI      027A I   372    369
```

```
  ADVJ     027D I   373    371
  ADVK     02B7 I   394    388
  ADVL     02C5 I   399    392    397
  ADVRTN   0114 I   240    158    173    230
  ADVSTR   0002 D   414    244    249    251    265    269    272    304    321    323
> ATVHLT   0012     235    235    262    271    276    283    295    302    312    335    353    378    402
> ATVLLT   0011     235    235    250    260    290    322    331    337    346    358    365    377    401
> ATVRTN   0017     238    238    307    372    403
  AXLADV   0080 A    31    178
  AXLFIR   0040 A    32    178
  AXLFTS   0010 A    34    180
  AXLOVR   0020 A    33    178
> BNDEND   0010     234    234    245    261    263    315    325    329    332    334    367    389    393
> BNDSET   0015     238    238    242    248
> BNDSTR   000F     234    234    243    253    259    281    284    336    338    383    387
> CMPPR1   0013     236    236    254    266    316    326    341    384    390
> CMPPR2   0014     236    236    252    264    278    314    324    339    382
> CMPRTN   0016     238    238    255    267    279    317    327    342    385    391
> CURCSF   0000       6      6    165    175    185    195    197    247    399
> DATVRT   0018     238    238    309    370    398
> DEXRTN   0008      11     11    221
> EXECTV   0006      10     10    190
> IDXRTN   0009      11     11    223
  LCABBR   0004 A    17     65     86     93     99    108    119    129    136    145    149
  LCAFLG   0024 A    36    166
  LCANRS   0002 A    15
  LCARSR   0003 A    16     60     63     67     76     92     98    105    110    130    150
  LCASPT   0000 A    14
  LCAST1   000C A    20    186    188
  LCAST4   000F A    23    176    177
  LCATRS   0005 A    18    106    109    146
S..JADV(A0011.02.019AA  CRS SPREAD ADVANCE ROUTINE)       08/04/78  09:55:55  PAGE  10

> LITEON   0004       9      9    181
> LITOFF   0003       9      9    179
  LS4FRL   0010 A    26
  LS4SPL   0002 A    24    159
  LS4SRL   0001 A    25    174
  LSTMTP   0001 A    21    187
> MPRSAV   0007      10     10    196
> MPRSTG   000E     233    233    241    374
  PSP1     010D I   223    218
  PSP2     0110 I   224    222
  PSP3     0113 I   225    215
  PSPADV   00D9 I   194     55    170
  RAS1     00FD I   214    199    206    211
  RAS2     00F5 I   209    202
  RAS3     00F7 I   210    213
  RAS4     00EF I   205    208
> RCMSET   000A      12     12    189
> RTSADV   0001       7      7    183    198
> RTUADR   000B     232    232    289    293    298    352    356    361    380    396
  SCFADV   0080 A    38    167
> SDPCHK   0002       9      9    157    172
  SPR7     00AC I   173    171
  SPR7A    00A5 I   170    168
< SPRADV   0099 I   164      4
  SPRC     00B1 I   175    160
  SPRD     00D6 I   190    184
  SPT3     001D I    68     66
  SPT5     003F I    96     61     64     69
  SPT6     008F I   157     87     94    107    111    120    137    147    151
  SPT7     0038 I    91     78
  SPT8     006A I   129     97
  SPT9     005B I   113    100
  SPTA     0065 I   124    114
< SPTADV   0000 I    54      4    169
  SPTAVL   0001 D   410     68    104    118    124    135    144    155    224
  SPTAVS   0000 D   409     58     73     77     96    217
  SPTC     0077 I   139    131
  SPTD     008A I   155    140
  SPTE     0008 I    58     56
  SPTF     004A I   104
```

```
  SPTN      0013 I    63     59
  SPTO      0017 I    65     62
  SPTV      0086 I   150    156
  SPTW      0061 I   119    125
  SPTX      0092 I   158     57
  SPTY      0033 I    85     83
  SPTZ      0028 I    76     74
> STNADR    000C     232    232   287   291   296   300   350   354   359   363   376   381   394
> STNSAV    000D     232    232   273   285   305   348   368
> USPRTN    0005      10     10   182
OVRIDE(A0011.02.020AA  CRS OVERRIDE ROUTINE)          08/04/78  10:09:28  PAGE   1

0000 I                 2           ISEC
                       3 *
                       4           DEF    OVRIDE
                       5 *
                       6           REF    CURCSP
                       7           REF    RDYFIR
                       8 *
                       9           REF    DISPLY,EXECTV,LITOFF,AFROVR
                      10           REF    LITEON
                      11 *
                      12 *
                      13 *      LINE STATUS FLAGS EQUATES
                      14 *
000C A                15 LCAST1    EQU    12            LINE STATUS FLAGS (BYTE 1)
000D A                16 LCAST2    EQU    13            LINE STATUS FLAGS (BYTE 2)
000E A                17 LCAST3    EQU    14            LINE STATUS FLAGS (BYTE 3)
000F A                18 LCAST4    EQU    15            LINE STATUS FLAGS (BYTE 4)
0001 A                19 LSTMTP    EQU    1             MULTIPLE NORMAL TEST PASSED
0010 A                20 LS4FRL    EQU    $10           FIRE LOCK OUT
0040 A                21 LS3BLE    EQU    $40           BLASTER ERROR
0010 A                22 LCAMDE    EQU    16            LINE MODE
                      23 *
                      24 *      AUXILIARY KEYBOARD LITE EQUATES
                      25 *
0040 A                26 AXLFIR    EQU    $40           FIRE LITE
0020 A                27 AXLOVR    EQU    $20           OVERRIDE LITE
0010 A                28 AXLFTS    EQU    $10           TEST LITE
                      29 *
                      30 *      LINE MODE EQUATES
                      31 *
0003 A                32 MODFIR    EQU    3             FIRE MODE
0004 A                33 MODTST    EQU    4             TEST MODE
                      34 *
                      35 *      CENTRAL RECORDING STATION OVERRIDE ROUTINE
                      36 *
0000 I                37 OVRIDE    EQU    *
0000 I FE 0000 R      38           LDX    CURCSP        LOAD LINE STATUS
0003 I A6 0E          39           LDA A  LCAST3,X      FLAGS
0005 I 85 40          40           BIT A  #LS3BLE       BLASTER ERROR
0007 I 27 09          41           BEQ    OVR1          NO
0009 I CE 003B I      42           LDX    #BLEMSG       DISPLAY ERROR
000C I BD 0002 R      43           JSR    DISPLY        MESSAGE
000F I 7E 0003 R      44           JMP    EXECTV        INITIATE NEXT SEQUENCE
0012 I 86 04          45 OVR1      LDA A  #MODTST
0014 I A7 10          46           STA A  LCAMDE,X
0016 I A6 0F          47           LDA A  LCAST4,X
0018 I 8A 10          48           ORA A  #LS4FRL       RESET FIRE LOCK OUT
001A I A7 0F          49           STA A  LCAST4,X
001C I 86 30          50           LDA A  #AXLFTS+AXLOVR
001E I BD 0004 R      51           JSR    LITOFF        ABORT LITE
0021 I 86 40          52           LDA A  #AXLFIR
0023 I BD 0006 R      53           JSR    LITEON
0026 I A6 0C          54           LDA A  LCAST1,X
0028 I 8A 01          55           ORA A  #LSTMTP       SET NORMAL TEST PASSED FLAG
002A I A7 0C          56           STA A  LCAST1,X
002C I CE 004A I      57           LDX    #AFEROV       NORMAL TEST ERROR OVERRIDE
002F I BD 0002 R      58           JSR    DISPLY
0032 I CE 0001 R      59           LDX    #RDYFIR       READY TO TEST OR FIRE
OVRIDE(A0011.02.020AA  CRS OVERRIDE ROUTINE)          08/04/78  10:09:29  PAGE   2

0035 I BD 0002 R      60           JSR    DISPLY
0038 I 7E 0003 R      61           JMP    EXECTV        INITIATE NEXT SEQUENCE
```

```
003B I 424C41         62 BLEMSG    FCC     /BLASTER ERROR/
0048 I 0D             63           FCB     $D,4
0049 I 04
                      64 *
004A I 455252         65 AFEROV    FCC     /ERROR CONDITION OVERRIDDEN/
0064 I 0D             66           FCB     $D,4
0065 I 04
0066                  67           END
OVRIDE(A0011 02.020AA  CRS OVERRIDE ROUTINE)            08/04/78  10:09:29  PAGE

   NO ERRORS
  ISECT LENGTH --   102
  DSECT LENGTH --     0

  AFEROV    004A I    65    57
> AFROVR    0005       9     9
  AXLFIR    0040 A    26    52
  AXLFTS    0010 A    28    50
  AXLOVR    0020 A    27    50
  BLEMSG    003B I    62    42
> CURCSP    0000       6     6    38
> DISPLY    0002       9     9    43    58    60
> EXECTV    0003       9     9    44    61
  LCAMDE    0010 A    22    46
  LCAST1    000C A    15    54    56
  LCAST2    000D A    16
  LCAST3    000E A    17    39
  LCAST4    000F A    18    47    49
> LITEON    0006      10    10    53
> LITOFF    0004       9     9    51
  LS3BLE    0040 A    21    40
  LS4FRL    0010 A    20    48
  LSTMTP    0001 A    19    55
  MODFIR    0003 A    32
  MODTST    0004 A    33    45
  OVR1      0012 I    45    41
  OVRIDE    0000 I    37     4
  RDYFIR    0001       7     7    59
AUTOFR(A0011.02.021AA  CRS AUTOFIRE ROUTINE)           08/04/78  13:08:36  PAGE   1

                       2 *
                       3 *       CENTRAL RECORDING STATION AUTO FIRE ROUTINE
                       4 *
0000 I                 5           ISEC
                       6 *
                       7           DEF     AUTOFR
                       8           DEF     AFROVR
                       9           DEF     AFRBLE
                      10 *
                      11           REF     TMRBTV,TMRBT1
                      12           REF     XMTOTL,XMTTL1
                      13           REF     RECTM0,RECTM1
                      14           REF     TSWRLT,TSWRLO,AUXDTB
                      15           REF     TODTYR
                      16           REF     CURCSP
                      17           REF     RTUADR,STNADR
                      18           REF     PIAKCR
                      19           REF     MONUMU
                      20           REF     RCTACK,RCTSEL,RCTBLT
                      21           REF     RCTPB2,RCTPB4
                      22           REF     STLBRK,SRCVBF
                      23           REF     TPMCNT
                      24           REF     MSGRQT
                      25           REF     CMPPR1,CMPPR2
                      26           REF     STLSW1
                      27 *
                      28           REF     SYSERR
                      29           REF     LITEON,LITOFF
                      30           REF     DISPLY,MSGOUT
                      31           REF     RECDTA
                      32           REF     RCVMRT
                      33           REF     NRMINI,NRMLST,ADPENT
                      34           REF     NRMTST
```

```
                         REF    CHMSET,PTBCNV
                         REF    RTSTAT,MX1000
                         REF    STLCRQ,RTUCMD
                         REF    EXECTV
                         REF    TPRCMP
                         REF    IDXRTN
                         REF    LOGFRM
                         REF    TCDSSP
                  *
                  *      KEYBOARD EQUATES
                  *
003E A            INTMSK EQU    $3E       LEADING EDGE TRANSITION (INTERRUPTS MASKED
003F A            INTENB EQU    $3F       LEADING EDGE TRANSITION (INTERRUPTS ENABLE)
                  *
                  *      RTU COMMAND EQUATES
                  *
00FF A            RTUACT EQU    $FF       RTU ADDRESS FOR ALL ACTIVE RTUS
0080 A            RTUSPT EQU    $80       SHOT POINT SELECT
0004 A            RTUPTB EQU    $4        PREPARE TO BLAST
00E0 A            RTUBLT EQU    $E0       BLAST COMMAND
0000 A            RTUACK EQU    0         ACKNOWLEDGE - INITIALIZE
0001 A            DATACK EQU    1         DATA ACKNOWLEDGE
0010 A            STS2MS EQU    $10       2 MSEC SAMPLE RATE
                  *
0010 A            SW15TO EQU    $10
A. .FR(A0011.02.021AA  CRS AUTOFIRE ROUTINE)        08/04/78  13:08:37  PAGE   2

                  *
                  *
                  *      CRS PANEL LITE EQUATES
                  *
0008 A            AXLCBP EQU    8         CAMERA BY-PASS LITE
0001 A            AXLTBP EQU    1         TAPE BY-PASS LITE
0002 A            AXLNTS EQU    2         NORMAL TEST-IN-PROGRESS LITE
0080 A            AXLADV EQU    $80       ADVANCE LITE
0040 A            AXLFIR EQU    $40       FIRE LITE
0020 A            AXLOVR EQU    $20       OVERRIDE LITE
0010 A            AXLFTS EQU    $10       AUTO FIRE MULTIPLE NORMAL TEST LITE
                  *      LINE MODE EQUATES
                  *
                  *
0010 A            LCAMDE EQU    16        LINE MODE
                  *
0001 A            MODPLY EQU    1         DEPLOY LINE
0002 A            MODPRG EQU    2         PROGRAM MODE
0003 A            MODFIR EQU    3         FIRE MODE
0004 A            MODTST EQU    4         TEST MODE
0005 A            MODFRA EQU    5         FIRE ABORT MODE
0006 A            MODADV EQU    6         ADVANCE MODE
                  *
0012 A            LCADTB EQU    18        TIME BREAK SAVE AREA
                  *
001B A            LCACTY EQU    27        TEST TEN YEARS
001C A            LCACUY EQU    28        TEST UNIT YEADRS
001D A            LCACHD EQU    29        TEST HUNDRED DAY
001E A            LCACTD EQU    30        TEST TEN DAY
001F A            LCACUD EQU    31        TEST UNIT DAY
0020 A            LCACTH EQU    32        TEST TEN HOURS
0021 A            LCACUH EQU    33        TEST UNIT HOURS
0022 A            LCACTM EQU    34        TEST TEN MINUTES
0023 A            LCACUM EQU    35        TEST UNIT MINUTES
                  *
                  *      MESSAGE REQUEST TYPE
                  *
0080 A            MSGTCV EQU    $80       CONVERT AND DISPLAY OLD VALUE
0040 A            MSGTIP EQU    $40       INPUT AND DISPLAY NEW VALUE
0020 A            MSGTBF EQU    $20       SET BLANK FLAG
0010 A            MSGTPS EQU    $10       CONVERSION PNTR ALREADY SET
0008 A            MSGTSV EQU    8         CONVERTED VALUE STORED READY FOR DISPLAY
0004 A            MSGTRC EQU    4         RETRY OR CONTINUE REQUEST
                  *
                  *      MAXIMUM TIME BREAK EQUATE
                  *
```

```
000E A          106 MAXTBV   EQU   14          MAXIMUM TIME BREAK VALUE
                107 *
                108 *      LINE STATUS EQUATES
                109 *
000C A          110 LCAST1   EQU   12          STATUS FLAGS (BYTE 1)
0001 A          111 LSTMTP   EQU   1           MULTIPLE NORMAL TEST PASSED
                112 *
000D A          113 LCAST2   EQU   13          LINE STATUS FLAGS (BYTE 2)
0008 A          114 LS2TIP   EQU   8           MULTIPLE NORMAL TEST-IN-PROGRESS
0004 A          115 LS2NTP   EQU   4           NORMAL TEST-IN-PROGRESS
0002 A          116 LS2BTP   EQU   2           BLAST TEST-IN-PROGRESS
0001 A          117 LS2TSP   EQU   1           TILT SEARCH-IN-PROGRESS
AL.JFR(A0011.02.021AA  CRS AUTOFIRE ROUTINE)    08/04/78  13:08:38  PAGE   3

                118 *
000E A          119 LCAST3   EQU   14          LINE STATUS FLAGS (BYTE 3)
0040 A          120 LS3BLE   EQU   $40         BLASTER ERROR
0020 A          121 LS3MTT   EQU   $20         MANUAL TEST FLAG
0010 A          122 LS3STF   EQU   $10         SINGLE TEST FLAG
0002 A          123 LS3NDR   EQU   2           NOISE DATA RECORDING
                124 *
000F A          125 LCAST4   EQU   15          LINE STATUS FLAGS (BYTE 4)
0080 A          126 LS4TIH   EQU   $80         TRACE ID HEADER FLAG
0010 A          127 LS4FRL   EQU   $10         FIRE LOCK OUT
0008 A          128 LS4OVL   EQU   8           OVERRIDE LOCK OUT
0004 A          129 LS4TSL   EQU   4           TEST LOCK OUT
0002 A          130 LS4SPL   EQU   2           SHOT POINT ADVANCE LOCK OUT
0001 A          131 LS4SRL   EQU   1           SPREAD ADVANCE LOCK OUT
                132 *
                133 *
                134 *
0000 I          135 AUTOFR   EQU   *
0000 I FE 000A R 136         LDX   CURCSP
0003 I A6 0C    137          LDA A LCAST1,X
0005 I 85 01    138          BIT A #LSTMTP     MULTIPLE NORMAL TEST PASSED
0007 I 27 05    139          BEQ   AFRD        NO, ABORT SEQUENCE
0009 I          140 AFROVR   EQU   *
0009 I BD 02C3 I 141         JSR   NTTCPR      NORMAL TEST COMPLETED WITHIN LAST 10 MINS
000C I 2C 22    142          BGE   AFR1        YES, CONTINUE WITH AUTOFIRE SEQUENCE
000E I 86 60    143 AFRD     LDA A #AXLFIR+AXLOVRTURN OFF FIRE AND
0010 I BD 001D R 144         JSR   LITOFF      OVERRIDE LITES
0013 I 86 10    145          LDA A #AXLFTS     TURN ON
0015 I BD 001C R 146         JSR   LITEON      TEST LITE
0018 I CE 01DB I 147         LDX   #AFRNTT
001B I BD 001E R 148 AFR6    JSR   DISPLY      INFORM OPERATOR OF ERROR
001E I FE 000A R 149 AFR6B   LDX   CURCSP
0021 I A6 0F    150          LDA A LCAST4,X
0023 I 84 EF    151          AND A #-1-LS4FRL  SET FIRE LOCK OUT
0025 I 8A 0D    152          ORA A #LS4TSL+LS4SRL+LS4OVL
0027 I A7 0F    153          STA A LCAST4,X
0029 I 86 05    154          LDA A #MODFRA
002B I A7 10    155          STA A LCAMDE,X    SET FIRE ABORT MODE
002D I 7E 002C R 156         JMP   EXECTV      INITIATE NEXT SEQUENCE
0030 I 86 FF    157 AFR1     LDA A #$FF
0032 I B7 0008 R 158         STA A AUXDTB      BLANK OUT TIME BREAK DISPLAY
0035 I CE 01CD I 159 AFR4    LDX   #AFRMSG
0038 I BD 001E R 160         JSR   DISPLY
003B I B6 0006 R 161         LDA A TSURLT      CHECK IF INVALID RECORD
003E I 26 09    162          BNE   AFR2        LENGTH SELECTED
0040 I B6 0007 R 163         LDA A TSWRLO
0043 I 27 04    164          BEQ   AFR2
0045 I 81 06    165          CMP A #6
0047 I 23 0D    166          BLS   AFR3
0049 I CE 01F0 I 167 AFR2    LDX   #AFRIRL     INFORM OPERATOR OF
004C I FF 0017 R 168         STX   MSGRQT      INVALID RECORD LENGTH
004F I C6 04    169          LDA B #MSGTRC
0051 I BD 001F R 170         JSR   MSGOUT      WAIT FOR OPERATOR INTERVENTION
0054 I 20 DF    171          BRA   AFR4        EXAMINE RECORD LENGTH
0056 I B7 0000 D 172 AFR3    STA A NRMNTL      SAVE RECORD LENGTH
0059 I CE 020C I 173         LDX   #AFRBTA
005C I BD 001E R 174         JSR   DISPLY      BLASTER TEST ACTIVE
005F I 86 30    175          LDA A #AXLFTS+AXLOVR
```

```
0061 I BD 001D R   176            JSR    LITOFF
0064 I A6 0F       177            LDA A  LCAST4,X
0066 I 8A 01       178            ORA A  #LS4SRL       RESET ADVANCE LOCK OUTS
0068 I 84 EF       179            AND A  #-1-LS4FRL    SET FIRE LOCKOUT
006A I A7 0F       180            STA A  LCAST4,X
006C I A6 0E       181            LDA A  LCAST3,X
006E I 84 DF       182            AND A  #-1-LS3MTT    RESET MANUAL TEST FLAG
0070 I 8A 10       183            ORA A  #LS3STF       SET SINGLE TEST FLAG
0072 I A7 0E       184            STA A  LCAST3,X
0074 I EE 00       185            LDX    0,X
0076 I FF 000C R   186            STX    STNADR
0079 I BD 0025 R   187            JSR    NRMTST        PERFORM NORMAL TEST ON BLASTER RTU
007C I FE 000A R   188            LDX    CURCSP
007F I A6 0E       189            LDA A  LCAST3,X
0081 I 85 40       190            BIT A  #LS3BLE       BLASTER ERROR ?
0083 I 27 0F       191            BEQ    AFR5          NO, ISSUE BLAST COMMAND
0085 I 86 40       192            LDA A  #AXLFIR
0087 I BD 001D R   193            JSR    LITOFF        TURN OFF FIRE LITE
008A I 86 30       194            LDA A  #AXLOVR+AXLFTSTURN ON OVERRIDE AND
008C I BD 001C R   195            JSR    LITEON        TEST LITES
008F I CE 022F I   196            LDX    #AFRBLE
0092 I 20 87       197            BRA    AFR6          INFORM OPERATOR OF ERROR
0094 I CE 023E I   198 AFR5       LDX    #AFRBTP       BLASTER TEST PASSED
0097 I BD 001E R   199            JSR    DISPLY        BLAST RECORDING
009A I BD 0022 R   200            JSR    NRMINI        SET UP RECORDING MAP AND PREPARE FOR OUTPU
009D I 86 FF       201 AFR5B      LDA A  #RTUACT
009F I C6 30       202            LDA B  #RTUSPT
00A1 I CE 0010 R   203            LDX    #RCTSEL
00A4 I BD 002B R   204            JSR    RTUCMD        CLEAR SHOT POINT FROM ALL ACTIVE RTUS
00A7 I FE 000A R   205            LDX    CURCSP
00AA I EE 00       206            LDX    0,X
00AC I FF 000C R   207            STX    STNADR        SAVE SHOT POINT STATION ADDR
00AF I BD 0024 R   208            JSR    ADPENT        PICK UP ASSOCIATED RTU AND CHANNEL ADDRESS
00B2 I B7 000B R   209            STA A  RTUADR        SAVE RTU ADDR
00B5 I CA 80       210            ORA B  #RTUSPT
00B7 I CE 0010 R   211            LDX    #RCTSEL
00BA I BD 002B R   212            JSR    RTUCMD        SELECT SHOT POINT
00BD I 4F          213            CLR A
00BE I BD 0028 R   214            JSR    RTSTAT        PICK UP CURRENT SAMPLE RATE
00C1 I CE 0012 R   215            LDX    #RCTPB2       ANTICIPATE 2 MSEC SAMPLE RATE
00C4 I 85 10       216            BIT A  #STS2MS       2 MSEC SAMPLE RATE
00C6 I 26 03       217            BNE    AFR5A         YES
00C8 I CE 0013 R   218            LDX    #RCTPB4       SET TIMEOUT VALUE FOR 4 MSEC RATE
00CB I 86 FF       219 AFR5A      LDA A  #RTUACT
00CD I C6 04       220            LDA B  #RTUPTB
00CF I BD 002B R   221            JSR    RTUCMD        GET READY TO BLAST
00D2 I F6 0000 D   222            LDA B  NRMNTL        PICK UP RECORD LENGTH IN SECONDS
00D5 I CE 0011 R   223            LDX    #RCTBLT
00D8 I FF 0000 R   224            STX    TMRBTV
00DB I BD 0029 R   225            JSR    MX1000
00DE I F7 0003 R   226            STA B  XMTTL1        SAVE # WORDS
00E1 I B7 0002 R   227            STA A  XMTOTL        TO OUTPUT
00E4 I FB 0001 R   228            ADD B  TMRBT1
00E7 I F7 0001 R   229            STA B  TMRBT1
00EA I BB 0000 R   230            ADD A  TMRBTV        INCLUDE RECORD LENGTH IN
00ED I B7 0000 R   231            STA A  TMRBTV        BLAST COMMAND TIMEOUT VALUE
00F0 I 86 FF       232            LDA A  #RTUACT
00F2 I F6 0000 D   233            LDA B  NRMNTL
```

```
00F5 I CA E0       234            ORA B  #RTUBLT
00F7 I FE 0000 R   235            LDX    TMRBTV
00FA I BD 002B R   236            JSR    RTUCMD        OUTPUT BLAST COMMAND
00FD I CE 000E R   237            LDX    #MONWMU
0100 I FF 0004 R   238            STX    RECTM0
0103 I F6 0000 D   239            LDA B  NRMNTL
0106 I BD 0029 R   240            JSR    MX1000
0109 I FB 0005 R   241            ADD B  RECTM1
010C I F7 0005 R   242            STA B  RECTM1
010F I B9 0004 R   243            ADC A  RECTM0        COMPUTE MONITOR OUTPUT
0112 I B7 0004 R   244            STA A  RECTM0        TIME VALUE
0115 I 4F          245            CLR A
```

```
0116 I BD 0028 R   246          JSR    RTSTAT
0119 I 85 10       247          BIT A  #STS2MS      2 MSEC SAMPLE RATE
011B I 27 06       248          BEQ    AFR7         NO
011D I 78 0003 R   249          ASL    XMTTL1       ADJUST TOTOL # WORDS
0120 I 79 0002 R   250          ROL    XMTOTL       TO OUTPUT
0123 I FE 000A R   251 AFR7     LDX    CURCSP
0126 I A6 0D       252          LDA A  LCAST2,X     RESET TEST-IN-PROGRESS FLAGS
0128 I 84 F0       253          AND A  #-1-LS2TIP-LS2NTP-LS2BTP-LS2TSP
012A I A7 0D       254          STA A  LCAST2,X
012C I A6 0E       255          LDA A  LCAST3,X
012E I 84 FD       256          AND A  #-1-LS3NDF
0130 I A7 0E       257          STA A  LCAST3,X     RESET NOISE DATA RECORDING
0132 I BD 0021 R   258 AFRA     JSR    RCVMRT       INPUT RTU DATA TO COMPUTE TIME BREAK
0135 I CE 0014 R   259          LDX    #STLBRK
0138 I BD 002A R   260          JSR    STLCRQ       ASK FOR TIME BREAK
013B I B6 001A R   261          LDA A  STLSW1
013E I 85 10       262          BIT A  #SW1STO
0140 I 27 05       263          BEQ    AFRA1
0142 I BD 001B R   264          JSR    SYSERR
0145 I 27 EB       265          BEQ    AFRA
0147 I 4F          266 AFRA1    CLR A
0148 I BD 0028 R   267          JSR    RTSTAT
014B I 85 10       268          BIT A  #STS2MS      2 MSEC SAMPLE RATE
014D I 27 03       269          BEQ    AFR8         NO
014F I 77 0015 R   270          ASR    SRCVBF
0152 I F6 0015 R   271 AFR8     LDA B  SRCVBF
0155 I BD 0027 R   272          JSR    PTBCNV       CONVERT TIME BREAK VALUE FOR DISPLAY
0158 I FE 000A R   273          LDX    CURCSP
015B I B7 0008 R   274          STA A  AUXDTB       SAVE TIME
015E I A7 12       275          STA A  LCADTB,X     BREAK VALUE
0160 I B6 0015 R   276          LDA A  SRCVBF
0163 I 81 0E       277          CMP A  #MAXTBV      MAXIMUM TIME BREAK EXCEEDED ?
0165 I 25 36       278          BCS    AFR9         NO, INPUT BLAST DATA
                   279 ***
0167 I CE 4534 A   280          LDX    #$4534
016A I BD 002F R   281          JSR    LOGFRM
                   282 ***
016D I CE 028D I   283          LDX    #AFRMTX
0170 I FF 0017 R   284          STX    MSGRQT
0173 I C6 04       285          LDA B  #MSGTRC
0175 I BD 001F R   286          JSR    MSGOUT       INFORM OPERATOR OF BLASTER ERROR
0178 I 26 23       287          BNE    AFR9         JUMP IF CONTINUE
017A I BD 0030 R   288          JSR    TCDSSP       SET STANDBY POWER
017D I FE 000A R   289          LDX    CURCSP
0180 I A6 0F       290          LDA A  LCAST4,X
0182 I 84 7F       291          AND A  #-1-LS4TIH   RESET TRACE ID HEADER FLAG
  OFR(A0011.02.021AA  CRS AUTOFIRE ROUTINE)             08/04/78  13:08:41  PAGE   6

0184 I A7 0F       292          STA A  LCAST4,X
0186 I 86 40       293          LDA A  #AXLFIR
0188 I BD 001D R   294          JSR    LITOFF
018B I 86 30       295          LDA A  #AXLOVR+AXLFTS
018D I BD 001C R   296          JSR    LITEON
0190 I CE 000F R   297          LDX    #RCTACK
0193 I 86 FF       298          LDA A  #RTUACT
0195 I C6 01       299          LDA B  #RTUACK+DATACK
0197 I BD 002B R   300          JSR    RTUCMD       TURN OFF ALL RTUS
019A I 7E 001E I   301          JMP    AFR6B
019D I CE 026E I   302 AFR9     LDX    #AFRBCP
01A0 I BD 001E R   303          JSR    DISPLY       BLAST COMPLETE DATA RECORDING
01A3 I 86 3E       304          LDA A  #INTMSK
01A5 I B7 000D R   305          STA A  PIAKCR       MASK KEYBOARD INTERRUTS
01A8 I BD 0023 R   306 AFRC     JSR    NRMLST       INPUT DATA FROM LAST RTU
01AB I 2B 05       307          BMI    AFRB         JUMP IF LAST RTU ALREADY PROCESSED
01AD I BD 0020 R   308          JSR    RECDTA       RECORD DATA
01B0 I 20 F6       309          BRA    AFRC         PROCESS NEXT RTU
01B2 I BD 002D R   310 AFRB     JSR    TPRCMP       COMPLETE OUTPUT REQUEST
01B5 I 86 40       311          LDA A  #AXLFIR
01B7 I BD 001D R   312          JSR    LITOFF       TURN OFF FIRE LITE
01BA I 86 80       313          LDA A  #AXLADV
01BC I BD 001C R   314          JSR    LITEON       TURN ON ADVANCE LITE
01BF I 86 3F       315          LDA A  #INTENB
01C1 I B7 000D R   316          STA A  PIAKCR       ENABLE KEYBOARD INTERRUPTS
```

```
01C4 I CE 02AC I   317             LDX    #AFRCMP
01C7 I BD 001E R   318             JSR    DISPLY
01CA I 7E 002C R   319             JMP    EXECTV       INITIATE NEXT SEQUENCE
                   320 *
                   321 *     AUTO FIRE MESSAGES
                   322 *
01CD I 415554      323 AFRMSG     FCC    /AUTO FIRE/
01D6 I 0D          324             FCB    $D,$D,$D,$D,4
01D7 I 0D
01D8 I 0D
01D9 I 0D
01DA I 04
01DB I 4E4F52      325 AFRNTT     FCC    /NORMAL TEST TIMEOUT/
01EE I 0D          326             FCB    $D,$4
01EF I 04
01F0 I 10          327 AFRIRL     FCB    $10,2,0
01F1 I 02
01F2 I 00
01F3 I 494E56      328             FCC    /INVALID RECORD LENGTH/
0208 I 0D          329             FCB    $D,$E
0209 I 0E
020A I 0016    R   330             FDB    TPMCNT
020C I 10          331 AFRBTA     FCB    $10,2,0
020D I 02
020E I 00
020F I 424C41      332             FCC    /BLASTER LOCATION TEST ACTIVE/
022B I 0D          333             FCB    $D,$D,$D,4
022C I 0D
022D I 0D
022E I 04
022F I 424C41      334 AFRBLE     FCC    /BLASTER ERROR/
023C I 0D          335             FCB    $D,4
023D I 04
```

AU.JFR(A0011.02.021AA CRS AUTOFIRE ROUTINE) 08/04/78 13:08:42 PAGE 7

```
023E I 424C41      336 AFRBTP     FCC    /BLASTER LOCATION TEST PASSED/
025A I 0D          337             FCB    $D
025B I 424C41      338             FCC    /BLAST RECORDING/
026A I 0D          339             FCB    $D,$D,$D,4
026B I 0D
026C I 0D
026D I 04
026E I 424C41      340 AFRBCP     FCC    /BLAST COMPLETE/
027C I 0D          341             FCB    $D
027D I 444154      342             FCC    /DATA RECORDING/
028B I 0D          343             FCB    $D,4
028C I 04
028D I 4D4158      344 AFRMTX     FCC    /MAXIMUM TIME BREAK EXCEEDED/
02A8 I 0D          345             FCB    $D,$E
02A9 I 0E
02AA I 0016    R   346             FDB    TPMCNT
02AC I 415554      347 AFRCMP     FCC    /AUTO FIRE COMPLETE/
02BE I 0D          348             FCB    $D,$D,$D,$D,4
02BF I 0D
02C0 I 0D
02C1 I 0D
02C2 I 04
                   349 *
                   350 *     ROUTINE TO CHECK FOR NORMAL TEST TIMEOUT
                   351 *
02C3 I             352 NTTCPR     EQU    *
02C3 I FE 000A R   353             LDX    CURCSP
02C6 I FF 0019 R   354             STX    CMPPR2
02C9 I CE 0019 R   355             LDX    #CMPPR2
02CC I 86 1B       356             LDA A  #LCACTY      COMPUTE PNTR TO CURRENT NORMAL
02CE I BD 002E R   357             JSR    IDXRTN       TEST TIMEOUT VALUE
02D1 I CE 0009 R   358             LDX    #TODTYR
02D4 I FF 0018 R   359             STX    CMPPR1       SET PNTR TO CURRENT TIME
02D7 I C6 09       360             LDA B  #LCACUM-LCACTY+1
02D9 I FE 0019 R   361 NTT2       LDX    CMPPR2       PICK UP NEXT
02DC I A6 00       362             LDA A  0,X          ELEMENT FROM LIST
02DE I 08          363             INX
02DF I FF 0019 R   364             STX    CMPPR2       UPDATE LIST PNTR
```

```
02E2 I FE 0018 R   365          LDX    CMPPR1      SET PNTR TO ELEMENT TO BE COMPARED AGAINST
02E5 I A1 00       366          CMP A  0,X         SET COMPARISON CODE
02E7 I 26 07       367          BNE    NTT1        JUMP IF NOT EQUAL
02E9 I 08          368          INX
02EA I FF 0018 R   369          STX    CMPPR1      UPDATE PNTR
02ED I 5A          370          DEC B              COMPARISON COMPLETE
02EE I 26 E9       371          BNE    NTT2        NO, CONTINUE
02F0 I 39          372 NTT1     RTS                RETURN TO CALLER
                   373 *
                   374 *
0000 D             375          DSEC
                   376 *
0000 D 00          377 NRMNTL   FCB    0           RECORD LENGTH
                   378 *
0001               379          END
```

```
 OFR(A0011.02.021AA  CRS AUTOFIRE ROUTINE)          08/04/78  13:08:43  PAGE   8

   NO ERRORS
  ISECT LENGTH --    753
  DSECT LENGTH --      1

> ADPENT    0024     33    33   208
  AFR1      0030 I  157   142
  AFR2      0049 I  167   162   164
  AFR3      0056 I  172   166
  AFR4      0035 I  159   171
  AFR5      0094 I  198   191
  AFR5A     00CB I  219   217
  AFR5B     009D I  201
  AFR6      001B I  148   197
  AFR6B     001E I  149   301
  AFR7      0123 I  251   248
  AFR8      0152 I  271   269
  AFR9      019D I  302   278   287
  AFRA      0132 I  258   265
  AFRA1     0147 I  266   263
  AFRB      01B2 I  310   307
  AFRBCP    026E I  340   302
< AFRBLE    022F I  334     9   196
  AFRBTA    020C I  331   173
  AFRBTP    023E I  336   198
  AFRC      01A8 I  306   309
  AFRCMP    02AC I  347   317
  AFRD      000E I  143   139
  AFRIRL    01F0 I  327   167
  AFRMSG    01CD I  323   159
  AFRMTX    028D I  344   283
  AFRNTT    01DB I  325   147
< AFROVR    0009 I  140     8
< AUTOFR    0000 I  135     7
> AUXDTB    0008     14    14   158   274
  AXLADV    0080 A   67   313
  AXLCBP    0008 A   64
  AXLFIR    0040 A   68   143   192.  293   311
  AXLFTS    0010 A   70   145   175   194   295
  AXLNTS    0002 A   66
  AXLOVR    0020 A   69   143   175   194   295
  AXLTBP    0001 A   65
> CHMSET    0026     35    35
> CMPPR1    0018     25    25   359   365   369
> CMPPR2    0019     25    25   354   355   361   364
> CURCSP    000A     16    16   136   149   188   205   251   273   289   353
  DATACK    0001 A   56   299
> DISPLY    001E     30    30   148   160   174   199   303   318
> EXECTV    002C     38    38   156   319
> IDXRTN    002E     40    40   357
  INTENB    003F A   47   315
  INTMSK    003E A   46   304
  LCACHD    001D A   87
  LCACTD    001E A   88
  LCACTH    0020 A   90
  LCACTM    0022 A   92
  LCACTY    001B A   85   356   360
  LCACUD    001F A   89
```

```
AU.OFR(A0011.02.021AA  CRS AUTOFIRE ROUTINE)          08/04/78  13:08:44  PAGE   9

   LCACUH    0021 A    91
   LCACUM    0023 A    93    360
   LCACUY    001C A    86
   LCADTB    0012 A    83    275
   LCAMDE    0010 A    74    155
   LCAST1    000C A   110    137
   LCAST2    000D A   113    252    254
   LCAST3    000E A   119    181    184    189    255    257
   LCAST4    000F A   125    150    153    177    180    290    292
 > LITEON    001C      29     29    146    195    296    314
 > LITOFF    001D      29     29    144    176    193    294    312
 > LOGFRM    002F      41     41    281
   LS2BTP    0002 A   116    253
   LS2NTP    0004 A   115    253
   LS2TIP    0008 A   114    253
   LS2TSP    0001 A   117    253
   LS3BLE    0040 A   120    190
   LS3MTT    0020 A   121    182
   LS3NDR    0002 A   123    256
   LS3STF    0010 A   122    183
   LS4FRL    0010 A   127    151    179
   LS4OVL    0008 A   128    152
   LS4SPL    0002 A   130
   LS4SRL    0001 A   131    152    178
   LS4TIH    0080 A   126    291
   LS4TSL    0004 A   129    152
   LSTMTP    0001 A   111    138
   MAXTBV    000E A   106    277
   MODADV    0006 A    81
   MODFIR    0003 A    78
   MODFRA    0005 A    80    154
   MODPLY    0001 A    76
   MODPRG    0002 A    77
   MODTST    0004 A    79
 > MONWMU    000E      19     19    237
 > MSGOUT    001F      30     30    170    286
 > MSGRQT    0017      24     24    168    284
   MSGTBF    0020 A    99
   MSGTCV    0080 A    97
   MSGTIP    0040 A    98
   MSGTPS    0010 A   100
   MSGTRC    0004 A   102    169    285
   MSGTSV    0008 A   101
 > MX1000    0029      36     36    225    240
 > NRMINI    0022      33     33    200
 > NRMLST    0023      33     33    306
   NRMNTL    0000 D   377    172    222    233    239
 > NRMTST    0025      34     34    187
   NTT1      02F0 I   372    367
   NTT2      02D9 I   361    371
   NTTCPR    02C3 I   352    141
 > PIAKCR    000D      18     18    305    316
 > PTBCNV    0027      35     35    272
 > RCTACK    000F      20     20    297
 > RCTBLT    0011      20     20    223
 > RCTPB2    0012      21     21    215
 > RCTPB4    0013      21     21    218
 > RCTSEL    0010      20     20    203    211
AU.OFR(A0011.02.021AA  CRS AUTOFIRE ROUTINE)          08/04/78  13:08:44  PAGE  10

 > RCVMRT    0021      32     32    258
 > RECDTA    0020      31     31    308
 > RECTM1    0005      13     13    241    242
 > RECTMO    0004      13     13    238    243    244
 > RTSTAT    0028      36     36    214    246    267
   RTUACK    0000 A    55    299
   RTUACT    00FF A    51    201    219    232    298
 > RTUADR    000B      17     17    209
   RTUBLT    00E0 A    54    234
 > RTUCMD    002B      37     37    204    212    221    236    300
   RTUPTB    0004 A    53    220
   RTUSPT    0080 A    52    202    210
```

```
> SRCVBF    0015     22    22   270   271   276
> STLBRK    0014     22    22   259
> STLCRQ    002A     37    37   260
> STLSW1    001A     26    26   261
> STNADR    000C     17    17   186   207
  STS2MS    0010 A   57   216   247   268
  SW1STO    0010 A   59   262
> SYSERR    001B     28    28   264
> TCDSSP    0030     42    42   288
> TMRBT1    0001     11    11   228   229
> TMRBTV    0000     11    11   224   230   231   235
> TODTYR    0009     15    15   358
> TPMCNT    0016     23    23   330   346
> TPRCMP    002D     39    39   310
> TSWRLO    0007     14    14   163
> TSWRLT    0006     14    14   161
> XMTOTL    0002     12    12   227   250
> XMTTL1    0003     12    12   226   249
RCVMRT(A0011.02.022AA  CRS RTU DATA INPUT)            08/04/78  09:44:37  PAGE   1

                      2 *
                      3 *      CENTRAL RECORDING STATION RTU DATA INPUT ROUTINE
                      4 *
 0000 I               5            ISEC
                      6 *
                      7            DEF     RCVMRT,XMTOTL,XMTTL1
                      8            DEF     TLTSTS
                      9            DEF     XMTRTY
                     10            DEF     CSQBFR
                     11 *
                     12            REF     SXMTBF,SXMTB1,SXMTB3,SXMTB4
                     13            REF     SRCVBF,SRCVB1,SRCVB2,SRCVB3,SRCVB4,SRCVB5,SRCVB6
                     14            REF     SRCVB7,SRCVB8,SRCVB9
                     15            REF     SRVB10
                     16 *
                     17            REF     STLBCD,STLBXT,STLBRV,STLBTV,STLRSQ,STLRPC
                     18            REF     STLSW1
                     19 *
                     20            REF     DEPSAR,TPMCNT,SYSERR,CLRDSP,NUMMSG
                     21 *
                     22            REF     CHRCNT,CKSTRT,DPAVAL,IDXSAV,MSGRQT
                     23 *
                     24            REF     CURCSP,STNADR,RTUADR
                     25 *
                     26            REF     RTSTLN,CMDFAR
                     27 *
                     28            REF     MVCDST
                     29            REF     MVCSTR
                     30 *
                     31            REF     AUXPAR
                     32 *
                     33 *
                     34            REF     RTUCMT,RCMTP9,NRMCMP
                     35            REF     RTUCME
                     36 *
                     37 *
                     38            REF     DPSUBR,IDXRTN,SELIDX,ADPSTN,ADPENT,MSGOUT,PCTUPD
                     39            REF     RTUCMD,STLDVR,CKSTMO,STLCRQ,DISPLY,MX1000
                     40            REF     CHKRDP
                     41            REF     MVCHAR,LOGFRM
                     42 *
                     43 *      RTU REQUEST EQUATES
                     44 *
 0BB8 A              45 RCTMAX     EQU     3000          RTU MAXIMUM TRANSMISSION TIME
 00C0 A              46 RTUXMT     EQU     $C0           TRANSMIT COMMAND
 00DF A              47 TLTXMT     EQU     $DF           TRANSMIT COMMAND FOR TILT SEARCH MODE
                     48 *
                     49 *      SATELLITE COMMAND EQUATES
                     50 *
 0005 A              51 SCLXRM     EQU     5             RCVR TO MEMORY XMIT LEN
 0001 A              52 SCLRRM     EQU     1             RCVR TO MEMORY RCV LENGTH
 0005 A              53 SCDREP     EQU     $5            RE-RECEIVE RTU DATA
 0000 A              54 SCDRTM     EQU     0             RECEIVER TO MEMORY
```

```
                         *
0001 A                   SW1WRS    EQU    1          W/R SEQUENCE
0010 A                   SW1STO    EQU    $10        SOFTWARE TIMEOUT
                         *
                         *      PARITY COUNT LIMITS
RCVMRT(A0011.02.022AA  CRS RTU DATA INPUT)           08/04/78  09:44:38  PAGE   2

                         *
000A A                   PCTCRS    EQU    10         CRS RF PARITY COUNT
0005 A                   PCTRTU    EQU    5          RTU CCD MEMORY PARITY COUNT
                         *
                         *      TRANSMISSION RETRY COUNTER
                         *
0001 A                   XMTRTV    EQU    1          TRANSMISSION RETRY VALUE
                         *
                         *      FORMATTER TO MEMORY DATA MODE EQUATES
                         *
0002 A                   DMDATA    EQU    2          DATA
0003 A                   DMBLST    EQU    3          LOOK FOR TIME BREAK
                         *
                         *      MESSAGE TYPE EQUATES
                         *
0080 A                   MSGTCV    EQU    $80        CONVERT AND DISPLAY OLD VALUE
0040 A                   MSGTIP    EQU    $40        INPUT AND DISPLAY NEW VALUE
0004 A                   MSGTRC    EQU    4          RETRY OR CONTINUE REQUEST
                         *
                         *      LINE STATUS FLAGS
                         *
000C A                   LCAST1    EQU    12         LINE STATUS FLAGS (BYTE 1)
                         *
000D A                   LCAST2    EQU    13         LINE STATUS FLAGS (BYTE 2)
0004 A                   LS2NTP    EQU    4          NORMAL TEST-IN-PROGRESS
0002 A                   LS2BTP    EQU    2          BLAST TEST-IN-PROGRESS
0001 A                   LS2TSP    EQU    1          TILT SEARCH-IN-PROGRESS
                         *
0010 A                   LCAMDE    EQU    16         LINE MODE
0001 A                   MODPLY    EQU    1          DEPLOY
0003 A                   MODFIR    EQU    3
                         *
0040 A                   RTUXME    EQU    $40        RTU XMIT ERROR FLAG
                         *
                         *
                         *      CALLING SEQUENCE:  JSR  RCVMRT
                         *
                         *      RTUADR => RTU ADDRESS
                         *      XMTOTL => TOTAL # WORDS TO INPUT
                         *
0000 I                   RCVMRT    EQU    *
0000 I 7D 0022 R                   TST    RTUADR
0003 I 26 01                       BNE    RCVM1      CONTINUE IF NOT ARTIFICIAL RTU
0005 I 39                          RTS
0006 I 86 FF             RCVM1     LDA A  #$FF       BLANK OUT
0008 I B7 0027 R                   STA A  AUXPAR     CRS PARITY COUNT
000B I 86 01                       LDA A  #1
000D I B7 0004 D                   STA A  XMTBCT     INIT CURRENT BLOCK COUNT
0010 I B7 0006 D                   STA A  XMTCNT     ANTICIPATE SINGLE BLOCK OUTPUT
0013 I 7F 0005 D                   CLR    XMTBFC     INIT BLOCKING FACTOR
0016 I FE 0000 D                   LDX    XMTOTL     SET # WORDS IN LAST BLOCK
0019 I FF 0008 D                   STX    XMTSAV     TO TOTAL # WORDS
001C I 86 0F                       LDA A  #$F        SET RETURN CODE FOR COMPARISON
001E I B7 000B D                   STA A  ERRDSC+1   INDICATOR MESSAGE ELEMENT
0021 I FE 0020 R                   LDX    CURCSP
0024 I A6 0D                       LDA A  LCAST2,X
0026 I 85 01                       BIT A  #LS2TSP    TILT SEARCH-IN-PROGRESS
0028 I 26 3E                       BNE    RCV2       YES, PARAMETERS SETUP FOR XMIT
RCVMRT(A0011.02.022AA  CRS RTU DATA INPUT)           08/04/78  09:44:39  PAGE   3

002A I F6 0                        LDA B  CMDFAR     PICK UP
002D I C4 (                        AND B  #7         BLOCK RATE
002F I C1 0                        CMP B  #7         XMIT ALL DATA FROM MEMORY ?
0031 I 27 35                       BEQ    RCV2       YES, PARAMETERS SETUP FRO XMIT
0033 I 5C                RCV1      INC B
0034 I C1 07                       CMP B  #7
```

```
0036 I 26 01        124           BNE    RCV3
0038 I 5C           125           INC B
0039 I F7 0005 D    126 RCV3      STA B  XMTBFC      SET PROPER BLOCK FACTOR
003C I BD 02DF I    127           JSR    MX1024      COMPUTE # WORDS PER BLOCK
003F I F7 0003 D    128           STA B  XMTWPB+1    SET # WORDS
0042 I B7 0002 D    129           STA A  XMTWPB      PER XMIT BLOCK
0045 I 7F 0006 D    130           CLR    XMTCNT      INIT # BLOCKS TO XMIT
0048 I FE 0000 D    131           LDX    XMTOTL      SAVE TOTAL #
004B I FF 001E R    132           STX    IDXSAV      WORDS TO XMIT
004E I CE 001E R    133           LDX    #IDXSAV     SET PNTR TO TOTAL
0051 I FF 001D R    134           STX    DPAVAL      # OF WORDS
0054 I FE 001E R    135 RCVL      LDX    IDXSAV      SAVE # WORDS IN LAST
0057 I FF 0008 D    136           STX    XMTSAV      BLOCK FOR LATER USE
005A I FE 0002 D    137           LDX    XMTWPB      COMPUTE # BLOCKS
005D I BD 002C R    138           JSR    DPSUBR      TO TRANSMIT
0060 I 7C 0006 D    139           INC    XMTCNT
0063 I FE 001E R    140           LDX    IDXSAV
0066 I 2E EC        141           BGT    RCVL
0068 I CE 0029 R    142 RCV2      LDX    #RCMTP9     INIT CHANNEL
006B I FF 002A R    143 RCV5      STX    NRMCMP      MAP PNTR
006E I EE 00        144           LDX    0,X         CHANNEL ASSIGNED
0070 I 26 08        145           BNE    RCV4        YES
0072 I FE 002A R    146           LDX    NRMCMP
0075 I 09           147           DEX
0076 I 09           148           DEX
0077 I 09           149           DEX                SET PNTR TO NEXT CHANNEL
0078 I 20 F1        150           BRA    RCV5
007A I FF 000D D    151 RCV4      STX    STNSVA      SAVE STATION NUMBER FOR THIS RTU
007D I FF 0021 R    152           STX    STNADR
0080 I BD 0030 R    153           JSR    ADPENT      PICK UP ASSOCIATED RTU ADDRESS
0083 I B7 0022 R    154           STA A  RTUADR      SAVE RTU ADDRESS
0086 I 5F           155           CLR B              ANTICIPATE NORMAL TEST TRANSMISSION
0087 I FE 0020 R    156           LDX    CURCSP      PICK UP CONTROL STORAGE AREA PNTR
008A I A6 10        157           LDA A  LCAMDE,X    PICK UP CURRENT LINE MODE
008C I 81 03        158           CMP A  #MODFIR     FIRE MODE ?
008E I 26 18        159           BNE    RCV6        NO, DETERMINE IF NORMAL OR PERFORMANCE TES
0090 I A6 0D        160           LDA A  LCAST2,X
0092 I 85 04        161           BIT A  #LS2NTP     NORMAL TEST ON BLASTER RTU
0094 I 26 25        162           BNE    RCV7        YES
0096 I EE 00        163           LDX    0,X
0098 I FF 0021 R    164           STX    STNADR      SAVE SHOT PT STATION NUMBER
009B I BD 0030 R    165           JSR    ADPENT      PICK UP ASSOCIATED RTU ADDR
009E I C6 02        166           LDA B  #DMDATA     ANTICIPATE NORMAL RTU DATA
00A0 I B1 0022 R    167           CMP A  RTUADR      BLASTER CONNECTED TO THIS RTU
00A3 I 26 16        168           BNE    RCV7        NO
00A5 I 5C           169           INC B
00A6 I 20 13        170           BRA    RCV7        GO SAVE DATA MODE CODE
00A8 I 81 01        171 RCV6      CMP A  #MODPLY     DEPLOY MODE ?
00AA I 27 0F        172           BEQ    RCV7        YES, TREAT AS NORMAL TEST
00AC I A6 0D        173           LDA A  LCAST2,X    PICK UP TEST-IN-PROGRESS FLAGS
00AE I 85 02        174           BIT A  #LS2BTP     BLAST TEST-IN-PROGRESS
00B0 I 27 04        175           BEQ    RCV8        NO
RCVMRT(A0011.02.022AA  CRS RTU DATA INPUT)              08/04/78  09:44:40  PAGE   4

00B2 I C6 03        176           LDA B  #DMBLST     SET DATA MODE CODE TO LOOK FOR TIME BREAK
00B4 I 20 05        177           BRA    RCV7
00B6 I 85 04        178 RCV8      BIT A  #LS2NTP     NORMAL TEST-IN-PROGRESS
00B8 I 26 01        179           BNE    RCV7        YES, SET DATA MODE CODE FOR NORMAL TEST
00BA I 5C           180           INC B              SET DATA MODE CODE FOR PERFORMANCE TEST
00BB I F7 0003 R    181 RCV7      STA B  SXMTB4      SAVE DATA MODE CODE
00BE I FE 000D D    182           LDX    STNSVA
00C1 I FF 0021 R    183           STX    STNADR      SET STATION ADDR FOR THIS RTU
00C4 I 86 00        184 RCVN      LDA A  #SCDRTM     SET XMIT COMMAND IN SATELLITE BLOCK
00C6 I C6 01        185 RCVO      LDA B  #XMTRTV     INITIALIZE XMIT
00C8 I F7 0007 D    186           STA B  XMTRTY      RETRY VALUE
00CB I B7 000F R    187 RCV9      STA A  STLBCD      MOVE COMMAND INTO SATELLITE REQ BLOCK
00CE I FE 0002 D    188           LDX    XMTWPB      ANTICIPATE NORMAL BLOCK TRANSMISSION
00D1 I B6 0004 D    189 RCVX      LDA A  XMTBCT
00D4 I 4A           190           DEC A
00D5 I 48           191           ASL A
00D6 I 48           192           ASL A
00D7 I B7 0002 R    193           STA A  SXMTB3      JETUP SATELLITE MEMORY ADDR
00DA I B6 0006 D    194           LDA A  XMTCNT
```

```
00DD I 4A          195         DEC A               LAST BLOCK
00DE I 26 03       196         BNE   RCVA          NO
00E0 I FE 0008 D   197         LDX   XMTSAV        XMIT REMAINING WORDS
00E3 I FF 0001 R   198 RCVA    STX   SXMTB1        SET # WORDS TO XMIT
00E6 I FF 000F D   199         STX   DTCSAV        SAVE # OF WORDS TRANSMITTED
00E9 I CE 03A6 I   200 RCVR    LDX   #DXMTIP       DATA TRANSMISSION
00EC I BD 0037 R   201         JSR   DISPLY        IN PROGRESS
00EF I CE 03C8 I   202         LDX   #XMTRTU
00F2 I FF 001F R   203         STX   MSGRQT
00F5 I C6 80       204         LDA B #MSGTCV
00F7 I BD 0031 R   205         JSR   MSGOUT        OUTPUT CURRENT RTU NUMBER
00FA I CE 03DF I   206         LDX   #XMTSTN
00FD I FF 001F R   207         STX   MSGRQT
0100 I C6 80       208         LDA B #MSGTCV
0102 I BD 0031 R   209         JSR   MSGOUT        OUTPUT CURRENT STATION ADDR
0105 I C6 C0       210         LDA B #RTUXMT       SETUP
0107 I FB 0004 D   211         ADD B XMTBCT        XMIT
010A I 5A          212         DEC B               COMMAND
010B I FE 0020 R   213         LDX   CURCSP
010E I A6 0D       214         LDA A LCAST2,X
0110 I 85 01       215         BIT A #LS2TSP       TILT SEARCH-IN-PROGRESS
0112 I 27 02       216         BEQ   RCVR1         NO
0114 I C6 DF       217         LDA B #TLTXMT       SET TILT SEARCH XMIT COMMAND
0116 I B6 0022 R   218 RCVR1   LDA A RTUADR        PICK UP RTU ADDRESS
0119 I CE 0000 A   219         LDX   #0            NO TIMEOUT
011C I BD 0033 R   220         JSR   RTUCMD        OUTPUT COMMAND TO RTU
011F I F6 000F R   221         LDA B STLBCD        PICK UP XMIT CMND
0122 I 86 05       222         LDA A #SCLXRM       SET # BYTES TO XMIT
0124 I B7 0010 R   223         STA A STLBXT
0127 I 86 01       224         LDA A #SCLRRM       SET # BYTES
0129 I B7 0011 R   225         STA A STLBRV        TO RECEIVE
012C I 86 01       226         LDA A #SW1WRS       SET NORMAL REQUEST TYPE
012E I CE 0BB8 A   227         LDX   #RCTMAX       PICK UP REQUEST TIMEOUT LENGTH
0131 I FF 0012 R   228         STX   STLBTV        SAVE TIMEOUT LENGTH
0134 I BD 0034 R   229         JSR   STLDVR        ISSUE SATELLITE REQUEST TO XMIT DATA
0137 I CE 00E9 I   230         LDX   #RCVR         SETUP RETRY
013A I FF 001C R   231         STX   CKSTRT        ADDRESS
013D I CE 0164 I   232         LDX   #RCVC         LOAD CONTINUATION ADDR
0140 I BD 0035 R   233         JSR   CKSTMO        CHECK FOR SOFTWARE TIMEOUT
RCVMRT(A0011.02.022AA  CRS RTU DATA INPUT)           08/04/78  09:44:42  PAGE   5

0143 I 6E 00       234         JMP   0,X           CALL APPROPRIATE ROUTINE
0145 I BD 02B2 I   235         JSR   RTNCSQ        SETUP COMMAND SEQUENCE
                   236 ***
0148 I CE 4532 A   237         LDX   #$4532
014B I BD 003B R   238         JSR   LOGFRM
                   239 ***
014E I BD 0018 R   240         JSR   SYSERR
0151 I 27 96       241         BEQ   RCVR          RETRY SPECIFIED
0153 I CE 0028 R   242         LDX   #RTUCMT
0156 I A6 02       243 RCVC1A  LDA A 2,X
0158 I 8A 40       244         ORA A #RTUXME       SET XMIT ERROR FLAG
015A I A7 02       245         STA A 2,X
015C I 08          246         INX
015D I 08          247         INX
015E I 08          248         INX
015F I 8C 002B R   249         CPX   #RTUCME
0162 I 26 F2       250         BNE   RCVC1A
0164 I BD 02B2 I   251 RCVC    JSR   RTNCSQ        PICK UP COMMAND SEQUENCE
0167 I 26 1A       252         BNE   RCVC2
                   253 ***
0169 I CE 4C31 A   254         LDX   #$4C31
016C I BD 003B R   255         JSR   LOGFRM
                   256 ***
016F I CE 0014 R   257         LDX   #STLRPC
0172 I BD 0036 R   258         JSR   STLCRQ        ASK FOR PARITY COUNT
0175 I CE 0164 I   259         LDX   #RCVC         SETUP RETRY ADDR
0178 I FF 001C R   260         STX   CKSTRT
017B I CE 0188 I   261         LDX   #RCVD         LOAD CONTINUATION ADDR
017E I BD 0035 R   262         JSR   CKSTMO        CHECK FOR SOFTWARE TIMEOUT
0181 I 6E 00       263         JMP   0,X           CALL APPROPRIATE ROUTINE
0183 I BD 0018 R   264 RCVC2   JSR   SYSERR
0186 I 27 DC       265         BEQ   RCVC          JUMP IF RETRY SPECIFIED
```

```
0188 I B6 0004 R    266 RCVD      LDA A  SRCVBF     PICK UP RF PARITY COUNT
018B I 81 0A        267           CMP A  #PCTCRS    MAXIMUM COUNT EXCEEDED
018D I 23 22        268           BLS    RCVE       NO, CHECK REMAINDER OF CONTROL WORDS
018F I 7A 0007 D    269           DEC    XMTRTY     RETRIES EXHAUSTED
0192 I 2F 05        270           BLE    RCVF       YES, NOTIFY OPERATOR
0194 I 86 05        271 RCVH      LDA A  #SCDREP    RE-TRANSMIT DATA
0196 I 7E 00CB I    272           JMP    RCV9
                    273 ***
0199 I CE 4532 A    274 RCVF      LDX    #$4532
019C I BD 003B R    275           JSR    LOGFRM
                    276 ***
019F I CE 0308 I    277           LDX    #XMTRFP    NOTIFY OPERATOR OF
01A2 I FF 001F R    278           STX    MSGRQT     RF PARITY ERROR
01A5 I C6 04        279           LDA B  #MSGTRC    ASK FOR OPERATOR INTERVENTION
01A7 I BD 0031 R    280           JSR    MSGOUT
01AA I 26 05        281           BNE    RCVE       BRANCH IF CONTINUE SPECIFIED
01AC I 86 05        282 RCVP      LDA A  #SCDREP    RE-XMIT DATA IF RETRY SPECIFIED
01AE I 7E 00C6 I    283           JMP    RCVO       RETRY TRANSMISSION
01B1 I F6 0004 R    284 RCVE      LDA B  SRCVBF
01B4 I BD 0032 R    285           JSR    PCTUPD     OUTPUT CRS RF PARITY COUNT
01B7 I 5F           286           CLR B             INIT # OF VALID CONTROL WORDS COUNT
01B8 I B6 0007 R    287           LDA A  SRCVB3     RTU ADDRESS VALID
01BB I 26 26        288           BNE    RCVG       NO
01BD I 5C           289           INC B             INCR VALID WORD COUNT
01BE I B6 0008 R    290           LDA A  SRCVB4     PICK UP RESPONDING RTU ADDR
01C1 I B1 0022 R    291           CMP A  RTUADR     CORRECT RTU RESPONDING
RCVMRT(A0011.02.022AA  CRS RTU DATA INPUT)           08/04/78  09:44:43  PAGE   6

01C4 I 27 1D        292           BEQ    RCVG       YES
01C6 I 7A 0007 D    293           DEC    XMTRTY     RETRIES EXHAUSTED
01C9 I 2E C9        294           BGT    RCVH       NO, RE-XMIT BAD DATA
01CB I 37           295           PSH B             SAVE VALID WORD COUNT
                    296 ***
01CC I CE 4532 A    297           LDX    #$4532
01CF I BD 003B R    298           JSR    LOGFRM
                    299 ***
01D2 I CE 02ED I    300           LDX    #XMTIRT    NOTIFY OPERATOR OF
01D5 I FF 001F R    301           STX    MSGRQT     WRONG RTU RESPONDING
01D8 I C6 04        302           LDA B  #MSGTRC    ASK FOR OPERATOR
01DA I BD 0031 R    303           JSR    MSGOUT     INTERVENTION
01DD I 33           304           PUL B             RESTORE VALID WORD COUNT
01DE I 26 03        305           BNE    RCVG
01E0 I 7E 00C4 I    306           JMP    RCVN       BRANCH IF RETRY SPECIFIED
01E3 I B6 0009 R    307 RCVG      LDA A  SRCVB5     DATA COUNT VALID ?
01E6 I 26 27        308           BNE    RCVJ       NO
01E8 I 5C           309           INC B             INCR VALID WORD COUNT
01E9 I FE 000A R    310           LDX    SRCVB6     PICK UP DATA COUNT
01EC I 86 3C        311           LDA A  #'<        ANTICIPATE SMALL DATA COUNT
01EE I BC 000F D    312           CPX    DTCSAV     DATA COUNT MATCH EXPECTED COUNT
01F1 I 27 1C        313           BEQ    RCVJ       YES, CHECK REMAINDER OF CONTROL WORDS
01F3 I 2D 02        314           BLT    RCVK       JUMP IF COUNT < EXPECTED COUNT
01F5 I 86 3E        315           LDA A  #'>        SET GREATER THAN INDICATOR
01F7 I B7 000A D    316 RCVK      STA A  ERRDSC     SET COMPARISON INDICATOR
01FA I 37           317           PSH B             SAVE VALID WORD COUNT
                    318 ***
01FB I CE 4532 A    319           LDX    #$4532
01FE I BD 003B R    320           JSR    LOGFRM
                    321 ***
0201 I CE 033C I    322           LDX    #ERRDCT    INFORM
0204 I FF 001F R    323           STX    MSGRQT     OPERATOR
0207 I C6 04        324           LDA B  #MSGTRC    ASK FOR OPERATOR
0209 I BD 0031 R    325           JSR    MSGOUT     INTERVENTION
020C I 33           326           PUL B             RESTORE VALID WORD COUNT
020D I 27 9D        327           BEQ    RCVP       JUMP IF RETRY SPECIFIED
020F I B6 0005 R    328 RCVJ      LDA A  SRCVB1     PARITY COUNT VALID ?
0212 I 26 20        329           BNE    RCVT       NO
0214 I 5C           330           INC B             INCR VALID WORD COUNT
0215 I B6 0006 R    331           LDA A  SRCVB2
0218 I 81 05        332           CMP A  #PCTRTU    RTU PARITY COUNT EXCEED MAXIMUM
021A I 23 18        333           BLS    RCVT       NO, CHECK REMAINDER OF CONTROL WORDS
021C I 37           334           PSH B             SAVE VALID WORD COUNT
                    335 ***
021D I CE 4532 A    336           LDX    #$4532
```

```
0220 I BD 003B R   337           JSR    LOGFRM
                   338 ***
0223 I CE 031E I   339           LDX    #XMTCDP     NOTIFY OPERATOR OF
0226 I FF 001F R   340           STX    MSGRQT      CCD MEMORY PARITY ERROR
0229 I C6 04       341           LDA B  #MSGTRC     ASK FOR OPERATOR
022B I BD 0031 R   342           JSR    MSGOUT      INTERVENTION
022E I 33          343           PUL B              RESTORE VALID WORD COUNT
022F I 26 03       344           BNE    RCVT        RE-XMIT DATA IF RETRY SPECIFIED
0231 I 7E 01AC I   345           JMP    RCVP
0234 I B6 000C R   346 RCVT      LDA A  SRCVB8      COMMAND COUNT VALID
0237 I 26 2E       347           BNE    RCVU        NO
0239 I 5C          348           INC B
023A I 37          349           PSH B              SAVE VALID WORD COUNT
RCVMRT(A0011.02.022AA  CRS RTU DATA INPUT)               08/04/78  09:44:44  PAGE   7

023B I BD 0039 R   350           JSR    CHKRDP      PICK UP EXPECTED COMMAND COUNT
023E I E6 03       351           LDA B  3,X         FROM RTU MAP TABLE
0240 I 86 3C       352           LDA A  #'<         ANTICIPATE COUNT < EXPECTED COUNT
0242 I F1 000D R   353           CMP B  SRCVB9      COMMAND COUNT MATCH EXPECTED COUNT
0245 I 33          354           PUL B              RESTORE VALID WORD COUNT
0246 I 27 1F       355           BEQ    RCVU        YES, CHECK IF ERROR MESG SHOULD BE L
0248 I 22 02       356           BHI    RCVV        JUMP IF COMMAND COUNT < EXPECTED
024A I 86 3E       357           LDA A  #'>         SET INDICATOR FOR COUNT > EXPECTED
024C I B7 000A D   358 RCVV      STA A  ERRDSC      SET COMPARISON INDICATOR
024F I 37          359           PSH B              SAVE VALID WORD COUNT
                   360 ***
0250 I CE 4532 A   361           LDX    #$4532
0253 I BD 003B R   362           JSR    LOGFRM
                   363 ***
0256 I CE 0360 I   364           LDX    #ERRCCT     INFORM OPERATOR OF
0259 I FF 001F R   365           STX    MSGRQT      COMMAND COUNT ERROR
025C I C6 04       366           LDA B  #MSGTRC     ASK FOR OPERATOR
025E I BD 0031 R   367           JSR    MSGOUT      INTERVENTION
0261 I 33          368           PUL B              RESTORE VALID WORD COUNT
0262 I 26 03       369           BNE    RCVU
0264 I 7E 01AC I   370           JMP    RCVP        RE-XMIT DATA IF RETRY SPECIFIED
0267 I B6 000E R   371 RCVU      LDA A  SRVB10
026A I B7 000C D   372           STA A  TLTSTS      SAVE TILT STATUS
026D I 5D          373           TST B              ANY VALID WORD ?
026E I 26 06       374           BNE    RCVU1       YES
0270 I CE 4533 A   375           LDX    #$4533
0273 I BD 003B R   376           JSR    LOGFRM
                   377 ***
0276 I FE 0020 R   378 RCVU1     LDX    CURCSP
0279 I A6 0D       379           LDA A  LCAST2,X
027B I 85 01       380           BIT A  #LS2TSP     TILT-SEARCH-IN-PROGRESS
027D I 26 05       381           BNE    RCV4A       YES, SKIP BLOCK COUNT CHECK
027F I 7A 0006 D   382           DEC    XMTCNT      LAST BLOCK
0282 I 26 1D       383           BNE    RCVW        NO, SETUP FOR NEXT BLOCK
0284 I CE 0387 I   384 RCV4A     LDX    #DXMTCP     DISPLAY TRANSMIT COMPLETE MESSAGE
0287 I BD 0037 R   385           JSR    DISPLY
028A I CE 03C8 I   386           LDX    #XMTRTU
028D I FF 001F R   387           STX    MSGRQT
0290 I C6 80       388           LDA B  #MSGTCV
0292 I BD 0031 R   389           JSR    MSGOUT      OUTPUT RTU NUMBER
0295 I CE 03DF I   390           LDX    #XMTSTN
0298 I FF 001F R   391           STX    MSGRQT
029B I C6 80       392           LDA B  #MSGTCV
029D I BD 0031 R   393           JSR    MSGOUT
02A0 I 39          394           RTS                RETURN TO CALLER
02A1 I B6 0005 D   395 RCVW      LDA A  XMTBFC
02A4 I BB 0004 D   396           ADD A  XMTBCT      UPDATE CURRENT
02A7 I B7 0004 D   397           STA A  XMTBCT      BLOCK COUNT
02AA I 86 01       398           LDA A  #XMTRTV
02AC I B7 0007 D   399           STA A  XMTRTY
02AF I 7E 00C4 I   400           JMP    RCVN        GET NEXT BLOCK
02B2 I             401 RTNCSQ    EQU    *
02B2 I F6 000F R   402           LDA B  STLBCD      SAVE COMMAND
02B5 I 37          403           PSH B
02B6 I CE 0013 R   404           LDX    #STLRSQ
02B9 I BD 0036 R   405           JSR    STLCRQ      ASK FOR COMMND SEQUENCE
02BC I 33          406           PUL B
02BD I F7 000F R   407           STA B  STLBCD      RESTORE COMMAND
```

```
02C0 I B6 0015 R   408          LDA A  STLSW1
02C3 I 85 10       409          BIT A  #SW1STO        SOFTWARE TIMEOUT
02C5 I 26 17       410          BNE    RCVC1
02C7 I CE 0004 R   411          LDX    #SRCVBF
02CA I A6 00       412          LDA A  0,X            PICK UP BYTE COUNT FOR COMMAND SEQUENCE
02CC I 4C          413          INC A
02CD I 4C          414          INC A
02CE I FF 0026 R   415          STX    MVCSTR
02D1 I CE 0012 D   416          LDX    #CSQBFR
02D4 I FF 0025 R   417          STX    MVCDST
02D7 I BD 003A R   418          JSR    MVCHAR         SAVE COMMAND SEQUENCE
02DA I 7C 0012 D   419          INC    CSQBFR
02DD I 4F          420          CLR A                 SET CC FOR GOOD RETURN
02DE I 39          421 RCVC1    RTS
                   422 *
                   423 *     ROUTINE TO MULTIPLY BY 1024
                   424 *
02DF I             425 MX1024   EQU    *
02DF I 86 0A       426          LDA A  #10            2**10 = 1024
02E1 I B7 0011 D   427          STA A  SHFTCT
02E4 I 4F          428          CLR A
02E5 I 58          429 MX1H1    ASL B
02E6 I 49          430          ROL A
02E7 I 7A 0011 D   431          DEC    SHFTCT
02EA I 26 F9       432          BNE    MX1H1
02EC I 39          433          RTS
                   434 *
                   435 *     TRANSMISSION AND RECORDING ERROR MESSAGES
                   436 *
02ED I             437 XMTIRT   EQU    *
02ED I 10          438          FCB    $10,3,0
02EE I 03
02EF I 00
02F0 I 57524F      439          FCC    /WRONG RTU RESPONDING/
0304 I 0D          440          FCB    $D,$E
0305 I 0E
0306 I 0017    R   441          FDB    TPMCNT
0308 I             442 XMTRFP   EQU    *
0308 I 10          443          FCB    $10,3,0
0309 I 03
030A I 00
030B I 524620      444          FCC    /RF PARITY ERROR/
031A I 0D          445          FCB    $D,$E
031B I 0E
031C I 0017    R   446          FDB    TPMCNT
031E I             447 XMTCDP   EQU    *
031E I 10          448          FCB    $10,3,0
031F I 03
0320 I 00
0321 I 434344      449          FCC    /CCD MEMORY PARITY ERROR/
0338 I 0D          450          FCB    $D,$E
0339 I 0E
033A I 0017    R   451          FDB    TPMCNT
033C I             452 ERRDCT   EQU    *               DATA COUNT ERROR
033C I 10          453          FCB    $10,3,0
033D I 03
033E I 00
033F I 444154      454          FCC    /DATA COUNT /
```

```
034A I 0E          455          FCB    $E
034B I 000A    D   456          FDB    ERRDSC
034D I 204558      457          FCC    / EXPECTED COUNT/
035C I 0D          458          FCB    $D,$E
035D I 0E
035E I 0017    R   459          FDB    TPMCNT
0360 I             460 ERRCCT   EQU    *               COMMAND COUNT ERROR
0360 I 10          461          FCB    $10,3,0
0361 I 03
0362 I 00
0363 I 434F4D      462          FCC    /COMMAND COUNT /
```

```
0371 I 0E            463            FCB    $E
0372 I 000A     D    464            FDB    ERRDSC
0374 I 204558        465            FCC    / EXPECTED COUNT/
0383 I 0D            466            FCB    $D,$E
0384 I 0E
0385 I 0017     R    467            FDB    TPMCNT
0387 I 444154        468 DXMTCP     FCC    /DATA TRANSMISSION COMPLETE/
03A1 I 0D            469            FCB    $D,$D,$D,$D,4
03A2 I 0D
03A3 I 0D
03A4 I 0D
03A5 I 04
03A6 I 444154        470 DXMTIP     FCC    /DATA TRANSMISSION IN PROGRESS/
03C3 I 0D            471            FCB    $D,$D,$D,$D,4
03C4 I 0D
03C5 I 0D
03C6 I 0D
03C7 I 04
03C8 I 83            472 XMTRTU     FCB    $83
03C9 I 02            473            FCB    2,11
03CA I 0B
03CB I 0022     R    474            FDB    RTUADR
03CD I 10            475            FCB    $10,2,0
03CE I 02
03CF I 00
03D0 I 525455        476            FCC    /RTU NUMBER/
03DA I 0D            477            FCB    $D,$E
03DB I 0E
03DC I 001A     R    478            FDB    NUMMSG
03DE I 04            479            FCB    4
03DF I 04            480 XMTSTN     FCB    4
03E0 I 02            481            FCB    2,23
03E1 I 17
03E2 I 0021     R    482            FDB    STNADR
03E4 I 10            483            FCB    $10,2,15
03E5 I 02
03E6 I 0F
03E7 I 535441        484            FCC    /STATION/
03EE I 0E            485            FCB    $E
03EF I 001A     R    486            FDB    NUMMSG
03F1 I 0D            487            FCB    $D,$D,$D,4
03F2 I 0D
03F3 I 0D
03F4 I 04
                     488 *
0000 D               489            DSEC
                     490 *
RCVMRT(A0011.02.022AA  CRS RTU DATA INPUT)                  08/04/78  09:44:47  PAGE  10

0000 D 0000     A    491 XMTOTL     FDB    0            TOTAL # WORDS TO OUTPUT
0001 D               492 XMTTL1     EQU    *-1
0002 D 0000     A    493 XMTWPB     FDB    0            # WORDS PER BLOCK
0004 D 00            494 XMTBCT     FCB    0            CURRENT BLOCK COUNT
0005 D 00            495 XMTBFC     FCB    0            BLOCK FACTOR
0006 D 00            496 XMTCNT     FCB    0            # BLOCKS TO XMIT
0007 D 00            497 XMTRTY     FCB    0            RETRY COUNTER
0008 D 0000     A    498 XMTSAV     FDB    0            COMPUTATION AREA
000A D 00            499 ERRDSC     FCB    0,$F         COMPARISON INDICATOR
000B D 0F
000C D 00            500 TLTSTS     FCB    0            TILT STATUS MODE ( 1 => TIPPED)
000D D 0000     A    501 STNSVA     FDB    0            STATION ADDR SAVE AREA
000F D 0000     A    502 DTCSAV     FDB    0            EXPECTED DATA COUNT SAVE AREA
0011 D 00            503 SHFTCT     FCB    0
                     504 *
0012 D               505 CSQBFR     RMB    100          COMMAND SEQUENCE BUFFER
                     506 *
0076                 507            END
RCVMRT(A0011.02.022AA  CRS RTU DATA INPUT)                  08/04/78  09:44:47  PAGE  11

   NO ERRORS
 ISECT LENGTH --  1013
 DSECT LENGTH --   118
```

| | | | | | | | | | | | | |
|---|---|---|---|---|---|---|---|---|---|---|---|---|
| > | ADPENT | 0030 | 38 | 38 | 153 | 165 | | | | | | |
| > | ADPSTN | 002F | 38 | 38 | | | | | | | | |
| > | AUXPAR | 0027 | 31 | 31 | 105 | | | | | | | |
| > | CHKRDP | 0039 | 40 | 40 | 350 | | | | | | | |
| > | CHRCNT | 001B | 22 | 22 | | | | | | | | |
| > | CKSTMO | 0035 | 39 | 39 | 233 | 262 | | | | | | |
| > | CKSTRT | 001C | 22 | 22 | 231 | 260 | | | | | | |
| > | CLRDSP | 0019 | 20 | 20 | | | | | | | | |
| > | CMDFAR | 0024 | 26 | 26 | 118 | | | | | | | |
| < | CSQBFR | 0012 D | 505 | 10 | 416 | 419 | | | | | | |
| > | CURCSP | 0020 | 24 | 24 | 114 | 156 | 213 | 378 | | | | |
| > | DEPSAR | 0016 | 20 | 20 | | | | | | | | |
| > | DISPLY | 0037 | 39 | 39 | 201 | 385 | | | | | | |
| | DMBLST | 0003 A | 71 | 176 | | | | | | | | |
| | DMDATA | 0002 A | 70 | 166 | | | | | | | | |
| > | DPAVAL | 001D | 22 | 22 | 134 | | | | | | | |
| > | DPSUBR | 002C | 38 | 38 | 138 | | | | | | | |
| | DTCSAV | 000F D | 502 | 199 | 312 | | | | | | | |
| | DXMTCP | 0387 I | 468 | 384 | | | | | | | | |
| | DXMTIP | 03A6 I | 470 | 200 | | | | | | | | |
| | ERRCCT | 0360 I | 460 | 364 | | | | | | | | |
| | ERRDCT | 033C I | 452 | 322 | | | | | | | | |
| | ERRDSC | 000A D | 499 | 113 | 316 | 358 | 456 | 464 | | | | |
| > | IDXRTN | 002D | 38 | 38 | | | | | | | | |
| > | IDXSAV | 001E | 22 | 22 | 132 | 133 | 135 | 140 | | | | |
| | LCAMDE | 0010 A | 88 | 157 | | | | | | | | |
| | LCAST1 | 000C A | 81 | | | | | | | | | |
| | LCAST2 | 000D A | 83 | 115 | 160 | 173 | 214 | 379 | | | | |
| > | LOGFRM | 003B | 41 | 41 | 238 | 255 | 275 | 298 | 320 | 337 | 362 | 376 |
| | LS2BTP | 0002 A | 85 | 174 | | | | | | | | |
| | LS2NTP | 0004 A | 84 | 161 | 178 | | | | | | | |
| | LS2TSP | 0001 A | 86 | 116 | 215 | 380 | | | | | | |
| | MODFIR | 0003 A | 90 | 158 | | | | | | | | |
| | MODPLY | 0001 A | 89 | 171 | | | | | | | | |
| > | MSGOUT | 0031 | 38 | 38 | 205 | 209 | 280 | 303 | 325 | 342 | 367 | 389 | 393 |
| > | MSGRQT | 001F | 22 | 22 | 203 | 207 | 278 | 301 | 323 | 340 | 365 | 387 | 391 |
| | MSGTCV | 0080 A | 75 | 204 | 208 | 388 | 392 | | | | | |
| | MSGTIP | 0040 A | 76 | | | | | | | | | |
| | MSGTRC | 0004 A | 77 | 279 | 302 | 324 | 341 | 366 | | | | |
| > | MVCDST | 0025 | 28 | 28 | 417 | | | | | | | |
| > | MVCHAR | 003A | 41 | 41 | 418 | | | | | | | |
| > | MVCSTR | 0026 | 29 | 29 | 415 | | | | | | | |
| > | MX1000 | 0038 | 39 | 39 | | | | | | | | |
| | MX1024 | 02DF I | 425 | 127 | | | | | | | | |
| | MX1H1 | 02E5 I | 429 | 432 | | | | | | | | |
| > | NRMCMP | 002A | 34 | 34 | 143 | 146 | | | | | | |
| > | NUMMSG | 001A | 20 | 20 | 478 | 486 | | | | | | |
| | PCTCRS | 000A A | 61 | 267 | | | | | | | | |
| | PCTRTU | 0005 A | 62 | 332 | | | | | | | | |
| > | PCTUPD | 0032 | 38 | 38 | 285 | | | | | | | |
| > | RCMTP9 | 0029 | 34 | 34 | 142 | | | | | | | |
| | RCTMAX | 0BB8 A | 45 | 227 | | | | | | | | |
| | RCV1 | 0033 I | 122 | | | | | | | | | |

RCVMRT(A0011.02.022AA CRS RTU DATA INPUT) 08/04/78 09:44:48 PAGE 12

| | | | | | | | | |
|---|---|---|---|---|---|---|---|---|
| RCV2 | 0068 I | 142 | 117 | 121 | | | | |
| RCV3 | 0039 I | 126 | 124 | | | | | |
| RCV4 | 007A I | 151 | 145 | | | | | |
| RCV4A | 0284 I | 384 | 381 | | | | | |
| RCV5 | 006B I | 143 | 150 | | | | | |
| RCV6 | 00A8 I | 171 | 159 | | | | | |
| RCV7 | 00BB I | 181 | 162 | 168 | 170 | 172 | 177 | 179 |
| RCV8 | 00B6 I | 178 | 175 | | | | | |
| RCV9 | 00CB I | 187 | 272 | | | | | |
| RCVA | 00E3 I | 198 | 196 | | | | | |
| RCVC | 0164 I | 251 | 232 | 259 | 265 | | | |
| RCVC1 | 02DE I | 421 | 410 | | | | | |
| RCVC1A | 0156 I | 243 | 250 | | | | | |
| RCVC2 | 0183 I | 264 | 252 | | | | | |
| RCVD | 0188 I | 266 | 261 | | | | | |
| RCVE | 01B1 I | 284 | 268 | 281 | | | | |
| RCVF | 0199 I | 274 | 270 | | | | | |
| RCVG | 01E3 I | 307 | 288 | 292 | 305 | | | |

```
  RCVH      0194 I   271    294
  RCVJ      020F I   328    308    313
  RCVK      01F7 I   316    314
  RCVL      0054 I   135    141
  RCVM1     0006 I   104    102
< RCVMRT    0000 I   100      7
  RCVN      00C4 I   184    306    400
  RCVO      00C6 I   185    283
  RCVP      01AC I   282    327    345    370
  RCVR      00E9 I   200    230    241
  RCVR1     0116 I   218    216
  RCVT      0234 I   346    329    333    344
  RCVU      0267 I   371    347    355    369
  RCVU1     0276 I   378    374
  RCVV      024C I   358    356
  RCVW      02A1 I   395    383
  RCVX      00D1 I   189
  RTNCSQ    02B2 I   401    235    251
> RTSTLN    0023      26     26
> RTUADR    0022      24     24    101    154    167    218    291    474
> RTUCMD    0033      39     39    220
> RTUCME    002B      35     35    249
> RTUCMT    0028      34     34    242
  RTUXME    0040 A    92    244
  RTUXMT    00C0 A    46    210
  SCDREP    0005 A    53    271    282
  SCDRTM    0000 A    54    184
  SCLRRM    0001 A    52    224
  SCLXRM    0005 A    51    222
> SELIDX    002E      38     38
  SHFTCT    0011 D   503    427    431
> SRCVB1    0005      13     13    328
> SRCVB2    0006      13     13    331
> SRCVB3    0007      13     13    287
> SRCVB4    0008      13     13    290
> SRCVB5    0009      13     13    307
> SRCVB6    000A      13     13    310
> SRCVB7    000B      14     14
> SRCVB8    000C      14     14    346
> SRCVB9    000D      14     14    353
 RCVMRT(A0011.02.022AA  CRS RTU DATA INPUT)              08/04/78  09:44:48  PAGE  1[illegible]

> SRCVBF    0004      13     13    266    284    411
> SRVB10    000E      15     15    371
> STLBCD    000F      17     17    187    221    402    407
> STLBRV    0011      17     17    225
> STLBTV    0012      17     17    228
> STLBXT    0010      17     17    223
> STLCRQ    0036      39     39    258    405
> STLDVR    0034      39     39    229
> STLRPC    0014      17     17    257
> STLRSQ    0013      17     17    404
> STLSW1    0015      18     18    408
> STNADR    0021      24     24    152    164    183    482
  STNSVA    000D D   501    151    182
  SW1STO    0010 A    57    409
  SW1WRS    0001 A    56    226
> SXMTB1    0001      12     12    198
> SXMTB3    0002      12     12    193
> SXMTB4    0003      12     12    181
> SXMTBF    0000      12     12
> SYSERR    0018      20     20    240    264
< TLTSTS    000C D   500      8    372
  TLTXMT    00DF A    47    217
> TPMCNT    0017      20     20    441    446    451    459    467
  XMTBCT    0004 D   494    107    189    211    396    397
  XMTBFC    0005 D   495    109    126    395
  XMTCDP    031E I   447    339
  XMTCNT    0006 D   496    108    130    139    194    382
  XMTIRT    02ED I   437    300
< XMTOTL    0000 D   491      7    110    131
  XMTRFP    0308 I   442    277
  XMTRTU    03C8 I   472    202    386
```

```
  XMTRTV    0001 A    66    185   398
< XMTRTY    0007 D   497      9   186   269   293   399
  XMTSAV    0008 D   498    111   136   197
  XMTSTN    03DF I   480    206   390
< XMTTL1    0001 D   492      7
  XMTWPB    0002 D   493    128   129   137   188
```

```
                    *
0000 I                          ISEC
                    *
                                DEF    RECDTA,RECTMO,RECTM1
                    *
                                REF    SXMTB1,SXMTB2,SXMTB3,SXMTB7,SXTB11
                                REF    SXTB12,SXTB14,SXTB16
                    *
                                REF    STLBRT,STLBCD,STLTRT,STLTRC
                                REF    STLBRV,STLBWT,STLBXT,STLBTV
                    *
                                REF    RCTP12,RMSKP4
                                REF    NRMMPT,NRMCMP
                    *
                                REF    MVCSTR,MVCDST
                    *
                                REF    CURCSP,RTUADR,CHNADR,STNADR,STNAD2
                    *
                                REF    STLSW1,STLSW2,TAPST1,TAPST2
                    *
                                REF    XMTRTY,XMTOTL
                                REF    TMRBTV,TMRBCA
                    *
                                REF    MSGRQT
                                REF    CLRDSP
                                REF    CASR1
                    *
                                REF    TIHTNL,TIHTNR
                    *
                                REF    TAPERM
                                REF    TPEBDB,TPEFWP
                                REF    SYSERR
                                REF    TAPDS1
                                REF    SYRDDS
                    *
                    *
                                REF    TMRCDV
                                REF    TIHOPT,MHDOPT
                                REF    ADPENT
                                REF    EXTPRA,MVCHAR
                                REF    STLDVR
                                REF    TCDEOF,TCDBSR,TCDERT
                                REF    TIOCHK,TPERCK
                                REF    MSGOUT
                                REF    DISPLY
                    *
                    *       MESSAGE REQUEST  EQUATES
                    *
0040 A                 MSGTIF   EQU    $40          INPUT AND DISPLAY NEW VALUE
0004 A                 MSGTRC   EQU    4            RETRY OR CONTINUE REQUEST
                    *
                    *       TAPE REQUEST FLAGS
                    *
0080 A                 TRQCR1   EQU    $80          COMMAND REGISTER 1
0040 A                 TRQCR2   EQU    $40          COMMAND REGISTER 2
0020 A                 TRQSSP   EQU    $20          SET STANDBY POWER
0010 A                 TRQSOP   EQU    $10          SET OPERATE POWER
0008 A                 TRQSTR   EQU    8            SATELLITE REQUEST
```

```
0004 A                 TRQWRT   EQU    4            WRITE REQUEST
0002 A                 TRQCMD   EQU    2            COMMAND REQUEST
0001 A                 TRQSTS   EQU    1
                    *
                    *       COMMAND REGISTER 2
                    *
```

```
0002 A          CMDWB    EQU   2         WRITE 1 BLOCK
                *
                *     TAPE STATUS WORD EQUATES
                *
0004 A          TW2EOT   EQU   4         END-OF-TAPE
0001 A          TW2EOF   EQU   1         FILE MARK DETECTED
                *
0010 A          SFPRM    EQU   $10       FILE PROTECT RING MISSING
                *
                *
                *     TAPE WRITE RETRY COUNTER
                *
0005 A          TPRTRY   EQU   5         TAPE WRITE RETRY COUNTER
                *
                *     TIMEOUT EQUATES
                *
01F4 A          TTMOWR   EQU   500       WRITE/READ OPERATION
0578 A          MONWMU   EQU   1400      MONITOR WARM UP TIME
0708 A          MTPWRT   EQU   1800      MONITOR & TAPE RECORD OUTPUT TIMEOUT
                *
                *     SATELLITE STATUS WORD EQUATES
                *
0004 A          SW1TRQ   EQU   4         TAPE REQUEST
0008 A          SW1MRQ   EQU   8         MONITOR REQUEST
0001 A          SW1WRS   EQU   1         W/R SEQUENCE
0020 A          SW1DTO   EQU   $20       DEVICE TIMEOUT
0010 A          SW1STO   EQU   $10       SOFTWARE TIMEOUT
                *
0002 A          SW2BTR   EQU   2         BAD TAPE REQUEST
0040 A          SW2TSC   EQU   $40       TAPE SEQUENCE COMPLETE
                *
                *     SATELLITE COMMAND EQUATES
                *
0010 A          SCDMTM   EQU   $10       MEMORY TO MONITOR
0008 A          SCDMTP   EQU   $08       MEMORY TO TAPE
                *
                *     SATELLITE COMMAND LENGTHS (IN BYTES)
                *
0011 A          SCLXMT   EQU   17        MEMORY TO TAPE XMIT
0003 A          SCLXMM   EQU   3         MEMORY TO MONITOR XMIT
0001 A          SCLRMM   EQU   1         MEMORY TO MONITOR RECEIVE
                *
                *     RTU CHANNEL STATUS EQUATES
                *
0040 A          RTUXME   EQU   $40       XMIT ERROR
0004 A          RTULCH   EQU   4         LAST RECORDING CHANNEL
0001 A          RTUCBL   EQU   1         BLASTER CHANNEL
                *
                *     TRACE IDENTIFICATION CODE EQUATES
                *
0001 A          TICNRM   EQU   1         NORMAL DATA
0003 A          TICSKP   EQU   3         DEAD TRACE
RL .TA(A0011.02.023AA  CRS DATA RECORDING ROUTINE)     08/04/78  13:03:08  PAGE   3

0005 A          TICBLT   EQU   5         BLASTER CHANNEL
                *
                *     LINE MODE EQUATES
                *
0010 A          LCAMDE   EQU   16        LINE MODE
0003 A          MODFIR   EQU   3         FIRE MODE
                *
                *     LINE STATUS FLAGS
                *
000C A          LCAST1   EQU   12        LINE STATUS FLAGS (BYTE 1)
0010 A          LSTTBP   EQU   $10       TAPE BY-PASS
0004 A          LSTEOT   EQU   4         END-OF-TAPE
                *
000E A          LCAST3   EQU   14        LINE STATUS FLAGS (BYTE 3)
0002 A          LS3NDR   EQU   2         NOISE DATA RECORDING
                *
000F A          LCAST4   EQU   15        LINE STATUS FLAGS (BYTE 4)
0080 A          LS4TIH   EQU   $80       TRACE IDENTIFICATION HEADER
0040 A          LS4DMH   EQU   $40       MONITOR HEADER
                *
```

```
                  *    SATELLITE XMIT BUFFER EQUATES FOR MEMORY TO TAPE FUNCTION
                  *
                  *  SXMTB1         CHANNEL ADDRESS
                  *  SXMTB2         # CHANNELS BETWEEN CURRENT CHANNEL AND BLASTER
                  *  SXMTB3         SEQUENCE # LINE
                  *  SXMTB7         SEQUENCE # REEL
                  *  SXTB11         RECORDING #
                  *  SXTB12         TAPE IDENTIFICATION CODE
                  *  SXTB14         RTU ADDRESS
                  *  SXTB16         CHANNEL NUMBER
                  *
                  *   CENTRAL RECORDING STATION DATA RECORDING ROUTINE
                  *
                  *         CALLING SEQUENCE:  JSR  RECDTA
                  *
                  *         XMTOTL => TOTAL # WORDS TO BE RECORDED
                  *         RECTMO => MONITOR TIMEOUT VALUE
                  *
0000 I              RECDTA  EQU    *
0000 I FE 0016 R            LDX    CURCSP
0003 I A6 0F                LDA A  LCAST4,X
0005 I 85 80                BIT A  #LS4TIH      SEND TRACE HEADER ?
0007 I 27 07                BEQ    RECA         NO
0009 I 84 7F                AND A  #-1-LS4TIH
000B I A7 0F                STA A  LCAST4,X     RESET INDICATOR
000D I BD 002F R            JSR    TIHOPT       SEND TRACE HEADER TO SATELLITE
0010 I FE 0016 R    RECA    LDX    CURCSP
0013 I A6 0F                LDA A  LCAST4,X
0015 I 85 40                BIT A  #LS4DMH      SEND MONITOR HEADER ?
0017 I 27 07                BEQ    RECB         NO
0019 I 84 BF                AND A  #-1-LS4DMH   RESET INDICATOR
001B I A7 0F                STA A  LCAST4,X
001D I BD 0030 R            JSR    MHDOPT       OUTPUT MONITOR HEADER TO SATELLITE
0020 I 86 09        RECB    LDA A  #SW1MRQ+SW1WRS
0022 I C6 10                LDA B  #SCDMTM      ANTICIPATE TAPE BY-PASS REQUEST
0024 I 37                   PSH B               SAVE SATELLITE COMMAND
0025 I FE 0016 R            LDX    CURCSP
0028 I E6 10                LDA B  LCAMDE,X

..DTA(A0011.02.023AA  CRS DATA RECORDING ROUTINE)     08/04/78  13:03:10  PAGE   4

02A I C1 03                 CMP B  #MODFIR      FIRE MODE ?
02C I 27 04                 BEQ    RECC         YES, SKIP TAPE BY-PASS CHECK
02E I E6 0C                 LDA B  LCAST1,X
030 I C5 10                 BIT B  #LSTTBP      TAPE BY-PASS SET ?
032 I 33            RECC    PUL B
033 I 26 18                 BNE    REC1         JUMP IF MONITOR ONLY REQUEST
035 I 8A 04                 ORA A  #SW1TRQ      SET TAPE REQUEST INDICATOR
037 I CA 08                 ORA B  #SCDMTP      INCLUDE MEMORY TO TAPE IN SATELLITE CO...
039 I B7 0001 D             STA A  RECTYP       SAVE SATELLITE REQUEST
03C I F7 0000 D             STA B  RECMDS       TYPE AND SATELLITE COMMAND
03F I 86 4C                 LDA A  #TRQCR2+TRQSTR+TRQWRT
041 I B7 000A R             STA A  STLTRT       SET TAPE REQUEST TYPE
044 I 86 02                 LDA A  #CMDWB       SET TAPE
046 I B7 000B R             STA A  STLTRC       UNIT COMMAND
049 I 86 11                 LDA A  #SCLXMT      SET # BYTES TO XMIT
04B I 20 08                 BRA    REC2
04D I B7 0001 D     REC1    STA A  RECTYP       SAVE SATELLITE REQUEST TYPE AND
050 I F7 0000 D             STA B  RECMDS       SATELLITE COMMAND
053 I 86 03                 LDA A  #SCLXMM      SET # BYTES TO XMIT
055 I B7 000E R     REC2    STA A  STLBXT
058 I 86 01                 LDA A  #SCLRMM      SET # BYTES
05A I F6 0000 D             LDA B  RECMDS
05D I C1 18                 CMP B  #SCDMTP+SCDMTMMEMORY TO YSAPE AND MONITOR COMMAND
05F I 26 01                 BNE    REC2A        NO
061 I 4C                    INC A               EXPECT TO RECEIVE 2 BYTES
062 I B7 000C R     REC2A   STA A  STLBRV       TO RECEIVE
065 I 86 05                 LDA A  #5           INIT CHANNEL
067 I B7 0018 R             STA A  CHNADR       ADDRESS
06A I CE 0011 R             LDX    #RMSKP4      INIT RECORDING MASK
06D I FF 0012 R             STX    NRMMPT       TABLE PNTR
070 I CE 0010 R             LDX    #RCTP12      INIT CHANNEL MAP
073 I FF 0013 R             STX    NRMCMP       TABLE PNTR
76 I 7A 0018 R      REC3    DEC    CHNADR       LAST CHANNEL PROCESSED
```

```
0079 I 26 1F                   BNE    RECD        NO, CONTINUE
007B I FE 0016 R               LDX    CURCSP
007E I E6 0C                   LDA B  LCAST1,X
0080 I A6 10                   LDA A  LCAMDE,X
0082 I 81 03                   CMP A  #MODFIR     FIRE MODE ?
0084 I 27 04                   BEQ    RECE        YES, GO CHECK EOT
0086 I C5 10                   BIT B  #LSTTBP     TAPE BY-PASS ?
0088 I 26 0F                   BNE    RECF        YES, SKIP EOT CHECK
008A I C5 04              RECE BIT B  #LSTEOT     END-OF-TAPE ?
008C I 27 0B                   BEQ    RECF        NO, RETURN TO CALLER
008E I CE 0222 I               LDX    #TPENTR     INFORM OPERATOR
0091 I FF 0023 R               STX    MSGRQT      OF END-OF-TAPE
0094 I C6 04                   LDA B  #MSGTRC     CONDITION
0096 I BD 003A R               JSR    MSGOUT      WAIT FOR OPERATOR TO HIT CONTINUE
0099 I 39                 RECF RTS
009A I FE 0013 R          RECD LDX    NRMCMP      SET CHANNEL MAP
009D I 09                      DEX                TABLE PNTR
009E I 09                      DEX                TO NEXT ENTRY
009F I 09                      DEX
00A0 I FF 0013 R               STX    NRMCMP
00A3 I FE 0012 R               LDX    NRMMPT      SET RECORDING
00A6 I 09                      DEX                MASK TABLE
00A7 I FF 0012 R               STX    NRMMPT      PNTR TO NEXT ENTRY
00AA I 6D 00                   TST    0,X         UNUSED CHANNEL ?
00AC I 27 C8                   BEQ    REC3        YES, CHECK NEXT CHANNEL

K..DTA(A0011.02.023AA  CRS DATA RECORDING ROUTINE)     08/04/78  13:03:11  PAGE   5

00AE I B6 0018 R               LDA A  CHNADR
00B1 I 4A                      DEC A
00B2 I FE 0016 R               LDX    CURCSP
00B5 I E6 0E                   LDA B  LCAST3,X
00B7 I C5 02                   BIT B  #LS3NDR     NOISE DATA RECORDING ?
00B9 I 27 02                   BEQ    RECG        NO, RECORDING START ADDR CORRECT
00BB I 8B 18                   ADD A  #24         SKIP NORMAL TEST DATA
00BD I B7 0000 R          RECG STA A  SXMTB1      SET RECORDING START ADDR IN SATELLITE B
00C0 I FE 0012 R               LDX    NRMMPT
00C3 I A6 00                   LDA A  0,X         SET RECORDING NUMBER
00C5 I B7 0004 R               STA A  SXTB11      IN SATELLITE BUFFER
00C8 I FE 0013 R               LDX    NRMCMP      PICK UP
00CB I A6 02                   LDA A  2,X         TYPE FLAGS
00CD I EE 00                   LDX    0,X         PICK UP ASSOCIATED STATION NUMBER
00CF I FF 0019 R               STX    STNADR
00D2 I CE 0708 A               LDX    #MTPWRT     ANTICIPATE NORMAL RECORD
00D5 I 85 04                   BIT A  #RTULCH     LAST CHANNEL ?
00D7 I 27 03                   BEQ    RECH        NO
00D9 I FE 0002 D               LDX    RECTMO      PICK UP RECORDING LENGTH
00DC I FF 000F R          RECH STX    STLBTV      SET REQUEST TIMEOUT VALUE
00DF I 36                      PSH A              SAVE TYPE FLAGS
00E0 I B6 0019 R               LDA A  STNADR      COMPUTE # STATIONS BETWEEN
00E3 I F6 001A R               LDA B  STNAD2      CURRENT STATION AND SHOT PT (ABSOLUTE VAL
00E6 I FE 0016 R               LDX    CURCSP
00E9 I E0 01                   SUB B  1,X
00EB I A2 00                   SBC A  0,X
00ED I 2C 01                   BGE    RECI
00EF I 50                      NEG B
00F0 I F7 0001 R          RECI STA B  SXMTB2      SAVE COMPUTED SLOPE VALUE
00F3 I BD 0031 R               JSR    ADPENT      PICK UP ASSOCIATED RTU AND CHANNEL ADDR
00F6 I F7 0007 R               STA B  SXTB16      MOVE CHANNEL ADDR INTO SATELLITE BUFFER
00F9 I CE 0006 R               LDX    #SXTB14
00FC I 6F 00                   CLR    0,X         MOVE RTU ADDR INTO
00FE I A7 01                   STA A  1,X         SATELLITE BUFFER
0100 I 32                      PUL A              RESTORE TYPE FLAGS
0101 I 85 40                   BIT A  #RTUXME     XMIT ERROR ?
0103 I 26 0D                   BNE    RECJ1       YES - RECORD AS DEAD CHANNEL
0105 I 84 03                   AND A  #3          MASK OFF LAST CHANNEL INDICATOR
0107 I C6 01                   LDA B  #TICNRM     ANTICIPATE NORMAL CHANNEL
0109 I 4D                      TST A              NORMAL CHANNEL ?
010A I 27 08                   BEQ    RECJ        YES
010C I C6 05                   LDA B  #TICBLT
010E I 81 01                   CMP A  #RTUCBL     BLASTER CHANNEL ?
0110 I 27 02                   BEQ    RECJ        YES
0112 I C6 03             RECJ1 LDA B  #TICSKP     SET DEAD CHANNEL TRACE ID CODE
0114 I CE 0005 R          RECJ LDX    #SXTB12
```

```
0117 I 6F 00        280          CLR    0,X
0119 I E7 01        281          STA B  1,X         SET TRACE IDENTIFICATION CODE
011B I FE 0020 R    282          LDX    XMTOTL
011E I FF 000D R    283          STX    STLBWT      SET # BYTES TO BE WRITTEN
0121 I B6 0000 D    284          LDA A  RECMDS      MEMORY TO TAPE ?
0124 I 85 08        285          BIT A  #SCDMTP
0126 I 27 1A        286          BEQ    REC8        NO
0128 I CE 0026 R    287          LDX    #TIHTNL     INCR TRACE
012B I FF 0014 R    288          STX    MVCSTR      SEQUENCE NUMBER
012E I BD 0032 R    289          JSR    EXTPRA      WITHIN LINE
0131 I CE 0027 R    290          LDX    #TIHTNR     INCR TRACE
0134 I BD 0032 R    291          JSR    EXTPRA      SEQUENCE # WITHIN REEL
RL.DTA(A0011.02.023AA  CRS DATA RECORDING ROUTINE)     08/04/78  13:03:12  PAGE   6

0137 I CE 0002 R    292          LDX    #SXMTB3
013A I FF 0015 R    293          STX    MVCDST      MOVE TRACE SEQUENCE #
013D I 86 08        294          LDA A  #8          WITHIN LINE & REEL
013F I BD 0033 R    295          JSR    MVCHAR      INTO XMIT BUFFER
0142 I 86 05        296 REC8     LDA A  #TPRTRY     RESET TAPE OUTPUT
0144 I B7 001F R    297          STA A  XMTRTY      RETRY COUNTER
0147 I B6 0001 D    298          LDA A  RECTYP      PICK UP SATELLITE
014A I F6 0000 D    299          LDA B  RECMDS      COMMAND & REQUEST TYPE
014D I 37           300 REC9     PSH B
014E I C6 11        301          LDA B  #SCLXMT
0150 I 85 04        302          BIT A  #SW1TRQ
0152 I 26 02        303          BNE    REC9C
0154 I C6 03        304          LDA B  #SCLXMM
0156 I F7 000E R    305 REC9C    STA B  STLBXT
0159 I 33           306          PUL B
015A I 36           307          PSH A
015B I 86 01        308          LDA A  #SCLRMM
015D I C1 18        309          CMP B  #SCDMTM+SCDMTP
015F I 26 01        310          BNE    REC9D
0161 I 4C           311          INC A
0162 I B7 000C R    312 REC9D    STA A  STLBRV
0165 I 32           313          PUL A
0166 I BD 0034 R    314          JSR    STLDVR      ISSUE SATELLITE REQUEST
0169 I B6 001B R    315          LDA A  STLSW1
016C I F6 001C R    316          LDA B  STLSW2
016F I 85 04        317          BIT A  #SW1TRQ     TAPE REQUEST ?
0171 I 27 09        318          BEQ    REC9B       NO-CONTNUE
0173 I 36           319          PSH A
0174 I B6 0025 R    320          LDA A  CASR1
0177 I 85 10        321          BIT A  #SFPRM      WRITE PROTECTED ?
0179 I 32           322          PUL A
017A I 26 04        323          BNE    REC9A       YES
017C I 85 10        324 REC9B    BIT A  #SW1STO     SATELLITE TIMEOUT ?
017E I 27 5C        325          BEQ    RECK        NO, CHECK TAPE UNIT
0180 I C5 40        326 REC9A    BIT B  #SW2TSC     TAPE SEQUENCE COMPLETE ?
0182 I 27 0D        327          BEQ    RECL        NO, SYSTEM ERROR
0184 I BD 0039 R    328          JSR    TPERCK      TAPE ERROR ?
0187 I 2A 08        329          BPL    RECL        NO
0189 I FE 0028 R    330          LDX    TAPERM
018C I 8C 002A R    331          CPX    #TPEFWP     FILE WRITE PROTECTED
018F I 27 68        332          BEQ    RECM        YES, INFORM OPERATOR
0191 I BD 002B R    333 RECL     JSR    SYSERR
0194 I 07           334          TPA
0195 I 36           335          PSH A              SAVE CONDITION CODE
0196 I CE 0024 R    336          LDX    #CLRDSP
0199 I BD 003B R    337          JSR    DISPLY      CLEAR DISPLAY
019C I 32           338          PUL A
019D I 06           339          TAP
019E I 26 0E        340          BNE    REC6        JUMP IF CONTINUE
01A0 I FE 0023 R    341          LDX    MSGRQT
01A3 I 8C 002D R    342          CPX    #SYRDDS     DATA DISPLAY ERROR
01A6 I 26 9A        343          BNE    REC8        NO
01A8 I C6 10        344          LDA B  #SCDMTM
01AA I 86 09        345          LDA A  #SW1WRS+SW1MRQDON'T WRITE TO TAPE ON RETRY
01AC I 20 9F        346          BRA    REC9
01AE I FE 0002 D    347 REC6     LDX    RECTMO
01B1 I BC 000F R    348          CPX    STLBTV      LAST CHANNEL OUTPUT
01B4 I 26 0C        349          BNE    REC6A       NO-CONTINUE
```

```
RECDTA(A0011.02.023AA  CRS DATA RECORDING ROUTINE)      08/04/78  13:03:13  PAGE   7

01B6 I FF 0021 R   350           STX    TMRBTV
01B9 I CE 0000 A   351           LDX    #0
01BC I FF 0022 R   352           STX    TMRBCA       DELAY FOR ALL CHANNELS
01BF I BD 002E R   353           JSR    TMRCDV       TO BE DISPLAYED
01C2 I F6 001B R   354 REC6A     LDA B  STLSW1
01C5 I C5 04       355           BIT B  #SW1TRQ      TAPE REQUEST ?
01C7 I 27 10       356           BEQ    RECN         NO, CHECK NEXT CHANNEL
01C9 I F6 001E R   357           LDA B  TAPST2       PICK UP TAPE STATUS FLAGS
01CC I C5 04       358           BIT B  #TW2EOT      END-OF-TAPE INDICATOR SET
01CE I 27 09       359           BEQ    RECN         NO, CHECK NEXT CHANNEL
01D0 I FE 0016 R   360           LDX    CURCSP
01D3 I A6 0C       361           LDA A  LCAST1,X
01D5 I 8A 04       362           ORA A  #LSTEOT      SET EOT FLAG
01D7 I A7 0C       363           STA A  LCAST1,X
01D9 I 7E 0076 I   364 RECN      JMP    REC3         GO CHECK NEXT CHANNEL
01DC I 85 20       365 RECK      BIT A  #SW1DTO      TAPE UNIT TIMEOUT ?
01DE I 26 04       366           BNE    RECO         YES
01E0 I C5 02       367           BIT B  #SW2BTR      BAD TAPE RECORD ?
01E2 I 27 CA       368           BEQ    REC6         NO, GOOD REQUEST COMPLETION
01E4 I BD 0039 R   369 RECO      JSR    TPERCK
01E7 I FE 0028 R   370           LDX    TAPERM
01EA I 8C 0029 R   371           CPX    #TPEBDB      BAD DATA BLOCK ?
01ED I 26 0A       372           BNE    RECM         NO, INFORM OPERATOR OF ERROR
01EF I 7A 001F R   373           DEC    XMTRTY       RETRIES EXHAUSTED ?
01F2 I 27 05       374           BEQ    RECM         YES, INFORM OPERATOR OF ERROR
01F4 I BD 0036 R   375           JSR    TCDBSR       BACKSPACE OVER BAD RECORD
01F7 I 20 22       376           BRA    RECP         RE-ISSUE REQUEST
01F9 I BD 0038 R   377 RECM      JSR    TIOCHK       INFORM OPERATOR OF ERROR
01FC I 07          378           TPA
01FD I 36          379           PSH A               SAVE CONDITION CODE
01FE I CE 0024 R   380           LDX    #CLRDSP
0201 I BD 003B R   381           JSR    DISPLY       CLEAR DISPLAY
0204 I 32          382           PUL A
0205 I 06          383           TAP
0206 I 26 A6       384           BNE    REC6         JUMP IF CONTINUE SPECIFIED
0208 I 86 05       385           LDA A  #TPRTRY      RESET RETRY
020A I B7 001F R   386           STA A  XMTRTY       COUNTER
020D I FE 0028 R   387           LDX    TAPERM
0210 I 8C 0029 R   388           CPX    #TPEBDB      BAD DATA BLOCK ?
0213 I 26 06       389           BNE    RECP         NO, RE-ISSUE REQUEST
0215 I BD 0036 R   390           JSR    TCDBSR       BACKSPACE OVER BAD DATA BLOCK
0218 I BD 0037 R   391           JSR    TCDERT
021B I C6 08       392 RECP      LDA B  #SCDMTP      SET SATELLITE COMMAND
021D I 86 05       393           LDA A  #SW1WRS+SW1TRQAND REQUEST TYPE
021F I 7E 014D I   394           JMP    REC9
                   395 *
                   396 *      MESSAGES FOR RECORDING ROUTINE
                   397 *
0222 I 544150      398 TPENTR    FCC    /TAPE END - MOUNT NEW REEL/
023B I 0D          399           FCB    $D
023C I 444550      400           FCC    /DEPRESS CONTINUE/
024C I 0D          401           FCB    $D,$D,$D,$D,4
024D I 0D
024E I 0D
024F I 0D
0250 I 04
                   402 *
0000 D             403           DSEC
RECDTA(A0011.02.023AA  CRS DATA RECORDING ROUTINE)      08/04/78  13:03:14  PAGE   8

                   404 *
                   405 *      STORAGE REQUIREMENTS FOR 'RECDTA
                   406 *
0000 D 00          407 RECMDS    FCB    0            SATELLITE COMMAND SAVE AREA
0001 D 00          408 RECTYP    FCB    0            SATELLITE REQUEST TYPE SAVE AREA
0002 D 0000    A   409 RECTMO    FDB    0            MONITOR TIMEOUT VALUE
0003 D             410 RECTM1    EQU    *-1
0004 D 0000    A   411 RECWPC    FDB    0            # WORDS PER CHANNEL
0006               412           END
```

```
RL.JDTA(A0011.02.023AA  CRS DATA RECORDING ROUTINE)      08/04/78  13:03:14  PAGE   9

   NO ERRORS
  ISECT LENGTH --    593
  DSECT LENGTH --      6

> ADPENT    0031        40     40    263
> CASR1     0025        27     27    320
> CHNADR    0018        18     18    203    208    234
> CLRDSP    0024        26     26    336    380
  CMDWB     0002 A      66    188
> CURCSP    0016        18     18    157    164    174    210    236    257    360
> DISPLY    003B        46     46    337    381
> EXTPRA    0032        41     41    289    291
  LCAMDE    0010 A     122    175    212
  LCAST1    000C A     127    178    211    361    363
  LCAST3    000E A     131    237
  LCAST4    000F A     134    158    162    165    169
  LS3NDR    0002 A     132    238
  LS4DMH    0040 A     136    166    168
  LS4TIH    0080 A     135    159    161
  LSTEOT    0004 A     129    217    362
  LSTTBP    0010 A     128    179    215
> MHDOPT    0030        39     39    170
  MODFIR    0003 A     123    176    213
  MONWMU    0578 A      83
> MSGOUT    003A        45     45    222
> MSGRQT    0023        25     25    220    341
  MSGTIP    0040 A      50
  MSGTRC    0004 A      51    221
  MTPWRT    0708 A      84    249
> MVCDST    0015        16     16    293
> MVCHAR    0033        41     41    295
> MVCSTR    0014        16     16    288
> NRMCMP    0013        14     14    207    224    228    245
> NRMMPT    0012        14     14    205    229    231    242
> RCTP12    0010        13     13    206
  REC1      004D I     192    181
  REC2      0055 I     195    191
  REC2A     0062 I     201    199
  REC3      0076 I     208    233    364
  REC6      01AE I     347    340    368    384
  REC6A     01C2 I     354    349
  REC8      0142 I     296    286    343
  REC9      014D I     300    346    394
  REC9A     0180 I     326    323
  REC9B     017C I     324    318
  REC9C     0156 I     305    303
  REC9D     0162 I     312    310
  RECA      0010 I     164    160
  RECB      0020 I     171    167
  RECC      0032 I     180    177
  RECD      009A I     224    209
< RECDTA    0000 I     156      5
  RECE      008A I     217    214
  RECF      0099 I     223    216    218
  RECG      00BD I     241    239
  RECH      00DC I     253    251
  RECI      00F0 I     262    260

RL.JDTA(A0011.02.023AA  CRS DATA RECORDING ROUTINE)      08/04/78  13:03:15  PAGE  10

  RECJ      0114 I     279    274    277
  RECJ1     0112 I     278    270
  RECK      01DC I     365    325
  RECL      0191 I     333    327    329
  RECM      01F9 I     377    332    372    374
  RECMDS    0000 D     407    185    193    197    284    299
  RECN      01D9 I     364    356    359
  RECO      01E4 I     369    366
  RECP      021B I     392    376    389
< RECTM1    0003 D     410      5
< RECTMO    0002 D     409      5    252    347
```

| | | | | | | | |
|---|---|---|---|---|---|---|---|
| RECTYP | 0001 D | 408 | 184 | 192 | 298 | | |
| RECWPC | 0004 D | 411 | | | | | |
| > RMSKP4 | 0011 | 13 | 13 | 204 | | | |
| > RTUADR | 0017 | 18 | 18 | | | | |
| RTUCBL | 0001 A | 112 | 276 | | | | |
| RTULCH | 0004 A | 111 | 250 | | | | |
| RTUXME | 0040 A | 110 | 269 | | | | |
| SCDMTM | 0010 A | 99 | 172 | 198 | 309 | 344 | |
| SCDMTP | 0008 A | 100 | 183 | 198 | 285 | 309 | 392 |
| SCLRMM | 0001 A | 106 | 196 | 308 | | | |
| SCLXMM | 0003 A | 105 | 194 | 304 | | | |
| SCLXMT | 0011 A | 104 | 190 | 301 | | | |
| SFPRM | 0010 A | 73 | 321 | | | | |
| > STLBCD | 0009 | 10 | 10 | | | | |
| > STLBRT | 0008 | 10 | 10 | | | | |
| > STLBRV | 000C | 11 | 11 | 201 | 312 | | |
| > STLBTV | 000F | 11 | 11 | 253 | 348 | | |
| > STLBWT | 000D | 11 | 11 | 283 | | | |
| > STLBXT | 000E | 11 | 11 | 195 | 305 | | |
| > STLDVR | 0034 | 42 | 42 | 314 | | | |
| > STLSW1 | 001B | 20 | 20 | 315 | 354 | | |
| > STLSW2 | 001C | 20 | 20 | 316 | | | |
| > STLTRC | 000B | 10 | 10 | 189 | | | |
| > STLTRT | 000A | 10 | 10 | 187 | | | |
| > STNAD2 | 001A | 18 | 18 | 256 | | | |
| > STNADR | 0019 | 18 | 18 | 248 | 255 | | |
| SW1DTO | 0020 A | 91 | 365 | | | | |
| SW1MRQ | 0008 A | 89 | 171 | 345 | | | |
| SW1STO | 0010 A | 92 | 324 | | | | |
| SW1TRQ | 0004 A | 88 | 182 | 302 | 317 | 355 | 393 |
| SW1WRS | 0001 A | 90 | 171 | 345 | 393 | | |
| SW2BTR | 0002 A | 94 | 367 | | | | |
| SW2TSC | 0040 A | 95 | 326 | | | | |
| > SXMTB1 | 0000 | 7 | 7 | 241 | | | |
| > SXMTB2 | 0001 | 7 | 7 | 262 | | | |
| > SXMTB3 | 0002 | 7 | 7 | 292 | | | |
| > SXMTB7 | 0003 | 7 | 7 | | | | |
| > SXTB11 | 0004 | 7 | 7 | 244 | | | |
| > SXTB12 | 0005 | 8 | 8 | 279 | | | |
| > SXTB14 | 0006 | 8 | 8 | 265 | | | |
| > SXTB16 | 0007 | 8 | 8 | 264 | | | |
| > SYRDDS | 002D | 35 | 35 | 342 | | | |
| > SYSERR | 002B | 33 | 33 | 333 | | | |
| > TAPDS1 | 002C | 34 | 34 | | | | |
| > TAPERM | 0028 | 31 | 31 | 330 | 370 | 387 | |
| > TAPST1 | 001D | 20 | 20 | | | | |
| > TAPST2 | 001E | 20 | 20 | 357 | | | |

| | | | | | | |
|---|---|---|---|---|---|---|
| > TCDBSP | 0036 | 43 | 43 | 375 | 390 | |
| > TCDEOF | 0035 | 43 | 43 | | | |
| > TCDERT | 0037 | 43 | 43 | 391 | | |
| TICBLT | 0005 A | 118 | 275 | | | |
| TICNRM | 0001 A | 116 | 272 | | | |
| TICSKP | 0003 A | 117 | 278 | | | |
| > TIHOPT | 002F | 39 | 39 | 163 | | |
| > TIHTNL | 0026 | 29 | 29 | 287 | | |
| > TIHTNR | 0027 | 29 | 29 | 290 | | |
| > TIOCHK | 0038 | 44 | 44 | 377 | | |
| > TMRBCA | 0022 | 23 | 23 | 352 | | |
| > TMRBTV | 0021 | 23 | 23 | 350 | | |
| > TMRCDV | 002E | 38 | 38 | 353 | | |
| > TPEBDB | 0029 | 32 | 32 | 371 | 388 | |
| > TPEFWP | 002A | 32 | 32 | 331 | | |
| TPENTR | 0222 I | 398 | 219 | | | |
| > TPERCK | 0039 | 44 | 44 | 328 | 369 | |
| TPRTRY | 0005 A | 78 | 296 | 385 | | |
| TRQCMD | 0002 A | 61 | | | | |
| TRQCR1 | 0080 A | 55 | | | | |
| TRQCR2 | 0040 A | 56 | 186 | | | |
| TRQSOP | 0010 A | 58 | | | | |
| TRQSSP | 0020 A | 57 | | | | |
| TRQSTR | 0008 A | 59 | 186 | | | |

```
  TRQSTS    0001 A    62
  TRQWRT    0004 A    60    186
  TTMOWR    01F4 A    82
  TW2EOF    0001 A    71
  TW2EOT    0004 A    70    358
> XMTOTL    0020      22     22   282
> XMTRTY    001F      22     22   297   373   386
```

```
TIHOPT(A0011.02.024AA  CRS TRACE ID HEADER ROUTINE)     08/04/78  10:03:09  PAGE   1

0000 I                2          ISEC
                      3 *
                      4          DEF     TIHOPT
                      5          DEF     TIHTNL,TIHTNR
                      6          DEF     TIHDBS,TIHESN
                      7 *
                      8          REF     CURCSP,SXMTBF,MVCDST,MVCSTR,FILENO
                      9          REF     FILEN1
                     10          REF     XMTOTL,XMTTL1
                     11          REF     CALYRS,CALDYR,CALHRS,CALMIN,CALSEC
                     12          REF     CALYR1,CALDY1,CALHR1,CALMN1,CALSC1
                     13          REF     STLSTH
                     14          REF     SXMTB1
                     15          REF     MSGRQT
                     16          REF     STLSW1
                     17          REF     SYSERR
                     18 *
                     19          REF     CLRCOR,MVCHAR,RTSTAT,TCVYRS,TCVDAY,TCVHRS
                     20          REF     TCVMIN,TCVSEC,STLCRQ
                     21          REF     MSGOUT
                     22 *
 0012 A              23 LCADTB   EQU     18            TIME BREAK
                     24 *
 000D A              25 LCAST2   EQU     13            STATUS FLAGS (BYTE 2)
 0004 A              26 LS2NTP   EQU     4             NORMAL TEST-IN-PROGRESS
 0002 A              27 LS2BTP   EQU     2             BLST TEST-IN-PROGRESS
 0001 A              28 LS2TSP   EQU     1             TILT SEARCH-IN-PROGRESS
                     29 *
 0010 A              30 LCAMDE   EQU     16            LINE MODE
 0004 A              31 MODTST   EQU     4             TEST MODE
                     32 *
 0010 A              33 STS2MS   EQU     $10           2 MSEC SAMPLE RATE
                     34 *
 0010 A              35 SW1STO   EQU     $10
                     36 *
 0004 A              37 MSGTRC   EQU     4             RETRY OR CONTINUE REQUEST
                     38 *
                     39 *
                     40 *
                     41 *
                     42 *     SATELLITE XMIT BUFFER EQUATES FOR TRACE IDENTIFICATION HEADER
                     43 *
 0001 A              44 SXBLSN   EQU     1             TRACE SEQ # WITHIN LINE 4 BYTES)
 0005 A              45 SXBRSN   EQU     5             TRACE SEQ # WITHIN REEL (4)
 0009 A              46 SXBFNM   EQU     9             FILE # (4)
 0010 A              47 SXBRCN   EQU     16            RECORDING # (1)
 0013 A              48 SXBESN   EQU     19            ENERGY SOURCE PT # (2)
 0017 A              49 SXBSPN   EQU     23            SHOT PT STATION # (2)
 001E A              50 SXBTIC   EQU     30            TRACE IDENTIFICATION CODE (2)
 0023 A              51 SXBDUS   EQU     35            DATA USE - PRODUCTION OR TEST (2)
 0033 A              52 SXBSDB   EQU     51            SOURCE DEPTH BELOW SURFACE (2)
 006B A              53 SXBTBD   EQU     107           TIME BREAK DIFFERENCE
 0073 A              54 SXBNST   EQU     115           # SAMPLES IN THIS TRACE (2)
 0075 A              55 SXBSIT   EQU     117           SAMPLE INTERVAL FOR THIS TRACE (2)
 0077 A              56 SXBGTI   EQU     119           GAIN TYPE OF FIELD INSTRUMENTS (2)
 0079 A              57 SXBIGC   EQU     121           INSTRUMENT GAIN CONSTANT (2)
 008D A              58 SXBAFF   EQU     141           ALIAS FILTER FREQUENCY (2)
 008F A              59 SXBAFS   EQU     143           ALIAS FILTER SLOPE (2)
TIHOPT(A0011.02.024AA  CRS TRACE ID HEADER ROUTINE)     08/04/78  10:03:10  PAGE   2

 0091 A              60 SXBNFF   EQU     145           NOTCH FILTER FREQUENCY
 009D A              61 SXBYRD   EQU     157           YEAR DATA RECORDED (2)
 009F A              62 SXBDOY   EQU     159           DAY OF YEAR (2)
 00A1 A              63 SXBHRS   EQU     161           HOUR OF DAY (2)
```

```
00A3 A              SXBMIN    EQU    163          MINUTE OF HOUR (2)
00A5 A              SXBSEC    EQU    165          SECOND OF MINUTE (2)
00A7 A              SXBTBC    EQU    167          TIME BASIS CODE (2)
00B6 A              SXBRTU    EQU    182          RTU #
00B8 A              SXBCHN    EQU    184          RTU CHANNEL #
                    *
                    *      TRACE HEADER DATA USE EQUATES
                    *
0001 A              THDPRD    EQU    1            PRODUCTION
0002 A              THDTST    EQU    2            NORMAL TEST
0004 A              THDPRF    EQU    4            PERFORMANCE TEST
                    *
                    *      TRACE IDENTIFICATION RECORD PARAMETER EQUATES
                    *
00F0 A              TIHHRL    EQU    240          TRACE IDENTIFICATION HEADER LENGTH
0003 A              TIHGTP    EQU    3            GAIN TYPE FIELD INSTRUMENTS
0040 A              TIHIGC    EQU    $40          INSTRUMENT GAIN CONSTANT
007C A              TIHAF2    EQU    124          ALIAS FILTER FREQUENCY (2 MSEC SAMPLE)
003E A              TIHAF4    EQU    62           ALIAS FILTER FREQUENCY (4 MSEC SAMPLE)
0048 A              TIHAFS    EQU    $48          ALIAS FILTER SLOPE
003C A              TIHNFF    EQU    60           NOTCH FILTER FREQUENCY
0001 A              TIHTBC    EQU    1            TIME BASIS CODE
                    *
                    *
                    *      ROUTINE TO SETUP AND OUTPUT TRACE IDENTIFICATION HEADER TO SATELLI
                    *
0000 I              TIHOPT    EQU    *
0000 I CE 0001 R              LDX    #SXMTBF      SET IDX TO START OF XMIT BUFFER
0003 I 86 F1                  LDA A  #241
0005 I BD 0017 R              JSR    CLRCOR       ZERO SATELLITE XMIT BUFFER
0008 I CE 0013 R              LDX    #SXMTB1      RESTORE BUFR INDEX
                    *
                    *      TRACE SEQUENCE NUMBER WITHIN LINE AND REEL
                    *
000B I FF 0002 R              STX    MVCDST
000E I CE 0000 D              LDX    #TIHTNL
0011 I FF 0003 R              STX    MVCSTR
0014 I 86 08                  LDA A  #8
0016 I BD 0018 R              JSR    MVCHAR
                    *
                    *      SET TIME BREAK DIFFERENCE
                    *
0019 I FE 0000 R              LDX    CURCSP
001C I A6 12                  LDA A  LCADTB,X
001E I CE 0001 R              LDX    #SXMTBF
0021 I A7 6C                  STA A  SXBTBD+1,X
                    *
                    *      FILE NUMBER
                    *
0023 I CE 0001 R              LDX    #SXMTBF      RESTORE BUFR INDEX
0026 I B6 0004 R              LDA A  FILENO
0029 I A7 0B                  STA A  SXBFNM+2,X
002B I F6 0005 R              LDA B  FILEN1
002E I E7 0C                  STA B  SXBFNM+3,X
TIHOPT(A0011.02.024AA  CRS TRACE ID HEADER ROUTINE)     08/04/78  10:03:11  PAGE   3

                    *
                    *      ENERGY SOURCE POINT NUMBER
                    *
0030 I B6 000E D              LDA A  TIHESN
0033 I F6 000F D              LDA B  TIHESN+1
0036 I A7 13                  STA A  SXBESN,X
0038 I E7 14                  STA B  SXBESN+1,X
                    *
                    *      SHOT POINT NUMBER
                    *
003A I FE 0000 R              LDX    CURCSP
003D I A6 00                  LDA A  0,X
003F I E6 01                  LDA B  1,X
0041 I CE 0001 R              LDX    #SXMTBF
0044 I A7 17                  STA A  SXBSPN,X
0046 I E7 18                  STA B  SXBSPN+1,X
                    *
                    *      DATA USE CODE
                    *
```

```
                   *      1 => PRODUCTION CODE
                   *      2 => TEST
                   *      4 => PERFORMANCE TEST
                   *
0048 I FE 0000 R             LDX    CURCSP
004B I A6 10                 LDA A  LCAMDE,X
004D I C6 01                 LDA B  #THDPRD
004F I 81 04                 CMP A  #MODTST
0051 I 26 0A                 BNE    TIH1
0053 I C6 02                 LDA B  #THDTST
0055 I A6 0D                 LDA A  LCAST2,X
0057 I 85 07                 BIT A  #LS2NTP+LS2BTP+LS2TSPTEST IN PROGRESS ?
0059 I 26 02                 BNE    TIH1          JUMP IF NOT PERFORMANCE TEST
005B I C6 04                 LDA B  #THDPRF       SET DATA USE CODE FOR PERFORMANDE TEST
005D I CE 0001 R     TIH1    LDX    #SXMTBF
0060 I E7 24                 STA B  SXBDUS+1,X
                   *
                   *      SOURCE DEPTH BELOW SURFACE
                   *
0062 I B6 0010 D             LDA A  TIHDBS
0065 I F6 0011 D             LDA B  TIHDBS+1
0068 I A7 33                 STA A  SXBSDB,X
006A I E7 34                 STA B  SXBSDB+1,X
                   *
                   *      SAMPLE INTERVAL FOR THIS TRACE
                   *
006C I 4F                    CLR A
006D I BD 0019 R             JSR    RTSTAT
0070 I C6 04                 LDA B  #4
0072 I 85 10                 BIT A  #STS2MS
0074 I 27 02                 BEQ    TIH2
0076 I C6 02                 LDA B  #2
0078 I E7 76         TIH2    STA B  SXBSIT+1,X
                   *
                   *      NUMBER OF SAMPLES IN THIS TRACE
                   *
007A I B6 0006 R             LDA A  XMTOTL
007D I F6 0007 R             LDA B  XMTTL1
0080 I 44                    LSR A
TIHOPT(A0011.02.024AA  CRS TRACE ID HEADER ROUTINE)     08/04/78  10:03:12  PAGE    4

0081 I 56                    ROR B
0082 I 44                    LSR A
0083 I 56                    ROR B
0084 I A7 73                 STA A  SXBNST,X
0086 I E7 74                 STA B  SXBNST+1,X
                   *
                   *      GAIN TYPE AND INSTRUMENT GAIN CONSTANT
                   *
0088 I 86 03                 LDA A  #TIHGTP
008A I A7 78                 STA A  SXBGTI+1,X   INSTRUMENT GAIN TYPE
008C I 86 40                 LDA A  #TIHIGC
008E I A7 7A                 STA A  SXBIGC+1,X   INSTRUMENT GAIN CONSTANT
                   *
                   *      ALIAS FILTER FREQUENCY
                   *
0090 I 4F                    CLR A
0091 I BD 0019 R             JSR    RTSTAT
0094 I C6 7C                 LDA B  #TIHAF2
0096 I 85 10                 BIT A  #STS2MS
0098 I 26 01                 BNE    TIH3
009A I 54                    LSR B
009B I E7 8E         TIH3    STA B  SXBAFF+1,X
                   *
                   *      ALIAS FILTER SLOPE
                   *
009D I 86 48                 LDA A  #TIHAFS
009F I A7 90                 STA A  SXBAFS+1,X
                   *
                   *      NOTCH FILTER FREQUENCY
00A1 I 86 3C                 LDA A  #TIHNFF
00A3 I A7 92                 STA A  SXBNFF+1,X
                   *
```

```
                         *       YEAR DATA RECORDED
                         *
00A5 I BD 001A R                  JSR    TCVYRS
00A8 I B6 0008 R                  LDA A  CALYRS
00AB I F6 000D R                  LDA B  CALYR1
00AE I CE 0001 R                  LDX    #SXMTBF
00B1 I A7 9D                      STA A  SXBYRD,X
00B3 I E7 9E                      STA B  SXBYRD+1,X
                         *
                         *       DAY OF YEAR
                         *
00B5 I BD 001B R                  JSR    TCVDAY
00B8 I B6 0009 R                  LDA A  CALDYR
00BB I F6 000E R                  LDA B  CALDY1
00BE I CE 0001 R                  LDX    #SXMTBF
00C1 I A7 9F                      STA A  SXBDOY,X
00C3 I E7 A0                      STA B  SXBDOY+1,X
                         *
                         *       HOUR OF DAY
                         *
00C5 I BD 001C R                  JSR    TCVHRS
00C8 I B6 000F R                  LDA A  CALHR1
00CB I CE 0001 R                  LDX    #SXMTBF
00CE I A7 A2                      STA A  SXBHRS+1,X
                         *
                         *       MINUTE OF HOUR
```

TIHOPT(A0011.02.024AA  CRS TRACE ID HEADER ROUTINE)     08/04/78  10:03:13  PAGE   5

```
                         *
00D0 I BD 001D R                  JSR    TCVMIN
00D3 I B6 0010 R                  LDA A  CALMN1
00D6 I CE 0001 R                  LDX    #SXMTBF
00D9 I A7 A4                      STA A  SXBMIN+1,X
                         *
                         *       SECOND OF MINUTE
                         *
00DB I BD 001E R                  JSR    TCVSEC
00DE I B6 0011 R                  LDA A  CALSC1
00E1 I CE 0001 R                  LDX    #SXMTBF
00E4 I A7 A6                      STA A  SXBSEC+1,X
                         *
                         *       TIME BASIS CODE
                         *
00E6 I 86 01                      LDA A  #TIHTBC
00E8 I A7 A8                      STA A  SXBTBC+1,X
                         *
                         *       OUTPUT TRACE IDENTIFICATION HEADER INFORMATION TO SATELLITE
                         *
00EA I CE 0012 R         TIH9     LDX    #STLSTH        SEND TRACE HEADER
00ED I BD 001F R                  JSR    STLCRQ         RECORD TO SATELLITE
00F0 I B6 0015 R                  LDA A  STLSW1
00F3 I 85 10                      BIT A  #SW1STO
00F5 I 27 05                      BEQ    TIH8
00F7 I BD 0016 R                  JSR    SYSERR
00FA I 27 EE                      BEQ    TIH9
                         *
00FC I 39                TIH8     RTS
0000 D                            DSEC
                         *
                         *       STORAGE REQUIREMENTS FOR 'TIHOPT'
                         *
0000 D                   TIHTNL   RMB    4              TRACE SEQUENCE # WITHIN LINE
0004 D                   TIHTNR   RMB    4              TRACE SEQUENCE # WITHIN REEL
0008 D                   TIHTIC   RMB    2              TRACE IDENTIFICATION CODE
000A D                   TIHRTU   RMB    2              RTU #
000C D                   TIHCHN   RMB    2              RTU CHANNEL #
000E D                   TIHESN   RMB    2              ENERGY SOURCE PT #
0010 D                   TIHDBS   RMB    2              SOURCE DEPTH BELOW SURFACE
0012                              END
```

TIHOPT(A0011.02.024AA  CRS TRACE ID HEADER ROUTINE)     08/04/78  10:03:14  PAGE   6

```
  NO ERRORS
 ISECT LENGTH --   253
 DSECT LENGTH --    18
```

```
> CALDY1    000E       12    12   221
> CALDYR    0009       11    11   220
> CALHR1    000F       12    12   229
> CALHRS    000A       11    11
> CALMIN    000B       11    11
> CALMN1    0010       12    12   236
> CALSC1    0011       12    12   243
> CALSEC    000C       11    11
> CALYR1    000D       12    12   212
> CALYRS    0008       11    11   211
> CLRCOR    0017       19    19    93
> CURCSP    0000        8     8   106   128   141
> FILEN1    0005        9     9   116
> FILENO    0004        8     8   114
  LCADTB    0012 A     23   107
  LCAMDE    0010 A     30   142
  LCAST2    000D A     25   147
  LS2BTP    0002 A     27   148
  LS2NTP    0004 A     26   148
  LS2TSP    0001 A     28   148
  MODTST    0004 A     31   144
> MSGOUT    0020       21    21
> MSGRQT    0014       15    15
  MSGTRC    0004 A     37
> MVCDST    0002        8     8    98
> MVCHAR    0018       19    19   102
> MVCSTR    0003        8     8   100
> RTSTAT    0019       19    19   164   192
> STLCRQ    001F       20    20   255
> STLSTH    0012       13    13   254
> STLSW1    0015       16    16   256
  STS2MS    0010 A     33   166   194
  SW1STO    0010 A     35   257
  SXBAFF    008D A     58   197
  SXBAFS    008F A     59   202
  SXBCHN    00B8 A     68
  SXBDOY    009F A     62   223   224
  SXBDUS    0023 A     51   152
  SXBESN    0013 A     48   123   124
  SXBFNM    0009 A     46   115   117
  SXBGTI    0077 A     56   185
  SXBHRS    00A1 A     63   231
  SXBIGC    0079 A     57   187
  SXBLSN    0001 A     44
  SXBMIN    00A3 A     64   238
  SXBNFF    0091 A     60   206
  SXBNST    0073 A     54   179   180
  SXBRCN    0010 A     47
  SXBRSN    0005 A     45
  SXBRTU    00B6 A     67
  SXBSDB    0033 A     52   158   159
  SXBSEC    00A5 A     65   245
  SXBSIT    0075 A     55   169
```

TIHOPT(A0011.02.024AA CRS TRACE ID HEADER ROUTINE) 08/04/78 10:03:15 PAGE 7

```
  SXBSPN    0017 A     49   132   133
  SXBTBC    00A7 A     66   250
  SXBTBD    006B A     53   109
  SXBTIC    001E A     50
  SXBYRD    009D A     61   214   215
> SXMTB1    0013       14    14    94
> SXMTBF    0001        8     8    91   108   113   131   151   213   222   230   237   244
> SYSERR    0016       17    17   259
> TCVDAY    001B       19    19   219
> TCVHRS    001C       19    19   228
> TCVMIN    001D       20    20   235
> TCVSEC    001E       20    20   242
> TCVYRS    001A       19    19   210
  THDPRD    0001 A     72   143
  THDPRF    0004 A     74   150
  THDTST    0002 A     73   146
  TIH1      005D I    151   145   149
  TIH2      0078 I    169   167
```

```
  TIH3      009B I   197    195
  TIH8      00FC I   262    258
  TIH9      00EA I   254    260
  TIHAF2    007C A    81    193
  TIHAF4    003E A    82
  TIHAFS    0048 A    83    201
  TIHCHN    000C D   271
< TIHDBS    0010 D   273      6   156   157
< TIHESN    000E D   272      6   121   122
  TIHGTP    0003 A    79    184
  TIHHRL    00F0 A    78
  TIHIGC    0040 A    80    186
  TIHNFF    003C A    84    205
< TIHOPT    0000 I    90      4
  TIHRTU    000A D   270
  TIHTBC    0001 A    85    249
  TIHTIC    0008 D   269
< TIHTNL    0000 D   267      5    99
< TIHTNR    0004 D   268      5
> XMTOTL    0006      10     10   173
> XMTTL1    0007      10     10   174
MHDOPT(A0011.02.025AA  CRS MONITOR HEADER ROUTINE)      08/04/78  10:04:31  PAGE   1

                     2 *
                     3 *      ROUTINE TO SETUP AND OUTPUT MONITOR HEADER
                     4 *
 0000 I              5            ISEC
                     6 *
                     7            DEF    MHDOPT
                     8            DEF    MHDPBK
                     9 *
                    10            REF    MVCDST,MVCSTR
                    11            REF    XMTOTL,XMTTL1
                    12            REF    SXMTB1,SXMTB2,SXMTB3,SXMTB4
                    13            REF    RMSKTB,RMSKTE,SXMTBF,STLSMH
                    14            REF    CURCSP,RMSKM1
                    15            REF    MSGRQT
                    16            REF    STLSW1
                    17            REF    SYSERR
                    18            REF    SRCVBF
                    19            REF    STLSMC
                    20            REF    MNHCHN
                    21            REF    SXMTB5,SXMTB6,SXMTB7
                    22            REF    NDMXM3
                    23            REF    TODHFN
                    24            REF    CURFNM
                    25 *
                    26            REF    RTSTAT,STLCRQ
                    27            REF    MSGOUT,IDXRTN,MVCHAR
                    28            REF    DSPDV2
                    29 *
                    30 *
 0010 A             31 LCAMDE     EQU    16          LINE MODE
 0003 A             32 MODFIR     EQU    3           FIRE MODE
                    33 *
                    34 *
 0010 A             35 SW1STO     EQU    $10         SOFTWARE TIMEOUT
                    36 *
                    37 *
 000C A             38 LCAST1     EQU    12          STATUS FLAGS (BYTE 1)
 0008 A             39 LSTCBP     EQU    8           CAMERA BY-PASS
 0002 A             40 LSTMMO     EQU    2           MULTIPLE MONITOR REQUEST
                    41 *
 000E A             42 LCAST3     EQU    14          STATUS FLAG (BYTE 2)
 0010 A             43 LS3STF     EQU    $10         SINGLE TEST FLAG
 0002 A             44 LS3NDR     EQU    2           NOISE DATA RECORDING
 0001 A             45 LS3TFP     EQU    1           TAPE FUNCTION IN PROGRESS
                    46 *
 0005 A             47 LCATRS     EQU    5           TOTAL # RECORDING STATIONS
                    48 *
 0004 A             49 MSGTRC     EQU    4           RETRY OR CONTINUE REQUEST
                    50 *
 0000 A             51 DTACAM     EQU    0           DATA TO CAMERA
```

```
0040 A             DTASCP    EQU    $40          DATA TO SCOPE
                   *
000A A             SCLXMC    EQU    10           # BYTES TO OUTPUT FOR LOW CUT FILTER PARAMT
                   *
                   *
0010 A             STS2MS    EQU    $10          2 MSEC SAMPLE RATE
                   *
0000 I             MHDOPT    EQU    *
MHDOPT(A0011.02.025AA  CRS MONITOR HEADER ROUTINE)       08/04/78  10:04:32  PAGE   2

0000 I FE 000C R             LDX    CURCSP
0003 I A6 05                 LDA A  LCATRS,X     SET UP #
0005 I E6 10                 LDA B  LCAMDE,X
0007 I C1 03                 CMP B  #MODFIR      FIRE
0009 I 27 17                 BEQ    MHD2         YES
000B I E6 0E                 LDA B  LCAST3,X
000D I C5 10                 BIT B  #LS3STF      MULTIPLE TEST
000F I 27 11                 BEQ    MHD2         YES
0011 I 4F                    CLR A
0012 I CE 000D R             LDX    #RMSKM1      COMPUTE
0015 I 08          MHD4      INX
0016 I 8C 0009 R             CPX    #RMSKTE      # CHANNELS TO
0019 I 27 14                 BEQ    MHD3         RECORD
001B I E6 00                 LDA B  0,X
001D I 27 F6                 BEQ    MHD4
001F I 4C                    INC A
0020 I 20 F3                 BRA    MHD4
0022 I 4C          MHD2      INC A               CHANNELS TO
0023 I FE 000C R             LDX    CURCSP
0026 I E6 0C                 LDA B  LCAST1,X
0028 I C5 02                 BIT B  #LSTMMO
002A I 27 03                 BEQ    MHD3         JUMP IF NOT MULTIPLE MONITOR OUTPUT REQ
002C I B6 0013 R             LDA A  MNHCHN
002F I B7 0004 R   MHD3      STA A  SXMTB1       BE RECORDED
0032 I 4F                    CLR A
0033 I BD 001A R             JSR    RTSTAT
0036 I C6 02                 LDA B  #2
0038 I 85 10                 BIT A  #STS2MS
003A I 26 02                 BNE    MHD1
003C I C6 04                 LDA B  #4
003E I F7 0007 R   MHD1      STA B  SXMTB4       SET SAMPLE RATE
0041 I B6 0002 R             LDA A  XMTOTL
0044 I F6 0003 R             LDA B  XMTTL1
0047 I 44                    LSR A
0048 I 56                    ROR B
0049 I 44                    LSR A
004A I 56                    ROR B
004B I F7 0006 R             STA B  SXMTB3       SET # WORDS PER CHANNEL
004E I             MHDPBK    EQU    *
004E I 36                    PSH A               SAVE UPPER BYTE OF # WORDS/CHANNEL
004F I FE 000C R             LDX    CURCSP
0052 I E6 0E                 LDA B  LCAST3,X
0054 I 86 40                 LDA A  #DTASCP      ANTICIPATE SCOPE DISPLAY
0056 I C5 02                 BIT B  #LS3NDR      NOISE DATA RECORDING ?
0058 I 26 08                 BNE    MHD5         YES, ROUTE DATA TO SCOPE
005A I E6 0C                 LDA B  LCAST1,X
005C I C5 08                 BIT B  #LSTCBP      CAMERA BY-PASS ?
005E I 26 02                 BNE    MHD5         YES, ROUTE DATA TO SCOPE
0060 I 86 00                 LDA A  #DTACAM      ROUTE DATA TO CAMERA
0062 I 33          MHD5      PUL B               INCLUDE DATA CONTROL
0063 I 1B                    ABA                 IN WORDS PER CHANNEL
0064 I B7 0005 R             STA A  SXMTB2
                   *
0067 I FE 000C R             LDX    CURCSP
006A I A6 0E                 LDA A  LCAST3,X
006C I CE 0018 R             LDX    #TODHFN
006F I 85 01                 BIT A  #LS3TFF
0071 I 27 09                 BEQ    MHD5A        JUMP IF NOT TAPE SEARCH FUCNTION
MHDOPT(A0011.02.025AA  CRS MONITOR HEADER ROUTINE)       08/04/78  10:04:33  PAGE   3

0073 I CE 0019 R             LDX    #CURFNM
0076 I BD 001F R             JSR    DSPDV2
0079 I CE 0017 R             LDX    #NDMXM3
```

```
007C I A6 00        121 MHD5A     LDA A  0,X
007E I 84 0F        122           AND A  #$F
0080 I B7 0014 R    123           STA A  SXMTB5
0083 I A6 01        124           LDA A  1,X
0085 I 84 0F        125           AND A  #$F
0087 I B7 0015 R    126           STA A  SXMTB6
008A I A6 02        127           LDA A  2,X
008C I 84 0F        128           AND A  #$F
008E I B7 0016 R    129           STA A  SXMTB7
                    130 *
0091 I CE 000B R    131 MHD7      LDX    #STLSMH
0094 I BD 001B R    132           JSR    STLCRQ
0097 I B6 000F R    133           LDA A  STLSW1
009A I 85 10        134           BIT A  #SW1STO     TIMEOUT ?
009C I 27 05        135           BEQ    MHD6        NO, SEND LOW CUT FILTER PARAMTERS
009E I BD 0010 R    136           JSR    SYSERR
00A1 I 27 EE        137           BEQ    MHD7        JUMP IF RETRY
00A3 I CE 00E4 I    138 MHD6      LDX    #LCFCTB     SELECT 2 OR 4 MSEC INDEX INTO FILTER TABLE
00A6 I F6 0007 R    139           LDA B  SXMTB4
00A9 I C1 02        140           CMP B  #2          2 MSEC SAMPLE RATE
00AB I 27 02        141           BEQ    MHD8        YES
00AD I 08           142           INX
00AE I 08           143           INX                SELECT 4 MSEC INDEX
00AF I FF 0001 R    144 MHD8      STX    MVCSTR      SAVE INDEX
00B2 I B6 0011 R    145           LDA A  SRCVBF      PICK PARAMTER SELECT CODE
00B5 I 84 03        146           AND A  #3
00B7 I 48           147           ASL A
00B8 I 48           148           ASL A
00B9 I CE 0001 R    149           LDX    #MVCSTR
00BC I BD 001D R    150           JSR    IDXRTN
00BF I EE 00        151           LDX    0,X         PICK UP PNTR
00C1 I EE 00        152           LDX    0,X         TO PROPER PARAMETER TABLE
00C3 I FF 0001 R    153           STX    MVCSTR      SAVE PNTR
00C6 I 86 0A        154           LDA A  #SCLXMC
00C8 I CE 0004 R    155           LDX    #SXMTB1
00CB I FF 0000 R    156           STX    MVCDST
00CE I BD 001E R    157           JSR    MVCHAR      MOVE PARAMETERS INTO SATELLITE XMIT VUFFER
00D1 I CE 0012 R    158 MHDA      LDX    #STLSMC
00D4 I BD 001B R    159           JSR    STLCRQ      SEND LOW CUT FILTER PARAMTERS
00D7 I B6 000F R    160           LDA A  STLSW1
00DA I 85 10        161           BIT A  #SW1STO     TIMEOUT ?
00DC I 27 05        162           BEQ    MHD9        JUMP IF RTRY
00DE I BD 0010 R    163           JSR    SYSERR
00E1 I 27 EE        164           BEQ    MHDA        JUMP IF RETRY
00E3 I 39           165 MHD9      RTS                RETURN TO CALLER
                    166 *
                    167 *      LOW CUT DIGITAL FILTER PARAMETRS ACCESS TABLE
                    168 *
00E4 I              169 LCFCTB    EQU    *
00E4 I 00F4     I   170           FDB    FPMOT2      OUT (2 MSEC)
00E6 I 00F4     I   171           FDB    FPMOT4      OUT (4 MSEC)
00E8 I 00FE     I   172           FDB    FPM82       8 HZ (2 MSEC)
00EA I 0108     I   173           FDB    FPM84       8 HZ (4 MSEC)
00EC I 0112     I   174           FDB    FPM122      12 HZ (2 MSEC)
00EE I 011C     I   175           FDB    FPM124      12 HZ (4 MSEC)
MHDOPT(A0011.02.025AA  CRS MONITOR HEADER ROUTINE)      08/04/78  10:04:34  PAGE   4

00F0 I 0126     I   176           FDB    FPM182      18 HZ (2 MSEC)
00F2 I 0130     I   177           FDB    FPM184      18 HZ (4 MSEC)
                    178 *
                    179 *      OUT SELECT PARAMETERS (2 & 4 MSEC)
                    180 *
00F4 I              181 FPMOT2    EQU    *
00F4 I              182 FPMOT4    EQU    *
00F4 I 2000     A   183           FDB    $2000       K1'
00F6 I 2000     A   184           FDB    $2000       K2'
00F8 I 4000     A   185           FDB    $4000       K1
00FA I E000     A   186           FDB    $E000       K2
00FC I 2000     A   187           FDB    $2000       K3
                    188 *
                    189 *      8 HZ SELECTED PARAMETERS (2 MSEC)
                    190 *
00FE I              191 FPM82     EQU    *
```

```
00FE I 73BD     A   192            FDB    $73BD        K1'
0100 I 79DE     A   193            FDB    $79DE        K2'
0102 I 7945     A   194            FDB    $7945        K1
0104 I 8C3C     A   195            FDB    $8C3C        K2
0106 I 7993     A   196            FDB    $7993        K3
                    197 *
                    198 *      8 HZ  SELECTED PARAMETERS (4 MSEC)
                    199 *
0108 I              200 FPM84      EQU    *
0108 I 688B     A   201            FDB    $688B        K1'
010A I 7446     A   202            FDB    $7446        K2'
010C I 7209     A   203            FDB    $7209        K1
010E I 973E     A   204            FDB    $973E        K2
0110 I 7335     A   205            FDB    $7335        K3
                    206 *
                    207 *      12 HZ SELECTED PARAMETERS (2 MSEC)
                    208 *
0112 I              209 FPM122     EQU    *
0112 I 6E05     A   210            FDB    $6E05        K1'
0114 I 7703     A   211            FDB    $7703        K2'
0116 I 75B5     A   212            FDB    $75B5        K1
0118 I 91E3     A   213            FDB    $91E3        K2
011A I 7662     A   214            FDB    $7662        K3
                    215 *
                    216 *      12 HZ SELECTED PARAMETERS (4 MSEC)
                    217 *
011C I              218 FPM124     EQU    *
011C I 5E3B     A   219            FDB    $5E3B        K1'
011E I 6F1E     A   220            FDB    $6F1E        K2'
0120 I 6A6B     A   221            FDB    $6A6B        K1
0122 I A11B     A   222            FDB    $A11B        K2
0124 I 6CEF     A   223            FDB    $6CEF        K3
                    224 *
                    225 *      18 HZ SELECTED PARAMETERS (2 MSEC)
                    226 *
0126 I              227 FPM182     EQU    *
0126 I 65E4     A   228            FDB    $65E4        K1'
0128 I 72F2     A   229            FDB    $72F2        K2'
012A I 7029     A   230            FDB    $7029        K1
012C I 99C0     A   231            FDB    $99C0        K2
012E I 71A1     A   232            FDB    $71A1        K3
                    233 *
MHDOPT(A0011.02.025AA  CRS MONITOR HEADER ROUTINE)      08/04/78  10:04:36  PAGE   5

                    234 *      18 HZ SELECTED PARAMETERS (4 MSEC)
                    235 *
0130 I              236 FPM184     EQU    *
0130 I 501C     A   237            FDB    $501C        K1'
0132 I 680E     A   238            FDB    $680E        K2'
0134 I 5E7A     A   239            FDB    $5E7A        K1
0136 I ADEA     A   240            FDB    $ADEA        K2
0138 I 63C2     A   241            FDB    $63C2        K3
                    242 *
                    243 *
013A                244            END
MHDOPT(A0011.02.025AA  CRS MONITOR HEADER ROUTINE)      08/04/78  10:04:36  PAGE   6

   NO ERRORS
  ISECT LENGTH --   314
  DSECT LENGTH --     0

> CURCSP    000C       14      14     60     78    100    113
> CURFNM    0019       24      24    118
> DSPDV2    001F       28      28    119
  DTACAM    0000 A     51     108
  DTASCP    0040 A     52     102
  FPM122    0112 I    209     174
  FPM124    011C I    218     175
  FPM182    0126 I    227     176
  FPM184    0130 I    236     177
  FPM82     00FE I    191     172
  FPM84     0108 I    200     173
  FPMOT2    00F4 I    181     170
```

```
  FPMOT4    00F4 I   182     171
> IDXRTN    001D      27      27    150
  LCAMDE    0010 A    31      62
  LCAST1    000C A    38      79    105
  LCAST3    000E A    42      65    101    114
  LCATRS    0005 A    47      61
  LCFCTB    00E4 I   169     138
  LS3NDR    0002 A    44     103
  LS3STF    0010 A    43      66
  LS3TFP    0001 A    45     116
  LSTCBP    0008 A    39     106
  LSTMMO    0002 A    40      80
  MHD1      003E I    90      88
  MHD2      0022 I    77      64     67
  MHD3      002F I    83      72     81
  MHD4      0015 I    70      74     76
  MHD5      0062 I   109     104    107
  MHD5A     007C I   121     117
  MHD6      00A3 I   138     135
  MHD7      0091 I   131     137
  MHD8      00AF I   144     141
  MHD9      00E3 I   165     162
  MHDA      00D1 I   158     164
< MHDOPT    0000 I    59       7
< MHDPBK    004E I    98       8
> MNHCHN    0013      20      20     82
  MODFIR    0003 A    32      63
> MSGOUT    001C      27      27
> MSGRQT    000E      15      15
  MSGTRC    0004 A    49
> MVCDST    0000      10      10    156
> MVCHAR    001E      27      27    157
> MVCSTR    0001      10      10    144    149    153
> NDMXM3    0017      22      22    120
> RMSKM1    000D      14      14     69
> RMSKTB    0008      13      13
> RMSKTE    0009      13      13     71
> RTSTAT    001A      26      26     85
  SCLXMC    000A A    54     154
> SRCVBF    0011      18      18    145
> STLCRQ    001B      26      26    132    159
 MHDOPT(A0011.02.025AA  CRS MONITOR HEADER ROUTINE)        08/04/78  10:04:37  PAGE   7

> STLSMC    0012      19      19    158
> STLSMH    000B      13      13    131
> STLSW1    000F      16      16    133    160
  STS2MS    0010 A    57      87
  SW1STO    0010 A    35     134    161
> SXMTB1    0004      12      12     83    155
> SXMTB2    0005      12      12    111
> SXMTB3    0006      12      12     97
> SXMTB4    0007      12      12     90    139
> SXMTB5    0014      21      21    123
> SXMTB6    0015      21      21    126
> SXMTB7    0016      21      21    129
> SXMTBF    000A      13      13
> SYSERR    0010      17      17    136    163
> TODHFN    0018      23      23    115
> XMTOTL    0002      11      11     91
> XMTTL1    0003      11      11     92
TPCTRP(A0011.02.026AA  CRS TAPE CONTROL PANEL)          08/04/78  10:05:58  PAGE   1

 0000 I                  2          ISEC
                         3 *
                         4          DEF      DSPDVR,DSPDV2
                         5          DEF      UPDFLN
                         6          DEF      FILPST,FILPS1
                         7          DEF      TSBBEG
                         8          DEF      FILENO,FILEN1,FILTMP,TCPLIT
                         9          DEF      CURFNM
                        10          DEF      DXFRCP
                        11 *
                        12          REF      TCPDSP,TCPLED,TCPSWX
                        13          REF      TODHFN
```

```
                         14              REF     TCPFIL
                         15              REF     NUMD,MAXDG,NUMCHR,CHNPTR,CURCSP
                         16              REF     DECNUM,CNVPTR
                         17              REF     NDMXM1,NDMXM2,NDMXM3,NDMXM4
                         18              REF     MONSTS,DATMON
                         19 *
                         20              REF     BINDEC,DECBIN,LITOFF,LITEON,EXECTV
                         21              REF     TCDSOP,TCDDEN,TCDBSR,DISPLY,TSBSUB
                         22              REF     TCDSSP,TCDFFM
                         23              REF     WRHBEG,FWDBEG,REVBEG,BKSBEG
                         24              REF     DEPYX
                         25 *
                         26 *
                         27 *      LINE STATUS FLAGS
                         28 *
000D A                   29 LCAST2   EQU     13          LINE STATUS FLAGS (BYTE 2)
0004 A                   30 LS2TBP   EQU     4           TAPE BY-PASS SWITCH
                         31 *
000E A                   32 LCAST3   EQU     14
0001 A                   33 LS3TFP   EQU     1           TAPE SEARCH FUNCTION IN PROGRESS
0002 A                   34 LS3NDR   EQU     2           NOISE DATA ECORDING
                         35 *
                         36 *
                         37 *
0010 A                   38 AXLTNL   EQU     $10         TAPE NOT READY LITE
                         39 *
                         40 *
0000 A                   41 SCPRFS   EQU     0           SELECT RF SPECTRUM FOR SCOPE DISPLAY
0002 A                   42 SCPSDT   EQU     2           SELECT SEISMIC DATA FOR SCOPE DISPLAY
                         43 *
                         44 *
                         45 *      TAPE CONTROL PANEL DISPLAY DRIVER
                         46 *      UPDATES FILE DISPLAY FROM CURRENT CONTENTS OF LOC. FILENO
                         47 *      ALL REGISTERS ARE DESTROYED
                         48 *
0000 I CE 0002 D         49 DSPDVR   LDX     #FILENO     GET FILE NUMBER
0003 I                   50 DSPDV2   EQU     *
0003 I 86 03             51          LDA A   #3
0005 I C6 E7             52          LDA B   #$E7        THIS IS 999 IN BASE TEN
0007 I A1 00             53          CMP A   0,X         TEST FOR PROPER VALUE
0009 I 22 0A             54          BHI     DSPOK
000B I 25 04             55          BCS     DSPERR
000D I E1 01             56          CMP B   1,X
000F I 24 04             57          BCC     DSPOK
0011 I A7 00             58 DSPERR   STA A   0,X         SET TO 999
0013 I E7 01             59          STA B   1,X
TPCTRP(A0011.02.026AA  CRS TAPE CONTROL PANEL)       08/04/78  10:05:59  PAGE   2

0015 I BD 0012 R         60 DSPOK    JSR     BINDEC      CONVERT TO DECIMAL
0018 I CE 0000 R         61          LDX     #TCPDSP     POINT TO DISPLAY
001B I                   62 DSPK2    EQU     *
001B I C6 30             63          LDA B   #$30
001D I B6 000E R         64          LDA A   NDMXM3      OUTPUT THE THREE DIGITS
0020 I 8D 0B             65          BSR     DSPSUB
0022 I B6 000D R         66          LDA A   NDMXM2
0025 I 8D 06             67          BSR     DSPSUB
0027 I B6 000C R         68          LDA A   NDMXM1
002A I 8D 01             69          BSR     DSPSUB
002C I 39                70          RTS
002D I 11                71 DSPSUB   CBA                 DISPLAY SUBROUTINE
002E I 2E 01             72          BGT     DSPJ1
0030 I 17                73          TBA                 BLANK NON-DIGITS
0031 I A7 00             74 DSPJ1    STA A   0,X         OUTPUT THE VALUE
0033 I 08                75          INX
0034 I 39                76          RTS
                         77 *
                         78 *      ROUTINE TO UPDATE FILE NUMBER
                         79 *
0035 I                   80 UPDFLN   EQU     *
0035 I FE 0002 D         81          LDX     FILENO      INCR
0038 I 08                82          INX                 FILE
0039 I FF 0002 D         83          STX     FILENO      NUMBER
003C I FF 0005 D         84          STX     CURFNM      UPDATE CURRENT DISPLAYED FILE NUMBER
```

```
003F I 8D BF         85            BSR    DSPDVR       UPDATE FILE
0041 I CE 0003 R     86            LDX    #TODHFN      UPDATE FILE NUMBER SAVE AREA
0044 I B6 000E R     87            LDA A  NDMXM3
0047 I 8D E8         88            BSR    DSPJ1
0049 I B6 000D R     89            LDA A  NDMXM2
004C I 8D E3         90            BSR    DSPJ1
004E I B6 000C R     91            LDA A  NDMXM1
0051 I 8D DE         92            BSR    DSPJ1
0053 I 39            93            RTS                 DISPLAY
                     94 *
                     95 *      FILE PRESET FUNCTION
                     96 *
0054 I CE 0004 R     97 FILPST     LDX    #TCPFIL
0057 I 8D 03         98            BSR    FILPS1       SET FILE NUMBER
0059 I 7E 0016 R     99            JMP    EXECTV       INITIATE NEXT SEQUENCE
005C I              100 FILPS1     EQU    *
005C I 09           101            DEX
005D I FF 000A R    102            STX    DECNUM       POINT TO FIRST DIGIT - 1
0060 I 86 03        103            LDA A  #3
0062 I B7 0007 R    104            STA A  NUMCHR       CONVERT THREE DIGITS
0065 I CE 0002 D    105            LDX    #FILENO
0068 I FF 000B R    106            STX    CNVPTR       STORE IN FILENO
006B I BD 0013 R    107            JSR    DECBIN       CONVERT
006E I 8D 90        108            BSR    DSPDVR
0070 I CE 0003 R    109            LDX    #TODHFN      UPDATE FILE NUMBER SAVE AREA
0073 I 8D A6        110            BSR    DSPK2
0075 I FE 0002 D    111            LDX    FILENO
0078 I FF 0005 D    112            STX    CURFNM       UPDATE DISPLAYED FILE NUMBER
007B I 39           113            RTS
                    114 *      TAPE START BUTTON ROUTINE
007C I              115 TSBBEG     EQU    *
007C I FE 0009 R    116            LDX    CURCSP
007F I A6 0E        117            LDA A  LCAST3,X
TPCTRP(A0011.02.026AA  CRS TAPE CONTROL PANEL)          08/04/78  10:06:01  PAGE   3

0081 I 8A 01        118            ORA A  #LS3TFP      SET TAPE FUNCTION IN PROGRESS INDICATOR
0083 I 84 FD        119            AND A  #-1-LS3NDR   RESET NOISE DATA RECORDING FLAG
0085 I A7 0E        120            STA A  LCAST3,X
0087 I CE 0113 I    121            LDX    #TRQIPG
008A I BD 001A R    122            JSR    DISPLY
008D I B6 0010 R    123            LDA A  MONSTS
0090 I 84 FD        124            AND A  #-1-SCPSDT
0092 I B7 0010 R    125            STA A  MONSTS
0095 I B7 0011 R    126            STA A  DATMON
0098 I 86 01        127            LDA A  #1
009A I B7 0001 R    128            STA A  TCPLED       TURN ON 'ACTIVE' LIGHT
009D I BD 0017 R    129            JSR    TCDSOP       SET OPERATE POWER
00A0 I BD 0018 R    130            JSR    TCDDEN       DEVICE ENABLE TAPE MACHINE
00A3 I CE 00D9 I    131            LDX    #TSBTBL      POINT TO JUMP TABLE
00A6 I B6 0002 R    132            LDA A  TCPSWX       GET SWITCH
00A9 I C6 04        133            LDA B  #4           MAXIMUM FUNCTION COUNT
00AB I 44           134 TSBLP1     LSR A               LOCATE SWITCH POSITION
00AC I 25 07        135            BCS    TSBFUN
00AE I 5A           136            DEC B
00AF I 27 04        137            BEQ    TSBFUN
00B1 I 08           138            INX                 POINT TO NEXT TABLE ENTRY
00B2 I 08           139            INX
00B3 I 20 F6        140            BRA    TSBLP1
00B5 I EE 00        141 TSBFUN     LDX    0,X          PICK UP ADDRESS OF ROUTINE
00B7 I AD 00        142            JSR    0,X          PERFORM THE FUNCTION
00B9 I CE 0019 R    143 TSBLP2     LDX    #TCDBSR      BACKSPACE RECORD
00BC I BD 001B R    144            JSR    TSBSUB
00BF I 2E F8        145            BGT    TSBLP2
00C1 I BD 001C R    146 TSBLP3     JSR    TCDSSP       SET STANDBY POWER
00C4 I 7F 0001 R    147 TSBFIN     CLR    TCPLED       TURN OFF 'ACTIVE' LIGHT
00C7 I FE 0009 R    148            LDX    CURCSP
00CA I A6 0E        149            LDA A  LCAST3,X
00CC I 84 FE        150            AND A  #-1-LS3TFP   RESET TAPE SEARCH IN PROGRESS FLAG
00CE I A7 0E        151            STA A  LCAST3,X
00D0 I CE 00F3 I    152            LDX    #DXFRCP      TAPE CONTROL PANEL REQUEST
00D3 I BD 001A R    153            JSR    DISPLY
00D6 I 7E 0022 R    154            JMP    DEPYX        INITIATE NEXT SEQUENCE
00D9 I              155 TSBTBL     EQU    *
```

```
00D9 I 00E1     I   156          FDB    EOFBEG      END OF FILE
00DB I 0021     R   157          FDB    BKSBEG      BACKSPACE
00DD I 0020     R   158          FDB    REVBEG      REVERSE FILE NUMBER SEARCH
00DF I 001F     R   159          FDB    FWDBEG      FORWARD FIE NUMBER SEARCH
                    160 *
                    161 *       END DATA FUNCTION
                    162 *
00E1 I CE 001D R    163 EOFBEG   LDX    #TCDFFM
00E4 I BD 001B R    164          JSR    TSBSUB      FORWARD FILE MAPK
00E7 I 27 F8        165          BEQ    EOFBEG      JUMP IF RETRY
00E9 I BD 0000 I    166          JSR    DSPDVR
00EC I FE 0002 D    167          LDX    FILENO
00EF I FF 0005 D    168          STX    CURFNM
00F2 I 39           169 EOFEX    RTS                RETURN
00F3 I 544150       170 DXFRCP   FCC    /TAPE PANEL REQUEST COMPLETE/
010E I 0D           171          FCB    $D,$D,$D,$D,4
010F I 0D
0110 I 0D
0111 I 0D
0112 I 04
TPCTRP(A0011.02.026AA  CRS TAPE CONTROL PANEL)        08/04/78  10:06:02  PAGE   4

0113 I 544150       172 TRQIPG   FCC    /TAPE PANEL REQUEST-IN-PROGRESS/
0131 I 0D           173          FCB    $D,$D,$D,$D,4
0132 I 0D
0133 I 0D
0134 I 0D
0135 I 04
0000 D              174          DSEC
                    175 *
                    176 *       STORAGE REQUIREMENTS FOR 'DSPDVR'
                    177 *
0000 D 0000     A   178 FILTMP   FDB    0           TEMPORARY FILE NUMBER LOCATION
0002 D 0000     A   179 FILENO   FDB    0           TAPE FILE NUMBER
0003 D              180 FILEN1   EQU    *-1
0004 D 00           181 TCPLIT   FCB    0           TAPE CONTROL PANEL LIGHT IMAGE
0005 D 0000     A   182 CURFNM   FDB    0           CURRENT TAPE POSITION FILE NUMBER
0007                183          END
TPCTRP(A0011.02.026AA  CRS TAPE CONTROL PANEL)        08/04/78  10:06:02  PAGE   5

   NO ERRORS
  ISECT LENGTH --     310
  DSECT LENGTH --       7

  AXLTNL    0010 A    38
> BINDEC    0012      20    20    60
> BKSBEG    0021      23    23   157
> CHNPTR    0008      15    15
> CNVPTR    000B      16    16   106
> CURCSP    0009      15    15   116   148
< CURFNM    0005 D   182     9    84   112   168
> DATMON    0011      18    18   126
> DECBIN    0013      20    20   107
> DECNUM    000A      16    16   102
> DEPYX     0022      24    24   154
> DISPLY    001A      21    21   122   153
< DSPDV2    0003 I    50     4
< DSPDVR    0000 I    49     4    85   108   166
  DSPERR    0011 I    58    55
  DSPJ1     0031 I    74    72    88    90    92
  DSPK2     001B I    62   110
  DSPOK     0015 I    60    54    57
  DSPSUB    002D I    71    65    67    69
< DXFRCP    00F3 I   170    10   152
  EOFBEG    00E1 I   163   156   165
  EOFEX     00F2 I   169
> EXECTV    0016      20    20    99
< FILEN1    0003 D   180     8
< FILENO    0002 D   179     8    49    81    83   105   111   167
< FILPS1    005C I   100     6    98
< FILPST    0054 I    97     6
< FILTMP    0000 D   178     8
> FWDBEG    001F      23    23   159
  LCAST2    000D A    29
```

```
  LCAST3    000E A    32    117   120   149   151
> LITEON    0015      20     20
> LITOFF    0014      20     20
  LS2TBP    0004 A    30
  LS3NDR    0002 A    34    119
  LS3TFP    0001 A    33    118   150
> MAXDG     0006      15     15
> MONSTS    0010      18     18   123   125
> NDMXM1    000C      17     17    63    91
> NDMXM2    000D      17     17    66    89
> NDMXM3    000E      17     17    64    87
> NDMXM4    000F      17     17
> NUMCHR    0007      15     15   104
> NUMD      0005      15     15
> REVBEG    0020      23     23   158
  SCPRFS    0000 A    41
  SCPSDT    0002 A    42    124
> TCDBSR    0019      21     21   143
> TCDDEN    0018      21     21   130
> TCDFFM    001D      22     22   163
> TCDSOP    0017      21     21   129
> TCDSSP    001C      22     22   146
> TCPDSP    0000      12     12    61
TPCTRP(A0011 02.026AA  CRS TAPE CONTROL PANEL)          08/04/78  10:06:03  PAGE

> TCPFIL    0004      14     14    97
> TCPLED    0001      12     12   128   147
< TCPLIT    0004 D   181      8
> TCPSWX    0002      12     12   132
> TODHFN    0003      13     13    86   109
  TRQIPG    0113 I   172    121
< TSBBEG    007C I   115      7
  TSBFIN    00C4 I   147
  TSBFUN    00B5 I   141    135   137
  TSBLP1    00AB I   134    140
  TSBLP2    00B9 I   143    145
  TSBLP3    00C1 I   146
> TSBSUB    001B      21     21   144   164
  TSBTBL    00D9 I   155    131
< UPDFLN    0035 I    80      5
> WRHBEG    001E      23     23
WRHBEG(A0011.02.027AA  CRS WRITE REEL HEADER)           08/04/78  13:24:27  PAGE   1

                      2 *
                      3 *     ROUTINE TO WRITE TAPE REEL HEADER
                      4 *
0000 I                5          ISEC
                      6 *
                      7          DEF    WRHBEG
                      8          DEF    RELHDR
                      9          DEF    CPTRCL
                     10 *
                     11          REF    TSWNCT,TSWRLO
                     12          REF    SXMTBF,MSGRQT,DECNUM,NUMCHR,CNVPTR
                     13          REF    TSWSPR,TAPRQT,DEPSAR,NUMMSG
                     14          REF    TAPDS1,STLSRH,STLSW1
                     15          REF    SYSERR,CHRCNT,TIHTNR
                     16          REF    SXTB13,SXTB16
                     17          REF    SXMTB3,SXMTB7,SXTB11,SXTB14,SXTB18,SXTB21,SXTB26
                     18          REF    SXTB15,SXTB22
                     19          REF    CURCSP
                     20          REF    DXFRCP
                     21          REF    TAPST1
                     22          REF    CASR1
                     23 *
                     24          REF    EXECTV
                     25          REF    CLRCOR,MSGOUT,DECBIN,TAPDVR,STLCRQ
                     26          REF    TCDEOF,TPERCK,TIOCHK
                     27          REF    MX1000
                     28          REF    TCDSOP,TCDDEN,TCDSSP
                     29          REF    DISPLY
                     30          REF    TCDBSR
                     31 *
```

```
                        32 *       MESSAGE TYPE EQUATES
                        33 *
0040 A                  34 MSGTIP    EQU    $40          INPUT AND DISPLAY NEW VALUE
0004 A                  35 MSGTRC    EQU    4            RETRY OR CONTINUE REQUEST
                        36 *
0001 A                  37 TW1STS    EQU    1            STATUS REQUEST
0040 A                  38 SLDPT     EQU    $40          LOAD POINT
0010 A                  39 SW1STO    EQU    $10          SOFTWARE TIMEOUT
                        40 *
0010 A                  41 SFPRM     EQU    $10          FILE PROTECT RING MISSING
                        42 *
000C A                  43 LCAST1    EQU    12           LINE STATUS
0004 A                  44 LSTEOT    EQU    4            END-OF-TAPE
                        45 *
0000 I                  46 RELHDR    EQU    *
0000 I 8D 03            47           BSR    WRHBEG       WRITE REEL HEADER
0002 I 7E 0020 R        48           JMP    EXECTV       INITIATE NEXT SEQUENCE
                        49 *
0005 I                  50 WRHBEG    EQU    *
0005 I BD 002A R        51           JSR    TCDSOP       SET OPERATE POWER
0008 I BD 002B R        52           JSR    TCDDEN       DEVICE ENABLE
000B I FE 001C R        53           LDX    CURCSP
000E I A6 0C            54           LDA A  LCAST1,X
0010 I 84 FB            55           AND A  #-1-LSTEOT
0012 I A7 0C            56           STA A  LCAST1,X     RESET END-OF-TAPE INDICATOR
0014 I 86 F1            57           LDA A  #241
0016 I CE 0002 R        58           LDX    #SXMTBF      ZERO SATELLITE
0019 I BD 0021 R        59           JSR    CLRCOR       XMIT BUFFER
L  BEG(A0011.02.027AA  CRS WRITE REEL HEADER)              08/04/78  13:24:29  PAGE-  2

001C I CE 0142 I        60           LDX    #RIHJID
001F I FF 0003 R        61           STX    MSGRQT
0022 I C6 40            62           LDA B  #MSGTIP
0024 I BD 0022 R        63           JSR    MSGOUT       INPUT JOB IDENTIFICATION #
0027 I CE 0169 I        64           LDX    #RIHLNM      INPUT
002A I FF 0003 R        65           STX    MSGRQT       LINE
002D I C6 40            66           LDA B  #MSGTIP      NUMBER
002F I BD 0022 R        67           JSR    MSGOUT
0032 I CE 0180 I        68           LDX    #RIHRNM
0035 I FF 0003 R        69           STX    MSGRQT
0038 I C6 40            70           LDA B  #MSGTIP
003A I BD 0022 R        71           JSR    MSGOUT       INPUT REEL NUMBER
003D I CE 0000 R        72           LDX    #TSWNCT      SET UP #
0040 I 09               73           DEX
0041 I FF 0004 R        74           STX    DECNUM       OF DATA TRACES
0044 I CE 0011 R        75           LDX    #SXTB13      PER
0047 I FF 0006 R        76           STX    CNVPTR       RECORD
004A I 86 02            77           LDA A  #2
004C I B7 0005 R        78           STA A  NUMCHR
004F I BD 0023 R        79           JSR    DECBIN
0052 I 86 01            80           LDA A  #1
0054 I CE 0012 R        81           LDX    #SXTB16
0057 I A7 00            82           STA A  0,X          SET NUMBER OF AUXILIARY RECORDS
0059 I C6 04            83           LDA B  #4           ANTICIPATE 4 MSEC
005B I B6 0007 R        84           LDA A  TSWSPR       PICK UP SAMPLE RATE SETTING
005E I 11               85           CBA                 4 MSEC SAMPLE
005F I 2C 02            86           BGE    WRH3         YES
0061 I C6 02            87           LDA B  #2           2 MSEC SAMPLE
0063 I F7 0017 R        88 WRH3      STA B  SXTB18       SET SAMPLE INTERVAL
0066 I BD 00E9 I        89           JSR    CPTRCL       COMPUTE DATA LENGTH IN SEC
0069 I BD 0029 R        90           JSR    MX1000       CONVERT TO MSEC
006C I 44               91           LSR A
006D I 56               92           ROR B               DIVIDE BY 2 MSEC SAMPLE
006E I 36               93           PSH A
006F I B6 0017 R        94           LDA A  SXTB18
0072 I 81 02            95           CMP A  #2           2 MSEC SAMPLE SETTING
0074 I 32               96           PUL A
0075 I 27 02            97           BEQ    WRH4         YES
0077 I 44               98           LSR A
0078 I 56               99           ROR B
0079 I B7 0018 R       100 WRH4      STA A  SXTB21       SET # SAMPLES PER
007C I F7 001B R       101           STA B  SXTB22       DATA TRACE
007F I 86 01           102           LDA A  #1           SET DATA SAMPLE
0081 I B7 0019 R       103           STA A  SXTB26       FORMAT CODE
```

```
0084 I 86 01       104 WRH1     LDA A  #TW1STS
0086 I B7 0008 R   105          STA A  TAPRQT      INPUT STATUS
0089 I BD 0024 R   106          JSR    TAPDVR      FROM TAPE UNIT
008C I B6 000B R   107          LDA A  TAPDS1
008F I 85 40       108          BIT A  #SLDPT      TAPE AT LOAD PT
0091 I 26 0D       109          BNE    WRH6
0093 I CE 00F8 I   110          LDX    #TNTALP     TAPE NOT AT LOAD POINT
0096 I FF 0003 R   111          STX    MSGRQT
0099 I C6 04       112          LDA B  #MSGTRC
009B I BD 0022 R   113          JSR    MSGOUT
009E I 20 E4       114          BRA    WRH1
00A0 I CE 000C R   115 WRH6     LDX    #STLSRH     WRITE REEL
00A3 I BD 0025 R   116          JSR    STLCRQ      HEADER
00A6 I F6 001F R   117          LDA B  CASR1
 BEG(A0011.02.027AA  CRS WRITE REEL HEADER)           08/04/78  13:24:31  PAGE

00A9 I C5 10       118          BIT B  #SFPRM      WRITE PROTECETED ?
00AB I 26 0C       119          BNE    WRHA        YES
00AD I B6 000D R   120          LDA A  STLSW1
00B0 I 85 10       121          BIT A  #SW1STO     SATELLITE TIMEOUT
00B2 I 27 05       122          BEQ    WRHA        NO
00B4 I BD 000E R   123          JSR    SYSERR
00B7 I 27 CB       124          BEQ    WRH1        YES
00B9 I BD 0027 R   125 WRHA     JSR    TPERCK      ANY ERROR
00BC I 2A 05       126          BPL    WRH8        NO
00BE I BD 0028 R   127          JSR    TIOCHK      OUTPUT ERROR MESG
00C1 I 27 C1       128          BEQ    WRH1        RETRY
00C3 I BD 0026 R   129 WRH8     JSR    TCDEOF      WRITE FILE MARK
00C6 I 2A 05       130          BPL    WRH7        NO
00C8 I BD 0028 R   131          JSR    TIOCHK
00CB I 27 F6       132          BEQ    WRH8        JUMP IF RETRY
00CD I BD 002E R   133 WRH7     JSR    TCDBSR
00D0 I 2A 05       134          BPL    WRH7A
00D2 I BD 0028 R   135          JSR    TIOCHK
00D5 I 27 F6       136          BEQ    WRH7
00D7 I 86 04       137 WRH7A    LDA A  #4          RESET TRACE
00D9 I CE 0010 R   138          LDX    #TIHTNR     SEQUENCE #
00DC I BD 0021 R   139          JSR    CLRCOR      WITHIN REEL
00DF I BD 002C R   140          JSR    TCDSSP      SET STAND-BY POWER ON TPAE UNIT
00E2 I CE 001D R   141          LDX    #DXFRCP     INFORM OPERATOR OF COMPLETION
00E5 I BD 002D R   142          JSR    DISPLY
00E8 I 39          143          RTS
                   144 *
                   145 *      ROUTINE TO COMPUTE DATA RECORDING TIME
                   146 *
00E9 I             147 CPTRCL   EQU    *
00E9 I F6 0001 R   148          LDA B  TSWRLO      READ RECORD LENGTH
00EC I 26 03       149          BNE    CPTR1       FORCE 1 SEC IF ZERO
00EE I C6 01       150          LDA B  #1
00F0 I 39          151          RTS
00F1 I C1 06       152 CPTR1    CMP B  #6          FORCE 6 SECS IF > 6
00F3 I 2F 02       153          BLE    CPTR2
00F5 I C6 06       154          LDA B  #6
00F7 I 39          155 CPTR2    RTS
                   156 *
00F8 I 544150      157 TNTALP   FCC    /TAPE NOT AT LOAD POINT/
010E I 0D          158          FCB    $D
010F I 524557      159          FCC    /REWIND TAPE UNIT/
011F I 0D          160          FCB    $D
0120 I 504C41      161          FCC    /PLACE UNIT ON LINE/
0132 I 0D          162          FCB    $D
0133 I 505553      163          FCC    /PUSH CONTINUE/
0140 I 0D          164          FCB    $D
0141 I 04          165          FCB    4
0142 I 04          166 RIHJID   FCB    4
0143 I 01          167          FCB    1,26
0144 I 1A
0145 I 0013    R   168          FDB    SXMTB3
0147 I 4A4F42      169          FCC    /JOB IDENTIFICATION NUMBER/
0160 I 0D          170          FCB    $D,$E
0161 I 0E
0162 I 000A    R   171          FDB    NUMMSG
0164 I 0D          172          FCB    $D,$D,$D,$D,4
0165 I 0D
```

```
0166 I 0D
0167 I 0D
0168 I 04
0169 I 04          173 RIHLNM    FCB    4
016A I 02          174           FCB    2,13
016B I 0D
016C I 0014    R   175           FDB    SXMTB7
016E I 10          176           FCB    $10,2,0
016F I 02
0170 I 00
0171 I 4C494E      177           FCC    /LINE NUMBER/
017C I 0E          178           FCB    $E
017D I 000A    R   179           FDB    NUMMSG
017F I 04          180           FCB    4
0180 I 04          181 RIHRNM    FCB    4
0181 I 03          182           FCB    3,14
0182 I 0E
0183 I 0015    R   183           FDB    SXTB11
0185 I 10          184           FCB    $10,3,0
0186 I 03
0187 I 00
0188 I 524545      185           FCC    /REEL NUMBER/
0193 I 0E          186           FCB    $E
0194 I 000A    R   187           FDB    NUMMSG
0196 I 04          188           FCB    4
0197               189           END
```

```
  NO ERRORS
 ISECT LENGTH --   407
 DSECT LENGTH --     0

> CASR1     001F      22    22   117
> CHRCNT    000F      15    15
> CLRCOR    0021      25    25    59   139
> CNVPTR    0006      12    12    76
  CPTR1     00F1 I   152   149
  CPTR2     00F7 I   155   153
< CPTRCL    00E9 I   147     9    89
> CURCSP    001C      19    19    53
> DECBIN    0023      25    25    79
> DECNUM    0004      12    12    74
> DEPSAR    0009      13    13
> DISPLY    002D      29    29   142
> DXFRCP    001D      20    20   141
> EXECTV    0020      24    24    48
  LCAST1    000C A    43    54    56
  LSTEOT    0004 A    44    55
> MSGOUT    0022      25    25    63    67    71   113
> MSGRQT    0003      12    12    61    65    69   111
  MSGTIP    0040 A    34    62    66    70
  MSGTRC    0004 A    35   112
> MX1000    0029      27    27    90
> NUMCHR    0005      12    12    78
> NUMMSG    000A      13    13   171   179   187
< RELHDR    0000 I    46     8
  RIHJID    0142 I   166    60
  RIHLNM    0169 I   173    64
  RIHRNM    0180 I   181    68
  SFPRM     0010 A    41   118
  SLDPT     0040 A    38   108
> STLCRQ    0025      25    25   116
> STLSRH    000C      14    14   115
> STLSW1    000D      14    14   120
  SW1STO    0010 A    39   121
> SXMTB3    0013      17    17   168
> SXMTB7    0014      17    17   175
> SXMTBF    0002      12    12    58
> SXTB11    0015      17    17   183
> SXTB13    0011      16    16    75
> SXTB14    0016      17    17
> SXTB15    001A      18    18
```

```
> SXTB16    0012      16     16    81
> SXTB18    0017      17     17    88    94
> SXTB21    0018      17     17   100
> SXTB22    001B      18     18   101
> SXTB26    0019      17     17   103
> SYSERR    000E      15     15   123
> TAPDS1    000B      14     14   107
> TAPDVR    0024      25     25   106
> TAPRQT    0008      13     13   105
> TAPST1    001E      21     21
> TCDBSR    002E      30     30   133
> TCDDEN    002B      28     28    52
> TCDEOF    0026      26     26   129
```

```
> TCDSOP    002A      28     28    51
> TCDSSP    002C      28     28   140
> TIHTNR    0010      15     15   138
> TIOCHK    0028      26     26   127   131   135
  TNTALP    00F8 I   157    110
> TPERCK    0027      26     26   125
> TSWNCT    0000      11     11    72
> TSWRLO    0001      11     11   148
> TSWSPR    0007      13     13    84
  TW1STS    0001 A    37    104
  WRH1      0084 I   104    114   124   128
  WRH3      0063 I    88     86
  WRH4      0079 I   100     97
  WRH6      00A0 I   115    109
  WRH7      00CD I   133    130   136
  WRH7A     00D7 I   137    134
  WRH8      00C3 I   129    126   132
  WRHA      00B9 I   125    119   122
< WRHBEG    0005 I    50      7    47
```

```
              *
              *      CENTRAL RECORDING STATION PLAYBACK ROUTINES
              *
0000 I                   ISEC
              *
                         DEF    REVBEG
                         DEF    FWDBEG
                         DEF    BKSBEG
                         DEF    TSBSUB,TSBSB1
              *
                         REF    SRVB10,SRVB15,SRVB35,SRB114,SRB115,SRB117
                         REF    FILTMP,CURFNM
                         REF    SXMTBF,SXMTB1,SXMTB2,SXMTB3,SXMTB4
                         REF    DECNUM,NUMCHR,CNVPTR
                         REF    MSGRQT,NUMMSG,SYSERR
                         REF    TTMOWR
                         REF    STLBTV,STLBRV
                         REF    TCPTTM,TCPDTA
                         REF    TAPRQT,TAPDS1,TAPST2
                         REF    TCPFIL
                         REF    RECTM0,RECTM1
                         REF    MONCHN,MONSTS,DATMON
                         REF    CURCSP
                         REF    TMRBTV,TMRBCA
                         REF    STLBXT
                         REF    STLSW1
              *
                         REF    DLYRTN
                         REF    TCDFFM,TCDFSR,TCDBSR,TCDREW
                         REF    STLCRQ,STLDVR
                         REF    MSGOUT
                         REF    TPERCK,TIOCHK
                         REF    DMNINI,TMONOF
                         REF    DSPDV2
                         REF    MHDPBK
                         REF    TAPDVR,TMRCDV
                         REF    DECBIN
                         REF    TMONON
```

```
                  *
                  *
0003 A            SCLXMM   EQU    3             MEMORY TO MONITOR XMIT
0001 A            SCLRMM   EQU    1             MEMORY TO MONITOR RECEIVE
                  *
0010 A            SCDMTM   EQU    $10           MEMORY TO MONITOR COMMAND
                  *
0010 A            SW1STO   EQU    $10           SOFTWARE TIMEOUT
0008 A            SW1MRQ   EQU    8             MONITOR REQUEST
0001 A            SW1WRS   EQU    1             W/R SEQUENCE
                  *
0578 A            MONWMU   EQU    1400          MONITOR WARM UP TIME
                  *
000C A            LCAST1   EQU    12            LINE STATUS FLAGS (BYTE 1)
0008 A            LSTCBP   EQU    8             CAMERA BY-PASS
                  *
0E74 A            PDO2MS   EQU    2300+MONWMU   PERFORMANCE DATA OUTPUT TIME (2 MSEC)
1770 A            PDO4MS   EQU    4600+MONWMU   PERFORMANCE DATA OUTPUT TIME (4 MSEC)
                  *
0004 A            THDPRF   EQU    4             DATA USE CODE (PERFORMANCE TEST)
F..RTN(A0011.02.028AA  CRS TAPE PLAYBACK ROUTINE)     08/04/78  13:22:33  PAGE  2

                  *
0031 A            MONMAX   EQU    49            MAXIMUM # MONITOR OUTPUT CHANNELS
05DC A            MONWRT   EQU    1500          MONITOR OUTPUT TIMEOUT
                  *
2710 A            SCPTMO   EQU    10000         SCOPE DISPLAY DELAY TIME
0000 A            SCPRFS   EQU    0             SELECT RF SPECTRUM FOR SCOPE DISPLAY
0002 A            SCPSDT   EQU    2             SELECT SEISMIC DATA FOR SCOPE DISPLAY
                  *
0080 A            MSGTCV   EQU    $80           CONVERT AND DISPLAY OLD VALUE
0004 A            MSGTRC   EQU    4             RETRY OR CONTINUE REQUEST
                  *
0001 A            TRQSTS   EQU    1             STATUS REQUEST
0040 A            SLDPT    EQU    $40           LOAD POINT
0001 A            TW2EOF   EQU    1             FILE MARK DETECTED
                  *
0001 A            DUT4BT   EQU    1             4 BYTE WORDS
                  *
                  *
                  *       ROUTINE TO SEARCH BACKWARD FOR SPECIFIED FILE NUMBER
                  *
0000 I            REVBEG   EQU    *
0000 I CE 001B R           LDX    #TCPFIL       READ FILE THUMBWHEELS
0003 I 09                  DEX
0004 I FF 000D R           STX    DECNUM
0007 I 86 03               LDA A  #3            SETUP
0009 I B7 000E R           STA A  NUMCHR        CONVERSION
000C I CE 0006 R           LDX    #FILTMP       PARAMETERS
000F I FF 000F R           STX    CNVPTR
0012 I BD 0036 R           JSR    DECBIN        CONVERT SPECIFIED FILE NUMBER TO BINARY
0015 I CE 0029 R  REV1     LDX    #TCDBSR
0018 I BD 033D I           JSR    TSBSUB        BACKSPACE OVER PREVIOUS RECORD
001B I 27 F8               BEQ    REV1          JUMP IF RETRY
001D I B6 0019 R           LDA A  TAPDS1
0020 I 85 40               BIT A  #SLDPT        TAPE AT LOAD POINT
0022 I 27 17               BEQ    REV2          NO, CONTINUE SEARCH
0024 I CE 009E I  REV1A    LDX    #FNOTRL
0027 I FF 0010 R           STX    MSGRQT
002A I C6 80               LDA B  #MSGTCV
002C I BD 002D R           JSR    MSGOUT        INFORM OPERATOR FILE NOT FOUND
002F I CE 00C4 I           LDX    #FNFCNT
0032 I FF 0010 R           STX    MSGRQT
0035 I C6 04               LDA B  #MSGTRC
0037 I BD 002D R           JSR    MSGOUT
003A I 39                  RTS                  RETURN TO CALLER
003B I CE 0029 R  REV2     LDX    #TCDBSR
003E I BD 033D I           JSR    TSBSUB
0041 I 27 F8               BEQ    REV2
0043 I B6 0019 R           LDA A  TAPDS1
0046 I 85 40               BIT A  #SLDPT
0048 I 26 DA               BNE    REV1A
004A I BD 034B I           JSR    BKSRRD        INPUT RECORD FROM TAPE
004D I FE 0000 R           LDX    SRVB10        PICK UP FILE NUMBER FROM TAPE RECORD
```

```
0050 I BC 0007 R    112         CPX    CURFNM      MATCH DISPLAYED FILE ?
0053 I 27 09        113         BEQ    REV3        YES, CHECK IF FILE FOUND
0055 I FF 0007 R    114         STX    CURFNM      UPDATE DISPLAYED FILE
0058 I CE 0007 R    115         LDX    #CURFNM
005B I BD 0032 R    116         JSR    DSPDV2      UPDATE DISPLAY
005E I FE 0000 R    117 REV3    LDX    SRVB10
PB..<TN(A0011.02.028AA  CRS TAPE PLAYBACK ROUTINE)      08/04/78  13:22:34  PAGE   3

0061 I BC 0006 R    118         CPX    FILTMP      SPECIFIED FILE FOUND ?
0064 I 27 1B        119         BEQ    REV4        YES, POSITION TO LAST RECORD IN FILE
0066 I B6 0001 R    120         LDA A  SRVB15      PICK UP TRACE NUMBER
0069 I 81 FF        121         CMP A  #255        BLASTER CHANNEL
006B I 26 02        122         BNE    REV6        NO, SET BACKSPACE COUNT
006D I 86 02        123         LDA A  #2          SET BACKSPACE COUNT TO POSITION PAST BLASTR
006F I B7 0001 D    124 REV6    STA A  BKSCNT      SET BACKSPACE COUNT
0072 I CE 0029 R    125 REV5    LDX    #TCDBSR
0075 I BD 033D I    126         JSR    TSBSUB      POSITION REEL TO PREVIOUS FILE
0078 I 27 F8        127         BEQ    REV5        JUMP IF RETRY
007A I 7A 0001 D    128         DEC    BKSCNT      REEL POSITIONED TO PREVIOUS FILE
007D I 26 F3        129         BNE    REV5        NO, CONTINUE BACKSPACE
007F I 20 94        130         BRA    REV1        CHECK IF DESIRED FILE FOUND
0081 I BD 034B I    131 REV4    JSR    BKSRRD      INPUT NEXT TAPE RECORD
0084 I B6 001A R    132         LDA A  TAPST2
0087 I 85 01        133         BIT A  #TW2EOF     END-OF-FILE ?
0089 I 26 08        134         BNE    REV8        YES, OUTPUT FILE TO MONITOR
008B I FE 0000 R    135         LDX    SRVB10      PICK UP FILE NUMBER FROM TAPE RECORD
008E I BC 0006 R    136         CPX    FILTMP      REEL POSITIONED PAST LAST RECORD IN FILE ?
0091 I 27 EE        137         BEQ    REV4        NO
0093 I CE 0029 R    138 REV8    LDX    #TCDBSR
0096 I BD 033D I    139         JSR    TSBSUB
0099 I 27 F8        140         BEQ    REV8        JUMP IF RETRY
009B I 7E 01B9 I    141         JMP    BKSLO       OUTPUT FILE TO MONITOR
                    142 *
                    143 *     TAPE SEARCH MESSAGES
                    144 *
009E I 03           145 FNOTRL  FCB    3
009F I 02           146         FCB    2,12
00A0 I 0C
00A1 I 0006    R    147         FDB    FILTMP
00A3 I 10           148         FCB    $10,2,0
00A4 I 02
00A5 I 00
00A6 I 46494C       149         FCC    /FILE NUMBER/
00B1 I 0E           150         FCB    $E
00B2 I 0011    R    151         FDB    NUMMSG
00B4 I 10           152         FCB    $10,2,16
00B5 I 02
00B6 I 10
00B7 I 4E4F54       153         FCC    /NOT ON REEL/
00C2 I 0D           154         FCB    $D,4
00C3 I 04
00C4 I 10           155 FNFCNT  FCB    $10,3,0
00C5 I 03
00C6 I 00
00C7 I 444550       156         FCC    /DEPRESS CONTINUE/
00D7 I 0D           157         FCB    $D,4
00D8 I 04
                    158 *
                    159 *     ROUTINE TO SEARCH FORWARD FOR SPECIFIED FILE NUMBER
                    160 *
00D9 I              161 FWDBEG  EQU    *
00D9 I 86 01        162         LDA A  #TRQSTS
00DB I B7 0018 R    163         STA A  TAPRQT
00DE I BD 0034 R    164         JSR    TAPDVR      PICK UP TAPE UNIT STATUS
00E1 I B6 0019 R    165         LDA A  TAPDS1
00E4 I 85 40        166         BIT A  #SLDPT      TAPE UNIT AT LOAD POINT ?
-..KRTN(A0011.02.028AA  CRS TAPE PLAYBACK ROUTINE)      08/04/78  13:22:36  PAGE   4

00E6 I 27 06        167         BEQ    FWD1        NO, BEGIN SEARCH
00E8 I CE 0028 R    168         LDX    #TCDFSR
00EB I BD 033D I    169         JSR    TSBSUB      SKIP REEL HEADER
00EE I CE 0028 R    170 FWD1    LDX    #TCDFSR
00F1 I BD 033D I    171         JSR    TSBSUB
00F4 I 7F 0002 D    172         CLR    FILFLG      RESET FILE FOUND INDICATOR
```

```
00F7 I CE 001B R   173          LDX    #TCPFIL     READ FILE THUMBWHEELS
00FA I 09          174          DEX
00FB I FF 000D R   175          STX    DECNUM      SETUP
00FE I 86 03       176          LDA A  #3          CONVERSION
0100 I B7 000E R   177          STA A  NUMCHR      PARAMETERS
0103 I CE 0006 R   178          LDX    #FILTMP
0106 I FF 000F R   179          STX    CNVPTR
0109 I BD 0036 R   180          JSR    DECBIN      CONVERT FILE NUMBER TO SEACH FOR
010C I BD 034B I   181 FWD7     JSR    BKSRRD      INPUT NEXT RECORD FROM TAPE
010F I B6 001A R   182          LDA A  TAPST2
0112 I 85 01       183          BIT A  #TW2EOF     END-OF-FILE ENCOUNTERED ?
0114 I 27 27       184          BEQ    FWD2        NO, CONTINUE SEARCH
0116 I CE 0029 R   185 FWD3     LDX    #TCDBSR
0119 I BD 033D I   186          JSR    TSBSUB      BACKSPACE OVER FILE MARK
011C I 27 F8       187          BEQ    FWD3        JUMP IF RETRY
011E I 7D 0002 D   188          TST    FILFLG      FILE FOUND
0121 I 27 03       189          BEQ    FWD4        NO, INFORM OPERATOR
0123 I 7E 01B9 I   190          JMP    BKSLO
0126 I CE 009E I   191 FWD4     LDX    #FNOTRL
0129 I FF 0010 R   192          STX    MSGRQT
012C I C6 80       193          LDA B  #MSGTCV
012E I BD 002D R   194          JSR    MSGOUT      DISPLAY FILE NOT FOUND MESSAGE
0131 I CE 00C4 I   195          LDX    #FNFCNT
0134 I FF 0010 R   196          STX    MSGRQT
0137 I C6 04       197          LDA B  #MSGTRC
0139 I BD 002D R   198          JSR    MSGOUT
013C I 39          199          RTS                RETURN TO CALLER
013D I FE 0000 R   200 FWD2     LDX    SRVB10      PICK UP FILE NUMBER FROM TAPE RECORD
0140 I BC 0007 R   201          CPX    CURFNM      MATCH CURRENT DISPLAYED FILE ?
0143 I 27 0C       202          BEQ    FWD5        YES
0145 I FF 0007 R   203          STX    CURFNM      UPDATE DISPLAYED FILE NUMBER
0148 I CE 0007 R   204          LDX    #CURFNM
014B I BD 0032 R   205          JSR    DSPDV2      UPDATE DISPLAY
014E I FE 0007 R   206          LDX    CURFNM      RESTORE FILE NUMBER
0151 I 7D 0002 D   207 FWD5     TST    FILFLG      FILE FOUND ?
0154 I 26 0A       208          BNE    FWD6        YES
0156 I BC 0006 R   209          CPX    FILTMP      FILE MATCH SPECIFIED SEARCH FILE NUMBER ?
0159 I 26 B1       210          BNE    FWD7        NO, CONTINUE SEARCH
015B I 7C 0002 D   211          INC    FILFLG      MARK FILE FOUND
015E I 20 AC       212          BRA    FWD7
0160 I BC 0006 R   213 FWD6     CPX    FILTMP      LAST RECORD IN FILE ?
0163 I 27 A7       214          BEQ    FWD7        NO, CONTINUE POSITIONING TO LAST RECORD
0165 I 20 AF       215          BRA    FWD3
                   216 *
                   217 *     ROUTINE TO BACKSPACE AND DUMP FILE TO MONITOR
                   218 *
0167 I             219 BKSBEG   EQU    *
0167 I CE 0029 R   220          LDX    #TCDBSR
016A I BD 033D I   221          JSR    TSBSUB      BACKSPACE OVER LAST RECORD
016D I 27 F8       222          BEQ    BKSBEG      JUMP IF RETRY SPECIFIED
016F I B6 0019 R   223          LDA A  TAPDS1
0172 I 85 40       224          BIT A  #SLDPT      TAPE AT LOAD POINT
PL...TN(A0011.02.028AA  CRS TAPE PLAYBACK ROUTINE)     08/04/78  13:22:37  PAGE   5

0174 I 27 01       225          BEQ    BKS1        NO, CONTINUE
0176 I 39          226 BKS1A    RTS                RETURN TO CALLER
0177 I CE 0029 R   227 BKS1     LDX    #TCDBSR
017A I BD 033D I   228          JSR    TSBSUB
017D I 27 F8       229          BEQ    BKS1
017F I B6 0019 R   230          LDA A  TAPDS1
0182 I 85 40       231          BIT A  #SLDPT      TAPE AT LOAD POINT
0184 I 26 F0       232          BNE    BKS1A       YES
0186 I BD 034B I   233          JSR    BKSRRD      INPUT RECORD FROM TAPE
0189 I FE 0000 R   234          LDX    SRVB10      GET FILE NUMBER FROM TAPE RECORD
018C I BC 0007 R   235          CPX    CURFNM      FILE NUMBER MATCH DISPLAYED FILE NO.
018F I 26 05       236          BNE    BKS2        NO, POSITION TO LAST RECORD IN FILE
0191 I BD 0029 R   237          JSR    TCDBSR      BACKSPACE OVER THIS RECORD
0194 I 20 E1       238          BRA    BKS1        EXAMINE PREVIOUS RECORD
0196 I FF 0007 R   239 BKS2     STX    CURFNM      UPDATE DISPLAYED FILE NUMBER
0199 I CE 0007 R   240          LDX    #CURFNM
019C I BD 0032 R   241          JSR    DSPDV2      DISPLAY NEW FILE POSITION
019F I BD 034B I   242 BKS5     JSR    BKSRRD      INPUT NEXT RECORD
01A2 I B6 001A R   243          LDA A  TAPST2
01A5 I 85 01       244          BIT A  #TW2EOF     END-OF-FILE ENCOUNTERED ?
```

```
01A7 I 26 08        245           BNE   BKS3        YES, DUMP FILE TO MONITOR
01A9 I FE 0000 R    246           LDX   SRVB10      PICK UP FILE NUMBER FROM TAPE
01AC I BC 0007 R    247           CPX   CURFNM      NEW FILE ?
01AF I 27 EE        248           BEQ   BKS5        NO, CONTINUE UNTIL POSITIONED TO LAST RECOD
01B1 I BD 0029 R    249 BKS3      JSR   TCDBSR      BACKSPACE OVER LAST RECORD READ
01B4 I BD 033F I    250           JSR   TSBSB1      FILE NOW POSITIONED AFTER LAST RECORD
01B7 I 27 F8        251           BEQ   BKS3        JUMP IF RETRY SPECIFIED
01B9 I              252 BKSLO     EQU   *
01B9 I 7F 0002 D    253           CLR   FILFLG      RESET BLASTER INDICATOR
01BC I CE 0029 R    254 BKS7      LDX   #TCDBSR
01BF I BD 033D I    255           JSR   TSBSUB      BACKSPACE OVER LAST RECORD
01C2 I 27 F8        256           BEQ   BKS7        JUMP IF RETRY
01C4 I BD 034B I    257           JSR   BKSRRD      INPUT RECORD FROM TAPE
01C7 I FE 0000 R    258           LDX   SRVB10      PICK UP FILE NUMBER FROM TAPE
01CA I BC 0007 R    259           CPX   CURFNM      FILE MATCH DISPLAYED FILE NUMBER
01CD I 27 09        260           BEQ   BKS8        YES, CONTINUE
01CF I FF 0007 R    261           STX   CURFNM      UPDATE DISPLAYED FILE NUMBER
01D2 I CE 0007 R    262           LDX   #CURFNM
01D5 I BD 0032 R    263           JSR   DSPDV2      UPDATE DISPLAY
01D8 I B6 0001 R    264 BKS8      LDA A SRVB15      GET TRACE NUMBER FROM TAPE RECORD
01DB I 81 FF        265           CMP A #255        BLASTER CHANNEL ?
01DD I 26 0D        266           BNE   BKS9        NO
01DF I CE 0029 R    267 BKS8A     LDX   #TCDBSR
01E2 I BD 033D I    268           JSR   TSBSUB
01E5 I 27 F8        269           BEQ   BKS8A
01E7 I 7C 0002 D    270           INC   FILFLG      SET BLASTER INDICATOR
01EA I 20 D0        271           BRA   BKS7
01EC I B7 0001 D    272 BKS9      STA A BKSCNT      SAVE BACKSPACE COUNT
01EF I 7D 0002 D    273           TST   FILFLG      PRODUCTION DATA ?  (FIRE MODE)
01F2 I 27 01        274           BEQ   BKSA        NO, CONTINUE
01F4 I 4C           275           INC A             INCLUDE BLASTER RECORD IN OUTPUT RECORD CON
01F5 I 7C 0001 D    276 BKSA      INC   BKSCNT
01F8 I 4C           277           INC A
01F9 I B7 0000 D    278           STA A BKSTRC      SAVE # RECORDS TO BE RECORDED
01FC I CE 0029 R    279 BKSB      LDX   #TCDBSR
01FF I BD 033D I    280           JSR   TSBSUB
0202 I 27 F8        281           BEQ   BKSB        JUMP IF RETRY SPECIFIED
0204 I 7A 0001 D    282           DEC   BKSCNT      FILE POSITIONED ?
PL.RTN(A0011.02.028AA  CRS TAPE PLAYBACK ROUTINE)     08/04/78  13:22:39  PAGE   6

0207 I 26 F3        283           BNE   BKSB        NO, CONTINUE BACKSPACE
0209 I B6 0019 R    284           LDA A TAPDS1
020C I 85 40        285           BIT A #SLDPT
020E I 27 01        286           BEQ   BKSD
0210 I 39           287           RTS
0211 I BD 034B I    288 BKSD      JSR   BKSRRD      INPUT TAPE RECORD
0214 I FE 0000 R    289           LDX   SRVB10      PICK UP FILE NUMBER FROM TAPE RECORD
0217 I BC 0007 R    290           CPX   CURFNM      SAME FILE ?
021A I 27 05        291           BEQ   BKSC        YES, CHECK IF 1ST TRACE
021C I 7A 0000 D    292           DEC   BKSTRC      ADJUST # RECORDS TO BE OUTPUT TO MONITOR
021F I 20 F0        293           BRA   BKSD        FIND 1ST RECORD OF FILE
0221 I B6 0001 R    294 BKSC      LDA A SRVB15      PICK UP TRACE NUMBER FROM TAPE RECORD
0224 I 81 01        295           CMP A #1          1ST TRACE
0226 I 27 0E        296           BEQ   BKSE        YES, OUTPUT DATA TO MONITOR
0228 I 81 FF        297           CMP A #255        SHOT POINT
022A I 27 0A        298           BEQ   BKSE        YES
022C I 7C 0000 D    299           INC   BKSTRC      ADJUST # RECORDS TO BE RECORDED
022F I 86 02        300           LDA A #2          SET BACKSPACE COUNT
0231 I B7 0001 D    301           STA A BKSCNT
0234 I 20 C6        302           BRA   BKSB        FIND 1ST TRACE
0236 I BD 0031 R    303 BKSE      JSR   TMONOF
0239 I CE 0001 A    304           LDX   #1
023C I BD 0026 R    305           JSR   DLYRTN
023F I BD 0037 R    306           JSR   TMONON
0242 I FE 0021 R    307           LDX   CURCSP
0245 I A6 0C        308           LDA A LCAST1,X
0247 I 85 02        309           BIT A #LSTCBP     CAMERA BY-PASS ?
0249 I 27 0B        310           BEQ   BKSF        NO, DATA WILL BE OUTPUT TO MONITOR
024B I B6 001F R    311           LDA A MONSTS
024E I 8A 02        312           ORA A #SCPSDT     SELECT SEISMIC DATA FOR SCOPE DISPLAY
0250 I B7 001F R    313           STA A MONSTS
0253 I B7 0020 R    314           STA A DATMON      SETUP SCOPE DISPLAY
0256 I CE 0578 A    315 BKSF      LDX   #MONWMU     INITIALIZE LAST RECORD OUTPUT
0259 I FF 001C R    316           STX   RECTMO      TIME TO MONITOR WARM UP TIME
```

```
025C I B6 0005 R   317          LDA A  SRB117      PICK UP SAMPLE RATE FROM TAPE RECORD
025F I F6 0002 R   318          LDA B  SRVB35      PICK UP DATA USE CODE FROM TAPE RECORD
0262 I C1 04       319          CMP B  #THDPRF     PERFORMANCE TEST
0264 I 26 0F       320          BNE    BKSG        NO, COMPUTE OUTPUT TIME
0266 I CE 0E74 A   321          LDX    #PD02MS     ANTICIPATE 2 MSEC SAMPLE RATE
0269 I 81 02       322          CMP A  #2          2 MSEC SAMPLE RATE
026B I 27 03       323          BEQ    BKSH        YES
026D I CE 1770 A   324          LDX    #PD04MS     SET MONITOR OUTPUT TIME FOR 4 MSEC SAMPLE
0270 I FF 001C R   325 BKSH     STX    RECTM0      SET MONITOR OUTPUT TIME FOR LAST RECORD
0273 I 20 1F       326          BRA    BKSI        GO OUTPUT DATA
0275 I B6 0003 R   327 BKSG     LDA A  SRB114
0278 I F6 0004 R   328          LDA B  SRB115      PICK UP # SAMPLES IN THIS TRACE
027B I 58          329          ASL B
027C I 49          330          ROL A
027D I 36          331          PSH A
027E I B6 0005 R   332          LDA A  SRB117      PICK UP SAMPLE RATE
0281 I 81 02       333          CMP A  #2          2 MSEC SAMPLE RATE ?
0283 I 32          334          PUL A
0284 I 27 02       335          BEQ    BKSJ        YES
0286 I 58          336          ASL B              FINISH COMPUTING ACTUAL
0287 I 49          337          ROL A              DATA COLLECTION TIME
0288 I FB 001D R   338 BKSJ     ADD B  RECTM1
028B I F7 001D R   339          STA B  RECTM1
028E I B9 001C R   340          ADC A  RECTM0
PBKRTN(A0011.02.028AA  CRS TAPE PLAYBACK ROUTINE)      08/04/78  13:22:41  PAGE   7

0291 I B7 001C R   341          STA A  RECTM0      INCLUDE MONITOR WARM UP TIME
0294 I BD 0030 R   342 BKSI     JSR    DMNINI      INITIALIZE DATA MONITOR FOR OUTPUT
0297 I B6 0000 D   343          LDA A  BKSTRC      PICK UP REMAINING CHANNELS TO BE OUTPUT
029A I B7 001E R   344          STA A  MONCHN      ANTICIPATE LAST BLOCK OF OUTPUT
029D I 7F 0000 D   345          CLR    BKSTRC
02A0 I C6 31       346          LDA B  #MONMAX     PICK UP MAXIMUM NUMBER OF MONITOR CHANNELS
02A2 I 10          347          SBA                LAST BLOCK TO BE OUTPUT ?
02A3 I 25 06       348          BCS    BKSK        YES
02A5 I B7 0000 D   349          STA A  BKSTRC      SAVE # CHANNELS REMAINING TO BE OUTPUT
02A8 I F7 001E R   350          STA B  MONCHN      SET # CHANNELS TO OUTPUT TO MAXIMUM VALUE
02AB I B6 001E R   351 BKSK     LDA A  MONCHN
02AE I B7 0009 R   352          STA A  SXMTB1      SET # CHANNELS TO BE RECORDED
02B1 I FE 0003 R   353          LDX    SRB114
02B4 I FF 000A R   354          STX    SXMTB2      SET # WORDS PER CHANNEL
02B7 I B6 0005 R   355          LDA A  SRB117
02BA I B7 000C R   356          STA A  SXMTB4      SET SAMPLE RATE
02BD I B6 000A R   357          LDA A  SXMTB2
02C0 I BD 0033 R   358          JSR    MHDPBK      OUTPUT MONITOR HEADER
02C3 I 7A 001E R   359 BKSL     DEC    MONCHN      DECR # CHANNELS TO BE OUTPUT
02C6 I 86 03       360          LDA A  #SCLXMM
02C8 I B7 0024 R   361          STA A  STLBXT      SET # BYTES TO TRANSMIT
02CB I 86 01       362          LDA A  #SCLRMM
02CD I B7 0015 R   363          STA A  STLBRV      SET # BYTES TO RECEIVE
02D0 I CE 05DC A   364          LDX    #MONWRT     ANTICIPATE NORMAL CHANNEL
02D3 I 7D 001E R   365          TST    MONCHN      LAST CHANNEL ?
02D6 I 26 03       366          BNE    BKSN        NO
02D8 I FE 001C R   367          LDX    RECTM0      SETUP OUTPUT TIME FOR LAST CHANNEL
02DB I FF 0014 R   368 BKSN     STX    STLBTV
02DE I 86 3C       369          LDA A  #60
02E0 I B7 0009 R   370          STA A  SXMTB1      SKIP TRACE HEADER
02E3 I 86 09       371 BKSP     LDA A  #SW1MRQ+SW1WRSSET REQUEST TYPE
02E5 I C6 10       372          LDA B  #SCDMTM     SET SATELLITE COMMAND
02E7 I BD 002C R   373          JSR    STLDVR      OUTPUT RECORD TO MONITOR
02EA I B6 0025 R   374          LDA A  STLSW1
02ED I 85 10       375          BIT A  #SW1STO     TIMEOUT ?
02EF I 27 05       376          BEQ    BKSO        NO
02F1 I BD 0012 R   377          JSR    SYSERR
02F4 I 27 ED       378          BEQ    BKSP        JUMP IF RETRY SPECIFIED
02F6 I 7D 001E R   379 BKSO     TST    MONCHN      LAST CHANNEL OUTPUT
02F9 I 27 04       380          BEQ    BKSQ        YES, CHECK FOR ANY REMAINING CHANNELS
02FB I 8D 4E       381          BSR    BKSRRD      INPUT NEXT RECORD FROM TAPE
02FD I 20 C4       382          BRA    BKSL        GO OUTPUT TAPE TO MONITOR
02FF I FE 001C R   383 BKSQ     LDX    RECTM0      DELAY UNTIL
0302 I FF 0022 R   384          STX    TMRBTV      ALL CHARACTERS
0305 I CE 0000 A   385          LDX    #0          OUTPUT TO
0308 I FF 0023 R   386          STX    TMRBCA      DATA
030B I BD 0035 R   387          JSR    TMRCDV      DISPLAY
030E I FE 0021 R   388          LDX    CURCSP
```

```
0311 I E6 0C        389           LDA B  LCAST1,X
0313 I B6 0000 D    390           LDA A  BKSTRC      ANY CHANNELS REMAINING TO BE OUTPUT
0316 I 27 16        391           BEQ    BKSR
0318 I C5 08        392           BIT B  #LSTCBP     CAMERA BY-PASS ?
031A I 27 0F        393           BEQ    BKST        NO
031C I CE 0000 A    394           LDX    #0
031F I FF 0023 R    395           STX    TMRBCA      CLEAR TIMER COMPLETION ADDR
0322 I CE 2710 A    396           LDX    #SCPTMO
0325 I FF 0022 R    397           STX    TMRBTV
0328 I BD 0035 R    398           JSR    TMRCDV      DELAY TO ALLOW OPERATOR TO VIEW SCOPE
PBKRTN(A0011 02.028AA  CRS TAPE PLAYBACK ROUTINE)      08/04/78  13:22:42  PAGE   8

032B I 7E 0294 I    399 BKST      JMP    BKSI        GO OUTPUT NEXT BLOCK OF RECORDS
032E I C5 08        400 BKSR      BIT B  #LSTCBP     CAMERA BY-PASS ?
0330 I 26 03        401           BNE    BKSS        YES
0332 I BD 0031 R    402           JSR    TMONOF      TURN OFF CCD CLOCK START
0335 I FE 0007 R    403 BKSS      LDX    CURFNM
0338 I 08           404           INX                SET CURRENT FILE NUMBER
0339 I FF 0007 R    405           STX    CURFNM      TO NEXT FILE
033C I 39           406           RTS                RETURN TO CALLER
                    407 *
                    408 *      TAPE CONTROL ERROR CHECKING ROUTINE
                    409 *
033D I              410 TSBSUB    EQU    *
033D I AD 00        411           JSR    0,X         PERFORM FUNCTION
033F I              412 TSBSB1    EQU    *
033F I BD 002E R    413           JSR    TPERCK      CHECK FOR ANY ERRORS ?
0342 I 2A 04        414           BPL    TSB1        NO
0344 I BD 002F R    415           JSR    TIOCHK      NOTIFY OPERATOR OF ERROR
0347 I 39           416           RTS
0348 I 86 FF        417 TSB1      LDA A  #-1         MARK NO ERROR INDICATOR
034A I 39           418           RTS                RETURN TO CALLER
                    419 *
                    420 *      ROUTINE TO READ RECORD FROM TAPE AND INPUT TRACE HEADER
                    421 *
034B I              422 BKSRRD    EQU    *
034B I CE 0016 R    423 BKSR2     LDX    #TCPTTM
034E I BD 002B R    424           JSR    STLCRQ      READ NEXT RECORD FROM TAPE
0351 I B6 0025 R    425           LDA A  STLSW1
0354 I 85 10        426           BIT A  #SW1STO     SOFTWARE TIMEOUT ?
0356 I 27 05        427           BEQ    BKSR1       NO, CHECK TAPE UNIT
0358 I BD 0012 R    428           JSR    SYSERR
035B I 27 EE        429           BEQ    BKSR2       JUMP IF RETRY SPECIFIED
035D I 8D E0        430 BKSR1     BSR    TSBSB1      CHECK ON TAPE ERROR
035F I 26 0A        431           BNE    BKSR3       JUMP IF CONTINUE
0361 I CE 0029 R    432 BKSR1A    LDX    #TCDBSR
0364 I BD 033D I    433           JSR    TSBSUB      BACKSPACE OVER TAPE ERROR RECORD
0367 I 27 F8        434           BEQ    BKSR1A      JUMP IF RETRY
0369 I 20 E0        435           BRA    BKSR2
036B I CE 0008 R    436 BKSR3     LDX    #SXMTBF     SETUP FOR DATA TRANSFER
036E I C6 1E        437           LDA B  #30
0370 I 6F 01        438           CLR    1,X
0372 I E7 02        439           STA B  2,X         SET WORD COUNT
0374 I 6F 03        440           CLR    3,X
0376 I 6F 04        441           CLR    4,X         SET BEGINNING ADDRESS
0378 I 86 01        442           LDA A  #DWT4BT     ASK FOR
037A I A7 05        443           STA A  5,X         4 BYTE WORDS
037C I CE 0017 R    444 BKSR4     LDX    #TCPDTA
037F I BD 002B R    445           JSR    STLCRQ      TRANSFER TRACE HEADER TO MEMORY
0382 I B6 0025 R    446           LDA A  STLSW1
0385 I 85 10        447           BIT A  #SW1STO     SOFTWARE TIMEOUT ?
0387 I 27 05        448           BEQ    BKSR5       NO
0389 I BD 0012 R    449           JSR    SYSERR
038C I 27 EE        450           BEQ    BKSR4       JUMP IF RETRY SPECIFIED
038E I 39           451 BKSR5     RTS                RETURN TO CALLER
                    452 *
                    453 *      STORAGE REQUIREMENTS FOR PLAYBACK ROUTINES
                    454 *
0000 D              455           DSEC
0000 D 00           456 BKSTRC    FCB    0
PBKRTN(A0011.02.028AA  CRS TAPE PLAYBACK ROUTINE)      08/04/78  13:22:44  PAGE   9

0001 D 00           457 BKSCNT    FCB    0
0002 D 00           458 FILFLG    FCB    0
0003                459           END
```

```
PBKRTN(A0011.02.028AA  CRS TAPE PLAYBACK ROUTINE)       08/04/78  13:22:44  PAGE  10

  NO ERRORS
 ISECT LENGTH --    911
 DSECT LENGTH --      3

 BKS1      0177 I   227    225   229   238
 BKS1A     0176 I   226    232
 BKS2      0196 I   239    236
 BKS3      01B1 I   249    245   251
 BKS5      019F I   242    248
 BKS7      01BC I   254    256   271
 BKS8      01D8 I   264    260
 BKS8A     01DF I   267    269
 BKS9      01EC I   272    266
 BKSA      01F5 I   276    274
 BKSB      01FC I   279    281   283   302
< BKSBEG   0167 I   219      9   222
 BKSC      0221 I   294    291
 BKSCNT    0001 D   457    124   128   272   276   282   301
 BKSD      0211 I   288    286   293
 BKSE      0236 I   303    296   298
 BKSF      0256 I   315    310
 BKSG      0275 I   327    320
 BKSH      0270 I   325    323
 BKSI      0294 I   342    326   399
 BKSJ      0288 I   338    335
 BKSK      02AB I   351    348
 BKSL      02C3 I   359    382
 BKSLO     01B9 I   252    141   190
 BKSN      02DB I   368    366
 BKSO      02F6 I   379    376
 BKSP      02E3 I   371    378
 BKSQ      02FF I   383    380
 BKSR      032E I   400    391
 BKSR1     035D I   430    427
 BKSR1A    0361 I   432    434
 BKSR2     034B I   423    429   435
 BKSR3     036B I   436    431
 BKSR4     037C I   444    450
 BKSR5     038E I   451    448
 BKSRRD    034B I   422    110   131   181   233   242   257   288   381
 BKSS      0335 I   403    401
 BKST      032B I   399    393
 BKSTRC    0000 D   456    278   292   299   343   345   349   390
> CNVPTR   000F      15     15    87   179
> CURCSP   0021      24     24   307   388
> CURFNM   0007      13     13   112   114   115   201   203   204   206   235   239   240   247
                           259   261   262   290   403   405
> DATMON   0020      23     23   314
> DECBIN   0036      38     38    88   180
> DECNUM   000D      15     15    83   175
> DLYRTN   0026      29     29   305
> DMNINI   0030      34     34   342
> DSPDV2   0032      35     35   116   205   241   263
 DWT4BT    0001 A    75    442
 FILFLG    0002 D   458    172   188   207   211   253   270   273
> FILTMP   0006      13     13    86   118   136   147   178   209   213
 FNFCNT    00C4 I   155     99   195
PBKRTN(A0011.02.028AA  CRS TAPE PLAYBACK ROUTINE)       08/04/78  13:22:45  PAGE  11

 FNOTRL    009E I   145     95   191
 FWD1      00EE I   170    167
 FWD2      013D I   200    184
 FWD3      0116 I   185    187   215
 FWD4      0126 I   191    189
 FWD5      0151 I   207    202
 FWD6      0160 I   213    208
 FWD7      010C I   181    210   212   214
< FWDBEG   00D9 I   161      8
 LCAST1    000C A    53    308   389
 LSTCBP    0008 A    54    309   392   400
> MHDPBK   0033      36     36   358
> MONCHN   001E      23     23   344   350   351   359   365   379
```

| | Symbol | Value | Def | References |
|---|---|---|---|---|
| | MONMAX | 0031 A | 61 | 346 |
| > | MONSTS | 001F | 23 | 23 311 313 |
| | MONWMU | 0578 A | 51 | 56 57 315 |
| | MONWRT | 05DC A | 62 | 364 |
| > | MSGOUT | 002D | 32 | 32 98 102 194 198 |
| > | MSGRQT | 0010 | 16 | 16 96 100 192 196 |
| | MSGTCV | 0080 A | 68 | 97 193 |
| | MSGTRC | 0004 A | 69 | 101 197 |
| > | NUMCHR | 000E | 15 | 15 85 177 |
| > | NUMMSG | 0011 | 16 | 16 151 |
| | PDO2MS | 0E74 A | 56 | 321 |
| | PDO4MS | 1770 A | 57 | 324 |
| > | RECTM1 | 001D | 22 | 22 338 339 |
| > | RECTMO | 001C | 22 | 22 316 325 340 341 367 383 |
| | REV1 | 0015 I | 89 | 91 130 |
| | REV1A | 0024 I | 95 | 109 |
| | REV2 | 003B I | 104 | 94 106 |
| | REV3 | 005E I | 117 | 113 |
| | REV4 | 0081 I | 131 | 119 137 |
| | REV5 | 0072 I | 125 | 127 129 |
| | REV6 | 006F I | 124 | 122 |
| | REV8 | 0093 I | 138 | 134 140 |
| < | REVBEG | 0000 I | 80 | 7 |
| | SCDMTM | 0010 A | 45 | 372 |
| | SCLRMM | 0001 A | 43 | 362 |
| | SCLXMM | 0003 A | 42 | 360 |
| | SCPRFS | 0000 A | 65 | |
| | SCPSDT | 0002 A | 66 | 312 |
| | SCPTMO | 2710 A | 64 | 396 |
| | SLDPT | 0040 A | 72 | 93 108 166 224 231 285 |
| > | SRB114 | 0003 | 12 | 12 327 353 |
| > | SRB115 | 0004 | 12 | 12 328 |
| > | SRB117 | 0005 | 12 | 12 317 332 355 |
| > | SRVB10 | 0000 | 12 | 12 111 117 135 200 234 246 258 289 |
| > | SRVB15 | 0001 | 12 | 12 120 264 294 |
| > | SRVB35 | 0002 | 12 | 12 318 |
| > | STLBRV | 0015 | 18 | 18 363 |
| > | STLBTV | 0014 | 18 | 18 368 |
| > | STLBXT | 0024 | 26 | 26 361 |
| > | STLCRQ | 002B | 31 | 31 424 445 |
| > | STLDVR | 002C | 31 | 31 373 |
| > | STLSW1 | 0025 | 27 | 27 374 425 446 |
| | SW1MRQ | 0008 A | 48 | 371 |
| | SW1STO | 0010 A | 47 | 375 426 447 |
| | SW1WRS | 0001 A | 49 | 371 |

PBKRTN(A0011.02.028AA CRS TAPE PLAYBACK ROUTINE) 08/04/78 13:22:45 PAGE 12

| | Symbol | Value | Def | References |
|---|---|---|---|---|
| > | SXMTB1 | 0009 | 14 | 14 352 370 |
| > | SXMTB2 | 000A | 14 | 14 354 357 |
| > | SXMTB3 | 000B | 14 | 14 |
| > | SXMTB4 | 000C | 14 | 14 356 |
| > | SXMTBF | 0008 | 14 | 14 436 |
| > | SYSERR | 0012 | 16 | 16 377 428 449 |
| > | TAPDS1 | 0019 | 20 | 20 92 107 165 223 230 284 |
| > | TAPDVR | 0034 | 37 | 37 164 |
| > | TAPRQT | 0018 | 20 | 20 163 |
| > | TAPST2 | 001A | 20 | 20 132 182 243 |
| > | TCDBSR | 0029 | 30 | 30 89 104 125 138 185 220 227 237 249 254 267 |
| | | | | 279 432 |
| > | TCDFFM | 0027 | 30 | 30 |
| > | TCDFSR | 0028 | 30 | 30 168 170 |
| > | TCDREW | 002A | 30 | 30 |
| > | TCPDTA | 0017 | 19 | 19 444 |
| > | TCPFIL | 001B | 21 | 21 81 173 |
| > | TCPTTM | 0016 | 19 | 19 423 |
| | THDPRF | 0004 A | 59 | 319 |
| > | TIOCHK | 002F | 33 | 33 415 |
| > | TMONOF | 0031 | 34 | 34 303 402 |
| > | TMONON | 0037 | 39 | 39 306 |
| > | TMRBCA | 0023 | 25 | 25 386 395 |
| > | TMRBTV | 0022 | 25 | 25 384 397 |
| > | TMRCDV | 0035 | 37 | 37 387 398 |
| > | TPERCK | 002E | 33 | 33 413 |
| | TRQSTS | 0001 A | 71 | 162 |

```
  TSB1        0348 I   417     414
< TSBSB1      033F I   412      10    250    430
< TSBSUB      033D I   410      10     90    105    126    139    169    171    186    221    228    255    268
                               280    433
> TTMOWR      0013      17      17
  TW2EOF      0001 A    73     133    183    244
TAPULD(A0011.02.029AA  CRS TAPE UNLOAD ROUTINE)          08/04/78  10:08:38  PAGE   1

                          2 *
                          3 *       CENTRAL RECORDING STATION TAPE UNLOAD FUNCTION
                          4 *
 0000 I                   5              ISEC
                          6 *
                          7              DEF     TAPULD
                          8 *
                          9              REF     TAPRQT,MSGRQT,TAPDS1
                         10              REF     DEPSAR,NUMMSG
                         11 *
                         12              REF     TCDSOP,TCDMRC,TCDDEN,TAPDVR,TCDREW
                         13              REF     MSGOUT,DISPLY,TCDSSP,EXECTV
                         14 *
 0001 A                  15 TRQSTS       EQU     1               STATUS REQUEST
 0001 A                  16 TW1STS       EQU     1               STATUS REQUEST
                         17 *
 0040 A                  18 MSGTIP       EQU     $40             INPUT AND DISPLAY NEW VALUE
 0004 A                  19 MSGTRC       EQU     4               RETRY OR CONTINUE
                         20 *
                         21 *
                         22 *       STATUS REGISTER EQUATES
                         23 *
 0040 A                  24 SLDPT        EQU     $40             LOAD POINT
                         25 *
 0000 I                  26 TAPULD       EQU     *
 0000 I BD 0005 R        27              JSR     TCDSOP          SET OPERATE POWER
 0003 I BD 0006 R        28              JSR     TCDMRC
 0006 I BD 0007 R        29              JSR     TCDDEN
 0009 I 86 01            30              LDA A   #TRQSTS         REQUEST TAPE
 000B I B7 0000 R        31              STA A   TAPRQT          UNIT
 000E I BD 0008 R        32              JSR     TAPDVR          STATUS
 0011 I B6 0002 R        33              LDA A   TAPDS1          PICK UP STATUS REGISTER 1
 0014 I 85 40            34              BIT A   #SLDPT          TAPE AT LOAD PT
 0016 I 26 03            35              BNE     TUL1            YES
 0018 I BD 0009 R        36              JSR     TCDREW          REWIND TAPE UNIT
 001B I CE 0076 I        37 TUL1         LDX     #MNTREL         TELL OPERATOR
 001E I FF 0001 R        38              STX     MSGRQT          TO MOUNT
 0021 I C6 04            39              LDA B   #MSGTRC
 0023 I BD 000A R        40              JSR     MSGOUT          REEL
 0026 I BD 0006 R        41              JSR     TCDMRC          ENABLE
 0029 I BD 0007 R        42              JSR     TCDDEN          UNIT
 002C I 86 01            43              LDA A   #TW1STS         REQUEST TAPE
 002E I B7 0000 R        44              STA A   TAPRQT          UNIT STATUS
 0031 I BD 0008 R        45              JSR     TAPDVR
 0034 I B6 0002 R        46              LDA A   TAPDS1          PICK UP STATUS REGISTER 1
 0037 I 85 40            47              BIT A   #SLDPT          TAPE AT LOAD PT
 0039 I 26 08            48              BNE     TUL2            YES
 003B I CE 00AA I        49              LDX     #TPNTLD         INFORM OPERATOR
 003E I BD 000B R        50              JSR     DISPLY
 0041 I 20 D8            51              BRA     TUL1            RETRY
 0043 I CE 004F I        52 TUL2         LDX     #RELMNT         INFORM OPERATOR
 0046 I BD 000B R        53              JSR     DISPLY          OF NEW REEL
 0049 I BD 000C R        54              JSR     TCDSSP          TURN OFF TAPE UNIT
 004C I 7E 000D R        55              JMP     EXECTV          INITIATE NEXT SEQUENCE
 004F I 10               56 RELMNT       FCB     $10,3,0
 0050 I 03
 0051 I 00
 0052 I 524545           57              FCC     /REEL MOUNTED - SEQUENCE COMPLETE/
TAPULD(A0011.02.029AA  CRS TAPE UNLOAD ROUTINE)          08/04/78  10:08:39  PAGE   2

 0072 I 0D               58              FCB     $D,$D,$D,4
 0073 I 0D
 0074 I 0D
 0075 I 04
 0076 I 4D4F55           59 MNTREL       FCC     /MOUNT NEW REEL/
 0084 I 0D               60              FCB     $D
```

```
0085 I 505245        61           FCC    /PRESS CONTINUE AFTER/
0099 I 0D            62           FCB    $D
009A I 4D4F55        63           FCC    /MOUNTING REEL/
00A7 I 0D            64           FCB    $D,$D,4
00A8 I 0D
00A9 I 04
00AA I 10            65 TPNTLD    FCB    $10,3,0
00AB I 03
00AC I 00
00AD I 544150        66           FCC    /TAPE NOT AT LOAD POINT/
00C3 I 0D            67           FCB    $D,4
00C4 I 04
00C5                 68           END
TAPULD(A0011.02.029AA  CRS TAPE UNLOAD ROUTINE)        08/04/78  10:08:39  PA..

  NO ERRORS
 ISECT LENGTH --   197
 DSECT LENGTH --    0

> DEPSAR    0003      10      10
> DISPLY    000B      13      13     50     53
> EXECTV    000D      13      13     55
  MNTREL    0076 I    59      37
> MSGOUT    000A      13      13     40
> MSGRQT    0001       9       9     38
  MSGTIP    0040 A    18
  MSGTRC    0004 A    19      39
> NUMMSG    0004      10      10
  RELMNT    004F I    56      52
  SLDPT     0040 A    24      34     47
> TAPDS1    0002       9       9     33     46
> TAPDVR    0008      12      12     32     45
> TAPRQT    0000       9       9     31     44
< TAPULD    0000 I    26       7
> TCDDEN    0007      12      12     29     42
> TCDMRC    0006      12      12     28     41
> TCDREW    0009      12      12     36
> TCDSOP    0005      12      12     27
> TCDSSP    000C      13      13     54
  TPNTLD    00AA I    65      49
  TRQSTS    0001 A    15      30
  TUL1      001B I    37      35     51
  TUL2      0043 I    52      48
  TW1STS    0001 A    16      43
I..RTN(A0011.02.030AA  CRS INTERRUPT HANDLER)          08/04/78  13:25:52  PAGE   1

 0000 I               2           ISEC
                      3 *
                      4           DEF    INTRTN,KEYTAB
                      5 *
                      6 *
                      7           REF    STLWCR,STLRCR,CASR1,TMRCLK
                      8           REF    PIADCR,PIADDR,TCPPBS,PIAKCR,PIAKDR
                      9           REF    TCPPSW
                     10           REF    CMDFAR
                     11 *
                     12 *
                     13           REF    CURCSP,CURMSM,CURPKM,CUREKM,CURMS2,CURPK2
                     14           REF    TMRSTS,STACK
                     15           REF    STSTAT
                     16 *
                     17 *
                     18           REF    STLWCT,STLRCT,TAPCNT,TMRCNT,LEDRIV
                     19           REF    DEXRTN,LITOFF
                     20           REF    LGCONT
                     21 *
                     22 *
                     23           REF    KEYENT
                     24           REF    ESCAPE
                     25           REF    TLTSRH
                     26           REF    TODSVC
                     27           REF    DISPDP
                     28           REF    STAIDT
                     29           REF    RTUIDT
```

```
                 REF    DEPLOY
                 REF    PRGRAM
                 REF    TAPBYP
                 REF    CHNSTS
                 REF    UNTSTS
                 REF    CAMBYP
                 REF    SLFTST
                 REF    BLSTST
                 REF    CALBRT
                 REF    LMPTST
                 REF    MLTEST
                 REF    SGLTST
                 REF    SPRADV
                 REF    SPTADV
                 REF    MTSFSQ
                 REF    OVRIDE
                 REF    AUTOFR
                 REF    FILPST
                 REF    RELHDR
                 REF    TSBBEG
                 REF    ENDLOG
          *
                 REF    PRTBSY,PRTACK
          *
          *      AUXILIARY KEYBOARD LITE EQUATES
          *
0002 A      AXLNTS  EQU    2          RTU TEST LITE
          *
          *
          *      CURRENT LINE CONTROL STORAGE OFFSETS
IN|RTN(A0011.02.030AA  CRS INTERRUPT HANDLER)     08/04/78  13:25:53  PAGE   2

          *
0000 A      LCASPT  EQU    0          SHOT POINT STATION
0002 A      LCANRS  EQU    2          # STATIONS NOT RECORDED EACH SIDE OF S. P.
0003 A      LCARSR  EQU    3          # RECORDING STATIONS TO 1ST RECORDING STN
0004 A      LCABBR  EQU    4          TOTAL # STATIONS TO 1ST RECORDING STATION
0005 A      LCATRS  EQU    5          TOTAL # RECORDING STATIONS
          *
          *         PARAMETER SAVE AREA FOR ADVANCE KEY RESET FUNCTION
          *
0006 A      LCASP1  EQU    6
0008 A      LCASP2  EQU    8
0009 A      LCASP3  EQU    9
000A A      LCASP4  EQU    10
000B A      LCASP5  EQU    11
          *
          *         LINE STATUS FLAGS
          *
000C A      LCAST1  EQU    12         STATUS FLAGS
000D A      LCAST2  EQU    13         STATUS FLAGS BYTE 2
000E A      LCAST3  EQU    14
000F A      LCAST4  EQU    15         STATUS FLAGS (BYTE 4)
0010 A      LCAMDE  EQU    16         LINE MODE
0011 A      LCAPAR  EQU    17         PARITY COUNT
0012 A      LCADTB  EQU    18         TIME BREAK
0013 A      LCASPL  EQU    19         KEYBOARD LITES
0014 A      LCADPM  EQU    20         ADDR OF START OF DEPLOYMENT MAP
0016 A      LCASTN  EQU    22         LAST STN # DEPLOYED FOR THIS LINE AND SHOOE
0018 A      LCASBT  EQU    24         ROLL ALONG DISPLAY PARAMETERS
0019 A      LCASHA  EQU    25         ROLL ALONG DISPLAY PARAMETERS
          *
          *      LINE STATUS FLAG EQUATES (BYTE 1)
          *
0080 A      LSTEMF  EQU    $80        EXECUTIVE MODE
0040 A      LSTMSF  EQU    $40        MOMENTARY SWITCH FLAG
0020 A      LSTPRG  EQU    $20        FIRE SEQUENCE PROGRAMMED
0010 A      LSTTBP  EQU    $10        TAPE BY-PASS
0008 A      LSTCBP  EQU    8          CAMERA BY-PASS
0004 A      LSTEOT  EQU    4          END-OF-TAPE
0002 A      LSTMMO  EQU    2          MULTIPLE MONITOR OUTPUT REQUEST
0001 A      LSTMTP  EQU    1          MULTIPLE NORMAL TEST PASSED
          *
```

```
                      *     LINE STATUS FLAG EQUATES (BYTE 2)
                      *
0080 A                LS2DKR   EQU    $80      DECIMAL KEY REQUEST PENDING
0040 A                LS2RCP   EQU    $40      DECIMAL KEY REQUEST COMPLETE
0020 A                LS2BFD   EQU    $20      BLANK FIELD IN DECIMAL REQUEST
0010 A                LS2RCR   EQU    $10      RETRY OR CONTINUE DECIMAL KEY ENTRY
0008 A                LS2TIP   EQU    8        MULTIPLE NORMAL TEST-IN-PROGRESS
0004 A                LS2NTP   EQU    4        NORMAL TEST-IN-PROGRESS
0002 A                LS2BTP   EQU    2        BLAST TEST-IN-PROGRESS
0001 A                LS2TSP   EQU    1        TILT SEARCH-IN-PROGRESS
                      *
                      *     LINE STATUS FLAG EQUATES (BYTE 3)
                      *
0080 A                LS3BVT   EQU    $80      UNIT STATUS DISPLAY TOGGLE
0040 A                LS3BLE   EQU    $40      BLASTER ERROR
0020 A                LS3MTT   EQU    $20      MANUAL TEST FLAG
0010 A                LS3STF   EQU    $10      SINGLE TEST FLAG
INTRTN(A0011.02.030AA  CRS INTERRUPT HANDLER)     08/04/78  13:25:54  PAGE   3

0008 A                LS3NEF   EQU    8        NORMAL TEST ERROR FLAG
0004 A                LS3MNE   EQU    4        NORMAL TEST ERROR FLAG (MULTIPLE TEST
0002 A                LS3NDR   EQU    2        NOISE DATA RECORDING
                      *
                      *     LINE MODE EQUATES
                      *
0000 A                MODFRE   EQU    0        FREE MODE
0001 A                MODPLY   EQU    1        DEPLOY MODE
0002 A                MODPRG   EQU    2        PROGRAM MODE
0003 A                MODFIR   EQU    3        FIRE MODE
0004 A                MODTST   EQU    4        TEST MODE
0005 A                MODFRA   EQU    5        FIRE ABORT MODE
0006 A                MODADV   EQU    6        ADVANCE MODE
                      *
0008 A                SINTB    EQU    8        TAPE UNIT INTERRUPT
                      *
003F A                KCRNSW   EQU    $3F      NORMAL SWITCH (LEADING EDGE TRANSITION)
003D A                KCRMSW   EQU    $3D      MOMENTARY SWITCH (TRAILING EDGE TRANSITION
                      *
000D A                KSWRTY   EQU    $D       RETRY KEY
0016 A                KSWDST   EQU    $16      DEAD STATION ENTRY
0028 A                KSWSP4   EQU    $28
0029 A                KSWFPT   EQU    $29      FILE PRESET
002B A                KSWMAX   EQU    $2B      MAXIMUM VALID KEY INDESX
                      *
0004 A                TCPBSS   EQU    4        SEARCH START
                      *
                      *
8004 A                ACIASS   EQU    $8004
                      *
8062 A                COPCRG   EQU    $8062
8063 A                DOPCRG   EQU    $8063
                      *
                      *
0008 A                LOGFG1   EQU    8        LOG ERROR ENABLE
                      *
                      *
                      *     CENTRAL RECORDING STATION INTERRUPT HANDLER
                      *
0000 I                INTRTN   EQU    *
0000 I 86 08                   LDA A  #LOGFG1
0002 I B5 000A R               BIT A  CMDFAR   ERROR LOGGING ENABLED ?
0005 I 27 14                   BEQ    INTS1    NO - DON'T CHECK FOR PRINTER IRQ
0007 I CE 0038 R               LDX    #PRTBSY  ANTICIAPTE BUSY IRQ
000A I B6 8062 A               LDA A  COPCRG
000D I 48                      ASL A           PRINTER BUSY IRQ ?
000E I 2B 09                   BMI    INTS2    YES, CALL CONTINUATOR
0010 I B6 8063 A               LDA A  DOPCRG   ACKNOWLEDGE IRQ ?
0013 I 48                      ASL A
0014 I 2A 05                   BPL    INTS1    NO, CONTINUE
0016 I CE 0039 R               LDX    #PRTACK
0019 I 6E 00          INTS2    JMP    0,X      CALL PROPER PRINTER CONTINUAOR
001B I B6 0000 R      INTS1    LDA A  STLWCR   SATELLITE WRITE INT
001E I 2A 03                   BPL    INTS     NO
0020 I 7E 0014 R               JMP    STLWCT   CALL WRITE CONT
```

```
0023 I B6 0001 R   173 INTS      LDA A  STLRCR      READ SIDE INTERRUPT
0026 I 2A 03       174           BPL    INTT        NO
0028 I 7E 0015 R   175           JMP    STLRCT      YES, CALL RAD CONT
```

```
002B I B6 0002 R   176 INTT      LDA A  CASR1
002E I 85 08       177           BIT A  #SINTB      TAPE UNIT INTERRUPT
0030 I 27 03       178           BEQ    INTU        NO
0032 I 7E 0016 R   179           JMP    TAPCNT      CALL TAPE CONTINUATOR
0035 I B6 0003 R   180 INTU      LDA A  TMRCLK      TIMER INTERRUPT
0038 I 2A 03       181           BPL    INTW        NO
003A I 7E 0017 R   182           JMP    TMRCNT      CALL TIMER CONTINUATOR
003D I F6 0004 R   183 INTW      LDA B  PIADCR      ROLL-ALONG INTERRUPT
0040 I 2A 07       184           BPL    INTTP       NO
0042 I B6 0005 R   185           LDA A  PIADDR      CLEAR INTERRUPT
0045 I BD 0018 R   186           JSR    LEDRIV
0048 I 3B          187           RTI                RETURN FROM INTERRUPT
0049 I B6 0009 R   188 INTTP     LDA A  TCPPSW      TEST FOR TAPE PANEL INTERRUPT
004C I 2A 13       189           BPL    INTK        NO
004E I B7 0006 R   190           STA A  TCPPBS      RESET THE INTERRUPT
0051 I 84 07       191           AND A  #7          MASK FOR BUTTON NUMBER
0053 I 81 04       192           CMP A  #TCPBSS     TAPE SEARCH START
0055 I 26 01       193           BNE    INTR1
0057 I 4A          194           DEC A
0058 I 8B 28       195 INTR1     ADD A  #KSWSP4
005A I FE 000B R   196           LDX    CURCSP
005D I E6 0C       197           LDA B  LCAST1,X
005F I 20 27       198           BRA    INTE
0061 I FE 000B R   199 INTK      LDX    CURCSP      SET PNTR TO CONTROL STORAGE AREA
0064 I E6 0C       200           LDA B  LCAST1,X    LOAD LINE STATUS
0066 I B6 0007 R   201           LDA A  PIAKCR      CA1 INTERRUPT
0069 I 2B 01       202           BMI    INTR        JUMP IF CA1 INTERRUPT
006B I 3B          203           RTI                RETURN FROM INTERRUPT
006C I 7D 0013 R   204 INTR      TST    STSTAT      SELF TEST MODE ?
006F I 26 14       205           BNE    INT1        YES - CONTINUE
0071 I C5 40       206           BIT B  #LSTMSF     MOMENTARY SWITCH FLAG
0073 I 27 10       207           BEQ    INT1        NO
0075 I CE 000C R   208           LDX    #CURMSM     SET PNTR MOMENTARY SWITCH FLAGS MASK
0078 I C6 3F       209           LDA B  #KCRNSW     SETUP FOR NORMAL SWITCH
007A I F7 0007 R   210           STA B  PIAKCR
007D I B6 0008 R   211           LDA A  PIAKDR      CLEAR INTERRUPT
0080 I B6 0002 D   212           LDA A  INTCHI      PICK UP MOMENTARY SWITCH
0083 I 20 20       213           BRA    INTP
0085 I B6 0008 R   214 INT1      LDA A  PIAKDR      INPUT KEY FROM KEYBOARD
0088 I CE 000D R   215 INTE      LDX    #CURPKM     SET PNTR TO PROCESSING MODE VALID KEY MASK
008B I C5 80       216           BIT B  #LSTEMF     EXECUTIVE MODE ?
008D I 27 03       217           BEQ    INT2        NO
008F I CE 000E R   218           LDX    #CUREKM     SET PNTR TO EXECUTIVE MODE VALID KEY MASK
0092 I 81 2B       219 INT2      CMP A  #KSWMAX     INVALID KEY
0094 I 23 01       220           BLS    INTY        NO
0096 I 3B          221           RTI                RETURN FROM INTERRUPT
0097 I B7 0002 D   222 INTY      STA A  INTCHI      SAVE CHARACTER FOR MOMENTARY SWITCH
009A I 7D 0013 R   223           TST    STSTAT      SELF TEST ?
009D I 27 06       224           BEQ    INTP        NO - CONTINUE
009F I CE 0029 R   225           LDX    #SLFTST     PROCESS KEY
00A2 I 7E 0182 I   226           JMP    INTM1       ENTRY IN SELF TEST MODE
00A5 I 5F          227 INTP      CLR B              SET INDEX FOR DECIMAL KEY ENTRY
00A6 I 81 0D       228           CMP A  #KSWRTY     DECIMAL KEY ?
00A8 I 23 14       229           BLS    INTV        YES
00AA I 8B 04       230           ADD A  #$4         SET BASE INDEX FOR KEY TABLE
00AC I 85 20       231           BIT A  #$20        KEY IN 2ND HW OF MASK
00AE I 27 0A       232           BEQ    INTZ        NO
00B0 I 08          233           INX                SET PNTR TO
```

```
00B1 I 08          234           INX                2ND
00B2 I 16          235           TAB
00B3 I 80 11       236           SUB A  #$11        SET UP KEY TAB
00B5 I 36          237           PSH A              INDEX
00B6 I C4 0F       238           AND B  #$F         MASK HW IND
00B8 I 20 05       239           BRA    INT3
00BA I 4A          240 INTZ      DEC A
00BB I 84 0F       241           AND A  #$F         MASK OFF TYPE INDICATOR
00BD I 16          242           TAB
```

```
00BE I 37            243 INTV    PSH B              SAVE INDEX
00BF I C0 08         244 INT3    SUB B  #8          VALID KEY BIT IN FIRST BYTE OF MASK
00C1 I 2C 03         245         BGE    INT4        YES
00C3 I 08            246         INX                SET PNTR TO 2ND BYTE OF MASK
00C4 I CB 08         247         ADD B  #8          RESTORE KEY INDEX
00C6 I 86 01         248 INT4    LDA A  #1          SET SHIFT REGISTER
00C8 I 5A            249 INTF    DEC B              BIT POSITIONED FOR TEST
00C9 I 2B 03         250         BMI    INT5        YES
00CB I 48            251         ASL A              POSITION BIT FOR TEST
00CC I 20 FA         252         BRA    INTF        CONTINUE
00CE I A5 00         253 INT5    BIT A  0,X         VALID KEY ?
00D0 I 32            254         PUL A              LOAD TABLE INDEX
00D1 I 26 01         255         BNE    INT6        YES
00D3 I 3B            256         RTI                RETURN TO INTERRUPTED ROUTINE
00D4 I CE 0189 I     257 INT6    LDX    #KEYTAB     INITIALIZE KEY ENTRY
00D7 I FF 0000 D     258         STX    SAVIDX      CONTROL TABLE INDEX
00DA I 36            259         PSH A              SAVE KEY INDEX
00DB I 5F            260         CLR B
00DC I 48            261         ASL A
00DD I 59            262         ROL B
00DE I 48            263         ASL A
00DF I 59            264         ROL B
00E0 I 48            265         ASL A
00E1 I 59            266         ROL B
00E2 I BB 0001 D     267         ADD A  SAVIDX+1    FORM PNTR
00E5 I B7 0001 D     268         STA A  SAVIDX+1    INTO KEY
00E8 I F9 0000 D     269         ADC B  SAVIDX      ENTRY
00EB I F7 0000 D     270         STA B  SAVIDX      CONTROL
00EE I 32            271         PUL A
00EF I CE 0000 D     272         LDX    #SAVIDX
00F2 I BD 0019 R     273         JSR    DEXRTN
00F5 I FE 000B R     274         LDX    CURCSP      LOAD CONTROL STORAGE AREA PNTR
00F8 I E6 0C         275         LDA B  LCAST1,X    LOAD LINE STATUS FLAGS
00FA I C5 40         276         BIT B  #LSTMSF     TRAILING EDGE OF MOMENTARY SWITCH
00FC I 26 7F         277         BNE    INTM        YES
00FE I FE 0000 D     278         LDX    SAVIDX      LOAD KEY ENTRY TABLE INDEX
0101 I A6 00         279         LDA A  0,X         MOMENTARY KEY ?
0103 I 2C 16         280         BGE    INT8        NO
0105 I EE 00         281         LDX    0,X         SET MOMENTARY SWITCH
0107 I FF 000C R     282         STX    CURMSM      VALID KEY MASK
010A I FE 0000 D     283         LDX    SAVIDX
010D I EE 02         284         LDX    2,X
010F I FF 000F R     285         STX    CURMS2
0112 I CA 40         286         ORA B  #LSTMSF     SET MOMENTARY SWITCH FLAG
0114 I 86 3D         287         LDA A  #KCRMSW     SET PIA FOR
0116 I B7 0007 R     288         STA A  PIAKCR      MOMENTARY KEY
0119 I 20 5D         289         BRA    INTC
011B I 8C 0189 I     290 INT8    CPX    #KEYTAB     DECIMAL KEY ENTRY ?
011E I 26 0A         291         BNE    INT9
```

```
0120 I FE 000B R     292 INT8A   LDX    CURCSP
0123 I A6 0D         293         LDA A  LCAST2,X
0125 I 85 80         294         BIT A  #LS2DKR     DECIMAL KEY REQUEST PENDING
0127 I 26 4F         295         BNE    INTC        YES, GO CALL KEY ETRY ROUTINE
0129 I 3B            296         RTI                RETURN TO INTERRUPTED ROUTINE
012A I B6 0002 D     297 INT9    LDA A  INTCHI
012D I 81 16         298         CMP A  #KSWDST     DEAD STATION ENTRY
012F I 27 EF         299         BEQ    INT8A       YES, TRAET AS DECIMAL KEY ENTRY
0131 I 6D 04         300         TST    4,X         NO MODE
0133 I 27 22         301         BEQ    INTI
0135 I 86 04         302         LDA A  #MODTST     NEW MODE
0137 I A1 04         303         CMP A  4,X         = TEST MODE
0139 I 27 15         304         BEQ    INTD        YES
013B I FE 000B R     305         LDX    CURCSP      OLD MODE
013E I A1 10         306         CMP A  LCAMDE,X    = TEST MODE
0140 I 26 0B         307         BNE    INTA        NO
0142 I A6 0D         308         LDA A  LCAST2,X
0144 I 84 F0         309         AND A  #-1-LS2TIP-LS2NTP-LS2BTP-LS2TSP
0146 I A7 0D         310         STA A  LCAST2,X    RESET TEST-IN-PROGRESS FLAGS
0148 I 86 02         311         LDA A  #AXLNTS
014A I BD 001A R     312         JSR    LITOFF      TURN OFF RTU TEST LITE
014D I FE 0000 D     313 INTA    LDX    SAVIDX      SET KEY ENRY TABLE INDEX
0150 I A6 04         314 INTD    LDA A  4,X         LOAD NEW LINE MODE
```

```
0152 I FE 000B R   315            LDX    CURCSP        LOAD CONTROL STORAGE AREA PNTR
0155 I A7 10       316            STA A  LCAMDE,X      SET NEW LINE MODE
0157 I FE 0000 D   317 INTI       LDX    SAVIDX        LOAD PNTR INTO KEY ENTRY TABLE
015A I EE 00       318            LDX    0,X           SET NEW PROCESSING
015C I FF 000D R   319            STX    CURPKM        VALID KEY MASK
015F I FE 0000 D   320            LDX    SAVIDX
0162 I EE 02       321            LDX    2,X
0164 I FF 0010 R   322            STX    CURPK2
0167 I FE 000B R   323            LDX    CURCSP
016A I A6 0D       324            LDA A  LCAST2,X
016C I 84 6F       325            AND A  #-1-LS2DKR-LS2RCRRESET DECIMAL REQUEST
016E I A7 0D       326            STA A  LCAST2,X
0170 I C4 7F       327            AND B  #-1-LSTEMF    SET PROCESSING
0172 I 7F 0011 R   328            CLR    TMRSTS        RESET TIMER REQUEST
0175 I 8E 0012 R   329            LDS    #STACK        RESET STACK PNTR
0178 I FE 000B R   330 INTC       LDX    CURCSP        LOAD PNTR TO CONTROL STORAGE AREA
017B I E7 0C       331            STA B  LCAST1,X      SAVE NEW LINE STATUS
017D I FE 0000 D   332 INTM       LDX    SAVIDX        PICK UP PNTR TO KEY ENTRY TABLE
0180 I EE 05       333            LDX    5,X           LOAD ADDRESS OF ROUTINE TO PROCESS
0182 I B6 0002 D   334 INTM1      LDA A  INTCHI        RESTORE CHARACTER
0185 I 01          335            NOP
0186 I 0E          336            CLI                  CLEAR INTERRUPT MASK
0187 I 6E 00       337            JMP    0,X           CALL ROUTINE TO HANDLE OPERATOR ENTRY
                   338 *
                   339 *      KEY ENTRY CONTROL TABLE
                   340 *
                   341 *           FORMAT OF SINGLE KEY ENTRY
                   342 *
                   343 *                  FDB      4 BYTE VALID KEY MASK
                   344 *                  FCB      LINE MODE
                   345 *                  FDB      ROUTINE ADDRESS
                   346 *
0189 I             347 KEYTAB     EQU    *
0189 I 0000    A   348            FDB    0,0           DECIMAL KEY ENTRY
018B I 0000    A
1...RTN(A0011.02.030AA  CRS INTERRUPT HANDLER)          08/04/78  13:25:58  PAGE   7

018D I 00          349            FCB    0
018E I 001C    R   350            FDB    KEYENT
                   351 *
0190 I 0001    A   352            FDB    1,0           ESCAPE
0192 I 0000    A
0194 I 00          353            FCB    0
0195 I 001D    R   354            FDB    ESCAPE
                   355 *
0197 I 0003    A   356            FDB    3,0           TILT SEARCH
0199 I 0000    A
019B I 04          357            FCB    4             TEST
019C I 001E    R   358            FDB    TLTSRH
                   359 *
019E I 0001    A   360            FDB    1,0           # (SPARE) - USED FOR END-OF-LOG
01A0 I 0000    A
01A2 I 00          361            FCB    0
01A3 I 0037    R   362            FDB    ENDLOG        END-OF-LOG
                   363 *
01A5 I 05F7    A   364            FDB    $05F7,$013E   DATE TIME
01A7 I 013E    A
01A9 I 00          365            FCB    0
01AA I 001F    R   366            FDB    TODSVC
                   367 *
01AC I 8020    A   368            FDB    $8020,0       DISPLAY DEPLOYMENT
01AE I 0000    A
01B0 I 00          369            FCB    0
01B1 I 0020    R   370            FDB    DISPDP
                   371 *
01B3 I 05F7    A   372            FDB    $5F7,$13E     STATION IDENTIFICATION
01B5 I 013E    A
01B7 I 00          373            FCB    0
01B8 I 0021    R   374            FDB    STAIDT
                   375 *
01BA I 05F7    A   376            FDB    $5F7,$13E     RTU IDENTIFICATION
01BC I 013E    A
01BE I 00          377            FCB    0
01BF I 0022    R   378            FDB    RTUIDT
```

```
                    379 *
01C1 I 37F7    A    380        FDB    $37F7,$13E   DEPLOYMENT
01C3 I 013E    A
01C5 I 01           381        FCB    1            DEPLOY MODE
01C6 I 0023    R    382        FDB    DEPLOY
                    383 *
01C8 I 0000    A    384        FDB    0,0          DEAD STATION
01CA I 0000    A
01CC I 00           385        FCB    0
01CD I 001C    R    386        FDB    KEYENT
                    387 *
01CF I 35F7    A    388        FDB    $35F7,$2A    PROGRAM
01D1 I 002A    A
01D3 I 02           389        FCB    2            PROGRAM MODE
01D4 I 0024    R    390        FDB    PRGRAM
                    391 *
01D6 I 8803    A    392        FDB    $8803,0      TAPE BY-PASS
01D8 I 0000    A
01DA I 00           393        FCB    0
01DB I 0025    R    394        FDB    TAPBYP
                    395 *
```

```
01DD I 35F7    A    396        FDB    $35F7,$13E   CHANNEL STATUS DISPLAY
01DF I 013E    A
01E1 I 00           397        FCB    0
01E2 I 0026    R    398        FDB    CHNSTS
                    399 *
01E4 I 35F7    A    400        FDB    $35F7,$13E   UNIT STATUS DISPLAY
01E6 I 013E    A
01E8 I 00           401        FCB    0
01E9 I 0027    R    402        FDB    UNTSTS
                    403 *
01EB I 0003    A    404        FDB    3,0          CAMERA BY-PASS
01ED I 0000    A
01EF I 00           405        FCB    0
01F0 I 0028    R    406        FDB    CAMBYP
                    407 *
01F2 I 0000    A    408        FDB    0,0          * (SPARE)
01F4 I 0000    A
01F6 I 00           409        FCB    0
01F7 I 0000    A    410        FDB    0
                    411 *
01F9 I 3DE7    A    412        FDB    $3DE7,$13E   BLAST TEST
01FB I 013E    A
01FD I 00           413        FCB    0            TEST MODE
01FE I 002A    R    414        FDB    BLSTST
                    415 *
0200 I 3DE7    A    416        FDB    $3DE7,$13E   PERFORMANCE TEST
0202 I 013E    A
0204 I 00           417        FCB    0
0205 I 002B    R    418        FDB    CALBRT
                    419 *
0207 I 8000    A    420        FDB    $8000,$8     LAMP TEST
0209 I 0008    A
020B I 00           421        FCB    0
020C I 002C    R    422        FDB    LMPTST
                    423 *
020E I 3DE7    A    424        FDB    $3DE7,$12E   MULTIPLE NORMAL TEST
0210 I 012E    A
0212 I 04           425        FCB    4            TEST MODE
0213 I 002D    R    426        FDB    MLTEST
                    427 *
0215 I 3DE7    A    428        FDB    $3DE7,$13E   SINGLE NORMAL TEST
0217 I 013E    A
0219 I 04           429        FCB    4            TEST MODE
021A I 002E    R    430        FDB    SGLTST
                    431 *
021C I 0001    A    432        FDB    1,0          SPREAD ADVANCE
021E I 0000    A
0220 I 06           433        FCB    6            ADVANCE MODE
0221 I 002F    R    434        FDB    SPRADV
                    435 *
0223 I 0001    A    436        FDB    1,0          SHOT POINT ADVANCE
```

```
0225 I 0000    A
0227 I 06           437            FCB    6             ADVANCE MODE
0228 I 0030    R    438            FDB    SPTADV
                    439 *
022A I 35E7    A    440            FDB    $35E7,$13E    TEST
022C I 013E    A
022E I 04           441            FCB    4             TEST MODE
INTRTN(A0011.02.030AA  CRS INTERRUPT HANDLER)          08/04/78  13:25:59  PAGE   9

022F I 0031    R    442            FDB    MTSFSQ
                    443 *
0231 I 0001    A    444            FDB    1,0           OVERRIDE
0233 I 0000    A
0235 I 00           445            FCB    0
0236 I 0032    R    446            FDB    OVRIDE
                    447 *
0238 I 0001    A    448            FDB    1,0           FIRE
023A I 0000    A
023C I 03           449            FCB    3             FIRE MODE
023D I 0033    R    450            FDB    AUTOFR
                    451 *
023F I 0000    A    452            FDB    0,0           SPARE
0241 I 0000    A
0243 I 00           453            FCB    0
0244 I 0000    A    454            FDB    0
                    455 *
0246 I 0000    A    456            FDB    0,0           SPARE
0248 I 0000    A
024A I 00           457            FCB    0
024B I 0000    A    458            FDB    0
                    459 *
024D I 0003    A    460            FDB    3,0           FILE PRESET
024F I 0000    A
0251 I 00           461            FCB    0
0252 I 0034    R    462            FDB    FILPST
                    463 *
0254 I 0003    A    464            FDB    3,0           WRITE REEL HEADER
0256 I 0000    A
0258 I 00           465            FCB    0
0259 I 0035    R    466            FDB    RELHDR
                    467 *
025B I 0003    A    468            FDB    3,0           TAPE SEARCH FUNCTION
025D I 0000    A
025F I 00           469            FCB    0
0260 I 0036    R    470            FDB    TSBBEG
                    471 *
0000 D              472            DSEC
                    473 *
                    474 *     PROGRAM STORAGE AREA
                    475 *
                    476 *     INTRTN ROUTINE
0000 D 0000    A    477 SAVIDX     FDB    0
0002 D 00           478 INTCHI     FCB    0             CHARACTER SAVE AREA
0003                479            END
INTRTN(A0011.02.030AA  CRS INTERRUPT HANDLER)          08/04/78  13:26:00  PAGE  10

   NO ERRORS
 ISECT LENGTH --   610
 DSECT LENGTH --     3

 ACIASS   8004 A   146
 AUTOFR   0033      46     46    450
 AXLNTS   0002 A    56    311
 BLSTST   002A      37     37    414
 CALBRT   002B      38     38    418
 CAMBYP   0028      35     35    406
 CASR1    0002       7      7    176
 CHNSTS   0026      33     33    398
 CMDFAR   000A      10     10    159
 COPCRG   8062 A   148    162
 CURCSP   000B      13     13    196   199   274   292   305   315   323   330
 CUREKM   000E      13     13    218
 CURMS2   000F      13     13    285
 CURMSM   000C      13     13    208   282
```

| | | | | | | | | |
|---|---|---|---|---|---|---|---|---|
| > | CURPK2 | 0010 | 13 | 13 | 322 | | | |
| > | CURPKM | 000D | 13 | 13 | 215 | 319 | | |
| > | DEPLOY | 0023 | 30 | 30 | 382 | | | |
| > | DEXRTN | 0019 | 19 | 19 | 273 | | | |
| > | DISPDP | 0020 | 27 | 27 | 370 | | | |
| | DOPCRG | 8063 A | 149 | 165 | | | | |
| > | ENDLOG | 0037 | 50 | 50 | 362 | | | |
| > | ESCAPE | 001D | 24 | 24 | 354 | | | |
| > | FILPST | 0034 | 47 | 47 | 462 | | | |
| | INT1 | 0085 I | 214 | 205 | 207 | | | |
| | INT2 | 0092 I | 219 | 217 | | | | |
| | INT3 | 00BF I | 244 | 239 | | | | |
| | INT4 | 00C6 I | 248 | 245 | | | | |
| | INT5 | 00CE I | 253 | 250 | | | | |
| | INT6 | 00D4 I | 257 | 255 | | | | |
| | INT8 | 011B I | 290 | 280 | | | | |
| | INT8A | 0120 I | 292 | 299 | | | | |
| | INT9 | 012A I | 297 | 291 | | | | |
| | INTA | 014D I | 313 | 307 | | | | |
| | INTC | 0178 I | 330 | 289 | 295 | | | |
| | INTCHI | 0002 D | 478 | 212 | 222 | 297 | 334 | |
| | INTD | 0150 I | 314 | 304 | | | | |
| | INTE | 0088 I | 215 | 198 | | | | |
| | INTF | 00C8 I | 249 | 252 | | | | |
| | INTI | 0157 I | 317 | 301 | | | | |
| | INTK | 0061 I | 199 | 189 | | | | |
| | INTM | 017D I | 332 | 277 | | | | |
| | INTM1 | 0182 I | 334 | 226 | | | | |
| | INTP | 00A5 I | 227 | 213 | 224 | | | |
| | INTR | 006C I | 204 | 202 | | | | |
| | INTR1 | 0058 I | 195 | 193 | | | | |
| < | INTRTN | 0000 I | 157 | 4 | | | | |
| | INTS | 0023 I | 173 | 171 | | | | |
| | INTS1 | 001B I | 170 | 160 | 167 | | | |
| | INTS2 | 0019 I | 169 | 164 | | | | |
| | INTT | 002B I | 176 | 174 | | | | |
| | INTTP | 0049 I | 188 | 184 | | | | |
| | INTU | 0035 I | 180 | 178 | | | | |
| | INTV | 00BE I | 243 | 229 | | | | |

INTRTN(A0011.02.030AA CRS INTERRUPT HANDLER) 08/04/78 13:26:01 PAGE 11

| | | | | | | | | |
|---|---|---|---|---|---|---|---|---|
| | INTW | 003D I | 183 | 181 | | | | |
| | INTY | 0097 I | 222 | 220 | | | | |
| | INTZ | 00BA I | 240 | 232 | | | | |
| | KCRMSW | 003D A | 135 | 287 | | | | |
| | KCRNSW | 003F A | 134 | 209 | | | | |
| > | KEYENT | 001C | 23 | 23 | 350 | 386 | | |
| < | KEYTAB | 0189 I | 347 | 4 | 257 | 290 | | |
| | KSWDST | 0016 A | 138 | 298 | | | | |
| | KSWFPT | 0029 A | 140 | | | | | |
| | KSWMAX | 002B A | 141 | 219 | | | | |
| | KSWRTY | 000D A | 137 | 228 | | | | |
| | KSWSP4 | 0028 A | 139 | 195 | | | | |
| | LCABBR | 0004 A | 64 | | | | | |
| | LCADPM | 0014 A | 85 | | | | | |
| | LCADTB | 0012 A | 83 | | | | | |
| | LCAMDE | 0010 A | 81 | 306 | 316 | | | |
| | LCANRS | 0002 A | 62 | | | | | |
| | LCAPAR | 0011 A | 82 | | | | | |
| | LCARSR | 0003 A | 63 | | | | | |
| | LCASBT | 0018 A | 87 | | | | | |
| | LCASHA | 0019 A | 88 | | | | | |
| | LCASP1 | 0006 A | 69 | | | | | |
| | LCASP2 | 0008 A | 70 | | | | | |
| | LCASP3 | 0009 A | 71 | | | | | |
| | LCASP4 | 000A A | 72 | | | | | |
| | LCASP5 | 000B A | 73 | | | | | |
| | LCASPL | 0013 A | 84 | | | | | |
| | LCASPT | 0000 A | 61 | | | | | |
| | LCAST1 | 000C A | 77 | 197 | 200 | 275 | 331 | |
| | LCAST2 | 000D A | 78 | 293 | 308 | 310 | 324 | 326 |
| | LCAST3 | 000E A | 79 | | | | | |
| | LCAST4 | 000F A | 80 | | | | | |
| | LCASTN | 0016 A | 86 | | | | | |

```
  LCATRS   0005 A   65
> LEDRIV   0018     18    18   186
> LGCONT   001B     20    20
> LITOFF   001A     19    19   312
> LMPTST   002C     39    39   422
  LOGFG1   0008 A  152   158
  LS2BFD   0020 A  105
  LS2BTP   0002 A  109   309
  LS2DKR   0080 A  103   294   325
  LS2NTP   0004 A  108   309
  LS2RCP   0040 A  104
  LS2RCR   0010 A  106   325
  LS2TIP   0008 A  107   309
  LS2TSP   0001 A  110   309
  LS3BLE   0040 A  115
  LS3BVT   0080 A  114
  LS3MNE   0004 A  119
  LS3MTT   0020 A  116
  LS3NDR   0002 A  120
  LS3NEF   0008 A  118
  LS3STF   0010 A  117
  LSTCBP   0008 A   96
  LSTEMF   0080 A   92   216   327
  LSTEOT   0004 A   97
  LSTMMO   0002 A   98
1...RTN(A0011.02.030AA  CRS INTERRUPT HANDLER)          08/04/78  13:26:01  PAGE  12

  LSTMSF   0040 A   93   206   276   286
  LSTMTP   0001 A   99
  LSTPRG   0020 A   94
  LSTTBP   0010 A   95
> MLTEST   002D     40    40   426
  MODADV   0006 A  130
  MODFIR   0003 A  127
  MODFRA   0005 A  129
  MODFRE   0000 A  124
  MODPLY   0001 A  125
  MODPRG   0002 A  126
  MODTST   0004 A  128   302
> MTSFSQ   0031     44    44   442
> OVRIDE   0032     45    45   446
> PIADCR   0004      8     8   183
> PIADDR   0005      8     8   185
> PIAKCR   0007      8     8   201   210   288
> PIAKDR   0008      8     8   211   214
> PRGRAM   0024     31    31   390
> PRTACK   0039     52    52   168
> PRTBSY   0038     52    52   161
> RELHDR   0035     48    48   466
> RTUIDT   0022     29    29   378
  SAVIDX   0000 D  477   258   267   268   269   270   272   278   283   313   317   320   332
> SGLTST   002E     41    41   430
  SINTB    0008 A  132   177
> SLFTST   0029     36    36   225
> SPRADV   002F     42    42   434
> SPTADV   0030     43    43   438
> STACK    0012     14    14   329
> STAIDT   0021     28    28   374
> STLRCR   0001      7     7   173
> STLRCT   0015     18    18   175
> STLWCR   0000      7     7   170
> STLWCT   0014     18    18   172
> STSTAT   0013     15    15   204   223
> TAPBYP   0025     32    32   394
> TAPCNT   0016     18    18   179
  TCPBSS   0004 A  143   192
> TCPPBS   0006      8     8   190
> TCPPSW   0009      9     9   188
> TLTSRH   001E     25    25   358
> TMRCLK   0003      7     7   180
> TMRCNT   0017     18    18   182
> TMRSTS   0011     14    14   328
> TODSVC   001F     26    26   366
> TSBBEG   0036     49    49   470
> UNTSTS   0027     34    34   402
```

```
LEDRIV(A0011.02.031AA  CRS ROLL-ALONG PANEL DRIVER)     08/04/78  10:07:17  PAGE   1

                    *
                              DEF     LEDRIV,BYTBIT,IMPREP
                              DEF     BYTBP3
                              DEF     XT01,XT02
                              DEF     LINENO
                    *
                              REF     STSTAT
                    *
                              REF     LCTBLE,CURLSS,DPTLPT,ROLSTS,CURCSP
                    *
0002 A                 LCANRS  EQU     2            # STATIONS NOT RECORDED EACH SIDE OF S. P.
0003 A                 LCARSR  EQU     3            # RECORDING STATION TO 1ST RECORDING STATIN
0004 A                 LCABBR  EQU     4            TOTAL # STATIONS TO 1ST RECORDING STATION
0005 A                 LCATRS  EQU     5            TOTAL # RECORDING STATIONS
0014 A                 LCADPM  EQU     20           ADDR OF START FO DEPLOYMENT TABLE
0018 A                 LCASBT  EQU     24           ROLL-ALONG DISPLAY PARAMENTERS
0019 A                 LCASHA  EQU     25           ROLL-ALONG DISPLAY PARAMENTERS
                    *
                    *       LINE CONTROL STORAGE INDEXES
                    *
0000 A                 LCSSAP  EQU     0            SHOOTER A PARAMTERS
0026 A                 LCSSAR  EQU     38           SHOOTER A RECORDING PATTERN
                    *
0000 I                        ISEC
                    *
                    * LED DRIVER SUBROUTINE
                    *
                    * THIS SUBROUTINE IS CALLED WHENEVER THE
                    * FLASHER TIMER OF PIA 800A-B TIMES OUT.
                    *
0000 I                 LEDRIV  EQU     *
0000 I 7D 0000 R               TST     STSTAT       ON-LINE TEST ACTIVE
0003 I 27 01                   BEQ     LEDR1        NO - CONTINUE
0005 I 39                      RTS                  YES - IGNORE IRQ
0006 I 4F              LEDR1   CLR A
0007 I F6 800D A               LDA B   LINSW        PICK UP LINE SWITCH
000A I 26 01                   BNE     LEDL1
000C I 5C                      INC B
000D I 4C              LEDL1   INC A                CONVERT TO BINARY
000E I 56                      ROR B
000F I 24 FC                   BCC     LEDL1
0011 I B7 0007 D               STA A   LINENO       STORE THE LINE NUMBER
0014 I CE 8040 A               LDX     #ROLONG
0017 I FF 0009 D               STX     PANAD        INITIALIZE PANEL ADDRESS
001A I 4A                      DEC A
001B I 48                      ASL A
001C I 16                      TAB                  10 BYTES PER INDEX TABLE
001D I 48                      ASL A
001E I 48                      ASL A                LINE NUMBER TIMES EIGHT
001F I 1B                      ABA
0020 I F6 800F A               LDA B   SHOOTR       PICK UP SHOOTER SWITCH
0023 I C4 02                   AND B   #2
0025 I 1B                      ABA                  ADJUST OFFSET
0026 I CE 0001 R               LDX     #LCTBLE      POINT TO HEAD OF INDEX TABLE
0029 I BD 00D4 I               JSR     OFSUBI
002C I EE 04                   LDX     4,X          GET ADDRESS OF PARAMETERS
002E I FF 0002 R               STX     CURLSS       STORE CURRENT PARAMETER ADDRESS
0031 I F6 0004 R               LDA B   ROLSTS       CHECK FOR FUNCTION
LEDRIV(A0011.02.031AA  CRS ROLL-ALONG PANEL DRIVER)     08/04/78  10:07:18  PAGE   2

0034 I 59                      ROL B
0035 I 25 5B                   BCS     LEDLMP       LAMP TEST
0037 I 59                      ROL B
0038 I 25 40                   BCS     LEDDPL       DISPLAY DEPLOYMENT
                    *
                    * DISPLAY RECORDING PATTERN
                    *
003A I A6 18           LEDRCD  LDA A   LCASBT,X     PICK UP SHOT POINT BIT
003C I EE 19                   LDX     LCASHA,X     AND ADDRESS
003E I A8 00                   EOR A   0,X
0040 I A7 00                   STA A   0,X          COMPLEMENT THE BIT
0042 I 86 FF                   LDA A   #$FF
```

```
0044 I B7 0008 D               STA A  TOGGLE       MARK NOT DEPLOY
0047 I FE 0002 R               LDX    CURLSS
004A I 86 26                   LDA A  #PLSIZ       GO TO HEAD OF RECORDING PATTERN
004C I BD 00D4 I     LEDOUT    JSR    OFSUBI
004F I C6 0D         LEDL3     LDA B  #$D          LOOP COUNT
0051 I FE 000B D     LEDL2     LDX    XTORI
0054 I A6 00                   LDA A  0,X          TRANSFER FROM HERE
0056 I 7D 0008 D               TST    TOGGLE
0059 I 2B 02                   BMI    LEDJ1
005B I A8 1A                   EOR A  26,X         FLASH IF DEPLOY MODE
005D I 08            LEDJ1     INX
005E I FF 000B D               STX    XTORI
0061 I FE 0009 D               LDX    PANAD
0064 I 43                      COM A
0065 I A7 00                   STA A  0,X          TO HERE
0067 I 7C 000A D               INC    NDX
006A I 5A                      DEC B               THIRTEEN BYTES
006B I 26 E4                   BNE    LEDL2
006D I 8C 805C A               CPX    #$805C       LAST PASS?
0070 I 27 07                   BEQ    LEDRET
0072 I C6 50                   LDA B  #$50         NO-ADJUST TO
0074 I F7 000A D               STA B  NDX          TOP OF NEXT PANEL
0077 I 20 D6                   BRA    LEDL3
0079 I 39            LEDRET    RTS                 EXIT ROUTINE
                     *
                     * DISPLAY DEPLOYMENT
                     *
007A I 73 0008 D     LEDDPL    COM    TOGGLE       WORK THE FLASHER
007D I CE 0003 R               LDX    #DPTLPT      OFFSET FOR DEPLOYMENT LITE PATTERN
0080 I FF 000B D               STX    XTORI
0083 I F6 000B D               LDA B  XTORI
0086 I B6 000C D               LDA A  XTORI+1
0089 I FE 0002 R               LDX    CURLSS
008C I EE 14                   LDX    LCADPM,X     LOOK UP DEPLO PATTERNS
008E I 8D 45                   BSR    OFSUBI+1
0090 I 20 BD                   BRA    LEDL3
                     *
                     * LAMP TEST FUNCTION
                     *
0092 I CE 0020 A     LEDLMP    LDX    #$20         ZERO OUT SCRATCHPAD
0095 I 09            LEDL4     DEX
0096 I 6F 00                   CLR    0,X
0098 I 8C 0000 A               CPX    #0
009B I 26 F8                   BNE    LEDL4
009D I 86 AA                   LDA A  #$AA         SPOT TEST CODE FOR H-P NUMERALS
009F I A7 0D                   STA A  $D,X
LEDRIV(A0011.02.031AA  CRS ROLL-ALONG PANEL DRIVER)    08/04/78  10:07:19  PAGE   3

00A1 I A7 0E                   STA A  $E,X
00A3 I A7 1D                   STA A  $1D,X
00A5 I A7 1E                   STA A  $1E,X
00A7 I FF 000B D               STX    XTORI
00AA I A6 00         LEDL5     LDA A  0,X          TRANSFER THE PATTERN TO THE PANELS.
00AC I 7C 000C D               INC    XTORI+1
00AF I FE 0009 D               LDX    PANAD
00B2 I A7 00                   STA A  0,X
00B4 I 7C 000A D               INC    NDX
00B7 I FE 000B D               LDX    XTORI
00BA I 8C 0020 A               CPX    #$20
00BD I 26 EB                   BNE    LEDL5
00BF I 39                      RTS
                     *
                     *      OFFSET SUBROUTINE
                     *
00C0 I 5F            OFSUB1    CLR B               ENTER WITHA=OFFSET
00C1 I FF 000D D     OFSUB     STX    XTOR         OR A=LSB, B=MSB OF OFFSET
00C4 I BB 000E D               ADD A  XTOR+1       X=BASE VALUE
00C7 I F9 000D D               ADC B  XTOR         RETURN WITH:
00CA I B7 000E D               STA A  XTOR+1       X=OLD X + OFFSET
00CD I F7 000D D               STA B  XTOR         A=LSB OF X, B=MSB OF X
00D0 I FE 000D D               LDX    XTOR
00D3 I 39                      RTS
00D4 I 5F            OFSUBI    CLR B               RESERVED FOR LEDRIV PROGRAM
```

```
00D5 I FF 000B D             STX    XTORI        SAME FUNCTION AS OFSUB1
00D8 I BB 000C D             ADD A  XTORI+1
00DB I F9 000B D             ADC B  XTORI
00DE I B7 000C D             STA A  XTORI+1
00E1 I F7 000B D             STA B  XTORI
00E4 I FE 000B D             LDX    XTORI
00E7 I 39                    RTS
                   *
                   *     STATION OFFSET SUBROUTINE
                   *
00E8 I 36          STAOFF    PSH A               ENTER WITH A=STATION NUMBER
00E9 I C6 01                 LDA B  #1           ANSWER IS  A=OFFSET
00EB I 84 07                 AND A  #7           B = BIT PATTERN
00ED I 27 04                 BEQ    STAJ1
00EF I 58          STAL1     ASL B
00F0 I 4A                    DEC A
00F1 I 2E FC                 BGT    STAL1
00F3 I 32          STAJ1     PUL A
00F4 I 44                    LSR A
00F5 I 47                    ASR A
00F6 I 47                    ASR A
00F7 I 39                    RTS
                   *
                   *     IMAGE PREPARATION
                   *
                   * REG A CONTAINS THE SHOT STATION #
                   *
00F8 I             IMPREP    EQU    *
00F8 I CE 0000 A             LDX    #0
00FB I 6F 00       IMPL0     CLR    0,X
00FD I 08                    INX
00FE I 8C 00C8 A             CPX    #200         ZERO THE TABLE
0101 I 26 F8                 BNE    IMPL0
LEDRIV(A0011.02.031AA  CRS ROLL-ALONG PANEL DRIVER)     08/04/78  10:07:20  PAGE   4

0103 I 7F 0005 D             CLR    SHOSTA
0106 I B7 0006 D             STA A  SHOSTA+1     SAVE SHOT STATION #
0109 I 81 64                 CMP A  #100         ADJUST FOR SEAM
010B I 25 02                 BCS    IMPJ0
010D I 8B 04                 ADD A  #4
010F I 8D D7       IMPJ0     BSR    STAOFF       CALC OFFSET AND BIT PATTERN
0111 I FE 0005 R             LDX    CURCSP       GET PARAMETER LIST
0114 I E7 18                 STA B  LCASBT,X     SAVE BIT PATTERN
0116 I 36                    PSH A
0117 I 86 26                 LDA A  #PLSIZ
0119 I 8D A5                 BSR    OFSUB1       POINT TO HEAD OF REC. TABLE
011B I FF 0000 D             STX    XT01
011E I 32                    PUL A
011F I 8D 9F                 BSR    OFSUB1       CALC SHOT POINT ADDRESS
0121 I FE 0005 R             LDX    CURCSP
0124 I E7 19                 STA B  LCASHA,X     STORE IT IN PARAMETER LIST
0126 I A7 1A                 STA A  LCASHA+1,X
0128 I A6 05                 LDA A  LCATRS,X     HOW MANY STATION BELOW
012A I A0 03                 SUB A  LCARSR,X     SHOT POINT
012C I 2F 24                 BLE    IMPJ1        NONE
012E I E6 04                 LDA B  LCABBR,X
0130 I 27 01                 BEQ    IMPJ2
0132 I 5A                    DEC B
0133 I EB 02       IMPJ2     ADD B  LCANRS,X     CALC OFFSET FOR NEAREST STATION
0135 I FE 0005 D             LDX    SHOSTA
0138 I 8C 0000 A   IMPL1     CPX    #0
013B I 26 03                 BNE    IMPJ3
013D I CE 00C8 A             LDX    #200
0140 I 09          IMPJ3     DEX                 ADJUST POINTER TO THAT VALUE
0141 I 5A                    DEC B
0142 I 2C F4                 BGE    IMPL1
0144 I A7 00       IMPL2     STA A  0,X          FILL IN TABLE
0146 I 8C 0000 A             CPX    #0
0149 I 26 03                 BNE    IMPJ4
014B I CE 00C8 A             LDX    #200
014E I 09          IMPJ4     DEX
014F I 4A                    DEC A
0150 I 2E F2                 BGT    IMPL2        ALL FILLED IN?
0152 I FE 0005 R   IMPJ1     LDX    CURCSP
```

```
0155 I A6 03                  LDA A  LCARSR,X      GET # STATION ABOVE
0157 I 2F 26                  BLE    IMPJ5         SHOT POINT
0159 I E6 04                  LDA B  LCABBR,X      GET OFFSET TO NEAREST STATION
015B I E0 03                  SUB B  LCARSR,X
015D I 2C 01                  BGE    IMPJ6
015F I 5F                     CLR B
0160 I EB 02          IMPJ6   ADD B  LCANRS,X
0162 I FE 0005 D              LDX    SHOSTA
0165 I 08             IMPL3   INX                  ADJUST POINTER TO THAT STATION
0166 I 8C 00C8 A              CPX    #200
0169 I 26 03                  BNE    IMPJ7
016B I CE 0000 A              LDX    #0
016E I 5A             IMPJ7   DEC B
016F I 2C F4                  BGE    IMPL3
0171 I A7 00          IMPL4   STA A  0,X           FILL IN TABLE
0173 I 08                     INX
0174 I 8C 00C8 A              CPX    #200
0177 I 26 03                  BNE    IMPJ8
0179 I CE 0000 A              LDX    #0
LEDRIV(A0011.02.031AA  CRS ROLL-ALONG PANEL DRIVER)     08/04/78  10:07:21  PAGE   5

017C I 4A             IMPJ8   DEC A
017D I 2E F2                  BGT    IMPL4
017F I CE 0000 A      IMPJ5   LDX    #0            POINT TO SCRATCH TABLE
0182 I FF 0002 D              STX    XT02
0185 I 5F                     CLR B                SINGLE BYTE TABLE
0186 I 86 64                  LDA A  #100          CONVERT TO PERMANENT
0188 I 8D 05                  BSR    BYTBIT        RECORDING PATTERN
018A I 86 64                  LDA A  #100
018C I 8D 01                  BSR    BYTBIT
018E I 39                     RTS
                      *
                      * BYTE TO BIT CONVERTER
                      *
                      * SETS BITS IN DEST CORRESP TO NON-ZERO BYTES IN SOURCE
                      * ENTER WITH XT01 = FIRST DESTINATION (BIT LIST)
                      *            XT02 = FIRST SOURCE (BYTE LIST)
                      *            A = NUMBER OF BITS TO BE CONVERTED.
                      * RETURNS WITH DATA RIGHT-JUSTIFIED.
                      *       B = 0 FOR SINGLE BYTE
                      *       B = 1 FOR DOUBLE BYTE
                      *       B IS UNCHANGED ON RETURN
                      *
018F I F7 0004 D      BYTBIT  STA B  BYTCTR        SAVE BYTE CONTROL
0192 I                BYTBP3  EQU    *
0192 I 16                     TAB                  BIT COUNT
0193 I C4 07                  AND B  #7
0195 I 37                     PSH B                REMAINDER
0196 I 44                     LSR A
0197 I 44                     LSR A
0198 I 44                     LSR A                WORD COUNT
0199 I 27 12                  BEQ    BITFIN
019B I 36             BYTL1   PSH A
019C I C6 08                  LDA B  #8
019E I 8D 26                  BSR    BITPAK        PACK ONE WORD
01A0 I FE 0000 D              LDX    XT01
01A3 I A7 00                  STA A  0,X           STORE IT
01A5 I 08                     INX
01A6 I FF 0000 D              STX    XT01
01A9 I 32                     PUL A
01AA I 4A                     DEC A                COUNT IT
01AB I 2E EE                  BGT    BYTL1
01AD I 33             BITFIN  PUL B
01AE I 5D                     TST B                EXAMINE REMAINDER
01AF I 27 14                  BEQ    BITOUT
01B1 I 86 08                  LDA A  #8
01B3 I 10                     SBA                  CALCULATE NUMBER OF BLANKS
01B4 I 36                     PSH A
01B5 I 8D 0F                  BSR    BITPAK
01B7 I 33                     PUL B
01B8 I 44             BYTL2   LSR A                SHIFT IN BLANKS
01B9 I 5A                     DEC B
01BA I 26 FC                  BNE    BYTL2
```

```
01BC I FE 0000 D   286           LDX    XT01
01BF I A7 00       287           STA A  0,X         STORE THE FINAL WORD
01C1 I 08          288           INX
01C2 I FF 0000 D   289           STX    XT01
01C5 I 39          290 BITOUT    RTS
01C6 I FE 0002 D   291 BITPAK    LDX    XT02
LEDRIV(A0011.02.031AA  CRS ROLL-ALONG PANEL DRIVER)    08/04/78  10:07:23  PAGE   6

01C9 I 6D 00       292 BITL1     TST    0,X
01CB I 27 01       293           BEQ    BITJ1
01CD I 0D          294           SEC
01CE I 46          295 BITJ1     ROR A
01CF I 7D 0004 D   296           TST    BYTCTR      IS TABLE DOUBLE-BYTE
01D2 I 27 01       297           BEQ    BITJ2
01D4 I 08          298           INX
01D5 I 08          299 BITJ2     INX
01D6 I 5A          300           DEC B
01D7 I 2E F0       301           BGT    BITL1
01D9 I FF 0002 D   302           STX    XT02
01DC I 39          303           RTS
                   304 **
                   305 **      DATA SECTION
                   306 **
0000 D             307           DSEC
                   308 *
                   309 *       STORAGE REQUIREMENTS FOR LED DRIVER ROUTINES
                   310 *
8040 A             311 ROLONG    EQU    $8040
800F A             312 SHOOTR    EQU    $800F
800D A             313 LINSW     EQU    $800D
0000 D 0000    A   314 XT01      FDB    0
0002 D 0000    A   315 XT02      FDB    0
0004 D 00          316 BYTCTR    FCB    0
0005 D 0000    A   317 SHOSTA    FDB    0
0026 A             318 PLSIZ     EQU    LCSSAR-LCSSAP
0007 D 00          319 LINENO    FCB    0           LINE NUMBER STORAGE
0008 D 00          320 TOGGLE    FCB    0           FLASHER CONTROL
0009 D 00          321 PANAD     FCB    0           ROLL-ALONG PANEL ADDRESS VARIABLE
000A D 00          322 NDX       FCB    0           SECOND BYTE OF ADDRESS
000B D 0000    A   323 XTORI     FDB    0
000D D 0000    A   324 XTOR      FDB    0           USED BY OFSUB
000F               325           END
LEDRIV(A0011.02.031AA  CRS ROLL-ALONG PANEL DRIVER)    08/04/78  10:07:23  PAGE   7

  NO ERRORS
 ISECT LENGTH --   477
 DSECT LENGTH --    15

 BITFIN    01AD I   275    264
 BITJ1     01CE I   295    293
 BITJ2     01D5 I   299    297
 BITL1     01C9 I   292    301
 BITOUT    01C5 I   290    277
 BITPAK    01C6 I   291    267   281
< BYTBIT   018F I   256      3   240   242
< BYTBP3   0192 I   257      4
 BYTCTR    0004 D   316    256   296
 BYTL1     019B I   265    274
 BYTL2     01B8 I   283    285
> CURCSP   0005      10     10   182   190   214
> CURLSS   0002      10     10    58    73   104
> DPTLPT   0003      10     10   100
 IMPJ0     010F I   181    179
 IMPJ1     0152 I   214    195
 IMPJ2     0133 I   199    197
 IMPJ3     0140 I   204    202
 IMPJ4     014E I   211    209
 IMPJ5     017F I   236    216
 IMPJ6     0160 I   221    219
 IMPJ7     016E I   227    225
 IMPJ8     017C I   234    232
 IMPL0     00FB I   172    175
 IMPL1     0138 I   201    206
 IMPL2     0144 I   207    213
```

```
IMPL3     0165 I   223    228
IMPL4     0171 I   229    235
IMPREP    00F8 I   170      3
LCABBR    0004 A    14    196    217
LCADPM    0014 A    16    105
LCANRS    0002 A    12    199    221
LCARSR    0003 A    13    194    215    218
LCASBT    0018 A    17     67    183
LCASHA    0019 A    18     68    191    192
LCATRS    0005 A    15    193
LCSSAP    0000 A    22    318
LCSSAR    0026 A    23    318
LCTBLE    0001          10     10     55
LEDDPL    007A I    99     63
LEDJ1     005D I    82     80
LEDL1     000D I    40     38     42
LEDL2     0051 I    77     89
LEDL3     004F I    76     94    107
LEDL4     0095 I   112    115
LEDL5     00AA I   122    129
LEDLMP    0092 I   111     61
LEDOUT    004C I    75
LEDR1     0006 I    36     34
LEDRCD    003A I    67
LEDRET    0079 I    95     91
LEDRIV    0000 I    32      3
LINENO    0007 D   319      6     43
LEDRIV(A0011.02.031AA  CRS ROLL-ALONG PANEL DRIVER)     08/04/78  10:07:24  PAGE   8

LINSW     800D A   313     37
NDX       000A D   322     87     93    126
OFSUB     00C1 I   135
OFSUB1    00C0 I   134    186    189
OFSUBI    00D4 I   142     56     75    106
PANAD     0009 D   321     45     84    124
PLSIZ     0026 A   318     74    185
ROLONG    8040 A   311     44
ROLSTS    0004          10     10     59
SHOOTR    800F A   312     52
SHOSTA    0005 D   317    176    177    200    222
STAJ1     00F3 I   160    156
STAL1     00EF I   157    159
STAOFF    00E8 I   153    181
STSTAT    0000           8      8     33
TOGGLE    0008 D   320     72     79     99
XT01      0000 D   314      5    187    268    271    286    289
XT02      0002 D   315      5    237    291    302
XTOR      000D D   324    135    136    137    138    139    140
XTORI     000B D   323     77     83    101    102    103    121    123    127    143    144    145    146
                          147    148
TMRDVR(A0011.02.032AA  CRS COUNT DOWN TIMER DRIVER)     08/04/78  10:10:41  PAGE   1

                      *
                      *      CENTRAL RECORDING STATION COUNT DOWN TIMER DRIVER
                      *
0000 I                          ISEC
                      *
                                DEF     TMRCDV,TMRDVR,TMRCNT,TMRRQL
                                DEF     TMRBTV,TMRBT1,TMRBCA,TMRBC1
                                DEF     TMRCTR
                      *
                                REF     TMRSTS
                                REF     TMRCLK,TMRCK1
                      *
                      *      TIMER STATUS WORD EQUATES
                      *
0080 A                  TMRBSY  EQU     $80          TIMER BUSY
0040 A                  TMRRCP  EQU     $40          REQUEST COMPLETE
                      *
                      *      CALLING SEQUENCE: JSR  TMRDVR
                      *
                      *      .      TIMER REQUEST INITIALIZATION ROUTINE
                      *
```

```
0000 I              23 TMRCDV    EQU    *
0000 I 7F 0000 D    24           CLR    TMRCTR        CLEAR MULTIPLE CNTR
0003 I              25 TMRDVR    EQU    *
0003 I 01           26           NOP
0004 I 0F           27           SEI
0005 I B6 0000 R    28           LDA A  TMRSTS        SET TIMER
0008 I 8A 80        29           ORA A  #TMRBSY       REQUEST BUSY
000A I 84 BF        30           AND A  #-1-TMRRCP    RESET REQUEST
000C I B7 0000 R    31           STA A  TMRSTS        COMPLETE FLAG
000F I B6 0001 R    32           LDA A  TMRCLK        CLEAR PENDING INTERRUPT
0012 I B6 0002 D    33           LDA A  TMRBT1        SET
0015 I F6 0001 D    34           LDA B  TMRBTV        COUNT DOWN
0018 I B7 0001 R    35           STA A  TMRCLK        SET LEAST SIGNIFICANT CNT
001B I F7 0002 R    36           STA B  TMRCK1        SET MOST SIGNIFICANT
001E I FE 0003 D    37           LDX    TMRBCA        COMPLETION ADDRESS SPECIFIED ?
0021 I 27 01        38           BEQ    TMRRQL        NO
0023 I 39           39           RTS                  RETURN TO CALLER
0024 I              40 TMRRQL    EQU    *             TIMER REQUEST LOOP
0024 I 01           41           NOP
0025 I 0E           42 TMR1      CLI                  CLEAR INTERRUPT MASK
0026 I 3E           43           WAI                  WAIT FOR TIMER INTERRUPT
0027 I 01           44           NOP
0028 I 0F           45           SEI                  MASK INTERRUPTS
0029 I B6 0000 R    46           LDA A  TMRSTS        TIMER
002C I 85 40        47           BIT A  #TMRRCP       REQUEST COMPLETE ?
002E I 27 F5        48           BEQ    TMR1          NO
0030 I 01           49           NOP
0031 I 0E           50           CLI                  CLEAR INTERRUPT MASK
0032 I 39           51           RTS                  RETURN TO CALLER
                    52 *
                    53 *      TIMER DRIVER CONTINUATOR
                    54 *
0033 I              55 TMRCNT    EQU    *
0033 I B6 0000 R    56           LDA A  TMRSTS        REQUEST BUSY ?
0036 I 2A 20        57           BPL    TMR2          NO
0038 I 7A 0000 D    58           DEC    TMRCTR        REQUEST
003B I 2F 0D        59           BLE    TMR3          COMPLETE
TMRDVR(A0011.02.032AA  CRS COUNT DOWN TIMER DRIVER)     08/04/78  10:10:43  PAGE   2

003D I B6 0002 D    60           LDA A  TMRBT1
0040 I F6 0001 D    61           LDA B  TMRBTV
0043 I B7 0001 R    62           STA A  TMRCLK        SET LEAST SIGNIFICANT CNT
0046 I F7 0002 R    63           STA B  TMRCK1        SET MOST SIGNIFICANT
0049 I 3B           64           RTI
004A I 8A 40        65 TMR3      ORA A  #TMRRCP       SET TIMER REQUEST COMPLETE
004C I 84 7F        66           AND A  #-1-TMRBSY    RESET REQUEST BUSY
004E I B7 0000 R    67           STA A  TMRSTS        SET TIMER STATUS
0051 I FE 0003 D    68           LDX    TMRBCA        COMPLETION ADDRESS ?
0054 I 27 02        69           BEQ    TMR2          NO
0056 I 6E 00        70           JMP    0,X           CALL COMPLETION ADDR
0058 I 3B           71 TMR2      RTI                  RETURN FROM INTERRUPT
0000 D              72           DSEC
                    73 *
                    74 *      TIMER REQUEST BLOCK
                    75 *
0000 D              76 TMRRQB    EQU    *
0000 D 00           77 TMRCTR    FCB    0             # TIMEOUTS ON MULTIPLE REQUEST
0001 D 0000     A   78 TMRBTV    FDB    0             TIMER COUNT DOWN VALUE
0002 D              79 TMRBT1    EQU    *-1
0003 D 0000     A   80 TMRBCA    FDB    0             COMPLETION ADDRESS (0 IF NORMAL REQUEST
0004 D              81 TMRBC1    EQU    *-1
                    82 *
                    83 *      STORAGE REQUIREMENTS FOR 'TMRREQ'
                    84 *
0005 D 0000     A   85 TMRTSV    FDB    0             COUNT VALUE SAVE AREA
0007                86           END
TMRDVR(A0011.02.032AA  CRS COUNT DOWN TIMER DRIVER)     08/04/78  10:10:43  PAGE   3

  NO ERRORS
 ISECT LENGTH --    89
 DSECT LENGTH --     7

 TMR1       0025 I    42     48
 TMR2       0058 I    71     57     69
```

```
  TMR3      004A I   65    59
< TMRBC1    0004 D   81     8
< TMRBCA    0003 D   80     8    37    68
  TMRBSY    0080 A   16    29    66
< TMRBT1    0002 D   79     8    33    60
< TMRBTV    0001 D   78     8    34    61
< TMRCDV    0000 I   23     7
> TMRCK1    0002     12    12    36    63
> TMRCLK    0001     12    12    32    35    62
< TMRCNT    0033 I   55     7
< TMRCTR    0000 D   77     9    24    58
< TMRDVR    0003 I   25     7
  TMRRCP    0040 A   17    30    47    65
  TMRRQB    0000 D   76
< TMRRQL    0024 I   40     7    38
> TMRSTS    0000     11    11    28    31    46    56    67
  TMRTSV    0005 D   85
RTUCMD(A0011.02.033AA  CRS COMMAND OUTPUT ROUTINE)      08/04/78  10:11:48  PAGE   1

                     *
                     *     CENTRAL RECORDING STATION RTU COMMAND OUTPUT ROUTINE
                     *
0000 I                          ISEC
                     *
                                DEF     RTUCMD
                                DEF     CFRMWD
                     *
                                REF     CMDFAR,CMDFCR
                                REF     TMRBTV,TMRBCA,TMRBC1
                                REF     MSGRQT,TPMCNT
                                REF     RTUADR,MONSTS,DATMON
                                REF     CURCSP
                                REF     RCMAPT
                                REF     RCMAPN
                     *
                                REF     TMRCDV,CHKRDP,MSGOUT
                                REF     CLRDSP
                                REF     LOGFRM
                     *
                     *     COMMAND FORMATTER STATUS WORD EQUATES
                     *
 0080 A                CFRBSY   EQU     $80          FORMATTER BUSY
 0040 A                CFRCAR   EQU     $40          CARRIER DETECT MODE FLAG
 0020 A                CFRTLT   EQU     $20          TILT MODE FLAG
                     *
                     *     LINE STATUS FLAG EQUATES
                     *
 000D A                LCAST2   EQU     13           LINE STATUS FLAGS (BYTE 2)
 0001 A                LS2TSP   EQU     1            TILT SEARH-IN-PROGRESS
                     *
                     *     MESSAGE REQUEST EQUATES
                     *
 0004 A                MSGTRC   EQU     4            RETRY OR CONTINUE REQUEST
                     *
                     *     SCOPE CONTROL EQUATES
                     *
 0000 A                SCPRFS   EQU     0            SELECT RF SPECTRUM
 0002 A                SCPSDT   EQU     2            SEISMIC DATA
                     *
 0002 A                RTUINT   EQU     2            RTU INITIALIZE COMMAND
                     *
                     *     CALLING SEQUENCE:  JSR  RTUCMD
                     *
                     *     REGISTER CONTENTS:  ACCA => RTU ADDRESS
                     *                         ACCB => RTU COMMAND
                     *                         IDX  => TIMER REQUEST TIMEOUT LENTH
                     *
  0000 I               RTUCMD   EQU     *
  0000 I B7 0007 R              STA A   RTUADR       SAVE RTU ADDR
  0003 I 26 01                  BNE     RTUC1        JUMP IF NOT ARTIFICIAL RTU
  0005 I 39                     RTS
  0006 I F7 0007 D     RTUC1    STA B   RTCMDS       SAVE RTU COMMAND
  0009 I FF 0003 D              STX     RTUTSV       SAVE RTU COMMAND TIMEOUT VALUE
  000C I 30                     TSX
```

```
000D I FF 0000 D    57          STX    RCMDSV        SAVE STACK POINTER
0010 I B6 0008 R    58          LDA A  MONSTS
0013 I 84 FD        59          AND A  #-1-SCPSDT    SELECT RF SPECTRUM FOR SCOPE DISPLAY
RTUCMD(A0011.02.033AA  CRS COMMAND OUTPUT ROUTINE)      08/04/78  10:11:49  PAGE   2

0015 I B7 0008 R    60          STA A  MONSTS        UPDATE MONITOR AND SCOPE STATUS
0018 I B7 0009 R    61          STA A  DATMON        SETUP DATA MONITOR CONTROL REGISTER
001B I 7D 0000 R    62 RTC1     TST    CMDFAR        COMMAND FORMATTER BUSY
001E I 2B FB        63          BMI    RTC1          YES, LOOP ON FORMATTER BUSY
0020 I B6 0002 D    64          LDA A  CFRMWD
0023 I 85 20        65          BIT A  #CFRTLT       TILT MODE FLAG SET ?
0025 I 26 07        66          BNE    RTC1A         YES
0027 I B6 0000 R    67 RTC1B    LDA A  CMDFAR        WAIT FOR CARRIER
002A I 2B FB        68          BMI    RTC1B         TO FALL
002C I 20 33        69          BRA    RTC2
002E I 8A 80        70 RTC1A    ORA A  #CFRBSY       SET COMMAND FORMATTER BUSY STATUS
0030 I CE 00AB I    71 RTCR     LDX    #RTUCMP       SETUP TIMEOUT
0033 I FF 0003 R    72          STX    TMRBCA        COMPLETION ADDR
0036 I 8A 40        73          ORA A  #CFRCAR       SET CARRIER HIGH DETECT STATUS BIT
0038 I B7 0002 D    74          STA A  CFRMWD        SAVE COMMAND FORMATTER STATUS WORD
003B I CE 0BB8 A    75          LDX    #3000         SETUP 3 SECOND TIMEOUT LIMIT
003E I FF 0002 R    76          STX    TMRBTV
0041 I BD 000D R    77          JSR    TMRCDV        INITIATE TIMEOUT REQUEST
0044 I 0E           78          CLI
0045 I B6 0000 R    79 RTC3     LDA A  CMDFAR
0048 I 48           80          ASL A                CARRIER HIGH ?
0049 I 2A FA        81          BPL    RTC3          NO, WAIT FOR CARRIER TO GO HIGH
004B I B6 0002 D    82 RTC9     LDA A  CFRMWD
004E I 84 BF        83          AND A  #-1-CFRCAR    RESET CARRIER HIGH DETECT STATUS
0050 I B7 0002 D    84          STA A  CFRMWD        SAVE COMMAND FORMATTER STATUS
0053 I B6 0000 R    85 RTC4     LDA A  CMDFAR
0056 I 48           86          ASL A                CARRIER LOW ?
0057 I 2B FA        87          BMI    RTC4          NO, WAIT FOR CARRIER TO GO LOW
0059 I B6 0002 D    88 RTCX     LDA A  CFRMWD
005C I 84 7F        89          AND A  #-1-CFRBSY    RESET FORMATTER BUSY STATUS BIT
005E I B7 0002 D    90          STA A  CFRMWD
0061 I B6 0007 R    91 RTC2     LDA A  RTUADR
0064 I 81 FF        92          CMP A  #$FF          ALL ACTIVE RTU ADDR
0066 I 26 1D        93          BNE    RTC2A         NO, CONTINUE
0068 I FE 000B R    94          LDX    RCMAPT
006B I 09           95 RTC2C    DEX
006C I 8C 000C R    96          CPX    #RCMAPN
006F I 27 0F        97          BEQ    RTC2B         ALL RTU'S IN LIST PROCESSED
0071 I A6 00        98          LDA A  0,X
0073 I B7 0007 R    99          STA A  RTUADR
0076 I FF 0005 D   100          STX    RAPTSV        SAVE ACTIVE LIST PNTR
0079 I 8D 69       101          BSR    SETRCC        INCR RTU COMMAND COUNT
007B I FE 0005 D   102          LDX    RAPTSV
007E I 20 EB       103          BRA    RTC2C
0080 I 86 FF       104 RTC2B    LDA A  #$FF
0082 I B7 0007 R   105          STA A  RTUADR
0085 I 8D 5D       106 RTC2A    BSR    SETRCC        INCR RTU COMMAND COUNT
0087 I F6 0007 D   107          LDA B  RTCMDS        RESTORE RTU COMMAND
008A I B6 0007 R   108          LDA A  RTUADR
008D I B7 0000 R   109          STA A  CMDFAR        SET RTU ADDRESS IN ADDRESS REGISTER
0090 I 7D 0000 R   110 RTC6     TST    CMDFAR        WAIT UNTIL COMMAND SENT OUT
0093 I 2B FB       111          BMI    RTC6          BY LOOPING ON FORMATTER BUSY
0095 I 7F 0003 R   112          CLR    TMRBCA
0098 I 7F 0004 R   113          CLR    TMRBC1        CLEAR TIMER COMPLETION ADDR
009B I FE 0003 D   114          LDX    RTUTSV
009E I 27 06       115          BEQ    RTC6A         JUMP IF NO TIMEOUT SPECIFIED
00A0 I FF 0002 R   116          STX    TMRBTV        SET RTU COMMAND TIMEOUT VALUE
00A3 I BD 000D R   117          JSR    TMRCDV        INITIATE TIMER REQUEST
RTUCMD(A0011.02.033AA  CRS COMMAND OUTPUT ROUTINE)      08/04/78  10:11:51  PAGE   3

00A6 I FE 0000 D   118 RTC6A    LDX    RCMDSV        RESTORE STACK PNTR
00A9 I 35          119          TXS
00AA I 39          120          RTS                  RETURN TO CALLER
                   121 *
                   122 *     COMMAND FORMATTER TIMEOUT COMPLETION ROUTINE
                   123 *
00AB I             124 RTUCMP   EQU    *
00AB I 01          125          NOP
00AC I 0E          126          CLI                  CLEAR INTERRUPTS
```

```
00AD I B6 0002 D   127          LDA A  CFRMWD      RTU CMND FORMATTER BUSY STATUS BIT SET
00B0 I 2B 01       128          BMI    RTC7        YES, TIMEOUT FOR CARRIER DETECT SEQUENCE
00B2 I 3B          129          RTI                RETURN TO INTERRUPTED ROUTINE
00B3 I 85 40       130 RTC7     BIT A  #CFRCAR     CARRIER HIGH DETECT TIMEOUT ?
00B5 I 26 1C       131          BNE    RTC8        YES, CHECK IF TILT SEARCH-IN-PROGRESS
00B7 I CE 4537 A   132          LDX    #$4537
00BA I BD 0011 R   133          JSR    LOGFRM
00BD I CE 00F8 I   134          LDX    #SYERCF     COMMAND FORMATTER SYSTEM ERROR
00C0 I FF 0005 R   135          STX    MSGRQT
00C3 I C6 04       136          LDA B  #MSGTRC
00C5 I BD 000F R   137          JSR    MSGOUT      ALLOW OPERATOR TO RETRY OR CONTINUE
00C8 I 26 09       138          BNE    RTC8        JUMP IF CONTINUE
00CA I BD 0010 R   139          JSR    CLRDSP      CLEAR DISPLAY
00CD I B6 0002 D   140          LDA A  CFRMWD      RESTORE FORMATTER STATUS WORD
00D0 I 7E 0030 I   141          JMP    RTCR        RETRY SEQUENCE
00D3 I FE 000A R   142 RTC8     LDX    CURCSP
00D6 I E6 0D       143          LDA B  LCAST2,X
00D8 I C5 01       144          BIT B  #LS2TSP     TILT SEARCH-IN-PROGRESS
00DA I 27 05       145          BEQ    RTC8A       NO, COMPLETE OUTPUT OF COMMAND
00DC I 84 DF       146          AND A  #-1-CFRTLT  RESET TILT MODE FLAG
00DE I B7 0002 D   147          STA A  CFRMWD      SAVE FORMATTER STATUS WORD
00E1 I 7E 0059 I   148 RTC8A    JMP    RTCX
                   149 *
                   150 *     ROUTINE TO INCR RTU COMMAND COUNT
                   151 *
00E4 I             152 SETRCC   EQU    *
00E4 I BD 000E R   153          JSR    CHKRDP      PICK UP PNTR TO PROPER RTU MAP ENTRY
00E7 I F6 0007 D   154          LDA B  RTCMDS      RESTORE RTU COMMAND
00EA I 4F          155          CLR A              ANTICIPATE ACKNOWLEDGE OR INITIALIZE COMMAD
00EB I F7 0001 R   156          STA B  CMDFCR      SET RTU COMMAND IN COMMAND REGISTER
00EE I C0 02       157          SUB B  #RTUINT     CHECK IF DATA ACKNOWLEDGE OR INITIALIZE
00F0 I 23 03       158          BLS    RTC5        YES, ZERO CURRENT COMMAND COUNT
00F2 I A6 03       159          LDA A  3,X         INCR CURRENT COMMAND COUNT
00F4 I 4C          160          INC A
00F5 I A7 03       161 RTC5     STA A  3,X         UPDATE COUNTER
00F7 I 39          162          RTS
                   163 *
                   164 *     RTU COMMAND OUTPUT ROUTINE MESSAGES
                   165 *
00F8 I 535953      166 SYERCF   FCC    /SYSTEM ERROR-COMMAND FORMATTER/
0116 I 0D          167          FCB    $D,$E
0117 I 0E
0118 I 0006     R  168          FDB    TPMCNT
                   169 *
                   170 *
                   171          DEF    RTUXMT,RTUPNT,RTUPPT
                   172          DEF    RTUSTS,STS4MS,STS2MS,STSIAV,STSACT,STS1BK
                   173          DEF    STS2BK,STS3BK,STS4BK,STS5BK,STS6BK,STS7BK
                   174          DEF    RTUSPT,SELCH1,SELCH2,SELCH3,SELCH4
RTUCMD(A0011.02.033AA  CRS COMMAND OUTPUT ROUTINE)      08/04/78  10:11:52  PAGE   4

                   175          DEF    RTUBLT,RTUACK,DATACK,RTUINT
                   176          DEF    RTUPTB,RTUACT
                   177 *
                   178 *
                   179 *     RTU COMMAND EQUATES
                   180 *
00C0 A             181 RTUXMT   EQU    $C0         TRANSMIT COMMAND
                   182 *
0020 A             183 RTUPNT   EQU    $20         PERFORM NORMAL TEST AND 0 SECS NOISE TEST
                   184 *
0040 A             185 RTUPPT   EQU    $40         PERFORM PERFORMANCE TEST
                   186 *
0060 A             187 RTUSTS   EQU    $60         RTU STATUS TRANSFER
0000 A             188 STS4MS   EQU    0           4 MSEC SAMPLE
0010 A             189 STS2MS   EQU    $10         2 MILLI SEC SAMPLE
0000 A             190 STSIAV   EQU    0           INACTIVE STATE
0008 A             191 STSACT   EQU    8           ACTIVE STATE
0000 A             192 STS1BK   EQU    0           20 K BIT XMIT VLOCK SIZE
0001 A             193 STS2BK   EQU    1           40
0002 A             194 STS3BK   EQU    2           60
0003 A             195 STS4BK   EQU    3           80
0004 A             196 STS5BK   EQU    4           100
```

```
0005 A          197 STS6BK    EQU    5          120
0006 A          198 STS7BK    EQU    6          160
                199 *
0080 A          200 RTUSPT    EQU    $80        SHOT POINT SELECT
0001 A          201 SELCH1    EQU    1          SELECT CHANNEL # 1
0002 A          202 SELCH2    EQU    2          SELECT CHANNEL # 2
0003 A          203 SELCH3    EQU    3          SELECT CHANNEL # 3
0004 A          204 SELCH4    EQU    4          SELECT CHANNEL # 4
                205 *
00E0 A          206 RTUBLT    EQU    $E0        BLAST COMMAND, STORE 0 SECONDS OF DATA
0000 A          207 RTUACK    EQU    0          ACK. - INIT
0001 A          208 DATACK    EQU    1          DTAT ACKNOWLEDGE
0002 A          209 RTUINT    EQU    2          INITIALIZE
                210 *
0004 A          211 RTUPTB    EQU    $4         PREPARE TO BLAST
                212 *
                213 *
00FF A          214 RTUACT    EQU    $FF        RTU ADDRESS FOR ALL ACTIVE RTUS
                215 *
                216           DEF    RCTXRT
                217           DEF    RCTPB2
                218           DEF    RCTPB4
                219           DEF    RCTNT2
                220           DEF    RCTNT4
                221           DEF    RCTNS2
                222           DEF    RCTNS4
                223           DEF    RCTPT2
                224           DEF    RCTPT4
                225           DEF    RCTSST
                226           DEF    RCTSEL
                227           DEF    RCTMAX
                228           DEF    RCTXMT
                229           DEF    RCTBLT
                230           DEF    RCTACK
                231 *
                232 *
RTUCMD(A0011.02.033AA  CRS COMMAND OUTPUT ROUTINE)      08/04/78  10:11:53  PAGE   5

                233 *       RTU COMMAND DURATION TIMES (MILLISECONDS)
                234 *
0064 A          235 RCTXRT    EQU    100        XMIT/RECEIVE TURNAROUND TIME
238C A          236 RCTPB2    EQU    9100       PREPARE TO BLAST (2 MXEC)
332C A          237 RCTPB4    EQU    13100      PREPARE TO BLAST (4 MSEC)
01A0 A          238 RCTNT2    EQU    416        NORMAL TEST W/O NOISE (2 MSEC)
01AE A          239 RCTNT4    EQU    430        NORMAL TEST W/O NOISE (4 MSEC)
1E14 A          240 RCTNS2    EQU    7700       NORMAL TEST W/ NOISE (2 MSEC)
2D50 A          241 RCTNS4    EQU    11600      NORMAL TEST W/ NOISE (4 MSEC)
4330 A          242 RCTPT2    EQU    17200      PERFORMANCE TEST (2 MSEC)
5F5B A          243 RCTPT4    EQU    24411      PERFORMANCE TEST (4 MSEC)
0136 A          244 RCTSST    EQU    310        SET RTU STATUS
0136 A          245 RCTSEL    EQU    310        SELECT SHOT POINT
0BB8 A          246 RCTMAX    EQU    3000       ALL OF MEMORY TRANSMISSION TIME
00C8 A          247 RCTXMT    EQU    200        TRANSMIT SINGLE BLOCK
0708 A          248 RCTBLT    EQU    1800       BLAST COMMAND
0136 A          249 RCTACK    EQU    310        ACKNOWLEDGE-INITIALIZE
                250 *
                251 *       DEF    PCTCRS
                252           DEF    PCTRTU
                253 *
                254 *
                255 *       PARITY COUNT LIMITS
                256 *
000A A          257 PCTCRS    EQU    10         CRS RF PARITY COUNT
0005 A          258 PCTRTU    EQU    5          CCD MEMORY PARITY COUNT
                259 *
                260           DEF    XMTNTD,XMTPTD,XMTPT4
                261 *
                262 *
                263 *       RTU WORD XMIT VALUES
                264 *
0018 A          265 XMTNTD    EQU    24         NORMAL TEST WORD LENGTH
0610 A          266 XMTPTD    EQU    1552       PERFORMANCE TEST WORD LENGTH
0410 A          267 XMTPT4    EQU    1040       PERFORMANCE TEST WORD LENGTH ( 4 MSEC SAMPE
```

```
0000 D              268          DSEC
                    269 *
                    270 *      STORAGE REQUIREMENTS FOR 'RTUCMD'
                    271 *
0000 D 0000    A    272 RCMDSV    FDB    0          STACK PNTR SAVE AREA
0002 D 00           273 CFRMWD    FCB    0          RTU COMMAND FORMATTER STATUS WORDS
0003 D 0000    A    274 RTUTSV    FDB    0          RTU COMMAND TIMEOUT SAVE AREA
0005 D 0000    A    275 RAPTSV    FDB    0
0007 D 00           276 RTCMDS    FCB    0          RTU COMMAND SAVE AREA
                    277 *
0008                278          END
RTUCMD(A0011.02.033AA  CRS COMMAND OUTPUT ROUTINE)      08/04/78  10:11:54  PAGE   6

  NO ERRORS
 ISECT LENGTH --   282
 DSECT LENGTH --     8

  CFRBSY    0080 A    24     70    89
  CFRCAR    0040 A    25     73    83   130
< CFRMWD    0002 D   273      8    64    74    82    84    88    90   127   140   147
  CFRTLT    0020 A    26     65   146
> CHKRDP    000E      18     18   153
> CLRDSP    0010      19     19   139
> CMDFAR    0000      10     10    62    67    79    85   109   110
> CMDFCR    0001      10     10   156
> CURCSP    000A      14     14   142
< DATACK    0001 A   208    175
> DATMON    0009      13     13    61
  LCAST2    000D A    30    143
> LOGFRM    0011      20     20   133
  LS2TSP    0001 A    31    144
> MONSTS    0008      13     13    58    60
> MSGOUT    000F      18     18   137
> MSGRQT    0005      12     12   135
  MSGTRC    0004 A    35    136
  PCTCRS    000A A   257
< PCTRTU    0005 A   258    252
  RAPTSV    0005 D   275    100   102
> RCMAPN    000C      16     16    96
> RCMAPT    000B      15     15    94
  RCMDSV    0000 D   272     57   118
< RCTACK    0136 A   249    230
< RCTBLT    0708 A   248    229
< RCTMAX    0BB8 A   246    227
< RCTNS2    1E14 A   240    221
< RCTNS4    2D50 A   241    222
< RCTNT2    01A0 A   238    219
< RCTNT4    01AE A   239    220
< RCTPB2    238C A   236    217
< RCTPB4    332C A   237    218
< RCTPT2    4330 A   242    223
< RCTPT4    5F5B A   243    224
< RCTSEL    0136 A   245    226
< RCTSST    0136 A   244    225
< RCTXMT    00C8 A   247    228
< RCTXRT    0064 A   235    216
  RTC1      001B I    62     63
  RTC1A     002E I    70     66
  RTC1B     0027 I    67     68
  RTC2      0061 I    91     69
  RTC2A     0085 I   106     93
  RTC2B     0080 I   104     97
  RTC2C     006B I    95    103
  RTC3      0045 I    79     81
  RTC4      0053 I    85     87
  RTC5      00F5 I   161    158
  RTC6      0090 I   110    111
  RTC6A     00A6 I   118    115
  RTC7      00B3 I   130    128
  RTC8      00D3 I   142    131   138
RTUCMD(A0011.02.033AA  CRS COMMAND OUTPUT ROUTINE)      08/04/78  10:11:55  PAGE   7

  RTC8A     00E1 I   148    145
  RTC9      004B I    82
```

```
  RTCMDS    0007 D   276     54    107   154
  RTCR      0030 I    71    141
  RTCX      0059 I    88    148
< RTUACK    0000 A   207    175
< RTUACT    00FF A   214    176
> RTUADR    0007      13     13     51    91    99   105   108
< RTUBLT    00E0 A   206    175
  RTUC1     0006 I    54     52
< RTUCMD    0000 I    50      7
  RTUCMP    00AB I   124     71
  RTUINT    0002 A   209    157    175
< RTUPNT    0020 A   183    171
< RTUPPT    0040 A   185    171
< RTUPTB    0004 A   211    176
< RTUSPT    0080 A   200    174
< RTUSTS    0060 A   187    172
  RTUTSV    0003 D   274     55    114
< RTUXMT    00C0 A   181    171
  SCPRFS    0000 A    39
  SCPSDT    0002 A    40     59
< SELCH1    0001 A   201    174
< SELCH2    0002 A   202    174
< SELCH3    0003 A   203    174
< SELCH4    0004 A   204    174
  SETRCC    00E4 I   152    101    106
< STS1BK    0000 A   192    172
< STS2BK    0001 A   193    173
< STS2MS    0010 A   189    172
< STS3BK    0002 A   194    173
< STS4BK    0003 A   195    173
< STS4MS    0000 A   188    172
< STS5BK    0004 A   196    173
< STS6BK    0005 A   197    173
< STS7BK    0006 A   198    173
< STSACT    0008 A   191    172
< STSIAV    0000 A   190    172
  SYERCF    00F8 I   166    134
> TMRBC1    0004      11     11    113
> TMRBCA    0003      11     11     72   112
> TMRBTV    0002      11     11     76   116
> TMRCDV    000D      18     18     77   117
> TPMCNT    0006      12     12    168
< XMTNTD    0018 A   265    260
< XMTPT4    0410 A   267    260
< XMTPTD    0610 A   266    260
STLDVR(A0011.02.034AA  CRS SATELLITE DRIVER)          08/04/78  13:13:28  PAGE   1

                           2 *
                           3 *      CENTRAL RECORDING STATION SATELLITE COMPUTER DRIVER
                           4 *
 0000 I                    5          ISEC
                           6 *
                           7          DEF    STLCRQ,STLDVR,STLRCT,STLWCT
                           8          DEF    SXMTBF,SRCVBF
                           9          DEF    SRVB15,SRB114,SRB115,SRB117
                          10          DEF    SRCVB1,SRCVB2,SRCVB3,SRCVB4,SRCVB5,SRCVB6,SRCVB7
                          11          DEF    SRCVB8,SRCVB9,SRVB10
                          12          DEF    SRVB35
                          13          DEF    SXTB11,SXTB14,SXTB18,SXTB21,SXTB26
                          14          DEF    SXMTB1,SXMTB2,SXMTB3,SXMTB4,SXMTB5,SXMTB6
                          15          DEF    SXMTB7,SXMTB8,SXMTB9,SXTB10
                          16          DEF    SXTB12,SXTB15,SXTB16,SXTB22
                          17          DEF    SXTB13
                          18          DEF    SYRDDS
                          19 *
                          20          REF    MVCSTR,MVCDST
                          21          REF    MONSTS,STLSW1,STLSW2,TMRSTS,TAPST1
                          22          REF    DATMON,STLRDR,STLWDR
                          23          REF    TAPRQT,TAPLEN,TAPTMO,TAPCPA
                          24          REF    TMRCTR,TMRBTV,TMRBCA,TMRBC1,TMRCNT
                          25          REF    TPMCNT
                          26          REF    MSGRQT
                          27 *
```

```
                       REF      MVCHAR,IDXRTN,TMRDVR,TAPDVR,TMRRQL
                       REF      LOGFRM
                       REF      MSGOUT
              *
                       DEF      STLBCD,STLBRT,STLBRV,STLBTV
                       DEF      STLBWT,STLBXT,STLTRC,STLTRT
              *
              *      TIMER STATUS WORD EQUATES
              *
0080 A        TMRBSY   EQU      $80          TIMER BUSY
0040 A        TMRRCP   EQU      $40          REQUEST COMPLETE
              *
              *      SATELLITE STATUS WORD 1 EQUATES
              *
0080 A        SW1SRB   EQU      $80          SATELLITE REQUEST BUSY
0040 A        SW1SRC   EQU      $40          SATELLITE REQUEST COMPLETE
0020 A        SW1DTO   EQU      $20          DEVICE TIMEOUT (SET IF TAPE UNIT ERROR)
0010 A        SW1STO   EQU      $10          SOFTWARE TIMEOUT
0008 A        SW1MRQ   EQU      8            MONITOR REQUEST
0004 A        SW1TRQ   EQU      4            TAPE REQUEST
0002 A        SW1URD   EQU      2            UNFORMATTED REQD
0001 A        SW1WRS   EQU      1            W/R SEQUENCE
              *
              *      SATELLITE STATUS WORD 2 EQUATES
              *
0080 A        SW2SSC   EQU      $80          SATELLITE SEQ COMPLETE
0040 A        SW2TSC   EQU      $40          TAPE SEQ COMPLETE
0020 A        SW2EXT   EQU      $20          EXTENDED FORMAT REQUEST
0010 A        SW2WRM   EQU      $10          W/R MODE (0 => WRITE; 1 => READ
0008 A        SW2INT   EQU      8            SATELLITE INTERRUPT
0004 A        SW2XRC   EQU      4            XMT/RCV COMPLETE
0002 A        SW2BTR   EQU      2            BAD TAPE REQUEST
STLDVR(A0011.02.034AA  CRS SATELLITE DRIVER)   08/04/78  13:13:29  PAGE  2

0001 A        SW2DPE   EQU      $1           DATA PROCESSOR ERROR
              *
              *      MAG TAPE UNIT STATUS WORD 1 EQUATES
              *
0080 A        TW1TRB   EQU      $80          TAPE REQUEST BUSY
0020 A        TW1DER   EQU      $20          DEVICE ERROR
0010 A        TW1STO   EQU      $10          SOFTWARE TIMEOUT
              *
              *      MONITOR AND SATELLITE CONTROL EQUATES
              *
0001 A        MONPWR   EQU      1            MONITOR ON
0000 A        MONOFF   EQU      0            MONITOR OFF
              *
0004 A        STLRST   EQU      4            SATELLITE RESET
0000 A        STLSTR   EQU      0            SATELLITE START
              *
              *      SATELLITE COMMAND EQUATES
              *
0020 A        SCDHTT   EQU      $20          HEADER TO TAPE
              *
              *
              *
0004 A        MSGTRC   EQU      4            RETRY OR CONTINUE REQUEST
              *
              *
              *      CALLING SEQUENCE:  JSR  STLDVR
              *
              *      ACCA => REQUEST TYPE
              *      ACCB  => SATELLITE COMMAND
              *
0000 I        STLCRQ   EQU      *
0000 I 86 0A           LDA A    $10
0002 I FF 0000 R       STX      MVCSTR
0005 I CE 0002 D       LDX      #STLRQB
0008 I FF 0001 R       STX      MVCDST
000B I BD 0015 R       JSR      MVCHAR
000E I B6 0002 D       LDA A    STLBRT
0011 I F6 0003 D       LDA B    STLBCD
0014 I        STLDVR   EQU      *
0014 I 30              TSX                   SAVE
```

```
0015 I 09            100            DEX
0016 I FF 0000 D     101            STX     STKSAV      STACK PNTR FOR REQUEST COMPLETION
0019 I B7 0002 D     102            STA A   STLBRT
001C I F7 0003 D     103            STA B   STLBCD
001F I F7 0012 D     104            STA B   SXMTBF      SET COMMAND
0022 I C1 7F         105            CMP B   #SCDMHC     LOW CUT FILTER PARAMS OUTPUT ?
0024 I 27 25         106            BEQ     STLR1       ] YES
0026 I 36            107            PSH A
0027 I 5F            108            CLR B               ANTICIPATE TAPE ONLY REQUEST
0028 I 85 08         109            BIT A   #SW1MRQ     MONITOR REQUEST
002A I 26 07         110            BNE     STLV        YES
002C I B6 0002 R     111            LDA A   MONSTS      MONITOR ON
002F I 85 01         112            BIT A   #MONPWR
0031 I 27 08         113            BEQ     STLR
0033 I C6 01         114 STLV       LDA B   #MONPWR     SET MONITOR POWER COMMAND
0035 I FA 0002 R     115            ORA B   MONSTS
0038 I F7 0002 R     116            STA B   MONSTS      SET MONITOR STATUS
003B I F6 0002 R     117 STLR       LDA B   MONSTS
STLDVR(A0011.02.034AA  CRS SATELLITE DRIVER)             08/04/78  13:13:30  PAGE   3

003E I 86 04         118            LDA A   #STLRST     RESET SATELLITE
0040 I 1B            119            ABA
0041 I B7 0007 R     120            STA A   DATMON
0044 I 86 00         121            LDA A   #STLSTR     ENABLE
0046 I 1B            122            ABA                 SATELLITE
0047 I B7 0007 R     123            STA A   DATMON
004A I 32            124            PUL A
004B I 84 0F         125 STLR1      AND A   #$F         INTO STATUS WORD 1
004D I 8A 80         126            ORA A   #SW1SRB     SFT SATELLITE BUSY FLAG
004F I B7 0003 R     127            STA A   STLSW1
0052 I 85 04         128            BIT A   #SW1TRQ     TAPE REQUEST
0054 I 27 21         129            BEQ     STLH        NO
0056 I FE 000A D     130            LDX     STLTRT      SET UP
0059 I FF 000A R     131            STX     TAPRQT      MAG TAPE
005C I FE 0008 D     132            LDX     STLBWT      REQUEST
005F I FF 000B R     133            STX     TAPLEN
0062 I F6 0003 D     134            LDA B   STLBCD
0065 I C1 20         135            CMP B   #SCDHTT     REEL HEADER COMMAND
0067 I 27 08         136            BEQ     STLS        YES, SKIP TRACE IDENTIFICATION HEADER
0069 I CE 000B R     137            LDX     #TAPLEN
006C I 86 F0         138            LDA A   #240        INCLUDE TRACE
006E I BD 0016 R     139            JSR     IDXRTN      HEADER
0071 I CE 0000 A     140 STLS       LDX     #0
0074 I FF 000C R     141            STX     TAPTMO
0077 I 7F 0004 R     142 STLH       CLR     STLSW2      CLEAR STATUS WORD 2
007A I F6 0004 D     143            LDA B   STLBXT      SET XMT
007D I F7 0010 D     144            STA B   SXMTCT      BYTE COUNT
0080 I F6 0005 D     145            LDA B   STLBRV
0083 I F7 0011 D     146            STA B   SRCVCT      SET # BYTES TO RECEIVE
0086 I CE 0012 D     147            LDX     #SXMTBF     INIT. XMT
0089 I F6 0003 D     148            LDA B   STLBCD
008C I C1 7F         149            CMP B   #SCDMHC     LOW CUT FILTER PARAMS OUTPUT ?
008E I 26 01         150            BNE     STLH1       NO
0090 I 08            151            INX
0091 I FF 0103 D     152 STLH1      STX     SXMTPT      AND RCV
0094 I CE 0105 D     153            LDX     #SRCVBF     BUFFER
0097 I FF 0205 D     154            STX     SRCVPT      PNTRS
009A I CE 013B I     155            LDX     #STLCMP     REQUEST WITH
009D I FF 0010 R     156            STX     TMRBCA      COMPLETION ADDR =
00A0 I FF 000D R     157            STX     TAPCPA
00A3 I 7F 000E R     158            CLR     TMRCTR
00A6 I FE 0006 D     159            LDX     STLBTV      INITIATE
00A9 I FF 000F R     160            STX     TMRBTV      INITIATE TIMER
00AC I 27 03         161            BEQ     STLH2       JUMP IF NO TIMEOUT SPECIFIED
00AE I BD 0017 R     162            JSR     TMRDVR      STLDVR COMPLETION ADDR
00B1 I CE 00E1 I     163 STLH2      LDX     #STLRIN     SET COMPL = READ SEQUENCE INITIATOR
00B4 I 7E 01BA I     164            JMP     SIMWAI      SIMULATE WAI AND INITIATE WRITE SEQUENCE
                     165 *
                     166 *      SATELLITE WRITE REQUEST CONTINUATOR
                     167 *
00B7 I               168 STLWCT     EQU     *
00B7 I F6 0009 R     169            LDA B   STLWDR      READ DATA REGISTER TO CLEAR INTERRUPT
00BA I F6 0004 R     170            LDA B   STLSW2
00BD I B6 0003 R     171            LDA A   STLSW1      SATELLITE REQUEST BUSY
```

```
00C0 I 2B 01        172          BMI    STL1         YES
00C2 I 3B           173 STL2     RTI                 RETURN TO INTERRUPTED ROUTINE
00C3 I C5 10        174 STL1     BIT B  #SW2WRM      WRITE MODE
00C5 I 26 FB        175          BNE    STL2
STLDVR(A0011.02.034AA  CRS SATELLITE DRIVER)          08/04/78  13:13:32  PAGE   4

00C7 I CA 08        176 STLWIT   ORA B  #SW2INT      SET SATELLITE INTERRUPT
00C9 I F7 0004 R    177          STA B  STLSW2       SAVE STATUS
00CC I FE 0103 D    178          LDX    SXMTPT
00CF I 7D 0010 D    179          TST    SXMTCT       XMIT COMAPLET
00D2 I 27 0D        180          BEQ    STLRIN       YES
00D4 I 7A 0010 D    181          DEC    SXMTCT
00D7 I A6 00        182          LDA A  0,X          BYTE TO XMT
00D9 I 08           183          INX                 INCR XMT
00DA I FF 0103 D    184          STX    SXMTPT       BUFR PNTR
00DD I B7 0009 R    185          STA A  STLWDR       OUTPUT TO SATELLITE
00E0 I 3B           186 STL4     RTI                 RETURN
                    187 *
                    188 *      READ SEQUENCE INITIATOR
                    189 *
00E1 I              190 STLRIN   EQU    *
00E1 I CA 10        191          ORA B  #SW2WRM      SET READ MODE
00E3 I F7 0004 R    192          STA B  STLSW2
00E6 I B6 0003 R    193          LDA A  STLSW1       PICK UP REQUEST TYPE FLAGS
00E9 I 85 04        194          BIT A  #SW1TRQ      TAPE REQUEST
00EB I 27 03        195          BEQ    STL5         NO
00ED I BD 0018 R    196          JSR    TAPDVR       INITIATE TAPE REQUEST
00F0 I 3B           197 STL5     RTI
                    198 *
                    199 *      SATELLITE READ REQUEST CONTINUATOR
                    200 *
00F1 I              201 STLRCT   EQU    *
00F1 I F6 0008 R    202          LDA B  STLRDR       INPUT BYTE FROM SATELLETE
00F4 I B6 0003 R    203          LDA A  STLSW1       SATELLITE REQUEST BUSY ?
00F7 I 2B 01        204          BMI    STL7         YES
00F9 I 3B           205 STL8     RTI                 RETURN TO INTERRUPTED ROUTINE
00FA I B6 0004 R    206 STL7     LDA A  STLSW2
00FD I 85 10        207          BIT A  #SW2WRM      READ MODE
00FF I 27 F8        208          BEQ    STL8         NO
0101 I FE 0205 D    209          LDX    SRCVPT       SAVE IN
0104 I E7 00        210          STA B  0,X          RECEIVE BUFFER
0106 I 08           211          INX                 INCR BUFFER
0107 I FF 0205 D    212          STX    SRCVPT       PNTR
010A I B6 0003 R    213          LDA A  STLSW1
010D I 85 02        214          BIT A  #SW1URD      UNFORMATTED READ
010F I 27 0D        215          BEQ    STL9         NO
0111 I 84 FD        216          AND A  #-1-SW1URD   RESET UNFORMATTED READ REQUEST INDICATOR
0113 I B7 0003 R    217          STA A  STLSW1
0116 I 5D           218          TST B
0117 I 27 01        219          BEQ    STL7A
0119 I 5C           220          INC B
011A I 5C           221 STL7A    INC B
011B I F7 0011 D    222          STA B  SRCVCT       SET RCV COUNT
011E I B6 0004 R    223 STL9     LDA A  STLSW2
0121 I 8A 08        224          ORA A  #SW2INT      SET SATELLITE INDICATOR
0123 I 7A 0011 D    225          DEC    SRCVCT       RCV COMPLETE
0126 I 27 04        226          BEQ    STLA
0128 I B7 0004 R    227          STA A  STLSW2
012B I 3B           228          RTI
012C I 8A 04        229 STLA     ORA A  #SW2XRC      SET COMPLETION FLAG
012E I F6 0003 R    230          LDA B  STLSW1
0131 I C4 7F        231          AND B  #-1-SW1SRB
0133 I F7 0003 R    232          STA B  STLSW1       RESET SATELLITE BUSY INDICATOR
                    233 *
STLDVR(A0011.02.034AA  CRS SATELLITE DRIVER)          08/04/78  13:13:33  PAGE   5

                    234 *      SETUP FOR SATELLETE REQUEST COMPLETION
                    235 *
0136 I              236 STLRCS   EQU    *
0136 I 8A 80        237          ORA A  #SW2SSC      SET SATELLITE
0138 I B7 0004 R    238          STA A  STLSW2       SEQUENCE COMPLETE
                    239 *
                    240 *      SATELLITE REQUEST COMPLETION ROUTINE
                    241 *
```

```
013B I             242 STLCMP   EQU    *
013B I 0F          243          SEI                 MASK INTERRUPTS
013C I F6 0003 R   244          LDA B  STLSW1       PICK UP REQUEST TYPE FLAGS
013F I B6 0004 R   245          LDA A  STLSW2       PICK UP COMPLETION FLAGS
0142 I 85 80       246          BIT A  #SW2SSC      SATELLITE SEQUENCE COMPLETE
0144 I 27 3B       247          BEQ    STLB         NO
0146 I C5 04       248          BIT B  #SW1TRQ      TAPE REQUEST
0148 I 27 04       249          BEQ    STLF         NO
014A I 85 40       250          BIT A  #SW2TSC      TAPE SEQUENCE COMPLETE
014C I 27 33       251          BEQ    STLB         NO
014E I CA 40       252 STLF     ORA B  #SW1SRC      SET SATELLITE REQUEST COMPLETE
0150 I F7 0003 R   253          STA B  STLSW1       SAVE STATUS WORD
0153 I 7F 0005 R   254          CLR    TMRSTS       CLEAR TIMER REQUEST
0156 I B6 0006 R   255          LDA A  TAPST1
0159 I 84 7F       256          AND A  #-1-TW1TRB   RESET TAPE REQUEST BUSY FLAG
015B I B7 0006 R   257          STA A  TAPST1
015E I B6 0003 R   258          LDA A  STLSW1
0161 I 85 10       259          BIT A  #SW1STO      SOFTWARE TIMEOUT ?
0163 I 27 16       260          BEQ    STLF1        NO
                   261 ***
0165 I CE 4536 A   262          LDX    #$4536
0168 I 7D 0010 D   263          TST    SXMTCT       DATA PROCESSOR ERROR
016B I 27 0B       264          BEQ    STLF2        NO
016D I F6 0004 R   265          LDA B  STLSW2
0170 I CA 01       266          ORA B  #SW2DPE      SET DATAPROCESSOR ERROR FLAG
0172 I F7 0004 R   267          STA B  STLSW2
0175 I CE 4538 A   268          LDX    #$4538
0178 I BD 001A R   269 STLF2    JSR    LOGFRM
                   270 ***
017B I BE 0000 D   271 STLF1    LDS    STKSAV       RESTORE STACK PNTR FOR COMPLETION
017E I 01          272          NOP
017F I 0E          273          CLI                 UNMASK INTERRUPTS
0180 I 39          274          RTS                 RETURN TO CALLER
0181 I B6 0005 R   275 STLB     LDA A  TMRSTS       TIMER REQUEST
0184 I 85 40       276          BIT A  #TMRRCP      COMPLETE
0186 I 26 09       277          BNE    STLD         YES
0188 I 7F 0010 R   278          CLR    TMRBCA       CLEAR
018B I 7F 0011 R   279          CLR    TMRBC1       TIMER COMPLETION ADDRESS
018E I BD 0019 R   280          JSR    TMRRQL       WAIT FOR COMPLETION
0191 I B6 0004 R   281 STLD     LDA A  STLSW2
0194 I F6 0003 R   282          LDA B  STLSW1
0197 I 85 80       283          BIT A  #SW2SSC      SATELLITE SEQUENCE COMPLETE
0199 I 27 16       284          BEQ    STLE         NO
019B I C5 04       285          BIT B  #SW1TRQ      TAPE REQUEST
019D I 27 AF       286          BEQ    STLF         NO, GOOD COMPLETION
019F I 85 40       287          BIT A  #SW2TSC      TAPE SEQUENCE COMPLETE
01A1 I 26 AB       288          BNE    STLF         YES, GOOD COMPLETION
01A3 I CA 20       289          ORA B  #SW1DTO      SET DEVICE TIME OUT FLAG
01A5 I 36          290          PSH A
01A6 I B6 0006 R   291          LDA A  TAPST1
STLDVR(A0011.02.034AA  CRS SATELLITE DRIVER)          08/04/78  13:13:34  PAGE   6

01A9 I 8A 30       292          ORA A  #TW1DER+TW1STOSET DEVICE ERROR AND SOFTWARE TIMEOUT
01AB I B7 0006 R   293          STA A  TAPST1       UPDATE TAPE STATUS
01AE I 32          294          PUL A
01AF I 20 02       295          BRA    STLM
01B1 I CA 10       296 STLE     ORA B  #SW1STO      SET SOFTWARE TIMEOUT FLAG
01B3 I C4 7F       297 STLM     AND B  #-1-SW1SRB   RESET SATELLITE REQUEST BUSY
01B5 I B7 0004 R   298          STA A  STLSW2
01B8 I 20 94       299          BRA    STLF         COMPLETE REQUEST
                   300 *
                   301 *      ROUTINE TO SIMULATE 'WAI' FOR SIDLCT
                   302 *
                   303 *      CALLING SEQUENCE: JMP  SIMWAI
                   304 *
                   305 *      IDX=) ADDRESS TO CALL ON XMT/RCV COMPLETE
                   306 *
01BA I             307 SIMWAI   EQU    *
01BA I CE 01DF I   308          LDX    #SIDLIR      SET PROGRAM CNTR TO
01BD I FF 000E D   309          STX    SIMILC       IDLE LOOP CONTINUATOR
01C0 I F6 0004 R   310          LDA B  STLSW2       PICK UP STL STATUS
01C3 I B6 000F D   311          LDA A  SIMILC+1
01C6 I 36          312          PSH A               PCL
```

```
01C7 I B6 000E D            LDA A  SIMILC
01CA I 36                   PSH A              PCH
01CB I B6 000D D            LDA A  SIMCPE+1
01CE I 36                   PSH A              IXL
01CF I B6 000C D            LDA A  SIMCPE
01D2 I 36                   PSH A              IXH
01D3 I 4F                   CLR A
01D4 I 36                   PSH A              ACCA
01D5 I 36                   PSH A              ACCB
01D6 I 36                   PSH A              SET CC
01D7 I 01                   NOP
01D8 I 0F                   SEI                MASK INTERRUPTS
01D9 I 7E 00C7 I            JMP    STLWIT      INITIATE WRITE SEQUENCE
                     *
                     *    SATELLITE REQUEST IDLE LOOP CONTINUATOR
                     *
                     *    RETURN FROM INTERRUPT CONDITIONS
                     *
                     *
                     *    ACCA => STATUS WORD 2
                     *    IDX  => COMPLETION ROUTINE ADDRESS
                     *
01DC I               SIDLCT EQU    *
01DC I 01            SID1   NOP
01DD I 0E                   CLI                CLEAR INTERRUPT MASK
01DE I 3E                   WAI                WAIT FOR SATELLITE INTERRUPT
                     *
                     *    IDLE LOOP CONTINUATOR INTERRUPT RETURN
                     *
01DF I               SIDLIR EQU    *
01DF I 01                   NOP
01E0 I 0F                   SEI                MASK INTERRUPTS
01E1 I B6 0004 R            LDA A  STLSW2      PICK UP SATELLITE STATUS WORD
01E4 I 85 08                BIT A  #SW2INT     SATELLITE INTERRUPT
01E6 I 27 F4                BEQ    SID1        NO
01E8 I 84 F7                AND A  #-1-SW2INT  CLEAR STL INTERRUPT INDICATOR
01EA I B7 0004 R            STA A  STLSW2
STLDVR(A0011.02.034AA  CRS SATELLITE DRIVER)        08/04/78  13:13:35  PAGE   7

01ED I 20 ED                BRA    SID1        WAIT FOR SATELLITE INTERRUPT
                     *
                            DEF    STLRSQ,STLRPC,STLRSN,STLRRD,STLBRK
                            DEF    STLRND,STLSMH,STLSRH
                            DEF    STLSTH
                            DEF    STLSMC
                            DEF    TCPTTM,TCPDTA
                            REF    TTMOWR
                     *
0040 A               TRQCR2 EQU    $40         COMMAND REF 2
0008 A               TRQSTR EQU    8           SATELLITE REQUEST
0004 A               TRQWRT EQU    4           WRITE REQUEST
                     *
0001 A               CMDRB  EQU    1           READ 1 BLOCK
0002 A               CMDWB  EQU    2           WRITE 1 BLOCK
                     *
                     *
                     *
                     *    CONVENTIONAL SATELLITE EQUEST BLOCKS
                     *
                     *    COMMAND SEQUENCE
                     *
01EF I 03            STLRSQ FCB    SW1WRS+SW1WRD
01F0 I 01                   FCB    SCDCSQ
01F1 I 01                   FCB    SCLXCS
01F2 I 01                   FCB    SCLRCS
01F3 I 03E8     A           FDB    SCTCDS
                     *
                     *    PARITY COUNT
                     *
01F5 I 01            STLRPC FCB    SW1WRS
01F6 I 03                   FCB    SCDPCT
01F7 I 01                   FCB    SCLXPC
01F8 I 0C                   FCB    SCLRPC
```

```
01F9 I 03E8    A   384             FDB    SCTPCT
                   385 *
                   386 *      STORE NORMAL TEST DATA
                   387 *
01FB I 01          388 STLRSN     FCB    SW1WRS
01FC I 06          389            FCB    SCDSND
01FD I 05          390            FCB    SCLXSN
01FE I 01          391            FCB    SCLRSN
01FF I 03E8    A   392            FDB    SCTSND
                   393 *
                   394 *      ASK FOR NORMAL TEST DATA
                   395 *
0201 I 01          396 STLRRD     FCB    SW1WRS
0202 I 02          397            FCB    SCDATA
0203 I 06          398            FCB    SCLXDT
0204 I 48          399            FCB    72           NORMAL TEST DATA
0205 I 03E8    A   400            FDB    SCTRDT
                   401 *
                   402 *      ASK FOR TIME BREAK
                   403 *
0207 I 01          404 STLBRK     FCB    SW1WRS
0208 I 04          405            FCB    SCDBRK
0209 I 01          406            FCB    SCLXTB
020A I 01          407            FCB    SCLRTB
STLDVR(A0011.02.034AA  CRS SATELLITE DRIVER)          08/04/78  13:13:37  PAGE   8

020B I 03E8    A   408            FDB    SCTTBK
                   409 *
                   410 *      RETRIEVE NORMAL DATA
                   411 *
020D I 01          412 STLRND     FCB    SW1WRS
020E I 07          413            FCB    SCDRND
020F I 02          414            FCB    SCLXRN
0210 I 48          415            FCB    SCLRRN
0211 I 03E8    A   416            FDB    SCTRND
                   417 *
                   418 *      SEND MONITOR HEADER
                   419 *
0213 I 09          420 STLSMH     FCB    SW1WRS+SW1MRQ
0214 I 23          421            FCB    SCDMHD
0215 I 08          422            FCB    SCLXMH
0216 I 01          423            FCB    SCLRMH
0217 I 03E8    A   424            FDB    SCTMHD
                   425 *
                   426 *      SEND  MONITOR HEADER LOW CUT FILTER PARAMETERS
                   427 *
0219 I 01          428 STLSMC     FCB    SW1WRS
021A I 7F          429            FCB    SCDMHC
021B I 0A          430            FCB    SCLXMC
021C I 01          431            FCB    SCLRMH
021D I 03E8    A   432            FDB    SCTMHD
                   433 *
                   434 *      SEND TRACE IDENTIFICATION HEADER
                   435 *
021F I 01          436 STLSTH     FCB    SW1WRS
0220 I 21          437            FCB    SCDTHD
0221 I F1          438            FCB    SCLXTH
0222 I 01          439            FCB    SCLRTH
0223 I 03E8    A   440            FDB    SCTTHD
                   441 *
                   442 *      WRITE REEL HEADER
                   443 *
0225 I 05          444 STLSRH     FCB    SW1TRQ+SW1WRS
0226 I 20          445            FCB    SCDHTT
0227 I 1D          446            FCB    SCLXRH
0228 I 01          447            FCB    SCLRRH
0229 I 001C    R   448            FDB    TTMOWR
022B I 0E10    A   449            FDB    3600
022D I 4C          450            FCB    TRQCR2+TRQWRT+TRQSTR
022E I 02          451            FCB    CMDWB
                   452 *
                   453 *      TAPE TO MEMORY REQUEST
                   454 *
```

```
022F I 05                TCPTTM   FCB   SW1TRQ+SW1WRS
0230 I 22                         FCB   SCDTTM
0231 I 01                         FCB   SCLXTM
0232 I 01                         FCB   SCLRTM
0233 I 0200       A               FDB   512
0235 I 0000       A               FDB   0
0237 I 48                         FCB   TRQCR2+TRQSTR
0238 I 01                         FCB   CMDRB
                         *
                         *      ASK FOR TRACE IDENTIFICATION HEADER DATA
                         *
STLDVR(A0011.02.034AA  CRS SATELLITE DRIVER)          08/04/78  13:13:38  PAGE   9

0239 I 01                TCPDTA   FCB   SW1WRS
023A I 02                         FCB   SCDATA
023B I 06                         FCB   SCLXDT
023C I 78                         FCB   120
023D I 03E8       A               FDB   SCTRDT
                         *
                                  DEF   DMNRML,DMDFRM,DMDATA,DMBLST
                         *
                         *
                         *      FORMATTER TO MEMORY DATA MODE EQUATES
                         *
0000 A                   DMNRML   EQU   0            NORMAL TEST
0001 A                   DMDFRM   EQU   1            PERFORMANCE
0002 A                   DMDATA   EQU   2            DATA
0003 A                   DMBLST   EQU   3            LOOK FOR TIME BREAK
                         *
                         *      ASK FOR DATA WORD TYPE CODE
                         *
0000 A                   DWT3BT   EQU   0            3 BYTE WORDS
0001 A                   DWT4BT   EQU   1            4 BYTE WORDS
                         *
                                  DEF   DWT3BT,DWT4BT
                         *
                         *
                                  DEF   SCDRTM,SCDCSQ,SCDATA,SCDPCT,SCDBRK,SCDREP
                                  DEF   SCDSND,SCDRND,SCDMTP,SCDMTM,SCDHTT,SCDTHD
                                  DEF   SCDTTM,SCDMHD
                                  DEF   SCDMHC
                         *
                         *
                         *      SATELLITE COMPUTER COMMAND EQUATES
                         *
0000 A                   SCDRTM   EQU   $00          RECEIVER TO MEMORY
0001 A                   SCDCSQ   EQU   $01          ASK FOR COMMAND SEQUENCE
0002 A                   SCDATA   EQU   $02          ASK FOR DATA
0003 A                   SCDPCT   EQU   $03          ASK FOR PARITY COUNT
0004 A                   SCDBRK   EQU   $04          TIME BREAK
0005 A                   SCDREP   EQU   $05          RE-RECEIVE RTU DATA
0006 A                   SCDSND   EQU   $06          STORE NORMAL TEST DATA
0007 A                   SCDRND   EQU   $07          RETRIEVE NORMAL TEST DATA
0008 A                   SCDMTP   EQU   $08          MEMORY TO TAPE
0010 A                   SCDMTM   EQU   $10          MEMORY TO MONITOR
0020 A                   SCDHTT   EQU   $20          HEADER TO TAPE
0021 A                   SCDTHD   EQU   $21          TRACE HEADER
0022 A                   SCDTTM   EQU   $22          TAPE TO MEMORY
0023 A                   SCDMHD   EQU   $23          MONITOR HEADER
007F A                   SCDMHC   EQU   $7F          MONITOR HEADER LOW CUT FILTER PARAMETER OUP
                         *
                                  DEF   SCTCDS,SCTRDT,SCTPCT,SCTPCT,SCTTBK,SCTSND,SCTRND
                                  DEF   SCTTHD,SCTMHD
                         *
                         *      SATELLITE COMMAND TIMEOUT LENGTHS (MILLISECONDS)
                         *
03E8 A                   SCTCDS   EQU   1000         ASK FOR COMMAND SEQUENCE
03E8 A                   SCTRDT   EQU   1000         ASK FOR DATA
03E8 A                   SCTPCT   EQU   1000         ASK FOR PARITY COUNT
03E8 A                   SCTTBK   EQU   1000         TIME BREAK
03E8 A                   SCTSND   EQU   1000         STORE NORMAL TEST DATA
STLDVR(A0011.02.034AA  CRS SATELLITE DRIVER)          08/04/78  13:13:39  PAGE  10

03E8 A                   SCTRND   EQU   1000         RETRIEVE NORMAL DATA
```

```
03E8 A          525 SCTTHD    EQU    1000          SEND TRACE HEADER
03E8 A          526 SCTMHD    EQU    1000          SEND MONITOR HEADER
                527 *
                528           DEF    SCLXRM,SCLRRM,SCLXCS,SCLRCS
                529           DEF    SCLXDT,SCLXPC,SCLRPC,SCLXTB,SCLRTB
                530           DEF    SCLXRX,SCLRRX,SCLXSN,SCLRSN
                531           DEF    SCLXMT,SCLRMT,SCLXRN,SCLRRN
                532           DEF    SCLXMM,SCLRMM,SCLXHT,SCLRHT
                533           DEF    SCLXTH,SCLRTH,SCLXRH,SCLRRH
                534           DEF    SCLXTM,SCLRTM,SCLXMH,SCLRMH
                535           DEF    SCLXMC
                536 *
                537 *
                538 *     SATELLITE COMMAND LENGTHS (IN BYTES)
                539 *
0005 A          540 SCLXRM    EQU    5             RCVR TO MEMORY XMIT LENGTH
0001 A          541 SCLRRM    EQU    1             RCVR TO MEMORY RECEIVE LENGTH
                542 *
0001 A          543 SCLXCS    EQU    1             COMMAND SEQUENCE XMIT
0001 A          544 SCLRCS    EQU    1             COMMAND SEQUENCE RCV
                545 *
0006 A          546 SCLXDT    EQU    6             ASK FOR DATA XMIT
                547 *
0001 A          548 SCLXPC    EQU    1             ASK FOR PARITY COUNT XMIT
000C A          549 SCLRPC    EQU    12            ASK FOR PARITY COUNT RCV
                550 *
0001 A          551 SCLXTB    EQU    1             TIME BREAK XMIT
0001 A          552 SCLRTB    EQU    1             RCV
                553 *
0006 A          554 SCLXRX    EQU    6             RE-TRANSMIT XMIT
0001 A          555 SCLRRX    EQU    1             RCV
0005 A          556 SCLXSN    EQU    5             STORE NORMAL TEST DATA XMIT
                557 *
0001 A          558 SCLRSN    EQU    1             RCV
                559 *
0011 A          560 SCLXMT    EQU    17            MEMORY TO TAPE XMIT
0001 A          561 SCLRMT    EQU    1             RCV
                562 *
0002 A          563 SCLXRN    EQU    2             RETRIEVE NORMAL TEST DATA
0048 A          564 SCLRRN    EQU    72            RCV
                565 *
0003 A          566 SCLXMM    EQU    3             MEMORY TO MONITOR XMIT
0001 A          567 SCLRMM    EQU    1             RCV
                568 *
0001 A          569 SCLXHT    EQU    1             HEADER TO TAPE XMIT
0001 A          570 SCLRHT    EQU    1
                571 *
00F1 A          572 SCLXTH    EQU    241           TRACE
0001 A          573 SCLRTH    EQU    1             HEADER
                574 *
001D A          575 SCLXRH    EQU    29            REEL
0001 A          576 SCLRRH    EQU    1             HEADER
                577 *
0001 A          578 SCLXTM    EQU    1             TAPE
0001 A          579 SCLRTM    EQU    1             MEMORY
                580 *
0008 A          581 SCLXMH    EQU    8             MONITOR
STLDVR(A0011.02.034AA  CRS SATELLITE DRIVER)        08/04/78  13:13:40  PAGE  11

0001 A          582 SCLRMH    EQU    1             HEADER
                583 *
000A A          584 SCLXMC    EQU    10            MONITOR HEADER LOW CUT FILTER PARAMETERS
                585 *
                586 *     SATELLITE COMMAND FORMATS
                587 *
                588 *
                589 *     SATELLITE RECEIVER TO MEMORY COMMAND XMIT BUFFER FORMAT
                590 *
                591 *     BYTE     PARAMETER DEFINITION
                592 *
                593 *     1        SATELLITE COMMAND
                594 *     2-3      #DATA WORDS TO RECEIVE
                595 *     4        MSB OF DATA MEMORY ADDR (LSB = 0)
                596 *     5        MODE ( 0 = NORMAL TEST, 1 = PERFORMANCE TEST, 2 = DATA,
```

```
*            3 = LOOK FOR TIME BREAK)
*
*      SATELLITE ASK FOR COMMAND SEQUENCE XMIT BUFFER FORMAT
*
*      BYTE    PARAMETER DEFINITION
*
*      1       SATELLITE COMMAND
*
*      SATELLITE ASK FOR DATA COMMAND XMIT BUFFER FORMAT
*
*      BYTE    PARAMETER DEFINITION
*
*      1       SATELLITE COMMAND
*      2-3   # WORDS REQUESTED
*      4-5     STARTING WORD ADDRESS
*      6       3 BYTE/ 4 BYTE WORD INDICATOR (0=> 3 BYTE; 1 => 4 BYTE)
*
*      SATELLITE ASK FOR PARITY COUNT COMMAND XMIT BUFFER FORMAT
*
*      BYTE    PARAMETER DEFINITION
*
*      1       SATELLITE COMMAND
*
*      SATELLITE ASK FOR TIME BREAK COMMAND XMIT BUFFER FORMAT
*
*      BYTE    PARAMETER DEFINITION
*
*      1       SATELLITE COMMAND
*
*      SATELLITE RE-RECEIVE RTU DATA COMMAND XMIT BUFFER FORMAT
*
*      BYTE    PARAMETER DEFINITION
*
*      1       SATELLITE COMMAND
*      2-3     # DATA WORDS TO RECEIVE
*
*      SATELLITE STORE NORMAL TEST DATA COMMAND XMIT BUFFER FORMAT
*
*      BYTE    PARAMETER DEFINITION
*
*      1       SATELLITE COMMAND
*      2-5   RECORDING NUMBER STORAGE KEYS (KEY1,KEY2,KEY3,KEY4)
*
```

STLDVR(A0011.02.034AA  CRS SATELLITE DRIVER)          08/04/78  13:13:42  PAGE  12

```
*      SATELLITE RETRIEVE NORMAL TEST DATA COMMAND XMIT BUFFER FORMAT
*
*      BYTE    PARAMETER DEFINITION
*
*      1     SATELLITE COMMAND
*      2       RECORDING NUMBER STORAGE KEY
*
*      SATELLITE MEMORY TO TAPE COMMAND XMIT BUFFER FORMAT
*
*      BYTE    PARAMETER DEFINITION
*
*      1       SATELLITE COMMAND
*      2       CHANNEL #       => 0-3 DATA
*              CHANNEL #       => 24-27 NOISE DATA
*      3       STATIONS BETWEEN BLASTER & PRESENT CHANNEL)
*      4-7     TRACE SEQUENCE # WITHIN LINE
*      8-11    TRACE SEQUENCE # WITHIN REEL
*      12      RECORDING #
*      13-14   TRACE IDENTIFICATION CODE
*      15-16   RTU ADDRESS
*      17      CHANNEL ADDRESS
*
*      SATELLITE MEMORY TO MONITOR COMMAND XMIT FORMAT
*
*      BYTE    PARAMETER DEFINITION
*
*      1       SATELLITE COMMAND
*      2       CHANNEL #       => 0-3 DATA
```

```
*               CHANNEL #      => 24-27 NOISE DATA
*               CHANNEL #      => 60 TAPE TO MEMORY
*       3       STATIONS BETWEEN BLASTER & PRESENT CHANNEL)
*
*       SATELLITE REEL HEADER TO TAPE COMMAND XMIT BUFFER FORMAT
*
*       BYTE    PARAMETER DEFINITION
*
*       1       SATELLITE COMMAND
*       2-5     JOB IDENTIFICATION NUMBER
*       6-9     LINE NUMBER
*       10-13   REEL NUMBER
*       14-15   # DATA TRACES PER RECORD
*       16-17   # AUXILIARY TRACES PER RECORD
*       18-19   SAMPLE INTERVAL IN MILLISECONDS
*       20-21   BLANK
*       22-23   # SAMPLES PER DATA TRACE
*       24-25   BLANK
*       26-27   DATA SAMPLE FORMAT CODE
*
*       SATELLITE TRACE HEADER COMMAND XMIT BUFFER FORMAT
*
*       BYTE    PARAMETER DEFINITION
*
*       1       SATELLITE COMMAND
*       2-5     TRACE SEQUENCE # WITHIN LINE
*       6-9     TRACE SEQUENCE # WITHIN REEL
*       10-13   FILE NUMBER
*       14-17   TRACE # WITHIN FIELD RECORD
*       18-21   ENERGY SOURCE POINT NUMBER
S1LDVR(A0011.02.034AA  CRS SATELLITE DRIVER)            08/04/78  13:13:43  PAGE  13

*       22-25   SHOT POINT NUMBER
*       26-29   BLANK
*       30-31   TRACE IDENTIFICATION CODE => 1 => NORMAL DATA
*               TRACE IDENTIFICATION CODE => 3 => DEAD TRACE (SKIP)
*               TRACE IDENTIFICATION CODE => 5 => BLASTER CHANNEL
*       32-35   BLANK
*       36-37   DATA USE CODE => 1 => PRODUCTION
*               DATA USE CODE => 2 => TEST
*       38-49 BLANK
*       50-53   SOURCE DEPTH BELOW SURFACE
*       54-107                  BLANK
*       108-10 TIME BREAK DIFFERENCE
*       110-115 BLANK
*       116-117 # SAMPLES IN THIS TRACE
*       118-119 SAMPLE INTERVAL FOR THIS TRACE
*       120-121 GAIN TYPE FO FIELD INSTRUMENTS (X'0003')
*       122-123 INSTRUMENT GAIN CONSTANT
*       124-141 BLANK
*       142-143 ALIAS FILTER FREQUENCY => 124 IF 2 MSEC SAMPLE RATE
*               ALIAS FILTER FREQUENCY => 62 IF 4 MSEC SAMPLE RATE
*       144-145 ALIAS FILTER SLOPE (X'0048')
*       146-147 NOTCH FILTER FREQUENCY (60)
*       148-157 BLANK
*       158-159 YEAR DATA RECORDED
*       160-161 DAY OF YEAR
*       162-163 HOUR OF DAY (24 HOUR CLOCK)
*       164-165 MINUTE OF HOUR
*       166-167 SECOND OF MINUTE
*       168-169 TIME BASIS CODE (X'0001')
*       170-181 BLANK
*       182-183 REMOTE TELEMETRY UNIT NUMBER
*       184-185 REMOTE TELEMETRY UNIT CHANNEL NUMBER
*       186-241 BLANK
*
*       SATELLITE TAPE TO MEMORY COMMAND XMIT BUFFER FORMAT
*
*       BYTE    PARAMETER DEFINITION
*
*       1       SATELLITE COMMAND
*
*       SATELLITE MONITOR HEADER COMMAND XMIT BUFFER FORMAT
*
```

```
                      740 *       BYTE    PARAMETER DEFINITION
                      741 *
                      742 *       1       SATELLITE COMMAND
                      743 *       2       #CHANNELS TO BE RECORDED
                      744 *       3-4     # WORDS PER CHANNEL
                      745 *               BIT 6 OF BYTE 3 CONTROLS DIRECTION OF DATA TO SCOPE OR CAM
                      746 *               BIT 6 => 0 - DATA GOES TO CAMERA
                      747 *               BIT 6 => 1 - DATA GOES TO SCOPE
                      748 *       5       SAMPLE RATE
                      749 *       6-8   FILE NUMBER
                      750 *
                      751 *       SATELLITE LOW CUT DIGITAL FILTER PARAMETERS OUTPUT
                      752 *
                      753 *       BYTE    PARAMETER DESCRIPTION
                      754 *
                      755 *       1       SATELLITE COMMAND
STLDVR(A0011.02.034AA  CRS SATELLITE DRIVER)          08/04/78  13:13:44  PAGE  14

                      756 *       6-15    LOW CUT DIGITAL FILTER PARAMETERS
                      757 *
                      758 *
                      759            DEF    SYSERR
                      760 *
                      761 *       ROUTINE TO OUTPUT PROPER SYSTEM ERROR MESSAGE
                      762 *
                      763 *           CALLING SEQUENCE:  JSR  SYSERR
                      764 *
                      765 *           REQUIRED PARAMETERS:  STLBCD => SATELLITE CMND
                      766 *
023F I                767 SYSERR     EQU    *
023F I CE 034F I      768            LDX    #DPRCER       ANTICIPATE DATA PROCESSOR ERROR
0242 I B6 0004 R      769            LDA A  STLSW2
0245 I 85 01          770            BIT A  #SW2DPE       DATA PROCESSOR ERROR ?
0247 I 26 21          771            BNE    SYR1          YES, NOTIFY OPERATOR
0249 I B6 0003 D      772            LDA A  STLBCD        PICK UP SATELLITE CMND
024C I 81 18          773            CMP A  #SCDMTM+SCDMTP
024E I 26 0B          774            BNE    SYR4
0250 I 86 08          775            LDA A  #SCDMTP
0252 I F6 0011 D      776            LDA B  SRCVCT
0255 I C1 02          777            CMP B  #2
0257 I 27 02          778            BEQ    SYR4          JUMP IF TAPE ERROR
0259 I 86 10          779            LDA A  #SCDMTM       MONITOR ERROR
025B I CE 0270 I      780 SYR4       LDX    #SYERSL-3     SELECT PROPER ERROR MESSAGE
025E I 08             781 SYR2       INX
025F I 08             782            INX
0260 I 08             783            INX
0261 I E6 00          784            LDA B  0,X           END-OF-TABLE
0263 I 27 03          785            BEQ    SYR3          YES, OUTPUT ERROR MESG
0265 I 11             786            CBA                  MATCH FOUND ?
0266 I 26 F6          787            BNE    SYR2          NO, CONTINUE
0268 I EE 01          788 SYR3       LDX    1,X           PICK UP ERROR MESG ADDR
026A I FF 0014 R      789 SYR1       STX    MSGRQT
026D I C6 04          790            LDA B  #MSGTRC       ASK FOR OPERATOR INTERVENTION
026F I BD 001B R      791            JSR    MSGOUT
0272 I 39             792            RTS                  RETURN TO CALLER
                      793 *
                      794 *       SYSTEM ERROR MESSAGE DECODE TABLE
                      795 *
0273 I                796 SYERSL     EQU    *
                      797 *
0273 I 08             798            FCB    SCDMTP        MEMORY TO TAPE
0274 I 02D0     I     799            FDB    SYRMTU
                      800 *
0276 I 20             801            FCB    SCDHTT        WRITE REEL HEADER
0277 I 02D0     I     802            FDB    SYRMTU
                      803 *
0279 I 22             804            FCB    SCDTTM        TAPE TO MEMORY
027A I 02D0     I     805            FDB    SYRMTU
                      806 *
027C I 10             807            FCB    SCDMTM        MEMORY TO MONITOR
027D I 0301     I     808            FDB    SYRDDS
                      809 *
027F I 23             810            FCB    SCDMHD        MONITOR HEADER
```

```
0280 I 0301     I   811          FDB    SYRDDS
                    812 *
0282 I 7F           813          FCB    SCDMHC      MONITOR HEADER LOW CUT FILTER PARAMS
STLDVR(A0011.02.034AA  CRS SATELLITE DRIVER)          08/04/78  13:13:46  PAGE  15

0283 I 0301     I   814          FDB    SYRDDS
                    815 *
0285 I 00           816          FCB    SCDRTM      RECEIVER TO MEMORY
0286 I 0336     I   817          FDB    XMTERR
                    818 *
0288 I 05           819          FCB    SCDREP      RE-RECEIVE RTU DATA
0289 I 0336     I   820          FDB    XMTERR
                    821 *
028B I 00           822          FCB    0           END-OF-TABLE
028C I 02A3     I   823          FDB    SYRDPR
                    824 *
                    825 *
                    826 *     ROUTINE TO CHECK FOR SATELLITE REQUEST TIMEOUT
                    827 *
                    828 *
                    829          DEF    CKSTMO
                    830 *
                    831          DEF    CKSTRT
                    832 *
                    833          REF    XMTRTY
                    834 *
                    835 *
                    836 *     CALLING SEQUENCE: JSR  CKSTMO
                    837 *
                    838 *     CKSTRT => RETRY ADDRESS
                    839 *     IDX    => CONTINUATION ADDRESS
                    840 *
                    841 *     RETURN SEQUENCE:
                    842 *
                    843 *     IDX => ADDRESS OF ROUTINE TO CALL
                    844 *
028E I              845 CKSTMO   EQU    *
028E I B6 0003 R    846          LDA A  STLSW1      PICK UP COMPLETION STATUS
0291 I 85 10        847          BIT A  #SW1STO     TIMEOUT
0293 I 27 0D        848          BEQ    CKS1        NO
0295 I FE 0207 D    849          LDX    CKSTRT      PICK UP RETRY ADDRESS
0298 I 7A 001D R    850          DEC    XMTRTY      RETRIES EXHAUSTED
029B I 2E 05        851          BGT    CKS1        NO
029D I 30           852          TSX                ERROR ROUTINE MUST IMMEDIATELY FOLLOW RETURN
029E I EE 00        853          LDX    0,X
02A0 I 08           854          INX
02A1 I 08           855          INX
02A2 I 39           856 CKS1     RTS                RETURN TO CALLER
                    857 *
02A3 I              858 SYRDPR   EQU    *
02A3 I 535953       859          FCC    /SYSTEM ERROR - NO RESPONSE/
02BD I 0D           860          FCB    $D
02BE I 444154       861          FCC    /DATA PROCESSOR/
02CC I 0D           862          FCB    $D,$E
02CD I 0E
02CE I 0013     R   863          FDB    TPMCNT
02D0 I              864 SYRMTU   EQU    *
02D0 I 535953       865          FCC    /SYSTEM ERROR - NO RESPONSE/
02EA I 0D           866          FCB    $D
02EB I 4D4147       867 MGTPER   FCC    /MAGNETIC TAPE UNIT/
02FD I 0D           868          FCB    $D,$E
02FE I 0E
02FF I 0013     R   869          FDB    TPMCNT
STLDVR(A0011.02.034AA  CRS SATELLITE DRIVER)          08/04/78  13:13:47  PAGE  16

0301 I              870 SYRDDS   EQU    *
0301 I 535953       871          FCC    /SYSTEM ERROR - NO RESPONSE/
031B I 0D           872          FCB    $D
031C I 444154       873          FCC    /DATA DISPLAY SUBSYSTEM/
0332 I 0D           874          FCB    $D,$E
0333 I 0E
0334 I 0013     R   875          FDB    TPMCNT
0336 I              876 XMTERR   EQU    *
0336 I 10           877          FCB    $10,3,0
```

```
0337 I 03
0338 I 00
0339 I 545241        878             FCC    /TRANSMISSION ERROR/
034B I 0D            879             FCB    $D,$E
034C I 0E
034D I 0013     R    880             FDB    TPMCNT
034F I               881 DPRCER      EQU    *
034F I 444154        882             FCC    /DATA PROCESSOR ERROR/
0363 I 0D            883             FCB    $D,$E
0364 I 0E
0365 I 0013     R    884             FDB    TPMCNT
                     885 *
0000 D               886             DSEC
                     887 *
                     888 *      STORAGE REQUIREMENTS FOR 'STLDVR'
                     889 *
0000 D 0000     A    890 STKSAV      FDB    0           STACK PNTR SAVE AREA
                     891 *
                     892             DEF    STLBCD,STLBRT,STLBRV,STLBTV
                     893             DEF    STLBWT,STLBXT,STLTRC,STLTRT
                     894 *
                     895 *
                     896 *      SATELLITE REQUEST BLOCK
                     897 *
0002 D               898 STLRQB      EQU    *
0002 D 00            899 STLBRT      FCB    0           REQUEST TYPE
0003 D 00            900 STLBCD      FCB    0           SATELLITE COMMAND
0004 D 00            901 STLBXT      FCB    0           # BYTES TO XMT
0005 D 00            902 STLBRV      FCB    0           # BYTES TO RECEIVE
0006 D 0000     A    903 STLBTV      FDB    0           REQUEST TIMEOUT VALUE
0008 D 0000     A    904 STLBWT      FDB    0           # BYTES TO BE WRITTEN TO TAPE OR MONITOR
000A D 00            905 STLTRT      FCB    0           TAPE REQUEST TYPE
000B D 00            906 STLTRC      FCB    0           TAPE REQUEST COMMAND
                     907 *
                     908 *      STORAGE REQUIREMENTS FOR 'SIMWAI'
                     909 *
000C D 0000     A    910 SIMCPE      FDB    0           ADDRESS TO CALL ON XMT/RCV COMPLETE
000E D 01DF     I    911 SIMILC      FDB    SIDLIR      PNTR TO IDLE LOOP INTERRUPT RETURN
                     912 *
                     913 *      STORAGE REQUIREMENTS FOR 'STLDVR'
                     914 *
0010 D 00            915 SXMTCT      FCB    0           # BYTES TO XMIT
0011 D 00            916 SRCVCT      FCB    0           # BYTES TO RCV
0012 D               917 SXMTBF      RMB    241         XMIT BUFFER
0103 D 0000     A    918 SXMTPT      FDB    0           XMT BUFFER PNTR
0105 D               919 SRCVBF      RMB    256         RECEIVE BUFFER
0205 D 0000     A    920 SRCVPT      FDB    0           RCV BUFFER PNTR
                     921 *
0013 D               922 SXMTB1      EQU    SXMTBF+1
```

```
0014 D               923 SXMTB2      EQU    SXMTBF+2
0015 D               924 SXMTB3      EQU    SXMTBF+3
0016 D               925 SXMTB4      EQU    SXMTBF+4
0017 D               926 SXMTB5      EQU    SXMTBF+5
0018 D               927 SXMTB6      EQU    SXMTBF+6
0019 D               928 SXMTB7      EQU    SXMTBF+7
001A D               929 SXMTB8      EQU    SXMTBF+8
001B D               930 SXMTB9      EQU    SXMTBF+9
001C D               931 SXTB10      EQU    SXMTBF+10
001D D               932 SXTB11      EQU    SXMTBF+11
001E D               933 SXTB12      EQU    SXMTBF+12
001F D               934 SXTB13      EQU    SXMTBF+13
0020 D               935 SXTB14      EQU    SXMTBF+14
0021 D               936 SXTB15      EQU    SXMTBF+15
0022 D               937 SXTB16      EQU    SXMTBF+16
0024 D               938 SXTB18      EQU    SXMTBF+18
0027 D               939 SXTB21      EQU    SXMTBF+21
0028 D               940 SXTB22      EQU    SXMTBF+22
002C D               941 SXTB26      EQU    SXMTBF+26
                     942 *
0106 D               943 SRCVB1      EQU    SRCVBF+1
0107 D               944 SRCVB2      EQU    SRCVBF+2
0108 D               945 SRCVB3      EQU    SRCVBF+3
```

```
0109 D              946 SRCVB4    EQU     SRCVBF+4
010A D              947 SRCVB5    EQU     SRCVBF+5
010B D              948 SRCVB6    EQU     SRCVBF+6
010C D              949 SRCVB7    EQU     SRCVBF+7
010D D              950 SRCVB8    EQU     SRCVBF+8
010E D              951 SRCVB9    EQU     SRCVBF+9
010F D              952 SRVB10    EQU     SRCVBF+10
0114 D              953 SRVB15    EQU     SRCVBF+15
0128 D              954 SRVB35    EQU     SRCVBF+35
0177 D              955 SRB114    EQU     SRCVBF+114
0178 D              956 SRB115    EQU     SRCVBF+115
017A D              957 SRB117    EQU     SRCVBF+117
                    958 *
                    959 *
                    960 *      STORAGE REQUIREMENTS FOR 'CKSTMO'
                    961 *
                    962 *
                    963 *
0207 D 0000    A    964 CKSTRT    FDB     0            RETRY ADDRESS
0209                965           END
STLDVR(A0011.02.034AA  CRS SATELLITE DRIVER)          08/04/78  13:13:49  PAGE  18

   NO ERRORS
  ISECT LENGTH --   871
  DSECT LENGTH --   521

  CKS1      02A2 I   856    848   851
< CKSTMO    028E I   845    829
< CKSTRT    0207 D   964    831   849
  CMDRB     0001 A   363    462
  CMDWB     0002 A   364    451
> DATMON    0007      22     22   120   123
< DMBLST    0003 A   480    472
< DMDATA    0002 A   479    472
< DMDFRM    0001 A   478    472
< DMNRML    0000 A   477    472
  DPRCER    034F I   881    768
  DWT3BT    0000 A   484    487
  DWT4BT    0001 A   485    487
> IDXRTN    0016      28     28   139
> LOGFRM    001A      29     29   269
  MGTPER    02EB I   867
  MONOFF    0000 A    71
  MONPWR    0001 A    70    112   114
> MONSTS    0002      21     21   111   115   116   117
> MSGOUT    001B      30     30   791
> MSGRQT    0014      26     26   789
  MSGTRC    0004 A    82    790
> MVCDST    0001      20     20    94
> MVCHAR    0015      28     28    95
> MVCSTR    0000      20     20    92
  SCDATA    0002 A   500    397   467   490
  SCDBRK    0004 A   502    405   490
  SCDCSQ    0001 A   499    373   490
  SCDHTT    0020 A   508    135   445   491   801
  SCDMHC    007F A   512    105   149   429   493   813
  SCDMHD    0023 A   511    421   492   810
< SCDMTM    0010 A   507    491   773   779   807
< SCDMTP    0008 A   506    491   773   775   798
  SCDPCT    0003 A   501    381   490
< SCDREP    0005 A   503    490   819
  SCDRND    0007 A   505    413   491
< SCDRTM    0000 A   498    490   816
  SCDSND    0006 A   504    389   491
  SCDTHD    0021 A   509    437   491
  SCDTTM    0022 A   510    456   492   804
  SCLRCS    0001 A   544    375   528
< SCLRHT    0001 A   570    532
  SCLRMH    0001 A   582    423   431   534
< SCLRMM    0001 A   567    532
< SCLRMT    0001 A   561    531
  SCLRPC    000C A   549    383   529
  SCLRRH    0001 A   576    447   533
< SCLRRM    0001 A   541    528
```

```
   SCLRRN    0048 A   564    415   531
 < SCLRRX    0001 A   555    530
   SCLRSN    0001 A   558    391   530
   SCLRTB    0001 A   552    407   529
   SCLRTH    0001 A   573    439   533
S.LDVR(A0011.02.034AA  CRS SATELLITE DRIVER)          08/04/78  13:13:50  PAGE  19

   SCLRTM    0001 A   579    458   534
   SCLXCS    0001 A   543    374   528
   SCLXDT    0006 A   546    398   468   529
 < SCLXHT    0001 A   569    532
   SCLXMC    000A A   584    430   535
   SCLXMH    0008 A   581    422   534
 < SCLXMM    0003 A   566    532
 < SCLXMT    0011 A   560    531
   SCLXPC    0001 A   548    382   529
   SCLXRH    001D A   575    446   533
 < SCLXRM    0005 A   540    528
   SCLXRN    0002 A   563    414   531
 < SCLXRX    0006 A   554    530
   SCLXSN    0005 A   556    390   530
   SCLXTB    0001 A   551    406   529
   SCLXTH    00F1 A   572    438   533
   SCLXTM    0001 A   578    457   534
   SCTCDS    03E8 A   519    376   514
   SCTMHD    03E8 A   526    424   432   515
   SCTPCT    03E8 A   521    384   514   514
   SCTRDT    03E8 A   520    400   470   514
   SCTRND    03E8 A   524    416   514
   SCTSND    03E8 A   523    392   514
   SCTTBK    03E8 A   522    408   514
   SCTTHD    03E8 A   525    440   515
   SID1      01DC I   336    347   350
   SIDLCT    01DC I   335
   SIDLIR    01DF I   342    308   911
   SIMCPE    000C D   910    315   317
   SIMILC    000E D   911    309   311   313
   SIMWAI    01BA I   307    164
 < SRB114    0177 D   955      9
 < SRB115    0178 D   956      9
 < SRB117    017A D   957      9
 < SRCVB1    0106 D   943     10
 < SRCVB2    0107 D   944     10
 < SRCVB3    0108 D   945     10
 < SRCVB4    0109 D   946     10
 < SRCVB5    010A D   947     10
 < SRCVB6    010B D   948     10
 < SRCVB7    010C D   949     10
 < SRCVB8    010D D   950     11
 < SRCVB9    010E D   951     11
 < SRCVBF    0105 D   919      8   153   943   944   945   946   947   948   949   950   951   952
                             953   954   955   956   957
   SRCVCT    0011 D   916    146   222   225   776
   SRCVPT    0205 D   920    154   209   212
 < SRVB10    010F D   952     11
 < SRVB15    0114 D   953      9
 < SRVB35    0128 D   954     12
   STKSAV    0000 D   890    101   271
   STL1      00C3 I   174    172
   STL2      00C2 I   173    175
   STL4      00E0 I   186
   STL5      00F0 I   197    195
   STL7      00FA I   206    204
   STL7A     011A I   221    219
   STL8      00F9 I   205    208
STLDVR(A0011.02.034AA  CRS SATELLITE DRIVER)          08/04/78  13:13:50  PAGE  20

   STL9      011E I   223    215
   STLA      012C I   229    226
   STLB      0181 I   275    247   251
 < STLBCD    0003 D   900     32    97   103   134   148   772   892
 < STLBRK    0207 I   404    352
 < STLBRT    0002 D   899     32    96   102   892
```

```
< STLBRV    0005 D   902    32   145   892
< STLBTV    0006 D   903    32   159   892
< STLBWT    0008 D   904    33   132   893
< STLBXT    0004 D   901    33   143   893
  STLCMP    013B I   242   155
< STLCRQ    0000 I    90     7
  STLD      0191 I   281   277
< STLDVR    0014 I    98     7
  STLE      01B1 I   296   284
  STLF      014E I   252   249   286   288   299
  STLF1     017B I   271   260
  STLF2     0178 I   269   264
  STLH      0077 I   142   129
  STLH1     0091 I   152   150
  STLH2     00B1 I   163   161
  STLM      01B3 I   297   295
  STLR      003B I   117   113
  STLR1     004B I   125   106
  STLRCS    0136 I   236
< STLRCT    00F1 I   201     7
> STLRDR    0008      22    22   202
  STLRIN    00E1 I   190   163   180
< STLRND    020D I   412   353
< STLRPC    01F5 I   380   352
  STLRQB    0002 D   898    93
< STLRRD    0201 I   396   352
< STLRSN    01FB I   388   352
< STLRSQ    01EF I   372   352
  STLRST    0004 A    73   118
  STLS      0071 I   140   136
< STLSMC    0219 I   428   355
< STLSMH    0213 I   420   353
< STLSRH    0225 I   444   353
< STLSTH    021F I   436   354
  STLSTR    0000 A    74   121
> STLSW1    0003      21    21   127   171   193   203   213   217   230   232   244   253   258
                             282   846
> STLSW2    0004      21    21   142   170   177   192   206   223   227   238   245   265   267
                             281   298   310   345   349   769
< STLTRC    000B D   906    33   893
< STLTRT    000A D   905    33   130   893
  STLV      0033 I   114   110
< STLWCT    00B7 I   168     7
> STLWDR    0009      22    22   169   185
  STLWIT    00C7 I   176   325
  SW1DTO    0020 A    44   289
  SW1MRQ    0008 A    46   109   420
  SW1SRB    0080 A    42   126   231   297
  SW1SRC    0040 A    43   252
  SW1STO    0010 A    45   259   296   847
  SW1TRQ    0004 A    47   128   194   248   285   444   455
  SW1URD    0002 A    48   214   216   372
STLDVR(A0011.02.034AA  CRS SATELLITE DRIVER)          08/04/78  13:13:51  PAGE  21

  SW1WRS    0001 A    49   372   380   388   396   404   412   420   428   436   444   455   466
  SW2BTR    0002 A    59
  SW2DPE    0001 A    60   266   770
  SW2EXT    0020 A    55
  SW2INT    0008 A    57   176   224   346   348
  SW2SSC    0080 A    53   237   246   283
  SW2TSC    0040 A    54   250   287
  SW2WRM    0010 A    56   174   191   207
  SW2XRC    0004 A    58   229
< SXMTB1    0013 D   922    14
< SXMTB2    0014 D   923    14
< SXMTB3    0015 D   924    14
< SXMTB4    0016 D   925    14
< SXMTB5    0017 D   926    14
< SXMTB6    0018 D   927    14
< SXMTB7    0019 D   928    15
< SXMTB8    001A D   929    15
< SXMTB9    001B D   930    15
< SXMTBF    0012 D   917     8   104   147   922   923   924   925   926   927   928   929   930
```

```
                                  931   932   933   934   935   936   937   938   939   940   941
SXMTCT    0010 D   915    144   179   181   263
SXMTPT    0103 D   918    152   178   184
SXTB10    001C D   931     15
SXTB11    001D D   932     13
SXTB12    001E D   933     16
SXTB13    001F D   934     17
SXTB14    0020 D   935     13
SXTB15    0021 D   936     16
SXTB16    0022 D   937     16
SXTB18    0024 D   938     13
SXTB21    0027 D   939     13
SXTB22    0028 D   940     16
SXTB26    002C D   941     13
SYERSL    0273 I   796    780
SYR1      026A I   789    771
SYR2      025E I   781    787
SYR3      0268 I   788    785
SYR4      025B I   780    774   778
SYRDDS    0301 I   870     18   808   811   814
SYRDPR    02A3 I   858    823
SYRMTU    02D0 I   864    799   802   805
SYSERR    023F I   767    759
TAPCPA    000D      23     23   157
TAPDVR    0018      28     28   196
TAPLEN    000B      23     23   133   137
TAPRQT    000A      23     23   131
TAPST1    0006      21     21   255   257   291   293
TAPTMO    000C      23     23   141
TCPDTA    0239 I   466    356
TCPTTM    022F I   455    356
TMRBC1    0011      24     24   279
TMRBCA    0010      24     24   156   278
TMRBSY    0080 A    37
TMRBTV    000F      24     24   160
TMRCNT    0012      24     24
TMRCTR    000E      24     24   158
TMRDVR    0017      28     28   162
TMRRCP    0040 A    38    276
S.._DVR(A0011.02.034AA  CRS SATELLITE DRIVER)           08/04/78  13:13:51  PAGE  22

TMRRQL    0019      28     28   280
TMRSTS    0005      21     21   254   275
TPMCNT    0013      25     25   863   869   875   880   884
TRQCR2    0040 A   359    450   461
TRQSTR    0008 A   360    450   461
TRQWRT    0004 A   361    450
TTMOWR    001C     357    357   448
TW1DER    0020 A    65    292
TW1STO    0010 A    66    292
TW1TRB    0080 A    64    256
XMTERR    0336 I   876    817   820
XMTRTY    001D     833    833   850
TAPDVR(A0011.02.035AA  CRS MAG TAPE UNIT DRIVER)       08/04/78  10:14:37  PAGE   1

                        2 *
                        3 *      CENTRAL RECORDING STATION MAGNETIC TAPE DRIVER
                        4 *
 0000 I                 5           ISEC
                        6 *
                        7           DEF     TAPDVR,TAPCNT,TAPCMP
                        8           DEF     TCDMRC,TCDDEN,TCDOFL,TCDFFM
                        9           DEF     TCDEOF,TCDBSR,TCDBFM,TCDREW
                       10           DEF     TCDERT,TCDFSR,TCDSSP,TCDSOP
                       11           DEF     TAPTMO,TAPRQT
                       12           DEF     TAPLEN,TAPCPA
                       13           DEF     TAPDS1
                       14 *
                       15           REF     TAPST1,TAPST2,STLSW1,STLSW2,TMRSTS
                       16           REF     TMRCTR
                       17           REF     TMRBTV,TMRBCA
                       18           REF     CASR1,CASR2,CASR3,CASR4,CACD1,CACD2,CACCH,CACCL
                       19           REF     CAADH,CAADL,CASSP,CASOP,CAIIR,CAEIR
```

```
                *
                          REF     TMRDVR,TPERCK
                *
                *       TIMER STATUS WORD EQUATES
                *
0080 A            TMRBSY    EQU    $80          TIMER BUSY
0040 A            TMRRCP    EQU    $40          REQUEST COMPLETE
                *
                *       MAG TAPE UNIT STATUS WORD 1 EQUATES
                *
0080 A            TW1TRB    EQU    $80          TAPE REQUEST BUSY
0040 A            TW1TRC    EQU    $40          RTAPE REQUEST COMPLETE
0020 A            TW1DER    EQU    $20          DEVICE ERROR
0010 A            TW1STO    EQU    $10          SOFTWARE TIMEOUT
0008 A            TW1STR    EQU    8            SATELLITE REQUEST
0004 A            TW1WRT    EQU    4            WRITE REQUEST
0002 A            TW1CMD    EQU    2            COMMAND REQUEST
0001 A            TW1STS    EQU    1            STATUS REQUEST
                *
                *       MAG TAPE UNIT STATUS WORD 2 EQUATES
                *
0080 A            TW2INT    EQU    $80          TAPE INTERRUPT
0040 A            TW2BSY    EQU    $40          DEVICE BUSY
0020 A            TW2DUV    EQU    $20          DEVICE UNAVAILABLE
0010 A            TW2DTE    EQU    $10          DATA ERROR
0004 A            TW2EOT    EQU    4            END-OF-TAPE
0002 A            TW2BOT    EQU    2            LOAD POINT
0001 A            TW2EOF    EQU    1            FILE MARK DETECTED
0080 A            CMDMR     EQU    $80          MASTER RESET
0040 A            CMDDE     EQU    $40          DEVICE ENABLE
0020 A            CMDOF     EQU    $20          OFF LINE
                *
                *       COMMAND REGISTER 2
                *
0001 A            CMDRB     EQU    1            READ 1 BLOCK
0002 A            CMDWB     EQU    2            WRITE 1 BLOCK
0003 A            CMDFF     EQU    3            FORWARD FILE MARK
0004 A            CMDWF     EQU    4            WRITE FILE MARK
0008 A            CMDBS     EQU    8            BACKSPACE 1 RECORD
0018 A            CMDBF     EQU    $18          BACKSPACE FILE MARK
TAPDVR(A0011.02.035AA  CRS MAG TAPE UNIT DRIVER)        08/04/78  10:14:38  PAGE   2

0010 A            CMDRW     EQU    $10          REWIND
0020 A            CMDET     EQU    $20          ERASE TAPE
0080 A            CMDFS     EQU    $80          FORWARD SPACE 1 RECORD
                *
                *       STATUS REGISTER 1
                *
0001 A            STBSY     EQU    1            TAPE UNIT BUSY
0002 A            SFBSY     EQU    2            FORMATTER BUSY
0004 A            SEOTP     EQU    4            END-OF-TAPE
0008 A            SINTB     EQU    8            READ DEVICE STATUS
0010 A            SFPRM     EQU    $10          FILE PROTECT RING MISSING
0020 A            SONLN     EQU    $20          ON LINE
0040 A            SLDPT     EQU    $40          LOAD POINT
0080 A            SRWDG     EQU    $80          REWINDING
0083 A            SBUSY     EQU    STBSY+SFBSY+SRWDGUNIT BUSY MASK
                *
                *       STATUS REGISTER 2
                *
0001 A            SGBLK     EQU    1            GOOD DATA BLOCK
0002 A            SMTRK     EQU    2            MULTITRACK ERROR
0004 A            SSKEW     EQU    4            SKEW ERROR
0008 A            SFMKD     EQU    8            FILE MARK DETECTED
0010 A            SVRCE     EQU    $10          VRC ERROR
0020 A            SOVFL     EQU    $20          RATE ERROR
0040 A            STDBY     EQU    $40          STANDBY
                *
                *       TAPE UNIT COMMAND TIMEOUT LENGTHS (MILLISECONDS)
                *
0001 A            TTMOMR    EQU    1            MASTER RESET
0001 A            TTMODE    EQU    1            DEVICE ENABLE
0001 A            TTMOOF    EQU    1            OFF LINE
```

```
7530 A              91 TTMOFF     EQU    30000        FORWARD FILE MARK
03E8 A              92 TTMOWF     EQU    1000         WRITE FILE MARK
03E8 A              93 TTMOBS     EQU    1000         BACKSPACE RECORD
7530 A              94 TTMOBF     EQU    30000        BACKSPACE FILE MARK
7530 A              95 TTMORW     EQU    30000        REWIND
03E8 A              96 TTMOET     EQU    1000         ERASE TAPE
03E8 A              97 TTMOFS     EQU    1000         FORWARD SPACE RECORD
05DC A              98 TTMOSS     EQU    1500         SET STAND-BY POWER
0FA0 A              99 TTMOSO     EQU    4000         SET OPERATE POWER
01F4 A             100 TTMOWR     EQU    500          WRITE/READ OPERATION
                   101 *
                   102 *     SATELLITE STATUS WORD 2 EQUATES
                   103 *
0040 A             104 SW2TSC     EQU    $40          TAPE SEQ COMPLETE
0002 A             105 SW2BTR     EQU    2            BAD TAPE REQUEST
                   106 *
                   107 *     CALLING SEQUENCE:  JSR  TAPDVR
                   108 *
                   109 *     REQUEST INITIALIZATION
                   110 *
0000 I             111 TAPDVR     EQU    *
0000 I F6 0000 D   112            LDA B  TAPRQT
0003 I C5 01       113            BIT B  #TRQSTS      STATUS REQUEST ?
0005 I 27 07       114            BEQ    TAP1         NO
0007 I FE 0008 R   115            LDX    CASR1        MOVE STATUS REGS
000A I FF 0002 D   116            STX    TAPDS1       INTO REQUEST BLOCK
000D I 39          117            RTS
TAPDVR(A0011.02.035AA  CRS MAG TAPE UNIT DRIVER)        08/04/78  10:14:39  PAGE   3

000E I 7F 0001 R   118 TAP1       CLR    TAPST2       CLEAR STATUS WORD 2
0011 I 86 80       119            LDA A  #TW1TRB      SET REQUEST BUSY
0013 I C4 0F       120            AND B  #$F          MASK OFF REQUEST TYPE
0015 I 1B          121            ABA                 MOVE REQUEST TYPE
0016 I B7 0000 R   122            STA A  TAPST1       INTO STATUS WORD 1
0019 I FE 0004 D   123            LDX    TAPTMO       TIMER REQUEST ?
001C I 27 03       124            BEQ    TAP2         NO
001E I 7F 0004 R   125            CLR    TMRSTS       CLEAR TIMER REQUEST COMPLETE
0021 I F6 0009 R   126 TAP2       LDA B  CASR2
0024 I C5 40       127            BIT B  #STDBY       STAND-BY POWER
0026 I 27 19       128            BEQ    TAP3         NO
0028 I F6 0000 D   129            LDA B  TAPRQT
002B I C5 10       130            BIT B  #TRQSOP      SET OPERATE POWER REQUEST
002D I 26 44       131            BNE    TAP4         YES
002F I C6 20       132 TAPC       LDA B  #TW2DUV      SET DEVICE UNAVAILABLE
0031 I FA 0001 R   133 TAP7       ORA B  TAPST2
0034 I F7 0001 R   134            STA B  TAPST2
0037 I 84 7F       135            AND A  #-1-TW1TRB   RESET REQUEST BUSY
0039 I 8A 20       136            ORA A  #TW1DER      SET DEVICE ERROR FLAG
003B I B7 0000 R   137            STA A  TAPST1
003E I 7E 00D6 I   138            JMP    TAPCMP       COMPLETE BAD REQUEST
0041 I F6 0008 R   139 TAP3       LDA B  CASR1
0044 I C5 20       140            BIT B  #SONLN       TAPE UNIT OFF LINE
0046 I 27 E7       141            BEQ    TAPC         NO, DEVICE UNAVAILABLE
0048 I C5 83       142            BIT B  #STBSY+SFBSY+SRWDG
004A I 27 0C       143            BEQ    TAP5         CONTINUE IF TAPE NOT BUSY
004C I 85 04       144            BIT A  #TW1WRT      WRITE REQUEST
004E I 26 04       145            BNE    TAP6         YES
0050 I C6 40       146 TAP8       LDA B  #TW2BSY      SET DEVICE BUSY FLAG
0052 I 20 DD       147            BRA    TAP7         COMPLETE BAD REQUEST
0054 I C5 82       148 TAP6       BIT B  #SFBSY+SRWDG WRITE POSSIBLE
0056 I 26 F8       149            BNE    TAP8         NO, TAPE UNIT BUSY
0058 I CE 0000 A   150 TAP5       LDX    #0           ANTICIPATE READ
005B I 85 04       151            BIT A  #TW1WRT      WRITE REQUEST
005D I 27 11       152            BEQ    TAPQ
005F I F6 0008 R   153            LDA B  CASR1
0062 I C5 10       154            BIT B  #SFPRM       WRITE PROTECTED
0064 I 26 06       155            BNE    TAPA         YES
0066 I FE 0006 D   156            LDX    TAPLEN       SET CHARACTER
0069 I 09          157            DEX
006A I 20 04       158            BRA    TAPQ         CONTINUE INITIALIZATION
006C I C6 10       159 TAPA       LDA B  #TW2DTE      SET DATA ERROR FLAG
006E I 20 C1       160            BRA    TAP7         COMPLETE BAD REQUEST
0070 I FF 000E R   161 TAPQ       STX    CACCH        COUNTER FOR WRITE
0073 I 8A 80       162 TAP4       ORA A  #TW1TRB      SET TAPE REQUEST BUSY
```

```
 0075 I B7 0000 R   163           STA A  TAPST1
 0078 I FE 0004 D   164           LDX    TAPTMO        TIMER REQUEST
 007B I 27 0C       165           BEQ    TAP9          NO
 007D I FF 0006 R   166           STX    TMRBTV        SET TIMEOUT IN TIMER REQUEST BLOCK
 0080 I CE 00D6 I   167           LDX    #TAPCMP       SET TIMER COMLETION ADDR
 0083 I FF 0007 R   168           STX    TMRBCA        TO TAPE REQUEST COMPLETION
 0086 I BD 0016 R   169           JSR    TMRDVR        INITIATE TIMER REQUEST
 0089 I B6 0001 D   170 TAP9      LDA A  TAPCMD        PICK UP TAPE COMMAND
 008C I F6 0000 D   171           LDA B  TAPRQT        SELECT
 008F I CE 000C R   172           LDX    #CACD1        PROPER
 0092 I 58          173           ASL B                COMMAND
 0093 I 25 0A       174           BCS    TAPB          REGISTER
 0095 I 08          175           INX
TAPDVR(A0011.02.035AA  CRS MAG TAPE UNIT DRIVER)        08/04/78  10:14:41  PAGE   4

 0096 I 2B 07       176           BMI    TAPB
 0098 I CE 0012 R   177           LDX    #CASSP
 009B I 58          178           ASL B
 009C I 2B 01       179           BMI    TAPB
 009E I 08          180           INX
 009F I A7 00       181 TAPB      STA A  0,X           ISSUE TAPE UNIT COMMAND
 00A1 I FE 0008 D   182           LDX    TAPCPA        COMPLETION ADDR SPECIFIED
 00A4 I 27 01       183           BEQ    TAPL          INITIATE IDLE LOOP
 00A6 I 39          184           RTS                  RETURN TO CALLER
                    185 *
                    186 *     TAPE REQUEST IDLE LOOP
                    187 *
 00A7 I 01          188 TAPL      NOP
 00A8 I 0E          189           CLI                  CLEAR INTERRUPT MASK
 00A9 I 3E          190           WAI                  WAIT FOR TAPE INTERRUPT
 00AA I 01          191           NOP
 00AB I 0F          192           SEI                  MASK
 00AC I B6 0001 R   193           LDA A  TAPST2        TAPE INTERRUPT
 00AF I 2A F6       194           BPL    TAPL          NO
 00B1 I B6 0000 R   195           LDA A  TAPST1
 00B4 I 85 40       196           BIT A  #TW1TRC       REQUEST COMPLETE
 00B6 I 27 EF       197           BEQ    TAPL          NO
 00B8 I 01          198           NOP
 00B9 I 0E          199           CLI                  CLEAR INTERRUPT MASK
 00BA I 39          200           RTS                  RETURN TO CALLER
                    201 *
                    202 *     TAPE INTERRUPT CONTINUATOR
                    203 *
 00BB I             204 TAPCNT    EQU    *
 00BB I B6 0000 R   205           LDA A  TAPST1        REQUEST BUSY
 00BE I 2B 0E       206           BMI    TAPD          YES
 00C0 I B6 0008 R   207           LDA A  CASR1
 00C3 I 85 20       208           BIT A  #SONLN        UNIT ON LINE
 00C5 I 27 06       209           BEQ    TAPE          NO
                    210 *      *
                    211 *      *    TRANSITION FROM OFF LINE TO ON LINE CONDITION
                    212 *      *
 00C7 I BD 0163 I   213           JSR    TCDMRC        MASTER RESET
 00CA I BD 0169 I   214           JSR    TCDDEN        DEVICE ENABLE
 00CD I 3B          215 TAPE      RTI                  RETURN FROM INTERRUPT
                    216 *      *
                    217 *      *    REQUEST INITIATED INTERRUPT
                    218 *      *
 00CE I F6 0001 R   219 TAPD      LDA B  TAPST2
 00D1 I CA 80       220           ORA B  #TW2INT       SET TAPE INTERRUPT INDICATOR
 00D3 I F7 0001 R   221           STA B  TAPST2
                    222 *
                    223 *     TAPE REQUEST COMPLETION ROUTINE
                    224 *
 00D6 I             225 TAPCMP    EQU    *
 00D6 I B6 0000 R   226           LDA A  TAPST1        PICK TAPE
 00D9 I F6 0001 R   227           LDA B  TAPST2        STATUS WORDS
 00DC I C5 80       228           BIT B  #TW2INT       TIMEOUT OR ERROR
 00DE I 26 0B       229           BNE    TAPF          NO
 00E0 I 85 20       230           BIT A  #TW1DER       ERROR
 00E2 I 26 07       231           BNE    TAPF          YES
 00E4 I 8A 30       232           ORA A  #TW1DER+TW1STOSET DEVICE ERROR AND TIMEOUT FLAGS
 00E6 I CA 80       233           ORA B  #TW2INT       SET TAPE INTERRUPT INDICATOR
```

```
TAPDVR(A0011.02.035AA  CRS MAG TAPE UNIT DRIVER)        08/04/78  10:14:42  PAGE   5

00E8 I F7 0001 R              STA B  TAPST2
00EB I FE 0004 D       TAPF   LDX    TAPTMO      TIMER REQUEST
00EE I 27 03                  BEQ    TAPR
00F0 I 7F 0004 R              CLR    TMRSTS      CLEAR TIMER STATUS
00F3 I 8A 40           TAPR   ORA A  #TW1TRC     SET REQUEST COMPLETE
00F5 I B7 0000 R              STA A  TAPST1
00F8 I 85 02                  BIT A  #TW1CMD     COMMAND REQUEST
00FA I 26 1D                  BNE    TAPG        YES
00FC I 85 04                  BIT A  #TW1WRT     WRITE REQUEST
00FE I 26 06                  BNE    TAPP
0100 I FE 000A R              LDX    CASR3       SET CHARACTER
0103 I FF 0006 D              STX    TAPLEN      COUNT IN REQUEST BLOCK
0106 I 37              TAPP   PSH B
0107 I F6 0009 R              LDA B  CASR2
010A I C5 01                  BIT B  #SGBLK      GOOD DATA BLOCK
010C I 33                     PUL B
010D I 26 0A                  BNE    TAPG        YES
010F I F6 0001 R              LDA B  TAPST2
0112 I 8A 20                  ORA A  #TW1DER     SET DEVICE ERROR
0114 I CA 10                  ORA B  #TW2DTE     AND DATA ERROR FLAGS
0116 I B7 0000 R              STA A  TAPST1
0119 I FE 0008 R       TAPG   LDX    CASR1       MOVE DEVICE STATUS
011C I FF 0002 D              STX    TAPDS1      REGISTERS INTO REQUEST BLOCK
011F I B6 0008 R              LDA A  CASR1
0122 I 85 04                  BIT A  #SEOTP      END-OF-TAPE
0124 I 27 02                  BEQ    TAPH        NO
0126 I CA 04                  ORA B  #TW2EOT     SET EOT STATUS BIT
0128 I 85 40           TAPH   BIT A  #SLDPT      LOAD POINT
012A I 27 02                  BEQ    TAPI        NO
012C I CA 02                  ORA B  #TW2BOT     SET BOT STATUS BIT
012E I B6 0009 R       TAPI   LDA A  CASR2
0131 I 85 08                  BIT A  #SFMKD      END-OF-FILE DETECTED
0133 I 27 02                  BEQ    TAPJ        NO
0135 I CA 01                  ORA B  #TW2EOF     SET EOF STATUS BIT
0137 I F7 0001 R       TAPJ   STA B  TAPST2      SAVE REQUEST STATUS BITS
013A I B6 0000 R              LDA A  TAPST1
013D I 85 08                  BIT A  #TW1STR     SATELLITE REQUEST
013F I 27 10                  BEQ    TAPK        NO
0141 I F6 0003 R              LDA B  STLSW2
0144 I CA 40                  ORA B  #SW2TSC     SET TAPE SEQUENCE COMPLETE FLAG
0146 I 85 20                  BIT A  #TW1DER     BAD COMPLETION ?
0148 I 27 02                  BEQ    TAPM        NO
014A I CA 02                  ORA B  #SW2BTR     SET BAD TAPE REQUEST
014C I F7 0003 R       TAPM   STA B  STLSW2      SET SATELLITE REQUEST STATUS
014F I 20 05                  BRA    TAPN
0151 I 85 80           TAPK   BIT A  #TW1TRB     ERROR COMPLETION - NO REQUEST INITIATED
0153 I 26 01                  BNE    TAPN        NO
0155 I 39                     RTS                RETURN TO CALLER
0156 I 84 7F           TAPN   AND A  #-1-TW1TRB  RESET REQUEST BUSY
0158 I B7 0000 R              STA A  TAPST1
015B I FE 0008 D              LDX    TAPCPA      COMPLETION ADDRESS SPECIFIED
015E I 27 02                  BEQ    TAPO        NO
0160 I 6E 00                  JMP    0,X         CALL COMPLETION ADDRESS
0162 I 3B              TAPO   RTI                RETURN TO INTERRUPTED ROUTINE
                       *
                       *      TAPE REQUEST ROUTINES
                       *
                       *      REGISTER USUAGES:
TAPDVR(A0011.02.035AA  CRS MAG TAPE UNIT DRIVER)        08/04/78  10:14:43  PAGE   6

                       *
                       *      ACCA => REQUEST TYPE
                       *      ACCB => COMMAND
                       *      IDX  => TIMEOUT VALUE
                       *
                       *      RETURN SEQUENCE:
                       *
                       *      CC => MINUS IF TAPE ERROR
                       *
0163 I                 TCDMRC EQU    *
0163 I C6 80                  LDA B  #CMDMR      MASTER RESET
0165 I F7 000C R       TCD7   STA B  CACD1       OUTPUT COMMAND
```

```
0168 I 39           304             RTS
0169 I              305 TCDDEN      EQU     *           DEVICE ENABLE
0169 I C6 40        306             LDA B   #CMDDE
016B I 20 F8        307             BRA     TCD7
016D I              308 TCDOFL      EQU     *           OFF LINE
016D I C6 20        309             LDA B   #CMDOF
016F I 20 F4        310             BRA     TCD7
0171 I              311 TCDFFM      EQU     *           FORWARD FILE MARK
0171 I C6 03        312             LDA B   #CMDFF
0173 I CE 7530 A    313             LDX     #TTMOFF
0176 I 86 14        314 TCD5        LDA A   #20         SET TIMER COUNTER
0178 I B7 0005 R    315 TCD8        STA A   TMRCTR
017B I 20 03        316             BRA     TCD6
017D I 7F 0005 R    317 TCD3        CLR     TMRCTR      CLEAR TIMER COUNTER
0180 I 86 40        318 TCD6        LDA A   #TRQCR2
0182 I 20 58        319             BRA     TCD1
0184 I              320 TCDEOF      EQU     *           WRITE FILE MARK
0184 I C6 04        321             LDA B   #CMDWF
0186 I CE 03E8 A    322             LDX     #TTMOWF
0189 I 20 F2        323             BRA     TCD3
018B I              324 TCDBSR      EQU     *           BACKSPACE RECORD
018B I BD 0202 I    325             JSR     CHKLPT
018E I 26 71        326             BNE     TCD4        IGNORE REQUEST IF TAPE AT LOAD PT
0190 I C6 08        327             LDA B   #CMDBS
0192 I CE 03E8 A    328             LDX     #TTMOBS
0195 I 20 E6        329             BRA     TCD3
0197 I              330 TCDBFM      EQU     *           BACKSPACE FILE MARK
0197 I BD 0202 I    331             JSR     CHKLPT
019A I 26 65        332             BNE     TCD4        IGNORE REQUEST IF TAPE AT LOAD PT
019C I C6 18        333             LDA B   #CMDBF
019E I CE 7530 A    334             LDX     #TTMOBF
01A1 I 20 D3        335             BRA     TCD5
01A3 I              336 TCDREW      EQU     *           REWIND
01A3 I C6 10        337             LDA B   #CMDRW
01A5 I CE 7530 A    338             LDX     #TTMORW
01A8 I 86 04        339             LDA A   #4          SET TIMER CNTR
01AA I 20 CC        340             BRA     TCD8
01AC I              341 TCDERT      EQU     *           ERASE TAPE
01AC I C6 20        342             LDA B   #CMDET
01AE I CE 03E8 A    343             LDX     #TTMOET
01B1 I 20 CA        344             BRA     TCD3
01B3 I              345 TCDFSR      EQU     *           FORWARD SPACE RECORD
01B3 I C6 80        346             LDA B   #CMDFS
01B5 I CE 03E8 A    347             LDX     #TTMOFS
01B8 I 20 C3        348             BRA     TCD3
01BA I              349 TCDSSP      EQU     *           SET STANDBY POWER
TAPDVR(A0011.02.035AA  CRS MAG TAPE UNIT DRIVER)      08/04/78  10:14:44  PAGE   7

01BA I 8D CF        350             BSR     TCDBSR      BACKSPACE RECORD
01BC I B7 0012 R    351             STA A   CASSP       SET STANDBY POWER
01BF I CE 0000 A    352             LDX     #0
01C2 I FF 0007 R    353             STX     TMRBCA
01C5 I CE 05DC A    354             LDX     #TTMOSS
01C8 I FF 0006 R    355             STX     TMRBTV
01CB I 7F 0005 R    356             CLR     TMRCTR
01CE I BD 0016 R    357             JSR     TMRDVR      SETUP STAND BY POWER DELAY
01D1 I 39           358             RTS
01D2 I              359 TCDSOP      EQU     *           SET OPERATE POWER
01D2 I C6 40        360             LDA B   #STDBY
01D4 I CE 0FA0 A    361             LDX     #TTMOSO
01D7 I 86 10        362             LDA A   #TRQSOP
01D9 I 7F 0005 R    363             CLR     TMRCTR
01DC I 8A 02        364 TCD1        ORA A   #TRQCMD     SET CMND REQUEST
01DE I B7 0000 D    365             STA A   TAPRQT      SET REQUEST TYPE
01E1 I F7 0001 D    366             STA B   TAPCMD      SET COMMAND BYTE
01E4 I FF 0004 D    367             STX     TAPTMO      SET TIMEOUT VALUE
01E7 I 7F 0008 D    368             CLR     TAPCPA      CLEAR COMPLETION
01EA I 7F 0009 D    369             CLR     TAPCPA+1    ADDRESS
01ED I BD 0000 I    370             JSR     TAPDVR      INITIATE TAPE REQUEST
01F0 I B6 0000 D    371             LDA A   TAPRQT
01F3 I 85 20        372             BIT A   #TRQSSP     SET STANDBY POWER
01F5 I 26 0A        373             BNE     TCD4        YES, SKIP ERROR CHECK
01F7 I B6 0001 D    374             LDA A   TAPCMD
```

```
01FA I 81 20       375          CMP A  #CMDOF       OFF LINE COMMAND
01FC I 27 03       376          BEQ    TCD4         YES, SKIP ERROR CHECK
01FE I BD 0017 R   377          JSR    TPERCK       CHECK FOR TAPE ERRORS
0201 I 39          378 TCD4     RTS                 RETURN TO CALLER
                   379 *
                   380 *      ROUTINE TO CHECK FOR LOAD POINT STAUTS
                   381 *
0202 I             382 CHKLPT   EQU    *
0202 I 86 01       383          LDA A  #TRQSTS
0204 I B7 0000 D   384          STA A  TAPRQT
0207 I 7F 0000 R   385          CLR    TAPST1
020A I 7F 0001 R   386          CLR    TAPST2
020D I BD 0000 I   387          JSR    TAPDVR
0210 I B6 0002 D   388          LDA A  TAPDS1
0213 I 85 40       389          BIT A  #SLDPT
0215 I 39          390          RTS
                   391 *
0000 D             392          DSEC
                   393 *
                   394 *      MAG TAPE UNIT REQUEST BLOCK
                   395 *
0000 D             396 TAPRQB   EQU    *
0000 D 00          397 TAPRQT   FCB    0            REGISTER IND/ REQUEST TYPE
0001 D 00          398 TAPCMD   FCB    0            COMMAND BYTE
0002 D 00          399 TAPDS1   FCB    0            DEVICE STATUS REGISTER 1
0003 D 00          400 TAPDS2   FCB    0            DEVICE STATUS REGISTER 2
0004 D 0000     A  401 TAPTMO   FDB    0            REQUEST TIMEOUT VALUE
0006 D 0000     A  402 TAPLEN   FDB    0            # BYTES XMT OR RECEIVE
0008 D 0000     A  403 TAPCPA   FDB    0            COMPLETION ADDRESS
                   404 *
                   405 *      MAG TAPE UNIT REQUEST TYPE EQUATES (TAPRQT)
                   406 *
0080 A             407 TRQCR1   EQU    $80          COMMAND REGISTER 1
```

```
0040 A             408 TRQCR2   EQU    $40          COMMAND REGISTER 2
0020 A             409 TRQSSP   EQU    $20          SET STANDBY POWER
0010 A             410 TRQSOP   EQU    $10          SET OPERATE POWER
0008 A             411 TRQSTR   EQU    8            SATELLITE REQUEST
0004 A             412 TRQWRT   EQU    4            WRITE REQUEST
0002 A             413 TRQCMD   EQU    2            COMMAND REQUEST
0001 A             414 TRQSTS   EQU    1            STATUS REQUEST
000A               415          END
```

```
  NO ERRORS
 ISECT LENGTH --   534
 DSECT LENGTH --    10

> CAADH     0010      19     19
> CAADL     0011      19     19
> CACCH     000E      18     18    161
> CACCL     000F      18     18
> CACD1     000C      18     18    172    303
> CACD2     000D      18     18
> CAEIR     0015      19     19
> CAIIR     0014      19     19
> CASOP     0013      19     19
> CASR1     0008      18     18    115    139    153    207    255    257
> CASR2     0009      18     18    126    247    264
> CASR3     000A      18     18    244
> CASR4     000B      18     18
> CASSP     0012      19     19    177    351
  CHKLPT    0202 I   382    325    331
  CMDBF     0018 A    59    333
  CMDBS     0008 A    58    327
  CMDDE     0040 A    49    306
  CMDET     0020 A    61    342
  CMDFF     0003 A    56    312
  CMDFS     0080 A    62    346
  CMDMR     0080 A    48    302
  CMDOF     0020 A    50    309    375
  CMDRB     0001 A    54
```

```
CMDRW    0010 A   60   337
CMDWB    0002 A   55
CMDWF    0004 A   57   321
SBUSY    0083 A   74
SEOTP    0004 A   68   258
SFBSY    0002 A   67    74   142   148
SFMKD    0008 A   81   265
SFPRM    0010 A   70   154
SGBLK    0001 A   78   248
SINTB    0008 A   69
SLDPT    0040 A   72   261   389
SMTRK    0002 A   79
SONLN    0020 A   71   140   208
SOVFL    0020 A   83
SRWDG    0080 A   73    74   142   148
SSKEW    0004 A   80
STBSY    0001 A   66    74   142
STDBY    0040 A   84   127   360
STLSW1   0002      15    15
STLSW2   0003      15    15   272   277
SVRCE    0010 A   82
SW2BTR   0002 A  105   276
SW2TSC   0040 A  104   273
TAP1     000E I  118   114
TAP2     0021 I  126   124
TAP3     0041 I  139   128
TAP4     0073 I  162   131
TAP5     0058 I  150   143
TAP6     0054 I  148   145
TAPDVR(A0011.02.035AA  CRS MAG TAPE UNIT DRIVER)        08/04/78  10:14:47  PAGE  10

TAP7     0031 I  133   147   160
TAP8     0050 I  146   149
TAP9     0089 I  170   165
TAPA     006C I  159   155
TAPB     009F I  181   174   176   179
TAPC     002F I  132   141
TAPCMD   0001 D  398   170   366   374
TAPCMP   00D6 I  225     7   138   167
TAPCNT   00BB I  204     7
TAPCPA   0008 D  403    12   182   284   368   369
TAPD     00CE I  219   206
TAPDS1   0002 D  399    13   116   256   388
TAPDS2   0003 D  400
TAPDVR   0000 I  111     7   370   387
TAPE     00CD I  215   209
TAPF     00EB I  235   229   231
TAPG     0119 I  255   241   250
TAPH     0128 I  261   259
TAPI     012E I  264   262
TAPJ     0137 I  268   266
TAPK     0151 I  279   271
TAPL     00A7 I  188   183   194   197
TAPLEN   0006 D  402    12   156   245
TAPM     014C I  277   275
TAPN     0156 I  282   278   280
TAPO     0162 I  287   285
TAPP     0106 I  246   243
TAPQ     0070 I  161   152   158
TAPR     00F3 I  238   236
TAPRQB   0000 D  396
TAPRQT   0000 D  397    11   112   129   171   365   371   384
TAPST1   0000      15    15   122   137   163   195   205   226   239   254   269   283   385
TAPST2   0001      15    15   118   133   134   193   219   221   227   234   251   268   386
TAPTMO   0004 D  401    11   123   164   235   367
TCD1     01DC I  364   319
TCD3     017D I  317   323   329   344   348
TCD4     0201 I  378   326   332   373   376
TCD5     0176 I  314   335
TCD6     0180 I  318   316
TCD7     0165 I  303   307   310
TCD8     0178 I  315   340
TCDBFM   0197 I  330     9
```

```
TCDBSR   018B I   324     9   350
TCDDEN   0169 I   305     8   214
TCDEOF   0184 I   320     9
TCDERT   01AC I   341    10
TCDFFM   0171 I   311     8
TCDFSR   01B3 I   345    10
TCDMRC   0163 I   301     8   213
TCDOFL   01ED I   308     8
TCDREW   01A3 I   336     9
TCDSOP   01D2 I   359    10
TCDSSP   01BA I   349    10
TMRBCA   0007      17    17   168   353
TMRBSY   0080 A    25
TMRBTV   0006      17    17   166   355
TMRCTR   0005      16    16   315   317   356   363
TMRDVR   0016      21    21   169   357
TAPDVR(A0011.02.035AA  CRS MAG TAPE UNIT DRIVER)        08/04/78  10:14:47  PAGE  11

TMRRCP   0040 A    26
TMRSTS   0004      15    15   125   237
TPERCK   0017      21    21   377
TRQCMD   0002 A   413   364
TRQCR1   0080 A   407
TRQCR2   0040 A   408   318
TRQSOP   0010 A   410   130   362
TRQSSP   0020 A   409   372
TRQSTR   0008 A   411
TRQSTS   0001 A   414   113   383
TRQWRT   0004 A   412
TTMOBF   7530 A    94   334
TTMOBS   03E8 A    93   328
TTMODE   0001 A    89
TTMOET   03E8 A    96   343
TTMOFF   7530 A    91   313
TTMOFS   03E8 A    97   347
TTMOMR   0001 A    88
TTMOOF   0001 A    90
TTMORW   7530 A    95   338
TTMOSO   0FA0 A    99   361
TTMOSS   05DC A    98   354
TTMOWF   03E8 A    92   322
TTMOWR   01F4 A   100
TW1CMD   0002 A    36   240
TW1DER   0020 A    32   136   230   232   252   274
TW1STO   0010 A    33   232
TW1STR   0008 A    34   270
TW1STS   0001 A    37
TW1TRB   0080 A    30   119   135   162   279   282
TW1TRC   0040 A    31   196   238
TW1WRT   0004 A    35   144   151   242
TW2BOT   0002 A    46   263
TW2BSY   0040 A    42   146
TW2DTE   0010 A    44   159   253
TW2DUV   0020 A    43   132
TW2EOF   0001 A    47   267
TW2EOT   0004 A    45   260
TW2INT   0080 A    41   220   228   233
TWTINI(A0011.02.036AA  CRS TAPE OUTPUT INITIALIZE)      08/04/78  10:16:15  PAGE   1

                   *
                   *      TAPE OUTPUT INITIALIZATION ROUTINE
                   *
0000 I                      ISEC
                   *
                            DEF     TWTINI
                   *
                            REF     CURCSP,TAPRQT,TAPDS1,TAPST2
                            REF     DEPSAR,CHRCNT,MSGRQT,NUMMSG
                   *
                            REF     TCDSOP,TCDDEN,TAPDVR,MSGOUT,WRHBEG
                            REF     TCDBSR,TCDFFM,TIOCHK
                            REF     DSPDVR
                   *
```

```
                        16 *      LINE STATUS FLAGS
                        17 *
000C A                  18 LCAST1    EQU    12           LINE STATUS FLAGS (BYTE 1)
0004 A                  19 LSTEOT    EQU    4            END-OF-TAPE
                        20 *
                        21 *
000F A                  22 LCAST4    EQU    15           LINE STATUS FLAGS (BYTE 4)
0080 A                  23 LS4TIH    EQU    $80          SEND TRACE IDENTIFICATION HEADER
                        24 *
                        25 *      STATUS REGISTER EQUATES
                        26 *
0001 A                  27 STBSY     EQU    1            TAPE UNIT BUSY
0002 A                  28 SFBSY     EQU    2            FORMATTER BUSY
0040 A                  29 SLDPT     EQU    $40          LOAD POINT
0080 A                  30 SRWDG     EQU    $80          REWINDING
                        31 *
                        32 *      MESSAGE TYPE EQUATES
0040 A                  33 MSGTIP    EQU    $40          INPUT AND DISPLAY NEW VALUE
0004 A                  34 MSGTRC    EQU    4            RETRY OR CONTINUE REQUEST
                        35 *
0001 A                  36 TRQSTS    EQU    1            STATUS REQUEST
0004 A                  37 TW2EOT    EQU    4            END-OF-TAPE
0001 A                  38 TW2EOF    EQU    1            FILE MARK DETECTED
                        39 *
                        40 *
0000 I                  41 TWTINI    EQU    *
0000 I BD 0008 R        42           JSR    TCDSOP       SET OPERATE POWER
0003 I BD 0009 R        43           JSR    TCDDEN       DEVICE ENABLE
0006 I FE 0000 R        44           LDX    CURCSP
0009 I A6 0F            45           LDA A  LCAST4,X     SET FLAG TO
000B I 8A 80            46           ORA A  #LS4TIH      SEND TRACE IDENTIFICATION
000D I A7 0F            47           STA A  LCAST4,X     HEADER TO SATELLITE
000F I 86 01            48 TWT6      LDA A  #TRQSTS      REQUEST TAPE
0011 I B7 0001 R        49           STA A  TAPRQT       UNIT
0014 I BD 000A R        50           JSR    TAPDVR       STATUS
0017 I B6 0002 R        51           LDA A  TAPDS1       PICK UP STATUS REGISTER 1
001A I 85 83            52           BIT A  #STBSY+SFBSY+SRWDG
001C I 26 17            53           BNE    TWT1         JUMP IF TAPE UNIT BUSY
001E I 85 40            54           BIT A  #SLDPT       TAPE AT LOAD PT
0020 I 27 13            55           BEQ    TWT1         NO
0022 I CE 0064 I        56           LDX    #TPMNRL      OUTPUT NEW REEL MESG
0025 I FF 0006 R        57           STX    MSGRQT
0028 I C6 04            58           LDA B  #MSGTRC      WAIT FOR OPERATOR INTERVENTION
002A I BD 000B R        59           JSR    MSGOUT
TWTINI(A0011.02.036AA  CRS TAPE OUTPUT INITIALIZE)      08/04/78  10:16:16  PAGE   2

002D I 26 06            60           BNE    TWT1         JUMP IF CONTINUE
002F I BD 000C R        61           JSR    WRHBEG       WRITE REEL HEADER
0032 I BD 000D R        62           JSR    TCDBSR       BACKSPACE OVER FILE MARK
0035 I BD 000E R        63 TWT1      JSR    TCDFFM       FORWARD FILE MARK
0038 I 2A 05            64           BPL    TWT3         CONTINUE IF NO ERRORS
003A I BD 000F R        65           JSR    TIOCHK       INFORM OPERATOR OF ERROR MESSAGES
003D I 27 F6            66           BEQ    TWT1         JUMP IF RETRY
003F I B6 0003 R        67 TWT3      LDA A  TAPST2       END-OF-TAPE
0042 I 85 04            68           BIT A  #TW2EOT      FLAG SET
0044 I 27 09            69           BEQ    TWT4         NO
0046 I FE 0000 R        70           LDX    CURCSP
0049 I A6 0C            71           LDA A  LCAST1,X
004B I 8A 04            72           ORA A  #LSTEOT      SET EOT INDICATOR
004D I A7 0C            73           STA A  LCAST1,X
004F I BD 000D R        74 TWT4      JSR    TCDBSR       BACKSPACE RECORD
0052 I 2A 0C            75           BPL    TWT5         CONTINUE IF NO ERRORS
0054 I BD 000F R        76           JSR    TIOCHK       INFORM OPERATOR
0057 I 27 F6            77           BEQ    TWT4         JUMP IF RETRY
0059 I B6 0003 R        78           LDA A  TAPST2
005C I 85 01            79           BIT A  #TW2EOF      END-OF-FLIE DETECTED ?
005E I 27 D5            80           BEQ    TWT1         NO-RETRY TAPE POSITION
0060 I BD 0010 R        81 TWT5      JSR    DSPDVR       DISPLAY CURRENT FILE NUMBER
0063 I 39               82           RTS                 RETURN TO CALLER
0064 I 4E4557           83 TPMNRL    FCC    /NEW REEL - WRITE TAPE HEADER/
0080 I 0D               84           FCB    $D
0081 I 484954           85           FCC    /HIT RETRY TO WRITE HEADER/
009A I 0D               86           FCB    $D
```

```
009B I 4F5448        87          FCC    /OTHERWISE HIT CONTINUE/
00B1 I 0D            88          FCB    $D,4
00B2 I 04
00B3                 89          END
TWTINI(A0011.02.036AA  CRS TAPE OUTPUT INITIALIZE)      08/04/78  10:16:17  PAGE   3

   NO ERRORS
  ISECT LENGTH --   179
  DSECT LENGTH --     0

> CHRCNT   0005      10     10
> CURCSP   0000       9      9    44    70
> DEPSAR   0004      10     10
> DSPDVR   0010      14     14    81
  LCAST1   000C A    18     71    73
  LCAST4   000F A    22     45    47
  LS4TIH   0080 A    23     46
  LSTEOT   0004 A    19     72
> MSGOUT   000B      12     12    59
> MSGRQT   0006      10     10    57
  MSGTIP   0040 A    33
  MSGTRC   0004 A    34     58
> NUMMSG   0007      10     10
  SFBSY    0002 A    28     52
  SLDPT    0040 A    29     54
  SRWDG    0080 A    30     52
  STBSY    0001 A    27     52
> TAPDS1   0002       9      9    51
> TAPDVR   000A      12     12    50
> TAPRQT   0001       9      9    49
> TAPST2   0003       9      9    67    78
> TCDBSR   000D      13     13    62    74
> TCDDEN   0009      12     12    43
> TCDFFM   000E      13     13    63
> TCDSOP   0008      12     12    42
> TIOCHK   000F      13     13    65    76
  TPMNRL   0064 I    83     56
  TRQSTS   0001 A    36     48
  TW2EOF   0001 A    38     79
  TW2EOT   0004 A    37     68
  TWT1     0035 I    63     53    55    60    66    80
  TWT3     003F I    67     64
  TWT4     004F I    74     69    77
  TWT5     0060 I    81     75
  TWT6     000F I    48
< TWTINI   0000 I    41      7
> WRHBEG   000C      12     12    61
TPRCMP(A0011.02.037AA  CRS I/O REQUEST COMPLETION)      08/04/78  10:17:21  PAGE   1

                      2 *
                      3 *     CENTRAL RECORDING STATION OUTPUT REQUEST COMPLETION ROUTINE
                      4 *
0000 I                5          ISEC
                      6 *
                      7          DEF    TPRCMP
                      8          DEF    TPENTR
                      9 *
                     10          REF    CURCSP
                     11          REF    TAPST2
                     12          REF    MSGRQT
                     13          REF    MONSTS,DATMON
                     14 *
                     15          REF    TCDEOF,TCDBSR,TCDSSP
                     16          REF    TPERCK,TIOCHK
                     17          REF    MSGOUT
                     18          REF    UPDFLN
                     19          REF    TMONOF
                     20 *
                     21 *     LINE STATUS FLAG EQUATES
                     22 *
000C A               23 LCAST1   EQU    12          LINE STATUS FLAGS (BYTE 1)
0010 A               24 LSTTBP   EQU    $10         TAPE BY-PASS
0008 A               25 LSTCBP   EQU    8           CAMERA BY-PASS
```

```
0004 A                  LSTEOT    EQU     4           END-OF-TAPE
                        *
000E A                  LCAST3    EQU     14          LINE STATUS FLAGS (BYTE 3)
0002 A                  LS3NDR    EQU     2           NOISE DATA RECORDING
                        *
                        *       LINE MODE EQUATES
                        *
0010 A                  LCAMDE    EQU     16          LINE MODE OFFSET
0003 A                  MODFIR    EQU     3           FIRE MODE
                        *
0004 A                  TW2EOT    EQU     4           END-OF-TAPE STATUS
                        *
0004 A                  MSGTRC    EQU     4           RETRY OR CONTINUE REQUEST
                        *
0000 A                  SCPRFS    EQU     0           SELECT RF SPCTRUM FOR SCOPE DISPLAY
0002 A                  SCPSDT    EQU     2           SELECT SEISMIC DATA FOR SCOPE DISPLAY
                        *
                        *
0000 I                  TPRCMP    EQU     *
0000 I FE 0000 R                  LDX     CURCSP
0003 I A6 10                      LDA A   LCAMDE,X
0005 I 81 03                      CMP A   #MODFIR     FIRE MODE ?
0007 I 27 06                      BEQ     TPR1        YES, COMPLETE TAPE OUTPUT
0009 I A6 0C                      LDA A   LCAST1,X
000B I 85 10                      BIT A   #LSTTBP     TAPE BY-PASS SET ?
000D I 26 3E                      BNE     TPR6        YES, SKIP WRITING EOF
000F I BD 0005 R        TPR1      JSR     TCDEOF      WRITE FILE MARK TO TAPE
0012 I BD 0008 R                  JSR     TPERCK      ANY ERRORS ?
0015 I 2A 05                      BPL     TPR3        NO, CONTINUE
0017 I BD 0009 R                  JSR     TIOCHK      INFORM OPERATOR OF ERROR
001A I 27 F3                      BEQ     TPR1        JUMP IF RETRY SPECIFIED
001C I F6 0001 R        TPR3      LDA B   TAPST2      PICK UP TAPE STATUS FLAGS
001F I C5 04                      BIT B   #TW2EOT     END-OF-TAPE
0021 I 27 09                      BEQ     TPR4        NO, CONTINUE
TPRCMP(A0011.02.037AA  CRS I/O REQUEST COMPLETION)      08/04/78  10:17:22  PAGE   2

0023 I FE 0000 R                  LDX     CURCSP
0026 I A6 0C                      LDA A   LCAST1,X
0028 I 8A 04                      ORA A   #LSTEOT     SET END-OF-TAPE INDICATOR
002A I A7 0C                      STA A   LCAST1,X
002C I BD 0006 R        TPR4      JSR     TCDBSR      BACKSPACE OVER FILE MARK
002F I BD 0008 R                  JSR     TPERCK      ANY ERRORS ?
0032 I 2A 05                      BPL     TPR5        NO, CONTINUE
0034 I BD 0009 R                  JSR     TIOCHK      INFORM OPERATOR OF ERROR
0037 I 27 F3                      BEQ     TPR4        JUMP IF RETRY SPECIFIED
0039 I FE 0000 R        TPR5      LDX     CURCSP
003C I A6 0C                      LDA A   LCAST1,X
003E I 85 04                      BIT A   #LSTEOT     END-OF-TAPE ENCOUNTERED
0040 I 27 0B                      BEQ     TPR6        NO, CONTINUE
0042 I CE 007B I                  LDX     #TPENTR
0045 I FF 0002 R                  STX     MSGRQT
0048 I C6 04                      LDA B   #MSGTRC
004A I BD 000A R                  JSR     MSGOUT      INFORM OPERATOR OF TAPE END
004D I FE 0000 R        TPR6      LDX     CURCSP
0050 I E6 0C                      LDA B   LCAST1,X
0052 I A6 0E                      LDA A   LCAST3,X
0054 I 85 02                      BIT A   #LS3NDR     NOISE DATA RECORDING
0056 I 26 12                      BNE     TPR7        YES, DO NOT TURN OFF CCD CLOCK START
0058 I C5 08                      BIT B   #LSTCBP     CAMERA BY-PASS SET ?
005A I 26 0E                      BNE     TPR7        YES, DO NOT TURN OFF CCD CLOCK START
005C I BD 000C R                  JSR     TMONOF      TURN OFF CCD CLOCK START
005F I B6 0003 R                  LDA A   MONSTS
0062 I 84 FD                      AND A   #-1-SCPSDT  SELECT RF SPECTRUM FOR SCOPE DISPLAY
0064 I B7 0003 R                  STA A   MONSTS
0067 I B7 0004 R                  STA A   DATMON
006A I A6 10            TPR7      LDA A   LCAMDE,X
006C I 81 03                      CMP A   #MODFIR     FIRE MODE
006E I 27 04                      BEQ     TPR8        YES
0070 I C5 10                      BIT B   #LSTTBP     TAPE BY-PASS SET
0072 I 26 06                      BNE     TPR9        YES, RETURN TO CALLER
0074 I BD 0007 R        TPR8      JSR     TCDSSP      SET STAND-BY POWER ON TAPE UNIT
0077 I BD 000B R                  JSR     UPDFLN      UPDATE FILE NUMBER
007A I 39               TPR9      RTS
```

```
                         97 *
                         98 *      REQUEST COMPLETION ROUTINE MESSAGES
                         99 *
007B I 544150           100 TPENTR    FCC    /TAPE END - MOUNT NEW REEL/
0094 I 0D               101           FCB    $D
0095 I 444550           102           FCC    /DEPRESS CONTINUE/
00A5 I 0D               103           FCB    $D,$D,$D,4
00A6 I 0D
00A7 I 0D
00A8 I 04
00A9                    104           END
PRCMP(A0011.02.037AA  CRS I/O REQUEST COMPLETION)     08/04/78  10:17:23  PAGE   3

 NO ERRORS
ISECT LENGTH --    169
DSECT LENGTH --      0

CURCSP    0000      10    10    45    60    69    77
DATMON    0004      13    13    88
LCAMDE    0010 A    33    46    89
LCAST1    000C A    23    49    61    63    70    78
LCAST3    000E A    28    79
LS3NDR    0002 A    29    80
LSTCBP    0008 A    25    82
LSTEOT    0004 A    26    62    71
LSTTBP    0010 A    24    50    92
MODFIR    0003 A    34    47    90
MONSTS    0003      13    13    85    87
MSGOUT    000A      17    17    76
MSGRQT    0002      12    12    74
MSGTRC    0004 A    38    75
SCPRFS    0000 A    40
SCPSDT    0002 A    41    86
TAPST2    0001      11    11    57
TCDBSR    0006      15    15    64
TCDEOF    0005      15    15    52
TCDSSP    0007      15    15    94
TIOCHK    0009      16    16    55    67
TMONOF    000C      19    19    84
TPENTR    007B I   100     8    73
TPERCK    0008      16    16    53    65
TPR1      000F I    52    48    56
TPR3      001C I    57    54
TPR4      002C I    64    59    68
TPR5      0039 I    69    66
TPR6      004D I    77    51    72
TPR7      006A I    89    81    83
TPR8      0074 I    94    91
TPR9      007A I    96    93
TPRCMP    0000 I    44     7
TW2EOT    0004 A    36    58
UPDFLN    000B      18    18    95
TPERCK(A0011.02.038AA  CRS TAPE REQUEST CHECK)        08/04/78  10:18:25  PAGE   1

                          2 *
                          3 *      ROUTINE TO SETUP TAPE ERROR MESSAGE
                          4 *
0000 I                    5           ISEC
                          6 *
                          7           DEF    TPERCK,TIOCHK
                          8           DEF    TPMCNT
                          9           DEF    TPEFUP,TPEBDB
                         10           DEF    TAPERM
                         11 *
                         12           REF    TAPST1,TAPST2,MSGRQT,CHRCNT,DEPSAR
                         13           REF    TAPDS1
                         14           REF    NUMMSG
                         15 *
                         16           REF    MSGOUT
                         17           REF    LOGFRM
                         18 *
                         19 *      TAPE STATUS WORD 1 EQUATES
                         20 *
```

```
0020 A              21 TW1DER    EQU    $20          DEVICE ERROR
0010 A              22 TW1STO    EQU    $10          SOFTWARE TIMEOUT
0004 A              23 TW1WRT    EQU    4            WRITE REQUEST
                    24 *
                    25 *     TAPE STATUS WORD 2 EQUATES
                    26 *
0040 A              27 TW2BSY    EQU    $40          DEVICE BUSY
0020 A              28 TW2DUV    EQU    $20          DEVICE UNAVAILABLE
                    29 *
                    30 *     STATUS REGISTER EQUATES
                    31 *
0010 A              32 SFPRM     EQU    $10          FILE PROTECT RING MISSING
                    33 *
                    34 *     MESSAGE TYPE EQUATES
                    35 *
0040 A              36 MSGTIP    EQU    $40          INPUT AND DISPLAY NEW VALUE
0004 A              37 MSGTRC    EQU    4            RETRY OR CONTINUE REQUEST
                    38 *
                    39 *     CALLING SEQUENCE:  JSR  TPERCK
                    40 *
                    41 *     RETURN SEQUENCE:
                    42 *
                    43 *     CC => MINUS IF TAPE ERROR
                    44 *
0000 I              45 TPERCK    EQU    *
0000 I B6 0000 R    46           LDA A  TAPST1       PICK UP TAPE STATUS WORD 1
0003 I 85 20        47           BIT A  #TW1DER      DEVICE ERROR FLAG SET
0005 I 27 3A        48           BEQ    TPE1         NO, GOOD REQUEST
                    49 ***
0007 I CE 4535 A    50           LDX    #$4535
000A I BD 0008 R    51           JSR    LOGFRM
                    52 ***
000D I B6 0000 R    53           LDA A  TAPST1
0010 I CE 004E I    54           LDX    #TPESTO
0013 I 85 10        55           BIT A  #TW1STO      SOFTWARE TIMEOUT
0015 I 26 25        56           BNE    TPE2         YES
0017 I F6 0001 R    57           LDA B  TAPST2       PICK UP TAPE STATUS WORD 2
001A I CE 0060 I    58           LDX    #TPEBSY
001D I C5 40        59           BIT B  #TW2BSY      TAPE UNIT BUSY
TPERCK(A0011.02.038AA  CRS TAPE REQUEST CHECK)         08/04/78  10:18:26  PAGE   2

001F I 26 1B        60           BNE    TPE2         YES
0021 I CE 0072 I    61           LDX    #TPEOFL
0024 I C5 20        62           BIT B  #TW2DUV      DEIVICE UNAVAILABLE
0026 I 26 14        63           BNE    TPE2         YES
0028 I B6 0000 R    64           LDA A  TAPST1
002B I 85 04        65           BIT A  #TW1WRT      WRITE REQUEST ?
002D I 27 0A        66           BEQ    TPE3         NO-DON'T CHECK WRITE PROTECT
002F I CE 009B I    67           LDX    #TPEFWP
0032 I B6 0005 R    68           LDA A  TAPDS1
0035 I 85 10        69           BIT A  #SFPRM
0037 I 26 03        70           BNE    TPE2
0039 I CE 0088 I    71 TPE3      LDX    #TPEBDB
003C I FF 0000 D    72 TPE2      STX    TAPERM       SET UP ERROR MESSAGE PNTR
003F I 86 FF        73           LDA A  #$FF         SET CC FOR BAD COMPLETION
0041 I 39           74 TPE1      RTS
                    75 *
                    76 *     TAPE I/O ERROR ROUTINE
                    77 *
                    78 *     CALLING SEQUENCE:  JSR  TIOCHK
                    79 *
                    80 *     TAPERM => PNTR TO TAPE ERROR MESSAGE
                    81 *
                    82 *     RETURN SEQUENCE:
                    83 *
                    84 *     CC = <> => CONTINUE
                    85 *     CC = 0 => RETRY
                    86 *
0042 I              87 TIOCHK    EQU    *
0042 I FE 0000 D    88           LDX    TAPERM       OUTPUT TAPE
0045 I FF 0002 R    89           STX    MSGRQT       ERROR MESSAGE
0048 I C6 04        90           LDA B  #MSGTRC      ASK FOR OPERATOR
004A I BD 0007 R    91           JSR    MSGOUT       INTERVENTION
```

```
004D I 39              92 TIO1      RTS          RETURN TO CALLER
004E I 444556          93 TPESTO    FCC    /DEVICE TIMEOUT/
005C I 0D              94           FCB    $D,$E
005D I 0E
005E I 00B0     I      95           FDB    TPMCNT
0060 I 544150          96 TPEBSY    FCC    /TAPE UNIT BUSY/
006E I 0D              97           FCB    $D,$E
006F I 0E
0070 I 00B0     I      98           FDB    TPMCNT
0072 I 544150          99 TPEOFL    FCC    /TAPE UNIT OFF LINE/
0084 I 0D             100           FCB    $D,$E
0085 I 0E
0086 I 00B0     I     101           FDB    TPMCNT
0088 I 424144         102 TPEBDB    FCC    /BAD TAPE RECORD/
0097 I 0D             103           FCB    $D,$E
0098 I 0E
0099 I 00B0     I     104           FDB    TPMCNT
009B I 524545         105 TPEFWP    FCC    /REEL WRITE PROTECTED/
00AF I 0D             106           FCB    $D
00B0 I 524554         107 TPMCNT    FCC    /RETRY OR CONTINUE/
00C1 I 0D             108           FCB    $D,$D,$D,4
00C2 I 0D
00C3 I 0D
00C4 I 04
0000 D                109           DSEC
                      110 *
TPERCK(A0011.02.038AA  CRS TAPE REQUEST CHECK)         08/04/78  10:18:27  PAGE   3

                      111 *       STORAGE REQURIEMENTS FOR 'TPERCK'
                      112 *
0000 D 0000     A     113 TAPERM    FDB    0            PNTR TO TAPE ERROR MESSAGE
0002                  114           END
TPERCK(A0011.02.038AA  CRS TAPE REQUEST CHECK)         08/04/78  10:18:27  PAGE   4

  NO ERRORS
 ISECT LENGTH --   197
 DSECT LENGTH --     2

> CHRCNT    0003      12     12
> DEPSAR    0004      12     12
> LOGFRM    0008      17     17     51
> MSGOUT    0007      16     16     91
> MSGRQT    0002      12     12     89
  MSGTIP    0040 A    36
  MSGTRC    0004 A    37     90
> NUMMSG    0006      14     14
  SFPRM     0010 A    32     69
> TAPDS1    0005      13     13     68
< TAPERM    0000 D   113     10     72     88
> TAPST1    0000      12     12     46     53     64
> TAPST2    0001      12     12     57
  TIO1      004D I    92
< TIOCHK    0042 I    87      7
  TPE1      0041 I    74     48
  TPE2      003C I    72     56     60     63     70
  TPE3      0039 I    71     66
< TPEBDB    0088 I   102      9     71
  TPEBSY    0060 I    96     58
< TPEFWP    009B I   105      9     67
  TPEOFL    0072 I    99     61
< TPERCK    0000 I    45      7
  TPESTO    004E I    93     54
< TPMCNT    00B0 I   107      8     95     98    101    104
  TW1DER    0020 A    21     47
  TW1STO    0010 A    22     55
  TW1WRT    0004 A    23     65
  TW2BSY    0040 A    27     59
  TW2DUV    0020 A    28     62
DMNINI(A0011.02.039AA  CRS DATA MONITOR INITIALIZE)    08/04/78  10:19:25  PAGE   1

                        2 *
                        3 *       ROUTINE TO INITIALIZE DATA MONITOR FOR OUTPUT
                        4 *
```

```
0000 I              5          ISEC
                    6 *
                    7          DEF    DMNINI
                    8          DEF    DLYRTN
                    9 *
                   10          REF    CURCSP
                   11 *
                   12          REF    TMONOF,TMONON
                   13 *
                   14 *     LINE STATUS FLAGS
                   15 *
000F A             16 LCAST4   EQU    15          STATUS FLAGS (BYTE 4)
0040 A             17 LS4DMH   EQU    $40         SEND MONITOR HEADER
                   18 *
0000 I             19 DMNINI   EQU    *
0000 I BD 0001 R   20          JSR    TMONOF      RESET DATA MONITOR
0003 I CE 0001 A   21          LDX    #1
0006 I 8D 0D       22          BSR    DLYRTN      DELAY FOR 1 MILLI-SECOND
0008 I BD 0002 R   23          JSR    TMONON      TURN POWER ON MONITOR
000B I FE 0000 R   24          LDX    CURCSP
000E I A6 0F       25          LDA A  LCAST4,X    SET FLAG TO
0010 I 8A 40       26          ORA A  #LS4DMH     SEND MONITOR
0012 I A7 0F       27          STA A  LCAST4,X    HDR TO SATELLITE
0014 I 39          28          RTS
                   29 *
                   30 *     ROUTINE TO DELAY SPECIFIED TIME IN MILLI-SECONDS
                   31 *
                   32 *          CALLING SEQUENCE:  JSR DLYRTN
                   33 *
                   34 *          REGISTER CONTENTS:  IDX => TIME IN MILLI-SECONDS
                   35 *
0015 I             36 DLYRTN   EQU    *
0015 I 86 A5       37 DLY2     LDA A  #165
0017 I 4A          38 DLY1     DEC A
0018 I 26 FD       39          BNE    DLY1
001A I 09          40          DEX
001B I 26 F8       41          BNE    DLY2
001D I 39          42          RTS
                   43 *
001E               44          END
DMNINI(A0011.02.039AA  CRS DATA MONITOR INITIALIZE)    08/04/78  10:19:26  PAGE   2

   NO ERRORS
 ISECT LENGTH --    30
 DSECT LENGTH --     0

> CURCSP    0000      10     10    24
  DLY1      0017 I    38     39
  DLY2      0015 I    37     41
< DLYRTN    0015 I    36      8    22
< DMNINI    0000 I    19      7
  LCAST4    000F A    16     25    27
  LS4DMH    0040 A    17     26
> TMONOF    0001      12     12    20
> TMONON    0002      12     12    23
TMONOF(A0011.02.040AA  CRS DATA MONITOR CONTROL)      08/04/78  10:20:21  PAGE   1

                    2 *
                    3 *     CENTRAL RECORDING STATION DATA MONITOR CONTROL ROUTINE
                    4 *
0000 I              5          ISEC
                    6 *
                    7          DEF    TMONOF,TMONON
                    8 *
                    9          REF    DATMON,MONSTS
                   10 *
                   11 *     MONITOR CONTROL EQUATES
                   12 *
0001 A             13 MONPWR   EQU    1           MONITOR ON
0000 A             14 MONOFF   EQU    0           MONITOR OFF
0004 A             15 STLRST   EQU    4           SATELLITE RESET
                   16 *
0000 I             17 TMONOF   EQU    *
```

```
0000 I B6 0001 R     18            LDA A  MONSTS
0003 I 84 FE         19            AND A  $-1-MONPWR   RESET MONITOR INDICATOR IN MONITOR STA[illegible]
0005 I B7 0001 R     20            STA A  MONSTS
0008 I 86 04         21            LDA A  $MONOFF+STLRSTTURN OFF DATA MONITOR
000A I 20 02         22            BRA    TMON1
000C I               23 TMONON     EQU    *
000C I 86 01         24            LDA A  $MONPWR      TURN ON DATA MONITOR
000E I BA 0001 R     25 TMON1      ORA A  MONSTS       INCLUDE WITH SCOPE STATUS
0011 I B7 0000 R     26            STA A  DATMON       OUTPUT COMMAND TO MONITOR
0014 I 84 FB         27            AND A  $-1-STLRST
0016 I B7 0001 R     28            STA A  MONSTS       SET MONITOR STATUS WORD
0019 I 39            29            RTS                 RETURN TO CALLER
001A                 30            END
TMONOF(A0011.02.040AA  CRS DATA MONITOR CONTROL)        08/04/78  10:20:21  PAGE   2

  NO ERRORS
 ISECT LENGTH --     26
 DSECT LENGTH --      0

> DATMON     0000         9      9     26
  MONOFF     0000 A      14     21
  MONPWR     0001 A      13     19     24
> MONSTS     0001         9      9     18     20     25     28
  STLRST     0004 A      15     21     27
  TMON1      000E I      25     22
< TMONOF     0000 I      17      7
< TMONON     000C I      23      7
KEYENT(A0011.02.041AA  CRS KEY ENTRY ROUTINE)          08/04/78  10:21:17  PAGE   1

 0000 I                  2            ISEC
                         3 *
                         4            DEF    KEYENT,KEYSET,KYS2
                         5            DEF    NDMXM1,NDMXM2,NDMXM3,NDMXM4,NDMXM0
                         6            DEF    DSPSGL,DSPSGC,CHRQST,CHRCNT
                         7            DEF    MAXDG,NUMMSG,NUML,NUMC,NUMD
                         8            REF    DECNUM,NUMCHR,CURCSP
                         9            REF    DEPFLG
                        10            REF    CNVPTR
                        11 *
                        12            REF    DISPLY,DECBIN
                        13 *
 000A A                 14 KSWBSP     EQU    $A           BACKSPACE KEY
 000B A                 15 KSWENT     EQU    $B           ENTRY KEY
 000C A                 16 KSWCNT     EQU    $C
 000D A                 17 KSWRTY     EQU    $D           RETRY KEY
 0016 A                 18 KSWDST     EQU    $16          DEAD STATION
                        19 *
 0040 A                 20 DEPSKP     EQU    $40          DEAD STATION INDICATOR
                        21 *
                        22 *
                        23 *
                        24 *
                        25 *       LINE STATUS FLAGS
                        26 *
 000C A                 27 LCAST1     EQU    12           LINE STATUS STATUS FLAGS (BYTE 1)
 0020 A                 28 LSTMSF     EQU    $20          MOMINTARY SWITCH FLAG
                        29 *
 000D A                 30 LCAST2     EQU    13           STATUS FLAGS (BYTE 2)
 0080 A                 31 LS2DKR     EQU    $80          DECIMAL KEY REQUEST PENDING
 0040 A                 32 LS2RCP     EQU    $40          DECIMAL KEY REQUEST COMPLETE
 0020 A                 33 LS2BFD     EQU    $20          BLANK FIELD
 0010 A                 34 LS2RCR     EQU    $10          RETRY OR CONTINUE REQUEST
                        35 *
 000F A                 36 LCAST4     EQU    15           STATUS FLAGS (BYTE 4)
 0020 A                 37 LS4RCE     EQU    $20          RETRY OR CONTINUE INDICATOR (0 => RETRY)
                        38 *
                        39 *
                        40 *       CENTRAL RECORDING STATION KEY ENTRY SETUP ROUTINE
                        41 *
 0000 I                 42 KEYSET     EQU    *
 0000 I FF 0004 R       43            STX    CNVPTR       SET PNTR TO CONVERTED VALUE
 0003 I FE 0002 R       44            LDX    CURCSP
 0006 I A6 0D           45            LDA A  LCAST2,X
 0008 I 85 10           46            BIT A  $LS2RCR      RETRY OR CONTINUE REQUEST
```

```
000A I 26 0F        47          BNE    KYS7          YES
000C I F7 0002 D    48 KYSA     STA B  CHRQST
000F I FE 0000 D    49          LDX    DSPSGL        SET LINE AND CHAR
0012 I FF 0005 D    50          STX    NUML          CO-ORDINATES
0015 I 5F           51          CLR B                CLEAR INTERNAL
0016 I 8D 21        52          BSR    KYS2          STORAGE AREA
0018 I FE 0002 R    53          LDX    CURCSP        PICK UP PNTR TO CONTROL STORAGE AREA
001B I A6 0D        54 KYS7     LDA A  LCAST2,X      SET DECIMAL KEY
001D I 8A 80        55          ORA A  #LS2DKR       REQUEST PENDING
001F I 84 BF        56          AND A  #-1-LS2RCP    RESET REQUEST COMPLETE
0021 I A7 0D        57          STA A  LCAST2,X      SAVE NEW STATUS
0023 I 7F 0003 D    58          CLR    CHRCNT        CLEAR CHAR CNT
0026 I 01           59 KYS1     NOP
KEYENT(A0011.02.041AA  CRS KEY ENTRY ROUTINE)         08/04/78  10:21:18  PAGE   2

0027 I 0E           60          CLI                  CLEAR INTERRUPT MASK
0028 I 3E           61          WAI                  WAIT FOR KEY ENTRY
0029 I 01           62          NOP
002A I 0F           63          SEI                  SET INTERRUPT MASK
002B I 86 40        64          LDA A  #LS2RCP       REQUEST
002D I A5 0D        65          BIT A  LCAST2,X      COMPLETE
002F I 27 F5        66          BEQ    KYS1          NO
0031 I A6 0D        67          LDA A  LCAST2,X
0033 I 84 EF        68          AND A  #-1-LS2RCR    RETRY OR CONTINUE REQUEST
0035 I A7 0D        69          STA A  LCAST2,X
0037 I 0E           70          CLI                  CLEAR INTERRUPT MASK
0038 I 39           71          RTS                  RETURN TO CALLER
                    72 *
                    73 *     SUBROUTINE TO SETUP INTERNAL STORAGE AREA
                    74 *
                    75 *     ACCB CONTAINS CHARACTER TO STORE
                    76 *
0039 I              77 KYS2     EQU    *
0039 I CE 0007 D    78          LDX    #NUMD         SET PNTR TO START OF AREA
003C I 86 06        79          LDA A  #MAXDG        COMPUTE #
003E I B0 0002 D    80          SUB A  CHRQST        DIGITS TO SET NULL
0041 I 4A           81 KYS6     DEC A
0042 I 2B 05        82          BMI    KYS5          JUMP IF DONE
0044 I 6F 00        83          CLR    0,X           SET TO NULL
0046 I 08           84          INX
0047 I 20 F8        85          BRA    KYS6          CONTINUE
0049 I B6 0002 D    86 KYS5     LDA A  CHRQST        PICK UP # CHARS REQUESTED
004C I 4A           87 KYS4     DEC A                SETUP COMPLETE
004D I 2B 05        88          BMI    KYS3          YES
004F I E7 00        89          STA B  0,X           SAVE VALUE
0051 I 08           90          INX                  INCR STORAGE PNTR
0052 I 20 F8        91          BRA    KYS4          CONTINUE
0054 I 39           92 KYS3     RTS                  RETURN TO CALLER
                    93 *
                    94 *     CENTRAL RECORDING STATION KEY ENTRY ROUTINE
                    95 *
                    96 *     CALLING SEQUENCE:
                    97 *     ACCB   => # CHARS REQUESTED
                    98 *     DSPSGL => LINE #
                    99 *     DSPSGC => CHARACTER #
                   100 *     CHRCNT => CHARACTER COUNT SAVE AREA
                   101 *
0055 I             102 KEYENT   EQU    *
0055 I FE 0002 R   103          LDX    CURCSP
0058 I E6 0D       104          LDA B  LCAST2,X
005A I C5 10       105          BIT B  #LS2RCR       RETRY OR CONTINUE REQUEST ?
005C I 27 06       106          BEQ    KEYP          NO, CHECK FOR DEAD STATION
005E I 80 0C       107          SUB A  #KSWCNT       CONTINUE
0060 I 27 74       108          BEQ    KEYN          YES, PROCESS CONTINUE KEY
0062 I 20 63       109          BRA    KEYM          TREAT ANY OTHER KEY AS RETRY
0064 I 81 16       110 KEYP     CMP A  #KSWDST       DEAD STATION KEY
0066 I 26 0A       111          BNE    KEYQ          NO
0068 I B6 0003 R   112          LDA A  DEPFLG
006B I 8A 40       113          ORA A  #DEPSKP       SET DEAD STATION FLAG IN DEPLOYMENT FLAGS
006D I B7 0003 R   114          STA A  DEPFLG
0070 I 20 3E       115          BRA    KEY7
0072 I F6 0003 D   116 KEYQ     LDA B  CHRCNT        SAVE CHARACTER COUNT
0075 I 80 0A       117          SUB A  #KSWBSP       ENTER KEY ?
```

```
KEYENT(A0011.02.041AA  CRS KEY ENTRY ROUTINE)          08/04/78  10:21:19  PAGE   3

0077 I 2E 0A                     BGT    KEY1          YES
0079 I 26 61                     BNE    KEY3          JUMP IF NOT BACKSPACE
007B I 5A                        DEC B                DECR CHARACTER COUNT
007C I 2A 33                     BPL    KEY2          CONTINUE IF COUNT NOT MINUS
007E I 7F 0003 D                 CLR    CHRCNT        CLEAR CHARACTER COUNT
0081 I 20 42                     BRA    KEYR          EXIT
                      *             'ENTER' PROCESS NUMBER
0083 I 80 02          KEY1       SUB A  #KSWRTY-KSWENTENTRY KEY ?
0085 I 2D 01                     BLT    KEYV          YES
0087 I 3B                        RTI                  IGNORE OTHER ENTRIES
0088 I 7D 0003 D      KEYV       TST    CHRCNT
008B I 27 12                     BEQ    KEYJ
008D I CE 000C D                 LDX    #NUMD+MAXDG-1
0090 I F7 0001 R                 STA B  NUMCHR        SET # DIGITS TO CONVERT
0093 I 5A             KEYH       DEC B                SET PNTR TO
0094 I 2B 03                     BMI    KEY6          MOST SIGNIFICANT DIGIT
0096 I 09                        DEX                  OF NUMBER
0097 I 20 FA                     BRA    KEYH          - 1
0099 I FF 0000 R      KEY6       STX    DECNUM
009C I BD 0006 R                 JSR    DECBIN        CONVERT # FROM BCD TO BINARY
009F I FE 0002 R      KEYJ       LDX    CURCSP        SET PNTR TO CONTROL STORAGE AREA
00A2 I A6 0D                     LDA A  LCAST2,X      LOAD CURRENT LINE STATUS
00A4 I 84 4F                     AND A  #-1-LS2DKR-LS2BFD-LS2RCR
00A6 I 8A 40                     ORA A  #LS2RCP       SET REQUEST COMPLETE
00A8 I A7 0D                     STA A  LCAST2,X      SAVE STATUS
00AA I CE 0004 D      KEY5       LDX    #NUMMSG
00AD I BD 0005 R                 JSR    DISPLY
00B0 I 3B             KEY7       RTI                  RETURN FROM INTERRUPT
                      *          'BACKSPACE' ROUTINE
00B1 I 7A 0003 D      KEY2       DEC    CHRCNT        SAVE NEW DIGIT COUNT
00B4 I CE 000B D                 LDX    #NUMD+MAXDG-2SET PNTR TO NEXT TO LAST CHARACTER
00B7 I 5A             KEY9       DEC B                ALL CHARACTERS SHIFTED
00B8 I 2B 07                     BMI    KEY8          YES
00BA I A6 00                     LDA A  0,X           MOVE DIGIT
00BC I A7 01                     STA A  1,X           RIGHT 1 PLACE
00BE I 09                        DEX                  GET NEXT DIGIT
00BF I 20 F6                     BRA    KEY9          CONTINUE SHIFTING
00C1 I C6 20          KEY8       LDA B  #$20          CLEAR OLD
00C3 I E7 01                     STA B  1,X           1ST DIGIT
00C5 I 20 E3          KEYR       BRA    KEY5          WAIT FOR NEXT CHARACTER
                      *
                      *          'RETRY' ROUTINE
                      *
00C7 I A6 0F          KEYM       LDA A  LCAST4,X
00C9 I 84 DF                     AND A  #-1-LS4RCE    SET RETRY INDICATOR
00CB I A7 0F          KEYO       STA A  LCAST4,X      RESET %ETRY-CONTINUE INDICATOR
00CD I A6 0D                     LDA A  LCAST2,X
00CF I 84 4F                     AND A  #-1-LS2DKR-LS2BFD-LS2RCR
00D1 I 8A 40                     ORA A  #LS2RCP       SET REQUEST COMPLETE
00D3 I A7 0D                     STA A  LCAST2,X
00D5 I 3B                        RTI
                      *
                      *          CONTINUE ROUTINE
                      *
00D6 I A6 0F          KEYN       LDA A  LCAST4,X
00D8 I 8A 20                     ORA A  #LS4RCE       SET CONTINUE INDICATOR
00DA I 20 EF                     BRA    KEYO          COMPLETE REQUEST
                      *
KEYENT(A0011.02.041AA  CRS KEY ENTRY ROUTINE)          08/04/78  10:21:21  PAGE   4

                      *          NORMAL DIGIT KEY
                      *
00DC I 8B 0A          KEY3       ADD A  #KSWBSP       SAVE DIGIT
00DE I 36                        PSH A                ENTERED
00DF I F1 0002 D                 CMP B  CHRQST        MAXIMUM #
00E2 I 2D 04                     BLT    KEYA          DIGITS EXCEEDED
00E4 I 5A                        DEC B                EXCEPT ONLY
00E5 I F7 0003 D                 STA B  CHRCNT        # CHARACTERS REQUESTED
00E8 I FE 0002 R      KEYA       LDX    CURCSP        LOAD PNTR TO CURRENT CONTROL STORAGE A
00EB I E6 0D                     LDA B  LCAST2,X      BLANK FIELD FLAG SET
00ED I C5 20                     BIT B  #LS2BFD
```

```
00EF I 27 13        187           BEQ    KEYB           NO
00F1 I C4 DF        188           AND B  #-1-LS2BFD     RESET BLANK
00F3 I E7 0D        189           STA B  LCAST2,X       FLAG
00F5 I C6 20        190           LDA B  #$20           BLANK INTERNAL
00F7 I BD 0039 I    191           JSR    KYS2           STORAGE AREA
00FA I CE 012C I    192           LDX    #BLKMSG        BLANK REQUEST
00FD I BD 0005 R    193           JSR    DISPLY         FIELD
0100 I 5F           194           CLR B
0101 I BD 0039 I    195           JSR    KYS2           CLEAR INTERNAL STORAGE AREA
0104 I CE 000C D    196 KEYB      LDX    #NUMD+MAXDG-1SET PNTR TO LAST DIGIT ENTERED
0107 I F6 0003 D    197           LDA B  CHRCNT         SET CHARACTER COUNT
010A I 27 12        198           BEQ    KEYL           JUMP IF 1ST DIGIT
010C I 5A           199 KEYC      DEC B                 COMPUTE
010D I 2F 03        200           BLE    KEYD           PNTR TO
010F I 09           201           DEX                   1ST DIGIT
0110 I 20 FA        202           BRA    KEYC           ENTERED
0112 I F6 0003 D    203 KEYD      LDA B  CHRCNT         RESTORE CHARACTER COUNT
0115 I 5A           204 KEYF      DEC B                 ALL DIGITS MOVED
0116 I 2B 09        205           BMI    KEYE           YES
0118 I A6 00        206           LDA A  0,X            LOAD DIGIT
011A I 09           207           DEX
011B I A7 00        208           STA A  0,X            MOVE 1 PLACE
011D I 08           209           INX
011E I 08           210 KEYL      INX                   TO LEFT
011F I 20 F4        211           BRA    KEYF           CONTINUE SHIFTING
0121 I 32           212 KEYE      PUL A                 LOAD DIGIT ENTERED
0122 I 8A 30        213           ORA A  #$30           CONVERT TO ASCII
0124 I 09           214           DEX
0125 I A7 00        215           STA A  0,X            SET IN NEW DIGIT
0127 I 7C 0003 D    216           INC    CHRCNT         INCR DIGIT COUNT
012A I 20 99        217           BRA    KEYR           RETURN
                    218 *
012C I 0E           219 BLKMSG    FCB    $E             BLANK # ENTRY
012D I 0004    D    220           FDB    NUMMSG         FIELD
012F I 04           221           FCB    4
0000 D              222           DSEC
                    223 *      KEYENT ROUTINE
0000 D 00           224 DSPSGL    FCB    0              LINE #
0001 D 00           225 DSPSGC    FCB    0              CHARACTER #
0002 D 06           226 CHRQST    FCB    MAXDG          # CHARS REQUESTED
0003 D 00           227 CHRCNT    FCB    0              CHARACTER COUNT SAVE AREA
0006 A              228 MAXDG     EQU    6              MAX # DIGITS FOR DISPLAY OR ENTRY
0004 D 10           229 NUMMSG    FCB    $10
0005 D 00           230 NUML      FCB    0              LINE #
0006 D 00           231 NUMC      FCB    0              CHARACTER #
0007 D 00           232 NUMD      FCB    0,0,0,0,0,0    ASCII DIGIT FIELD
0008 D 00
KEYENT(A0011.02.041AA  CRS KEY ENTRY ROUTINE)          08/04/78  10:21:22  PAGE   5

0009 D 00
000A D 00
000B D 00
000C D 00
000D D 0F           233           FCB    $F             RETURN
                    234 *
000D D              235 NDMXM0    EQU    NUMD+MAXDG
000C D              236 NDMXM1    EQU    NUMD+MAXDG-1
000B D              237 NDMXM2    EQU    NUMD+MAXDG-2
000A D              238 NDMXM3    EQU    NUMD+MAXDG-3
0009 D              239 NDMXM4    EQU    NUMD+MAXDG-4
                    240 *
000E                241           END
KEYENT(A0011.02.041AA  CRS KEY ENTRY ROUTINE)          08/04/78  10:21:22  PAGE   6

  NO ERRORS
 ISECT LENGTH --   304
 DSECT LENGTH --   14

 BLKMSG    012C I   219    192
< CHRCNT   0003 D   227      6    58   116   122   128   147   183   197   203   216
< CHRQST   0002 D   226      6    48    80    86   180
> CNVPTR   0004      10     10    43
> CURCSP   0002       8      8    44    53   103   138   184
> DECBIN   0006      12     12   137
```

```
DECNUM    0000       8     8   136
DEPFLG    0003       9     9   112   114
DEPSKP    0040 A    20   113
DISPLY    0005      12    12   144   193
DSPSGC    0001 D   225     6
DSPSGL    0000 D   224     6    49
KEY1      0083 I   125   118
KEY2      00B1 I   147   121
KEY3      00DC I   178   119
KEY5      00AA I   143   157
KEY6      0099 I   136   133
KEY7      00B0 I   145   115
KEY8      00C1 I   155   150
KEY9      00B7 I   149   154
KEYA      00E8 I   184   181
KEYB      0104 I   196   187
KEYC      010C I   199   202
KEYD      0112 I   203   200
KEYE      0121 I   212   205
KEYENT    0055 I   102     4
KEYF      0115 I   204   211
KEYH      0093 I   132   135
KEYJ      009F I   138   129
KEYL      011E I   210   198
KEYM      00C7 I   161   109
KEYN      00D6 I   172   108
KEYO      00CB I   163   174
KEYP      0064 I   110   106
KEYQ      0072 I   116   111
KEYR      00C5 I   157   123   217
KEYSET    0000 I    42     4
KEYV      0088 I   128   126
KSWBSP    000A A    14   117   178
KSWCNT    000C A    16   107
KSWDST    0016 A    18   110
KSWENT    000B A    15   125
KSWRTY    000D A    17   125
KYS1      0026 I    59    66
KYS2      0039 I    77     4    52   191   195
KYS3      0054 I    92    88
KYS4      004C I    87    91
KYS5      0049 I    86    82
KYS6      0041 I    81    85
KYS7      001B I    54    47
KYSA      000C I    48
LCAST1    000C A    27
LCAST2    000D A    30    45    54    57    65    67    69   104   139   142   164   167   185
KEYENT(A0011.02.041AA  CRS KEY ENTRY ROUTINE)          08/04/78  10:21:23  PAGE   7

                        189
LCAST4    000F A    36   161   163   172
LS2BFD    0020 A    33   140   165   186   188
LS2DKR    0080 A    31    55   140   165
LS2RCP    0040 A    32    56    64   141   166
LS2RCR    0010 A    34    46    68   105   140   165
LS4RCE    0020 A    37   162   173
LSTMSF    0020 A    28
MAXDG     0006 A   228     7    79   130   148   196   226   235   236   237   238   239
NDMXM0    000D D   235     5
NDMXM1    000C D   236     5
NDMXM2    000B D   237     5
NDMXM3    000A D   238     5
NDMXM4    0009 D   239     5
NUMC      0006 D   231     7
NUMCHR    0001       8     8   131
NUMD      0007 D   232     7    78   130   148   196   235   236   237   238   239
NUML      0005 D   230     7    50
NUMMSG    0004 D   229     7   143   220
MSGOUT(A0011.02.042AA  CRS MESSAGE CONTROL ROUTINE)     08/04/78  10:22:35  PAGE   1

                  2 *
                  3 *      ROUTINE TO DISPLAY OPERATOR REQUEST AND INPUT NEW *
                  4 *
```

```
0000 I                      ISEC
                     *
                            DEF    MSGOUT
                            DEF    MSGRQT,MSGCNV
                     *
                            REF    PIAKCR,CHRQST,NUML
                            REF    DSPSGL,CHRCNT
                            REF    CURCSP,HEXVAL,HEXVL1
                     *
                            REF    KYS2,BINDEC,DISPLY,KEYSET
                            REF    INX4
                     *
                     *      MESSAGE REQUEST TYPE EQUATES
                     *
0080 A               MSGTCV   EQU    $80         CONVERT AND DISPLAY OLD VALUE
0040 A               MSGTIP   EQU    $40         INPUT AND DISPLAY NEW VALUE
0020 A               MSGTBF   EQU    $20         SET BLANK FLAG
0010 A               MSGTPS   EQU    $10         CONVERSION PNTR ALREADY SET
0008 A               MSGTSV   EQU    8           CONVERTED VALUE STORED READY FOR DISPLA
0004 A               MSGTRC   EQU    4           RETRY OR CONTINUE REQUEST
                     *
                     *      CALLING SEQUENCE:
                     *
                     *      MSGRQT => POINTER TO PARAMETER BLOCK
                     *      MSGCNV => POINTER TO CONVERSION SAVE AREA
                     *      ACCB   => REQUEST TYPE
                     *
                     *
                     *
                     *    .     REQUEST PARAMETER BLOCK FORMAT
                     *
                     *    .     BYTE NO 1 => MAXIMUM # DIGITS FOR PARAMETER
                     *    .             2 => LINE FOR PARAMETER DISPLAY
                     *    .             3 => CHARACTER # FOR PARAMETER DISPLAY
                     *    .        4-5 => CONVERSION PNTR ADDRESS
                     *    .        6-  => MESSAGE BLOCK
                     *
003F A               INTENB   EQU    $3F         ENABLE KEYBOARD INTERRUPTS
                     *
0006 A               MAXDG    EQU    6           MAX # DIGITS FOR DISPLAY OR ENTRY
                     *
000C A               LCAST1   EQU    12          STATUS FLAGS (BYTE 1)
                     *
000D A               LCAST2   EQU    13          STATUS FLAGS (BYTE 2)
0020 A               LS2BFD   EQU    $20         BLANK FIELD DECIMAL REQUEST
0010 A               LS2RCR   EQU    $10         RETRY OR CONTINUE REQUEST
                     *
000F A               LCAST4   EQU    15          STATUS FLAGS (BYTE 4)
0020 A               LS4RCE   EQU    $20         RETRY OR CONTINUE INDICATOR (0 => RETRY)
                     *
                     *
                     *      RETURN SEQUENCE RETRY OR CONTINUE REQUEST
                     *
                     *      CC = 0 => RETRY
                     *      CC = <> => CONTINUE
MSGOUT(A0011.02.042AA  CRS MESSAGE CONTROL ROUTINE)     08/04/78  10:22:36  PAGE   2

                     *
0000 I               MSGOUT   EQU    *
0000 I F7 0004 D              STA B  MSGTYP      SAVE RQUEST TYPE
0003 I B6 0000 R              LDA A  PIAKCR
0006 I 36                     PSH A
0007 I 86 3F                  LDA A  #INTENB
0009 I B7 0000 R              STA A  PIAKCR      ENABLE KEYBOARD INTERRUPTS
000C I FE 0000 D              LDX    MSGRQT      SET CONVERSION PNTR
000F I C5 04                  BIT B  #MSGTRC     RETRY OR CONTINUE REQUEST
0011 I 27 0E                  BEQ    MSG4A       NO,PROCESS NORMAL REQUUST
0013 I BD 000A R              JSR    DISPLY      DISPLAY MESSAGE
0016 I FE 0005 R              LDX    CURCSP      PICK UP LINE CONTROL STORAGE AREA PNTR
0019 I 86 10                  LDA A  #LS2RCR     SET RETRY OR CONTINUE
001B I AA 0D                  ORA A  LCAST2,X    REQUEST INDICATOR
001D I A7 0D                  STA A  LCAST2,X
001F I 20 5B                  BRA    MSG3A       WAIT FOR OPERATOR ENTRY
0021 I C5 10         MSG4A    BIT B  #MSGTPS     CONVERSION PNTR ALREADY SET
```

```
0023 I 26 05          77            BNE    MSG4          YES
0025 I EE 03          78            LDX    3,X
0027 I FF 0002 D      79            STX    MSGCNV
002A I C5 08          80 MSG4       BIT B  #MSGTSV       VALUE SET UP FOR DISPLAY
002C I 26 1A          81            BNE    MSG1
002E I 86 06          82            LDA A  #MAXDG
0030 I B7 0001 R      83            STA A  CHRQST
0033 I C6 20          84            LDA B  #$20
0035 I BD 0008 R      85            JSR    KYS2          BLANK NUMBER FIELD
0038 I 7D 0004 D      86            TST    MSGTYP
003B I 2A 0B          87            BPL    MSG1
003D I FE 0000 D      88            LDX    MSGRQT        PICK UP PNTR TO PARAMETER BLOCK
0040 I A6 00          89            LDA A  0,X           LOAD MAXIMUM # CHARS
0042 I FE 0002 D      90            LDX    MSGCNV        PICK UP PNTR
0045 I BD 0009 R      91            JSR    BINDEC        CONVERT CURRENT VALUE FOR DISPLAY
0048 I FE 0000 D      92 MSG1       LDX    MSGRQT
004B I 08             93            INX
004C I EE 00          94            LDX    0,X           SET UP
004E I FF 0002 R      95            STX    NUML          DISPLAY AND
0051 I FF 0003 R      96            STX    DSPSGL        REQUEST CO-ORDINATES
0054 I FE 0000 D      97            LDX    MSGRQT
0057 I 08             98            INX
0058 I BD 000C R      99            JSR    INX4          DISPLAY CURRENT VALUE AND REQUEST OPERATO
005B I BD 000A R     100            JSR    DISPLY        ACTION
005E I B6 0004 D     101            LDA A  MSGTYP
0061 I 85 40         102            BIT A  #MSGTIP       INPUT NEW VALUE
0063 I 27 41         103            BEQ    MSG7          NO
0065 I 85 20         104            BIT A  #MSGTBF       BLANK FIELD
0067 I 27 09         105            BEQ    MSG3          NO
0069 I FE 0005 R     106            LDX    CURCSP        SET BLANK FIELD
006C I A6 0D         107            LDA A  LCAST2,X      INDICATOR FOR
006E I 8A 20         108            ORA A  #LS2BFD       DECIMAL KEY REQUEST
0070 I A7 0D         109            STA A  LCAST2,X
0072 I FE 0000 D     110 MSG3       LDX    MSGRQT        LOAD MAX
0075 I E6 00         111            LDA B  0,X           #
0077 I C4 7F         112            AND B  #$7F          MASK OFF SINGLE BYTE INDICATOR
0079 I CE 0006 R     113            LDX    #HEXVAL
007C I BD 000B R     114 MSG3A      JSR    KEYSET
007F I F6 0004 D     115            LDA B  MSGTYP
0082 I C5 04         116            BIT B  #MSGTRC       RETRY OR CONTINUE REQUEST ?
0084 I 26 20         117            BNE    MSG7          YES
MSGOUT(A0011.02.042AA  CRS MESSAGE CONTROL ROUTINE)    08/04/78  10:22:37  PAGE   3

0086 I 7D 0004 R     118            TST    CHRCNT
0089 I 27 1B         119            BEQ    MSG7
008B I B6 0006 R     120            LDA A  HEXVAL
008E I F6 0007 R     121            LDA B  HEXVL1
0091 I FE 0000 D     122            LDX    MSGRQT
0094 I 6D 00         123            TST    0,X
0096 I 2C 07         124            BGE    MSG5
0098 I FE 0002 D     125            LDX    MSGCNV
009B I E7 00         126            STA B  0,X
009D I 20 07         127            BRA    MSG7
009F I FE 0002 D     128 MSG5       LDX    MSGCNV
00A2 I A7 00         129            STA A  0,X
00A4 I E7 01         130            STA B  1,X
00A6 I 32            131 MSG7       PUL A                RESTORE INTERRUPT
00A7 I B7 0000 R     132            STA A  PIAKCR        STATUS
00AA I F6 0004 D     133            LDA B  MSGTYP
00AD I C5 04         134            BIT B  #MSGTRC       RETRY OR CONTINUE REQUEST
00AF I 27 08         135            BEQ    MSG8          NO
00B1 I FE 0005 R     136            LDX    CURCSP
00B4 I A6 0F         137            LDA A  LCAST4,X      SET CC FOR RETURN TO CALLER
00B6 I 85 20         138            BIT A  #LS4RCE
00B8 I 39            139            RTS                  RETURN TO CALLER
00B9 I FE 0000 D     140 MSG8       LDX    MSGRQT        RESTORE
00BC I A6 00         141            LDA A  0,X           DECIMAL VALUE
00BE I FE 0002 D     142            LDX    MSGCNV        FOR
00C1 I BD 0009 R     143            JSR    BINDEC        DISPLAY
00C4 I 39            144            RTS
0000 D               145            DSEC
                     146 *
                     147 *      STORAGE REQUIREMENTS FOR 'MSGOUT'
                     148 *
```

```
 0000 D 0000    A   149 MSGRQT    FDB    0          PNTR TO PARAMETER BLOCK
 0002 D 0000    A   150 MSGCNV    FDB    0          PNTR TO CONVERSION SAVE AREA
 0004 D 00          151 MSGTYP    FCB    0          MESSAGE REQUEST TYPE
 0005               152           END
MSGOUT(A0011.02.042AA  CRS MESSAGE CONTROL ROUTINE)     08/04/78  10:22:38  PAGE   4

  NO ERRORS
 ISECT LENGTH --   197
 DSECT LENGTH --     5

> BINDEC    0009      14     14    91    143
> CHRCNT    0004      11     11   118
> CHRQST    0001      10     10    83
> CURCSP    0005      12     12    71    106    136
> DISPLY    000A      14     14    70    100
> DSPSGL    0003      11     11    96
> HEXVAL    0006      12     12   113    120
> HEXVL1    0007      12     12   121
  INTENB    003F A    42     65
> INX4      000C      15     15    99
> KEYSET    000B      14     14   114
> KYS2      0008      14     14    85
  LCAST1    000C A    46
  LCAST2    000D A    48     73    74    107    109
  LCAST4    000F A    52    137
  LS2BFD    0020 A    49    108
  LS2RCR    0010 A    50     72
  LS4RCE    0020 A    53    138
  MAXDG     0006 A    44     82
  MSG1      0048 I    92     81    87
  MSG3      0072 I   110    105
  MSG3A     007C I   114     75
  MSG4      002A I    80     77
  MSG4A     0021 I    76     69
  MSG5      009F I   128    124
  MSG7      00A6 I   131    103   117    119    127
  MSG8      00B9 I   140    135
< MSGCNV    0002 D   150      8    79     90    125    128    142
< MSGOUT    0000 I    61      7
< MSGRQT    0000 D   149      8    67     88     92     97    110    122    140
  MSGTBF    0020 A    21    104
  MSGTCV    0080 A    19
  MSGTIP    0040 A    20    102
  MSGTPS    0010 A    22     76
  MSGTRC    0004 A    24     68   116    134
  MSGTSV    0008 A    23     80
  MSGTYP    0004 D   151     62    86    101    115    133
> NUML      0002      10     10    95
> PIAKCR    0000      10     10    63     66    132
DSPLY(A0011.02.043AA  CRS SELF-SCAN DRIVER)             08/04/78  13:00:48  PAGE   1

                     2 *
                     3 *      CENTRAL RECORDING STATION DISPLAY DRIVER
                     4 *
                     5 *
                     6           DEF    DISPLY,DSPLY
                     7 *
                     8           REF    SCAN
                     9           REF    ASL4
                    10 *
 0000 D             11           DSEC
                    12 *
                    13 *      STORAGE REQUIREMENTS FOR 'DSPLY'
                    14 *
 0000 D             15 I         RMB    2
 0002 D             16 J         RMB    2
 0004 D             17 STKCNT    RMB    1
 0005 D             18 BCCODE    RMB    1
                    19 *
 0000 I             20           ISEC
                    21 *
                    22 *      INPUT: INDEX REG = ADDR OF MESG
                    23 *      MESSAGE DIRECTIVES:
                    24 *      X'4'  EOT                END OF TRANSIMISSION
```

```
                        *      X'9' HT              SPACE/NON-BLANK
                        *      X'A' LF              INDEX LINE COUNTER
                        *      X'B' VT              CARRIAGE RETURN/NON-BLANK
                        *      X'D' CR              CARRIAGE RETURN/BLANK
                        *      X'E' SO              INDIRECT ADDR TO APPENDIX
                        *      X'F' S1              RETURN TO PREVIOUS MESSAGE
                        *      X'10' DLE            POSITION DISPLAY COORDINATES
                        *      X'11' DC1 SET BLINK
                        *      X'12' DC2 CLEAR BLINK
                        *      X'13' DC3 SET UNDERLINE
                        *      X'14' DC4            CLEAR UNDERLINE
                        *      X'20' BLK            SPACE/BLANK
                        *      X'21' - X'5F'        ASCII DISPLAY
                        *
0000 I                  DISPLY   EQU    *
0000 I                  DSPLY    EQU    *
0000 I FF 0000 D                 STX    I
0003 I 7F 0004 D                 CLR    STKCNT
0006 I CE 0000 R                 LDX    #SCAN
0009 I FF 0002 D                 STX    J
000C I FE 0000 D                 LDX    I
000F I 36                        PSH A
0010 I 37                        PSH B
0011 I 7F 0005 D                 CLR    BCCODE
0014 I A6 00            MESS0    LDA A  0,X         GET MESSAGE BYTE
0016 I 81 14                     CMP A  #$14
0018 I 22 46                     BHI    ASCII       BRANCH IF ASCII
001A I 27 2C                     BEQ    CLRC        BRANCH IF CMD CLEAR UNDERLINE
001C I 81 12                     CMP A  #$12
001E I 22 36                     BHI    SETC        BRANCH IF CMD SET UNDERLINE
0020 I 27 31                     BEQ    CLRB        BRANCH IF CMD CLEAR BLINK
0022 I 81 10                     CMP A  #$10
0024 I 22 36                     BHI    SETB        BRANCH IF CMD SET BLINK
0026 I 26 03                     BNE    MS1
0028 I 7E 00AD I                 JMP    COORD       JUMP IF CMD POSITION
DISPLY(A0011.02.043AA  CRS SELF-SCAN DRIVER)        08/04/78  13:00:49  PAGE  2

002B I 81 0E            MS1      CMP A  #$E
002D I 22 6C                     BHI    PULI        BRANCH IF CMD PULL I
002F I 27 53                     BEQ    PSHI        BRANCH IF CMD PSH I
0031 I 81 0B                     CMP A  #$B
0033 I 22 7A                     BHI    CR          BRANCH IF CMD CR
0035 I 27 3C                     BEQ    VT          BRANCH IF CMD VT
0037 I 81 09                     CMP A  #9
0039 I 22 3F                     BHI    LF          BRANCH IF CMD LF
003B I 27 31                     BEQ    HT          BRANCH IF CMD SAPCE
003D I 4D                        TST A
003E I 27 10                     BEQ    MESS2       BRANCH IF NULL
0040 I 33               MESS7    PUL B
0041 I 32                        PUL A
0042 I 7A 0004 D                 DEC    STKCNT      EOT ROUTINE
0045 I 2A F9                     BPL    MESS7
0047 I 39                        RTS
0048 I 86 80            CLRC     LDA A  #$80        CLEAR UNDERLINE ROUTINE
004A I B4 0005 D        MESS3    AND A  BCCODE
004D I B7 0005 D        MESS4    STA A  BCCODE
0050 I 08               MESS2    INX
0051 I 20 C1                     BRA    MESS0
0053 I 4F               CLRB     CLR A              CLEAR BLINK
0054 I 20 F4                     BRA    MESS3
0056 I 4F               SETC     CLR A              SET UNDERLINE ROUTINE
0057 I BA 0005 D        MESS5    ORA A  BCCODE
005A I 20 F1                     BRA    MESS4
005C I 86 80            SETB     LDA A  #$80        SET BLINK ROUTINE
005E I 20 F7                     BRA    MESS5
0060 I FF 0000 D        ASCII    STX    I           STOREASCII ROUTINE
0063 I FE 0002 D                 LDX    J
0066 I BB 0005 D                 ADD A  BCCODE
0069 I A7 00                     STA A  0,X
006B I FE 0000 D                 LDX    I
006E I 7C 0003 D        HT       INC    J+1         SPACE/NON-BLANK ROUTINE
0071 I 20 DD                     BRA    MESS2
0073 I 86 E0            VT       LDA A  #$E0        CARRIAGE RET/NON-BLANK
0075 I B4 0003 D                 AND A  J+1
```

```
0078 I 20 03         97           BRA    MESS6
007A I B6 0003 D     98 LF        LDA A  J+1          INDEX LINE COUNT
007D I 8B 20         99 MESS6     ADD A  #32
007F I B7 0003 D    100           STA A  J+1
0082 I 20 CC        101           BRA    MESS2
0084 I FF 0000 D    102 PSHI      STX    I
0087 I B6 0001 D    103           LDA A  I+1          PUSH I
008A I 8B 03        104           ADD A  #3
008C I 36           105           PSH A
008D I B6 0000 D    106           LDA A  I
0090 I 89 00        107           ADC A  #0
0092 I 36           108           PSH A
0093 I 7C 0004 D    109           INC    STKCNT
0096 I EE 01        110           LDX    1,X
0098 I 7E 0014 I    111 COOR1     JMP    MESS0
009B I 7A 0004 D    112 PULI      DEC    STKCNT       PULL I
009E I 2B A0        113           BMI    MESS7
00A0 I 32           114           PUL A
00A1 I B7 0000 D    115           STA A  I
00A4 I 32           116           PUL A
00A5 I B7 0001 D    117           STA A  I+1
DISPLY(A0011.02.043AA  CRS SELF-SCAN DRIVER)          08/04/78  13:00:51  PAGE   3

00A8 I FE 0000 D    118           LDX    I
00AB I 20 EB        119           BRA    COOR1
00AD I 20 1B        120 COORD     BRA    COORD1
00AF I F6 0003 D    121 CR        LDA B  J+1          CARRIAGE RET/BLANK ROUTINE
00B2 I CA E0        122           ORA B  #$E0
00B4 I FF 0000 D    123           STX    I
00B7 I FE 0002 D    124           LDX    J
00BA I 86 20        125           LDA A  #'
00BC I A7 00        126 CR1       STA A  0,X
00BE I 08           127           INX
00BF I 5C           128           INC B
00C0 I 26 FA        129           BNE    CR1
00C2 I FF 0002 D    130           STX    J
00C5 I FE 0000 D    131           LDX    I
00C8 I 20 86        132           BRA    MESS2
00CA I A6 01        133 COORD1    LDA A  1,X          POSITION TO COORDINATES
00CC I 4A           134           DEC A
00CD I BD 0001 R    135           JSR    ASL4
00D0 I 48           136           ASL A
00D1 I AB 02        137           ADD A  2,X
00D3 I 08           138           INX
00D4 I 08           139           INX
00D5 I B7 0003 D    140           STA A  J+1
00D8 I 7E 0050 I    141           JMP    MESS2
00DB                142           END
DISPLY(A0011.02.043AA  CRS SELF-SCAN DRIVER)          08/04/78  13:00:52  PAGE   4

  NO ERRORS
 ISECT LENGTH --   219
 DSECT LENGTH --     6

 ASCII     0060 I    88    51
> ASL4     0001       9     9   135
 BCCODE    0005 D    18    48    77    78    84    90
 CLRB      0053 I    81    55
 CLRC      0048 I    76    52
 COOR1     0098 I   111   119
 COORD     00AD I   120    59
 COORD1    00CA I   133   120
 CR        00AF I   121    64
 CR1       00BC I   126   129
< DISPLY   0000 I    39     6
< DSPLY    0000 I    40     6
 HT        006E I    93    68
 I         0000 D    15    41    45    88    92   102   103   106   115   117   118   123   131
 J         0002 D    16    44    89    93    96    98   100   121   124   130   140
 LF        007A I    98    67
 MESS0     0014 I    49    80   111
 MESS2     0050 I    79    70    94   101   132   141
 MESS3     004A I    77    82
```

```
  MESS4      004D I    78     85
  MESS5      0057 I    84     87
  MESS6      007D I    99     97
  MESS7      0040 I    71     74   113
  MS1        002B I    60     58
  PSHI       0084 I   102     62
  PULI       009B I   112     61
> SCAN       0000       8      8    43
  SETB       005C I    86     57
  SETC       0056 I    83     54
  STKCNT     0004 D    17     42    73   109   112
  VT         0073 I    95     65
BNDSET(A0011.02.044AA  CRS SPREAD BOUNDARY SETUP)       08/04/78  10:25:02  PAGE   1

                        *
                        *      ROUTINE TO SET STARTING AND ENDING ADDRESS OF SPREAD
                        *
  0000 I                          ISEC
                        *
                                  DEF    BNDSET,BNDEND,BNDSTR
                        *
                                  REF    DEXRTN,IDXRTN
                        *
                        *      CURRINT LINE STORAGE OFFSETS
                        *
  0000 A                  LCASPT    EQU    0              SHOT POINT STATION
  0002 A                  LCANRS    EQU    2              # STATIONS NOT RECORDED EACH SIDE FO S. P.
  0003 A                  LCARSR    EQU    3              # RECORDING STATIONS TO 1ST RECORDING STATO
  0004 A                  LCABBR    EQU    4              TOTAL @ STATIONS TO 1ST RECORDING STATION
  0005 A                  LCATRS    EQU    5              TOTAL # RECORDING STATIONS
                        *
                        *      CALLING SEQUENCE:
                        *
                        *      IDX => PNTR TO LINE AND SHOOTER PAARAMETERS
                        *
                        *      .     EQUATIONS:
                        *
                        *      .     LCARSR = 0
                        *      .     BNDEND =LCASPT-LCABBR-LCANRS
                        *      .     BNDSTR = ENDSTN-LCATRS+1
                        *
                        *      .     LCABBR > LCATRS
                        *      .     LCABBR = LCATRS
                        *      .     BNDEND = LCASPT+LCABBR+LCANRS
                        *      .     BNDSTR = LCASPT+LCANRS+1+LCABBR-LCATRS
                        *
                        *      .     LCABBR < LCATRS
                        *      .     BNDEND = LCASPT+LCANRS+LCARSR
                        *      .     BNDSTR = LCASPT-LCATRS+LCARSR-LCANRS
                        *
  0000 I                  BNDSET    EQU    *
  0000 I FF 0000 D                  STX    BNDIDX         SAVE BASE INDEX
  0003 I EE 00                      LDX    LCASPT,X       INITIALIZE
  0005 I FF 0002 D                  STX    BNDEND         BOUNDARY
  0008 I FF 0004 D                  STX    BNDSTR         VALUES
  000B I FE 0000 D                  LDX    BNDIDX         RESTORE BASE INDEX
  000E I A6 03                      LDA A  LCARSR,X       SHOT-POINT RIGHT OF SPREAD
  0010 I 26 21                      BNE    BND1           NO
  0012 I A6 04                      LDA A  LCABBR,X
  0014 I E6 02                      LDA B  LCANRS,X
  0016 I CE 0002 D                  LDX    #BNDEND        BNDEND
  0019 I BD 0000 R                  JSR    DEXRTN         = LCASPT-
  001C I 17                         TBA                   LCABBR-
  001D I BD 0000 R                  JSR    DEXRTN         LCANRS
  0020 I FE 0002 D                  LDX    BNDEND         COMPUTE
  0023 I FF 0004 D                  STX    BNDSTR         STARTING
  0026 I FE 0000 D                  LDX    BNDIDX
  0029 I A6 05                      LDA A  LCATRS,X
  002B I 4A                         DEC A
  002C I CE 0004 D                  LDX    #BNDSTR        BOUNDARY
  002F I BD 0000 R                  JSR    DEXRTN
  0032 I 39               BND3      RTS                   RETURN TO CALLER
```

```
BNDSET(A0011.02.044AA  CRS SPREAD BOUNDARY SETUP)       08/04/78  10:25:04  PAGE   2

 0033 I A6 02         60 BND1      LDA A  LCANRS,X      INITIAZE
 0035 I 16            61           TAB
 0036 I CE 0002 D     62           LDX    #BNDEND       ENDING
 0039 I BD 0001 R     63           JSR    IDXRTN        BOUNDARY
 003C I FE 0000 D     64           LDX    BNDIDX        RESTORE INDEX
 003F I A6 04         65           LDA A  LCABBR,X      SHOT POINT
 0041 I A1 05         66           CMP A  LCATRS,X      LEFT OF SPREAD
 0043 I 2D 1A         67           BLT    BND2          NO
 0045 I CE 0002 D     68           LDX    #BNDEND       COMPUTE
 0048 I BD 0001 R     69           JSR    IDXRTN        END BOUNDARY
 004B I 17            70           TBA                  COMPUTE
 004C I 4C            71           INC A                STARTING
 004D I FE 0000 D     72           LDX    BNDIDX
 0050 I AB 04         73           ADD A  LCABBR,X
 0052 I E6 05         74           LDA B  LCATRS,X
 0054 I CE 0004 D     75           LDX    #BNDSTR       SPREAD
 0057 I BD 0001 R     76           JSR    IDXRTN        STATION
 005A I 17            77           TBA
 005B I BD 0000 R     78           JSR    DEXRTN
 005E I 39            79           RTS                  RETURN TO CALLER
 005F I FE 0000 D     80 BND2      LDX    BNDIDX
 0062 I A6 03         81           LDA A  LCARSR,X      COMPUTE
 0064 I CE 0002 D     82           LDX    #BNDEND       ENDING
 0067 I BD 0001 R     83           JSR    IDXRTN        BOUNDARY
 006A I FE 0000 D     84           LDX    BNDIDX
 006D I A6 03         85           LDA A  LCARSR,X
 006F I CE 0004 D     86           LDX    #BNDSTR       COMPUTE
 0072 I BD 0001 R     87           JSR    IDXRTN        STARTING
 0075 I 17            88           TBA                  BOUNDARY
 0076 I BD 0000 R     89           JSR    DEXRTN
 0079 I FE 0000 D     90           LDX    BNDIDX
 007C I A6 05         91           LDA A  LCATRS,X
 007E I CE 0004 D     92           LDX    #BNDSTR
 0081 I BD 0000 R     93           JSR    DEXRTN
 0084 I 39            94           RTS
 0000 D               95           DSEC
                      96 *
                      97 *      STORAGE REQUIREMENTS FOR 'BNDSET'
                      98 *
 0000 D 0000     A    99 BNDIDX    FDB    0             PNTR TO LINE AND SHOOTER PARAMETRS
 0002 D 0000     A   100 BNDEND    FDB    0             ENDING STATION IN SPREAD
 0004 D 0000     A   101 BNDSTR    FDB    0             STARTING STATION IN SPREAD
 0006                102           END
BNDSET(A0011.02.044AA  CRS SPREAD BOUNDARY SETUP)       08/04/78  10:25:05  PAGE   3

   NO ERRORS
 ISECT LENGTH --    133
 DSECT LENGTH --      6

 BND1      0033 I    60    45
 BND2      005F I    80    67
 BND3      0032 I    59
< BNDEND   0002 D   100     7    41    48    52    62    68    82
 BNDIDX    0000 D    99    39    43    54    64    72    80    84    90
< BNDSET   0000 I    38     7
< BNDSTR   0004 D   101     7    42    53    57    75    86    92
> DEXRTN   0000       9     9    49    51    58    78    89    93
> IDXRTN   0001       9     9    63    69    76    83    87
 LCABBR    0004 A    16    46    65    73
 LCANRS    0002 A    14    47    60
 LCARSR    0003 A    15    44    81    85
 LCASPT    0000 A    13    40
 LCATRS    0005 A    17    55    66    74    91
RCMSET(A0011.02.045AA  CRS RECORDING MAP SETUP)        08/04/78  10:25:59  PAGE   1

                       2 *
                       3 *      ROUTINE TO SET UP RECORDING MAP
                       4 *
 0000 I                5           ISEC
                       6 *
                       7           DEF    RCMSET
                       8           DEF    RCMENT,RCMPTR,RTMELN
```

```
                    DEF     RCMAPT,RCMAPN
                    DEF     RACTLS
          *
                    REF     CURCSP,STNADR,RTUADR
                    REF     STNAD2
                    REF     CMPPR1,CMPPR2,CHKIDS
                    REF     RCMSTR
                    REF     BNDSTR,BNDEND
          *
                    REF     DEXRTN,IDXRTN,BNDSET,CMPRTN
                    REF     SELIDX,CHKDEP,ADPICP,ADPSTN
                    REF     ADPENT
          *
          *      CURRENT LINE STORAGE OFFSETS
          *
0000 A      LCASPT  EQU     0          SHOT POINT STATION
0002 A      LCANRS  EQU     2          # STATIONS NOT REOCRDED EACH SIDE F S. P.
0003 A      LCARSR  EQU     3          # RECORDING STATIONS TO 1ST RECORDING STATO
0004 A      LCABBR  EQU     4          TOTAL # STATIONS TO 1ST RECORDING SATION
0005 A      LCATRS  EQU     5          TOTAL # RECORDING STATIONS
          *
          *      RTU CHANNEL MAP STATUS EQUATES
          *
0000 A      RTUCNM  EQU     0          NORMAL CHANNEL
0001 A      RTUCBL  EQU     1          BLASTER
0002 A      RTUCSK  EQU     2          DEAD CHANNEL
0003 A      RTUCNC  EQU     3          UNUSED CHANNEL
0004 A      RTULCH  EQU     4          LAST RECORDING CHANNEL
0040 A      RTUXME  EQU     $40        XMIT ERROR
0080 A      RTUCHE  EQU     $80        RTU NORMAL TEST CHANNEL LEAKAGE OR CO      N
          *
          *
0010 A      LCAMDE  EQU     16         LINE MODE
0003 A      MODFIR  EQU     3          FIRE MODE
          *
          *
          *      RECORDING MAP ENTRY FORMAT
          *
          *      BYTE 0-1 => STATION NUMBER
          *              2 => TYPE RTU FLAGS
          *              3 => RTU ADDRESS
          *              4 => CHANNEL ADDRESS
          *              5 => RECORDING #
          *
          *      NOTE: BLASTER ASSIGNED RECORDING # OF 255
          *
0000 I              RCMSET  EQU     *
0000 I CE 000A D            LDX     #RACTLS    INIT. ACTIVE RTU LIST PNTR
0003 I FF 0008 D            STX     RCMAPT
0006 I FE 0000 R            LDX     CURCSP     COMPUTE BLANK
0009 I A6 02                LDA A   LCANRS,X   BOUNDARIES
RCMSET(A0011.02.045AA  CRS RECORDING MAP SETUP)      08/04/78  10:26:00  PAGE   2

000B I 36                   PSH A              SAVE # OF BLANK STATIONS
000C I EE 00                LDX     0,X        INITIALIZE
000E I FF 0000 D            STX     RCMBLL     BOUNDARIES TO
0011 I FF 0002 D            STX     RCMBHL     SHOT POINT STATION
0014 I CE 0000 D            LDX     #RCMBLL    SET LOWER BLANKING
0017 I BD 000A R            JSR     DEXRTN     LIMIT
001A I 32                   PUL A              RESTORE # OF BLANK STATIONS
001B I CE 0002 D            LDX     #RCMBHL    SET UPPER BLANKING
001E I BD 000B R            JSR     IDXRTN     LIMIT
0021 I FE 0000 R            LDX     CURCSP     COMPUTE SPREAD
0024 I BD 000C R            JSR     BNDSET     BOUNDARIES
0027 I CE 0007 R            LDX     #RCMSTR    INITIALIZE PNTR TO
002A I FF 0004 D            STX     RCMPTR     START OF RECORDING MAP
002D I 7F 0007 D            CLR     RCMENT     INITIALIZE # MAP ENTRIES
0030 I 7F 0006 D            CLR     RCMRCN     INITIALIZE RECORDING #
0033 I FE 0000 R            LDX     CURCSP
0036 I A6 10                LDA A   LCAMDE,X
0038 I 81 03                CMP A   #MODFIR    FIRE MODE ?
003A I 27 07                BEQ     RCM1       YES, SKIP SHOT PT RIGHT OF SPREAD CHECK
003C I A6 03                LDA A   LCARSR,X   SHOT PT RIGHT OF SPREAD ?
```

```
003E I 26 03         80          BNE   RCM1        NO
0040 I BD 0111 I     81          JSR   STBCHN      SETUP BLASTER CHANNEL IN RECORDING MAP
0043 I FE 0009 R     82 RCM1     LDX   BNDEND      PICK UP NEXT CHANNEL IN SPREAD
0046 I FF 0001 R     83          STX   STNADR      SAVE CURRENT STATION NUMBER
0049 I 09            84          DEX               SET PNTR TO
004A I FF 0009 R     85          STX   BNDEND      NEXT STATION
004D I CE 0001 R     86          LDX   #STNADR
0050 I FF 0005 R     87          STX   CMPPR2
0053 I CE 0008 R     88          LDX   #BNDSTR
0056 I FF 0004 R     89          STX   CMPPR1
0059 I BD 000D R     90          JSR   CMPRTN      MAP COMPLETE ?
005C I 24 03         91          BCC   RCM11       NO
005E I 7E 00F0 I     92          JMP   RCMC
0061 I FE 0004 D     93 RCM11    LDX   RCMPTR      PICK UP CURRENT MAP PNTR
0064 I B6 0001 R     94          LDA A STNADR
0067 I F6 0003 R     95          LDA B STNAD2
006A I A7 00         96          STA A 0,X         MOVE STATION
006C I E7 01         97          STA B 1,X         NUMBER INTO MAP
006E I 6F 02         98          CLR   2,X         ANTICIPATE NORMAL CHANNEL
0070 I BD 0012 R     99          JSR   ADPENT      PICK UP ASSOCIATED RTU & CHANNEL ADDR
0073 I FE 0004 D    100          LDX   RCMPTR
0076 I A7 03        101          STA A 3,X         MOVE RTU AND
0078 I E7 04        102          STA B 4,X         CHANNEL # INTO MAP
007A I FE 0008 D    103          LDX   RCMAPT
007D I 09           104 RCM1C    DEX
007E I 8C 0009 D    105          CPX   #RCMAPN     END OF ACITVE LIST ?
0081 I 26 0B        106          BNE   RCM1A       NO, CONTINUE
0083 I FE 0008 D    107          LDX   RCMAPT
0086 I A7 00        108          STA A 0,X
0088 I 08           109          INX
0089 I FF 0008 D    110          STX   RCMAPT
008C I 20 04        111          BRA   RCM1B
008E I A1 00        112 RCM1A    CMP A 0,X         SAME RTU
0090 I 26 EB        113          BNE   RCM1C       NO, CONTINUE SEARCH
0092 I FE 0000 R    114 RCM1B    LDX   CURCSP
0095 I EE 00        115          LDX   LCASPT,X
0097 I BC 0001 R    116          CPX   STNADR      SHOT POINT STATION
009A I 26 14        117          BNE   RCM2        NO
RCMSET(A0011.02.045AA  CRS RECORDING MAP SETUP)        08/04/78  10:26:01  PAGE   3

009C I FE 0000 R    118          LDX   CURCSP
009F I A6 10        119          LDA A LCAMDE,X
00A1 I 81 03        120          CMP A #MODFIR     FIRE MODE ?
00A3 I 27 9E        121          BEQ   RCM1        YES, DO NOT PLACE STATION IN MAP
00A5 I FE 0004 D    122          LDX   RCMPTR
00A8 I 86 01        123          LDA A #RTUCBL     SET BLASTER INDICATOR
00AA I A7 02        124          STA A 2,X         IN TYPE FLAGS
00AC I 86 FF        125          LDA A #255        SET SHOT-PT RECORDING # = 255
00AE I 20 30        126          BRA   RCM3        SETUP RECORDING #
00B0 I CE 0000 D    127 RCM2     LDX   #RCMBLL
00B3 I FF 0004 R    128          STX   CMPPR1
00B6 I BD 000D R    129          JSR   CMPRTN      STATION # < LOWER BLANK LIMIT
00B9 I 25 0E        130          BCS   RCM4        YES
00BB I CE 0002 D    131          LDX   #RCMBHL
00BE I FF 0004 R    132          STX   CMPPR1
00C1 I BD 000D R    133          JSR   CMPRTN      STATION # > UPPER BLANK LIMIT
00C4 I 22 03        134          BHI   RCM4        YES
00C6 I 7E 0043 I    135          JMP   RCM1        NO, BLANKING STATION (DO NOT ENTER IN MAP)
00C9 I FE 0006 R    136 RCM4     LDX   CHKIDS      COMPUTE INDEX INTO DEPLOYMENT TABLE
00CC I EE 00        137          LDX   0,X         DEAD CHANNEL
00CE I 2A 07        138          BPL   RCM5        NO
00D0 I FE 0004 D    139          LDX   RCMPTR      SET DEAD CHANNEL
00D3 I 86 02        140          LDA A #RTUCSK     IN TYPE FLAG
00D5 I A7 02        141          STA A 2,X
00D7 I 7C 0006 D    142 RCM5     INC   RCMRCN      INCR RECORDING #
00DA I B6 0006 D    143          LDA A RCMRCN      PICK UP RECORDING #
00DD I FE 0004 D    144          LDX   RCMPTR
00E0 I A7 05        145 RCM3     STA A 5,X         MOVE RECORDING # INTO MAP
00E2 I 7C 0007 D    146          INC   RCMENT      INCR MAP ENTRY COUNT
00E5 I 86 06        147          LDA A #RTMELN     SET PNTR
00E7 I CE 0004 D    148          LDX   #RCMPTR     TO NEXT
00EA I BD 000B R    149          JSR   IDXRTN      MAP ENTRY
00ED I 7E 0043 I    150          JMP   RCM1        CONTINUE PROCESSING SPREAD
```

```
00F0 I FE 0000 R    151 RCMC       LDX     CURCSP
00F3 I A6 10        152            LDA A   LCAMDE,X
00F5 I 81 03        153            CMP A   #MODFIR     FIRE MODE ?
00F7 I 27 08        154            BEQ     RCM8        YES
00F9 I A6 04        155            LDA A   LCABBR,X    SHOT POINT WITHIN SPREAD
00FB I 27 06        156            BEQ     RCM7        YES
00FD I A6 03        157            LDA A   LCARSR,X    SHOT POINT LEFT OF SPREAD
00FF I 27 02        158            BEQ     RCM7        NO
0101 I 8D 0E        159 RCM8       BSR     STBCHN      SET BLAST CHANNEL
0103 I FE 0004 D    160 RCM7       LDX     RCMPTR
0106 I 09           161            DEX
0107 I 09           162            DEX
0108 I 09           163            DEX
0109 I 09           164            DEX
010A I A6 00        165            LDA A   0,X
010C I 8A 04        166            ORA A   #RTULCH     SET LAST CHANNEL INDICATOR
010E I A7 00        167            STA A   0,X
0110 I 39           168            RTS                 RETURN TO CALLER
                    169 *
                    170 *      ROUTINE TO SETUP BLAST CHANNEL IN RECORDING MAP
                    171 *
0111 I              172 STBCHN     EQU     *
0111 I 7C 0007 D    173            INC     RCMENT      INCR MAP ENTRY COUNT
0114 I FE 0000 R    174            LDX     CURCSP
0117 I A6 00        175            LDA A   0,X         PICK UP SHOT POINT
RCMSET(A0011.02.045AA  CRS RECORDING MAP SETUP)          08/04/78  10:26:03  PAGE    4

0119 I E6 01        176            LDA B   1,X         STATION #
011B I EE 00        177            LDX     0,X
011D I FF 0001 R    178            STX     STNADR
0120 I FE 0004 D    179            LDX     RCMPTR      PICK UP MAP PNTR
0123 I A7 00        180            STA A   0,X         MOVE STATION #
0125 I E7 01        181            STA B   1,X         INTO RECORDING MAP
0127 I 86 01        182            LDA A   #RTUCBL     SET BLASTER INDICATOR
0129 I A7 02        183            STA A   2,X         IN TYPE FLAGS
012B I 86 FF        184            LDA A   #255        SET UP
012D I A7 05        185            STA A   5,X         SHOT POINT RECORDING #
012F I BD 000E R    186            JSR     SELIDX      PICK UP ASSOCIATED RTU
0132 I BD 0011 R    187            JSR     ADPSTN      AND CHANNEL #
0135 I FE 0004 D    188            LDX     RCMPTR
0138 I A7 03        189            STA A   3,X         MOVE IN RTU
013A I E7 04        190            STA B   4,X         AND CHANNEL ADDRESS
013C I FE 0008 D    191            LDX     RCMAPT
013F I 09           192 STBCH3     DEX
0140 I 8C 0009 D    193            CPX     #RCMAPN     END-OF-CURRENT ACTIVE LIST ?
0143 I 26 0B        194            BNE     STBCH1      NO-CHECK IF RTU ALREADY IN LIST
0145 I FE 0008 D    195            LDX     RCMAPT      CURRENT END-OF-LIST PNTR
0148 I A7 00        196            STA A   0,X         INCLUED RTU IN ACTIVE LIST
014A I 08           197            INX
014B I FF 0008 D    198            STX     RCMAPT      BUMP ACTIVE LIST PNTR
014E I 20 04        199            BRA     STBCH2
0150 I A1 00        200 STBCH1     CMP A   0,X         RTU ALREADY IN LIST ?
0152 I 26 EB        201            BNE     STBCH3      NO-CONTINUE
0154 I 86 06        202 STBCH2     LDA A   #RTMELN
0156 I CE 0004 D    203            LDX     #RCMPTR     UPDATE RECORDING MAP PNTR
0159 I BD 000B R    204            JSR     IDXRTN
015C I 39           205            RTS                 RETURN TO CALLER
0000 D              206            DSEC
                    207 *
                    208 *      STORAGE REQUIREMENTS FOR 'RCMSET'
                    209 *
0000 D 0000      A  210 RCMBLL     FDB     0           BLANKING CHANNEL LOW LIMIT
0002 D 0000      A  211 RCMBHL     FDB     0           BLANKING CHANNEL HIGH LIMIT
0004 D 0000      A  212 RCMPTR     FDB     0           PNTR TO CURRENT MAP ENTRY
0006 D 00           213 RCMRCN     FCB     0           CURRENT RECORDING #
0007 D 00           214 RCMENT     FCB     0           # MAP ENTRIES
0006 A              215 RTMELN     EQU     6           # BYTES/ RECORDING MAP AREA
0008 D 0000      A  216 RCMAPT     FDB     0           ACTIVE LIST PNTR
0009 D              217 RCMAPN     EQU     *-1
000A D              218 RACTLS     EQU     *
000A D              219            RMB     254         RTU ACTIVE LIST PNTR
0108                220            END
```

```
RCMSET(A0011.02.045AA  CRS RECORDING MAP SETUP)        08/04/78  10:26:04  PAGE   5

   NO ERRORS
  ISECT LENGTH --    349
  DSECT LENGTH --    264

> ADPENT    0012       20      20     99
> ADPICP    0010       19      19
> ADPSTN    0011       19      19    187
> BNDEND    0009       16      16     82     85
> BNDSET    000C       18      18     70
> BNDSTR    0008       16      16     88
> CHKDEP    000F       19      19
> CHKIDS    0006       14      14    136
> CMPPR1    0004       14      14     89    128    132
> CMPPR2    0005       14      14     87
> CMPRTN    000D       18      18     90    129    133
> CURCSP    0000       12      12     58     69     75    114    118    151    174
> DEXRTN    000A       18      18     65
> IDXRTN    000B       18      18     68    149    204
  LCABBR    0004 A     27     155
  LCAMDE    0010 A     41      76    119    152
  LCANRS    0002 A     25      59
  LCARSR    0003 A     26      79    157
  LCASPT    0000 A     24     115
  LCATRS    0005 A     28
  MODFIR    0003 A     42      77    120    153
< RACTLS    000A D    218      10     56
  RCM1      0043 I     82      78     80    121    135    150
  RCM11     0061 I     93      91
  RCM1A     008E I    112     106
  RCM1B     0092 I    114     111
  RCM1C     007D I    104     113
  RCM2      00B0 I    127     117
  RCM3      00E0 I    145     126
  RCM4      00C9 I    136     130    134
  RCM5      00D7 I    142     138
  RCM7      0103 I    160     156    158
  RCM8      0101 I    159     154
< RCMAPN    0009 D    217       9    105    193
< RCMAPT    0008 D    216       9     57    103    107    110    191    195    198
  RCMBHL    0002 D    211      63     67    131
  RCMBLL    0000 D    210      62     64    127
  RCMC      00F0 I    151      92
< RCMENT    0007 D    214       8     73    146    173
< RCMPTR    0004 D    212       8     72     93    100    122    139    144    148    160    179    188    203
  RCMRCN    0006 D    213      74    142    143
< RCMSET    0000 I     55       7
> RCMSTR    0007       15      15     71
< RTMELN    0006 A    215       8    147    202
> RTUADR    0002       12      12
  RTUCBL    0001 A     33     123    182
  RTUCHE    0080 A     38
  RTUCNC    0003 A     35
  RTUCNM    0000 A     32
  RTUCSK    0002 A     34     140
  RTULCH    0004 A     36     166
  RTUXME    0040 A     37
> SELIDX    000E       19      19    186
RCMSET(A0011.02.045AA  CRS RECORDING MAP SETUP)        08/04/78  10:26:05  PAGE   6

  STBCH1    0150 I    200     194
  STBCH2    0154 I    202     199
  STBCH3    013F I    192     201
  STBCHN    0111 I    172      81    159
> STNAD2    0003       13      13     95
> STNADR    0001       12      12     83     86     94    116    178
RMLST(A0011.02.046AA  CRS MULTIPLE RTU RECORDING)      08/04/78  10:13:06  PAGE   1

                          2 *
                          3 *      ROUTINE TO INITIALIZE MULTIPLE RTU RECORDING LOOP
                          4 *
0000 I                    5          ISEC
```

```
            *
                       DEF    NRMINI
                       DEF    NRMCMC
                       DEF    MNHCHN,MONCHN
            *
                       REF    RCMENT,RCMPTR,RCMSTR
                       REF    CURCSP
            *
                       REF    TWTINI,DMNINI
                       REF    RCMSET
            *
            *      LINE STATUS EQUATES
            *
000C A      LCAST1     EQU    12           LINE STATUS FLAGS (BYTE 1)
0010 A      LSTTBP     EQU    $10          TAPE BY-PASS
0008 A      LSTCBP     EQU    8            CAMERA BY-PASS
0002 A      LSTMMO     EQU    2            MULTIPLE MONITOR OUTPUT REQUEST
            *
000D A      LCAST2     EQU    13           LINE STATUS FLAGS (BYTE 2)
0004 A      LS2NTP     EQU    4            NORMAL TEST-IN-PROGRESS
            *
000E A      LCAST3     EQU    14           LINE STATUS FLAGS (BYTE 3)
0002 A      LS3NDR     EQU    2            NOISE DATA RECORDING
            *
            *
0010 A      LCAMDE     EQU    16           LINE MODE
0003 A      MODFIR     EQU    3            FIRE MODE
            *
0031 A      MONMAX     EQU    49           MAXIMUM # CHANNELS TO BE WRITTEN TO MONITO
            *
            *      MULTIPLE RTU RECORDING LOOP INITIALIZATION ROUTINE
            *
0000 I                 NRMINI     EQU    *
0000 I BD 0006 R                  JSR    RCMSET       SETUP RECORDING MAP
0003 I 7F 0008 D                  CLR    CRTUIM       CLEAR CURRENT RTU IN MEMORY ADDR
0006 I CE 0002 R                  LDX    #RCMSTR      SET PNTR TO START
0009 I FF 0001 R                  STX    RCMPTR       OF RECORDING MAP
000C I B6 0000 R                  LDA A  RCMENT       SAVE RECORDING MAP
000F I B7 0000 D                  STA A  NRMCMC       ENTRY COUNT
0012 I B7 0006 D                  STA A  MONCHN       ANTICIPATE SINGLE MONITOR OUTPUT REQUEST
0015 I B7 0005 D                  STA A  MNHCHN
0018 I FE 0003 R                  LDX    CURCSP
001B I E6 0C                      LDA B  LCAST1,X
001D I C4 FD                      AND B  #-1-LSTMMO   RESET MULTIPLE MONITOR REQUEST FLAG
001F I E7 0C                      STA B  LCAST1,X
0021 I A6 10                      LDA A  LCAMDE,X
0023 I 81 03                      CMP A  #MODFIR
0025 I 27 10                      BEQ    NRL1A        JUMP IF FIRE MODE
0027 I A6 0D                      LDA A  LCAST2,X
0029 I 85 04                      BIT A  #LS2NTP      NORMAL TEST-IN-PROGRESS
002B I 27 06                      BEQ    NRL1         NO
002D I A6 0E                      LDA A  LCAST3,X
002F I 85 02                      BIT A  #LS3NDR      NOISE DATA RECORDING
0031 I 27 25                      BEQ    NRL2         NO, RETURN TO CALLER
NRMLST(A0011.02.046AA  CRS MULTIPLE RTU RECORDING)     08/04/78  10:13:07  PAGE   2

0033 I C5 10           NRL1       BIT B  #LSTTBP      TAPE BY-PASS
0035 I 26 03                      BNE    NRL3         YES, SKIP TAPE INITIALIZATION
0037 I BD 0004 R       NRL1A      JSR    TWTINI       SETUP TAPE UNIT FOR OUTPUT
003A I B6 0000 R       NRL3       LDA A  RCMENT       TOTAL # RECORDING MAP
003D I C6 31                      LDA B  #MONMAX      ENTRIES < TOTAL # CHANNELS
003F I 11                         CBA                 OF MONITOR OUTPUT
0040 I 23 13                      BLS    NRL4         YES, OUTPUT WITHIN MONITOR LIMITS
0042 I F7 0006 D                  STA B  MONCHN       SET # OF MONITOR CHANNELS TO OUTPUT
0045 I F7 0005 D                  STA B  MNHCHN
0048 I 10                         SBA                 SAVE # OF CHANNELS REMAINING
0049 I B7 0007 D                  STA A  MNCHSV       TO BE OUTPUT TO MONITOR
004C I FE 0003 R                  LDX    CURCSP
004F I A6 0C                      LDA A  LCAST1,X     SET MULTIPLE MONITOR
0051 I 8A 02                      ORA A  #LSTMMO      OUTPUT REQUEST
0053 I A7 0C                      STA A  LCAST1,X     FLAG
0055 I BD 0005 R       NRL4       JSR    DMNINI       SETUP DATA MONITOR FOR OUTPUT
0058 I 39              NRL2       RTS                 RETURN TO CALLER
                       *
```

```
                            *      ROUTINE TO PROCESS MULTIPLE RTU RECORDING LOOP
                            *
                                       DEF     NRMLST
                            *
                                       DEF     NRMMPT,NRMCMP
                                       DEF     RTUCMT,RTUCME
                                       DEF     RMSKTB,RMSKTE
                                       DEF     RCMTM3,RCMTP9,RCTP12
                                       DEF     RMSKP2,RMSKP3,RMSKP4,RMSKP3
                                       DEF     RMSKM1
                            *
                                       REF     STNADR,RTUADR,CHNADR
                                       REF     TMRBCA,TMRBTV
                                       REF     RCTACK
                                       REF     MONSTS,DATMON
                            *
                                       REF     ADPENT,IDXRTN
                                       REF     TMRCDV,RCVMRT,RTUCMD
                                       REF     ACKTMO
                            *
                            *      RTU COMMAND EQUATES
                            *
0000 A                      RTUACK     EQU     0             ACKNOWLEDGE INITIALIZE
0001 A                      DATACK     EQU     1             DATA ACKNOWLEDGE
                            *
                            *      RTU CHANNEL MAP STATUS EQUATES
                            *
0000 A                      RTUCNM     EQU     0             NORMAL CHANNEL
0001 A                      RTUCBL     EQU     1             BLASTER
0002 A                      RTUCSK     EQU     2             DEAD CHANNEL
0003 A                      RTUCNC     EQU     3             UNUSED CHANNEL
0004 A                      RTULCH     EQU     4             LAST RECORDING CHANNEL
0040 A                      RTUXME     EQU     $40           XMIT ERROR
0080 A                      RTUCHE     EQU     $80           NORMAL TEST CHANNEL ERROR
                            *
2710 A                      SCPTMO     EQU     10000         SCOPE OUTPUT TIMEOUT LENGTH
0002 A                      SCPSDT     EQU     2             SELECT SEISMIC DATA FOR SCOPE DISPLAY
0000 A                      SCPRFS     EQU     0             SELECT RF SPECTRUM FOR SCOPE DISPLAY
                            *
                            *      CALLING SEQUENCE:  JSR  NRMLST
NRMLST(A0011.02.046AA  CRS MULTIPLE RTU RECORDING)      08/04/78  10:13:08  PAGE   3

                            *
                            *      NRMCMC => ENTRY COUNT
                            *      RCMPTR => PNTR TO NEXT ENTRY IN RECORDING MAP
                            *      XMTOTL => TOTAL # WORDS TO INPUT FROM RTU
                            *
                            *      MULTIPLE RTU RECORDING LOOP PROCESSING ROUTINE
                            *
0059 I                      NRMLST     EQU     *
0059 I 7D 0000 D                       TST     NRMCMC        LAST RTU PROCESSED ?
005C I 2E 03                           BGT     NRML1         NO
005E I 86 FF                           LDA A   #$FF          SET CC FOR LAST RTU
0060 I 39                              RTS                   RETURN TO CALLER
0061 I CE 000C D            NRML1      LDX     #RMSKTB+3     INITIALIZE MASK
0064 I FF 0001 D                       STX     NRMMPT        TABLE PNTR
0067 I CE 0016 D                       LDX     #RTUCMT+9     INITIALIZE CHANNEL
006A I FF 0003 D                       STX     NRMCMP        MAP TABLE PNTR
006D I 86 04                           LDA A   #4            INITIALIZE CURRENT
006F I B7 0009 R                       STA A   CHNADR        CHANNEL PNTR
0072 I FE 0001 R                       LDX     RCMPTR        PICK UP PNTR TO NEXT RECORDING MAP ENTRY
0075 I EE 00                           LDX     0,X           PICK UP ASSOCIATED
0077 I FF 0007 R                       STX     STNADR        STATION ADDR
007A I BD 000F R                       JSR     ADPENT        PICK UP RTU # FOR NEXT STATION
007D I B7 0008 R                       STA A   RTUADR        SET CURRENT RTU ADDR
0080 I 7A 0000 D            NRML3      DEC     NRMCMC        END-OF-MAP ?
0083 I 2B 0D                           BMI     NRML4A        YES, SET REMAINDER OF CHNLS TO UNUSED CHNL
0085 I FE 0001 R                       LDX     RCMPTR
0088 I A6 03                           LDA A   3,X
008A I B1 0008 R                       CMP A   RTUADR        NEW RTU ?
008D I 27 06                           BEQ     NRML8         NO
008F I 7C 0000 D            NRML9      INC     NRMCMC        RESET MAP COUNT
0092 I 7E 01D1 I            NRML4A     JMP     NRML4         SET REMAINDER OF CHANNELS TO UNUSED CHANNES
0095 I FE 0003 R            NRML8      LDX     CURCSP
```

```
0098 I A6 10         150          LDA A  LCAMDE,X
009A I 81 03         151          CMP A  #MODFIR      FIRE MODE ?
009C I 26 0C         152          BNE    NRML2        NO, CHECK MONITOR OUTPUT REQUIREMENTS
009E I 7D 0000 D     153          TST    NRMCMC       LAST MAP ENTRY ?
00A1 I 26 07         154          BNE    NRML2        NO
00A3 I B6 0009 R     155          LDA A  CHNADR       1ST CHANNEL TO BE
00A6 I 81 04         156          CMP A  #4           PROCESSED FOR THIS RTU
00A8 I 26 E5         157          BNE    NRML9        NO, RESET MAP COUNT
00AA I 7A 0006 D     158 NRML2    DEC    MONCHN       MONITOR OUTPUT OVERLAP ?
00AD I 2A 3C         159          BPL    NRMLA        NO
00AF I B6 0007 D     160          LDA A  MNCHSV       PICK UP # CHANNELS REMAINING TO BE OUTPUT
00B2 I C6 31         161          LDA B  #MONMAX
00B4 I B7 0006 D     162          STA A  MONCHN       ANTICIPATE LAST BLOCK FOR MONITOR OUTPUT
00B7 I B7 0005 D     163          STA A  MNHCHN
00BA I 11            164          CBA                 LAST BLOCK ?
00BB I 23 0A         165          BLS    NRMLB        YES
00BD I F7 0006 D     166          STA B  MONCHN       SET MONITOR OUTPUT CHANNEL COUNT
00C0 I F7 0005 D     167          STA B  MNHCHN
00C3 I 10            168          SBA
00C4 I B7 0007 D     169          STA A  MNCHSV       SET REMAINING CHANNEL COUNT
00C7 I 7A 0006 D     170 NRMLB    DEC    MONCHN
00CA I FE 0003 R     171          LDX    CURCSP
00CD I A6 0C         172          LDA A  LCAST1,X
00CF I 85 08         173          BIT A  #LSTCBP      CAMERA BY-PASS
00D1 I 26 06         174          BNE    NRMLC        YES, SETUP SCOPE DISPLAY TIMEOUT
00D3 I A6 0E         175          LDA A  LCAST3,X
NRMLST(A0011.02.046AA  CRS MULTIPLE RTU RECORDING)      08/04/78  10:13:09  PAGE   4

00D5 I 85 02         176          BIT A  #LS3NDR      NOISE DATA RECORDING
00D7 I 27 0F         177          BEQ    NRMLD        NO, SKIP TIMEOUT
00D9 I CE 0000 A     178 NRMLC    LDX    #0
00DC I FF 000A R     179          STX    TMRBCA       CLEAR TIMER COMPLETION ADDR
00DF I CE 2710 A     180          LDX    #SCPTMO      SET UP SCOPE
00E2 I FF 000B R     181          STX    TMRBTV       OUTPUT TIMEOUT LENGTH
00E5 I BD 0011 R     182          JSR    TMRCDV       DELAY TO ALLOW OPERATOR TO LOOK AT SCOPE DS
00E8 I BD 0005 R     183 NRMLD    JSR    DMNINI       SETUP MONITOR FOR OUTPUT
00EB I FE 0001 R     184 NRMLA    LDX    RCMPTR       RESTORE CURRENT RECORDING MAP PNTR
00EE I B6 0009 R     185          LDA A  CHNADR
00F1 I A0 04         186          SUB A  4,X          MAP CHANNEL MATCH CURRENT CHANNEL
00F3 I 27 2B         187          BEQ    NRML5        YES, PLACE ENTRY IN MAP
00F5 I 2A 05         188          BPL    NRMLE        JUMP IF NOT CONSECUTIVE ARTIFICIAL RTU'S
00F7 I 7C 0006 D     189          INC    MONCHN       RESTORE MONITOR CHANNEL COUNT
00FA I 20 93         190          BRA    NRML9
00FC I E6 04         191 NRMLE    LDA B  4,X          SET CURRENT
00FE I F7 0009 R     192          STA B  CHNADR       CHANNEL = MAP CHANNEL
0101 I 4A            193 NRML6    DEC A               CHANNEL MAP & RECORDING MASKS UPDATED
0102 I 2B 1C         194          BMI    NRML5        YES
0104 I FE 0001 D     195          LDX    NRMMPT       CLEAR CORRESPONDING
0107 I 6F 00         196          CLR    0,X          RECORDING MASK
0109 I 09            197          DEX                 ENTRY
010A I FF 0001 D     198          STX    NRMMPT       UPDATE PNTR
010D I FE 0003 D     199          LDX    NRMCMP
0110 I 6F 00         200          CLR    0,X          CLEAR STATION
0112 I 6F 01         201          CLR    1,X          NUMBER
0114 I C6 03         202          LDA B  #RTUCNC      SET UNUSED
0116 I E7 02         203          STA B  2,X          CHANNEL INDICATOR
0118 I 09            204          DEX
0119 I 09            205          DEX
011A I 09            206          DEX
011B I FF 0003 D     207          STX    NRMCMP       UPDATE CHANNEL MAP PNTR
011E I 20 E1         208          BRA    NRML6
0120 I FE 0001 R     209 NRML5    LDX    RCMPTR       PICK UP RECORDING #
0123 I A6 05         210          LDA A  5,X          FROM RECORDING MAP
0125 I FE 0001 D     211          LDX    NRMMPT       SET RECORDING #
0128 I A7 00         212          STA A  0,X          INTO
012A I 09            213          DEX                 RECORDING MASK
012B I FF 0001 D     214          STX    NRMMPT       TABLE
012E I FE 0001 R     215          LDX    RCMPTR       PICK UP TYPE FLAGS
0131 I A6 02         216          LDA A  2,X          FROM RECORDING MAP
0133 I 36            217          PSH A               SAVE TYPE FLAGS
0134 I A6 00         218          LDA A  0,X          PICK UP STATION
0136 I E6 01         219          LDA B  1,X          NUMBER FROM RECORDING MAP
0138 I FE 0003 D     220          LDX    NRMCMP       MOVE INTO
013B I A7 00         221          STA A  0,X          CHANNEL
```

```
013D I E7 01        222            STA B  1,X        MAP
013F I 32           223            PUL A             RESTORE TYPE FLAGS
0140 I 7D 0006 D    224            TST    MONCHN     LAST MONITOR CHANNEL
0143 I 26 02        225            BNE    NRMLF      NO
0145 I 8A 04        226            ORA A  #RTULCH    SET LAST CHANNEL INDICATOR
0147 I A7 02        227 NRMLF      STA A  2,X        SET TYPE FLAGS IN CHANNEL MAP
0149 I 09           228            DEX
014A I 09           229            DEX
014B I 09           230            DEX
014C I FF 0003 D    231            STX    NRMCMP     UPDATE CHANNEL MAP PNTR
014F I 86 06        232            LDA A  #RTMELN    SET PNTR TO
0151 I CE 0001 R    233            LDX    #RCMPTR    NEXT RECORDING MAP
NRMLST(A0011.02.046AA  CRS MULTIPLE RTU RECORDING)     08/04/78  10:13:10  PAGE   5

0154 I BD 0010 R    234            JSR    IDXRTN     ENTRY
0157 I 7A 0009 R    235            DEC    CHNADR     UPDATE CURRENT CHANNEL
015A I FE 0003 R    236            LDX    CURCSP
015D I A6 0C        237            LDA A  LCAST1,X
015F I 85 02        238            BIT A  #LSTMMO    MULTIPLE MONITOR REQUEST
0161 I 27 05        239            BEQ    NRMLG      NO, CHECK IF ALL CHANNELS PROCESSED
0163 I 7D 0006 D    240            TST    MONCHN     LAST MONITOR CHANNEL
0166 I 27 69        241            BEQ    NRML4      YES, SET REMAINDER OF CHANNELS UNUSED
0168 I 7D 0009 R    242 NRMLG      TST    CHNADR     LAST CHANNEL FOR THIS RTU
016B I 27 03        243            BEQ    NRML7      YES
016D I 7E 0080 I    244            JMP    NRML3      NO, CONTINUE
0170 I FE 0003 R    245 NRML7      LDX    CURCSP
0173 I B6 0008 R    246            LDA A  RTUADR     PICK UP CURRENT RTU ADDR
0176 I E6 10        247            LDA B  LCAMDE,X
0178 I C1 03        248            CMP B  #MODFIR    FIRE MODE ?
017A I 26 05        249            BNE    NRMLH      NO
017C I 7D 0000 D    250            TST    NRMCMC     LAST CHANNEL IN RECORDING MAP
017F I 2F 05        251            BLE    NRMLI      YES, SKIP RTU CHECK
0181 I B1 0008 D    252 NRMLH      CMP A  CRTUIM     RTU DATA ALREADY IN SATELLITE MEMORY
0184 I 27 33        253            BEQ    NRMLJ      YES, SKIP INPUT
0186 I B7 0008 D    254 NRMLI      STA A  CRTUIM     UPDATE CURRENT RTU IN MEMORY
0189 I 4D           255            TST A             ARTIFICIAL RTU ?
018A I 27 2D        256            BEQ    NRMLJ      YES, SKIP INPUT
018C I BD 0012 R    257            JSR    RCVMRT     INPUT RTU DATA
018F I FE 0003 R    258            LDX    CURCSP
0192 I A6 10        259            LDA A  LCAMDE,X
0194 I 81 03        260            CMP A  #MODFIR    FIRE MODE ?
0196 I 26 13        261            BNE    NRMLK      NO, ACKNOWLEDGE RTU DATA
0198 I B6 0000 D    262            LDA A  NRMCMC
019B I 4A           263            DEC A             JUMP IF PROCESSING LAST RTU
019C I 2B 0D        264            BMI    NRMLK      IN RECORDING MAP
019E I EE 00        265            LDX    0,X
01A0 I FF 0007 R    266            STX    STNADR     SAVE CURRENT SHOT POINT STATION ADDR
01A3 I BD 000F R    267            JSR    ADPENT     PICK UP ASSOCIATED RTU ADDRESS
01A6 I B1 0008 R    268            CMP A  RTUADR     CURRENT RTU CONTAIN SHOT POINT
01A9 I 27 0E        269            BEQ    NRMLJ      YES, DO NOT ACKNOWLEDGE RTU DATA
01AB I BD 0014 R    270 NRMLK      JSR    ACKTMO
01AE I CE 000C R    271            LDX    #RCTACK
01B1 I B6 0008 R    272            LDA A  RTUADR
01B4 I C6 01        273            LDA B  #RTUACK+DATACK
01B6 I BD 0013 R    274            JSR    RTUCMD     ACKNOWLEDGE
01B9 I 7D 0000 D    275 NRMLJ      TST    NRMCMC     LAST CHANNEL IN RECORDING MAP
01BC I 27 05        276            BEQ    NRMLL      YES, SETUP SCOPE CONTROL FOR SEISMIC DATA
01BE I 7D 0006 D    277            TST    MONCHN     LAST MONITOR CHANNEL
01C1 I 26 0B        278            BNE    NRMLM      NO
01C3 I B6 000D R    279 NRMLL      LDA A  MONSTS     PICK UP MONITOR STATUS WORD
01C6 I 8A 02        280            ORA A  #SCPSDT    SELECT SEISMIC DATA FOR SCOPE DISPLAY
01C8 I B7 000D R    281            STA A  MONSTS     PICK UP CURRENT STATUS OF CCD CLOCK START
01CB I B7 000E R    282            STA A  DATMON     SETUP DATA MONITOR CONTROL REGISTER
01CE I 86 01        283 NRMLM      LDA A  #1         SET CC FOR NOT LAST RTU
01D0 I 39           284            RTS               RETURN TO CALLER
01D1 I 7A 0009 R    285 NRML4      DEC    CHNADR     LAST CHANNEL FOR CURRENT RTU
01D4 I 2B 9A        286            BMI    NRML7      YES
01D6 I FE 0003 D    287            LDX    NRMCMP
01D9 I 6F 00        288            CLR    0,X        CLEAR CHANNEL MAP
01DB I 6F 01        289            CLR    1,X        STATION NUMBER
01DD I 86 03        290            LDA A  #RTUCNC    SET UNUSED
01DF I A7 02        291            STA A  2,X        CHANNEL INDICATOR
```

```
NRMLST(A0011.02.046AA  CRS MULTIPLE RTU RECORDING)     08/04/78  10:13:12  PAGE   6

01E1 I 09              292            DEX
01E2 I 09              293            DEX
01E3 I 09              294            DEX
01E4 I FF 0003 D       295            STX      NRMCMP      UPDATE CHANNEL MAP PNTR
01E7 I FE 0001 D       296            LDX      NRMMPT
01EA I 6F 00           297            CLR      0,X         CLEAR RECORDING
01EC I 09              298            DEX                  MASK ENTRY
01ED I FF 0001 D       299            STX      NRMMPT
01F0 I 20 DF           300            BRA      NRML4
                       301 *
0000 D                 302            DSEC
                       303 *
                       304 *     STORAGE REQUIREMENTS FOR 'NRMLST'
                       305 *
0000 D 00              306 NRMCMC     FCB      0           MAP ENTRY COUNT
0001 D 0000      A     307 NRMMPT     FDB      0           MASK TABLE PNTR
0003 D 0000      A     308 NRMCMP     FDB      0           RTU CHANNEL MAP PNTR
0005 D 00              309 MNHCHN     FCB      0           MONITOR HEADER CHANNEL COUNT
0006 D 00              310 MONCHN     FCB      0           MONITOR OUTPUT CHANNEL COUNT
0007 D 00              311 MNCHSV     FCB      0           NUMBER OF MONITOR CHANNELS REMAINING
0008 D 00              312 CRTUIM     FCB      0           CURRENT RTU IN SATELLITE MEMORY
0009 D                 313 RMSKTB     RMB      4           RECORDING MASK TABLE
000D D                 314 RMSKTE     EQU      *
                       315 *
                       316 *     FORMAT OF RTU CHANNEL MAP TABLE
                       317 *
                       318 *     BYTE  1-2 => STATION NUMBER
                       319 *             3 => TYPE FLAGS
000D D                 320 RTUCMT     RMB      12          RTU CHANNEL MAP TABLE
0019 D                 321 RTUCME     EQU      *
                       322 *
000A D                 323 RCMTM3     EQU      RTUCMT-3
0019 D                 324 RCTP12     EQU      RTUCMT+12
0016 D                 325 RCMTP9     EQU      RTUCMT+9
0008 D                 326 RMSKM1     EQU      RMSKTB-1
000C D                 327 RMSKP3     EQU      RMSKTB+3
000D D                 328 RMSKP4     EQU      RMSKTB+4
000B D                 329 RMSKP2     EQU      RMSKTB+2
                       330 *
0006 A                 331 RTMELN     EQU      6           # BYTES/ RECORDING MAP ENTRY
                       332 *
0019                   333            END
NRMLST(A0011.02.046AA  CRS MULTIPLE RTU RECORDING)     08/04/78  10:13:12  PAGE   7

   NO ERRORS
  ISECT LENGTH --    498
  DSECT LENGTH --     25

> ACKTMO     0014       96      96    270
> ADPENT     000F       94      94    139    267
> CHNADR     0009       89      89    135    155    185    192    235    242    285
  CRTUIM     0008 D    312      40    252    254
> CURCSP     0003       12      12     47     71    149    171    236    245    258
  DATACK     0001 A    101     273
> DATMON     000E       92      92    282
> DMNINI     0005       14      14     75    183
> IDXRTN     0010       94      94    234
  LCAMDE     0010 A     31      51    150    247    259
  LCAST1     000C A     19      48     50     72     74    172    237
  LCAST2     000D A     24      54
  LCAST3     000E A     27      57    175
  LS2NTP     0004 A     25      55
  LS3NDR     0002 A     28      58    176
  LSTCBP     0008 A     21     173
  LSTMMO     0002 A     22      49     73    238
  LSTTBP     0010 A     20      60
  MNCHSV     0007 D    311      70    160    169
< MNHCHN     0005 D    309       9     46     68    163    167
  MODFIR     0003 A     32      52    151    248    260
< MONCHN     0006 D    310       9     45     67    158    162    166    170    189    224    240    277
  MONMAX     0031 A     34      64    161
> MONSTS     000D       92      92    279    281
```

```
  NRL1      0033 I    60    56
  NRL1A     0037 I    62    53
  NRL2      0058 I    76    59
  NRL3      003A I    63    61
  NRL4      0055 I    75    66
< NRMCMC    0000 D   306     8    44   126   141   147   153   250   262   275
< NRMCMP    0003 D   308    82   133   199   207   220   231   287   295
< NRMINI    0000 I    38     7
  NRML1     0061 I   130   127
  NRML2     00AA I   158   152   154
  NRML3     0080 I   141   244
  NRML4     01D1 I   285   148   241   300
  NRML4A    0092 I   148   142
  NRML5     0120 I   209   187   194
  NRML6     0101 I   193   208
  NRML7     0170 I   245   243   286
  NRML8     0095 I   149   146
  NRML9     008F I   147   157   190
  NRMLA     00EB I   184   159
  NRMLB     00C7 I   170   165
  NRMLC     00D9 I   178   174
  NRMLD     00E8 I   183   177
  NRMLE     00FC I   191   188
  NRMLF     0147 I   227   225
  NRMLG     0168 I   242   239
  NRMLH     0181 I   252   249
  NRMLI     0186 I   254   251
  NRMLJ     01B9 I   275   253   256   269
  NRMLK     01AB I   270   261   264
NRMLST(A0011.02.046AA  CRS MULTIPLE RTU RECORDING)      08/04/78  10:13:13  PAGE   8

  NRMLL     01C3 I   279   276
  NRMLM     01CE I   283   278
< NRMLST    0059 I   125    80
< NRMMPT    0001 D   307    82   131   195   198   211   214   296   299
> RCMENT    0000      11    11    43    63
> RCMPTR    0001      11    11    42   136   143   184   209   215   233
> RCMSET    0006      15    15    39
> RCMSTR    0002      11    11    41
< RCMTM3    000A D   323    85
< RCMTP9    0016 D   325    85
> RCTACK    000C      91    91   271
< RCTP12    0019 D   324    85
> RCVMRT    0012      95    95   257
< RMSKM1    0008 D   326    87
< RMSKP2    000B D   329    86
< RMSKP3    000C D   327    86    86
< RMSKP4    000D D   328    86
< RMSKTB    0009 D   313    84   130   326   327   328   329
< RMSKTE    000D D   314    84
  RTMELN    0006 A   331   232
  RTUACK    0000 A   100   273
> RTUADR    0008      89    89   140   145   246   268   272
  RTUCBL    0001 A   106
  RTUCHE    0080 A   111
> RTUCMD    0013      95    95   274
< RTUCME    0019 D   321    83
< RTUCMT    000D D   320    83   132   323   324   325
  RTUCNC    0003 A   108   202   290
  RTUCNM    0000 A   105
  RTUCSK    0002 A   107
  RTULCH    0004 A   109   226
  RTUXME    0040 A   110
  SCPRFS    0000 A   115
  SCPSDT    0002 A   114   280
  SCPTMO    2710 A   113   180
> STNADR    0007      89    89   138   266
> TMRBCA    000A      90    90   179
> TMRBTV    000B      90    90   181
> TMRCDV    0011      95    95   182
> TWTINI    0004      14    14    62
```

```
CH.SET(A0011.02.047AA  CRS SINGLE RTU RECORDING)        08/04/78  11:12:04  PAGE   1

                  *
                  *      ROUTINE TO SET UP CHANNEL MAP AND RECORDING MASK FOR 'SNMT
                  *
0000 I                       ISEC
                  *
                             DEF    CHMSET
                             DEF    CHMRCN
                  *
                             REF    CURCSP
                             REF    RTUCMT,RMSKTB
                             REF    RCMTP9,RMSKP3
                             REF    RTUADR,CHNADR,STNADR
                             REF    STNAD2,STNSAV
                             REF    NRMCMC,NRMMPT,NRMCMP,CHKIDS
                  *
                             REF    SELIDX,CHKDEP,ADPSTN,ADPICP
                  *
                  *      LINE STATUS FLAGS
                  *
000C A            LCAST1     EQU    12            STATUS FLAG
0020 A            LSTPRG     EQU    $20           FIRE SEQUENCE PROGRAMMED
                  *
                  *
                  *      RTU CHANNEL MAP STATUS EQUATES
                  *
0000 A            RTUCNM     EQU    0             NORMAL CHANNEL
0001 A            RTUCBL     EQU    1             BLASTER
0002 A            RTUCSK     EQU    2             DEAD
0003 A            RTUCNC     EQU    3             UNUSED CHANNEL
0004 A            RTULCH     EQU    4             LAST RECORDING CHANNEL
                  *
                  *      CALLING SEQUENCE:  JSR  CHMSET
                  *
                  *      STNADR => STATION NUMBER TO BE TESTED
                  *      CHKIDS => DEPLOYMENT TABLE INDEX
                  *
                  *      RETURN SEQUENCE
                  *
                  *      RTUADR => RTU ADDRESS
                  *
0000 I            CHMSET     EQU    *
0000 I FE 000D R             LDX    CHKIDS
0003 I A6 01                 LDA A  1,X           SET RTU
0005 I B7 0005 R             STA A  RTUADR        ADDRESS
0008 I FE 0007 R  CHM2       LDX    STNADR        FIND
000B I FF 0009 R             STX    STNSAV        LAST CHANNEL
000E I 08                    INX                  ASSOCIATED WITH
000F I FF 0007 R             STX    STNADR        SPECIFIED RTU
0012 I BD 000E R             JSR    SELIDX        NEXT STATION OUTSIDE DEPLOYMENT MAP
0015 I 2B 0C                 BMI    CHM1          YES
0017 I BD 000F R             JSR    CHKDEP        STATION DEPLOYED
001A I 27 07                 BEQ    CHM1          NO
001C I A6 01                 LDA A  1,X
001E I B1 0005 R             CMP A  RTUADR        SAME RTU
0021 I 27 E5                 BEQ    CHM2          YES
0023 I FE 0009 R  CHM1       LDX    STNSAV
0026 I FF 0007 R             STX    STNADR
0029 I BD 000E R             JSR    SELIDX
CH.SET(A0011.02.047AA  CRS SINGLE RTU RECORDING)        08/04/78  11:12:05  PAGE   2

002C I BD 0010 R             JSR    ADPSTN
002F I F7 0006 R             STA B  CHNADR        SET CHANNEL NUMBER OF LAST CHANNEL
0032 I 86 04                 LDA A  #4
0034 I B7 000A R             STA A  NRMCMC
0037 I 7F 0000 D             CLR    CHMRCN        INIT RECIRDING #
003A I CE 0004 R             LDX    #RMSKP3
003D I FF 000B R             STX    NRMMPT
0040 I CE 0003 R             LDX    #RCMTP9
0043 I FF 000C R             STX    NRMCMP
0046 I B6 000A R  CHM4       LDA A  NRMCMC
0049 I B1 0006 R             CMP A  CHNADR        CHANNEL MATCH CURRENT CHANNEL
```

```
004C I 2C 03              BGE    CHM4A      JUMP IF NOT CONSECUTIVE ARTIFICIAL RTUS
004E I 7E 00DF I          JMP    CHM7       JUMP IF CONSECUTIVE ARTIFICIAL RTUS
0051 I 27 1F        CHM4A BEQ    CHM3       YES
0053 I FE 000B R          LDX    NRMMPT     SET RECORDING
0056 I 6F 00              CLR    0,X        MASK ENTRY
0058 I 09                 DEX               TO
0059 I FF 000B R          STX    NRMMPT     ZERO
005C I FE 000C R          LDX    NRMCMP
005F I 6F 00              CLR    0,X        CLEAR STATION
0061 I 6F 01              CLR    1,X        NUMBER
0063 I 86 03              LDA A  #RTUCNC    SET UNUSED
0065 I A7 02              STA A  2,X        CHANNEL INDICATOR
0067 I 09                 DEX
0068 I 09                 DEX
0069 I 09                 DEX
006A I FF 000C R          STX    NRMCMP     UPDATE CHANNEL MAP PNTR
006D I 7A 000A R    CHMB  DEC    NRMCMC
0070 I 20 D4              BRA    CHM4
0072 I B6 0007 R    CHM3  LDA A  STNADR
0075 I F6 0008 R          LDA B  STNAD2
0078 I FE 000C R          LDX    NRMCMP
007B I A7 00              STA A  0,X        MOVE STATION
007D I E7 01              STA B  1,X        NUMBER INTO CHANNEL MAP
007F I C6 01              LDA B  #RTUCBL    ANTICIPATE BLAST CHANNEL
0081 I FE 0000 R          LDX    CURCSP
0084 I A6 0C              LDA A  LCAST1,X
0086 I 85 20              BIT A  #LSTPRG
0088 I 27 07              BEQ    CHMD
008A I EE 00              LDX    0,X
008C I BC 0007 R          CPX    STNADR     BLAST CHANNEL
008F I 27 0A              BEQ    CHM5       YES
0091 I 5F           CHMD  CLR B             ANTICIPATE NORMAL CHANNEL
0092 I FE 000D R          LDX    CHKIDS
0095 I 6D 00              TST    0,X        NORMAL CHANNEL
0097 I 2A 02              BPL    CHM5       YES
0099 I C6 02              LDA B  #RTUCSK    SET DEAD CHANNEL INDICATOR
009B I FE 000C R    CHM5  LDX    NRMCMP     SET TYPE
009E I 7A 0006 R          DEC    CHNADR     LAST CHANNEL
00A1 I 2E 02              BGT    CHM9       NO
00A3 I CA 04              ORA B  #RTULCH    SET LAST RECORDING CH
00A5 I E7 02        CHM9  STA B  2,X        FLAGS
00A7 I 09                 DEX
00A8 I 09                 DEX
00A9 I 09                 DEX
00AA I FF 000C R          STX    NRMCMP
00AD I B6 0000 D          LDA A  CHMRCN     SET RECORDING #
00B0 I 4C                 INC A
```

..1SET(A0011.02.047AA CRS SINGLE RTU RECORDING) 08/04/78 11:12:06 PAGE 3

```
00B1 I B7 0000 D          STA A  CHMRCN
00B4 I FE 000B R          LDX    NRMMPT     IN RECORDING
00B7 I A7 00              STA A  0,X        MASK
00B9 I 09                 DEX
00BA I FF 000B R          STX    NRMMPT
00BD I 7D 0006 R          TST    CHNADR     LAST CHANNEL
00C0 I 26 01              BNE    CHM6       NO
00C2 I 39           CHM8  RTS               RETURN TO CALLER
00C3 I FE 0007 R    CHM6  LDX    STNADR     COMPUTE
00C6 I 09                 DEX               NEXT STATION
00C7 I FF 0007 R          STX    STNADR     NUMBER
00CA I BD 000E R          JSR    SELIDX     STATION OUTSIDE DEPLOYMENT MAP
00CD I 2B 10              BMI    CHM7       YES
00CF I BD 000F R          JSR    CHKDEP     STATION DEPLOYED
00D2 I 27 0B              BEQ    CHM7       NO
00D4 I BD 0011 R          JSR    ADPICP     PICK UP RTU ADDRESS
00D7 I F7 0006 R          STA B  CHNADR     SET CHANNEL
00DA I B1 0005 R          CMP A  RTUADR     SAME RTU
00DD I 27 8E              BEQ    CHMB       YES
00DF I FE 000C R    CHM7  LDX    NRMCMP
00E2 I E6 05              LDA B  5,X
00E4 I CA 04              ORA B  #RTULCH    SET LAST RECORDING
00E6 I E7 05              STA B  5,X        CHANNEL INDICATOR
00E8 I 7A 000A R    CHMA  DEC    NRMCMC     LAST CHANNEL
00EB I 27 D5              BEQ    CHM8       YES
```

```
00ED I FE 000C R   143          LDX    NRMCMP      SET UP
00F0 I 6F 00       144          CLR    0,X         CHANNEL
00F2 I 6F 01       145          CLR    1,X         MAP FOR UNUSED
00F4 I C6 03       146          LDA B  #RTUCNC     CHANNEL
00F6 I E7 02       147          STA B  2,X
00F8 I 09          148          DEX
00F9 I 09          149          DEX
00FA I 09          150          DEX
00FB I FF 000C R   151          STX    NRMCMP
00FE I FE 000B R   152          LDX    NRMMPT      CLEAR RECORDING
0101 I 6F 00       153          CLR    0,X         MASK
0103 I 09          154          DEX                ENTRY
0104 I FF 000B R   155          STX    NRMMPT
0107 I 20 DF       156          BRA    CHMA
                   157 *
0000 D             158          DSEC
                   159 *
0000 D 00          160 CHMRCN   FCB    0
                   161 *
0001               162          END
CHMSET(A0011.02.047AA  CRS SINGLE RTU RECORDING)      08/04/78  11:12:07  PAGE   4

  NO ERRORS
 ISECT LENGTH --   265
 DSECT LENGTH --     1

> ADPICP    0011     17    17   133
> ADPSTN    0010     17    17    60
> CHKDEP    000F     17    17    52   131
> CHKIDS    000D     15    15    43   103
  CHM1      0023 I   57    51    53
  CHM2      0008 I   46    56
  CHM3      0072 I   89    73
  CHM4      0046 I   69    88
  CHM4A     0051 I   73    71
  CHM5      009B I  107   101   105
  CHM6      00C3 I  126   124
  CHM7      00DF I  137    72   130   132
  CHM8      00C2 I  125   142
  CHM9      00A5 I  111   109
  CHMA      00E8 I  141   156
  CHMB      006D I   87   136
  CHMD      0091 I  102    98
< CHMRCN    0000 D  160     8    64   116   118
< CHMSET    0000 I   42     7
> CHNADR    0006     13    13    61    70   108   123   134
> CURCSP    0000     10    10    95
  LCAST1    000C A   21    96
  LSTPRG    0020 A   22    97
> NRMCMC    000A     15    15    63    69    87   141
> NRMCMP    000C     15    15    68    78    86    91   107   115   137   143   151
> NRMMPT    000B     15    15    66    74    77   119   122   152   155
> RCMTP9    0003     12    12    67
> RMSKP3    0004     12    12    65
> RMSKTB    0002     11    11
> RTUADR    0005     13    13    45    55   135
  RTUCBL    0001 A   28    94
> RTUCMT    0001     11    11
  RTUCNC    0003 A   30    81   146
  RTUCNM    0000 A   27
  RTUCSK    0002 A   29   106
  RTULCH    0004 A   31   110   139
> SELIDX    000E     17    17    50    59   129
> STNAD2    0008     14    14    90
> STNADR    0007     13    13    46    49    58    89   100   126   128
> STNSAV    0009     14    14    47    57
RTSTAT(A0011.02.048AA  CRS SAMPLE RATE SETUP)      08/04/78  11:13:23  PAGE   1

                   2 *
                   3 *     ROUTINE TO SETUP RTU STATE
                   4 *
0000 I             5          ISEC
                   6 *
                   7          DEF    RTSTAT
```

```
                       8 *
                       9          REF    TSWSPR,CMDFAR
                      10 *
0000 A                11 STS4MS   EQU    0           4 MSEC SAMPLE RATE
0010 A                12 STS2MS   EQU    $10         2 MSEC SAMPLE ARTE
                      13 *
                      14 *
                      15 *      CALLING SEQUENCE:  JSR  RTSTAT
                      16 *
                      17 *      ACCA => STATUS COMMAND AND ACTIVATE OR DEACTIVATE INDICATORS
                      18 *
0000 I                19 RTSTAT   EQU    *
0000 I 36             20          PSH A              SAVE STATUS COMMAND
0001 I C6 00          21          LDA B  #STS4MS     ANTICIPATE 4 MSEC SAMPLE RATE
0003 I B6 0000 R      22          LDA A  TSWSPR      PICK UP SAMPLE RATE SWITCH SETTING
0006 I 81 04          23          CMP A  #4          4 MILLISECONDS
0008 I 2C 02          24          BGE    RTST1
000A I C6 10          25          LDA B  #STS2MS     2 MILLISECONDS
000C I 32             26 RTST1    PUL A
000D I 1B             27          ABA
000E I F6 0001 R      28          LDA B  CMDFAR      INCLUDE
0011 I C4 07          29          AND B  #$7         BLOCK
0013 I 1B             30          ABA                FACTOR
0014 I 39             31          RTS                RETURN TO CALLER
0015                  32          END
RTS..AT(A0011.02.048AA  CRS SAMPLE RATE SETUP)         08/04/78  11:13:24  PAGE   2

  NO ERRORS
 ISECT LENGTH --    21
 DSECT LENGTH --     0

> CMDFAR    0001      9       9     28
  RTST1     000C I   26      24
< RTSTAT    0000 I   19       7
  STS2MS    0010 A   12      25
  STS4MS    0000 A   11      21
> TSWSPR    0000      9       9     22
LITEON(A0011.02.049AA  CRS PANEL LITE DRIVER)          08/04/78  11:14:28  PAGE   1

                       2 *
                       3 *      ROUTINE TO TURN ON AND OFF KEYBOARD LITES
                       4 *
0000 I                 5          ISEC
                       6 *
                       7          DEF    LITEON,LITOFF
                       8          DEF    LITON,LITOF
                       9 *
                      10          REF    CURCSP
                      11          REF    AUXSPL
                      12          REF    AUXSAV
                      13 *
                      14 *      LINE CONTROL STORAGE OFFSETS
                      15 *
0013 A                16 LCASPL   EQU    19          KEYBOARD LITES
                      17 *
                      18 *      CALLING SEQUENCE:
                      19 *
                      20 *      ACCA => LITE MASK FOR LITES TO BE TURNED ON OR OFF
                      21 *
                      22 *      ENTRY LITEON: TURN ON SPECIFIED LITES
                      23 *      ENTRY LITOFF: TURN OFF SPECIFIED LITES
                      24 *
0000 I                25 LITEON   EQU    *
0000 I FE 0000 R      26          LDX    CURCSP
0003 I                27 LITON    EQU    *
0003 I AA 13          28          ORA A  LCASPL,X    ON
0005 I 20 06          29          BRA    LIT1
0007 I                30 LITOFF   EQU    *
0007 I FE 0000 R      31          LDX    CURCSP
000A I                32 LITOF    EQU    *
000A I 43             33          COM A              TURN LITES
000B I A4 13          34          AND A  LCASPL,X    TURN LITES OFF
000D I A7 13          35 LIT1     STA A  LCASPL,X    SAVE LITE STATUS
```

```
 000F I B7 0001 R    36          STA A  AUXSPL       OUTPUT COMMAND TO KEYBOARD
 0012 I 39           37          RTS                 RETURN TO CALLER
 0013                38          END
LITEON(A0011.02.049AA  CRS PANEL LITE DRIVER)          08/04/78  11:14:28  PAGE   2

   NO ERRORS
 ISECT LENGTH --    19
 DSECT LENGTH --    0

> AUXSAV    0002      12      12
> AUXSPL    0001      11      11    36
> CURCSP    0000      10      10    26    31
  LCASPL    0013 A    16      28    34    35
  LIT1      000D I    35      29
< LITEON    0000 I    25       7
< LITOF     000A I    32       8
< LITOFF    0007 I    30       7
< LITON     0003 I    27       8
DLPUPD(A0011.02.050AA  CRS DEPLOYMENT PATTERN)         08/04/78  11:15:40  PAGE   1
```

```
                      2 *
                      3 *      ROUTINE TO UPDATE DEPLOYMENT LITE PATTERN
                      4 *
 0000 I               5           ISEC
                      6 *
                      7           DEF    DLPUPD
                      8 *
                      9           REF    SAVDT2
                     10           REF    DPAVAL
                     11           REF    XT01,XT02
                     12 *
                     13           REF    IDXRTN,DPADDR,RSTRID,UDBTFP,BYTBIT,BYTBP3
                     14 *
                     15 *      DEPLOYMENT TABLE OFFSETS
                     16 *
 0006 A              17 DPTDT1    EQU    6            DEPLOYMENT TABLE 1
 0196 A              18 DPTLPT    EQU    406          DEPLOYMENT LITE PATTERN
                     19 *
                     20 *
                     21 *      CALLING SEQUENCE:  JSR  DLPUPD
                     22 *
                     23 *      IDX => PNTR TO START OF DEPLOYMENT TABLE
                     24 *
 0000 I              25 DLPUPD    EQU    *
 0000 I FF 0003 R    26           STX    XT02         SET PNTR TO DEPLOYMENT LITE PATTERN
 0003 I FF 0002 R    27           STX    XT01         SET PNTR
 0006 I CE 0003 R    28           LDX    #XT02        TO START
 0009 I 86 06        29           LDA A  #DPTDT1      OF DEPLOYMENT
 000B I BD 0004 R    30           JSR    IDXRTN       TABLE
 000E I FE 0003 R    31           LDX    XT02
 0011 I FF 0000 R    32           STX    SAVDT2       SAVE PNTR TO START OF DEPLOYMENT TABLE
 0014 I CE 0002 R    33           LDX    #XT01        SET
 0017 I FF 0001 R    34           STX    DPAVAL       PNTR TO
 001A I CE 0196 A    35           LDX    #DPTLPT      DEPLOYMENT LITE
 001D I BD 0005 R    36           JSR    DPADDR       PATTERN
 0020 I 86 64        37           LDA A  #100         UPDATE DEPLOYMENT
 0022 I C6 01        38           LDA B  #1           SET DEPLOYMENT INDICATOR
 0024 I BD 0008 R    39           JSR    BYTBIT       LITE PATTERN
 0027 I 86 64        40           LDA A  #100         UPDATE NEXT SECTION
 0029 I BD 0009 R    41           JSR    BYTBP3       OF DEPLOYMENT LITE PATTERN
 002C I BD 0006 R    42           JSR    RSTRID       UPDATE DEPLOYMENT INDEX
 002F I FE 0000 R    43           LDX    SAVDT2       SET UP
 0032 I BD 0007 R    44           JSR    UDBTFP       BAD TEST FLASH PATTERN
 0035 I 39           45           RTS
 0036                46           END
DLPUPD(A0011.02.050AA  CRS DEPLOYMENT PATTERN)         08/04/78  11:15:41  PAGE   2

   NO ERRORS
 ISECT LENGTH --    54
 DSECT LENGTH --    0

> BYTBIT    0008      13      13    39
> BYTBP3    0009      13      13    41
< DLPUPD    0000 I    25       7
```

```
> DPADDR    0005      13    13    36
> DPAVAL    0001      10    10    34
  DPTDT1    0006 A    17    29
  DPTLPT    0196 A    18    35
> IDXRTN    0004      13    13    30
> RSTRID    0006      13    13    42
> SAVDT2    0000       9     9    32    43
> UDBTFP    0007      13    13    44
> XT01      0002      11    11    27    33
> XT02      0003      11    11    26    28    31
UDBTFP(A0011.02.051AA  CRS BAD TEST FLASH PATTERN)      08/04/78  11:16:49  PAGE   1

                           2 *
                           3 *       ROUTINE TO SETUP BAD TEST FLASH PATTERN
                           4 *
 0000 I                    5           ISEC
                           6 *
                           7           DEF    UDBTFP
                           8 *
                           9           REF    XT01,XT02
                          10 *
                          11           REF    IDXRTN
                          12           REF    BYTBIT
                          13 *
                          14 *
                          15 *       DEPLOYMENT TABLE FLAGS
                          16 *
 0080 A                   17 DTBSKP    EQU    $80            DEAD STATION
 0040 A                   18 DTBNTE    EQU    $40            NORMAL TEST ERROR
                          19 *
                          20 *       DEPLOYMENT TABLE OFFSETS
                          21 *
 0196 A                   22 DPTLPT    EQU    406            DEPLOYMENT LITE PATTERN
 01B0 A                   23 DPTBTF    EQU    432            BAD TEST FLASH PATTERN
                          24 *
                          25 *
                          26 *       CALLING SEQUENCE:  JSR  UDBTFP
                          27 *
                          28 *       IDX => PNTR TO START OF DEPLOYMENT TABLE
                          29 *
 0000 I                   30 UDBTFP    EQU    *
 0000 I FF 0000 R         31           STX    XT01           SAVE PNTR TO START OF DEPLOYMENT TABLE
 0003 I CE 0000 A         32           LDX    #0             SET PNTR
 0006 I FF 0001 R         33           STX    XT02           TO START OF PSEUDO TABLE AREA
 0009 I FE 0000 R         34 UDB2      LDX    XT01           PICK UP STATUS
 000C I A6 00             35           LDA A  0,X            FLAGS FROM DEPLOYMENT TABLE
 000E I 08                36           INX                   SET PNTR
 000F I 08                37           INX                   TO NEXT DEPLOYMENT
 0010 I FF 0000 R         38           STX    XT01           TABLE ENTRY
 0013 I 85 40             39           BIT A  #DTBNTE        NORMAL TEST ERROR FLAG SET
 0015 I 26 01             40           BNE    UDB1           YES
 0017 I 4F                41           CLR A                 SET GOOD ENTRY INDICATOR
 0018 I FE 0001 R         42 UDB1      LDX    XT02           PLACE ENTRY
 001B I A7 00             43           STA A  0,X            IN BYTE TABLE
 001D I 08                44           INX                   INCR BYTE
 001E I FF 0001 R         45           STX    XT02           TABLE PNTR
 0021 I 8C 00C8 A         46           CPX    #200           END-OF-TABLE
 0024 I 26 E3             47           BNE    UDB2           NO
 0026 I 86 1A             48           LDA A  #DPTBTF-DPTLPT
 0028 I CE 0000 R         49           LDX    #XT01          SET PNTR TO START OF
 002B I BD 0002 R         50           JSR    IDXRTN         BAD TEST FLASH PATTERN
 002E I CE 0000 A         51           LDX    #0             SET PNTR TO
 0031 I FF 0001 R         52           STX    XT02           START OF BYTE TABLE
 0034 I 5F                53           CLR B                 SET SINGLE BYTE TABLE INDICATOR
 0035 I 86 64             54           LDA A  #100
 0037 I BD 0003 R         55           JSR    BYTBIT
 003A I 86 64             56           LDA A  #100
 003C I BD 0003 R         57           JSR    BYTBIT
 003F I 39                58           RTS                   RETURN TO CALLER
 0040                     59           END
UDBTFP(A0011.02.051AA  CRS BAD TEST FLASH PATTERN)      08/04/78  11:16:51  PAGE   2

  NO ERRORS
ISECT LENGTH --     64
```

```
 DSECT LENGTH --      0

> BYTBIT     0003     12      12     55     57
  DPTBTF     01B0 A   23      48
  DPTLPT     0196 A   22      48
  DTBNTE     0040 A   18      39
  DTBSKP     0080 A   17
> IDXRTN     0002     11      11     50
  UDB1       0018 I   42      40
  UDB2       0009 I   34      47
< UDBTFP     0000 I   30       7
> XT01       0000      9       9     31     34     38     49
> XT02       0001      9       9     33     42     45     52
USPRTN(A0011.02.052AA  CRS SHOOTER PATTERN UPDATE)      08/04/78  11:18:23  PAGE   1

                           2 *
                           3 *      ROUTINE TO UPDATE SHOOTER PATTERN DISPLAY
                           4 *
 0000 I                    5            ISEC
                           6 *
                           7            DEF     USPRTN
                           8 *
                           9            REF     CURCSP,STNADR
                          10            REF     DEPIDX,LOOPFG
                          11            REF     PRGESN,PRGDBS
                          12            REF     MSGRQT
                          13            REF     PIAKCR
                          14 *
                          15            REF     SELIDX,CHKDEP,IMPREP,MSGOUT
                          16 *
                          17 *      KEYBOARD INTERRUPT MASK
                          18 *
 003E A                   19 INTMSK     EQU     $3E
 003F A                   20 INTENB     EQU     $3F
                          21 *
                          22 *      MESSAGE REQUEST EQUATES
                          23 *
 0080 A                   24 MSGTCV     EQU     $80           CONVERT AND DISPLAY OLD VALUE
 0040 A                   25 MSGTIP     EQU     $40           INPUT AND DISPLAY NEW VALUE
 0020 A                   26 MSGTBF     EQU     $20           SET BLANK FLAG
                          27 *
 0000 I                   28 USPRTN     EQU     *
 0000 I 86 3E             29            LDA A   #INTMSK       MASK KEYBOARD
 0002 I B7 0007 R         30            STA A   PIAKCR        INTERRUPTS
 0005 I FE 0000 R         31            LDX     CURCSP        SET UP
 0008 I EE 00             32            LDX     0,X           SHOT POINT
 000A I FF 0001 R         33            STX     STNADR        STATION ADDR
 000D I BD 0008 R         34            JSR     SELIDX        COMPUTE 0-99
 0010 I BD 0009 R         35            JSR     CHKDEP        DEPLOYMENT TABLE INDEX
 0013 I B6 0002 R         36            LDA A   DEPIDX        PICK UP INDEX
 0016 I F6 0003 R         37            LDA B   LOOPFG        SPT IN UPPER HALF
 0019 I 26 02             38            BNE     USP1          UYSE
 001B I 8B 64             39            ADD A   #100          SET INDEX FOR LOWER HALF
 001D I BD 000A R         40 USP1       JSR     IMPREP        UPDATE SHOOTER PATTERN
 0020 I 86 3F             41            LDA A   #INTENB       ENABLE KEYBOARD INTERRUPTS
 0022 I B7 0007 R         42            STA A   PIAKCR
 0025 I CE 0004 R         43            LDX     #PRGESN       SET ENERGY SOURCE
 0028 I FF 0006 R         44            STX     MSGRQT        POINT #
 002B I C6 E0             45            LDA B   #MSGTIP+MSGTCV+MSGTBF
 002D I BD 000B R         46            JSR     MSGOUT
 0030 I CE 0005 R         47            LDX     #PRGDBS       SET
 0033 I FF 0006 R         48            STX     MSGRQT
 0036 I C6 E0             49            LDA B   #MSGTIP+MSGTCV+MSGTBF
 0038 I BD 000B R         50            JSR     MSGOUT
 003B I 39                51            RTS                   RETURN TO CALLER
 003C                     52            END
 USPRTN(A0011.02.052AA  CRS SHOOTER PATTERN UPDATE)      08/04/78  11:18:24  PAGE   2

   NO ERRORS
  ISECT LENGTH --     60
  DSECT LENGTH --      0

> CHKDEP     0009      15      15     35
```

```
> CURCSP    0000      9     9    31
> DEPIDX    0002     10    10    36
> IMPREP    000A     15    15    40
  INTENB    003F A   20    41
  INTMSK    003E A   19    29
> LOOPFG    0003     10    10    37
> MSGOUT    000B     15    15    46    50
> MSGRQT    0006     12    12    44    48
  MSGTBF    0020 A   26    45    49
  MSGTCV    0080 A   24    45    49
  MSGTIP    0040 A   25    45    49
> PIAKCR    0007     13    13    30    42
> PRGDBS    0005     11    11    47
> PRGESN    0004     11    11    43
> SELIDX    0008     15    15    34
> STNADR    0001      9     9    33
  USP1      001D I   40    38
< USPRTN    0000 I   28     7
PTBCNV(A0011.02.053AA  CRS TIME BREAK AND PARITY)      08/04/78  11:19:26  PAGE   1

                     2 *
                     3 *      ROUTINE TO CONVERT TIME BREAK AND PARITY VALUES FOR DISPLAY
                     4 *
 0000 I              5          ISEC
                     6 *
                     7          DEF     PTBCNV
                     8 *
                     9          REF     NDMXM1,NDMXM2
                    10          REF     HEXVL1
                    11 *
                    12          REF     BINDEC
                    13          REF     ASL4
                    14 *
                    15 *
                    16 *
                    17 *      ACCB => PARITY COUNT OR TIME BREAK
                    18 *
 0000 I             19 PTBCNV   EQU     *
 0000 I C1 63       20          CMP B   #99          MAXIMUM PARITY COUNT EXCEEDED
 0002 I 23 02       21          BLS     PCT1         NO
 0004 I C6 63       22          LDA B   #99          SET TO MAX VALUE
 0006 I CE 0002 R   23 PCT1     LDX     #HEXVL1      STORE COUNT OFR
 0009 I E7 00       24          STA B   0,X          CONVERSION
 000B I 86 82       25          LDA A   #$82         SET # DIGITS
 000D I BD 0003 R   26          JSR     BINDEC       CONVERT PARITY COUNT
 0010 I F6 0000 R   27          LDA B   NDMXM1       PICK UP
 0013 I B6 0001 R   28          LDA A   NDMXM2       ASCII DIGITS
 0016 I BD 0004 R   29          JSR     ASL4
 0019 I C4 0F       30          AND B   #$F          CONVERT
 001B I 1B          31          ABA                  TO BCD
 001C I 39          32          RTS
 001D               33          END
PTBCNV(A0011.02.053AA  CRS TIME BREAK AND PARITY)      08/04/78  11:19:26  PAGE   2

   NO ERRORS
  ISECT LENGTH --    29
  DSECT LENGTH --    0

> ASL4      0004     13    13    29
> BINDEC    0003     12    12    26
> HEXVL1    0002     10    10    23
> NDMXM1    0000      9     9    27
> NDMXM2    0001      9     9    28
  PCT1      0006 I   23    21
< PTBCNV    0000 I   19     7
PCTUPD(A0011.02.054AA  CRS RF PARITY COUNT DISPLAY)    08/04/78  11:20:24  PAGE   1

                     2 *
                     3 *      ROUTINE TO UPDATE PARITY DISPLAY FROM SATELLITE PARITY COUNT
                     4 *
 0000 I              5          ISEC
                     6 *
                     7          DEF     PCTUPD
                     8 *
```

```
                      9         REF    CURCSP
                     10         REF    AUXPAR
                     11         REF    PTBCNV
                     12 *
 0011 A              13 LCAPAR  EQU    17          PARITY COUNT
                     14 *
                     15 *
                     16 *     CALLING SEQUENCE: JSR PCTUPD
                     17 *
                     18 *     ACCB => HEX CRS PARITY COUNT
                     19 *
 0000 I              20 PCTUPD  EQU    *
 0000 I BD 0002 R    21         JSR    PTBCNV      CONVERT PARITY CNT FOR DISPLAY
 0003 I FE 0000 R    22         LDX    CURCSP
 0006 I A7 11        23         STA A  LCAPAR,X    OUTPUT PARITY
 0008 I B7 0001 R    24         STA A  AUXPAR      COUNT TO PANEL
 000B I 39           25         RTS
 000C                26         END
PCTUPD(A0011.02.054AA  CRS RF PARITY COUNT DISPLAY)     08/04/78  11:20:25  PAGE   2

  NO ERRORS
 ISECT LENGTH --    12
 DSECT LENGTH --    0

> AUXPAR    0001     10     10    24
> CURCSP    0000      9      9    22
  LCAPAR    0011 A   13     23
< PCTUPD    0000 I   20      7
> PTBCNV    0002     11     11    21
RSTRID(A0011.02.055AA  CRS ROLL-ALONG INDEX UPDATE)     08/04/78  11:21:27  PAGE   1

                      2 *
                      3 *     ROUTINE TO UPDATE ROLL-ALONG PANEL DISPLAY INDEXES
                      4 *
 0000 I               5         ISEC
                      6 *
                      7         DEF    RSTRID
                      8 *
                      9         REF    CURCSP
                     10         REF    SAVDTI
                     11         REF    ROLLTU
                     12         REF    ROLUTU
                     13 *
                     14 *
 0014 A              15 LCADPM  EQU    20          ADDR OF START OF DEPLOYMENT MAP
                     16 *
                     17 *
 0000 I              18 RSTRID  EQU    *
 0000 I FE 0000 R    19         LDX    CURCSP
 0003 I EE 14        20         LDX    LCADPM,X
 0005 I 08           21         INX
 0006 I 08           22         INX
 0007 I FF 0001 R    23         STX    SAVDTI
 000A I CE 0003 R    24         LDX    #ROLUTU
 000D I FF 0000 D    25         STX    UPDIAD
 0010 I 8D 11        26         BSR    UPDIDX
 0012 I FE 0001 R    27         LDX    SAVDTI
 0015 I 08           28         INX
 0016 I 08           29         INX
 0017 I FF 0001 R    30         STX    SAVDTI
 001A I CE 0002 R    31         LDX    #ROLLTU
 001D I FF 0000 D    32         STX    UPDIAD
 0020 I 8D 01        33         BSR    UPDIDX
 0022 I 39           34         RTS
                     35 *
                     36 *     ROUTINE TO UPDATE ROLL-ALONG INDEXES
                     37 *
                     38 *
                     39         DEF    UPDIDX
                     40         DEF    UPDIAD
                     41 *
                     42         REF    NDMXM2,NDMXM3
                     43 *
                     44         REF    ASL4
```

```
                       45            REF    BINDEC
                       46 *
                       47 *      MAXIMUM # DIGITS FOR DEPLOY PARAMETERS
                       48 *
 0004 A                49 STNNDG     EQU    4
                       50 *
                       51 *
                       52 *      CALLING SEQUENCE:
                       53 *
                       54 *      SAVDTI => PNTR TO HEX INDEX VALUE
                       55 *      UPDIAD =>ADDR OF TENS/UNIT DISPLAY
                       56 *
 0023 I                57 UPDIDX     EQU    *
 0023 I 86 04          58            LDA A  #STNNDG
 0025 I FE 0001 R      59            LDX    SAVDTI      CONVERT HEX
RSTRID(A0011.02.055AA  CRS ROLL-ALONG INDEX UPDATE)    08/04/78  11:21:28  PAGE   2

 0028 I BD 0007 R      60            JSR    BINDEC      TO ASCII DECIMAL
 002B I CE 0004 R      61            LDX    #NDMXM2
 002E I A6 00          62            LDA A  0,X         TENS
 0030 I E6 01          63            LDA B  1,X         UNITS
 0032 I BD 0006 R      64            JSR    ASL4
 0035 I C4 0F          65            AND B  #$F         TENS AND
 0037 I 1B             66            ABA                UNITS
 0038 I FE 0000 D      67            LDX    UPDIAD
 003B I A7 00          68            STA A  0,X         SET TENS/UNITS
 003D I CE 0005 R      69            LDX    #NDMXM3
 0040 I A6 00          70            LDA A  0,X
 0042 I BD 0006 R      71            JSR    ASL4
 0045 I FE 0000 D      72            LDX    UPDIAD      SET IN
 0048 I 09             73            DEX
 0049 I A7 00          74            STA A  0,X         HUNDREDS DIGIT
 004B I 39             75            RTS                RETURN TO CALLER
                       76 *
 0000 D                77            DSEC
 0000 D 0000    A      78 UPDIAD     FDB    0           ADDR OF TENS/UNITS DISPLAY OF INDEX
 0002                  79            END
RSTRID(A0011.02.055AA  CRS ROLL-ALONG INDEX UPDATE)    08/04/78  11:21:29  PAGE   3

   NO ERRORS
 ISECT LENGTH --     76
 DSECT LENGTH --     2

> ASL4       0006     44     44     64     71
> BINDEC     0007     45     45     60
> CURCSP     0000      9      9     19
  LCADPM     0014 A   15     20
> NDMXM2     0004     42     42     61
> NDMXM3     0005     42     42     69
> ROLLTU     0002     11     11     31
> ROLUTU     0003     12     12     24
< RSTRID     0000 I   18      7
> SAVDTI     0001     10     10     23     27     30     59
  STNNDG     0004 A   49     58
  UPDIAD     0000 D   78     25     32     40     67     72
  UPDIDX     0023 I   57     26     33     39
SEQTST(A0011.02.056AA  CRS SPREAD DEPLOYMENT CHECK)    08/04/78  11:22:28  PAGE   1

 0000 I                 2            ISEC
                        3 *
                        4            DEF    SEQTST,SDPCHK
                        5            DEF    BLASKP
                        6            DEF    SNDMSG
                        7 *
                        8            REF    CLRDSP
                        9            REF    CURCSP
                       10            REF    STNADR,STNFLD
                       11            REF    NUML
                       12            REF    MPRSTG
                       13            REF    BNDSTR,BNDEND
                       14            REF    NUMMSG
                       15 *
                       16            REF    BNDSET,SELIDX,ADPSTN,BINDEC,MPRRST
```

```
                                REF     EXECTV,CHKDEP,DISPLY,IDXRTN
                        *
0010 A                  LCAMDE  EQU     16              LINE MODE
0001 A                  MODPLY  EQU     1               DEPLOY MODE
                        *
                        *
                        *       MAXIMUM NUMBER DIGITS FOR DEPLOY PARAMS
                        *
0004 A                  STNNDG  EQU     4               STATION NUMBER
                        *
                        *
                        *       ROUTINE TO CHECK IF ALL RTUS IN FIRE SEQUENCE DEPLOYED
                        *
                        *       RETURN SEQUENCE:
                        *
                        *       CC => 0 - VALID FIRE SEQUENCE
                        *          - NON-ZERO - INVALID FIRE SEQUENCE
                        *
0000 I                  SEQTST  EQU     *
0000 I FE 0001 R                LDX     CURCSP
0003 I BD 0009 R                JSR     BNDSET          COMPUTE SPREAD BOUNDARIES
0006 I FE 0006 R        SEQ1    LDX     BNDSTR          PICK UP STATION NUMBER
0009 I FF 0002 R                STX     STNADR          STATION NUMBER
000C I BD 000A R                JSR     SELIDX          WITHIN DEPLOYMENT TABLE ?
000F I 2B 15                    BMI     SEQX            NO
0011 I BD 000F R                JSR     CHKDEP          STATION DEPLOYED ?
0014 I 27 11                    BEQ     SEQN            NO
0016 I 86 01                    LDA A   #1              INCREMENT
0018 I CE 0006 R                LDX     #BNDSTR         TO NEXT
001B I BD 0011 R                JSR     IDXRTN          STATION
001E I FE 0002 R                LDX     STNADR          DEPLOYMENT TEST
0021 I BC 0007 R                CPX     BNDEND          COMPLETE ?
0024 I 26 E0                    BNE     SEQ1            NO
0026 I 39               SEQX    RTS                     RETURN TO CALLER
0027 I 4C               SEQN    INC A                   SET CC FOR NOT DEPLOYED RETURN
0028 I 39                       RTS                     RETURN TO CALLER
                        *
                        *       ROUTINE TO CHECK IF ALL RTUS IN SPREAD DEPLOYED
                        *
0029 I                  SDPCHK  EQU     *
0029 I FE 0001 R                LDX     CURCSP
002C I EE 00                    LDX     0,X             STATION OUTSIDE DEPLOYMENT MAP
002E I FF 0002 R                STX     STNADR
SEQIST(A0011.02.056AA  CRS SPREAD DEPLOYMENT CHECK)     08/04/78  11:22:30  PAGE   2

0031 I BD 000A R                JSR     SELIDX
0034 I 2C 24                    BGE     SDP1            NO
0036 I CE 0002 R        SDP2    LDX     #STNADR         CONVERT INVALID
0039 I 86 04                    LDA A   #STNNDG         STATION #
003B I BD 000C R                JSR     BINDEC          FOR DISPLAY
003E I FE 0003 R                LDX     STNFLD          DISPLAY
0041 I FF 0004 R                STX     NUML            ERROR
0044 I CE 0094 I                LDX     #SNDMSG         MESSAGE
0047 I BD 0010 R        SDP5    JSR     DISPLY
004A I FE 0005 R        SDP3    LDX     MPRSTG          RESTORE OLD
004D I BD 000D R                JSR     MPRRST          PARAMETERS
0050 I FE 0001 R                LDX     CURCSP          SET
0053 I 86 01                    LDA A   #MODPLY         MODE = DEPLOY
0055 I A7 10                    STA A   LCAMDE,X
0057 I 7E 000E R                JMP     EXECTV          INITIATE NEXT SEQUENCE
005A I BD 000F R        SDP1    JSR     CHKDEP          STATION DEPLOYED ?
005D I 27 D7                    BEQ     SDP2            NO
005F I 6D 00                    TST     0,X             SKIP STATION
0061 I 2A 05                    BPL     SDP4            NO
0063 I CE 0073 I                LDX     #BLASKP
0066 I 20 DF                    BRA     SDP5
0068 I CE 0000 R        SDP4    LDX     #CLRDSP         CLEAR SKIP MESSAGE
006B I BD 0010 R                JSR     DISPLY
006E I 8D 90                    BSR     SEQTST          ALL RTUS IN SPREAD DEPLOYED
0070 I 26 C4                    BNE     SDP2            NO, DISPLAY 1ST CHANNEL IN ERROR
0072 I 39                       RTS                     RETURN TO CALLER
0073 I 424C41           BLASKP  FCC     /BLASTER ASSIGNED TO DEAD STATION/
0093 I 04                       FCB     4
```

```
0094 I 535441        88 SNDMSG    FCC    /STATION NOT DEPLOYED/
00A8 I 0D            89           FCB    $D,$E
00A9 I 0E
00AA I 0008     R    90           FDB    NUMMSG
00AC I 0D            91           FCB    $D,$D,$D,4
00AD I 0D
00AE I 0D
00AF I 04
00B0                 92           END
SEQTST(A0011.02.056AA  CRS SPREAD DEPLOYMENT CHECK)     08/04/78  11:22:31  PAGE   3

  NO ERRORS
 ISECT LENGTH --    176
 DSECT LENGTH --      0

> ADPSTN    000B      16     16
> BINDEC    000C      16     16    64
< BLASKP    0073 I    86      5    79
> BNDEND    0007      13     13    48
> BNDSET    0009      16     16    37
> BNDSTR    0006      13     13    38    45
> CHKDEP    000F      17     17    42    75
> CLRDSP    0000       8      8    81
> CURCSP    0001       9      9    36    57    71
> DISPLY    0010      17     17    68    82
> EXECTV    000E      17     17    74
> IDXRTN    0011      17     17    46
  LCAMDE    0010 A    19     73
  MODPLY    0001 A    20     72
> MPRRST    000D      16     16    70
> MPRSTG    0005      12     12    69
> NUML      0004      11     11    66
> NUMMSG    0008      14     14    90
  SDP1      005A I    75     61
  SDP2      0036 I    62     76    84
  SDP3      004A I    69
  SDP4      0068 I    81     78
  SDP5      0047 I    68     80
< SDPCHK    0029 I    56      4
> SELIDX    000A      16     16    40    60
  SEQ1      0006 I    38     49
  SEQN      0027 I    51     43
< SEQTST    0000 I    35      4    83
  SEQX      0026 I    50     41
< SNDMSG    0094 I    88      6    67
> STNADR    0002      10     10    39    47    59    62
> STNFLD    0003      10     10    65
  STNNDG    0004 A    25     63
ACTRTN(A0011.02.057AA  CRS RTU ACTIVATE-DEACTIVATE)     08/04/78  11:23:36  PAGE   1

                      2 *
0000 I                3           ISEC
                      4 *
                      5           DEF    ACTRTN,DATVRT,ATVRTN
                      6           DEF    ATVLLT,ATVHLT
                      7           DEF    ATVCMD
                      8 *
                      9           REF    BNDSTR,BNDEND,CURCSP
                     10           REF    RTUADR,STNADR
                     11           REF    RCTSST
                     12           REF    CMPPR1,CMPPR2
                     13 *
                     14           REF    BNDSET,RTSTAT,SELIDX,ADPSTN,RTUCMD,CMPRTN
                     15 *
                     16 *     RTU COMMAND EQUATES
                     17 *
0060 A               18 RTUSTS    EQU    $60          RTU STATUS XFER
0000 A               19 STSIAV    EQU    0            INACTIVE STATE
0008 A               20 STSACT    EQU    8            ACTIVE STATE
                     21 *
                     22 *
                     23 *     ROUTINE TO SET ALL RTUS IN SPREAD ACTIVE
                     24 *
```

```
0000 I                25 ACTRTN    EQU    *
0000 I FE 0002 R      26           LDX    CURCSP        COMPUTE SPREAD
0003 I BD 0008 R      27           JSR    BNDSET        LIMITS
0006 I FE 0000 R      28           LDX    BNDSTR        SET
0009 I FF 0001 D      29           STX    ATVLLT        HIGH AND
000C I FE 0001 R      30           LDX    BNDEND        LOW LIMITS
000F I FF 0003 D      31           STX    ATVHLT        FOR ACTIVATION
0012 I BD 0028 I      32           JSR    ATVRTN        ACTIVATE ALL RTUS IN SPREAD
0015 I FE 0002 R      33           LDX    CURCSP
0018 I EE 00          34           LDX    0,X
001A I FF 0001 D      35           STX    ATVLLT
001D I FF 0003 D      36           STX    ATVHLT
0020 I BD 0028 I      37           JSR    ATVRTN        ACTIVATE RTU CONNECTED BLASTER
0023 I 39             38           RTS
                      39 *
                      40 *      ROUTINE TO HANDLE ACTIVATION AND DEACTIVATION OF RTUS
                      41 *
                      42 *      ENTRY DATURT : DEACTIVATE RTUS WITHIN STATION LIMITS
                      43 *      ENTRY ATVRTN : ACTIVATE RTUS WITHIN STATION LIMITS
                      44 *
                      45 *      CALLING SEQUENCE:
                      46 *
                      47 *      ATVLLT => LOW STATION # LIMIT
                      48 *      ATVHLT => HIGH STATION # LIMIT
                      49 *
0024 I                50 DATVRT    EQU    *
0024 I 86 60          51           LDA A  #RTUSTS+STSIAVLOAD INACTIVE COMMAND
0026 I 20 02          52           BRA    ATV1
0028 I                53 ATVRTN    EQU    *
0028 I 86 68          54           LDA A  #RTUSTS+STSACTLOAD ACTIVE COMMAND
002A I BD 0009 R      55 ATV1      JSR    RTSTAT        SET UP RTU STATUS
002D I B7 0000 D      56           STA A  ATVCMD        SET ACTIVATE/DEACTIVATE COMMAND
0030 I 7F 0003 R      57           CLR    RTUADR        CLEAR RTU ADDRESS
0033 I FE 0001 D      58 ATV3      LDX    ATVLLT        PICK UP NEXT STATION #
0036 I FF 0004 R      59           STX    STNADR        SAVE STATION #
ACTRTN(A0011.02.057AA  CRS RTU ACTIVATE-DEACTIVATE)    08/04/78  11:23:38  PAGE   2

0039 I 08             60           INX                  INCR
003A I FF 0001 D      61           STX    ATVLLT        LOW LIMIT
003D I BD 000A R      62           JSR    SELIDX        PICK UP
0040 I BD 000B R      63           JSR    ADPSTN        RTU ADDRESS FOR STATION #
0043 I B1 0003 R      64           CMP A  RTUADR        NEW RTU ?
0046 I 27 0E          65           BEQ    ATV2          NO
0048 I CE 0005 R      66           LDX    #RCTSST       SET TIMEOUT
004B I B7 0003 R      67           STA A  RTUADR        SET CURRENT RTU ADDRESS
004E I 27 06          68           BEQ    ATV2          JUMP IF ARTIFICIAL RTU
0050 I F6 0000 D      69           LDA B  ATVCMD        OUTPUT
0053 I BD 000C R      70           JSR    RTUCMD        COMMAND
0056 I CE 0003 D      71 ATV2      LDX    #ATVHLT
0059 I FF 0006 R      72           STX    CMPPR1
005C I CE 0001 D      73           LDX    #ATVLLT
005F I FF 0007 R      74           STX    CMPPR2
0062 I BD 000D R      75           JSR    CMPRTN
0065 I 23 CC          76           BLS    ATV3
0067 I 39             77           RTS                  RETURN TO CALLER
0000 D                78           DSEC
                      79 *
                      80 *      STORAGE REQUIREMENTS FOR 'ATVRTN'
                      81 *
0000 D 00             82 ATVCMD    FCB    0             ACTIVATE/DEACTIVATE CMND
0001 D 0000      A    83 ATVLLT    FDB    0             LOW STATION # LIMIT
0003 D 0000      A    84 ATVHLT    FDB    0             HIGH STATION # LIMIT
0005                  85           END
ACTRTN(A0011.02.057AA  CRS RTU ACTIVATE-DEACTIVATE)    08/04/78  11:23:38  PAGE   3

   NO ERRORS
  ISECT LENGTH --   104
  DSECT LENGTH --     5

< ACTRTN    0000 I    25      5
> ADPSTN    000B      14     14     63
  ATV1      002A I    55     52
  ATV2      0056 I    71     65     68
```

```
  ATV3      0033 I   58    76
< ATVCMD    0000 D   82     7    56    69
< ATVHLT    0003 D   84     6    31    36    71
< ATVLLT    0001 D   83     6    29    35    58    61    73
< ATVRTN    0028 I   53     5    32    37
> BNDEND    0001      9     9    30
> BNDSET    0008     14    14    27
> BNDSTR    0000      9     9    28
> CMPPR1    0006     12    12    72
> CMPPR2    0007     12    12    74
> CMPRTN    000D     14    14    75
> CURCSP    0002      9     9    26    33
< DATVRT    0024 I   50     5
> RCTSST    0005     11    11    66
> RTSTAT    0009     14    14    55
> RTUADR    0003     10    10    57    64    67
> RTUCMD    000C     14    14    70
  RTUSTS    0060 A   18    51    54
> SELIDX    000A     14    14    62
> STNADR    0004     10    10    59
  STSACT    0008 A   20    54
  STSIAV    0000 A   19    51
```

RTSMAP(A0011.02.058AA CRS RTU STATION MAP SETUP) 08/04/78 11:24:39 PAGE 1

```
                      2 *
                      3 *      ROUTINE TO SET UP RTU STATION MAP
                      4 *
0000 I                5           ISEC
                      6 *
                      7           DEF    RTSMAP,STNMAP
                      8           DEF    STNMP8,STNMP6,STNMP4,STNMP2
                      9           DEF    STNMPT
                     10 *
                     11           REF    LINSAV,CHNADR,RTUADR
                     12           REF    STNADR,STNAD2
                     13 *
                     14           REF    CPCTIX,SELID2,ADPSTN
                     15 *
                     16 *      CALLING SEQUENCE:  JSR  RTSMAP
                     17 *
                     18 *      ACCB => LINE # ON WHICH RTU DEPLOYED
                     19 *
0000 I               20 RTSMAP    EQU    *
0000 I BD 0005 R     21           JSR    CPCTIX       COMPUTE CONTROL TABLE INDEX
0003 I CE 0000 D     22           LDX    #STNMAP
0006 I 09            23           DEX
0007 I 09            24           DEX
0008 I FF 0008 D     25           STX    STNMPT
000B I CE 0000 A     26           LDX    #0
000E I FF 0000 D     27           STX    STNMAP
0011 I FF 0002 D     28           STX    STNMAP+2
0014 I FF 0004 D     29           STX    STNMAP+4
0017 I FF 0006 D     30           STX    STNMAP+6
001A I FE 0000 R     31           LDX    LINSAV       SET PNTR
001D I EE 02         32           LDX    2,X          TO START OF
001F I FF 0000 R     33           STX    LINSAV       DEPLOYMENT TABLE
0022 I 5F            34           CLR B
0023 I 5C            35 RTS2      INC B               INCR CURRENT
0024 I F7 0001 R     36           STA B  CHNADR       CHANNEL #
0027 I C1 04         37           CMP B  #4           LAST CHANNEL
0029 I 22 3A         38           BHI    RTS1         YES
002B I FE 0008 D     39           LDX    STNMPT       INCR MAP PNTR
002E I 08            40           INX
002F I 08            41           INX
0030 I FF 0008 D     42           STX    STNMPT
0033 I FE 0000 R     43           LDX    LINSAV       PICK UP PNTR TO DEPLOYEMT TABLE
0036 I BD 0006 R     44           JSR    SELID2       STATION OUTSIDE
0039 I 2B 2A         45           BMI    RTS1         YES
003B I BD 0007 R     46           JSR    ADPSTN       PICK UP RTU & CH ADDR
003E I B1 0002 R     47           CMP A  RTUADR       SAME RTU
0041 I 26 22         48           BNE    RTS1         NO
0043 I F1 0001 R     49           CMP B  CHNADR       CHANNELS MATCH
0046 I 27 05         50           BEQ    RTS4         YES
```

```
0048 I F6 0001 R     51           LDA B  CHNADR       CHANNEL #
004B I 20 D6         52           BRA    RTS2
004D I 37            53 RTS4      PSH B               SAVE CHANNEL
004E I F6 0004 R     54           LDA B  STNAD2       SET
0051 I B6 0003 R     55           LDA A  STNADR       STATION #
0054 I FE 0008 D     56           LDX    STNMPT       IN
0057 I E7 01         57           STA B  1,X          MAP
0059 I A7 00         58           STA A  0,X
005B I FE 0003 R     59           LDX    STNADR       INCR TO
RTSMAP(A0011.02.058AA  CRS RTU STATION MAP SETUP)       08/04/78  11:24:40  PAGE   2

005E I 08            60           INX                 NEXT
005F I FF 0003 R     61           STX    STNADR       STATION
0062 I 33            62           PUL B
0063 I 20 BE         63           BRA    RTS2
0065 I 39            64 RTS1      RTS                 RETURN TO CALLER
0000 D               65           DSEC
                     66 *     STORAGE REQUIREMENTS FOR 'RTSMAP'
                     67 *
0000 D               68 STNMAP    RMB    8           RTU STATION ADDR TABLE
0008 D 0000    A     69 STNMPT    FDB    0           STATION MAP PNTR
                     70 *
0008 D               71 STNMP8    EQU    STNMAP+8
0006 D               72 STNMP6    EQU    STNMAP+6
0004 D               73 STNMP4    EQU    STNMAP+4
0002 D               74 STNMP2    EQU    STNMAP+2
                     75 *
000A                 76           END
RTSMAP(A0011.02.058AA  CRS RTU STATION MAP SETUP)       08/04/78  11:24:41  PAGE   3

   NO ERRORS
  ISECT LENGTH --   102
  DSECT LENGTH --    10

> ADPSTN    0007     14     14     46
> CHNADR    0001     11     11     36     49     51
> CPCTIX    0005     14     14     21
> LINSAV    0000     11     11     31     33     43
  RTS1      0065 I   64     38     45     48
  RTS2      0023 I   35     52     63
  RTS4      004D I   53     50
< RTSMAP    0000 I   20      7
> RTUADR    0002     11     11     47
> SELID2    0006     14     14     44
> STNAD2    0004     12     12     54
> STNADR    0003     12     12     55     59     61
< STNMAP    0000 D   68      7     22     27     28     29     30     71     72     73     74
< STNMP2    0002 D   74      8
< STNMP4    0004 D   73      8
< STNMP6    0006 D   72      8
< STNMP8    0008 D   71      8
< STNMPT    0008 D   69      9     25     39     42     56
CPCTIX(A0011.02.059AA  CRS LINE CONTROL TABLE INDX)     08/04/78  11:25:42  PAGE   1

                      2 *
                      3 *     ROUTINE TO COMPUTE INDEX INTO LINE CONTROL TABLE
                      4 *
 0000 I               5           ISEC
                      6 *
                      7           DEF    CPCTIX
                      8 *
                      9           REF    LCTBLE,LINSAV
                     10 *
                     11           REF    IDXRTN
                     12 *
                     13 *     CALLING SEQUENCE:   JSR   CPCTIX
                     14 *
                     15 *     ACCB => LINE #
                     16 *
                     17 *     RETURN SEQUENCE :
                     18 *
                     19 *     LINSAV => CONTROL TABLE PNTR
                     20 *
```

```
0000 I              21 CPCTIX    EQU    *
0000 I CE 0000 R    22           LDX    #LCTBLE     COMPUTE
0003 I FF 0001 R    23           STX    LINSAV      INDEX
0006 I 5A           24           DEC B
0007 I 58           25           ASL B
0008 I 17           26           TBA
0009 I 58           27           ASL B
000A I 58           28           ASL B
000B I 1B           29           ABA                COMPUT INDEX INTO LINE CONTROL TABLE
000C I CE 0001 R    30           LDX    #LINSAV     CONTROL STORE
000F I BD 0002 R    31           JSR    IDXRTN      TABLE
0012 I 39           32           RTS
0013                33           END
CPCTIX(A0011.02.059AA  CRS LINE CONTROL TABLE INDX)     08/04/78  11:25:43  PAGE   2

  NO ERRORS
 ISECT LENGTH --    19
 DSECT LENGTH --    0

< CPCTIX    0000 I    21     7
> IDXRTN    0002      11    11    31
> LCTBLE    0000       9     9    22
> LINSAV    0001       9     9    23    30
RTUPDR(A0011.02.060AA  CRS RTU-DEPLOYMENT TABLE)        08/04/78  11:26:37  PAGE   1

                     2 *
                     3 *     ROUTINE TO UPDATE RTU MAP AND DEPLOUYMENT TABLE
                     4 *
0000 I               5           ISEC
                     6 *
                     7           DEF    RTUPDR,LINSAV
                     8 *
                     9           REF    STNADR,CHKIDS,RTUADR
                    10           REF    CHKRDP,CPCTIX,SELID2,CHKDEP,DLPUPD
                    11 *
                    12 *     CALLING SEQUENCE:  JSR  RTUPDR
                    13 *
                    14 *     RTUADR => RTU ADDRESS
                    15 *
0000 I              16 RTUPDR    EQU    *
0000 I BD 0003 R    17           JSR    CHKRDP      COMPUTE PNTR INTO RTU MAP
0003 I EE 01        18           LDX    1,X         PICK UP 1ST STATION #
0005 I FF 0000 R    19           STX    STNADR
0008 I FE 0000 D    20           LDX    LINSAV      RESTORE PNTR INTO RTU MAP
000B I 6F 00        21           CLR    0,X         REMOVE ENTRY
000D I 6F 01        22           CLR    1,X         FROM RTU
000F I 6F 02        23           CLR    2,X         TABLE
0011 I BD 0004 R    24           JSR    CPCTIX      COMPUTE PNTR INTO LINE CONTROL TABLE
0014 I FE 0000 D    25           LDX    LINSAV      PICK UP PNTR
0017 I EE 02        26           LDX    2,X         TO START TO DEPLOYMENT TABLE
0019 I FF 0000 D    27           STX    LINSAV      SET PNTR TO START OF DEPLOUMENT TABLE
001C I FE 0000 D    28 RTU2      LDX    LINSAV      PICK UP PNTR TO DEPLOYMENT TABLE
001F I BD 0005 R    29           JSR    SELID2      COMPUTE PNTR INTO PROPER SECTION OF TABLE
0022 I 2B 1C        30           BMI    RTU1        JUMP IF OVERFLOW
0024 I BD 0006 R    31           JSR    CHKDEP      COMPUTE DEPLOYMENT TABLE PNTR
0027 I 27 17        32           BEQ    RTU1        JUMP IF NOT DEPLOYED
0029 I FE 0001 R    33           LDX    CHKIDS      PICK UP DEPLOYMENT TABLE PNTR
002C I A6 01        34           LDA A  1,X         PICK UP RTU #
002E I B1 0002 R    35           CMP A  RTUADR      SAME RTU
0031 I 26 0D        36           BNE    RTU1        NO
0033 I 6F 00        37           CLR    0,X         CLEAR
0035 I 6F 01        38           CLR    1,X         DEPLOYMENT TABLE ENTRY
0037 I FE 0000 R    39           LDX    STNADR      CHECK NEXT CHANNEL
003A I 08           40           INX
003B I FF 0000 R    41           STX    STNADR
003E I 20 DC        42           BRA    RTU2        CONTINUE WITH NEXT STATION
0040 I FE 0000 D    43 RTU1      LDX    LINSAV      PICK UP PNTR TO
0043 I BD 0007 R    44           JSR    DLPUPD      UPDATE DEPLOYMENT LITE PATTERN
0046 I 39           45           RTS                RETURN TO CALLER
0000 D              46           DSEC
                    47 *
                    48 *     STORAGE REQUIREMENTS FOR 'RTUPDR'
                    49 *
0000 D 0000     A   50 LINSAV    FDB    0           INDEX INTO LINE CONTROL STORAGE AREA
0002                51           END
```

```
RTUPDR(A0011.02.060AA  CRS RTU-DEPLOYMENT TABLE)       08/04/78  11:26:38  PAGE   2

   NO ERRORS
  ISECT LENGTH --     71
  DSECT LENGTH --      2

> CHKDEP    0006       10      10     31
> CHKIDS    0001        9       9     33
> CHKRDP    0003       10      10     17
> CPCTIX    0004       10      10     24
> DLPUPD    0007       10      10     44
< LINSAV    0000 D     50       7     20     25     27     28     43
  RTU1      0040 I     43      30     32     36
  RTU2      001C I     28      42
> RTUADR    0002        9       9     35
< RTUPDR    0000 I     16       7
> SELID2    0005       10      10     29
> STNADR    0000        9       9     19     39     41
CHKDEP(A0011.02.061AA  CRS STATION DEPLOYED CHECK)      08/04/78  11:32:18  PAGE   1

                          2 *
                          3 *      ROUTINE TO CHECK STATION DEPLOYMENT
                          4 *
 0000 I                   5           ISEC
                          6 *
                          7           DEF    CHKDEP,CHKIDS
                          8 *
                          9           REF    IDXSAV,STNADR,DEPIDX,SAVDTI,DPAVAL
                         10           REF    SAVDT2,SVDTI2
                         11 *
                         12           REF    DPADDR
                         13 *
                         14 *      CALLING SEQUENE
                         15 *
                         16 *      SAVDT2 => PNTR TO INDEX VALUE
                         17 *      IDXSAV => PNTR TO START OF DEPLOYMENT TABLE
                         18 *      STNADR => STATION NUMBER
                         19 *      CC     => 0 IF NOT DEPLOYED
                         20 *
 0000 I                  21 CHKDEP    EQU    *
 0000 I FE 0000 R        22           LDX    IDXSAV       SAVE PARAMETERS
 0003 I FF 0000 D        23           STX    CHKIDS
 0006 I FE 0001 R        24           LDX    STNADR
 0009 I FF 0002 D        25           STX    CHKSNS
 000C I B6 0002 D        26           LDA A  CHKSNS       LOAD STATION
 000F I F6 0003 D        27           LDA B  CHKSNS+1     NUMBER
 0012 I FE 0005 R        28           LDX    SAVDT2       PICK UP PNTR TO START OF TABLE
 0015 I E0 01            29           SUB B  1,X
 0017 I A2 00            30           SBC A  0,X
 0019 I F7 0002 R        31           STA B  DEPIDX       SAVE 0-99 INDEX
 001C I 58               32           ASL B
 001D I F7 0006 R        33           STA B  SVDTI2       COMPUTE
 0020 I 7F 0003 R        34           CLR    SAVDTI       INDEX
 0023 I CE 0000 D        35           LDX    #CHKIDS      COMPUTE
 0026 I FF 0004 R        36           STX    DPAVAL       INDEX
 0029 I FE 0003 R        37           LDX    SAVDTI
 002C I BD 0007 R        38           JSR    DPADDR       INTO DEPLOYMENT TABLE
 002F I FE 0000 D        39           LDX    CHKIDS       PICK UP TABLE INDEX
 0032 I 4F               40           CLR A               CHECK IF STATION
 0033 I A1 00            41           CMP A  0,X          ALREADY DEPLOYED
 0035 I 39               42           RTS                 RETURN TO CALLER
 0000 D                  43           DSEC
                         44 *
                         45 *      PROGRAM STORAGE REQUIREMENTS FOR 'CHKDEP'
                         46 *
 0000 D 0000     A       47 CHKIDS    FDB    0            IDX SAVE
 0002 D 0000     A       48 CHKSNS    FDB    0            STATION # SAVE
 0004                    49           END
CHKDEP(A0011.02.061AA  CRS STATION DEPLOYED CHECK)      08/04/78  11:32:19  PAGE   2

   NO ERRORS
 ISECT LENGTH --     54
 DSECT LENGTH --      4
```

```
< CHKDEP    0000 I    21      7
< CHKIDS    0000 D    47      7    23    35    39
  CHKSNS    0002 D    48     25    26    27
> DEPIDX    0002       9      9    31
> DPADDR    0007      12     12    38
> DPAVAL    0004       9      9    36
> IDXSAV    0000       9      9    22
> SAVDT2    0005      10     10    28
> SAVDTI    0003       9      9    34    37
> STNADR    0001       9      9    24
> SVDTI2    0006      10     10    33
ADPSTN(A0011.02.062AA  CRS DEPLOYMENT TABLE ACCESS)     08/04/78  11:33:42  PAGE   1

                       2 *
                       3 *      ROUTINE TO ACCESS DEPLOYMENT TABLE VIA STATION NUMBER
                       4 *
 0000 I                5           ISEC
                       6 *
                       7           DEF    ADPSTN,ADPICP
                       8           DEF    ADPENT
                       9 *
                      10           REF    CHKIDS
                      11 *
                      12           REF    CHKDEP
                      13           REF    SELIDX
                      14 *
                      15 *      ENTRY ADPICP: DEPLOYMENT TABLE INDEX ALREADY COMPUTED
                      16 *
                      17 *      .     CALLING SEQUENCE:
                      18 *
                      19 *      .     CHKIDS => INDEX INTO DEPLOYMENT TABLE
                      20 *
                      21 *      ENTRY ADPSTN: DEPIDX NOT COMPUTED
                      22 *
                      23 *      .     CALLING SEQUENCE:
                      24 *
                      25 *      .     STNADR => STATION NUMBER
                      26 *
                      27 *      RETURN SEQUENCE:
                      28 *
                      29 *      ACCA => RTU ADDRESS
                      30 *      ACCB => CHANNEL ADDRESS
                      31 *
 0000 I               32 ADPENT    EQU    *
 0000 I BD 0002 R     33           JSR    SELIDX         SETUP INDEX INTO DEPLOYMENT TABLE
 0003 I               34 ADPSTN    EQU    *
 0003 I BD 0001 R     35           JSR    CHKDEP         COMPUTE INDEX INTO TABLE
 0006 I               36 ADPICP    EQU    *
 0006 I FE 0000 R     37           LDX    CHKIDS         PICK UP PNTR TO TABLE ENTRY
 0009 I E6 00         38           LDA B  0,X            PICK UP CHANNEL ADDRESS
 000B I C4 07         39           AND B  #7             MASK OUT DEPLOYMENT FLAGS
 000D I A6 01         40           LDA A  1,X            PICK UP RTU ADDRESS
 000F I 39            41           RTS                   RETURN TO CALLER
 0010                 42           END
ADPSTN(A0011.02.062AA  CRS DEPLOYMENT TABLE ACCESS)     08/04/78  11:33:43  PAGE   2

   NO ERRORS
 ISECT LENGTH --      16
 DSECT LENGTH --       0

< ADPENT    0000 I    32      8
< ADPICP    0006 I    36      7
< ADPSTN    0003 I    34      7
> CHKDEP    0001      12     12    35
> CHKIDS    0000      10     10    37
> SELIDX    0002      13     13    33
ACKTMO(A0011.02.063AA  CRS DATA ACKNOWLEDGE DELAY)     08/04/78  11:34:39  PAGE   1

                       2 *
                       3 *      RTU DATA ACKNOWLEDGE DELAY ROUTINE
                       4 *
 0000 I                5           ISEC
                       6 *
                       7           DEF    ACKTMO
```

```
                         8 *
                         9           REF    RCTXRT,TMRBTV,TMRBCA
                        10           REF    TMRBC1
                        11 *
                        12           REF    TMRCDV
 0000 I                 13 ACKTMO    EQU    *
 0000 I CE 0000 R       14           LDX    #RCTXRT
 0003 I FF 0001 R       15           STX    TMRBTV
 0006 I 7F 0002 R       16           CLR    TMRBCA
 0009 I 7F 0003 R       17           CLR    TMRBC1
 000C I BD 0004 R       18           JSR    TMRCDV
 000F I 39              19           RTS
 0010                   20           END
ACKTMO(A0011.02.063AA  CRS DATA ACKNOWLEDGE DELAY)      08/04/78  11:34:39  PAGE   2

   NO ERRORS
  ISECT LENGTH --      16
  DSECT LENGTH --      0

< ACKTMO    0000 I     13      7
> RCTXRT    0000        9      9    14
> TMRBC1    0003       10     10    17
> TMRBCA    0002        9      9    16
> TMRBTV    0001        9      9    15
> TMRCDV    0004       12     12    18
CHKRDP(A0011.02.064AA  CRS RTU DEPLOYMENT CHECK)        08/04/78  11:35:37  PAGE   1

                         2 *
                         3 *      ROUTINE TO CHECK IF RTU DEPLOYED
                         4 *
 0000 I                  5           ISEC
                         6 *
                         7           DEF    CHKRDP
                         8 *
                         9           REF    RTUMAP,LINSAV,SAVDTI,DPAVAL
                        10           REF    RTUADR,SVDTI2
                        11 *
                        12           REF    IDXRTN,DPADDR
                        13 *
                        14 *      CALLING SEQUENCE:  JSR  CHKRDP
                        15 *
                        16 *      RTUADR => RTU ADDRESS
                        17 *
                        18 *      RETURN SEQUENCE:
                        19 *
                        20 *      LINSAV => PNTR TO PROPER ENTRY IN MAP
                        21 *      ACCB   => LINE #
                        22 *      CC     => 0 IF NOT DEPLOYED
                        23 *
 0000 I                 24 CHKRDP    EQU    *
 0000 I 36              25           PSH A
 0001 I CE 0000 R       26           LDX    #RTUMAP      PICK UP RTU MAP ADDRESS
 0004 I FF 0001 R       27           STX    LINSAV
 0007 I 4F              28           CLR A
 0008 I F6 0004 R       29           LDA B  RTUADR
 000B I 58              30           ASL B
 000C I 49              31           ROL A
 000D I 58              32           ASL B
 000E I 49              33           ROL A
 000F I F7 0005 R       34           STA B  SVDTI2       SAVE INDEX INTO RTU MAP
 0012 I B7 0002 R       35           STA A  SAVDTI
 0015 I CE 0001 R       36           LDX    #LINSAV
 0018 I FF 0003 R       37           STX    DPAVAL
 001B I FE 0002 R       38           LDX    SAVDTI
 001E I BD 0007 R       39           JSR    DPADDR       COMPUTE PNTR TO RTU MAP ENTRY
 0021 I FE 0001 R       40           LDX    LINSAV       RTU DEPLOYED IF ENTRY NOT ZERO
 0024 I 32              41           PUL A
 0025 I E6 00           42           LDA B  0,X          SET CC FOR RETURN
 0027 I 39              43           RTS                 RETURN TO CALLER
 0028                   44           END
CHKRDP(A0011.02.064AA  CRS RTU DEPLOYMENT CHECK)        08/04/78  11:35:38  PAGE   2

   NO ERRORS
  ISECT LENGTH --      40
  DSECT LENGTH --      0
```

```
< CHKRDP    0000 I    24      7
> DPADDR    0007      12     12     39
> DPAVAL    0003       9      9     37
> IDXRTN    0006      12     12
> LINSAV    0001       9      9     27     36     40
> RTUADR    0004      10     10     29
> RTUMAP    0000       9      9     26
> SAVDTI    0002       9      9     35     38
> SVDTI2    0005      10     10     34
MPRSAV(A0011.02.065AA  CRS LINE-SHOOTER PARAMETERS)     08/04/78  11:36:32  PAGE   1

                          2 *
                          3 *      ROUTINE TO RESTORE SAVED LINE AND SHOOTER PARAMETERS
                          4 *
 0000 I                   5            ISEC
                          6 *
                          7            DEF     MPRRST,MPRRS1
                          8            DEF     MPRSAV
                          9            DEF     MPRFTC,MPRSTG
                         10 *
                         11            REF     CURCSP,MVCSTR,MVCDST
                         12 *
                         13            REF     MVCHAR,IDXRTN
                         14 *
                         15 *      CALLING SEQUENCE:
                         16 *
                         17 *      IDX => PNTR TO START OF SAVE AREA
                         18 *
                         19 *
 0006 A                  20 LCASP1     EQU     6            S. P. SAVE AREA
 0000 A                  21 LCASPT     EQU     0            S. P. STATION
                         22 *
 0000 I                  23 MPRRST     EQU     *
 0000 I FF 0000 D        24            STX     MPRFTC       SAVE PNTR TO START OF SAVE AREA
 0003 I FE 0000 R        25 MPRRS1     LDX     CURCSP       LOAD PNTR TO CURRENT PARAMS
 0006 I FF 0002 D        26            STX     MPRSTG
 0009 I 20 0E            27            BRA     MPR1         MOVE PARAMS
                         28 *
                         29 *      ROUTINE TO SAVE CURRENT LINE AND SHOOTER PARAMETERS
                         30 *
                         31 *      CALLING SEQUENCE:
                         32 *
                         33 *      IDX => PNTR TO CURRENT PARAMETERS
                         34 *
 000B I                  35 MPRSAV     EQU     *
 000B I FF 0000 D        36            STX     MPRFTC       SAVE PNTR TO CURRENT PARAMETERS
 000E I FF 0002 D        37            STX     MPRSTG       COMPUTE
 0011 I 86 06            38            LDA A   #LCASP1      POINTER
 0013 I CE 0002 D        39            LDX     #MPRSTG      TO SAVE AREA
 0016 I BD 0004 R        40            JSR     IDXRTN
                         41 *
                         42 *      MOVE PARAMETERS
                         43 *
 0019 I 86 06            44 MPR1       LDA A   #LCASP1-LCASPTCOMPUTE # BYTES TO MOVE
 001B I FE 0000 D        45            LDX     MPRFTC
 001E I FF 0001 R        46            STX     MVCSTR
 0021 I FE 0002 D        47            LDX     MPRSTG
 0024 I FF 0002 R        48            STX     MVCDST
 0027 I BD 0003 R        49            JSR     MVCHAR
 002A I 39               50 MPR2       RTS                  RETURN TO CALLER
 0000 D                  51            DSEC
                         52 *
                         53 *      STORAGE REQUIREMENTS FOR 'MPRSAV'
                         54 *
 0000 D 0000       A     55 MPRFTC     FDB     0            PNTR TO CURRENT PARAMETERS
 0002 D 0000       A     56 MPRSTG     FDB     0            PNTR TO START OF SAVE AREA
 0004                    57            END
MPRSAV(A0011.02.065AA  CRS LINE-SHOOTER PARAMETERS)     08/04/78  11:36:33  PAGE   2

   NO ERRORS
  ISECT LENGTH --     43
  DSECT LENGTH --      4

> CURCSP    0000      11     11     25
```

```
> IDXRTN    0004      13      13    40
  LCASP1    0006 A    20      38    44
  LCASPT    0000 A    21      44
  MPR1      0019 I    44      27
  MPR2      002A I    50
< MPRFTC    0000 D    55       9    24    36    45
< MPRRS1    0003 I    25       7
< MPRRST    0000 I    23       7
< MPRSAV    000B I    35       8
< MPRSTG    0002 D    56       9    26    37    39    47
> MVCDST    0002      11      11    48
> MVCHAR    0003      13      13    49
> MVCSTR    0001      11      11    46
SELIDX(A0011.02.066AA  CRS DEPLOYMENT TABLE INDEX)      08/04/78  11:37:28  PAGE   1

                     2 *
                     3 *      ROUTINE TO INDEX DEPLOYMENT TABLE
                     4 *
 0000 I              5            ISEC
                     6 *
                     7            DEF    SELIDX,SELID2
                     8 *
                     9            REF    CURCSP,STNADR
                    10            REF    SAVDT2,IDXSAV,SAVDTI,LOOPFG,CMPPR1,CMPPR2,SAVDT3
                    11            REF    DEPFLG
                    12 *
                    13            REF    CMPRTN,IDXRTN
                    14 *
                    15 *               .
 0014 A             16 LCADPM    EQU    20           ADDR OF START OF DEPLOYMENT MAP
 0002 A             17 DPTID1    EQU    2            DEPLOYMENT INDEX 1
                    18 *
                    19 *
                    20 *      DEPLOY FLAG EQUATES
                    21 *
 0080 A             22 DEPOVL    EQU    $80          DEPLOYMENT MAP OVERFLOW
 0020 A             23 DEP2IG    EQU    $20          IDX2>IDX1
                    24 *
                    25 *      CALLING SEQUENCE:  JSR  SELIDX
                    26 *                         JSR  SELID2  IDX => PNTR TO DEPLOYMENT TABLE
                    27 *
                    28 *      STNADR => STATION NUMBER
                    29 *
                    30 *      RETURN SEQUENCE:
                    31 *
                    32 *      IDXSAV              => PNTR TO DEPLOYMENT TABLE
                    33 *      CC     => MINUS IF STATION # OUTSIDE MAP
                    34 *
 0000 I             35 SELIDX    EQU    *
 0000 I FE 0000 R   36           LDX    CURCSP       LOAD PNTR TO START
 0003 I EE 14       37           LDX    LCADPM,X     OF DEPLOYMENT MAP
 0005 I             38 SELID2    EQU    *
 0005 I FF 0003 R   39           STX    IDXSAV       SAVE PNTRE TO START OF DEPLOYMENT MAP
 0008 I FF 0002 R   40           STX    SAVDT2       SAVE PNTR TO TO DEPLOYMENT TABL INDEX
 000B I EE 02       41           LDX    DPTID1,X     INIT PNTR TO
 000D I FF 0004 R   42           STX    SAVDTI       OLD INDEX
 0010 I 86 02       43           LDA A  #2           SET LOOP
 0012 I B7 0005 R   44           STA A  LOOPFG       FLAG
 0015 I 7A 0005 R   45 SEL2      DEC    LOOPFG       MAP OVERFLOW
 0018 I 2B 60       46           BMI    SELO         YES
 001A I FE 0002 R   47           LDX    SAVDT2       SET PNTR
 001D I 08          48           INX
 001E I 08          49           INX                 TO NEXT DEPLOYMENT TABLE
 001F I FF 0002 R   50           STX    SAVDT2       INDEX
 0022 I B6 0009 R   51           LDA A  DEPFLG       CLEAR IDX2 >
 0025 I 84 DF       52           AND A  #-1-DEP2IG   INDICATOR
 0027 I FE 0002 R   53           LDX    SAVDT2
 002A I FF 0007 R   54           STX    CMPPR2
 002D I CE 0004 R   55           LDX    #SAVDTI
 0030 I FF 0006 R   56           STX    CMPPR1
 0033 I BD 000A R   57           JSR    CMPRTN       NEW INDEX > OLD INDEX
 0036 I 25 02       58           BCS    SEL1         NO
 0038 I 8A 20       59           ORA A  #DEP2IG      SET IDX2 > INDICATOR
```

```
SELIDX(A0011.02.066AA  CRS DEPLOYMENT TABLE INDEX)     08/04/78  11:37:29  PAGE   2

 003A I B7 0009 R    60 SEL1      STA A  DEPFLG       INNDEPLOYMENT FLAGS
 003D I CE 0001 R    61           LDX    #STNADR      PICK UP PNTR TO STATION NUMBER
 0040 I FF 0007 R    62           STX    CMPPR2       STATION # >
 0043 I FE 0002 R    63           LDX    SAVDT2       BASE
 0046 I FF 0006 R    64           STX    CMPPR1       INDEX
 0049 I BD 000A R    65           JSR    CMPRTN
 004C I 25 C7        66           BCS    SEL2         NO, CHECK NEXT INDEX
 004E I FE 0002 R    67           LDX    SAVDT2
 0051 I EE 00        68           LDX    0,X
 0053 I FF 0008 R    69           STX    SAVDT3       COMPUTE
 0056 I CE 0008 R    70           LDX    #SAVDT3      UPPER
 0059 I 86 63        71           LDA A  #99          INDEX
 005B I BD 000B R    72           JSR    IDXRTN       LIMIT
 005E I FF 0006 R    73           STX    CMPPR1
 0061 I BD 000A R    74           JSR    CMPRTN       STATION # WITHIN LIMITS
 0064 I 22 AF        75           BHI    SEL2         NO, CHECK NEXT INDEX
 0066 I FE 0003 R    76           LDX    IDXSAV       PICK UP PNTR
 0069 I EE 00        77           LDX    0,X          TO START OF DEPLOYMENT TABLE MAP
 006B I 08           78           INX
 006C I 7D 0005 R    79           TST    LOOPFG       STATION IN UPPER DISPLAY
 006F I 26 02        80           BNE    SEL3
 0071 I 08           81           INX
 0072 I 08           82           INX
 0073 I EE 00        83 SEL3      LDX    0,X          SAVE PNTR TO PROPER
 0075 I FF 0003 R    84           STX    IDXSAV       SECTION OF DEPLOYMENT TABLE
 0078 I 4F           85           CLR A               SET CC FOR NO OVERFLOW
 0079 I 39           86           RTS                 RETURN TO CALLER
 007A I B6 0009 R    87 SEL0      LDA A  DEPFLG       SET DEPLOYMENT
 007D I 8A 80        88           ORA A  #DEPOVL      MAP OVERFLOW
 007F I B7 0009 R    89           STA A  DEPFLG
 0082 I 39           90           RTS                 RETURN TO CALLER
 0083                91           END
SELIDX(A0011.02.066AA  CRS DEPLOYMENT TABLE INDEX)     08/04/78  11:37:30  PAGE   3

   NO ERRORS
  ISECT LENGTH --    131
  DSECT LENGTH --     0

> CMPPR1     0006      10     10     56     64     73
> CMPPR2     0007      10     10     54     62
> CMPRTN     000A      13     13     57     65     74
> CURCSP     0000       9      9     36
  DEP2IG     0020 A    23     52     59
> DEPFLG     0009      11     11     51     60     87     89
  DEPOVL     0080 A    22     88
  DPTID1     0002 A    17     41
> IDXRTN     000B      13     13     72
> IDXSAV     0003      10     10     39     76     84
  LCADPM     0014 A    16     37
> LOOPFG     0005      10     10     44     45     79
> SAVDT2     0002      10     10     40     47     50     53     63     67
> SAVDT3     0008      10     10     69     70
> SAVDTI     0004      10     10     42     55
  SEL1       003A I    60     58
  SEL2       0015 I    45     66     75
  SEL3       0073 I    83     80
< SELID2     0005 I    38      7
< SELIDX     0000 I    35      7
  SEL0       007A I    87     46
> STNADR     0001       9      9     61
FNDRNM(A0011.02.067AA  CRS RECORDING MAP SEARCH)     08/04/78  11:38:33  PAGE   1

                          2 *
                          3 *     ROUTINE TO SEARCH RECORDING MAP FOR RECORDING #
                          4 *
 0000 I                   5          ISEC
                          6 *
                          7          DEF      FNDRNM
                          8 *
                          9          REF      RCMENT,RSTMEN,RCMPTR
                         10          REF      STNADR,SXMTBF
```

```
                            REF     SXMTB1
                            REF     STLRND
                            REF     STLSW1
                      *
                            REF     IDXRTN,STLCRQ,SELIDX,CHKDEP,CHMSET,CNVNTD
                            REF     SYSERR
                      *
                      *
                      *     DEPLOY FLAG EQUATES
                      *
0080 A                DEPOVL   EQU     $80         DEPLOYMENT MAP OVERFLOW
0040 A                DEPSKP   EQU     $40         SKIP FUNCTION
0020 A                DEP2IG   EQU     $20         IDX2 > IDX1
0010 A                DEPFSN   EQU     $10         FIRST STATION NUMBER
                      *
                      *     RECORDING MAP EQUATES
                      *
0006 A                RTMELN   EQU     6           # BYTES PER ENTRY
                      *
                      *
0010 A                SW1STO   EQU     $10         SOFTWARE TIMEOUT
                      *
                      *     CALLING SEQUENCE: JSR FNDRNM
                      *
                      *
                      *     ACCA => 0 FOR NORMAL TEST DISPLAY ENTRY
                      *     ACCA => FOR AUTO FIRE ENTRY
                      *     STNADR => STATION # INDEX
                      *
                      *     RETURN SEQUENCE :
                      *
                      *     CC => MINUS IF STAION NOT WITHIN RECORDING MAP
                      *
0000 I                FNDRNM   EQU     *
0000 I B7 0000 D               STA A   RCNMSV      SAVE ENTRY TYPE INDICATOR
0003 I F6 0000 R               LDA B   RCMENT      PICK UP # ENTRIES IN RECORDING MAP
0006 I CE 0001 R               LDX     #RSTMEN     INIT RECORDING
0009 I FF 0002 R               STX     RCMPTR      MAP PNTR
000C I 5A             FND2     DEC B               LAST ENTRY
000D I 2B 3E                   BMI     FND1        YES
000F I 86 06                   LDA A   #RTMELN     SET PNTR
0011 I CE 0002 R               LDX     #RCMPTR     TO NEXT
0014 I BD 0008 R               JSR     IDXRTN      MAP ENTRY
0017 I FE 0002 R               LDX     RCMPTR
001A I EE 00                   LDX     0,X         ENTRY MATCH
001C I BC 0003 R               CPX     STNADR      SPECIFIED STATION #
001F I 26 EB                   BNE     FND2        NO
0021 I 7D 0000 D               TST     RCNMSV      AUTO FIRE ENTRY
0024 I 26 26                   BNE     FND3        YES
FNDRNM(A0011.02.067AA  CRS RECORDING MAP SEARCH)        08/04/78  11:38:34  PAGE    2

0026 I FE 0002 R               LDX     RCMPTR
0029 I A6 05                   LDA A   5,X         PICK UP RECORDING #
002B I B7 0005 R               STA A   SXMTB1      SAVE N SATELLITE CMND BUFR
002E I CE 0006 R      FND5     LDX     #STLRND     RETRIEVE NORMAL
0031 I BD 0009 R               JSR     STLCRQ      TEST DATA
0034 I B6 0007 R               LDA A   STLSW1
0037 I 85 10                   BIT A   #SW1STO     TIMEOUT
0039 I 27 05                   BEQ     FND4        NO
003B I BD 000E R               JSR     SYSERR
003E I 27 EE                   BEQ     FND5        JUMP IF RETRY
0040 I BD 000A R      FND4     JSR     SELIDX
0043 I BD 000B R               JSR     CHKDEP
0046 I BD 000C R               JSR     CHMSET
0049 I BD 000D R               JSR     CNVNTD      SETUP NORMAL TEST DATA FOR DISPLAY
004C I 4F             FND3     CLR A               SET CC FOR MATCH
004D I 39             FND1     RTS
0000 D                         DSEC
                      *
                      *     STORAGE REQUIREMENTS FOR 'FNDRNM'
                      *
0000 D 00             RCNMSV   FCB     0           ENTRY TYPE
0001                           END
```

```
FNDRNM(A0011.02.067AA  CRS RECORDING MAP SEARCH)        08/04/78  11:38:34  PAGE   3

   NO ERRORS
  ISECT LENGTH --     78
  DSECT LENGTH --      1

> CHKDEP     000B       15       15     71
> CHMSET     000C       15       15     72
> CNVNTD     000D       15       15     73
  DEP2IG     0020 A     23
  DEPFSN     0010 A     24
  DEPOVL     0080 A     21
  DEPSKP     0040 A     22
  FND1       004D I     75       50
  FND2       000C I     49       57
  FND3       004C I     74       59
  FND4       0040 I     70       67
  FND5       002E I     63       69
< FNDRNM     0000 I     44        7
> IDXRTN     0008       15       15     53
> RCMENT     0000        9        9     46
> RCMPTR     0002        9        9     48      52      54      60
  RCNMSV     0000 D     80       45     58
> RSTMEN     0001        9        9     47
  RTMELN     0006 A     28       51
> SELIDX     000A       15       15     70
> STLCRQ     0009       15       15     64
> STLRND     0006       12       12     63
> STLSW1     0007       13       13     65
> STNADR     0003       10       10     56
  SW1STO     0010 A     31       66
> SXMTB1     0005       11       11     62
> SXMTBF     0004       10       10
> SYSERR     000E       16       16     68
DPLRTU(A0011.02.068AA  CRS CHANNEL ASSIGNMENT)          08/04/78  11:39:40  PAGE   1

                           2 *
                           3 *        ROUTINE TO DISPLAY RTU CHANNEL ASSIGNMENTS
                           4 *
 0000 I                    5            ISEC
                           6 *
                           7            DEF     DPLRTU
                           8 *
                           9            REF     MSGRQT,STNMAP
                          10            REF     STNMP2,STNMP4,STNMP6
                          11            REF     NUMMSG
                          12 *
                          13            REF     MSGOUT
                          14 *
                          15 *
 0004 A                   16 STNNDG     EQU     4             MAX # DIGITS FOR STATION NUMBER
                          17 *
 0080 A                   18 MSGTCV     EQU     $80           CONVERT AND DISPLAY OLD VALUE
                          19 *
 0000 I                   20 DPLRTU     EQU     *
 0000 I C6 80             21            LDA B   #MSGTCV       SAVE REQUEST
 0002 I CE 002D I         22            LDX     #RDC1MG       DISPLAY
 0005 I FF 0000 R         23            STX     MSGRQT
 0008 I BD 0006 R         24            JSR     MSGOUT        STATION #
 000B I C6 80             25            LDA B   #MSGTCV
 000D I CE 0042 I         26            LDX     #RDC2MG
 0010 I FF 0000 R         27            STX     MSGRQT        CHANNEL
 0013 I BD 0006 R         28            JSR     MSGOUT        2
 0016 I C6 80             29            LDA B   #MSGTCV
 0018 I CE 0056 I         30            LDX     #RDC3MG
 001B I FF 0000 R         31            STX     MSGRQT
 001E I BD 0006 R         32            JSR     MSGOUT        CHANNEL 3
 0021 I CE 006B I         33            LDX     #RDC4MG
 0024 I FF 0000 R         34            STX     MSGRQT
 0027 I C6 80             35            LDA B   #MSGTCV
 0029 I BD 0006 R         36            JSR     MSGOUT        CHANNEL 4
 002C I 39                37            RTS
 002D I 04                38 RDC1MG     FCB     STNNDG
```

```
002E I 03           39           FCB    3,9
002F I 09
0030 I 0001    R    40           FDB    STNMAP
0032 I 10           41           FCB    $10,3,0
0033 I 03
0034 I 00
0035 I 43484E       42           FCC    /CHNL 1 =/
003D I 0D           43           FCB    $D,$E
003E I 0E
003F I 0005    R    44           FDB    NUMMSG
0041 I 04           45           FCB    4
0042 I 04           46 RDC2MG    FCB    STNNDG
0043 I 03           47           FCB    3,24
0044 I 18
0045 I 0002    R    48           FDB    STNMP2
0047 I 10           49           FCB    $10,3,15
0048 I 03
0049 I 0F
004A I 43484E       50           FCC    /CHNL 2 =/
0052 I 0E           51           FCB    $E
0053 I 0005    R    52           FDB    NUMMSG
DPLRTU(A0011.02.068AA  CRS CHANNEL ASSIGNMENT)          08/04/78  11:39:41  PAGE   2

0055 I 04           53           FCB    4
0056 I 04           54 RDC3MG    FCB    STNNDG
0057 I 04           55           FCB    4,9
0058 I 09
0059 I 0003    R    56           FDB    STNMP4
005B I 10           57           FCB    $10,4,0
005C I 04
005D I 00
005E I 43484E       58           FCC    /CHNL 3 =/
0066 I 0D           59           FCB    $D,$E
0067 I 0E
0068 I 0005    R    60           FDB    NUMMSG
006A I 04           61           FCB    4
006B I 04           62 RDC4MG    FCB    STNNDG
006C I 04           63           FCB    4,24
006D I 18
006E I 0004    R    64           FDB    STNMP6
0070 I 10           65           FCB    $10,4,15
0071 I 04
0072 I 0F
0073 I 43484E       66           FCC    /CHNL 4 =/
007B I 0E           67           FCB    $E
007C I 0005    R    68           FDB    NUMMSG
007E I 0D           69           FCB    $D,4
007F I 04
0080                70           END
DPLRTU(A0011.02.068AA  CRS CHANNEL ASSIGNMENT)          08/04/78  11:39:42  PAGE   3

  NO ERRORS
 ISECT LENGTH --   128
 DSECT LENGTH --     0

< DPLRTU    0000 I    20      7
> MSGOUT    0006      13     13    24    28    32    36
> MSGRQT    0000       9      9    23    27    31    34
  MSGTCV    0080 A    18     21    25    29    35
> NUMMSG    0005      11     11    44    52    60    68
  RDC1MG    002D I    38     22
  RDC2MG    0042 I    46     26
  RDC3MG    0056 I    54     30
  RDC4MG    006B I    62     33
> STNMAP    0001       9      9    40
> STNMP2    0002      10     10    48
> STNMP4    0003      10     10    56
> STNMP6    0004      10     10    64
  STNNDG    0004 A    16     38    46    54    62
ATHRTN(A0011.02.069AA  CRS ARITHMETIC FUNCTIONS)        08/04/78  11:40:46  PAGE   1

0000 I               2           ISEC
```

```
           *
                  DEF    IDXRTN
                  DEF    DEXRTN
                  DEF    INXIDX,INX4
                  DEF    ASLRTN,ASL4
                  DEF    DPADDR,DPAVAL
                  DEF    DPSUBR
                  DEF    CMPRTN,CMPPR1,CMPPR2
                  DEF    MX1000
                  DEF    EXTPRA
                  DEF    CLRCOR
           *
                  REF    SAVDTI
           *
           *
           *      ROUTINE TO MULTIPLY BY 1000
           *
           *      CALLING SEQUENCE:
           *
           *      ACCB => # TO BE MULTIPLIED
           *
0000 I        MX1000  EQU    *
0000 I 4F             CLR A
0001 I 5D             TST B
0002 I 26 01          BNE    MX2
0004 I 39             RTS
0005 I 4A     MX2     DEC A
0006 I F7 0000 R      STA B  SAVDTI
0009 I 50             NEG B
000A I 58             ASL B
000B I 58             ASL B
000C I FB 0000 R      ADD B  SAVDTI
000F I 58             ASL B
0010 I BB 0000 R      ADD A  SAVDTI
0013 I 58             ASL B
0014 I 49             ROL A
0015 I 58             ASL B
0016 I 49             ROL A
0017 I 39             RTS
           *
           *      ROUTINE TO COMPARE TWO 16 BIT NUMBERS
           *
           *      CALLING SEQUENCE:  JSR  CMPRTN
           *
           *      CMPPR2 => PNTR TO VALUE TO COMPARE
           *      CMPPR1 => PNTR TO VALUE TO COMPARE AGAINST
           *
0018 I        CMPRTN  EQU    *
0018 I 36             PSH A                SAVE ACCUMULATORS
0019 I 37             PSH B
001A I FE 0006 D      LDX    CMPPR2
001D I A6 00          LDA A  0,X           LOAD VALUE
001F I E6 01          LDA B  1,X           TO COMPARE
0021 I FE 0004 D      LDX    CMPPR1        LOAD PNTR TO VALUE TO COMPARE AGAINST
0024 I A1 00          CMP A  0,X           SET CC FOR BRANCH
0026 I 27 03          BEQ    CMP1          JUMP IF 1ST BYTES EQUAL
0028 I 33     CMP2    PUL B                RESTORE VALUES
ATHRTN(A0011.02.069AA  CRS ARITHMETIC FUNCTIONS)      08/04/78  11:40:47  PAGE   2

0029 I 32             PUL A
002A I 39             RTS                  RETURN TO CALLER
002B I E1 01  CMP1    CMP B  1,X           COMPARE 2ND BYTES OF EACH NUMBER
002D I 20 F9          BRA    CMP2
           *
           *      ROUTINE TO PERFORM DOUBLE PRECISION ADD
           *
           *      CALLING SEQUENCE:  JSR  DPADDR
           *
           *      DPAVAL => PNTR TO VALUE TO BE INCREMENTED
           *      IDX    => VALUE TO BE ADDED
           *
002F I        DPADDR  EQU    *
002F I 36             PSH A
```

```
0030 I 37                     PSH B
0031 I FF 0002 D              STX   DPAINC      SAVE INCREMENT
0034 I B6 0002 D              LDA A DPAINC
0037 I F6 0003 D              LDA B DPAINC+1
003A I FE 0000 D     DPA1     LDX   DPAVAL      LOAD PNTR TO BASE VALUE
003D I EB 01                  ADD B 1,X         PERFORM
003F I E7 01                  STA B 1,X         ADDITION
0041 I A9 00                  ADC A 0,X
0043 I A7 00                  STA A 0,X
0045 I 33                     PUL B
0046 I 32                     PUL A
0047 I 39                     RTS               RETURN TO CALLER
                     *
                     *     ROUTINE TO PERFORM DOUBLE PRECISION ADD
                     *
                     *
                     *     CALLING SEQUENCE:  JSR  DPADDR
                     *
                     *     DPAVAL => PNTR TO VALUE TO BE DECREMENTED
                     *     IDX    => VALUE TO BE SUBTRACTED
                     *
0048 I               DPSUBR   EQU   *
0048 I 36                     PSH A
0049 I 37                     PSH B
004A I FF 0002 D              STX   DPAINC
004D I F6 0003 D              LDA B DPAINC+1
0050 I B6 0002 D              LDA A DPAINC
0053 I 43                     COM A
0054 I 53                     COM B
0055 I CB 01                  ADD B #1
0057 I 89 00                  ADC A #0
0059 I F7 0003 D              STA B DPAINC+1
005C I B7 0002 D              STA A DPAINC
005F I 20 D9                  BRA   DPA1
                     *
                     *     ARITHMETIC SHIFT LEFT ROUTINE
                     *
0061 I               ASLRTN   EQU   *
0061 I 48            ASL4     ASL A
0062 I 48            ASL3     ASL A
0063 I 48            ASL2     ASL A
0064 I 48            ASL1     ASL A
0065 I 39                     RTS
                     *
ATHRTN(A0011.02.069AA  CRS ARITHMETIC FUNCTIONS)      08/04/78  11:40:48  PAGE   3

                     *     ROUTINE TO INCREMENT INDEX REGISTER
                     *
0066 I               INXIDX   EQU   *
0066 I 08            INX4     INX
0067 I 08            INX3     INX
0068 I 08            INX2     INX
0069 I 08            INX1     INX
006A I 39                     RTS
                     *
                     *     ROUTINE TO INCREMENT 16 BIT NUMBER
                     *
                     *     CALLING SEQUENCE:
                     *
                     *     ACCA => INCREMENT
                     *     IDX  => POINTER TO VALUE
                     *
006B I               IDXRTN   EQU   *
006B I AB 01                  ADD A 1,X
006D I A7 01                  STA A 1,X
006F I 24 02                  BCC   IDX1
0071 I 6C 00                  INC   0,X
0073 I 39            IDX1     RTS
                     *
                     *     ROUTINE TO DECREMENT 16 BIT NUMBER
                     *
                     *     CALLING SEQUENCE:
                     *
```

```
                           *       ACCA => DECREMENT
                           *       IDX  => POINTER TO VALUE
                           *
0074 I                     DEXRTN    EQU     *
0074 I 40                            NEG A
0075 I 27 0A                         BEQ     DEX1
0077 I AB 01                         ADD A   1,X
0079 I A7 01                         STA A   1,X
007B I 86 FF                         LDA A   #$FF
007D I A9 00                         ADC A   0,X
007F I A7 00                         STA A   0,X
0081 I 39                  DEX1      RTS
0000 D                               DSEC
                           *
                           *       STORAGE REQUIREMENTS FOR 'DPADDR'
                           *
0000 D 0000      A         DPAVAL    FDB     0          PNTR TO VALUE TO BE INCREMENTED
0002 D 0000      A         DPAINC    FDB     0          VALUE TO BE ADDED
                           *
                           *       STORAGE REQUIREMENTS FOR 'CMPRTN'
                           *
0004 D 0000      A         CMPPR1    FDB     0
0006 D 0000      A         CMPPR2    FDB     0
                           *
                           *       CENTRAL RECORDING STATION DECIMAL TO BINARY CONVERSION SUBROUTINE
                           *
0082 I                               ISEC
                           *
                                     DEF     DECBIN
                                     DEF     CNVPTR,NUMCHR,DECNUM
                           *
ATHRTN(A0011.02.069AA  CRS ARITHMETIC FUNCTIONS)       08/04/78  11:40:49  PAGE   4

                           *       CALLING SEQUENCE
                           *
                           *       CNVPTR => POINTER TO CONVERTED VALUE
                           *       NUMCHR => # CHARACTERS TO CONVERT
                           *       DECNUM => PNTR TO MOST SIGNIFICANT DIGIT OF # - 1
                           *
0082 I                     DECBIN    EQU     *
0082 I FE 0008 D                     LDX     CNVPTR     LOAD PNTR TO CONVERTED VALUE
0085 I 6F 00                         CLR     0,X        CLEAR CONVERSION
0087 I 6F 01                         CLR     1,X        AREA
0089 I A6 00                         LDA A   0,X        PICK UP
008B I E6 01                         LDA B   1,X        INITIAL VALUE
008D I 58                  DEC1      ASL B              MULTIPLY
008E I 49                            ROL A              VALUE
008F I 68 01                         ASL     1,X        BY
0091 I 69 00                         ROL     0,X        10
0093 I 68 01                         ASL     1,X
0095 I 69 00                         ROL     0,X
0097 I 68 01                         ASL     1,X
0099 I 69 00                         ROL     0,X
009B I EB 01                         ADD B   1,X
009D I A9 00                         ADC A   0,X
009F I A7 00                         STA A   0,X        SAVE INTERIM VALUE
00A1 I E7 01                         STA B   1,X        MULTIPLIED BY 10
00A3 I FE 000B D                     LDX     DECNUM     LOAD PNTR
00A6 I 08                            INX                TO NEXT DIGIT
00A7 I FF 000B D                     STX     DECNUM
00AA I E6 00                         LDA B   0,X        PICK UP
00AC I C4 0F                         AND B   #$F        NEXT DIGIT
00AE I FE 0008 D                     LDX     CNVPTR     SET PNTR TO CONVERSION VALUE
00B1 I 4F                            CLR A
00B2 I EB 01                         ADD B   1,X        ADD IN
00B4 I A9 00                         ADC A   0,X        NEXT DIGIT
00B6 I A7 00                         STA A   0,X        SAVE FINAL
00B8 I E7 01                         STA B   1,X        CONVERSION VALUE
00BA I 7A 000A D                     DEC     NUMCHR     NUMBER CONVERTED
00BD I 2E CE                         BGT     DEC1       NO
00BF I 39                            RTS                RETURN TO CALLER
                           *
0008 D                               DSEC
```

```
                     216 *      DECBIN ROUTINE
                     217 *
0008 D 0000     A    218 CNVPTR    FDB    0            PNTR TO CONVERTED VALUE
000A D 00            219 NUMCHR    FCB    0            # CHARS TO CONVERT
000B D 0000     A    220 DECNUM    FDB    0            PNTR TO MOST SIGNIFICANT DIGIT OF # -1
                     221 *
                     222 *      CENTRAL RECORDING STATION BINARY TO DECIMAL CONVERSION ROUTINE
                     223 *
00C0 I               224           ISEC
                     225 *
                     226           DEF    BINDEC
                     227           DEF    HEXVAL,DGTPTR,DGTCTR
                     228           DEF    HEXVL1
                     229 *
                     230           REF    CHRQST,IDXSAV,NUMD,MAXDG
                     231           REF    IDXSV2
                     232           REF    NDMXM0
                     233 *
ATHRTN(A0011.02.069AA  CRS ARITHMETIC FUNCTIONS)       08/04/78  11:40:51  PAGE   5

                     234           REF    KYS2
                     235 *
                     236 *      CALLING SEQUENCE:
                     237 *
                     238 *      IDX  => PNTR TO VALUE TO BE CONVERTED
                     239 *      ACCA => BITS 0-6 MAX # DIGITS
                     240 *              BIT 7 SET INDICATES SINGLE BYTE VALUE
                     241 *
00C0 I               242 BINDEC    EQU    *
00C0 I 4D            243           TST A
00C1 I 2A 0C         244           BPL    BIN1         JUMP IF DOUBLE BYTE
00C3 I 84 7F         245           AND A  #$7F         MASK OFF SINGLE BYTE VALUE INDICATOR
00C5 I 7F 000D D     246           CLR    HEXVAL       CLEAR 1ST BYTE OF VALUE
00C8 I E6 00         247           LDA B  0,X          SET IN VALUE
00CA I F7 000E D     248           STA B  HEXVAL+1     TO BE CONVERTED
00CD I 20 05         249           BRA    BIN2
00CF I EE 00         250 BIN1      LDX    0,X          SET VALUE
00D1 I FF 000D D     251           STX    HEXVAL       TO BE CONVERTED
00D4 I B7 0001 R     252 BIN2      STA A  CHRQST       SAVE MAX # DIGITS
00D7 I C6 20         253           LDA B  #$20         BLANK INTERNAL
00D9 I BD 0007 R     254           JSR    KYS2         STORAGE AREA
00DC I CE 0153 I     255           LDX    #VALTAB      COMPUTE
00DF I FF 0002 R     256           STX    IDXSAV       STARTING
00E2 I B6 0001 R     257           LDA A  CHRQST
00E5 I 48            258           ASL A               PNTR INTO
00E6 I BB 0005 R     259           ADD A  IDXSV2       CONVERSION
00E9 I B7 0005 R     260           STA A  IDXSV2
00EC I 24 03         261           BCC    BIN3         TABLE
00EE I 7C 0002 R     262           INC    IDXSAV
00F1 I CE 0006 R     263 BIN3      LDX    #NDMXM0      COMPUTE
00F4 I B6 0001 R     264           LDA A  CHRQST       PNTR TO
00F7 I 4A            265 BIN5      DEC A               MOST SIGNIFICANT
00F8 I 2B 03         266           BMI    BIN4         DIGIT OF
00FA I 09            267           DEX                 NUMBER
00FB I 20 FA         268           BRA    BIN5
00FD I FF 000F D     269 BIN4      STX    DGTPTR       SAVE PNTR
0100 I 7F 0001 R     270           CLR    CHRQST       SET 1ST CHARACTER INDICATOR
0103 I B6 000D D     271           LDA A  HEXVAL       PICK UP #
0106 I F6 000E D     272 BINA      LDA B  HEXVAL+1     TO CONVERT
0109 I 7F 0011 D     273           CLR    DGTCTR       CLEAR COUNTER
010C I FE 0002 R     274           LDX    IDXSAV       SET PNTR
010F I 09            275           DEX                 TO NEXT
0110 I 09            276           DEX                 CONVERSION
0111 I FF 0002 R     277           STX    IDXSAV       VALUE
0114 I 8C 0151 I     278           CPX    #VALTAB-2    CONVERSION COMPLETE
0117 I 27 2C         279           BEQ    BIN7         YES
0119 I E0 01         280 BIN9      SUB B  1,X          DECR VALUE
011B I A2 00         281           SBC A  0,X          BY CONVERSION FACTOR
011D I 24 21         282           BCC    BIN6         CONTINUE IF NO POSITION SHIFT
011F I EB 01         283           ADD B  1,X          RESTORE
0121 I A9 00         284           ADC A  0,X          VALUE
0123 I F7 000E D     285           STA B  HEXVAL+1     SAVE ACCB
0126 I FE 000F D     286           LDX    DGTPTR       LOAD PNTR TO DIGIT STORAGE AREA
```

```
0129 I F6 0011 D   287         LDA B  DGTCTR      LOAD COUNT
012C I 26 05       288         BNE    BINB        CONTINUE IF NOT ZERO
012E I 7D 0001 R   289         TST    CHRQST      1ST DIGIT
0131 I 27 07       290         BEQ    BIN8        YES
0133 I CA 30       291 BINB    ORA B  #$30        CONVERT TO ASCII
```

ATHRTN(A0011.02.069AA CRS ARITHMETIC FUNCTIONS) 08/04/78 11:40:52 PAGE 6

```
0135 I E7 00       292         STA B  0,X         SAVE IN DISPLAY AREA
0137 I 7C 0001 R   293         INC    CHRQST
013A I 08          294 BIN8    INX                UPDATE DIGIT
013B I FF 000F D   295         STX    DGTPTR      PNTR
013E I 20 C6       296         BRA    BINA        CONTINUE CONVERSION
0140 I 7C 0011 D   297 BIN6    INC    DGTCTR      INCR CNTR
0143 I 20 D4       298         BRA    BIN9        CONTINUE
0145 I 7D 0001 R   299 BIN7    TST    CHRQST      ZERO VALUE
0148 I 26 08       300         BNE    BINC        NO
014A I 86 30       301         LDA A  #$30        SET SINGLE ZERO FOR 0 VALUE
014C I FE 000F D   302         LDX    DGTPTR
014F I 09          303         DEX
0150 I A7 00       304         STA A  0,X
0152 I 39          305 BINC    RTS                RETURN TO CALLER
                   306 *
0153 I 0001     A  307 VALTAB  FDB    1           CONVERSION
0155 I 000A     A  308         FDB    10          FACTORS
0157 I 0064     A  309         FDB    100
0159 I 03E8     A  310         FDB    1000
015B I 2710     A  311         FDB    10000
                   312 *
                   313 *      ROUTINE TO INCREMENT EXTENDED PRECISION NUMBER (4 BYTES)
                   314 *
                   315 *      CALLING SEQUENCE:  JSR EXTPRA
                   316 *
                   317 *      IDX => PNTR TO VALUE VALUE TO BE INCREMENTED
                   318 *
015D I             319 EXTPRA  EQU    *
015D I A6 03       320         LDA A  3,X
015F I E6 02       321         LDA B  2,X
0161 I 8B 01       322         ADD A  #1
0163 I C9 00       323         ADC B  #0
0165 I A7 03       324         STA A  3,X
0167 I E7 02       325         STA B  2,X
0169 I A6 01       326         LDA A  1,X
016B I E6 00       327         LDA B  0,X
016D I 89 00       328         ADC A  #0
016F I C9 00       329         ADC B  #0
0171 I A7 01       330         STA A  1,X
0173 I E7 00       331         STA B  0,X
0175 I 39          332         RTS
                   333 *
                   334 *      ROUTINE TO ZERO CONSECUTIVE STORAGE LOCATIONS
                   335 *
                   336 *      CALLING SEQUENCE:  JSR  CLRCOR
                   337 *
                   338 *      ACCA => # LOCATIONS TO ZERO
                   339 *      IDX  => STARTING LOCATION
                   340 *
0176 I             341 CLRCOR  EQU    *
0176 I 4C          342         INC A
0177 I 4A          343 CLRC2   DEC A              COMPLETE ?
0178 I 27 05       344         BEQ    CLRC1       YES
017A I 6F 00       345         CLR    0,X         ZERO
017C I 08          346         INX
017D I 20 F8       347         BRA    CLRC2       CONTINUE
017F I 39          348 CLRC1   RTS
000D D             349         DSEC
```

ATHRTN(A0011.02.069AA CRS ARITHMETIC FUNCTIONS) 08/04/78 11:40:54 PAGE 7

```
                   350 *      BINARY TO DECIMAL CONVERSION ROUTINE
000D D 0000     A  351 HEXVAL  FDB    0           VALUE TO BE CONVERTED
000E D             352 HEXVL1  EQU    *-1
000F D 0000     A  353 DGTPTR  FDB    0           PNTR TO STORAGE LOCATION FOR NEXT ASCII DII
0011 D 00          354 DGTCTR  FCB    0           DIGIT COUNTER
                   355 *
                   356 *      ROUTINE TO CONVERT HEX TO ASCII
                   357 *
```

```
                      358 *            CALLING SEQUENCE:  JSR  HEXASC
                      359 *
                      360 *            CALLING PARAMETERS:  IDX => PNTR TO VALUE TO CONVERT
                      361 *                                 ACCA => # BYTES TO CONVERT
                      362 *                                 HXACVP => CONVESION SAVE AREA PNTR
                      363 *
                      364 *
                      365          DEF    HEXASC
                      366          DEF    HXACVP,HXAVAL
                      367 *
0180 I                368          ISEC
                      369 *
0180 I                370 HEXASC   EQU    *
0180 I 36             371          PSH A             SAVE # BYTES TO CONVERT
0181 I FF 0014 D      372          STX    HXAVAL     SAVE PNTR TO VALUE TO CONVERT
0184 I 32             373 HXA5     PUL A
0185 I 4A             374          DEC A             ALL BYTES CONVERTED ?
0186 I 2B 2D          375          BMI    HXA2       YES, RETURN TO CALLER
0188 I 36             376          PSH A             SAVE # BYTES REMAINING TO CONVERT
0189 I FE 0014 D      377          LDX    HXAVAL     PICK UP PNTR TO VALUE TO CONVERT
018C I E6 00          378          LDA B  0,X        PICK UP NEXT BYTE TO CONVERT
018E I 08             379          INX
018F I FF 0014 D      380          STX    HXAVAL     SET PNTR TO NEXT VALUE TO CONVERT
0192 I 86 02          381          LDA A  #2         INITIALIZE NIBBLE COUNT
0194 I 36             382 HXA4     PSH A
0195 I 4F             383          CLR A
0196 I 58             384          ASL B
0197 I 49             385          ROL A
0198 I 58             386          ASL B
0199 I 49             387          ROL A
019A I 58             388          ASL B
019B I 49             389          ROL A
019C I 58             390          ASL B
019D I 49             391          ROL A
019E I 8B 30          392          ADD A  #'0        ANTICIPATE 0-9 DIGIT
01A0 I 81 39          393          CMP A  #'9        0-9 DIGIT ?
01A2 I 23 02          394          BLS    HXA3       YES
01A4 I 8B 07          395          ADD A  #7         SETUP A-F DIGIT
01A6 I FE 0012 D      396 HXA3     LDX    HXACVP     PICK UP CONVERSION SAVE AREA PNTR
01A9 I A7 00          397          STA A  0,X        SAVE CONVERTED DIGIT
01AB I 08             398          INX
01AC I FF 0012 D      399          STX    HXACVP     UPDATE CONVERSION SAVE AREA PNTR
01AF I 32             400          PUL A
01B0 I 4A             401          DEC A             BOTH NIBBLES CONVERTED ?
01B1 I 26 E1          402          BNE    HXA4       NO, CONVERT 2ND DIGIT
01B3 I 20 CF          403          BRA    HXA5       CHECK IF CONVERSION COMPLETE
01B5 I 39             404 HXA2     RTS
                      405 *
                      406 *      STORAGE REQUIREMENTS FOR 'HEXASC'
                      407 *
ATHRTN(A0011.02.069AA  CRS ARITHMETIC FUNCTIONS)        08/04/78  11:40:55  PAGE   8
0012 D                408          DSEC
                      409 *
0012 D 0000    A      410 HXACVP   FDB    0          CONVERSION SAVE AREA POINTER
0014 D 0000    A      411 HXAVAL   FDB    0          POINTER TO VALUE TO CONVERT
0016                  412          END
ATHRTN(A0011.02.069AA  CRS ARITHMETIC FUNCTIONS)        08/04/78  11:40:55  PAGE   9
   NO ERRORS
 ISECT LENGTH --    438
 DSECT LENGTH --     22

 ASL1       0064 I   115
 ASL2       0063 I   114
 ASL3       0062 I   113
< ASL4      0061 I   112       7
< ASLRTN    0061 I   111       7
 BIN1       00CF I   250     244
 BIN2       00D4 I   252     249
 BIN3       00F1 I   263     261
 BIN4       00FD I   269     266
 BIN5       00F7 I   265     268
 BIN6       0140 I   297     282
 BIN7       0145 I   299     279
 BIN8       013A I   294     290
 BIN9       0119 I   280     298
 BINA       0106 I   272     296
```

```
  BINB      0133 I   291   288
  BINC      0152 I   305   300
< BINDEC    00C0 I   242   226
> CHRQST    0001     230   230   252   257   264   270   289   293   299
  CLRC1     017F I   348   344
  CLRC2     0177 I   343   347
< CLRCOR    0176 I   341    13
  CMP1      002B I    62    58
  CMP2      0028 I    59    63
< CMPPR1    0004 D   166    10    56
< CMPPR2    0006 D   167    10    53
< CMPRTN    0018 I    50    10
< CNVPTR    0008 D   218   174   183   205
  DEC1      008D I   188   212
< DECBIN    0082 I   182   173
< DECNUM    000B D   220   174   200   202
  DEX1      0081 I   156   150
< DEXRTN    0074 I   148     5
< DGTCTR    0011 D   354   227   273   287   297
< DGTPTR    000F D   353   227   269   286   295   302
  DPA1      003A I    78   107
< DPADDR    002F I    72     8
  DPAINC    0002 D   162    75    76    77    98    99   100   105   106
< DPAVAL    0000 D   161     8    78
< DPSUBR    0048 I    95     9
< EXTPRA    015D I   319    12
< HEXASC    0180 I   370   365
< HEXVAL    000D D   351   227   246   248   251   271   272   285
< HEXVL1    000E D   352   228
  HXA2      01B5 I   404   375
  HXA3      01A6 I   396   394
  HXA4      0194 I   382   402
  HXA5      0184 I   373   403
< HXACVP    0012 D   410   366   396   399
< HXAVAL    0014 D   411   366   372   377   380
  IDX1      0073 I   139   137
< IDXRTN    006B I   134     4
> IDXSAV    0002     230   230   256   262   274   277
A1HRTN(A0011.02.069AA  CRS ARITHMETIC FUNCTIONS)        08/04/78  11:40:56  PAGE  10

> IDXSV2    0005     231   231   259   260
  INX1      0069 I   124
  INX2      0068 I   123
  INX3      0067 I   122
< INX4      0066 I   121     6
< INXIDX    0066 I   120     6
> KYS2      0007     234   234   254
> MAXDG     0004     230   230
< MX1000    0000 I    24    11
  MX2       0005 I    29    27
> NDMXM0    0006     232   232   263
< NUMCHR    000A D   219   174   211
> NUMD      0003     230   230
> SAVDTI    0000      15    15    30    34    36
  VALTAB    0153 I   307   255   278
MVCHAR(A0011.02.070AA  CRS CHARACTER MOVE ROUTINE)      08/04/78  11:42:18  PAGE   1
```

```
                        2 *
                        3 *      ROUTINE TO MOVE CHARACTERS
                        4 *
 0000 I                 5           ISEC
                        6 *
                        7           DEF    MVCHAR,MVCCHR
                        8           DEF    MVCSTR,MVCDST
                        9 *
                       10 *      CALLING SEQUENCE: JSR MVCHAR
                       11 *
                       12 *      MVCSTR => STARTING ADDRESS
                       13 *      MVCDST => DESTINATION
                       14 *      ACCA   => # CHARACTERS TO MOVE
                       15 *
 0000 I                16 MVCHAR    EQU    *
 0000 I                17 MVCCHR    EQU    *
```

```
0000 I 4A          18 MVC1    DEC A              ALL CHARACTERS MOVED
0001 I 2B 14       19         BMI    MVCX        YES
0003 I FE 0000 D   20         LDX    MVCSTR      LOAD CHARACTER
0006 I E6 00       21         LDA B  0,X
0008 I 08          22         INX                MVCSTR
0009 I FF 0000 D   23         STX    MVCSTR
000C I FE 0002 D   24         LDX    MVCDST
000F I E7 00       25         STA B  0,X         STORE
0011 I 08          26         INX                CHARACTER
0012 I FF 0002 D   27         STX    MVCDST
0015 I 20 E9       28         BRA    MVC1
0017 I 39          29 MVCX    RTS                RETURN
0000 D             30         DSEC
                   31 *
                   32 *    STORAGE REQUIREMENTS FOR 'MVCHAR'
                   33 *
0000 D 0000    A   34 MVCSTR  FDB    0           SOURCE
0002 D 0000    A   35 MVCDST  FDB    0           DESTINATION
0004               36         END
MVCHAR(A0011.02.070AA  CRS CHARACTER MOVE ROUTINE)      08/04/78  11:42:18  PAGE   2

  NO ERRORS
 ISECT LENGTH --    24
 DSECT LENGTH --    4

 MVC1      0000 I    18     28
( MVCCHR   0000 I    17      7
( MVCDST   0002 D    35      8    24    27
( MVCHAR   0000 I    16      7
( MVCSTR   0000 D    34      8    20    23
 MVCX      0017 I    29     19
CNVNTD(A0011.02.071AA  CRS NORMAL TEST DATA SETUP)      08/04/78  13:27:35  PAGE   1

                    2 *
                    3 *    ROUTINE TO SETUP NORMAL TEST DATA DISPLAY
                    4 *
0000 I              5         ISEC
                    6 *
                    7         DEF    CNVNTD,MSGN1,MSGN2,MSGN3
                    8         DEF    RTUCC1
                    9         DEF    MSGN1C,MSGN1B
                   10         DEF    MSGN1D,MSGN1A
                   11 *
                   12         REF    TSWLLH,TSWLLT,TSWLLO
                   13         REF    TSWCHH,TSWCLT,TSWCHT
                   14         REF    TSWCLO,TSWCHO
                   15         REF    TSWCLH
                   16         REF    RTUCMT
                   17         REF    RTUCME
                   18         REF    SRCVBF,STNADR,CURCSP
                   19         REF    NDMXM1,NDMXM2,NDMXM3,NDMXM4
                   20 *
                   21         REF    BINDEC
                   22 *
                   23 *    LINE STATUS FLAGS AND EQUATES
                   24 *
000E A             25 LCAST3  EQU    14
0008 A             26 LS3NEF  EQU    8           NORMAL TEST ERROR FLAG
0040 A             27 LS3BLE  EQU    $40         BLASTER ERROR
                   28 *
                   29 *    LINE MODE EQUATES
                   30 *
0010 A             31 LCAMDE  EQU    16          LINE MODE
0003 A             32 MODFIR  EQU    3           FIRE MODE
0005 A             33 MODFRA  EQU    5           FIRE ABLRT MODE
                   34 *
                   35 *
0080 A             36 RTUCHE  EQU    $80         RTU NORMAL TEST CHANNEL ERROR LFAG
                   37 *
                   38 *
0000 I             39 CNVNTD  EQU    *
0000 I CE 000B R   40         LDX    #SRCVBF
0003 I FF 0019 D   41         STX    BUFPTR      INITIALIZE POINTER TO RTU DATA
```

```
0006 I 86 0E                 LDA A  #SMSG
0008 I B7 0015 D             STA A  RTUCC       SET RTU STATUS MESSAGE TO GOOD
000B I 86 0F                 LDA A  #RTNCD
000D I B7 0018 D             STA A  RTUCC+3
0010 I B7 004A D             STA A  TEMPD+3
0013 I CE 0616 I             LDX    #MSGN1A
0016 I FF 0016 D             STX    RTUCC+1
                   * TEMPERATURE = (.65593-E)/.005033
                   * TECHNIQUE T = (0833-E)*F.E
0019 I BD 01B9 I             JSR    READ        READ TEMP
001C I CE 0046 D             LDX    #TEMPD-1
001F I 43                    COM A
0020 I 53                    COM B
0021 I 8B 33                 ADD A  #$33
0023 I C9 08                 ADC B  #$8
0025 I BD 021E I             JSR    SIGN        SET SIGN FOR DISPLAY
0028 I 48                    ASL A
0029 I 59                    ROL B
CNvNTD(A0011.02.071AA  CRS NORMAL TEST DATA SETUP)      08/04/78  13:27:37  PAGE   2

002A I 48                    ASL A
002B I 59                    ROL B
002C I 48                    ASL A
002D I 59                    ROL B
002E I 48                    ASL A
002F I 59                    ROL B
0030 I 10                    SBA
0031 I C2 00                 SBC B  #0
0033 I 10                    SBA
0034 I C2 00                 SBC B  #0
0036 I B7 0013 D             STA A  TMP
0039 I 86 2F                 LDA A  #$2F
003B I 4C          TEMP1     INC A
003C I C0 0A                 SUB B  #10
003E I 24 FB                 BCC    TEMP1       DIVIDE BY 10 DEGREES
0040 I CB 3A                 ADD B  #$3A
0042 I A7 02                 STA A  2,X         STORE TENS OF DEGREES
0044 I E7 03                 STA B  3,X         STORE UNITS OF DEGREES
0046 I CE 05EC I             LDX    #MSGN1B
0049 I FF 0008 D             STX    PERR        SET TYPE OF ERROR IF ONE OCCURS
004C I BD 01B9 I             JSR    READ        READ 6.75 VOLTS
004F I BD 01B9 I             JSR    READ        READ -6.75 VOLTS
0052 I CE 0588 I             LDX    #M6V
0055 I BD 01C7 I             JSR    CMPR        TEST LIMITS
0058 I CE 0052 D             LDX    #M6VD
005B I BD 0238 I             JSR    CONV3D      CONVERT TO ASCII
005E I BD 01B9 I             JSR    READ        READ 18.75 VOLTS
0061 I CE 0560 I             LDX    #P18V
0064 I BD 01C7 I             JSR    CMPR        TEST LIMITS
0067 I CE 001B D             LDX    #P18VD
006A I BD 023D I             JSR    CONV4D      CONVERT TO ASCII
006D I BD 01B9 I             JSR    READ        READ -18.75 VOLTS
0070 I CE 057C I             LDX    #M18V
0073 I BD 01C7 I             JSR    CMPR        TEST LIMITS
0076 I CE 0023 D             LDX    #M18VD
0079 I BD 023D I             JSR    CONV4D      CONVERT TO ASCII
007C I BD 01B9 I             JSR    READ        READ 8.75 VOLTS
007F I CE 056C I             LDX    #P8V
0082 I BD 01C7 I             JSR    CMPR        TEST LIMITS
0085 I CE 002B D             LDX    #P8VD
0088 I BD 0238 I             JSR    CONV3D      CONVERT TO ASCII
008B I BD 01B9 I             JSR    READ        READ ADC +
008E I CE 0590 I             LDX    #PADCV
0091 I BD 01C7 I             JSR    CMPR
0094 I CE 0032 D             LDX    #PADCD
0097 I BD 0238 I             JSR    CONV3D      CONVERT TO ASCII
009A I BD 01B9 I             JSR    READ        READ ADC -
009D I CE 0594 I             LDX    #MADCV
00A0 I BD 01C7 I             JSR    CMPR
00A3 I CE 0039 D             LDX    #MADCD
00A6 I BD 0238 I             JSR    CONV3D      CONVERT TO ASCII
00A9 I CE 05FA I             LDX    #MSGN1C
00AC I FF 0008 D             STX    PERR        SET TYPE OF ERROR IF ONE OCCURS
```

```
00AF I BD 01B9 I   113      JSR    READ       READ 5 MICRO VOLTAGE
00B2 I CE 0574 I   114      LDX    #P5MV
00B5 I BD 01C7 I   115      JSR    CMPR       TEST LIMITS
00B8 I CE 0059 D   116      LDX    #P5MVD
00BB I BD 0238 I   117      JSR    CONV3D     CONVERT TO ASCII
```

CNVNTD(A0011.02.071AA CRS NORMAL TEST DATA SETUP) 08/04/78 13:27:38 PAGE 3

```
00BE I BD 01B9 I   118      JSR    READ       READ 5
00C1 I CE 0578 I   119      LDX    #P5V
00C4 I BD 01C7 I   120      JSR    CMPR       TEST LIMITS
00C7 I CE 0060 D   121      LDX    #P5VD
00CA I BD 0238 I   122      JSR    CONV3D     CONVERT TO ASCII
00CD I BD 01B9 I   123      JSR    READ       READ +12D
00D0 I CE 0564 I   124      LDX    #P12V
00D3 I BD 01C7 I   125      JSR    CMPR       TEST LIMITS
00D6 I CE 006E D   126      LDX    #P12DVD
00D9 I BD 023D I   127      JSR    CONV4D     CONVERT TO ASCII
00DC I BD 01B9 I   128      JSR    READ       READ -12D
00DF I CE 0580 I   129      LDX    #M12V
00E2 I BD 01C7 I   130      JSR    CMPR       TEST LIMITS
00E5 I CE 0076 D   131      LDX    #M12DVD
00E8 I BD 023D I   132      JSR    CONV4D     CONVERT TO ASCII
00EB I BD 01B9 I   133      JSR    READ       READ +15A
00EE I CE 0568 I   134      LDX    #P15V
00F1 I BD 01C7 I   135      JSR    CMPR       TEST LIMITS
00F4 I CE 007E D   136      LDX    #P12AVD
00F7 I BD 023D I   137      JSR    CONV4D     CONVERT TO ASCII
00FA I BD 01B9 I   138      JSR    READ       READ -15A
00FD I CE 0584 I   139      LDX    #M15V
0100 I BD 01C7 I   140      JSR    CMPR       TEST LIMITS
0103 I CE 0086 D   141      LDX    #M12AVD
0106 I BD 023D I   142      JSR    CONV4D     CONVERT TO ASCII
0109 I BD 01B9 I   143      JSR    READ       READ -5
010C I CE 058C I   144      LDX    #M5V
010F I BD 01C7 I   145      JSR    CMPR       TEST LIMITS
0112 I CE 0067 D   146      LDX    #M5VD
0115 I BD 0238 I   147      JSR    CONV3D     CONVERT TO ASCII
0118 I BD 01B9 I   148      JSR    READ       READ ADC 0
011B I CE 0598 I   149      LDX    #ZADCV
011E I BD 01C7 I   150      JSR    CMPR
0121 I CE 0040 D   151      LDX    #ZADCD
0124 I BD 0238 I   152      JSR    CONV3D     CONVERT TO ASCII
0127 I CE 0609 I   153      LDX    #MSGN1D
012A I FF 0008 D   154      STX    PERR       SET TYPE OF ERROR IF ONE OCCURS
012D I BD 01B9 I   155      JSR    READ       READ LEAKAGE
0130 I B7 00BC D   156      STA A  LKG1D+1
0133 I F7 00BB D   157      STA B  LKG1D
0136 I BD 01B9 I   158      JSR    READ       READ LEAKAGE
0139 I B7 00C1 D   159      STA A  LKG2D+1
013C I F7 00C0 D   160      STA B  LKG2D
013F I 8D 78       161      BSR    READ       READ LEAKAGE
0141 I B7 00C6 D   162      STA A  LKG3D+1
0144 I F7 00C5 D   163      STA B  LKG3D
0147 I 8D 70       164      BSR    READ       READ LEAKAGE
0149 I B7 00CB D   165      STA A  LKG4D+1
014C I F7 00CA D   166      STA B  LKG4D
014F I 8D 68       167      BSR    READ       READ CONTINUITY
0151 I B7 00A8 D   168      STA A  CONT1D+1
0154 I F7 00A7 D   169      STA B  CONT1D
0157 I 8D 60       170      BSR    READ       READ CONTINUITY
0159 I B7 00AD D   171      STA A  CONT2D+1
015C I F7 00AC D   172      STA B  CONT2D
015F I 8D 58       173      BSR    READ       READ CONTINUITY
0161 I B7 00B2 D   174      STA A  CONT3D+1
0164 I F7 00B1 D   175      STA B  CONT3D
```

CNVNTD(A0011.02.071AA CRS NORMAL TEST DATA SETUP) 08/04/78 13:27:40 PAGE 4

```
0167 I 8D 50       176      BSR    READ       READ CONTINUITY
0169 I B7 00B7 D   177      STA A  CONT4D+1
016C I F7 00B6 D   178      STA B  CONT4D
016F I CE 0009 R   179      LDX    #RTUCMT
0172 I FF 0000 D   180      STX    TMPX1
0175 I CE 0093 D   181      LDX    #STAT1D
```

```
0178 I FF 0002 D    182          STX     TMPX2
017B I CE 00BB D    183          LDX     #LKG1D
017E I FF 0004 D    184          STX     TMPX3
0181 I CE 00A7 D    185          LDX     #CONT1D
0184 I FF 0006 D    186          STX     TMPX4
0187 I BD 0282 I    187          JSR     CNTNTY
018A I BD 0282 I    188          JSR     CNTNTY
018D I BD 0282 I    189          JSR     CNTNTY
0190 I BD 0282 I    190          JSR     CNTNTY
0193 I CE 000C R    191          LDX     #STNADR
0196 I 86 04        192          LDA A   #4
0198 I BD 0012 R    193          JSR     BINDEC       CONVERT STATION ID TO ASCII
019B I B6 0011 R    194          LDA A   NDMXM4
019E I B7 008E D    195          STA A   STATID
01A1 I B6 0010 R    196          LDA A   NDMXM3
01A4 I B7 008F D    197          STA A   STATID+1
01A7 I B6 000F R    198          LDA A   NDMXM2
01AA I B7 0090 D    199          STA A   STATID+2
01AD I B6 000E R    200          LDA A   NDMXM1
01B0 I B7 0091 D    201          STA A   STATID+3
01B3 I 86 0F        202          LDA A   #$F
01B5 I B7 0092 D    203          STA A   STATID+4
01B8 I 39           204          RTS
                    205 *
                    206 *     NORMAL TEST DATA CONVERSION UTILITY ROUTINES
                    207 *
                    208 * ROUTINE TO RETRIEVE DATA FROM INPUT BUFFER
01B9 I FE 0019 D    209 READ     LDX     BUFPTR
01BC I 08           210          INX
01BD I E6 00        211          LDA B   0,X          B = HIGH ORDER BYTES
01BF I 08           212          INX
01C0 I A6 00        213          LDA A   0,X          A = LOW ORDER BYTE
01C2 I 08           214          INX
01C3 I FF 0019 D    215          STX     BUFPTR
01C6 I 39           216          RTS
                    217 * ROUTINE TO COMPARE INPUT DATA TO A RANGE OF VALUES
                    218 * X-REG POINTS TO THE LARGER OF TWO 16 BIT LIMITS
                    219 * THE SMALLER LIMIT IMMEDIATELY FOLLOWS THE LARGER
                    220 * B-REG = MOST SIGNIFICANT BYTE
                    221 * A-REG = LEAST SIGNIFICANT BYTE
01C7 I 36           222 CMPR     PSH A
01C8 I E1 00        223          CMP B   0,X          TEST UPPER LIMIT
01CA I 2D 06        224          BLT     CMPR1        BRH IF WITHIN LIMITS
01CC I 2E 12        225          BGT     CMPR2E       BRH IF NOT IN LIMIT
01CE I A1 01        226          CMP A   1,X
01D0 I 22 0E        227          BHI     CMPR2E       BRH IF NOT IN LIMIT
01D2 I E1 02        228 CMPR1    CMP B   2,X          TEST LOWER LIMIT
01D4 I 2E 06        229          BGT     CMPR4        BRH IF WITHIN LIMITS
01D6 I 2D 08        230          BLT     CMPR2E       BRH IF NOT IN LIMIT
01D8 I A1 03        231          CMP A   3,X
01DA I 25 04        232          BCS     CMPR2E       BRH IF NOT IN LIMIT
01DC I 86 00        233 CMPR4    LDA A   #NBLINK
```

```
01DE I 20 39        234          BRA     CMPR3
01E0 I CE 0009 R    235 CMPR2E   LDX     #RTUCMT
01E3 I A6 02        236 CMPRA    LDA A   2,X
01E5 I 8A 80        237          ORA A   #RTUCHE
01E7 I A7 02        238          STA A   2,X          SET CHANNEL ERROR FOR ALL CHANNELS
01E9 I 08           239          INX
01EA I 08           240          INX
01EB I 08           241          INX
01EC I 8C 000A R    242          CPX     #RTUCME
01EF I 26 F2        243          BNE     CMPRA
01F1 I FE 000D R    244 CMPR2    LDX     CURCSP
01F4 I A6 0E        245          LDA A   LCAST3,X
01F6 I 8A 08        246          ORA A   #LS3NEF      SET NRMAL TEST ERROR FLAG
01F8 I A7 0E        247          STA A   LCAST3,X
01FA I B6 0008 D    248          LDA A   PERR
01FD I B1 0016 D    249          CMP A   RTUCC+1
0200 I 22 15        250          BHI     CMPR2C       BRH IF ERROR PRIORITY IS LOW
0202 I 26 0A        251          BNE     CMPR2A       BRH IF ERROR PRIORITY IS HIGH
0204 I B6 0009 D    252          LDA A   PERR+1
```

```
0207 I B1 0017 D              CMP A  RTUCC+2
020A I 24 0B                  BCC    CMPR2C      BRH IF ERROR PRIORITY IS LOW OR EQUAL
020C I 20 06                  BRA    CMPR2D
020E I B7 0016 D     CMPR2A   STA A  RTUCC+1
0211 I B6 0009 D              LDA A  PERR+1
0214 I B7 0017 D     CMPR2D   STA A  RTUCC+2     STORE ERROR MESSAGE POINTER
0217 I 86 11         CMPR2C   LDA A  #BLINK
0219 I B7 0012 D     CMPR3    STA A  MODE        SET BLINK IF ERROR
021C I 32                     PUL A
021D I 39                     RTS
                     * ROUTINE TO EXTRACT A SIGN AND RETURN MAGNITUDE VALUES
                     * B-REG = MOST SIGNIFICANT BYTE
                     * A-REG = LEAST SIGNIFICANT BYTE
021E I B7 0013 D     SIGN     STA A  TMP
0221 I 5D                     TST B
0222 I 2A 08                  BPL    SIGN2       BRH IF POSITIVE VALUE
0224 I 73 0013 D              COM    TMP
0227 I 53                     COM B              GET MAGNITUDE OF VALUE
0228 I 86 2D                  LDA A  #'-
022A I 20 01                  BRA    SIGN1
022C I 4F            SIGN2    CLR A
022D I A7 01         SIGN1    STA A  1,X         STORE SIGN
022F I B6 0012 D              LDA A  MODE
0232 I A7 00                  STA A  0,X         STORE BLINK MODE
0234 I B6 0013 D              LDA A  TMP
0237 I 39                     RTS
                     * ROUTINE TO CONVERT 16 BIT VOLTAGE VALUE TO 3 DIGIT ASCII NUMBER
0238 I 8D E4         CONV3D   BSR    SIGN        SET SIGN FOR DISPLAY
023A I 09                     DEX
023B I 20 18                  BRA    CONV6
                     * ROUTINE TO CONVERT 16 BIT VOLTAGE VALUE TO 4 DIGIT ASCII NUMBER
023D I 8D DF         CONV4D   BSR    SIGN        SET SIGN FOR DISPLAY
023F I 48                     ASL A
0240 I 59                     ROL B
0241 I 48                     ASL A
0242 I 59                     ROL B
0243 I B7 0013 D              STA A  TMP
0246 I 86 30                  LDA A  #'0
0248 I 24 03                  BCC    CONV2       BRH IF <20 VOLTS
CNVNTD(A0011.02.071AA  CRS NORMAL TEST DATA SETUP)     08/04/78  13:27:44  PAGE   6

024A I C0 7D                  SUB B  #$7D
024C I 4C            CONV3    INC A
024D I C0 7D         CONV2    SUB B  #$7D
024F I 24 FB                  BCC    CONV3       DIVIDE BY 10 VOLTS
0251 I CB 7D                  ADD B  #$7D
0253 I A7 02                  STA A  2,X         STORE TENS OF VOLTS
0255 I 78 0013 D     CONV6    ASL    TMP
0258 I 59                     ROL B
0259 I 86 2F                  LDA A  #$2F
025B I 4C            CONV4    INC A
025C I C0 19                  SUB B  #$19
025E I 24 FB                  BCC    CONV4       DIVIDE BY 1 VOLT
0260 I CB 19                  ADD B  #$19
0262 I A7 03                  STA A  3,X         STORE UNITS OF VOLTS
0264 I 78 0013 D              ASL    TMP
0267 I 59                     ROL B
0268 I 86 2F                  LDA A  #$2F
026A I 4C            CONV5    INC A
026B I C0 05                  SUB B  #$5
026D I 24 FB                  BCC    CONV5       DIVIDE BY .1 VOLT
026F I A7 05                  STA A  5,X         STORE TENTHS OF VOLTS
0271 I 86 2E                  LDA A  #'.
0273 I A7 04                  STA A  4,X         STORE DECIMAL POINT
0275 I 78 0013 D              ASL    TMP
0278 I 59                     ROL B
0279 I CB 3A                  ADD B  #$3A
027B I E7 06                  STA B  6,X         STORE HUNDREDTHS OF VOLTS
027D I 86 0F                  LDA A  #RTNCD
027F I A7 07                  STA A  7,X         STORE DISPLAY RETURN
0281 I 39                     RTS
                     * ROUTINE TO INTERPRET CHANNEL CONTINUITY, LEAKAGE, AND STATION NUMBER
0282 I FE 0000 D     CNTNTY   LDX    TMPX1
```

```
0285 I 86 04        324          LDA A  #4
0287 I BD 0012 R    325          JSR    BINDEC        CONVERT STATION NUMBER TO ASCII
028A I FE 0000 D    326          LDX    TMPX1
028D I A6 02        327          LDA A  2,X
028F I 84 03        328          AND A  #3            MASK TYPE FLAGS
0291 I 08           329          INX
0292 I 08           330          INX
0293 I 08           331          INX
0294 I FF 0000 D    332          STX    TMPX1         STORE UPDATED POINTER TO RTUCMT
                    333 * ROUTINE TO GENERATE DISPLAY OF CHANNEL NUMBER OR INDICATE N/C
0297 I FE 0002 D    334          LDX    TMPX2
029A I 81 03        335          CMP A  #3
029C I 2D 12        336          BLT    CNTA1         BRH IF CHANNEL IS MAPPED
029E I C6 20        337          LDA B  #'
02A0 I E7 00        338          STA B  0,X           STORE N/C FOR STATION NUMBER
02A2 I C6 4E        339          LDA B  #'N
02A4 I E7 01        340          STA B  1,X
02A6 I C6 2F        341          LDA B  #'/
02A8 I E7 02        342          STA B  2,X
02AA I C6 52        343          LDA B  #'R
02AC I E7 03        344          STA B  3,X
02AE I 20 14        345          BRA    CNTA2
02B0 I F6 0011 R    346 CNTA1    LDA B  NDMXM4
02B3 I E7 00        347          STA B  0,X           STORE STATION NUMBER
02B5 I F6 0010 R    348          LDA B  NDMXM3
02B8 I E7 01        349          STA B  1,X

CNVNTD(A0011 02.071AA  CRS NORMAL TEST DATA SETUP)      08/04/78  13:27:45  PAGE   7

02BA I F6 000F R    350          LDA B  NDMXM2
02BD I E7 02        351          STA B  2,X
02BF I F6 000E R    352          LDA B  NDMXM1
02C2 I E7 03        353          STA B  3,X
02C4 I C6 0F        354 CNTA2    LDA B  #$F
02C6 I E7 04        355          STA B  4,X           STORE RETURN CODE
02C8 I 08           356          INX
02C9 I 08           357          INX
02CA I 08           358          INX
02CB I 08           359          INX
02CC I 08           360          INX
02CD I FF 0002 D    361          STX    TMPX2
                    362 * ROUTINE TO CONVERT VOLTAGE TO CONTINUITY RESISTANCE OR INDICATE SKIP
02D0 I FE 0006 D    363          LDX    TMPX4
02D3 I 7F 0014 D    364          CLR    BTRER         CLEAR BLASTER ERROR FLAG
02D6 I B7 0013 D    365          STA A  TMP
02D9 I 27 25        366          BEQ    CNTA4         B IF NORMAL CHANNEL
02DB I 81 02        367          CMP A  #2
02DD I 2D 3A        368          BLT    CNTA4A        BRH IF CHANNEL IS BLASTER
02DF I 27 0E        369          BEQ    CNTA3         BRH IF CHANNEL IS A SKIP
02E1 I C6 20        370 CNTA3B   LDA B  #'
02E3 I E7 01        371          STA B  1,X           INDICATE NO VALUE FOR CONTINUITY
02E5 I E7 02        372          STA B  2,X
02E7 I E7 03        373          STA B  3,X
02E9 I 20 10        374          BRA    CNTA5
02EB I C6 2D        375 CNTA3A   LDA B  #'-
02ED I 20 F2        376          BRA    CNTA3B
02EF I C6 44        377 CNTA3    LDA B  #'D
02F1 I E7 01        378          STA B  1,X           INDICATE SKIP IN CHANNEL CONTINUITY
02F3 I C6 44        379          LDA B  #'D
02F5 I E7 02        380          STA B  2,X
02F7 I C6 20        381          LDA B  #'
02F9 I E7 03        382          STA B  3,X
02FB I 86 00        383 CNTA5    LDA A  #NBLINK
02FD I 7E 041B I    384          JMP    CNTA6
0300 I A6 01        385 CNTA4    LDA A  1,X
0302 I E6 00        386          LDA B  0,X
0304 I 2B 43        387          BMI    CNTA4B
0306 I 48           388 CNTA4G   ASL A
0307 I 59           389          ROL B
0308 I C1 7D        390          CMP B  #$7D
030A I 23 41        391          BLS    MAXCN         BRH IF CONTINUITY < 1K OHMS
030C I 86 39        392 MAXC     LDA A  #'9
030E I A7 01        393 MAXC1    STA A  1,X
0310 I A7 02        394          STA A  2,X
```

```
0312 I A7 03        395            STA A  3,X
0314 I C6 01        396            LDA B  #1
0316 I 7E 03F1 I    397            JMP    CNTA7D
0319 I 5F           398 CNTA4A     CLR B
031A I FE 000D R    399            LDX    CURCSP
031D I A6 10        400            LDA A  LCAMDE,X
031F I 81 03        401            CMP A  #MODFIR
0321 I 27 04        402            BEQ    CNTA4D       B IF FIRE MODE
0323 I 81 05        403            CMP A  #MODFRA      FIRE ABORT MODE ?
0325 I 26 14        404            BNE    CNTA4C       NO
0327 I FE 0006 D    405 CNTA4D     LDX    TMPX4
032A I 5C           406            INC B
032B I F7 0014 D    407            STA B  BTRER        SET BLASTER STATUS
CNVNTD(A0011.02.071AA  CRS NORMAL TEST DATA SETUP)      08/04/78  13:27:47  PAGE   8

032E I A6 01        408            LDA A  1,X
0330 I E6 00        409            LDA B  0,X
0332 I C1 E0        410            CMP B  #$E0         -2 VOLTS
0334 I 2F B5        411            BLE    CNTA3A       B IF OK
0336 I 5D           412            TST B
0337 I 2B 10        413            BMI    CNTA4B
0339 I 20 CB        414            BRA    CNTA4G
033B I FE 0006 D    415 CNTA4C     LDX    TMPX4
033E I F7 0014 D    416            STA B  BTRER
0341 I A6 01        417            LDA A  1,X
0343 I E6 00        418            LDA B  0,X
0345 I 2B A4        419            BMI    CNTA3A
0347 I 20 BD        420            BRA    CNTA4G
0349 I 86 30        421 CNTA4B     LDA A  #'0
034B I 20 C1        422            BRA    MAXC1
034D I 48           423 MAXCN      ASL A
034E I 59           424            ROL B
034F I F7 000B D    425            STA B  V0
0352 I 17           426            TBA
0353 I C6 0A        427            LDA B  #10
0355 I F7 000A D    428            STA B  CNT          SET DIVIDE SHIFT COUNT
0358 I 5F           429            CLR B
0359 I F7 0011 D    430            STA B  D0           ZERO QUOTIENT
035C I F7 0010 D    431            STA B  D1
035F I F7 000F D    432            STA B  D2
0362 I C6 09        433            LDA B  #9
0364 I 78 0011 D    434 LP3        ASL    D0
0367 I 78 0010 D    435            ASL    D1
036A I 78 000F D    436            ASL    D2           SHIFT QUOTIENTS
036D I 48           437            ASL A               SHIFT DIVIDEND
036E I 24 03        438            BCC    CNTY1        BRH IF DIVIDEND < DIVISOR
0370 I 7C 0011 D    439            INC    D0
0373 I CE 0010 D    440 CNTY1      LDX    #D0-1
0376 I BD 054C I    441            JSR    TSTD         CHECK QUOTIENTS FOR BCD CARRYS
0379 I BD 054C I    442            JSR    TSTD
037C I 7A 000A D    443            DEC    CNT
037F I 26 E3        444            BNE    LP3          BRH IF MORE DIVIDE NEEDED
0381 I FE 0006 D    445            LDX    TMPX4
0384 I 5F           446            CLR B
0385 I B6 000F D    447            LDA A  D2
0388 I B1 0008 R    448            CMP A  TSWCLH
038B I 2E 06        449            BGT    PRT5         BRH IF C > LOWER LIMIT
038D I 27 01        450            BEQ    PRT5A        BRH IF C NOT < LOWER LIMIT
038F I 5A           451            DEC B
0390 I 5A           452 PRT5A      DEC B
0391 I 20 09        453            BRA    PRT6
0393 I B1 0003 R    454 PRT5       CMP A  TSWCHH
0396 I 2D 04        455            BLT    PRT6         BRH IF C < UPPER LIMIT
0398 I 27 01        456            BEQ    PRT6C        BRH IF C NOT > UPPER LIMIT
039A I 5C           457            INC B
039B I 5C           458 PRT6C      INC B
039C I 7F 000E D    459 PRT6       CLR    D4           RESET ZERO SUPPRESSION FLAG
039F I 4D           460            TST A
03A0 I 27 05        461            BEQ    PRT6A        BRH IF ZERO SUPPRESS
03A2 I 8B 10        462            ADD A  #16
03A4 I 7C 000E D    463            INC    D4           SET ZERO SUPPRESS FLAG
03A7 I 8B 20        464 PRT6A      ADD A  #'
03A9 I A7 01        465            STA A  1,X          STORE 100'S OHMS
```

```
03AB I B6 0010 D   466             LDA A  D1
03AE I C5 01       467             BIT B  #1
03B0 I 27 15       468             BEQ    PRT8        BRH IF C STATUS DETERMINED
03B2 I 5D          469             TST B
03B3 I 2A 0A       470             BPL    PRT7        BRH IF C NEAR UPPER BOUND
03B5 I B1 0004 R   471             CMP A  TSWCLT
03B8 I 2E 0C       472             BGT    PRT7A       BRH IF C > LOWER BOUND
03BA I 27 0B       473             BEQ    PRT8        BRH IF C NOT < LOWER BOUND
03BC I 5A          474 PRT7B       DEC B
03BD I 20 08       475             BRA    PRT8
03BF I B1 0005 R   476 PRT7        CMP A  TSWCHT
03C2 I 2D F8       477             BLT    PRT7B       BRH IF C < UPPER BOUND
03C4 I 27 01       478             BEQ    PRT8        BRH IF C NOT > UPPER BOUND
03C6 I 5C          479 PRT7A       INC B
03C7 I 7D 000E D   480 PRT8        TST    D4
03CA I 26 03       481             BNE    PRT8A       BRH IF SIGNIFICANCE SET
03CC I 4D          482             TST A
03CD I 27 02       483             BEQ    PRT8B       BRH IF ZERO SUPPRESS
03CF I 8B 10       484 PRT8A       ADD A  #16
03D1 I 8B 20       485 PRT8B       ADD A  #'
03D3 I A7 02       486             STA A  2,X         STORE 10'S OHMS
03D5 I B6 0011 D   487             LDA A  D0
03D8 I C5 01       488             BIT B  #1
03DA I 27 11       489             BEQ    PRT10       BRH IF C STATUS DETERMINED
03DC I 5D          490             TST B
03DD I 2A 08       491             BPL    PRT9        BRH IF C NEAR UPPER BOUND
03DF I B1 0006 R   492             CMP A  TSWCLO
03E2 I 2C 08       493             BGE    PRT9A       BRH IF C > LOWER BOUND
03E4 I 5A          494 PRT9B       DEC B
03E5 I 20 06       495             BRA    PRT10
03E7 I B1 0007 R   496 PRT9        CMP A  TSWCHO
03EA I 2F F8       497             BLE    PRT9B       BRH IF C <= UPPER BOUND
03EC I 5C          498 PRT9A       INC B
03ED I 8B 30       499 PRT10       ADD A  #'0
03EF I A7 03       500             STA A  3,X         STORE 1'S OHMS
03F1 I 7D 0014 D   501 CNTA7D      TST    BTRER       BLASTER ERROR
03F4 I 26 08       502             BNE    CNTA7C      YES-SET BLASTER ERROR FLAG
03F6 I 7D 0013 D   503             TST    TMP         NORMAL CHANNEL ?
03F9 I 27 0C       504             BEQ    CNTA7
03FB I 5F          505             CLR B              SET NO ERROR FLAG
03FC I 20 09       506             BRA    CNTA7
03FE I FE 000D R   507 CNTA7C      LDX    CURCSP
0401 I A6 0E       508             LDA A  LCAST3,X
0403 I 8A 40       509             ORA A  #LS3BLE     SET BLASTER ERROR FALG
0405 I A7 0E       510             STA A  LCAST3,X
0407 I 86 00       511 CNTA7       LDA A  #NBLINK
0409 I 5D          512             TST B
040A I 27 0F       513             BEQ    CNTA6       BRH IF WITHIN LIMITS
040C I 86 11       514 CNTA7A      LDA A  #BLINK
040E I BD 055C I   515             JSR    ERRSET
0411 I FE 0000 D   516             LDX    TMPX1       SET CHANNEL ERROR
0414 I 09          517             DEX                INDICATOR IN
0415 I E6 00       518             LDA B  0,X         RTU
0417 I CA 80       519             ORA B  #RTUCHE     CHANNEL MAP
0419 I E7 00       520             STA B  0,X         TABLE
041B I FE 0006 D   521 CNTA6       LDX    TMPX4
041E I A7 00       522             STA A  0,X         STORE BLINK MODE
0420 I 86 0F       523             LDA A  #RTNCD
```

```
0422 I A7 04       524             STA A  4,X         STORE RETURN SUB-MSG CODE
0424 I 08          525             INX
0425 I 08          526             INX
0426 I 08          527             INX
0427 I 08          528             INX
0428 I 08          529             INX
0429 I FF 0006 D   530             STX    TMPX4
                   531 * ROUTINE TO CONVERT VOLTAGE TO LEAKAGE RESISTANCE OR INDICATE IRRELEVNAT
042C I FE 0004 D   532             LDX    TMPX3
042F I B6 0013 D   533             LDA A  TMP
0432 I 81 01       534             CMP A  #1
```

```
0434 I 2D 0F        535          BLT    LKGA1      BRH IF CHANNEL IS NORMAL
0436 I 27 1B        536          BEQ    LKG1       B IF CHANNEL IS BLASTER
0438 I C6 20        537          LDA B  #'
043A I E7 01        538          STA B  1,X        INDICATE NO VALUE FOR LEAKAGE
043C I E7 02        539          STA B  2,X
043E I E7 03        540          STA B  3,X
0440 I 86 00        541          LDA A  #NBLINK
0442 I 7E 053A I    542          JMP    LKGA3
0445 I 86 04        543 LKGA1    LDA A  #4
0447 I B7 000A D    544          STA A  CNT        SET INITIAL DIVIDE SHIFT COUNT
044A I 6D 00        545          TST    0,X
044C I 2A 16        546          BPL    LKG2       B IF ERRONEOUS NEG LEAKAGE
044E I 86 FD        547 ERROR    LDA A  #$FD       (SYSTEM ERROR)
0450 I 7E 04C7 I    548          JMP    ERROR2
0453 I 86 42        549 LKG1     LDA A  #'B
0455 I A7 01        550          STA A  1,X
0457 I 86 4C        551          LDA A  #'L
0459 I A7 02        552          STA A  2,X
045B I 86 54        553          LDA A  #'T
045D I A7 03        554          STA A  3,X
045F I 86 00        555          LDA A  #NBLINK
0461 I 7E 053A I    556          JMP    LKGA3
0464 I 86 32        557 LKG2     LDA A  #$32
0466 I 5F           558          CLR B
0467 I F7 0011 D    559          STA B  D0         ZERO QUOTIENT
046A I F7 0010 D    560          STA B  D1
046D I F7 000F D    561          STA B  D2
0470 I F7 000E D    562          STA B  D4
0473 I E0 01        563          SUB B  1,X
0475 I A2 00        564          SBC A  0,X
0477 I 23 4C        565          BLS    MAX
0479 I 20 00        566          BRA    LP1
047B I 7C 000A D    567 LP1      INC    CNT
047E I 58           568          ASL B
047F I 49           569          ROL A
0480 I 2A F9        570          BPL    LP1        GET MAXIMUM DIVISOR
0482 I B7 000D D    571          STA A  DIV        STORE DIVISOR
0485 I A6 00        572          LDA A  0,X
0487 I E6 01        573          LDA B  1,X        LOAD DIVIDEND
0489 I 47           574          ASR A
048A I 56           575          ROR B
048B I 47           576          ASR A
048C I 56           577          ROR B
048D I 47           578          ASR A
048E I 56           579          ROR B
048F I EB 01        580          ADD B  1,X
0491 I A9 00        581          ADC A  0,X
CNVNTD(A0011.02.071AA  CRS NORMAL TEST DATA SETUP)     08/04/78  13:27:53  PAGE  11

0493 I 47           582          ASR A
0494 I 56           583          ROR B
0495 I A9 00        584          ADC A  0,X
0497 I EB 01        585          ADD B  1,X
0499 I 58           586          ASL B
049A I 49           587          ROL A             MULTIPLY BY 50K OHMS
049B I C6 09        588          LDA B  #9
049D I 78 0011 D    589 LP2      ASL    D0
04A0 I 78 0010 D    590          ASL    D1
04A3 I 78 000F D    591          ASL    D2         SHIFT QUOTIENTS
04A6 I 48           592          ASL A             SHIFT DIVIDEND
04A7 I 25 05        593          BCS    SUB1       BRH IF DIVIDEND > DIVISOR
04A9 I B1 000D D    594          CMP A  DIV
04AC I 25 06        595          BCS    NSUB1      BRH IF DIVIDEND < DIVISOR
04AE I B0 000D D    596 SUB1     SUB A  DIV
04B1 I 7C 0011 D    597          INC    D0
04B4 I CE 0010 D    598 NSUB1    LDX    #D0-1
04B7 I BD 054C I    599          JSR    TSTD       CHECK QUOTIENTS FOR BCD CARRYS
04BA I BD 054C I    600          JSR    TSTD
04BD I BD 054C I    601          JSR    TSTD
04C0 I 7D 000E D    602          TST    D4
04C3 I 27 0D        603          BEQ    CHK        BRH IF VALUE DOES NOT EXCEED 1 MEGOHM
04C5 I 86 09        604 MAX      LDA A  #9         SET MAXIMUM DISPLAYABLE VALUE
04C7 I B7 000F D    605 ERROR2   STA A  D2         SET ERROR VALUES
```

```
04CA I B7 0010 D   606          STA A  D1
04CD I B7 0011 D   607          STA A  D0
04D0 I 20 05       608          BRA    PRT
04D2 I 7A 000A D   609 CHK      DEC    CNT
04D5 I 26 C6       610          BNE    LP2        BRH IF MORE DIVIDE NEEDED
04D7 I B6 000F D   611 PRT      LDA A  D2         CONVERT BCD TO ASCII
04DA I FE 0004 D   612          LDX    TMPX3
04DD I 5F          613          CLR B
04DE I B1 0000 R   614          CMP A  TSWLLH
04E1 I 2E 04       615          BGT    PRT1       BRH IF L > LOWER LIMIT
04E3 I 27 01       616          BEQ    PRT1C      BRH IF L NOT < LOWER LIMIT
04E5 I 5A          617          DEC B
04E6 I 5A          618 PRT1C    DEC B
04E7 I 7F 000E D   619 PRT1     CLR    D4         RESET ZERO SUPPRESSION FLAG
04EA I 4D          620          TST A
04EB I 27 05       621          BEQ    PRT1A      BRH IF ZERO SUPPRESS
04ED I 8B 10       622          ADD A  #16
04EF I 7C 000E D   623          INC    D4         SET ZERO SUPPRESS FLAG
04F2 I 8B 20       624 PRT1A    ADD A  #'
04F4 I A7 01       625          STA A  1,X        STORE 100K OHMS
04F6 I B6 0010 D   626          LDA A  D1
04F9 I C5 01       627          BIT B  #1
04FB I 27 0B       628          BEQ    PRT2       BRH IF L STATUS DETERMINED
04FD I B1 0001 R   629          CMP A  TSWLLT
0500 I 2E 05       630          BGT    PRT2C      BRH IF L > LOWER LIMIT
0502 I 27 04       631          BEQ    PRT2       BRH IF L NOT < LIMIT
0504 I 5A          632          DEC B
0505 I 20 01       633          BRA    PRT2
0507 I 5C          634 PRT2C    INC B
0508 I 7D 000E D   635 PRT2     TST    D4
050B I 26 03       636          BNE    PRT2A      BRH IF SIGNIFICANCE SET
050D I 4D          637          TST A
050E I 27 02       638          BEQ    PRT2B      BRH IF ZERO SUPPRESS
0510 I 8B 10       639 PRT2A    ADD A  #16
CNVNTD(A0011.02.071AA  CRS NORMAL TEST DATA SETUP)     08/04/78  13:27:55  PAGE  12

0512 I 8B 20       640 PRT2B    ADD A  #'
0514 I A7 02       641          STA A  2,X        STORE 10K OHMS
0516 I B6 0011 D   642          LDA A  D0
0519 I C5 01       643          BIT B  #1
051B I 27 06       644          BEQ    PRT3       BRH IF L STATUS DETERMINED
051D I B1 0002 R   645          CMP A  TSWLLO
0520 I 2C 01       646          BGE    PRT3       BRH IF L >= LOWER LIMIT
0522 I 5A          647          DEC B
0523 I 8B 30       648 PRT3     ADD A  #'0
0525 I A7 03       649          STA A  3,X        STORE 1K OHMS
0527 I 86 00       650          LDA A  #NBLINK
0529 I 5C          651          INC B
052A I 2A 0E       652          BPL    LKGA3      BRH IF L WITHIN RANGE
052C I 86 11       653          LDA A  #BLINK
052E I 8D 2C       654          BSR    ERRSET     SET ERROR MESSAGE LEVEL
0530 I FE 0000 D   655          LDX    TMPX1      SET CHANNEL
0533 I 09          656          DEX               ERROR INDICATR
0534 I E6 00       657          LDA B  0,X        IN RTU
0536 I CA 80       658          ORA B  #RTUCHE    CHANNEL MAP
0538 I E7 00       659          STA B  0,X        TABLE
053A I FE 0004 D   660 LKGA3    LDX    TMPX3
053D I A7 00       661          STA A  0,X        SET BLINK MODE
053F I C6 0F       662          LDA B  #$F
0541 I E7 04       663          STA B  4,X        STORE RETURN SUB-MESSAGE CODE
0543 I 08          664          INX
0544 I 08          665          INX
0545 I 08          666          INX
0546 I 08          667          INX
0547 I 08          668          INX
0548 I FF 0004 D   669          STX    TMPX3
054B I 39          670 PRT11    RTS
054C I E1 01       671 TSTD     CMP B  1,X        TEST FOR BCD CARRY
054E I 24 0A       672          BCC    EXIT       BRH IF NO CARRY
0550 I E6 01       673          LDA B  1,X
0552 I C0 0A       674          SUB B  #10
0554 I E7 01       675          STA B  1,X        STORE REMAINDER AFTER CARRY
0556 I C6 09       676          LDA B  #9
```

```
0558 I 6C 00         677             INC    0,X           ADD THE CARRY
055A I 09            678 EXIT        DEX
055B I 39            679             RTS
055C I 36            680 ERRSET      PSH A
055D I 7E 01F1 I     681             JMP    CMPR2
                     682 *
                     683 *        NORMAL TEST INFORMATION DISPLAY MESGS
                     684 *
0560 I 4650      A   685 P18V        FDB    $4650,$34BC   18.75 BATTERY LIMITS
0562 I 34BC      A
0564 I 2760      A   686 P12V        FDB    $2760,$23A0   12 VOLT REGULATOR LIMITS
0566 I 23A0      A
0568 I 3133      A   687 P15V        FDB    $3138,$2C88   15 VOLT REGULATOR
056A I 2C88      A
056C I 7FFF      A   688 P8V         FDB    $7FFF,$6270   8.75 BATTERY LIMITS
056E I 6270      A
0570 I 5760      A   689 P6V         FDB    $5760,$4650   6.25 TAP VOLTAGE LIMITS
0572 I 4650      A
0574 I 4380      A   690 P5MV        FDB    $4380,$3FC0   +5 M REGULATOR LIMITS
0576 I 3FC0      A
0578 I 4380      A   691 P5V         FDB    $4380,$3B60   5 VOLT REGULATOR LIMITS
CNVNTD(A0011.02.071AA  CRS NORMAL TEST DATA SETUP)      08/04/78  13:27:56  PAGE  13

057A I 3B60      A
057C I CB44      A   692 M18V        FDB    $CB44,$B9B0   -18.75 BATTERY LIMITS
057E I B9B0      A
0580 I DC60      A   693 M12V        FDB    $DC60,$D8A0   -12 VOLT REGULATOR LIMITS
0582 I D8A0      A
0584 I D378      A   694 M15V        FDB    $D378,$CEC8   -15 VOLT REGULATOR
0586 I CEC8      A
0588 I B9AF      A   695 M6V         FDB    $B9AF,$A627   -6.25 TAP VOLTAGE LIMITS
058A I A627      A
058C I C4A0      A   696 M5V         FDB    $C4A0,$BE60   -5 VOLT REGULATOR LIMITS
058E I BE60      A
0590 I 6960      A   697 PADCV       FDB    $6960,$6888   ADC PLUS VOLTAGE LIMITS
0592 I 6888      A
0594 I 9778      A   698 MADCV       FDB    $9778,$96A0   ADC MINUS VOLTAGE LIMITS
0596 I 96A0      A
0598 I 0068      A   699 ZADCV       FDB    $0068,$FF98   ADC ZERO VOLTAGE LIMITS
059A I FF98      A
059C I 424154        700 MSGN1       FCC    /BATT /
05A1 I 0E            701             FCB    SMSG
05A2 I 002B      D   702             FDB    P8VD
05A4 I 12            703             FCB    $12
05A5 I 202041        704             FCC    /  ADC /
05AB I 0E            705             FCB    SMSG
05AC I 0032      D   706             FDB    PADCD
05AE I 12            707             FCB    $12
05AF I 202054        708             FCC    /  TEMP /
05B6 I 0E            709             FCB    SMSG
05B7 I 0047      D   710             FDB    TEMPD
05B9 I 12            711             FCB    $12
05BA I 0D            712             FCB    $D,$D,$D,$D,$10,2,4,SMSG
05BB I 0D
05BC I 0D
05BD I 0D
05BE I 10
05BF I 02
05C0 I 04
05C1 I 0E
05C2 I 001B      D   713             FDB    P18VD
05C4 I 10            714             FCB    $10,2,14,SMSG
05C5 I 02
05C6 I 0E
05C7 I 0E
05C8 I 0039      D   715             FDB    MADCD
05CA I 12            716             FCB    $12
05CB I 10            717             FCB    $10,3,3,SMSG
05CC I 03
05CD I 03
05CE I 0E
05CF I 0023      D   718             FDB    M18VD
05D1 I 12            719             FCB    $12
05D2 I 10            720             FCB    $10,3,14,SMSG
```

```
05D3 I 03
05D4 I 0E
05D5 I 0E
05D6 I 0040    D   721          FDB    ZADCD
05D8 I 12          722          FCB    $12
05D9 I 10          723          FCB    $10,4,0,SMSG
05DA I 04
```

```
05DB I 00
05DC I 0E
05DD I 0015    D   724          FDB    RTUCC
05DF I 205354      725          FCC    / STATION /
05E8 I 0E          726          FCB    SMSG
05E9 I 008E    D   727          FDB    STATID
05EB I 04          728          FCB    4
05EC I 424144      729 MSGN1B   FCC    /BAD BATTERIES/
05F9 I 0F          730          FCB    RTNCD
05FA I 424144      731 MSGN1C   FCC    /BAD REGULATORS/
0608 I 0F          732          FCB    RTNCD
0609 I 424144      733 MSGN1D   FCC    /BAD CHANNELS/
0615 I 0F          734          FCB    RTNCD
0616 I 474F4F      735 MSGN1A   FCC    /GOOD RTU/
061E I 0F          736          FCB    RTNCD
061F I 544150      737 MSGN2    FCC    /TAPPED-REGULATED VOLTAGES/
0638 I 0D          738          FCB    $D,$D,$D,$D
0639 I 0D
063A I 0D
063B I 0D
063C I 10          739          FCB    $10,2,8,SMSG
063D I 02
063E I 08
063F I 0E
0640 I 0059    D   740          FDB    P5MVD
0642 I 12          741          FCB    $12
0643 I 10          742          FCB    $10,2,14,SMSG
0644 I 02
0645 I 0E
0646 I 0E
0647 I 006E    D   743          FDB    P12DVD
0649 I 12          744          FCB    $12
064A I 10          745          FCB    $10,2,21,SMSG
064B I 02
064C I 15
064D I 0E
064E I 007E    D   746          FDB    P12AVD
0650 I 12          747          FCB    $12
0651 I 10          748          FCB    $10,3,0,SMSG
0652 I 03
0653 I 00
0654 I 0E
0655 I 0052    D   749          FDB    M6VD
0657 I 12          750          FCB    $12
0658 I 10          751          FCB    $10,3,8,SMSG
0659 I 03
065A I 08
065B I 0E
065C I 0060    D   752          FDB    P5VD
065E I 12          753          FCB    $12
065F I 10          754          FCB    $10,3,13.SMSG
0660 I 03
0661 I 0D
0662 I 0E
0663 I 0076    D   755          FDB    M12DVD
0665 I 12          756          FCB    $12
0666 I 10          757          FCB    $10,3,20,SMSG
0667 I 03
```

```
0668 I 14
0669 I 0E
066A I 0086    D   758          FDB    M12AVD
066C I 12          759          FCB    $12
```

```
066D I 10        760          FCB     $10,4,7,SMSG
066E I 04
066F I 07
0670 I 0E
0671 I 0067   D  761          FDB     MSVD
0673 I 12        762          FCB     $12
0674 I 04        763          FCB     4
0675 I 535441    764 MSGN3    FCC     /STAT /
067A I 0E        765          FCB     SMSG
067B I 0093   D  766          FDB     STAT1D
067D I 202043    767          FCC     /  CONT /
0684 I 0E        768          FCB     SMSG
0685 I 00A7   D  769          FDB     CONT1D
0687 I 12        770          FCB     $12
0688 I 20204C    771          FCC     /  LKG /
068E I 0E        772          FCB     SMSG
068F I 00BB   D  773          FDB     LKG1D
0691 I 12        774          FCB     $12
0692 I 4B        775          FCB     $'K,$D,$D,$D,$D,$10,2,5,SMSG
0693 I 0D
0694 I 0D
0695 I 0D
0696 I 0D
0697 I 10
0698 I 02
0699 I 05
069A I 0E
069B I 0098   D  776          FDB     STAT2D
069D I 10        777          FCB     $10,2,16,SMSG
069E I 02
069F I 10
06A0 I 0E
06A1 I 00AC   D  778          FDB     CONT2D
06A3 I 12        779          FCB     $12
06A4 I 10        780          FCB     $10,2,25,SMSG
06A5 I 02
06A6 I 19
06A7 I 0E
06A8 I 00C0   D  781          FDB     LKG2D
06AA I 12        782          FCB     $12
06AB I 4B        783          FCB     $'K,$10,3,5,SMSG
06AC I 10
06AD I 03
06AE I 05
06AF I 0E
06B0 I 009D   D  784          FDB     STAT3D
06B2 I 10        785          FCB     $10,3,16,SMSG
06B3 I 03
06B4 I 10
06B5 I 0E
06B6 I 00B1   D  786          FDB     CONT3D
06B8 I 12        787          FCB     $12
06B9 I 10        788          FCB     $10,3,25,SMSG
06BA I 03
```

```
06BB I 19
06BC I 0E
06BD I 00C5   D  789          FDB     LKG3D
06BF I 12        790          FCB     $12
06C0 I 4B        791          FCB     $'K,$10,4,5,SMSG
06C1 I 10
06C2 I 04
06C3 I 05
06C4 I 0E
06C5 I 00A2   D  792          FDB     STAT4D
06C7 I 10        793          FCB     $10,4,16,SMSG
06C8 I 04
06C9 I 10
06CA I 0E
06CB I 00B6   D  794          FDB     CONT4D
06CD I 12        795          FCB     $12
06CE I 10        796          FCB     $10,4,25,SMSG
```

```
06CF I 04
06D0 I 19
06D1 I 0E
06D2 I 00CA    D   797          FDB    LKG4D
06D4 I 12          798          FCB    $12
06D5 I 4B          799          FCB    'K,4
06D6 I 04
0000 D             800          DSEC
                   801 *
                   802 *     STORAGE REQUIREMENTS FOR 'CNVNTD'
                   803 *
0000 D             804 TMPX1    RMB    2        POINTER TO STATION NUMBER
0002 D             805 TMPX2    RMB    2        POINTER TO STATION DISPLAY
0004 D             806 TMPX3    RMB    2        POINTER TO LEAKAGE DISPLAY
0006 D             807 TMPX4    RMB    2        POINTER TO CONTINUITY DISPLAY
0008 D             808 PERR     RMB    2        POSSIBLE ERROR POINTER
000A D             809 CNT      RMB    1        DIVIDE SHIFT COUNTER
000B D             810 V0       RMB    2        TEMPORARY VOLTAGE VALUE
000D D             811 DIV      RMB    1        DIVISOR IN DIVIDE ALGORITHM
000E D             812 D4       RMB    1        BCD QUOTIENTS IN DIVIDE ALGORITHM
000F D             813 D2       RMB    1
0010 D             814 D1       RMB    1
0011 D             815 D0       RMB    1
0012 D             816 MODE     RMB    1        BLINK/NO-BLINK
0013 D             817 TMP      RMB    1        LOW ORDER BYTE OF DATA
0014 D             818 BTRER    RMB    1
0015 D             819 RTUCC    RMB    4        RTU STATUS DISPLAY
0016 D             820 RTUCC1   EQU    RTUCC+1
0019 D             821 BUFPTR   RMB    2
000E A             822 SMSG     EQU    $E       SUB-MESSAGE CALL IN DISPLAY
000F A             823 RTNCD    EQU    $F       SUB-MESSAGE RETURN IN DISPLAY
0011 A             824 BLINK    EQU    $11      BLINK CODE IN DISPLAY
0000 A             825 NBLINK   EQU    0        NO-BLINK CODE FOR DISPLAY
                   826 * NORMAL TEST DISPLAY AREA
001B D             827 P18VD    RMB    8        18 VOLT BATTERY (BLINK-XX.XXRETURN)
0023 D             828 M18VD    RMB    8        -18 VOLT BATTERY
002B D             829 P8VD     RMB    7        8 VOLT BATTERY (BLINK-X.XXRETURN)
0032 D             830 PADCD    RMB    7        ADC PLUS VALUE
0039 D             831 MADCD    RMB    7        ADC MINUS VALUE
0040 D             832 ZADCD    RMB    7        ADC ZERO VALUE
0047 D             833 TEMPD    RMB    4        TEMPERATURE (-XXRETURN)
CNVNTD(A0011.02.071AA  CRS NORMAL TEST DATA SETUP)      08/04/78  13:28:02  PAGE  17

                   834 *
004B D             835 P6VD     RMB    7        6 VOLT TAP
0052 D             836 M6VD     RMB    7        -6 VOLT TAP
0059 D             837 P5MVD    RMB    7        5 VOLT REG
0060 D             838 P5VD     RMB    7        5 VOLT REG
0067 D             839 M5VD     RMB    7        -5 VOLT REG
006E D             840 P12DVD   RMB    8        12 VOLT REG
0076 D             841 M12DVD   RMB    8        -12 VOLT REG
007E D             842 P12AVD   RMB    8        12 VOLT REG
0086 D             843 M12AVD   RMB    8        -12 VOLT REG
                   844 *
008E D             845 STATID   RMB    5        STATION NUMBER ENTERED FROM PANEL
0093 D             846 STAT1D   RMB    5        STATION NUMBERS (XXXXRETURN)
0098 D             847 STAT2D   RMB    5
009D D             848 STAT3D   RMB    5
00A2 D             849 STAT4D   RMB    5
00A7 D             850 CONT1D   RMB    5        CONTINUITY RESISTANCE (BLINKXXXRETURN)
00AC D             851 CONT2D   RMB    5
00B1 D             852 CONT3D   RMB    5
00B6 D             853 CONT4D   RMB    5
00BB D             854 LKG1D    RMB    5        LEAKAGE RESISTANCE (BLINKXXXRETURN)
00C0 D             855 LKG2D    RMB    5
00C5 D             856 LKG3D    RMB    5
00CA D             857 LKG4D    RMB    5
00CF               858          END
CNVNTD(A0011.02.071AA  CRS NORMAL TEST DATA SETUP)      08/04/78  13:28:03  PAGE  18

  NO ERRORS
 ISECT LENGTH --  1751
 DSECT LENGTH --   207
```

```
> BINDEC    0012       21    21   193   325
  BLINK     0011 A    824   259   514   653
  BTRER     0014 D    818   364   407   416   501
  BUFPTR    0019 D    821    41   209   215
  CHK       04D2 I    609   603
  CMPR      01C7 I    222    83    88    93    98   103   108   115   120   125   130   135   140
                            145   150
  CMPR1     01D2 I    228   224
  CMPR2     01F1 I    244   681
  CMPR2A    020E I    256   251
  CMPR2C    0217 I    259   250   254
  CMPR2D    0214 I    258   255
  CMPR2E    01E0 I    235   225   227   230   232
  CMPR3     0219 I    260   234
  CMPR4     01DC I    233   229
  CMPRA     01E3 I    236   243
  CNT       000A D    809   428   443   544   567   609
  CNTA1     02B0 I    346   336
  CNTA2     02C4 I    354   345
  CNTA3     02EF I    377   369
  CNTA3A    02EB I    375   411   419
  CNTA3B    02E1 I    370   376
  CNTA4     0300 I    385   366
  CNTA4A    0319 I    398   368
  CNTA4B    0349 I    421   387   413
  CNTA4C    033B I    415   404
  CNTA4D    0327 I    405   402
  CNTA4G    0306 I    388   414   420
  CNTA5     02FB I    383   374
  CNTA6     041B I    521   384   513
  CNTA7     0407 I    511   504   506
  CNTA7A    040C I    514
  CNTA7C    03FE I    507   502
  CNTA7D    03F1 I    501   397
  CNTNTY    0282 I    323   187   188   189   190
  CNTY1     0373 I    440   438
< CNVNTD    0000 I     39     7
  CONT1D    00A7 D    850   168   169   185   769
  CONT2D    00AC D    851   171   172   778
  CONT3D    00B1 D    852   174   175   786
  CONT4D    00B6 D    853   177   178   794
  CONV2     024D I    294   291
  CONV3     024C I    293   295
  CONV3D    0238 I    280    85   100   105   110   117   122   147   152
  CONV4     025B I    301   303
  CONV4D    023D I    284    90    95   127   132   137   142
  CONV5     026A I    309   311
  CONV6     0255 I    298   282
> CURCSP    000D       18    18   244   399   507
  D0        0011 D    815   430   434   439   440   487   559   589   597   598   607   642
  D1        0010 D    814   431   435   466   560   590   606   626
  D2        000F D    813   432   436   447   561   591   605   611
  D4        000E D    812   459   463   480   562   602   619   623   635
CNVNTD(A0011.02.071AA  CRS NORMAL TEST DATA SETUP)      08/04/78  13:28:04  PAGE  19

  DIV       000D D    811   571   594   596
  ERROR     044E I    547
  ERROR2    04C7 I    605   548
  ERRSET    055C I    680   515   654
  EXIT      055A I    678   672
  LCAMDE    0010 A     31   400
  LCAST3    000E A     25   245   247   508   510
  LKG1      0453 I    549   536
  LKG1D     00BB D    854   156   157   183   773
  LKG2      0464 I    557   546
  LKG2D     00C0 D    855   159   160   781
  LKG3D     00C5 D    856   162   163   789
  LKG4D     00CA D    857   165   166   797
  LKGA1     0445 I    543   535
  LKGA3     053A I    660   542   556   652
  LP1       047B I    567   566   570
  LP2       049D I    589   610
  LP3       0364 I    434   444
```

| | | | | | | | | | | |
|---|---|---|---|---|---|---|---|---|---|---|
| | LS3BLE | 0040 | A | 27 | 509 | | | | | |
| | LS3NEF | 0008 | A | 26 | 246 | | | | | |
| | M12AVD | 0086 | D | 843 | 141 | 758 | | | | |
| | M12DVD | 0076 | D | 841 | 131 | 755 | | | | |
| | M12V | 0580 | I | 693 | 129 | | | | | |
| | M15V | 0584 | I | 694 | 139 | | | | | |
| | M18V | 057C | I | 692 | 92 | | | | | |
| | M18VD | 0023 | D | 828 | 94 | 718 | | | | |
| | M5V | 058C | I | 696 | 144 | | | | | |
| | M5VD | 0067 | D | 839 | 146 | 761 | | | | |
| | M6V | 0588 | I | 695 | 82 | | | | | |
| | M6VD | 0052 | D | 836 | 84 | 749 | | | | |
| | MADCD | 0039 | D | 831 | 109 | 715 | | | | |
| | MADCV | 0594 | I | 698 | 107 | | | | | |
| | MAX | 04C5 | I | 604 | 565 | | | | | |
| | MAXC | 030C | I | 392 | | | | | | |
| | MAXC1 | 030E | I | 393 | 422 | | | | | |
| | MAXCN | 034D | I | 423 | 391 | | | | | |
| | MODE | 0012 | D | 816 | 260 | 275 | | | | |
| | MODFIR | 0003 | A | 32 | 401 | | | | | |
| | MODFRA | 0005 | A | 33 | 403 | | | | | |
| < | MSGN1 | 059C | I | 700 | 7 | | | | | |
| < | MSGN1A | 0616 | I | 735 | 10 | 47 | | | | |
| < | MSGN1B | 05EC | I | 729 | 9 | 78 | | | | |
| < | MSGN1C | 05FA | I | 731 | 9 | 111 | | | | |
| < | MSGN1D | 0609 | I | 733 | 10 | 153 | | | | |
| < | MSGN2 | 061F | I | 737 | 7 | | | | | |
| < | MSGN3 | 0675 | I | 764 | 7 | | | | | |
| | NBLINK | 0000 | A | 825 | 233 | 383 | 511 | 541 | 555 | 650 |
| > | NDMXM1 | 000E | | 19 | 19 | 200 | 352 | | | |
| > | NDMXM2 | 000F | | 19 | 19 | 198 | 350 | | | |
| > | NDMXM3 | 0010 | | 19 | 19 | 196 | 348 | | | |
| > | NDMXM4 | 0011 | | 19 | 19 | 194 | 346 | | | |
| | NSUB1 | 04B4 | I | 598 | 595 | | | | | |
| | P12AVD | 007E | D | 842 | 136 | 746 | | | | |
| | P12DVD | 006E | D | 840 | 126 | 743 | | | | |
| | P12V | 0564 | I | 686 | 124 | | | | | |
| | P15V | 0568 | I | 687 | 134 | | | | | |
| | P18V | 0560 | I | 685 | 87 | | | | | |
| | P18VD | 001B | D | 827 | 89 | 713 | | | | |

| | | | | | | | | | | |
|---|---|---|---|---|---|---|---|---|---|---|
| | P5MV | 0574 | I | 690 | 114 | | | | | |
| | P5MVD | 0059 | D | 837 | 116 | 740 | | | | |
| | P5V | 0578 | I | 691 | 119 | | | | | |
| | [illegible] | [illegible] | D | [illegible] | [illegible] | [illegible] | | | | |
| | P6V | 0570 | I | 689 | | | | | | |
| | P6VD | 004B | D | 835 | | | | | | |
| | P8V | 056C | I | 688 | 97 | | | | | |
| | P8VD | 002B | D | 829 | 99 | 702 | | | | |
| | PADCD | 0032 | D | 830 | 104 | 706 | | | | |
| | PADCV | 0590 | I | 697 | 102 | | | | | |
| | PERR | 0008 | D | 808 | 79 | 112 | 154 | 248 | 252 | 257 |
| | PRT | 04D7 | I | 611 | 608 | | | | | |
| | PRT1 | 04E7 | I | 619 | 615 | | | | | |
| | PRT10 | 03ED | I | 499 | 489 | 495 | | | | |
| | PRT11 | 054B | I | 670 | | | | | | |
| | PRT1A | 04F2 | I | 624 | 621 | | | | | |
| | PRT1C | 04E6 | I | 618 | 616 | | | | | |
| | PRT2 | 0508 | I | 635 | 628 | 631 | 633 | | | |
| | PRT2A | 0510 | I | 639 | 636 | | | | | |
| | PRT2B | 0512 | I | 640 | 638 | | | | | |
| | PRT2C | 0507 | I | 634 | 630 | | | | | |
| | PRT3 | 0523 | I | 648 | 644 | 646 | | | | |
| | PRT5 | 0393 | I | 454 | 449 | | | | | |
| | PRT5A | 0390 | I | 452 | 450 | | | | | |
| | PRT6 | 039C | I | 459 | 453 | 455 | | | | |
| | PRT6A | 03A7 | I | 464 | 461 | | | | | |
| | PRT6C | 039B | I | 458 | 456 | | | | | |
| | PRT7 | 03BF | I | 476 | 470 | | | | | |
| | PRT7A | 03C6 | I | 479 | 472 | | | | | |
| | PRT7B | 03BC | I | 474 | 477 | | | | | |
| | PRT8 | 03C7 | I | 480 | 468 | 473 | 475 | 478 | | |

```
  PRT8A     03CF I   484    481
  PRT8B     03D1 I   485    483
  PRT9      03E7 I   496    491
  PRT9A     03EC I   498    493
  PRT9B     03E4 I   494    497
  READ      01B9 I   209     51    80    81    86    91    96   101   106   113   118   123   128
                            133   138   143   148   155   158   161   164   167   170   173   176
  RTNCD     000F A   823     44   319   523   730   732   734   736
  RTUCC     0015 D   819     43    45    48   249   253   256   258   724   820
< RTUCC1    0016 D   820      8
  RTUCHE    0080 A    36    237   519   658
> RTUCME    000A      17     17   242
> RTUCMT    0009      16     16   179   235
  SIGN      021E I   266     57   280   284
  SIGN1     022D I   274    272
  SIGN2     022C I   273    268
  SMSG      000E A   822     42   701   705   709   712   714   717   720   723   726   739   742
                            745   748   751   754   757   760   765   768   772   775   777   780
                            783   785   788   791   793   796
> SRCVBF    000B      18     18    40
  STAT1D    0093 D   846    181   766
  STAT2D    0098 D   847    776
  STAT3D    009D D   848    784
  STAT4D    00A2 D   849    792
  STATID    008E D   845    195   197   199   201   203   727
> STNADR    000C      18     18   191
  SUB1      04AE I   596    593
```

CNVNTD(A0011.02.071AA CRS NORMAL TEST DATA SETUP) 08/04/78 13:28:04 PAGE 21

```
  TEMP1     003B I    72     74
  TEMPD     0047 D   833     46    52   710
  TMP       0013 D   817     70   266   269   277   289   298   306   315   365   503   533
  TMPX1     0000 D   804    180   323   326   332   516   655
  TMPX2     0002 D   805    182   334   361
  TMPX3     0004 D   806    184   532   612   660   669
  TMPX4     0006 D   807    186   363   405   415   445   521   530
  TSTD      054C I   671    441   442   599   600   601
> TSWCHH    0003      13     13   454
> TSWCHO    0007      14     14   496
> TSWCHT    0005      13     13   476
> TSWCLH    0008      15     15   448
> TSWCLO    0006      14     14   492
> TSWCLT    0004      13     13   471
> TSWLLH    0000      12     12   614
> TSWLLO    0002      12     12   645
> TSWLLT    0001      12     12   629
  V0        000B D   810    425
  ZADCD     0040 D   832    151   721
  ZADCV     0598 I   699    149
```

CRSDEV(A0011.02.072AA CRS I/O ADDRESSES) 08/04/78 11:44:45 PAGE 1

```
0000 A                        ASEC
           ***********************************************************************
           ***********************************************************************
           *
           *      I/O ADDRESS ASSIGNMENTS
           *
           *
                              DEF    CONSOL,CONROW
           *
8004 A                        ORG    $8004
           *      CONSOLE ACIA REGISTERS
           *
8004 A        CONSOL   RMB    1              STATUS OR CONTROL
8005 A        CONROW   RMB    1              READ OR WRITE
8006 A                 RMB    2
           ***********************************************************************
           ***********************************************************************
           *
                              DEF    PIAKDR,PIAKCR
           *
           *
           *      KEYBOARD PIA REGISTERS
```

```
               *
8008 A           PIAKDR   RMB    1             PERIPHERAL DATA OR DATA DIRECTION REGISTER
8009 A           PIAKCR   RMB    1             CONTROL REGISTER
               *
                          DEF    INTMSK,INTENB,KCRNSW,KCRMSW
               *
               *
               *      PIA CONTROL REGISTER EQUATES
               *
003E A           INTMSK   EQU    $3E           LEADING EDGE TRANSITION (INTERRUPTS MASKED
003F A           INTENB   EQU    $3F           LEADING EDGE TRANSITION (INTERRUPTS ENABLE)
003F A           KCRNSW   EQU    $3F           NORMAL SWITCH (LEADING EDGE TRANSITION)
003D A           KCRMSW   EQU    $3D           MOMENTARY SWITCH (TAILING EDGE TRANSITION)
               *
                          DEF    KSWMAX
               *
               *
               *      KEYBOARD SWITCH EQUATES
               *
0000 A           KSWDC0   EQU    0             0
0001 A           KSWDC1   EQU    1             1
0002 A           KSWDC2   EQU    2             2
0003 A           KSWDC3   EQU    3             3
0004 A           KSWDC4   EQU    4             4
0005 A           KSWDC5   EQU    5             5
0006 A           KSWDC6   EQU    6             6
0007 A           KSWDC7   EQU    7             7
0008 A           KSWDC8   EQU    8             8
0009 A           KSWDC9   EQU    9             9
000A A           KSWBSP   EQU    $A            BACKSPACE
000B A           KSWENT   EQU    $B            ENTRY
000C A           KSWCNT   EQU    $C            CONTINUE
000D A           KSWRTY   EQU    $D            RETRY
000E A           KSWESC   EQU    $E            ESCAPE
000F A           KSWTLS   EQU    $F            TILT SEARCH
0010 A           KSWSP1   EQU    $10           * (SPARE)
CRSDEV(A0011.02.072AA  CRS I/O ADDRESSES)       08/04/78  11:44:47  PAGE   2

0011 A           KSWTIM   EQU    $11           TIME-OF-DAY CLOCK
0012 A           KSWDDP   EQU    $12           DISPLAY DEPLOYMENT
0013 A           KSWSID   EQU    $13           STATION IDENTIFICATION
0014 A           KSWRID   EQU    $14           RTU IDENTIFICATION
0015 A           KSWDPY   EQU    $15           DEPLOYMENT
0016 A           KSWDST   EQU    $16           DEAD STATION
0017 A           KSWPRG   EQU    $17           PROGRAM
0018 A           KSWTBP   EQU    $18           TAPE BY-PASS
0019 A           KSWCST   EQU    $19           CHANNEL STATUS
001A A           KSWUST   EQU    $1A           UNIT STATUS
001B A           KSWCBP   EQU    $1B           CAMERA BY-PASS
001C A           KSWSP2   EQU    $1C           ONLINE TEST CONTROL
001D A           KSWBST   EQU    $1D           BLASTER TEST
001E A           KSWPFT   EQU    $1E           PERFORMANCE TEST
001F A           KSWLMP   EQU    $1F           LAMP TEST
0020 A           KSWMNT   EQU    $20           MULTIPLE NORMAL TEST
0021 A           KSWSNT   EQU    $21           SINGLE NORMAL TEST
0022 A           KSWSPR   EQU    $22           SPREAD ADVANCE
0023 A           KSWSPT   EQU    $23           SHOT POINT ADVANCE
0024 A           KSWTST   EQU    $24           AUTO FIRE MULTIPLE NORMAL TEST
0025 A           KSWOVR   EQU    $25           OVERRIDE
0026 A           KSWFIR   EQU    $26           FIRE
0027 A           KSWSP3   EQU    $27           SPARE
0028 A           KSWSP4   EQU    $28           SPARE
0029 A           KSWFPT   EQU    $29           FILE PRESET
002A A           KSWHDR   EQU    $2A           REEL HEADER
002B A           KSWSCH   EQU    $2B           FILE SEARCH
002B A           KSWMAX   EQU    $2B
               ***************************************************************************
               ***************************************************************************
               *
                          DEF    PIADDR,PIADCR
               *
               *
                          DEF    PIADDR,PIADCR
```

```
             *
             *
             *      ROLL-ALONG DISPLAY PIA REGISTERS
             *
800A A         PIADDR    RMB    1         PERIPHERAL DATA OR DATA DIRECTION REGISTER
800B A         PIADCR    RMB    1         CONTROL REGISTER
             *
                         DEF    ROLENB,ROLMSK
             *
             *
             *      PIA CONTROL REGISTER EQUATES
             *
0007 A         ROLENB    EQU    7         ROLL-ALONG INTERRUPT (INTERRUPTS ENABLED)
0006 A         ROLMSK    EQU    6         ROLL-ALONG INTERRUPTS (INTERRUPTS MASKED)
             **************************************************************************
             **************************************************************************
             *
                         DEF    RTSADV,RTSLNN,RTSTLN,RTSSPT
             *
             *
             *      ROTARY SWITCHES (READ ONLY)
             *
800C A         RTSADV    RMB    1         STEP ADVANCE
CRSDEV(A0011.02.072AA  CRS I/O ADDRESSES)      08/04/78  11:44:48  PAGE   3

800D A         RTSLNN    RMB    1         LINE NUMBER
800E A         RTSTLN    RMB    1         RTU TEST / NOISE TEST LENGTH
800F A         RTSSPT    RMB    1         SHOT POINT
             *
             *      STEP ADVANCE ROTARY SWITCH POSITION EQUATES
             *
0001 A         SPAMN4    EQU    1         -1 ADVANCE
0002 A         SPAMN3    EQU    2         -2 ADVANCE
0004 A         SPAMN2    EQU    4         -3 ADVANCE
0008 A         SPAMN1    EQU    8         -4 ADVANCE
0000 A         SPAZAV    EQU    0         0 ADVANCE
0010 A         SPAPL1    EQU    $10       +1 ADVANCE
0020 A         SPAPL2    EQU    $20       +2 ADVANCE
0040 A         SPAPL3    EQU    $40       +4 ADVANCE
0080 A         SPAPL4    EQU    $80       +8 ADVANCE
             *
             *      LINE NUMBER ROTARY SWITCH POSITION EQUATES
             *
0001 A         LNESW1    EQU    1         LINE 1
0002 A         LNESW2    EQU    2         LINE 2
0004 A         LNESW3    EQU    4         LINE 3
0008 A         LNESW4    EQU    8         LINE 4
             *
                         DEF    NTSTL0,NTSTL1,NTSTL2,NTSTL6
             *
             *
             *      RTU TEST / NOISE LENGTH SWITCH POSITION EQUATES
             *
0001 A         NTSTL0    EQU    1         NOISE TEST LENGTH = 0 SECONDS
0002 A         NTSTL1    EQU    2         NOISE TEST LENGTH = 1 SECOND
0004 A         NTSTL2    EQU    4         NOISE TEST LENGTH = 2 SECOND
0008 A         NTSTL6    EQU    8         NOISE TEST LENGTH = 6 SECONDS
             *
                         DEF    SHTPTA,SHTPTB
             *
             *
             *      SHOOTER ROTARY SWITCH POSITION EQUATES
             *
0001 A         SHTPTA    EQU    1         SHOOTER A
0002 A         SHTPTB    EQU    2         SHOOTER B
             **************************************************************************
             **************************************************************************
             *
                         DEF    AUXDTB,AUXPAR,AUXSPL,AUXSAV
             *
             *
             *      AUXILIARY KEYBOARD LITES AND BLAST INFORMATION (WRITE ONLY)
             *
```

```
800C A          166            ORG   RTSADV
800C A          167 AUXDTB     RMB   1            BLAST DELAY TIME
800D A          168 AUXPAR     RMB   1            PARITY ERROR
800E A          169 AUXSPL     RMB   1            AUXILIARY KEYBOARD LITES
800F A          170 AUXSAV     RMB   1            TIME BREAK SIGN (BIT 7 => 1 = MINUS SIGN)
                171 *
                172            DEF   AXLCBP,AXLTBP,AXLNTS,AXLADV,AXLFIR,AXLOVR,AXLFTS
                173 *
                174 *
                175 *      AUXILIARY KEYBOARD LITE EQUATES
CRSDEV(A0011.02.072AA  CRS I/O ADDRESSES)         08/04/78  11:44:49  PAGE   4

                176 *
0008 A          177 AXLCBP     EQU   8            CAMERA BY-PASS LITE
0001 A          178 AXLTBP     EQU   1            TAPE BY-PASS LITE
0002 A          179 AXLNTS     EQU   2            NORMAL TEST-IN-PROGRESS
0080 A          180 AXLADV     EQU   $80          ADVANCE LITE
0040 A          181 AXLFIR     EQU   $40          FIRE LITE
0020 A          182 AXLOVR     EQU   $20          OVERRIDE LITE
0010 A          183 AXLFTS     EQU   $10          FIRE MULTIPLE NORMAL TEST
                184 ***********************************************************************
                185 ***********************************************************************
                186 *
                187            DEF   TSWSPR,TSWRLT,TSWRLO,TSWNCT,TSWNCO
                188            DEF   TSWCLH,TSWCLT,TSWCLO,TSWCHH,TSWCHT
                189            DEF   TSWCHO,TSWLLH,TSWLLT,TSWLLO
                190 *
                191 *
                192 *      THUMBWHEEL SWITCH SETTINGS
                193 *
8010 A          194 TSWSPR     RMB   1            SAMPLE RATE
8011 A          195 TSWRLT     RMB   1            RECORD LENGTH (TENS)
8012 A          196 TSWRLO     RMB   1            RECORD LENGTH (ONES)
8013 A          197 TSWNCT     RMB   1            NUMBER RECORDED CHANNELS (TENS)
8014 A          198 TSWNCO     RMB   1            NUMBER RECORDED CHANNELS (ONES)
8015 A          199 TSWCLH     RMB   1            CONTINUITY LOW LIMIT (HUNDREDS)
8016 A          200 TSWCLT     RMB   1            CONTINUITY LOW LIMIT (TENS)
8017 A          201 TSWCLO     RMB   1            CONTINUITY LOW LIMIT (ONES)
8018 A          202 TSWCHH     RMB   1            CONTINUITY HIGH LIMIT (HUNDREDS)
8019 A          203 TSWCHT     RMB   1            CONTINUITY HIGH LIMIT (TENS)
801A A          204 TSWCHO     RMB   1            CONTINUITY HIGH LIMIT (ONES)
801B A          205 TSWLLH     RMB   1            LEAKAGE LOW LIMIT (HUNDREDS)
801C A          206 TSWLLT     RMB   1            LEAKAGE LOW LIMIT (TENS)
801D A          207 TSWLLO     RMB   1            LEAKAGE LOW LIMIT (ONES)
                208 ***********************************************************************
                209 ***********************************************************************
                210 *
                211            DEF   STLRDR,STLRCR,STLWDR,STLWCR
                212 *
                213 *
                214 *      SATELLITE COMPUTER PIA INTERFACE REGISTERS
                215 *
8024 A          216            ORG   $8024
8024 A          217 STLRDR     RMB   1            DATA OF DATA DIRECTION REGISTERS
8025 A          218 STLRCR     RMB   1            CONTROL REGISTER (READ)
8026 A          219 STLWDR     RMB   1            DATA OR DATA DIRECTION REGISTER (WRITE)
8027 A          220 STLWCR     RMB   1            CONTROL REGISTER (WRITE)
                221 *
                222            DEF   STLRMK,STLWMK
                223 *
                224 *
                225 *      PIA CONTROL REGISTER EQUATES
                226 *
0027 A          227 STLRMK     EQU   $27          SATELLITE READ MASK
0027 A          228 STLWMK     EQU   $27          SATELLITE WRITE MASK
                229 ***********************************************************************
                230 ***********************************************************************
                231 *
                232            DEF   DATMON,MONPWR,MONOFF,STLRST,STLSTR
                233            DEF   SCPSDT,SCPRFS
CRSDEV(A0011.02.072AA  CRS I/O ADDRESSES)         08/04/78  11:44:51  PAGE   5

                234 *
                235 *
```

```
                 *      DATA MONITOR CONTROL REGISTER AND SATELLITE RESET
                 *
802C A                  ORG    $802C
802C A           DATMON RMB    1             DATA MONITOR
0001 A           MONPWR EQU    1             MONITOR ON
0000 A           MONOFF EQU    0             MONITOR OFF
0004 A           STLRST EQU    4             SATELLITE RESET
0000 A           STLSTR EQU    0             SATELLITE START
                 *
                 *      SCOPE DISPLAY SELCET EQUATES
                 *
0000 A           SCPRFS EQU    0             SELECT RF SPECTRUM FOR SCOPE DISPLAY
0002 A           SCPSDT EQU    2             SELECT SEISMIC DATA FOR SCOPE DISPLAY
                 *
                        DEF    MONWMU
                 *
                 *
                 *      MONITOR WARM UP VALUE
                 *
0578 A           MONWMU EQU    1400          MONITOR WARM UP TIME
                 ***********************************************************************
                 ***********************************************************************
                 *
                        DEF    CMDFCR,CMDFAR,CMDBSY
                        DEF    CMDCAR
                 *
                 *
                 *      RTU COMMAND FORMATTER REGISTERS
                 *
803E A                  ORG    $803E
803E A           CMDFCR RMB    1             COMMAND REGISTER
803F A           CMDFAR RMB    1             ADDRESS REGISTER
0080 A           CMDBSY EQU    $80           FORMATTER BUSY
0040 A           CMDCAR EQU    $40           CARRIER DETECT
                 ***********************************************************************
                 ***********************************************************************
                 *
                        DEF    ROLUHD,ROLUTU,ROLLHD,ROLLTU
                 *
                 *
                 *      ROLL-ALONG DISPLAY INDEXES
                 *
804D A                  ORG    $804D
804D A           ROLUHD RMB    1             ROLL-ALONG UPPER DISPLAY HUNDREDS DIGIT
804E A           ROLUTU RMB    1             ROLL-ALONG UPPER DISPLAY TENS-UNITS
805D A                  ORG    $805D
805D A           ROLLHD RMB    1             ROLL-ALONG LOWER DISPLAY HUNDREDS DIGIT
805E A           ROLLTU RMB    1             ROLL-ALONG LOWER DISPLAY TENS-UNITS
                 ***********************************************************************
                 ***********************************************************************
                 *
                 *
                        DEF    CASR1,CASR2,CASR3,CASR4,CACD1
                        DEF    CACD2,CACCH,CACCL
                        DEF    CAADH,CAADL,CASSP,CASOP
                        DEF    CAIIR,CAEIR
CRSDEV(A0011.02.072AA  CRS I/O ADDRESSES)          08/04/78  11:44:52  PAGE   6

                 *
8080 A                  ORG    $8080
                 *
                 *      MAGNETIC TAPE UNIT CONTROLLER ADDRESSES
                 *
8080 A           CASR1  RMB    1             STATUS REGISTER 1
8081 A           CASR2  RMB    1             STATUS REGISTER 2
8082 A           CASR3  RMB    1             STATUS REGISTER 3
8083 A           CASR4  RMB    1             STATUS REGISTER 4
8084 A           CACD1  RMB    1             COMMAND REGISTER 1
8085 A           CACD2  RMB    1             COMMAND REGISTER 2
8086 A           CACCH  RMB    1             CHARACTER COUNTER HIGH ORDER
8087 A           CACCL  RMB    1             CHARACTER COUNTER LOW ORDER
8088 A           CAADH  RMB    1             ADDRESS POINTER HIGH ORDER
8089 A           CAADL  RMB    1             ADDRESS POINTER LOW ORDER
808A A           CASSP  RMB    1             SET STANDBY POWER
```

```
808B A           308 CASOP    RMB    1            SET OPERATE POWER
808C A           309 CAIIR    RMB    1            INHIBIT INTERRUPT REQUEST
808D A           310 CAEIR    RMB    1            ENABLE INTERRUPT REQUEST
                 311 *
                 312          DEF    CMDMR,CMDDE,CMDOF
                 313 *
                 314 *
                 315 *     MAGNETIC TAPE UNIT COMMAND EQUATES
                 316 *
0080 A           317 CMDMR    EQU    $80          MASTER RESET
0040 A           318 CMDDE    EQU    $40          DEVICE ENABLE
0020 A           319 CMDOF    EQU    $20          OFF LINE
                 320 *
                 321          DEF    CMDRB,CMDWB,CMDFF,CMDWF,CMDBS
                 322          DEF    CMDBF,CMDRW,CMDET,CMDFS
                 323 *
                 324 *
                 325 *     COMMAND REGISTER 2
                 326 *
0001 A           327 CMDRB    EQU    1            READ 1 BLOCK
0002 A           328 CMDWB    EQU    2            WRITE 1 BLOCK
0003 A           329 CMDFF    EQU    3            FORWARD FILE MARK
0004 A           330 CMDWF    EQU    4            WRITE FILE MARK
0008 A           331 CMDBS    EQU    8            BACKSPACE 1 RECORD
0018 A           332 CMDBF    EQU    $18          BACKSPACE FILE MARK
0010 A           333 CMDRW    EQU    $10          REWIND
0020 A           334 CMDET    EQU    $20          ERASE TAPE
0080 A           335 CMDFS    EQU    $80          FORWARD SPACE 1 RECORD
                 336 *
                 337          DEF    STBSY,SFBSY,SEOTP,SINTB,SFPRM
                 338          DEF    SONLN,SLDPT,SRWDG,SBUSY
                 339 *
                 340 *
                 341 *     MAGNETIC TAPE UNIT STATUS EQUATES
                 342 *
                 343 *     STATUS REGISTER 1
                 344 *
0001 A           345 STBSY    EQU    1            TAPE UNIT BUSY
0002 A           346 SFBSY    EQU    2            FORMATTER BUSY
0004 A           347 SEOTP    EQU    4            END-OF-TAPE
0008 A           348 SINTB    EQU    8            READ DEVICE STATUS
0010 A           349 SFPRM    EQU    $10          FILE PROTECT RING MISSING
CRSDEV(A0011.02.072AA  CRS I/O ADDRESSES)          08/04/78  11:44:53  PAGE   7

0020 A           350 SONLN    EQU    $20          ON LINE
0040 A           351 SLDPT    EQU    $40          LOAD POINT
0080 A           352 SRWDG    EQU    $80          REWINDING
0083 A           353 SBUSY    EQU    STBSY+SFBSY+SRWDGUNIT BUSY MASK
                 354 *
                 355          DEF    SGBLK,SMTRK,SSKEW,SFMKD
                 356          DEF    SVRCE,SOVFL,STDBY
                 357 *
                 358 *
                 359 *     STATUS REGISTER 2
                 360 *
0001 A           361 SGBLK    EQU    1            GOOD DATA BLOCK
0002 A           362 SMTRK    EQU    2            MULTITRACK ERROR
0004 A           363 SSKEW    EQU    4            SKEW ERROR
0008 A           364 SFMKD    EQU    8            FILE MARK DETECTED
0010 A           365 SVRCE    EQU    $10          VRC ERROR
0020 A           366 SOVFL    EQU    $20          RATE ERROR
0040 A           367 STDBY    EQU    $40          STANDBY
                 368 *
                 369 *
                 370          DEF    TTMOMR,TTMODE,TTMOOF,TTMOFF
                 371          DEF    TTMOWF,TTMOBS,TTMORW,TTMOET
                 372          DEF    TTMOFS,TTMOSS,TTMOSO,TTMOWR
                 373 *
                 374 *
                 375 *     TAPE UNIT COMMAND TIMEOUT LENGTHS (MILLISECONDS)
                 376 *
0001 A           377 TTMOMR   EQU    1            MASTER RESET
0001 A           378 TTMODE   EQU    1            DEVICE ENABLE
0001 A           379 TTMOOF   EQU    1            OFF LINE
```

```
7530 A      TTMOFF   EQU   30000        FORWARD FILE MARK
03E8 A      TTMOWF   EQU   1000         WRITE FILE MARK
03E8 A      TTMOBS   EQU   1000         BACKSPACE RECORD
7530 A      TTMOBF   EQU   30000        BACKSPACE FILE MARK
7530 A      TTMORW   EQU   30000        REWIND
03E8 A      TTMOET   EQU   1000         ERASE TAPE
03E8 A      TTMOFS   EQU   1000         FORWARD SPACE RECORD
05DC A      TTMOSS   EQU   1500         SET STAND-BY POWER
0FA0 A      TTMOSO   EQU   4000         SET OPERATE POWER
01F4 A      TTMOWR   EQU   500          WRITE/READ OPERATION
            ************************************************************************
            ************************************************************************
            *
                     DEF   TCPFIL,TCPSWX,TCPDSP
                     DEF   TCPERT,TCPLED,TCPPBS,TCPIEN,TCPIDS
                     DEF   TCPPSW
            *
            *     TAPE CONTROL PANEL
            *     FILE THUMBWHEEL SWITCH
8090 A      TCPFIL   EQU   $8090
            *     TAPE CONTROL PANEL ROTARY SWITCH
            *     BIT 0 = END DATA
            *     BIT 1 = BACKSPACE
            *     BIT 2 = FILE SEARCH (REVERSE)
            *     BIT 3 = FILE SEARCH (FORWARD)
8093 A      TCPSWX   EQU   $8093
            *     TAPE CONTROL PANEL DISPLAY - FILE NUMBER
8098 A      TCPDSP   EQU   $8098
CRSDEV(A0011.02.072AA  CRS I/O ADDRESSES)          08/04/78  11:44:55  PAGE   8

            *     TAPE CONTROL PANEL TAPE ERROR DISPLAY
809B A      TCPERT   EQU   $809B
            *     TAPE CONTROL PANEL LEDS
            *     BIT 0 = ACTIVE
809C A      TCPLED   EQU   $809C
            *
            *     TAPE FUNCTION SELECT BUTTONS
            *
0001 A      TCPBFP   EQU   1            FILE PRESET
0002 A      TCPBWH   EQU   2            WRITE HEADER
0004 A      TCPBSS   EQU   4            SEARCH START
            *
8097 A      TCPPSW   EQU   $8097        P/B CODE
            *     TAPE CONTROL PANEL PUSHBUTTONS
            *     CLEAR P/B INTERRUPT ON WRITE
            *     BIT 7 = INTERRUPT FLAG
809D A      TCPPBS   EQU   $809D        P/B RESET
809E A      TCPIEN   EQU   $809E        P/B INTERRUPT ENABLE
809F A      TCPIDS   EQU   $809F        P/B INTERRUPT DISABLE
            ************************************************************************
            ************************************************************************
            *
                     DEF   TMRCLK,TMRINT
                     DEF   TMRCK1
            *
            *
            *     COUNT DOWN CLOCK REGISTERS
            *
8038 A               ORG   $8038
8038 A      TMRCLK   RMB   2            COUNT DOWN TIMER (MILLISEC)
8039 A      TMRCK1   EQU   *-1
0080 A      TMRINT   EQU   $80          CLOCK INTERRUPT
            ************************************************************************
            ************************************************************************
            *
                     DEF   TODTSC,TODUSC,TODTMN,TODUMN
                     DEF   TODTHR,TODUHR,TODHDY,TODTDY,TODUDY
                     DEF   TODTHY,TODHYR,TODTYR,TODUYR
                     DEF   TODHFN,TODTFN,TODUFN
            *
80A0 A               ORG   $80A0
            *
            *     TIME-OF-DAY CLOCK
            *
```

```
80A0 A          452 TODTHY    EQU    *            THOUSAND YEARS
80A1 A          453 TODHYR    EQU    *+1
80A2 A          454 TODTYR    EQU    *+2          TENS YEARS
80A3 A          455 TODUYR    EQU    *+3          UNITS YEARS
80A4 A          456 TODHDY    EQU    *+4          HUNDRED DAYS
80A5 A          457 TODTDY    EQU    *+5          TENS DAYS
80A6 A          458 TODUDY    EQU    *+6          UNITS DAYS
80A7 A          459 TODTHR    EQU    *+7          TENS HOURS
80A8 A          460 TODUHR    EQU    *+8          UNITS HOURS
80A9 A          461 TODTMN    EQU    *+9          TENS MINUTES
80AA A          462 TODUMN    EQU    *+10         UNIT MINUTES
80AB A          463 TODTSC    EQU    *+11         TENS SECONDS
80AC A          464 TODUSC    EQU    *+12         UNITS SECONDS
80AD A          465 TODHFN    EQU    *+13         HUNDREDS FIEL NUMBER
CRSDEV(A0011.02.072AA  CRS I/O ADDRESSES)          08/04/78  11:44:56  PAGE   9

80AE A          466 TODTFN    EQU    *+14         TENS FILE NUMBER
80AF A          467 TODUFN    EQU    *+15         UNITS FILE NUMBER
                468 ************************************************************************
                469 ************************************************************************
                470 *
                471           DEF    SCAN
                472 *
8100 A          473           ORG    $8100
8100 A          474 SCAN      RMB    256          SELFSCAN MEMORY
8200            475           END
CRSDEV(A0011.02.072AA  CRS I/O ADDRESSES)          08/04/78  11:44:57  PAGE  10

  NO ERRORS
 ISECT LENGTH --    0
 DSECT LENGTH --    0

< AUXDTB   800C A   167    161
< AUXPAR   800D A   168    161
< AUXSAV   800F A   170    161
< AUXSPL   800E A   169    161
< AXLADV   0080 A   180    172
< AXLCBP   0008 A   177    172
< AXLFIR   0040 A   181    172
< AXLFTS   0010 A   183    172
< AXLNTS   0002 A   179    172
< AXLOVR   0020 A   182    172
< AXLTBP   0001 A   178    172
< CAADH    8088 A   305    290
< CAADL    8089 A   306    290
< CACCH    8086 A   303    289
< CACCL    8087 A   304    289
< CACD1    8084 A   301    288
< CACD2    8085 A   302    289
< CAEIR    808D A   310    291
< CAIIR    808C A   309    291
< CASOP    808B A   308    290
< CASR1    8080 A   297    288
< CASR2    8081 A   298    288
< CASR3    8082 A   299    288
< CASR4    8083 A   300    288
< CASSP    808A A   307    290
< CMDBF    0018 A   332    322
< CMDBS    0008 A   331    321
< CMDBSY   0080 A   268    259
< CMDCAR   0040 A   269    260
< CMDDE    0040 A   318    312
< CMDET    0020 A   334    322
< CMDFAR   803F A   267    259
< CMDFCR   803E A   266    259
< CMDFF    0003 A   329    321
< CMDFS    0080 A   335    322
< CMDMR    0080 A   317    312
< CMDOF    0020 A   319    312
< CMDRB    0001 A   327    321
< CMDRW    0010 A   333    322
< CMDWB    0002 A   328    321
< CMDWF    0004 A   330    321
< CONROW   8005 A    15      9
```

```
< CONSOL    8004 A    14     9
< DATMON    802C A   239   232
< INTENB    003F A    34    28
< INTMSK    003E A    33    28
< KCRMSW    003D A    36    28
< KCRNSW    003F A    35    28
  KSWBSP    000A A    53
  KSWBST    001D A    72
  KSWCBP    001B A    70
  KSWCNT    000C A    55
  KSWCST    0019 A    68
 CRSDEV(A0011.02.072AA  CRS I/O ADDRESSES)            08/04/78  11:44:57  PAGE  11

  KSWDC0    0000 A    43
  KSWDC1    0001 A    44
  KSWDC2    0002 A    45
  KSWDC3    0003 A    46
  KSWDC4    0004 A    47
  KSWDC5    0005 A    48
  KSWDC6    0006 A    49
  KSWDC7    0007 A    50
  KSWDC8    0008 A    51
  KSWDC9    0009 A    52
  KSWDDP    0012 A    61
  KSWDPY    0015 A    64
  KSWDST    0016 A    65
  KSWENT    000B A    54
  KSWESC    000E A    57
  KSWFIR    0026 A    81
  KSWFPT    0029 A    84
  KSWHDR    002A A    85
  KSWLMP    001F A    74
< KSWMAX    002B A    87    38
  KSWMNT    0020 A    75
  KSWOVR    0025 A    80
  KSWPFT    001E A    73
  KSWPRG    0017 A    66
  KSWRID    0014 A    63
  KSWRTY    000D A    56
  KSWSCH    002B A    86
  KSWSID    0013 A    62
  KSWSNT    0021 A    76
  KSWSP1    0010 A    59
  KSWSP2    001C A    71
  KSWSP3    0027 A    82
  KSWSP4    0028 A    83
  KSWSPR    0022 A    77
  KSWSPT    0023 A    78
  KSWTBP    0018 A    67
  KSWTIM    0011 A    60
  KSWTLS    000F A    58
  KSWTST    0024 A    79
  KSWUST    001A A    69
  LNESW1    0001 A   136
  LNESW2    0002 A   137
  LNESW3    0004 A   138
  LNESW4    0008 A   139
< MONOFF    0000 A   241   232
< MONPWR    0001 A   240   232
< MONWMU    0578 A   255   250
< NTSTL0    0001 A   146   141
< NTSTL1    0002 A   147   141
< NTSTL2    0004 A   148   141
< NTSTLC    0008 A   149   141
< PIADCR    800B A   100    91    94
< PIADDR    800A A    99    91    94
< PIAKCR    8009 A    26    20
< PIAKDR    8008 A    25    20
< ROLENB    0007 A   107   102
< ROLLHD    805D A   282   273
< ROLLTU    805E A   283   273
 CRSDEV(A0011.02.072AA  CRS I/O ADDRESSES)            08/04/78  11:44:58  PAGE  12

< ROLMSK    0006 A   108   102
```

```
< ROLUHD    804D A   279    273
< ROLUTU    804E A   280    273
< RTSADV    800C A   117    112    166
< RTSLNN    800D A   118    112
< RTSSPT    800F A   120    112
< RTSTLN    800E A   119    112
< SBUSY     0083 A   353    338
< SCAN      8100 A   474    471
< SCPRFS    0000 A   247    233
< SCPSDT    0002 A   248    233
< SEOTP     0004 A   347    337
< SFBSY     0002 A   346    337    353
< SFMKD     0008 A   364    355
< SFPRM     0010 A   349    337
< SGBLK     0001 A   361    355
< SHTPTA    0001 A   156    151
< SHTPTB    0002 A   157    151
< SINTB     0008 A   348    337
< SLDPT     0040 A   351    338
< SMTRK     0002 A   362    355
< SONLN     0020 A   350    338
< SOVFL     0020 A   366    356
  SPAMN1    0008 A   127
  SPAMN2    0004 A   126
  SPAMN3    0002 A   125
  SPAMN4    0001 A   124
  SPAPL1    0010 A   129
  SPAPL2    0020 A   130
  SPAPL3    0040 A   131
  SPAPL4    0080 A   132
  SPAZAV    0000 A   128
< SRWDG     0080 A   352    338    353
< SSKEW     0004 A   363    355
< STBSY     0001 A   345    337    353
< STDBY     0040 A   367    356
< STLRCR    8025 A   218    211
< STLRDR    8024 A   217    211
< STLRMK    0027 A   227    222
< STLRST    0004 A   242    232
< STLSTR    0000 A   243    232
< STLWCR    8027 A   220    211
< STLWDR    8026 A   219    211
< STLWMK    0027 A   228    222
< SVRCE     0010 A   365    356
  TCPBFP    0001 A   416
  TCPBSS    0004 A   418
  TCPBWH    0002 A   417
< TCPDSP    8098 A   407    393
< TCPERT    809B A   409    394
< TCPFIL    8090 A   399    393
< TCPIDS    809F A   426    394
< TCPIEN    809E A   425    394
< TCPLED    809C A   412    394
< TCPPBS    809D A   424    394
< TCPPSW    8097 A   420    395
< TCPSWX    8093 A   405    393
< TMRCK1    8039 A   438    431
CRSDEV(A0011.02.072AA  CRS I/O ADDRESSES)                 08/04/78  11:44:58  PAGE  13

< TMRCLK    8038 A   437    430
< TMRINT    0080 A   439    430
< TODHDY    80A4 A   456    444
< TODHFN    80AD A   465    446
< TODHYR    80A1 A   453    445
< TODTDY    80A5 A   457    444
< TODTFN    80AE A   466    446
< TODTHR    80A7 A   459    444
< TODTHY    80A0 A   452    445
< TODTMN    80A9 A   461    443
< TODTSC    80AB A   463    443
< TODTYR    80A2 A   454    445
< TODUDY    80A6 A   458    444
< TODUFN    80AF A   467    446
< TODUHR    80A8 A   460    444
```

```
< TODUMN    80AA A   462    443
< TODUSC    80AC A   464    443
< TODUYR    80A3 A   455    445
< TSWCHH    8018 A   202    188
< TSWCHO    801A A   204    189
< TSWCHT    8019 A   203    188
< TSWCLH    8015 A   199    188
< TSWCLO    8017 A   201    188
< TSWCLT    8016 A   200    188
< TSWLLH    801B A   205    189
< TSWLLO    801D A   207    189
< TSWLLT    801C A   206    189
< TSWNCO    8014 A   198    187
< TSWNCT    8013 A   197    187
< TSWRLO    8012 A   196    187
< TSWRLT    8011 A   195    187
< TSWSPR    8010 A   194    187
  TTMOBF    7530 A   383
< TTMOBS    03E8 A   382    371
< TTMODE    0001 A   378    370
< TTMOET    03E8 A   385    371
< TTMOFF    7530 A   380    370
< TTMOFS    03E8 A   386    372
< TTMOMR    0001 A   377    370
< TTMOOF    0001 A   379    370
< TTMORW    7530 A   384    371
< TTMOSO    0FA0 A   388    372
< TTMOSS    05DC A   387    372
< TTMOWF    03E8 A   381    371
< TTMOWR    01F4 A   389    372
CRCLST(A0011.02.073AA  CRS CIRCULAR LIST HANDLER)       08/04/78  11:46:30  PAGE   1

                      2 *
                      3 *      CRS CIRCULAR LIST HANDLER
                      4 *
 0000 I               5          ISEC
                      6 *
                      7          DEF    CRCLST
                      8          DEF    RTNRTL
                      9          DEF    RTNRBL
                     10          DEF    RTNATL
                     11          DEF    RTNABL
                     12 *
                     13 *      CIRCULAR LIST FORMAT
                     14 *
                     15 *           BYTE 1 => TOTAL NUMBER OF SLOTS IN LIST
                     16 *                2 => NUMBER OF SLOTS IN USE
                     17 *                3 => CURRENT TOP-OF-LIST POINTER
                     18 *                4 => CURRENT BOTTOM-OF-LIST POINTER
                     19 *                     2 BYTES REQUIRED FOR EACH SLOT IN LIST
                     20 *
                     21 *      CIRCULAR LIST OFFSET EQUATES
                     22 *
 0000 A              23 CLTMXS    EQU    0            TOTAL NUMBERR OF SLOITS IN LIST
 0001 A              24 CLTSIU    EQU    1            NUMBER OF SLOTS IN USE
 0002 A              25 CLTCTP    EQU    2            CURRENT TOP-OF-LIST POINTER
 0003 A              26 CLTNXB    EQU    3            NEXT BOTTOM-OF-LIST POINTER
 0003 A              27 CLTNBT    EQU    3
 0004 A              28 CLTSL0    EQU    4            OFFSET TO SLOT 0
                     29 *
                     30 *      CONDITION CODE EQUATES
                     31 *
 0010 A              32 CCIRQ     EQU    $10          INTERRUPT REQUEST MASKED
 0004 A              33 CCZER     EQU    4            ZERO CONDITION CODE
 0002 A              34 CCOVR     EQU    2            OVERFLOW CONDITION CODE
 0001 A              35 CCCAR     EQU    1            CARRY CONDITION CODE
                     36 *
                     37 *      CIRCULAR LIST FUNCTION CODE EQUATES
                     38 *
 0000 A              39 FCABL     EQU    0            ADD TO BOTTOM OF LIST
 0001 A              40 FCATL     EQU    1            ADD TO TOP OF LIST
 0002 A              41 FCRBL     EQU    2            REMOVE FROM BOTTOM OF LIST
 0003 A              42 FCRTL     EQU    3            REMOVE FROM TOP OF LIST
                     43 *
```

```
                      *       STACK OFFSET EQUATES
                      *
0007 A                  STKNRG    EQU   7            OFFSET TO 1ST STACK PAST SWI REGISTERS
0006 A                  STKPCL    EQU   6            PC LOW ORDER BYTE
0005 A                  STKPCH    EQU   5            PC HIGH ORDER BYTE
0004 A                  STKIXL    EQU   4            IDX LOW ORDER BYTE
0003 A                  STKIXH    EQU   3            IDX HIGH ORDER BYTE
0002 A                  STKACA    EQU   2            ACCUMULATOR A
0001 A                  STKACB    EQU   1            ACCUMULATOR B
0000 A                  STKCC     EQU   0            CONDITION CODES
0000 I                  CRCLST    EQU   *
0000 I 30                         TSX
0001 I A6 00                      LDA A STKCC,X
0003 I 84 10                      AND A #CCIRQ
0005 I A7 00                      STA A STKCC,X
0007 I EE 05                      LDX   STKPCH,X
CRCLST(A0011.02.073AA  CRS CIRCULAR LIST HANDLER)       08/04/78  11:46:32  PAGE   2

0009 I A6 00                      LDA A 0,X          PICK UP CIRCULAR LIST FUNCTION CODE
000B I 30                         TSX
000C I 6C 06                      INC   STKPCL,X     MOVE PC PAST
000E I 26 02                      BNE   CRC2         LIST
0010 I 6C 05                      INC   STKPCH,X     FUNCTION CODE
0012 I CE 00D6 I        CRC2      LDX   #SWIJTB-2    INIT JUMP TABLE PNTR
0015 I 08               CRC1      INX
0016 I 08                         INX
0017 I 4A                         DEC A              SELECT ROUTINE TO HANDLE
0018 I 2A FB                      BPL   CRC1         SPECIFIED LIST FUNCTION
001A I EE 00                      LDX   0,X
001C I 6E 00                      JMP   0,X
                      *
                      *       ROUTINE TO ADD ENTRY TO BOTTOM-OF-LIST
                      *
                      *            REGISTER CONTENTS:  STKIXH => CIRCULAR LIST ADDR
                      *                                STKACA => MSB OF LIST ENTRY
                      *                                STKACB => LSB OF LIST ENTRY
                      *
                      *            RETURN CONDITION CODE:  CC OVERFLOW SET => LIST FULL
                      *                                    CC ZERO SET     => SUCCESSFUL ADD
                      *
001E I                  RTNABL    EQU   *
001E I 30                         TSX
001F I EE 03                      LDX   STKIXH,X     PICK UP LIST ADDR
0021 I A6 00                      LDA A CLTMXS,X     # SLOTS USED =
0023 I A1 01                      CMP A CLTSIU,X     # SLOTS IN LIST
0025 I 27 20                      BEQ   ATL4         YES, GO SET PPROPER CC FOR RETUNR
0027 I A6 03                      LDA A CLTNXB,X     PICK UP NEXT BOTTOM PNTR
0029 I 6C 01                      INC   CLTSIU,X     INCR NUMBER OF SLOTS IN LIST
002B I 30                         TSX                SAVE STACK PO-NTER
002C I 8D 78                      BSR   LSTADD       ADD ENTRY TO LIST
002E I 30                         TSX
002F I EE 03                      LDX   STKIXH,X     RESTORE LIST ADDR
0031 I E6 03                      LDA B CLTNXB,X
0033 I 5C                         INC B              INCR NEXT BOTTOM PNTR
0034 I E1 00                      CMP B CLTMXS,X     LIST WRAP
0036 I 23 02                      BLS   ABL1         NO, UPDATE PNTR
0038 I C6 01                      LDA B #1           SET PNTR TO SLOT 1
003A I E7 03            ABL1      STA B CLTNXB,X     UPDATE NEXT BOTTOM PNTR
003C I 20 1F                      BRA   ATL5         SET CC FOR SUCCESSFUL ADDITION
                      *
                      *       ROUTINE TO ADD ENTRY TO TOP-OF-LIST
                      *
                      *            REGISTER CONTENTS:  STKIXH => CIRCULAR LIST ADDR
                      *                                STKACA => MSB OF LIST ENTRY
                      *                                STKACB => LSB OF LIST ENTRY
                      *
                      *            RETURN CONDITION CODE:  CC OVERFLOW SET => LIST FULL
                      *                                    CC ZERO SET     => SUCCESSFUL ADD
                      *
003E I                  RTNATL    EQU   *
003E I 30                         TSX
003F I EE 03                      LDX   STKIXH,X     PICK UP LIST ADDR
0041 I A6 00                      LDA A CLTMXS,X     PICK UP TOTAL LIST LENGTH
0043 I A1 01                      CMP A CLTSIU,X     # SLOTS USED = # SLOTS IN LIST
```

```
0045 I 26 09        116          BNE   ATL1        NO, LIST NOT YET YET FULL
0047 I 86 02        117 ATL4     LDA A #CCOVR      SET OVERFLOW CC
CRCLST(A0011.02.073AA  CRS CIRCULAR LIST HANDLER)       08/04/78  11:46:33  PAGE   3

0049 I 30           118 ATL6     TSX
004A I E6 00        119          LDA B STKCC,X
004C I 1B           120          ABA
004D I A7 00        121          STA A STKCC,X     SET PROPER CC FOR RETURN
004F I 3B           122          RTI
0050 I E6 02        123 ATL1     LDA B CLTCTP,X    PIKC UP CURRENT TOP-OF-LIST PNTR
0052 I 5A           124          DEC B
0053 I 27 01        125          BEQ   ATL2        JUMP IF LIST WRAP
0055 I 17           126          TBA
0056 I A7 02        127 ATL2     STA A CLTCTP,X    UPDATE CURRENT TOP-OF-LIST PNTR
0058 I 6C 01        128          INC   CLTSIU,X    INCR # SLOTS IN USE
005A I 30           129          TSX
005B I 8D 49        130          BSR   LSTADD      ADD ENTYRY TO LIST
005D I 86 04        131 ATL5     LDA A #CCZER      SET CC FOR SUCCESSFUL
005F I 20 E8        132          BRA   ATL6        LIST ADDITION
                    133 *
                    134 *     ROUTINE TO REMOVE ENTRY FROM TOP-OF-LIST
                    135 *
                    136 *          REGISTER CONTENTS:  STKIXH => LIST ADDR
                    137 *
                    138 *          RETURN CONTENTS:  STKACA => MSB OF ENTRY REMOVED
                    139 *                              STKACB => LSB OF ENTRY REMOVED
                    140 *
                    141 *          RETURN CONDITION CODE:  CC OVERFLOW SET => LIST ALREADY EMPT
                    142 *                                  CC CARRY SET    => LSB OF ENTRY REMO
                    143 *                                  CC ZERO SET     => LIST NOT YET EMPT
                    144 *
0061 I              145 RTNRTL   EQU   *
0061 I 30           146          TSX
0062 I EE 03        147          LDX   STKIXH,X    PICK UP LIST ADDR
0064 I A6 01        148          LDA A CLTSIU,X    LIST ALREADY EMPTY?
0066 I 27 DF        149 RTL6     BEQ   ATL4        YES, SET PROPER CC
0068 I A6 02        150          LDA A CLTCTP,X
006A I 30           151          TSX               REMOVE ENTRY POINTED TO BY THE
006B I 8D 48        152          BSR   LSTREM      CURRENT TOP-OF-LIST PNTR
006D I 30           153          TSX
006E I A7 02        154          STA A STKACA,X    SAVE ENTRY
0070 I E7 01        155          STA B STKACB,X    REMOVED
0072 I EE 03        156          LDX   STKIXH,X    RESTORE LIST ADDR
0074 I E6 02        157          LDA B CLTCTP,X
0076 I 5C           158          INC B             INCR CURRENT TOP-OF-LIST PNTR
0077 I E1 00        159          CMP B CLTMXS,X    LIST WRAP ?
0079 I 23 02        160          BLS   RTL2        NO, UPDATE PNTR
007B I C6 01        161          LDA B #1          SET PNTR TO SLOT 1
007D I E7 02        162 RTL2     STA B CLTCTP,X    UPDATE CURRENT TOP-OF-LIST PNTR
007F I 86 04        163 RTL5     LDA A #CCZER      ANTICIPATE LIST NOT YET EMPTY
0081 I 6A 01        164          DEC   CLTSIU,X    LIST NOW EMPTY ?
0083 I 26 C4        165          BNE   ATL6        NO
0085 I 86 01        166          LDA A #CCCAR      SET CC FOR LIST EMPTY CONDITION
0087 I 20 C0        167          BRA   ATL6
                    168 *
                    169 *     ROUTINE TO REMOVE ENTRY FROM BOTTOM OF LSIT
                    170 *
                    171 *          REGISTER CONTENTS:  STKIXH => LIST ADDR
                    172 *
                    173 *          RETURN CONTENTS:  STKACA => MSB OF ENTRY REMOVED
                    174 *                            STKACB => LSB OF ENTRY REMOVED
                    175 *
CRCLST(A0011.02.073AA  CRS CIRCULAR LIST HANDLER)       08/04/78  11:46:34  PAGE   4

                    176 *          RETURN CONDITION CODE:  CC OVERFLOW SET => LIST ALREADY EMPT
                    177 *                                  CC CARRY SET    => LIST NOW EMPTY
                    178 *                                  CC ZERO SET     => LIST NOT YET EMPT
                    179 *
0089 I              180 RTNRBL   EQU   *
0089 I 30           181          TSX
008A I EE 03        182          LDX   STKIXH,X    PICK UP LIST ADDR
008C I A6 01        183          LDA A CLTSIU,X    LIST ALREADY EMPTY?
008E I 27 D6        184          BEQ   RTL6        YES, INFORM CALLER
```

```
0090 I A6 00         185            LDA A  CLTMXS,X     ANTICIPATE LIST WRAP
0092 I E6 03         186            LDA B  CLTNXB,X     LIST WRAP ?
0094 I 5A            187            DEC B
0095 I 27 01         188            BEQ    RBL1         JUMP IF LIST WRAP
0097 I 17            189            TBA
0098 I A7 03         190 RBL1       STA A  CLTNXB,X     UPDATE NEXT BOTTOM PNTR
009A I 30            191            TSX
009B I 8D 18         192            BSR    LSTREM       REMOVE ENTRY FROM LIST
009D I 30            193            TSX
009E I A7 02         194            STA A  STKACA,X     SAVE ENTRY
00A0 I E7 01         195            STA B  STKACB,X     REMOVED
00A2 I EE 03         196            LDX    STKIXH,X     RESTORE LIST ADDR
00A4 I 20 D9         197            BRA    RTLS         SET CC FOR REMOVAL
                     198 *
                     199 *      ROUTINE TO ADD ENTRY TO CIRCULAR LIST
                     200 *
                     201 *          REGISTER CONTS:  IDX => ORIGINAL STACK PNTR
                     202 *                           ACCA=> SLOT ADDRESS FOR ADDITION
                     203 *
00A6 I               204 LSTADD     EQU    *
00A6 I E6 01         205            LDA B  STKACB,X
00A8 I 37            206            PSH B
00A9 I E6 02         207            LDA B  STKACA,X
00AB I 37            208            PSH B
00AC I 8D 0E         209            BSR    LSTOFF       COMPUTE OFFSET INTO SLOT
00AE I 32            210            PUL A
00AF I 33            211            PUL B
00B0 I A7 00         212            STA A  0,X          ADD ENTRY
00B2 I E7 01         213            STA B  1,X
00B4 I 39            214            RTS
                     215 *
                     216 *      ROUTINE TO REMOVE ENTRY FROM LIST
                     217 *
                     218 *          REGISTER CONTENTS:  IDX => ORIGINAL STACK PNTR
                     219 *                              ACCA=> SLOT ADDRESS FOR REMOVAL
                     220 *
00B5 I               221 LSTREM     EQU    *
00B5 I 8D 05         222            BSR    LSTOFF       COMPUTE OFFSET INTO LIST
00B7 I A6 00         223            LDA A  0,X
00B9 I E6 01         224            LDA B  1,X          FROM LIST
00BB I 39            225            RTS
                     226 *
                     227 *      ROUTINE TO COMPUTE OFFSET INTO CIRCULAR LIST
                     228 *
                     229 *          REGISTER CONTENTS:  IDX  =>ORIGINAL STACK PNTR
                     230 *
00BC I               231 LSTOFF     EQU    *
00BC I 4A            232            DEC A
00BD I E6 04         233            LDA B  STKIXL,X
CRCLST(A0011.02.073AA  CRS CIRCULAR LIST HANDLER)      08/04/78  11:46:36  PAGE   5

00BF I 37            234            PSH B
00C0 I E6 03         235            LDA B  STKIXH,X
00C2 I 37            236            PSH B
00C3 I 30            237            TSX
00C4 I 5F            238            CLR B
00C5 I 48            239            ASL A
00C6 I 59            240            ROL B
00C7 I 8B 04         241            ADD A  #CLTSL0
00C9 I C9 00         242            ADC B  #0
00CB I AB 01         243            ADD A  1,X
00CD I A7 01         244            STA A  1,X
00CF I E9 00         245            ADC B  0,X
00D1 I E7 00         246            STA B  0,X
00D3 I EE 00         247            LDX    0,X
00D5 I 33            248            PUL B
00D6 I 33            249            PUL B
00D7 I 39            250            RTS
                     251 *
                     252 *      SWI CIRCULAR LIST FUNCTION JUMP TABLE
                     253 *
00D8 I               254 SWIJTB     EQU    *
00D8 I 001E      I   255            FDB    RTNABL
```

```
 00DA I 003E    I   256          FDB    RTNATL
 00DC I 0089    I   257          FDB    RTNRBL
 00DE I 0061    I   258          FDB    RTNRTL
                    259 *
 00E0               260          END
CRCLST(A0011.02.073AA  CRS CIRCULAR LIST HANDLER)      08/04/78  11:46:36  PAGE   6

   NO ERRORS
 ISECT LENGTH --   224
 DSECT LENGTH --     0

 ABL1      003A I    99    97
 ATL1      0050 I   123   116
 ATL2      0056 I   127   125
 ATL4      0047 I   117    87   149
 ATL5      005D I   131   100
 ATL6      0049 I   118   132   165   167
 CCCAR     0001 A    35   166
 CCIRQ     0010 A    32    57
 CCOVR     0002 A    34   117
 CCZER     0004 A    33   131   163
 CLTCTP    0002 A    25   123   127   150   157   162
 CLTMXS    0000 A    23    85    96   114   159   185
 CLTNBT    0003 A    27
 CLTNXB    0003 A    26    88    94    99   186   190
 CLTSIU    0001 A    24    86    89   115   128   148   164   183
 CLTSL0    0004 A    28   241
 CRC1      0015 I    66    69
 CRC2      0012 I    65    63
< CRCLST   0000 I    54     7
 FCABL     0000 A    39
 FCATL     0001 A    40
 FCRBL     0002 A    41
 FCRTL     0003 A    42
 LSTADD    00A6 I   204    91   130
 LSTOFF    00BC I   231   209   222
 LSTREM    00B5 I   221   152   192
 RBL1      0098 I   190   188
 RTL2      007D I   162   160
 RTL5      007F I   163   197
 RTL6      0066 I   149   184
< RTNABL   001E I    82    11   255
< RTNATL   003E I   111    10   256
< RTNRBL   0089 I   180     9   257
< RTNRTL   0061 I   145     8   258
 STKACA    0002 A    51   154   194   207
 STKACB    0001 A    52   155   195   205
 STKCC     0000 A    53    56    58   119   121
 STKIXH    0003 A    50    84    93   113   147   156   182   196   235
 STKIXL    0004 A    49   233
 STKNRG    0007 A    46
 STKPCH    0005 A    48    59    64
 STKPCL    0006 A    47    62
 SWIJTB    00D8 I   254    65
LOGDVR(A0011.02.074AA  CRS LOG DEVICE DRIVER)          08/04/78  11:47:52  PAGE   1

                      2 *
                      3 *      CENTRAL RECORDING STATION LOG DEVICE DRIVER
                      4 *
 0000 I               5          ISEC
                      6 *
                      7          DEF    LGINIT
                      8          DEF    LGCONT
                      9          DEF    LGWCNT
                     10          DEF    LGRDCT
                     11          DEF    LGFECT
                     12          DEF    LGRDFM
                     13          DEF    LGWFRM
                     14          DEF    LGCOMP
                     15 *
                     16          DEF    RQBSVA,RQBSAV
                     17          DEF    BFRFDE,BFRSVC,BFRSVA
                     18 *
                     19          DEF    LGRSWD,LGRCTR,LGRTHD
```

```
                         DEF   LGRCNT,LGRWCT,LGRFRM
                         DEF   LGRCRB,LGRTYP,LGRBLN
                         DEF   LGRBFR
                         DEF   LGRICC
                         DEF   LGRAVL
                 *
                         DEF   LRQLST
                         DEF   LRQMXS,LRQSIU
                         DEF   LRQCTP,LRQNXB
                 *
                         DEF   LSWBSY,LSWRCP,LSWHLD
                         DEF   LSWFCH,LSWRQA
                 *
                         DEF   LTPCMD,LTPRDR,LTPWRT
                         DEF   LTPASC,LTPBIN,LTPRCD
                         DEF   LTPWTR,LTPFRM,LTPUFM
                 *
                         DEF   CRGRIE,CRGXIE
                 *
                         DEF   SRGIRQ,SRGXRE,SRGRRF
                 *
                 *
                         REF   TCPIEN,TCPIDS
                         REF   CRCBFR
                         REF   PIAKCR
                         REF   PTRINI
                 *
                         REF   RTNABL,RTNATL,RTNRTL
                 *
                 *
                 **
                 **      LOG REQUEST STATUS WORD EQUATES
                 **
0080 A           LSWBSY  EQU   $80          REQUEST BUSY
0040 A           LSWRCP  EQU   $40          REQUEST COMPLETE
0020 A           LSWHLD  EQU   $20          REQUEST HOLD
0010 A           LSWFCH  EQU   $10          WRITE REQUEST 1ST CHAR INDICATOR
0008 A           LSWRQA  EQU   8            FLOPPY DISC ERROR REQUEST ABORT
                 **
                 **      LOG REQUEST TYPE EQUATES
LUGDVR(A0011.02.074AA  CRS LOG DEVICE DRIVER)        08/04/78  11:47:53  PAGE   2

                 **
0080 A           LTPCMD  EQU   $80          COMMAND REQUEST
                 *
0040 A           LTPRDR  EQU   $40          READ REQUEST
0000 A           LTPWRT  EQU   0            WRITE REQUEST
                 *
0000 A           LTPASC  EQU   0            ASCII REQUEST
0010 A           LTPBIN  EQU   $10          BINARY REQUEST
                 *
0000 A           LTPRCD  EQU   0            I/O PROCEED
0008 A           LTPWTR  EQU   8            I/O WAIT
                 *
0000 A           LTPFRM  EQU   0            FORMATTED REQUEST
0001 A           LTPUFM  EQU   1            UNFORMATTED REQUEST
                 **
                 **      CONTROL REGISTER EQUATES
                 **
0080 A           CRGRIE  EQU   $80          RECEIVE INTERRUPT ENABLE
0020 A           CRGXIE  EQU   $20          TRANSMIT INTERRUPT ENABLE
                 **
                 **      STATUS REGISTER EQUATES
                 **
0080 A           SRGIRQ  EQU   $80          INTERRUPT REQUEST FLAG
0002 A           SRGXRE  EQU   2            XMIT DATA REGISTER EMPTY
0001 A           SRGRRF  EQU   1            RCV DATA REGISTER FULL
                 *
                 *       KEYBOARD INTERRUPT CONTROL EQUATES
                 *
003E A           INTMSK  EQU   $3E          INTERRUPTS MASKED
003F A           INTENB  EQU   $3F          INTERRUPTS ENABLED
                 *
```

```
                 *       ACIA REGISTER ADDRESSES
                 *
8004 A           ACIASS    EQU    $8004         STATUS REGISTER
8004 A           ACIAC     EQU    $8004         CONTROL REGISTER
8005 A           ACIADR    EQU    $8005         DATA REGISTER
                 *
                 *       CIRCULAR LIST FUNCTION CODE EQUATES
                 *
0000 A           FCABL     EQU    0             ADD TO BOTTOM OF LIST
0001 A           FCATL     EQU    1             ADD TO TOP OF LIST
0002 A           FCRBL     EQU    2             REMOVE FROM BOTTOM OF LIST
0003 A           FCRTL     EQU    3             REMOVE FROM TOP OF LSIT
                 *
                 *       COMMUNICATIONS CONTROL CHARACTER EQUATES
                 *
0004 A           EOT       EQU    4
0005 A           ENQ       EQU    5
0006 A           ACK       EQU    6
000A A           LF        EQU    $A
000D A           CR        EQU    $D
0015 A           NAK       EQU    $15
                 *
                 *       CONDITION CODE REGISTER EQUATES
                 *
0010 A           CCIRQ     EQU    $10           INTERRUPTS MASKED
                 *
001E A           LGRQMX    EQU    30            MAXIMUM NUMBER OF REQUESTS
LOGDVR(A0011.02.074AA  CRS LOG DEVICE DRIVER)     08/04/78  11:47:55  PAGE   3

                 *
                 *
                 *       FLOPPY DISC INTERFACE PIA REGISTER
                 *
8069 A           DIOREG    EQU    $8069         DATA I/O REGISTER
8068 A           CTLREG    EQU    $8068         CONTROLLER COMMAND & STATUS REGISTER
806A A           RDIREG    EQU    $806A         READ PULSE, DATA INPUT REGISTER
806B A           WCIREG    EQU    $806B         WRITE PULSE, COMMAND INPUT REGISTER
806E A           DOUTRG    EQU    $806E         DATA OUTPUT IRQ REGISTER
806F A           COUTRG    EQU    $806F         COMMAND OUTPUT IRQ REGISTER
                 *
                 *
0004 A           CRGPDR    EQU    4             SELECT PERIPHERAL DATA REGISTER
                 *
                 *       DATA DIRECTION REGISTER SETUP EQUATES
                 *
00FF A           DIODDR    EQU    $FF           ALL DATA LINES OUTPUTS
0003 A           CTLDDR    EQU    $3            RESET,STATUS/DATA OUTPUTS; RESET COMPLETE N
                 *
                 *       CONTROL REGISTER INITIALIZATION EQUATES
                 *
003F A           RDICRG    EQU    $3F
002F A           WCICRG    EQU    $2F
0005 A           DOTCRG    EQU    5
0005 A           WOTCRG    EQU    5
                 *
0037 A           RDIPCR    EQU    $37           READ PULSE CONTROL REG EQUATE
                 *
                 *       CONTROLLER COMMAND & STATUS REGISTER EQUATES
                 *
0001 A           CTLRST    EQU    1             CONTROLLER RESET
0002 A           CTLCMD    EQU    2             COMMAND OUTPUT MODE
0000 A           CTLDTA    EQU    0             DATA OUTPUT MODE
0080 A           CTLRCP    EQU    $80           CONTROLLER RESET COMPLETE
                 *
                 *       DISC STATUS WORD EQUATES
                 *
0080 A           DSTBSY    EQU    $80           REQUEST BUSY
0040 A           DSTRCP    EQU    $40           REQUEST COMPLETE
0020 A           DSTWRT    EQU    $20           WRITE REQUEST
0010 A           DSTCMD    EQU    $10           COMMAND REQUEST
0008 A           DSTFCH    EQU    8             FIRST CHARACTER INDICATOR
                 *
                 *       DISC DRIVER REQUEST INITIALIZATION ROUTINE
                 *
```

```
                    163 *          CALLING SEQUENCE:  JSR LGINIT
                    164 *
                    165 *          REGISTER CONTENTS:  IDX => REQUEST BLOCK ADDR
                    166 *
0000 I              167 LGINIT    EQU    *
0000 I 07           168           TPA
0001 I B7 010D D    169           STA A  LGRICC     SAVE CONDITION CODES
0004 I 0F           170           SEI               MASK INTERRUPTS
0005 I 7D 010E D    171           TST    LGRAVL     DISC AVAILABLE ?
0008 I 27 28        172           BEQ    LGI1       YES, CONTINUE
000A I FF 010B D    173           STX    REQSAV     SAVE REQUEST BLOCK ADDR
000D I B6 010B D    174           LDA A  REQSAV
0010 I F6 010C D    175           LDA B  REQSAV+1
LOGDVR(A0011 02.074AA  CRS LOG DEVICE DRIVER)        08/04/78  11:47:56  PAGE   4

0013 I FE 0111 D    176           LDX    LGRTHD
0016 I 3F           177           SWI
0017 I 00           178           FCB    FCABL      ADD REQUEST TO BOTTOM OF QUEUE
0018 I FE 0111 D    179 LGI3      LDX    LGRTHD
001B I 3F           180           SWI
001C I 03           181           FCB    FCRTL      ALL REQUESTS OFF QUEUE
001D I 29 0E        182           BVS    LGI2       YES, EXIT
001F I B7 010B D    183           STA A  REQSAV
0022 I F7 010C D    184           STA B  REQSAV+1
0025 I FE 010B D    185           LDX    REQSAV
0028 I BD 0004 R    186           JSR    PTRINI     INITIATE PRINTER REQUEST IF POSSIBLE
002B I 20 EB        187           BRA    LGI3       CONTINUE UNTIL ALL REQUESTS REMOVED
002D I B6 010D D    188 LGI2      LDA A  LGRICC     RESTORE ORIGINAL COND. CODE
0030 I 06           189           TAP
0031 I 39           190           RTS               RETURN TO CALLER
0032 I              191 LGI1      EQU    *
                    192 **
                    193 **     FLOPPY DISC DRIVER CODE
                    194 **
0032 I              195 LGCONT    EQU    *
0032 I              196 LGWCNT    EQU    *
0032 I              197 LGRDCT    EQU    *
0032 I              198 LGFECT    EQU    *
0032 I              199 LGRDFM    EQU    *
0032 I              200 LGWFRM    EQU    *
0032 I              201 LGCOMP    EQU    *
                    202 **
                    203 **     LOG DRIVER SUPPORT SUBROUTINES
                    204 **
                    205 *
                    206 *      ROUTINE TO SETUP PARAMETERS FOR QUEUE ADDITION
                    207 *
0032 I              208 PRCADD    EQU    *
0032 I 07           209           TPA
0033 I 36           210           PSH A             SAVE CURRENT CONDITION CODE
0034 I 0F           211           SEI               MASK INTERRUPTS
0035 I FF 010B D    212           STX    REQSAV
0038 I FE 0111 D    213           LDX    LGRTHD     ANTICIPATE ADD TO REQUEST QUEUE
003B I B6 010F D    214           LDA A  LGRSWD
003E I 85 40        215           BIT A  #LSWRCP    REQUEST COMPLETE ?
0040 I 27 03        216           BEQ    PRCAD2     NO, SETUP FOR REQUEST QUEUE
0042 I CE 0002 R    217           LDX    #CRCBFR    ADD ENTRY TO EMPTY BUFFER QUEUE
0045 I 32           218 PRCAD2    PUL A
0046 I F6 010B D    219           LDA B  REQSAV     TO ADD TO QUEUE
0049 I 37           220           PSH B             ON STACK
004A I F6 010C D    221           LDA B  REQSAV+1   PLACE UPPER AND
004D I 85 10        222           BIT A  #CCIRQ     INTERRUPTS MASKED ON ENTRY TO ROUTINE ?
004F I 32           223           PUL A
0050 I 26 01        224           BNE    PRAD1      YES, LEAVE INTERRUPTS MASKED
0052 I 0E           225           CLI               UNMASK INTERRUPTS
0053 I 39           226 PRAD1     RTS               RETURN TO CALLER
                    227 *
                    228 *      ROUTINE TO SETUP PARAMETERS FOR QUEUE ENTRY REMOVAL
                    229 *
0054 I              230 PRCREM    EQU    *
0054 I 36           231           PSH A
0055 I 07           232           TPA               SAVE CURRENT CONDITION CODE
0056 I 0F           233           SEI               MASK INTERRUPTS
```

```
0057 I F7 010C D   234             STA B  REQSAV+1
005A I 33          235             PUL B
005B I F7 010B D   236             STA B  REQSAV
005E I 85 10       237             BIT A  #CCIRQ        INTERRUPTS MASKED ON ENTRY TO ROUTINE ?
0060 I 26 01       238             BNE    PRM1          YES, LEAVE MASKED
0062 I 0E          239             CLI                  UNMASK INTERRUPTS
0063 I 39          240 PRM1        RTS                  RETURN TO CALLER
                   241 *
                   242 *      ROUTINE TO ADD ENTRY TO BOTTOM OF QUEUE
                   243 *
0064 I             244 PRCABL      EQU    *
0064 I 8D CC       245             BSR    PRCADD
0066 I 3F          246             SWI
0067 I 00          247             FCB    FCABL
0068 I 39          248             RTS
                   249 *
                   250 *      ROUTINE TO ADD ENTRY TO TOP OF QUEUE
                   251 *
0069 I             252 PRCATL      EQU    *
0069 I 8D C7       253             BSR    PRCADD
006B I 3F          254             SWI
006C I 01          255             FCB    FCATL
006D I 39          256             RTS
                   257 *
                   258 *      ROUTINE TO REMOVE ENTRY FROM TOP OF QUEUE
                   259 *
006E I             260 PRCRTL      EQU    *
006E I 3F          261             SWI
006F I 03          262             FCB    FCRTL
0070 I 8D E2       263             BSR    PRCREM
0072 I 39          264             RTS
                   265 *
                   266 *      FLOPPY DISC ERROR MESSAGE SEQUENCE REQUEST BLOCKS
                   267 *
0073 I             268 RQBERI      EQU    *             CONTROLLER ERROR INPUT BLOCK
0073 I C0          269             FCB    LTPCMD+LTPRDRREAD ASCII & PROCEED
0074 I 00F0    A   270             FDB    240           BUFFER LENGTH
0076 I 0000    D   271             FDB    BFRFDE        BUFFER ADDRESS
                   272 *
0078 I             273 RQBERO      EQU    *             ECHO FLOPPY DISC ERROR MESSAGE
0078 I 80          274             FCB    LTPCMD        WRITE ASCII & PROCEED
0079 I 00F0    A   275             FDB    240
007B I 0000    D   276             FDB    BFRFDE
                   277 *
007D I             278 RQBSAV      EQU    *             SAVE COMMAND OUTPUT BLOCK
007D I 81          279             FCB    LTPCMD+LTPUFMWRITE ASCII & PROCEED
007E I 0011    A   280             FDB    17
0080 I 00F0    D   281             FDB    BFRSVC
                   282 *
0082 I             283 RQBSVA      EQU    *             SAVE COMMAND ACKNOWLEDGE INPUT BLOCK
0082 I C0          284             FCB    LTPCMD+LTPRDRREAD ASCII & PROCEED
0083 I 0002    A   285             FDB    2
0085 I 0109    D   286             FDB    BFRSVA
                   287 **
                   288 **     STORAGE REQUIREMENTS FOR 'LOGDVR'
                   289 **
0000 D             290             DSEC
                   291 *
```

```
                   292 *
                   293 *
0000 D             294 BFRFDE      RMB    240           FLOPPY DISC ERROR MESSAGE BUFFER
00F8 D             295 SCFLNM      EQU    *+8           SAVE COMMAND FILE NUMBER
00F0 D             296 BFRSVC      RMB    25            SAVE COMMAND MESSAGE BUFFER
0109 D             297 BFRSVA      RMB    2             SAVE COMMAND ACKNOWLEDGE BUFFER
                   298 *
010B D             299 REQSAV      RMB    2             REQUEST BLOCK ADDR SAVE AREA
                   300 *
                   301 *      LOG DRIVER CONTROL BLOCK
                   302 *
010D D 00          303 LGRICC      FCB    0             INITIAL CONDITION CODE SAVE AREA
```

```
010E D 00          304 LGRAVL    FCB    0          DISC AVAILABLE :  0 => AVAILABLE, -1 => NO
010F D 00          305 LGRSWD    FCB    0          STATUS WORD
0110 D 00          306 LGRCTR    FCB    0          CONTROL REGISTER SAVE AREA
0111 D 011F    D   307 LGRTHD    FDB    LRQLST     PNTR TO LOG REQUEST QUEUE
0113 D 0032    I   308 LGRCNT    FDB    LGFECT     READ CONTINUATOR ADDR
0115 D 0032    I   309 LGRWCT    FDB    LGWCNT     WRITE CONTINUATOR ADDR
0117 D 0000    A   310 LGRFRM    FDB    0          FORMATTER ADDR
0119 D 0000    A   311 LGRCRB    FDB    0          CURRENT REQUEST BLOCK ADDR
011B D 00          312 LGRTYP    FCB    0          REQUEST TYPE
011C D 00          313 LGRBLN    FCB    0          BUFFER LENGTH
011D D 0000    A   314 LGRBFR    FDB    0          BUFFER POINTER
                   315 *
                   316 *      CIRCULAR LIST REQUEST QUEUE
                   317 *
                   318 *
011F D             319 LRQLST    EQU    *          LOG REQUEST QUEUE
011F D 00          320 LRQMXS    FCB    0          TOTAL # REQUESTS POSSIBLE
0120 D 00          321 LRQSIU    FCB    0          NUMBER OF REQUESTS IN QUEUE
0121 D 00          322 LRQCTP    FCB    0          CURRENT TOP POINTER
0122 D 00          323 LRQNXB    FCB    0          NEXT BOTTOM POINTER
0123 D             324           RMB    LGRQMX+4*2
                   325 *
0167               326           END
LOGDVR(A0011 02.074AA  CRS LOG DEVICE DRIVER)          08/04/78  11:48:00  PAGE   7

   NO ERRORS
  ISECT LENGTH --    135
  DSECT LENGTH --    359

  ACIAC     8004 A    94
  ACIADR    8005 A    95
  ACIASS    8004 A    93
  ACK       0006 A   108
< BFRFDE    0000 D   294     17     271    276
< BFRSVA    0109 D   297     17     286
< BFRSVC    00F0 D   296     17     281
  CCIRQ     0010 A   115    222     237
  COUTRG    806F A   127
  CR        000D A   110
> CRCBFR    0002      43     43     217
  CRGPDR    0004 A   130
< CRGRIE    0080 A    77     37
< CRGXIE    0020 A    78     37
  CTLCMD    0002 A   149
  CTLDDR    0003 A   135
  CTLDTA    0000 A   150
  CTLRCP    0080 A   151
  CTLREG    8068 A   123
  CTLRST    0001 A   148
  DIODDR    00FF A   134
  DIOREG    8069 A   122
  DOTCRG    0005 A   141
  DOUTRG    806E A   126
  DSTBSY    0080 A   155
  DSTCMD    0010 A   158
  DSTFCH    0008 A   159
  DSTRCP    0040 A   156
  DSTWRT    0020 A   157
  ENQ       0005 A   107
  EOT       0004 A   106
  FCABL     0000 A    99    178     247
  FCATL     0001 A   100    255
  FCRBL     0002 A   101
  FCRTL     0003 A   102    181     262
  INTENB    003F A    89
  INTMSK    003E A    88
  LF        000A A   109
< LGCOMP    0032 I   201     14
< LGCONT    0032 I   195      8
< LGFECT    0032 I   198     11     308
  LGI1      0032 I   191    172
  LGI2      002D I   188    182
  LGI3      0018 I   179    187
< LGINIT    0000 I   167      7
```

```
< LGRAVL   010E D   304    24   171
< LGRBFR   011D D   314    22
< LGRBLN   011C D   313    21
< LGRCNT   0113 D   308    20
< LGRCRB   0119 D   311    21
< LGRCTR   0110 D   306    19
< LGRDCT   0032 I   197    10
< LGRDFM   0032 I   199    12
LOGDVR(A0011.02.074AA  CRS LOG DEVICE DRIVER)        08/04/78  11:48:01  PAGE   8

< LGRFRM   0117 D   310    20
< LGRICC   010D D   303    23   169   188
  LGRQMX   001E A   117   324
< LGRSWD   010F D   305    19   214
< LGRTHD   0111 D   307    19   176   179   213
< LGRTYP   011B D   312    21
< LGRWCT   0115 D   309    20
< LGWCNT   0032 I   196     9   309
< LGWFRM   0032 I   200    13
< LRQCTP   0121 D   322    28
< LRQLST   011F D   319    26   307
< LRQMXS   011F D   320    27
< LRQNXB   0122 D   323    28
< LRQSIU   0120 D   321    27
< LSWBSY   0080 A    53    30
< LSWFCH   0010 A    56    31
< LSWHLD   0020 A    55    30
< LSWRCP   0040 A    54    30   215
< LSWRQA   0008 A    57    31
< LTPASC   0000 A    66    34
< LTPBIN   0010 A    67    34
< LTPCMD   0080 A    61    33   269   274   279   284
< LTPFRM   0000 A    72    35
< LTPRCD   0000 A    69    34
< LTPRDR   0040 A    63    33   269   284
< LTPUFM   0001 A    73    35   279
< LTPWRT   0000 A    64    33
< LTPWTR   0008 A    70    35
  NAK      0015 A   111
> PIAKCR   0003      44    44
  PRAD1    0053 I   226   224
  PRCABL   0064 I   244
  PRCAD2   0045 I   218   216
  PRCADD   0032 I   208   245   253
  PRCATL   0069 I   252
  PRCREM   0054 I   230   263
  PRCRTL   006E I   260
  PRM1     0063 I   240   238
> PTRINI   0004      45    45   186
  RDICRG   003F A   139
  RDIPCR   0037 A   144
  RDIREG   806A A   124
  REQSAV   010B D   299   173   174   175   183   184   185   212   219   221   234   236
  RQBERI   0073 I   268
  RQBERO   0078 I   273
< RQBSAV   007D I   278    16
< RQBSVA   0082 I   283    16
> RTNABL   0005      47    47
> RTNATL   0006      47    47
> RTNRTL   0007      47    47
  SCFLNM   00F8 D   295
< SRGIRQ   0080 A    82    39
< SRGRRF   0001 A    84    39
< SRGXRE   0002 A    83    39
> TCPIDS   0001      42    42
> TCPIEN   0000      42    42
  WCICRG   002F A   140
  WCIREG   806B A   125
LOGDVR(A0011.02.074AA  CRS LOG DEVICE DRIVER)        08/04/78  11:48:01  PAGE   9

  WOTCRG   0005 A   142
LOGFRM(A0011.02.075AA CRS LOG FORMATTER)             08/04/78  11:50:44  PAGE   1

2 *
```

```
                *      CENTRAL RECORDING STATION LOG FORMATTER
                *
0000 I                 ISEC
                *
                       DEF     LOGFRM
                       DEF     LGOVTX
                       DEF     LOGOVL
                *
                       REF     CMDFAR,RTUADR
                       REF     CRCBFR
                       REF     SRCVBF,CSQBFR,SXMTBF
                       REF     STLBXT
                       REF     LGRTHD
                       REF     TAPDS1,TAPST1
                       REF     HXACVP,HXAVAL
                       REF     NDMXM3,NDMXM2,NDMXM1
                       REF     MVCSTR,MVCDST
                       REF     CALAM1,CALASM
                       REF     CALASD,CALAD1
                       REF     TODTYR,TODUYR
                       REF     TODTHR,TODUHR
                       REF     TODTMN,TODUMN
                       REF     TODTSC,TODUSC
                *
                       REF     IDXRTN,INX4
                       REF     BINDEC,HEXASC
                       REF     RTNRTL
                       REF     LGINIT
                       REF     MVCHAR
                       REF     TCVYRS,TCVDAY,DOYTMD
                *
                *      LOG BUFFER OFFSET EQUATES
                *
0000 A          LGBMNT EQU     0             MONTH OFFSET
0002 A          LGBSL1 EQU     2
0003 A          LGBDAY EQU     3             DAY OFFSET
0005 A          LGBSL2 EQU     5
0006 A          LGBYRD EQU     6             YEAR OFFSET
0009 A          LGBHRS EQU     9             HOUR OFFSET
000B A          LGBCL1 EQU     11
000C A          LGBMIN EQU     12            MINUTE OFFSET
000E A          LGBCL2 EQU     14
000F A          LGBSEC EQU     15            SECOND OFFSET
0012 A          LGBERC EQU     18            ERROR CODE
                *
                *      LOG LEVEL SELECT EQUATES
                *
0008 A          LOGFG1 EQU     8             LOG ERRORS
0010 A          LOGFG2 EQU     $10           LOG RTU COMMAND SEQUENCE
0020 A          LOGFG3 EQU     $20           LOG NORMAL TEST VALUES
                *
                *      LOG FORMAT CONTROL BLOCK TYPE FIELD EQUATES
                *
0001 A          FCTRTA EQU     1             RTU ADDR INCLUDED
0002 A          FCTIDT EQU     2             4 BYTE IDENTIFIER
0004 A          FCTVLN EQU     4             VARIABLE LENGTH DATA SOURCE STREAM
0008 A          FCTSSQ EQU     8             SATELLITE COMMAND BUFFER OUTPUT
LOGFRM(A0011.02.075AA CRS LOG FORMATTER)       08/04/78  11:50:45  PAGE   2

                *                            (PICK UP # PARAMETERS FROM STLBXT)
                *
                *      LOG BUFFER LENGTH EQUATES
                *
00C4 A          LGBFLN EQU     196           MAXIMUM LOG BUFFER LENGTH
0015 A          LGBFOV EQU     21            LOG REQUEST OVERFLOW BUFFER LENGTH
0032 A          PRMAXV EQU     50            MAX # PARAM TO CONVERT
                *
                *      COMMAND FORMATTER ADDRESS REGISTER LOG CONTROL BITS
                *
                *            BIT 5 => 1 = ENABLE NORMAL TEST VALUE LOGGING
                *            BIT 4 => 1 = ENABLE RTU COMMAND SEQUENCE LOGGING
                *
                *
                *      ROUTINE TO FORMAT LOG MESSAGES
```

```
                   *
                   *              CALLING SEQUENCE:  JSR  LOGFRM
                   *
                   *              CALLING PARAMETERS:  IDX => LOG CODE
                   *
                   *              LOG CODE EXPLANATIONS:
                   *
                   *                             E1 - NORMAL TEST FAILURE
                   *                                  LOG NORMAL TEST VALUES
                   *
                   *                             E2 - DATA TRANSMISSION ERROR
                   *                                  LOG ASK FOR PARITY PARAMETERS AND
                   *                                  RTU COMMAND SEQUENCE
                   *
                   *                             E3 - SPECIAL TRANSMISSION ERROR (ALL PARITY
                   *                                  PARAMETERS BAD)
                   *                                  LOG INFORMATION SAME AS CODE 'E2'
                   *
                   *                             E4 - AUTO FIRE MAXIMUM TIMEBREAK EXCEEDED
                   *                                  LOG TIME BREAK VALUE
                   *
                   *                             E5 - TAPE ERROR
                   *                                  LOG TAPE STATUS BITS
                   *
                   *                             E6 - SYSTEM ERROR
                   *                                  LOG SATELLITE COMMAND AND PARAMETERS
                   *
                   *                             E7 - SYSTEM ERROR - COMMAND FORMATTER
                   *                                  LOG RTU ADDRESS AND COMMAND
                   *
                   *                             E8 - SYSTEM ERROR - DATA PROCESSOR
                   *                                  LOG INFORMATION SAME AS CODE 'E6'
                   *
                   *                             L1 - MONITOR COMMAND SEQUENCE
                   *                                  LOG RTU COMMAND SEQUENCE
                   *
                   *                             L2 - MONITOR NORMAL TEST VALUES
                   *                                  LOG INFORMATION SAME AS CODE 'E2'
                   *
                   *
                   *       CIRCULAR LIST FUNCTION CODE EQUATES
                   *
0000 A             FCABL      EQU   0           ADD TO BOTTOM OF LIST
LOGFRM(A0011.02.075AA CRS LOG FORMATTER)          08/04/78  11:50:47  PAGE   3

0001 A             FCATL      EQU   1           ADD TO TOP OF LIST
0002 A             FCRBL      EQU   2           REMOVE FROM BOTTOM OF LIST
0003 A             FCRTL      EQU   3           REMOVE FROM TOP OF LSIT
                   *
0004 A             EOT        EQU   4
                   *
                   *
0000 I             LOGFRM     EQU   *
0000 I FF 0006 D              STX   LGCODE      SAVE SELECTED LOG CODE
0003 I 86 08                  LDA A #LOGFG1     ANTICIPATE ERROR LOG REQUEST
0005 I B5 0000 R              BIT A CMDFAR      LOGGING ENABLED ?
0008 I 27 64                  BEQ   LOGX        NO-RETURN TO CALLER
000A I C6 45                  LDA B #'E
000C I F1 0006 D              CMP B LGCODE      ERROR LOG ?
000F I 27 0E                  BEQ   LOGFA       YES, CHECK IF VALID LOG STATE
0011 I 48                     ASL A
0012 I C6 31                  LDA B #'1         ANTICIPATE LEVEL 1 LOG REQUEST
0014 I F1 0007 D              CMP B LGCODE+1    LEVEL 1 LOG ?
0017 I 27 01                  BEQ   LOGF        YES, CHECK IF VALID LOG STATE
0019 I 48                     ASL A             SETUP FOR LEVEL 2 CHECK
001A I B5 0000 R   LOGF       BIT A CMDFAR      VALID LOG STATE ?
001D I 27 4F                  BEQ   LOGX        NO, RETURN TO CALLER
001F I CE 01D1 I   LOGFA      LDX   #ELGFRM     ANTICIPATE ERROR LOG
0022 I B6 0006 D              LDA A LGCODE
0025 I 81 45                  CMP A #'E
0027 I 27 03                  BEQ   LOG4        ERROR LOG REQUEST ?
0029 I CE 01E1 I              LDX   #L12FRM     SELECT PROPER LOG FORMAT CONTROL TABLE
002C I FF 000A D   LOG4       STX   FRMADR
002F I B6 0007 D              LDA A LGCODE+1
```

```
0032 I 84 0F             AND A  #$F
0034 I 4A                DEC A
0035 I 48                ASL A
0036 I CE 000A D         LDX    #FRMADR
0039 I BD 001D R         JSR    IDXRTN      POSITION PNTR TO PROPER LOG FORMAT CONTROLT
003C I EE 00             LDX    0,X
003E I EE 00             LDX    0,X
0040 I FF 000A D         STX    FRMADR      SAVE FORMAT CONTROL TABLE PNTR
0043 I CE 0002 R   LOGI  LDX    #CRCBFR
0046 I 3F                SWI                ANY EMPTY REQUEST BLOCKS ON QUEUE
0047 I 03                FCB    FCRTL
0048 I 28 25             BVC    LOG1        YES, FORMAT MESSAGE
004A I FE 0007 R         LDX    LGRTHD
004D I A6 01             LDA A  1,X
004F I A1 00             CMP A  0,X         REQUEST QUEUE FULL ?
0051 I 27 1B             BEQ    LOGX        RETURN TO CALLER
0053 I CE 4F56 A         LDX    #$4F56
0056 I FF 0006 D         STX    LGCODE      SET OVERFLOW LOG FORMAT CODE
0059 I CE 0015 A         LDX    #LGBFOV
005C I FF 0002 D         STX    LGBFRL
005F I CE 000C D         LDX    #LGOVMG
0062 I FF 0004 D         STX    LOGBFR
0065 I BD 0158 I         JSR    TODFR2      INCLUDE TIME AND DATE IN LOG BUFFER
0068 I CE 024F I         LDX    #LOGOVL
006B I BD 0022 R         JSR    LGINIT      INITIATE REQUEST
006E I 39          LOGX  RTS                RETURN TO CALLER
006F I B7 0008 D   LOG1  STA A  LGRQBK
0072 I F7 0009 D         STA B  LGRQBK+1    SET REQUEST BLOCK ADDR
0075 I CE 00C4 A         LDX    #LGBFLN
LOGFRM(A0011.02.075AA CRS LOG FORMATTER)     08/04/78  11:50:48  PAGE   4

0078 I FF 0002 D         STX    LGBFRL
007B I FE 0008 D         LDX    LGRQBK
007E I EE 03             LDX    3,X
0080 I FF 0004 D         STX    LOGBFR
0083 I BD 0158 I         JSR    TODFRM      INCLUDE TIME AND DATE IN LOG BUFFER
0086 I CE 0004 D         LDX    #LOGBFR
0089 I 86 16             LDA A  #22
008B I BD 001D R         JSR    IDXRTN      SET CONVERSION SAVE AREA POINTER
008E I EE 00             LDX    0,X
0090 I FF 000A R         STX    HXACVP
0093 I FE 000A D         LDX    FRMADR
0096 I A6 00             LDA A  0,X         PICK UP FORMAT CONTROL BLOCK TYPE INDICATO
0098 I 08                INX
0099 I FF 000A D         STX    FRMADR      UPDATE FORMAT CONTROL BLOCK PNTR
009C I 85 01             BIT A  #FCTRTA     RTU ADDRESS REQUIRED IN LOG BUFFER
009E I 27 25             BEQ    LOG6        NO, CONTINUE
00A0 I 36                PSH A              SAVE TYPE FLAGS
00A1 I 86 83             LDA A  #$83
00A3 I CE 0001 R         LDX    #RTUADR
00A6 I BD 001F R         JSR    BINDEC      CONVERT RTU NUMBER TO DECIMAL
00A9 I FE 0004 D         LDX    LOGBFR
00AC I B6 000C R         LDA A  NDMXM3
00AF I F6 000D R         LDA B  NDMXM2
00B2 I A7 00             STA A  0,X
00B4 I E7 01             STA B  1,X
00B6 I B6 000E R         LDA A  NDMXM1      MOVE RTU NUMBER
00B9 I A7 02             STA A  2,X         INTO MESSAGE BUFFER
00BB I BD 001E R         JSR    INX4
00BE I FF 0004 D         STX    LOGBFR      INCR BUFFER PNTR
00C1 I FF 000A R         STX    HXACVP      PAST RTU NUMBER
00C4 I 32                PUL A              RESTORE FORMAT TYPE FLAGS
00C5 I 85 02       LOG6  BIT A  #FCTIDT     4 BYTE IDENTIFIER REQUIRED ?
00C7 I 27 20             BEQ    LOG7        NO, CONTINUE
00C9 I 36                PSH A              SAVE TYPE FLAGS
00CA I FE 000A D         LDX    FRMADR
00CD I FF 000F R         STX    MVCSTR
00D0 I FE 000A R         LDX    HXACVP
00D3 I FF 0010 R         STX    MVCDST
00D6 I 86 04             LDA A  #4
00D8 I BD 0023 R         JSR    MVCHAR      MOVE 4 BYTE IDENTIFIER INTO BUFFER
00DB I FE 0010 R         LDX    MVCDST
00DE I 08                INX
```

```
00DF I FF 000A R   218            STX     HXACVP       UPDATE BUFFER PNTR
00E2 I FE 000F R   219            LDX     MVCSTR
00E5 I FF 000A D   220            STX     FRMADR       UPDATE FORMAT CONTROL BLOCK PNTR
00E8 I 32          221            PUL A
00E9 I FE 000A D   222 LOG7       LDX     FRMADR
00EC I EE 00       223            LDX     0,X          PICK UP PNTR TO LOG DATA SOURCE STREAM
00EE I 85 04       224            BIT A   #FCTVLN      VARIABLE LENGTH ?
00F0 I 27 03       225            BEQ     LOG8         NO
00F2 I E6 00       226            LDA B   0,X          PICK UP # PARAMS TO CONVERT
00F4 I 08          227            INX
00F5 I FF 000B R   228 LOG8       STX     HXAVAL       SAVE PNTR TO VALUE TO CONVERT
00F8 I FE 000A D   229 LOGC       LDX     FRMADR
00FB I 08          230            INX
00FC I 08          231            INX
00FD I FF 000A D   232            STX     FRMADR       UPDATE CONTROL BLOCK PNTR
0100 I 85 04       233            BIT A   #FCTVLN      VARIABLE LENGTH ?
LOGFRM(A0011.02.075AA CRS LOG FORMATTER)                 08/04/78  11:50:50  PAGE   5

0102 I 26 0D       234            BNE     LOG9
0104 I E6 00       235            LDA B   0,X          PICK UP # PARAMS TO CONVERT
0106 I 85 08       236            BIT A   #FCTSSQ      SATELLITE CMND SEQUENCE OUTPUT ?
0108 I 27 03       237            BEQ     LOGD         NO
010A I F6 0006 R   238            LDA B   STLBXT       PICK UP # PARAMS TO CONVERT
010D I C1 FF       239 LOGD       CMP B   #-1          END-OF-PATTERN ?
010F I 27 25       240            BEQ     LOGA         YES, QUEUE REQUEST
0111 I 84 F3       241 LOG9       AND A   #-1-FCTVLN-FCTSSQ
0113 I 5D          242            TST B                ANY PARAMS TO CONVERT
0114 I 27 E2       243            BEQ     LOGC         NO
0116 I C1 32       244            CMP B   #PRMAXV      MAX PARAMS TO CONVERT EXCEDDED
0118 I 23 02       245            BLS     LOG9A        NO
011A I C6 32       246            LDA B   #PRMAXV      SET # PARAMS TO CONVERT TO MAX VALUE
011C I 36          247 LOG9A      PSH A                SAVE TYPE FLAGS
011D I A6 01       248            LDA A   1,X          PICK UP # BYTES TO CONVERT/ PARAMETER
011F I 37          249 LOGB       PSH B                SAVE # PARAMS TO CONVERT
0120 I 36          250            PSH A                SAVE # BYTES TO CONVERT
0121 I FE 000B R   251            LDX     HXAVAL       LOAD PNTR TO VALUE TO CONVERT
0124 I BD 0020 R   252            JSR     HEXASC       CONVERT PARAM
0127 I FE 000A R   253            LDX     HXACVP
012A I 08          254            INX
012B I FF 000A R   255            STX     HXACVP       UPDATE CONVERSION AREA PNTR
012E I 32          256            PUL A
012F I 33          257            PUL B
0130 I 5A          258            DEC B                ALL PARAMS OF THIS TYPE CONVERTED
0131 I 2E EC       259            BGT     LOGB         NO,CONTINUE CONV
0133 I 32          260            PUL A                RESTORE TYPE FLAGS
0134 I 20 C2       261            BRA     LOGC         PROCESS REMAINDER OF THIS BUFFER FORMAT COT
0136 I FE 000A R   262 LOGA       LDX     HXACVP
0139 I 86 0D       263            LDA A   #$D
013B I A7 00       264            STA A   0,X          PLACE C/R IN BUFFER
013D I 86 04       265            LDA A   #EOT         END-OF-MESG
013F I A7 01       266            STA A   $1,X
0141 I FE 0008 D   267            LDX     LGRQBK
0144 I BD 0022 R   268            JSR     LGINIT       INITIATE REQUEST
0147 I FE 000A D   269            LDX     FRMADR
014A I 08          270            INX
014B I FF 000A D   271            STX     FRMADR       UPDATE FORMAT CONTROL BLOCK PNTR
014E I A6 00       272            LDA A   0,X
0150 I 81 FF       273            CMP A   #-1          END-OF-LOG ?
0152 I 27 03       274            BEQ     LOGA1
0154 I 7E 0043 I   275            JMP     LOGI
0157 I 39          276 LOGA1      RTS                  RETURN
                   277 *
                   278 *      ROUTINE TO FORMAT HEADER SECTION OF LOG MESSAGE
                   279 *
0158 I             280 TODFRM     EQU     *
0158 I             281 TODFR2     EQU     *
0158 I FF 0000 D   282            STX     LGBFSV
015B I C6 20       283 TOD1       LDA B   #'
015D I FE 0000 D   284            LDX     LGBFSV
0160 I E7 00       285            STA B   0,X          BLANK OUT LOG MESSAGE BUFFER
0162 I 08          286            INX
0163 I FF 0000 D   287            STX     LGBFSV
0166 I FE 0002 D   288            LDX     LGBFRL
0169 I 09          289            DEX
```

```
 016A I FF 0002 D   290           STX   LGBFRL
 016D I 26 EC       291           BNE   TOD1
LOGFRM(A0011.02.075AA CRS LOG FORMATTER)                     08/04/78  11:50:51  PAGE   6

 016F I FE 0000 D   292           LDX   LGBFSV
 0172 I BD 0024 R   293           JSR   TCVYRS
 0175 I BD 0025 R   294           JSR   TCVDAY
 0178 I BD 0026 R   295           JSR   DOYTMD       CONVERT DAY-OF-YR TO MONTH AND DAY
 017B I FE 0004 D   296           LDX   LOGBFR
 017E I 86 2F       297           LDA A  #'/
 0180 I A7 02       298           STA A  LGBSL1,X     SET SEPARATORS
 0182 I A7 05       299           STA A  LGBSL2,X     IN DATE FIELD
 0184 I 86 3A       300           LDA A  #':
 0186 I A7 0B       301           STA A  LGBCL1,X     SET SEPARATORS IN
 0188 I A7 0E       302           STA A  LGBCL2,X     TIME FIELD
 018A I F6 0011 R   303           LDA B  CALAM1
 018D I B6 0012 R   304           LDA A  CALASM
 0190 I A7 00       305           STA A  LGBMNT,X     MOVE MONTH
 0192 I E7 01       306           STA B  LGBMNT+1,X   INTO LOG BUFFER
 0194 I B6 0013 R   307           LDA A  CALASD
 0197 I F6 0014 R   308           LDA B  CALAD1
 019A I A7 03       309           STA A  LGBDAY,X     MOVE DAY
 019C I E7 04       310           STA B  LGBDAY+1,X   INTO LOG BUFFER
 019E I B6 0015 R   311           LDA A  TODTYR
 01A1 I F6 0016 R   312           LDA B  TODUYR
 01A4 I A7 06       313           STA A  LGBYRD,X     MOVE YEAR
 01A6 I E7 07       314           STA B  LGBYRD+1,X   INTO LOG BUFFER
 01A8 I B6 0017 R   315           LDA A  TODTHR
 01AB I F6 0018 R   316           LDA B  TODUHR
 01AE I A7 09       317           STA A  LGBHRS,X     MOVE HOUR
 01B0 I E7 0A       318           STA B  LGBHRS+1,X   INTO LOG BUFFER
 01B2 I B6 0019 R   319           LDA A  TODTMN
 01B5 I F6 001A R   320           LDA B  TODUMN
 01B8 I A7 0C       321           STA A  LGBMIN,X     MOVE MINUTES
 01BA I E7 0D       322           STA B  LGBMIN+1,X   INTO LOG BUFFER
 01BC I B6 001B R   323           LDA A  TODTSC
 01BF I F6 001C R   324           LDA B  TODUSC
 01C2 I A7 0F       325           STA A  LGBSEC,X     MOVE SECONDS
 01C4 I E7 10       326           STA B  LGBSEC+1,X   INTO LOG BUFFER
 01C6 I B6 0006 D   327           LDA A  LGCODE
 01C9 I F6 0007 D   328           LDA B  LGCODE+1
 01CC I A7 12       329           STA A  LGBERC,X     MOVE ERROR CODE
 01CE I E7 13       330           STA B  LGBERC+1,X   INTO LOG BUFFER
 01D0 I 39          331           RTS                RETURN TO CALLER
                    332 *
                    333 *      LOG FORMAT CONTROL TABLE AREA DEFINITION
                    334 *
                    335 *           BYTE              FIELD DEFINITION
                    336 *
                    337 *           0                 FORMAT TYPE
                    338 *           1-4               IDENTIFIER IF SPECIFIED
                    339 *           5-6               LOG DATA
                    340 *           7                 # PARAMETERS TO CONVERT (FF => END-OF-PATTER
                    341 *           8                 # BYTES/PARAMETER (FF => END-OF-LOG)
                    342 *
                    343 **
                    344 **     LOG FORMAT CONTROL TABLE DIRECTORIES
                    345 **
                    346 *
                    347 *      ERROR LOG FORMAT CONTROL
                    348 *
 01D1 I             349 ELGFRM    EQU    *
LOGFRM(A0011.02.075AA CRS LOG FORMATTER)                     08/04/78  11:50:52  PAGE   7

 01D1 I 01E5     I  350           FDB   FRMNTD       E1 - NORMAL TEST FAILURE
 01D3 I 01EC     I  351           FDB   FRMXMT       E2 - DATA TRANSMISSION ERROR
 01D5 I 01EC     I  352           FDB   FRMXMT       E3 - DATA TRANSMISSION ERROR
 01D7 I 0205     I  353           FDB   FRMTBK       E4 - AUTO FIRE TIME BREAK ERROR
 01D9 I 0210     I  354           FDB   FRMTPE       E5 - TAPE ERROR
 01DB I 0225     I  355           FDB   FRMSYR       E6 - SYSTEM ERROR
 01DD I 0230     I  356           FDB   FRMCFR       E7 - SYSTEM ERROR - COMMAND FORMATTER
 01DF I 0244     I  357           FDB   FRMDPR       E8 - SYSTEM ERROR - DATA PROCESSOR
                    358 *
                    359 *      LEVEL 1 & 2 CONTROL
```

```
                    360 *
01E1 I              361 L12FRM    EQU    *
01E1 I 0239    I    362           FDB    FRMCSQ        L1 - MONITOR COMMAND SECUENCES
01E3 I 01E5    I    363           FDB    FRMNTD        L2 - MONITOR NORMAL TEST VALUES
                    364 *
                    365 *     FORMAT CONTROL TABLES
                    366 *
01E5 I              367 FRMNTD    EQU    *             E1 FORMAT CONTROL TABLE
01E5 I 01           368           FCB    FCTRTA
01E6 I 0003    R    369           FDB    SRCVBF
01E8 I 18           370           FCB    24,3          8 WORDS : 3 BYTES/WORD
01E9 I 03
01EA I FF           371           FCB    $FF,$FF       END-OF-LOG
01EB I FF
                    372 *
01EC I              373 FRMXMT    EQU    *             E2-E3 FORMAT CONTROL TABLE
01EC I 03           374           FCB    FCTRTA+FCTIDT
01ED I 505345       375           FCC    /PSEQ/
01F1 I 0003    R    376           FDB    SRCVBF
01F3 I 06           377           FCB    6,1           6 WORDS : 1 BYTE/WORD
01F4 I 01
01F5 I 01           378           FCB    1,2           1 WORD : 2 BYTES/WORD
01F6 I 02
01F7 I 04           379           FCB    4,1           4 WORDS : 1 BYTE/WORD
01F8 I 01
01F9 I FF           380           FCB    $FF           END-OF-BUFFER
01FA I 07           381           FCB    FCTRTA+FCTIDT+FCTVLN
01FB I 435345       382           FCC    /CSEQ/
01FF I 0004    R    383           FDB    CSQBFR
0201 I 00           384           FCB    0,1           VARIABLE # WORDS : 1 BYTE/WORD
0202 I 01
0203 I FF           385           FCB    $FF,$FF       END-OF-LOG
0204 I FF
                    386 *
0205 I              387 FRMTBK    EQU    *             E4 FORMAT CONTROL TABLE
0205 I 03           388           FCB    FCTRTA+FCTIDT
0206 I 544252       389           FCC    /TBRK/
020A I 0003    R    390           FDB    SRCVBF
020C I 01           391           FCB    1,1           1 WORD : 1 BYTE/WORD
020D I 01
020E I FF           392           FCB    $FF,$FF       END-OF-LOG
020F I FF
                    393 *
0210 I              394 FRMTPE    EQU    *             E5 FORMAT CONTROL TABLE
0210 I 02           395           FCB    FCTIDT
0211 I 444556       396           FCC    /DEVS/
0215 I 0008    R    397           FDB    TAPDS1
0217 I 02           398           FCB    2,1           2 WORDS : 1 BYTES/WORD
LOGFRM(A0011.02.075AA CRS LOG FORMATTER)                08/04/78  11:50:54  PAGE   8

0218 I 01
0219 I FF           399           FCB    $FF           END-OF-MESSAGE
021A I 02           400           FCB    FCTIDT
021B I 535441       401           FCC    /STAT/
021F I 0009    R    402           FDB    TAPST1
0221 I 02           403           FCB    2,1           2 WORDS : 1 BYTE/WORD
0222 I 01
0223 I FF           404           FCB    $FF,$FF       END-OF-LOG
0224 I FF
                    405 *
0225 I              406 FRMSYR    EQU    *             E6 FORMAT CONTROL TABLE
0225 I 0A           407           FCB    FCTIDT+FCTSSQ
0226 I 535945       408           FCC    /SYER/
022A I 0005    R    409           FDB    SXMTBF
022C I 00           410           FCB    0,1           VARIABLE WORDS : 1 BYTE/WORD
022D I 01
022E I FF           411           FCB    $FF,$FF
022F I FF
                    412 *
0230 I              413 FRMCFR    EQU    *             E7 FORMAT CONTROL TABLE
0230 I 03           414           FCB    FCTIDT+FCTRTA
0231 I 434645       415           FCC    /CFER/
0235 I 0000    A    416           FDB    0
0237 I FF           417           FCB    $FF,$FF       END-OF-LOG
```

```
0238 I FF
0239 I              418 FRMCSQ    EQU    *              L1 FORMAT CONTROL TABLE
0239 I 07           419           FCB    FCTRTA+FCTIDT+FCTVLN
023A I 435345       420           FCC    /CSEQ/
023E I 0004     R   421           FDB    CSQBFR
0240 I 00           422           FCB    0,1            VARIABLE # WORDS : 1 BYTE/WORD
0241 I 01
0242 I FF           423           FCB    $FF,$FF        END-OF-LOG
0243 I FF
                    424 *
0244 I              425 FRMDPR    EQU    *              E8 FORMAT CONTROL TABLE
0244 I 0A           426           FCB    FCTIDT+FCTSSQ
0245 I 445045       427           FCC    /DPER/
0249 I 0005     R   428           FDB    SXMTBF
024B I 00           429           FCB    0,1            VARIABLE WORDS : 1 BYTE PER WORD
024C I 01
024D I FF           430           FCB    $FF,$FF
024E I FF
                    431 *
                    432 *      FORMATTER REQUEST BLOCK OVERFLOW
                    433 *
024F I              434 LOGOVL    EQU    *
024F I 80           435           FCB    $80            WRITE,ASCII,PROCEED
0250 I 002A     A   436           FDB    LGBFOV+21      BUFFER LENGTH
0252 I 000C     D   437           FDB    LGOVMG
                    438 *
                    439 *      STORAGE REQUIREMENTS FOR 'LOGFRM'
                    440 *
0000 D              441           DSEC
                    442 *
0000 D 0000     A   443 LGBFSV    FDB    0
0002 D 0000     A   444 LGBFRL    FDB    0              BUFFER LENGTH
0004 D 0000     A   445 LOGBFR    FDB    0              LOG MESSAGE ADDRESS
0006 D 0000     A   446 LGCODE    FDB    0              LOG REQUEST CODE
LOGFRM(A0011.02.075AA CRS LOG FORMATTER)                  08/04/78  11:50:55  PAGE   9

0008 D 0000     A   447 LGRQBK    FDB    0              LOG REQUEST BLOCK
000A D 0000     A   448 FRMADR    FDB    0              LOG FORMAT CONTROL BLOCK ADDR
                    449 *
                    450 *      LOG REQUEST OVERFLOW ERROR MESSAGE BUFFER
                    451 *
000C D              452 LGOVMG    EQU    *
000C D              453           RMB    21
0021 D 455252       454 LGOVTX    FCC    /ERROR LOG OVERFLOW/
0033 D 0D           455           FCB    $D,4
0034 D 04
                    456 *
0035                457           END
LOGFRM(A0011.02.075AA CRS LOG FORMATTER)                  08/04/78  11:50:55  PAGE  10

  NO ERRORS
 ISECT LENGTH --   596
 DSECT LENGTH --    53

> BINDEC    001F     28    28   195
> CALAD1    0014     21    21   308
> CALAM1    0011     20    20   303
> CALASD    0013     21    21   307
> CALASM    0012     20    20   304
> CMDFAR    0000     11    11   128   138
> CRCBFR    0002     12    12   155
> CSQBFR    0004     13    13   383   421
> DOYTMD    0026     32    32   295
  ELGFRM    01D1 I  349   140
  EOT       0004 A  122   265
  FCABL     0000 A  117
  FCATL     0001 A  118
  FCRBL     0002 A  119
  FCRTL     0003 A  120   157
  FCTIDT    0002 A   57   207   374   381   388   395   400   407   414   419   426
  FCTRTA    0001 A   56   190   368   374   381   388   414   419
  FCTSSQ    0008 A   59   236   241   407   426
  FCTVLN    0004 A   58   224   233   241   381   419
  FRMADR    000A D  448   145   150   154   186   189   210   220   222   229   232   269   271
```

```
  FRMCFR    0230 I   413    356
  FRMCSQ    0239 I   418    362
  FRMDPR    0244 I   425    357
  FRMNTD    01E5 I   367    350    363
  FRMSYR    0225 I   406    355
  FRMTBK    0205 I   387    353
  FRMTPE    0210 I   394    354
  FRMXMT    01EC I   373    351    352
> HEXASC    0020      28     28    252
> HXACVP    000A      17     17    185    205    212    218    253    255    262
> HXAVAL    000B      17     17    228    251
> IDXRTN    001D      27     27    151    183
> INX4      001E      27     27    203
  L12FRM    01E1 I   361    144
  LGBCL1    000B A    42    301
  LGBCL2    000E A    44    302
  LGBDAY    0003 A    38    309    310
  LGBERC    0012 A    46    329    330
  LGBFLN    00C4 A    64    175
  LGBFOV    0015 A    65    165    436
  LGBFRL    0002 D   444    166    176    288    290
  LGBFSV    0000 D   443    282    284    287    292
  LGBHRS    0009 A    41    317    318
  LGBMIN    000C A    43    321    322
  LGBMNT    0000 A    36    305    306
  LGBSEC    000F A    45    325    326
  LGBSL1    0002 A    37    298
  LGBSL2    0005 A    39    299
  LGBYRD    0006 A    40    313    314
  LGCODE    0006 D   446    126    131    135    141    146    164    327    328
> LGINIT    0022      30     30    171    268
  LGOVMG    000C D   452    167    437
< LGOVTX    0021 D   454      8
LOGFRM(A0011.02.075AA CRS LOG FORMATTER)                 08/04/78  11:50:56  PAGE  11

  LGRQBK    0008 D   447    173    174    177    267
> LGRTHD    0007      15     15    159
  LOG1      006F I   173    158
  LOG4      002C I   145    143
  LOG6      00C5 I   207    191
  LOG7      00E9 I   222    208
  LOG8      00F5 I   228    225
  LOG9      0111 I   241    234
  LOG9A     011C I   247    245
  LOGA      0136 I   262    240
  LOGA1     0157 I   276    274
  LOGB      011F I   249    259
  LOGBFR    0004 D   445    168    179    181    196    204    296
  LOGC      00F8 I   229    243    261
  LOGD      010D I   239    237
  LOGF      001A I   138    136
  LOGFA     001F I   140    132
  LOGFG1    0008 A    50    127
  LOGFG2    0010 A    51
  LOGFG3    0020 A    52
< LOGFRM    0000 I   125      7
  LOGI      0043 I   155    275
< LOGOVL    024F I   434      9    170
  LOGX      006E I   172    129    139    162
> MVCDST    0010      19     19    213    216
> MVCHAR    0023      31     31    215
> MVCSTR    000F      19     19    211    219
> NDMXM1    000E      18     18    201
> NDMXM2    000D      18     18    198
> NDMXM3    000C      18     18    197
  PRMAXV    0032 A    66    244    246
> RTNRTL    0021      29     29
> RTUADR    0001      11     11    194
> SRCVBF    0003      13     13    369    376    390
> STLBXT    0006      14     14    238
> SXMTBF    0005      13     13    409    428
> TAPDS1    0008      16     16    397
> TAPST1    0009      16     16    402
> TCVDAY    0025      32     32    294
```

```
> TCVYRS     0024      32      32     293
  TOD1       015B I   283     291
  TODFR2     0158 I   281     169
  TODFRM     0158 I   280     180
> TODTHR     0017      23      23     315
> TODTMN     0019      24      24     319
> TODTSC     001B      25      25     323
> TODTYR     0015      22      22     311
> TODUHR     0018      23      23     316
> TODUMN     001A      24      24     320
> TODUSC     001C      25      25     324
> TODUYR     0016      22      22     312
ENDLOG(A0011.02.076AA CRS END-OF-LOG ROUTINE)          08/04/78  11:52:21  PAGE   1

                        2 *
                        3 *      CRS END-OF-LOG ROUTINE
                        4 *
 0000 I                 5           ISEC
                        6 *
                        7           DEF    ENDLOG
                        8 *
                        9           REF    PTRAVL
                       10           REF    EXECTV
                       11 *
                       12 *
 0001 A                13 CMDRST    EQU    1           CONTROLLER RESET CMND
                       14 *
 8060 A                15 COPTRG    EQU    $8060       CMND OUTPUT REG
 8061 A                16 DOPTRG    EQU    $8061       DATA OUTPUT REGISTER
                       17 *
 0000 I                18 ENDLOG    EQU    *
 0000 I 86 01          19           LDA A  #CMDRST
 0002 I B7 8060 A      20           STA A  COPTRG      OUTPUT RESET CMND
 0005 I CE 000A A      21           LDX    #10
 0008 I 09             22 ENDL1     DEX
 0009 I 26 FD          23           BNE    ENDL1       DELAY FOR RESET
 000B I 7F 8060 A      24           CLR    COPTRG      REMOVE RESET PULSE
 000E I 7F 0000 R      25           CLR    PTRAVL      ANTICIPATE PRINTER AVAILABLE
 0011 I B6 8060 A      26           LDA A  COPTRG      CONTROLLER RESET COMPLETE
 0014 I 2B 03          27           BMI    ENDL2       YES
 0016 I 7A 0000 R      28           DEC    PTRAVL      NO, PRINTER NOT AVAILABLE
 0019 I 7E 0001 R      29 ENDL2     JMP    EXECTV
                       30 *
 001C                  31           END
ENDLOG(A0011.02.076AA CRS END-OF-LOG ROUTINE)          08/04/78  11:52:22  PAGE   2

   NO ERRORS
 ISECT LENGTH --     28
 DSECT LENGTH --     0

 CMDRST     0001 A    13     19
 COPTRG     8060 A    15     20     24     26
 DOPTRG     8061 A    16
 ENDL1      0008 I    22     23
 ENDL2      0019 I    29     27
< ENDLOG    0000 I    18      7
> EXECTV    0001      10     10     29
> PTRAVL    0000       9      9     25     28
PRTDVR(A0011.02.080AA  CRS PRINTER - LOGGER DRIVER)    08/04/78  11:49:18  PAGE   1

                        2 *
                        3 *      CENTRAL RECORDING STATION PRINTER DRIVER
                        4 *
 0000 I                 5           ISEC
                        6 *
                        7           DEF    PRTDVR
                        8           DEF    PTRINI
                        9           DEF    PRTBSY,PRTACK
                       10           DEF    PRTCMP
                       11           DEF    PRTCNT
                       12 *
                       13           DEF    PTRSWD
                       14           DEF    PTRQTH
                       15           DEF    PTRAVL
```

```
                   *
                          DEF    PTRCTL
                   *
                          REF    CRCBFR
                          REF    LOGOVL
                   *
                   **
                   **     PRINTER PIA REGISTERS
                   **
8061 A             DOPTRG  EQU    $8061        DATA OUTPUT REGISTER (SIDE B)
8063 A             DOPCRG  EQU    $8063        ACKNOWLEDGE INDICATOR (CB2)
                   *
8060 A             COPTRG  EQU    $8060        COMMAND OUTPUT REGISTER (SIDE A)
8062 A             COPCRG  EQU    $8062        BUSY INDICATOR (CA2)
                   *
                   *      DATA OUTPUT REGISTER EQUATS
                   *
0080 A             DTASTB  EQU    $80          DTA STROBE
                   *
                   *      COMMAND OUTPUT REGISTER EQUATES
                   *
0080 A             CMDBSY  EQU    $80          BUSY STATUS
0004 A             CMDFD   EQU    4            FEED
0002 A             CMDPRT  EQU    2            PRINT
0001 A             CMDRST  EQU    1            RESET
                   *
                   *      CONTROL CHARACTER EQUATES
                   *
0004 A             EOT     EQU    4
000A A             LF      EQU    $A
000D A             CR      EQU    $D
                   *
                   *      INTERFACE BUFFER SIZE
                   *
0014 A             IBFMAX  EQU    20
                   *
                   *      PRINTER STATUS WORD EAUATES
                   *
0080 A             PSTRQB  EQU    $80          REQUEST BUSY
0040 A             PSTRCP  EQU    $40          REQUEST COMPLETE
0020 A             PSTFCH  EQU    $20          FIRST CHARACTER
0010 A             PSTBFL  EQU    $10          INTERFACE BUFFER FULL
                   *
                   *      MAXIMUM NUMBER OF LOG REQUESTS
PRTDVR(A0011.02.080AA  CRS PRINTER - LOGGER DRIVER)    08/04/78  11:49:20  PAGE   2

                   *
001E A             LGRQMX  EQU    30
                   *
                   *      CIRCULAR LIST FUNCTION CODE EQUATES
                   *
0000 A             FCABL   EQU    0            ADD TO BOTTOM OF LIST
0001 A             FCATL   EQU    1            ADD TO TOP OF LIST
0002 A             FCRBL   EQU    2            REMOVE FROM BOTTOM OF LIST
0003 A             FCRTL   EQU    3            REMOVE FROM TOP OF LIST
                   *
                   *      PRINTER LOG REQUEST INITIALIZATION
                   *
                   *          CALLING SEQUENCE:  JSR  PTRINI
                   *
                   *          REGISTER CONTENTS:  IDX => REQUEST BLOCK ADDRESS
                   *
0000 I             PRTDVR  EQU    *
0000 I             PTRINI  EQU    *
0000 I 07                  TPA
0001 I B7 0000 D           STA A  PTRICC       SAVE CONDITION CODES
0004 I 01                  NOP
0005 I 0F                  SEI                 MASK INTERRUPTS
0006 I FF 000F D           STX    REQSAV       SAVE REQUEST BLOCK ADDR
0009 I 7D 0001 D           TST    PTRAVL       PRINTER AVAILABLE ?
000C I 27 24               BEQ    PTR1         YES, CONTINUE
000E I B6 000F D           LDA A  REQSAV       SAVE REQUEST BLOCK ADDR
0011 I F6 0010 D           LDA B  REQSAV+1
0014 I 20 10               BRA    PTR3         ADD REQUEST TO EMPTY QUEUE
```

```
0016 I FE 0003 D    88 PTR2     LDX    PTRQTH      PICK UP REQUEST ADDR
0019 I 3F           89 PTR4     SWI
001A I 03           90          FCB    FCRTL       REMOVE REQUEST FROM QUEUE
001B I 29 1D        91          BVS    PTRX
001D I B7 000F D    92          STA A  REQSAV
0020 I F7 0010 D    93          STA B  REQSAV+1
0023 I FE 000F D    94          LDX    REQSAV
0026 I 8C 0001 R    95 PTR3     CPX    #LOGOVL     LOG OVERFLOW MESSAGE ?
0029 I 27 EB        96          BEQ    PTR2        YES, DON'T ADD TO EMPTY QUEUE
002B I CE 0000 R    97          LDX    #CRCBFR
002E I 3F           98          SWI
002F I 00           99          FCB    FCABL       ADD TO MEPTY QUEUE
0030 I 20 E7        100         BRA    PTR4        CONTINUE UNTIL ALL REQUESTS REMOVED
0032 I F6 0002 D    101 PTR1    LDA B  PTRSWD      PRINTER BUSY ?
0035 I 2A 08        102         BPL    PTR5        NO, CONTINUE
0037 I BD 016E I    103         JSR    PRCABL      ADD REQUEST TO BOTTOM OF LIST
003A I B6 0000 D    104 PTRX    LDA A  PTRICC
003D I 06           105         TAP                RESTORE ORIGINAL CC
003E I 39           106         RTS                RETURN TO CALLER
003F I FE 0003 D    107 PTR5    LDX    PTRQTH
0042 I A6 01        108         LDA A  1,X         ANY REQUESTS ALREADY IN QUEUE
0044 I 27 09        109         BEQ    PTR6        NO, PROCESS CURRENT REQUEST
0046 I FE 000F D    110         LDX    REQSAV
0049 I BD 016E I    111         JSR    PRCABL      ADD CURRENT REQUEST TO LIST
004C I              112 PTRQLP  EQU    *
004C I BD 0178 I    113         JSR    PRCRTL      REMOVE NEXT REQUEST FROM QUEUE
004F I 86 80        114 PTR6    LDA A  #PSTRQB
0051 I B7 0002 D    115         STA A  PTRSWD      SET REQUEST BUSY FLAG
0054 I FE 000F D    116         LDX    REQSAV
0057 I FF 0005 D    117         STX    PTRCRB      SAVE CURRENT REQUEST BLOCK ADDR
PRTDVR(A0011.02.080AA  CRS PRINTER - LOGGER DRIVER)   08/04/78  11:49:21  PAGE   3

005A I A6 00        118         LDA A  0,X         SAVE REQUEST
005C I B7 0007 D    119         STA A  PTRTYP      TYPE
005F I EE 01        120         LDX    1,X         SAVE BUFFER
0061 I FF 0008 D    121         STX    PTRBLN      LENGTH
0064 I FE 000F D    122         LDX    REQSAV
0067 I EE 03        123         LDX    3,X         SAVE PNTR
0069 I FF 000A D    124         STX    PTRBFR      TO START OF BUFR
006C I 7F 000C D    125         CLR    IRQCNT      INITIALIZE STROBE-ACKNOWLEDGE SYNC CONTROL
006F I 7F 000D D    126         CLR    IBFCCH      INITIALIZE INTERFACE BUFFER CHAR COUNT
0072 I B6 8060 A    127         LDA A  COPTRG
0075 I 85 80        128         BIT A  #CMDBSY     PRINTER BUSY ?P
0077 I 26 C1        129         BNE    PTRX        YES, WAIT FOR IRQ TO INITIATE REQUEST
0079 I B6 0002 D    130         LDA A  PTRSWD
007C I 8A 20        131         ORA A  #PSTFCH     SET 1ST CHAR INDICATOR
007E I B7 0002 D    132         STA A  PTRSWD
0081 I 20 29        133         BRA    PRTC        INITIATE REQUEST
                    134 *
                    135 *     PRINTER BUSY IRQ CONTINUATOR
                    136 *
0083 I              137 PRTBSY  EQU    *
0083 I F6 000E D    138         LDA B  LSTCHR
0086 I C1 04        139         CMP B  #CMDFD      LAST COMMAND A FEED ?
0088 I 27 10        140         BEQ    PRTCNT      YES, CONTINUE REQUEST
008A I B6 0002 D    141         LDA A  PTRSWD
008D I 84 EF        142         AND A  #-1-PSTBFL  RESET INTER FACE BUFFER FULL
008F I B7 0002 D    143         STA A  PTRSWD
0092 I 20 06        144         BRA    PRTCNT      CONTINUE REQUEST PROCESSING
                    145 *
                    146 *     PRINTER ACKNOWLEDGE IRQ CONTINUATOR
                    147 *
0094 I              148 PRTACK  EQU    *
0094 I B6 8061 A    149         LDA A  DOPTRG      CLEAR INTERRUPT
0097 I 7A 000C D    150         DEC    IRQCNT      SET ACKNOWLEDGE INDICATOR
                    151 *
                    152 *     PRINTER MAIN CONTINUATOR
                    153 *
009A I              154 PRTCNT  EQU    *
009A I B6 8060 A    155         LDA A  COPTRG
009D I 85 80        156         BIT A  #CMDBSY     PRINTER BUSY ?
009F I 27 01        157         BEQ    PCT3        NO, CONTINUE
00A1 I 3B           158 PCT4    RTI                YES, RETURN TO INTERRUPTED ROUTINE
00A2 I B6 0002 D    159 PCT3    LDA A  PTRSWD      REQUEST BUSY ?
```

```
 00A5 I 2A FA        160            BPL    PCT4         YES, IGNORE INTERRUPT
 00A7 I 84 DF        161            AND A  #-1-PSTFCH
 00A9 I B7 0002 D    162            STA A  PTRSWD       RESET 1ST CHAR INDICATOR
 00AC I              163 PRTC       EQU    *
 00AC I FE 000A D    164            LDX    PTRBFR       PICK UP BUFR PNTR
 00AF I 7D 000C D    165            TST    IRQCNT       STROBE-ACKNOWLEDGE IN SYNC ?
 00B2 I 27 07        166            BEQ    PCT2         YES, CONTINUE
 00B4 I 09           167            DEX                 BACKSPACE BUFR PNTR TO RE-ISSUE CHAR
 00B5 I 7F 000C D    168            CLR    IRQCNT       CLRAR SYNC CONTROL
 00B8 I 7A 000D D    169            DEC    IBFCCH       DECR INTERFACE BUFR CUNT
 00BB I A6 00        170 PCT2       LDA A  0,X          PICK UP NEXT CHAR TO OUTPUT
 00BD I 08           171            INX
 00BE I FF 000A D    172            STX    PTRBFR       UPDATE BUFR PNTR
 00C1 I F6 0002 D    173            LDA B  PTRSWD       PICK UP STATUS WORD
 00C4 I CE 8060 A    174            LDX    #COPTRG      ANTICIPATE COMMAND OUTPUT
 00C7 I 81 0D        175            CMP A  #CR          CARRIAGE RETURN ?
PRTDVR(A0011.02.080AA  CRS PRINTER - LOGGER DRIVER)      08/04/78  11:49:22  PAGE   4

 00C9 I 26 15        176            BNE    PCT1         NO, CONTINUE
 00CB I C5 10        177            BIT B  #PSTBFL      BUFFER FULL ?
 00CD I 26 DD        178            BNE    PRTC         YES, SKIP PRINT COMMAND
 00CF I 7D 000D D    179            TST    IBFCCH       INTERFACE BUFFER EMPTY ?
 00D2 I 27 D8        180            BEQ    PRTC         YES, SKIP PRINT COMMAND
 00D4 I CA 10        181            ORA B  #PSTBFL      SET BUFFER FULL INDICATOR
 00D6 I F7 0002 D    182            STA B  PTRSWD
 00D9 I 7F 000D D    183            CLR    IBFCCH       RESET INTERFACE CHAR COUNT
 00DC I C6 02        184            LDA B  #CMDPRT      SET PRINT COMMAND
 00DE I 20 2B        185            BRA    PCT6         GO OUTPUT COMMAND
 00E0 I 81 0A        186 PCT1       CMP A  #LF          LINE FEED ?
 00E2 I 26 10        187            BNE    PCT7         NO, CONTINUE
 00E4 I C5 10        188            BIT B  #PSTBFL      BUFFER FULL ?
 00E6 I 27 08        189            BEQ    PCT8         NO
 00E8 I FE 000A D    190            LDX    PTRBFR
 00EB I 09           191            DEX
 00EC I FF 000A D    192            STX    PTRBFR       BACKSPACE BUFFER PNTR
 00EF I 3B           193            RTI                 WAIT FOR BUSY INTERRUPT
 00F0 I C6 04        194 PCT8       LDA B  #CMDFD       SELECT FEED COMMAND
 00F2 I 20 17        195            BRA    PCT6         OUTPUT COMMAND
 00F4 I 08           196 PCT7       INX                 SELECT DATA OUTPUT REGISTER
 00F5 I 81 04        197            CMP A  #EOT         END-OF-MESSAGE ?
 00F7 I 27 38        198            BEQ    PRTCMP       YES, COMPLETE REQUEST
 00F9 I 16           199            TAB
 00FA I CA 80        200            ORA B  #DTASTB      SET STROBE
 00FC I E7 00        201            STA B  0,X          OUTPUT CHAR & STROBE
 00FE I C4 7F        202            AND B  #-1-DTASTB   REMOVE STROBE
 0100 I 7C 000D D    203            INC    IBFCCH       INCR INTERFACE BUFR CNTR
 0103 I 7C 000C D    204            INC    IRQCNT       SET STROBE INDICATOR
 0106 I 86 07        205            LDA A  #7
 0108 I 4A           206 PCT9       DEC A               DELAY REMAINDER OF 25
 0109 I 26 FD        207            BNE    PCT9         MICRO SECONDS
 010B I E7 00        208 PCT6       STA B  0,X          OUTPUT CHAR OR COMMAND
 010D I F7 000E D    209            STA B  LSTCHR       SAVE LAST CHAR OUTPUT
 0110 I B6 0002 D    210            LDA A  PTRSWD
 0113 I F6 000D D    211            LDA B  IBFCCH
 0116 I C1 14        212            CMP B  #IBFMAX      INTERFACE BUFFER FULL ?
 0118 I 2D 08        213            BLT    PCTA         NO
 011A I 8A 10        214            ORA A  #PSTBFL      SET BUFFER FULL INDICATOR
 011C I B7 0002 D    215            STA A  PTRSWD
 011F I 7F 000D D    216            CLR    IBFCCH       CLEAR CHAR COUNT
 0122 I 8C 8060 A    217 PCTA       CPX    #COPTRG      COMMAND OUTPUT ?
 0125 I 26 02        218            BNE    PCTB         NO
 0127 I 6F 00        219            CLR    0,X          RESET COMMAND PULSE
 0129 I 85 20        220 PCTB       BIT A  #PSTFCH      FIRST CHAR ?
 012B I 26 01        221            BNE    PCTD         YES
 012D I 3B           222            RTI
 012E I 7E 003A I    223 PCTD       JMP    PTRX         REQUEST INITIALIZATION COMPLETE
                     224 *
                     225 *     PRINTER REQUEST COMPLETION ROUTINE
                     226 *
 0131 I              227 PRTCMP     EQU    *
 0131 I B6 0002 D    228            LDA A  PTPSWD
 0134 I 8A 40        229            ORA A  #PSTRCP      SET REQUEST COMPLETE
 0136 I 84 7F        230            AND A  #-1-PSTRQB   RESET REQEUST BUSY
 0138 I B7 0002 D    231            STA A  PTRSWD
```

```
013B I FE 0005 D   232            LDX    PTRCRB
013E I 8C 0001 R   233            CPX    #LOGOVL       BUFFER OVERFLOW MESG
PRTDVR(A0011.02.080AA  CRS PRINTER - LOGGER DRIVER)     08/04/78  11:49:24  PAGE   5

0141 I 27 02       234            BEQ    PRTC1
0143 I 8D 29       235            BSR    PRCABL        ADD REQUEST TO EMPTY QUEUE
0145 I FE 0003 D   236 PRTC1      LDX    PTRQTH
0148 I E6 01       237            LDA B  1,X           ANY ENTRIES IN REQUEST QUEUE
014A I 27 03       238            BEQ    PCMP1         NO, RETURN
014C I BD 004C 1   239            JSR    PTRQLP        INITIATE NEXT REQUEST
014F I 3B          240 PCMP1      RTI                  RETURN TO INTERRUPTED ROUTINE
                   241 **
                   242 **      LOG DRIVER SUPPORT SUBROUTINES
                   243 **
                   244 *
                   245 *       ROUTINE TO SETUP PARAMETERS FOR QUEUE LOCATION
                   246 *
0150 I             247 PRCADD     EQU    *
0150 I FF 000F D   248            STX    REQSAV
0153 I FE 0003 D   249            LDX    PTRQTH        ANTICIAPTE ADD TO REQUEST QUEUE
0156 I B6 0002 D   250            LDA A  PTRSWD
0159 I 85 40       251            BIT A  #PSTRCP       REQEST COMPLETE ?
015B I 27 03       252            BEQ    PRCA1         NO, SETUP FOR REQUEST QUEUE
015D I CE 0000 R   253            LDX    #CRCBFR       ADD ENTRY TO EMPTY BUFFER QUEUE
0160 I B6 000F D   254 PRCA1      LDA A  REQSAV
0163 I F6 0010 D   255            LDA B  REQSAV+1
0166 I 39          256            RTS                  RETURN TO CLLER
                   257 *
                   258 *       ROUTINE TO SETUP PARAMETERS FOR QUEUE ENTRY REMOVAL
0167 I             259 PRCREM     EQU    *
0167 I B7 000F D   260            STA A  REQSAV        SAVE ENTRY
016A I F7 0010 D   261            STA B  REQSAV+1      REMOVED FROM QUEUE
016D I 39          262            RTS
                   263 *
                   264 *       ROUTINE TO ADD ENTRY TO BOTTOM OF QUEUE
                   265 *
016E I             266 PRCABL     EQU    *
016E I 8D E0       267            BSR    PRCADD
0170 I 3F          268            SWI
0171 I 00          269            FCB    FCABL
0172 I 39          270            RTS
                   271 *
                   272 *       ROUTINE TO ADD ENTRY TO TOP OF QUEUE
                   273 *
0173 I             274 PRCATL     EQU    *
0173 I 8D DB       275            BSR    PRCADD
0175 I 3F          276            SWI
0176 I 00          277            FCB    FCABL
0177 I 39          278            RTS
                   279 *
                   280 *       ROUTINE TO REMOVE ENTRY FROM TOP W QUEUE
                   281 *
0178 I             282 PRCRTL     EQU    *
0178 I 3F          283            SWI
0179 I 03          284            FCB    FCRTL
017A I 8D EB       285            BSR    PRCREM
017C I 39          286            RTS
                   287 **
                   288 **      STORAGE REQUIREMENTS FLR 'PRTDVR'
                   289 **
0000 D             290            DSEC
                   291 *
PRTDVR(A0011.02.080AA  CRS PRINTER - LOGGER DRIVER)     08/04/78  11:49:25  PAGE   6

                   292 *       PRINTER DRIVER CONTROL BLOCK
                   293 *
0000 D 00          294 PTRICC     FCB    0             INITIAL CC SAVE AREA
0001 D 00          295 PTRAVL     FCB    0             PRINTER AVAILABLE:  0 => AVAILABLE, -1 => 0
0002 D 00          296 PTRSWD     FCB    0             STATUS WORD
0003 D 0011     D  297 PTRQTH     FDB    PTRCTL        PRINTER REQUEST QUEUE PNTR
0005 D 0000     A  298 PTRCRB     FDB    0             PNTR O CURRENT REQUEST BLOCK
0007 D 00          299 PTRTYP     FCB    0             REQUEST TYPE
0008 D 0000     A  300 PTRBLN     FDB    0             BUFFER LENGTH
000A D 0000     A  301 PTRBFR     FDB    0             BUFFER PNTR
```

```
000C D 00              302 IRQCNT    FCB    0            STROBE-ACKNOWLEDGE SYNC CONTROL
000D D 00              303 IBFCCH    FCB    0            INTERFACE BUFFER CHARACTER COUNT
000E D 00              304 LSTCHR    FCB    0            LAST CHAR-CMND
                       305 *
000F D 0000      A     306 REQSAV    FDB    0            REQUEST BLOCK ADDR SAVE AREA
                       307 *
                       308 *      CIRCULAR LIST REQUEST QUEUE
                       309 *
0011 D                 310 PTRCTL    EQU    *
0011 D 00              311 PRQMXS    FCB    0            TOTAL # REQUESTS POSSIGLE
0012 D 00              312 PRQSIU    FCB    0            NUMBER OF REQUESTS IN QUEUE
0013 D 00              313 PRQCTP    FCB    0            CURRENT TOP POINTER
0014 D 00              314 PRQNXB    FCB    0            NEXT BOTTOM POINTER
0015 D                 315           RMB    LGRQMX+4*2
                       316 *
0059                   317           END
PRTDVR(A0011 02.080AA  CRS PRINTER - LOGGER DRIVER)     08/04/78  11:49:26  PAGE   7

  NO ERRORS
 ISECT LENGTH --    381
 DSECT LENGTH --     89

 CMDBSY    0080 A    37    128   156
 CMDFD     0004 A    38    139   194
 CMDPRT    0002 A    39    184
 CMDRST    0001 A    40
 COPCRG    8062 A    29
 COPTRG    8060 A    28    127   155   174   217
 CR        000D A    46    175
> CRCBFR   0000      19     19    97   253
 DOPCRG    8063 A    26
 DOPTRG    8061 A    25    149
 DTASTB    0080 A    33    200   202
 EOT       0004 A    44    197
 FCABL     0000 A    65     99   269   277
 FCATL     0001 A    66
 FCRBL     0002 A    67
 FCRTL     0003 A    68     90   284
 IBFCCH    000D D   303    126   169   179   183   203   211   216
 IBFMAX    0014 A    50    212
 IRQCNT    000C D   302    125   150   165   168   204
 LF        000A A    45    186
 LGRQMX    001E A    61    315
> LOGOVL   0001      20     20    95   233
 LSTCHR    000E D   304    138   209
 PCMP1     014F I   240    238
 PCT1      00E0 I   186    176
 PCT2      00BB I   170    166
 PCT3      00A2 I   159    157
 PCT4      00A1 I   158    160
 PCT6      010B I   208    185   195
 PCT7      00F4 I   196    187
 PCT8      00F0 I   194    189
 PCT9      0108 I   206    207
 PCTA      0122 I   217    213
 PCTB      0129 I   220    218
 PCTD      012E I   223    221
 PRCA1     0160 I   254    252
 PRCABL    016E I   266    103   111   235
 PRCADD    0150 I   247    267   275
 PRCATL    0173 I   274
 PRCREM    0167 I   259    285
 PRCRTL    0178 I   282    113
 PRQCTP    0013 D   313
 PRQMXS    0011 D   311
 PRQNXB    0014 D   314
 PRQSIU    0012 D   312
< PRTACK   0094 I   148      9
< PRTBSY   0083 I   137      9
 PRTC      00AC I   163    133   178   180
 PRTC1     0145 I   236    234
< PRTCMP   0131 I   227     10   198
< PRTCNT   009A I   154     11   140   144
< PRTDVR   0000 I    76      7
 PSTBFL    0010 A    57    142   177   181   188   214
```

```
PRTDVR(A0011.02.080AA  CRS PRINTER - LOGGER DRIVER)     08/04/78  11:49:27  PAGE   8

  PSTFCH    0020 A    56    131   161   220
  PSTRCP    0040 A    55    229   251
  PSTRQB    0080 A    54    114   230
  PTR1      0032 I   101     84
  PTR2      0016 I    88     96
  PTR3      0026 I    95     87
  PTR4      0019 I    89    100
  PTR5      003F I   107    102
  PTR6      004F I   114    109
< PTRAVL    0001 D   295     15    83
  PTRBFR    000A D   301    124   164   172   190   192
  PTRBLN    0008 D   300    121
  PTRCRB    0005 D   298    117   232
< PTRCTL    0011 D   310     17   297
  PTRICC    0000 D   294     79   104
< PTRINI    0000 I    77      8
  PTRQLP    004C I   112    239
< PTRQTH    0003 D   297     14    88   107   236   249
< PTRSWD    0002 D   296     13   101   115   130   132   141   143   159   162   173   182   210
                              215   228   231   250
  PTRTYP    0007 D   299    119
  PTRX      003A I   104     91   129   223
  REQSAV    000F D   306     82    85    86    92    93    94   110   116   122   248   254   255
                              260   261
SCNDVR(A0011.02.080AA CRS SELF-SCAN DRIVER)            08/04/78  13:17:20  PAGE   1

                         *
                         *          CRS SELF-SCAN DRIVER ROUTINE (TEST MODE)
                         *
0000 I                               ISEC
                         *
                                     DEF     SCAN.INI,SCAN.REQ
                                     DEF     INISCRN,SCAN.IN2
                                     DEF     MPTR,LCNT,CCNT
                         *
                                     REF     DLYRTN
                                     REF     SCNENB
                         *
                         *          SPECIAL CHARACTER EQUATES
                         *
0004 A                     EOT       EQU     $4
000A A                     LF        EQU     $A
000D A                     CR        EQU     $D
007F A                     BLK       EQU     $7F
                         *
                         *          REQUEST TYPE EQUATES
                         *
0080 A                     RQBLNK    EQU     $80           BLINK CHARACTERS
0000 A                     RQSCHR    EQU     0             SINGLE CHARACTER REQUEST
0002 A                     RQFMSG    EQU     2             FORMATTED MESG, TERMINATED BY EOT
0004 A                     RQUMSG    EQU     4             UNFORMATTED MESG, # CHARS SPECIFIED
                         *
                         *          CONTROL PARAMETERS
                         *
8100 A                     SCAN      EQU     $8100         START OF SELF SCAN MEMORY
0004 A                     LPPG      EQU     4             # LINES DISPLAYED
0020 A                     CPLN      EQU     32            # CHARACTERS PER LINE
                         *
01F4 A                     SCRL.DLY  EQU     500           SCROLL DELAY TIME MSEC
                         *
                         *
                         *          SELF-SCAN DRIVER INITIALIZATION ROUTINE
                         *
0000 I                     SCAN.INI  EQU     *
0000 I CE 01F4 A                     LDX     #SCRL.DLY
0003 I FF 0010 D                     STX     DLY.SCRL
0006 I CE 8100 A                     LDX     #SCAN         INITIALIZE SELF-SCAN
0009 I FF 0002 D                     STX     MPTR          MEMORY PNTR
000C I 86 01                         LDA A   #1
000E I B7 000A D                     STA A   LCNT          SET LINE COUNT AND
0011 I B7 000B D                     STA A   CCNT          CHAR COUNT
0014 I 7F 000C D                     CLR     MODE          SET NORMAL MODE
```

```
0017 I                 48 SCAN.IN2  EQU    *
0017 I BD 0119 I       49           JSR    BLKSCRN       CLEAR SCREEN
001A I 39              50           RTS                  RETURN
                       51 *
                       52 *        SELF-SCAN DRIVER REQUEST HANDLER
                       53 *
                       54 *             CALLING SEQUENCE:  JSR  SCAN.REQ
                       55 *
                       56 *             REGISTER CONTENTS:  ACCB => REQUEST TYPE
                       57 *                                 IX   => MESSAGE BUFFER (2,4)
                       58 *
                       59 *             REQUEST OPTIONS:  TYPE=0=> OUTPUT CHAR IN ACCA
SCNDVR(A0011.02.080AA CRS SELF-SCAN DRIVER)              08/04/78  13:17:20  PAGE   2

                       60 *                                TYPE=2=> OUTPUT MESG @ X, TERM. BY EOT
                       61 *                                TYPE=4=> OUTPUT MESG @ X, 1ST BYTE=COUNT
                       62 *                                TYPE=$80=>BLINK OUTPUT CHARS
                       63 *
001B I                 64 SCAN.REQ  EQU    *
001B I 7D 0001 R       65           TST    SCNENB        SELF SCAN ENABLE ?
001E I 26 01           66           BNE    SCR6          YES-CONTINUE
0020 I 39              67           RTS                  NO-IGNORE REQUEST
0021 I FF 0000 D       68 SCR6      STX    IDXSAV        SAVE MESG BUFFER PNTR
0024 I F7 000E D       69           STA B  RTYP          SAVE REQUEST TYPE
0027 I C4 7F           70           AND B  #-1-RQBLNK    MASK BLINK INDICATOR
0029 I 27 12           71           BEQ    SCR1          JUMP IF SINGLE CHAR REQUEST
002B I C1 04           72           CMP B  #RQUMSG       UNFORMATTED REQUEST ?
002D I 26 06           73           BNE    SCR2A         NO-CONTINUE
002F I E6 00           74           LDA B  0,X
0031 I F7 000D D       75           STA B  OCCT          SAVE CHARACTER COUNT
0034 I 08              76           INX
0035 I FF 0004 D       77 SCR2A     STX    MBFR          SAVE MESG BUFFER PNTR
                       78 *
                       79 *
0038 I                 80 SCN.CNT   EQU    *
0038 I FE 0004 D       81           LDX    MBFR          RESTORE MESSAGE BUFFER PNTR
003B I A6 00           82           LDA A  0,X           NEXT CHARACTER
003D I B7 000F D       83 SCR1      STA A  CHRSAV
0040 I 84 7F           84           AND A  #-1-RQBLNK    MASK BLINK
0042 I 81 04           85           CMP A  #EOT          END-OF-MESG
0044 I 26 04           86           BNE    SCR2          NO-CONTINUE
0046 I FE 0000 D       87           LDX    IDXSAV        RESTORE INDEX REGISTER
0049 I 39              88           RTS                  RETURN TO CALLER
                       89 *
004A I 81 7F           90 SCR2      CMP A  #BLK          BLANK SCREEN ?
004C I 26 16           91           BNE    SCR3          NO-CONTINUE
004E I BD 0119 I       92           JSR    BLKSCRN       BLANK SCREEN
0051 I 7F 000C D       93           CLR    MODE          SET NORMAL MODE
0054 I 86 01           94           LDA A  #1
0056 I B7 000A D       95           STA A  LCNT          SET LINE=1
0059 I B7 000B D       96           STA A  CCNT          SET CHAR=1
005C I CE 8100 A       97           LDX    #SCAN         RESET SELF-SCAN
005F I FF 0002 D       98           STX    MPTR          MEMORY PNTR
0062 I 20 79           99           BRA    SCRX          EXIT REQUEST
                      100 *
0064 I 81 0D          101 SCR3      CMP A  #CR           CARRIAGE RETURN ?
0066 I 26 1C          102           BNE    SCR4          NO-CONTINUE
0068 I B6 000B D      103           LDA A  CCNT          BLANK
006B I C6 20          104           LDA B  #'            REMAINDER
006D I FE 0002 D      105           LDX    MPTR          OF
0070 I 4C             106 SCR3B     INC A                CURRENT
0071 I 81 20          107           CMP A  #CPLN         LINE
0073 I 2E 05          108           BGT    SCR3A
0075 I E7 00          109           STA B  0,X
0077 I 08             110           INX                  ;
0078 I 20 F6          111           BRA    SCR3B
007A I 86 01          112 SCR3A     LDA A  #1
007C I B7 000B D      113           STA A  CCNT          SET CHAR=1
007F I BD 00F9 I      114           JSR    SOL.RTN       ADJUST SELF-SCAN PNTR TO START-OF-LIN      E
0082 I 20 59          115           BRA    SCRX          EXIT REQUEST
                      116 *
0084 I 81 0A          117 SCR4      CMP A  #LF           LINE FEED ?
```

```
0086 I 26 21                   BNE    SCR5       NO-CONTINUE
0088 I F6 000A D               LDA B  LCNT
008B I C1 04                   CMP B  #LPPG      SCROLL REQUIRED ?
008D I 27 15                   BEQ    SCR4A      YES
008F I 7C 000A D               INC    LCNT       BUMP LINE PNTR
0092 I B6 0002 D               LDA A  MPTR       ADJUST SELF-SCAN
0095 I F6 0003 D               LDA B  MPTR+1     MEMORY PNTR
0098 I CB 20                   ADD B  #CPLN      TO NEXT LINE
009A I 89 00                   ADC A  #0
009C I B7 0002 D               STA A  MPTR
009F I F7 0003 D               STA B  MPTR+1
00A2 I 20 39                   BRA    SCRX       CHECK EXIT
                    *
00A4 I BD 012E I    SCR4A      JSR    SCROLL     SCROLL DISPLAY
00A7 I 20 34                   BRA    SCRX       CHECK EXIT
                    *
00A9 I B6 000F D    SCR5       LDA A  CHRSAV     RESTORE CHARACTER
00AC I 7D 000E D               TST    RTYP       BLINK REQUEST ?
00AF I 2A 02                   BPL    SCR5A      NO-CONTINUE
00B1 I 8A 30                   ORA A  #RQBLNK    SET BLINK IN CHAR
00B3 I FE 0002 D    SCR5A      LDX    MPTR       BUMP SELF-SCAN
00B6 I A7 00                   STA A  0,X
00B8 I 08                      INX               MEMORY
00B9 I FF 0002 D               STX    MPTR       PNTR
00BC I 7C 000B D               INC    CCNT       BUMP CHAR COUNT
00BF I B6 000B D               LDA A  CCNT
00C2 I 81 20                   CMP A  #CPLN      END-OF-LINE ?
00C4 I 2F 17                   BLE    SCRX       NO-CHECK EXIT
00C6 I 86 01                   LDA A  #1
00C8 I B7 000B D               STA A  CCNT       SET CHAR COUNT =1
00CB I B6 000A D               LDA A  LCNT
00CE I 81 04                   CMP A  #LPPG      SCROLL REQUIRED ?
00D0 I 27 05                   BEQ    SCR5B      YES-CONTINUE
00D2 I 7C 000A D               INC    LCNT       BUMP LINE PNTR
00D5 I 20 06                   BRA    SCRX       CHECK EXIT
00D7 I BD 00F9 I    SCR5B      JSR    SOL.RTN    ADJUST MEMORY PNTR TO START-OF-LINE
00DA I BD 012E I               JSR    SCROLL     SCROLL DISPLAY
                    *
                    *
00DD I F6 000E D    SCRX       LDA B  RTYP       SINGLE CHAR REQUEST ?
00E0 I 27 10                   BEQ    SCRXA      YES-RETURN TO CALLER
00E2 I FE 0004 D               LDX    MBFR       BUMP
00E5 I 08                      INX               MESSAGE BUFFER
00E6 I FF 0004 D               STX    MBFR       PNTR
00E9 I C1 04                   CMP B  #RQUMSG    UNFORMATTED REQUEST ?
00EB I 26 09                   BNE    SCRXB      NO-CONTINUE
00ED I 7A 000D D               DEC    OCCT       END-OF-MESG ?
00F0 I 26 04                   BNE    SCRXB      NO-CONTINUE
00F2 I FE 0000 D    SCRXA      LDX    IDXSAV     RESTORE INDEX REGISTER
00F5 I 39                      RTS               RETURN TO CALLER
00F6 I 7E 0038 I    SCRXB      JMP    SCN.CNT    CONTINUE PROCESSING REQUEST
                    *
                    *          ROUTINE TO COMPUTE START OF LINE SELF SCAN MEMORY POINTER
                    *
00F9 I              SOL.RTN    EQU    *
00F9 I 36                      PSH A
00FA I F6 000A D               LDA B  LCNT       CURRENT LINE COUNT
00FD I 37                      PSH B
```

```
00FE I 86 81                   LDA A  #SCAN/256
0100 I C6 00                   LDA B  #SCAN&255
0102 I 7A 000A D    SOL1       DEC    LCNT       MEMORY PNTR SET FOR CURRENT LINE ?
0105 I 27 06                   BEQ    SOL2       YES
0107 I CB 20                   ADD B  #CPLN      POSITION PNTR TO
0109 I 89 00                   ADC A  #0         START OF NEXT LINE
010B I 20 F5                   BRA    SOL1
010D I B7 0002 D    SOL2       STA A  MPTR
0110 I F7 0003 D               STA B  MPTR+1     UPDATE POINTER
0113 I 33                      PUL B
0114 I 32                      PUL A
0115 I F7 000A D               STA B  LCNT
```

```
0118 I 39                          RTS                    RETURN
                         *
                         *       ROUTINE TO BLANK SCREEN
                         *
                         *             CALLING SEQUENCE:  JSR  BLKSCRN
                         *
0119 I                   BLKSCRN   EQU     *
0119 I C6 20                       LDA B   #'
011B I                   INISCRN   EQU     *
011B I CE 8100 A                   LDX     #SCAN          SET PNTR TO START-OF-SELF SCAN MEMORY
011E I 86 04                       LDA A   #LPPG
0120 I 36                BLK2      PSH A                  SAVE # LINES COUNT
0121 I 86 20                       LDA A   #CPLN          PICK UP # CHARS PER LINE
0123 I E7 00             BLK1      STA B   0,X            BLANK MEMORY
0125 I 08                          INX
0126 I 4A                          DEC A                  END-OF-LINE ?
0127 I 26 FA                       BNE     BLK1           NO-CONTINUE
0129 I 32                          PUL A
012A I 4A                          DEC A                  ALL OF SCREEN BLANKED ?
012B I 26 F3                       BNE     BLK2           NO-CONTINUE
012D I 39                          RTS                    RETURN
                         *
                         *       ROUTINE TO SCROLL SELF-SCAN MEMORY
                         *
                         *             CALLING SEQUENCE:  JSR  SCROLL
                         *
012E I                   SCROLL    EQU     *
012E I 7C 000C D                   INC     MODE           SET SCROLL MODE
0131 I FE 0010 D                   LDX     DLY.SCRL
0134 I BD 0000 R                   JSR     DLYRTN         DELAY SCROLLING 1ST LINE
0137 I 86 04             SRL1      LDA A   #LPPG          SAVE # LINES
0139 I 36                          PSH A                  ON DISPLAY
013A I CE 8100 A                   LDX     #SCAN
013D I FF 0006 D                   STX     SRL.DEST       SCROLL LINE DESTINATION PNTR
0140 I CE 8120 A                   LDX     #SCAN+CPLN
0143 I FF 0008 D                   STX     SRL.STRT       SCROLL LINE STARTING PNTR
0146 I 32                SRL3      PUL A
0147 I 4A                          DEC A                  SCROLLING COMPLETE ?
0148 I 27 1A                       BEQ     SRL4           YES-BLANK LAST DISPLAY LINE
014A I 36                          PSH A                  NO-SAVE # LINES REMAINING
014B I C6 20                       LDA B   #CPLN          SET CHARS PER LINE COUNT
014D I FE 0008 D         SRL2      LDX     SRL.STRT
0150 I A6 00                       LDA A   0,X            NEXT CHARACTER
0152 I 08                          INX
0153 I FF 0008 D                   STX     SRL.STRT
0156 I FE 0006 D                   LDX     SRL.DEST       MOVE CHAR TO PREVIOUS LINE
SCNDVR(A0011.02.080AA CRS SELF-SCAN DRIVER)                  08/04/78  13:17:23  PAGE   5

0159 I A7 00                       STA A   0,X
015B I 08                          INX
015C I FF 0006 D                   STX     SRL.DEST
015F I 5A                          DEC B                  END-OF-LINE ?
0160 I 26 EB                       BNE     SRL2           NO-CONTINUE
0162 I 20 E2                       BRA     SRL3           CONTINUE
0164 I 86 20             SRL4      LDA A   #'
0166 I FE 0006 D                   LDX     SRL.DEST
0169 I C6 20                       LDA B   #CPLN
016B I A7 00             SRL5      STA A   0,X            BLANK LAST DISPLAY LINE
016D I 08                          INX
016E I 5A                          DEC B
016F I 26 FA                       BNE     SRL5
0171 I 39                          RTS                    RETURN TO CALLER
                         *
                         *       STORAGE REQUIREMENTS FOR SELF-SCAN DRIVER
                         *
0000 D                             DSEC
                         *
0000 D 0000     A        IDXSAV    FDB     0              INDEX REGISTER SAVE AREA
0002 D 0000     A        MPTR      FDB     0              SELF-SCAN MEMORY PNTR
0004 D 0000     A        MBFR      FDB     0              MESSAGE BUFFER PNTR
0006 D 0000     A        SRL.DEST  FDB     0              SCROLL DESTINATION SELF-SCAN MEMORY P     N
0008 D 0000     A        SRL.STRT  FDB     0              SCROLL STARTING SELF-SCAN MEMORY PNTR
000A D 00                LCNT      FCB     0              CURRENT LINE PNTR
000B D 00                CCNT      FCB     0              CURRENT CHARACTER PNTR
```

```
000C D 00          260 MODE      FCB    0          DISPLAY MODE
000D D 00          261 OCCT      FCB    0          CHARACTER COUNT - UNFORMATTED REQUEST
000E D 00          262 RTYP      FCB    0          REQUEST TYPE
000F D 00          263 CHRSAV    FCB    0          CURRENT CHARACTER SAVE AREA
0010 D 0000   A    264 DLY.SCRL  FDB    0          SCROLL DELAY TIME SAVE AREA
                   265 *
0012               266           END
SCNDVR(A0011.02.030AA CRS SELF-SCAN DRIVER)           08/04/78  13:17:24  PAGE   6

  NO ERRORS
 ISECT LENGTH --   370
 DSECT LENGTH --    18

  BLK       007F A   19    90
  BLK1      0123 I  201   204
  BLK2      0120 I  199   207
  BLKSCRN   0119 I  194    49    92
< CCNT      000B D  259     9    46    96   103   113   142   143   147
  CHRSAV    000F D  263    83   134
  CPLN      0020 A   32   107   125   144   180   200   222   228   242
  CR        000D A   18   101
  DLY.SCRL  0010 D  264    41   216
> DLYRTN    0000     11    11   217
  EOT       0004 A   16    85
  IDXSAV    0000 D  253    68    87   166
< INISCRN   011B I  196     8
< LCNT      000A D  258     9    45    95   119   122   148   151   174   178   187
  LF        000A A   17   117
  LPPG      0004 A   31   120   149   198   218
  MBFF      0004 D  255    77    81   159   161
  MODE      000C D  260    47    93   215
< MPTR      0002 D  254     9    43    98   105   123   124   127   128   138   141   183   184
  OCCT      000D D  261    75   164
  RQBLNK    0080 A   23    70    84   137
  RQFMSG    0002 A   25
  RQSCHR    0000 A   24
  RQUMSG    0004 A   26    72   162
  RTYP      000E D  262    69   135   157
  SCAN      8100 A   30    42    97   176   177   197   220   222
< SCAN.IN2  0017 I   48     8
< SCAN.INI  0000 I   39     7
< SCAN.REQ  001B I   64     7
  SCN.CNT   0038 I   80   168
> SCNENB    0001     12    12    65
  SCR1      003D I   83    71
  SCR2      004A I   90    86
  SCR2A     0035 I   77    73
  SCR3      0064 I  101    91
  SCR3A     007A I  112   108
  SCR3B     0070 I  106   111
  SCR4      0084 I  117   102
  SCR4A     00A4 I  131   121
  SCR5      00A9 I  134   118
  SCR5A     00B3 I  138   136
  SCR5B     00D7 I  153   150
  SCR6      0021 I   68    66
  SCRL.DLY  01F4 A   34    40
  SCROLL    012E I  214   131   154
  SCRX      00DD I  157    99   115   129   132   145   152
  SCRXA     00F2 I  166   158
  SCRXB     00F6 I  168   163   165
  SOL.RTN   00F9 I  172   114   153
  SOL1      0102 I  178   182
  SOL2      010D I  183   179
  SRL.DEST  0006 D  256   221   233   236   241
  SRL.STRT  0008 D  257   223   229   232
SCNDVR(A0011.02.080AA CRS SELF-SCAN DRIVER)           08/04/78  13:17:24  PAGE   7

  SRL1      0137 I  218
  SRL2      014D I  229   238
  SRL3      0146 I  224   239
  SRL4      0164 I  240   226
  SRL5      016B I  243   246
```

```
SLFTST(A0011.02.081AA CRS SELF-TEST CONTROL ROUTINE)    08/04/78  13:05:48  PAGE   1

                   *
                   *        CRS SELF-TEST SUBSYSTEM CONTROL ROUTINE
                   *
0000 I                       ISEC
                   *
                             DEF     SLF.INIT
                             DEF     SLF.STAT
                             DEF     SLFTST
                             DEF     INCH,DECIN,IN2HX,IN4HX
                             DEF     DECIN.SW
                             DEF     PCR,PCRLF
                             DEF     OUT2H,OUT2HS,OUT4HS
                             DEF     OCHAR,OUTCH,OUTSP
                             DEF     DECOUT
                             DEF     PDATA,PDATA1
                             DEF     CHEXL,CHEXR
                             DEF     CBCDHX
                             DEF     RTYCNT
                             DEF     IPTVAL,IPTADR
                             DEF     STSTAT
                             DEF     XSAVE
                             DEF     KYENTR
                   *
                             REF     CURCSP,STSTAT
                             REF     SCAN.INI,SCAN.REQ
                             REF     MPTR,LCNT,CCNT
                             REF     INICRS
                   *
                   *        SELF TEST CONTROL EQUATES
                   *
0080 A             STC.TIP   EQU     $80           TEST-IN-PROGRESS
0040 A             STC.TRC   EQU     $40           RETRY OR CONTINUE REQUEST
0020 A             STC.DKR   EQU     $20           KEY ENTRY REQUEST
0010 A             STC.ENT   EQU     $10           KEY ENTERED FLAG
0008 A             STC.RCP   EQU     8             REQUEST COMPLETE
0004 A             STC.ABT   EQU     4             TEST ABORT
0002 A             STC.HLD   EQU     2             OVERRIDE DECIMAL KEY ECHO
0001 A             STC.DEC   EQU     1             DECIMAL INPUT
                   *
                   *        SYSTEM KEY ENTRY EQUATES
                   *
000D A             LCAST2    EQU     13            STATUS FLAGS (BYTE 2)
0080 A             LS2DKR    EQU     $80           DECIMAL KEY REQUEST PENDING
                   *
000D A             CR        EQU     $D            CARRIAGE RETURN
000A A             LF        EQU     $A            LINI FEED
                   *
0002 A             RQFMSG    EQU     2             FORMATTED MESG
                   *
                   *        KEYBOARD SWITCH EQUATES
                   *
0009 A             KSWDC9    EQU     9             9
000A A             KSWBSP    EQU     $A            BACKSPACE
000B A             KSWENT    EQU     $B            ENTRY
000D A             KSWRTY    EQU     $D            RETRY
000E A             KSWESC    EQU     $E            ESCAPE
0012 A             KSWDDP    EQU     $12           DISPLAY DEPOLYMENT
0017 A             KSWPRG    EQU     $17           PROGRAM
SLFTST(A0011.02.081AA CRS SELF-TEST CONTROL ROUTINE)    08/04/78  13:05:49  PAGE   2

001C A             KSWSP2    EQU     $1C           ON-LINE TEST
                   *
                   *        CRS SELF-TEST SUBSYSTEM CONTROL ROUTINE
                   *
                   *              ACCA => CHARACTER ENTERED
                   *
0000 I             SLFTST    EQU     *
0000 I F6 000A D             LDA B   SLF.STAT
0003 I 81 0E                 CMP A   #KSWESC       ESCAPE ?
0005 I 26 10                 BNE     SLF2          NO-CHECK IF KEY REQUESTED
0007 I 5D                    TST B                 TEST-IN-PROGRESS ?
0008 I 2B 03                 BMI     SLF3          YES-ABORT CURRENT TEST
```

```
000A I 7E 0006 R          JMP    INICRS          NO-RESTART SYSTEM
000D I C5 20      SLF3    BIT B  #STC.DKR        KEY ENTRY REQUEST ?
000F I 27 24              BEQ    SLF.LOOP        NO-REQUEST NEW TEST
0011 I CA 14              ORA B  #STC.ENT+STC.ABTSET TEST ABORT & KEY ENTERED
0013 I F7 000A D          STA B  SLF.STAT
0016 I 3B                 RTI                    RETURN FROM IRQ
0017 I B7 000E D  SLF2    STA A  KEYENT          SAVE CHARACTER ENTERED
001A I C5 20              BIT B  #STC.DKR        KEY ENTRY REQUEST ?
001C I 26 62              BNE    INCH.RTN        YES-PROCESS OPERATOR ENTRY
001E I 3B                 RTI                    NO-IGNORE ENTRY
001F I            SLF.INIT EQU   *
001F I BD 0001 R          JSR    SCAN.INI        INITIALIZE SCAN DRIVER
0022 I 7F 000A D          CLR    SLF.STAT        CLEAR TEST CONTROL WORD
0025 I C6 01              LDA B  #1              MARK SELF-TEST
0027 I F7 0000 D          STA B  STSTAT          SUBSYSTEM ACTIVE
002A I BF 000C D          STS    STKSAV          SAVE STACK PNTR
002D I 01                 NOP
002E I 0E                 CLI
002F I CE 0324 I          LDX    #SLFTID         IDENTIFY SELF-TEST
0032 I BD 02F2 I          JSR    PDATA           SUBSYSTEM
                  *
                  *
0035 I            SLF.LOOP EQU   *
0035 I 7F 000A D          CLR    SLF.STAT
0038 I BE 000C D          LDS    STKSAV          RESET STACK PNTR
003B I CE 0304 I          LDX    #SLF.TCTL
003E I FF 0016 D          STX    XSAV3
0041 I CE 033A I          LDX    #SLFSLT         NOTIFY OPERATOR TO
0044 I BD 02F2 I          JSR    PDATA           SELECT TEST
0047 I CE 0008 D          LDX    #SLF.TSTN
004A I BD 017A I          JSR    DECIN           PICK UP TEST NUMBER
004D I A6 00              LDA A  0,X
004F I E6 01              LDA B  1,X
0051 I 4D                 TST A
0052 I 26 0E              BNE    SLF5
0054 I C1 0F              CMP B  #SLF.TEND-SLF.TCTL/2
0056 I 22 0A              BHI    SLF5
0058 I 58                 ASL B
0059 I 49                 ROL A
005A I FB 0017 D          ADD B  XSAV3+1
005D I B9 0016 D          ADC A  XSAV3
0060 I 20 08              BRA    SLF4
0062 I CE 0350 I  SLF5    LDX    #SLFINV         INFORM OPERATOR OF
0065 I BD 02F2 I          JSR    PDATA           INVALID ENTRY
0068 I 20 CB              BRA    SLF.LOOP        INPUT NEW NUMBER
006A I CE 0008 D  SLF4    LDX    #SLF.TSTN
SLFTST(A0011.02.081AA CRS SELF-TEST CONTROL ROUTINE)    08/04/78  13:05:50  PAGE   3

006D I A7 00              STA A  0,X
006F I E7 01              STA B  1,X
0071 I EE 00              LDX    0,X             PICK UP TEST ADDR
0073 I EE 00              LDX    0,X
0075 I 27 EB              BEQ    SLF5            JUMP IF NO TEST
0077 I C6 80              LDA B  #STC.TIP
0079 I F7 000A D          STA B  SLF.STAT        SET TEST-IN-PROGRESS
007C I AD 00              JSR    0,X             PERFORM SELECTED TEST
007E I 20 B5              BRA    SLF.LOOP        INITIATE NEXT TEST
                  *
                  *
0080 I            INCH.RTN EQU   *
0080 I 7F 000F D          CLR    ASCHAR          ANTICIPATE NON-ASCII ENTRY
0083 I F6 000A D          LDA B  SLF.STAT        CONTROL FLAGS
0086 I C5 02              BIT B  #STC.HLD        ECHO OVERRIDE ?
0088 I 26 04              BNE    INCH.NHX        YES - REQUEST COMPLETE
008A I 81 0B              CMP A  #KSWENT         ENTER ?
008C I 26 0A              BNE    INCH2           NO-CONTINUE
                  *
008E I CA 08      INCH.NHX ORA B #STC.RCP        SET REQUEST COMPLETE
0090 I CA 10      INCH.HX  ORA B #STC.ENT        SET KEY ENTERED FLAG
0092 I C4 DF              AND B  #-1-STC.DKR     RESET KEY ENTRY REQUEST FLAG
0094 I F7 000A D          STA B  SLF.STAT        SAVE FLAGS
0097 I 3B                 RTI                    RETURN FROM IRQ
                  *
0098 I 81 0A      INCH2   CMP A  #KSWBSP         BACKSPACE ?
```

```
009A I 26 22              BNE    INCH3        NO-CONTINUE
009C I B6 0005 R          LDA A  CCNT         CURRENT CHARACTER COUNT
009F I 81 01              CMP A  #1           1ST CHARACTER ?
00A1 I 27 ED              BEQ    INCH.HX      YES-IGNORE BACKSPACE
00A3 I 7A 0005 R          DEC    CCNT
00A6 I FE 0003 R          LDX    MPTR
00A9 I 09                 DEX
00AA I FF 0003 R          STX    MPTR
00AD I 37                 PSH B
00AE I BD 02BF I          JSR    OUTSP        BLANK OUT CHARACTER
00B1 I 33                 PUL B
00B2 I 7A 0005 R          DEC    CCNT
00B5 I FE 0003 R          LDX    MPTR
00B8 I 09                 DEX
00B9 I FF 0003 R          STX    MPTR
00BC I 20 D2              BRA    INCH.HX
00BE I 81 09      INCH3   CMP A  #KSWDC9      0-9 DIGIT ?
00C0 I 23 0E              BLS    INCH4        YES-CONVERT TO ASCII
00C2 I C5 01              BIT B  #STC.DEC     DECIMAL INPUT
00C4 I 26 C8              BNE    INCH.NHX     YES
00C6 I 81.12              CMP A  #KSWDDP
00C8 I 25 C4              BCS    INCH.NHX     JUMP IF NON-HEX CHARACTER
00CA I 81 17              CMP A  #KSWPRG
00CC I 22 C0              BHI    INCH.NHX     JUMP IF NON-HEX CHARACTER
00CE I 8B F8              ADD A  #$A-KSWDDP
00D0 I 8B 30      INCH4   ADD A  #'0          CONVERT TO ASCII
00D2 I 81 39              CMP A  #'9
00D4 I 23 02              BLS    INCH5
00D6 I 8B 07              ADD A  #7
00D8 I B7 000F D  INCH5   STA A  ASCHAR       SAVE ASCII CHARACTER
00DB I 37                 PSH B
00DC I BD 02BA I          JSR    OUTCH        OUTPUT CHARACTER
SLFTST(A0011.02.081AA CRS SELF-TEST CONTROL ROUTINE)    08/04/78  13:05:51  PAGE   4

00DF I 33                 PUL B
00E0 I 20 AE              BRA    INCH.HX      EXIT ROUTINE
                  *
                  *       ... INPUT ONE CHARACTER INTO ACCA
                  *
00E2 I            INCH    EQU    *
00E2 I F6 000A D          LDA B  SLF.STAT     RESET TEST ABORT, REQ. COMPLETE
00E5 I C4 E3              AND B  #-1-STC.ABT-STC.RCP-STC.ENT
00E7 I F7 000A D          STA B  SLF.STAT     AND KEY ENTERED FLAGS
00EA I CA 20      INCHL   ORA B  #STC.DKR
00EC I F7 000A D          STA B  SLF.STAT     SET KEY ENTRY REQUEST FLAG
00EF I 01                 NOP
00F0 I 0E                 CLI                 ENABLE IRQ
00F1 I 3E                 WAI                 WAIT FOR OPERATOR ENTRY
00F2 I 01                 NOP
00F3 I 0F                 SEI                 MASK IRQ
00F4 I F6 000A D          LDA B  SLF.STAT
00F7 I C5 10              BIT B  #STC.ENT     KEY ENTERED ?
00F9 I 27 EF              BEQ    INCHL        NO-WAIT FOR ENTRY
00FB I 01                 NOP
00FC I 0E                 CLI                 YES-ENABLE IRQ
00FD I C5 04              BIT B  #STC.ABT     TEST ABORT ?
00FF I 27 03              BEQ    INCH1        NO-RETURN TO CALLER
0101 I 7E 0035 I          JMP    SLF.LOOP     YES-INITIATE NEXT TEST
0104 I B6 000E D  INCH1   LDA A  KEYENT
0107 I 39                 RTS                 RETURN
                  *
                  *
                  *
                  *       ... RETRY OR CONTINUE REQUEST
                  *
                  *           CC => 0 FOR RETRY
                  *           CC => - FOR CONTINUE
                  *
0108 I            RTYCNT  EQU    *
0108 I F6 000A D          LDA B  SLF.STAT
010B I CA 42              ORA B  #STC.TRC+STC.HLD
010D I F7 000A D          STA B  SLF.STAT
0110 I 8D D0              BSR    INCH         INPUT CHARACTER
0112 I B6 000E D          LDA A  KEYENT
```

```
0115 I 80 0D                      SUB A  #KSWRTY        RETRY ?
0117 I 27 04                      BEQ    RTYX           YES-RETURN
0119 I 16                         TAB
011A I 5C                         INC B                 CONTINUE ?
011B I 26 EB                      BNE    RTYCNT         NO-IGNORE INPUT
011D I F6 000A D     RTYX         LDA B  SLF.STAT
0120 I C4 BD                      AND B  #-1-STC.TRC-STC.HLD
0122 I F7 000A D                  STA B  SLF.STAT
0125 I 4D                         TST A                 SET CONDITION CODE FOR RETU
0126 I 39                         RTS                   RETURN
                     *
                     *          ... INPUT VALUE FROM OPERATOR
                     *
                     *               ACCB => TOTAL # CHARS ENTERED
                     *
0127 I               RDVAL        EQU    *
0127 I 5F                         CLR B                 INIT. CHARACTER COUNT
0128 I CE 0002 D                  LDX    #IPTVAL
SLFTST(A0011.02.081AA CRS SELF-TEST CONTROL ROUTINE)   08/04/78  13:05:52  PAGE   5

012B I FF 0012 D                  STX    XSAVE          INIT. SAVE AREA PNTR
012E I 37            RDVL         PSH B
012F I 8D B1                      BSR    INCH
0131 I F6 000A D                  LDA B  SLF.STAT
0134 I C5 08                      BIT B  #STC.RCP
0136 I 33                         PUL B
0137 I 26 40                      BNE    RDVX           YES-INPUT COMPLETE
0139 I B6 000E D                  LDA A  KEYENT
013C I 81 0A                      CMP A  #KSWBSP        BACKSPACE ?
013E I 26 0D                      BNE    RDV1           NO-CONTINUE
0140 I 5D                         TST B                 ANY CHARS ENTERED ?
0141 I 27 EB                      BEQ    RDVL           NO-IGNORE BACKSPACE
0143 I FE 0012 D                  LDX    XSAVE
0146 I 09                         DEX
0147 I FF 0012 D                  STX    XSAVE          BACKSPACE SAVE AREA PNTR
014A I 5A                         DEC B
014B I 20 E1         RDV2         BRA    RDVL
014D I B6 000F D     RDV1         LDA A  ASCHAR         VALID CHAR ?
0150 I 27 27                      BEQ    RDVX           NO-REQUEST COMPLETE
0152 I C1 05                      CMP B  #5             SAVE AREA FULL ?
0154 I 26 17                      BNE    RDV3           NO-CONTINUE
0156 I 37                         PSH B
0157 I CE 0002 D                  LDX    #IPTVAL
015A I 5A            RDV5         DEC B                 SHIFT COMPLETE ?
015B I 27 07                      BEQ    RDV4           YES
015D I A6 01                      LDA A  1,X
015F I A7 00                      STA A  0,X
0161 I 08                         INX
0162 I 20 F6                      BRA    RDV5
0164 I FF 0012 D     RDV4         STX    XSAVE          RESET SAVE AREA PNTR
0167 I 33                         PUL B
0168 I B6 000F D                  LDA A  ASCHAR
016B I 20 01                      BRA    RDV6
016D I 5C            RDV3         INC B                 INCR CHARACTER COUNT
016E I FE 0012 D     RDV6         LDX    XSAVE
0171 I A7 00                      STA A  0,X            SAVE CHARACTER ENTERED
0173 I 08                         INX
0174 I FF 0012 D                  STX    XSAVE          UPDATE PNTR
0177 I 20 B5                      BRA    RDVL           CONTINUE
0179 I 39            RDVX         RTS                   RETURN TO CALLER (ACCB = # CHARS)
                     *
                     *          ... INPUT DECIMAL NUMBER, STORE 16 BITS @ X
                     *
017A I               DECIN        EQU    *
017A I FF 0010 D                  STX    IPTADR         SAVE CONVERSION PNTR
017D I 8D A8                      BSR    RDVAL          INPUT VALUE
017F I               DECIN.SW     EQU    *
017F I 5D                         TST B                 ANY CHARS ENTERED ?
0180 I 37                         PSH B
0181 I 27 49                      BEQ    DECC           NO-DON'T CHANGE VALUE @ X
0183 I 37                         PSH B
0184 I CE 02F8 I                  LDX    #DECIML-2
0187 I FF 0014 D                  STX    XSAV2          INIT. CONVERSION TABLE PNTR
018A I FE 0010 D                  LDX    IPTADR
```

```
 018D I 6F 00         .       CLR    0,X          INITIALIZE VALUE
 018F I 6F 01                 CLR    1,X          TO ZERO
 0191 I 33           DEC3     PUL B
 0192 I 5A                    DEC B               CONVERSION COMPLETE ?
SLFTST(A0011.02.081AA CRS SELF-TEST CONTROL ROUTINE)    08/04/78  13:05:53  PAGE   6

 0193 I 2B 37                 BMI    DECC         YES-RETURN
 0195 I 37                    PSH B               SAVE # CHARS REMAINING TO CONVERT
 0196 I FE 0014 D             LDX    XSAV2        SET CONVERSION TABLE
 0199 I 08                    INX                 PNTR FOR
 019A I 08                    INX                 CURRENT
 019B I FF 0014 D             STX    XSAV2        DIGIT TO BE CONVERTED
 019E I FE 0012 D             LDX    XSAVE
 01A1 I 09                    DEX
 01A2 I FF 0012 D             STX    XSAVE        SET PNTR TO NEXT DIGIT
 01A5 I A6 00                 LDA A  0,X
 01A7 I 84 0F                 AND A  #$F
 01A9 I B7 0018 D             STA A  DIGSAV
 01AC I 4F                    CLR A               INIT. CONVERSION
 01AD I 5F                    CLR B               FACTOR
 01AE I 7A 0018 D    DEC1     DEC    DIGSAV       CONVERSION COMPLETE FOR THIS
 01B1 I 2B 0C                 BMI    DEC2         DIGIT POSITION
 01B3 I FE 0014 D             LDX    XSAV2
 01B6 I EB 01                 ADD B  1,X          COMPUTE CONVERSION VALUE
 01B8 I A9 00                 ADC A  0,X          FOR CURRENT
 01BA I FE 0012 D             LDX    XSAVE        DIGIT
 01BD I 20 EF                 BRA    DEC1         POSITION
 01BF I FE 0010 D    DEC2     LDX    IPTADR
 01C2 I EB 01                 ADD B  1,X          INCLUDE VALUE
 01C4 I E7 01                 STA B  1,X          IN OVERALL
 01C6 I A9 00                 ADC A  0,X          CONVERSION
 01C8 I A7 00                 STA A  0,X
 01CA I 20 C5                 BRA    DEC3         CONTINUE CONVERSION
 01CC I FE 0010 D    DECC     LDX    IPTADR
 01CF I 33                    PUL B               RESTORE # CHARS ENTERED
 01D0 I 5D                    TST B               SET CC FOR RETURN
 01D1 I 39                    RTS                 RETURN TO CALLER
                     *
                     *       ... INPUT 2 HEX CHARACTERS
                     *
 01D2 I              IN2HX    EQU    *
 01D2 I 86 02                 LDA A  #2           SET INPUT CHARACTER COUNT
 01D4 I 20 02                 BRA    IHX1
                     *
                     *       ... INPUT 4 HEX CHARACTERS
                     *
 01D6 I              IN4HX    EQU    *
 01D6 I 86 04                 LDA A  #4           SET INPUT CHARACTER COUNT
 01D8 I 36           IHX1     PSH A
 01D9 I FF 0010 D             STX    IPTADR       SAVE CONVERSION ADDR
 01DC I BD 0127 I             JSR    RDVAL        INPUT CHARACTERS
 01DF I 32                    PUL A
 01E0 I 5D                    TST B               ANY CHARACTERS ?
 01E1 I 37                    PSH B
 01E2 I 27 41                 BEQ    INHXC        NO-ACCEPT CURRENT VALUE
 01E4 I FE 0010 D             LDX    IPTADR
 01E7 I 6F 00                 CLR    0,X
 01E9 I 81 02                 CMP A  #2           2 HEX CHAR CONVERSION ?
 01EB I 27 03                 BEQ    IHX1A        YES
 01ED I 6F 01                 CLR    1,X
 01EF I 08                    INX
 01F0 I FF 0014 D    IHX1A    STX    XSAV2        SAVE CONVERSION AREA PNTR
 01F3 I 11                    CBA                 MORE THAN REQUIRED CHARS ENTERED ?
 01F4 I 33                    PUL B
SLFTST(A0011.02.081AA CRS SELF-TEST CONTROL ROUTINE)    08/04/78  13:05:55  PAGE   7

 01F5 I 24 01                 BCC    IHX2A        NO-CONTINUE
 01F7 I 16                    TAB                 CONVERT ONLY REQUIRED CHARS
 01F8 I 37           IHX2A    PSH B
 01F9 I FE 0012 D    IHX2     LDX    XSAVE
 01FC I 09                    DEX
 01FD I A6 00                 LDA A  0,X          NEXT CHARACTER TO CONVERT
 01FF I 8D EA                 BSR    CBCDHX       CONVERT TO HEX DIGIT
 0201 I 33                    PUL B
```

```
0202 I 5A                 DEC B                ALL OF NUMBER CONVERTED ?
0203 I 37                 PSH B
0204 I 27 11              BEQ    IHX3          YES-COMPLETE CONVERSION
0206 I 16                 TAB                  SAVE DIGIT
0207 I 32                 PUL A
0208 I 4A                 DEC A
0209 I 36                 PSH A
020A I 09                 DEX
020B I A6 00              LDA A  0,X           NEXT CHARACTER TO CONVERT
020D I FF 0012 D          STX    XSAVE         SAVE INPUT PNTR
0210 I 8D 19              BSR    CBCDHX        CONVERT TO HEX DIGIT
0212 I 48                 ASL A
0213 I 48                 ASL A
0214 I 48                 ASL A
0215 I 48                 ASL A
0216 I 1B                 ABA
0217 I FE 0014 D     IHX3 LDX    XSAV2
021A I A7 00              STA A  0,X           SAVE 1 BYTE OF CONVERTED VALUE
021C I 09                 DEX
021D I FF 0014 D          STX    XSAV2
0220 I 33                 PUL B
0221 I 5D                 TST B                CONVERSION COMPLETE ?
0222 I 37                 PSH B
0223 I 26 D4              BNE    IHX2          NO-CONTINUE
0225 I FE 0010 D    INHXC LDX    IPTADR        RESTORE CONVERSION AREA PNTR
0228 I 33                 PUL B                RESTORE # CHARS ENTERED
0229 I 5D                 TST B                SET CC FOR RETURN
022A I 39                 RTS                  RETURN
                     *
                     *   ... CONVERT CHARACTER IN ACCA TO HEX
                     *
022B I             CBCDHX EQU    *
022B I 80 30              SUB A  #'0
022D I 81 09              CMP A  #9
022F I 23 02              BLS    CBC1
0231 I 80 07              SUB A  #7
0233 I 39            CBC1 RTS
                     *
                     *   ...   PRINT 16 BIT # @ X IN DECIMAL
                     *
0234 I             DECOUT EQU    *
0234 I 4F                 CLR A
0235 I 6D 00              TST    0,X
0237 I 2A 02              BPL    DC01
0239 I 86 2D              LDA A  #'-
023B I 36            DC01 PSH A                SAVE SIGN OF CONVERTED VALUE
023C I 5F                 CLR B
023D I 37                 PSH B                DC2 = 0
023E I 37                 PSH B                DC1 = 0
023F I 37                 PSH B                DCC = 0
SLF ST(A0011.02.081AA CRS SELF-TEST CONTROL ROUTINE)   08/04/78  13:05:56  PAGE   8

0240 I E6 01              LDA B  1,X
0242 I A6 00              LDA A  0,X
0244 I 2A 06              BPL    DC02          JUMP IF POSITIVE #
0246 I 43                 COM A
0247 I 53                 COM B
0248 I CB 01              ADD B  #1
024A I 89 00              ADC A  #0            COMPLEMENT #
024C I 37            DC02 PSH B
024D I 36                 PSH A
024E I 30                 TSX
024F I 5F                 CLR B
0250 I 86 10              LDA A  #16           SET BIT CNT
0252 I 36            DECL PSH A
0253 I 68 01              ASL    1,X
0255 I 69 00              ROL    0,X
0257 I 59                 ROL B
0258 I CB F6              ADD B  #-10
025A I A6 04              LDA A  4,X           DC2
025C I A9 04              ADC A  4,X
025E I 19                 DAA
025F I A7 04              STA A  4,X           LEAST SIGNIFICANT DIGITS
0261 I A6 03              LDA A  3,X           DC1
```

```
0263 I A9 03              ADC A  3,X
0265 I 19                 DAA
0266 I A7 03              STA A  3,X
0268 I A6 02              LDA A  2,X           DC0
026A I A9 02              ADC A  2,X
026C I 19                 DAA
026D I A7 02              STA A  2,X
026F I 5D                 TST B
0270 I 2A 02              BPL    DC03
0272 I C0 F6              SUB B  #-10
0274 I 32           DC03  PUL A
0275 I 4A                 DEC A                CONVERSION COMPLETE ?
0276 I 26 DA              BNE    DECL          NO-CONTINUE
                    *
                    *     ... ACCB CONTAINS LEAST SIGNIFICANT DIGIT
                    *
0278 I 32                 PUL A                REMOVE VALUE
0279 I 32                 PUL A                FROM STACK
027A I 37                 PSH B                SAVE LEAST SIGNIFICANT DIGIT
027B I A6 05              LDA A  5,X           POSITIVE NUMBER ?
027D I 27 02              BEQ    DEC4          YES
027F I 8D 39              BSR    OUTCH         OUTPUT MINUS SIGN
0281 I 08           DEC4  INX                  SET PNTR TO MOST
0282 I 08                 INX                  SIGNIFICANT DIGIT
0283 I C6 83              LDA B  #$83
0285 I A6 00        DEC5  LDA A  0,X
0287 I 26 03              BNE    DEC5A
0289 I 5D                 TST B                BLANK LEADING ZERO ?
028A I 2B 15              BMI    DEC5B         YES - CONTINUE
028C I 37           DEC5A PSH B
028D I 8D 41              BSR    CHEXL
028F I 81 30              CMP A  #'0
0291 I 26 03              BNE    DEC5E
0293 I 5D                 TST B
0294 I 2B 02              BMI    DEC5D
0296 I 8D 22        DEC5E BSR    OUTCH
SLFTST(A0011.02 081AA CRS SELF-TEST CONTROL ROUTINE)    08/04/78  13:05:57  PAGE   9

0298 I A6 00        DEC5D LDA A  0,X
029A I 8D 38              BSR    CHEXR
029C I 8D 1C              BSR    OUTCH
029E I 33                 PUL B
029F I C4 7F              AND B  #$7F
02A1 I 08           DEC5B INX                  SET PNTR TO NEXT BCD GROUP
02A2 I 17                 TBA
02A3 I 84 80              AND A  #$80
02A5 I C4 7F              AND B  #$7F
02A7 I 5A                 DEC B                OUTPUT COMPLETE?
02A8 I 27 04              BEQ    DEC5C         YES - OUTPUT LAST DIGIT
02AA I 1B                 ABA
02AB I 16                 TAB
02AC I 20 D7              BRA    DEC5
02AE I 32           DEC5C PUL A
02AF I 8D 23              BSR    CHEXR
02B1 I 8D 07              BSR    OUTCH         OUTPUT LEAST SIGNIFICANT DIGIT
02B3 I 31                 INS
02B4 I 31                 INS
02B5 I 31                 INS
02B6 I 31                 INS                  RESTORE STACK PNTR
02B7 I 8D 06              BSR    OUTSP
02B9 I 39                 RTS                  RETURN
                    *
                    *     ... OUTPUT CHAR IN ACCA
                    *
02BA I              OCHAR EQU    *
02BA I              OUTCH EQU    *
02BA I 5F                 CLR B
02BB I BD 0002 R          JSR    SCAN.REQ      OUTPUT CHARACTER
02BE I 39                 RTS
                    *
                    *     ... OUTPUT SPACE
                    *
02BF I              OUTSP EQU    *
02BF I 86 20              LDA A  #'
```

```
02C1 I 8D F7                BSR    OUTCH
02C3 I 39                   RTS
                  *
                  *         ... OUTPUT CARRIAGE RETURN
                  *
02C4 I            PCR       EQU    *
02C4 I 86 0D                LDA A  #CR
02C6 I 8D F2                BSR    OUTCH
02C8 I 39                   RTS
                  *
                  *         ... OUTPUT C/R AND LINE FEED
                  *
02C9 I            PCRLF     EQU    *
02C9 I 8D F9                BSR    PCR          OUTPUT C/R
02CB I 86 0A                LDA A  #LF
02CD I 8D E3                BSR    OUTCH        OUTPUT LF
02CF I 39                   RTS
                  *
                  *         ... CONVERT LEFT HEX DIGIT IN ACCA TO ASCII
                  *
02D0 I            CHEXL     EQU    *
02D0 I 44                   LSR A
SLFTST(A0011 02.081AA CRS SELF-TEST CONTROL ROUTINE)    08/04/78  13:05:58  PAGE  10

02D1 I 44                   LSR A
02D2 I 44                   LSR A
02D3 I 44                   LSR A
                  *
                  *         ... CONVERT RIGHT HEX DIGIT IN ACCA TO ASCII
                  *
02D4 I            CHEXR     EQU    *
02D4 I 84 0F                AND A  #$F
02D6 I 8B 30                ADD A  #'0
02D8 I 81 39                CMP A  #'9          DECIMAL DIGIT 0-9 ?
02DA I 23 02                BLS    CHEX1        YES-CONTINUE
02DC I 8B 07                ADD A  #$7          HEX DIGIT
02DE I 39         CHEX1     RTS
                  *
                  *         ... OUTPUT 2 HEX CHARACTERS FROM BYTE @ X
                  *
02DF I            OUT2H     EQU    *
02DF I A6 00                LDA A  0,X
02E1 I 8D ED                BSR    CHEXL        FORM LEFT HEX CHAR
02E3 I 8D D5                BSR    OUTCH        OUTPUT CHARACTER
02E5 I A6 00                LDA A  0,X
02E7 I 08                   INX
02E8 I 8D EA                BSR    CHEXR        FORM RIGHT HEX CHARACTER
02EA I 20 CE                BRA    OUTCH        OUTPUT CHARACTER
                  *
                  *         ... OUTPUT 4 HEX CHARACTERS FROM WORD @ X FOLLOWED BY SPACE
                  *
02EC I            OUT4HS    EQU    *
02EC I 8D F1                BSR    OUT2H
                  *
                  *         ... OUTPUT 2 HEX CHARS FROM BYTE @ X FOLLOWED BY SPACE
                  *
02EE I            OUT2HS    EQU    *
02EE I 8D EF                BSR    OUT2H
02F0 I 20 CD                BRA    OUTSP        OUTPUT SPACE
                  *
                  *         ... PRINT C/R,LF, ASCII DATA @ X
                  *
02F2 I            PDATA     EQU    *
02F2 I 8D D5                BSR    PCRLF        PRINT C/R AND LF
                  *
                  *         ... PRINT ASCII DATA @ X
                  *
02F4 I            PDATA1    EQU    *
02F4 I C6 02                LDA B  #RQFMSG
02F6 I BD 0002 R            JSR    SCAN.REQ     DISPLAY MESG
02F9 I 39                   RTS
                  *
                  *         DECIMAL CONVERSION FACTOR TABLE
                  *
```

```
02FA I                574 DECIML    EQU    *
02FA I 0001      A    575           FDB    1
02FC I 000A      A    576           FDB    10
02FE I 0064      A    577           FDB    100
0300 I 03E8      A    578           FDB    1000
0302 I 2710      A    579           FDB    10000
                      580 *
                      581 *        TEST ROUTINE INDEX TABLE
SLF:ST(A0011.02.081AA CRS SELF-TEST CONTROL ROUTINE)    08/04/78  13:05:59  PAGE  11

                      582 *
                      583           REF    CRS.TIMR      COUNT DOWN TIMER EST
                      584           REF    CRS.SCAN      SELF SCAN UNIT TEST
                      585           REF    CRS.TAPE      CRS MAG TAPE TEST
                      586           REF    CRS.KYBD      CRS KEYBOARD TEST
                      587           REF    CRS.PROM      CRS PROM TEST
                      588           REF    CRS.RAM       CRS RAM TEST
                      589           REF    CRS.PTP       CRS PROCESSOR TO PROCESSOR INTERFACE
                      590           REF    CRS.SATL      CRS 2900 SATELLITE TEST
                      591           REF    CRS.LED       CRS CONTROL PANEL LED DISPLAYS
                      592           REF    CRS.TWHL      CRS CONTROL PANEL THUMBWHEEL SWITCH T      E
                      593           REF    CRS.RTRY      CRS CONTROL PANEL ROTARY SWITCH TEST
                      594           REF    CRS.EXCH      CRS EXAMINE AND DISPLAY MEMORY
                      595           REF    CRS.DDP       CRS DATA DISPLAY SUBSYSTEM TEST
                      596           REF    CRS.DDM       CRS 2900 DATA MEMORY TEST
                      597 *
0304 I                598 SLF.TCTL  EQU    *
0304 I 0008      R    599           FDB    CRS.SCAN
0306 I 000C      R    600           FDB    CRS.RAM
0308 I 000B      R    601           FDB    CRS.PROM
030A I 000A      R    602           FDB    CRS.KYBD
030C I 0010      R    603           FDB    CRS.TWHL
030E I 0011      R    604           FDB    CRS.RTRY
0310 I 000F      R    605           FDB    CRS.LED
0312 I 0007      R    606           FDB    CRS.TIMR
0314 I 000D      R    607           FDB    CRS.PTP
0316 I 000E      R    608           FDB    CRS.SATL
0318 I 0014      R    609           FDB    CRS.DDM
031A I 0013      R    610           FDB    CRS.DDP
031C I 0009      R    611           FDB    CRS.TAPE
031E I 0012      R    612           FDB    CRS.EXCH
0320 I 0000      A    613           FDB    0
0322 I 0000      A    614           FDB    0
0322 I                615 SLF.TEND  EQU    *-2
                      616 *
                      617 *        SELF-TEST SYSTEM MESSAGES
                      618 *
0324 I                619 SLFTID    EQU    *
0324 I AA             620           FCB    '*+$80
0325 I 435253         621           FCC    /CRS SELF-TEST SYSTEM/
0339 I 04             622           FCB    4
                      623 *
033A I                624 SLFSLT    EQU    *
033A I AA             625           FCB    '*+$80
033B I 454E54         626           FCC    /ENTER TEST NUMBER:  /
034F I 04             627           FCB    4
                      628 *
0350 I                629 SLFINV    EQU    *
0350 I AA             630           FCB    '*+$80
0351 I 494E56         631           FCC    /INVALID TEST NUMBER/
0364 I 04             632           FCB    4
                      633 *
0000 D                634           DSEC
                      635 *
                      636 *        CRS SELF-TEST STORAGE REQUIREMENTS
                      637 *
0000 D 00             638 STSTAT    FCB    0             SELF TEST STATUS WORD
0001 D 00             639 SCNENB    FCB    0             SELF-SCAN ENABLE
SLFTST(A0011.02.081AA CRS SELF-TEST CONTROL ROUTINE)    08/04/78  13:06:00  PAGE  12

                      640 *
0002 D                641 IPTVAL    RMB    6             INPUT VALUE SAVE AREA
0008 D 0000      A    642 SLF.TSTN  FDB    0             TEST NUMBER
000A D 0000      A    643 SLF.STAT  FDB    0             SELF-TEST CONTROL WORD
```

```
000C D 0000    A   644 STKSAV    FDB     0           STACK PNTR SAVE AREA
000E D             645 KYENTR    EQU     *
000E D 00          646 KEYENT    FCB     0           KEY ENTERED SAVE AREA
000F D 00          647 ASCHAR    FCB     0           ASCII CHAR SAVE AREA
0010 D 0000    A   648 IPTADR    FDB     0           CONVERSION AREA PNTR
0012 D 0000    A   649 XSAVE     FDB     0           INDEX REGISTER
0014 D 0000    A   650 XSAV2     FDB     0           SAVE AREA
0016 D 0000    A   651 XSAV3     FDB     0           SAVE AREA
0018 D 00          652 DIGSAV    FCB     0           SAVE AREA
                   653 *
0019               654           END
SLFTST(A0011.02.081AA CRS SELF-TEST CONTROL ROUTINE)    08/04/78  13:06:01  PAGE  13

   NO ERRORS
  ISECT LENGTH --   869
  DSECT LENGTH --    25

  ASCHAR     000F D   647    130   173   251   265
  CBC1       0233 I   394    392
< CBCDHX     022B I   389     18   356   368
> CCNT       0005      27     27   145   148   155
  CHEX1      02DE I   536    534
< CHEXL      02D0 I   522     17   460   542
< CHEXR      02D4 I   530     17   467   481   546
  CR         000D A    46    508
> CRS.DDM    0014     596    596   609
> CRS.DDP    0013     595    595   610
> CRS.EXCH   0012     594    594   612
> CRS.KYBD   000A     586    586   602
> CRS.LED    000F     591    591   605
> CRS.PROM   000B     587    587   601
> CRS.PTP    000D     589    589   607
> CRS.RAM    000C     588    588   600
> CRS.RTRY   0011     593    593   604
> CRS.SATL   000E     590    590   608
> CRS.SCAN   0008     584    584   599
> CRS.TAPE   0009     585    585   611
> CRS.TIMR   0007     583    583   606
> CRS.TWHL   0010     592    592   603
> CURCSP     0000      25     25
  DCO1       023B I   403    401
  DCO2       024C I   415    410
  DCO3       0274 I   440    438
  DEC1       01AE I   306    312
  DEC2       01BF I   313    307
  DEC3       0191 I   290    318
  DEC4       0281 I   452    450
  DEC5       0285 I   455    479
  DEC5A      028C I   459    456
  DEC5B      02A1 I   471    458
  DEC5C      02AE I   480    476
  DEC5D      0298 I   466    464
  DEC5E      0296 I   465    462
  DECC       01CC I   319    283   292
  DECIML     02FA I   574    285
< DECIN      017A I   277     10   102
< DECIN.SW   017F I   280     11
  DECL       0252 I   420    442
< DECOUT     0234 I   398     15
  DIGSAV     0018 D   652    303   306
  IHX1       01D8 I   334    328
  IHX1A      01F0 I   347    344
  IHX2       01F9 I   353    321
  IHX2A      01F8 I   352    350
  IHX3       0217 I   374    360
< IN2HX      01D2 I   326     10
< IN4HX      01D6 I   332     10
< INCH       00E2 I   181     10   214   236
  INCH.HX    0090 I   138    147   159   177
  INCH.NHX   008E I   137    133   163   165   167
SLFTST(A0011.02.081AA CRS SELF-TEST CONTROL ROUTINE)    08/04/78  13:06:02  PAGE  14

  INCH.RTN   0080 I   129     80
  INCH1      0104 I   200    198
```

| | Symbol | Value | Type | Defined | References |
|---|---|---|---|---|---|
| | INCH2 | 0098 | I | 143 | 135 |
| | INCH3 | 00BE | I | 160 | 144 |
| | INCH4 | 00D0 | I | 169 | 161 |
| | INCH5 | 00D8 | I | 173 | 171 |
| | INCHL | 00EA | I | 185 | 194 |
| | INHXC | 0225 | I | 382 | 340 |
| > | INICRS | 0006 | | 28 | 28 72 |
| < | IPTADR | 0010 | D | 648 | 20 278 287 313 319 335 341 382 |
| < | IPTVAL | 0002 | D | 641 | 20 233 256 |
| | KEYENT | 000E | D | 646 | 78 200 215 241 |
| | KSWBSP | 000A | A | 54 | 143 242 |
| | KSWDC9 | 0009 | A | 53 | 160 |
| | KSWDDP | 0012 | A | 58 | 164 168 |
| | KSWENT | 000B | A | 55 | 134 |
| | KSWESC | 000E | A | 57 | 68 |
| | KSWPRG | 0017 | A | 59 | 166 |
| | KSWRTY | 000D | A | 56 | 216 |
| | KSWSP2 | 001C | A | 60 | |
| < | KYENTR | 000E | D | 645 | 23 |
| | LCAST2 | 000D | A | 43 | |
| > | LCNT | 0004 | | 27 | 27 |
| | LF | 000A | A | 47 | 516 |
| | LS2DKR | 0080 | A | 44 | |
| > | MPTR | 0003 | | 27 | 27 149 151 156 158 |
| < | OCHAR | 02BA | I | 492 | 14 |
| < | OUT2H | 02DF | I | 540 | 13 552 557 |
| < | OUT2HS | 02EE | I | 556 | 13 |
| < | OUT4HS | 02EC | I | 551 | 13 |
| < | OUTCH | 02BA | I | 493 | 14 175 451 465 468 482 502 509 517 543 547 |
| < | OUTSP | 02BF | I | 500 | 14 153 487 558 |
| < | PCR | 02C4 | I | 507 | 12 515 |
| < | PCRLF | 02C9 | I | 514 | 12 563 |
| < | PDATA | 02F2 | I | 562 | 16 91 100 115 |
| < | PDATA1 | 02F4 | I | 567 | 16 |
| | RDV1 | 014D | I | 251 | 243 |
| | RDV2 | 014B | I | 250 | |
| | RDV3 | 016D | I | 267 | 254 |
| | RDV4 | 0164 | I | 263 | 258 |
| | RDV5 | 015A | I | 257 | 262 |
| | RDV6 | 016E | I | 268 | 266 |
| | RDVAL | 0127 | I | 231 | 279 336 |
| | RDVL | 012E | I | 235 | 245 250 272 |
| | RDVX | 0179 | I | 273 | 240 252 |
| | RQFMSG | 0002 | A | 49 | 568 |
| < | RTYCNT | 0108 | I | 210 | 19 220 |
| | RTYX | 011D | I | 221 | 217 |
| > | SCAN.INI | 0001 | | 26 | 26 83 |
| > | SCAN.REQ | 0002 | | 26 | 26 495 569 |
| | SCNENB | 0001 | D | 639 | |
| < | SLF.INIT | 001F | I | 82 | 7 |
| | SLF.LOOP | 0035 | I | 94 | 74 116 126 199 |
| < | SLF.STAT | 000A | D | 643 | 8 67 76 84 95 124 131 140 182 184 186 192 211 213 221 223 237 |
| | SLF.TCTL | 0304 | I | 598 | 97 107 |
| | SLF.TEND | 0322 | I | 615 | 107 |
| | SLF.TSTN | 0308 | D | 642 | 101 117 |

SLFTST(A0011.02.081AA CRS SELF-TEST CONTROL ROUTINE)    08/04/78 13:06:02 PAGE 15

| | Symbol | Value | Type | Defined | References |
|---|---|---|---|---|---|
| | SLF2 | 0017 | I | 78 | 69 |
| | SLF3 | 000D | I | 73 | 71 |
| | SLF4 | 006A | I | 117 | 113 |
| | SLF5 | 0062 | I | 114 | 106 108 122 |
| | SLFINV | 0350 | I | 629 | 114 |
| | SLFSLT | 033A | I | 624 | 99 |
| | SLFTID | 0324 | I | 619 | 90 |
| < | SLFTST | 0000 | I | 66 | 9 |
| | STC.ABT | 0004 | A | 37 | 75 183 197 |
| | STC.DEC | 0001 | A | 39 | 162 |
| | STC.DKR | 0020 | A | 34 | 73 79 139 185 |
| | STC.ENT | 0010 | A | 35 | 75 138 183 193 |
| | STC.HLD | 0002 | A | 38 | 132 212 222 |
| | STC.RCP | 0008 | A | 36 | 137 183 238 |
| | STC.TIP | 0080 | A | 32 | 123 |
| | STC.TRC | 0040 | A | 33 | 212 222 |

```
STKSAV    000C D   644     87    96
STSTAT    0000 D   638     21    25    86
XSAV2     0014 D   650    286   294   297   308   347   374   377
XSAV3     0016 D   651     98   111   112
XSAVE     0012 D   649     22   234   246   248   263   268   271   298   300   311   353   367
CRSKBD(A0011.02.082AA CRS KEYBOARD TEST)                08/04/78  11:55:50  PAGE   1

                     2 *
                     3 *         CRS KEYBOARD TEST
                     4 *
0000 I               5           ISEC
                     6 *
                     7           DEF    CRS.KYBD
                     8 *
                     9           REF    PDATA,PDATA1
                    10           REF    OUTCH,INCH,PCRLF
                    11           REF    SCNENB
                    12           REF    PCR
                    13 *
                    14           REF    KYENTR
                    15 *
                    16           REF    PTBCNV
                    17           REF    AUXPAR
                    18 *
                    19 *
0000 I              20 CRS.KYBD  EQU    *
0000 I CE 027D I    21           LDX    #KYBD.ID       IDENTIFY TEST
0003 I BD 0000 R    22           JSR    PDATA
0006 I CE 0290 I    23           LDX    #KYBD.INS      OUTPUT TEST
0009 I BD 0000 R    24           JSR    PDATA          INSTRUCTIONS
000C I 86 BE        25 KYBL      LDA A  #'>+$80
000E I BD 0002 R    26           JSR    OUTCH          OUTPUT PROMPT
0011 I BD 0003 R    27           JSR    INCH           INPUT SWITCH ENTRY
0014 I BD 0006 R    28           JSR    PCR
0017 I 86 BE        29           LDA A  #'>+$80
0019 I BD 0002 R    30           JSR    OUTCH
001C I CE 0064 I    31           LDX    #KYBD.MSG
001F I FF 0000 D    32           STX    XSAV
0022 I CE 00BA I    33           LDX    #KYBD.MEN
0025 I FF 0002 D    34           STX    XSV2
0028 I 4F           35           CLR A
0029 I F6 0007 R    36           LDA B  KYENTR         PICK UP SWITCH ENTERED
002C I 58           37           ASL B
002D I FB 0001 D    38           ADD B  XSAV+1
0030 I B9 0000 D    39           ADC A  XSAV
0033 I F7 0001 D    40           STA B  XSAV+1         COMPUTE PNTR TO
0036 I B7 0000 D    41           STA A  XSAV           SWITCH IDENTIFIER
0039 I CE 02B0 I    42           LDX    #KYBD.INV      ANTICIPATE INVALID ENTRY
003C I B1 0002 D    43           CMP A  XSV2           INVALID ?
003F I 22 0C        44           BHI    KYB1           YES
0041 I 25 05        45           BCS    KYB2
0043 I F1 0003 D    46           CMP B  XSV2+1
0046 I 22 05        47           BHI    KYB1
0048 I FE 0000 D    48 KYB2      LDX    XSAV
004B I EE 00        49           LDX    0,X            PICK UP SWITCH IDENTIFIER
004D I 7D 0005 R    50 KYB1      TST    SCNENB         SELF SCAN ENABLED ?
0050 I 26 0A        51           BNE    KYB3           YES - CONTINUE
0052 I F6 0007 R    52           LDA B  KYENTR
0055 I BD 0008 R    53           JSR    PTBCNV         CONVERT KEY ENTERED TO DECIMAL
0058 I B7 0009 R    54           STA A  AUXPAR         DISPLAY TO OPERATOR
005B I 39           55           RTS                   RETURN TO CALLER
005C I BD 0001 R    56 KYB3      JSR    PDATA1         DISPLAY SWITCH ENTERED
005F I BD 0004 R    57           JSR    PCRLF
0062 I 20 A8        58           BRA    KYBL
                    59 *
CRSKBD(A0011.02.082AA CRS KEYBOARD TEST)                08/04/78  11:55:52  PAGE   2

                    60 *         KEYBOARD SWITCH IDENTIFIER INDEX TABLE
                    61 *
0064 I              62 KYBD.MSG  EQU    *
0064 I 00BC    I    63           FDB    SW.DC0         0
0066 I 00BE    I    64           FDB    SW.DC1         1
0068 I 00C0    I    65           FDB    SW.DC2         2
006A I 00C2    I    66           FDB    SW.DC3         3
```

```
006C I 00C4    I   67          FDB    SW.DC4      4
006E I 00C6    I   68          FDB    SW.DC5      5
0070 I 00C8    I   69          FDB    SW.DC6      6
0072 I 00CA    I   70          FDB    SW.DC7      7
0074 I 00CC    I   71          FDB    SW.DC8      8
0076 I 00CE    I   72          FDB    SW.DC9      9
0078 I 00D0    I   73          FDB    SW.BSP      BACKSPACE
007A I 00DA    I   74          FDB    SW.ENT      ENTRY
007C I 00E0    I   75          FDB    SW.CNT      CONTINUE
007E I 00E9    I   76          FDB    SW.RTY      RETRY
0080 I 00EF    I   77          FDB    SW.ESC      ESCAPE
0082 I 00F6    I   78          FDB    SW.TLS      TILT SEARCH
0084 I 0102    I   79          FDB    SW.PRT      PRINTER RESET
0086 I 0110    I   80          FDB    SW.TIM      TIME-OF-DAY
0088 I 011A    I   81          FDB    SW.DDP      DISPLAY DEPLOYMENT
008A I 012D    I   82          FDB    SW.SID      STATION IDENTIFICATION
008C I 0144    I   83          FDB    SW.RID      RTU IDENTIFICATION
008E I 0157    I   84          FDB    SW.DPY      DEPLOYMENT
0090 I 015E    I   85          FDB    SW.DST      DEAD STATION
0092 I 016B    I   86          FDB    SW.PRG      PROGRAM
0094 I 0173    I   87          FDB    SW.TBP      TAPE BY-PASS
0096 I 0180    I   88          FDB    SW.CST      CHANNEL STATUS
0098 I 018F    I   89          FDB    SW.UST      UNIT STATUS
009A I 019B    I   90          FDB    SW.CBP      CAMERA BY-PASS
009C I 01AA    I   91          FDB    SW.SYS      SYSTEM TEST
009E I 01B4    I   92          FDB    SW.BST      BLASTER TEST
00A0 I 01C1    I   93          FDB    SW.PFT      PERFORMANCE TEST
00A2 I 01D2    I   94          FDB    SW.LMP      LAMP TEST
00A4 I 01DC    I   95          FDB    SW.MNT      MULTIPLE NORMAL TEST
00A6 I 01F1    I   96          FDB    SW.SNT      SINGLE NORMAL TEST
00A8 I 0204    I   97          FDB    SW.SPR      SPREAD ADVANCE
00AA I 0213    I   98          FDB    SW.SPT      SHOT POINT ADVANCE
00AC I 0226    I   99          FDB    SW.TST      AUTO FIRE MULTIPLE NORMAL TEST
00AE I 0245    I  100          FDB    SW.OVR      OVERRIDE
00B0 I 024E    I  101          FDB    SW.FIR      FIRE
00B2 I 0253    I  102          FDB    SW.SP3      SPARE
00B4 I 0253    I  103          FDB    SW.SP4      SPARE
00B6 I 0259    I  104          FDB    SW.FPT      FILE PRESET
00B8 I 0265    I  105          FDB    SW.HDR      REEL HEADER
00BA I 0271    I  106          FDB    SW.SCH      FILE SEARCH
00BA I                107 KYBD.MEN  EQU    *-2
                      108 *
                      109 *        KEYBOARD SWITCH ID MESSAGES
                      110 *
00BC I 30             111 SW.DC0    FCC    /0/
00BD I 04             112           FCB    4
                      113 *
00BE I 31             114 SW.DC1    FCC    /1/
00BF I 04             115           FCB    4
                      116 *
00C0 I 32             117 SW.DC2    FCC    /2/
CRSKBD(A0011 02.082AA CRS KEYBOARD TEST)              08/04/78  11:55:54  PAGE   3

00C1 I 04             118           FCB    4
                      119 *
00C2 I 33             120 SW.DC3    FCC    /3/
00C3 I 04             121           FCB    4
                      122 *
00C4 I 34             123 SW.DC4    FCC    /4/
00C5 I 04             124           FCB    4
                      125 *
00C6 I 35             126 SW.DC5    FCC    /5/
00C7 I 04             127           FCB    4
                      128 *
00C8 I 36             129 SW.DC6    FCC    /6/
00C9 I 04             130           FCB    4
                      131 *
00CA I 37             132 SW.DC7    FCC    /7/
00CB I 04             133           FCB    4
                      134 *
00CC I 38             135 SW.DC8    FCC    /8/
00CD I 04             136           FCB    4
                      137 *
00CE I 39             138 SW.DC9    FCC    /9/
```

```
00CF I 04           139           FCB    4
                    140 *
00D0 I 424143       141 SW.BSP    FCC    /BACKSPACE/
00D9 I 04           142           FCB    4
                    143 *
00DA I 454E54       144 SW.ENT    FCC    /ENTER/
00DF I 04           145           FCB    4
                    146 *
00E0 I 434F4E       147 SW.CNT    FCC    /CONTINUE/
00E8 I 04           148           FCB    4
                    149 *
00E9 I 524554       150 SW.RTY    FCC    /RETRY/
00EE I 04           151           FCB    4
                    152 *
00EF I 455343       153 SW.ESC    FCC    /ESCAPE/
00F5 I 04           154           FCB    4
                    155 *
00F6 I 54494C       156 SW.TLS    FCC    /TILT SEARCH/
0101 I 04           157           FCB    4
                    158 *
0102 I 505249       159 SW.PRT    FCC    /PRINTER RESET/
010F I 04           160           FCB    4
                    161 *
0110 I 444154       162 SW.TIM    FCC    /DATE-TIME/
0119 I 04           163           FCB    4
                    164 *
011A I 444953       165 SW.DDP    FCC    /DISPLAY DEPLOYMENT/
012C I 04           166           FCB    4
                    167 *
012D I 535441       168 SW.SID    FCC    /STATION IDENTIFICATION/
0143 I 04           169           FCB    4
                    170 *
0144 I 525455       171 SW.RID    FCC    /RTU IDENTIFICATION/
0156 I 04           172           FCB    4
                    173 *
0157 I 444550       174 SW.DPY    FCC    /DEPLOY/
015D I 04           175           FCB    4
CRSKBD(A0011.02.082AA CRS KEYBOARD TEST)              08/04/78  11:55:55  PAGE   4

                    176 *
015E I 444541       177 SW.DST    FCC    /DEAD STATION/
016A I 04           178           FCB    4
                    179 *
016B I 50524F       180 SW.PRG    FCC    /PROGRAM/
0172 I 04           181           FCB    4
                    182 *
0173 I 544150       183 SW.TBP    FCC    /TAPE BY-PASS/
017F I 04           184           FCB    4
                    185 *
0180 I 434841       186 SW.CST    FCC    /CHANNEL STATUS/
018E I 04           187           FCB    4
                    188 *
018F I 554E49       189 SW.UST    FCC    /UNIT STATUS/
019A I 04           190           FCB    4
                    191 *
019B I 43414D       192 SW.CBP    FCC    /CAMERA BY-PASS/
01A9 I 04           193           FCB    4
                    194 *
01AA I 2A2028       195 SW.SYS    FCC    /* (SPARE)/
01B3 I 04           196           FCB    4
                    197 *
01B4 I 424C41       198 SW.BST    FCC    /BLASTER TEST/
01C0 I 04           199           FCB    4
                    200 *
01C1 I 504552       201 SW.PFT    FCC    /PERFORMANCE TEST/
01D1 I 04           202           FCB    4
                    203 *
                    204 *
01D2 I 4C414D       205 SW.LMP    FCC    /LAMP TEST/
01DB I 04           206           FCB    4
                    207 *
01DC I 4D554C       208 SW.MNT    FCC    /MULTIPLE NORMAL TEST/
01F0 I 04           209           FCB    4
                    210 *
```

```
 01F1 I 53494E       211 SW.SNT     FCC     /SINGLE NORMAL TEST/
 0203 I 04           212            FCB     4
                     213 *
 0204 I 535052       214 SW.SPR     FCC     /SPREAD ADVANCE/
 0212 I 04           215            FCB     4
                     216 *
 0213 I 53484F       217 SW.SPT     FCC     /SHOT POINT ADVANCE/
 0225 I 04           218            FCB     4
                     219 *
 0226 I 415554       220 SW.TST     FCC     /AUTO FIRE MULTIPLE NORMAL TEST/
 0244 I 04           221            FCB     4
                     222 *
 0245 I 4F5645       223 SW.OVR     FCC     /OVERRIDE/
 024D I 04           224            FCB     4
                     225 *
 024E I 464952       226 SW.FIR     FCC     /FIRE/
 0252 I 04           227            FCB     4
                     228 *
 0253 I              229 SW.SP3     EQU     *
                     230 *
 0253 I              231 SW.SP4     EQU     *
 0253 I 535041       232            FCC     /SPARE/
 0258 I 04           233            FCB     4
CRSKBD(A0011.02.082AA CRS KEYBOARD TEST)              08/04/78  11:55:57  PAGE   5

                     234 *
 0259 I 46494C       235 SW.FPT     FCC     /FILE PRESET/
 0264 I 04           236            FCB     4
                     237 *
 0265 I 524545       238 SW.HDR     FCC     /REEL HEADER/
 0270 I 04           239            FCB     4
                     240 *
 0271 I 46494C       241 SW.SCH     FCC     /FILE SEARCH/
 027C I 04           242            FCB     4
                     243 *
                     244 *        KEYBOARD TEST MESSAGES
                     245 *
 027D I BE           246 KYBD.ID    FCB     '>+$80
 027E I 435253       247            FCC     /CRS KEYBOARD TEST/
 028F I 04           248            FCB     4
                     249 *
 0290 I BE           250 KYBD.INS   FCB     '>+$80
 0291 I 444550       251            FCC     /DEPRESS KEY AFTER '>' PROMPT/
 02AD I 0D           252            FCB     $D,$A
 02AE I 0A
 02AF I 04           253            FCB     4
                     254 *
 02B0 I 494E56       255 KYBD.INV   FCC     /INVALID KEY ENTRY/
 02C1 I 04           256            FCB     4
                     257 *
 0000 D              258            DSEC
                     259 *
 0000 D 0000     A   260 XSAV       FDB     0           IDX SAVE AREA
 0002 D 0000     A   261 XSV2       FDB     0           ALTERNATE SAVE AREA
                     262 *
 0004                263            END
CRSKBD(A0011.02.082AA CRS KEYBOARD TEST)              08/04/78  11:55:58  PAGE   6

   NO ERRORS
 ISECT LENGTH --    706
 DSECT LENGTH --      4

> AUXPAR    0009      17      17     54
< CRS.KYBD  0000 I    20       7
> INCH      0003      10      10     27
  KYB1      004D I    50      44     47
  KYB2      0048 I    48      45
  KYB3      005C I    56      51
  KYBD.ID   027D I   246      21
  KYBD.INS  0290 I   250      23
  KYBD.INV  02B0 I   255      42
  KYBD.MEN  00BA I   107      33
  KYBD.MSG  0064 I    62      31
  KYBL      000C I    25      58
```

```
KYENTR    0007      14     14    36    52
OUTCH     0002      10     10    26    30
PCR       0006      12     12    28
PCRLF     0004      10     10    57
PDATA     0000       9      9    22    24
PDATA1    0001       9      9    56
PTBCNV    0008      16     16    53
SCNENB    0005      11     11    50
SW.BSP    00D0 I   141     73
SW.BST    01B4 I   198     92
SW.CBP    019B I   192     90
SW.CNT    00E0 I   147     75
SW.CST    0180 I   186     88
SW.DC0    00BC I   111     63
SW.DC1    00BE I   114     64
SW.DC2    00C0 I   117     65
SW.DC3    00C2 I   120     66
SW.DC4    00C4 I   123     67
SW.DC5    00C6 I   126     68
SW.DC6    00C8 I   129     69
SW.DC7    00CA I   132     70
SW.DC8    00CC I   135     71
SW.DC9    00CE I   138     72
SW.DDP    011A I   165     81
SW.DPY    0157 I   174     84
SW.DST    015E I   177     85
SW.ENT    00DA I   144     74
SW.ESC    00EF I   153     77
SW.FIR    024E I   226    101
SW.FPT    0259 I   235    104
SW.HDR    0265 I   238    105
SW.LMP    01D2 I   205     94
SW.MNT    01DC I   208     95
SW.OVR    0245 I   223    100
SW.PFT    01C1 I   201     93
SW.PRG    016B I   180     86
SW.PRT    0102 I   159     79
SW.RID    0144 I   171     83
SW.RTY    00E9 I   150     76
SW.SCH    0271 I   241    106
SW.SID    012D I   168     82
CRSKBD(A0011.02.082AA CRS KEYBOARD TEST)                    08/04/78  11:55:59  PAGE   7

SW.SNT    01F1 I   211     96
SW.SP3    0253 I   229    102
SW.SP4    0253 I   231    103
SW.SPR    0204 I   214     97
SW.SPT    0213 I   217     98
SW.SYS    01AA I   195     91
SW.TBP    0173 I   183     87
SW.TIM    0110 I   162     80
SW.TLS    00F6 I   156     78
SW.TST    0226 I   220     99
SW.UST    013F I   189     89
XSAV      0000 D   260     32    38    39    40    41    48
XSV2      0002 D   261     34    43    46
CRSCAN(A0011.02.083AA CRS SELF SCAN TEST)                   08/04/78  13:12:19  PAGE   1

                       2 *
                       3 *          CRS SELF-SCAN TEST
                       4 *
0000 I                 5             ISEC
                       6 *
                       7            DEF      CRS.SCAN
                       8            DEF      SCNERR
                       9            DEF      SCNENB
                      10 *
                      11            REF      AUXPAR,AUXDTB
                      12 *
                      13            REF      DLYRTN
                      14 *
                      15            REF      RAM.MOD
                      16            REF      ERRCNT
                      17            REF      AUXDTB
```

```
                                    REF     SCAN.MEM
                        *
                                    REF     RTYCNT
                                    REF     RAM.IN2
                        *
0000 I                  CRS.SCAN    EQU     *
                        *
                        **
                        **          SELF-SCAN MEMORY TEST
                        **
                        *
0000 I 86 01                        LDA A   #1
0002 I B7 0000 R                    STA A   AUXPAR      SET TEST 1 IDENTIFIER
0005 I 7F 0001 R                    CLR     AUXDTB      SETUP GOOD COMPLETION CODE
0008 I 7F 0000 D                    CLR     SCNERR
000B I 86 01                        LDA A   #1
000D I B7 0003 R                    STA A   RAM.MOD     SETUP RAM MEMORY TEST LOOP MODE
0010 I 4F                           CLR A
0011 I CE 0005 R                    LDX     #SCAN.MEM
0014 I BD 0007 R                    JSR     RAM.IN2     ZERO SELF SCAN MEMORY
0017 I 7D 0004 R                    TST     ERRCNT      ANY ERRORS ?
001A I 26 0D                        BNE     SCN1        YES-NOTIFY OPERATOR
001C I 86 FF                        LDA A   #$FF
001E I CE 0005 R                    LDX     #SCAN.MEM   LITE UP ENTIRE MATRIX
0021 I BD 0007 R                    JSR     RAM.IN2     FOR EACH SELF SCAN POSITION
0024 I 7D 0004 R                    TST     ERRCNT
0027 I 27 14                        BEQ     SCN2
0029 I 86 AA            SCN1        LDA A   #$AA
002B I B7 0001 R                    STA A   AUXDTB      SETUP ERROR CODE IN COMPLETION STATUS
002E I B7 0000 D                    STA A   SCNERR      SET SELF SCAN ERROR FLAG
0031 I CE 1388 A                    LDX     #5000
0034 I BD 0002 R                    JSR     DLYRTN
0037 I 7D 0000 D                    TST     SCNERR      ANY ERRORS ?
003A I 27 01                        BEQ     SCN2        NO-CONTINUE
003C I 39               SCNX        RTS                 RETURN
                        *
                        **
                        **          SELF SCAN SCREEN POSITION MATRIX TEST
                        **
                        *
003D I                  SCN2        EQU     *
003D I 86 02                        LDA A   #2
CRSCAN(A0011.02.083AA CRS SELF SCAN TEST)                  08/04/78  13:12:21  PAGE  2

003F I B7 0000 R                    STA A   AUXPAR      SET TEST 2 IDENTIFIER
0042 I 86 AA                        LDA A   #$AA        ANTICIPATE ERROR
0044 I 36                           PSH A
0045 I BD 0006 R                    JSR     RTYCNT      RETRY OR CONTNUE ?
0048 I 32                           PUL A
0049 I 26 11                        BNE     SCN3A       NO ERROR IF CONTINUE
004B I B7 0001 R                    STA A   AUXDTB      SET ERROR COMPLETION CODE
004E I B7 0000 D                    STA A   SCNERR      SET SELF SCAN ERROR
0051 I CE 1388 A        SCN3        LDX     #5000
0054 I BD 0002 R                    JSR     DLYRTN
0057 I 7D 0000 D                    TST     SCNERR      ANY ERRORS ?
005A I 26 E0                        BNE     SCNX        YES - EXIT
                        *
                        **
                        **          SELF SCAN CHARACTER GENERATOR TEST
                        **
                        *
005C I 86 03            SCN3A       LDA A   #3
005E I B7 0000 R                    STA A   AUXPAR      SET TEST 3 IDENTIFIER
0061 I 86 20                        LDA A   #$20        INIT. GENERATOR TEST CHARACTER
0063 I CE 0005 R        SCN5        LDX     #SCAN.MEM
0066 I BD 0007 R                    JSR     RAM.IN2     MOVE CHARACTER INTO ALL SCREEN POSITI     O
0069 I 36                           PSH A
006A I BD 0006 R                    JSR     RTYCNT      RETRY OR CONTINUE
006D I 32                           PUL A
006E I 26 0F                        BNE     SCN4        NO ERROR IF RETRY
0070 I 86 AA                        LDA A   #$AA
0072 I B7 0001 R                    STA A   AUXDTB      SET BAD COMPLETION CODE
0075 I B7 0000 D                    STA A   SCNERR      SET SELF SCAN ERROR FLAG
0078 I CE 1388 A        SCN6        LDX     #5000
```

```
007B I BD 0002 R        90          JSR    DLYRTN
007E I 39               91 SCN6A    RTS
007F I 4C               92 SCN4     INC A
0080 I 81 5F            93          CMP A  #$5F       ENTIRE CHARACTER SET PROCESSED ?
0082 I 23 DF            94          BLS    SCN5       NO-CONTINUE
0084 I 20 F8            95          BRA    SCN6A      DISPLAY GOOD COMPLETION CODE
                        96 *
0000 D                  97          DSEC
                        98 *
                        99 *       STORAGE REQUIREMENTS
                       100 *
0000 D 00              101 SCNERR   FCB    0          SELF SCAN TEST ERROR FLAG
0001 D 00              102 SCNENB   FCB    0          SELF SCAN TEST SYSTEM ENABLE FLAG
                       103 *
0002                   104          END
CRSCAN(A0011.02.083AA CRS SELF SCAN TEST)             08/04/78  13:12:22  PAGE   3

  NO ERRORS
 ISECT LENGTH --   134
 DSECT LENGTH --     2

> AUXDTB    0001     11     11    17    31    46    66    87
> AUXPAR    0000     11     11    30    60    78
< CRS.SCAN  0000 I   23      7
> DLYRTN    0002     13     13    49    69    90
> ERRCNT    0004     16     16    38    43
> RAM.IN2   0007     21     21    37    42    81
> RAM.MOD   0003     15     15    34
> RTYCNT    0006     20     20    63    83
> SCAN.MEM  0005     18     18    36    41    80
  SCN1      0029 I   45     39
  SCN2      003D I   58     44    51
  SCN3      0051 I   68
  SCN3A     005C I   77     65
  SCN4      007F I   92     85
  SCN5      0063 I   80     94
  SCN6      0078 I   89
  SCN6A     007E I   91     95
< SCNENB    0001 D  102      9
< SCNERR    0000 D  101      8    32    47    50    67    70    88
  SCNX      003C I   52     71
CRSRAM(A0011.02.084AA CRS RAM MEMORY TEST)            08/04/78  10:23:44  PAGE   1

                         2 *
                         3 *        CENTRAL RECORDING STATION RAM MEMORY TEST
                         4 *
0000 I                   5          ISEC
                         6 *
                         7          DEF    CRS.RAM
                         8          DEF    RAM.IN2,SCAN.MEM
                         9          DEF    ERRCNT
                        10          DEF    RAM.MOD
                        11 *
                        12          REF    PDATA,OUTSP,OUTCH,DECIN
                        13          REF    RTYCNT
                        14          REF    PCRLF,OUT4HS,OUT2HS
                        15 *
                        16          REF    SCNENB
                        17          REF    IN4HX
                        18 *
                        19 *
                        20 *
0000 I                  21 CRS.RAM  EQU    *
                        22 *
                        23 *        RAM MEMORY PATTERN TEST
                        24 *
0000 I CE 0244 I        25          LDX    #RAM.ID
0003 I BD 0000 R        26          JSR    PDATA      IDENTIFY TEST
0006 I CE 027C I        27          LDX    #RAM.PTRN
0009 I BD 0000 R        28          JSR    PDATA      IDENTIFY PATTERN MEMORY TEST
000C I CE 0295 I        29          LDX    #SLCT.MOD
000F I BD 0000 R        30          JSR    PDATA      TELL OPERATOR TO SELECT MODE
0012 I CE 8F04 A        31          LDX    #RAM.MOD-1
0015 I BD 0003 R        32          JSR    DECIN      INPUT MODE INDICATOR
```

```
                     *
0018 I               PTNI    EQU    *
0018 I CE 0224 I             LDX    #PTRN.CTB
001B I FF 8F00 A     PTNL    STX    PTR.CTB     INIT. CONTROL TABLE PNTR
001E I 7F 8F13 A             CLR    INIMOD
0021 I A6 00                 LDA A  0,X         PICK UP BYTE PATTERN
0023 I CE 0018 I             LDX    #PTNI       TEST RESTART ADDR
0026 I BD 01A0 I             JSR    RAM.INIT
0029 I 7C 8F13 A             INC    INIMOD
002C I FE 8F00 A             LDX    PTR.CTB
002F I A6 00                 LDA A  0,X
0031 I CE 0018 I             LDX    #PTNI
0034 I BD 01A0 I             JSR    RAM.INIT    INIT. RAM WITH SPECIFIED BYTE PATTERN
0037 I FE 8F00 A             LDX    PTR.CTB
003A I 08                    INX
003B I 6D 00                 TST    0,X         END-OF-TEST
003D I 26 DC                 BNE    PTNL        NO - CONTINUE WITH NEXT PATTERN
003F I 6D 01                 TST    1,X
0041 I 26 D8                 BNE    PTNL
0043 I 7D 8F05 A             TST    RAM.MOD     LOOP MODE ?
0046 I 26 D0                 BNE    PTNI        YES - CONTINUE WITH PATTERN TEST
                     *
                     *       CRS WALKING BIT TEST
                     *
0048 I CE 02C0 I             LDX    #RAM.WALK
004B I BD 0000 R             JSR    PDATA       IDENTIFY WALKING BIT TEST
004E I CE 0295 I             LDX    #SLCT.MOD
CRSRAM(A0011 02.084AA CRS RAM MEMORY TEST)             08/04/78  10:23:45  PAGE  2

0051 I BD 0000 R             JSR    PDATA
0054 I CE 8F04 A             LDX    #RAM.MOD-1
0057 I BD 0003 R             JSR    DECIN       INPUT MODE INDICATOR
005A I FE 022C I             LDX    MEM.TBL
005D I FF 8F14 A             STX    MTB.WLKB
0060 I FE 022E I             LDX    MEM.TBL+2
0063 I FF 8F16 A             STX    MTB.WLKE
0066 I CE 0000 A             LDX    #0
0069 I FF 8F18 A             STX    MTB.WKEN
006C I FF 8F1A A             STX    MTB.WKEN+2
006F I CE 0259 I     WLKI2   LDX    #BEG.ADDR
0072 I BD 0000 R             JSR    PDATA
0075 I CE 8F14 A             LDX    #MTB.WLKB   DISPLAY AND UPDATE
0078 I BD 0006 R             JSR    OUT4HS      BEGINNING
007B I CE 8F14 A             LDX    #MTB.WLKB   MEMORY
007E I BD 0009 R             JSR    IN4HX
0081 I CE 026C I             LDX    #END.ADDR
0084 I BD 0000 R             JSR    PDATA
0087 I CE 8F16 A             LDX    #MTB.WLKE   DISPLAY AND UPDATE
008A I BD 0006 R             JSR    OUT4HS      ENDING
008D I CE 8F16 A             LDX    #MTB.WLKE   MEMORY
0090 I BD 0009 R             JSR    IN4HX       ADDR
0093 I CE 8F16 A             LDX    #MTB.WLKE
0096 I A6 00                 LDA A  0,X
0098 I E6 01                 LDA B  1,X
009A I B1 8F14 A             CMP A  MTB.WLKB
009D I 26 03                 BNE    WLKI1
009F I F1 8F15 A             CMP B  MTB.WLKB+1  ENDING ADDR < BEGINNING ADDR
00A2 I 23 CB         WLKI1   BLS    WLKI2       YES-REENTER
00A4 I               WLKI    EQU    *
00A4 I 4F                    CLR A
00A5 I B7 8F00 A     WLKS    STA A  PTR.CTB     SAVE TEST BIT STATUS
00A8 I CE 00A4 I             LDX    #WLKI
00AB I 7F 8F13 A             CLR    INIMOD
00AE I BD 01A0 I             JSR    RAM.INIT    INIT. RAM WITH SPECIFIED PATTERN
00B1 I CE 8F14 A             LDX    #MTB.WLKB
00B4 I FF 8F02 A             STX    PTR.MEM     INIT. MEMORY SPACE CNTRL TABLE PNTR
00B7 I FE 8F02 A     WLKP    LDX    PTR.MEM
00BA I EE 02                 LDX    2,X
00BC I FF 8F08 A             STX    PTR.PBND    MEMORY PARTITION UPPER LIMIT
00BF I FE 8F02 A             LDX    PTR.MEM
00C2 I EE 00                 LDX    0,X
00C4 I FF 8F06 A     WLKB    STX    PTR.CADR    CURRENT RAM MEMORY PNTR
00C7 I 4F                    CLR A
00C8 I 0D                    SEC
```

```
00C9 I 46                      ROR A
00CA I B7 8F01 A     WLKM      STA A   RAM.MSK      SAVE CURRENT BIT MASK
00CD I 7D 8F00 A               TST     PTR.CTB      WALKING 1 BIT ?
00D0 I 27 01                   BEQ     WLK1         YES
00D2 I 43                      COM A                WALKING 0 BIT
00D3 I FE 8F06 A     WLK1      LDX     PTR.CADR
00D6 I A7 00                   STA A   0,X          MOVE VALUE INTO MEMORY
00D8 I CE 8F14 A               LDX     #MTB.WLKB
00DB I FF 8F0A A               STX     PTR.MEMA     INIT. MEMORY SPACE CNTRL TABLE PNTR
00DE I FE 8F0A A     WLK5      LDX     PTR.MEMA
00E1 I EE 02                   LDX     2,X
00E3 I FF 8F0E A               STX     PTR.EBND     MEMORY PARTITION UPPER LIMIT
00E6 I FE 8F0A A               LDX     PTR.MEMA
CRSRAM(A0011.02.084AA CRS RAM MEMORY TEST)          08/04/78  10:23:45  PAGE   3

00E9 I EE 00                   LDX     0,X
00EB I FF 8F0C A               STX     PTR.EADR     CURRENT RAM MEMORY PNTR
00EE I A6 00         WLK4      LDA A   0,X
00F0 I B1 8F00 A               CMP A   PTR.CTB      RAM VALUE = EXPECTED VALUE
00F3 I 27 4C                   BEQ     WLK2B        YES - CONTINUE
00F5 I BC 8F06 A               CPX     PTR.CADR     WALKING BIT ADDR ?
00F8 I 26 0C                   BNE     WLK3         NO - ADDRESSING ERROR
00FA I 16                      TAB
00FB I 7D 8F00 A               TST     PTR.CTB
00FE I 27 01                   BEQ     WLK4A
0100 I 53                      COM B
0101 I F1 8F01 A     WLK4A     CMP B   RAM.MSK      MATCH ?
0104 I 27 3B                   BEQ     WLK2B        YES
0106 I FF 8F0C A     WLK3      STX     PTR.EADR
0109 I 36                      PSH A                SAVE BYTE READ FROM RAM
010A I BD 0005 R               JSR     PCRLF
010D I 86 BE                   LDA A   #'>+$80
010F I BD 0002 R               JSR     OUTCH
0112 I CE 8F06 A               LDX     #PTR.CADR
0115 I BD 0006 R               JSR     OUT4HS       DISPLAY CURRENT WALKING BIT ADDR
0118 I CE 8F0C A               LDX     #PTR.EADR
011B I BD 0006 R               JSR     OUT4HS       DISPLAY ERROR ADDR
011E I CE 8F00 A               LDX     #PTR.CTB
0121 I BD 0007 R               JSR     OUT2HS       DISPLAY EXPECTED VALUE
0124 I 30                      TSX
0125 I BD 0007 R               JSR     OUT2HS       DISPLAY ACTURAL VALUE
0128 I 32                      PUL A
0129 I 7D 8F05 A               TST     RAM.MOD      LOOP MODE ?
012C I 26 10                   BNE     WLK2         YES -CONTINUE
012E I BD 0005 R               JSR     PCRLF
0131 I 86 BE                   LDA A   #'>+$80
0133 I BD 0002 R               JSR     OUTCH
0136 I BD 0004 R               JSR     RTYCNT       RETRY - CONTINUE
0139 I 26 03                   BNE     WLK2         JUMP IF CONTINUE
013B I 7E 00A4 I     WLKIB     JMP     WLKI         JUMP IF RETRY
013E I FE 8F0C A     WLK2      LDX     PTR.EADR
0141 I BC 8F0E A     WLK2B     CPX     PTR.EBND     END-OF-PARTITION
0144 I 27 03                   BEQ     WLK6         YES - PROCESS NEXT PARTITION
0146 I 08                      INX
0147 I 20 A5                   BRA     WLK4         TEST NEXT BYTE
0149 I FE 8F0A A     WLK6      LDX     PTR.MEMA
014C I 08                      INX
014D I 08                      INX
014E I 08                      INX
014F I 08                      INX
0150 I FF 8F0A A               STX     PTR.MEMA
0153 I EE 02                   LDX     2,X          ALL-OF-MEMORY CHECKED ?
0155 I 26 87                   BNE     WLK5         NO - CONTINUE
0157 I FE 8F06 A               LDX     PTR.CADR
015A I B6 8F00 A               LDA A   PTR.CTB
015D I A7 00                   STA A   0,X          RESTORE WALKING BIT LOCATION
015F I B6 8F01 A               LDA A   RAM.MSK
0162 I 0C                      CLC
0163 I 46                      ROR A                BIT MOVED THRU ALL OF BYTE ?
0164 I 26 09                   BNE     WLK6B        NO - CONTINUE
0166 I BC 8F08 A               CPX     PTR.PBND     END-OF-PARTITION ?
0169 I 27 07                   BEQ     WLK7         YES - CHECK END-OF-MEMORY
016B I 08                      INX
```

```
CRSRAM(A0011.02.084AA CRS RAM MEMORY TEST)          08/04/78  10:23:46  PAGE   4

016C I 7E 00C4 I   176 WLK6A    JMP   WLKB        CONTINUE WITH NEXT BYTE
016F I 7E 00CA I   177 WLK6B    JMP   WLKM
0172 I FE 8F02 A   178 WLK7     LDX   PTR.MEM
0175 I 08          179          INX
0176 I 08          180          INX
0177 I 08          181          INX
0178 I 08          182          INX
0179 I FF 8F02 A   183          STX   PTR.MEM
017C I EE 02       184          LDX   2,X
017E I 27 03       185          BEQ   WLK7A
0180 I 7E 00B7 I   186          JMP   WLKP        END-OF-MEMORY ?
0183 I 86 FF       187 WLK7A    LDA A #$FF
0185 I 7D 8F00 A   188          TST   PTR.CTB     WALKING 1 TEST ?
0188 I 26 03       189          BNE   WLK7B
018A I 7E 00A5 I   190          JMP   WLKS        YES - PERFORM WALKING 0 TES
018D I 7D 8F05 A   191 WLK7B    TST   RAM.MOD     LOOP MODE ?
0190 I 26 A9       192          BNE   WLKIB       YES - RESTART TEST
0192 I BD 0005 R   193          JSR   PCRLF
0195 I 86 BE       194          LDA A #'>+$80
0197 I BD 0002 R   195          JSR   OUTCH
019A I BD 0004 R   196          JSR   RTYCNT      RETRY - CONTINUE
019D I 27 9C       197          BEQ   WLKIB       RESTART TEST IF RETRY
019F I 39          198          RTS               RETURN TO CALLER
                   199 *
                   200 *        ROUTINE TO INITIALIZE RAM WITH SPECIFIED MEMORY PATTERN
                   201 *
                   202 *             CALLING SEQUENCE:  JSR  RAM.INIT
                   203 *
                   204 *                                 ACCA => 8 BIT PATTERN
                   205 *                                 IDX  => RESTART ADDR
                   206 *
01A0 I             207 RAM.INIT EQU   *
01A0 I FF 8F10 A   208          STX   RAM.RST     SAVE TEST RESTART ADDR
01A3 I CE 022C I   209          LDX   #MEM.TBL
01A6 I 20 03       210          BRA   RIN5
01A8 I             211 RAM.IN2  EQU   *
01A8 I 7F 8F13 A   212          CLR   INIMOD
01AB I FF 8F02 A   213 RIN5     STX   PTR.MEM     INIT.MEMORY SPACE CONTROL TABLE
01AE I 7F 8F12 A   214          CLR   ERRCNT
01B1 I FE 8F02 A   215 RIN4     LDX   PTR.MEM
01B4 I EE 02       216          LDX   2,X
01B6 I FF 8F08 A   217          STX   PTR.PBND    PARTITION UPPER LIMIT
01B9 I FE 8F02 A   218          LDX   PTR.MEM
01BC I EE 00       219          LDX   0,X
01BE I FF 8F06 A   220 RIN3     STX   PTR.CADR    CURRENT RAM MEMORY PNTR
01C1 I 7D 8F13 A   221          TST   INIMOD
01C4 I 26 02       222          BNE   RIN6
01C6 I A7 00       223          STA A 0,X         SET PATTERN INTO MEMORY
01C8 I A1 00       224 RIN6     CMP A 0,X         MEMORY CHANGE SUCCESSFUL
01CA I 36          225          PSH A
01CB I 27 3C       226          BEQ   RIN1
01CD I 86 01       227          LDA A #1
01CF I B7 8F12 A   228          STA A ERRCNT
01D2 I 7D 0008 R   229          TST   SCNENB      SELF SCAN ENABLED ?
01D5 I 27 32       230          BEQ   RIN1        NO
01D7 I BD 0005 R   231          JSR   PCRLF
01DA I 86 BE       232          LDA A #'>+$80
01DC I BD 0002 R   233          JSR   OUTCH
CRSRAM(A0011.02.084AA CRS RAM MEMORY TEST)          08/04/78  10:23:47  PAGE   5

01DF I CE 8F06 A   234          LDX   #PTR.CADR
01E2 I BD 0006 R   235          JSR   OUT4HS      DISPLAY RAM MEMORY ADDR
01E5 I 30          236          TSX
01E6 I BD 0007 R   237          JSR   OUT2HS      DISPLAY EXPECTED VALUE
01E9 I FE 8F06 A   238          LDX   PTR.CADR
01EC I BD 0007 R   239          JSR   OUT2HS      DISPLAY ACTURAL VALUE
01EF I 7D 8F05 A   240          TST   RAM.MOD     LOOP MODE ?
01F2 I 26 15       241          BNE   RIN1        YES - CONTINUE
01F4 I BD 0005 R   242          JSR   PCRLF
01F7 I 86 BE       243          LDA A #'>+$80
01F9 I BD 0002 R   244          JSR   OUTCH
01FC I BD 0004 R   245          JSR   RTYCNT      RETRY - CONTINUE
```

```
01FF I 26 08        246           BNE    RIN1          CONTINUE
0201 I 32           247           PUL A
0202 I 31           248           INS
0203 I 31           249           INS
0204 I FE 8F10 A    250           LDX    RAM.RST
0207 I 6E 00        251           JMP    0,X           RESTART TEST
0209 I 32           252 RIN1      PUL A
020A I FE 8F06 A    253           LDX    PTR.CADR
020D I BC 8F08 A    254           CPX    PTR.PBND      END-OF-PARTITION
0210 I 27 03        255           BEQ    RIN2          YES - CHECK END-OF-MEMORY
0212 I 08           256           INX
0213 I 20 A9        257           BRA    RIN3
0215 I FE 8F02 A    258 RIN2      LDX    PTR.MEM
0218 I 08           259           INX
0219 I 08           260           INX
021A I 08           261           INX
021B I 08           262           INX
021C I FF 8F02 A    263           STX    PTR.MEM
021F I EE 02        264           LDX    2,X           END-OF-MEMORY ?
0221 I 26 8E        265           BNE    RIN4          NO - CONTINUE
0223 I 39           266           RTS                  RETURN TO CALLER
                    267 *
                    268 *        PATTERN MEMORY TEST CONTROL TABLE
                    269 *
0224 I              270 PTRN.CTB  EQU    *
0224 I 00           271           FCB    0
0225 I FF           272           FCB    $FF
0226 I 00           273           FCB    0
0227 I 55           274           FCB    $55
0228 I 00           275           FCB    0
0229 I AA           276           FCB    $AA
022A I 00           277           FCB    0,0           END-OF-TABLE
022B I 00
                    278 *
                    279 *        RAM MEMORY SPACE INDEX TABLE
                    280 *
022C I              281 MEM.TBL   EQU    *
022C I 0000    A    282           FDB    0,$3EFF
022E I 3EFF    A
0230 I 0000    A    283           FDB    0,0
0232 I 0000    A
0234 I 0000    A    284           FDB    0,0
0236 I 0000    A
0238 I 8100    A    285 SCAN.MEM  FDB    $8100,$81FF
023A I 81FF    A
023C I 0000    A    286           FDB    0,0
CRSRAM(A0011.02.084AA CRS RAM MEMORY TEST)              08/04/78  10:23:48  PAGE   6

023E I 0000    A
0240 I 0000    A    287           FDB    0,0           END-OF-TABLE
0242 I 0000    A
                    288 *
                    289 *        RAM MEMORY TEST MESSAGES
                    290 *
0244 I              291 RAM.ID    EQU    *
0244 I BE           292           FCB    '>+$80
0245 I 435253       293           FCC    /CRS RAM MEMORY TEST/
0258 I 04           294           FCB    4
                    295 *
0259 I              296 BEG.ADDR  EQU    *
0259 I BE           297           FCB    '>+$80
025A I 424547       298           FCC    /BEGINNING ADDR:  /
026B I 04           299           FCB    4
                    300 *
026C I              301 END.ADDR  EQU    *
026C I BE           302           FCB    '>+$80
026D I 454E44       303           FCC    /ENDING ADDR:  /
027B I 04           304           FCB    4
                    305 *
027C I              306 RAM.PTRN  EQU    *
027C I BE           307           FCB    '>+$80
027D I 52414D       308           FCC    /RAM MEMORY PATTERN TEST/
0294 I 04           309           FCB    4
                    310 *
```

```
0295 I              311 SLCT.MOD  EQU    *
0295 I BE           312           FCB    '>+$80
0296 I 53454C       313           FCC    /SELECT TEST MODE:/
02A7 I 0D           314           FCB    $D,$A
02A8 I 0A
02A9 I 20303D       315           FCC    / 0=>SINGLE; 1=>LOOP:  /
02BF I 04           316           FCB    4
                    317 *
02C0 I              318 RAM.WALK  EQU    *
02C0 I BE           319           FCB    '>+$80
02C1 I 52414D       320           FCC    /RAM WALKING BIT TEST/
02D5 I 04           321           FCB    4
                    322 *
                    323 *        STORAGE REQUIREMENTS FOR RAM MEMORY TEST
                    324 *
8F00 A              325 PTR.CTB   EQU    $8F00        CONTROL TABLE PNTR
8F01 A              326 RAM.MSK   EQU    $8F01        WALKING BIT MASK
8F02 A              327 PTR.MEM   EQU    $8F02        MEMORY SPACE CONTROL TABLE PNTR
8F05 A              328 RAM.MOD   EQU    $8F05        TEST MODE
8F06 A              329 PTR.CADR  EQU    $8F06        CURRENT RAM MEMORY ADDR PNTR
8F08 A              330 PTR.PBND  EQU    $8F08        CURRENT RAM MEMORY PARTITION END
8F0A A              331 PTR.MEMA  EQU    $8F0A
8F0C A              332 PTR.EADP  EQU    $8F0C
8F0E A              333 PTR.EBND  EQU    $8F0E
8F10 A              334 RAM.RST   EQU    $8F10        RAM TEST RESTART ADDR
8F12 A              335 ERRCNT    EQU    $8F12        RAM MEMORY INITIALIZATION ERROR COUNT
8F13 A              336 INIMOD    EQU    $8F13
8F14 A              337 MTB.WLKB  EQU    $8F14
8F16 A              338 MTB.WLKE  EQU    $8F16
8F18 A              339 MTB.WKEN  EQU    $8F18
                    340 *
02D6                341           END
CRSRAM(A0011.02.084AA CRS RAM MEMORY TEST)          08/04/78  10:23:49  PAGE   7

  NO ERRORS
 ISECT LENGTH --   726
 DSECT LENGTH --     0

  BEG.ADDR  0259 I   296     70
< CRS.RAM   0000 I    21      7
> DECIN     0003      12     12    32    62
  END.ADDR  026C I   301     76
< ERRCNT    8F12 A   335      9   214   228
> IN4HX     0009      17     17    75    81
  INIMOD    8F13 A   336     37    41    93   212   221
  MEM.TBL   022C I   281     63    65   209
  MTB.WKEN  8F18 A   339     68    69
  MTB.WLKB  8F14 A   337     64    72    74    85    87    95   112
  MTB.WLKE  8F16 A   338     66    78    80    82
> OUT2HS    0007      14     14   141   143   237   239
> OUT4HS    0006      14     14    73    79   137   139   235
> OUTCH     0002      12     12   135   149   195   233   244
> OUTSF     0001      12     12
> PCRLF     0005      14     14   133   147   193   231   242
> PDATA     0000      12     12    26    28    30    58    60    71    77
  PTNI      0018 I    34     39    44    53
  PTNL      001B I    36     49    51
  PTR.CADR  8F06 A   329    102   110   123   136   166   220   234   238   253
  PTR.CTB   8F00 A   325     36    42    46    91   107   121   126   140   167   188
  PTR.EADR  8F0C A   332    119   131   138   153
  PTR.EBND  8F0E A   333    116   154
  PTR.MEM   8F02 A   327     96    97   100   178   183   213   215   218   258   263
  PTR.MEMA  8F0A A   331    113   114   117   158   163
  PTR.PBND  8F08 A   330     99   173   217   254
  PTRN.CTB  0224 I   270     35
  RAM.ID    0244 I   291     25
< RAM.IN2   01A8 I   211      8
  RAM.INIT  01A0 I   207     40    45    94
< RAM.MOD   8F05 A   328     10    31    52    61   145   191   240
  RAM.MSK   8F01 A   326    106   129   169
  RAM.PTRN  027C I   306     27
  RAM.RST   8F10 A   334    208   250
  RAM.WALK  02C0 I   318     57
  RIN1      0209 I   252    226   230   241   246
```

```
 RIN2      0215 I   258    255
 RIN3      01BE I   220    257
 RIN4      01E1 I   215    265
 RIN5      01AB I   213    210
 RIN6      01C8 I   224    222
> RTYCNT   0004      13     13   150   196   245
: SCAN.MEM 0238 I   285      8
> SCNENB   0008      16     16   229
 SLCT.MOD  0295 I   311     29    59
 WLK1      00D3 I   110    108
 WLK2      013E I   153    146   151
 WLK2B     0141 I   154    122   130
 WLK3      0106 I   131    124
 WLK4      00EE I   120    157
 WLK4A     0101 I   129    127
 WLK5      00DE I   114    165
 WLK6      0149 I   158    155
CRSRAM(A0011.02.084AA CRS RAM MEMORY TEST)          08/04/78  10:23:50  PAGE   8

 WLK6A     016C I   176
 WLK6B     016F I   177    172
 WLK7      0172 I   178    174
 WLK7A     0183 I   187    185
 WLK7B     018D I   191    189
 WLKB      00C4 I   102    176
 WLKI      00A4 I    89     92   152
 WLKI1     00A2 I    88     86
 WLKI2     006F I    70     88
 WLKIB     013B I   152    192   197
 WLKM      00CA I   106    177
 WLKP      00B7 I    97    186
 WLKS      00A5 I    91    190
CRSLED(A0011.02.085AA CRS LED-DIGITAL DISPLAY TEST)     08/04/78  11:58:11  PAGE   1

                      2 *
                      3 *        CRS LED-DIGITAL DISPLAY TEST
                      4 *
 0000 I               5           ISEC
                      6 *
                      7           DEF    CRS.LED
                      8 *
                      9           REF    AUXDTB      BLAST TIME BREAK VALUE
                     10           REF    AUXPAR      PARITY ERROR COUNT DISPLAY
                     11           REF    ROLUHD      ROLL-ALONG UPPER DISPLAY HUNDREDS DIG    I
                     12           REF    ROLUTU      ROLL ALONG UPPER DISPLAY TENS-UNITS
                     13           REF    ROLLHD      ROLL-ALONG LOWER DISPLAY HUNDREDS DIG    I
                     14           REF    ROLLTU      ROLL-ALONG LOWER DISPLAY TENS-UNITS
                     15           REF    TCPDSP      TAPE CONTROL PANEL FILE # HUNDREDS DI    G
                     16 *
                     17           REF    AUXSPL      AUXILIARY KEYBOARD LITES
                     18           REF    AUXSAV      TIME BREAK SIGN (BIT 7)
                     19           REF    TCPLED      TAPE CONTROL PANEL ACTIVE (BIT 0)
                     20 *
                     21 *
                     22           REF    KYENTR
                     23           REF    DLYRTN,RTYCNT
                     24           REF    IPTVAL,IPTADR
                     25           REF    PDATA,PDATA1
                     26           REF    CBCDHX,DECIN
                     27           REF    IN2HX,OUTCH
                     28           REF    PCRLF
                     29 *
                     30 *        AUXILIARY KEYBOARD LITE EQUATES
                     31 *
 0080 A              32 AXLADV    EQU    $80         ADVANCE LITE
 0040 A              33 AXLFIR    EQU    $40         FIRE LITE
 0020 A              34 AXLOVR    EQU    $20         OVERRIDE LITE
 0010 A              35 AXLFTS    EQU    $10         FIRE MULTIPLE NORMAL TEST
 0008 A              36 AXLCBP    EQU    8           CAMERA BY-PASS LITE
 0002 A              37 AXLNTS    EQU    2           NORMAL TEST-IN-PROGRESS
 0001 A              38 AXLTBP    EQU    1           TAPE BY-PASS LITE
                     39 *
 0080 A              40 AXLTBK    EQU    $80         TIME BREAK SIGN
                     41 *
```

```
0001 A                42 TPFACT   EQU    1            TAPE CONTROL PANEL ACTIVE LITE
                      43 *
                      44 *
000C A                45 KSWCNT   EQU    $C
                      46 *
0000 I                47 CRS.LED  EQU    *
0000 I CE 022E I      48          LDX    #LED.ID
0003 I BD 000F R      49          JSR    PDATA        IDENTIFY TEST
0006 I CE 024C I      50          LDX    #LED.DIG     DIGITAL DISPLAY
0009 I BD 000F R      51          JSR    PDATA        SUBSYSTEM TEST
000C I CE 031A I      52          LDX    #DIG.CTB
000F I FF 0000 D      53          STX    PTR.CTB      INITIALIZE CONTROL TABLE PNTR
                      54 *
0012 I                55 LDG.RTY  EQU    *
0012 I FE 0000 D      56          LDX    PTR.CTB
0015 I EE 02          57          LDX    2,X
0017 I BD 000F R      58          JSR    PDATA        IDENTIFY DISPLAY UNDER TEST
001A I FE 0000 D      59          LDX    PTR.CTB
CRSLED(A0011.02.085AA CRS LED-DIGITAL DISPLAY TEST)    08/04/78  11:58:13  PAGE   2

001D I EE 00          60          LDX    0,X
001F I FF 0002 D      61          STX    DIG.DSP      SAVE DATA DISPLAY ADDR
0022 I FE 0000 D      62          LDX    PTR.CTB
0025 I C6 02          63          LDA B  #2           ANTICIPATE 2 BCD DIGIT DISPLAY
0027 I A6 04          64          LDA A  4,X          2 BCD DIGIT DISPLAY ?
0029 I 36             65          PSH A
002A I 27 01          66          BEQ    LDG1         YES-SET EXPECTED COUNT
002C I 5C             67          INC B               NO-3 BCD DIGIT DISPLAY
002D I F7 0004 D      68 LDG1     STA B  DIG.CNT      # BCD DIGITS
0030 I CE 0006 D      69          LDX    #LED.VAL
0033 I BD 0012 R      70          JSR    DECIN        INPUT DESIRED DISPLAY VALUE
0036 I CE 000D R      71          LDX    #IPTVAL
0039 I F1 0004 D      72          CMP B  DIG.CNT
003C I 23 0A          73          BLS    LDG1A
003E I F0 0004 D      74          SUB B  DIG.CNT
0041 I 08             75 LDG2A    INX
0042 I 5A             76          DEC B
0043 I 26 FC          77          BNE    LDG2A
0045 I F6 0004 D      78          LDA B  DIG.CNT
0048 I FF 000E R      79 LDG1A    STX    IPTADR       SET INPUT DIGIT PNTR
004B I F7 0005 D      80          STA B  DIG.ENT      SAVE # DIGITS ENTERED
004E I FE 000E R      81 LDGL     LDX    IPTADR
0051 I 4F             82          CLR A
0052 I F1 0004 D      83          CMP B  DIG.CNT      EXPECTED DIGIT COUNT = # DIGITS ENTER     E
0055 I 26 06          84          BNE    LDG2         NO-ZERO DISPLAY DIGIT
0057 I A6 00          85          LDA A  0,X          NEXT INPUT DIGIT
0059 I 08             86          INX
005A I FF 000E R      87          STX    IPTADR
005D I 33             88 LDG2     PUL B               DISPLAY TYPE
005E I 5D             89          TST B               2 BCD DIGIT DISPLAY ?
005F I 37             90          PSH B
0060 I 27 2B          91          BEQ    LDG3         YES-PACK INPUT DIGITS
0062 I FE 0002 D      92          LDX    DIG.DSP
0065 I 5D             93          TST B
0066 I 2B 04          94          BMI    LDG2B
0068 I 48             95          ASL A
0069 I 48             96          ASL A
006A I 48             97          ASL A
006B I 48             98          ASL A
006C I A7 00          99 LDG2B    STA A  0,X          SET DIGIT IN DISPLAY
006E I 08            100          INX
006F I FF 0002 D     101          STX    DIG.DSP
0072 I 5D            102          TST B               3 ASCII-BCD DIGIT DISPLAY
0073 I 2B 03         103          BMI    LDG4         YES-EACH DIGIT DISPLAYED SEPARATELY
0075 I 33            104          PUL B
0076 I 5F            105          CLR B
0077 I 37            106          PSH B               SET DISPLAY TYPE FOR 2 BCD DIGITS
0078 I F6 0005 D     107 LDG4     LDA B  DIG.ENT      EXPECTED DIGIT COUNT =
007B I F1 0004 D     108          CMP B  DIG.CNT      # DIGITS ENTERED
007E I 26 03         109          BNE    LDG5         NO-SKIP # DIGITS ENTERED DECR
0080 I 7A 0005 D     110          DEC    DIG.ENT      DECR # DIGITS ENTERED
0083 I 7A 0004 D     111 LDG5     DEC    DIG.CNT      DECR EXPECTED COUNT
0086 I 27 24         112          BEQ    LDGX         JUMP IF ALL DIGITS DISPLAYED
0088 I F6 0005 D     113          LDA B  DIG.ENT
```

```
008B I 20 C1        114          BRA    LDGL        CONTINUE UNTIL ALL DIGITS DISPLAYED
                    115 *
008D I 4D           116 LDG3     TST A
008E I 27 07        117          BEQ    LDG3A
CR___D(A0011.02.085AA CRS LED-DIGITAL DISPLAY TEST)    08/04/78  11:58:14  PAGE   3

0090 I BD 0011 R    118          JSR    CBCDHX      CONVERT INPUT DIGIT TO HEX
0093 I 48           119          ASL A
0094 I 48           120          ASL A
0095 I 48           121          ASL A
0096 I 48           122          ASL A
0097 I 7A 0005 D    123 LDG3A    DEC    DIG.ENT     NUMBER DIGITS ENTERED =
009A I 2B 0B        124          BMI    LDG6        NO - SET DISPLAY TO ZERO
009C I 36           125          PSH A
009D I FE 000E R    126          LDX    IPTADR
00A0 I A6 00        127          LDA A  0,X
00A2 I BD 0011 R    128          JSR    CBCDHX      CONVERT INPUT DIGIT TO HEX
00A5 I 33           129          PUL B
00A6 I 1B           130          ABA                PACK 2 BCD DIGITS
00A7 I FE 0002 D    131 LDG6     LDX    DIG.DSP
00AA I A7 00        132          STA A  0,X
00AC I 33           133 LDGX     PUL B              REMOVE DISPLAY TYPE CODE
00AD I BD 000C R    134          JSR    RTYCNT      ASK FOR OPERATOR INTERVENTION
00B0 I 26 03        135          BNE    LDG7
00B2 I 7E 0012 I    136 LDG8     JMP    LDG.RTY     JUMP IF RETRY SPECIFIED
00B5 I FE 0000 D    137 LDG7     LDX    PTR.CTB
00B8 I 08           138          INX
00B9 I 08           139          INX
00BA I 08           140          INX
00BB I 08           141          INX
00BC I 08           142          INX
00BD I FF 0000 D    143          STX    PTR.CTB
00C0 I EE 00        144          LDX    0,X         END-OF-TABLE ?
00C2 I 26 EE        145          BNE    LDG8        NO - CONTINUE
                    146 *
                    147 *        CRS CONTROL PANEL LED TEST
                    148 *
00C4 I 7F 0008 R    149          CLR    AUXSAV
00C7 I CE 0262 I    150          LDX    #LED.PLED   CRS CONTROL PANEL
00CA I BD 000F R    151          JSR    PDATA       LED TEST
00CD I CE 03B2 I    152          LDX    #PLED.CTB
00D0 I FF 0000 D    153 PLD3     STX    PTR.CTB     INIT CONTROL TABLE PNTR
00D3 I 7F 0002 D    154          CLR    DIG.DSP
00D6 I EE 00        155          LDX    0,X         END-OF-TABLE ?
00D8 I 27 11        156          BEQ    PLD1        YES-START TEST
00DA I BC 0002 D    157          CPX    DIG.DSP
00DD I 27 02        158          BEQ    PLD2
00DF I 6F 00        159          CLR    0,X         TURN OFF LED
00E1 I FE 0000 D    160 PLD2     LDX    PTR.CTB
00E4 I 08           161          INX
00E5 I 08           162          INX
00E6 I 08           163          INX
00E7 I 08           164          INX
00E8 I 08           165          INX
00E9 I 20 E5        166          BRA    PLD3
00EB I CE 03B2 I    167 PLD1     LDX    #PLED.CTB
00EE I FF 0000 D    168 PLDN     STX    PTR.CTB
00F1 I FE 0000 D    169 PLDL     LDX    PTR.CTB
00F4 I EE 02        170          LDX    2,X
00F6 I BD 000F R    171          JSR    PDATA       IDENTIFY LED UNDER TEST
00F9 I FE 0000 D    172          LDX    PTR.CTB
00FC I A6 04        173          LDA A  4,X         PICK UP LED MASK
00FE I EE 00        174          LDX    0,X
0100 I 6F 00        175          CLR    0,X
CR   D(A0011.02.085AA CRS LED-DIGITAL DISPLAY TEST)    08/04/78  11:58:16  PAGE   4

0102 I A7 00        176          STA A  0,X         TURN ON SPECIFIED LED
0104 I BD 0015 R    177          JSR    PCRLF
0107 I 86 BE        178          LDA A  #'>+$80
0109 I BD 0014 R    179          JSR    OUTCH       OUTPUT OPERATOR PROMPT
010C I BD 000C R    180          JSR    RTYCNT      RETRY OR CONTINUE ?
010F I 27 E0        181          BEQ    PLDL        JUMP IF RETRY
0111 I FE 0000 D    182          LDX    PTR.CTB
0114 I 08           183          INX
```

```
0115 I 08                 INX
0116 I 08                 INX
0117 I 08                 INX
0118 I 08                 INX
0119 I 6D 00              TST    0,X          END-OF-TEST
011B I 26 D1              BNE    PLDN         NO-CONTINUE WITH NEXT LED
011D I 6D 01              TST    1,X
011F I 26 CD              BNE    PLDN
                    *
                    *     CRS ROLL-ALONG PANEL LITES
                    *
0121 I CE 0274 I          LDX    #LED.PNL
0124 I BD 000F R          JSR    PDATA        IDENTIFY TEST
0127 I CE 028F I    PNLS  LDX    #PNL.WALK    IDENTIFY WALKING BIT
012A I BD 000F R          JSR    PDATA        SUBSYSTEM TEST
012D I 7F 000A R          CLR    KYENTR
0130 I 4F           PNLL  CLR A
0131 I BD 0218 I          JSR    RPNL.INI     TURN OFF ALL ROLL-ALONG PANEL LEDS
0134 I 36           PNL1  PSH A               SAVE LED COUNT
0135 I BD 01F0 I          JSR    PNLOFS
0138 I FE 0000 D          LDX    PTR.CTB
013B I A7 00              STA A  0,X          TURN ON LED
013D I CE 0064 A          LDX    #100
0140 I BD 000B R          JSR    DLYRTN       DELAY 100 MSEC
0143 I 4F                 CLR A
0144 I FE 0000 D          LDX    PTR.CTB
0147 I A7 00              STA A  0,X          TURN OFF LED
0149 I 32                 PUL A
014A I 4C                 INC A
014B I 81 C8              CMP A  #200         SCAN COMPLETE
014D I 25 E5              BCS    PNL1
014F I 86 FF              LDA A  #$FF
0151 I BD 0218 I          JSR    RPNL.INI     TURN ON ALL ROLL-ALONG PANEL LEDS
0154 I 4F                 CLR A
0155 I 36           PNL2  PSH A
0156 I BD 01F0 I          JSR    PNLOFS
0159 I 43                 COM A
015A I A7 00              STA A  0,X          TURN OFF LED
015C I CE 0064 A          LDX    #100
015F I BD 000B R          JSR    DLYRTN       DELAY 100 MSEC
0162 I 86 FF              LDA A  #$FF
0164 I FE 0000 D          LDX    PTR.CTB
0167 I A7 00              STA A  0,X          TURN ON LEDS
0169 I 32                 PUL A
016A I 4C                 INC A
016B I 81 C8              CMP A  #200
016D I 25 E6              BCS    PNL2
016F I B6 000A R          LDA A  KYENTR
0172 I 81 0C              CMP A  #KSWCNT      CONTINUE SCAN ?
0174 I 27 BA              BEQ    PNLL         YES
CR..LED(A0011.02.085AA CRS LED-DIGITAL DISPLAY TEST)    08/04/78  11:58:17  PAGE   5

                    *
                    *     ROLL-ALONG PANEL INDIVIDUAL LED TEST
                    *
0176 I              PNLI  EQU    *
0176 I 86 FF              LDA A  #$FF
0178 I BD 0218 I          JSR    RPNL.INI
017B I CE 02A0 I          LDX    #PNL.INDV
017E I BD 000F R          JSR    PDATA        IDENTIFY TEST
0181 I CE 02BB I    PNLI1 LDX    #SLCT.LED
0184 I BD 000F R          JSR    PDATA        SELECT LED #
0187 I CE 0006 D          LDX    #LED.VAL
018A I BD 0012 R          JSR    DECIN
018D I CE 02D0 I          LDX    #SLCT.STA
0190 I BD 000F R          JSR    PDATA        SELECT ON/OFF STATUS
0193 I CE 0008 D          LDX    #LED.ON
0196 I BD 0012 R          JSR    DECIN        INPUT ON/OFF SETTING
0199 I B6 0007 D          LDA A  LED.VAL+1
019C I 81 C7              CMP A  #199         VALID LED NUMBER ?
019E I 22 E1              BHI    PNLI1        NO
01A0 I BD 01F0 I          JSR    PNLOFS       COMPUTE OFFSET FOR ROLL-ALONG PANEL
01A3 I 7D 0009 D          TST    LED.ON+1     TURN LED OFF ?
01A6 I 26 04              BNE    PNLI2        YES
```

```
01A8 I 6F 00         256             CLR    0,X          TURN OFF ALL LEDS IN THE GROUP
01AA I 20 01         257             BRA    PNLI3
01AC I 43            258 PNLI2       COM A
01AD I A7 00         259 PNLI3       STA A  0,X          TURN LED ON/OFF
01AF I BD 0015 R     260             JSR    PCRLF
01B2 I 86 BE         261             LDA A  #'>+$80
01B4 I BD 0014 R     262             JSR    OUTCH        OUTPUT OPERATOR PROMPT
01B7 I BD 000C R     263             JSR    RTYCNT       RETRY-CONTINUE ?
01BA I 27 C5         264             BEQ    PNLI1        RESTART TEST IF RETRY SPECIFIED
                     265 *
                     266 *          CRS ROLL-ALONG DISPLAY PATTERN TEST
                     267 *
01BC I CE 02E6 I     268             LDX    #PNL.PTRN
01BF I BD 000F R     269             JSR    PDATA        IDENTIFY TEST
01C2 I CE 0307 I     270 PTRN1       LDX    #SLCT.PTN
01C5 I BD 000F R     271             JSR    PDATA
01C8 I CE 0006 D     272             LDX    #LED.VAL
01CB I BD 0013 R     273             JSR    IN2HX        INPUT DISPLAY PATTERN
01CE I F6 0006 D     274             LDA B  LED.VAL
01D1 I 53            275             COM B
01D2 I 86 08         276             LDA A  #8
01D4 I B7 0008 D     277             STA A  LED.ON
01D7 I 4F            278             CLR A
01D8 I 58            279 PTRN2       ASL B
01D9 I 46            280             ROR A
01DA I 7A 0008 D     281             DEC    LED.ON
01DD I 26 F9         282             BNE    PTRN2
01DF I BD 0218 I     283             JSR    RPNL.INI     MOVE PATTERN INTO DISPLAY
01E2 I BD 0015 R     284             JSR    PCRLF
01E5 I 86 BE         285             LDA A  #'>+$80
01E7 I BD 0014 R     286             JSR    OUTCH        OUTPUT OPERATOR PROMPT
01EA I BD 000C R     287             JSR    RTYCNT
01ED I 27 D3         288             BEQ    PTRN1        RESTART TEST IF RETRY
01EF I 39            289             RTS                 END-OF-TEST
                     290 *
                     291 *          ROUTINE TO COMPUTE OFFSET FOR ROLL-ALONG PANEL DISPLAY
CRSLED(A0011.02.085AA CRS LED-DIGITAL DISPLAY TEST)     08/04/78  11:53:18  PAGE   6

                     292 *
                     293 *                CALLING SEQUENCE:   JSR   PNLOFS
                     294 *
                     295 *                REGISTER CONTENTS:   ACCA => LED NUMBER
                     296 *
                     297 *                RETURN REGISTERS:  PTR.CTB => 8 BIT GROUP ADDR
                     298 *                                     IX      => 8 BIT GROUP ADDR
                     299 *                                     ACCA    => MASK FOR LED ON
                     300 *
01F0 I               301 PNLOFS      EQU    *
01F0 I CE 8040 A     302             LDX    #$8040
01F3 I 81 63         303             CMP A  #99          UPPER DISPLAY ?
01F5 I 23 05         304             BLS    PFS1         YES
01F7 I CE 8050 A     305             LDX    #$8050       SELECT LOWER DISPLAY BASE ADDR
01FA I 80 64         306             SUB A  #100
01FC I FF 0000 D     307 PFS1        STX    PTR.CTB
01FF I 16            308             TAB
0200 I C4 07         309             AND B  #$7
0202 I 44            310             LSR A
0203 I 44            311             LSR A
0204 I 44            312             LSR A
0205 I BB 0001 D     313             ADD A  PTR.CTB+1    SET 8 BIT
0208 I B7 0001 D     314             STA A  PTR.CTB+1    GROUP ADDR
020B I 86 01         315             LDA A  #$1
020D I 5D            316 PFS4        TST B
020E I 27 04         317             BEQ    PFS3
0210 I 5A            318             DEC B
0211 I 48            319             ASL A
0212 I 20 F9         320             BRA    PFS4
0214 I FE 0000 D     321 PFS3        LDX    PTR.CTB
0217 I 39            322             RTS
                     323 *
                     324 *          ROUTINE TO INITIALIZE ROLL-ALONG PANEL DISPLAY
                     325 *
                     326 *                CALLING SEQUENCE:   JSR   RPNL.INI
                     327 *
```

```
                  *                                             ACCA => 8 BIT GROUP MASK
                  *
0218 I                RPNL.INI   EQU     *
0218 I CE 8040 A                 LDX     #$8040         SELECT UPPER DISPLAY
021B I C6 0D          RPNL3      LDA B   #$D
021D I A7 00          RPNL1      STA A   0,X
021F I 08                        INX
0220 I 5A                        DEC B
0221 I 26 FA                     BNE     RPNL1
0223 I 8C 805D A                 CPX     #$805D         INITIALIZATION COMPLETE
0226 I 27 05                     BEQ     RPNL2
0228 I CE 8050 A                 LDX     #$8050
022B I 20 EE                     BRA     RPNL3
022D I 39             RPNL2      RTS                    RETURN
                  *
                  *        CRS LED-DIGITAL DISPLAY TEST MESSAGES
                  *
022E I                LED.ID     EQU     *
022E I BE                        FCB     '>+$80
022F I 435253                    FCC     /CRS LED-DIGITAL DISPLAY TEST/
024B I 04                        FCB     4
                  *
CRSLED(A0011.02.085AA CRS LED-DIGITAL DISPLAY TEST)     08/04/78  11:58:20  PAGE   7

024C I                LED.DIG    EQU     *
024C I BE                        FCB     '>+$80
024D I 444947                    FCC     /DIGITAL DISPLAY TEST/
0261 I 04                        FCB     4
                  *
0262 I                LED.PLED   EQU     *
0262 I BE                        FCB     '>+$80
0263 I 4C4544                    FCC     /LED DISPLAY TEST/
0273 I 04                        FCB     4
                  *
0274 I                LED.PNL    EQU     *
0274 I BE                        FCB     '>+$80
0275 I 524F4C                    FCC     /ROLL-ALONG PANEL LED TEST/
028E I 04                        FCB     4
                  *
028F I                PNL.WALK   EQU     *
028F I BE                        FCB     '>+$80
0290 I 50414E                    FCC     /PANEL SCAN TEST/
029F I 04                        FCB     4
                  *
                  *
02A0 I                PNL.INDV   EQU     *
02A0 I BE                        FCB     '>+$80
02A1 I 50414E                    FCC     /PANEL INDIVIDUAL LED TEST/
02BA I 04                        FCB     4
                  *
02BB I                SLCT.LED   EQU     *
02BB I BE                        FCB     '>+$80
02BC I 454E54                    FCC     /ENTER LED NUMBER:  /
02CF I 04                        FCB     4
                  *
02D0 I                SLCT.STA   EQU     *
02D0 I BE                        FCB     '>+$80
02D1 I 4F4646                    FCC     /OFF => 0; ON => 1:  /
02E5 I 04                        FCB     4
                  *
02E6 I                PNL.PTRN   EQU     *
02E6 I BE                        FCB     '>+$80
02E7 I 524F4C                    FCC     /ROLL-ALONG DISPLAY PATTERN TEST/
0306 I 04                        FCB     4
                  *
0307 I                SLCT.PTN   EQU     *
0307 I BE                        FCB     '>+$80
0308 I 53454C                    FCC     /SELECT PATTERN:  /
0319 I 04                        FCB     4
                  *
                  *        DIGITAL DISPLAY TEST CONTROL TABLE
                  *
031A I                DIG.CTB    EQU     *              ROLL-ALONG UPPER DISPLAY
                  *
```

```
031A I 0002    R    400            FDB     ROLUHD,DIG.ROLU
031C I 0335    I
031E I 01           401            FCB     1
                    402 *                                      ROLL-ALONG LOWER DISPLAY
031F I 0004    R    403            FDB     ROLLHD,DIG.ROLL
0321 I 0351    I
0323 I 01           404            FCB     1
                    405 *                                      PARITY ERROR COUNT DISPLAY
CRSLED(A0011.02.085AA CRS LED-DIGITAL DISPLAY TEST)     08/04/78  11:58:21  PAGE    8

0324 I 0001    R    406            FDB     AUXPAR,DIG.PAR
0326 I 036D    I
0328 I 00           407            FCB     0
                    408 *                                      TIME BREAK DIFFERENCE DISPLAY
0329 I 0000    R    409            FDB     AUXDTB,DIG.DTB
032B I 0385    I
032D I 00           410            FCB     0
                    411 *                                      TAPE CONTROL PANEL FILE NUMBER DISPLAY
032E I 0006    R    412            FDB     TCPDSP,DIG.FDSP
0330 I 039B    I
0332 I FF           413            FCB     -1
                    414 *
0333 I 0000    A    415            FDB     0            END-OF-TABLE
                    416 *
                    417 *         DIGITAL DISPLAY IDENTIFICATION MESSAGES
                    418 *
0335 I BE           419 DIG.ROLU   FCB     '>+$80
0336 I 524F4C       420            FCC     /ROLL-ALONG UPPER DISPLAY: /
0350 I 04           421            FCB     4
                    422 *
0351 I BE           423 DIG.ROLL   FCB     '>+$80
0352 I 524F4C       424            FCC     /ROLL-ALONG LOWER DISPLAY: /
036C I 04           425            FCB     4
                    426 *
036D I BE           427 DIG.PAR    FCB     '>+$80
036E I 504152       428            FCC     /PARITY ERROR DISPLAY: /
0384 I 04           429            FCB     4
                    430 *
0385 I BE           431 DIG.DTB    FCB     '>+$80
0386 I 54494D       432            FCC     /TIME BREAK DISPLAY: /
039A I 04           433            FCB     4
                    434 *
039B I BE           435 DIG.FDSP   FCB     '>+$80
039C I 46494C       436            FCC     /FILE NUMBER DISPLAY: /
03B1 I 04           437            FCB     4
                    438 *
                    439 *         CONTROL PANEL LED DISPLAY TEST
                    440 *
03B2 I              441 PLED.CTB   EQU     *
03B2 I 0007    R    442            FDB     AUXSPL,PLED.ADVADVANCE LITE
03B4 I 03E1    I
03B6 I 80           443            FCB     AXLADV
                    444 *
03B7 I 0007    R    445            FDB     AUXSPL,PLED.FIRFIRE LITE
03B9 I 03EE    I
03BB I 40           446            FCB     AXLFIR
                    447 *
03BC I 0007    R    448            FDB     AUXSPL,PLED.OVROVERRIDE LITE
03BE I 03F8    I
03C0 I 20           449            FCB     AXLOVR
                    450 *
03C1 I 0007    R    451            FDB     AUXSPL,PLED.FTSFIRE MULTIPLE NORMAL TEST
03C3 I 0406    I
03C5 I 10           452            FCB     AXLFTS
                    453 *
03C6 I 0007    R    454            FDB     AUXSPL,PLED.CBPCAMERA BY-PASS LITE
03C8 I 041D    I
03CA I 08           455            FCB     AXLCBP
CRSLED(A0011.02.085AA CRS LED-DIGITAL DISPLAY TEST)     08/04/78  11:58:23  PAGE    9

                    456 *
03CB I 0007    R    457            FDB     AUXSPL,PLED.NTSNORMAL TEST-IN-PROGRESS
03CD I 0431    I
03CF I 02           458            FCB     AXLNTS
```

```
                    459 *
03D0 I 0007    R    460             FDB     AUXSPL,PLED.TBPTAPE BY-PASS LITE
03D2 I 044E    I
03D4 I 01           461             FCB     AXLTBP
                    462 *
03D5 I 0008    R    463             FDB     AUXSAV,PLED.TBKTIME BREAK SIGN
03D7 I 0460    I
03D9 I 80           464             FCB     AXLTBK
                    465 *
03DA I 0009    R    466             FDB     TCPLED,PLED.ACTTAPE CONTROL PANEL ACTIVE LIGHT
03DC I 0471    I
03DE I 01           467             FCB     TPFACT
                    468 *
03DF I 0000    A    469             FDB     0               END-OF-TABLE
                    470 *
                    471 *          CONTROL PANEL LED IDENTIFIER MESSAGES
                    472 *
03E1 I BE           473 PLED.ADV    FCB     '>+$80
03E2 I 414456       474             FCC     /ADVANCE LED/
03ED I 04           475             FCB     4
                    476 *
03EE I BE           477 PLED.FIR    FCB     '>+$80
03EF I 464952       478             FCC     /FIRE LED/
03F7 I 04           479             FCB     4
                    480 *
03F8 I BE           481 PLED.OVR    FCB     '>+$80
03F9 I 4F5645       482             FCC     /OVERRIDE LED/
0405 I 04           483             FCB     4
                    484 *
0406 I BE           485 PLED.FTS    FCB     '>+$80
0407 I 464952       486             FCC     /FIRE CONTROL TEST LED/
041C I 04           487             FCB     4
                    488 *
041D I BE           489 PLED.CBP    FCB     '>+$80
041E I 43414D       490             FCC     /CAMERA BY-PASS LED/
0430 I 04           491             FCB     4
                    492 *
0431 I BE           493 PLED.NTS    FCB     '>+$80
0432 I 4E4F52       494             FCC     /NORMAL TEST-IN-PROGRESS LED/
044D I 04           495             FCB     4
                    496 *
044E I BE           497 PLED.TBP    FCB     '>+$80
044F I 544150       498             FCC     /TAPE BY-PASS LED/
045F I 04           499             FCB     4
                    500 *
0460 I BE           501 PLED.TBK    FCB     '>+$80
0461 I 54494D       502             FCC     /TIME BREAK SIGN/
0470 I 04           503             FCB     4
                    504 *
0471 I BE           505 PLED.ACT    FCB     '>+$80
0472 I 544150       506             FCC     /TAPE CONTROL PANEL ACTIVE LITE/
0490 I 04           507             FCB     4
                    508 *
0000 D              509             DSEC
CKLLED(A0011.02.085AA CRS LED-DIGITAL DISPLAY TEST)     08/04/78  11:58:24  PAGE  10

                    510 *
0000 D 0000    A    511 PTR.CTB     FDB     0               CONTROL TABLE PNTR
0002 D 0000    A    512 DIG.DSP     FDB     0               DIGITAL DISPLAY SAVE AREA
0004 D 00           513 DIG.CNT     FCB     0               EXPECTED DIGIT COUNT
0005 D 00           514 DIG.ENT     FCB     0               # DIGITS ENTERED
0006 D 0000    A    515 LED.VAL     FDB     0               OPERATOR INPUT MASK
0008 D 0000    A    516 LED.ON      FDB     0               LED ON/OFF STATE
                    517 *
000A                518             END
CKLLED(A0011.02.085AA CRS LED-DIGITAL DISPLAY TEST)     08/04/78  11:58:24  PAGE  11

   NO ERRORS
  ISECT LENGTH --  1169
  DSECT LENGTH --    10

> AUXDTE    0000      9      9    409
> AUXPAR    0001     10     10    406
> AUXSAV    0008     18     18    149    463
> AUXSPL    0007     17     17    442    445    448    451    454    457    460
```

```
  AXLADV    0080 A    32    443
  AXLCBP    0008 A    36    455
  AXLFIR    0040 A    33    446
  AXLFTS    0010 A    35    452
  AXLNTS    0002 A    37    458
  AXLOVR    0020 A    34    449
  AXLTBK    0080 A    40    464
  AXLTBP    0001 A    38    461
> CBCDHX    0011        26     26   118   128
< CRS.LED   0000 I      47      7
> DECIN     0012        26     26    70   245   249
  DIG.CNT   0004 D     513     68    72    74    78    83   108   111
  DIG.CTB   031A I     398     52
  DIG.DSP   0002 D     512     61    92   101   131   154   157
  DIG.DTB   0385 I     431    409
  DIG.ENT   0005 D     514     80   107   110   113   123
  DIG.FDSP  039B I     435    412
  DIG.PAR   036D I     427    406
  DIG.ROLL  0351 I     423    403
  DIG.ROLU  0335 I     419    400
> DLYRTN    000B        23     23   207   223
> IN2HX     0013        27     27   273
> IPTADR    000E        24     24    79    81    87   126
> IPTVAL    000D        24     24    71
  KSWCNT    000C A      45    232
> KYENTR    000A        22     22   199   231
  LDG.RTY   0012 I      55    136
  LDG1      002D I      68     66
  LDG1A     0048 I      79     73
  LDG2      005D I      88     84
  LDG2A     0041 I      75     77
  LDG2B     006C I      99     94
  LDG3      008D I     116     91
  LDG3A     0097 I     123    117
  LDG4      0078 I     107    103
  LDG5      0083 I     111    109
  LDG6      00A7 I     131    124
  LDG7      00B5 I     137    135
  LDG8      00B2 I     136    145
  LDGL      004E I      81    114
  LDGX      00AC I     133    112
  LED.DIG   024C I     350     50
  LED.ID    022E I     345     48
  LED.ON    0008 D     516    248   254   277   281
  LED.PLED  0262 I     355    150
  LED.PNL   0274 I     360    195
  LED.VAL   0006 D     515     69   244   250   272   274
> OUTCH     0014        27     27   179   262   286
> PCRLF     0015        28     28   177   260   284
CRSLED(A0011.02.085AA CRS LED-DIGITAL DISPLAY TEST)    08/04/78  11:58:25  PAGE  12

> PDATA     000F        25     25    49    51    58   151   171   196   198   241   243   247   269
                              271
> PDATA1    0010        25     25
  PFS1      01FC I     307    304
  PFS3      0214 I     321    317
  PFS4      020D I     316    320
  PLD1      00EB I     167    156
  PLD2      00E1 I     160    158
  PLD3      00D0 I     153    166
  PLDL      00F1 I     169    181
  PLDN      00EE I     168    189   191
  PLED.ACT  0471 I     505    466
  PLED.ADV  03E1 I     473    442
  PLED.CBP  041D I     489    454
  PLED.CTB  03B2 I     441    152   167
  PLED.FIR  03EE I     477    445
  PLED.FTS  0406 I     485    451
  PLED.NTS  0431 I     493    457
  PLED.OVR  03F8 I     481    448
  PLED.TBK  0460 I     501    463
  PLED.TBP  044E I     497    460
  PNL.INDV  02A0 I     371    240
  PNL.PTRN  02E6 I     386    268
```

```
PNL.WALK   023F I   365    197
PNL1       0134 I   202    214
PNL2       0155 I   218    230
PNLI       0176 I   237
PNLI1      0181 I   242    252    264
PNLI2      01AC I   258    255
PNLI3      01AD I   259    257
PNLL       0130 I   200    233
PNLOFS     01F0 I   301    203    219    253
PNLS       0127 I   197
PTR.CTB    0000 D   511     53     56     59     62    137    143    153    160    168    169    172    182
                           204    209    225    307    313    314    321
PTRN1      01C2 I   270    288
PTRN2      01D8 I   279    282
> ROLLHD   0004      13     13    403
> ROLLTU   0005      14     14
> ROLUHD   0002      11     11    400
> ROLUTU   0003      12     12
RPNL.INI   0218 I   330    201    216    239    283
RPNL1      021D I   333    336
RPNL2      022D I   341    338
RPNL3      021B I   332    340
> RTYCNT   000C      23     23    134    180    263    287
SLCT.LED   02BB I   376    242
SLCT.PTN   0307 I   391    270
SLCT.STA   02D0 I   381    246
> TCPDSP   0006      15     15    412
> TCPLED   0009      19     19    466
TPFACT     0001 A    42    467
CRSMEM(A0011.02.086AA CRS EXAMINE/CHANGE MEMORY)        08/04/78  11:57:10  PAGE   1

                         2 *
                         3 *           CRS EXAMINE/CHANGE MEMORY ROUTINE
                         4 *
0000 I                   5              ISEC
                         6 *
                         7              DEF      CRS.EXCH
                         8 *
                         9              REF      PDATA,PCRLF,OUTCH
                        10              REF      IN2HX,IN4HX
                        11              REF      OUT2HS,OUT4HS
                        12              REF      OUTSP
                        13 *
                        14              REF      KYENTR
                        15 *
0010 A                  16 KSWSP1       EQU      $10            #KEY
                        17 *
                        18 *
0000 I                  19 CRS.EXCH     EQU      *
0000 I CE 008B I        20              LDX      #EXCH.ID
0003 I BD 0000 R        21              JSR      PDATA         IDENTIFY TEST
0006 I CE 0000 A        22              LDX      #0
0009 I FF 0000 D        23              STX      BIAS.SAV      INITIALIZE DISPLAY BIAS
000C I CE 00AB I        24              LDX      #EXCH.BI
000F I BD 0000 R        25              JSR      PDATA         ASK OPERATOR TO INPUT BIAS
0012 I CE 0000 D        26              LDX      #BIAS.SAV
0015 I BD 0004 R        27              JSR      IN4HX         INPUT BIAS
                        28 *
0018 I BD 0001 R        29 EXC6         JSR      PCRLF
001B I 86 BE            30              LDA A    #'>+$80
001D I BD 0002 R        31              JSR      OUTCH         OUTPUT OPERATOR PROMPT
0020 I CE 0002 D        32              LDX      #CMEM.ADR
0023 I BD 0004 R        33              JSR      IN4HX         INPUT MEMORY ADDR TO DISPLAY
0026 I 5F               34              CLR B                  ANTICIPATE BYTE DISPLAY MODE
0027 I B6 0008 R        35              LDA A    KYENTR
002A I 81 10            36              CMP A    #KSWSP1       HALF-WORD MODE ?
002C I 26 01            37              BNE      EXC1          NO-DISPLAY BYTE
002E I 16               38              TAB
002F I F7 0006 D        39 EXC1         STA B    DISP.TYP      SET DISPLAY MODE
0032 I BD 0007 R        40              JSR      OUTSP
0035 I B6 0002 D        41 EXCL         LDA A    CMEM.ADR
0038 I F6 0003 D        42              LDA B    CMEM.ADR+1
003B I FB 0001 D        43              ADD B    BIAS.SAV+1
003E I B9 0000 D        44              ADC A    BIAS.SAV
```

```
0041 I F7 0005 D     45            STA B  AMEM.ADR+1
0044 I B7 0004 D     46            STA A  AMEM.ADR     COMPUTE ABSOLUTE MEMORY ADDR
0047 I FE 0004 D     47            LDX    AMEM.ADR     CURRENT MEMORY ADDR
004A I 7D 0006 D     48            TST    DISP.TYP     BYTE DISPLAY MODE ?
004D I 26 05         49            BNE    EXC2         NO-DISPLAY HALFWORD
004F I BD 0005 R     50            JSR    OUT2HS
0052 I 20 03         51            BRA    EXC3
0054 I BD 0006 R     52 EXC2       JSR    OUT4HS
0057 I FE 0004 D     53 EXC3       LDX    AMEM.ADR
005A I 7D 0006 D     54            TST    DISP.TYP     BYTE DISPLAY ?
005D I 26 05         55            BNE    EXC4         NO-INPUT HW
005F I BD 0003 R     56            JSR    IN2HX        INPUT BYTE CHANGE
0062 I 20 03         57            BRA    EXC5
0064 I BD 0004 R     58 EXC4       JSR    IN4HX        INPUT HW CHANGE
0067 I B6 0008 R     59 EXC5       LDA A  KYENTR       PICK UP TERMINATOR
CRSMEM(A0011.02.086AA CRS EXAMINE/CHANGE MEMORY)     08/04/78  11:57:11  PAGE   2

006A I 81 10         60            CMP A  #KSWSP1      DISPLAY NEXT LOCATION ?
006C I 26 AA         61            BNE    EXC6         NO-ASK OPERATOR FOR ADDR
006E I FE 0002 D     62            LDX    CMEM.ADR
0071 I 08            63            INX
0072 I 7D 0006 D     64            TST    DISP.TYP     BYTE DISPLAY ?
0075 I 27 01         65            BEQ    EXC7         YES-DISPLAY BYTE
0077 I 08            66            INX
0078 I FF 0002 D     67 EXC7       STX    CMEM.ADR     SAVE MEMORY ADDR
007B I BD 0001 R     68            JSR    PCRLF
007E I 86 BE         69            LDA A  #'>+$80
0080 I BD 0002 R     70            JSR    OUTCH
0083 I CE 0002 D     71            LDX    #CMEM.ADR    DISPLAY NEXT
0086 I BD 0006 R     72            JSR    OUT4HS       MEMORY LOCATION
0089 I 20 AA         73            BRA    EXCL         CONTINUE
                     74 *
                     75 *        EXAMINE/CHANGE MEMORY TEST MESSAGES
                     76 *
008B I               77 EXCH.ID    EQU    *
008B I BE            78            FCB    '>+$80
008C I 435253        79            FCC    ?CRS EXAMINE/CHANGE MEMORY TEST?
00AA I 04            80            FCB    4
                     81 *
00AB I               82 EXCH.BI    EQU    *
00AB I BE            83            FCB    '>+$80
00AC I 424941        84            FCC    /BIAS = /
00B3 I 04            85            FCB    4
                     86 *
0000 D               87            DSEC
                     88 *
0000 D 0000     A    89 BIAS.SAV   FDB    0            DISPLAY BIAS
0002 D 0000     A    90 CMEM.ADR   FDB    0            CURRENT RELATIVE MEMORY ADDR
0004 D 0000     A    91 AMEM.ADR   FDB    0            ABSOLUTE MEMORY ADDR
0006 D 00            92 DISP.TYP   FCB    0            DISPLAY TYPE
                     93 *
0007                 94            END
CRSMEM(A0011.02.086AA CRS EXAMINE/CHANGE MEMORY)     08/04/78  11:57:13  PAGE   3

  NO ERRORS
 ISECT LENGTH --   180
 DSECT LENGTH --     7

 AMEM.ADR   0004 D    91     45    46    47    53
 BIAS.SAV   0000 D    89     23    26    43    44
 CMEM.ADR   0002 D    90     32    41    42    62    67    71
< CRS.EXCH  0000 I    19      7
 DISP.TYP   0006 D    92     39    48    54    64
 EXC1       002F I    39     37
 EXC2       0054 I    52     49
 EXC3       0057 I    53     51
 EXC4       0064 I    58     55
 EXC5       0067 I    59     57
 EXC6       0018 I    29     61
 EXC7       0078 I    67     65
 EXCH.BI    00AB I    82     24
 EXCH.ID    008B I    77     20
 EXCL       0035 I    41     73
> IN2HX     0003      10     10    56
```

```
> IN4HX     0004     10     10    27    33    58
  KSWSF1    0010 A   16     36    60
> KYENTR    0008     14     14    35    59
> OUT2HS    0005     11     11    50
> OUT4HS    0006     11     11    52    72
> OUTCH     0002      9      9    31    70
> OUTSP     0007     12     12    40
> PCRLF     0001      9      9    29    68
> PDATA     0000      9      9    21    25
CRSTWH(A0011.02.087AA CRS CONTROL PANEL THUMBWHEEL SWIT 08/11/78  13:28:48  PAGE   1

                       2 *
                       3 *       CRS CONTROL PANEL THUMBWHEEL SWITCH TEST
                       4 *
 0000 I                5          ISEC
                       6 *
                       7          DEF    CRS.TWHL
                       8          DEF    STLMPS
                       9 *
                      10          REF    TSWSPR      SAMPLE RATE
                      11          REF    TSWRLT      RECORD LENGTH (TENS)
                      12          REF    TSWRLO      RECORD LENGTH (ONES)
                      13          REF    TSWNCT      NUMBER CHANNELS (TENS)
                      14          REF    TSWNCO      NUMBER CHANNELS (ONES)
                      15          REF    TSWCLH      CONTINUITY LOW LIMIT (HUNDREDS)
                      16          REF    TSWCLT      CONTINUITY LOW LIMIT (TENS)
                      17          REF    TSWCLO      CONTINUITY LOW LIMIT (ONES)
                      18          REF    TSWCHH      CONTINUITY HIGH LIMIT (HUNDREDS)
                      19          REF    TSWCHT      CONTINUITY HIGH LIMIT (TENS)
                      20          REF    TSWCHO      CONTINUITY HIGH LIMIT (ONES)
                      21          REF    TSWLLH      LEAKAGE LOW LIMIT (HUNDREDS)
                      22          REF    TSWLLT      LEAKAGE LOW LIMIT (TENS)
                      23          REF    TSWLLO      LEAKAGE LOW LIMIT (ONES)
                      24          REF    TCPFIL      FILE THUMBWHEEL SWITCH (HUNDREDS)
                      25 *
                      26          REF    CCNT,MPTR
                      27 *
                      28          REF    PDATA,PDATA1
                      29          REF    DECOUT,OUTCH
                      30          REF    PCRLF
                      31 *
                      32          REF    STLCRQ
                      33          REF    SXMTB1,SRCVBF
                      34 *
                      35          REF    KYENTR
                      36 *
                      37 *       MONITOR CONTROL PANEL SWITCH INPUT COMMAND EQUATES
                      38 *
 00F9 A               39 SCDMPS   EQU    $F9         MONITOR CONTROL PNAEL SWITCH INPUT CO     M
 0002 A               40 SCLXMP   EQU    2           COMMAND LENGTH
 0001 A               41 SCLRMP   EQU    1           RESPONSE MESG LENGTH
 03E8 A               42 SCTMPS   EQU    1000        TIMEOUT
                      43 *
                      44 *
 0001 A               45 SW1WRS   EQU    1           W/R SEQUENCE
                      46 *
 000C A               47 KSWCNT   EQU    $C          CONTINUE KEY
                      48 *
                      49 *
                      50 *
 0000 I               51 CRS.TWHL EQU    *
 0000 I CE 0140 I     52          LDX    #TWHL.ID
 0003 I BD 0011 R     53          JSR    PDATA       IDENTIFY TEST
 0006 I CE 0116 I     54          LDX    #TWHL.CTB-5
 0009 I 08            55 TWHL     INX
 000A I 08            56          INX
 000B I 08            57          INX
 000C I 08            58          INX
 000D I 08            59          INX
CRSTWH(A0011.02.087AA CRS CONTROL PANEL THUMBWHEEL SWIT 08/11/78  13:28:49  PAGE   2

 000E I FF 0000 D     60          STX    XSAV        INCR CONTROL TABLE PNTR
 0011 I EE 00         61          LDX    0,X         END-OF-TABLE ?
 0013 I 27 15         62          BEQ    TWHL2       YES - CHECK MONITOR CONTROL PANEL
```

```
0015 I BD 0011 R    63            JSR    PDATA         IDENTIFY SWITCH GROUP
0018 I FE 0000 D    64            LDX    XSAV
001B I A6 04        65            LDA A  4,X           PICK UP # DIGITS IN GROUP
001D I EE 02        66            LDX    2,X           POINTER TO MOST SIGNIFICANT DIGIT
001F I BD 00B0 I    67            JSR    SWDSP         PROCESS SWITCH DISPLAY
0022 I 7F 0019 R    68            CLR    KYENTR
0025 I FE 0000 D    69            LDX    XSAV          RESTORE CONTROL TABLE POINTER
0028 I 20 DF        70            BRA    TWHL
002A I              71 TWHL2      EQU    *
002A I CE 01CF I    72            LDX    #MCTP.CTB-7
002D I 08           73 TWHLI      INX
002E I 08           74            INX
002F I 08           75            INX
0030 I 08           76            INX
0031 I 08           77            INX
0032 I 08           78            INX
0033 I 08           79            INX
0034 I FF 0000 D    80            STX    XSAV          INCR CONTROL TABLE PNTR
0037 I EE 00        81            LDX    0,X           END-OF-TABLE ?
0039 I 27 74        82            BEQ    TWHLX         YES - TEST COMPLETE
003B I 7F 0019 R    83            CLR    KYENTR
003E I BD 0011 R    84            JSR    PDATA         IDENTIFY SWITCH
0041 I FE 0000 D    85 TWHLB      LDX    XSAV
0044 I A6 02        86            LDA A  2,X           PICK UP SWITCH ADDR
0046 I E6 03        87            LDA B  3,X           PICK UP SWITCH TYPE
0048 I 37           88            PSH B
0049 I B7 0017 R    89            STA A  SXMTB1
004C I CE 02AA I    90            LDX    #STLMPS
004F I BD 0016 R    91            JSR    STLCRQ
0052 I 33           92            PUL B
0053 I B6 0018 R    93            LDA A  SRCVBF
0056 I FE 0000 D    94            LDX    XSAV
0059 I 5D           95            TST B                POSITION ID REQUIRED ?
005A I 26 14        96            BNE    TWHL3         NO- CONTINUE
005C I A1 06        97            CMP A  6,X
005E I 22 14        98            BHI    TWHL3A
0060 I EE 04        99            LDX    4,X           PICK UP PNTR TO SWITCH ID TABLE
0062 I 4A          100 TWHL5      DEC A
0063 I 2B 04       101            BMI    TWHL4         POSITION PNTR FOR
0065 I 08          102            INX                  CURRENT
0066 I 08          103            INX                  SWITCH
0067 I 20 F9       104            BRA    TWHL5         POSITION
0069 I EE 00       105 TWHL4      LDX    0,X
006B I BD 0012 R   106 TWHL8      JSR    PDATA1        IDENTIFY SWITCH POSITION
006E I 20 26       107            BRA    TWHL6
0070 I A1 05       108 TWHL3      CMP A  5,X           VALID SETTING ?
0072 I 23 05       109            BLS    TWHL7         YES - CONTINUE
0074 I CE 02A2 I   110 TWHL3A     LDX    #MSW.INV      NOTIFY OPERATOR OF INVALID SWITCH
0077 I 20 F2       111            BRA    TWHL8
0079 I E6 04       112 TWHL7      LDA B  4,X           PIXK UP INCR FOR EACH SW POSITION
007B I CE 0008 D   113            LDX    #MSW.VAL
007E I 6F 01       114            CLR    1,X
0080 I 6F 00       115            CLR    0,X
0082 I 4A          116 TWHLA      DEC A                SWITCH READING CONVERSION COMPLETE ?
0083 I 2B 0E       117            BMI    TWHL9         YES - DISPLAY READING
CRSTWH(A0011.02.087AA CRS CONTROL PANEL THUMBWHEEL SWIT 08/11/78  13:28:50  PAGE   3

0085 I 37          118            PSH B
0086 I EB 01       119            ADD B  1,X
0088 I E7 01       120            STA B  1,X
008A I E6 00       121            LDA B  0,X
008C I C9 00       122            ADC B  #0
008E I E7 00       123            STA B  0,X
0090 I 33          124            PUL B
0091 I 20 EF       125            BRA    TWHLA
0093 I BD 0013 R   126 TWHL9      JSR    DECOUT        DISPLAY SWITCH READING
0096 I FE 0000 D   127 TWHL6      LDX    XSAV
0099 I F6 0019 R   128            LDA B  KYENTR
009C I C1 0C       129            CMP B  #$C
009E I 27 8D       130            BEQ    TWHLI         YES-CONTINUE
00A0 I 86 0D       131            LDA A  #$D
00A2 I BD 0014 R   132            JSR    OUTCH
00A5 I FE 0000 D   133            LDX    XSAV
00A8 I EE 00       134            LDX    0,X
```

```
00AA I BD 0012 R           JSR    PDATA1       IDENTIFY SWITCH
00AD I 20 92               BRA    TWHLB        CONTINUE
00AF I 39           TWHLX  RTS                 END-OF-TEST
                    *
                    *      SWITCH DISPLAY ROUTINE
                    *
00B0 I              SWDSP  EQU    *
00B0 I FF 0004 D           STX    XSTRT
00B3 I FF 0002 D           STX    XSAV2        POINTER TO MOST SIGNIFICANT DIGIT
00B6 I 16                  TAB                 SAVE # DIGITS
00B7 I 34           SWD1   DES
00B8 I 5A                  DEC B               USE STACK TO SAVE
00B9 I 2A FC               BPL    SWD1         CURRENT SWITCH READING
00BB I 36                  PSH A
00BC I BD 0015 R           JSR    PCRLF
00BF I 86 BE               LDA A  #'>+$80
00C1 I BD 0014 R           JSR    OUTCH
00C4 I 32           SWDL   PUL A               PICK UP # DIGITS
00C5 I 36                  PSH A
00C6 I 30                  TSX
00C7 I 08           SWD2   INX
00C8 I FF 0006 D           STX    XDEST        SET DESTINATION ADDR
00CB I FE 0004 D           LDX    XSTRT        SETUP CURRENT SWITCH READING
00CE I E6 00               LDA B  0,X
00D0 I CA 30               ORA B  #$30
00D2 I C1 39               CMP B  #'9
00D4 I 23 02               BLS    SWD2A
00D6 I C6 2D               LDA B  #$2D
00D8 I 08           SWD2A  INX
00D9 I FF 0004 D           STX    XSTRT
00DC I FE 0006 D           LDX    XDEST
00DF I E7 00               STA B  0,X
00E1 I 4A                  DEC A               MOVE COMPLETE ?
00E2 I 26 E3               BNE    SWD2         NO-CONTINUE
00E4 I C6 04               LDA B  #4
00E6 I E7 01               STA B  1,X
00E8 I 30                  TSX
00E9 I 08                  INX
00EA I BD 0012 R           JSR    PDATA1       DISPLAY CURRENT SWITCH READING
00ED I 32                  PUL A
00EE I 36                  PSH A
CRSTWH(A0011.02.087AA CRS CONTROL PANEL THUMBWHEEL SWIT 08/11/78  13:28:52  PAGE   4

00EF I 16                  TAB
00F0 I 7A 000F R    SWD3   DEC    CCNT         RE-POSITION CHARACTER COUNTER
00F3 I 4A                  DEC A
00F4 I 26 FA               BNE    SWD3
00F6 I FE 0010 R           LDX    MPTR
00F9 I 09           SWD4   DEX                 RE-POSITION SELF-SCAN MEMORY PNTR
00FA I 5A                  DEC B
00FB I 26 FC               BNE    SWD4
00FD I FF 0010 R           STX    MPTR
0100 I 32                  PUL A
0101 I 30                  TSX
0102 I FF 0006 D           STX    XDEST
0105 I 36                  PSH A
0106 I F6 0019 R    SWD6   LDA B  KYENTR
0109 I C1 0C               CMP B  #KSWCNT      GO TO NEXT SWITCH ?
010B I 26 06               BNE    SWD5         NO - CONTINUE
010D I 32                  PUL A
010E I 31           SWD7   INS
010F I 4A                  DEC A
0110 I 2A FC               BPL    SWD7
0112 I 39                  RTS                 RETURN TO CALLER
0113 I FE 0002 D    SWD5   LDX    XSAV2
0116 I FF 0004 D           STX    XSTRT
0119 I 20 A9               BRA    SWDL
                    *
                    *      CRS THUMBWHEEL SWITCH TEST CONTROL TABLE
                    *
011B I              TWHL.CTB EQU  *
011B I 015C     I          FDB    TWHL.SPR,TSWSPRSAMPLE RATE
011D I 0000     R
```

```
011F I 01            205            FCB     1
                     206 *
0120 I 0169     I    207            FDB     TWHL.RCL,TSWRLTRECORD LENGTH
0122 I 0001     R
0124 I 02            208            FCB     2
                     209 *
0125 I 0178     I    210            FDB     TWHL.NCH,TSWNCTNUMBER CHANNELS
0127 I 0003     R
0129 I 02            211            FCB     2
                     212 *
012A I 0189     I    213            FDB     TWHL.CLL,TSWCLHCONTINUITY LOW LIMIT
012C I 0005     R
012E I 03            214            FCB     3
                     215 *
012F I 019F     I    216            FDB     TWHL.CHL,TSWCHHCONTINUITY HIGH LIMIT
0131 I 0008     R
0133 I 03            217            FCB     3
                     218 *
0134 I 01B6     I    219            FDB     TWHL.LLL,TSWLLHLEAKAGE LOW LIMIT
0136 I 000B     R
0138 I 03            220            FCB     3
                     221 *
0139 I 01C9     I    222            FDB     TWHL.FIL,TOPFILFILE NUMBER
013B I 000E     R
013D I 03            223            FCB     3
                     224 *
013E I 0000     A    225            FDB     0
                     226 *
CRSTWH(A0011.02.087AA CRS CONTROL PANEL THUMBWHEEL SWIT 08/11/78  13:28:53  PAGE   5

                     227 *          CRS THUMBWHEEL TEST SWITCH IDENTIFICATION
                     228 *
0140 I BE            229 TWHL.ID    FCB     '>+$80
0141 I 435253        230            FCC     /CRS THUMBWHEEL SWITCH TEST/
015B I 04            231            FCB     4
                     232 *
015C I BE            233 TWHL.SPR   FCB     '>+$80
015D I 53414D        234            FCC     /SAMPLE RATE/
0168 I 04            235            FCB     4
                     236 *
0169 I BE            237 TWHL.RCL   FCB     '>+$80
016A I 524543        238            FCC     /RECORD LENGTH/
0177 I 04            239            FCB     4
                     240 *
0178 I BE            241 TWHL.NCH   FCB     '>+$80
0179 I 4E554D        242            FCC     /NUMBER CHANNELS/
0188 I 04            243            FCB     4
                     244 *
0189 I BE            245 TWHL.CLL   FCB     '>+$80
018A I 434F4E        246            FCC     /CONTINUITY LOW LIMIT/
019E I 04            247            FCB     4
                     248 *
019F I BE            249 TWHL.CHL   FCB     '>+$80
01A0 I 434F4E        250            FCC     /CONTINUITY HIGH LIMIT/
01B5 I 04            251            FCB     4
                     252 *
01B6 I BE            253 TWHL.LLL   FCB     '>+$80
01B7 I 4C4541        254            FCC     /LEAKAGE LOW LIMIT/
01C8 I 04            255            FCB     4
                     256 *
01C9 I BE            257 TWHL.FIL   FCB     '>+$80
01CA I 46494C        258            FCC     /FILE NUMBER/
01D5 I 04            259            FCB     4
                     260 *
                     261 *
                     262 *
                     263 *          MONITOR CONTROL PANEL THUMBWHEEL SWITCH TEST CONTROL TABLE
                     264 *
01D6 I               265 MCTP.CTB   EQU     *
                     266 *
01D6 I 0219     I    267            FDB     MSW.LCFL      LOW CUT FILTER
01D8 I 0C            268            FCB     12            SWITCH ADDR
01D9 I 00            269            FCB     0             POSITION ID REQUIRED
01DA I 0209     I    270            FDB     LCFL.IDT      POSITION ID TABLE
```

```
01DC I 03           271            FCB    3            MAXIMUM SWITCH READING
                    272 *
01DD I 023C     I   273            FDB    MSW.TPTM     TRIP TIME
01DF I 08           274            FCB    8            SWITCH ADDR
01E0 I 01           275            FCB    1            NO POSTION ID REQUIRED
01E1 I 01           276            FCB    1            INCR FOR EACH SW POSITION
01E2 I 09           277            FCB    9            MAXIMUM SWITCH READING
01E3 I 00           278            FCB    0
                    279 *
01E4 I 024A     I   280            FDB    MSW.TPSP     TRIP SLOPE
01E6 I 09           281            FCB    9            SWITCH ADDR
01E7 I 01           282            FCB    1            NO POSITION ID REQUIRED
01E8 I 14           283            FCB    20           INCR FOR EACH SWITCH POSITION
01E9 I 09           284            FCB    9            MAXIMUM SWITCH READING
CRSTWH(A0011.02.087AA CRS CONTROL PANEL THUMBWHEEL SWIT 08/11/78  13:28:55  PAGE   6

01EA I 00           285            FCB    0
                    286 *
01EB I 0259     I   287            FDB    MSW.TPRT     TRIP RATE
01ED I 0B           288            FCB    11           SWITCH ADDR
01EE I 00           289            FCB    0            POSITION ID REQUIRED
01EF I 0211     I   290            FDB    TPRT.IDT     POSITION ID TABLE
01F1 I 03           291            FCB    3            MAXIMUM SWITCH READING
                    292 *
01F2 I 0277     I   293            FDB    MSW.SEIS     FIXED SEIS
01F4 I 0A           294            FCB    10           SWITCH ADDR
01F5 I 01           295            FCB    1            NO POSITION REQ1IRED
01F6 I 06           296            FCB    6            INCR FOR EQCH SW POSITION
01F7 I 0F           297            FCB    $F           MAXIMUM SWITCH READING
01F8 I 00           298            FCB    0
                    299 *
01F9 I 0286     I   300            FDB    MSW.GAIN     GAIN AUX.
01FB I 0E           301            FCB    14           SWITCH ADDR
01FC I 01           302            FCB    1            NO POSITION ID REQUIRED
01FD I 06           303            FCB    6            INCR FOR EQCH SWITCH POSITION
01FE I 0F           304            FCB    $F           MAXIMUM SWITCH READING
01FF I 00           305            FCB    0
                    306 *
0200 I 0293     I   307            FDB    MSW.NGN      NOISE GAIN
0202 I 0D           308            FCB    13           SWITCH ADDR
0203 I 01           309            FCB    1            NO POSITION ID REQUIRED
0204 I 06           310            FCB    6            INCR FOR EQCH SWITCH POSITION
0205 I 0F           311            FCB    $F           MAXIMUM SWITCH READING
0206 I 00           312            FCB    0
                    313 *
0207 I 0000     A   314            FDB    0            END-OF-TABLE
                    315 *
                    316 *
                    317 *         SWITCH POSITION IDENTIFIER TABLE
                    318 *
0209 I              319 LCFL.IDT   EQU    *
0209 I 022C     I   320            FDB    LCFL.OUT
020B I 0230     I   321            FDB    LCFL.8
020D I 0234     I   322            FDB    LCFL.12
020F I 0238     I   323            FDB    LCFL.18
                    324 *
0211 I              325 TPRT.IDT   EQU    *
0211 I 0267     I   326            FDB    TPRT.16
0213 I 026B     I   327            FDB    TPRT.32
0215 I 026F     I   328            FDB    TPRT.64
0217 I 0273     I   329            FDB    TPRT.128
                    330 *
                    331 *
0219 I BE           332 MSW.LCFL   FCB    '>+$80
021A I 4C4F57       333            FCC    /LOW CUT FILTER:  //
022B I 04           334            FCB    4
                    335 *
022C I              336 LCFL.OUT   EQU    *
022C I 4F5554       337            FCC    /OUT/
022F I 04           338            FCB    4
                    339 *
0230 I              340 LCFL.8     EQU    *
0230 I 382020       341            FCC    /8  /
0233 I 04           342            FCB    4
```

```
CRSTWH(A0011.02.087AA CRS CONTROL PANEL THUMBWHEEL SWIT 08/11/78  13:28:56  PAGE   7

                     343 *
0234 I               344 LCFL.12   EQU    *
0234 I 313220        345           FCC    /12 /
0237 I 04            346           FCB    4
                     347 *
0238 I               348 LCFL.18   EQU    *
0238 I 313820        349           FCC    /18 /
023B I 04            350           FCB    4
                     351 **
                     352 **
023C I BE            353 MSW.TPTM  FCB    '>+$80
023D I 545249        354           FCC    /TRIP TIME:   /
0249 I 04            355           FCB    4
                     356 **
                     357 **
024A I BE            358 MSW.TPSP  FCB    '>+$80
024B I 545249        359           FCC    /TRIP SLOPE:   /
0258 I 04            360           FCB    4
                     361 **
                     362 **
0259 I BE            363 MSW.TPRT  FCB    '>+$80
025A I 545249        364           FCC    /TRIP RATE:   /
0266 I 04            365           FCB    4
                     366 *
0267 I               367 TPRT.16   EQU    *
0267 I 313620        368           FCC    /16 /
026A I 04            369           FCB    4
                     370 *
026B I               371 TPRT.32   EQU    *
026B I 333220        372           FCC    /32 /
026E I 04            373           FCB    4
                     374 *
026F I               375 TPRT.64   EQU    *
026F I 363420        376           FCC    /64 /
0272 I 04            377           FCB    4
                     378 *
0273 I               379 TPRT.128  EQU    *
0273 I 313238        380           FCC    /128/
0276 I 04            381           FCB    4
                     382 **
                     383 **
0277 I BE            384 MSW.SEIS  FCB    '>+$80
0278 I 464958        385           FCC    /FIXED SEIS:   /
0285 I 04            386           FCB    4
                     387 **
                     388 **
0286 I BE            389 MSW.GAIN  FCB    '>+$80
0287 I 474149        390           FCC    /GAIN AUX:   /
0292 I 04            391           FCB    4
                     392 **
                     393 **
0293 I BE            394 MSW.NGN   FCB    '>+$80
0294 I 4E4F49        395           FCC    /NOISE GAIN:   /
02A1 I 04            396           FCB    4
                     397 *
02A2 I               398 MSW.INV   EQU    *
02A2 I C9            399           FCB    'I+$80
02A3 I CE            400           FCB    'N+$80
CRSTWH(A0011.02.087AA CRS CONTROL PANEL THUMBWHEEL SWIT 08/11/78  13:28:57  PAGE   8

02A4 I D6            401           FCB    'V+$80
02A5 I C1            402           FCB    'A+$80
02A6 I CC            403           FCB    'L+$80
02A7 I C9            404           FCB    'I+$80
02A8 I C4            405           FCB    'D+$80
02A9 I 04            406           FCB    4
                     407 **
                     408 **
                     409 *
                     410 *        MONITOR CONTROL PANEL SWITCH INPUT REQUEST BLOCK
                     411 *
02AA I               412 STLMPS    EQU    *
```

```
02AA I 01           413          FCB    SW1WRS
02AB I F9           414          FCB    SCDMPS
02AC I 02           415          FCB    SCLXMP
02AD I 01           416          FCB    SCLRMP
02AE I 03E8     A   417          FDB    SCTMPS
                    418 *
0000 D              419          DSEC
                    420 *
0000 D 0000     A   421 XSAV     FDB    0
0002 D 0000     A   422 XSAV2    FDB    0
0004 D 0000     A   423 XSTRT    FDB    0
0006 D 0000     A   424 XDEST    FDB    0
0008 D 0000     A   425 MSW.VAL  FDB    0
                    426 *
000A                427          END
CRSTWH(A0011.02.087AA CRS CONTROL PANEL THUMBWHEEL SWIT 08/11/78  13:28:58  PAGE   9

  NO ERRORS
 ISECT LENGTH --   688
 DSECT LENGTH --    10

> CCNT      000F      26    26   177
< CRS.TWHL  0000 I    51     7
> DECOUT    0013      29    29   126
  KSWCNT    000C A    47   190
> KYENTR    0019      35    35    68    83   128   189
  LCFL.12   0234 I   344   322
  LCFL.18   0238 I   348   323
  LCFL.8    0230 I   340   321
  LCFL.IDT  0209 I   319   270
  LCFL.OUT  022C I   336   320
  MCTP.CTB  01D6 I   265    72
> MPTR      0010      26    26   180   184
  MSW.GAIN  0286 I   389   300
  MSW.INV   02A2 I   398   110
  MSW.LCFL  0219 I   332   267
  MSW.NGN   0293 I   394   307
  MSW.SEIS  0277 I   384   293
  MSW.TPRT  0259 I   363   287
  MSW.TPSP  024A I   358   280
  MSW.TPTM  023C I   353   273
  MSW.VAL   0008 D   425   113
> OUTCH     0014      29    29   132   151
> PCRLF     0015      30    30   149
> PDATA     0011      28    28    53    63    84
> PDATA1    0012      28    28   106   135   173
  SCDMPS    00F9 A    39   414
  SCLRMP    0001 A    41   416
  SCLXMP    0002 A    40   415
  SCTMPS    03E8 A    42   417
> SRCVBF    0018      33    33    93
> STLCRQ    0016      32    32    91
< STLMPS    02AA I   412     8    90
  SW1WRS    0001 A    45   413
  SWD1      00B7 I   145   147
  SWD2      00C7 I   155   168
  SWD2A     00D8 I   163   161
  SWD3      00F0 I   177   179
  SWD4      00F9 I   181   183
  SWD5      0113 I   197   191
  SWD6      0106 I   189
  SWD7      010E I   193   195
  SWDL      00C4 I   152   199
  SWDSP     00B0 I   141    67
> SXMTB1    0017      33    33    89
> TCPFIL    000E      24    24   222
  TPRT.128  0273 I   379   329
  TPRT.16   0267 I   367   326
  TPRT.32   026B I   371   327
  TPRT.64   026F I   375   328
  TPRT.IDT  0211 I   325   290
> TSWCHH    0008      18    18   216
> TSWCHO    000A      20    20
> TSWCHT    0009      19    19
```

```
CRSTWH(A0011.02.087AA CRS CONTROL PANEL THUMBWHEEL SWIT 08/11/78  13:28:59  PAGE  10

> TSWCLH    0005      15    15   213
> TSWCLO    0007      17    17
> TSWCLT    0006      16    16
> TSWLLH    000B      21    21   219
> TSWLLO    000D      23    23
> TSWLLT    000C      22    22
> TSWNCO    0004      14    14
> TSWNCT    0003      13    13   210
> TSWRLO    0002      12    12
> TSWRLT    0001      11    11   207
> TSWSPR    0000      10    10   204
  TWHL      0009 I    55    70
  TWHL.CHL  019F I   249   216
  TWHL.CLL  0189 I   245   213
  TWHL.CTB  011B I   203    54
  TWHL.FIL  01C9 I   257   222
  TWHL.ID   0140 I   229    52
  TWHL.LLL  01B6 I   253   219
  TWHL.NCH  0178 I   241   210
  TWHL.PCL  0169 I   237   207
  TWHL.SPR  015C I   233   204
  TWHL2     002A I    71    62
  TWHL3     0070 I   108    96
  TWHL3A    0074 I   110    98
  TWHL4     0069 I   105   101
  TWHL5     0062 I   100   104
  TWHL6     0096 I   127   107
  TWHL7     0079 I   112   109
  TWHL8     006B I   106   111
  TWHL9     0093 I   126   117
  TWHLA     0082 I   116   125
  TWHLB     0041 I    85   136
  TWHLI     002D I    73   130
  TWHLX     00AF I   137    82
  XDEST     0006 D   424   156   165   187
  XSAV      0000 D   421    60    64    69    80    85    94   127   133
  XSAV2     0002 D   422   143   197
  XSTRT     0004 D   423   142   157   164   198
CRSRTY(A0011.02.088AA CRS ROTARY SWITCH TEST)         08/04/78  13:15:54  PAGE   1

                     *
                     *      CRS CONTROL PANEL ROTARY SWITCH TEST
                     *
 0000 I                      ISEC
                     *
                             DEF     CRS.RTRY
                     *
                             REF     RTSADV        SPREAD CONTROL-STEP ADVANCE
                             REF     RTSLNN        SPREAD CONTROL-LINE NUMBER
                             REF     RTSTLN        TEST CONTROL - NORMAL TEST LENG
                             REF     RTSSPT        SPREAD CONTROL - SHOT POINT
                             REF     TCPSWX        TAPE CONTROL PANEL - SEARCH
                     *
                             REF     PDATA,PDATA1
                             REF     PCRLF
                     *
                             REF     STLCRQ
                             REF     SXMTB1,SRCVBF
                             REF     STLMPS
                             REF     KYENTR
                             REF     DLYRTN
                     *
                     *
                     *      NOISE LENGTH SWITCH POSITION EQUATES
                     *
 0001 A               NTSTL0   EQU     1           NOISE TEST LENGTH = 0 SECONDS
 0002 A               NTSTL1   EQU     2           NOISE TEST LENGTH = 1 SECONDS
 0004 A               NTSTL2   EQU     4           NOISE TEST LENGTH = 2 SECONDS
 0008 A               NTSTL6   EQU     8
                     *
                     *      LINE NUMBER ROTARY SWITCH POSITION EQUATES
                     *
```

```
0001 A              34 LNESW1    EQU    1          LINE 1
0002 A              35 LNESW2    EQU    2          LINE 2
0004 A              36 LNESW3    EQU    4          LINE 3
0008 A              37 LNESW4    EQU    8          LINE 4
                    38 *
                    39 *         SHOOTER ROTARY SWITCH POSITION EQUATES
                    40 *
0001 A              41 SHTPTA    EQU    1          SHOOTER A
0002 A              42 SHTPTB    EQU    2          SHOOTER B
                    43 *
                    44 *         STEP ADVANCE ROTARY SWITCH POSITION EQUATES
                    45 *
0001 A              46 SPAMN4    EQU    1          -1 ADVANCE
0002 A              47 SPAMN3    EQU    2          -2 ADVANCE
0004 A              48 SPAMN2    EQU    4          -3 ADVANCE
0008 A              49 SPAMN1    EQU    8          -4 ADVANCE
0000 A              50 SPAZAV    EQU    0          0 ADVANCE
0010 A              51 SPAPL1    EQU    $10        +1 ADVANCE
0020 A              52 SPAPL2    EQU    $20        +2 ADVANCE
0040 A              53 SPAPL3    EQU    $40        +4 ADVANCE
0080 A              54 SPAPL4    EQU    $80        +8 ADVANCE
                    55 *
                    56 *         TAPE SEARCH FUNCTION ROTARY SWITCH POSITION EQUATES
                    57 *
0001 A              58 SCHEND    EQU    1          END DATA
0002 A              59 SCHBSP    EQU    2          BACKSPACE
CRSRTY(A0011.02.088AA CRS ROTARY SWITCH TEST)      08/04/78  13:15:55  PAGE   2

0004 A              60 SCHREV    EQU    4          REVERSE FILE SEARCH
0008 A              61 SCHFWD    EQU    8          FORWARD FILE SEARCH
                    62 *
                    63 *
000C A              64 KSWCNT    EQU    $C         CONTINUE KEY
                    65 *
                    66 *
0000 I              67 CRS.RTRY  EQU    *
0000 I CE 0279 I    68           LDX    #RTRY.ID
0003 I BD 0005 R    69           JSR    PDATA      IDENTIFY TEST
0006 I CE 0086 I    70           LDX    #RTRY.CTB
0009 I FF 0000 D    71           STX    PTR.CTB    INIT. CONTROL TABLE PNTR
                    72 *
000C I              73 RTRY.SWL  EQU    *
000C I FE 0000 D    74           LDX    PTR.CTB
000F I EE 02        75           LDX    2,X
0011 I BD 0005 R    76           JSR    PDATA      IDENTIFY CURRENT SWITCH
0014 I FE 0000 D    77           LDX    PTR.CTB
0017 I EE 06        78           LDX    6,X
0019 I FF 0004 D    79           STX    PTR.PSEN   SET END-SWITCH POSITION
001C I BD 0007 R    80           JSR    PCRLF
001F I              81 RTRY.PSL  EQU    *
001F I 7F 000C R    82           CLR    KYENTR
0022 I CE 0291 I    83           LDX    #RTRY.PMT
0025 I BD 0006 R    84           JSR    PDATA1     OUTPUT OPERATOR PROMPT
0028 I FE 0000 D    85           LDX    PTR.CTB
002B I EE 04        86           LDX    4,X
002D I FF 0002 D    87           STX    PTR.PSID   PNTR SWITCH POSITION ID TABLE
0030 I FE 0000 D    88           LDX    PTR.CTB
0033 I A6 00        89           LDA A  0,X        MONITOR CONTROL PNEL SWITCH
0035 I 26 10        90           BNE    RTRY4      NO-CONTINUE
0037 I A6 01        91           LDA A  1,X        PICK UP SWITCH ADDR
0039 I B7 0009 R    92           STA A  SXMTB1
003C I CE 000B R    93           LDX    #STLMPS
003F I BD 0308 R    94           JSR    STLCRQ
0042 I B6 000A R    95           LDA A  SRCVBF
0045 I 20 04        96           BRA    RTRY4A
0047 I EE 00        97 RTRY4     LDX    0,X
0049 I A6 00        98           LDA A  0,X        INPUT SWITCH POSITION
004B I FE 0002 D    99 RTRY4A    LDX    PTR.PSID
004E I A1 00       100 RTRY1     CMP A  0,X        SWITCH POSITION ID MATCH ?
0050 I 27 12       101           BEQ    RTRY3      YES-NOTIFY OPERATOR
0052 I BC 0004 D   102           CPX    PTR.PSEN   INVALID SWITCH READING ?
0055 I 27 0A       103           BEQ    RTRYI      YES-NOTIFY OPERATOR
0057 I C6 04       104           LDA B  #4         END-OF-MESG
0059 I 08          105 RTRY2     INX
```

```
 005A I E1 00          106           CMP B  0,X           POSITION TO NEXT SWITCH POSITION
 005C I 26 FB          107           BNE    RTRY2
 005E I 08             108           INX
 005F I 20 ED          109           BRA    RTRY1         CONTINUE
 0061 I CE 02C4 I      110 RTRYI     LDX    #RTRY.IVL-1   INVALID SWITCH READING
 0064 I 08             111 RTRY3     INX
 0065 I BD 0006 R      112           JSR    PDATA1        OUTPUT SWITCH POSITION ID
 0068 I CE 01F4 A      113           LDX    #500
 006B I BD 000D R      114           JSR    DLYRTN
 006E I B6 000C R      115           LDA A  KYENTR
 0071 I 81 0C          116           CMP A  #KSUCNT       GO TO NEXT SWITCH
 0073 I 26 AA          117           BNE    RTRY.PSL
CRSRTY(A0011.02.088AA CRS ROTARY SWITCH TEST)         08/04/78  13:15:56  PAGE   3

 0075 I FE 0000 D      118           LDX    PTR.CTB
 0078 I C6 08          119           LDA B  #8
 007A I 08             120 RTRY5     INX
 007B I 5A             121           DEC B
 007C I 26 FC          122           BNE    RTRY5         POSITION CNTRL TABLE PNTR TO NEXT SWI    T
 007E I FF 0000 D      123           STX    PTR.CTB
 0081 I EE 00          124           LDX    0,X           END-OF-TABLE ?
 0083 I 26 87          125           BNE    RTRY.SWL      NO-PROCESS NEXT SWITCH
 0085 I 39             126           RTS
                       127 *
                       128 *         CRS ROTARY SWITCH TEST CONTROL TABLE
                       129 *
 0086 I                130 RTRY.CTB  EQU    *
 0086 I 0002      R    131           FDB    RTSTLN        TEST CONTROL - NORMAL TEST LENGTH
 0088 I 00B8      I    132           FDB    SW.NTLN
 008A I 011C      I    133           FDB    NTLN.ID
 008C I 0179      I    134           FDB    NTLN.EN
                       135 *
 008E I 0001      R    136           FDB    RTSLNN        SPREAD CONTROL - LINE NUMBER
 0090 I 00CC      I    137           FDB    SW.SLNN
 0092 I 0198      I    138           FDB    SLNN.ID
 0094 I 01B0      I    139           FDB    SLNN.EN
                       140 *
 0096 I 0003      R    141           FDB    RTSSPT        SPREAD CONTROL - SHOT POINT
 0098 I 00D9      I    142           FDB    SW.SSPT
 009A I 01B8      I    143           FDB    SSPT.ID
 009C I 01C3      I    144           FDB    SSPT.EN
                       145 *
 009E I 0000      R    146           FDB    RTSADV        SPREAD CONTROL - STEP ADVANCE
 00A0 I 00E5      I    147           FDB    SW.SADV
 00A2 I 01CE      I    148           FDB    SADV.ID
 00A4 I 022E      I    149           FDB    SADV.EN
                       150 *
 00A6 I 0004      R    151           FDB    TCPSWX        TAPE CONTROL PANEL - SEARCH
 00A8 I 00F3      I    152           FDB    SW.SRCH
 00AA I 023A      I    153           FDB    SRCH.ID
 00AC I 0264      I    154           FDB    SRCH.EN
                       155 *
 00AE I 000F      A    156           FDB    15            MONITOR GAIN MODE
 00B0 I 0108      I    157           FDB    SW.MGMD
 00B2 I 0295      I    158           FDB    MGMD.ID
 00B4 I 02E9      I    159           FDB    MGMD.EN
                       160 *
 00B6 I 0000      A    161           FDB    0             END-OF-TABLE
                       162 *
                       163 *         ROTARY SWITCH IDENTIFIER MESSAGES
                       164 *
 00B8 I                165 SW.NTLN   EQU    *
 00B8 I BE             166           FCB    '>+$80
 00B9 I 4E4F52         167           FCC    /NORMAL TEST LENGTH/
 00CB I 04             168           FCB    4
                       169 *
 00CC I                170 SW.SLNN   EQU    *
 00CC I BE             171           FCB    '>+$80
 00CD I 4C494E         172           FCC    /LINE NUMBER/
 00D8 I 04             173           FCB    4
                       174 *
 00D9 I                175 SW.SSPT   EQU    *
```

```
CR...TY(A0011.02.088AA CRS ROTARY SWITCH TEST)          08/04/78  13:15:57  PAGE   4

00D9 I BE                      FCB    '>+$80
00DA I 53484F                  FCC    /SHOT POINT/
00E4 I 04                      FCB    4
                 *
00E5 I           SW.SADV       EQU    *
00E5 I BE                      FCB    '>+$80
00E6 I 535445                  FCC    /STEP ADVANCE/
00F2 I 04                      FCB    4
                 *
00F3 I           SW.SRCH       EQU    *
00F3 I BE                      FCB    '>+$80
00F4 I 544150                  FCC    /TAPE SEARCH CONTROL/
0107 I 04                      FCB    4
                 *
0108 I           SW.MGMD       EQU    *
0108 I BE                      FCB    '>+$80
0109 I 4D4F4E                  FCC    /MONITOR GAIN MODE /
011B I 04                      FCB    4
                 *
                 *             ROTARY SWITCH POSITION ID TABLES
                 *
011C I           NTLN.ID       EQU    *            NORMAL TEST LENGTH
                 *
011C I 01                      FCB    NTSTL0
011D I 4E4F49                  FCC    /NOISE TEST LENGTH = 0 SECONDS/
013A I 04                      FCB    4
                 *
013B I 02                      FCB    NTSTL1
013C I 4E4F49                  FCC    /NOISE TEST LENGTH = 1 SECOND /
0159 I 04                      FCB    4
                 *
015A I 04                      FCB    NTSTL2
015B I 4E4F49                  FCC    /NOISE TEST LENGTH = 2 SECONDS/
0178 I 04                      FCB    4
                 *
0179 I           NTLN.EN       EQU    *
0179 I 08                      FCB    NTSTL6
017A I 4E4F49                  FCC    /NOISE TEST LENGTH = 6 SECONDS/
0197 I 04                      FCB    4
                 *
                 *
0198 I           SLNN.ID       EQU    *            LINE NUMBER
                 *
0198 I 01                      FCB    LNESW1
0199 I 4C494E                  FCC    /LINE 1/
019F I 04                      FCB    4
                 *
01A0 I 02                      FCB    LNESW2
01A1 I 4C494E                  FCC    /LINE 2/
01A7 I 04                      FCB    4
                 *
01A8 I 04                      FCB    LNESW3
01A9 I 4C494E                  FCC    /LINE 3/
01AF I 04                      FCB    4
                 *
01B0 I           SLNN.EN       EQU    *
01B0 I 08                      FCB    LNESW4
01B1 I 4C494E                  FCC    /LINE 4/
CR...TY(A0011.02.088AA CRS ROTARY SWITCH TEST)          08/04/78  13:15:59  PAGE   5

01B7 I 04                      FCB    4
                 *
                 *
01B8 I           SSPT.ID       EQU    *            SHOT POINT SELECT
                 *
01B8 I 01                      FCB    SHTPTA
01B9 I 53484F                  FCC    /SHOOTER A/
01C2 I 04                      FCB    4
                 *
01C3 I           SSPT.EN       EQU    *
01C3 I 02                      FCB    SHTPTB
01C4 I 53484F                  FCC    /SHOOTER B/
```

```
01CD I 04         246            FCB    4
                  247 *
                  248 *
01CE I            249 SADV.ID    EQU    *            STEP ADVANCE
                  250 *
01CE I 01         251            FCB    SPAMN4
01CF I 2D3120     252            FCC    /-1 ADVANCE/
01D9 I 04         253            FCB    4
                  254 *
01DA I 02         255            FCB    SPAMN3
01DB I 2D3220     256            FCC    /-2 ADVANCE/
01E5 I 04         257            FCB    4
                  258 *
01E6 I 04         259            FCB    SPAMN2
01E7 I 2D3320     260            FCC    /-3 ADVANCE/
01F1 I 04         261            FCB    4
                  262 *
01F2 I 08         263            FCB    SPAMN1
01F3 I 2D3420     264            FCC    /-4 ADVANCE/
01FD I 04         265            FCB    4
                  266 *
01FE I 00         267            FCB    SPAZAV
01FF I 302041     268            FCC    /0 ADVANCE /
0209 I 04         269            FCB    4
                  270 *
020A I 10         271            FCB    SPAPL1
020B I 2B3120     272            FCC    /+1 ADVANCE/
0215 I 04         273            FCB    4
                  274 *
0216 I 20         275            FCB    SPAPL2
0217 I 2B3220     276            FCC    /+2 ADVANCE/
0221 I 04         277            FCB    4
                  278 *
0222 I 40         279            FCB    SPAPL3
0223 I 2B3320     280            FCC    /+3 ADVANCE/
022D I 04         281            FCB    4
                  282 *
022E I            283 SADV.EN    EQU    *
022E I 80         284            FCB    SPAPL4
022F I 2B3420     285            FCC    /+4 ADVANCE/
0239 I 04         286            FCB    4
                  287 *
                  288 *
023A I            289 SRCH.ID    EQU    *
023A I 01         290            FCB    SCHEND
023B I 454E44     291            FCC    /END DATA/
CRSRTY(A0011.02.088AA CRS ROTARY SWITCH TEST)          08/04/78  13:16:00  PAGE   6

0243 I 04         292            FCB    4
                  293 *
0244 I 02         294            FCB    SCHBSP
0245 I 424143     295            FCC    /BACKSPACE/
024E I 04         296            FCB    4
                  297 *
024F I 04         298            FCB    SCHREV
0250 I 524556     299            FCC    /REVERSE FILE SEARCH/
0263 I 04         300            FCB    4
                  301 *
0264 I            302 SRCH.EN    EQU    *
0264 I 08         303            FCB    SCHFWD
0265 I 464F52     304            FCC    /FORWARD FILE SEARCH/
0278 I 04         305            FCB    4
                  306 *
                  307 *
0279 I            308 RTRY.ID    EQU    *
0279 I BE         309            FCB    '>+$80
027A I 435253     310            FCC    /CRS ROTARY SWITCH TEST/
0290 I 04         311            FCB    4
                  312 *
0291 I 0D         313 RTRY.PMT   FCB    $D,'>+$80,'  ,4
0292 I BE
0293 I 20
0294 I 04
                  314 *
```

```
                    315 *
 0295 I             316 MGMD.ID   EQU    *
                    317 *
 0295 I 01          318           FCB    1
 0296 I 444154      319           FCC    /DATA BITS /
 02A0 I 04          320           FCB    4
                    321 *
 02A1 I 02          322           FCB    2
 02A2 I 414743      323           FCC    /AGC       /
 02AC I 04          324           FCB    4
                    325 *
 02AD I 04          326           FCB    4
 02AE I 464958      327           FCC    /FIXED GAIN/
 02B8 I 04          328           FCB    4
                    329 *
 02B9 I             330 MGMD.EN   EQU    *
 02B9 I 08          331           FCB    8
 02BA I 474149      332           FCC    /GAIN BITS /
 02C4 I 04          333           FCB    4
                    334 *
 02C5 I             335 RTRY.IVL  EQU    *
 02C5 I 494E56      336           FCC    /INVALID SWITCH READING          /
 02E4 I 04          337           FCB    4
                    338 *
 0000 D             339           DSEC
                    340 *
 0000 D             341 PTR.CTB   RMB    2
 0002 D             342 PTR.PSID  RMB    2
 0004 D             343 PTR.PSEN  RMB    2
                    344 *
 0006               345           END
CR. TY(A0011.02.088AA CRS ROTARY SWITCH TEST)          08/04/78  13:16:01  PAGE   7

  NO ERRORS
 ISECT LENGTH --    741
 DSECT LENGTH --      6

< CRS RTRY  0000 I    67      7
> DLYRTN    000D      22     22    114
  KSWCNT    000C A    64    116
> KYENTR    000C      21     21     82    115
  LNESW1    0001 A    34    219
  LNESW2    0002 A    35    223
  LNESW3    0004 A    36    227
  LNESW4    0008 A    37    232
  MGMD.EN   02B9 I   330    159
  MGMD.ID   0295 I   316    158
  NTLN.EN   0179 I   211    134
  NTLN.ID   011C I   197    133
  NTSTL0    0001 A    27    199
  NTSTL1    0002 A    28    203
  NTSTL2    0004 A    29    207
  NTSTL6    0008 A    30    212
> PCRLF     0007      16     16     80
> PDATA     0005      15     15     69     76
> PDATA1    0006      15     15     84    112
  PTR.CTB   0000 D   341     71     74     77     85     88    118    123
  PTR.PSEN  0004 D   343     79    102
  PTR.PSID  0002 D   342     87     99
  RTRY.CTB  0086 I   130     70
  RTRY.ID   0279 I   308     68
  RTRY.IVL  02C5 I   335    110
  RTRY.PMT  0291 I   313     83
  RTRY.PSL  001F I    81    117
  RTRY.SWL  000C I    73    125
  RTRY1     004E I   100    109
  RTRY2     0059 I   105    107
  RTRY3     0064 I   111    101
  RTRY4     0047 I    97     90
  RTRY4A    004B I    99     96
  RTRY5     007A I   120    122
  RTRYI     0061 I   110    103
> RTSADV    0000       9      9    146
> RTSLNN    0001      10     10    136
```

```
> RTSSPT     0003      12      12    141
> RTSTLN     0002      11      11    131
  SADV.EN    022E I   283     149
  SADV.ID    01CE I   249     148
  SCHBSP     0002 A    59     294
  SCHEND     0001 A    58     290
  SCHFWD     0008 A    61     303
  SCHREV     0004 A    60     298
  SHTPTA     0001 A    41     239
  SHTPTB     0002 A    42     244
  SLNN.EN    01B0 I   231     139
  SLNN ID    0198 I   217     138
  SPAMN1     0008 A    49     263
  SPAMN2     0004 A    48     259
  SPAMN3     0002 A    47     255
  SPAMN4     0001 A    46     251
 CRSRTY(A0011.02.088AA CRS ROTARY SWITCH TEST)          08/04/78  13:16:01  PAGE   8

  SPAPL1     0010 A    51     271
  SPAPL2     0020 A    52     275
  SPAPL3     0040 A    53     279
  SPAPL4     0080 A    54     284
  SPAZAV     0000 A    50     267
  SRCH.EN    0264 I   302     154
  SRCH.ID    023A I   289     153
> SRCVBF     000A      19      19     95
  SSPT.EN    01C3 I   243     144
  SSPT.ID    01B8 I   237     143
> STLCRQ     0008      18      18     94
> STLMPS     000B      20      20     93
  SW.MGMD    0108 I   190     157
  SW.NTLN    00B8 I   165     132
  SW.SADV    00E5 I   180     147
  SW.SLNN    00CC I   170     137
  SW.SRCH    00F3 I   185     152
  SW.SSPT    00D9 I   175     142
> SXMTB1     0009      19      19     92
> TCPSWX     0004      13      13    151
 CRSDDP(A0011.02.089AA CRS DATA DISPLAY SUBSYSTEM TEST)  08/04/78  13:21:03  PAGE   1

                          *
                          *       CRS DATA DISPLAY SUBSYSTEM TEST
                          *
  0000 I                           ISEC
                          *
                                   DEF     CRS.DDP
                          *
                                   REF     PDATA,PDATA1
                                   REF     RTYCNT
                                   REF     DECIN.SW
                                   REF     DECOUT
                                   REF     DECIN
                                   REF     IPTADR
                                   REF     XSAVE
                          *
                                   REF     DATMON,MONSTS
                                   REF     STLCRQ,TMONOF
                                   REF     MX1000,DLYRTN
                          *
                                   REF     STLSW1
                                   REF     SXMTB1,SXMTB2,SXMTB4
                                   REF     STLSMH
                          *
                          *       WRITE DELAY TIME BETWEEN RECORDS
                          *
  01F4 A                    WRTDLY EQU     500
                          *
                          *       DISPLAY MODE EQUATES
                          *
  0000 A                    MODSGL EQU     0                SINGLE MODE DISPLAY
  0040 A                    MODCNT EQU     $40              CONTINUOUS DISPLAY
                          *
                          *       SCOPE CONTROL EQUATES
                          *
```

```
0000 A              36 SCPRFS    EQU    0             SELECT RF SPECTRUM FOR SCOPE DISPLAY
0002 A              37 SCPSDT    EQU    2             SELECT SEISMIC DATA FOR SCOPE DISPLAY
                    38 *
                    39 *
0010 A              40 SW1STO    EQU    $10           SOFTWARE TIMEOUT
0008 A              41 SW1MRQ    EQU    8             MONITOR REQUEST
0001 A              42 SW1WRS    EQU    1             W/R SEQUENCE
                    43 *
                    44 *         THUMBWHEEL SWITCH ADDRESSES
                    45 *
8010 A              46 TSWSPR    EQU    $8010
8011 A              47 TSWRLT    EQU    $8011
8013 A              48 TSWNCT    EQU    $8013
                    49 *
                    50 *
0000 I              51 CRS.DDP   EQU    *
0000 I CE 0165 I    52           LDX    #DDPS.ID
0003 I BD 0000 R    53           JSR    PDATA         IDENTIFY TEST
0006 I CE 01F4 A    54           LDX    #WRTDLY       INITIALIZE
0009 I FF 0000 D    55           STX    DELAY         INTER-RECORD DELAY
000C I B6 0009 R    56           LDA A  MONSTS
000F I 84 FD        57           AND A  #-1-SCPSDT    SELECT RF SPECTRUM
0011 I B7 0009 R    58           STA A  MONSTS        FOR SCOPE
0014 I B7 0008 R    59           STA A  DATMON        DISPLAY
C( .DP(A0011.02.089AA CRS DATA DISPLAY SUBSYSTEM TEST)  08/04/78  13:21:05  PAGE  2

0017 I 86 00        60           LDA A  #MODSGL       SELECT SINGLE
0019 I B7 0003 D    61           STA A  OUTMOD        OUTPUT MODE
                    62 *
                    63 *
001C I CE 025C I    64 DDP2      LDX    #STLDMI       INITIALIZE DATA
001F I BD 000A R    65           JSR    STLCRQ        MEMORY WITH RAMP PATTERN
0022 I B6 000E R    66           LDA A  STLSW1
0025 I 85 10        67           BIT A  #SW1STO       SUCCESSFUL COMPLETION ?
0027 I 27 0B        68           BEQ    DDP1          YES-CONTINUE
0029 I CE 0183 I    69           LDX    #SYSERR       NOTIFY OPERATOR OF
002C I BD 0000 R    70           JSR    PDATA         ERROR
002F I BD 0002 R    71           JSR    RTYCNT        RETRY OR CONTINUE ?
0032 I 27 E8        72           BEQ    DDP2          JUMP IF RETRY
                    73 *
                    74 *         SELECT SINGLE OR CONTINUOUS DISPLAY MODE
                    75 *
0034 I              76 DDP1      EQU    *
0034 I CE 01A2 I    77           LDX    #DDP.MODS
0037 I BD 0000 R    78           JSR    PDATA
003A I CE 01E9 I    79           LDX    #DDP.SGLM     ANTICIPATE SINGLE DISPLAY MODE
003D I B6 0003 D    80           LDA A  OUTMOD        SINGLE DISPLAY MODE ?
0040 I 27 03        81           BEQ    DDP3          YES-CONTINUE
0042 I CE 01F5 I    82           LDX    #DDP.CNTM
0045 I BD 0001 R    83 DDP3      JSR    PDATA1        DISPLAY CURRENT MODE
0048 I CE 0002 D    84           LDX    #OUTMOD-1
004B I BD 0005 R    85           JSR    DECIN         INPUT NEW MODE
004E I 27 0C        86           BEQ    DDP5          JUMP IF CURRENT MODE ACCEPTED
0050 I C6 00        87           LDA B  #MODSGL       ANTICIAPTE SINGLE MODE SELECT
0052 I 7D 0003 D    88           TST    OUTMOD        SINGLE MODE SELECTED ?
0055 I 27 02        89           BEQ    DDP4          YES-SET NEW MODE
0057 I C6 40        90           LDA B  #MODCNT       SELECT CONTINUOUS MODE
0059 I F7 0003 D    91 DDP4      STA B  OUTMOD        SET NEW MODE
                    92 *
005C I              93 DDP5      EQU    *
005C I BD 000B R    94           JSR    TMONOF        TURN OFF CCD CLOCK START
                    95 *
                    96 *         INPUT CONTROL PARAMETERS FROM SWITCHES
                    97 *
005F I CE 0006 D    98           LDX    #MHDSRT-1
0062 I FF 0006 R    99           STX    IPTADR
0065 I CE 8011 A   100           LDX    #TSWSPR+1
0068 I FF 0007 R   101           STX    XSAVE
006B I C6 01       102           LDA B  #1            DIGIT COUNT
006D I BD 0003 R   103           JSR    DECIN.SW      IPUT SAMPLE RATE FROM SWITCH
                   104 *
0070 I CE 0008 D   105           LDX    #MHDRCL-1
0073 I FF 0006 R   106           STX    IPTADR
0076 I CE 8013 A   107           LDX    #TSWRLT+2
```

```
0079 I FF 0007 R          STX    XSAVE
007C I C6 02              LDA B  #2
007E I BD 0003 R          JSR    DECIN.SW     INPUT RECORD LENGTH IN SECONDS
                 *
0081 I CE 0004 D          LDX    #MHDCHN-1
0084 I FF 0006 R          STX    IPTADR
0087 I CE 8015 A          LDX    #TSWNCT+2
008A I FF 0007 R          STX    XSAVE
008D I C6 02              LDA B  #2
008F I BD 0003 R          JSR    DECIN.SW     INPUT # CHANNELS TO RECORD
CRSDDP(A0011.02.089AA CRS DATA DISPLAY SUBSYSTEM TEST)  08/04/78  10:21:07  PAGE   3

                 *
                 *      ENTER NUMBER OF CHANNELS TO BE RECORDED
                 *
0092 I CE 0205 I          LDX    #DDP.NCH
0095 I BD 0000 R          JSR    PDATA
0098 I CE 0004 D          LDX    #MHDCHN-1    DISPLAY CHRRENTLY SELECTED
009B I BD 0004 R          JSR    DECOUT       NUMBER OF CHANELS
009E I CE 0004 D          LDX    #MHDCHN-1
00A1 I BD 0005 R          JSR    DECIN        INPUT NEW VALUE
                 *
                 *      ENTER LENGTH IN SECONDS
                 *
00A4 I CE 0236 I          LDX    #DDP.RCLS
00A7 I BD 0000 R          JSR    PDATA
00AA I CE 0008 D          LDX    #MHDRCL-1    DISPLAY CURRENTLY SELECTED
00AD I BD 0004 R          JSR    DECOUT       RECORD LENGTH
00B0 I CE 0008 D          LDX    #MHDRCL-1
00B3 I BD 0005 R          JSR    DECIN        INPUT NEW VALUE
                 *
                 *      ENTER SAMPLE RATE
                 *
00B6 I CE 021D I          LDX    #DDP.SRT
00B9 I BD 0000 R          JSR    PDATA
00BC I CE 0006 D          LDX    #MHDSRT-1    DISPLAY CURRENTLU SELECTED
00BF I BD 0004 R          JSR    DECOUT       SAMPLE RATE
00C2 I CE 0006 D          LDX    #MHDSRT-1
00C5 I BD 0005 R          JSR    DECIN        INPUT NEW VALUE
                 *
                 *      COMPUTE NUMBER OF WORDS PER CHANNEL
                 *
00C8 I F6 0009 D          LDA B  MHDRCL
00CB I BD 000C R          JSR    MX1000
00CE I 44                 LSR A
00CF I 56                 ROR B
00D0 I F7 000B D          STA B  MHDWPC+1
00D3 I B7 000A D          STA A  MHDWPC
00D6 I B6 0007 D          LDA A  MHDSRT       COMPUTE # WORDS
00D9 I 81 02              CMP A  #2           PER CHANNEL FOR
00DB I 27 06              BEQ    DDP6         2 OR J MILLISECOND
00DD I 74 000A D          LSR    MHDWPC       SAMPLE
00E0 I 76 000B D          ROR    MHDWPC+1     RATE
                 *
                 *      OUTPUT HEADER TO MONITOR
                 *
00E3 I           DDP6     EQU    *
00E3 I B6 0003 D          LDA A  OUTMOD
00E6 I BA 000A D          ORA A  MHDWPC
00E9 I B7 000A D          STA A  MHDWPC
00EC I B6 0005 D          LDA A  MHDCHN       MOVE # CHANNELS
00EF I B7 000F R          STA A  SXMTB1       TO BE RECORDED INTO XMIT BUFR
00F2 I FE 000A D          LDX    MHDWPC
00F5 I FF 0010 R          STX    SXMTB2       # WORDS PER CHANNEL
00F8 I B6 0007 D          LDA A  MHDSRT
00FB I B7 0011 R          STA A  SXMTB4       SAMPLE RATE
00FE I CE 0012 R DDP8     LDX    #STLSMH      OUTPUT MONITOR HEADER
0101 I BD 000A R          JSR    STLCRQ
0104 I B6 000E R          LDA A  STLSW1
0107 I 85 10              BIT A  #SW1STO      TIMEOUT ?
CRSDDP(A0011.02.089AA CRS DATA DISPLAY SUBSYSTEM TEST)  08/04/78  13:21:08  PAGE   4

0109 I 27 08              BEQ    DDP7         NO-CONTINUE
010B I CE 0183 I          LDX    #SYSERR      NOTIFY OPERATOR
```

```
010E I BD 0000 R   178            JSR    PDATA
0111 I BD 0002 R   179            JSR    RTYCNT       RETRY OR CONTINUE ?
0114 I 27 E8       180            BEQ    DDP8         JUMP IF RETRY
0116 I CE 0248 I   181 DDP7       LDX    #DDP.HDR     INFORM OPERATOR OF SUCCESSFUL
0119 I BD 0000 R   182            JSR    PDATA        HEADER OUTPUT
011C I 7F 000D D   183            CLR    CHNCNT       INIT CHANNLE COUNT
011F I FE 000A D   184            LDX    MHDWPC       MOVE # WRODS PER
0122 I FF 000F R   185            STX    SXMTB1       CHANNEL INTO XMIT BUFR
0125 I B6 000F R   186            LDA A  SXMTB1
0128 I 84 3F       187            AND A  #$3F
012A I B7 000F R   188            STA A  SXMTB1
                   189 *
                   190 *         OUTPUT DATA RECORSDS TO MONITOR
                   191 *
012D I FE 0000 D   192 DDPA       LDX    DELAY
0130 I BD 000D R   193            JSR    DLYRTN       INTER-RECORDS DELAY
0133 I CE 0262 I   194            LDX    #STLMTM
0136 I BD 000A R   195            JSR    STLCRQ       OUTPUT RECORD TO MONITOR
0139 I B6 000E R   196            LDA A  STLSW1
013C I 85 10       197            BIT A  #SW1STO      TIMEOUT ?
013E I 27 0B       198            BEQ    DDP9         NO-CONTINUE
0140 I CE 0183 I   199            LDX    #SYSERR      INFORM OPERATOR
0143 I BD 0000 R   200            JSR    PDATA
0146 I BD 0002 R   201            JSR    RTYCNT       RETRY OR CONTINUE X
0149 I 27 E2       202            BEQ    DDPA         JUMP IF RETRY
014B I CE 0251 I   203 DDP9       LDX    #DDP.CHN
014E I BD 0000 R   204            JSR    PDATA
0151 I CE 000C D   205            LDX    #CHNCNT-1    DISPLAY CHANNEL #
0154 I BD 0004 R   206            JSR    DECOUT       OUTPUT
0157 I 7C 000D D   207            INC    CHNCNT       INCR CHANNEL COUNT
015A I B6 000D D   208            LDA A  CHNCNT
015D I B1 0005 D   209            CMP A  MHDCHN       ALL CHANNELS PROCESSED ?
0160 I 26 CB       210            BNE    DDPA         NO-CONTINUE
0162 I 7E 0034 I   211            JMP    DDP1         RESTART TEST
                   212 *
                   213 *         DATA DISPLAY SUBSYSTEM TEST MESSAGES
                   214 *
0165 I             215 DDPS.ID    EQU    *
0165 I BE          216            FCB    '>+$80
0166 I 435253      217            FCC    /CRS DATA DISPLAY SYSTEM TEST/
0182 I 04          218            FCB    4
                   219 *
0183 I             220 SYSERR     EQU    *
0183 I BE          221            FCB    '>+$80
0184 I 535953      222            FCC    /SYSTEM ERROR - NO RESPONSE/
019E I 0D          223            FCB    $D,$A
019F I 0A
01A0 I BE          224            FCB    '>+$80
01A1 I 04          225            FCB    4
                   226 *
01A2 I             227 DDP.MODS   EQU    *
01A2 I BE          228            FCB    '>+$80
01A3 I 53454C      229            FCC    /SELECT DISPLAY MODE:   /
01B9 I 0D          230            FCB    $D,$A
01BA I 0A
01BB I 203020      231            FCC    / 0 = SINGLE; 1 = CONTINUOUS/
CRS...P(A0011.02.089AA CRS DATA DISPLAY SUBSYSTEM TEST)  08/04/78  13:21:10  PAGE   5

01D6 I 0D          232            FCB    $D,$A
01D7 I 0A
01D8 I 204355      233            FCC    / CURRENT MODE = /
01E8 I 04          234            FCB    4
01E9 I             235 DDP.SGLM   EQU    *
01E9 I 2F5349      236            FCC    @/SINGLE/ : @
01F4 I 04          237            FCB    4
01F5 I             238 DDP.CNTM   EQU    *
01F5 I 2F434F      239            FCC    @/CONTINUOUS/ : @
0204 I 04          240            FCB    4
                   241 *
0205 I             242 DDP.NCH    EQU    *
0205 I BE          243            FCB    '>+$80
0206 I 232043      244            FCC    /# CHANNELS RECORDED = /
021C I 04          245            FCB    4
                   246 *
```

```
021D I               DDP.SRT   EQU    *
021D I BE                      FCB    '>+$80
021E I 322F34                  FCC    @2/4 MSEC SAMPLE RATE = @
0235 I 04                      FCB    4
                     *
0236 I               DDP.RCLS  EQU    *
0236 I BE                      FCB    '>+$80
0237 I 524543                  FCC    /RECORD LENGTH = /
0247 I 04                      FCB    4
                     *
0248 I               DDP.HDR   EQU    *
0248 I 204845                  FCC    / HEADER /
0250 I 04                      FCB    4
                     *
0251 I               DDP.CHN   EQU    *
0251 I 204348                  FCC    / CHANNELS /
025B I 04                      FCB    4
                     *
                     *
                     *         SATELLITE COMPUTER COMMAND EQUATES
                     *
00FE A               SCDDMI    EQU    $FE          DATA MEMORY INITIALIZATION
0001 A               SCLXDM    EQU    1            COMMAND LENGTH
0001 A               SCLRDM    EQU    1            RESPONSE MESG LENGTH
03E8 A               SCTDMI    EQU    1000         COMMAND TIMEOUT (MILLISECONDS)
                     *
00FD A               SCDMTM    EQU    $FD          MEMORY TO MONITOR
0003 A               SCLXMH    EQU    3            COMMAND LENGTH
0001 A               SCLRMH    EQU    1            RESPONSE MESG LENGTH
07D0 A               SCTMTM    EQU    2000         COMMAND TIMEOUT
                     *
                     *
                     *         SATELLITE REQUEST BLOCK
                     *
025C I               STLDMI    EQU    *
025C I 01                      FCB    SW1WRS
025D I FE                      FCB    SCDDMI
025E I 01                      FCB    SCLXDM
025F I 01                      FCB    SCLRDM
0260 I 03E8      A             FDB    SCTDMI
                     *
0262 I 09            STLMTM    FCB    SW1WRS+SW1MRQ
CR..JP(A0011.02.089AA CRS DATA DISPLAY SUBSYSTEM TEST)  08/04/78  13:21:12  PAGE   6

0263 I FD                      FCB    SCDMTM
0264 I 03                      FCB    SCLXMH
0265 I 01                      FCB    SCLRMH
0266 I 07D0      A             FDB    SCTMTM
                     *
                     *
0000 D                         DSEC
                     *
                     *         STORAGE REQUIREMENTS
                     *
0000 D               DELAY     RMB    2            INTER-RECORD DELAY
                     *
0002 D                         RMB    1
0003 D               OUTMOD    RMB    1            SINGLE / CONTINUOUS MODE DISPLAY
                     *
0004 D                         RMB    1
0005 D               MHDCHN    RMB    1            # CHANNELS TO BE RECORDED
                     *
0006 D                         RMB    1
0007 D               MHDSRT    RMB    1            SAMPLE RATE (2 OR 4 MILLISECONDS)
                     *
0008 D                         RMB    1
0009 D               MHDRCL    RMB    1            RECORD LENGTH IN SECONDS
                     *
000A D               MHDWPC    RMB    2            # WORDS PER CHANNEL
                     *
000C D                         RMB    1
000D D               CHNCNT    RMB    1            CURRENT CHANNEL
                     *
000E                           END
```

```
  NO ERRORS
 ISECT LENGTH --   616
 DSECT LENGTH --    14

  CHNCNT    000D D   316    183   205   207   208
< CRS.DDP   0000 I    51      7
> DATMON    0008      17     17    59
  DDP.CHN   0251 I   261    203
  DDP.CNTM  01F5 I   238     82
  DDP.HDR   0248 I   257    181
  DDP.MODS  01A2 I   227     77
  DDP.NCH   0205 I   242    121
  DDP.RCLS  0236 I   252    130
  DDP.SGLM  01E9 I   235     79
  DDP.SRT   021D I   247    139
  DDP1      0034 I    76     68   211
  DDP2      001C I    64     72
  DDP3      0045 I    83     81
  DDP4      0059 I    91     89
  DDP5      005C I    93     86
  DDP6      00E3 I   162    156
  DDP7      0116 I   181    176
  DDP8      00FE I   172    180
  DDP9      014B I   203    198
  DDPA      012D I   192    202   210
  DDPS.ID   0165 I   215     52
> DECIN     0005      13     13    85   126   135   144
> DECIN.SW  0003      11     11   103   110   117
> DECOUT    0004      12     12   124   133   142   206
  DELAY     0000 D   299     55   192
> DLYRTN    000D      19     19   193
> IPTADR    0006      14     14    99   106   113
  MHDCHN    0005 D   305    112   123   125   166   209
  MHDRCL    0009 D   311    105   132   134   148
  MHDSRT    0007 D   308     98   141   143   154   170
  MHDWPC    000A D   313    152   153   157   158   164   165   168   184
  MODCNT    0040 A    32     90
  MODSGL    0000 A    31     60    87
> MONSTS    0009      17     17    56    58
> MX1000    000C      19     19   149
  OUTMOD    0003 D   302     61    80    84    88    91   163
> PDATA     0000       9      9    53    70    78   122   131   140   178   182   200   204
> PDATA1    0001       9      9    83
> RTYCNT    0002      10     10    71   179   201
  SCDDMI    00FE A   268    283
  SCDMTM    00FD A   273    289
  SCLRDM    0001 A   270    285
  SCLRMH    0001 A   275    291
  SCLXDM    0001 A   269    284
  SCLXMH    0003 A   274    290
  SCPRFS    0000 A    36
  SCPSDT    0002 A    37     57
  SCTDMI    03E8 A   271    286
  SCTMTM    07D0 A   276    292
> STLCRQ    000A      18     18    65   173   195
  STLDMI    025C I   281     64
  STLMTM    0262 I   288    194
```

```
> STLSMH    0012      23     23   172
> STLSW1    000E      21     21    66   174   196
  SW1MRQ    0008 A    41    288
  SW1STO    0010 A    40     67   175   197
  SW1WRS    0001 A    42    282   288
> SXMTB1    000F      22     22   167   185   186   188
> SXMTB2    0010      22     22   169
> SXMTB4    0011      22     22   171
  SYSERR    0183 I   220     69   177   199
> TMONOF    000B      18     18    94
  TSWNCT    8013 A    48    114
  TSWRLT    8011 A    47    107
  TSWSPR    8010 A    46    100
  WRTDLY    01F4 A    27     54
> XSAVE     0007      15     15   101   108   115
```

```
CRS .DM(A0011.02.090AA CRS 2900 DATA MEMORY TEST)        08/04/78  13:04:40  PAGE   1

                          *
                          *       CRS 2900 DATA MEMORY TEST
                          *
0000 I                            ISEC
                          *
                                  DEF    CRS.DDM
                          *
                                  REF    STLCRQ
                                  REF    MONSTS,DATMON
                                  REF    SXMTB1
                                  REF    SRCVBF
                          *
                                  REF    PDATA
                                  REF    IN2HX
                                  REF    RTYCNT
                                  REF    OUT2HS
                                  REF    PCRLF,OUTCH
                          *
                          *
0003 A                     MXVLBD EQU    3            MAXIMUM VALID MEMORY BOARD #
0004 A                     STLRST EQU    4            2900 SATELLITE RESET FOMMAND
                          *
                          *       SATELLITE STATUS WORD EQUATES
                          *
0001 A                     SW1WRS EQU    1            W/R SEQUENCE
                          *
                          *       SATELLITE DATA MEMORY TEST EQUATES
                          *
00FB A                     SCDDMT EQU    $FB          DATA MEMORY TEST COMMAND
0002 A                     SCLXDM EQU    2            COMMAND LENGTH
0001 A                     SCLRDM EQU    1            RESPONSE MESG LENGTH
0000 A                     SCTDMT EQU    0            NO COMMAND TIMEOUT
                          *
                          *
0000 I                     CRS.DDM EQU   *
0000 I CE 005B I                  LDX    #DDM.ID
0003 I BD 0005 R                  JSR    PDATA        IDENTIFY TEST
0006 I CE 0076 I           DDM1   LDX    #DDM.SLMB
0009 I BD 0005 R                  JSR    PDATA
000C I CE 0003 R                  LDX    #SXMTB1      ASK OPERATOR
000F I BD 0006 R                  JSR    IN2HX        TO SELECT MEMORY BOARD
0012 I B6 0003 R                  LDA A  SXMTB1
0015 I 81 03                      CMP A  #MXVLBD      VALID BOARD SELECTED
0017 I 22 ED                      BHI    DDM1         NO-REENTER DATA MEMORY BOARD #
0019 I CE 0055 I                  LDX    #STLDMT      PERFORM DATA MEMORY TEST
001C I BD 0000 R                  JSR    STLCRQ       ON SELECTED BOARD
001F I B6 0001 R                  LDA A  MONSTS
0022 I 8A 04                      ORA A  #STLRST
0024 I B7 0001 R                  STA A  MONSTS
0027 I B7 0002 R                  STA A  DATMON       RESET SATELLITE
002A I B6 0004 R                  LDA A  SRCVBF
002D I CE 0093 I                  LDX    #DDM.DMG     ANTICIPATE SUCCESSFUL TEST
0030 I 81 41                      CMP A  #'A          ANY ERRORS ?
0032 I 27 03                      BEQ    DDM2         NO-NOTIFY OPERATOR
0034 I CE 00AE I                  LDX    #DDM.DMER    DATA MEMORY ERROR
0037 I BD 0005 R           DDM2   JSR    PDATA
003A I B6 0004 R                  LDA A  SRCVBF
003D I 81 41                      CMP A  #'A          ERROR ?
CR__DM(A0011.02.090AA CRS 2900 DATA MEMORY TEST)        08/04/78  13:04:41  PAGE   2

003F I 27 C5                      BEQ    DDM1         NO-RESTART TEST
0041 I CE 0003 R                  LDX    #SXMTB1
0044 I BD 0008 R                  JSR    OUT2HS       IDENTIFY BOARD UNDER TEST
0047 I BD 0009 R                  JSR    PCRLF
004A I 86 BE                      LDA A  #'>+$80
004C I BD 000A R                  JSR    OUTCH
004F I BD 0007 R                  JSR    RTYCNT       WAIT FOR OPERATOR TO ACK
0052 I 27 B2                      BEQ    DDM1         RESTART TEST
0054 I 39                         RTS
                          *
                          *       SATELLITE DATA MEMORY TEST COMMAND REQUEST BLOCK
                          *
```

```
0055 I              72 STLDMT    EQU    *
0055 I 01           73           FCB    SW1WRS
0056 I FB           74           FCB    SCDDMT
0057 I 02           75           FCB    SCLXDM
0058 I 01           76           FCB    SCLRDM
0059 I 0000    A    77           FDB    SCTDMT
                    78 *
                    79 *        SATELLITE DATA MEMORY TEST MESSAGES
                    80 *
005B I              81 DDM.ID    EQU    *
005B I BE           82           FCB    '>+$80
005C I 435253       83           FCC    /CRS 2900 DATA MEMORY TEST/
0075 I 04           84           FCB    4
                    85 *
0076 I              86 DDM.SLMB  EQU    *
0076 I BE           87           FCB    '>+$80
0077 I 534540       88           FCC    /SELECT DATA MEMORY BOARD:  /
0092 I 04           89           FCB    4
                    90 *
0093 I              91 DDM.DMG   EQU    *
0093 I BE           92           FCB    '>+$80
0094 I 544553       93           FCC    /TEST COMPLETE - NO ERRORS/
00AD I 04           94           FCB    4
                    95 *
00AE I              96 DDM.DMER  EQU    *
00AE I BE           97           FCB    '>+$80
00AF I 444154       98           FCC    /DATA MEMORY ERROR/
00C0 I 0D           99           FCB    $D,$A
00C1 I 0A
00C2 I 205245      100           FCC    / REPLACE DATA MEMORY BOARD /
00DD I 04          101           FCB    4
                   102 *
00DE               103           END
CR.  M(A0011.02.090AA CRS 2900 DATA MEMORY TEST)        08/04/78  13:04:42  PAGE   3

   NO ERRORS
  ISECT LENGTH --    222
  DSECT LENGTH --      0

< CRS.DDM    0000 I     36      7
> DATMON     0002       10     10     51
  DDM.DMER   00AE I     96     56
  DDM.DMG    0093 I     91     53
  DDM.ID     005B I     81     37
  DDM.SLMB   0076 I     86     39
  DDM1       0006 I     39     45     60     67
  DDM2       0037 I     57     55
> IN2HX      0006       15     15     42
> MONSTS     0001       10     10     48     50
  MXVLBD     0003 A     21     44
> OUT2HS     0008       17     17     62
> OUTCH      000A       18     18     65
> PCRLF      0009       18     18     63
> PDATA      0005       14     14     38     40     57
> RTYCNT     0007       16     16     66
  SCDDMT     00FB A     30     74
  SCLRDM     0001 A     32     76
  SCLXDM     0002 A     31     75
  SCTDMT     0000 A     33     77
> SRCVBF     0004       12     12     52     58
> STLCRQ     0000        9      9     47
  STLDMT     0055 I     72     46
  STLRST     0004 A     22     49
  SW1WRS     0001 A     26     73
> SXMTB1     0003       11     11     41     43     61
CR  .TL(A0011.02.091AA CRS 2900 SATELLITE TEST )        08/04/78  13:07:34  PAGE   1

                     2 *
                     3 *        CRS 2900 SATELLITE TEST
                     4 *
0000 I               5           ISEC
                     6 *
                     7           DEF    CRS.SATL
                     8 *
```

```
                                REF     PDATA
                                REF     RTYCNT
                          *
                                REF     MONSTS,DATMON
                                REF     STLCRQ
                                REF     SRCVBF
                          *
                          *         2900 SATELLITE TEST COMMAND EQUATES
                          *
00FF A                    SCD29T    EQU     $FF         2900 SATELLITE TEST COMMAND
0001 A                    SCLX29    EQU     1           COMMAND LENGTH
0001 A                    SCLR29    EQU     1           RESPONSE MESG LENGTH
0000 A                    SCT29T    EQU     0           NO COMMAND TIMEOUT
                          *
                          *
0001 A                    SW1WRS    EQU     1           W/R SEQUENCE
0004 A                    STLRST    EQU     4           2900 SATELLITE RESET COMMAND
                          *
                          *
0000 I                    CRS.SATL  EQU     *
0000 I CE 0037 I                    LDX     #SATL.ID
0003 I BD 0000 R                    JSR     PDATA       IDENTIFY TEST
0006 I CE 0031 I                    LDX     #STL29T     INITIATE 2900 SATELLITE
0009 I BD 0004 R                    JSR     STLCRQ      TEST
000C I B6 0002 R                    LDA A   MONSTS
000F I 8A 04                        ORA A   #STLRST
0011 I B7 0002 R                    STA A   MONSTS
0014 I B7 0003 R                    STA A   DATMON      RESET 2900 PROCESSOR
0017 I B6 0005 R                    LDA A   SRCVBF
001A I 81 CC                        CMP A   #$CC        ANY ERRORS ?
001C I 26 07                        BNE     SATL1       YES - NOTIFY OPERATOR
001E I CE 0050 I                    LDX     #SATL.TCP
0021 I BD 0000 R                    JSR     PDATA       NOTIFY OPERATOR OF
0024 I 39                           RTS                 SUCCESSFUL COMPLETION
0025 I CE 006E I          SATL1     LDX     #SATL.PER   NOTIFY OPERATOR
0028 I BD 0000 R                    JSR     PDATA       OF ERROR
002B I BD 0001 R                    JSR     RTYCNT      WAIT FOR ACKNOWLEDGE
002E I 27 D0                        BEQ     CRS.SATL    RESTART TEST
0030 I 39                           RTS
                          *
                          *         2900 SATELL2TE TEST COMMAND REQUEST BLOCK
                          *
0031 I                    STL29T    EQU     *
0031 I 01                           FCB     SW1WRS
0032 I FF                           FCB     SCD29T
0033 I 01                           FCB     SCLX29
0034 I 01                           FCB     SCLR29
0035 I 0000      A                  FDB     SCT29T
                          *
                          *
                          *         CRS 2900 SATELLITE TEST MESSAGES
CRS_ _(A0011.02.091AA CRS 2900 SATELLITE TEST )      08/04/78  13:07:35  PAGE   2

                          *
0037 I                    SATL.ID   EQU     *
0037 I BE                           FCB     '>+$80
0038 I 435253                       FCC     /CRS 2900 PROCESSOR TEST/
004F I 04                           FCB     4
                          *
0050 I                    SATL.TCP  EQU     *
0050 I BE                           FCB     '>+$80
0051 I 323930                       FCC     /2900 PROCESSOR TEST COMPLETE/
006D I 04                           FCB     4
                          *
006E I                    SATL.PER  EQU     *
006E I BE                           FCB     '>+$80
006F I 323930                       FCC     /2900 PROCESSOR ERROR/
0083 I 0D                           FCB     $D,$A
0084 I 0A
0085 I 205245                       FCC     / REPLACE DATA PROCESSOR BOARD 2;/
00A5 I 204946                       FCC     / IF ERROR REMAINS, REPLACE /
00C0 I 0D                           FCB     $D,$A
00C1 I 0A
```

```
00C2 I 20424F        78          FCC    / BOARD 1/
00CA I 04            79          FCB    4
                     80 *
00CB                 81          END
C.  .TL(A0011.02.091AA CRS 2900 SATELLITE TEST )          08/04/78  1?:07:36  PAGE   3

  NO ERRORS
 ISECT LENGTH --     203
 DSECT LENGTH --     0

< CRS.SATL  0000 I   28      7      46
> DATMON    0003     12      12     36
> MONSTS    0002     12      12     33     35
> PDATA     0000     9       9      30     41     44
> RTYCNT    0001     10      10     45
  SATL.ID   0037 I   61      29
  SATL.PER  006E I   71      43
  SATL.TCP  0050 I   66      40
  SATL1     0025 I   43      39
  SCD29T    00FF A   18      53
  SCLR29    0001 A   20      55
  SCLX29    0001 A   19      54
  SCT29T    0000 A   21      56
> SRCVBF    0005     14      14     37
  STL29T    0031 I   51      31
> STLCRQ    0004     13      13     32
  STLRST    0004 A   25      34
  SW1WRS    0001 A   24      52
C.   .MR(A0011.02.092AA CRS COUNT DOWN TIMER TEST)         08/04/78  13:01:59  PAGE   1
```

```
                        2 *
                        3 *          CRS COUNT DOWN TIMER TEST
                        4 *
 0000 I                 5             ISEC
                        6 *
                        7             DEF     CRS.TIMR
                        8 *
                        9             REF     TMRCDV
                       10             REF     TMRBTV,TMRBT1
                       11             REF     TMRBCA,TMRSTS
                       12             REF     MX1000
                       13             REF     TMRCLK
                       14             REF     DLYRTN
                       15 *
                       16             REF     PDATA
                       17             REF     DECIN
                       18 *
                       19 *          TIMER STATUS WORD EQUATES
                       20 *
 0080 A                21 TMRBSY      EQU     $80          TIMER REQUEST BUSY
 0040 A                22 TMRRCP      EQU     $40          REQUEST COMPLETE
                       23 *
                       24 *
 0000 I                25 CRS.TIMR    EQU     *
 0000 I CE 0071 I      26             LDX     #TIMR.ID
 0003 I BD 0008 R      27             JSR     PDATA
 0006 I CE 008C I      28 TIM3        LDX     #TIMR.TMO
 0009 I BD 0008 R      29             JSR     PDATA
 000C I CE 0001 R      30             LDX     #TMRBTV      ASK OPERATOR TO SELECT
 000F I BD 0009 R      31             JSR     DECIN        TIMEOUT VALUE
 0012 I F6 0002 R      32             LDA B   TMRBT1
 0015 I C1 1E          33             CMP B   #30
 0017 I 22 ED          34             BHI     TIM3
 0019 I BD 0005 R      35             JSR     MX1000
 001C I F7 0002 R      36             STA B   TMRBT1
 001F I B7 0001 R      37             STA A   TMRBTV
 0022 I 7F 0000 D      38             CLR     TMRERR       CLEAR ERROR INDICATOR
 0025 I CE 0070 I      39             LDX     #TIMRCP
 0028 I FF 0003 R      40             STX     TMRBCA       SETUP TIMER COMPLETION ADDR
 002B I BD 0000 R      41             JSR     TMRCDV       INITIATE TIMER REQUEST
 002E I FE 0001 R      42             LDX     TMRBTV
 0031 I 86 A3          43 TIM6        LDA A   #163
 0033 I 4A             44 TIM4        DEC A
 0034 I 26 FD          45             BNE     TIM4
```

```
0036 I B6 0006 R     46            LDA A  TMRCLK       EARLY TIMEOUT ?
0039 I 2B 0A         47            BMI    TIM5
003B I 01            48            NOP
003C I 01            49            NOP
003D I 09            50            DEX
003E I 26 F1         51            BNE    TIM6
0040 I 7C 0000 D     52 TIM8       INC    TMRERR       SET ERROR INDICATOR
0043 I 20 03         53            BRA    TIM7
0045 I 09            54 TIM5       DEX                 WITHIN 1 MSEC ?
0046 I 26 F8         55            BNE    TIM8         NO-ERROR
0048 I 01            56 TIM7       NOP
0049 I 0E            57            CLI
004A I CE 0001 A     58            LDX    #1
004D I BD 0007 R     59            JSR    DLYRTN
CR  MR(A0011.02.092AA CRS COUNT DOWN TIMER TEST)        08/04/78  13:02:01  PAGE   2

0050 I 01            60            NOP
0051 I 0F            61            SEI
0052 I CE 00AA I     62            LDX    #TIMR.RG
0055 I B6 0004 R     63            LDA A  TMRSTS
0058 I 84 7F         64            AND A  #-1-TMRBSY   RESET REQUEST BUSY
005A I B7 0004 R     65            STA A  TMRSTS
005D I 85 40         66            BIT A  #TMRRCP      REQUEST COMPLETE ?
005F I 26 08         67            BNE    TIM2         YES-CONTINUE
0061 I 7D 0000 D     68            TST    TMRERR       NO TIMEOUT OR EARLY TIMEOUT
0064 I 27 03         69            BEQ    TIM2         NO - NOTIFY OPERATOR
0066 I CE 00C7 I     70            LDX    #TIMR.ER     ERROR MESG
0069 I BD 0008 R     71 TIM2       JSR    PDATA        NOTIFY OPERATOR
006C I 01            72            NOP
006D I 0E            73            CLI
006E I 20 96         74            BRA    TIM3
                     75 *
                     76 *          TIMER REQUEST COMPLETION ROUTINE
                     77 *
0070 I               78 TIMRCP     EQU    *
0070 I 3B            79 TCP2       RTI
                     80 *
                     81 *          CRS COUNT DOWN TIMER TEST MESSAGES
                     82 *
0071 I               83 TIMR.ID    EQU    *
0071 I BE            84            FCB    '>+$80
0072 I 435253        85            FCC    /CRS COUNT DOWN TIMER TEST/
008B I 04            86            FCB    4
                     87 *
008C I               88 TIMR.TMO   EQU    *
008C I BE            89            FCB    '>+$80
008D I 53454C        90            FCC    /SELECT TIMEOUT IN SECONDS:  /
00A9 I 04            91            FCB    4
                     92 *
00AA I               93 TIMR.RG    EQU    *
00AA I BE            94            FCB    '>+$80
00AB I 524551        95            FCC    /REQUEST COMPLETE - NO ERROR/
00C6 I 04            96            FCB    4
                     97 *
00C7 I               98 TIMR.ER    EQU    *
00C7 I BE            99            FCB    '>+$80
00C8 I 54494D       100            FCC    /TIMER ERROR - REPLACE BOARD/
00E3 I 04           101            FCB    4
                    102 *
0000 D              103            DSEC
                    104 *
                    105 *          STORAGE REQUIREMENTS FOR COUNT DOWN TIMER TEST
                    106 *
0000 D 00           107 TMRERR     FCB    0            ERROR INDICATOR
0001 D              108 TMOVAL     RMB    2            TIMEOUT VALUE SAVE AREA
                    109 *
0003                110            END
CR  MR(A0011.02.092AA CRS COUNT DOWN TIMER TEST)        08/04/78  13:02:02  PAGE   3

  NO ERRORS
 ISECT LENGTH --   228
 DSECT LENGTH --     3

< CRS TIMR  0000 I     25      7
```

```
> DECIN      0009      17    17    31
> DLYRTN     0007      14    14    59
> MX1000     0005      12    12    35
> PDATA      0008      16    16    27    29    71
  TCP2       0070 I    79
  TIM2       0069 I    71    67    69
  TIM3       0006 I    28    34    74
  TIM4       0033 I    44    45
  TIM5       0045 I    54    47
  TIM6       0031 I    43    51
  TIM7       0048 I    56    53
  TIM8       0040 I    52    55
  TIMR.ER    00C7 I    98    70
  TIMR ID    0071 I    83    26
  TIMR.RG    00AA I    93    62
  TIMR.TMO   008C I    88    28
  TIMRCP     0070 I    78    39
  TMOVAL     0001 D   108
> TMPBCA     0003      11    11    40
  TMRBSY     0080 A    21    64
> TMRBT1     0002      10    10    32    36
> TMRBTV     0001      10    10    30    37    42
> TMRCDV     0000       9     9    41
> TMRCLK     0006      13    13    46
  TMRERR     0000 D   107    38    52    68
  TMRRCP     0040 A    22    66
> TMRSTS     0004      11    11    63    65
CI    PC(A0011.02.093AA CRS PROCESSOR TO PROCESSOR INTERFA08/04/78  13:10:04  PAGE   1

                         *
                         *        CRS   PROCESSOR TO PROCESSOR INTERFACE TEST
                         *
 0000 I                             ISEC
                         *
                                    DEF      CRS.PTP
                         *
                                    REF      STLCRQ
                                    REF      STLSW1
                                    REF      SXMTB1,SRCVBF,SXMTB2
                         *
                                    REF      PDATA,PDATA1
                                    REF      OUT2HS
                                    REF      RTYCNT
                                    REF      PCRLF
                                    REF      OUTCH
                         *
                         *        SATELLITE STATUS WORD EQUATES
                         *
 0010 A                    SW1STO   EQU      $10          SOFTWARE TIMEOUT
 0001 A                    SW1WRS   EQU      1            W/R SEQUENCE
                         *
                         *
 0000 I                    CRS.PTP  EQU      *
 0000 I CE 0079 I                   LDX      #PTP.ID
 0003 I BD 0005 R                   JSR      PDATA        CLEAR ERROR FLAG
 0006 I 7F 0002 R                   CLR      SXMTB1       INITIALIZE XFER CODE
 0009 I 7F 0004 R          PTP6     CLR      SXMTB2       CLEAR ERROR CODE
 000C I CE 0073 I          PTP5     LDX      #STLPTP      SEND CODE FROM
 000F I BD 0000 R                   JSR      STLCRQ       6800 TO 2900 PROCESSOR
 0012 I F6 0001 R                   LDA B    STLSW1
 0015 I C5 10                       BIT B    #SW1STO      TIMEOUT ?
 0017 I 26 08                       BNE      PTP1         YES-CONTINUE
 0019 I B6 0002 R                   LDA A    SXMTB1       BYTE SENT =
 001C I B1 0003 R                   CMP A    SRCVBF       BYTE RECEIVED ?
 001F I 27 39                       BEQ      PTP2         YES-CONTINUE WITH NEXT CODE
 0021 I CE 0097 I          PTP1     LDX      #PTP.ERR     NOTIFY OPERATOR
 0024 I BD 0005 R                   JSR      PDATA        OF ERROR
 0027 I CE 0002 R                   LDX      #SXMTB1      DISPLAY BYTE
 002A I BD 0007 R                   JSR      OUT2HS       SENT TO INTERFACE
 002D I 86 01                       LDA A    #1
 002F I B7 0004 R                   STA A    SXMTB2       SET ERROR INDICATOR
 0032 I CE 00BC I                   LDX      #PTP.RCV
 0035 I BD 0006 R                   JSR      PDATA1
 0038 I CE 0003 R                   LDX      #SRCVBF
```

```
003B I B6 0001 R    47          LDA A  STLSW1
003E I B5 10        48          BIT A  #SW1STO     COMMAND TIMEOUT X
0040 I 27 08        49          BEQ    PTP3        NO-DISPLAY BYTE RECEIVVED
0042 I CE 00C9 I    50          LDX    #PTP.NRP
0045 I BD 0006 R    51          JSR    PDATA1      DISPLAY NO RESPONSE INDICASTOR
0048 I 20 03        52          BRA    PTP4
004A I BD 0007 R    53 PTP3     JSR    OUT2HS      DISPLAY BYTE RECEIVED
004D I BD 0009 R    54 PTP4     JSR    PCRLF
0050 I 86 BE        55          LDA A  #'>+$80
0052 I BD 000A R    56          JSR    OUTCH
0055 I BD 0008 R    57          JSR    RTYCNT      WAIT FOR OPERATOR
0058 I 27 AF        58          BEQ    PTP6        JUMP IF RETRY
005A I 7C 0002 R    59 PTP2     INC    SXMTB1      ALL CODES OUTPUT ?
CF  PTPA0011.02.093AA CRS PROCESSOR TO PROCESSOR INTERFA08/04/78  13:10:05  PAGE   2

005D I 26 AD        60          BNE    PTP5        NO - CONTINUE
005F I CE 00CC I    61          LDX    #PTP.RCP    ANY ERRORS ENCOUNTERED ?
0062 I 7D 0004 R    62          TST    SXMTB2
0065 I 27 03        63          BEQ    PTP7        NO
0067 I CE 00EA I    64          LDX    #PTP.BCP
006A I BD 0005 R    65 PTP7     JSR    PDATA       NOTIFY OPERATOR OF COMPLETION
006D I BD 0008 R    66          JSR    RTYCNT      WAIT FOR OPERATOR ACK
0070 I 27 8E        67          BEQ    CRS.PTP     RESTART TEST
0072 I 39           68          RTS                TEST COMPLETE
                    69 *
                    70 *       SATELLITE PROC-PROC INTERFACE TEST COMMAND EQUATES
                    71 *
00FA A              72 SCDPTP   EQU    $FA         PROC-PROC INTERFACE TEST CMND
0002 A              73 SCLXPP   EQU    2           COMMAND LENGTH
0001 A              74 SCLRPP   EQU    1           RESPONSE MESG LENGTH
03E8 A              75 SCTPTP   EQU    1000        COMMAND TIMEOUT
                    76 *
                    77 *       PROC-PROC INTERFACE TEST COMMAND REQUEST BLOCK
                    78 *
0073 I              79 STLPTP   EQU    *
0073 I 01           80          FCB    SW1WRS
0074 I FA           81          FCB    SCDPTP
0075 I 02           82          FCB    SCLXPP
0076 I 01           83          FCB    SCLRPP
0077 I 03E8    A    84          FDB    SCTPTP
                    85 *
                    86 *       CRS PROC-PROC INTERFACE TEST MESSAGES
                    87 *
0079 I              88 PTP.ID   EQU    *
0079 I BE           89          FCB    '>+$80
007A I 435253       90          FCC    /CRS PROC-PROC INTERFACE TEST/
0096 I 04           91          FCB    4
                    92 *
0097 I              93 PTP.ERR  EQU    *
0097 I BE           94          FCB    '>+$80
0098 I 50524F       95          FCC    /PROC-PROC INTERFACE ERROR/
00B1 I 0D           96          FCB    $D,$A
00B2 I 0A
00B3 I 205345       97          FCC    / SENT:   /
00BB I 04           98          FCB    4
00BC I              99 PTP.RCV  EQU    *
00BC I 205245      100          FCC    / RECEIVED:  /
00C8 I 04          101          FCB    4
00C9 I             102 PTP.NRP  EQU    *
00C9 I A0          103          FCB    '           +$80,' +$80
00CA I A0
00CB I 04          104          FCB    4
                   105 *
00CC I             106 PTP.RCP  EQU    *
00CC I BE          107          FCB    '>+$80
00CD I 544553      108          FCC    /TEST COMPLETE - NO ERRORS/
00E6 I 0D          109          FCB    $D,$A,'>+$80
00E7 I 0A
00E8 I BE
00E9 I 04          110          FCB    4
                   111 *
00EA I             112 PTP.BCP  EQU    *
00EA I BE          113          FCB    '>+$80
```

```
CRSPTP(A0011 02.093AA CRS PROCESSOR TO PROCESSOR INTERFA08/04/78  13:10:07  PAGE   3

 00EB I 494E54       114          FCC    /INTERFACE PROBLEM ENCOUNTERED/
 0108 I 0D           115          FCB    $D,$A,'>+$80
 0109 I 0A
 010A I BE
 010B I 04           116          FCB    4
                     117 *
 010C                118          END
CRSPTP(A0011.02.093AA CRS PROCESSOR TO PROCESSOR INTERFA08/04/78  13:10:07  PAGE   4

   NO ERRORS
 ISECT LENGTH --   268
 DSECT LENGTH --     0

< CRS.PTP    0000 I    25      7    67
> OUT2HS     0007      14     14    41    53
> OUTCH      000A      17     17    56
> PCRLF      0009      16     16    54
> PDATA      0005      13     13    27    39    65
> PDATA1     0006      13     13    45    51
  PTP.BCP    00EA I   112     64
  PTP.ERR    0097 I    93     38
  PTP.ID     0079 I    88     26
  PTP.NRP    00C9 I   102     50
  PTP.RCP    00CC I   106     61
  PTP.RCV    00BC I    99     44
  PTP1       0021 I    38     34
  PTP2       005A I    59     37
  PTP3       004A I    53     49
  PTP4       004D I    54     52
  PTP5       000C I    30     60
  PTP6       0009 I    29     58
  PTP7       006A I    65     63
> RTYCNT     0008      15     15    57    66
  SCDPTP     00FA A    72     81
  SCLRPP     0001 A    74     83
  SCLXPP     0002 A    73     82
  SCTPTP     03E8 A    75     84
> SRCVBF     0003      11     11    36    46
> STLCRQ     0000       9      9    31
  STLPTP     0073 I    79     30
> STLSW1     0001      10     10    32    47
  SW1STO     0010 A    21     33    48
  SW1WRS     0001 A    22     80
> SXMTB1     0002      11     11    28    35    40    59
> SXMTB2     0004      11     11    29    43    62
CRSPRM(A0011.02.094AA CRS PROM BOARD TEST)              08/04/78  10:01:51  PAGE   1

                       2 *
                       3 *       CRS PROM BOARD TEST
                       4 *
 0000 I                5          ISEC
                       6 *
                       7          DEF    CRS.PROM
                       8          DEF    PROM.TST
                       9 *
                      10          REF    PDATA
                      11          REF    RTYCNT
                      12          REF    OUT2HS
                      13 *
                      14          REF    STSTAT
                      15 *
                      16 *       PROM BOARD TEST CONTROL PARAMETERS
                      17 *
 0800 A               18 PROM.CHL EQU    2048         PROM CHIP SIZE (BYTES)
                      19 *
 7F00 A               20 TBL.CKSM EQU    $7F00
                      21 *
                      22 *
 0000 I               23 CRS.PROM EQU    *
 0000 I CE 0106 I     24          LDX    #PROM.ID
 0003 I BD 0000 R     25          JSR    PDATA        IDNTIFY TEST
 0006 I 8D 01         26          BSR    PROM.TST     PERFORM PROM TEST
```

```
0008 I 39              27            RTS
                       28 *
                       29 *
0009 I                 30 PROM.TST   EQU     *
0009 I CE 7F00 A       31            LDX     #TBL.CKSM     INITIALIZE CKSM
000C I FF 0000 D       32            STX     PTR.CKSM      TABLE PNTR
000F I CE 0800 A       33            LDX     #PROM.CHL
0012 I FF 0004 D       34            STX     PROM.BYT      INITIALIZE PROM BYTE COUNT
0015 I CE 00FC I       35            LDX     #TBL.PRBD     INITIALIZE PROM
0018 I FF 0002 D       36 PRM7       STX     PTR.CTB       MEMORY MAP PNTR
001B I EE 00           37            LDX     0,X
001D I FF 000A D       38 PRM2       STX     PTR.MPTR
0020 I 7F 0007 D       39            CLR     CKSM.ADC
0023 I 7F 0008 D       40            CLR     CKSM.ADC+1    INITIALIZE ADDITIVE
0026 I 7F 0009 D       41            CLR     CKSM.ADC+2    CKSM COMPUTATION AREA
0029 I 4F              42            CLR A                 INITIALIZE XOR CKSM
002A I B7 0006 D       43            STA A   CKSM.EOR      COMPUTATION AREA
002D I FE 000A D       44            LDX     PTR.MPTR
0030 I A6 00           45 PRM2A      LDA A   0,X           COMPUTE EOR
0032 I 16              46            TAB                   CKSM
0033 I B8 0006 D       47            EOR A   CKSM.EOR
0036 I B7 0006 D       48            STA A   CKSM.EOR
0039 I 4F              49            CLR A
003A I FB 0009 D       50            ADD B   CKSM.ADC+2
003D I F7 0009 D       51            STA B   CKSM.ADC+2
0040 I B9 0008 D       52            ADC A   CKSM.ADC+1
0043 I B7 0008 D       53            STA A   CKSM.ADC+1
0046 I 86 00           54            LDA A   #0
0048 I B9 0007 D       55            ADC A   CKSM.ADC      COMPUTE ADDITIVE
004B I B7 0007 D       56            STA A   CKSM.ADC      CKSM
004E I FF 000A D       57            STX     PTR.MPTR      SAVE CURRENT PNTR
0051 I FE 0004 D       58            LDX     PROM.BYT
0054 I 09              59            DEX
CPSPRM(A0011.02.094AA CRS PROM BOARD TEST)                 08/04/78  10:01:52  PAGE   2

0055 I FF 0004 D       60            STX     PROM.BYT      END-OF-PROM CHIP ?
0058 I 27 09           61            BEQ     PRM1          YES-EXAMINE COMPUTED & EXPECTED CKSMS
005A I FE 000A D       62 PRM6       LDX     PTR.MPTR      BUMP CURRENT MEMORY PNTR
005D I 08              63            INX
005E I FF 000A D       64            STX     PTR.MPTR
0061 I 20 CD           65            BRA     PRM2A
0063 I CE 0800 A       66 PRM1       LDX     #PROM.CHL
0066 I FF 0004 D       67            STX     PROM.BYT
0069 I FE 0000 D       68            LDX     PTR.CKSM
006C I B6 0006 D       69            LDA A   CKSM.EOR
006F I A1 00           70            CMP A   0,X           EOR CKSM MATCH EXPECTED CKSM
0071 I 26 15           71            BNE     PRM3          NO-NOTIFY OPERATOR
0073 I B6 0007 D       72            LDA A   CKSM.ADC
0076 I F6 0008 D       73            LDA B   CKSM.ADC+1
0079 I A1 01           74            CMP A   1,X
007B I 26 0B           75            BNE     PRM3
007D I E1 02           76            CMP B   2,X
007F I 26 07           77            BNE     PRM3
0081 I B6 0009 D       78            LDA A   CKSM.ADC+2
0084 I A1 03           79            CMP A   3,X
0086 I 27 3E           80            BEQ     PRM4
0088 I 7D 0003 R       81 PRM3       TST     STSTAT        SELF TEST MODE
008B I 26 03           82            BNE     PRM5          YES-CONTINUE
008D I 86 01           83            LDA A   #1            SET CC FOR ERROR RETURN
008F I 39              84            RTS                   RETURN TO CALLER
0090 I CE 011B I       85 PRM5       LDX     #PROM.ERR     NOTIFY OPERATOR OF
0093 I BD 0000 R       86            JSR     PDATA         ERROR
0096 I CE 0127 I       87            LDX     #PROM.CCK
0099 I BD 0000 R       88            JSR     PDATA
009C I CE 0006 D       89            LDX     #CKSM.EOR     DISPLAY COMPUTED EXCLUSIVE
009F I BD 0002 R       90            JSR     OUT2HS        OR CHECK SUM
00A2 I CE 0139 I       91            LDX     #PROM.ECK
00A5 I BD 0000 R       92            JSR     PDATA
00A8 I FE 0000 D       93            LDX     PTR.CKSM      DISPLAY EXPECTED EXCLUSIVE
00AB I BD 0002 R       94            JSR     OUT2HS        OR CHECKSUM
00AE I CE 014B I       95            LDX     #PROM.RPB     INFORM OPERATOR OF WHICH
00B1 I BD 0000 R       96            JSR     PDATA         BOARD TO REPLACE
00B4 I FE 0002 D       97            LDX     PTR.CTB
00B7 I 08              98            INX
```

```
00B8 I 08                  INX
00B9 I 08                  INX
00BA I 08                  INX
00BB I BD 0002 R           JSR    OUT2HS      DISPLAY BOARD # TO REPLACE
00BE I BD 0001 R           JSR    RTYCNT      WAIT FOR OPERATOR ACKNOWLEDGE
00C1 I 26 03               BNE    PRM4
00C3 I 7E 0009 I           JMP    PROM.TST
00C6 I FE 0000 D    PRM4   LDX    PTR.CKSM
00C9 I 08                  INX
00CA I 08                  INX
00CB I 08                  INX
00CC I 08                  INX
00CD I FF 0000 D           STX    PTR.CKSM    INCR CKSM TABLE PNTR
00D0 I B6 000A D           LDA A  PTR.MPTR
00D3 I F6 000B D           LDA B  PTR.MPTR+1
00D6 I FE 0002 D           LDX    PTR.CTB
00D9 I A1 02               CMP A  2,X         NOARD OVERLAP ?
00DB I 27 0A               BEQ    PRM4A
00DD I FE 000A D    PRM4B  LDX    PTR.MPTR
CRSPRM(A0011.02.094AA CRS PROM BOARD TEST)          08/04/78  10:01:54  PAGE   3

00E0 I 08                  INX
00E1 I FF 000A D           STX    PTR.MPTR
00E4 I 7E 001D I           JMP    PRM2
00E7 I E1 03        PRM4A  CMP B  3,X
00E9 I 26 F2               BNE    PRM4B       CONTINUE IF NO OVERLAP
00EB I FE 0002 D           LDX    PTR.CTB     INCR MEMORY MAP PNTR
00EE I 08                  INX
00EF I 08                  INX
00F0 I 08                  INX
00F1 I 08                  INX
00F2 I 08                  INX
00F3 I 8C 0106 I           CPX    #TBL.PRBE   ALL BOARDS PROCESSED ?
00F6 I 27 03               BEQ    PRM8        YES
00F8 I 7E 0018 I           JMP    PRM7        NO-PROCESS NEXT BOARD
00FB I 39           PRM8   RTS                RETURN TO CALLER
                    *
                    *      CRS PROM BOARD MEMORY MAP
                    *
00FC I              TBL.PRBD  EQU  *
                    *
00FC I 9000     A   PROM.BD1  FDB  $9000,$CFFF
00FE I CFFF     A
0100 I 01                  FCB    1           BOARD ID
                    *
0101 I D000     A   PROM.BD2  FDB  $D000,$EFFF
0103 I EFFF     A
0105 I 02                  FCB    2           BOARD ID
                    *
0106 I              TBL.PRBE  EQU  *          END-OF-TABLE
                    *
                    *      CRS PROM BOARD TEST MESSAGES
                    *
0106 I              PROM.ID   EQU  *
0106 I BE                  FCB    '>+$80
0107 I 435253              FCC    /CRS PROM BOARD TEST/
011A I 04                  FCB    4
                    *
011B I              PROM.ERR  EQU  *
011B I BE                  FCB    '>+$80
011C I 50524F              FCC    /PROM ERROR/
0126 I 04                  FCB    4
0127 I              PROM.CCK  EQU  *
0127 I 20434F              FCC    / COMPUTED CKSM:   /
0138 I 04                  FCB    4
0139 I              PROM.ECK  EQU  *
0139 I 204558              FCC    / EXPECTED CKSM:   /
014A I 04                  FCB    4
                    *
014B I              PROM.RPB  EQU  *
014B I 205245              FCC    / REPLACE CRS PROM BOARD /
0163 I 04                  FCB    4
                    *
                    *
```

```
0000 I          169          DSEC
                170 *
                171 *        STORAGE REQUIREMENTS FOR PROM BOARD TEST
                172 *
0000 D          173 PTR.CKSM   RMB    2          CKSM TABLE PNTR
CRSPRM(A0011.02.094AA CRS PROM BOARD TEST)          08/04/78  10:01:55  PAGE    4

0002 D          174 PTR.CTB    RMB    2          PROM MEMORY MAP PNTR
0004 D          175 PROM.BYT   RMB    2          PROM BYTE COUNT
0006 D          176 CKSM.EOR   RMB    1          EXCLUSIVE OR CKSM
0007 D          177 CKSM.ADC   RMB    3          ADDITIVE CKSM
000A D          178 PTR.MPTR   RMB    2          CURRENT PROM MEMORU PNTR
                179 *
000C            180          END
CRSPRM(A0011.02.094AA CRS PROM BOARD TEST)          08/04/78  10:01:55  PAGE    5

  NO ERRORS
 ISECT LENGTH --   356
 DSECT LENGTH --    12

 CKSM.ADC  0007 D  177   39   40   41   50   51   52   53   55   56   72   73   78
 CKSM.EOR  0006 D  176   43   47   48   69   89
< CRS.PROM 0000 I   23    7
> OUT2HS   0002     12   12   90   94  102
> PDATA    0000     10   10   25   86   88   92   96
 PRM1      0063 I   66   61
 PRM2      001D I   38  120
 PRM2A     0030 I   45   65
 PRM3      0088 I   81   71   75   77
 PRM4      00C6 I  106   80  104
 PRM4A     00E7 I  121  116
 PRM4B     00DD I  117  122
 PRM5      0090 I   85   82
 PRM6      005A I   62
 PRM7      0018 I   36  131
 PRM8      00FB I  132  130
 PROM.BD1  00FC I  138
 PROM.BD2  0101 I  141
 PROM.BYT  0004 D  175   34   58   60   67
 PROM.CCK  0127 I  157   87
 PROM.CHL  0800 A   18   33   66
 PROM.ECK  0139 I  160   91
 PROM.ERR  011B I  153   85
 PROM.ID   0106 I  148   24
 PROM.RPB  014B I  164   95
< PROM.TST 0009 I   30    8   26  105
 PTR.CKSM  0000 D  173   32   68   93  106  111
 PTR.CTB   0002 D  174   36   97  114  123
 PTR.MPTR  000A D  178   38   44   57   62   64  112  113  117  119
> RTYCNT   0001     11   11  103
> STSTAT   0003     14   14   81
 TBL.CKSM  7F00 A   20   31
 TBL.PRBD  00FC I  136   35
 TBL.PRBE  0106 I  144  129
```

That which is claimed is:

1. A method for performing a seismic geophysical survey wherein a central control means is utilized to control and acquire data from a plurality of remote geophone monitoring means, each of said plurality of remote geophone monitoring means being adapted to receive analog electrical signals from at least one geophone means, comprising the steps of:

activating at least one of said plurality of remote geophone monitoring means;

providing analog electrical signals, representative of seismic waves, from at least one of a plurality of geophone means to a respective one of each activated remote geophone monitoring means, said remote geophone monitoring means performing preselected data processing operations on said analog electrical signals, said preselected data processing operations comprising the steps of:

sampling said analog electrical signals; and converting the thus sampled analog electrical signals from analog form to digital form;

transmitting the sampled electrical signals, which have been converted to digital form, as seismic data to said central control means; and storing said seismic data on a recording medium in said central control means, said step of storing said seismic data on a recording medium in said central control means comprising the steps of:

using a central computer to control said recording medium;

using a peripheral computer, under the control of said central computer, to supply said seismic data to said recording medium to be recorded;

detecting an error in the transfer of said data from said peripheral computer to said recording medium;

supplying an indication that an error has been detected, in the transfer of said data from said peripheral computer to said recording medium, to said central computer; and using said central computer to command said peripheral computer to retransmit said data to said recording medium to thereby correct the error which occurred in the previous transfer of said data from said peripheral computer to said recording medium.

2. A method in accordance with claim 1 wherein said recording medium comprises a formatter and a magnetic tape unit, said formatter accepting commands from said central computer and initiating the desired operations of said magnetic tape unit in response to the commands from said central computer.

3. A method in accordance with claim 2 wherein said step of using said central computer to control said recording medium comprises enabling said formatter to activate said tape recording unit and to generate a first signal which indicates that said tape recording unit is ready to receive data.

4. A method in accordance with claim 3 wherein said step of using said peripheral computer to supply said data to said recording medium to be recorded comprises:

using said central computer to generate a second signal representative of a command to write data from said peripheral computer to said tape recording unit; and transferring data from said peripheral computer through said formatter to said tape recording unit in response to said first signal and said second signal.

5. A method for storing data on a recording medium comprising the steps of:

using a central computer to control said recording medium;

using a peripheral computer, under the control of said central computer, to supply said data to said recording medium to be recorded;

detecting an error in the transfer of said data from said peripheral computer to said recording medium;

supplying an indication that an error has been detected, in the transfer of said data from said peripheral computer to said recording medium, to said central computer;

using said central computer to command said peripheral computer to retransmit said data to said recording medium to thereby correct the error which occurred in the previous transfer of said data from said peripheral computer to said recording medium.

6. A method in accordance with claim 5 wherein said recording medium comprises a formatter and a magnetic tape unit, said formatter accepting commands from said central computer and initiating the desired operations of said magnetic tape unit in response to the commands from said central computer.

7. A method in accordance with claim 6 wherein said step of using said central computer to control said recording medium comprises enabling said formatter to activate said tape recording unit and to generate a first signal which indicates that said tape recording unit is ready to receive data.

8. A method in accordance with claim 7 wherein said step of using said peripheral computer to supply said data to said recording medium to be recorded comprises:

using said central computer to generate a second signal representative of a command to write data from said peripheral computer to said tape recording unit; and transferring data from said peripheral computer through said formatter to said tape recording unit in response to said first signal and said second signal.

9. A seismic system for geophysical exploration comprising:

a plurality of remote geophone monitoring means, each of said plurality of remote geophone monitoring means being adapted to receive electrical signals from at least one geophone means; and a central control means for generating electrical signals for initiating the operation of said plurality of remote geophone monitoring means;

each of said plurality of remote geophone monitoring means comprising:

means for sampling electrical signals, provided from at least one geophone means, and for converting the sampled electrical signals into digital seismic data; and means for transmitting said digital seismic data to said central control means;

said central control means comprising:

means for receiving data from said plurality of remote geophone monitoring means;

a central computer means;

a peripheral computer means;

a recording means;

means for interfacing said central computer means to said peripheral computer means to enable said central computer means to control said peripheral computer means;

means for interfacing said central computer means to said recording means to enable said central computer means to control said recording means;

means for interfacing said peripheral computer means to said recording means to enable data to be transferred from said peripheral computer means to said recording means;

means for interfacing said peripheral computer means to said means for receiving data from said plurality of remote geophone monitoring means to thereby enable data to be transferred from said means for receiving data, from said plurality of remote geophone monitoring means, to said peripheral computer means;

means for detecting an error in the transfer of the data from said peripheral computer means to said recording means and for generating a first signal representative of an error signal; and means for supplying said first signal to said central computer means, said central computer means commanding said peripheral computer means to retransmit the data to said recording means, in response to said first signal, to thereby correct the error which occurred in the previous transfer of data from said peripheral computer means to said recording means.

10. Apparatus in accordance with claim 9 wherein said recording means comprises a formatter and a magnetic tape unit, said formatter accepting commands from said central computer means and initiating the desired operations of said magnetic tape unit in response to the commands from said central computer means.

11. Apparatus in accordance with claim 10 wherein said means for interfacing said central computer means to said recording means comprises:

a decoder means;

means for supplying address and command signals from said central computer means to said decoder means to thereby enable said decoder means to generate a plurality of clock signals which are utilized in said means for interfacing said central computer means to said peripheral computer means and in said means for interfacing said central computer means to said recording means;

a counter means;

means for supplying at least a portion of the data lines from said central computer means to said counter means to thereby enable said central computer means to preset the number of characters to be written from said peripheral computer means to said recording means in said counter means;

data register means;

means for supplying at least a portion of the data lines from said central computer to said data register means; and means for supplying data, supplied from said central computer means to said data register means, from said data register means to said formatter to thereby enable said central computer means to initiate a desired operation of said magnetic tape unit by means of said formatter.

12. Apparatus in accordance with claim 11 wherein said means for interfacing said peripheral computer means to said recording means comprises:

means for supplying at least a portion of the data lines from said peripheral computer means to said data register means; and means for enabling said data register means to transfer the data, from the data lines of said peripheral computer, through said formatter to said magnetic tape unit.

13. Apparatus comprising:

a central computer means;

a peripheral computer means;

a recording means;

means for interfacing said central computer means to said peripheral computer means to enable said central computer means to control said peripheral computer means;

means for interfacing said central computer means to said recording means to enable said central computer means to control said recording means;

means for interfacing said peripheral computer means to said recording means to enable data to be transferred from said peripheral computer means to said recording means;

means for detecting an error in the transfer of the data from said peripheral computer means to said recording means and for generating a first signal representative of an error signal; and means for supplying said first signal to said central computer means, said central computer means commanding said peripheral computer means to retransmit the data to said recording means, in response to said first signal, to thereby correct the error which occurred in the previous transfer of data from said peripheral computer means to said recording means.

14. Apparatus in accordance with claim 13 wherein said recording means comprises a formatter and a magnetic tape unit, said formatter accepting commands from said central computer means and initiating the desired operations of said magnetic tape unit in response to the commands from said central computer means.

15. Apparatus in accordance with claim 14 wherein said means for interfacing said central computer means to said recording means comprises:

a decoder means;

means for supplying address and command signals from said central computer means to said decoder means to thereby enable said decoder means to generate a plurality of clock signals which are utilized in said means for interfacing said central computer means to said peripheral computer means and in said means for interfacing said central computer means to said recording means;

a counter means;

means for supplying at least a portion of the data lines from said central computer means to said counter means to thereby enable said central computer means to preset the number of characters to be written from said peripheral computer to said recording means in said counter means;

data register means;

means for supplying at least a portion of the data lines from said central computer means to said data register means; and means for supplying data, supplied from said central computer means to said data register means, from said data register means to said formatter to thereby enable said central computer means to initiate a desired operation of said magnetic tape unit by means of said formatter.

16. Apparatus in accordance with claim 15 wherein said means for interfacing said peripheral computer means to said recording means comprises:

means for supplying at least a portion of the data lines from said peripheral computer means to said data register means; and means for enabling said data register means to transfer the data, from the data lines of said peripheral computer means, through said formatter to said magnetic tape unit.

* * * * *